US008078481B2

(12) United States Patent
Steinbarth et al.

(10) Patent No.: US 8,078,481 B2
(45) Date of Patent: Dec. 13, 2011

(54) BENEFITS ADMINISTRATION SYSTEM AND METHODS OF USE AND DOING BUSINESS

(76) Inventors: John Steinbarth, Auburn, CA (US); Patricia Steinbarth, Auburn, CA (US)

( * ) Notice: Subject to any disclaimer, the term of this patent is extended or adjusted under 35 U.S.C. 154(b) by 1192 days.

(21) Appl. No.: 11/006,278

(22) Filed: Dec. 6, 2004

(65) Prior Publication Data

US 2006/0064313 A1 Mar. 23, 2006

Related U.S. Application Data

(60) Provisional application No. 60/526,961, filed on Dec. 5, 2003.

(51) Int. Cl.
*G06Q 10/00* (2006.01)

(52) U.S. Cl. .............................. 705/4; 705/1.1; 705/322

(58) Field of Classification Search ............... 705/4, 1.1, 705/322
See application file for complete search history.

(56) References Cited

U.S. PATENT DOCUMENTS 6,068,156 A * 5/2000 Liff et al. .......................... 221/7
7,054,844 B2 * 5/2006 Fletcher et al. ................. 705/75
2002/0049617 A1 * 4/2002 Lencki et al. ..................... 705/4
2002/0082991 A1 * 6/2002 Friedman et al. ............... 705/40
2002/0103680 A1 * 8/2002 Newman .......................... 705/4
2002/0116231 A1 * 8/2002 Hele et al. ......................... 705/4
2003/0069870 A1 * 4/2003 Ras et al. ........................ 706/54
2003/0182147 A1 * 9/2003 Mahoney et al. ................. 705/1
2004/0064472 A1 * 4/2004 Oetringer et al. ............. 707/102
2004/0073615 A1 * 4/2004 Darling ......................... 709/206
2004/0260628 A1 * 12/2004 Minton et al. ................. 705/30

OTHER PUBLICATIONS

Burke Christensen's article Reinstatement Period Presents Issues and Ethical Questions, Trusts and Estates, Dec. 1992, p. 57.*

* cited by examiner

*Primary Examiner* — Kirsten Apple
*Assistant Examiner* — Scott Trotter
(74) *Attorney, Agent, or Firm* — Klarquist Sparkman, LLP

(57) ABSTRACT

An automated benefit administration system and methods of use and doing business. The full system includes a wide range of features including application of business rules to enrollment, eligibility, and maintenance data input, making of business decisions based on the specific data entered, and issuing of notices based on business rule discrepancies including notices to third parties when deemed appropriate. The full system also is secure while providing remote access, including through the Internet, limits access based on user hierarchy, allows user customization of various features including communications vehicles (e-mail, letter correspondence, or facsimile) and of the format of certain communications, provides automatic enrollment in Cobra without re-entry of beneficiary data, accomplishes various types of financial reconciliation, accommodates differing organizational structures and groupings of entities, provides business rule over-ride capability for certain users, and provides robust information about carriers and their services.

16 Claims, 490 Drawing Sheets

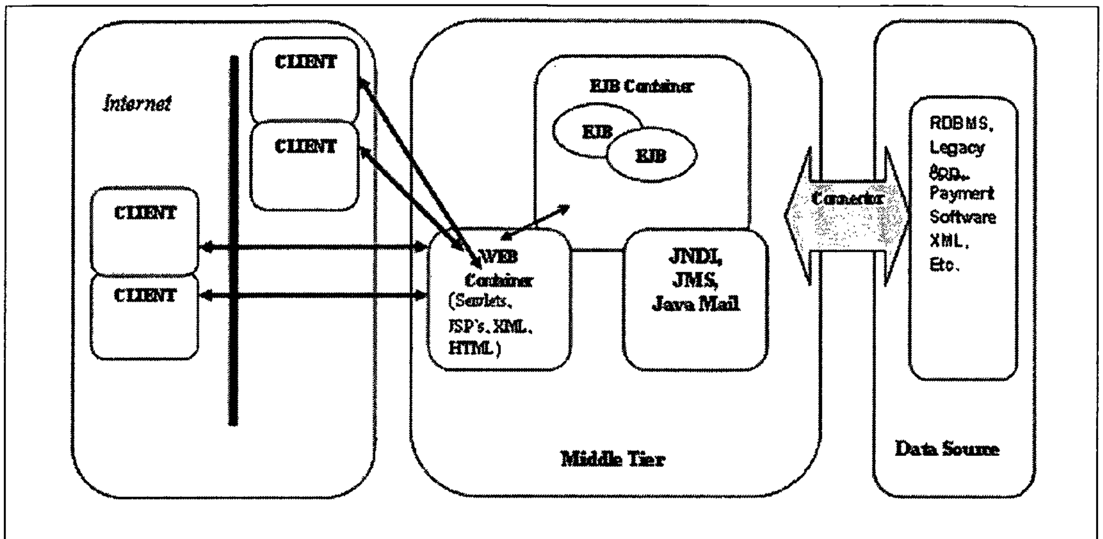
(Figure A-1)
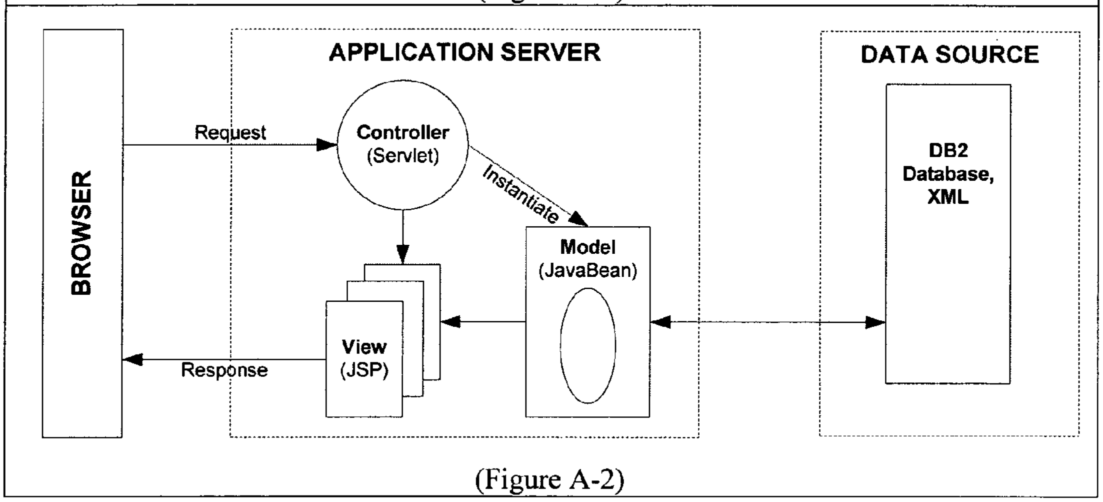
(Figure A-2)

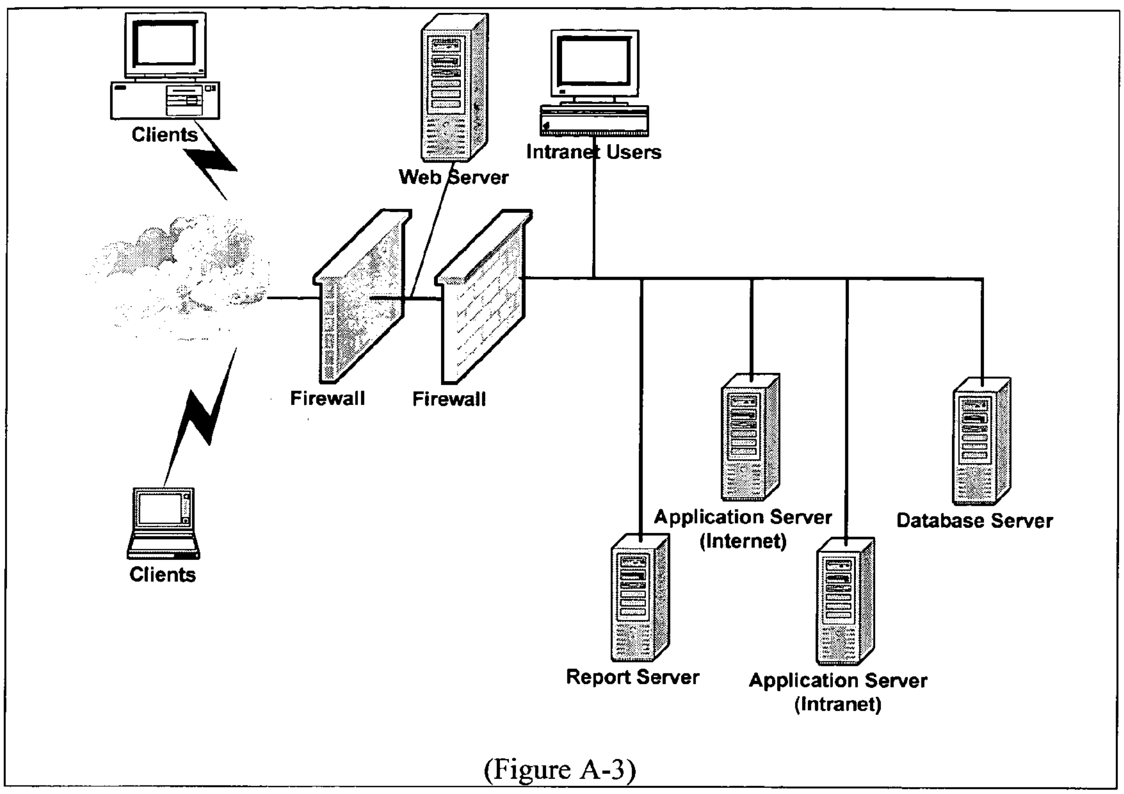
(Figure A-3)

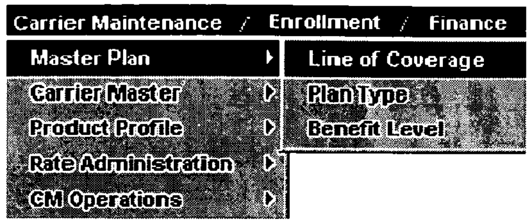
(Figure B-1)
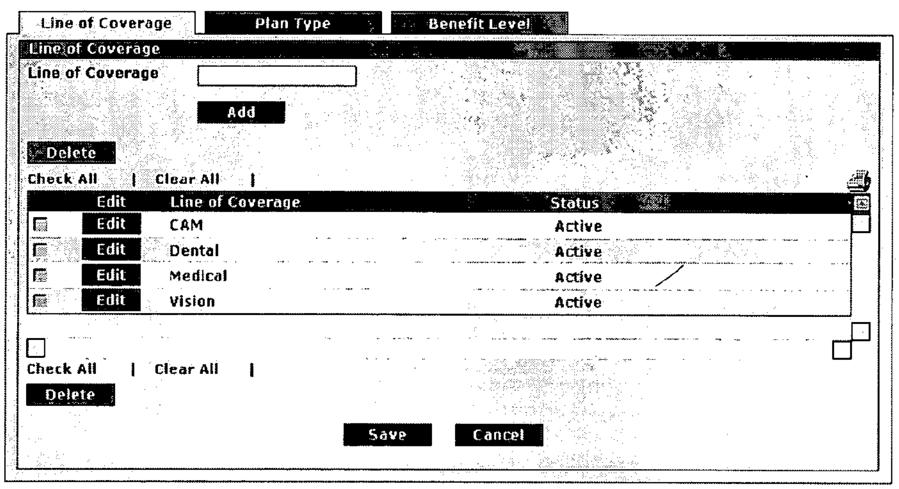
(Figure B-2)
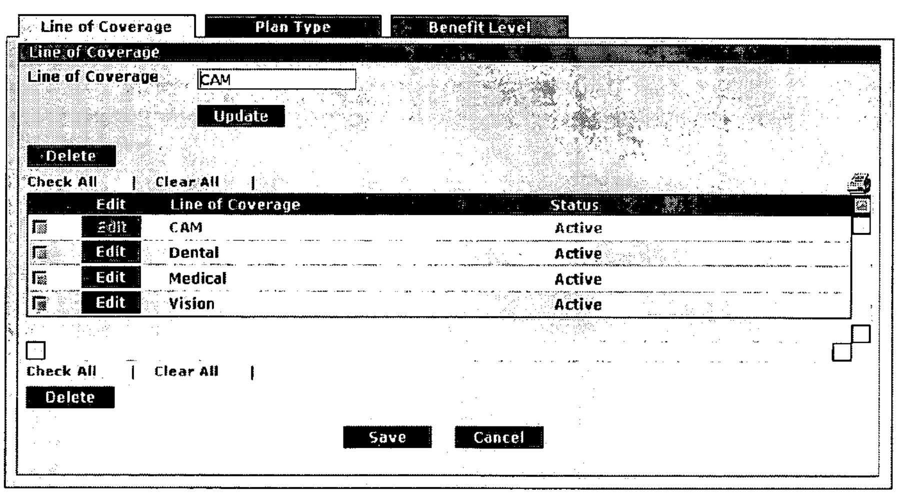
(Figure B-3)

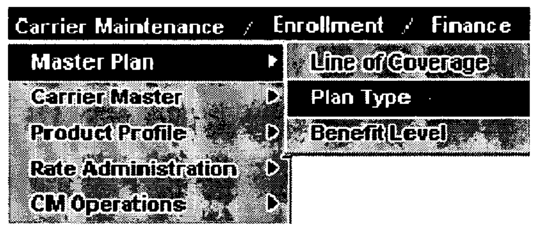
(Figure B-4)
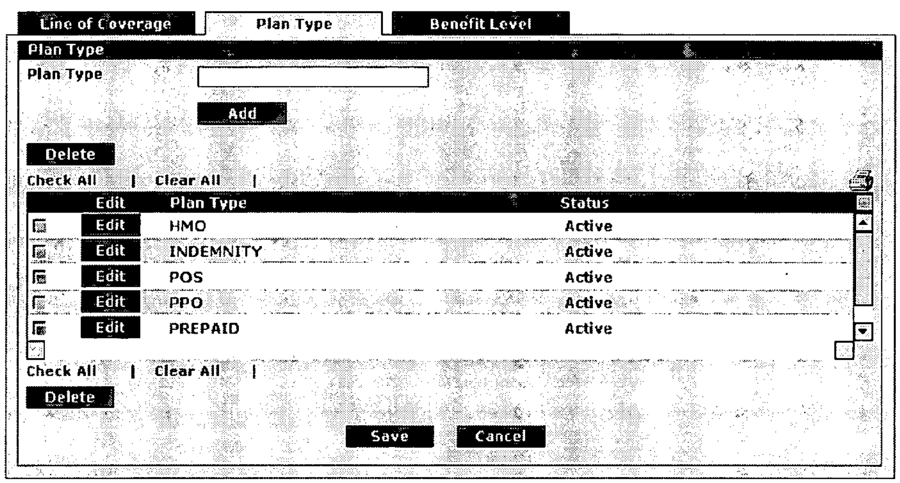
(Figure B-5)
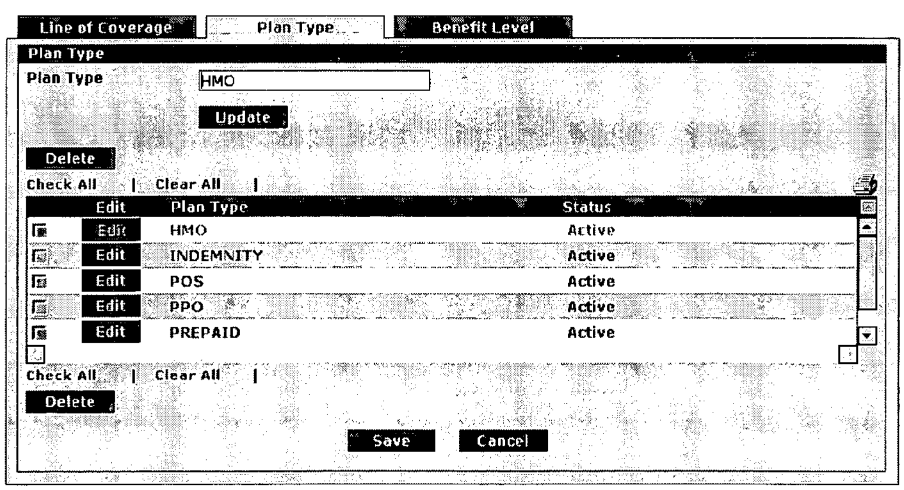
(Figure B-6)

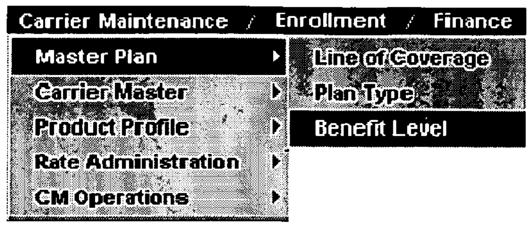
(Figure B-7)
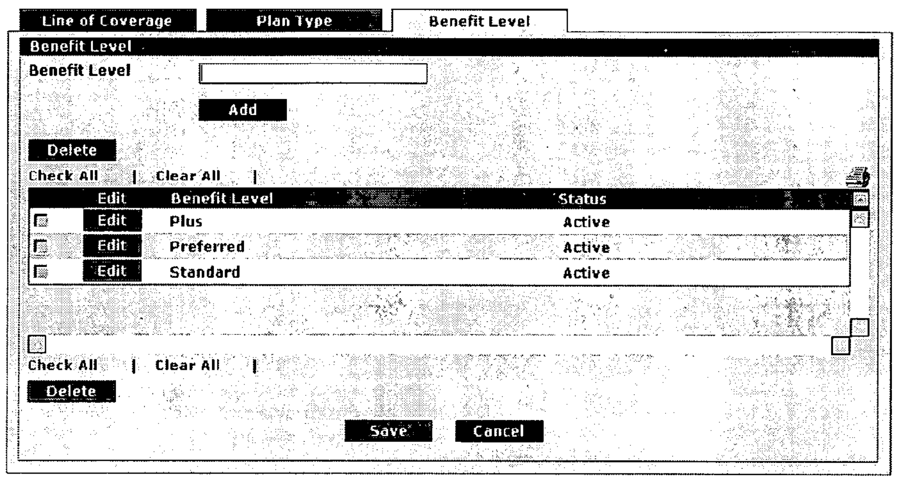
(Figure B-8)
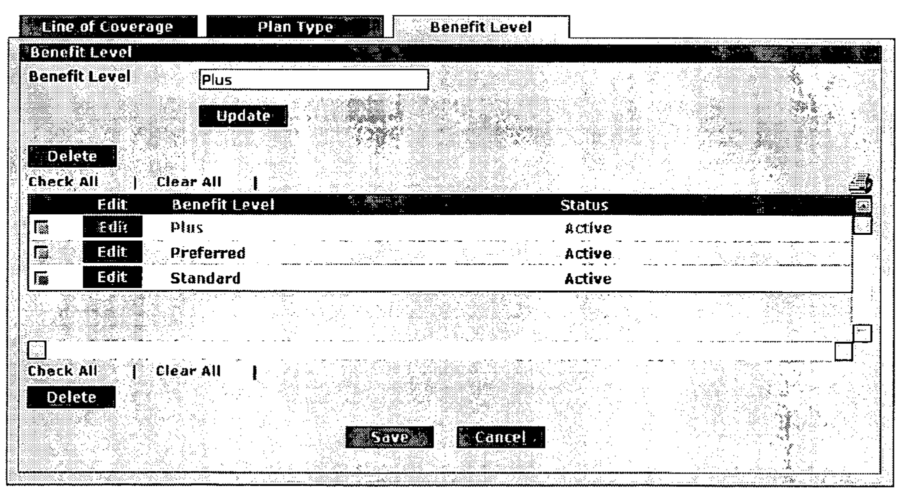
(Figure B-9)

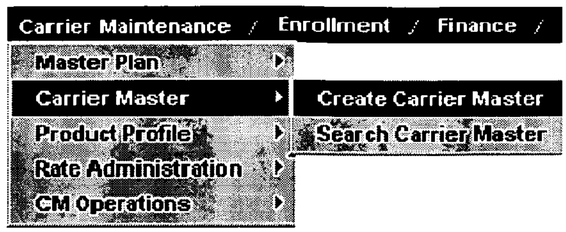
(Figure B-10)
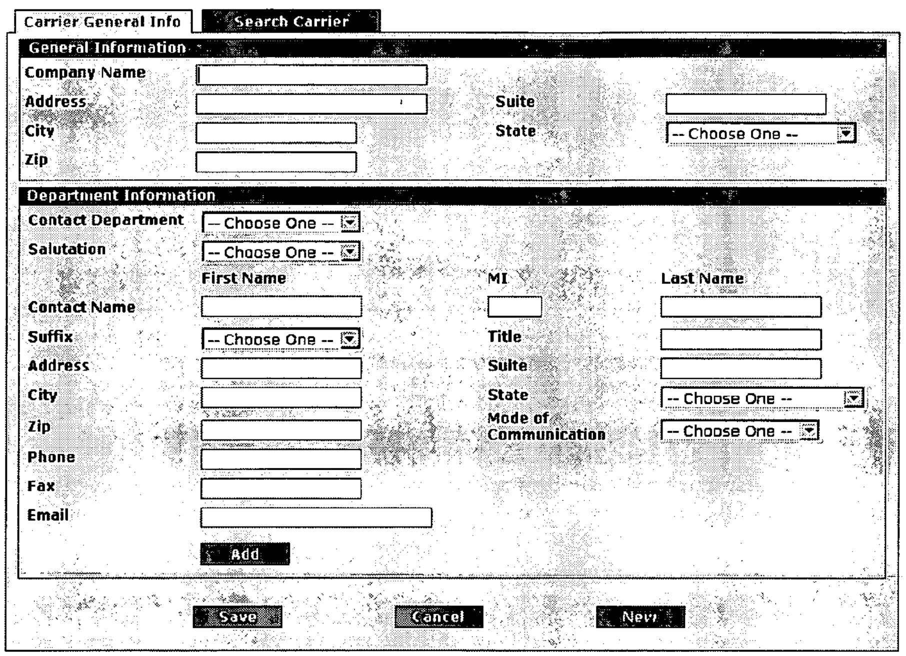
(Figure B-11)
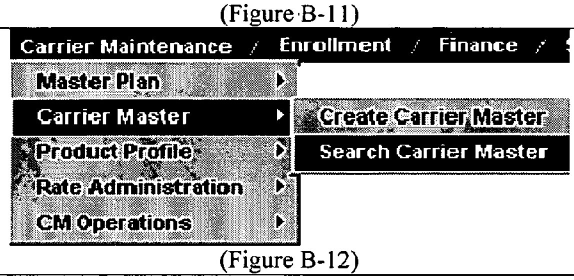
(Figure B-12)

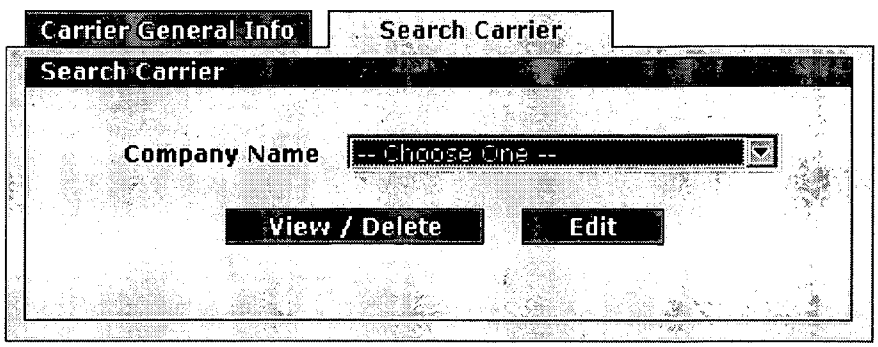
(Figure B-13)
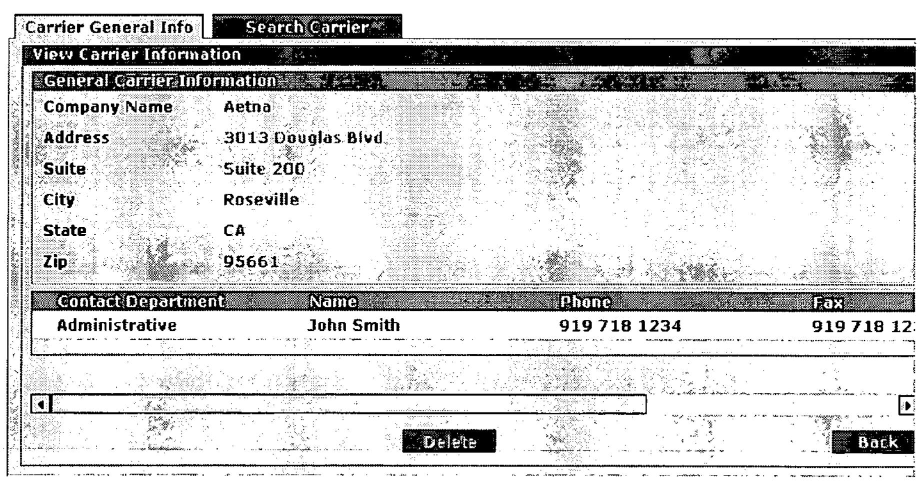
(Figure B-14)

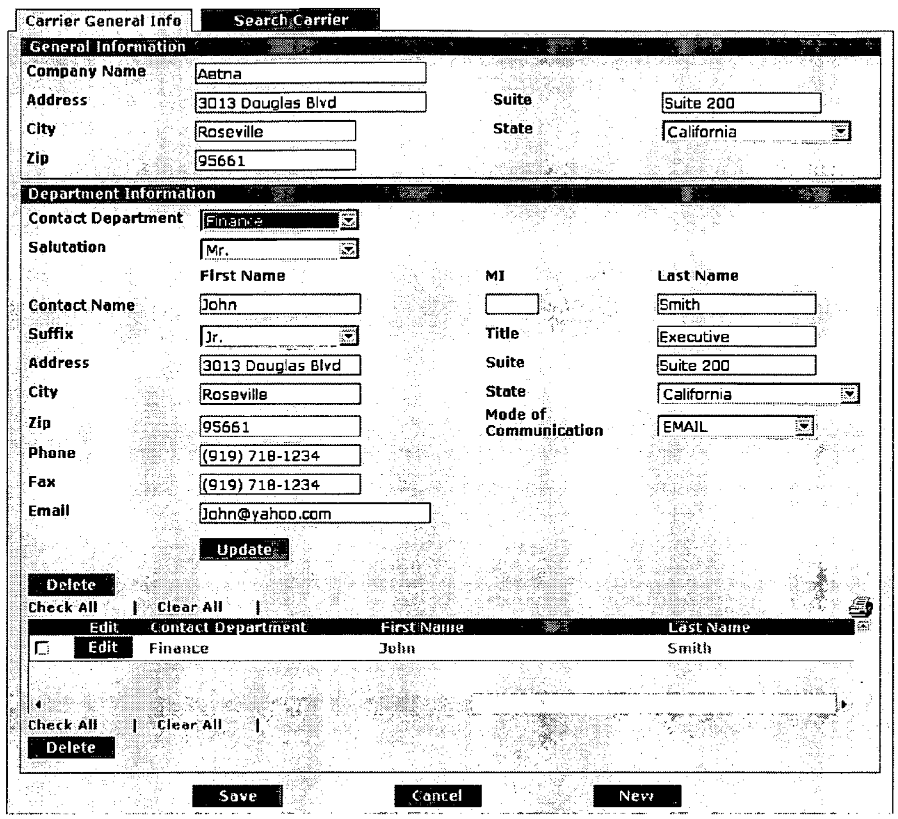
(Figure B-15)
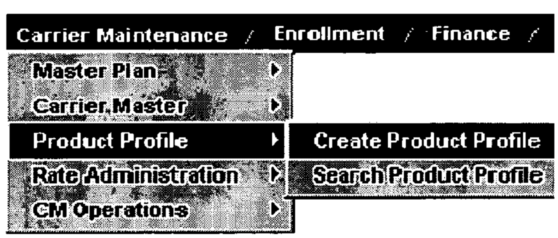
(Figure B-16)

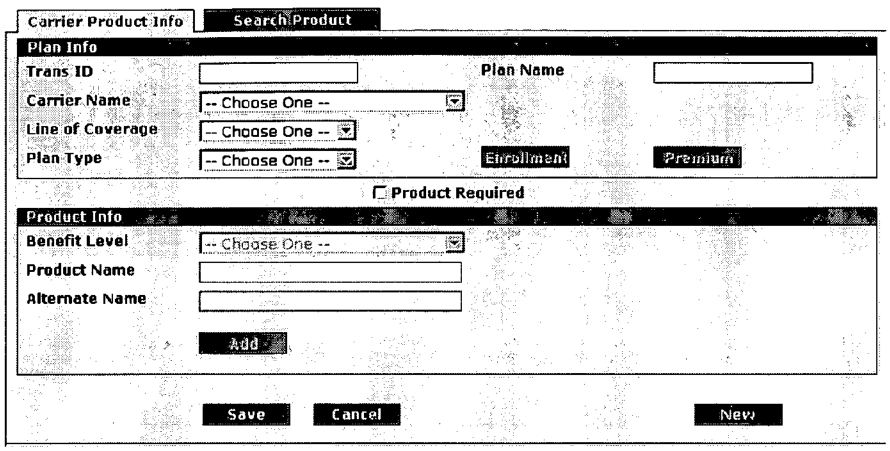
(Figure B-17)
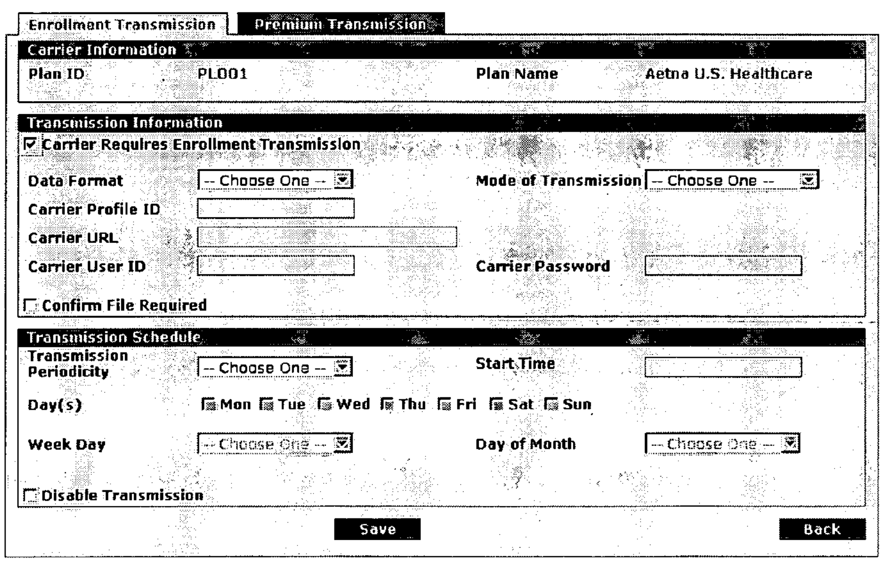
(Figure B-18)

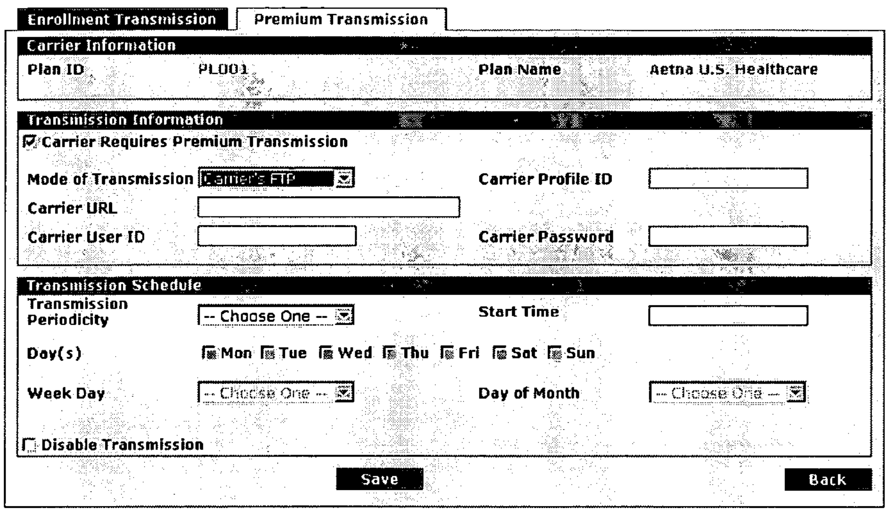
(Figure B-19)
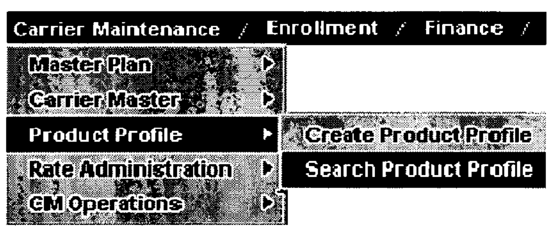
(Figure B-20)
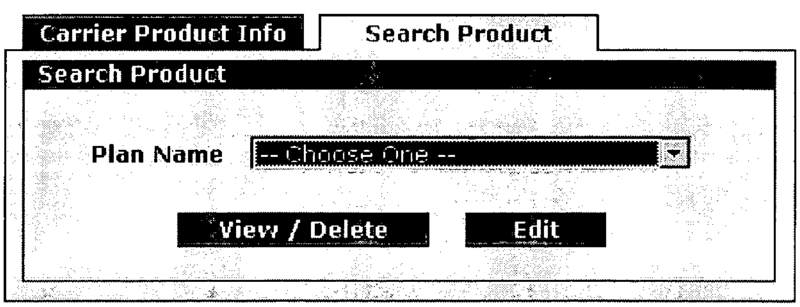
(Figure B-21)

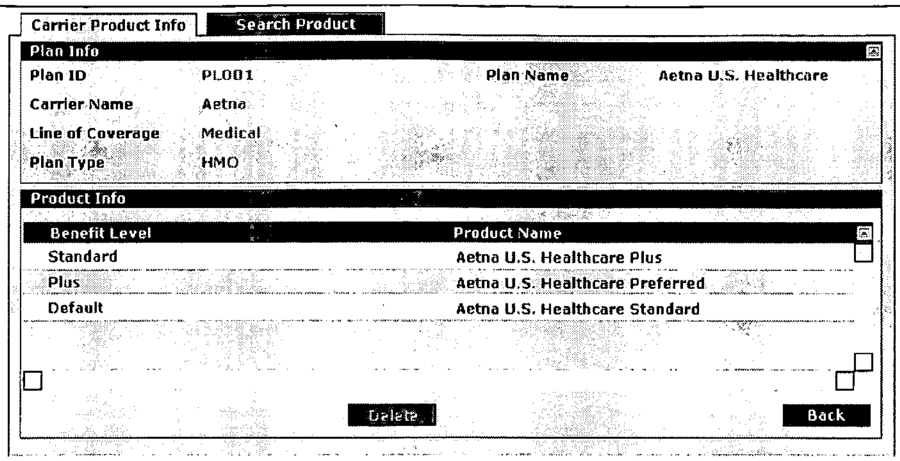
(Figure B-22)
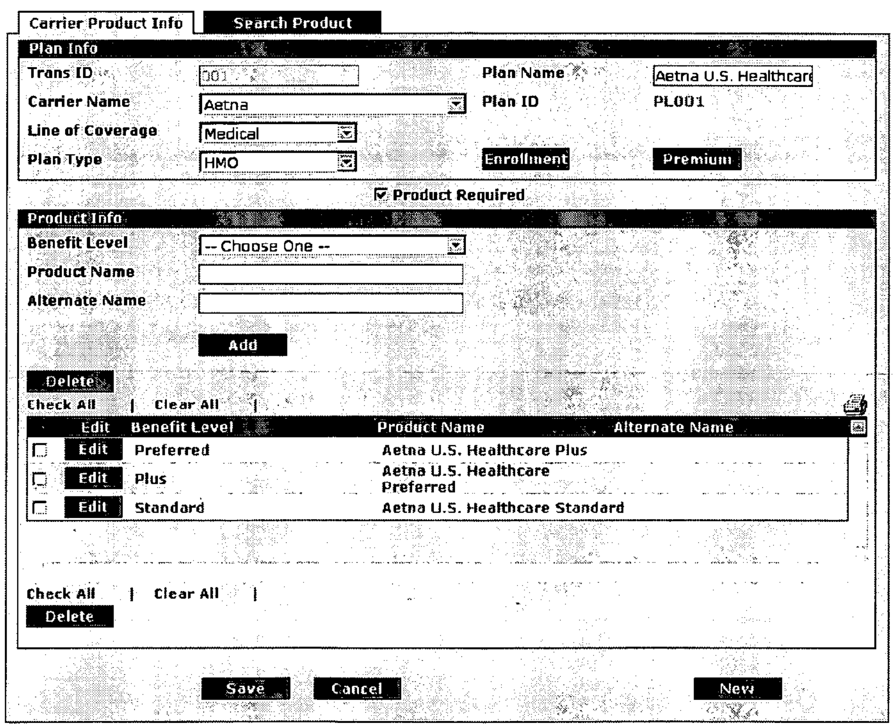
(Figure B-23)

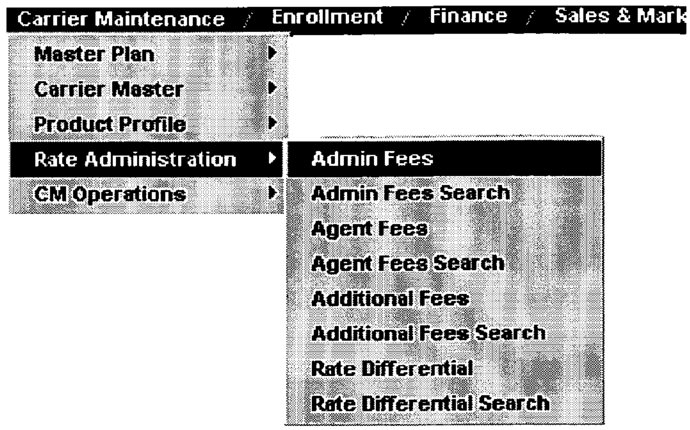
(Figure B-24)
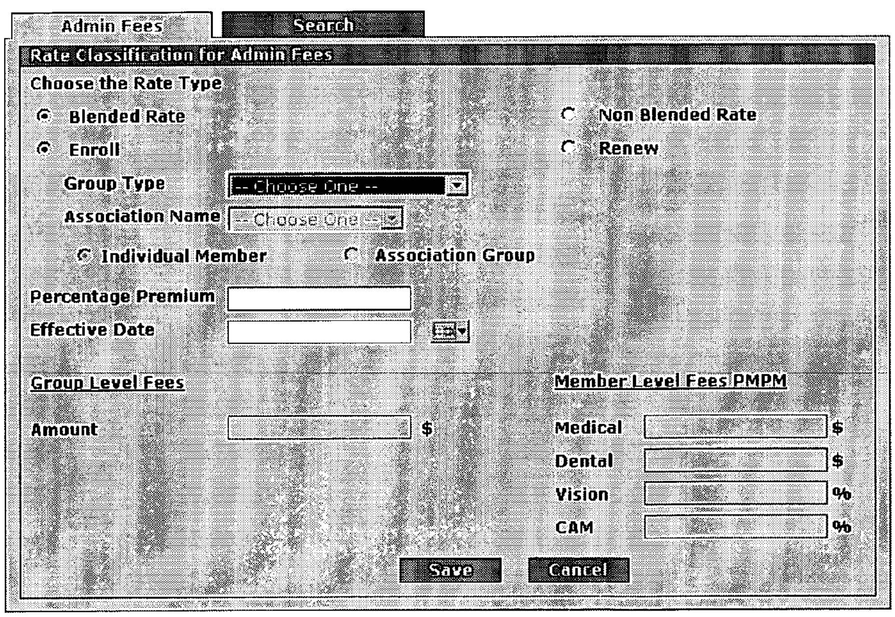
(Figure B-25)

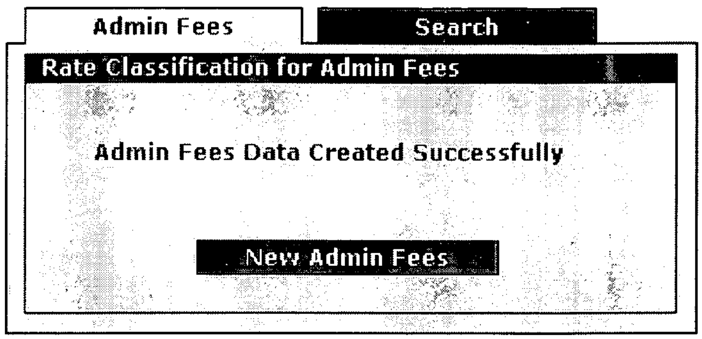
(Figure B-26)
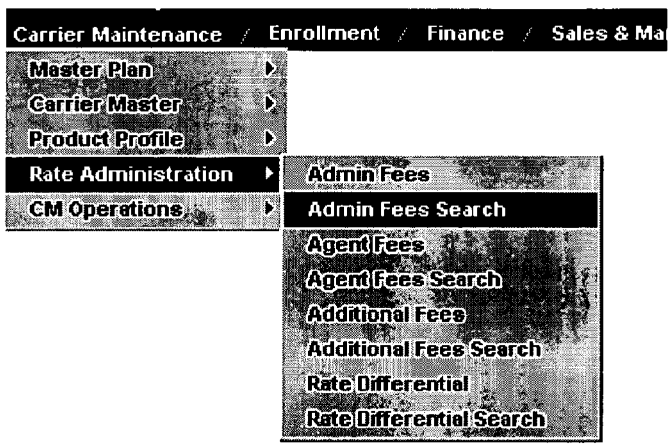
(Figure B-27)
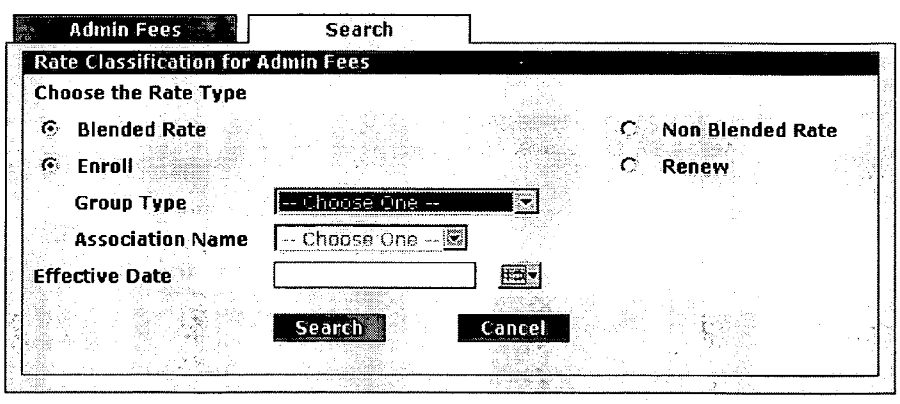
(Figure B-28)

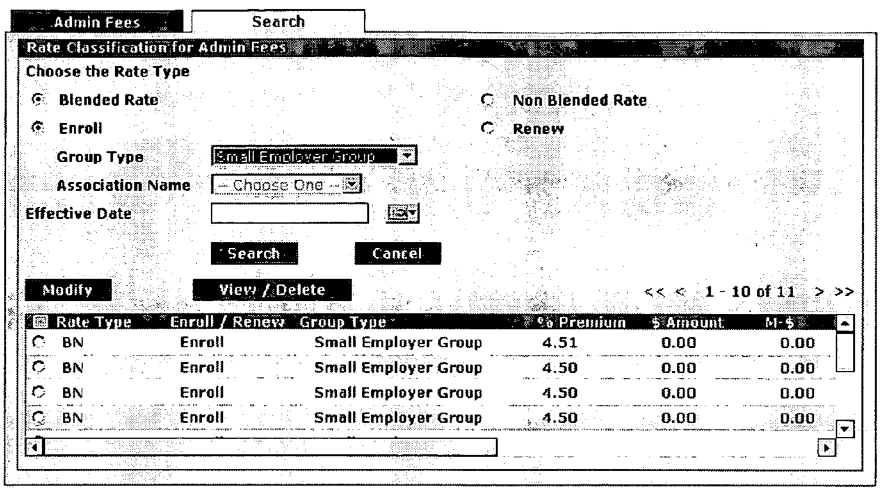
(Figure B-29)
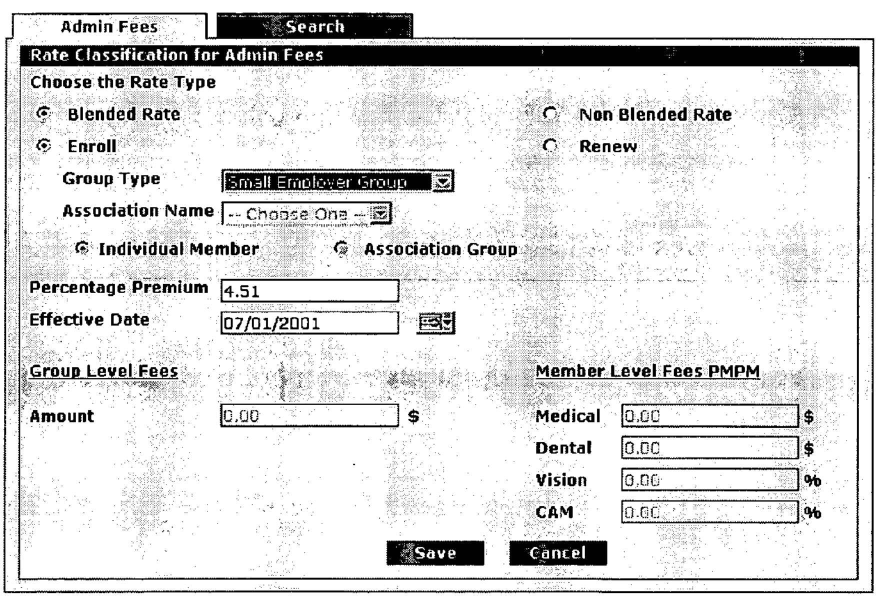
(Figure B-30)

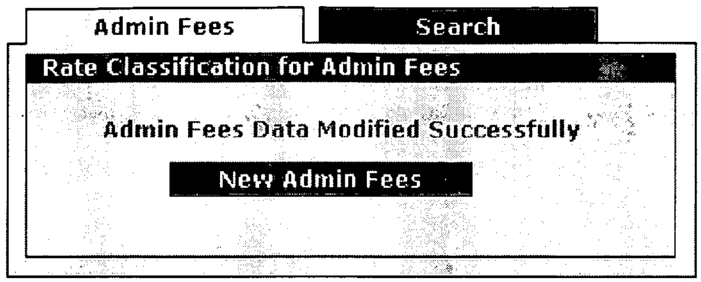
(Figure B-31)
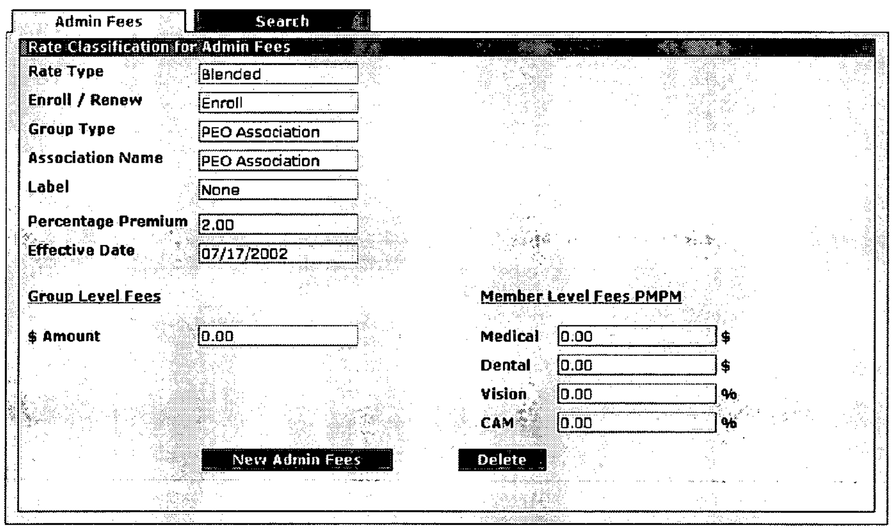
(Figure B-32)
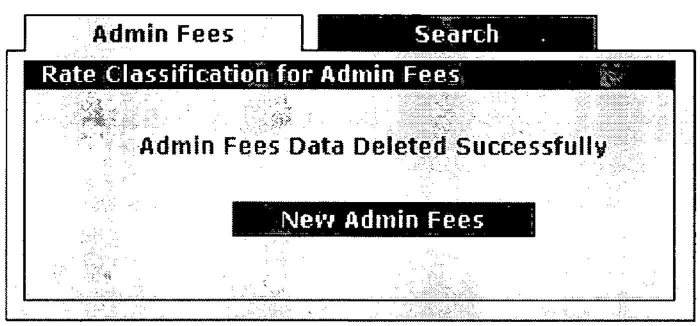
(Figure B-33)

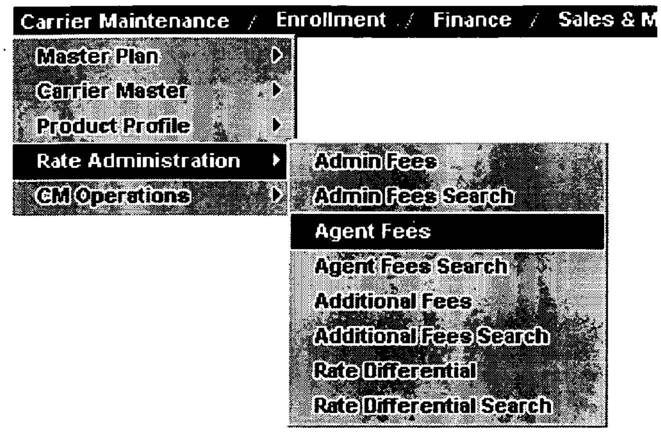
(Figure B-34)
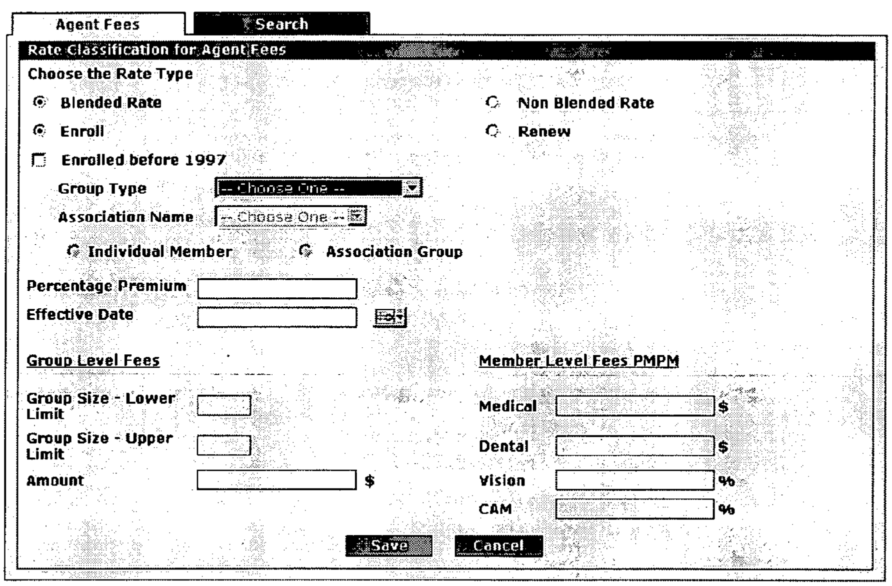
(Figure B-35)

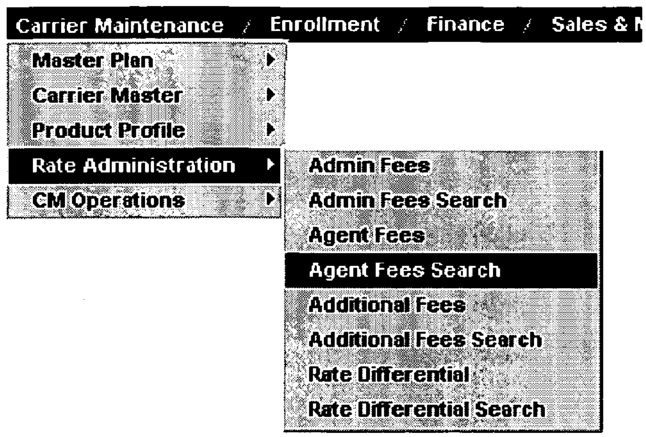
(Figure B-36)
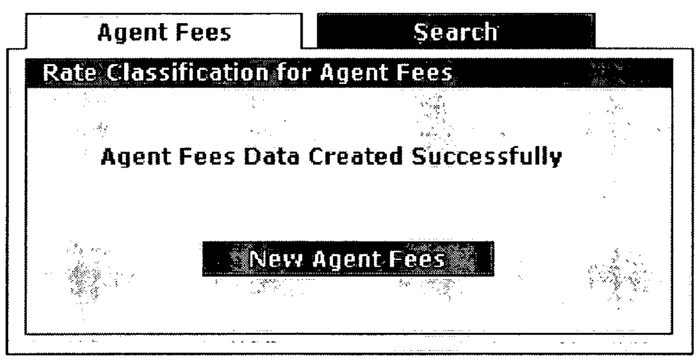
(Figure B-37)
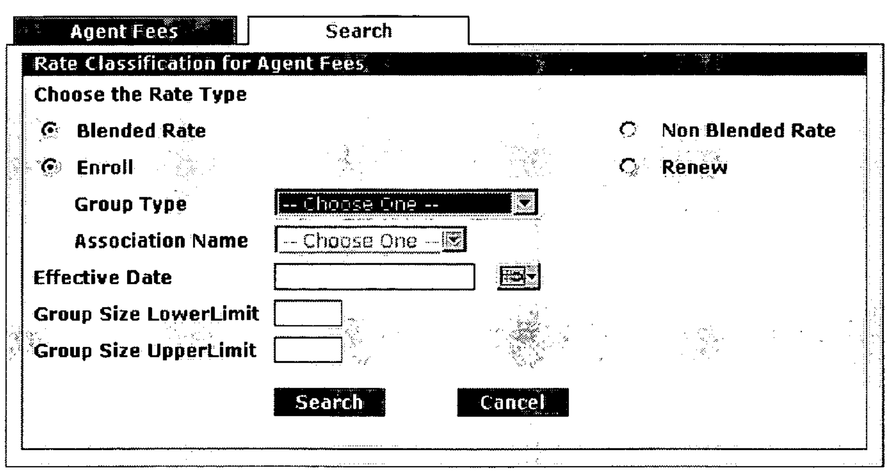
(Figure B-38)

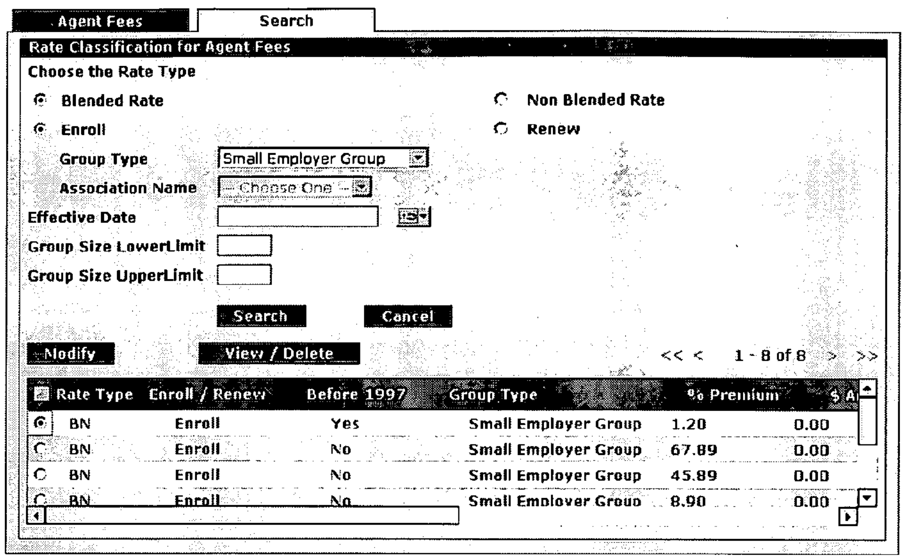
(Figure B-39)
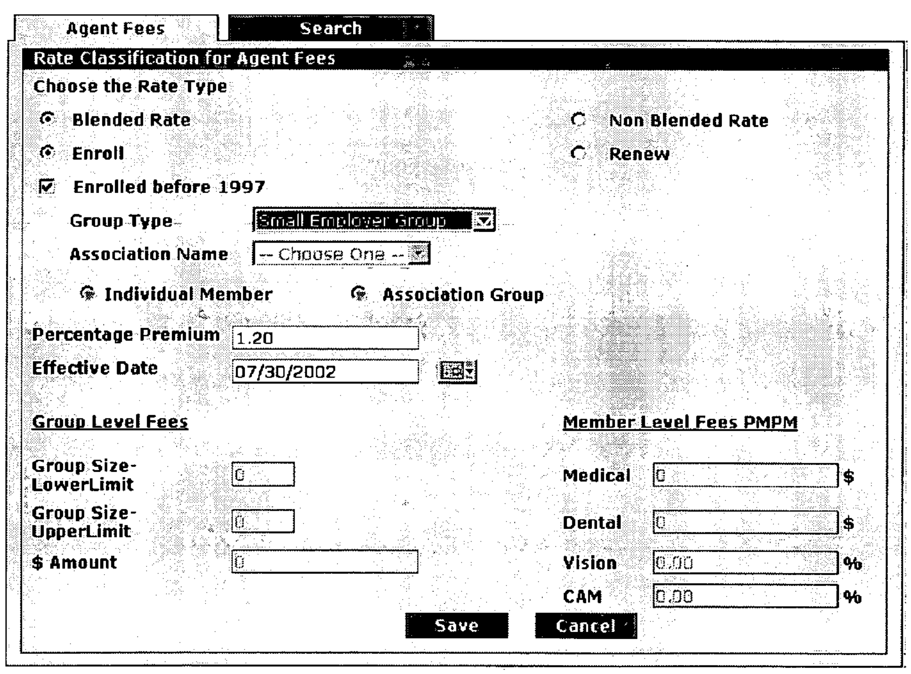
( Figure B-40)

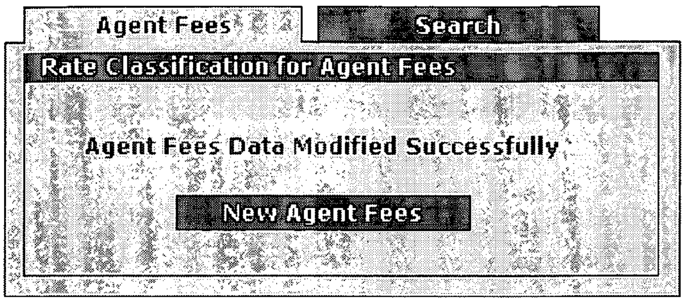
(Figure B-41)
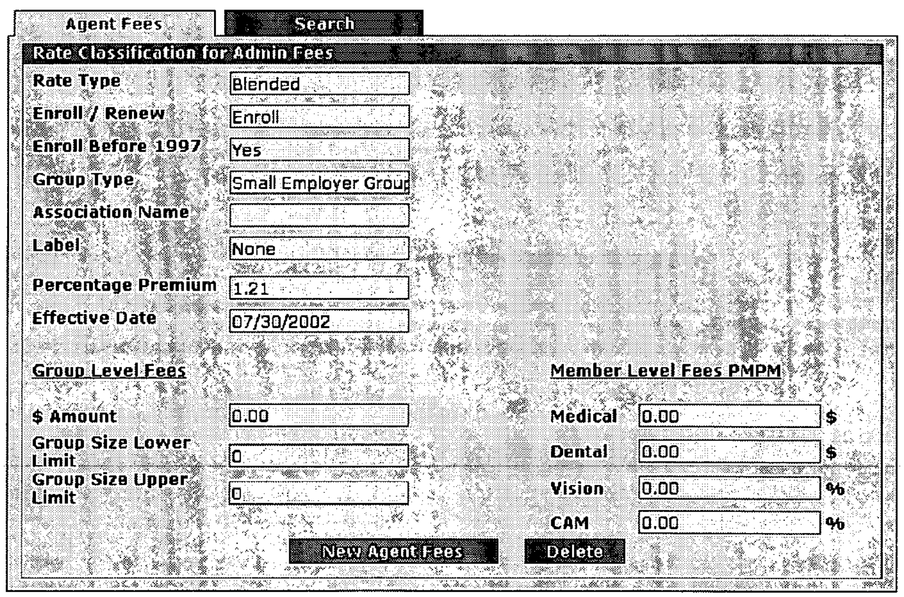
(Figure B-42)
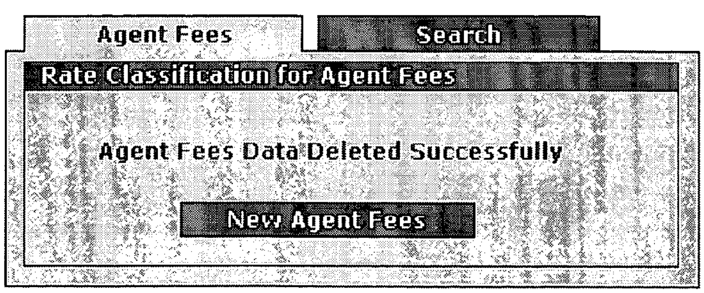
(Figure B-43)

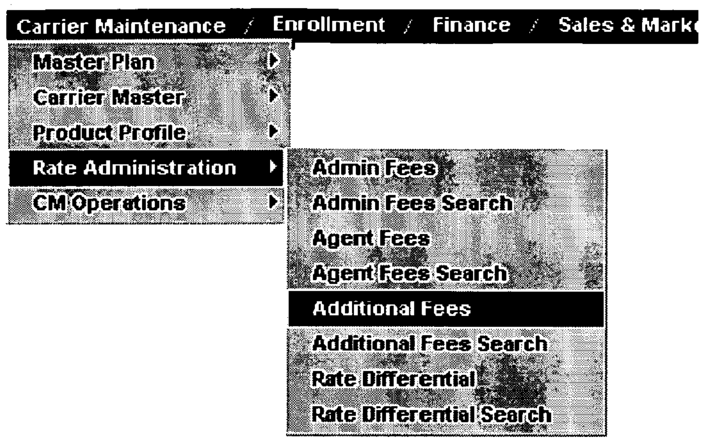
(Figure B-44)
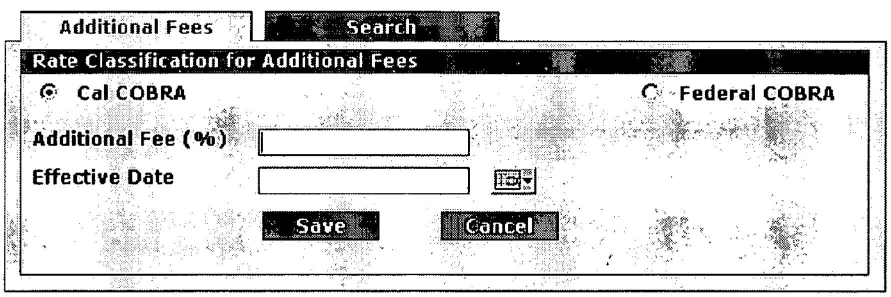
(Figure B-45)
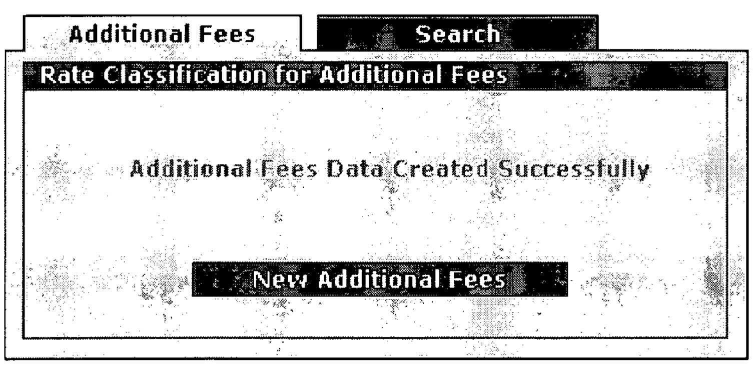
(Figure B-46)

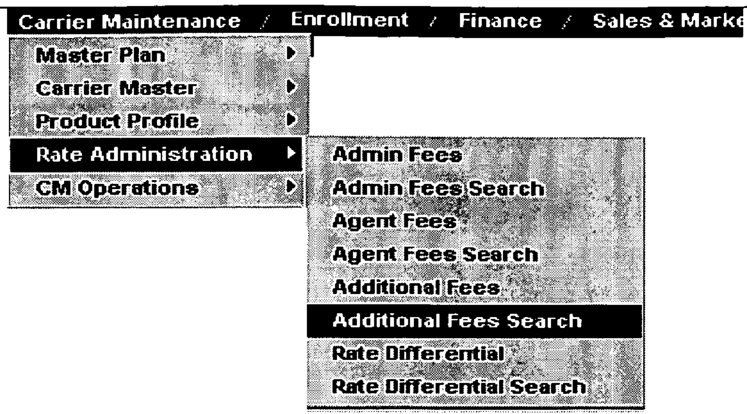
(Figure B-47)
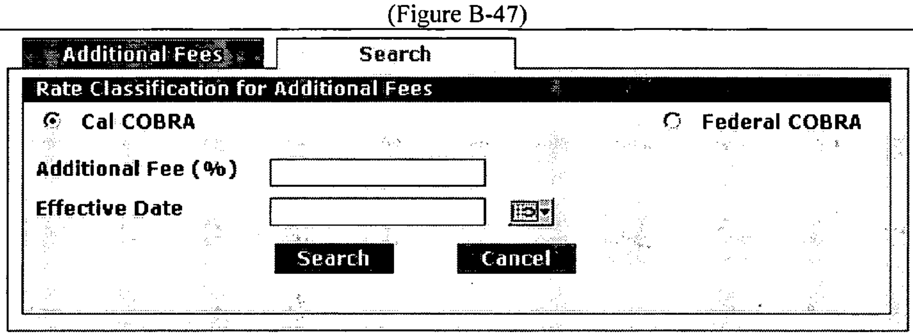
(Figure B-48)
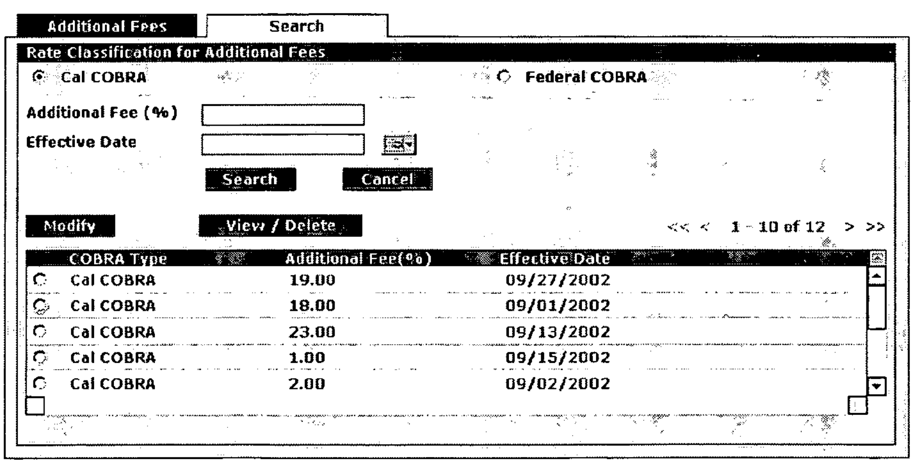
(Figure B-49)

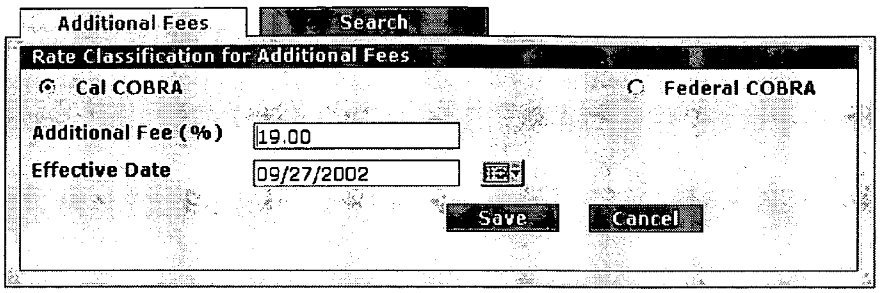
(Figure B-50)
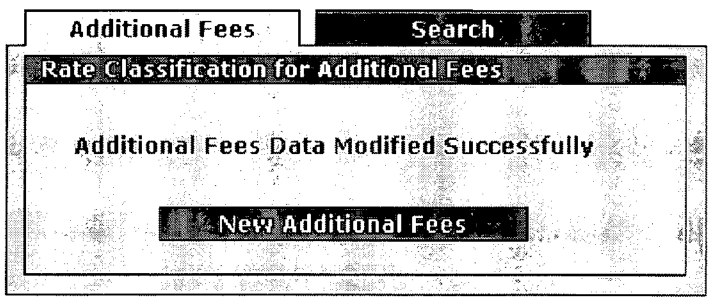
(Figure B-51)
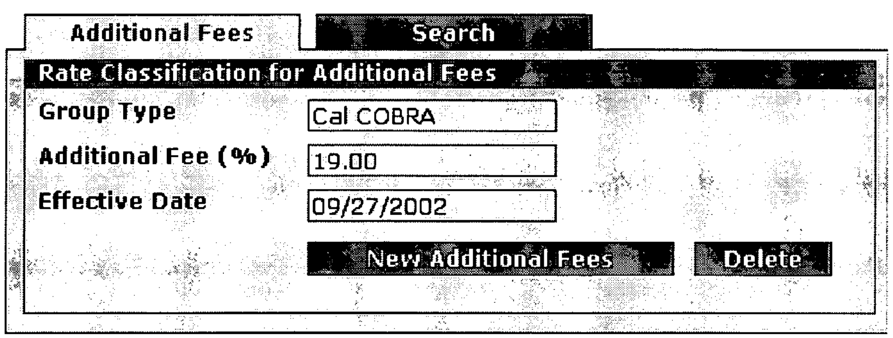
(Figure B-52)

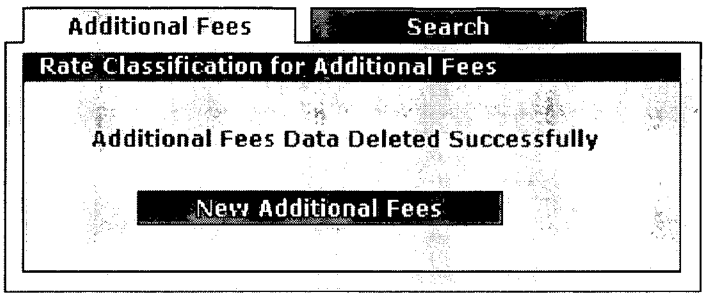
(Figure B-53)
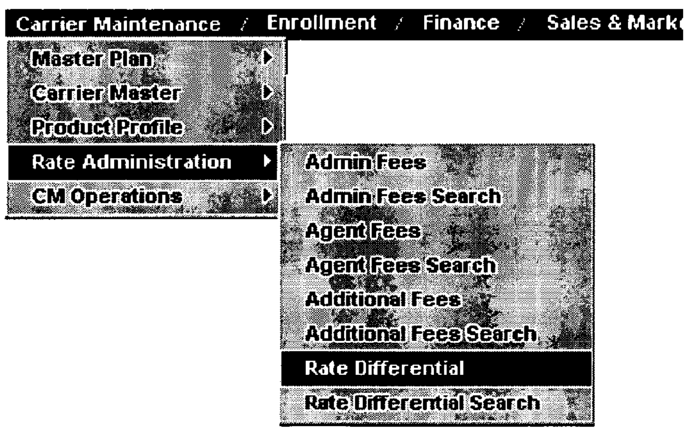
(Figure B-54)
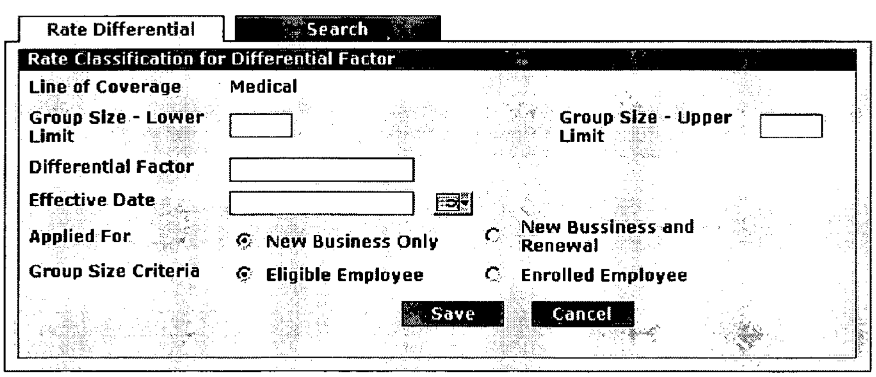
(Figure B-55)

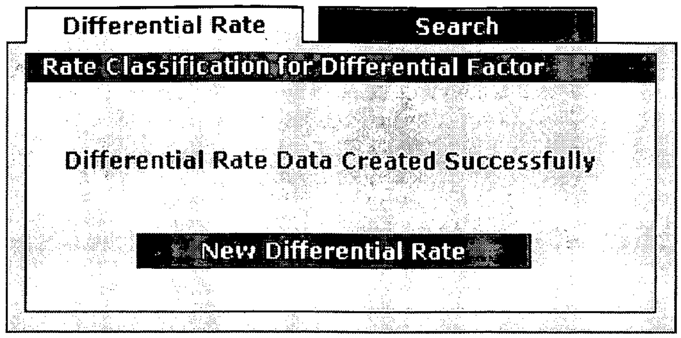
(Figure B-56)
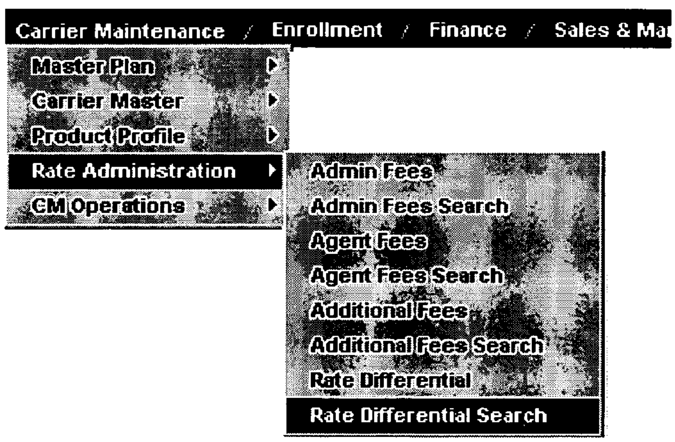
(Figure B-57)
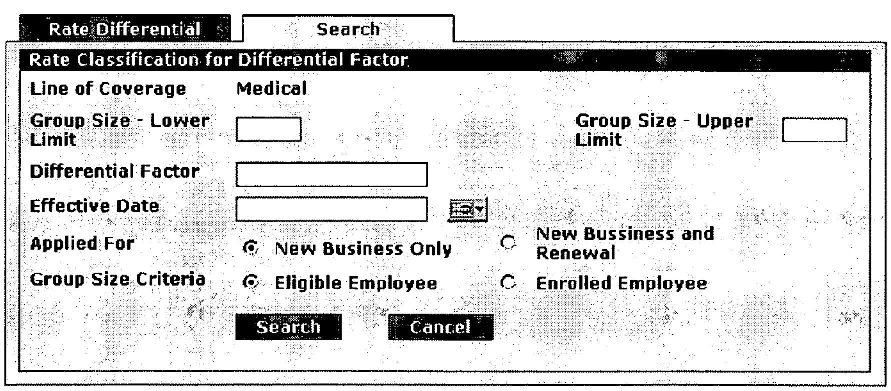
(Figure B-58)

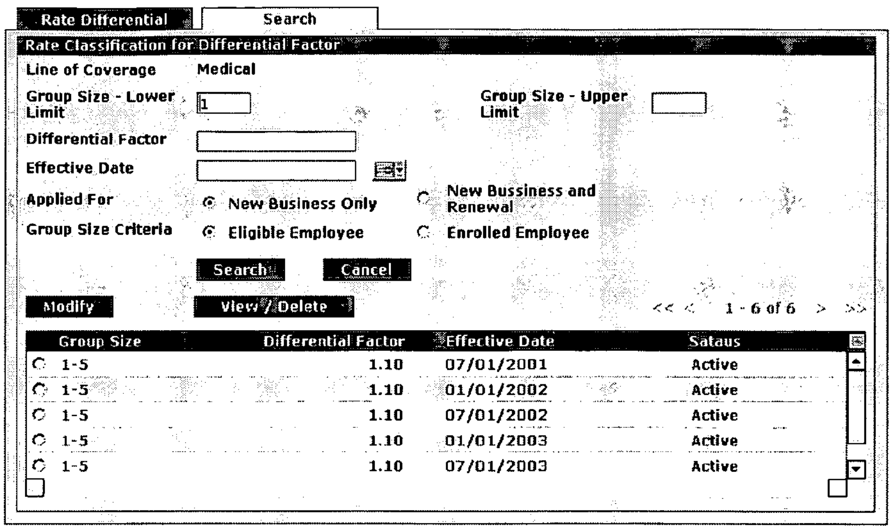
(Figure B-59)
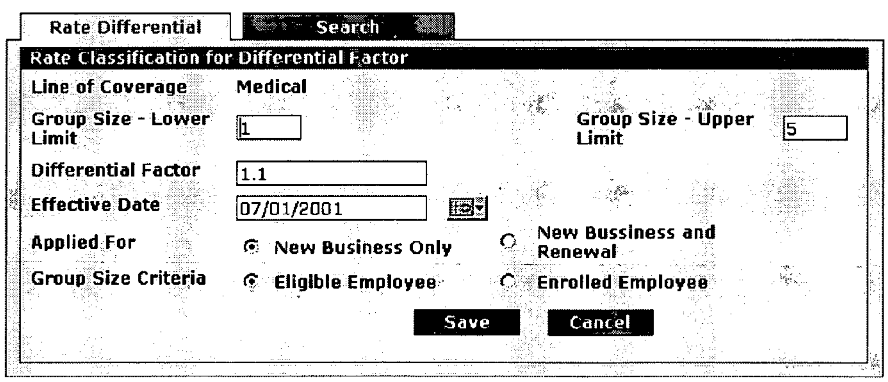
(Figure B-60)
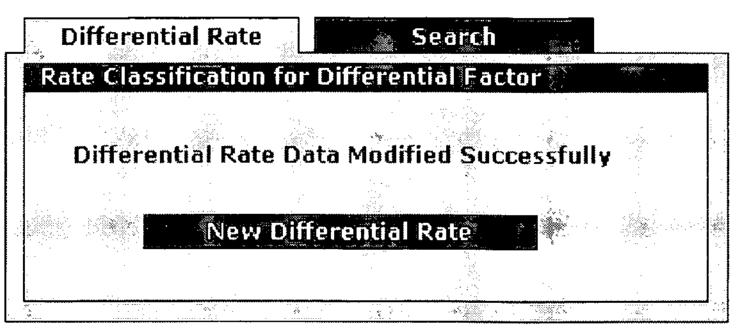
(Figure B-61)

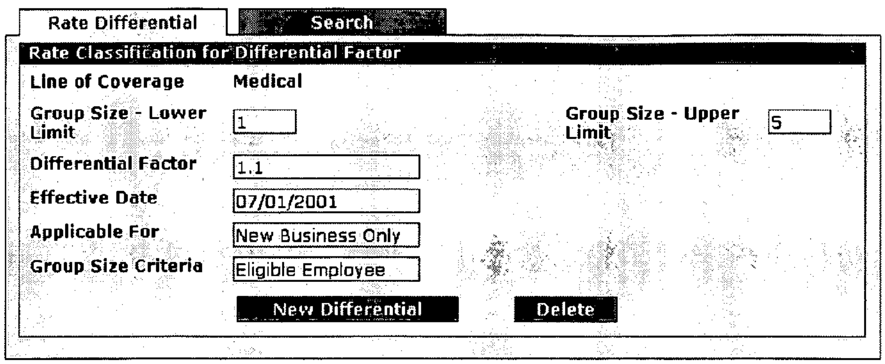
(Figure B-62)
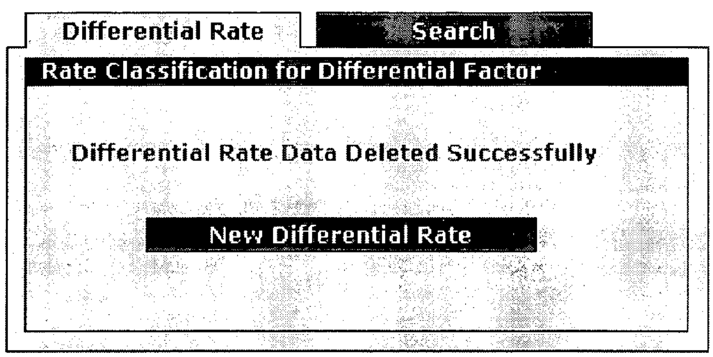
(Figure B-63)
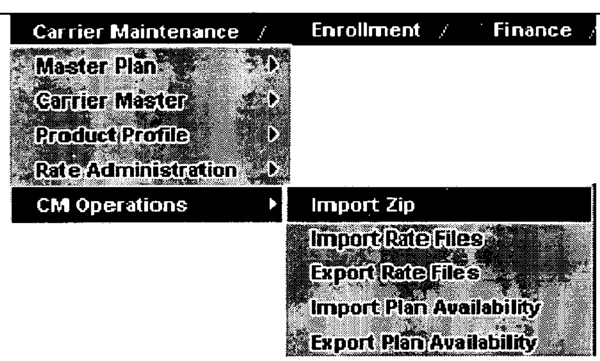
(Figure B-64)

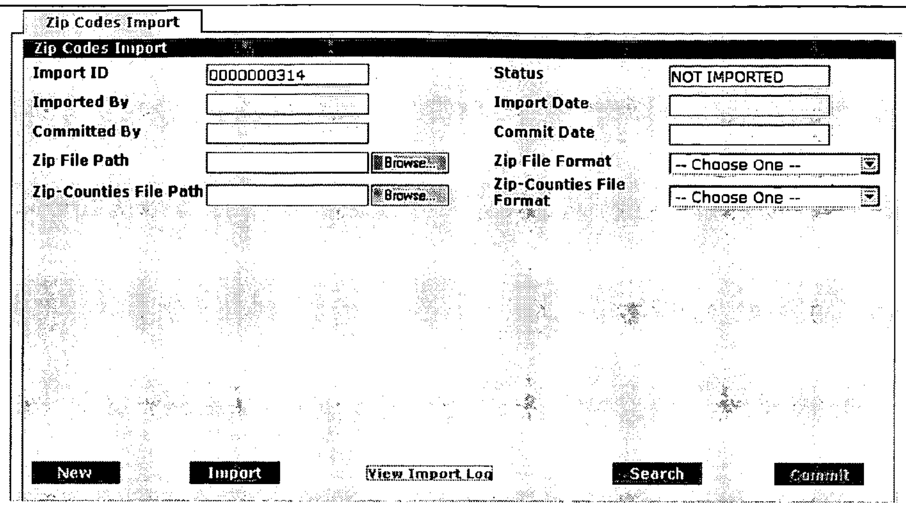
(Figure B-65)
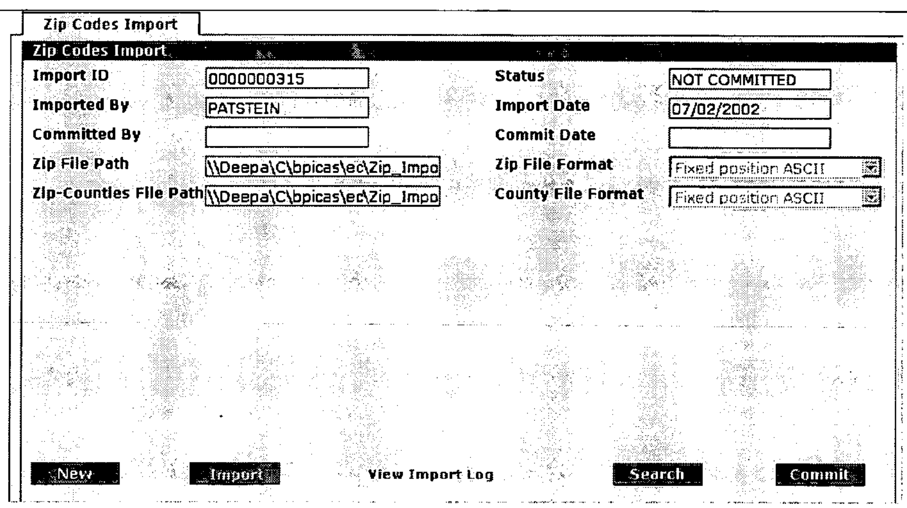
(Figure B-66)

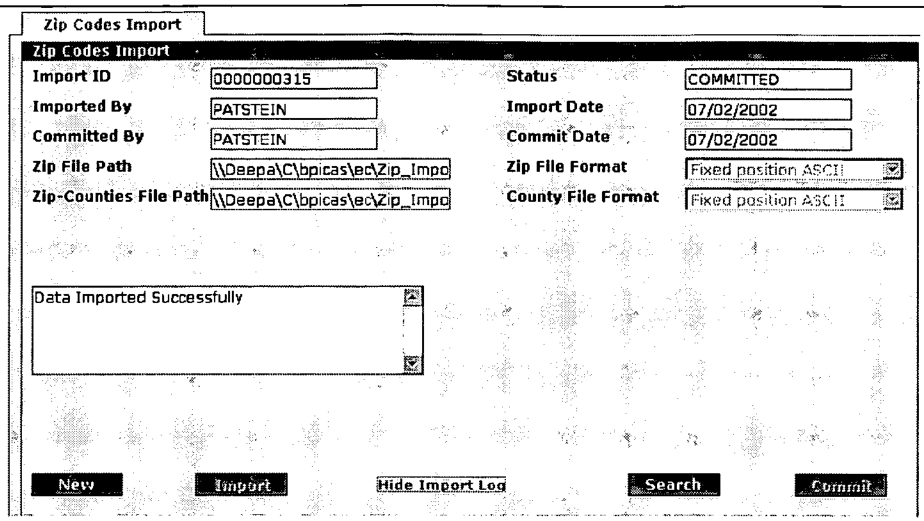
(Figure B-67)
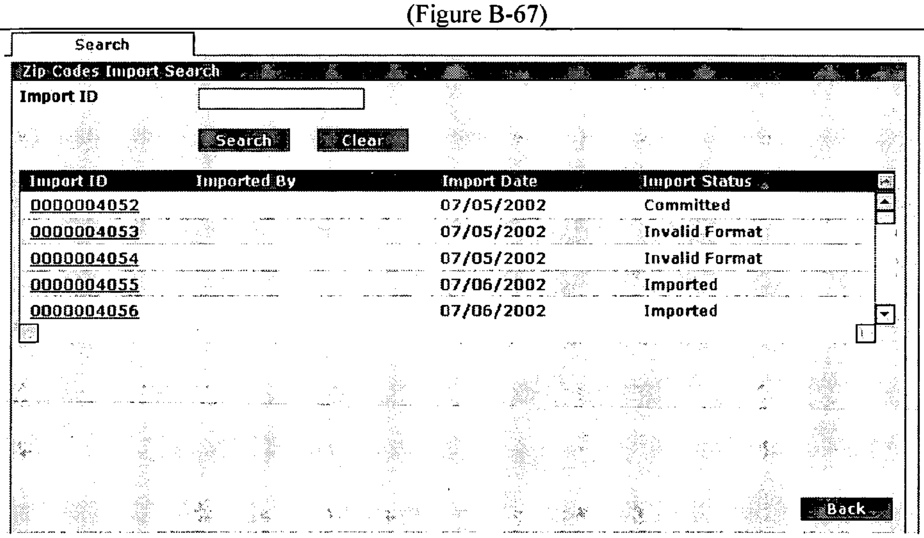
(Figure B-68)

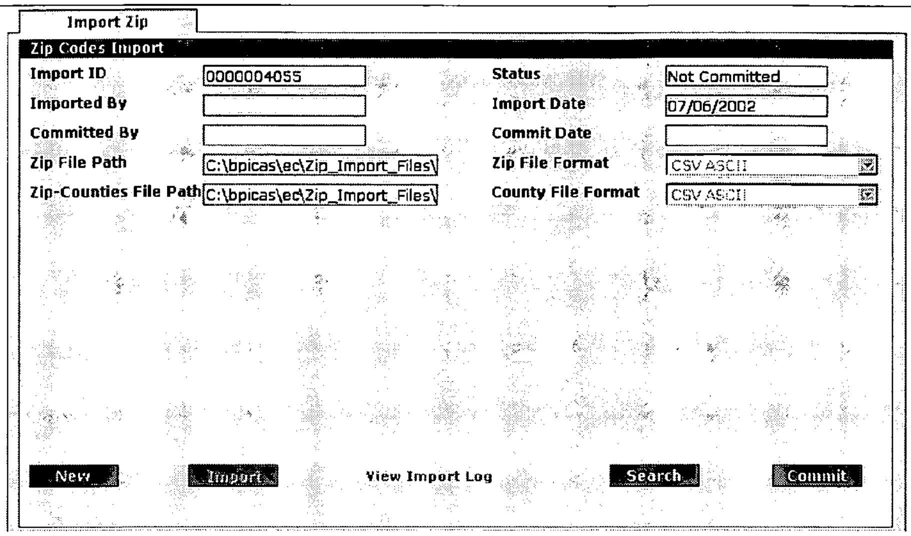
(Figure B-69)
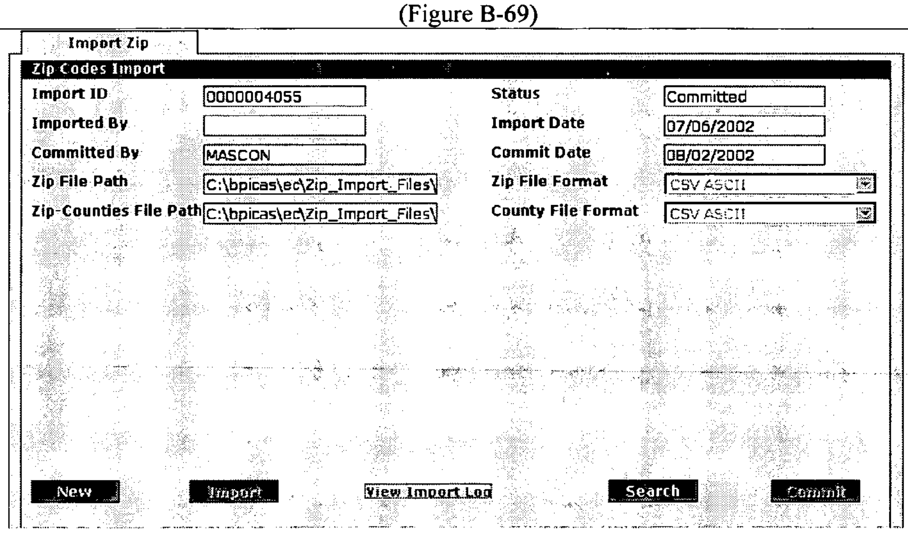
(Figure B-70)
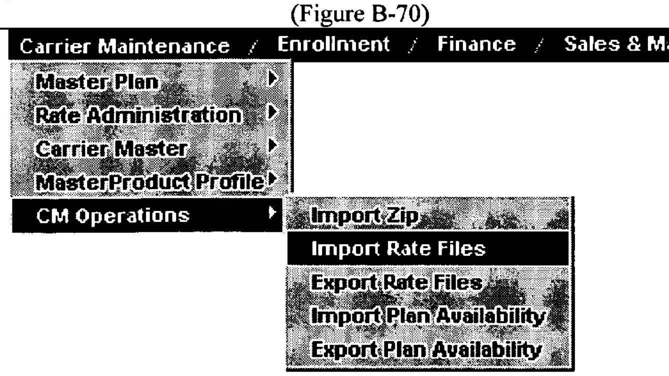
Figure B-71

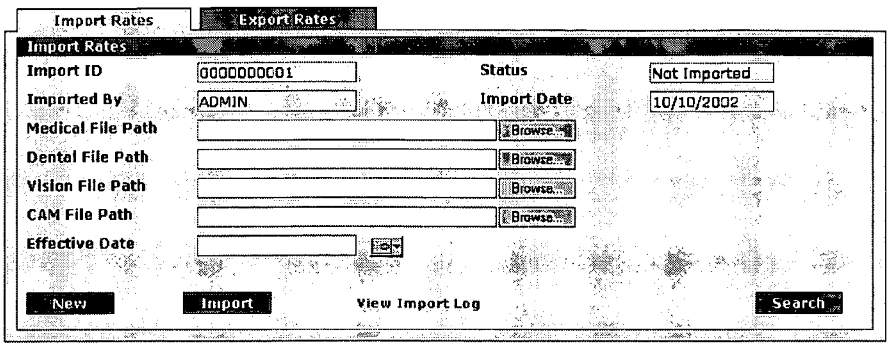
(Figure B-72)
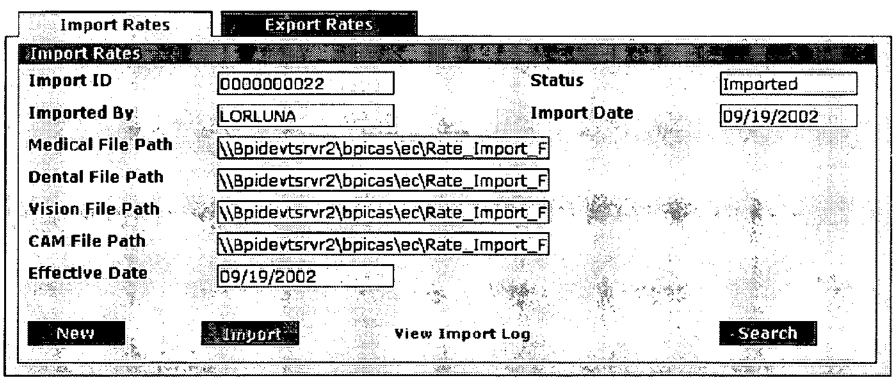
(Figure B-73)
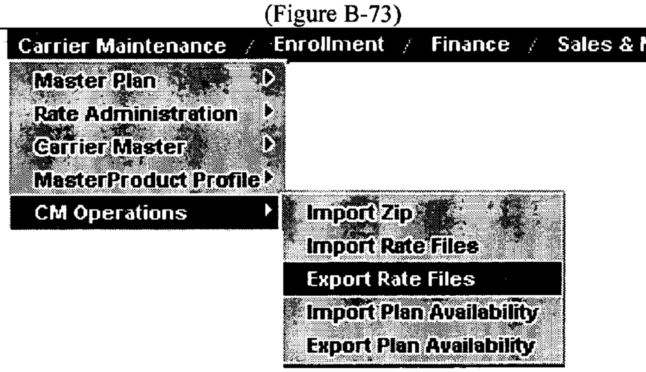
(Figure B-74)

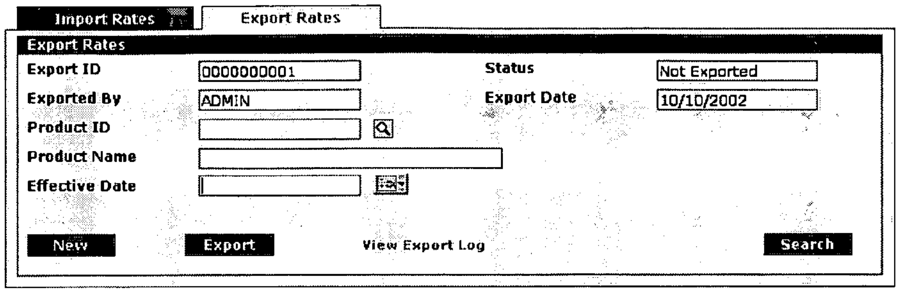
(Figure B-75)
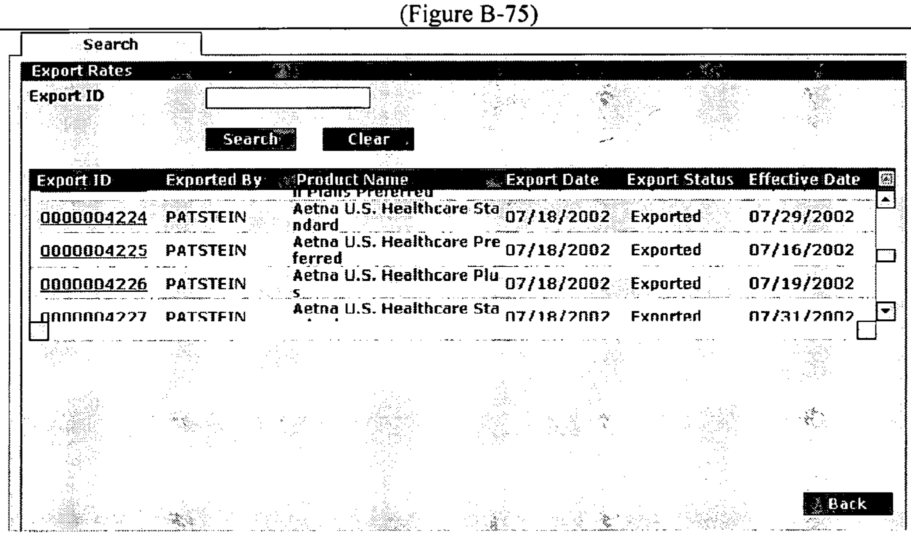
(Figure B-76)
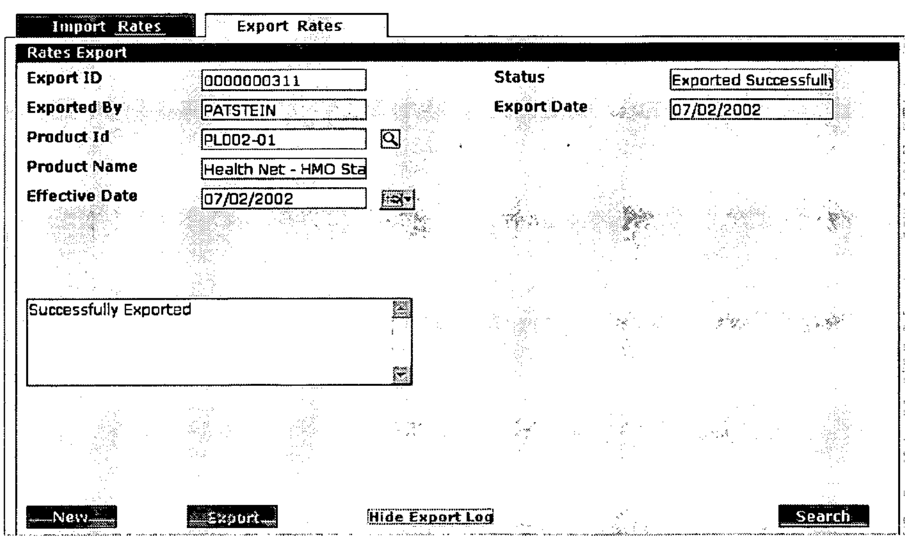
(Figure B-77)

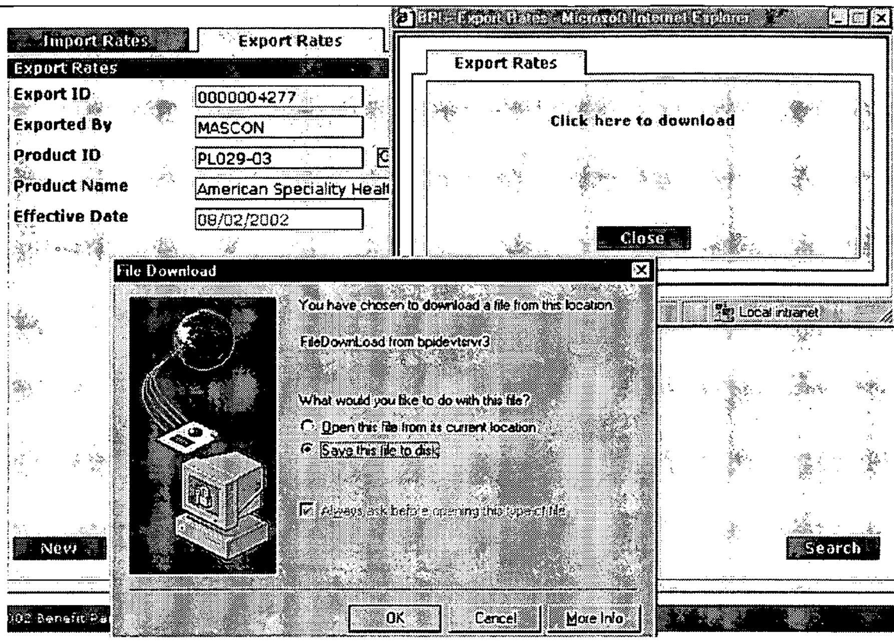
(Figure B-78)
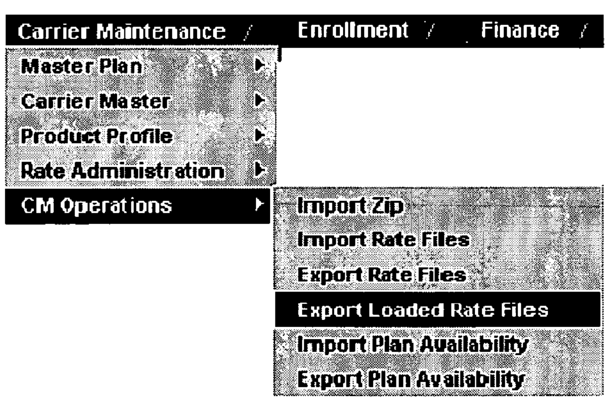
(Figure B-79)

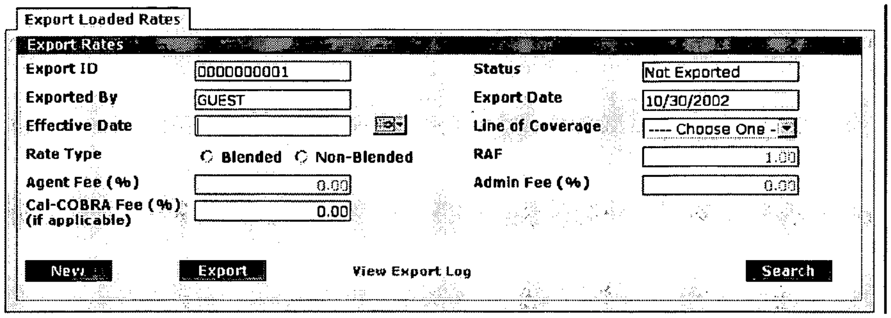
Figure B-80
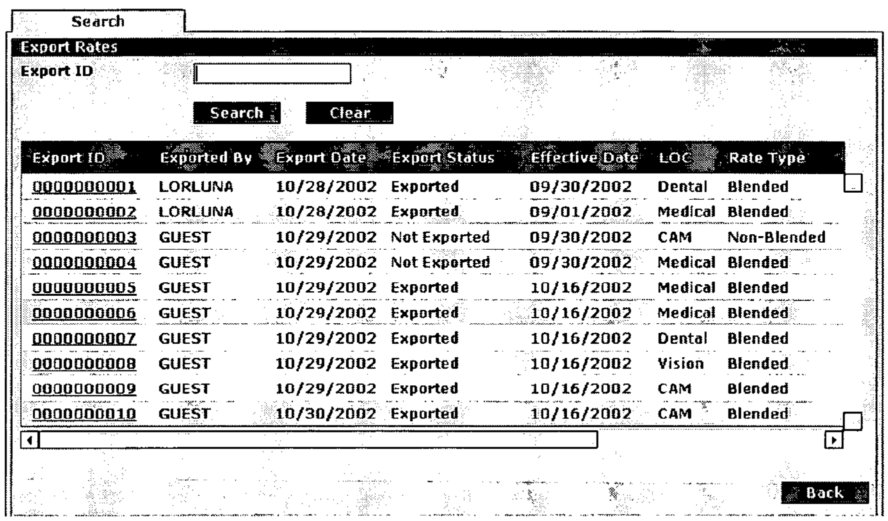
(Figure B-81)
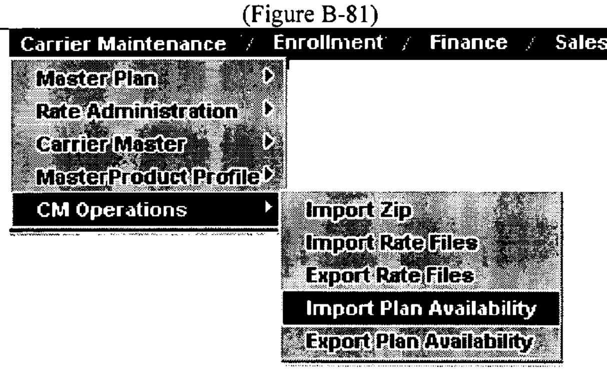
(Figure B-82)

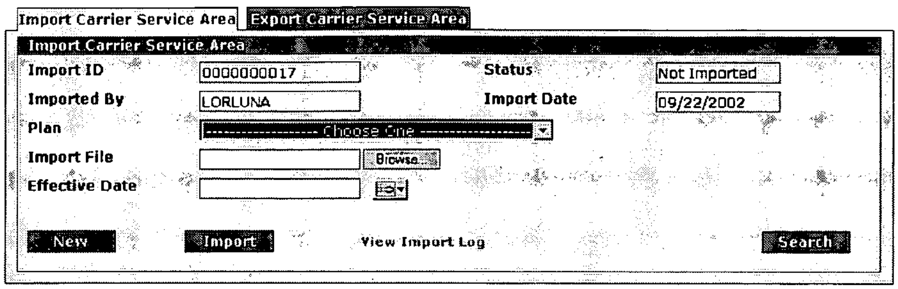
(Figure B-83)
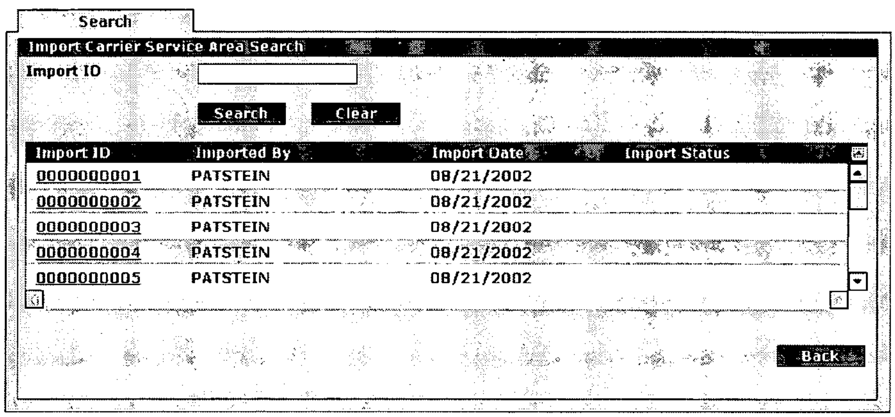
(Figure B-84)
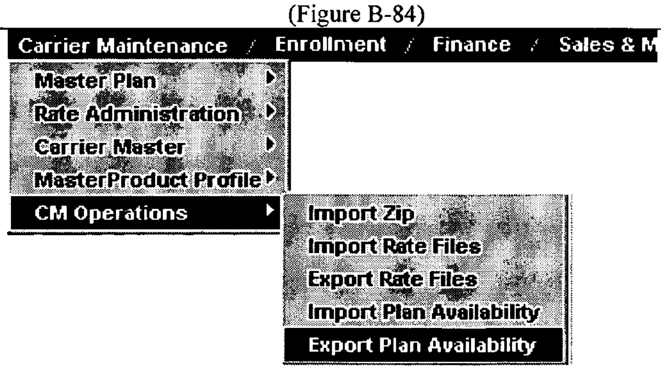
(Figure B-85)

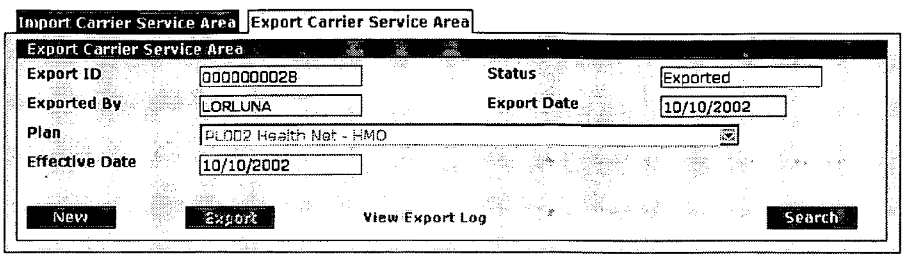
(Figure B-86)
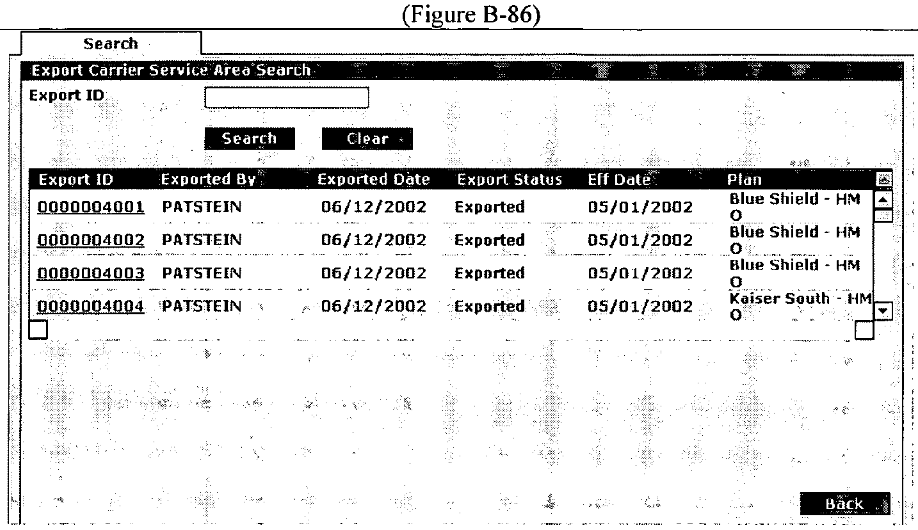
(Figure B-87)

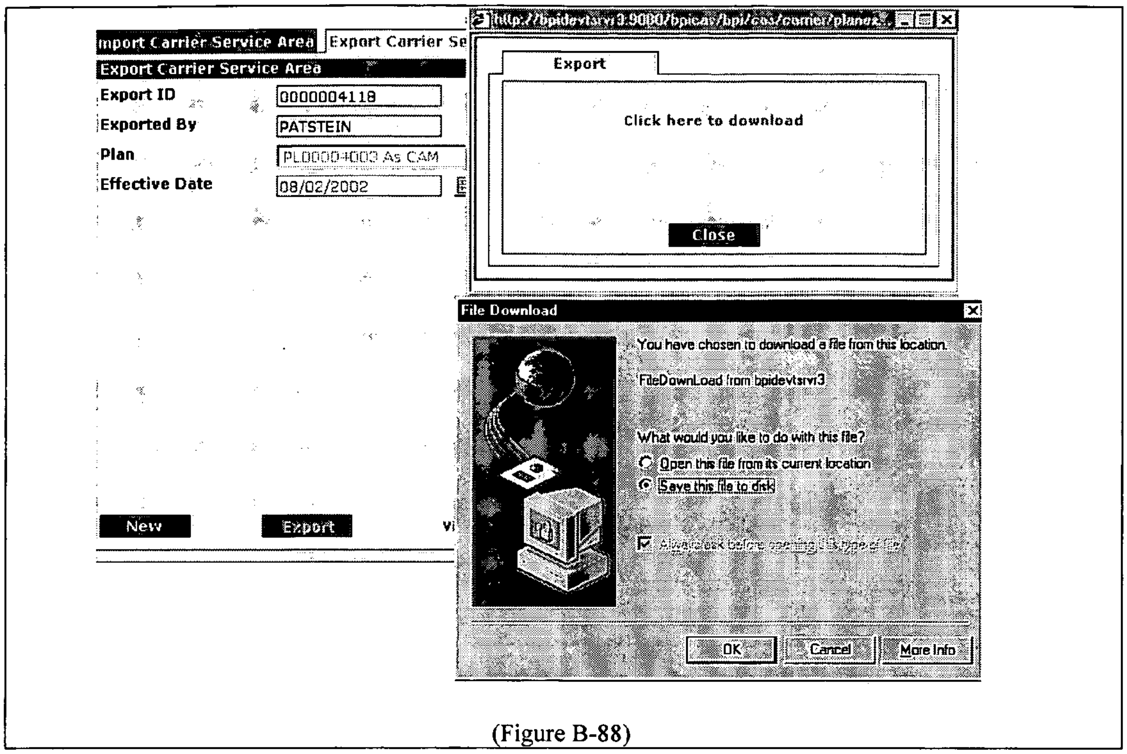
(Figure B-88)

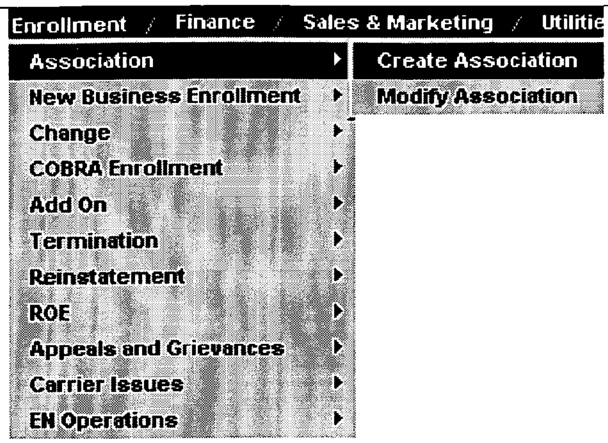
(Figure C-1)
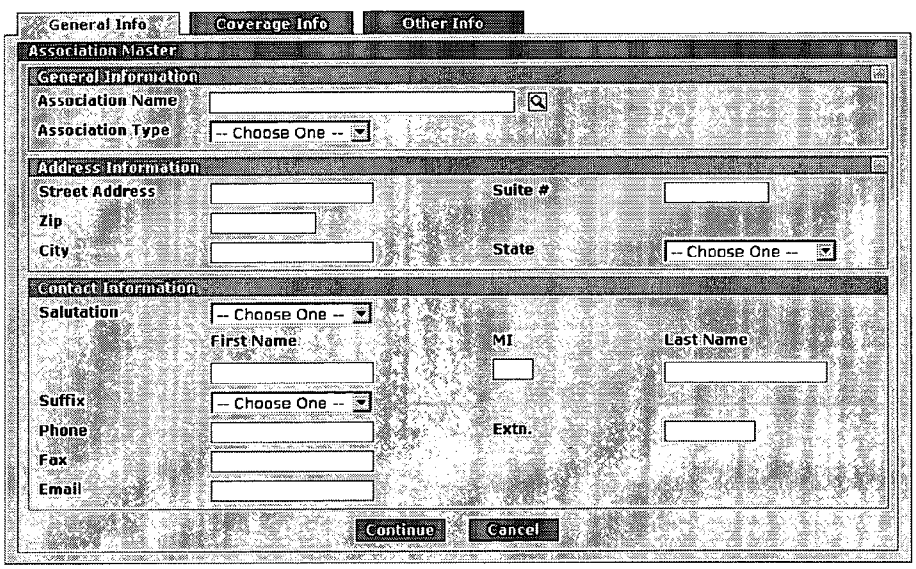
(Figure C-2)

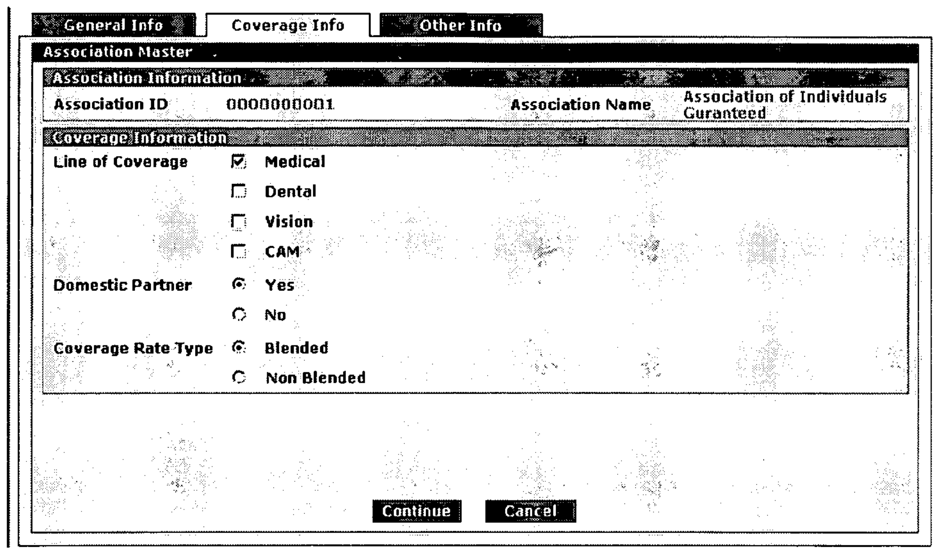
(Figure C-3)
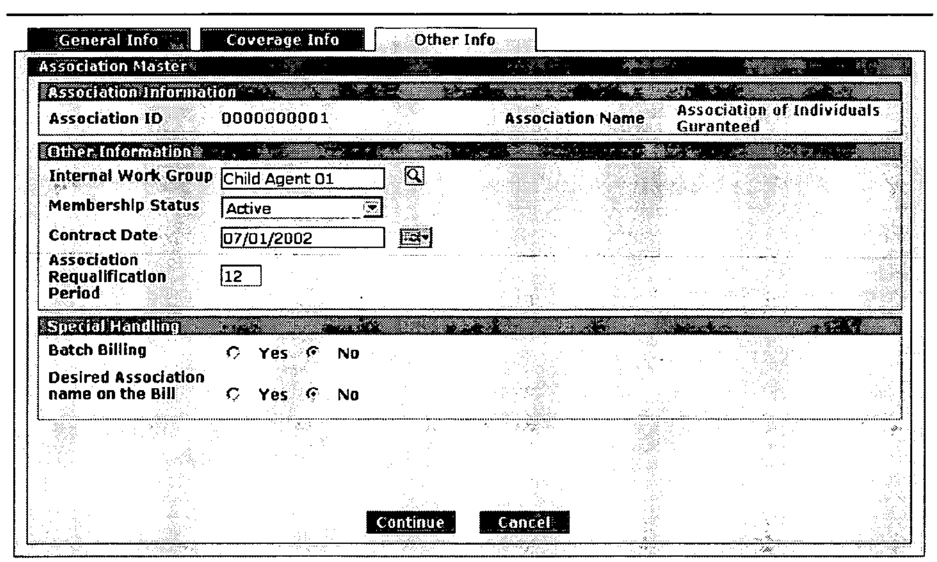
(Figure C-4)

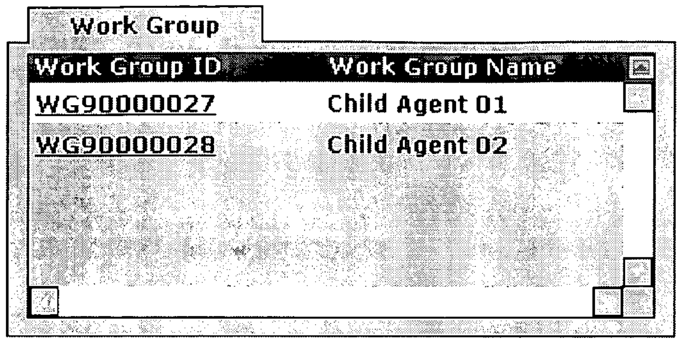
(Figure C-5)
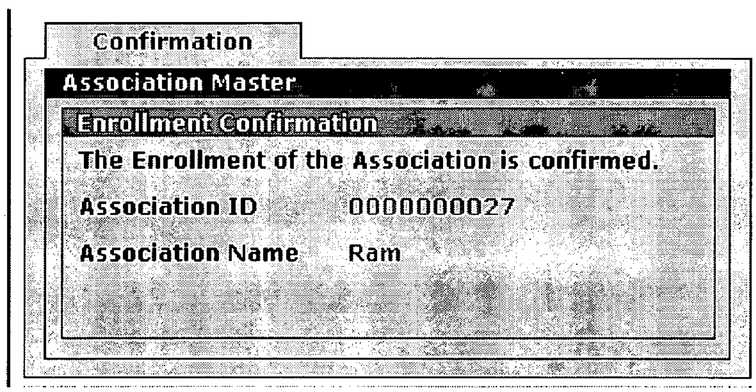
(Figure C-6)
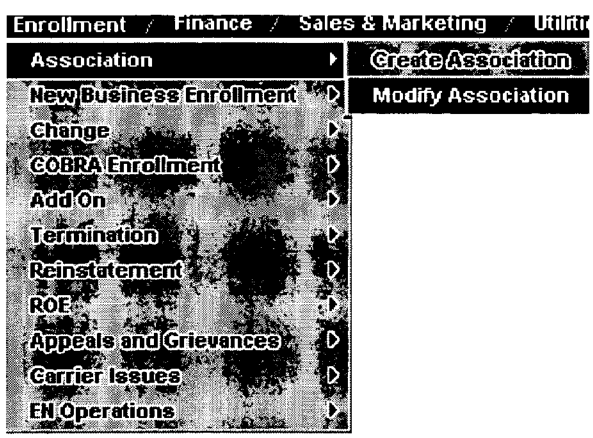
(Figure C-7)

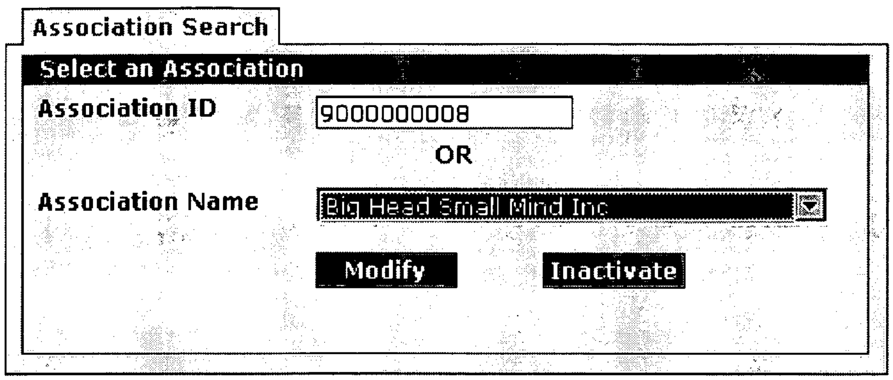
(Figure C-8)
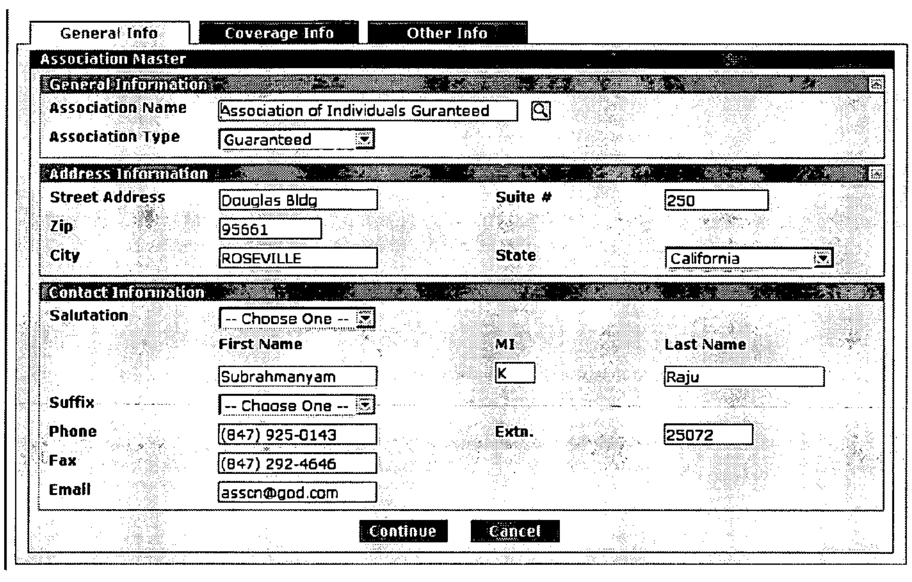
(Figure C-9)

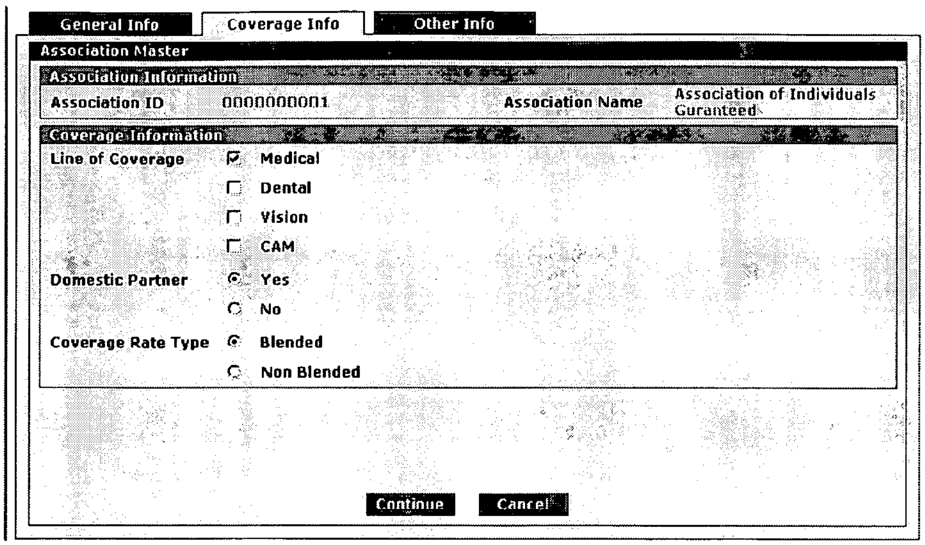
(Figure C-10)
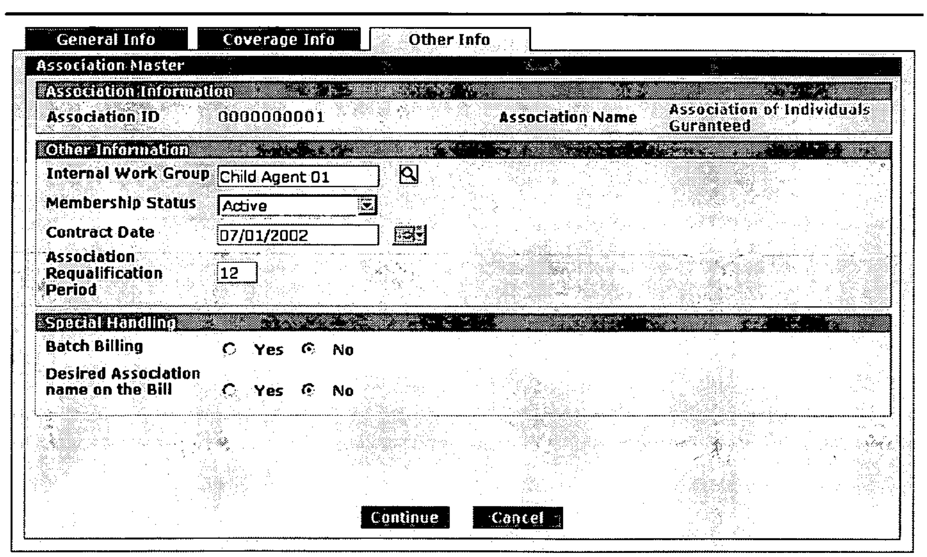
(Figure C-11)

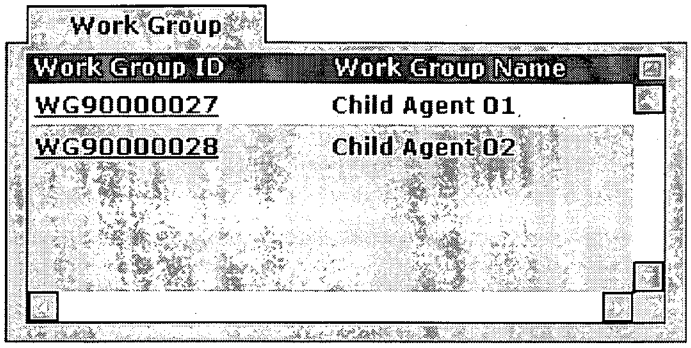
(Figure C-12)
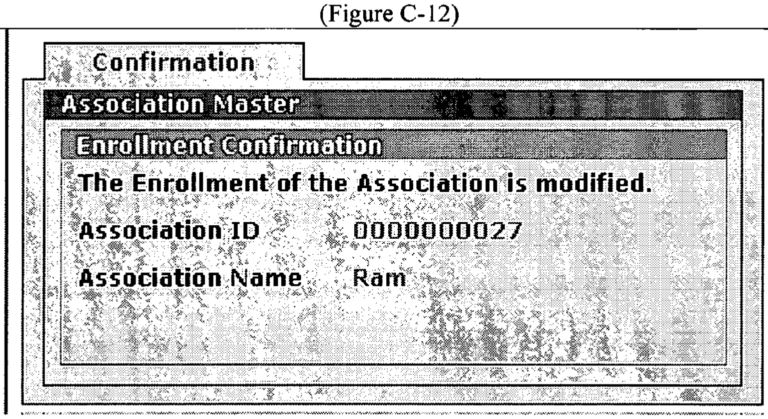
(Figure C-13)
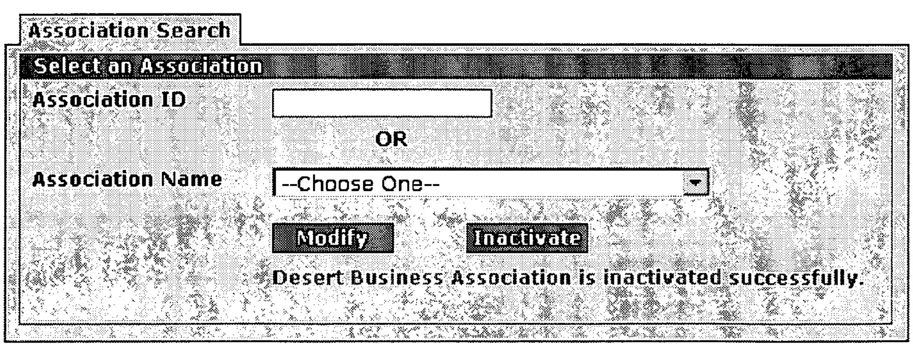
(Figure C-14)

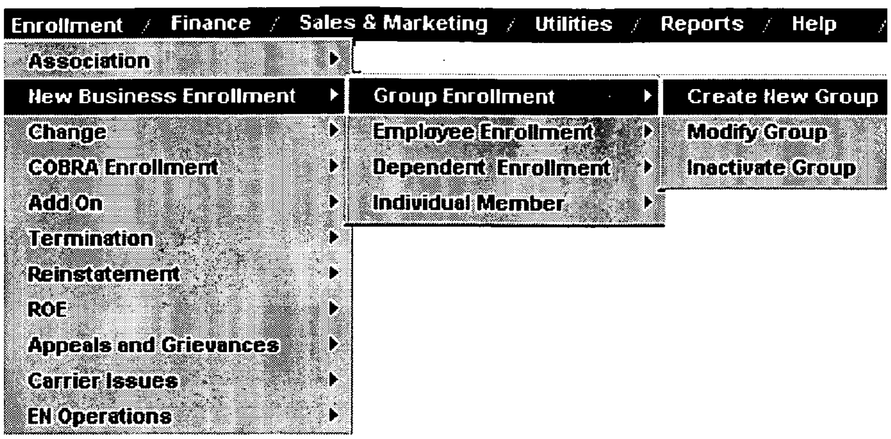
(Figure C-15)
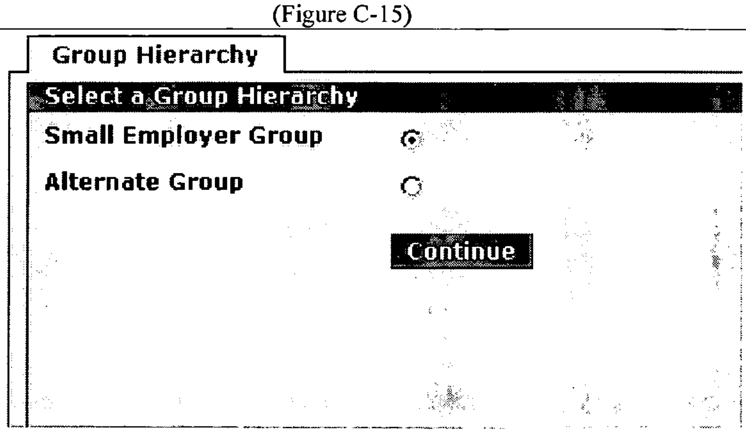
(Figure C-16)

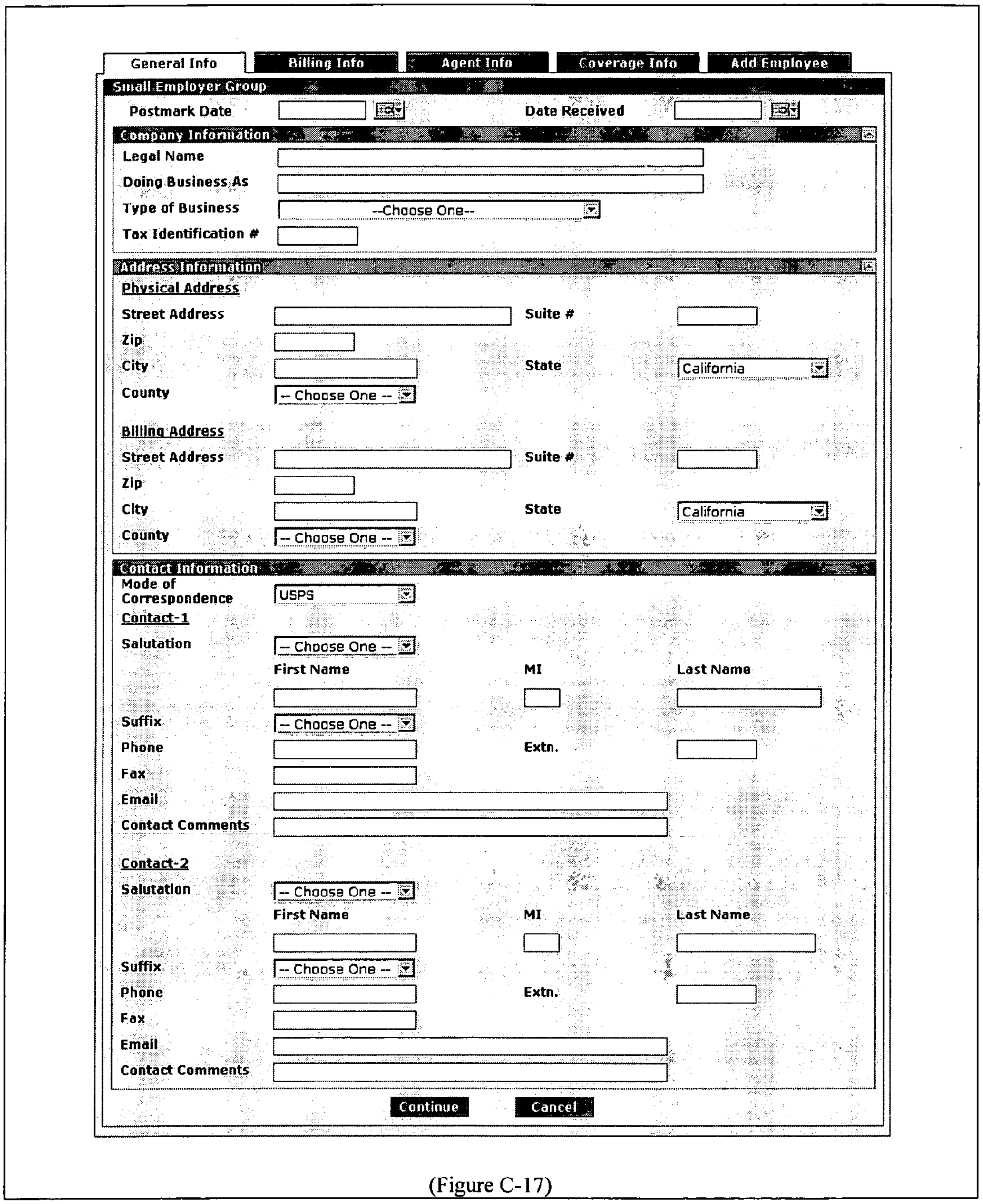
(Figure C-17)

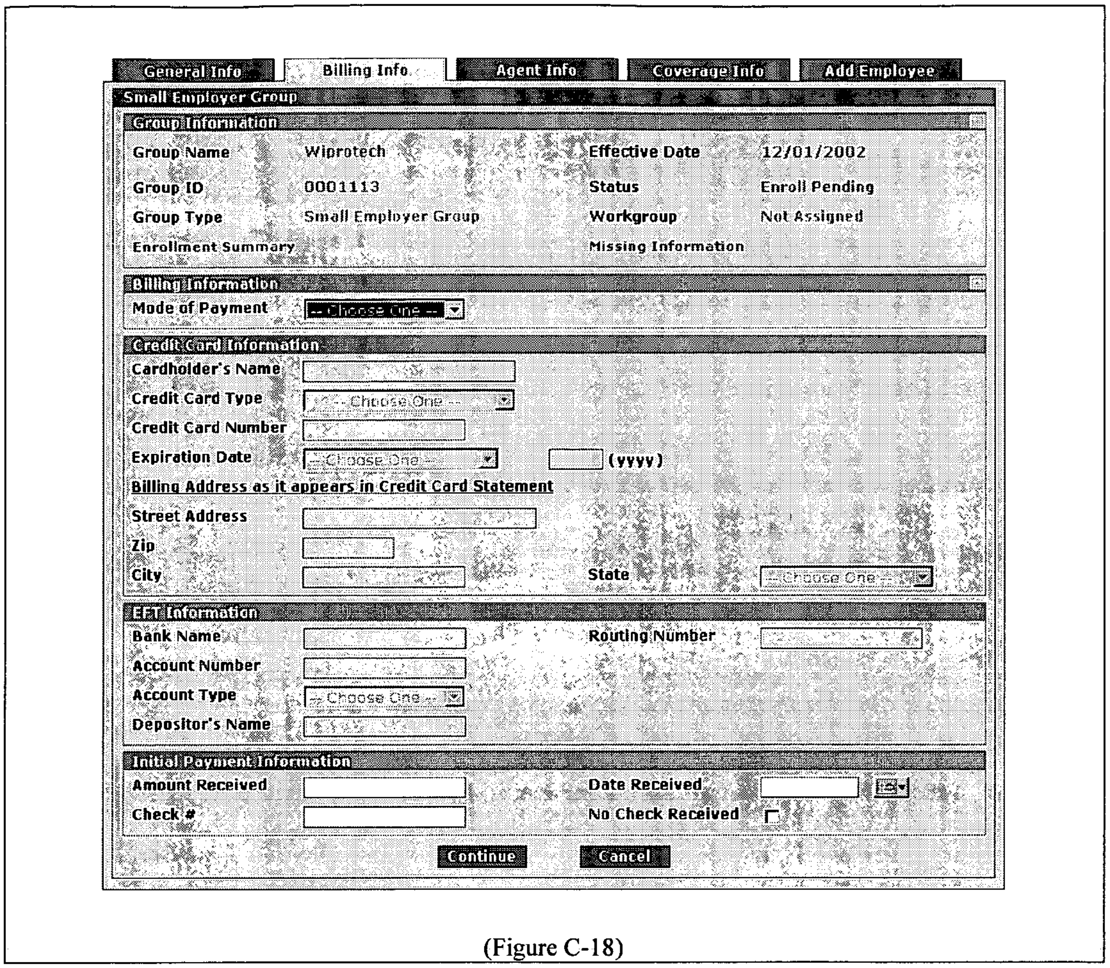
(Figure C-18)

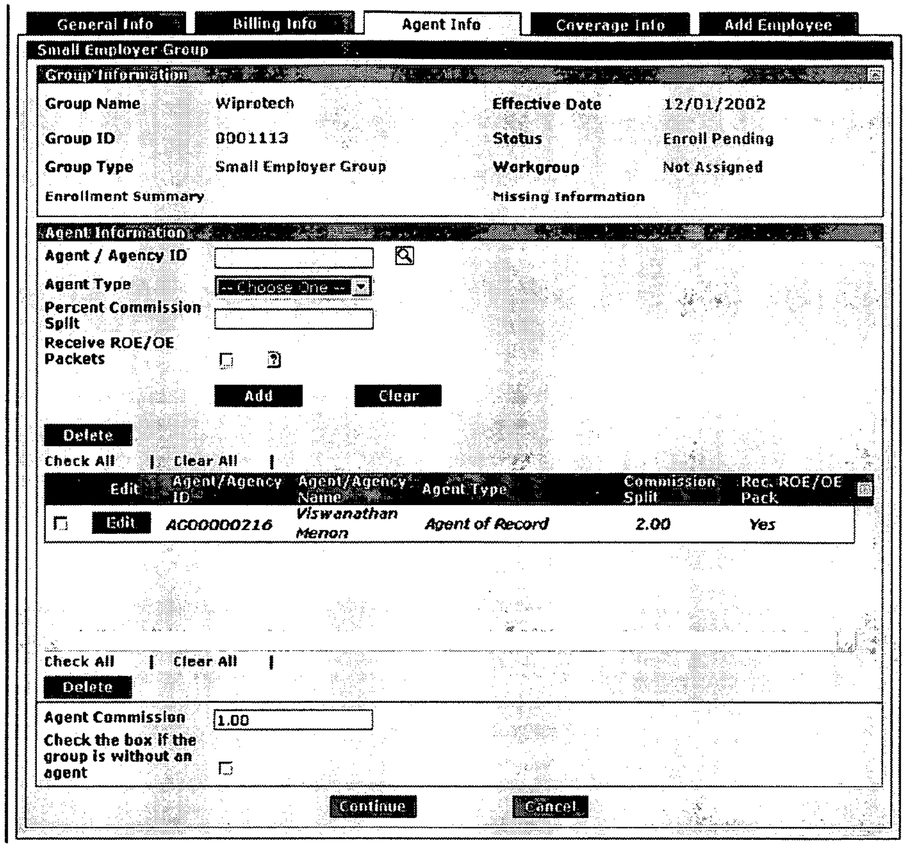
(Figure C-19)
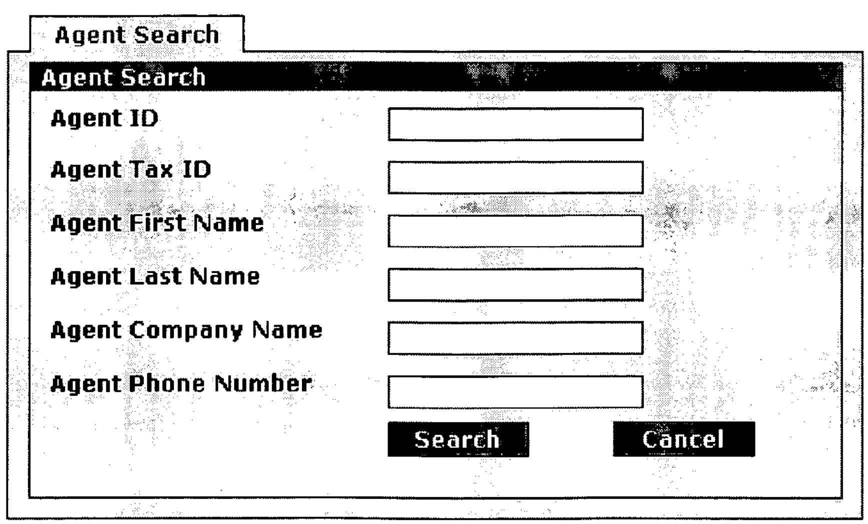
(Figure C-20)

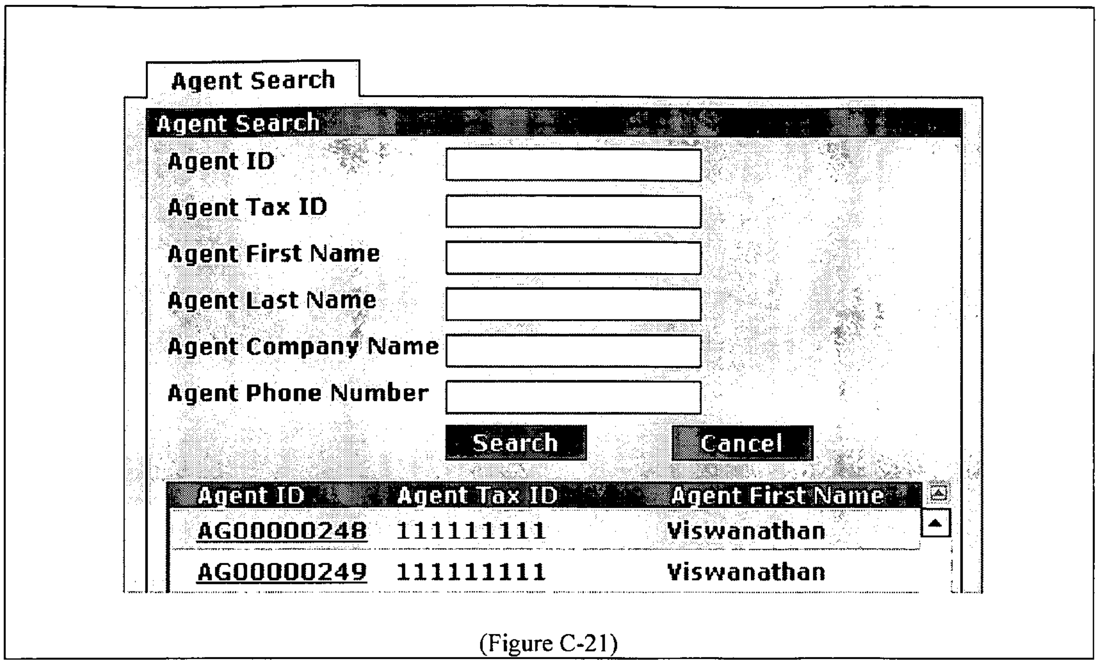
(Figure C-21)

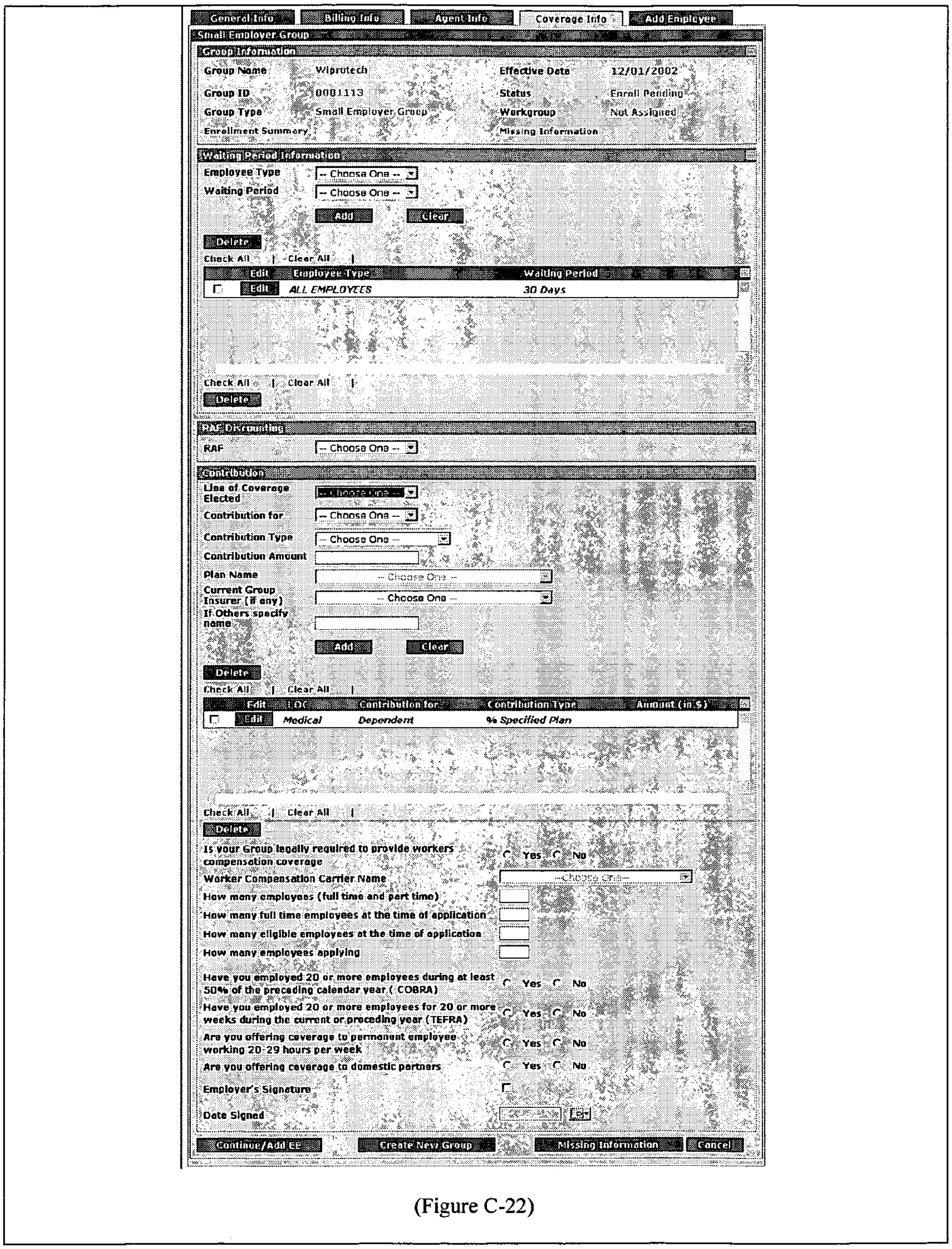
(Figure C-22)

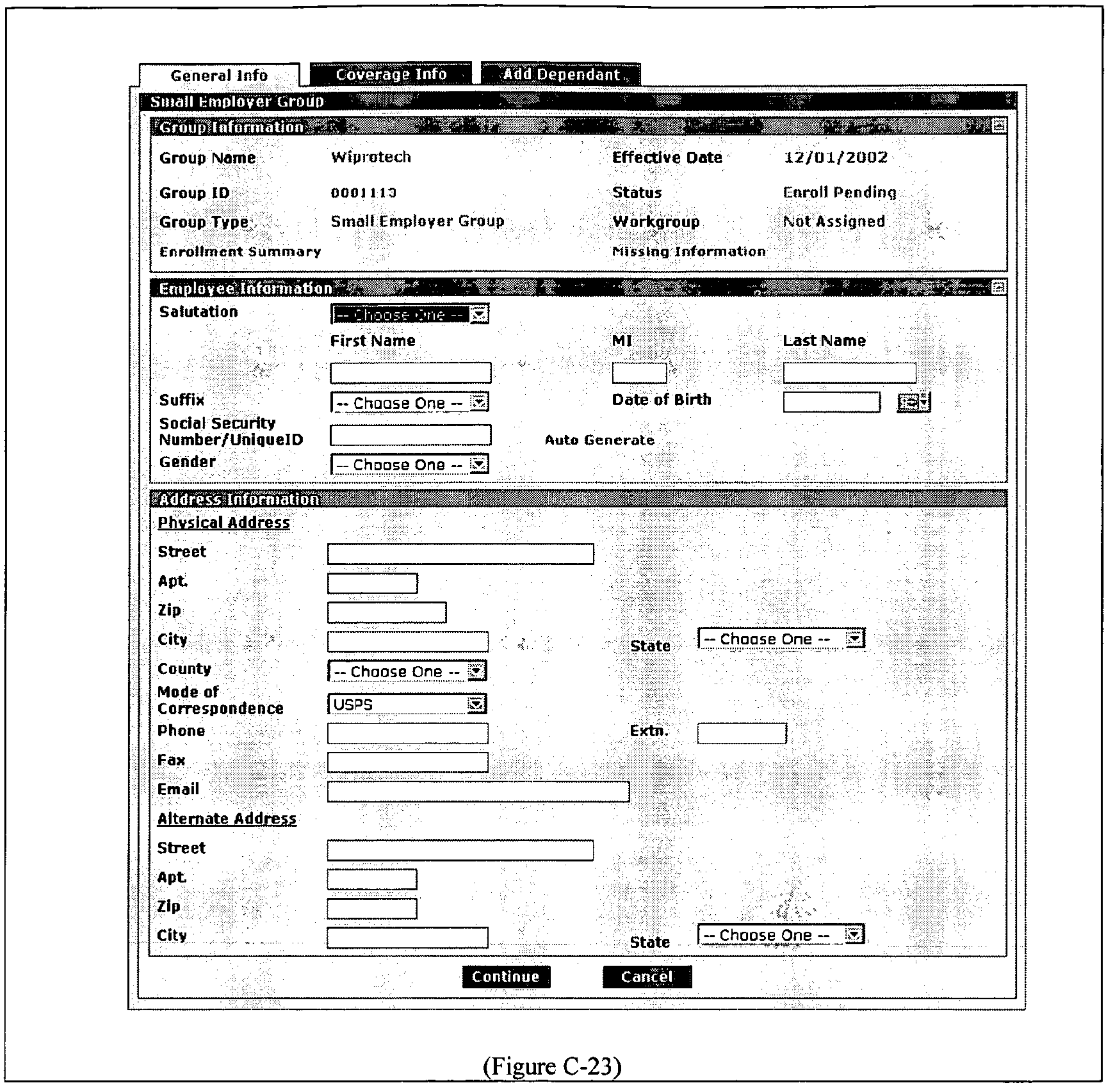
(Figure C-23)

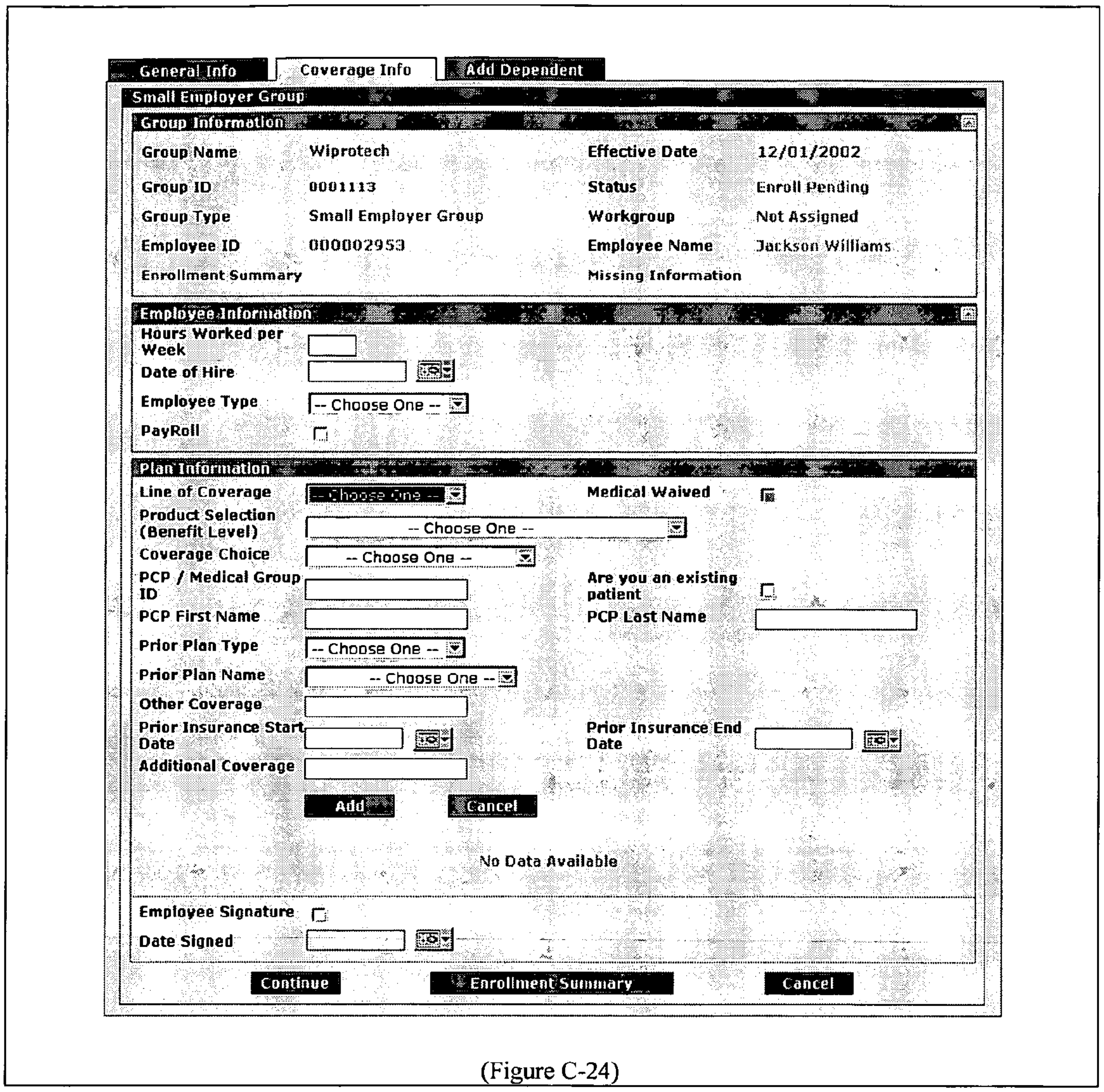
(Figure C-24)

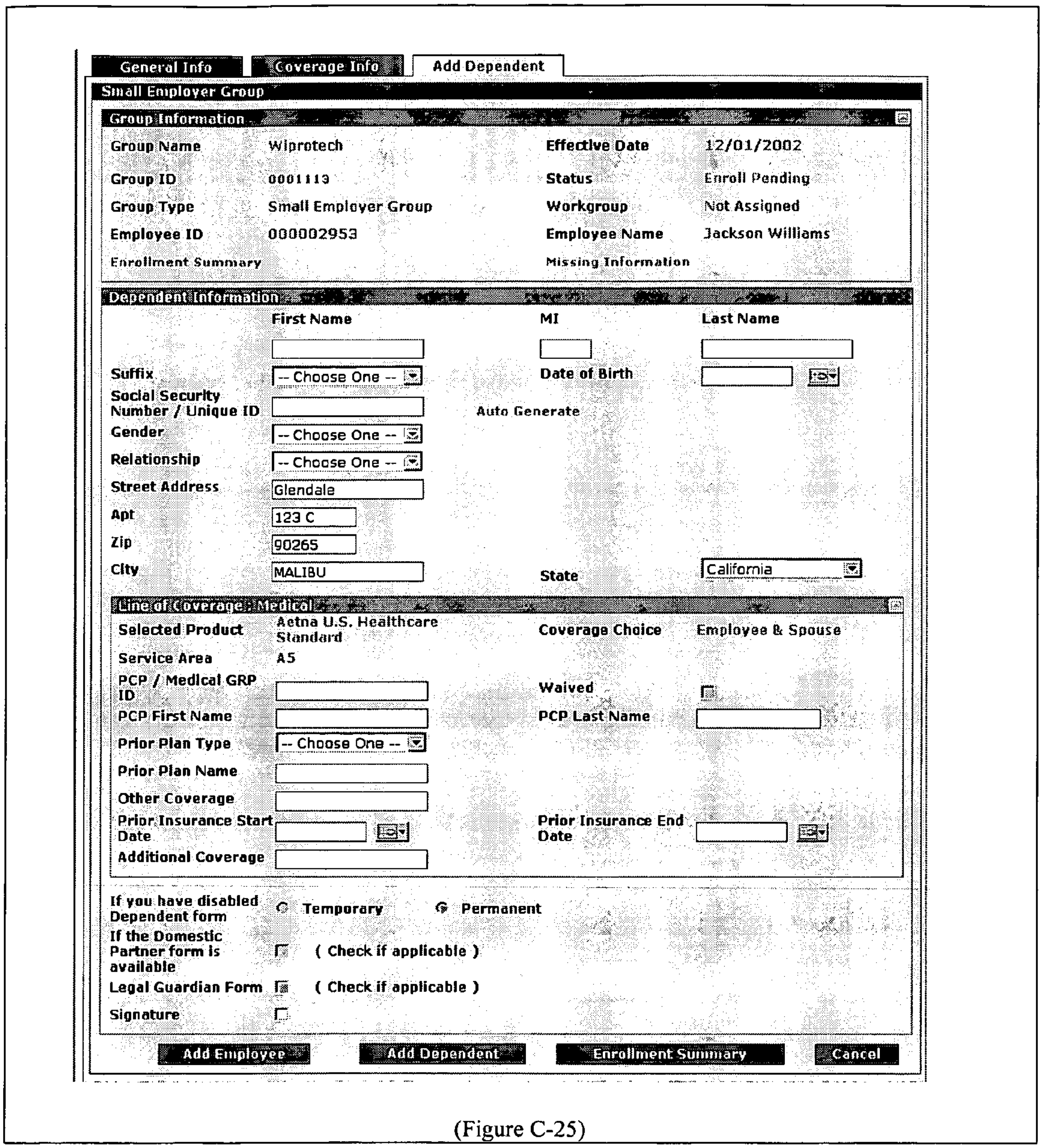
(Figure C-25)

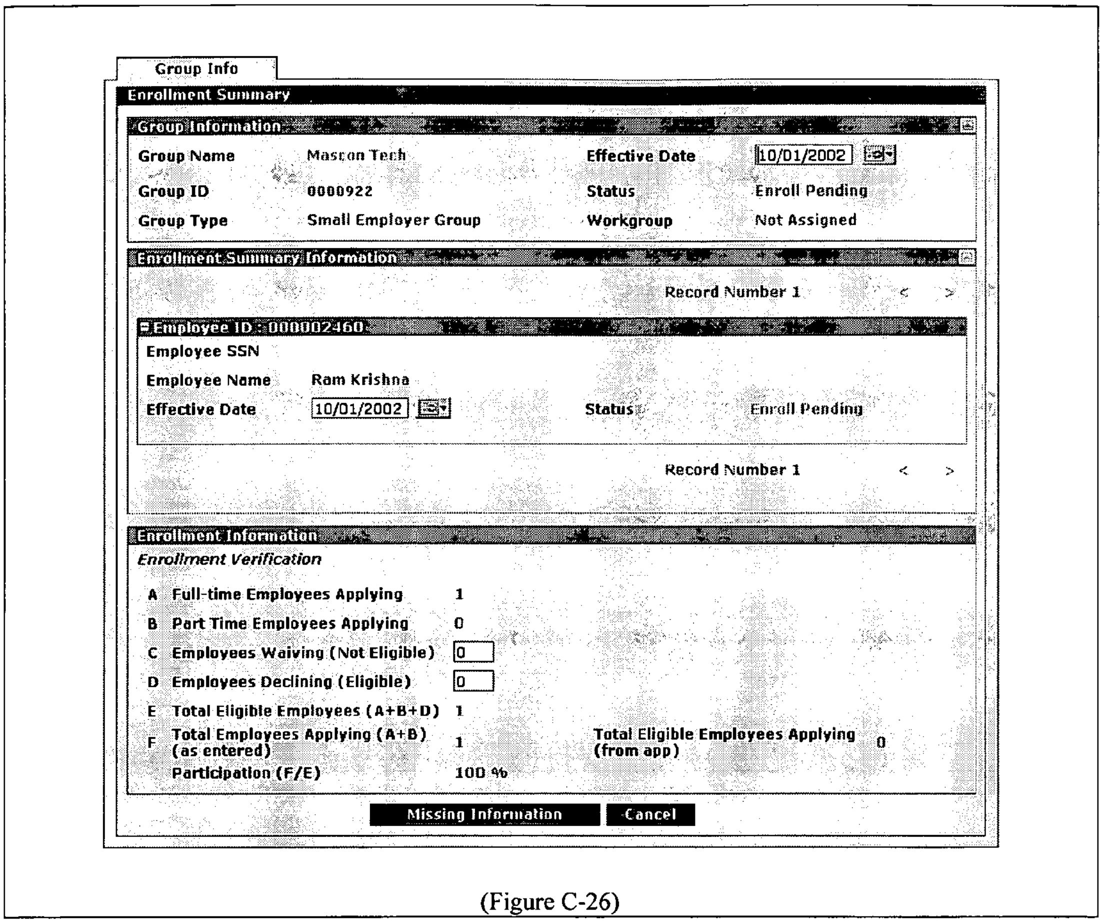
(Figure C-26)

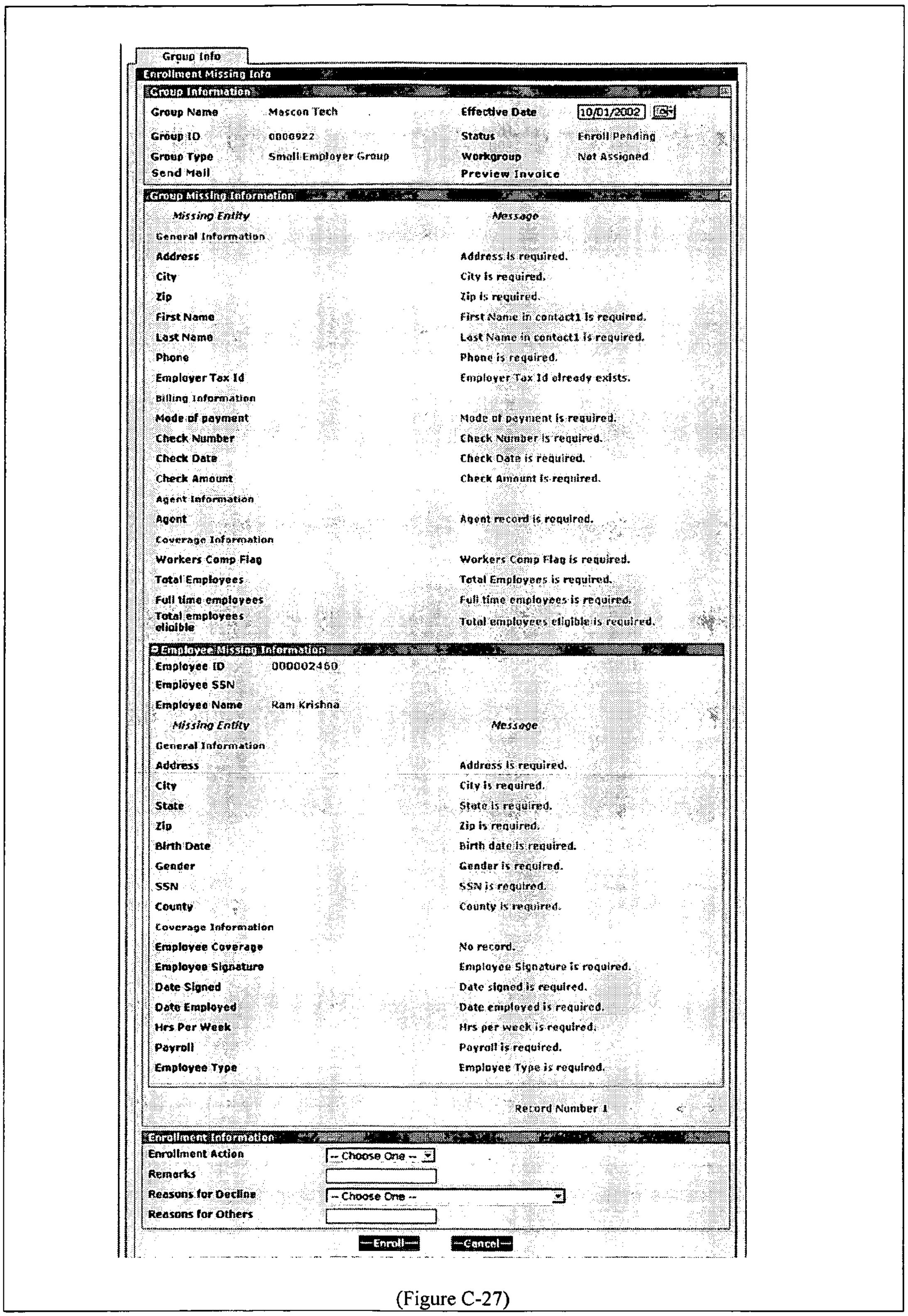
(Figure C-27)

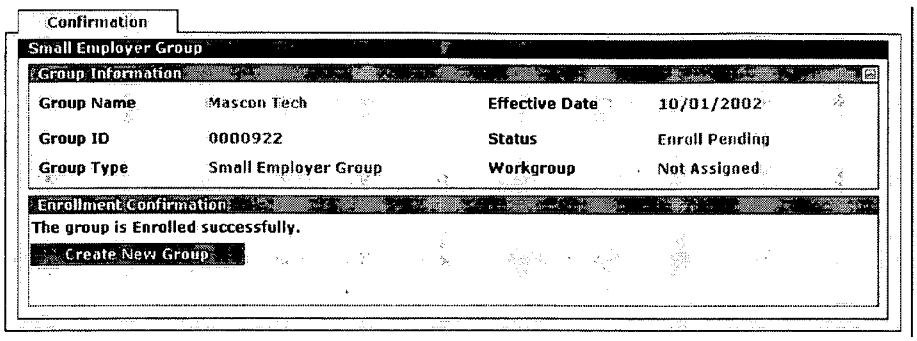
(Figure C-28)
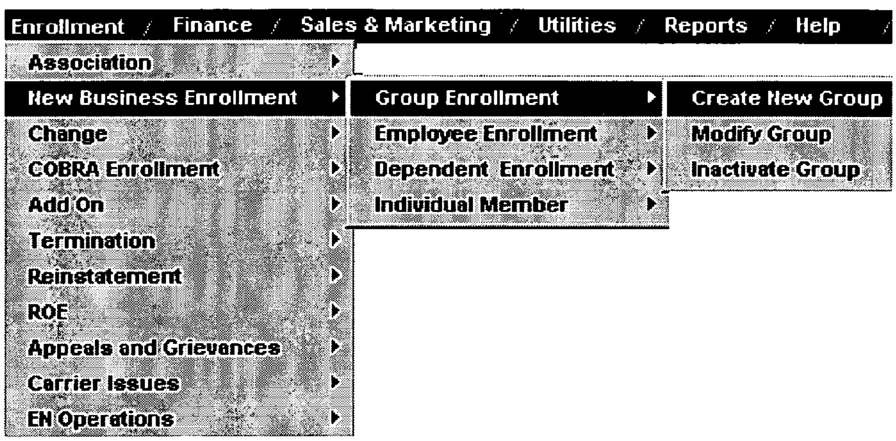
(Figure C-29)
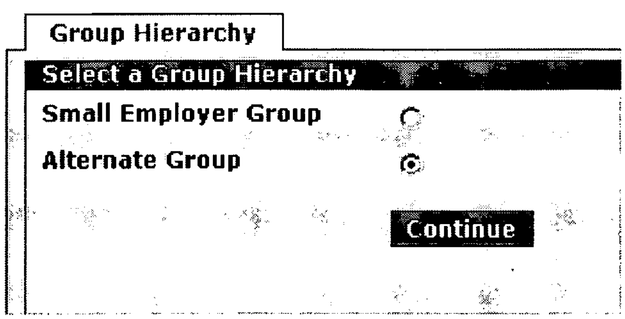
(Figure C-30)

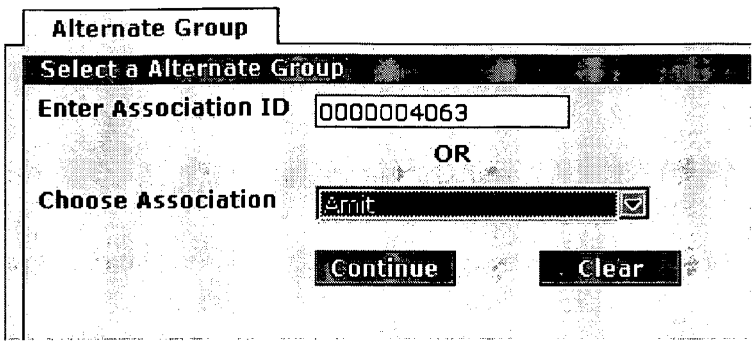
(Figure C-31)
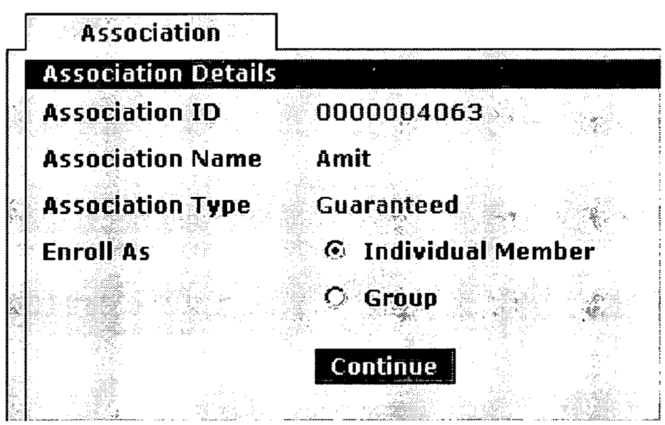
(Figure C-32)

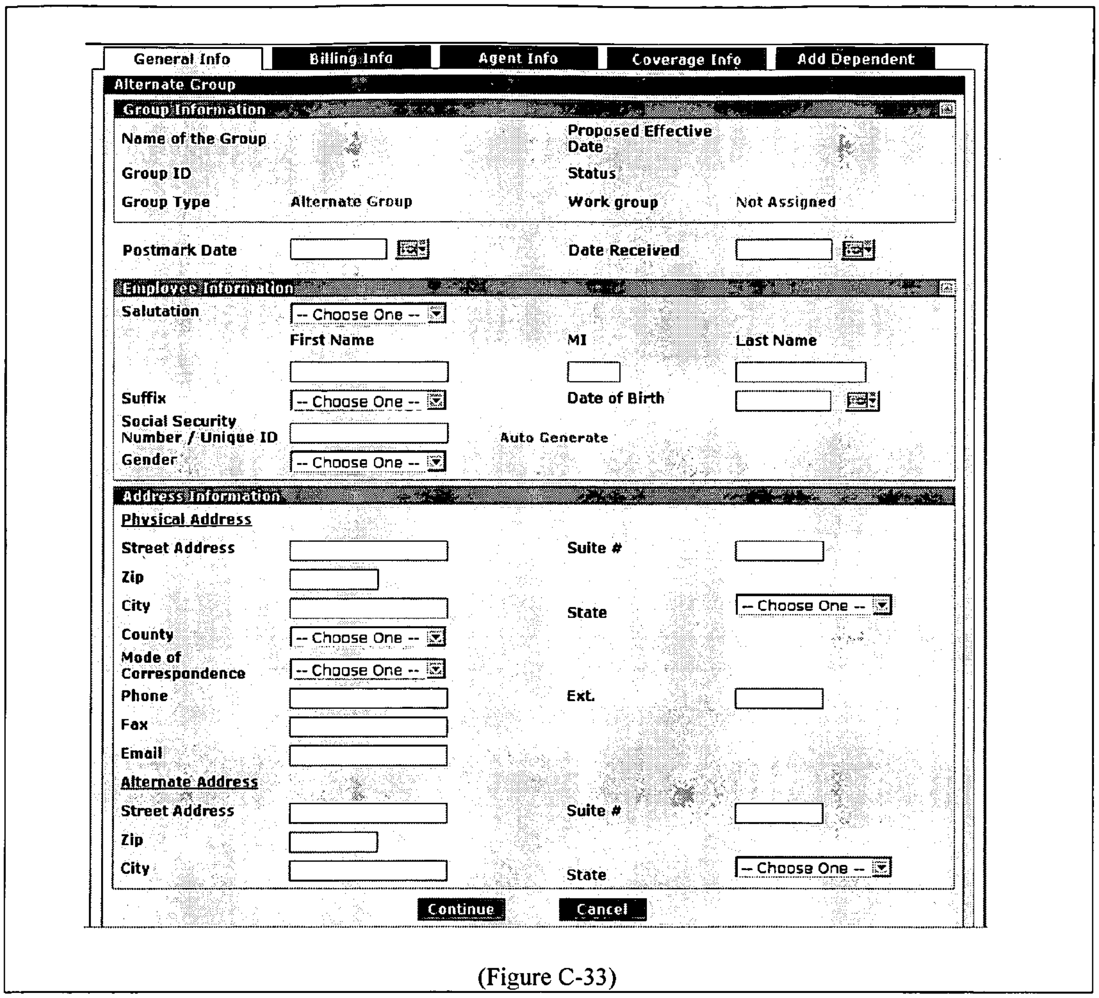
(Figure C-33)

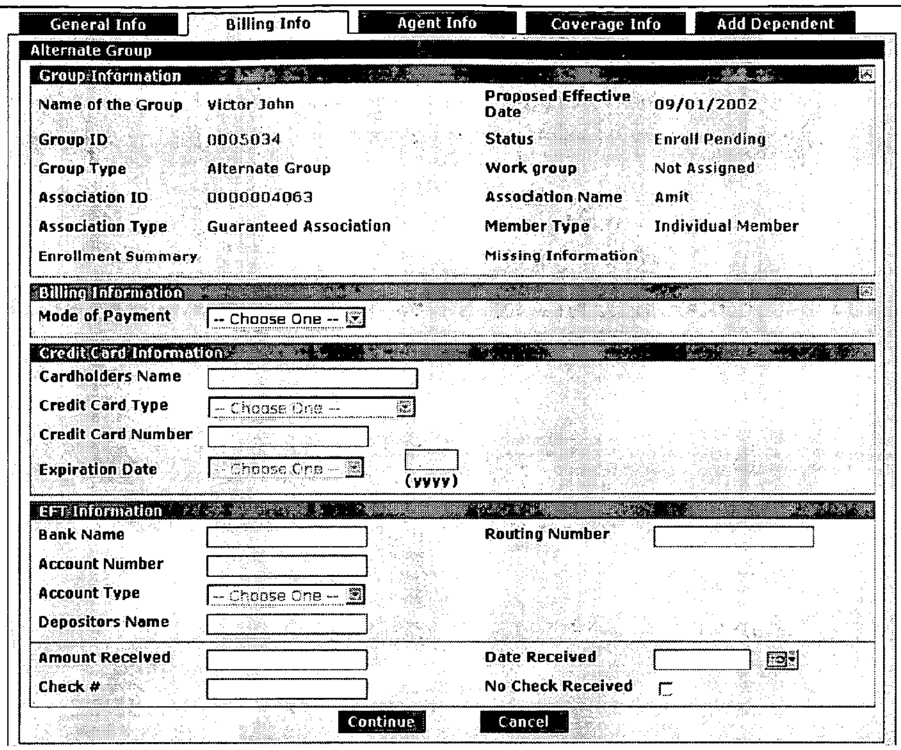
(Figure C-34)
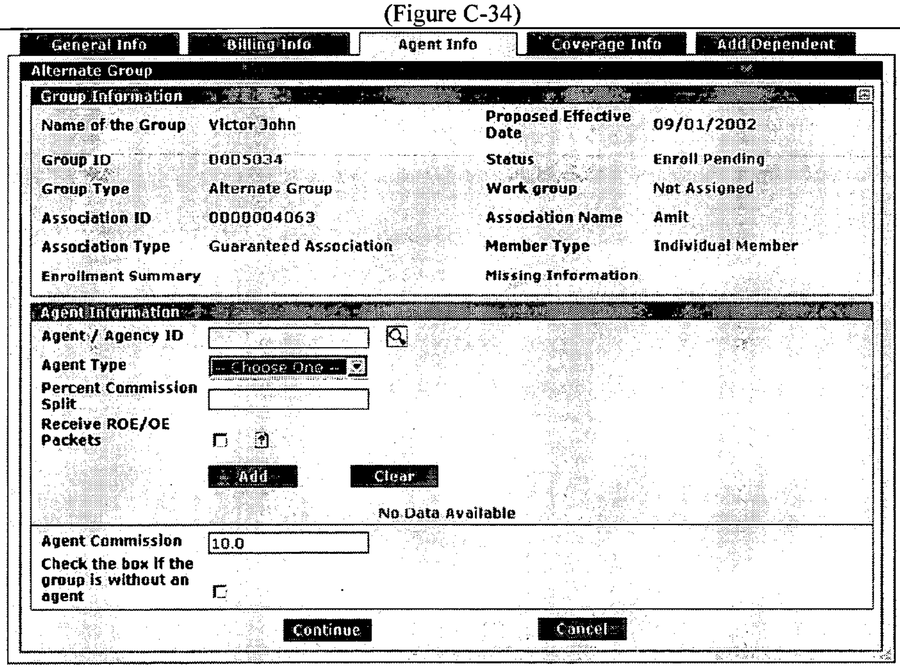
(Figure C-35)

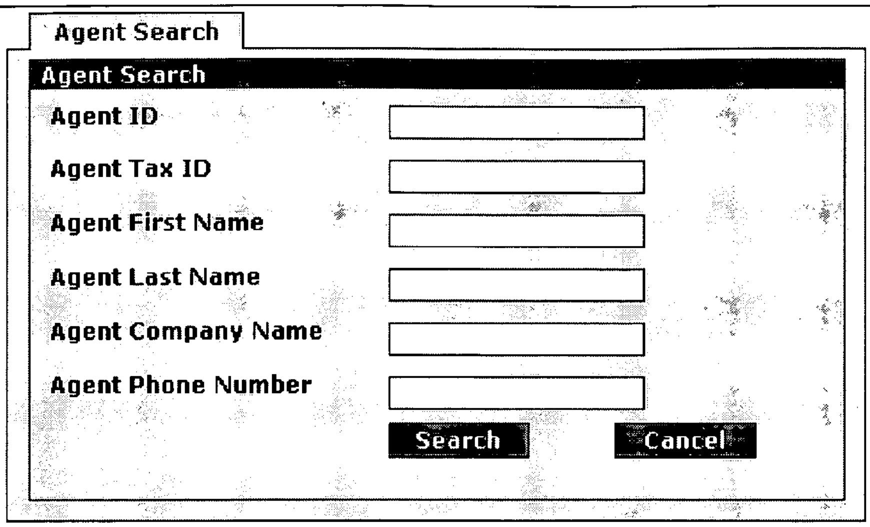
(Figure C-36)
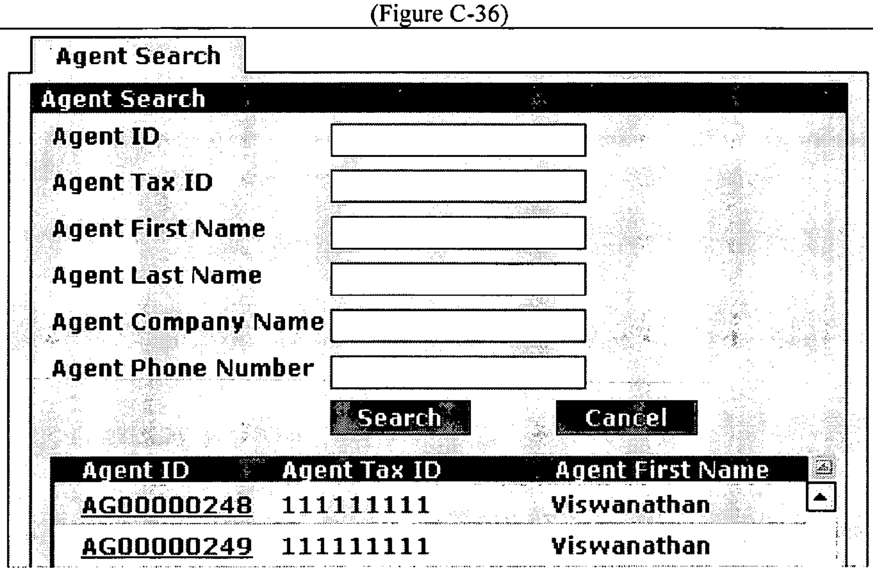
Figure C-37

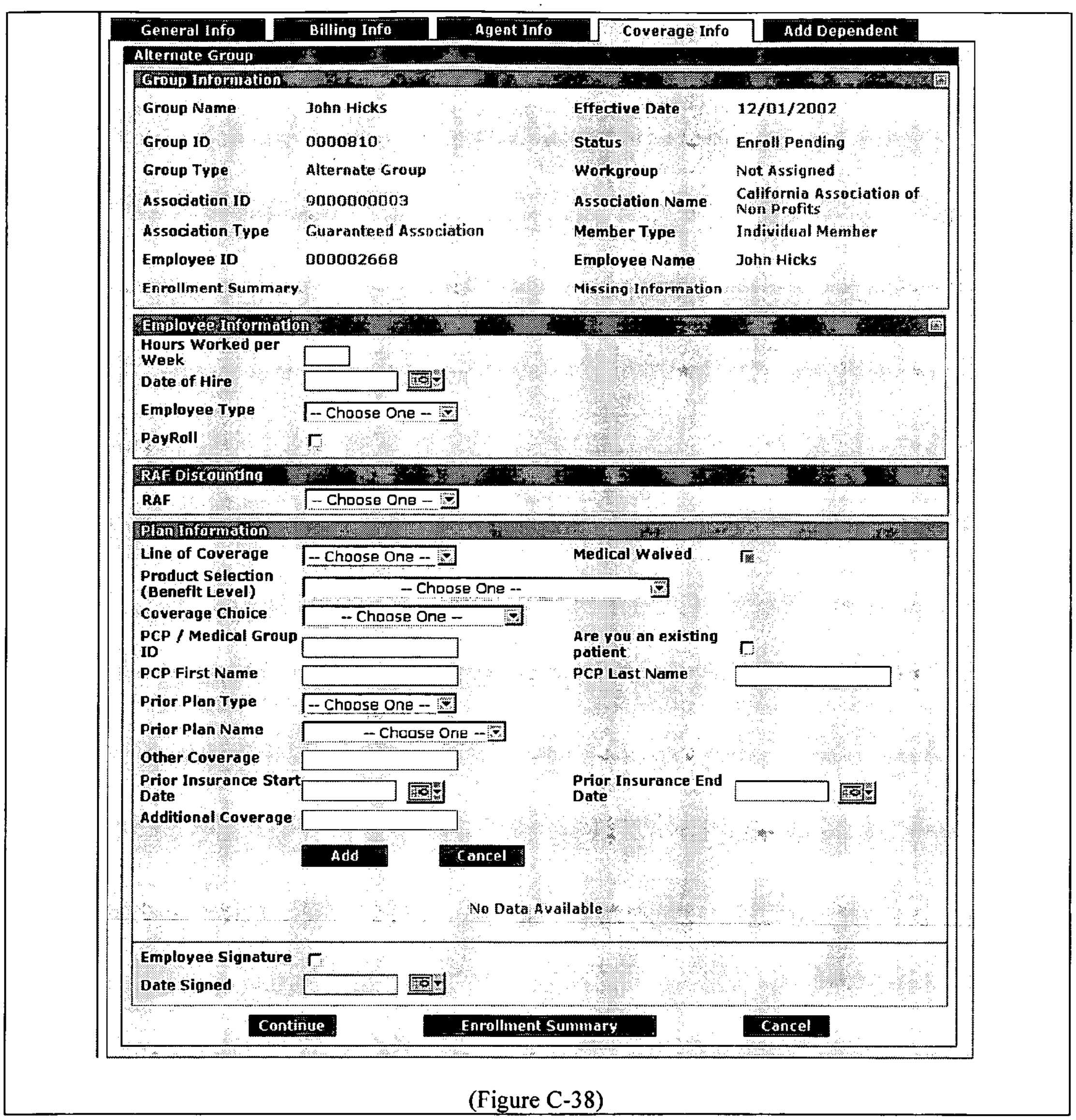
(Figure C-38)

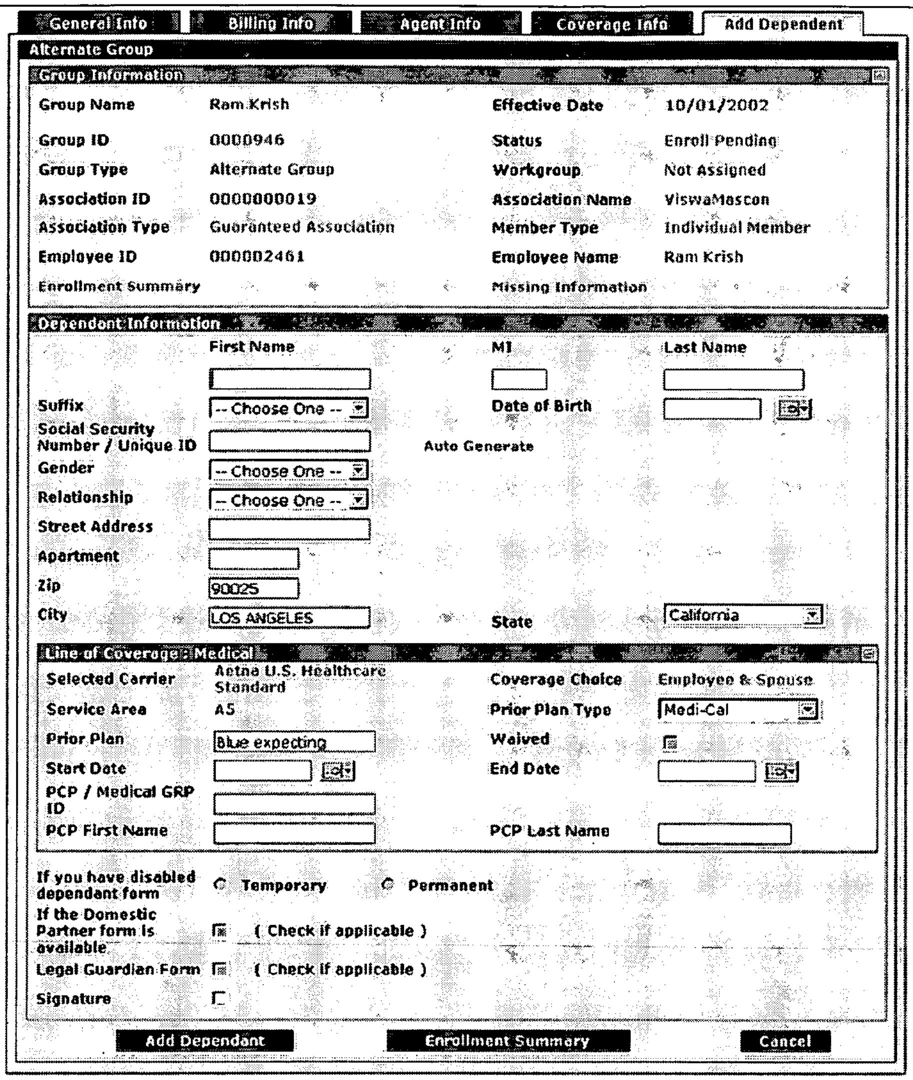
(Figure C-39)
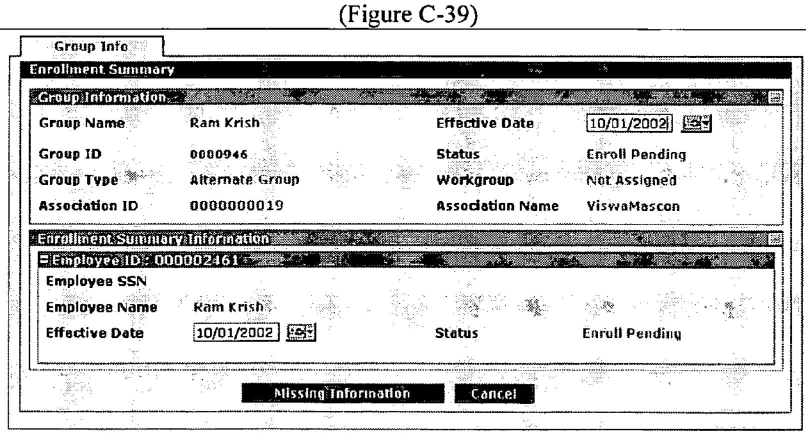
(Figure C-40)

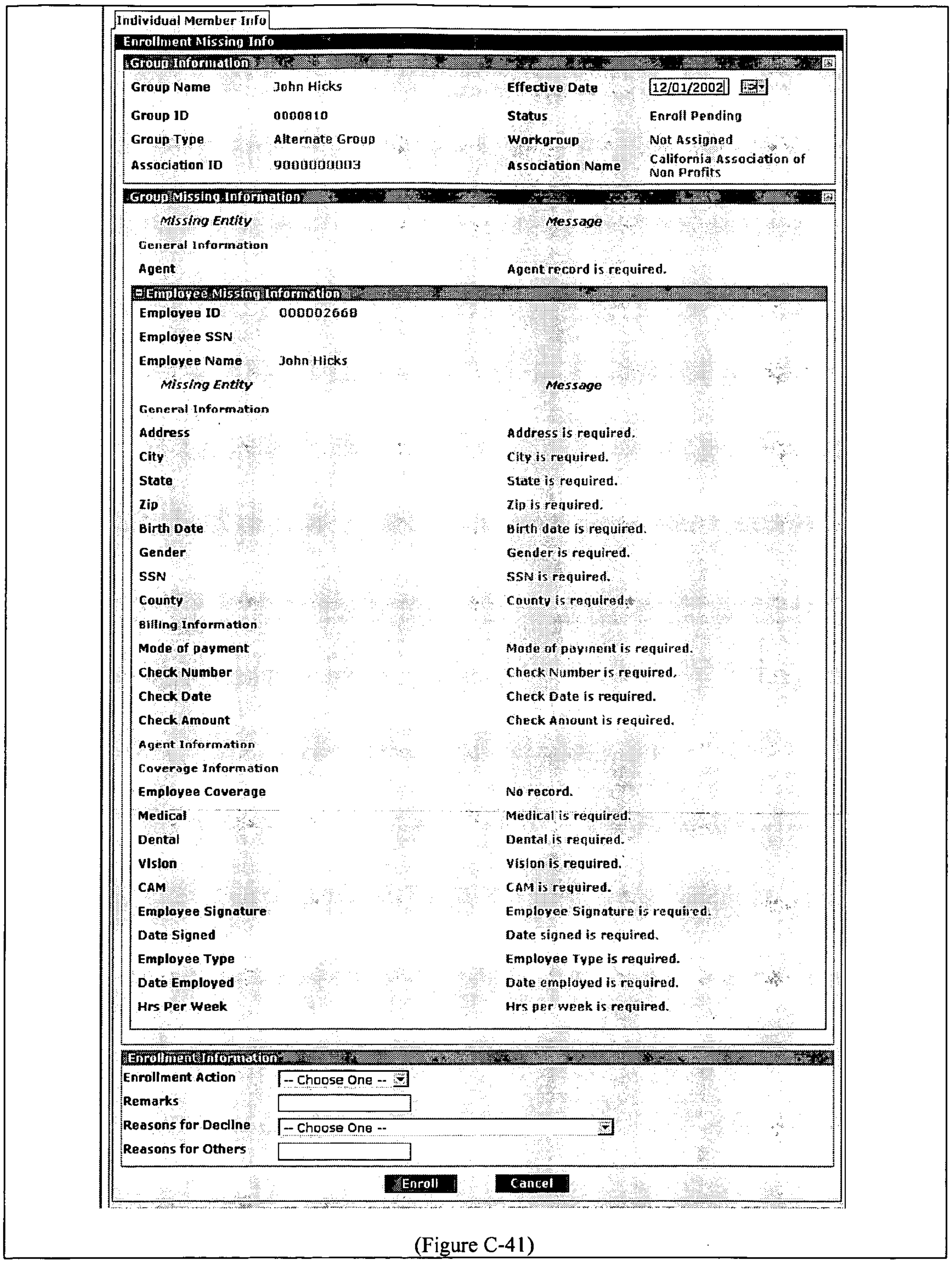
(Figure C-41)

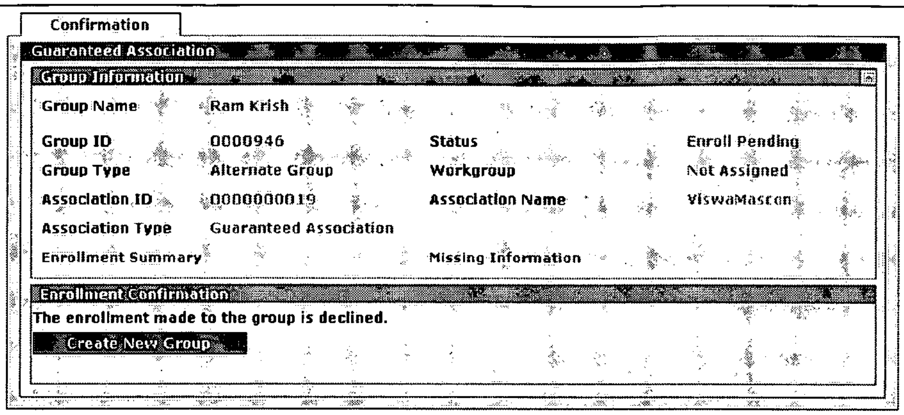
(Figure C-42)
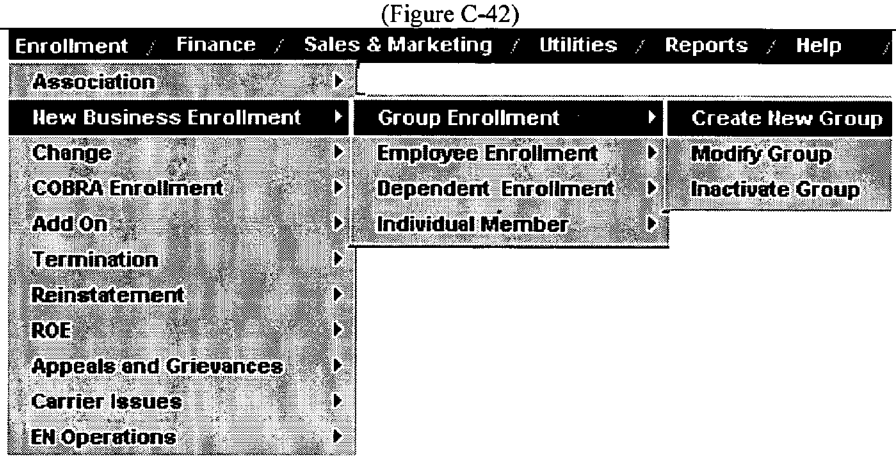
(Figure C-43)
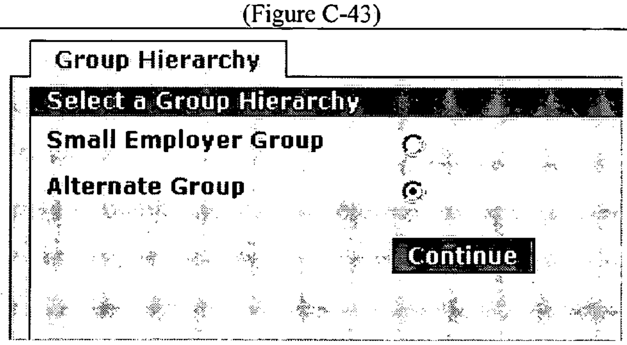
(Figure C-44)

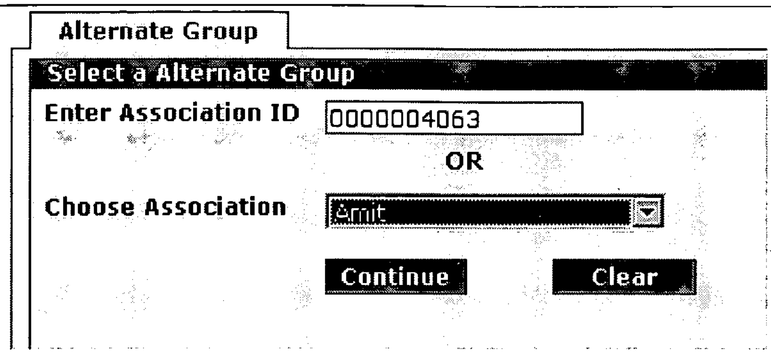
(Figure C-45)
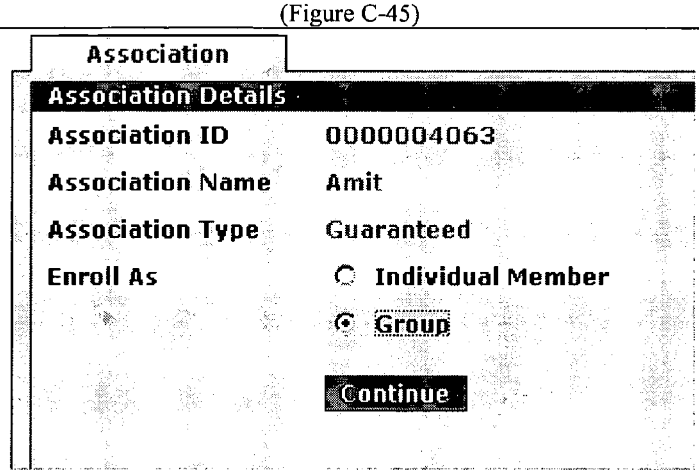
(Figure C-46)

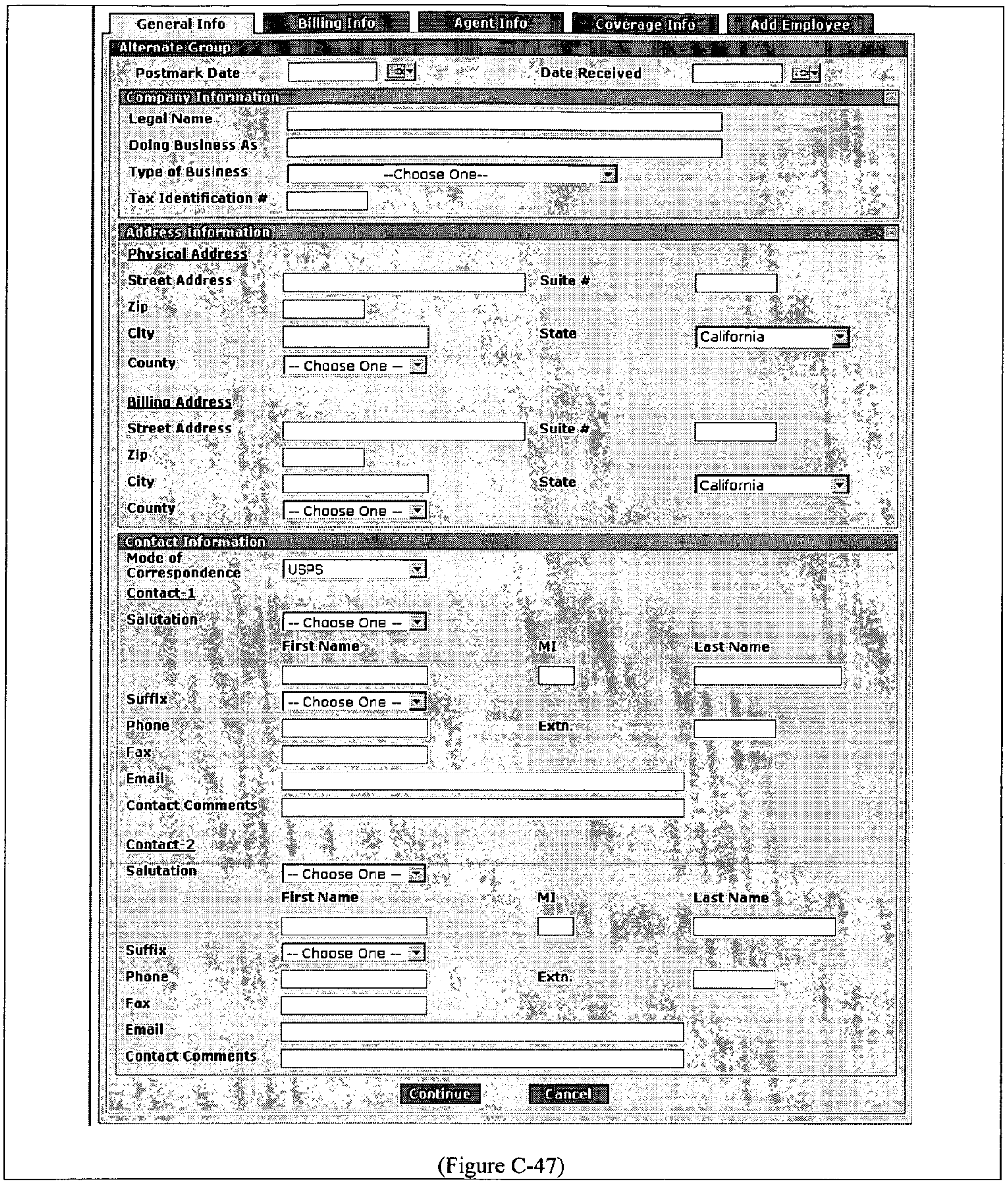
(Figure C-47)

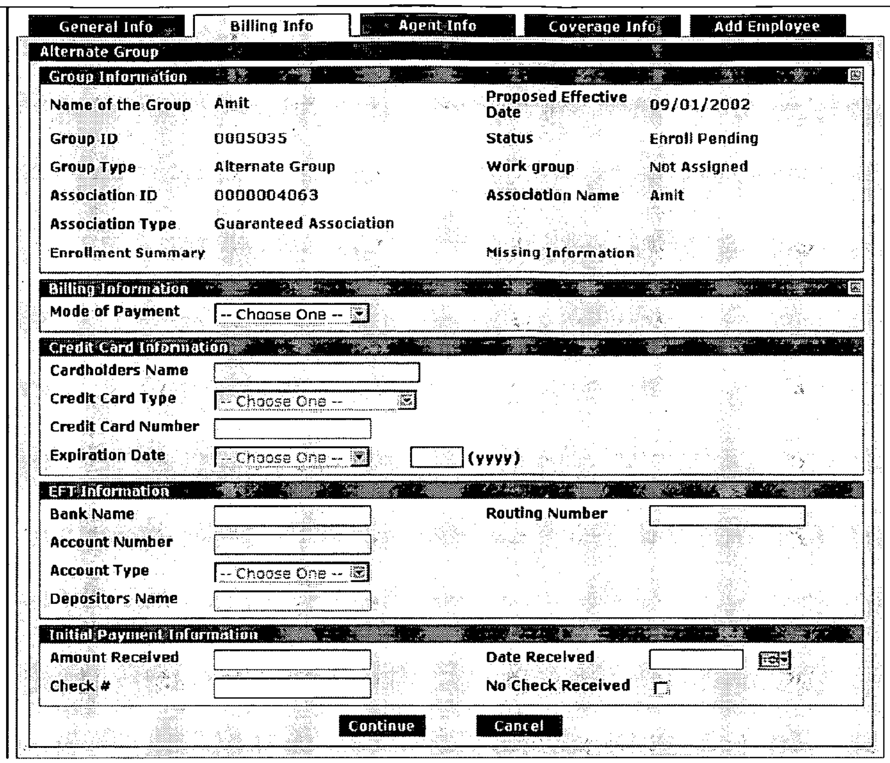
(Figure C-48)
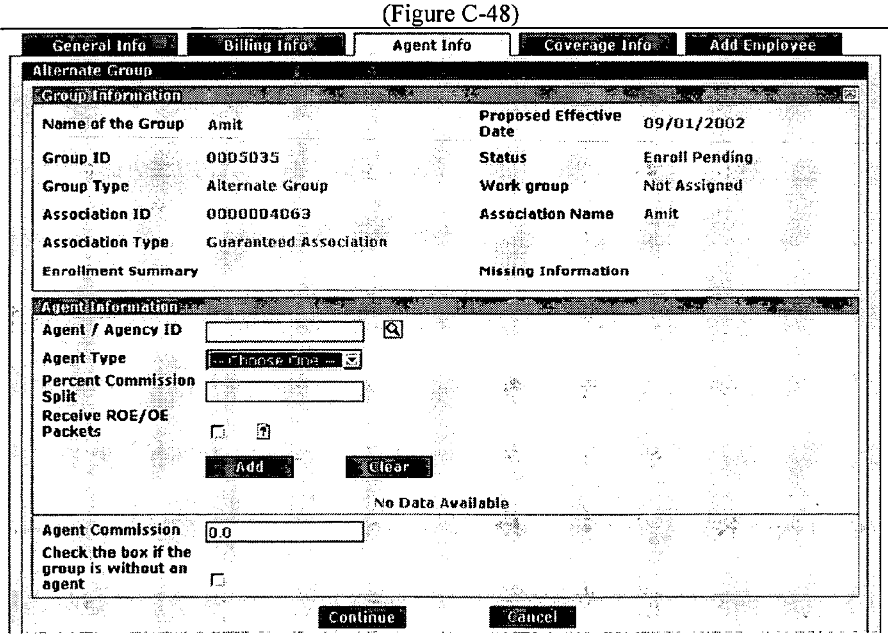
(Figure C-49)

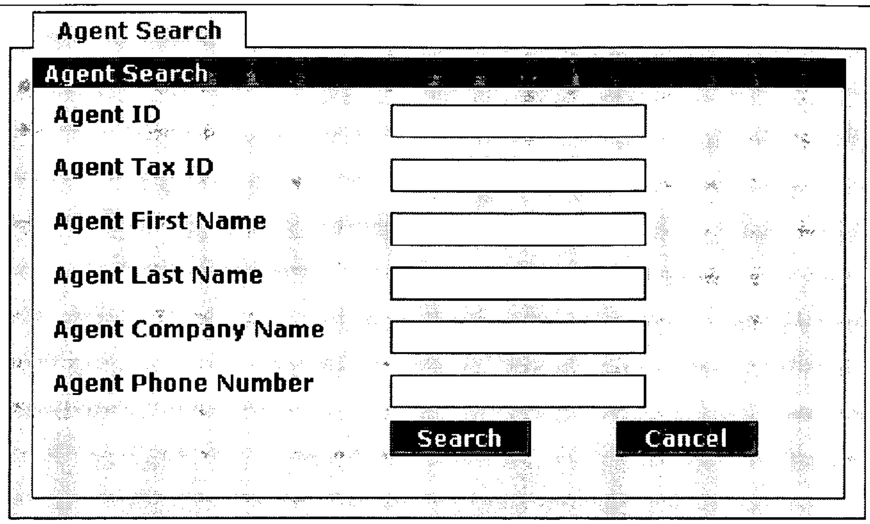
(Figure C-50)
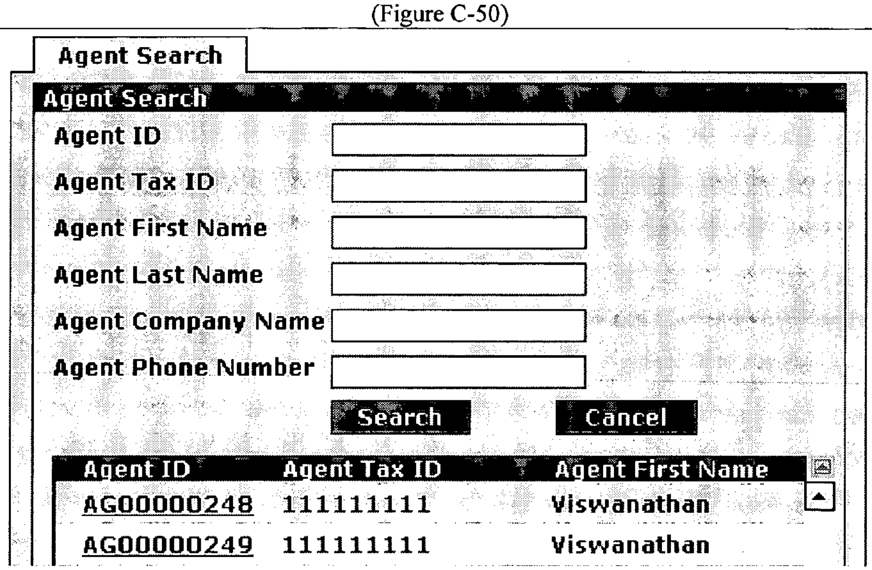
(Figure C-51)

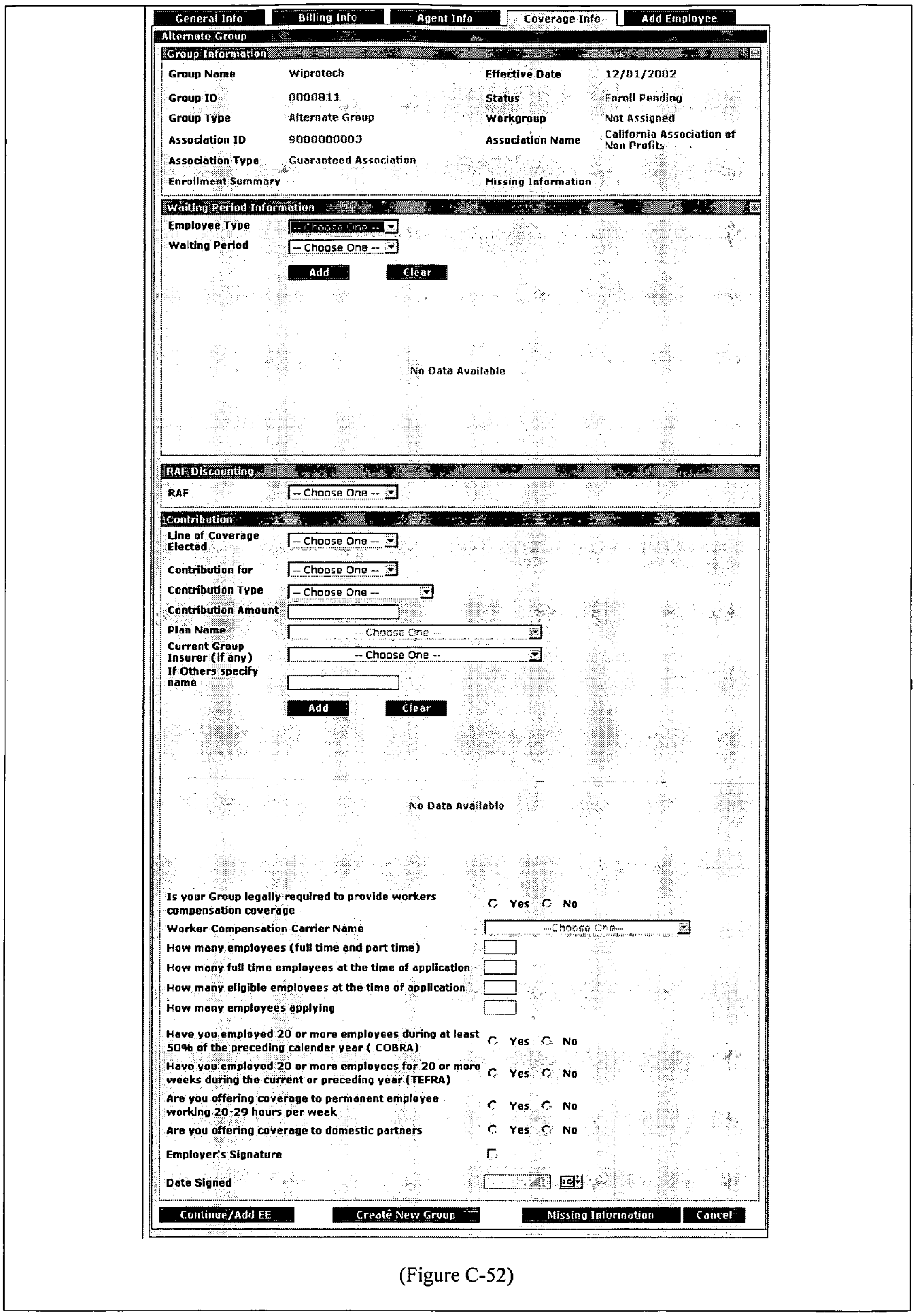
(Figure C-52)

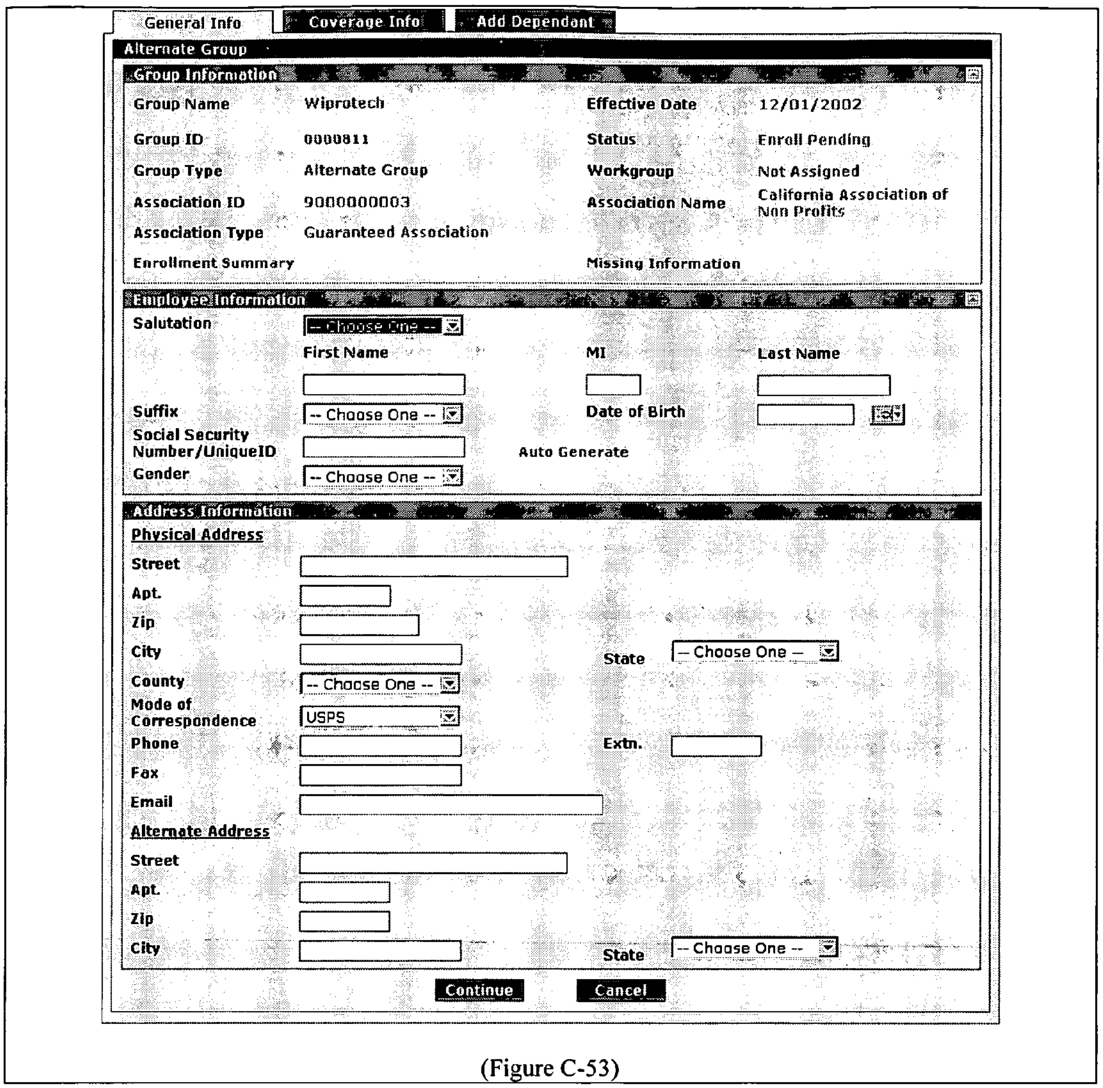
(Figure C-53)

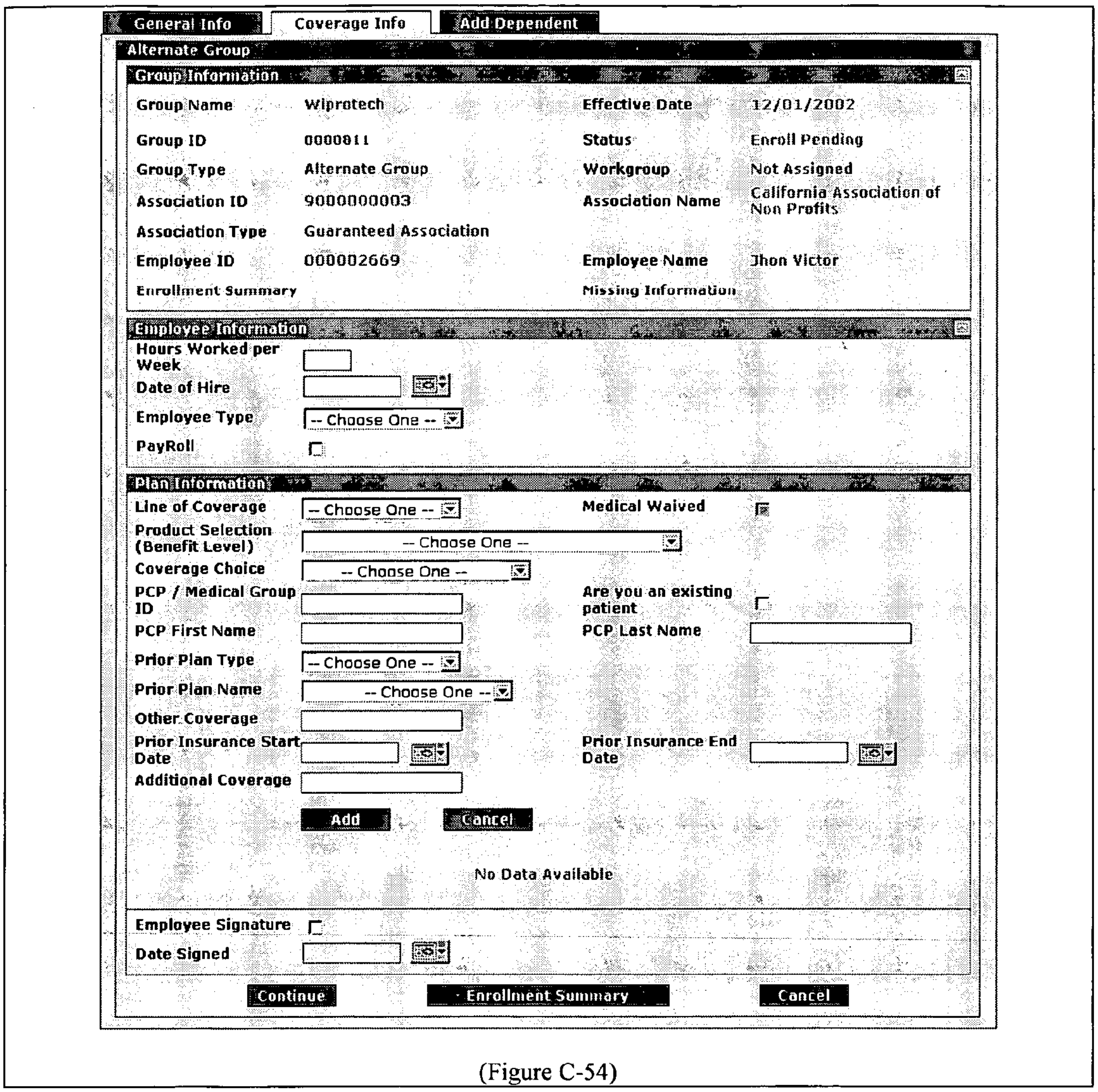
(Figure C-54)

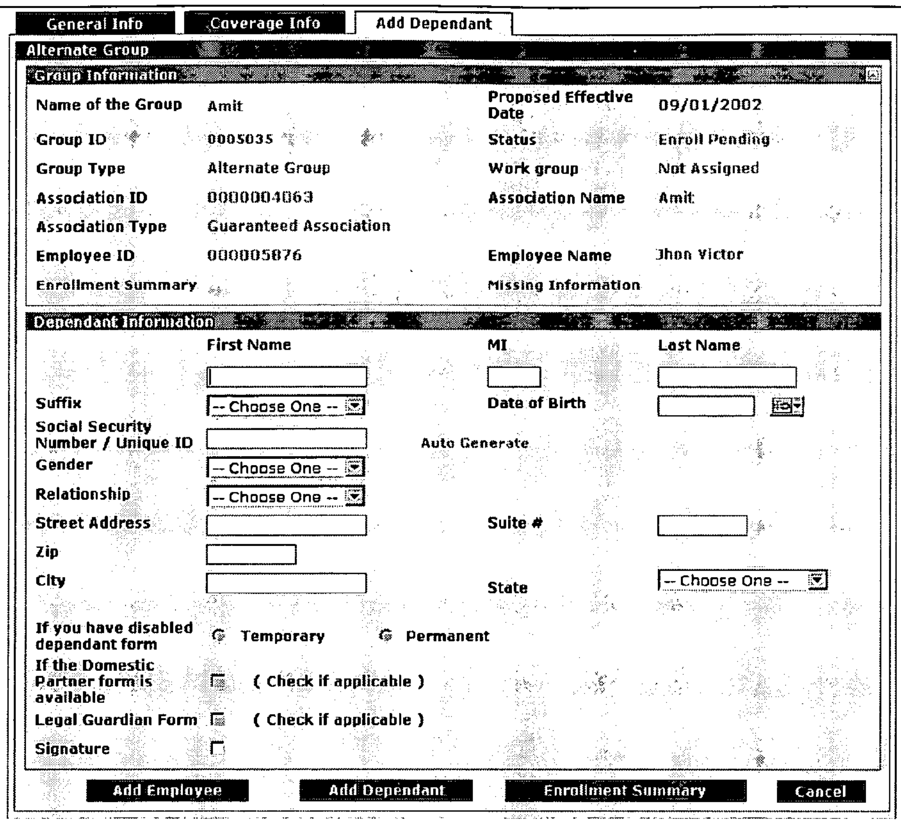
(Figure C-55)
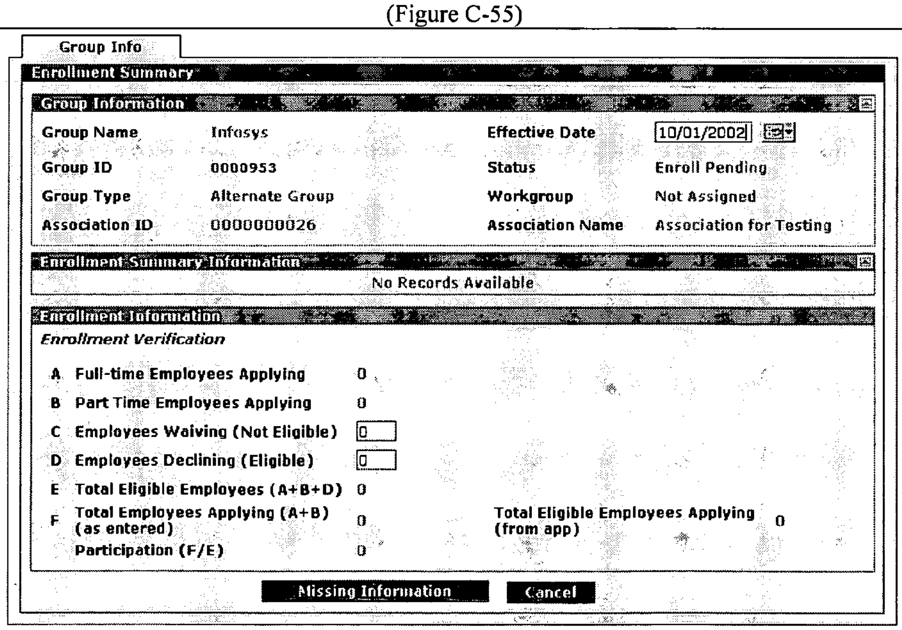
(Figure C-56)

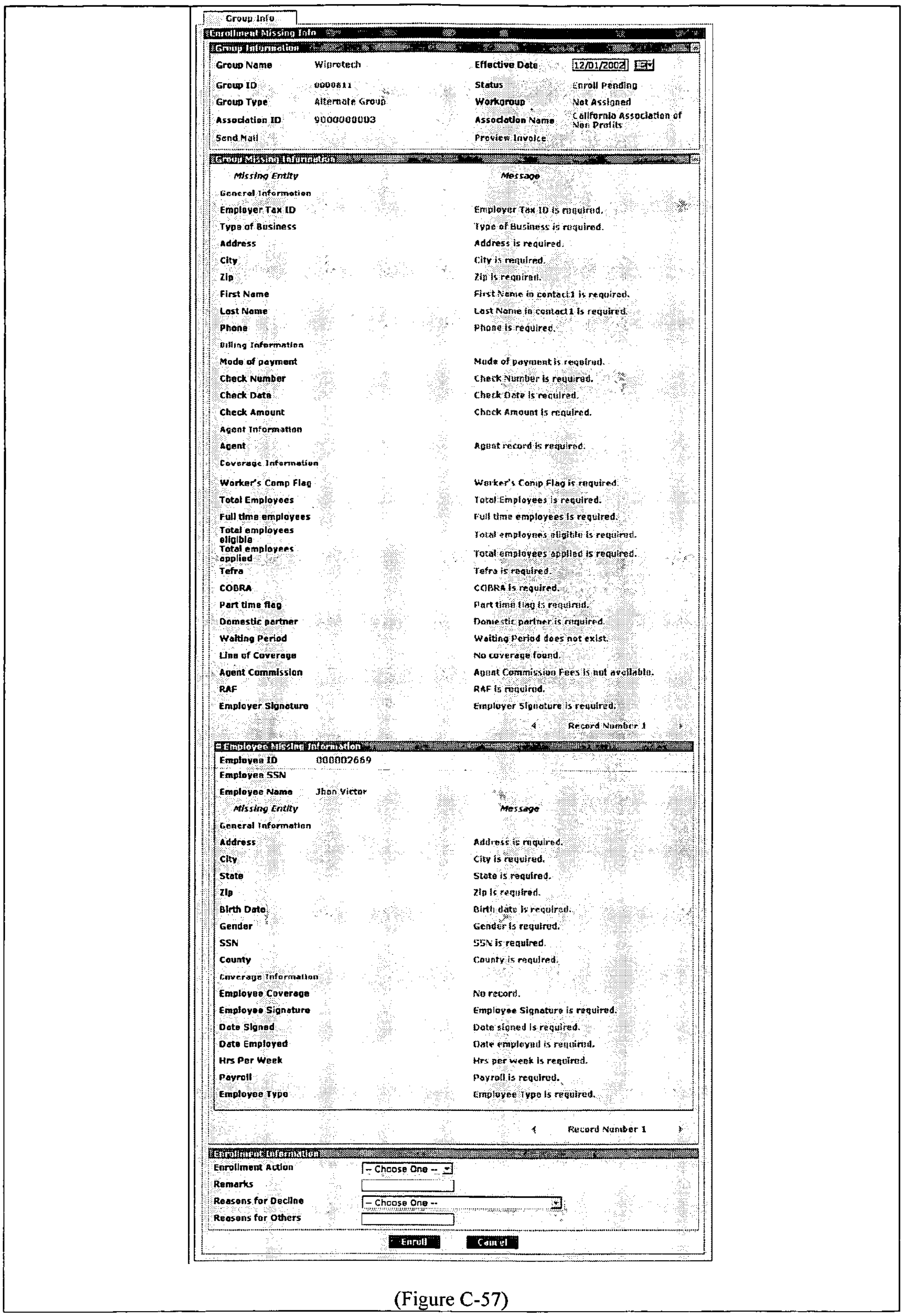
(Figure C-57)

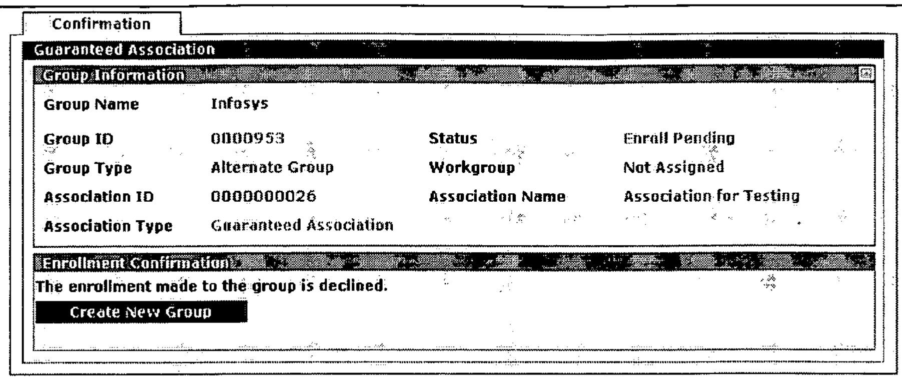
(Figure C-58)
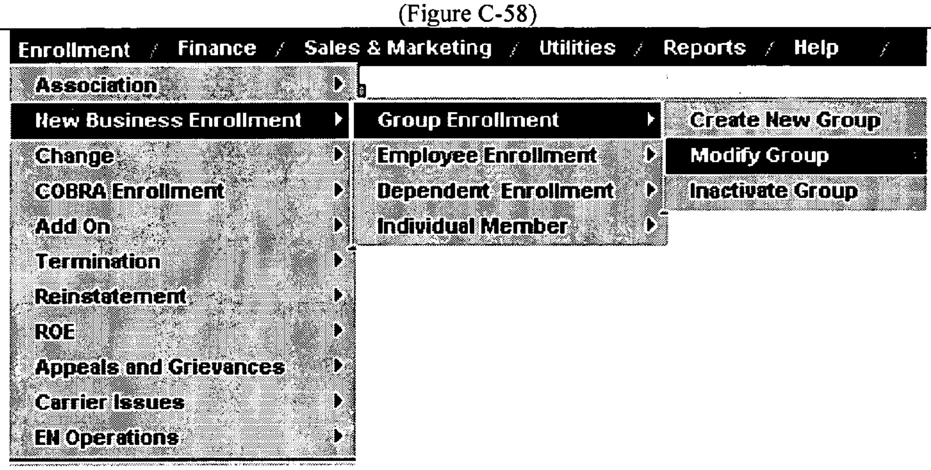
(Figure C-59)
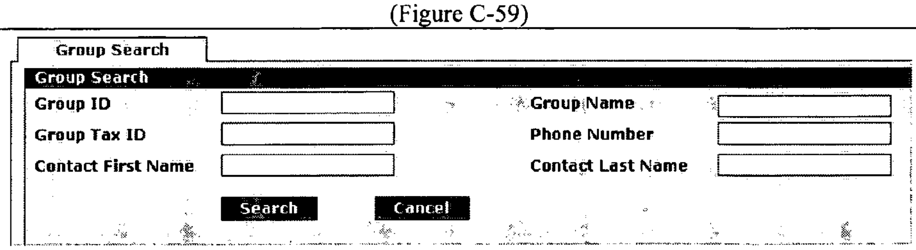
(Figure C-60)

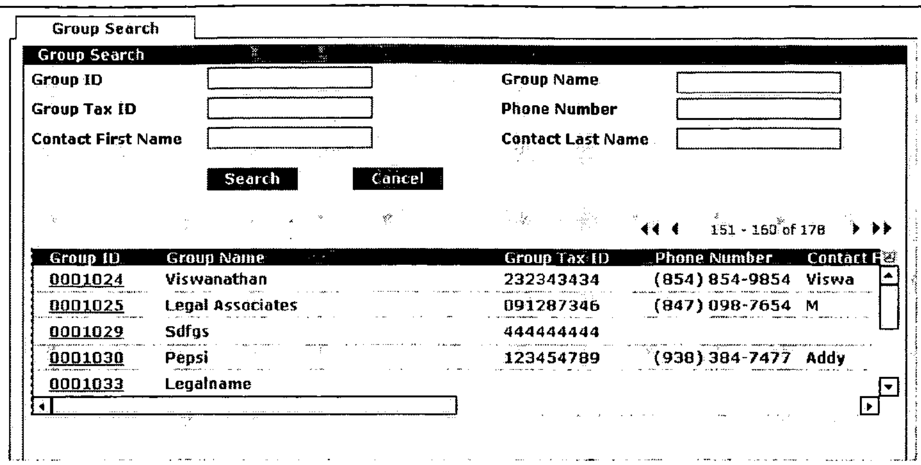
(Figure C-61)
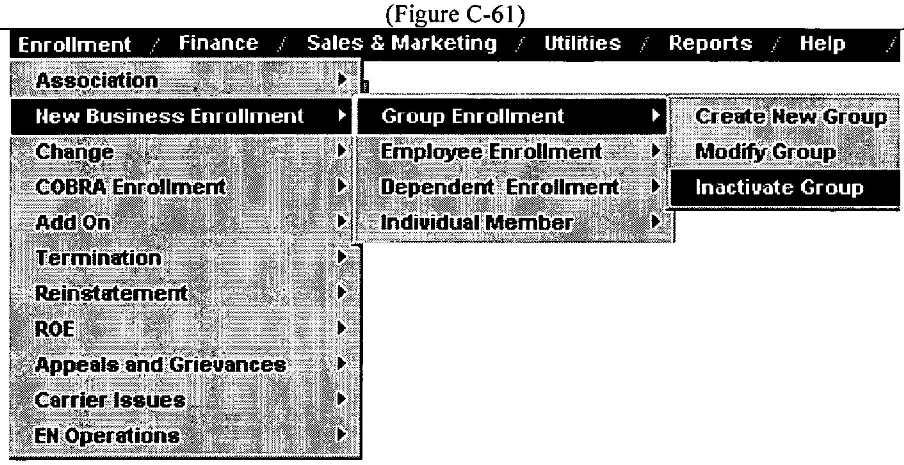
(Figure C-62)
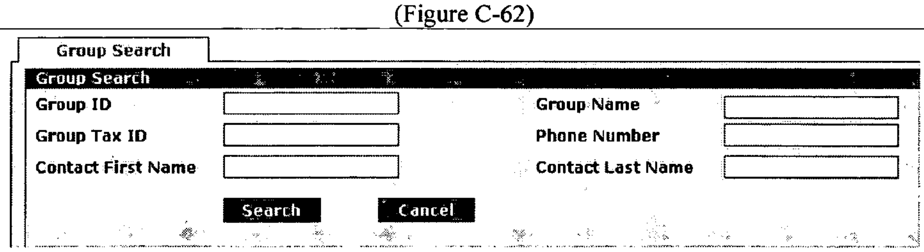
(Figure C-63)

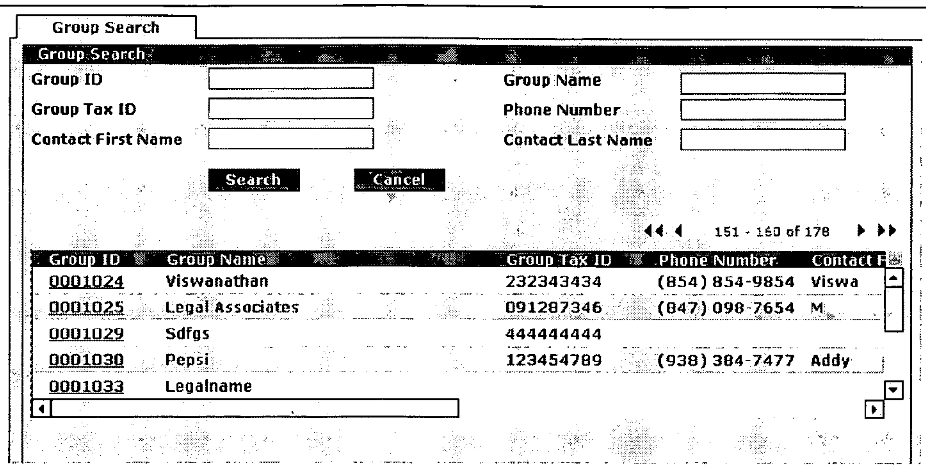
(Figure C-64)
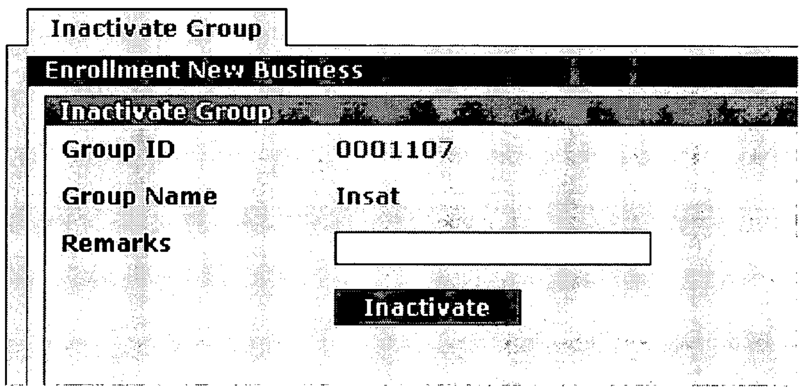
(Figure C-65)
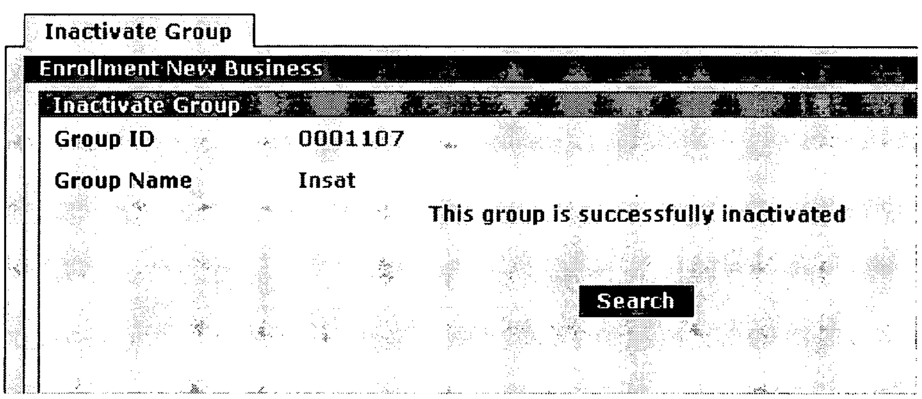
(Figure C-66)

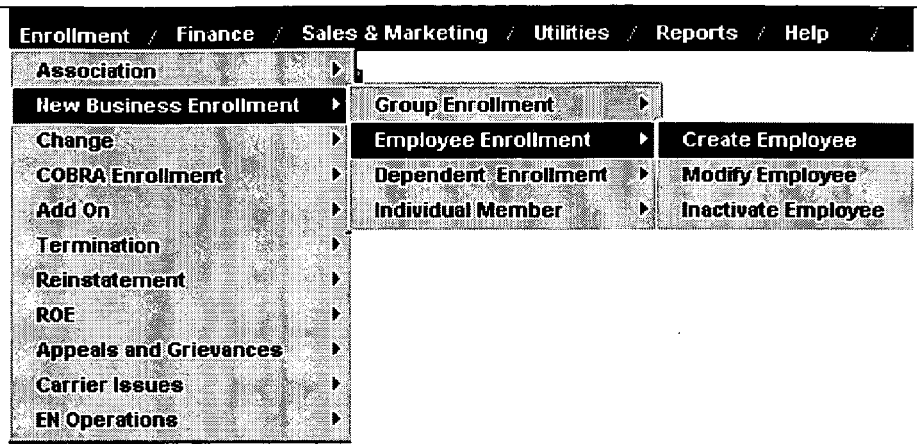
(Figure C-67)
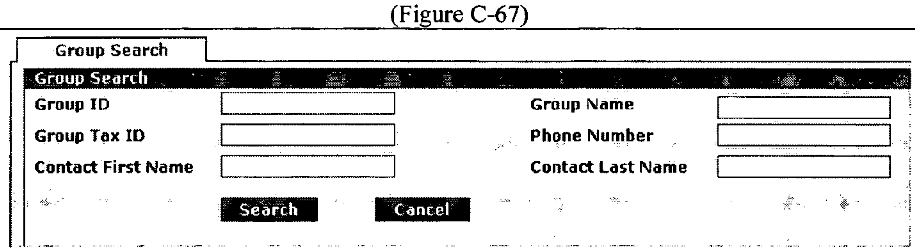
(Figure C-68)
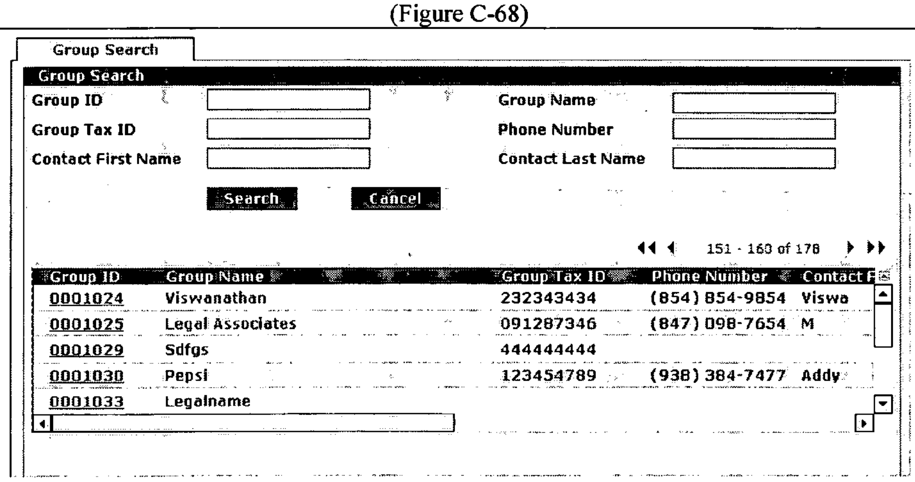
(Figure C-69)

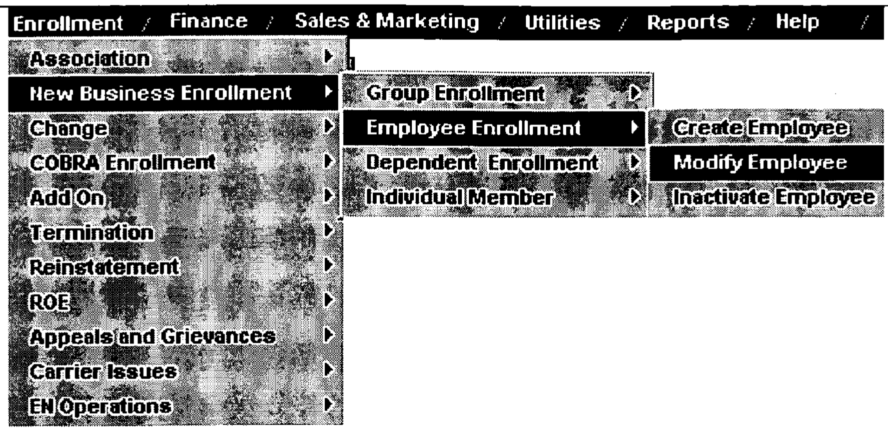
(Figure C-70)
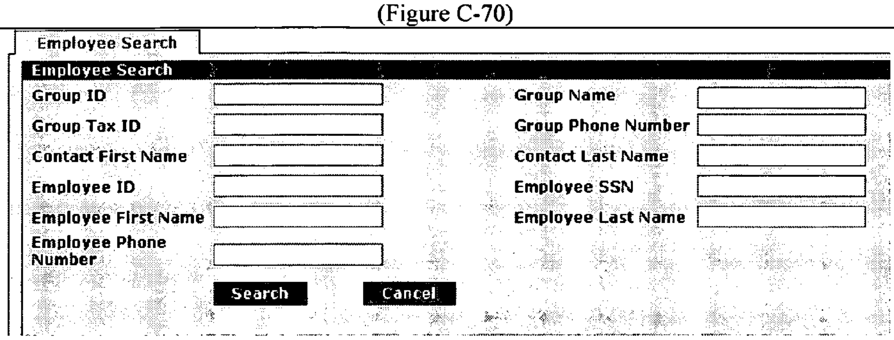
(Figure C-71)
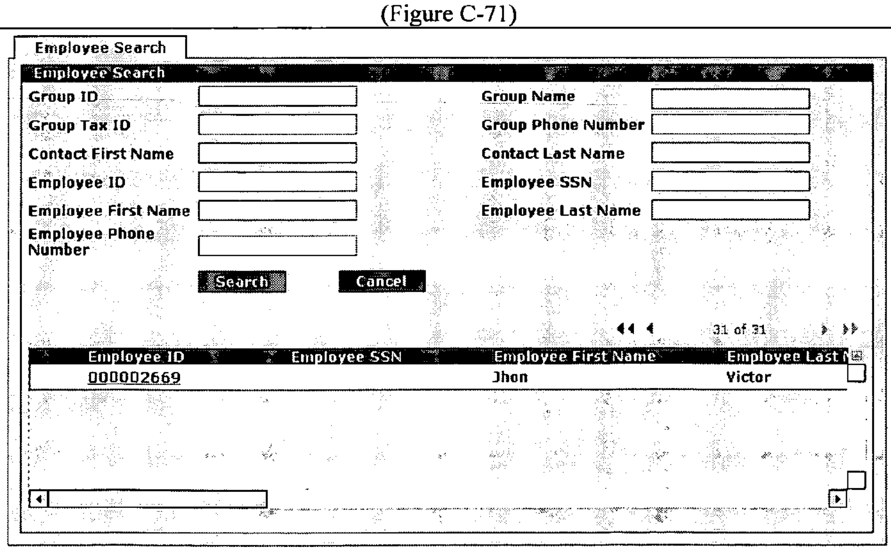
(Figure C-72)

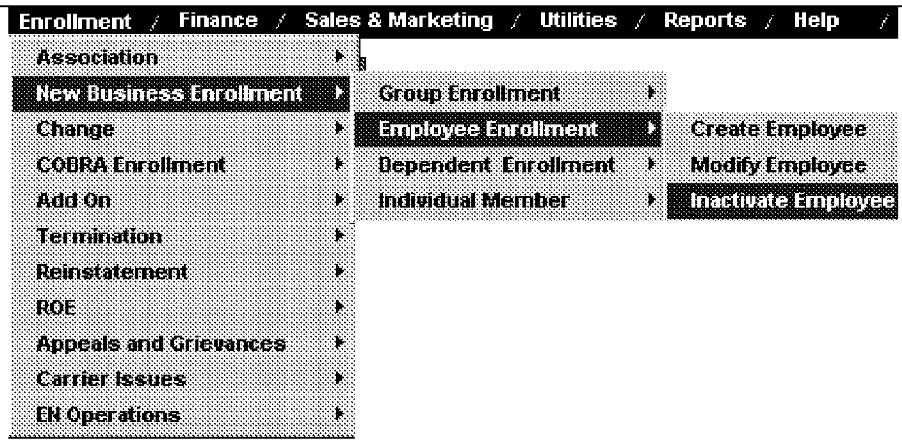
(Figure C-73)
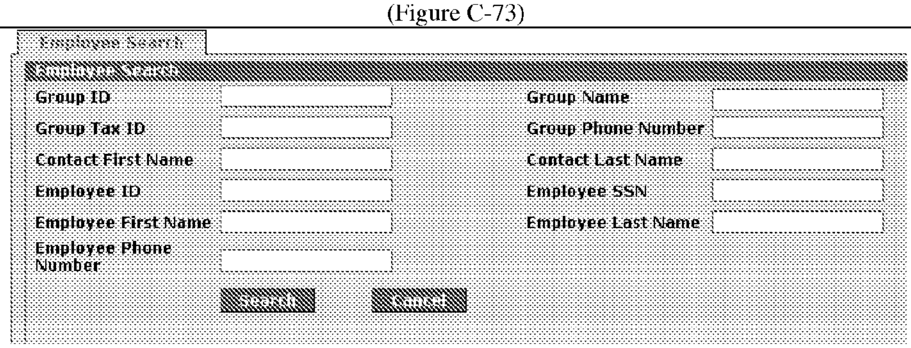
(Figure C-74)
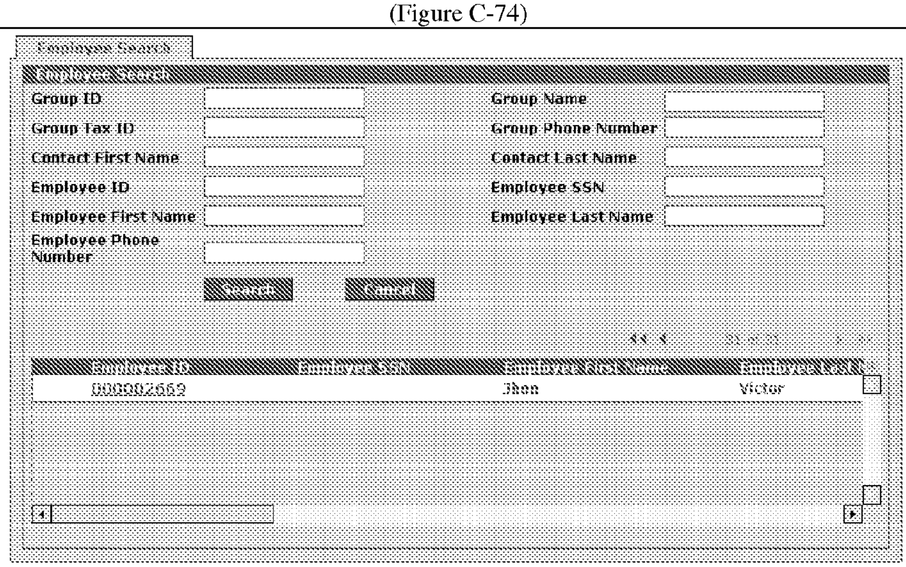
(Figure C-75a)

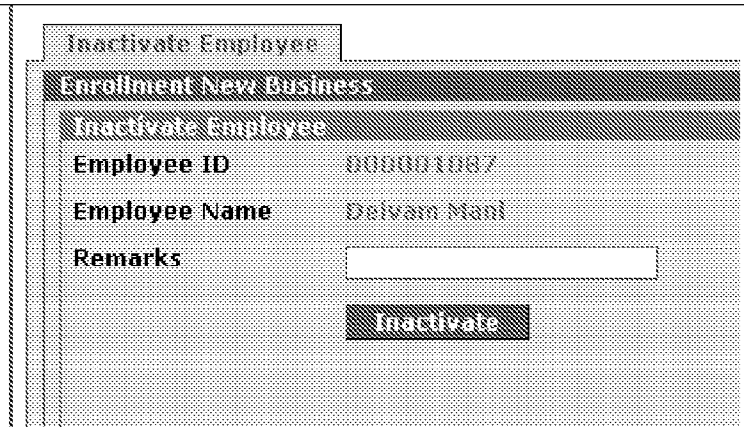
(Figure C-75b)
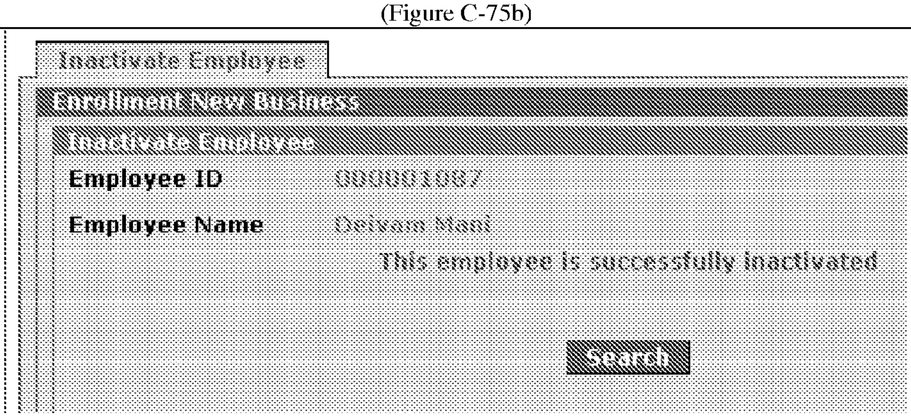
(Figure C-76)
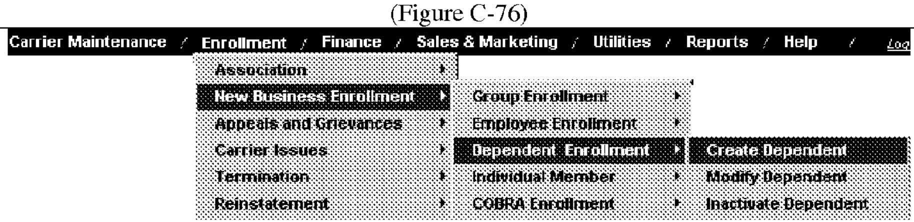
(Figure C-77)
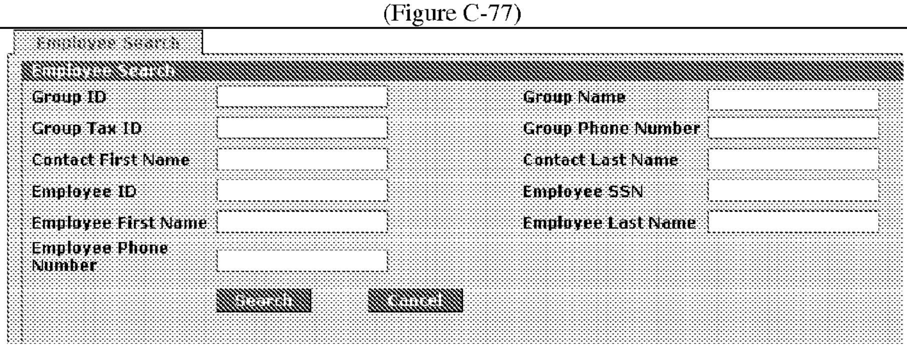
(Figure C-78)

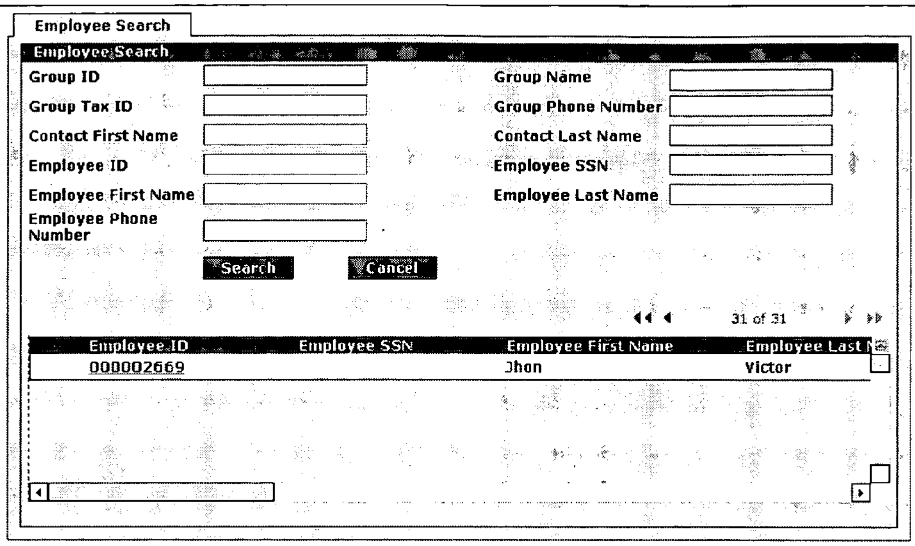
(Figure C-79)
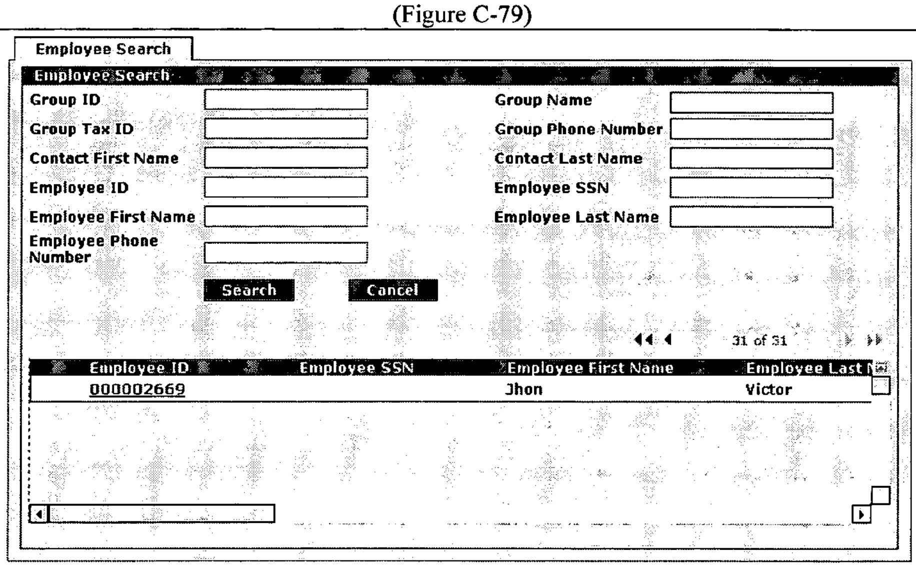
(Figure C-80)
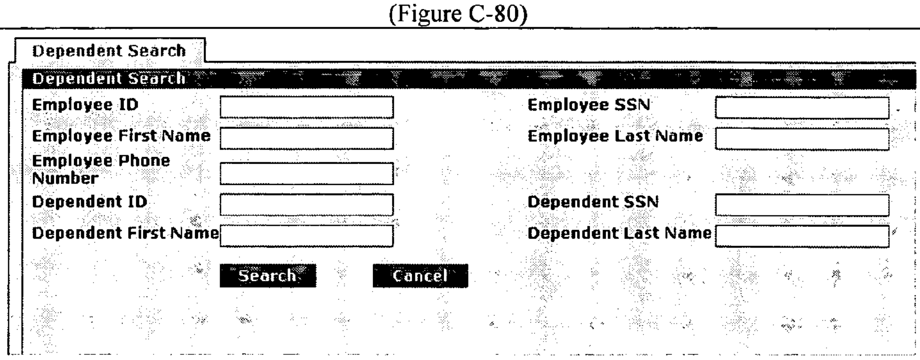
(Figure C-81)

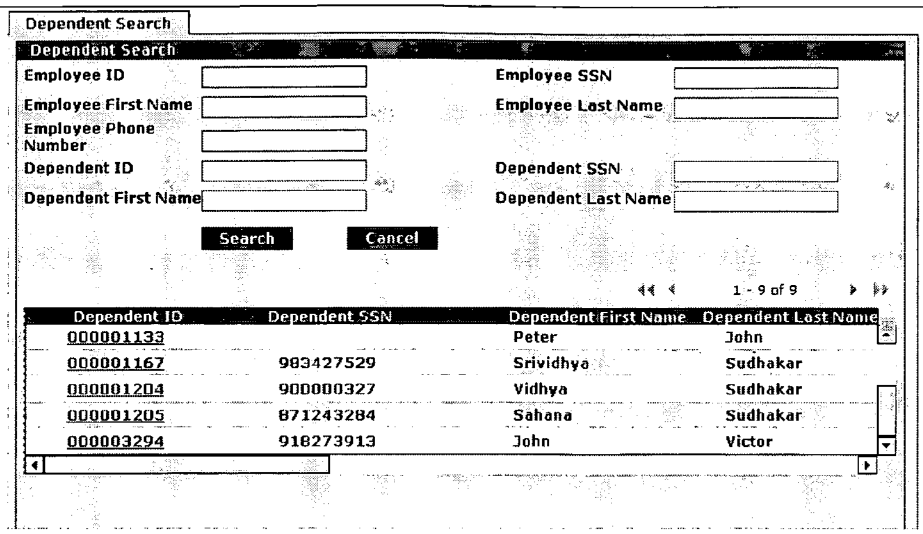
(Figure C-82)
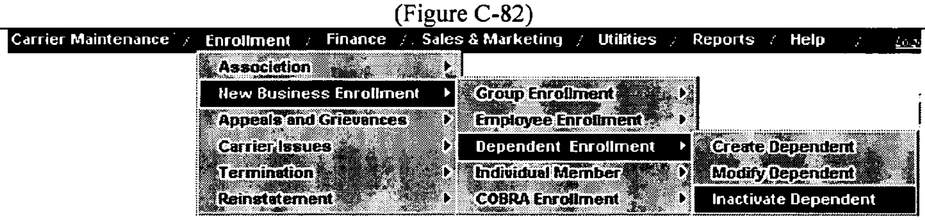
(Figure C-83)
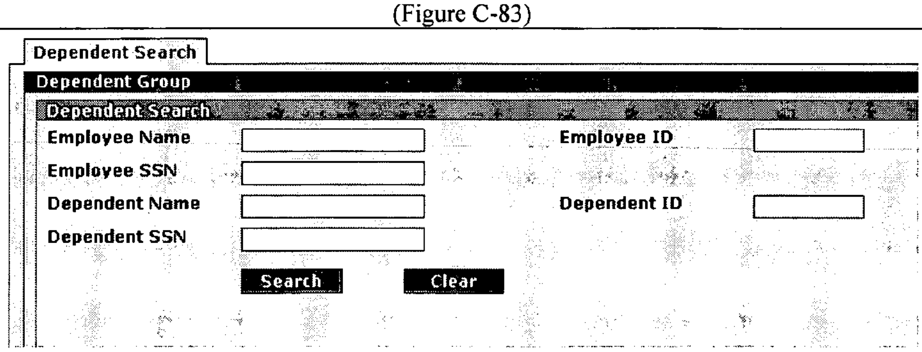
(Figure C-84)
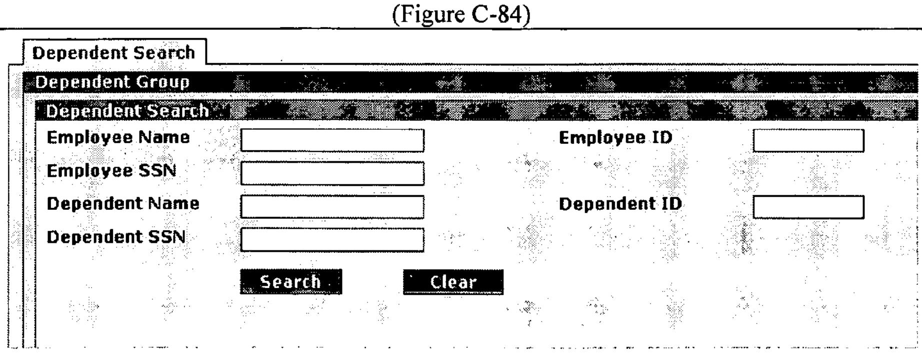
(Figure C-85)

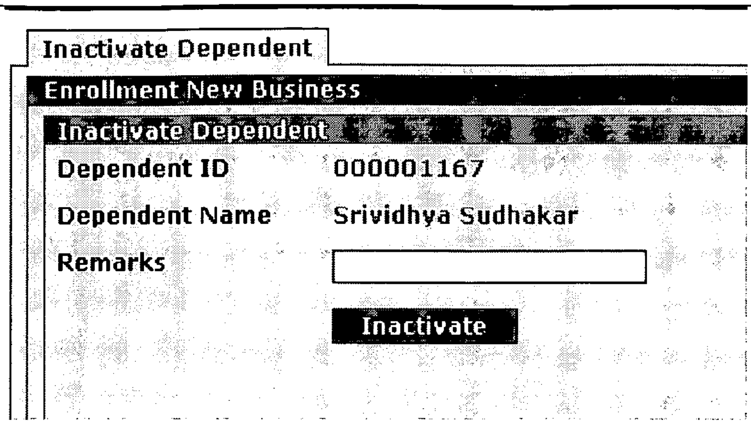
(Figure C-86)
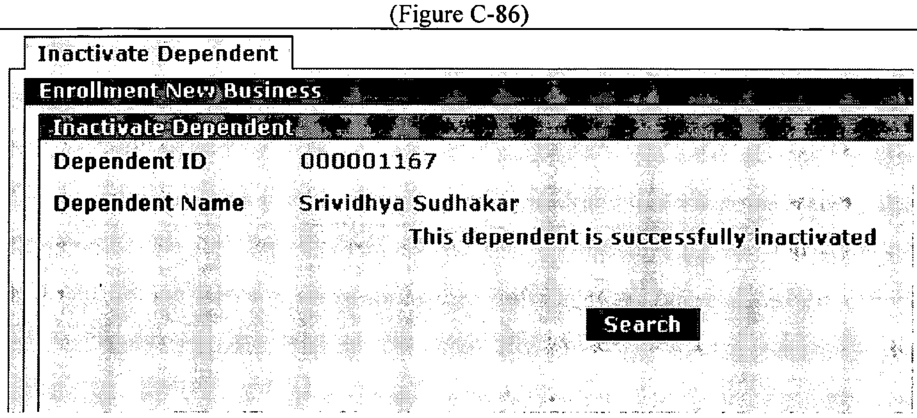
(Figure C-87)
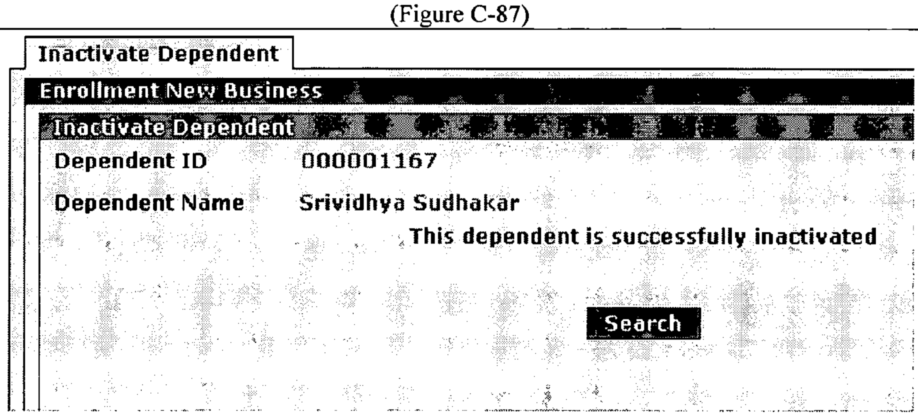
(Figure C-88)

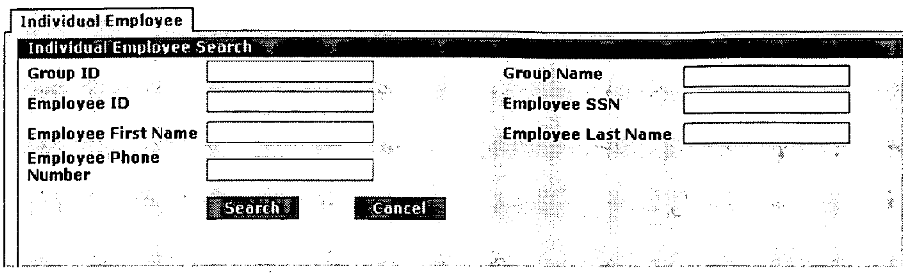
(Figure C-89)
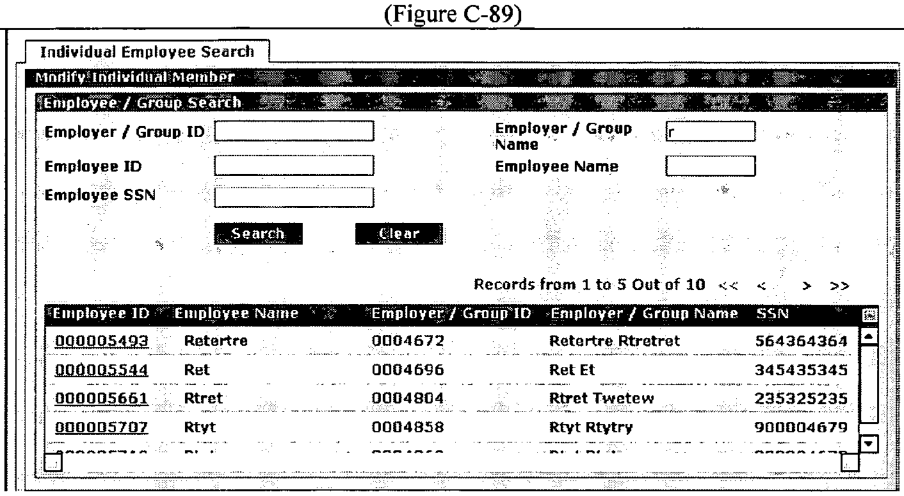
(Figure C-90)
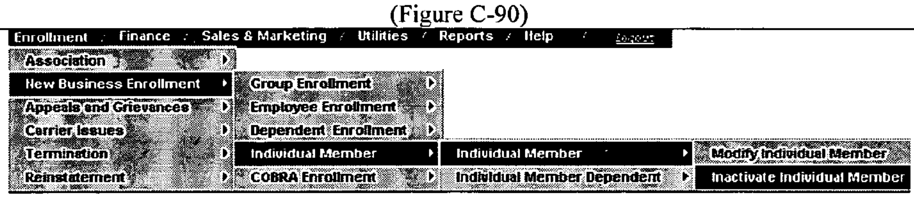
(Figure C-91)
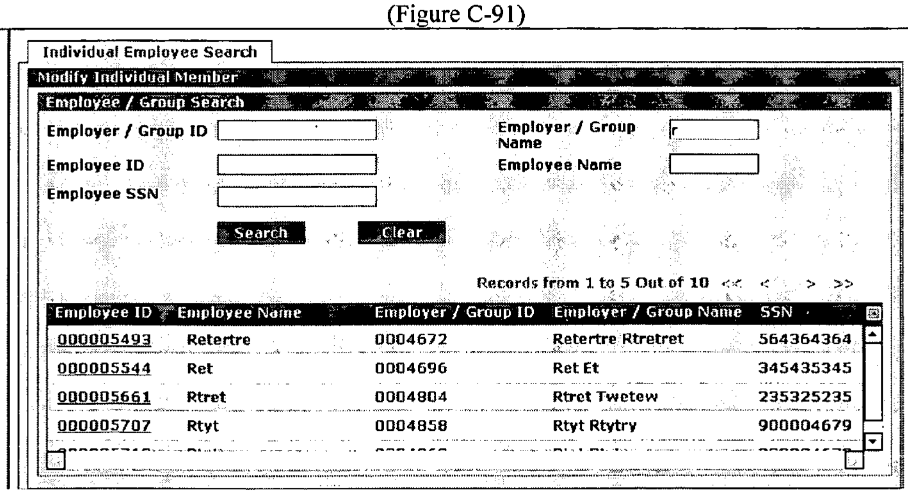
(Figure C-92)

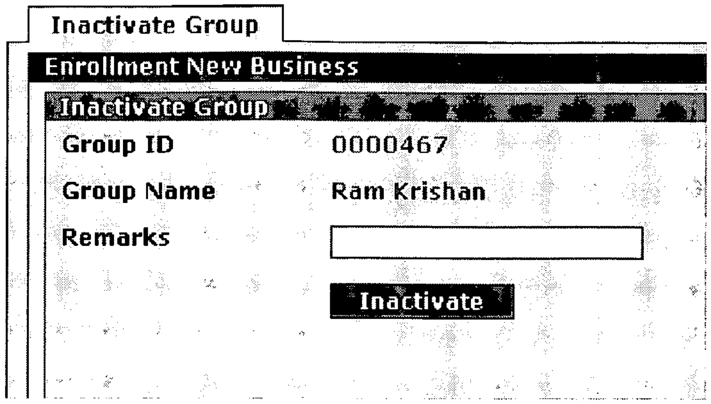
(Figure C-93)
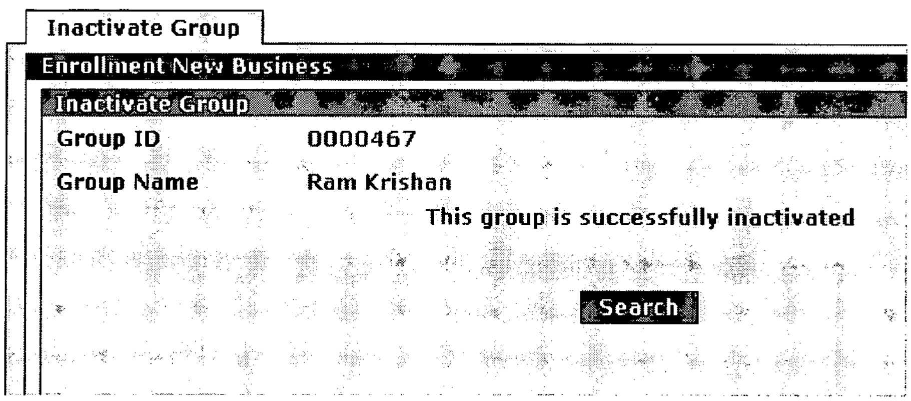
(Figure C-94)
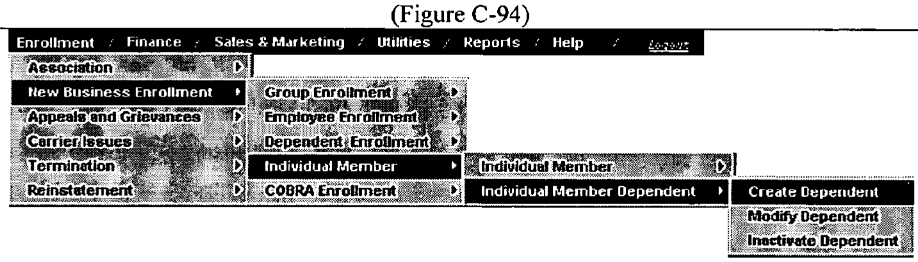
(Figure C-95)
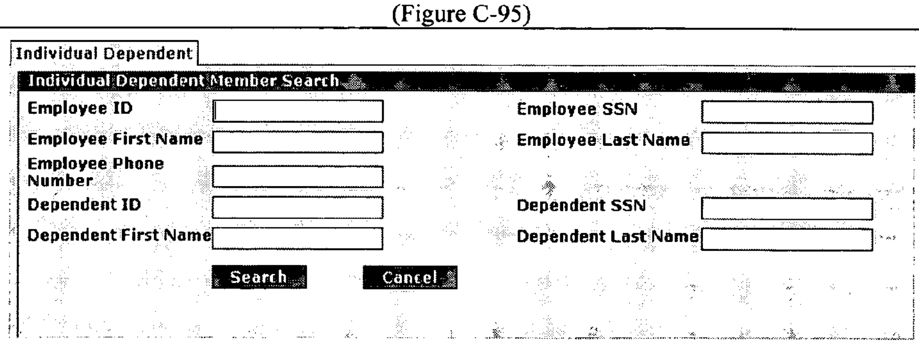
(Figure C-96)

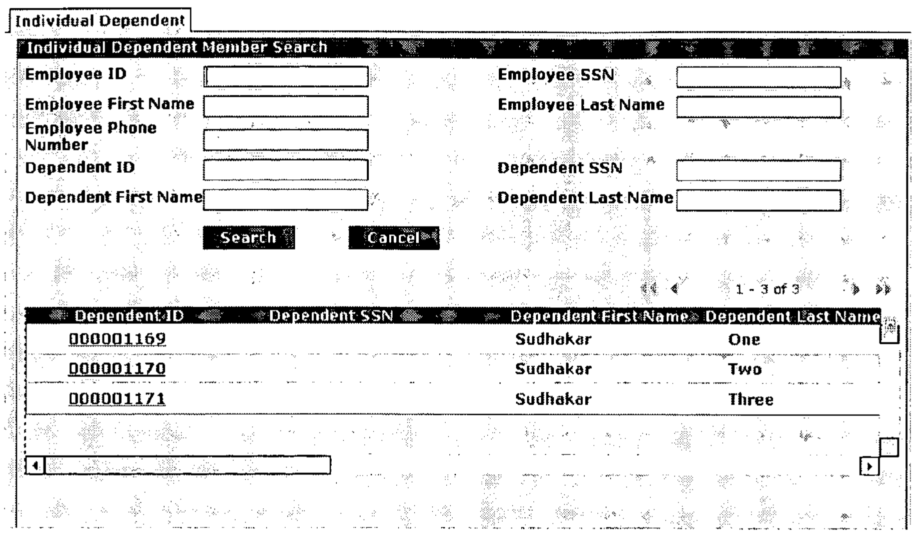
(Figure C-97)
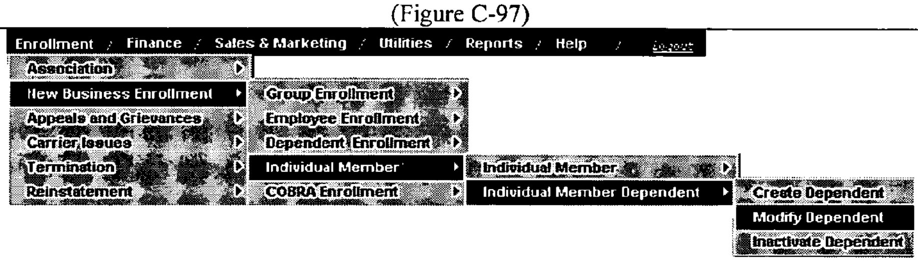
(Figure C-98)
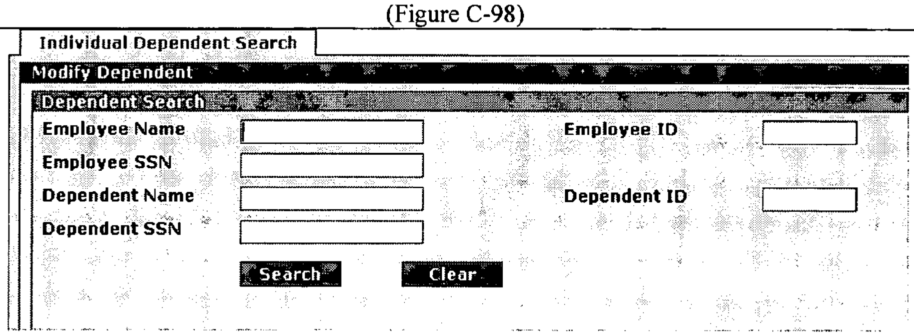
(Figure C-99)

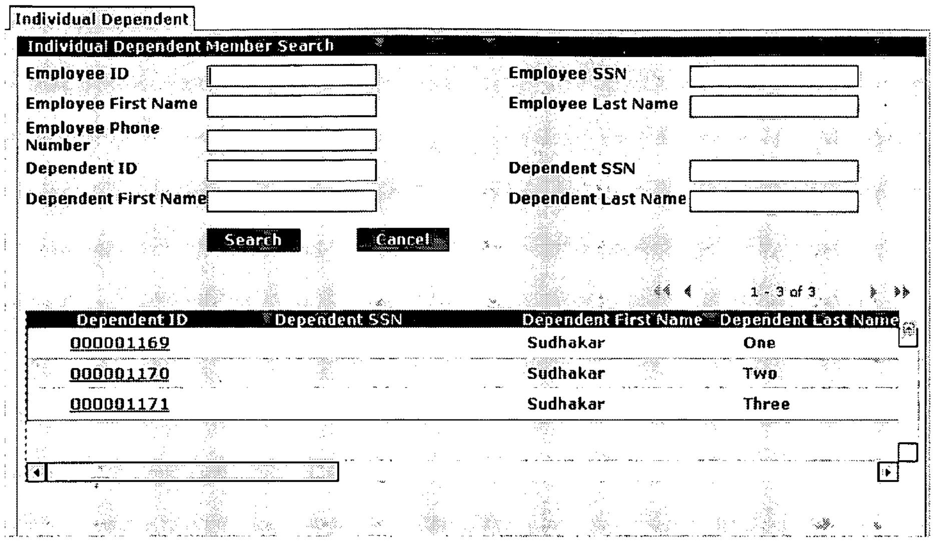
(Figure C-100)
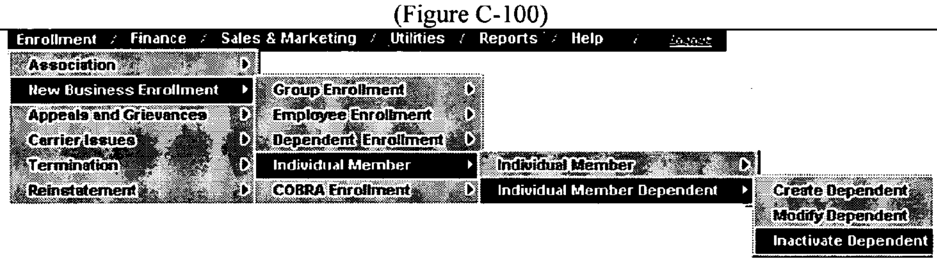
(Figure C-101)
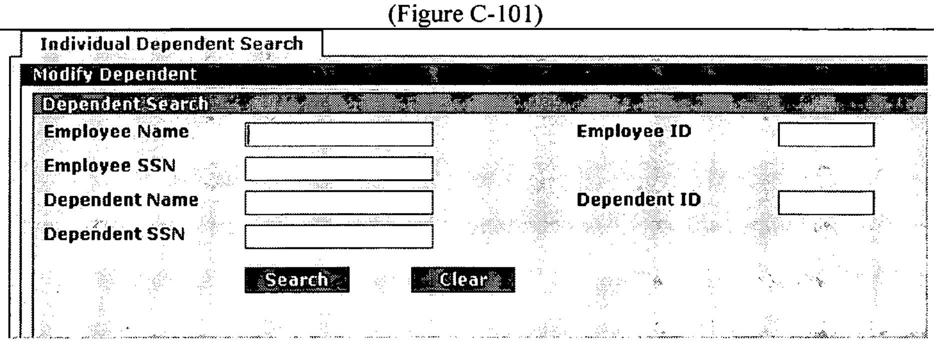
(Figure C-102)

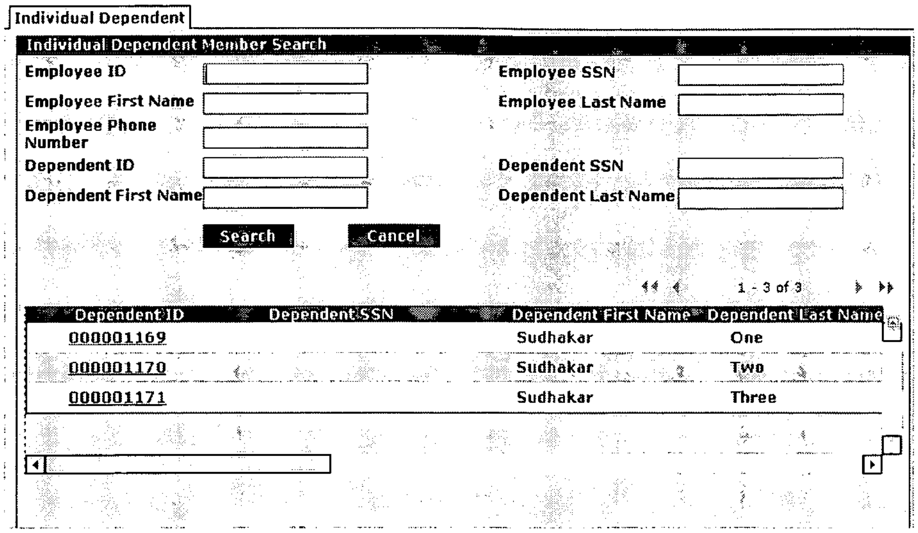
(Figure C-103)
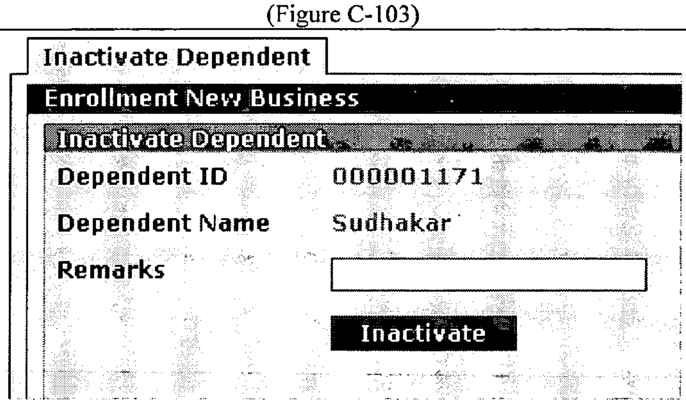
(Figure C-104)
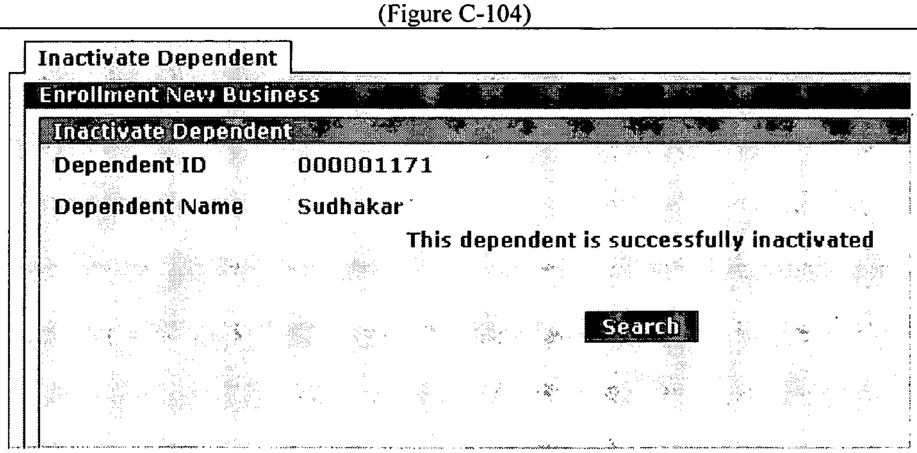
(Figure C-105)

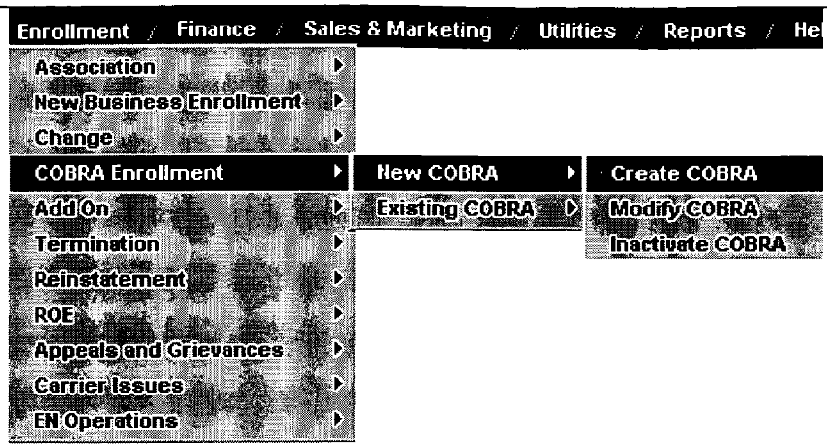
(Figure C-106)
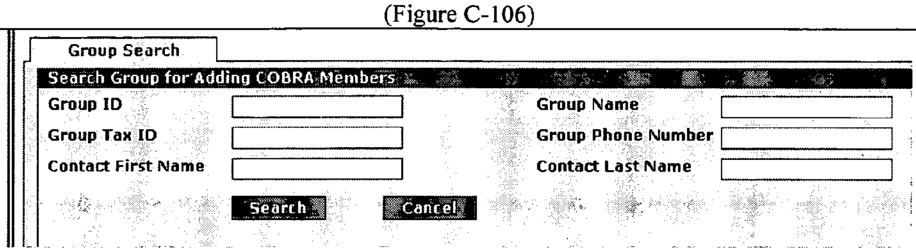
(Figure C-107)
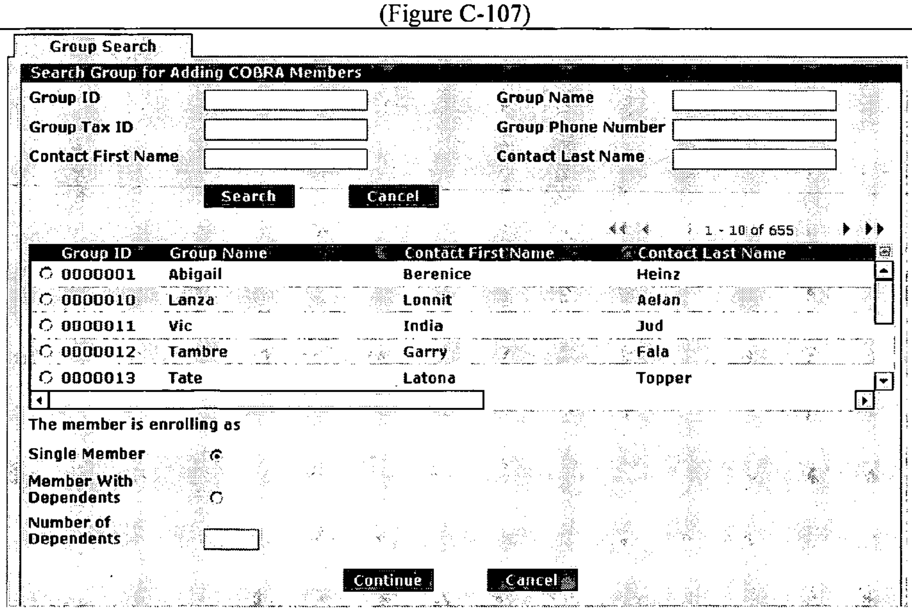
(Figure C-108)

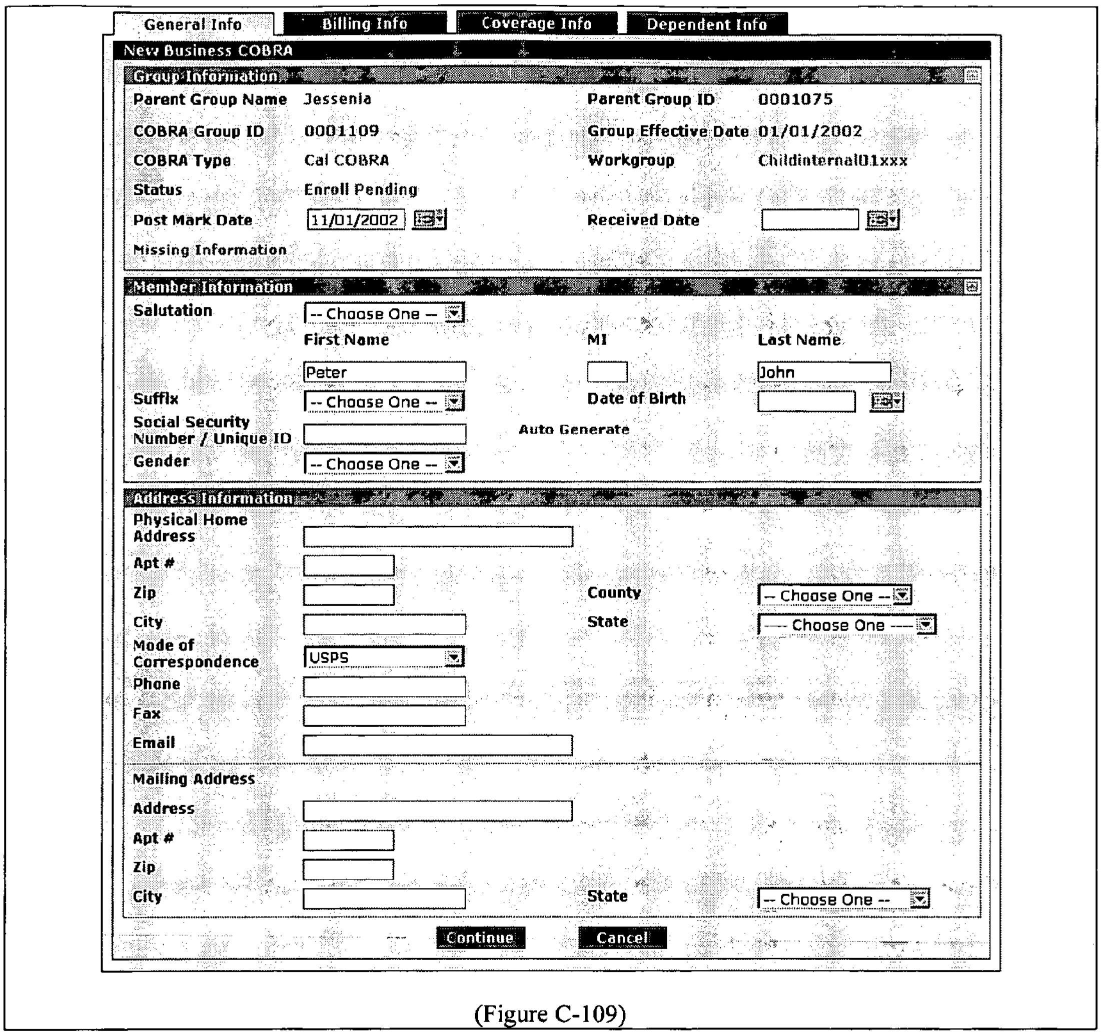
(Figure C-109)

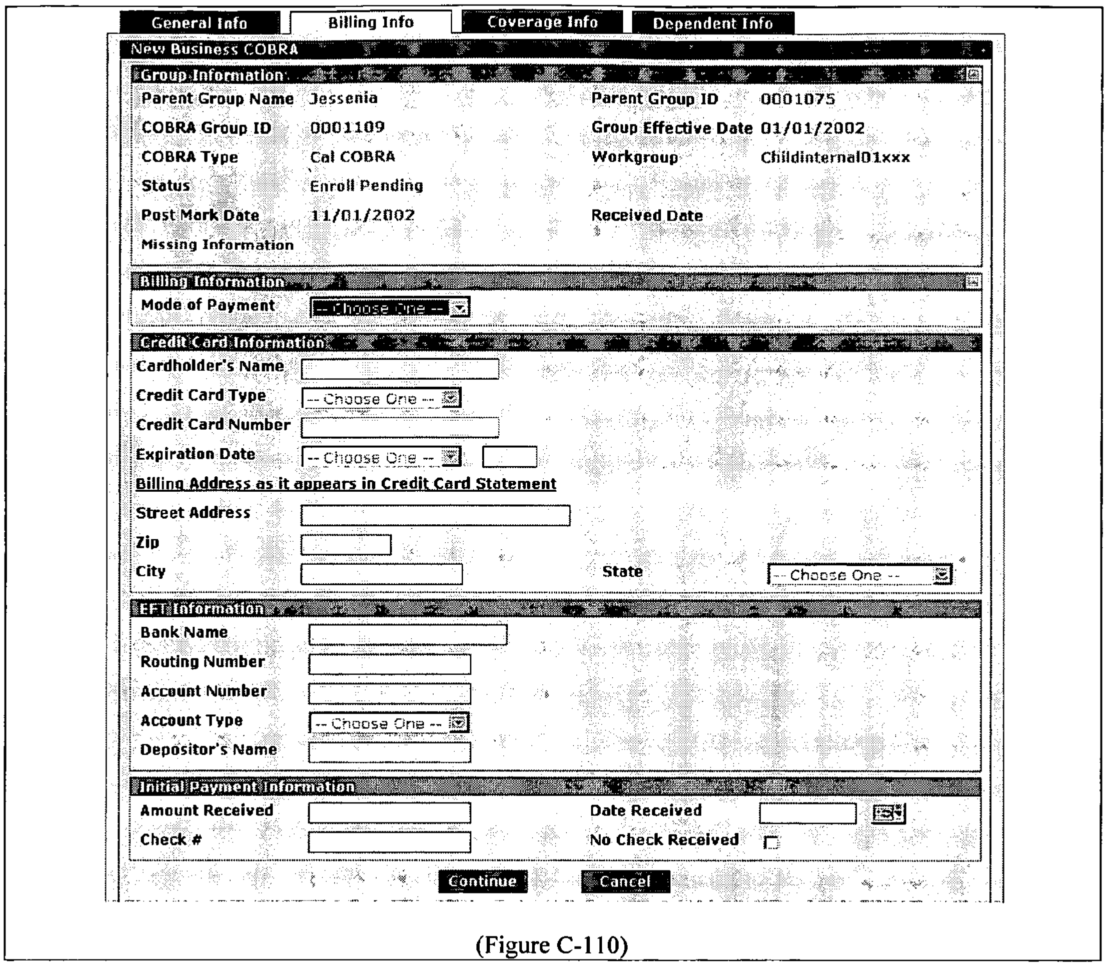
(Figure C-110)

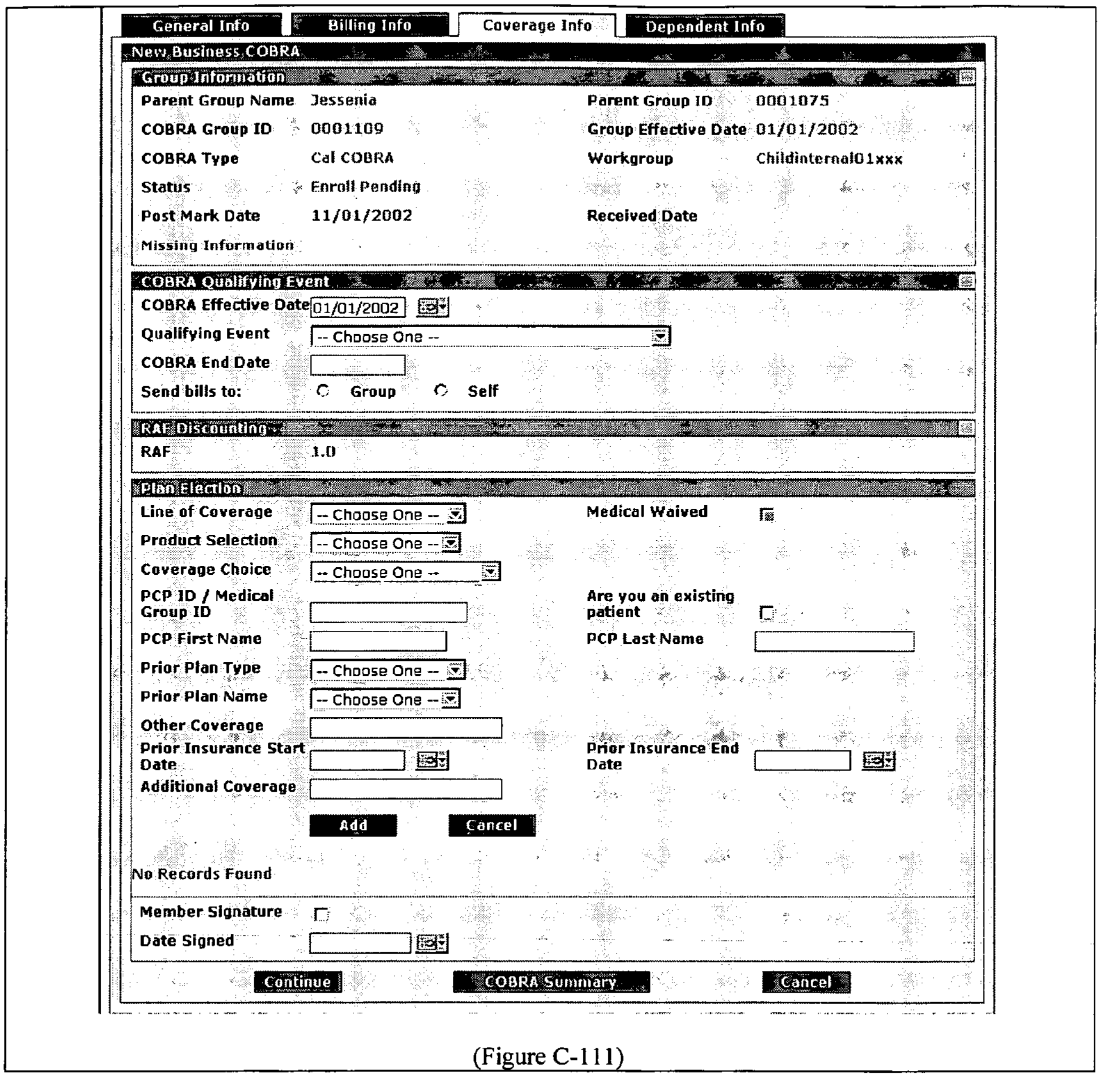
(Figure C-111)

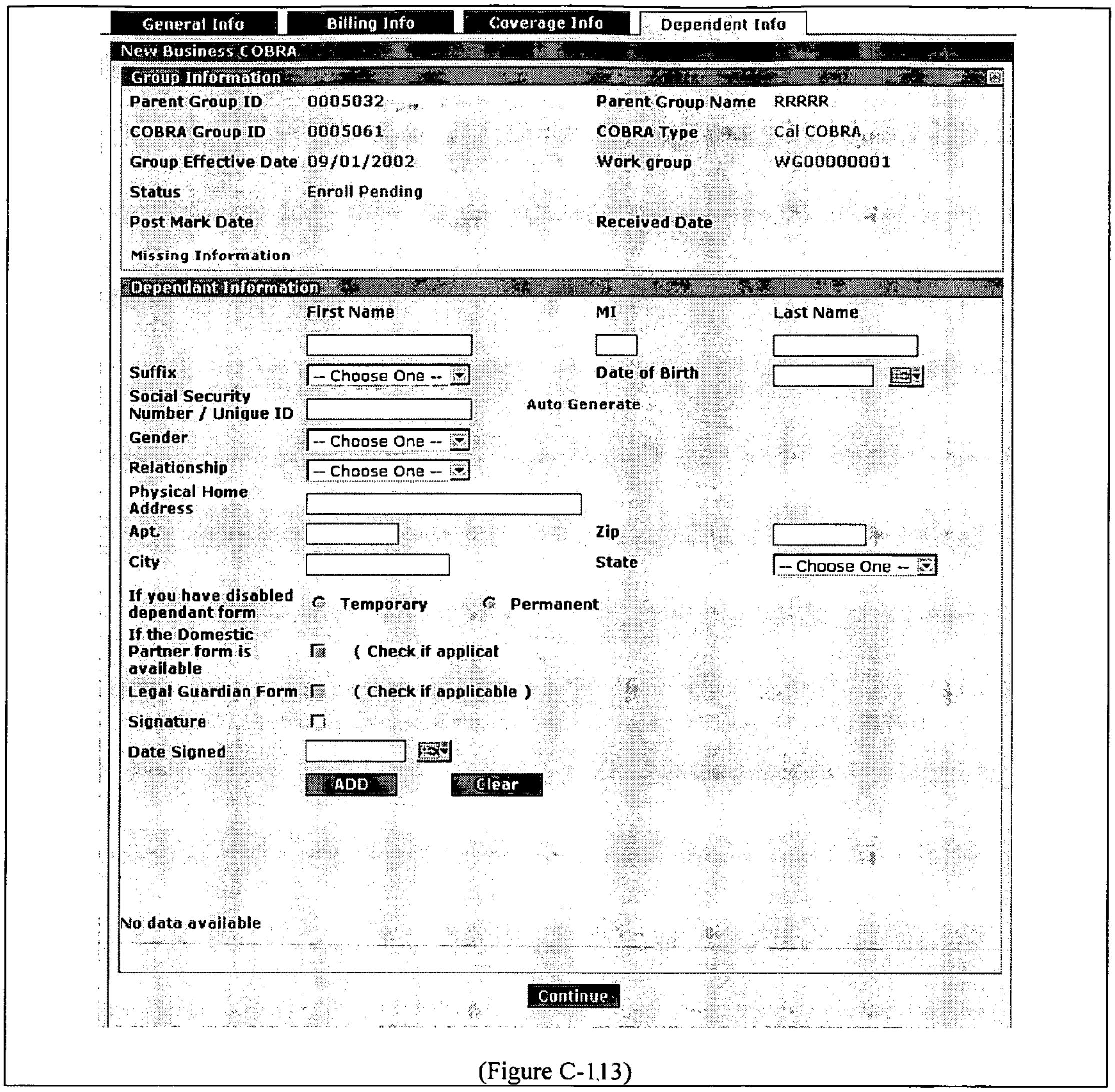
(Figure C-1.13)

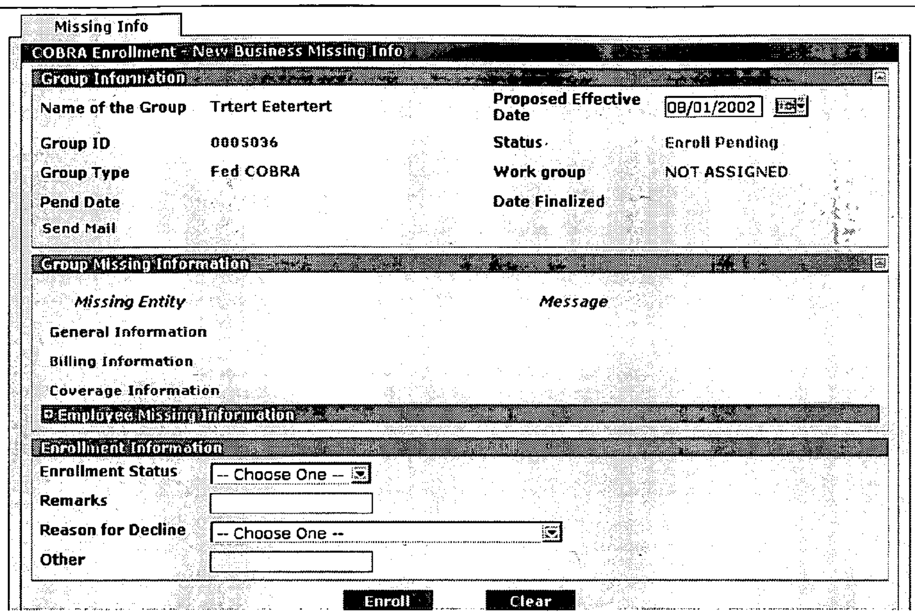
(Figure C-114)
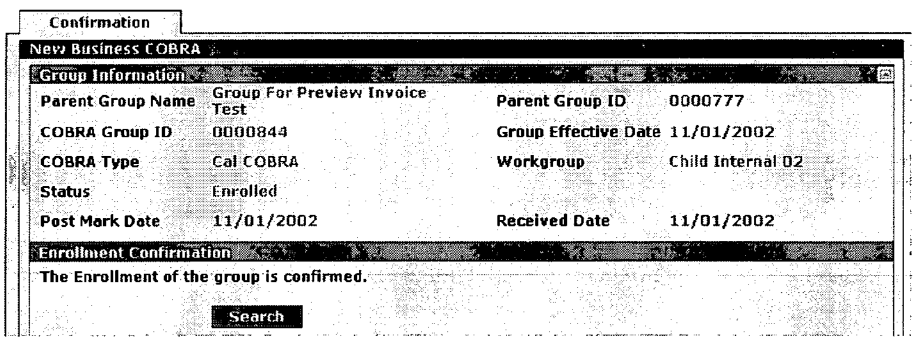
(Figure C-115)
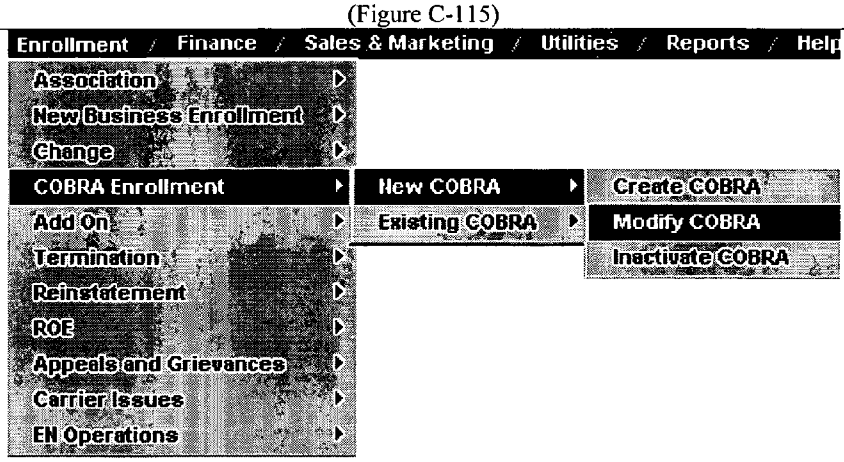
(Figure C-116)

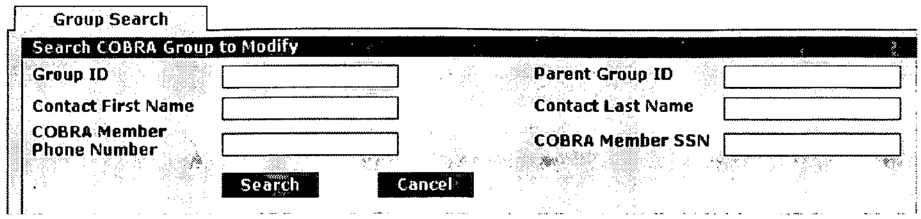
(Figure C-117)
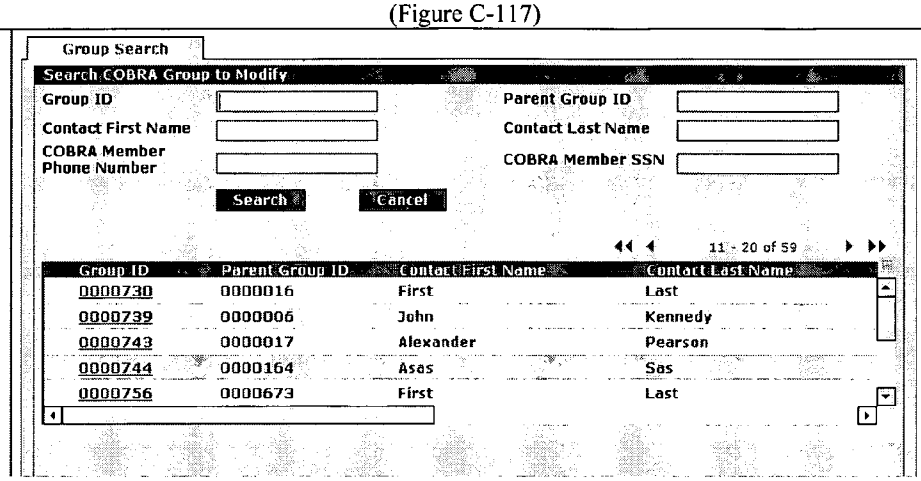
(Figure C-118)
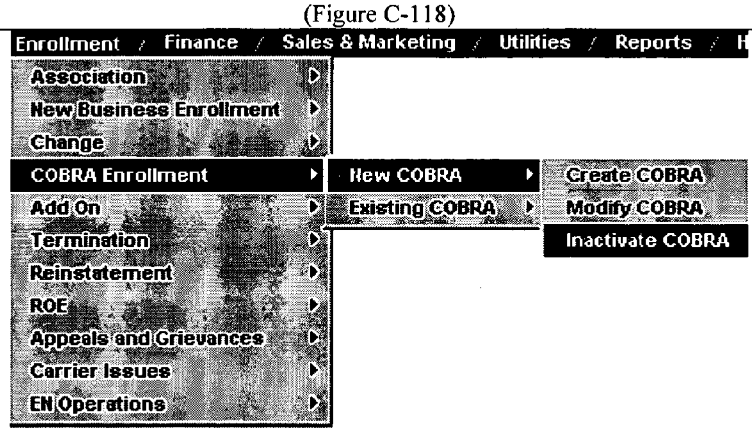
(Figure C-119)
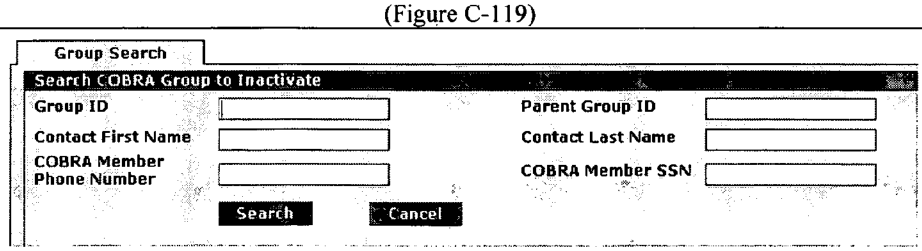
(Figure C-120)

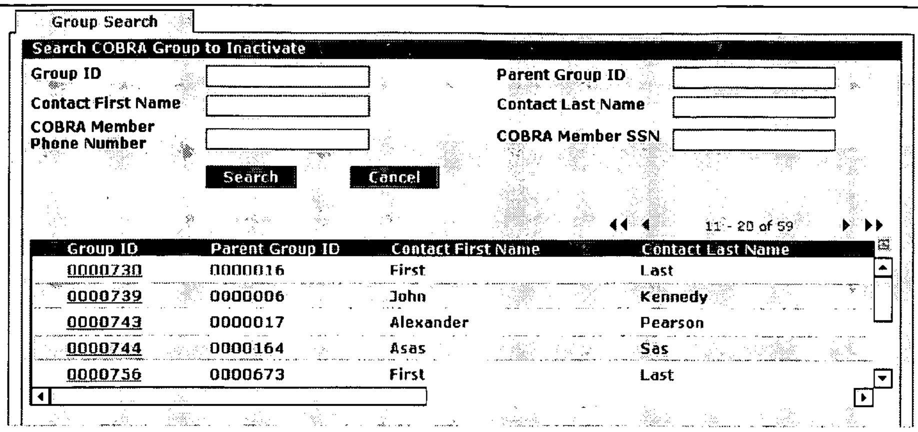
(Figure C-121)
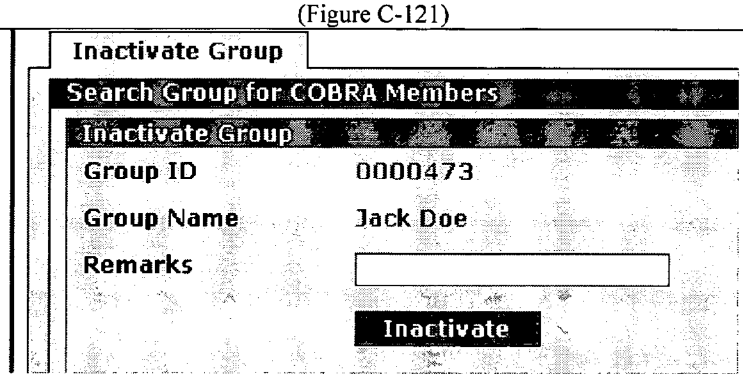
(Figure C-122)
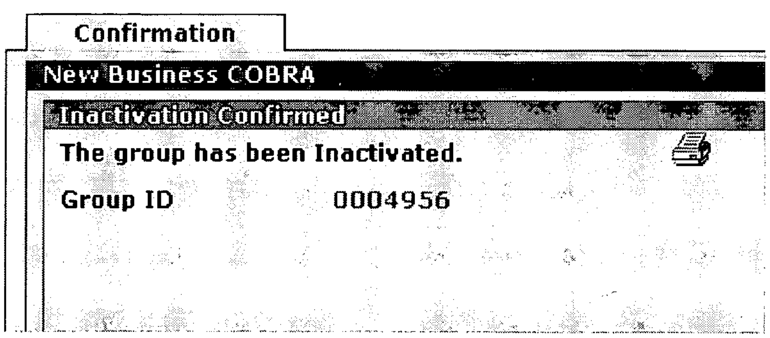
(Figure C-123)

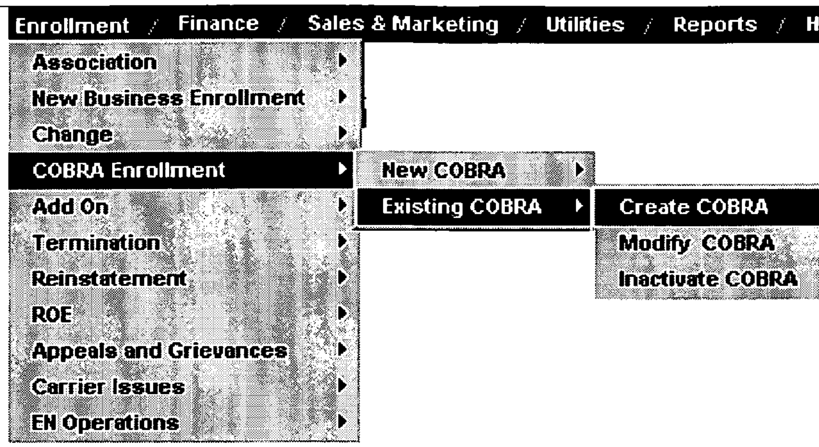
(Figure C-124)
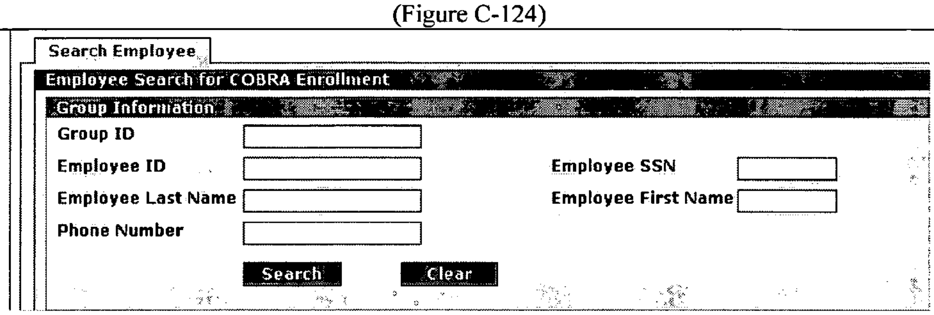
(Figure C-125)

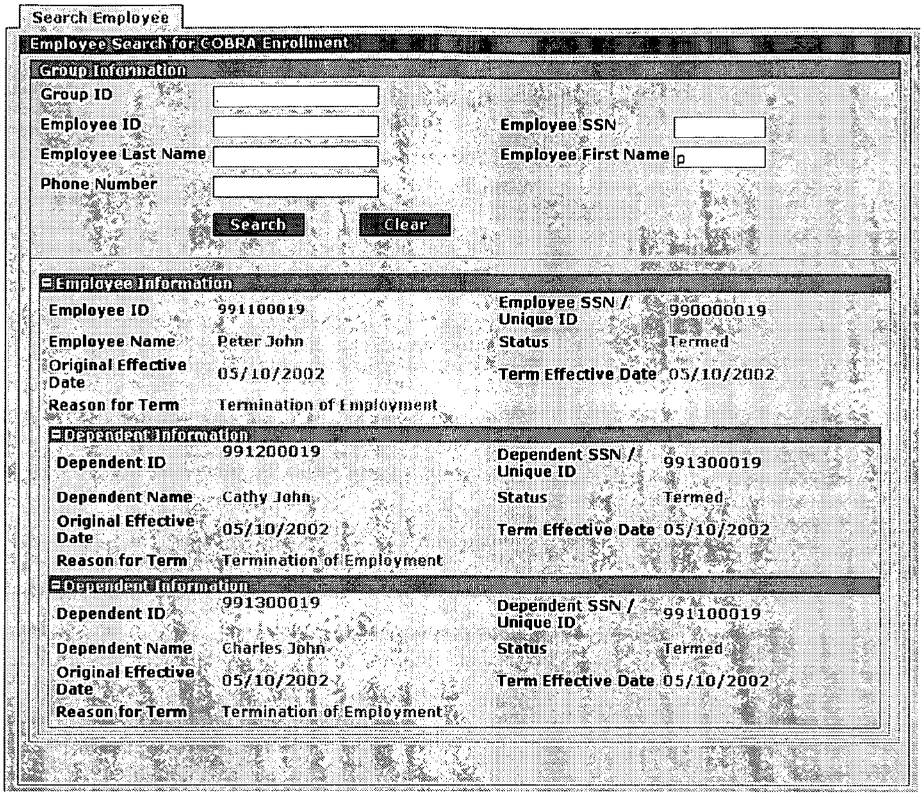
(Figure C-126)
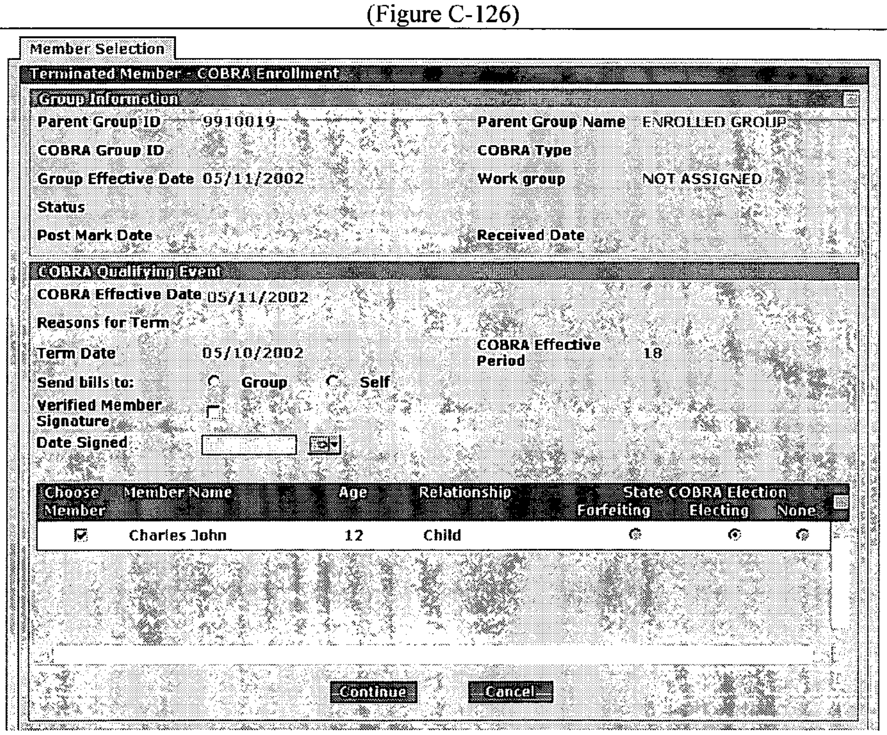
(Figure C-127)

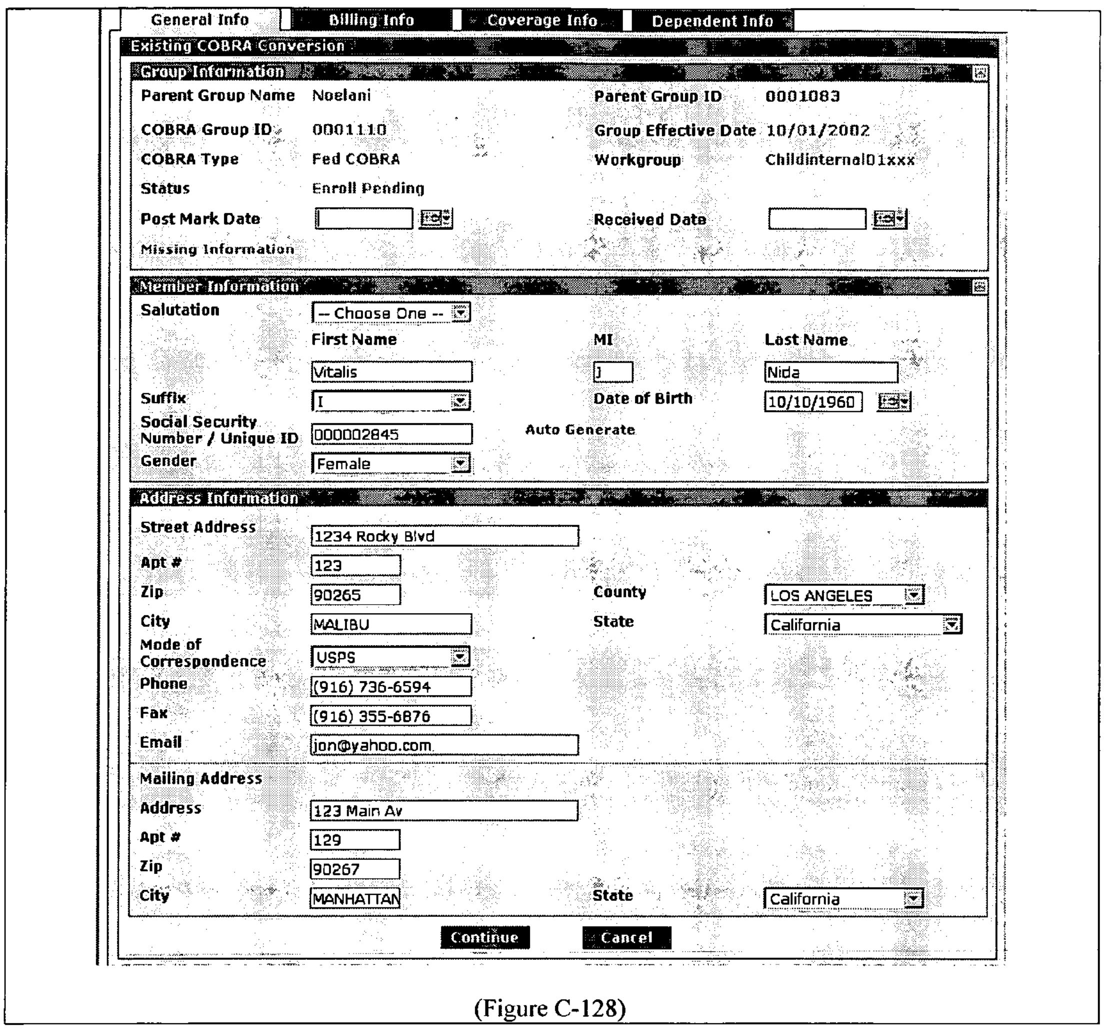
(Figure C-128)

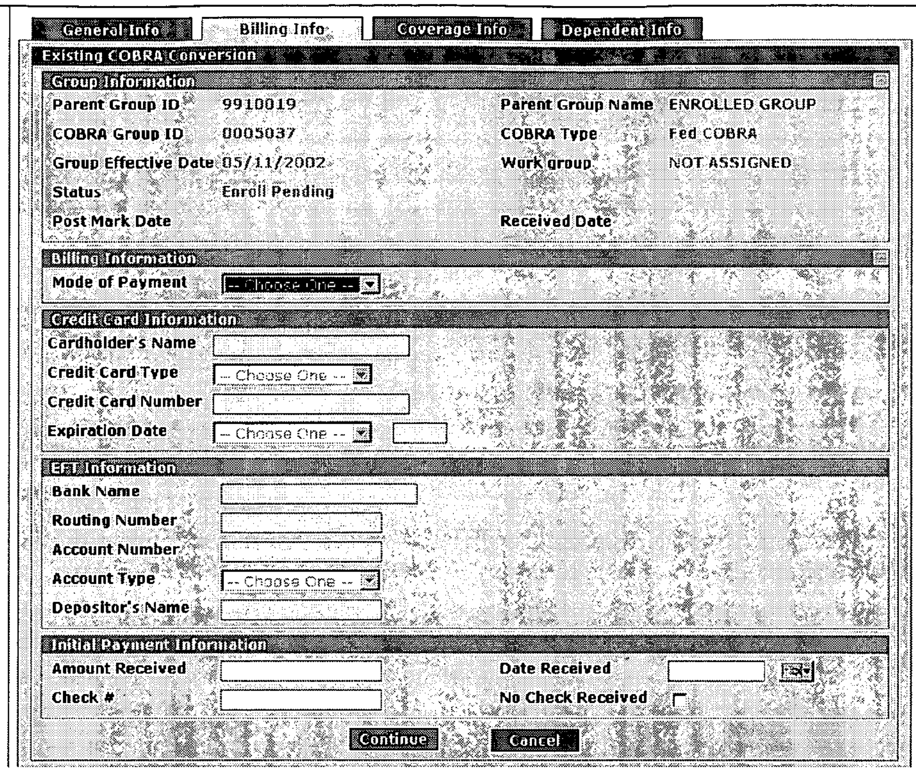
(Figure C-129)
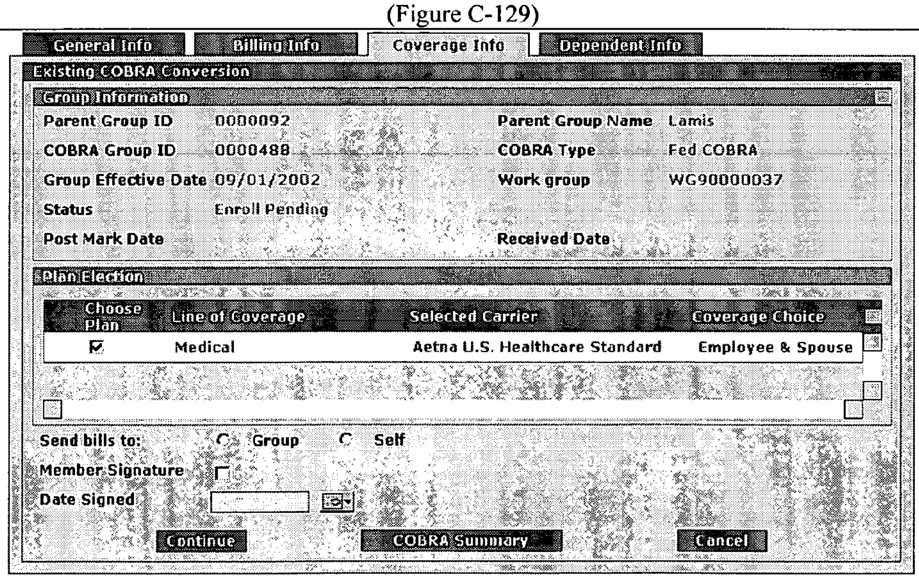
(Figure C-130)

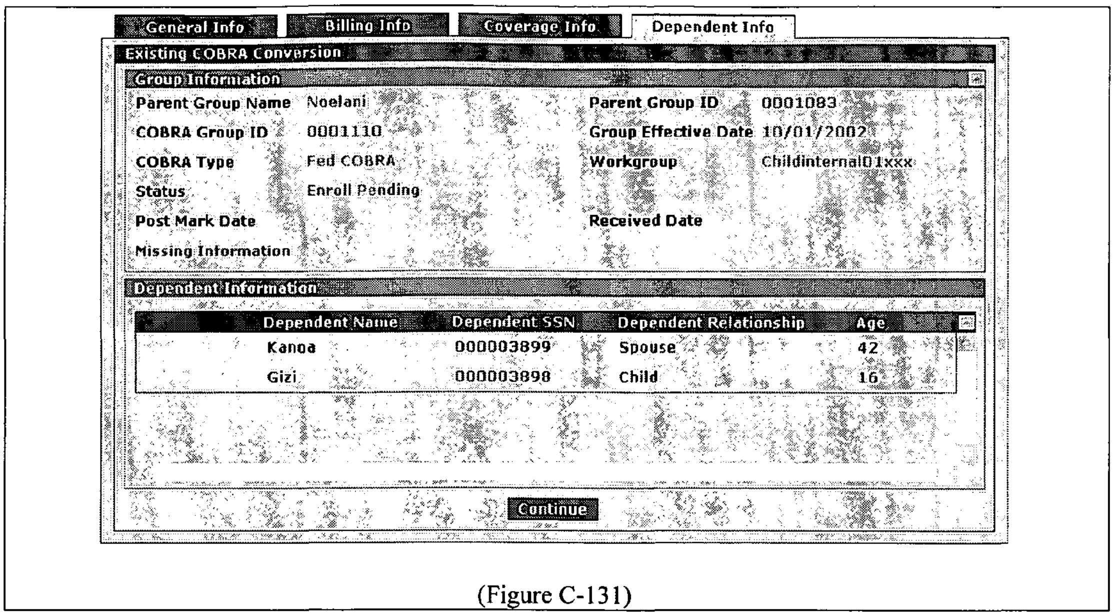
(Figure C-131)

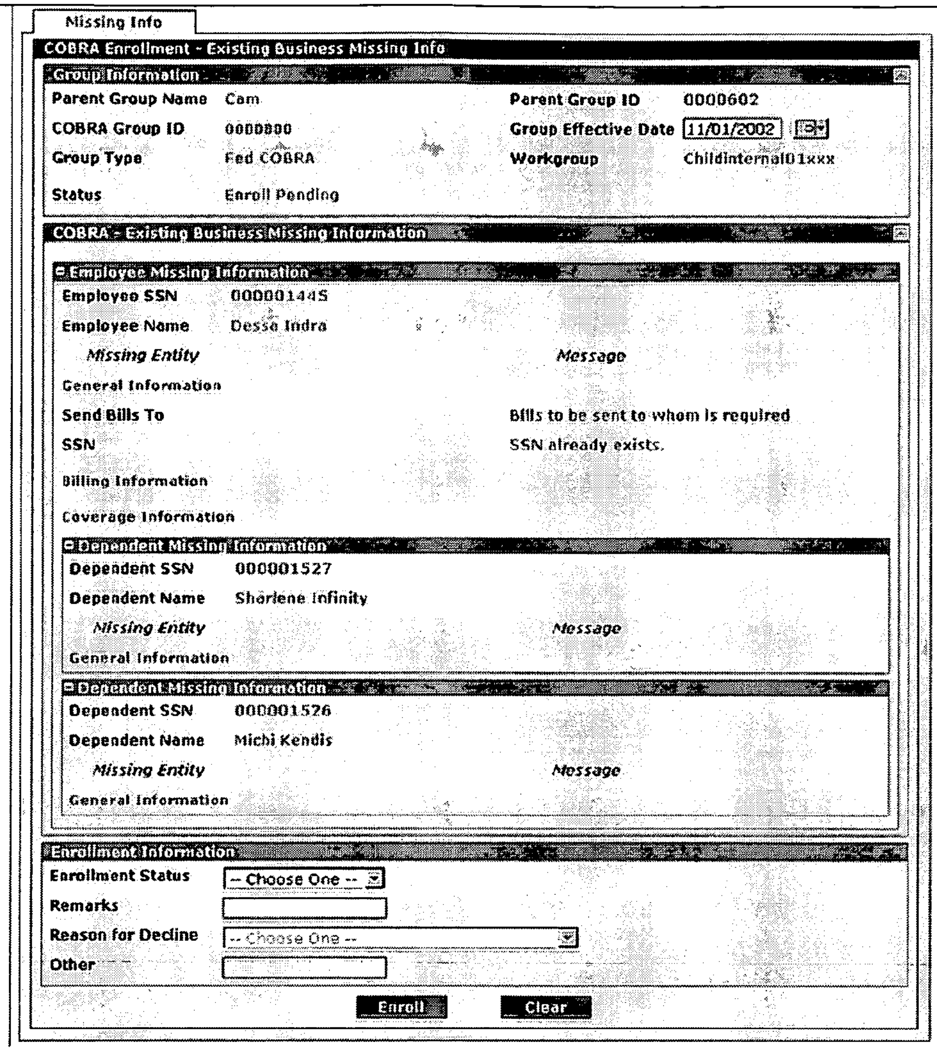
(Figure C-132)
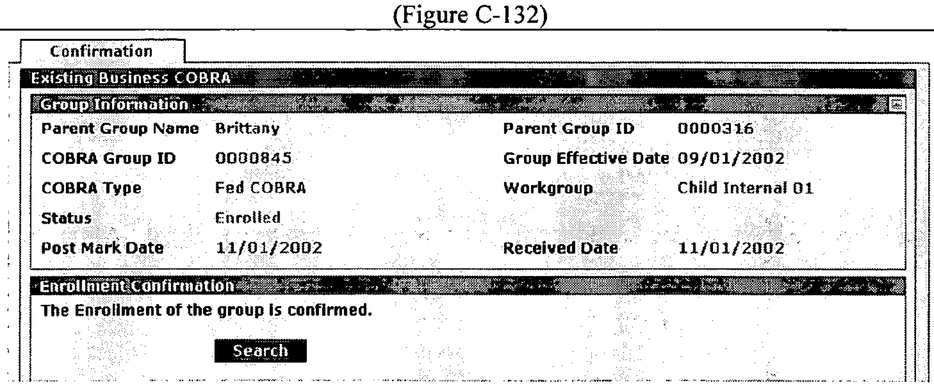
(Figure C-133)

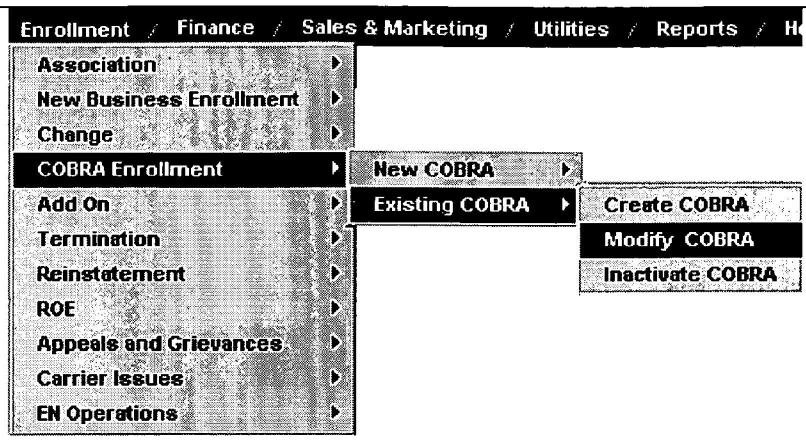
(Figure C-134)
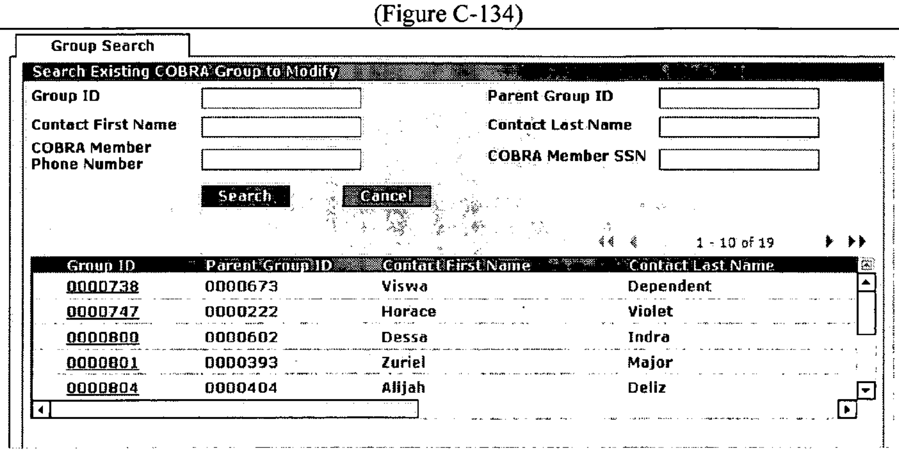
(Figure C-135)
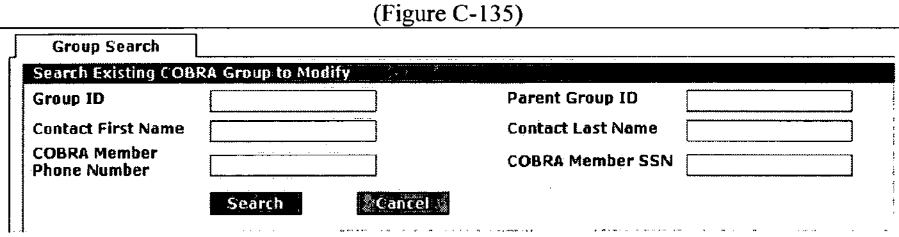
(Figure C-136)

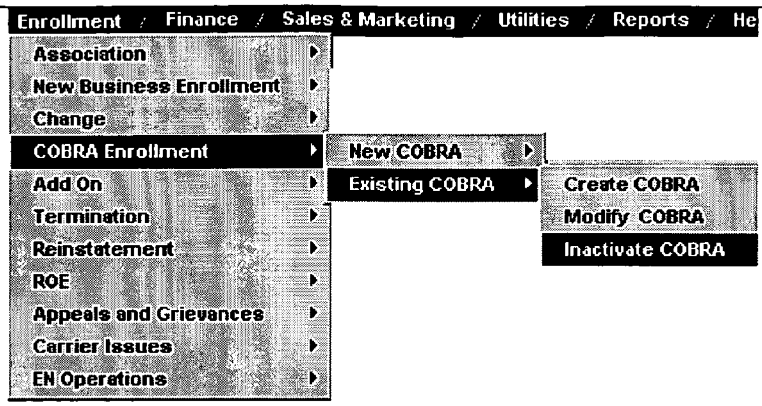
(Figure C-137)
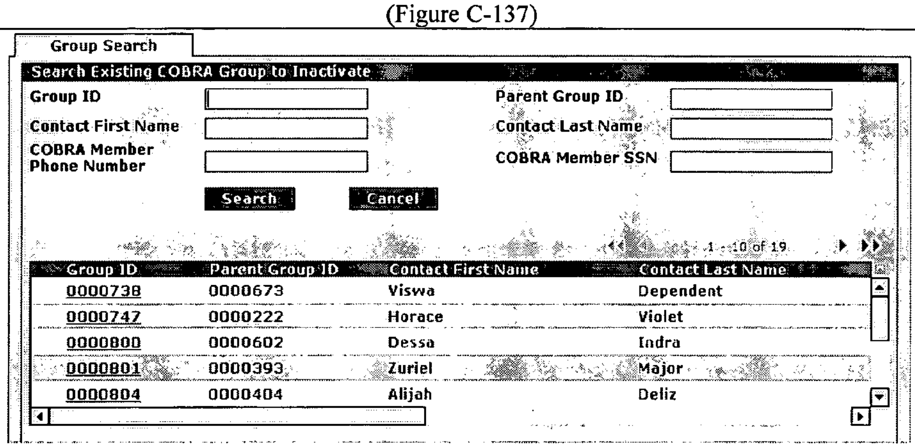
(Figure C-138)
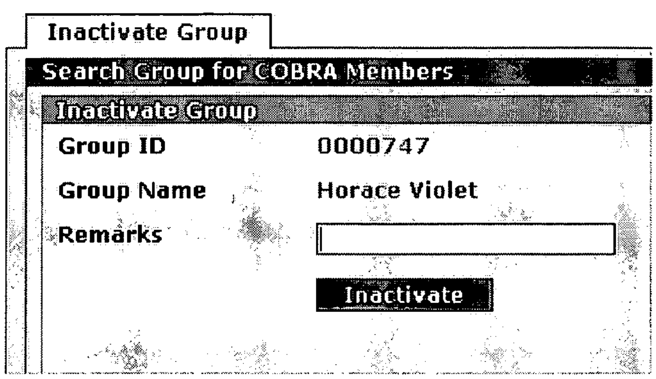
(Figure C-139)

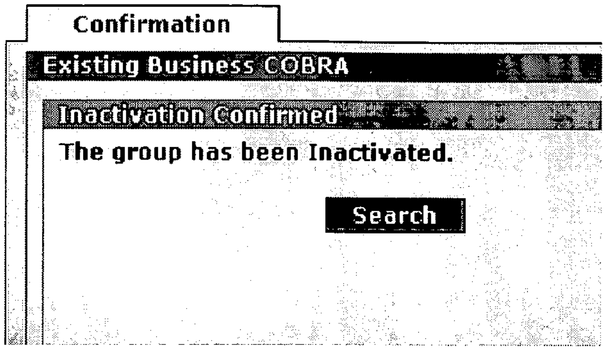
(Figure C-140)
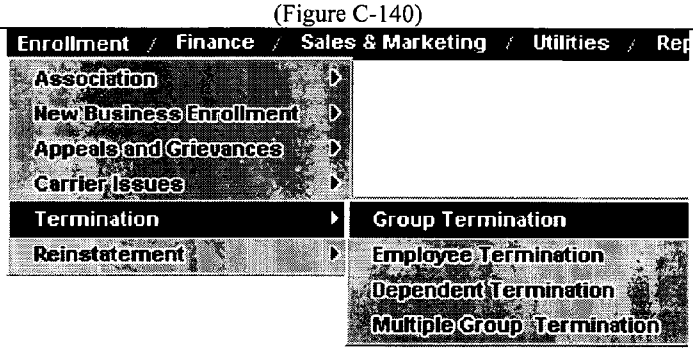
(Figure C-141)
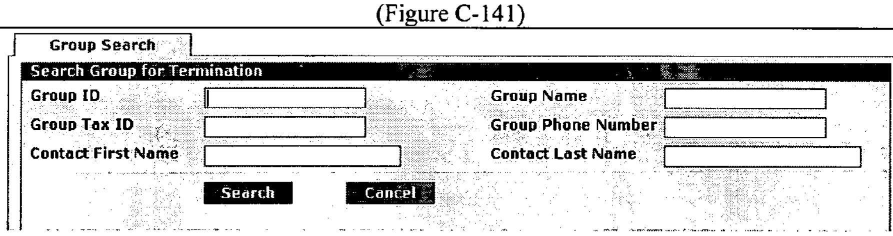
(Figure C-142)
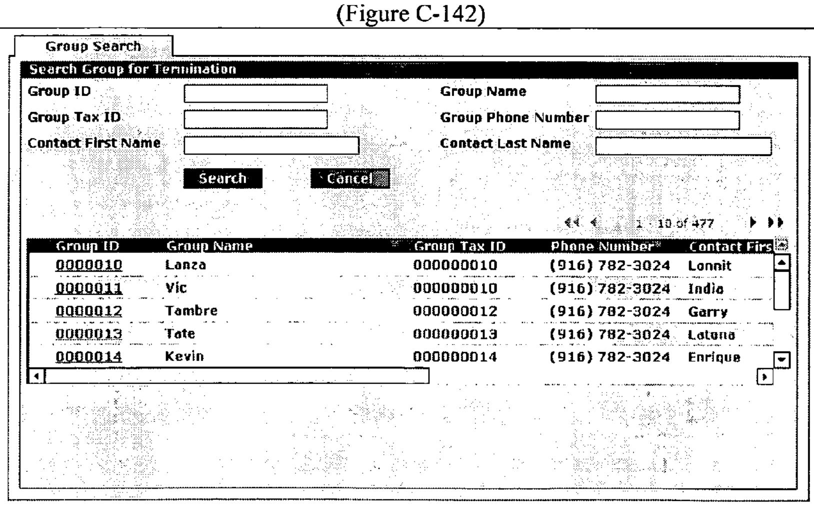
(Figure C-143)

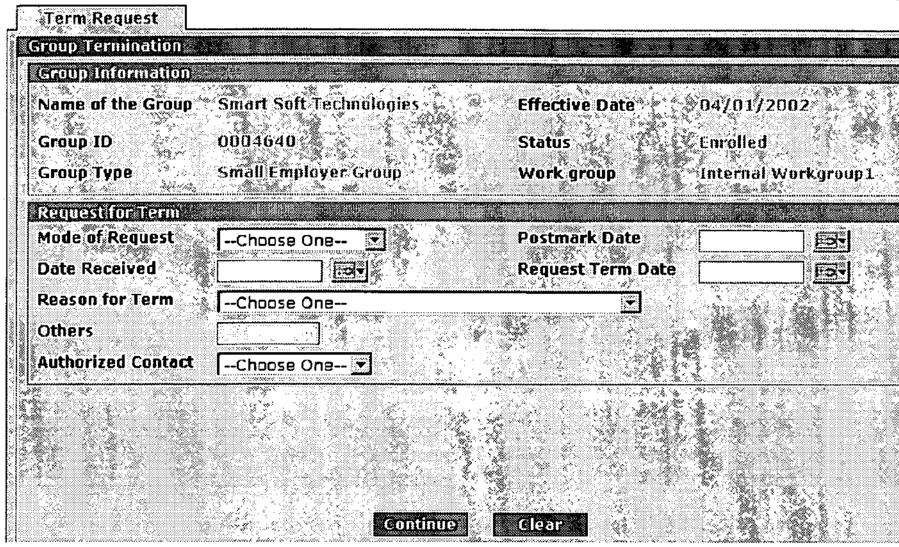
(Figure C-144)
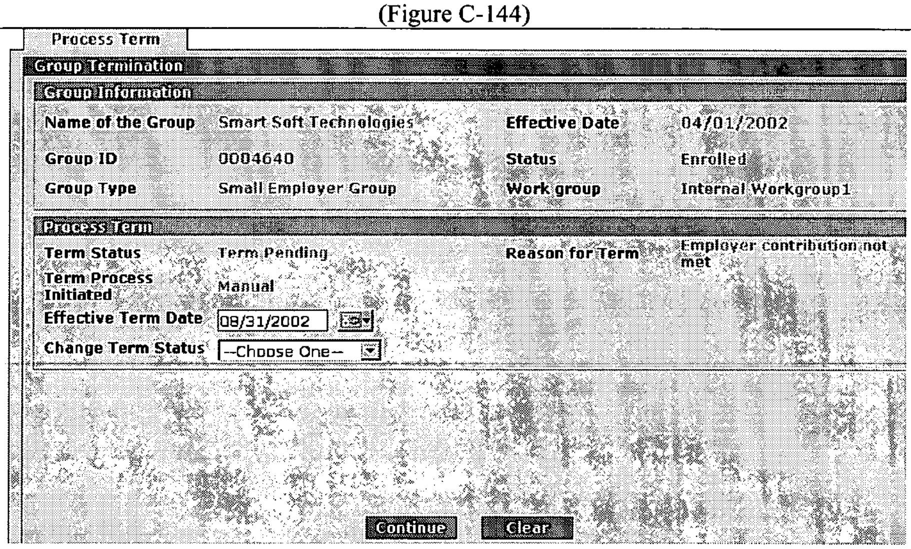
(Figure C-145)
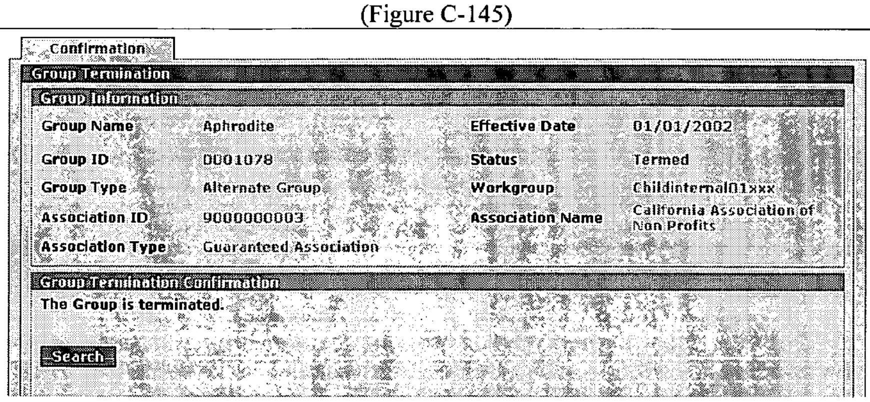
(Figure C-146)

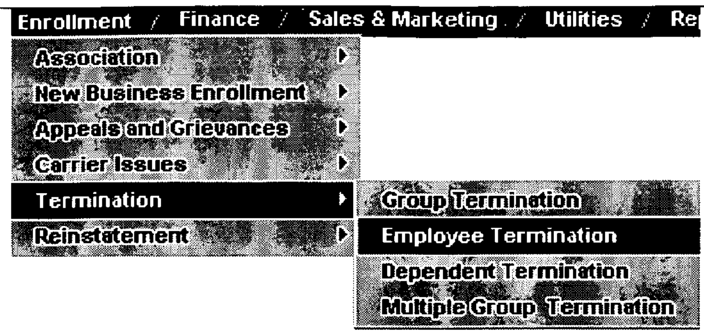
(Figure C-147)
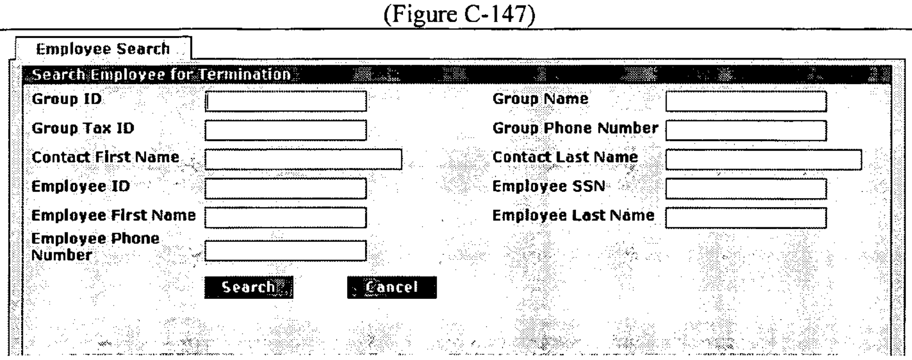
(Figure C-148)
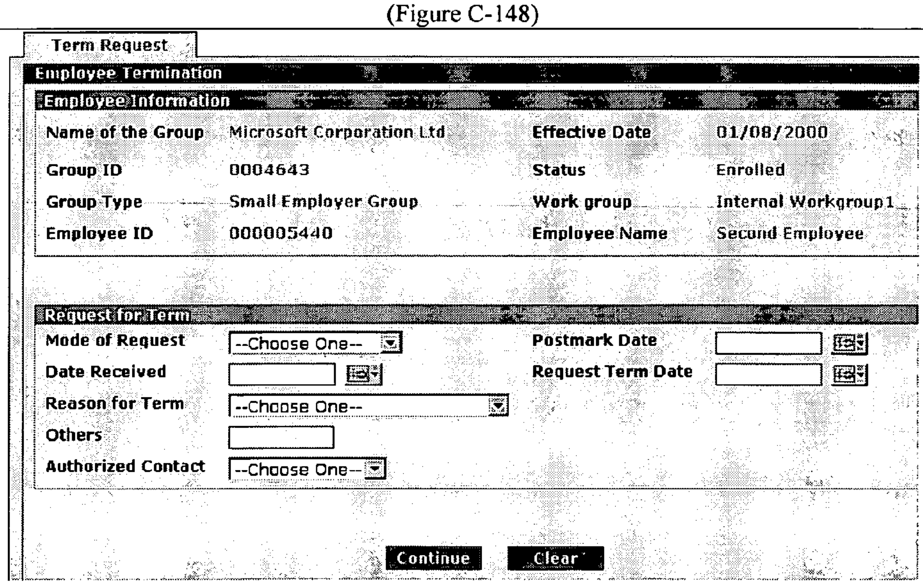
(Figure C-149)

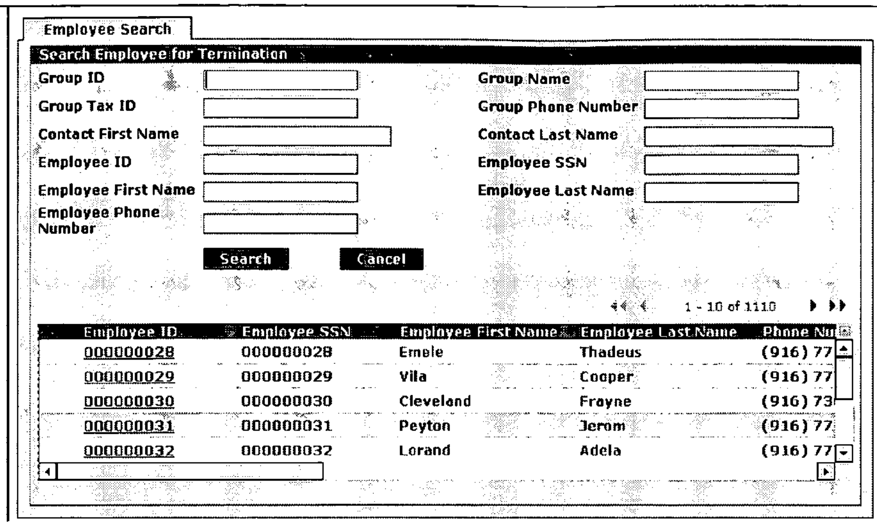
(Figure C-150)
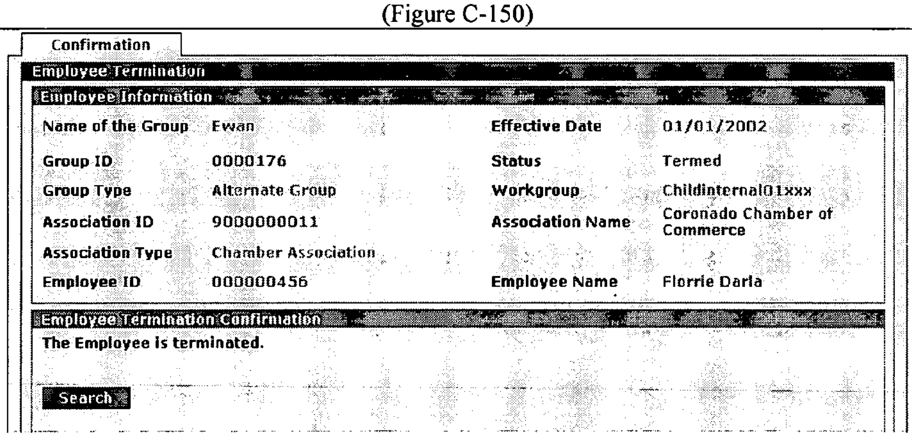
(Figure C-151)
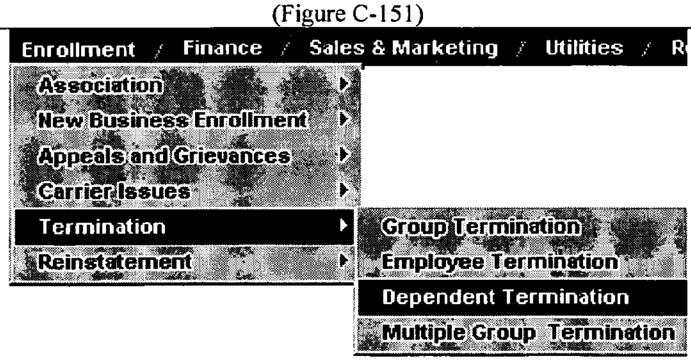
(Figure C-152)

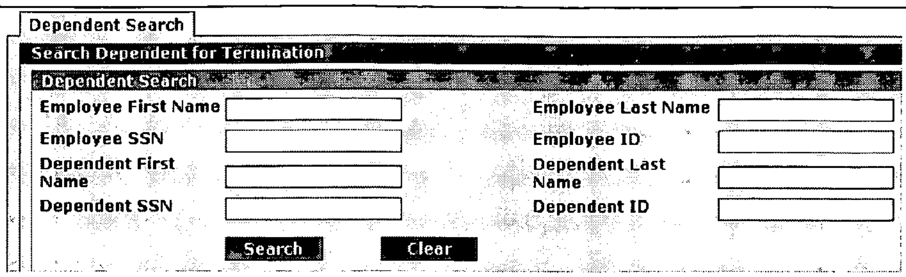
(Figure C-153)
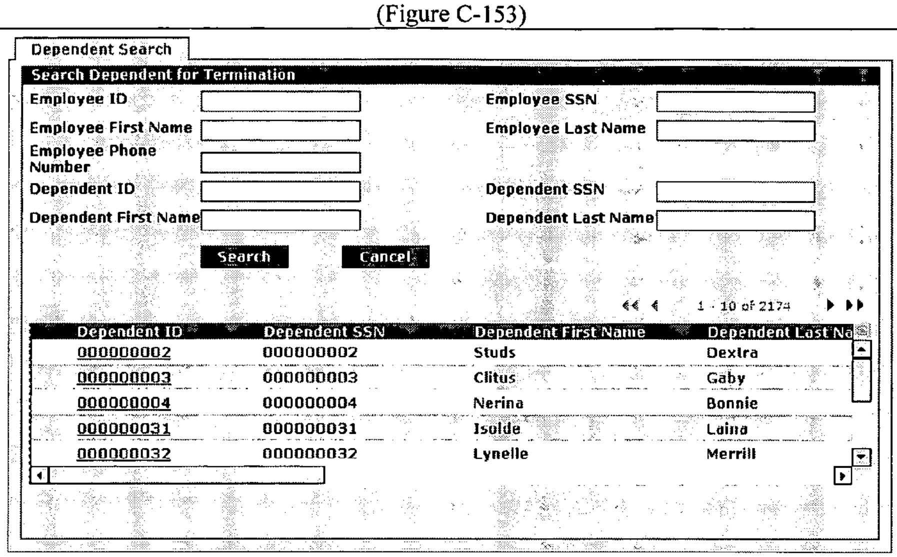
(Figure C-154)
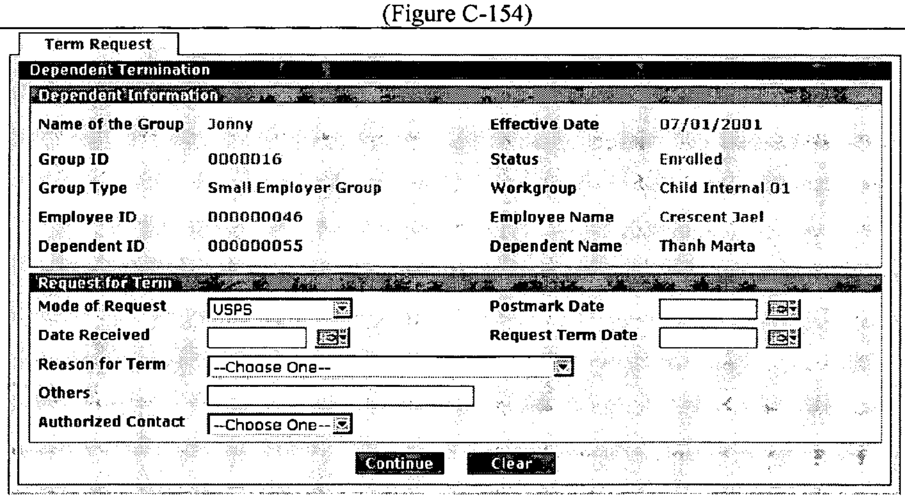
(Figure C-155)

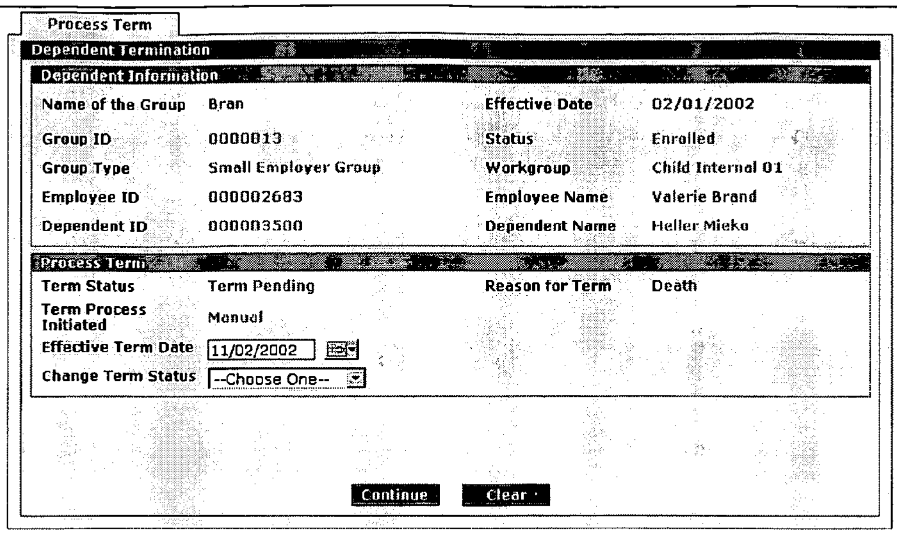
(Figure C-156)
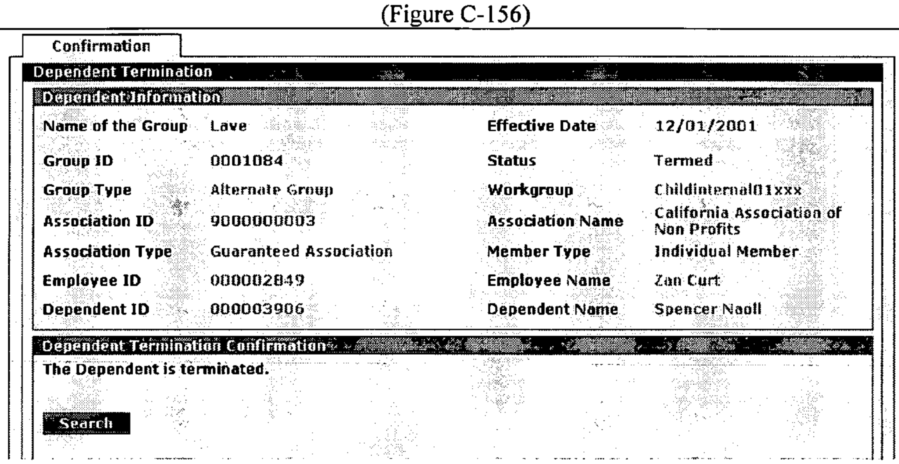
(Figure C-157)
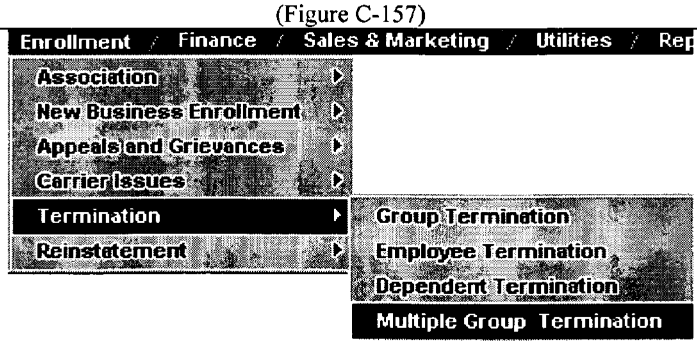
(Figure C-158)

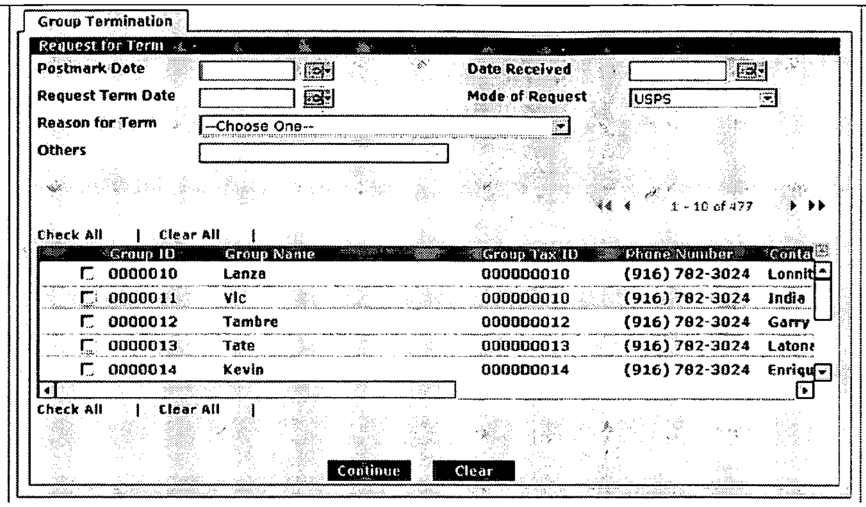
(Figure C-159)
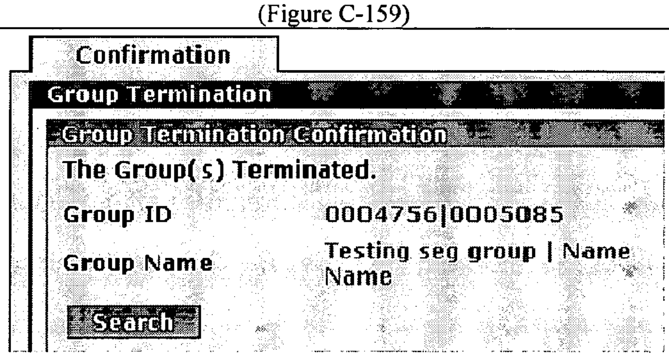
(Figure C-160)
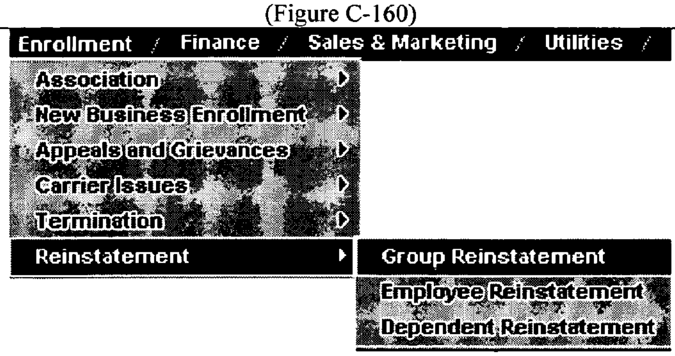
(Figure C-161)
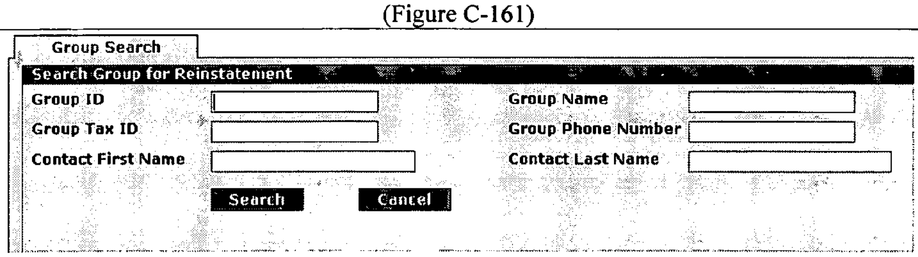
(Figure C-162)

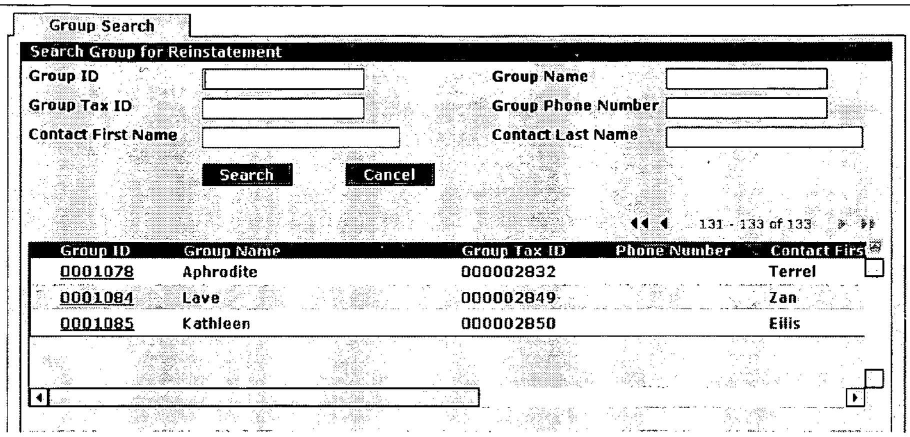
(Figure C-163)
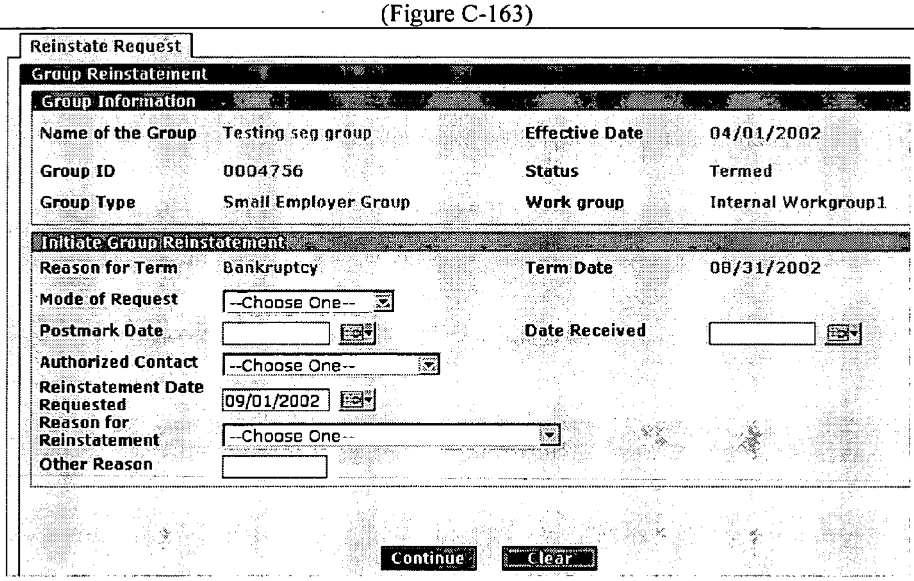
(Figure C-164)

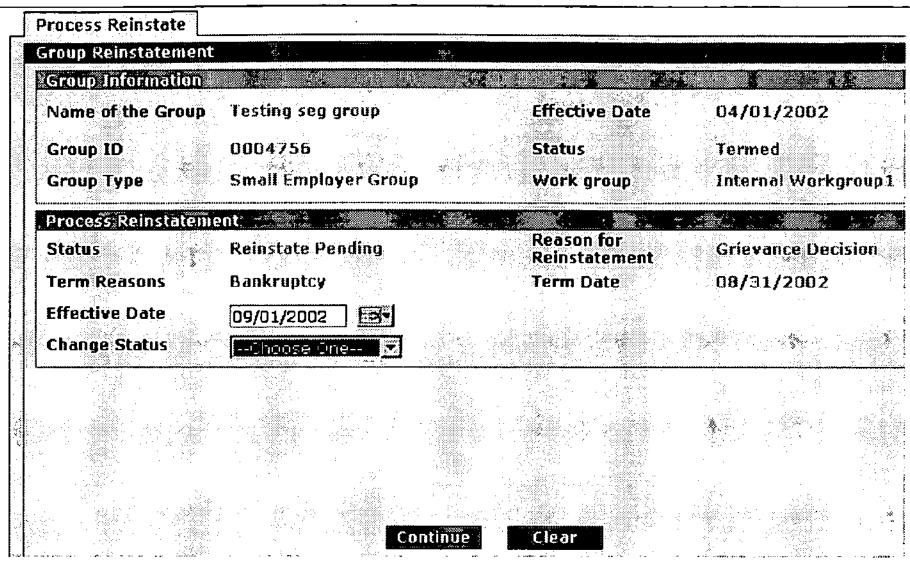
(Figure C-165)
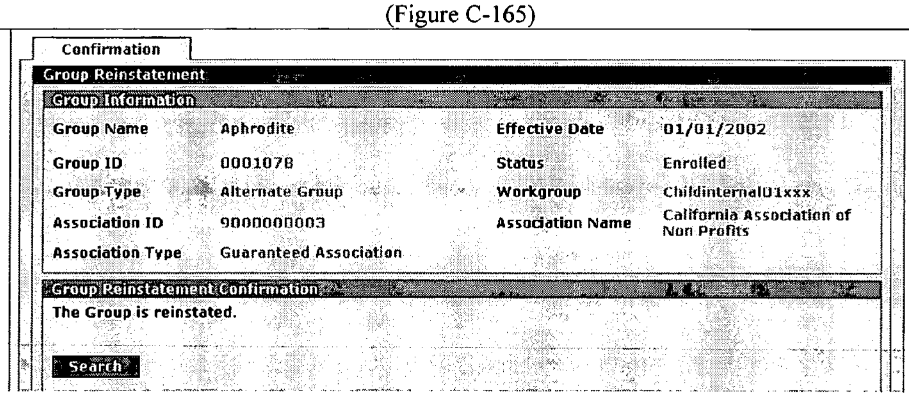
(Figure C-166)
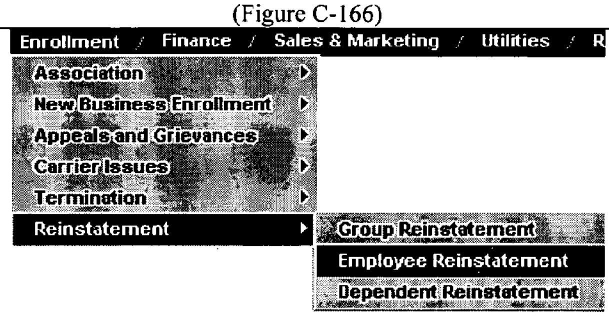
(Figure C-167)

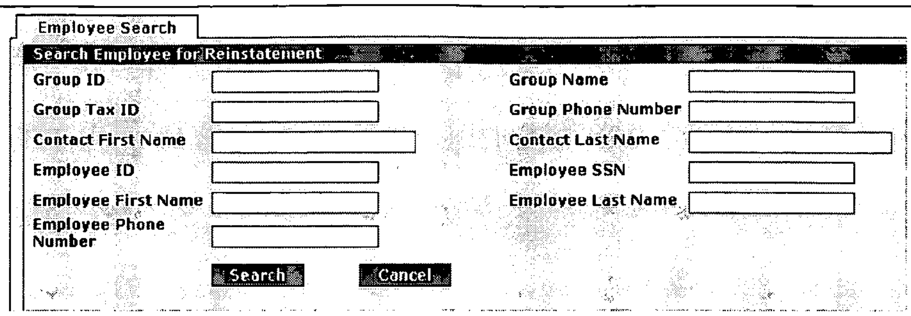
(Figure C-168)
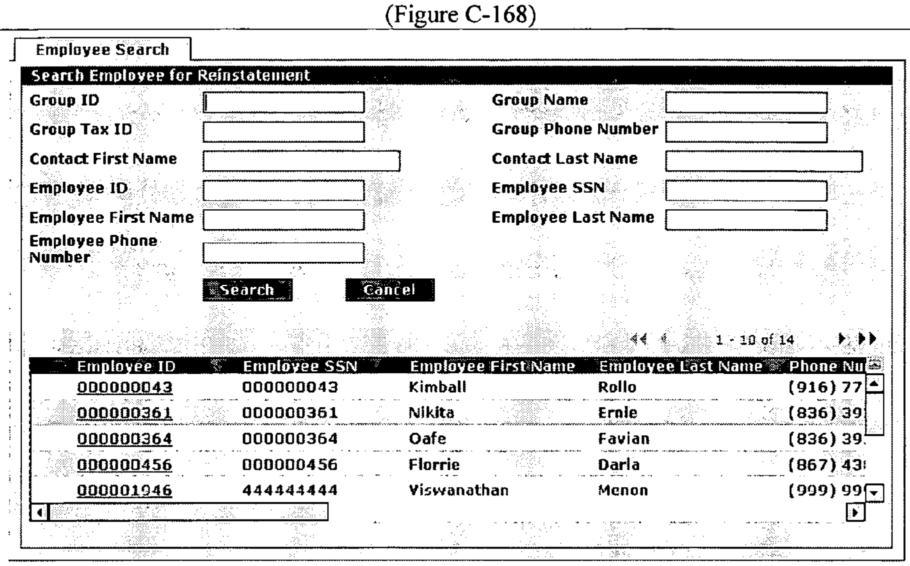
(Figure C-169)
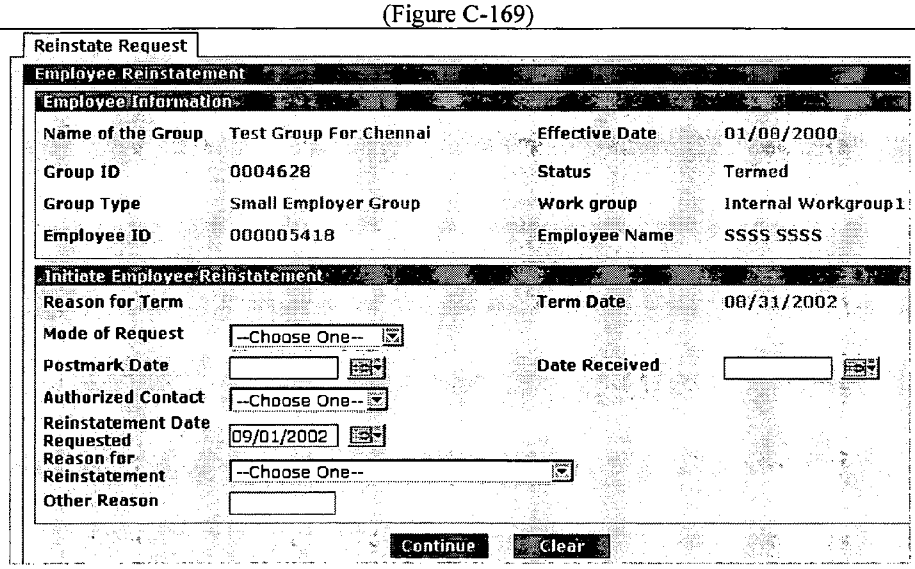
(Figure C-170)

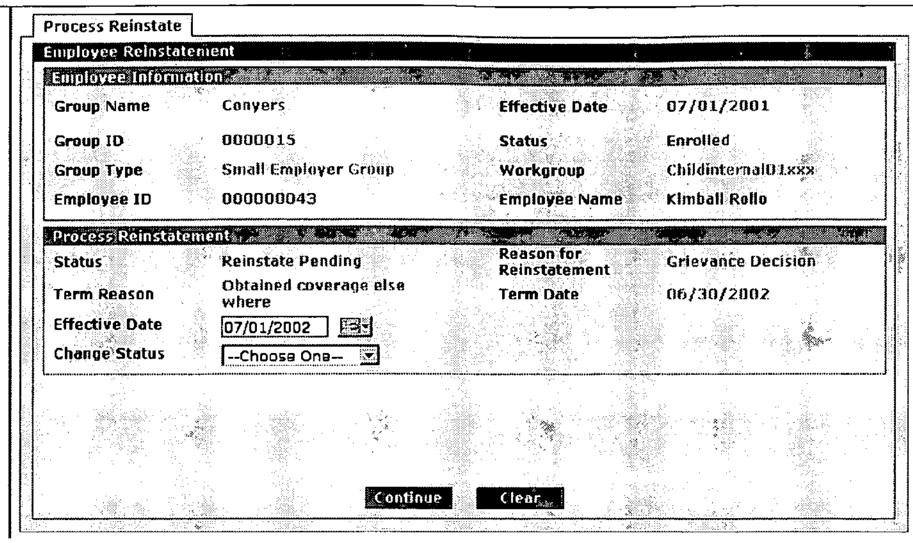
(Figure C-171)
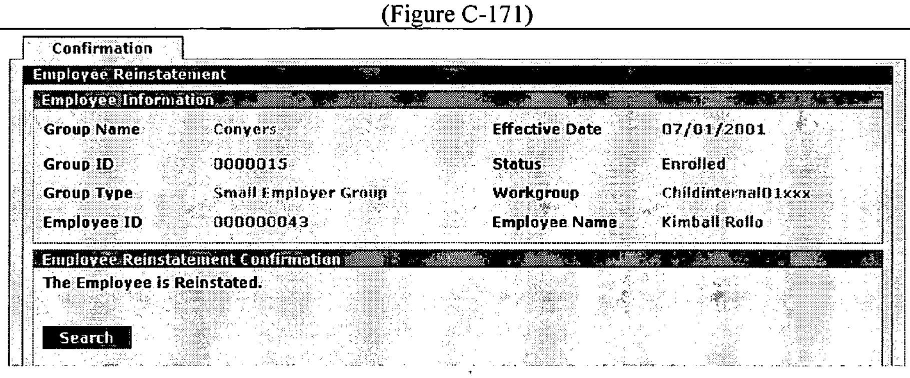
(Figure C-172)
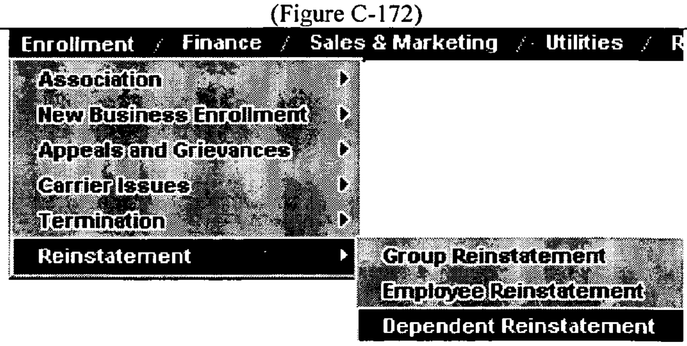
(Figure C-173)

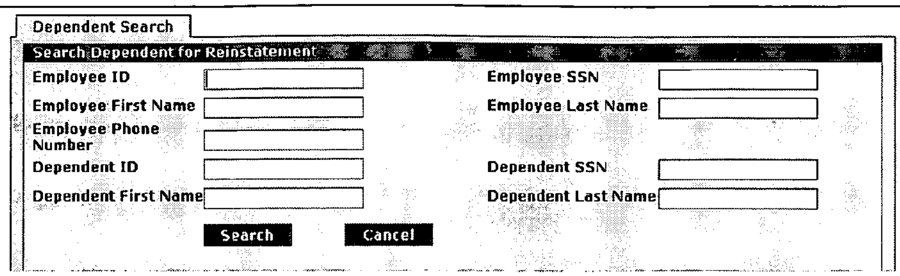
(Figure C-174)
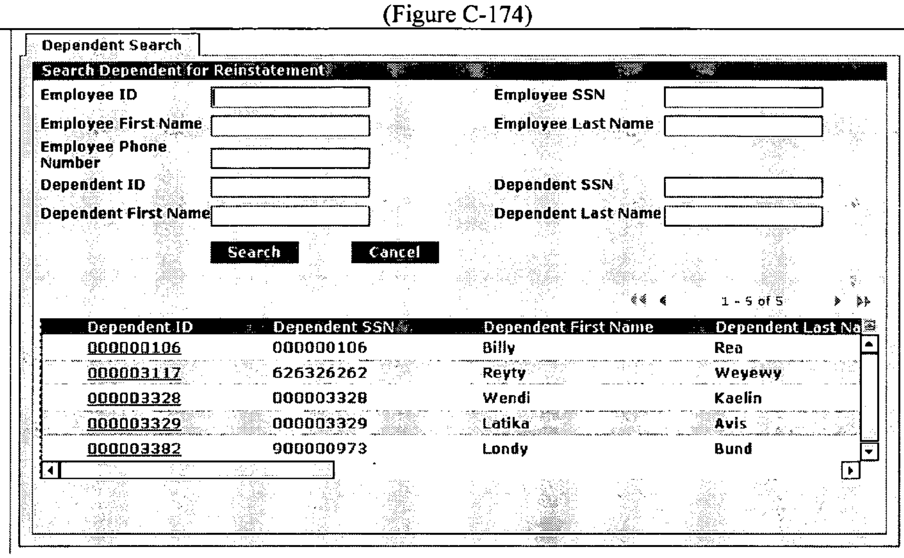
(Figure C-175)
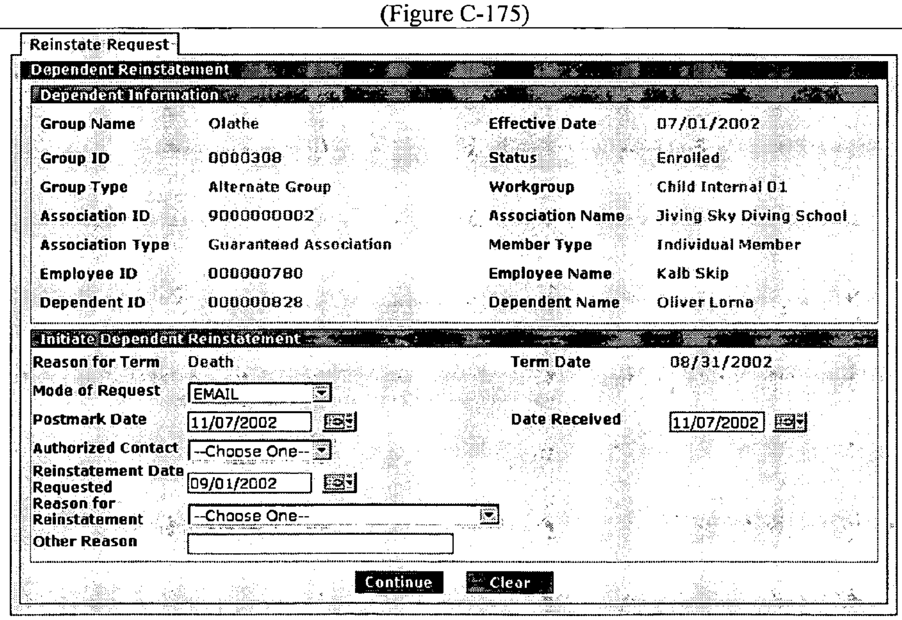
(Figure C-176)

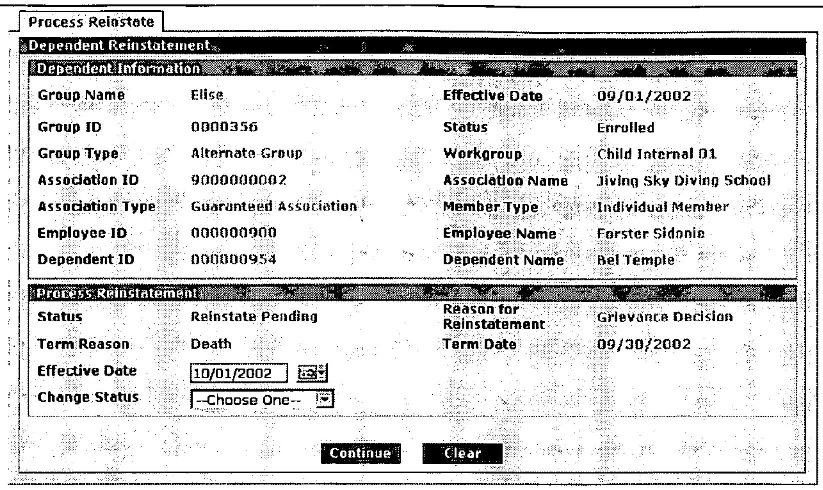
(Figure C-177)
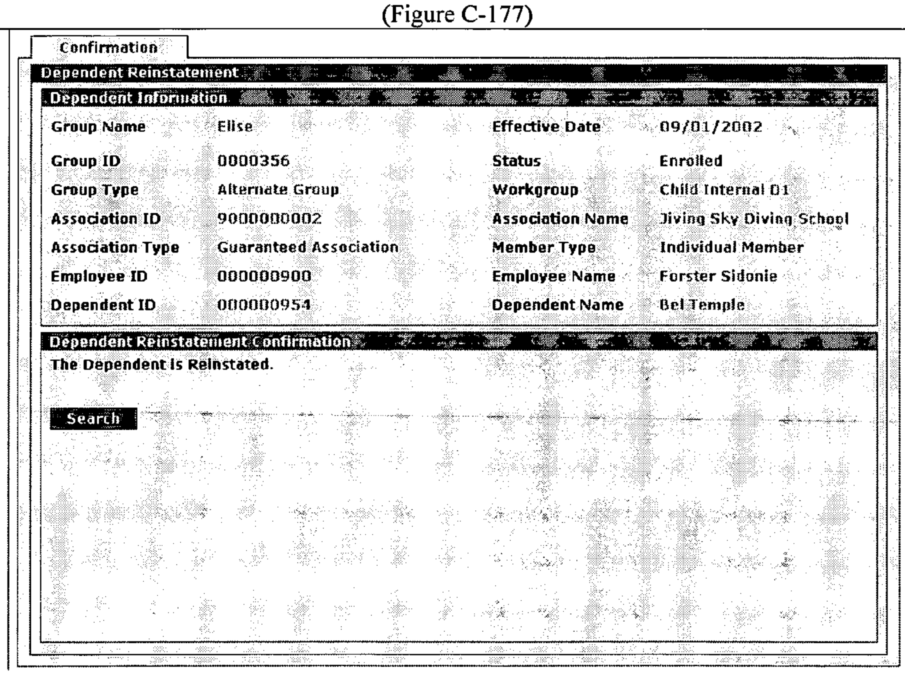
(Figure C-178)
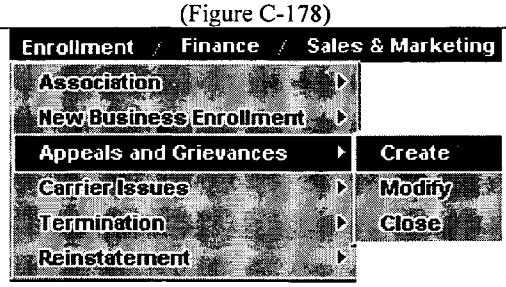
(Figure C-179)

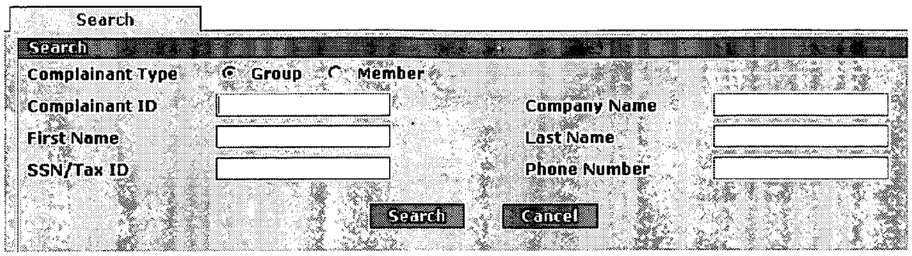
(Figure C-180)
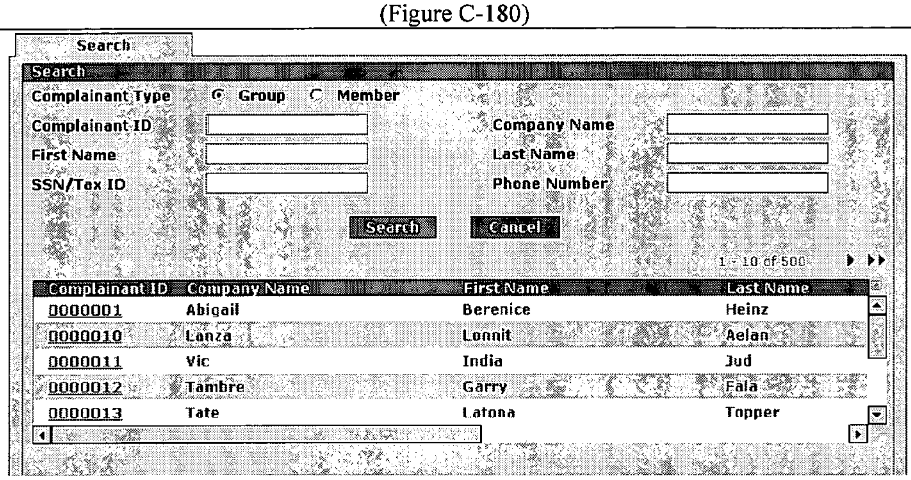
(Figure C-181)
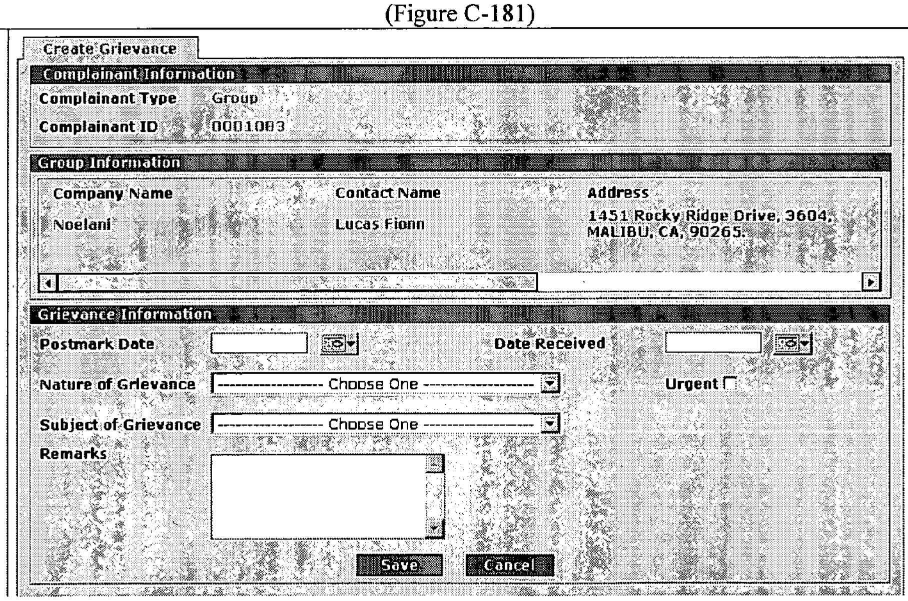
(Figure C-182)

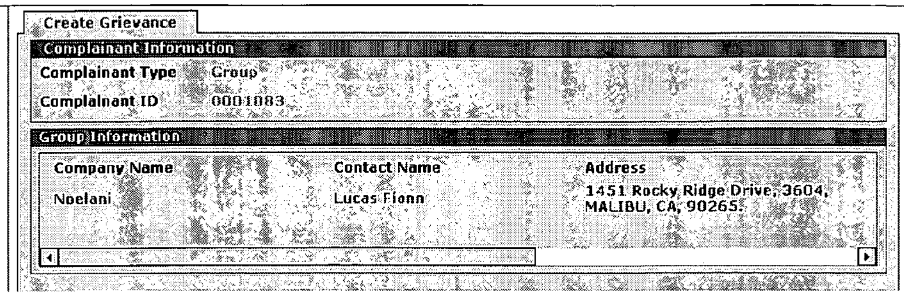
(Figure C-183)
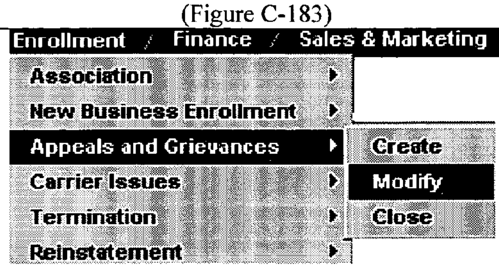
(Figure C-184)
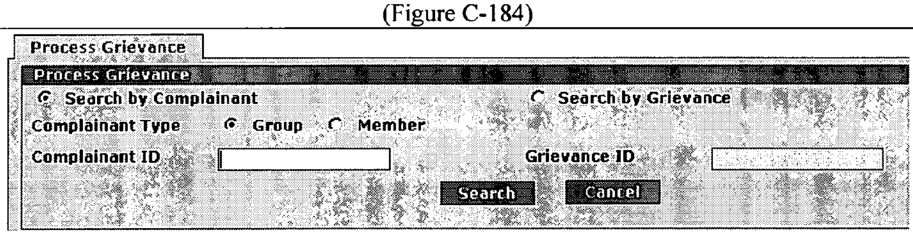
(Figure C-185)
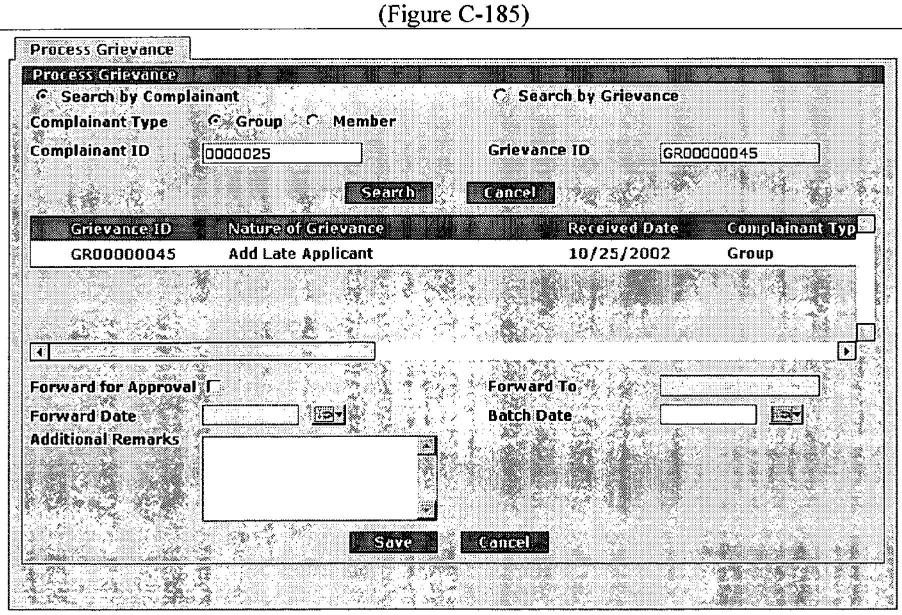
(Figure C-186)

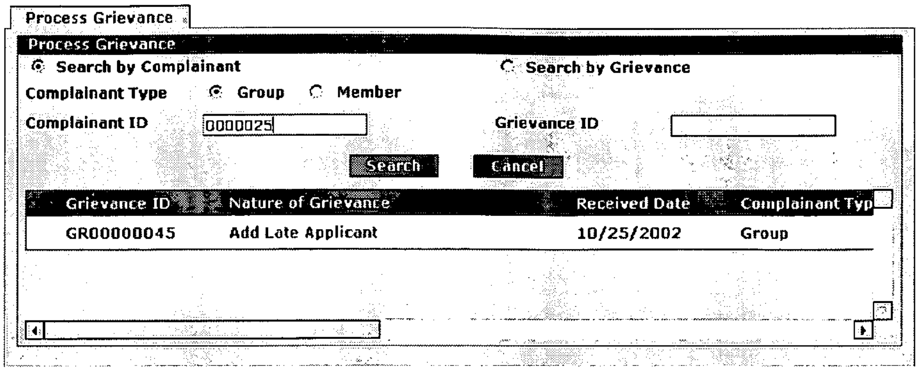
(Figure C-187)
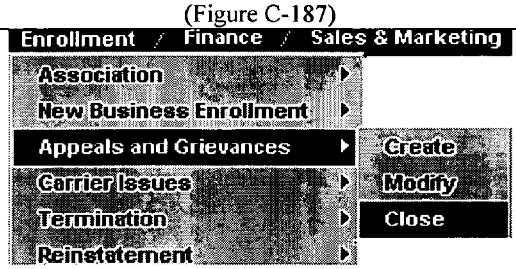
(Figure C-188)
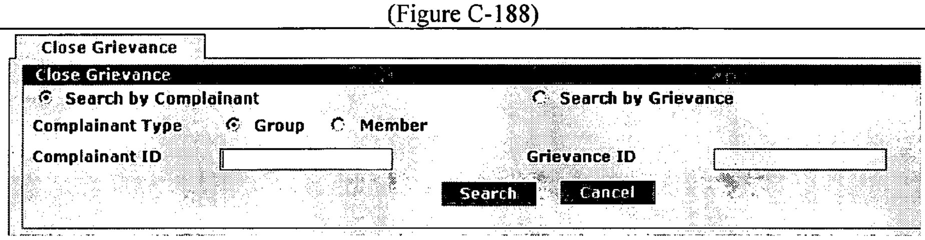
(Figure C-189)
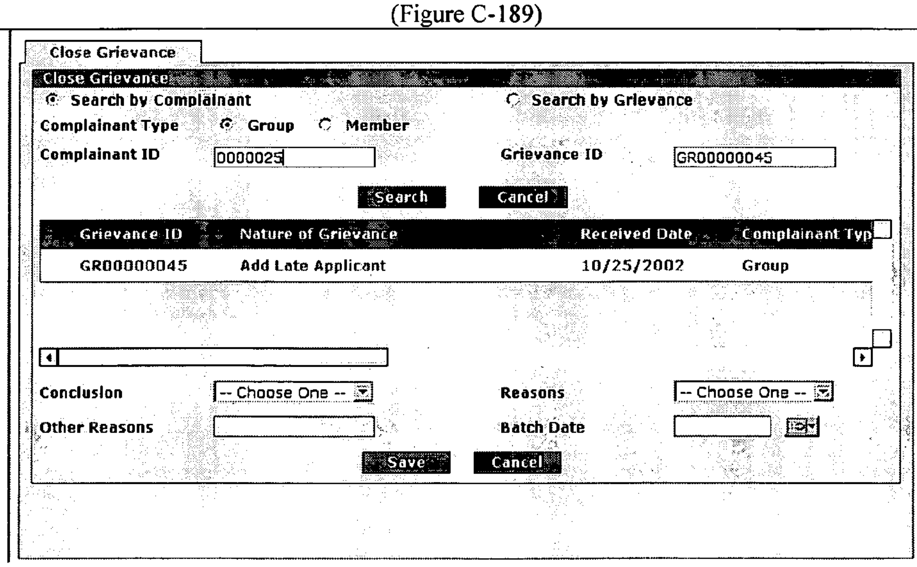
(Figure C-190)

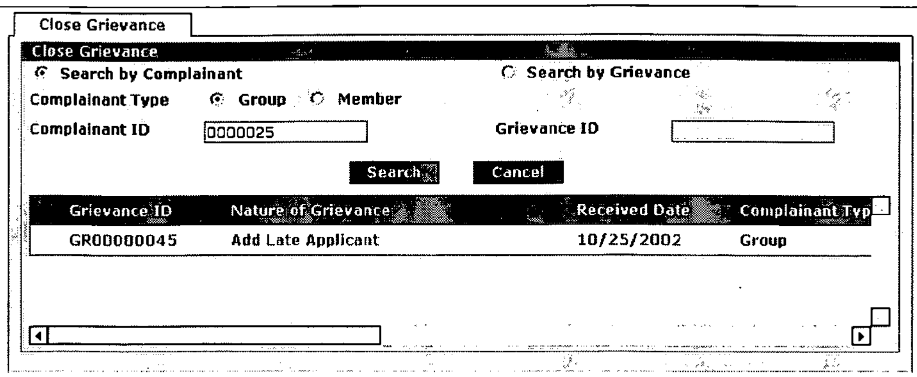
(Figure C-191)
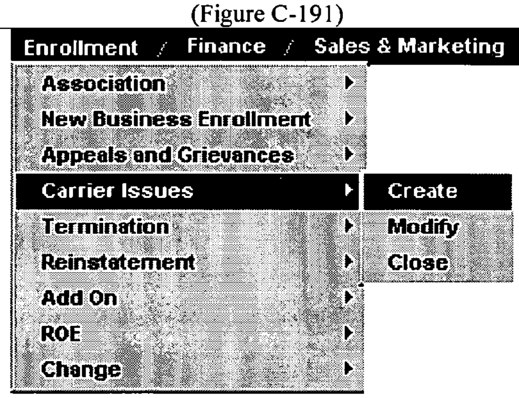
(Figure C-192)
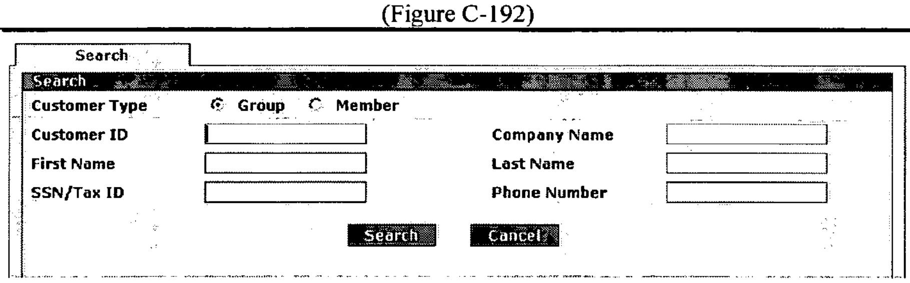
(Figure C-193)

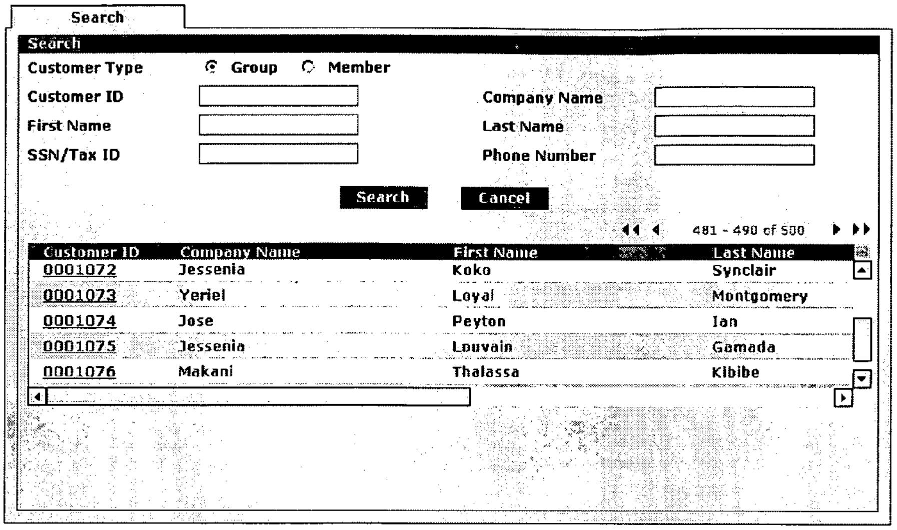
(Figure C-194)
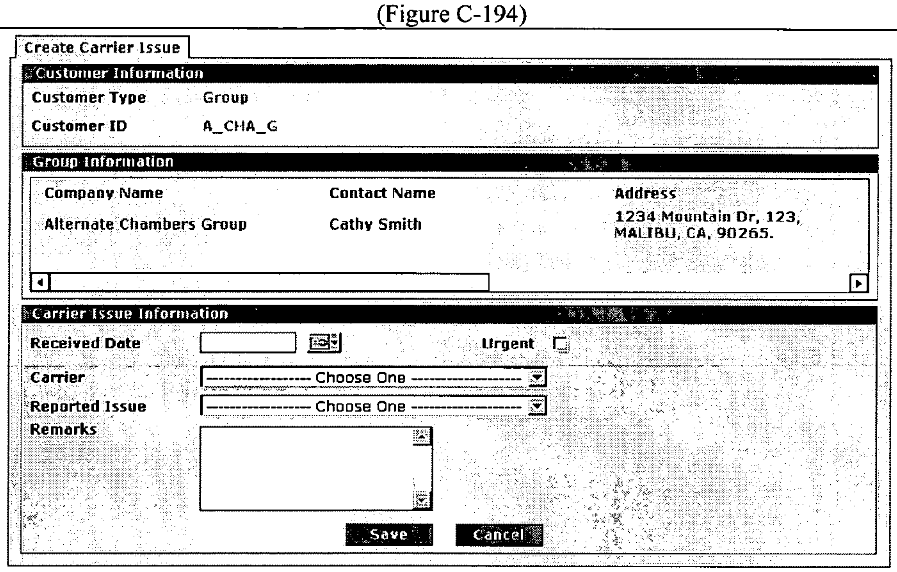
(Figure C-195)
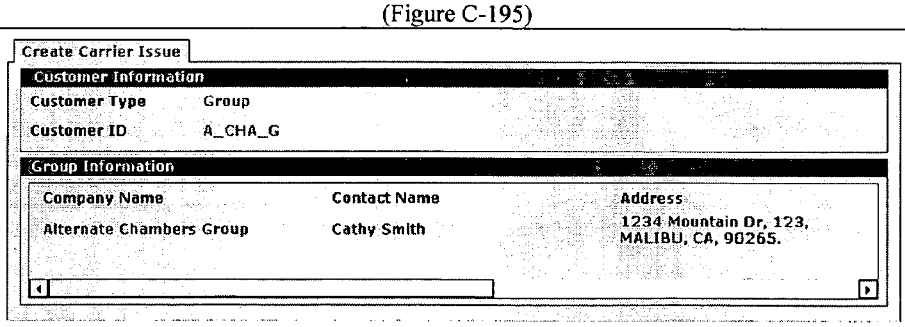
(Figure C-196)

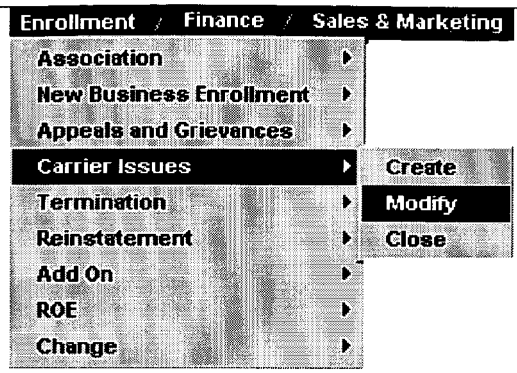
(Figure C-197)
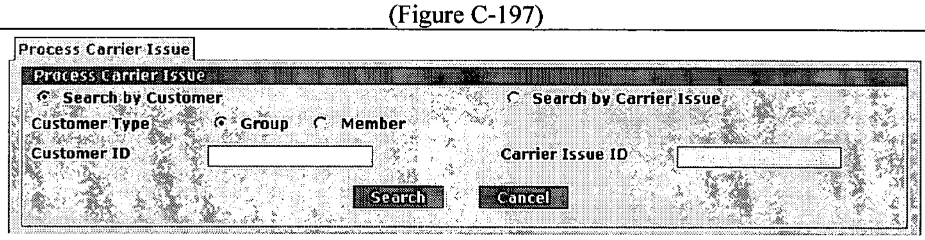
(Figure C-198)
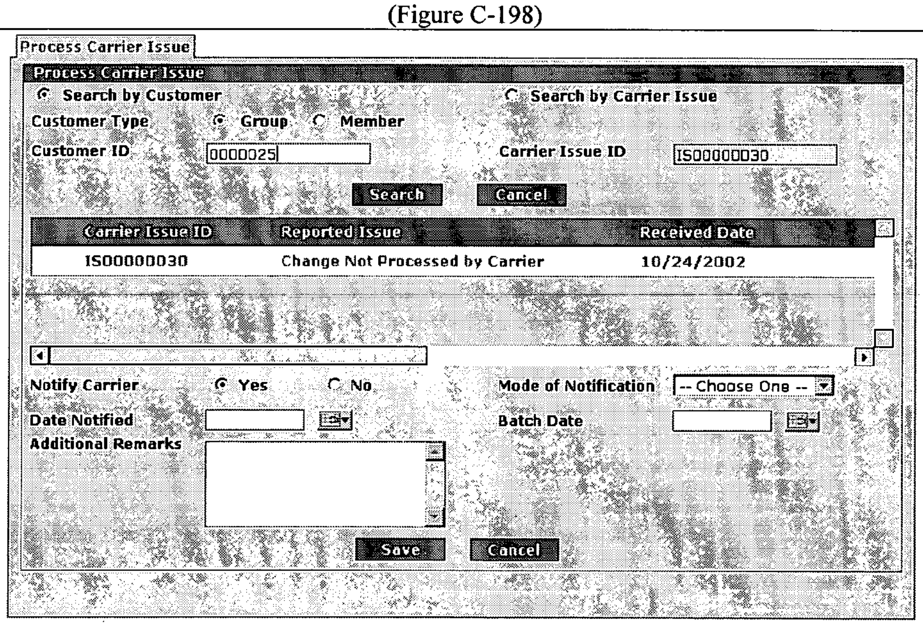
(Figure C-199)

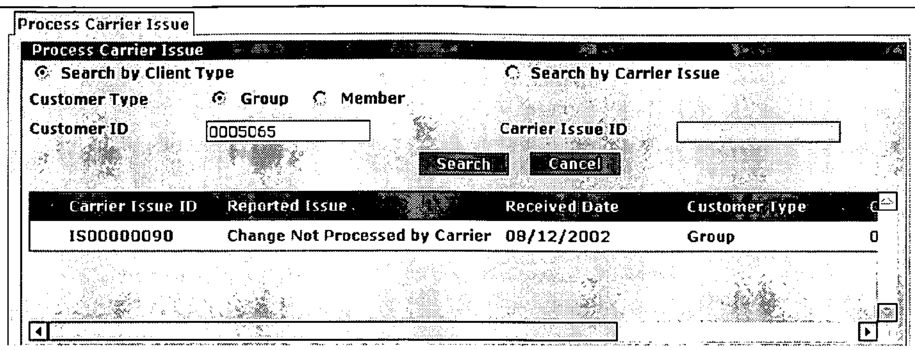
(Figure C-200)
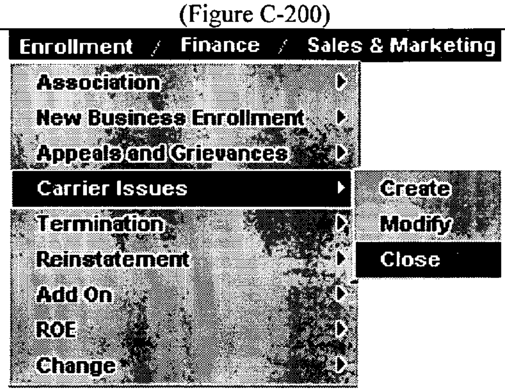
(Figure C-201)
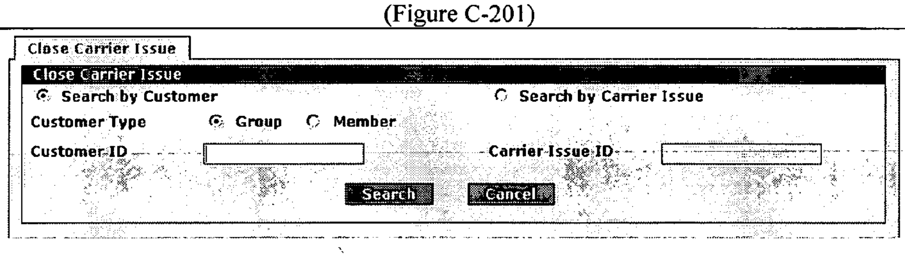
(Figure C-202)

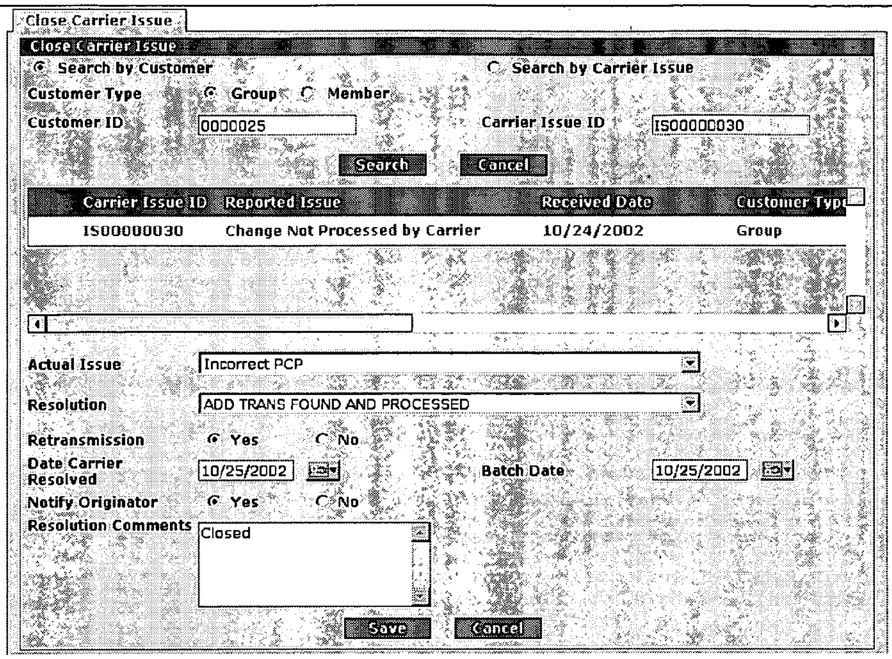
(Figure C-203)
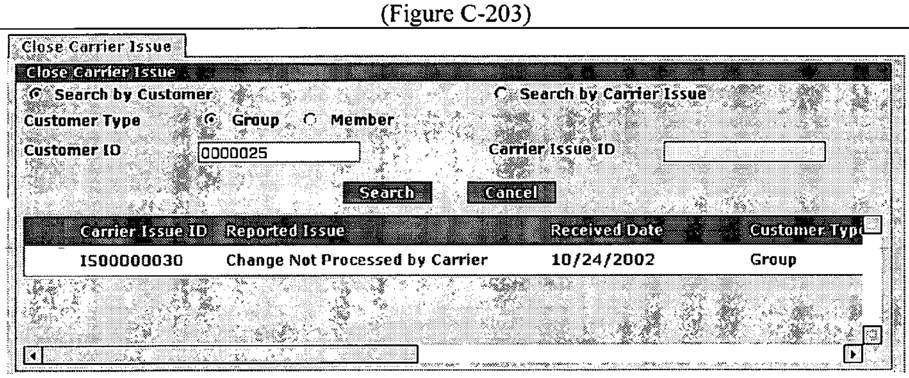
(Figure C-204)
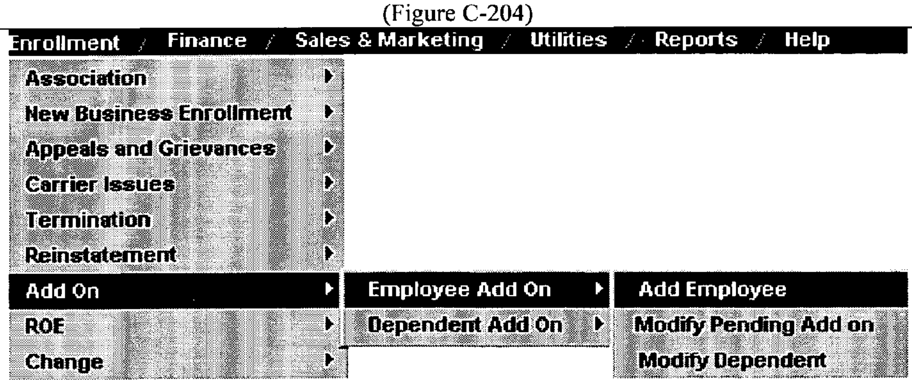
(Figure C-205)

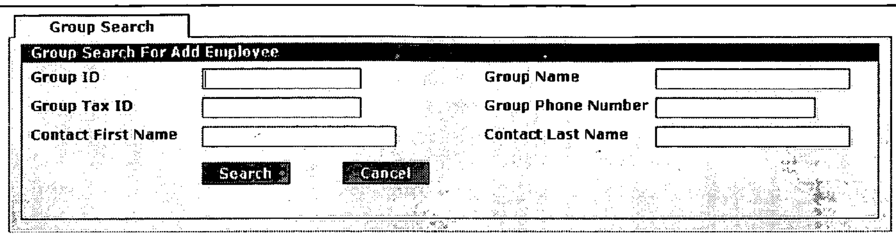
(Figure C-206)
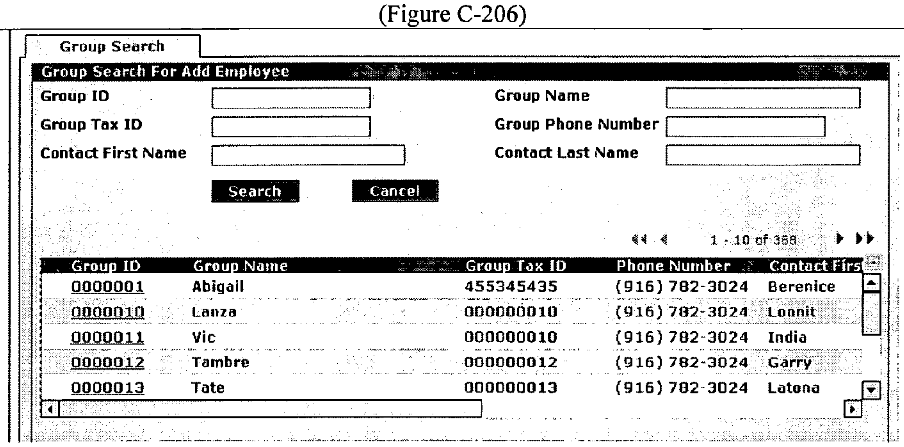
(Figure C-207)
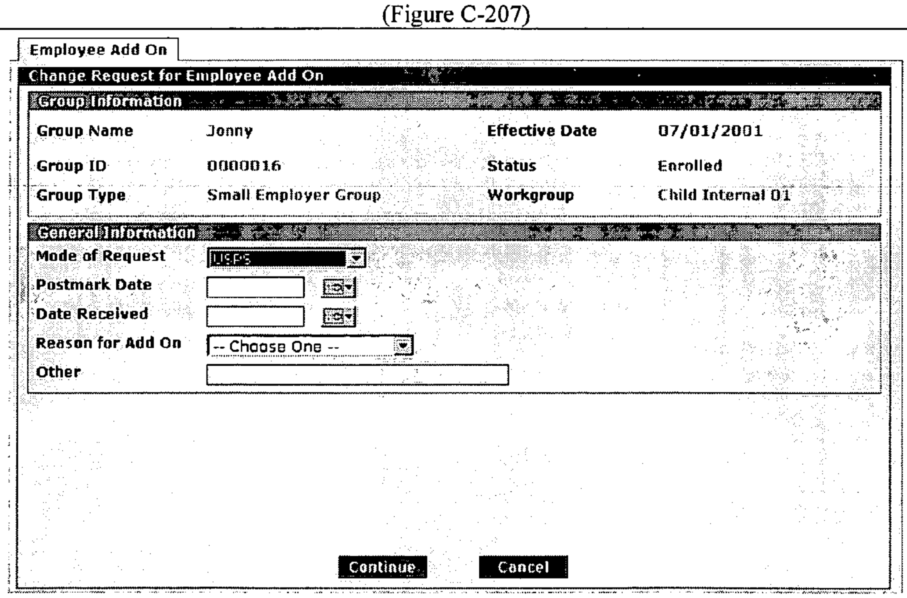
(Figure C-208)

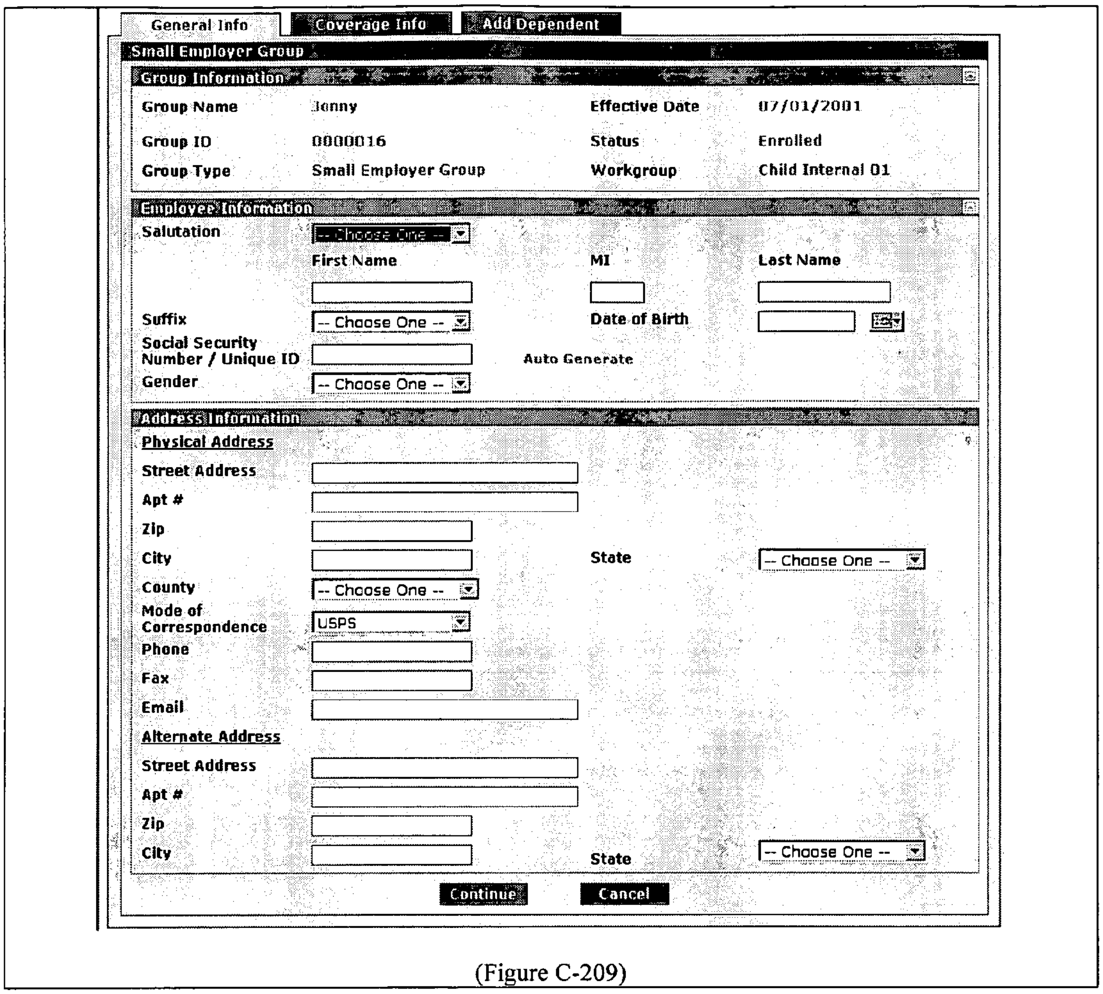
(Figure C-209)

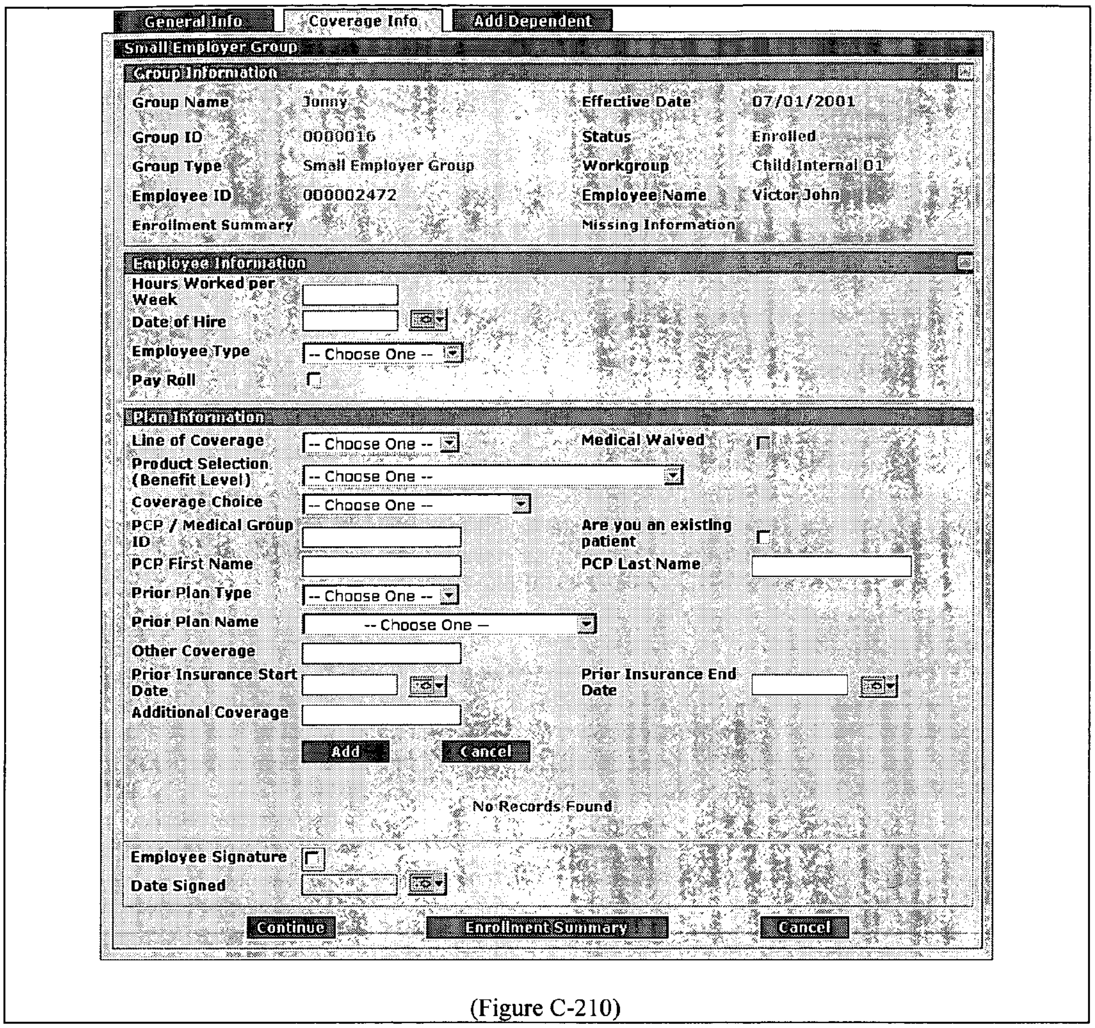
(Figure C-210)

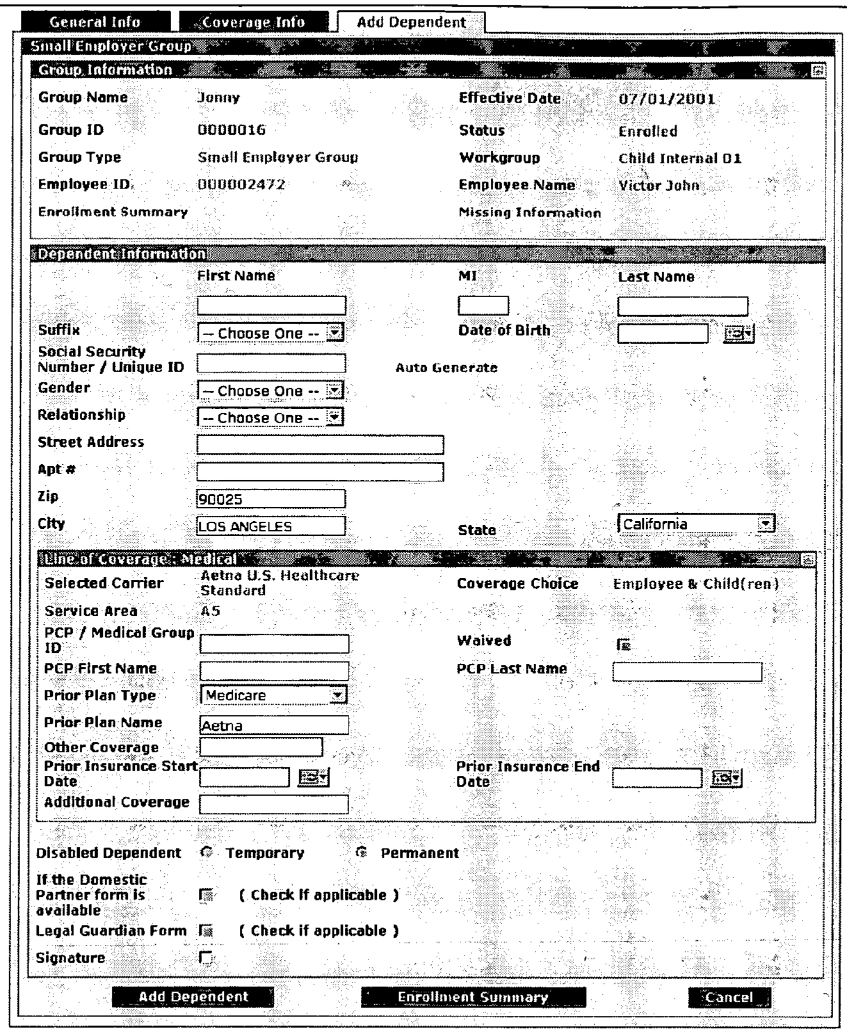
(Figure C-211)
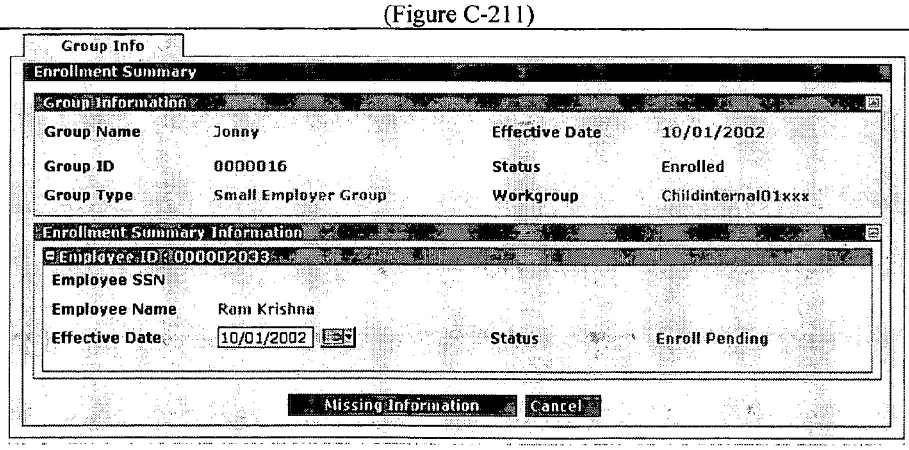
Figure C-212

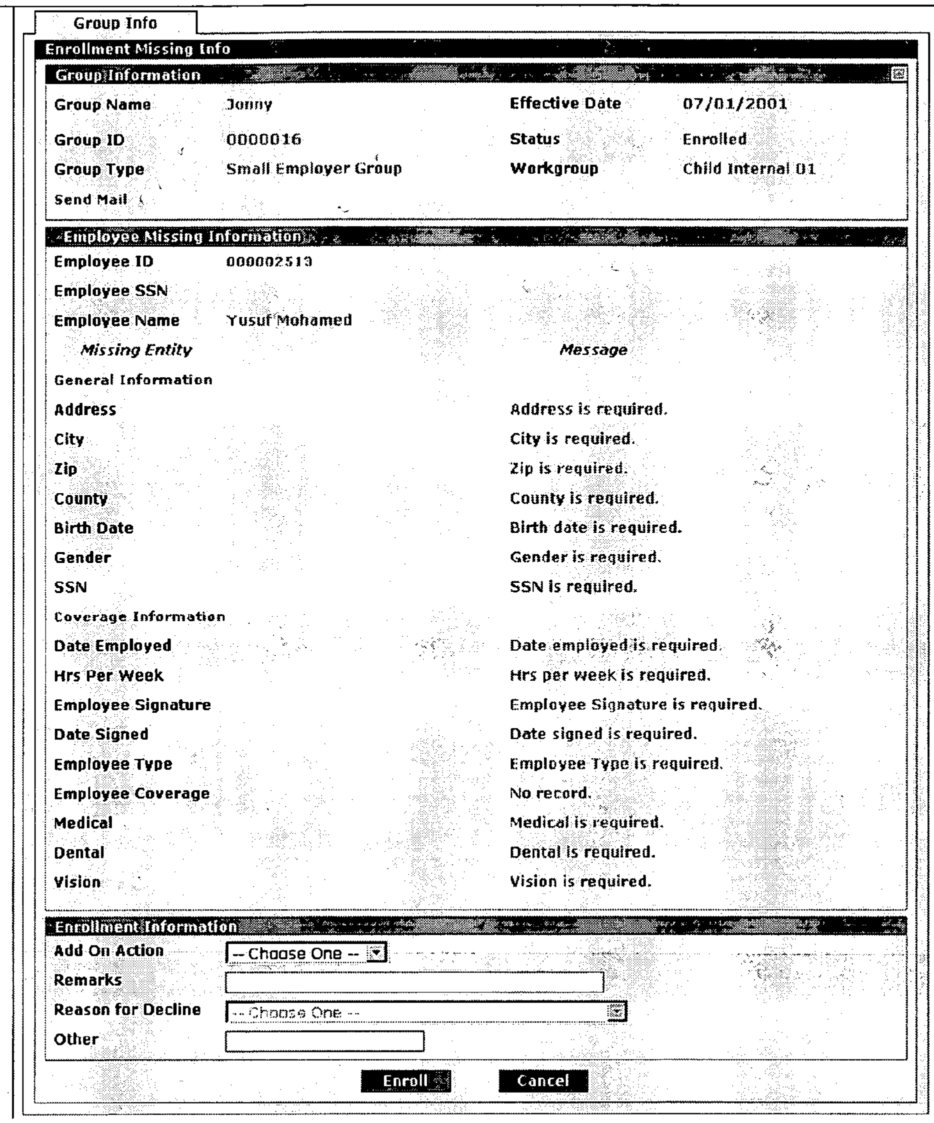
(Figure C-213)
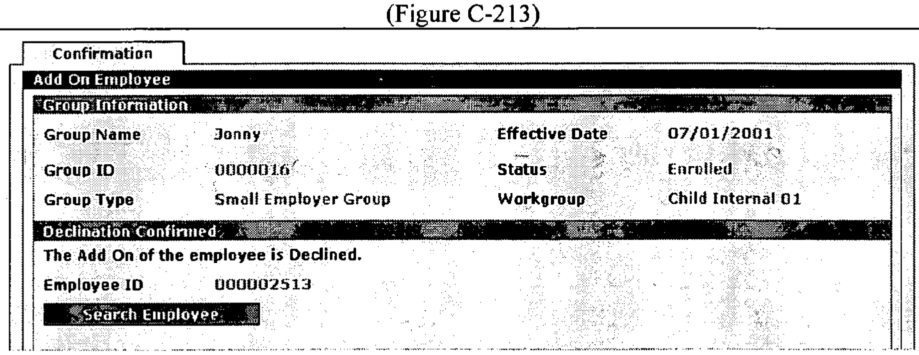
(Figure C-214)

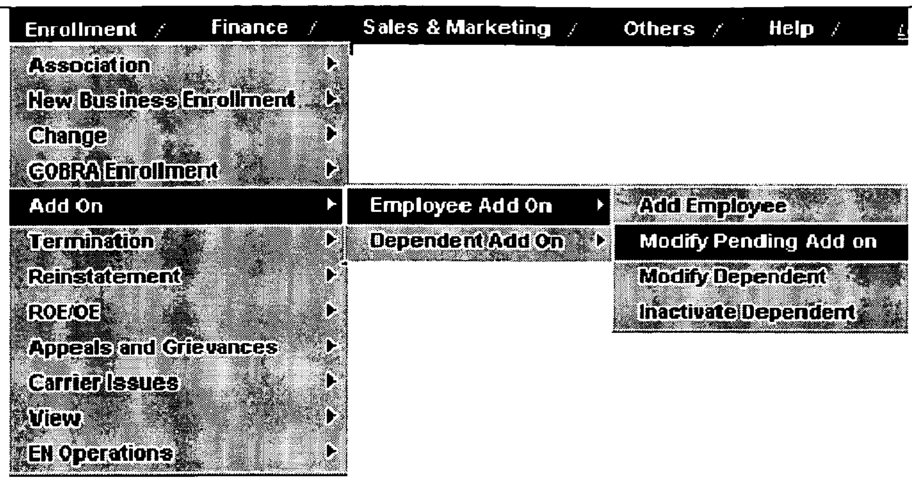
(Figure C-215)
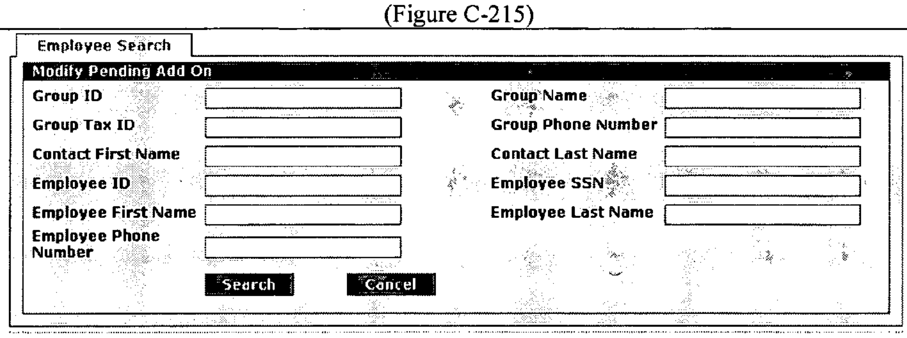
(Figure C-216)
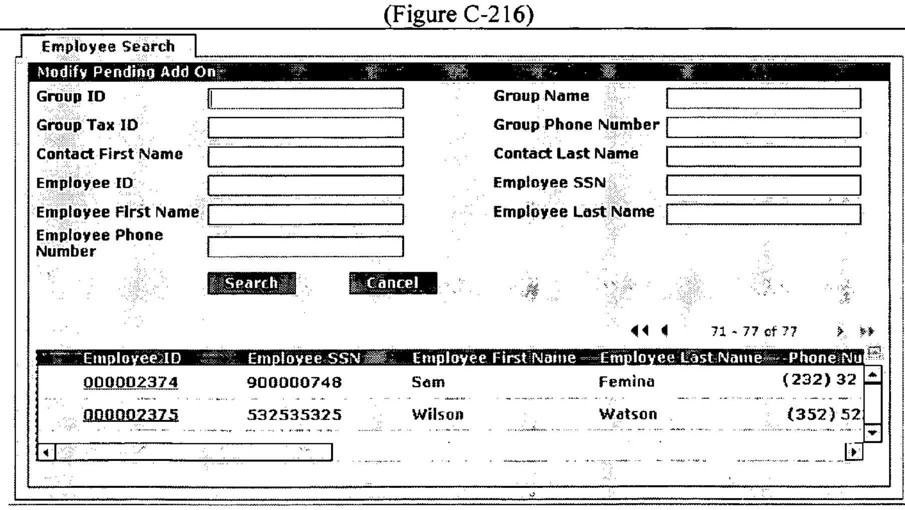
(Figure C-217)

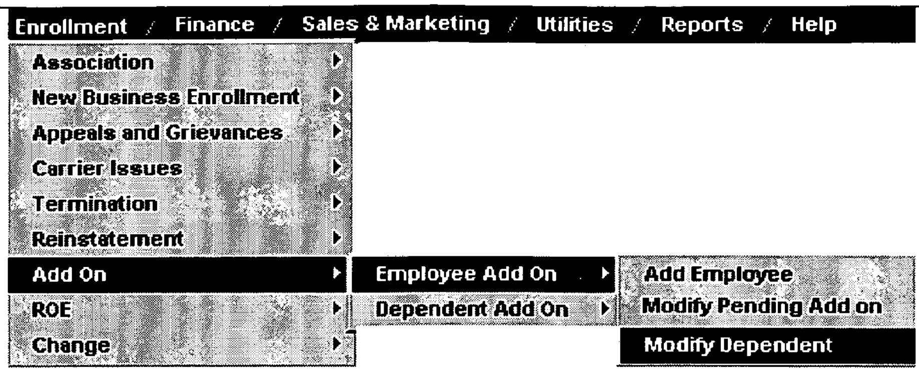
(Figure C-218)
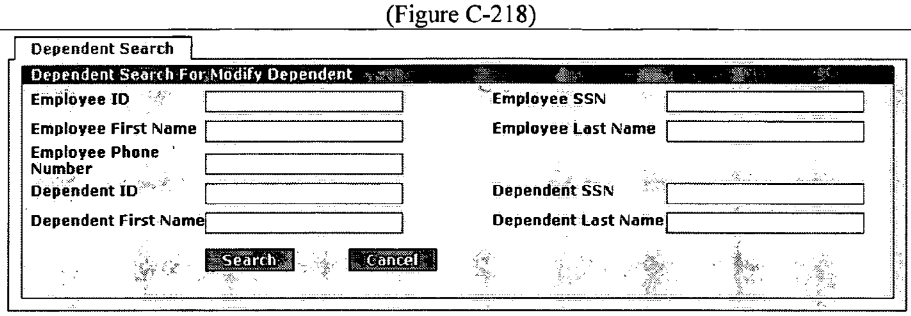
Figure C-219
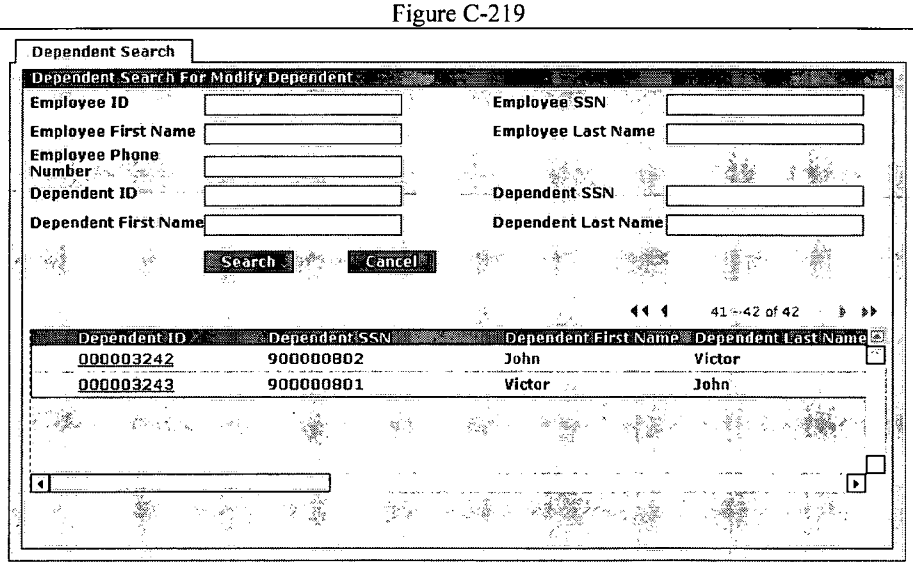
(Figure C-220)

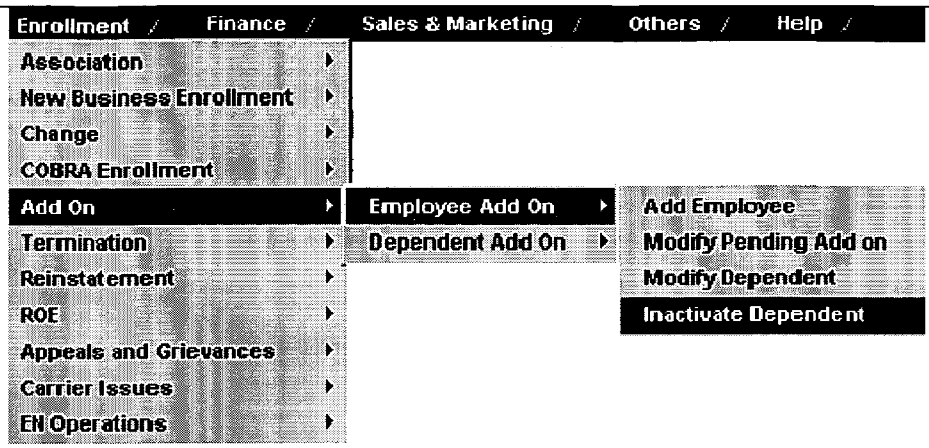
(Figure C-221)
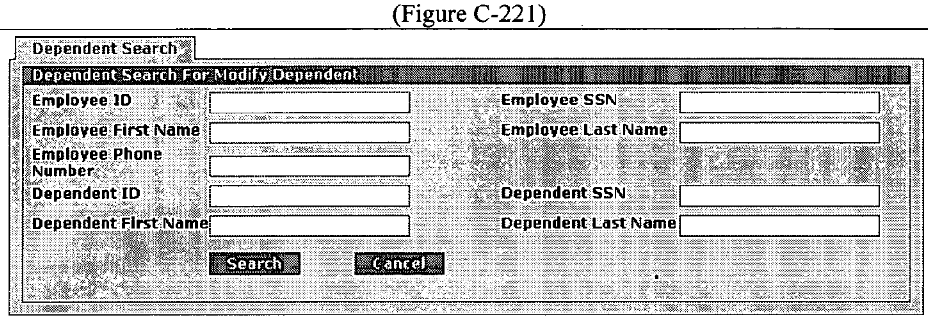
(Figure C-222)
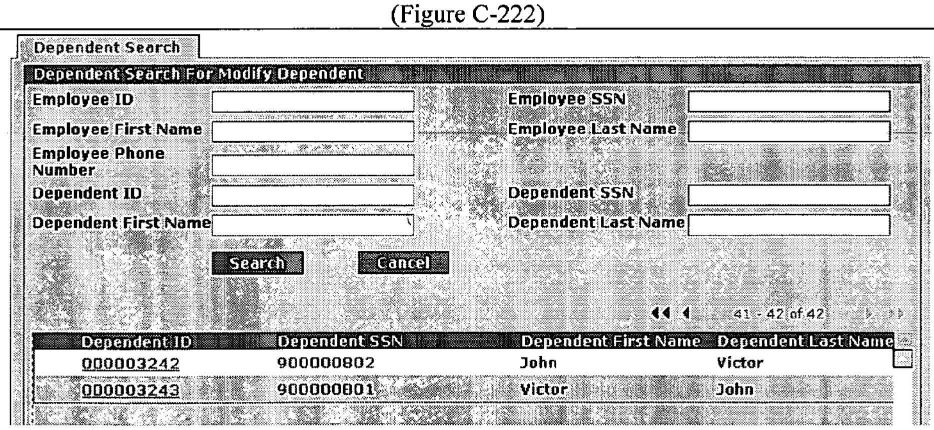
(Figure C-223)

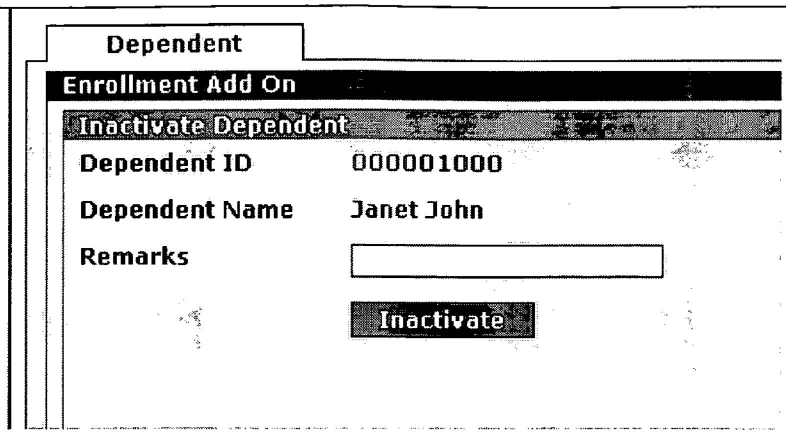
(Figure C-224)
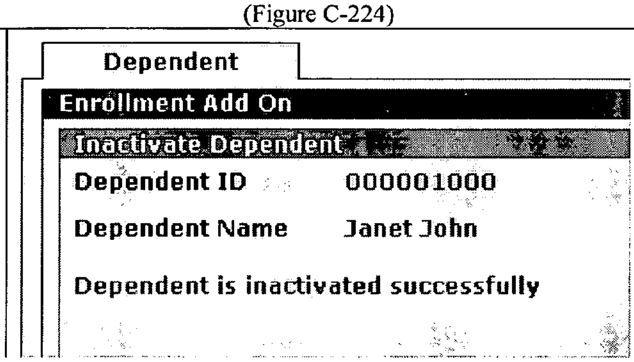
(Figure C-225)
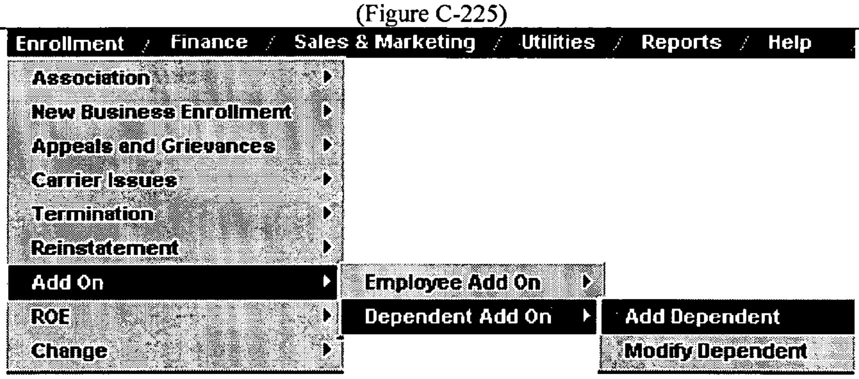
(Figure C-226)
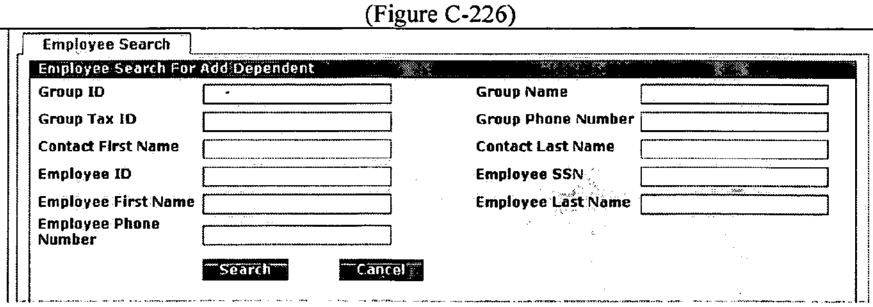
(Figure C-227)

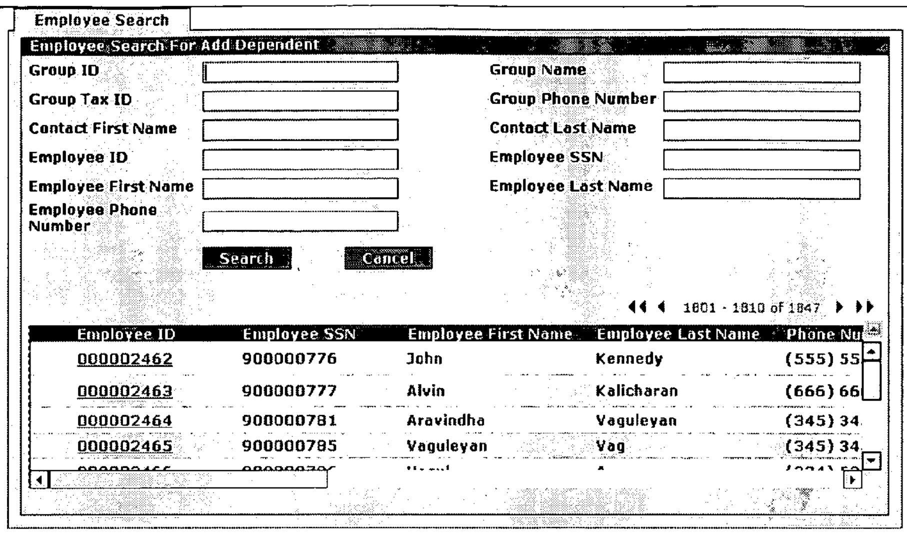
(Figure C-228)
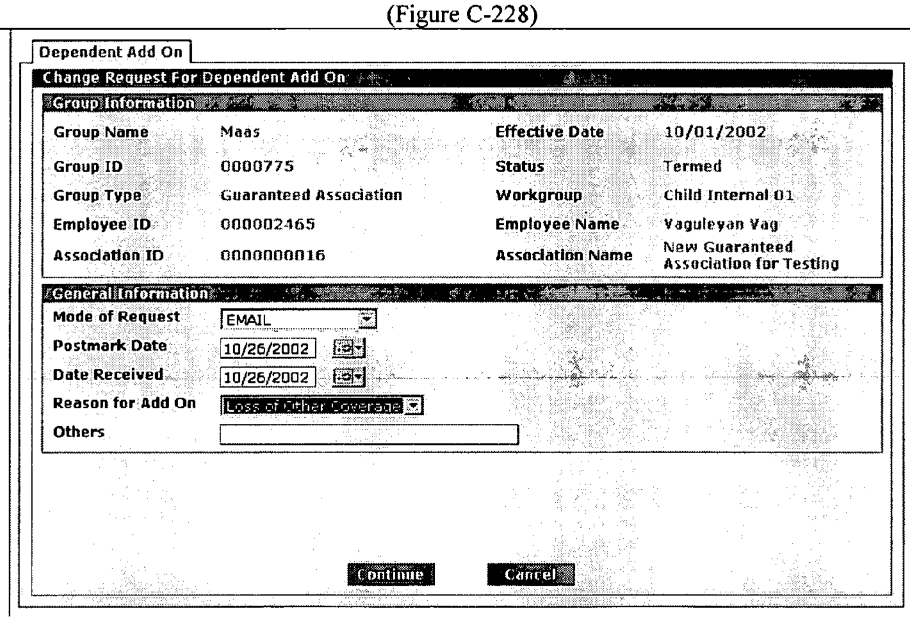
(Figure C-229)

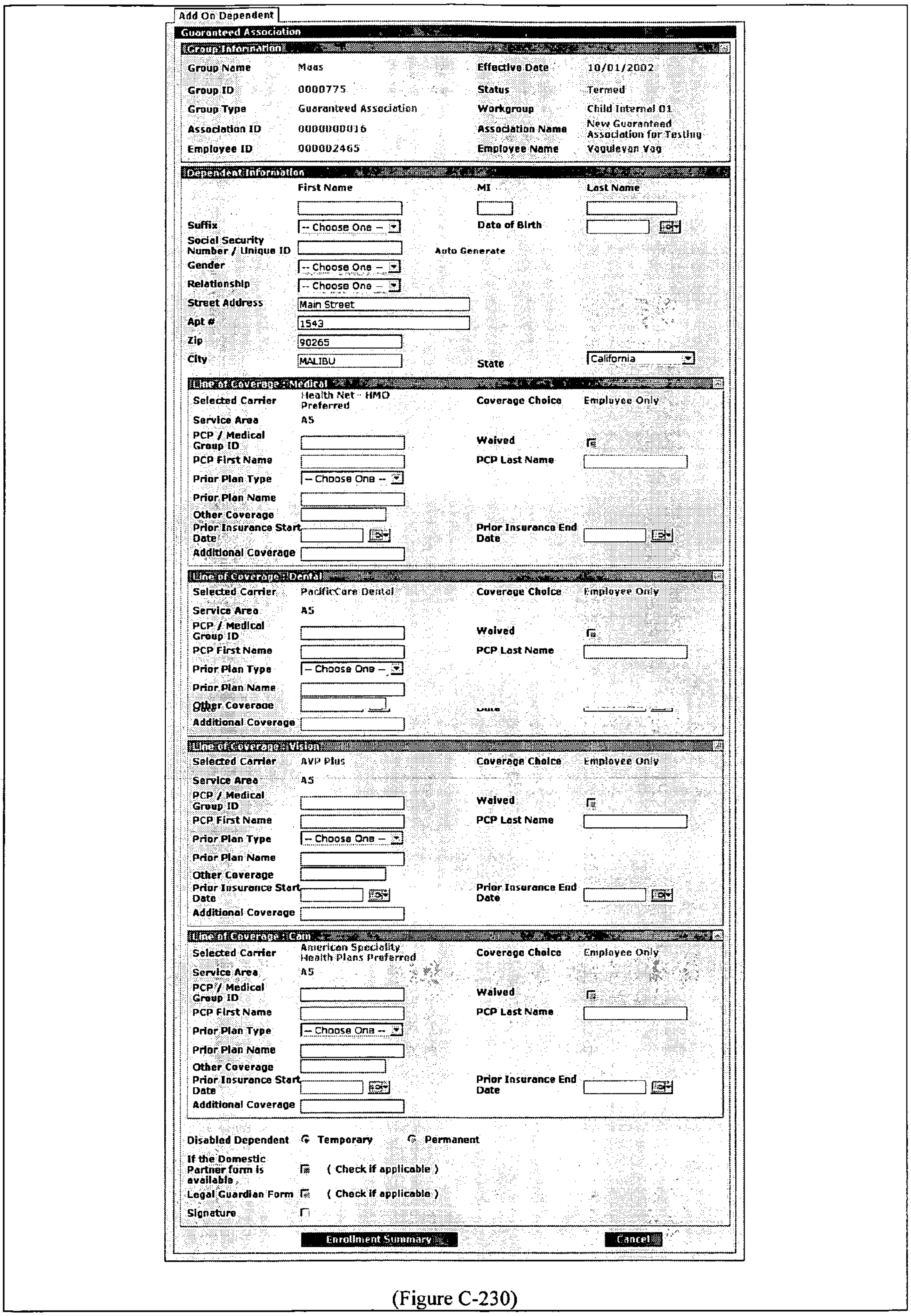
(Figure C-230)

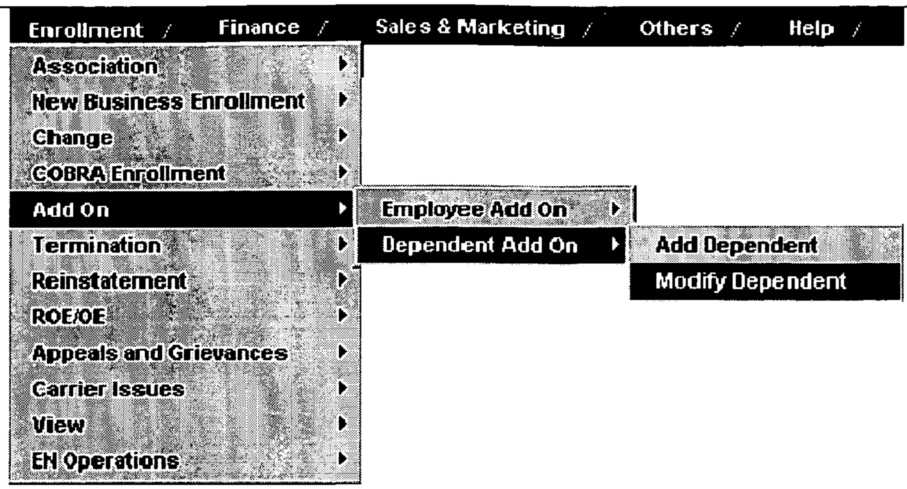
(Figure C-231)
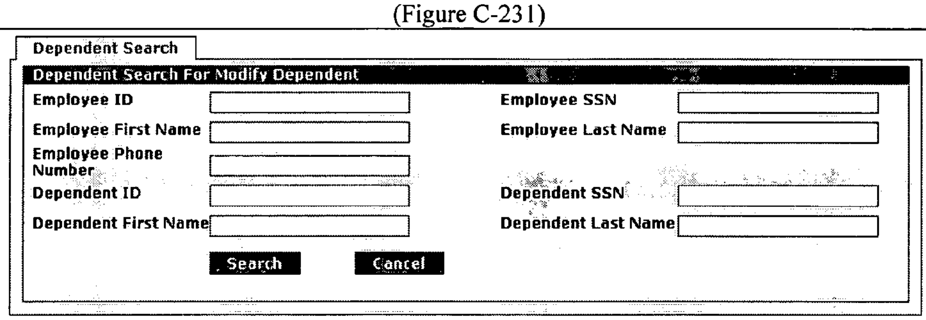
(Figure C-232)
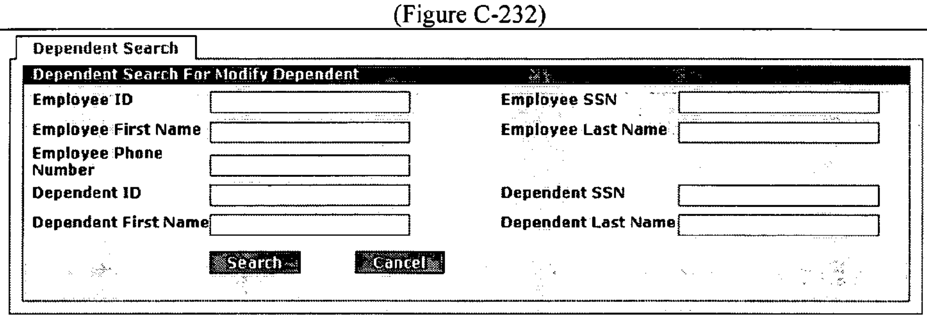
(Figure C-233)

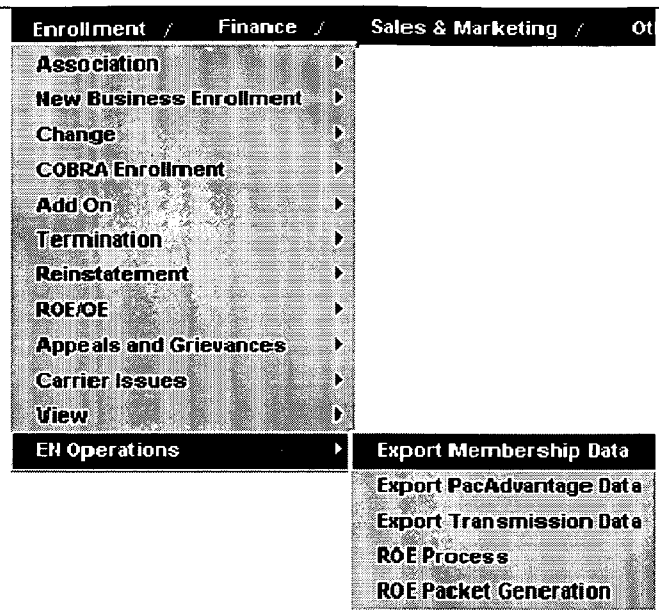
(Figure C-234)
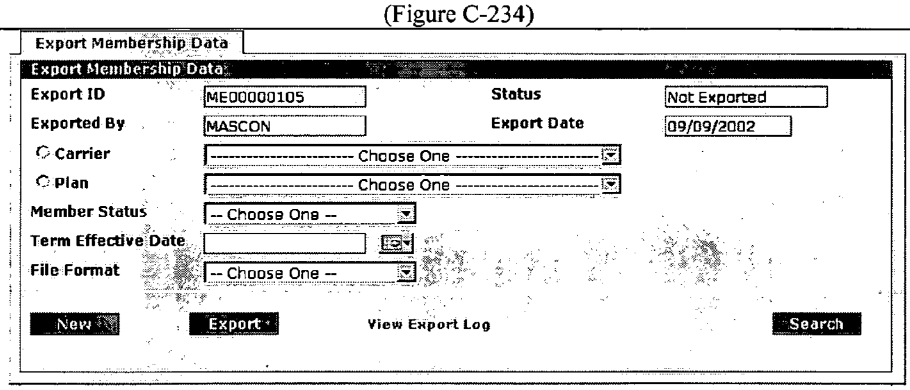
(Figure C-235)

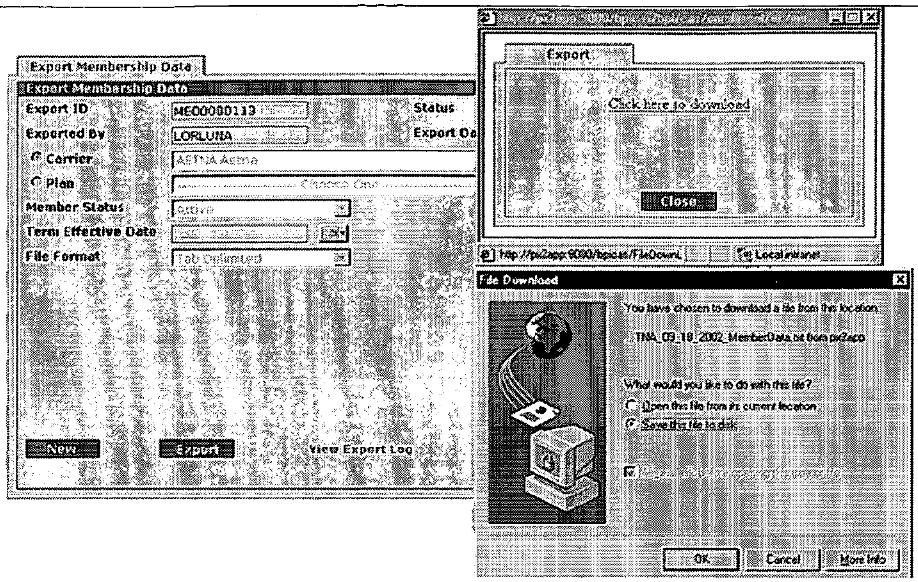
(Figure C-236)
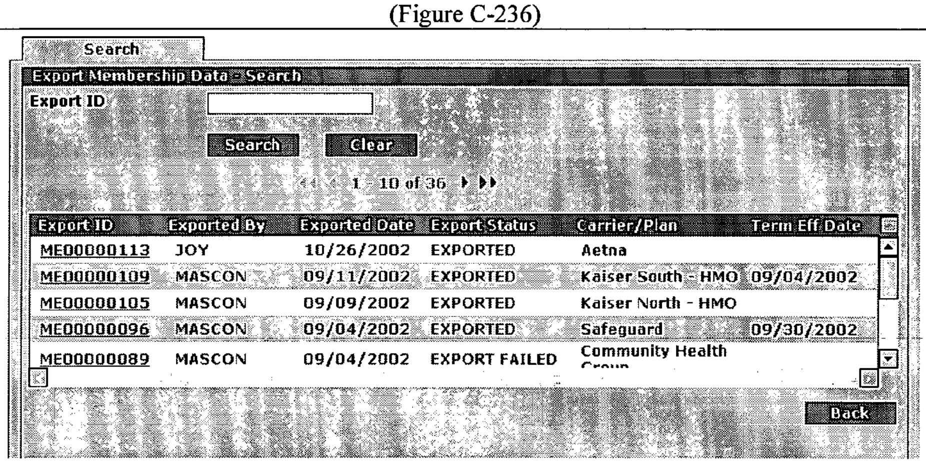
| Export ID | Exported By | Exported Date | Export Status | Carrier/Plan | Term Eff Date |
|---|---|---|---|---|---|
| ME00000113 | JOY | 10/26/2002 | EXPORTED | Aetna | |
| ME00000109 | MASCON | 09/11/2002 | EXPORTED | Kaiser South - HMO | 09/04/2002 |
| ME00000105 | MASCON | 09/09/2002 | EXPORTED | Kaiser North - HMO | |
| ME00000096 | MASCON | 09/04/2002 | EXPORTED | Safeguard | 09/30/2002 |
| ME00000089 | MASCON | 09/04/2002 | EXPORT FAILED | Community Health Group | |
(Figure C-237)

(Figure C-238)
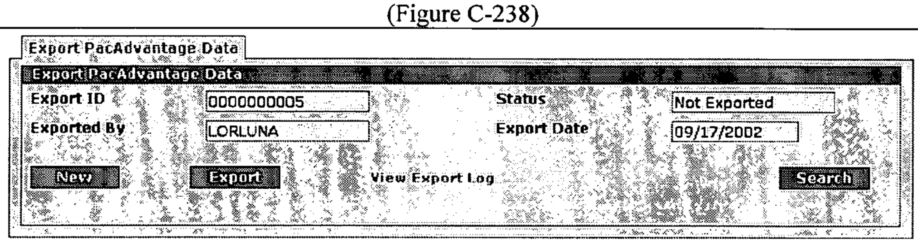
(Figure C-239)
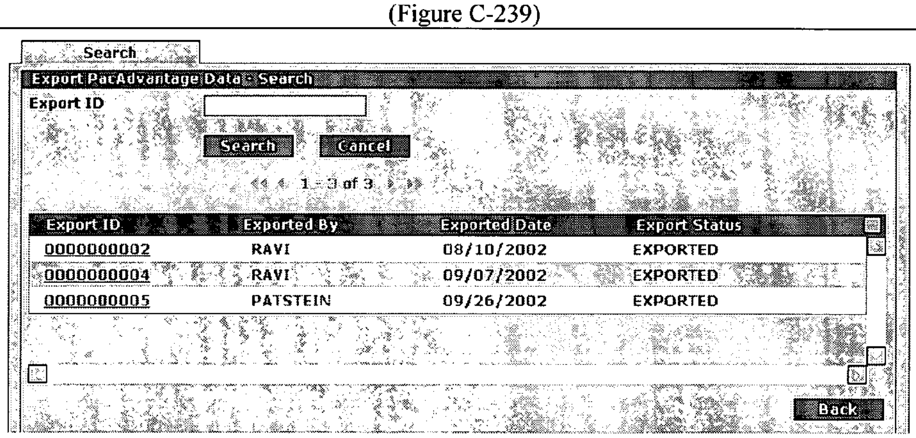
(Figure C-240)

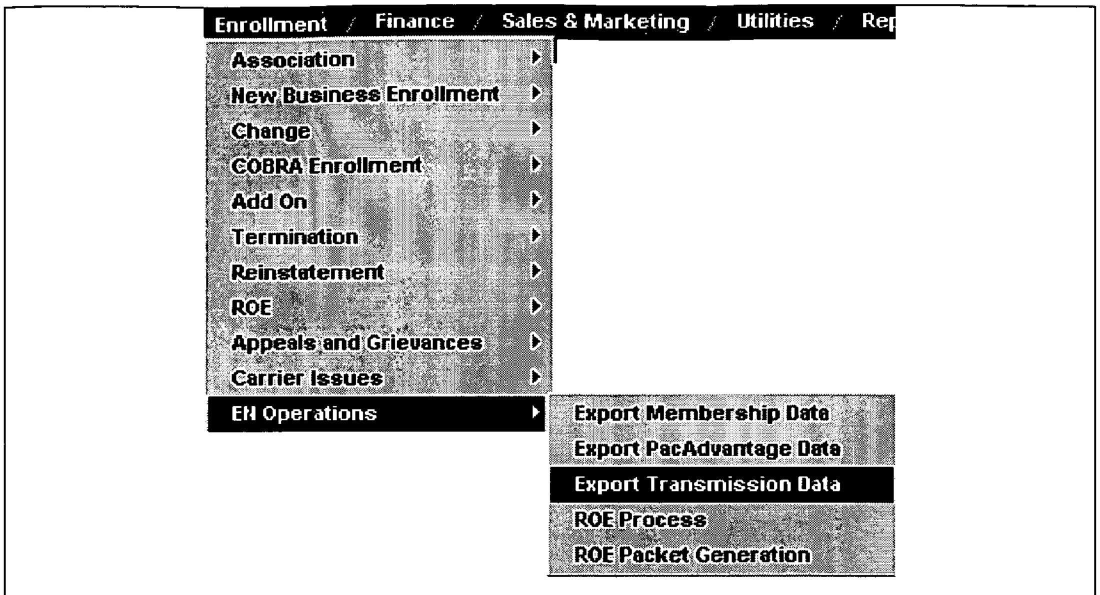
(Figure C-241)
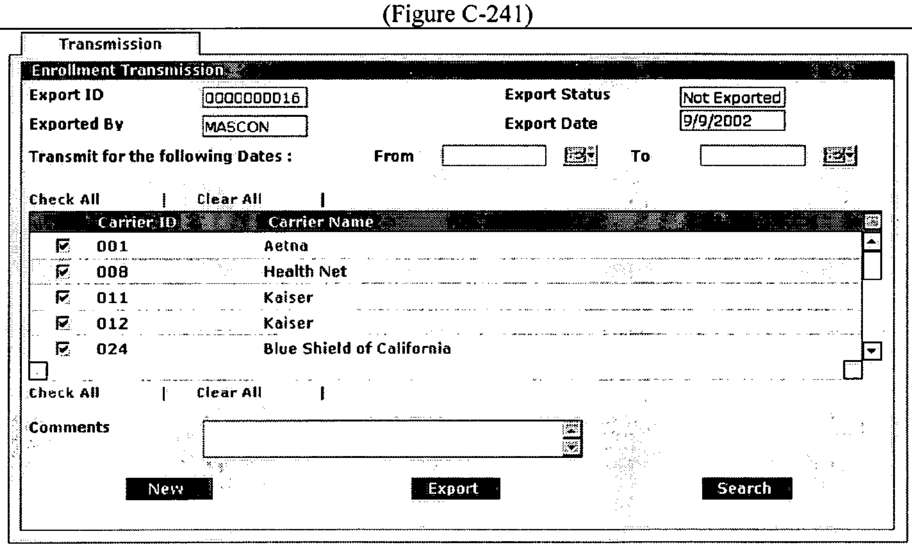
(Figure C-242)

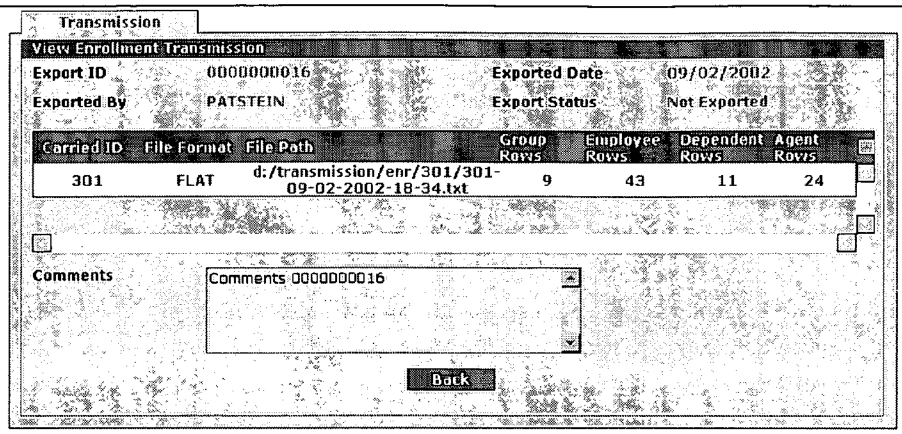
(Figure C-243)
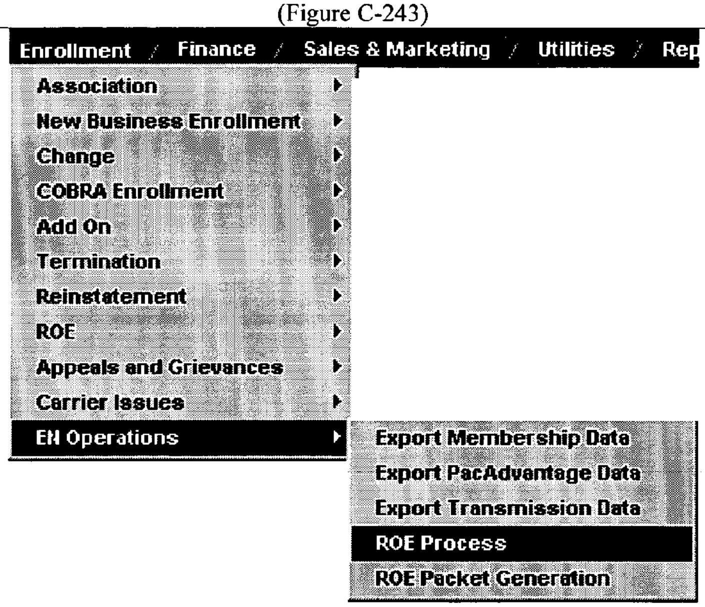
(Figure C-244)
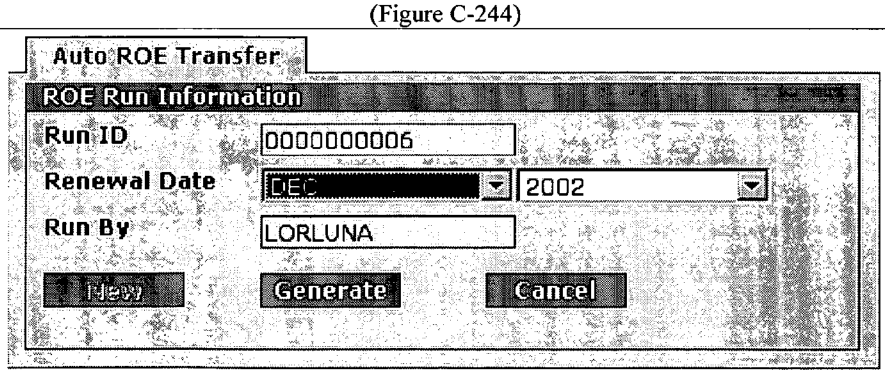
(Figure C-245)

(Figure C-246)
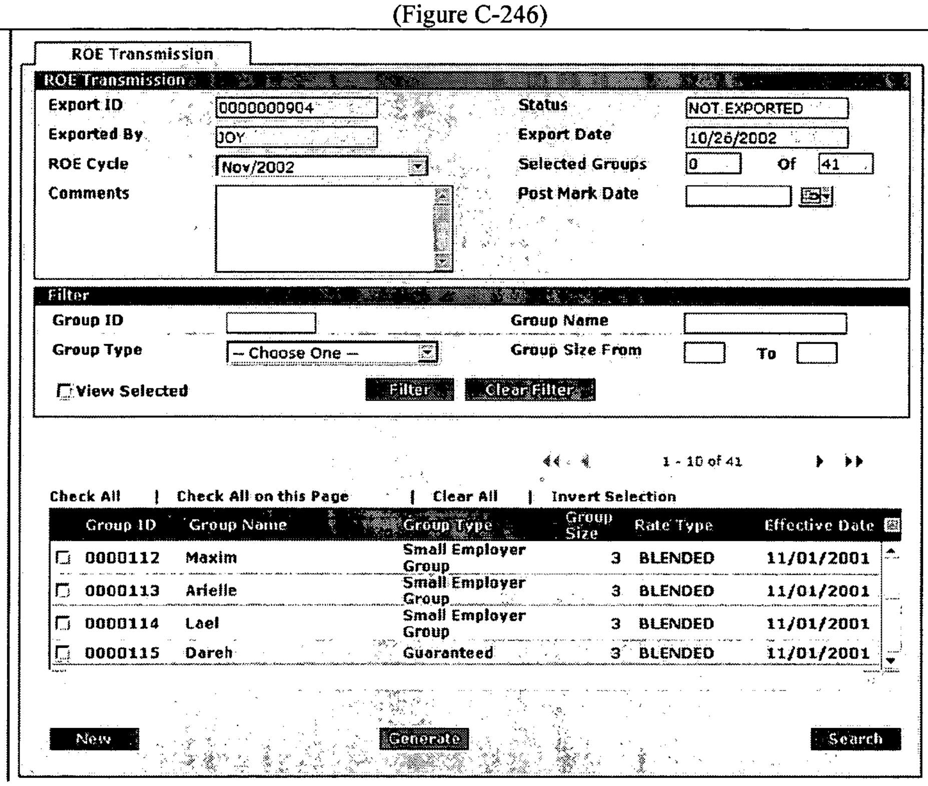
(Figure C-247)

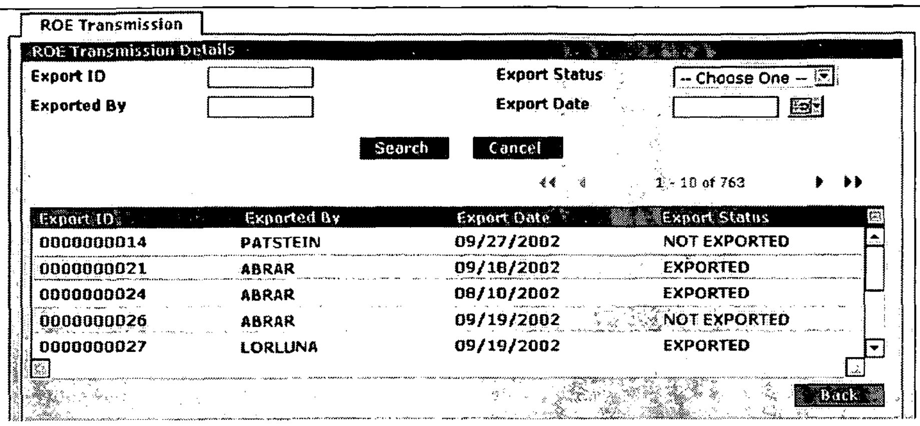
Figure C-248
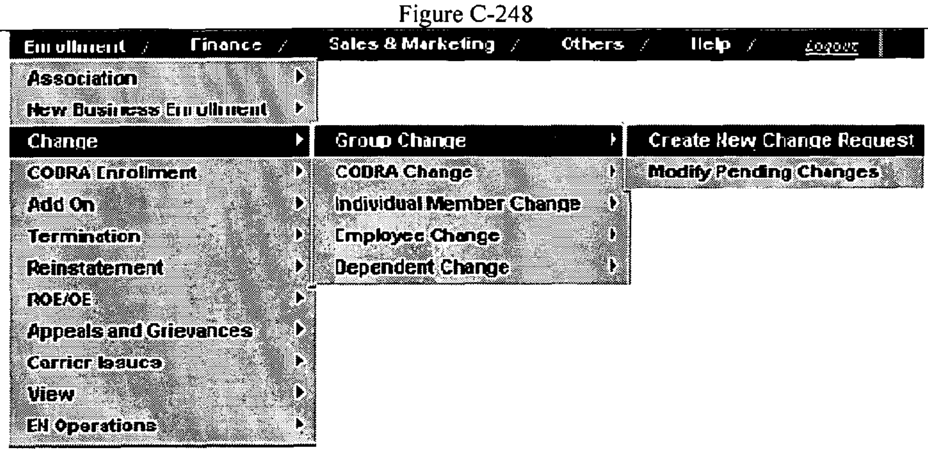
(Figure C-249)
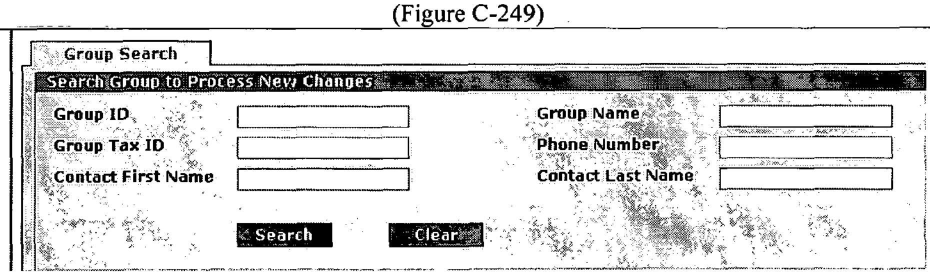
(Figure C-250)

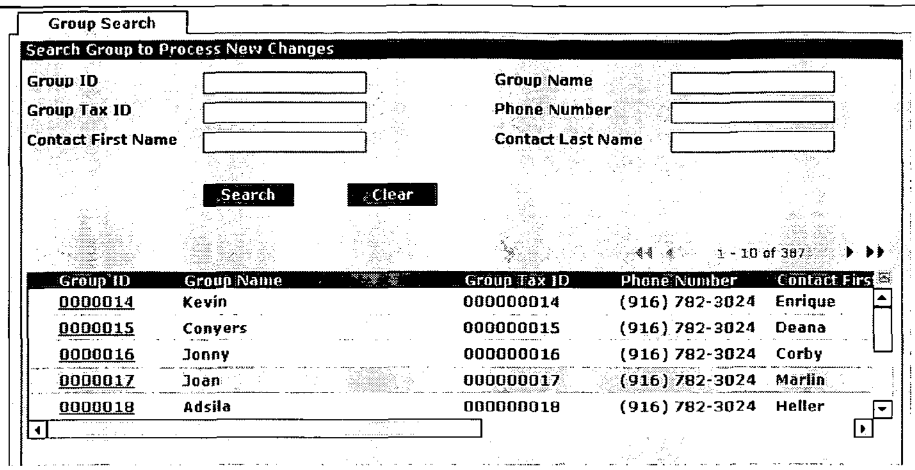
(Figure C-251)
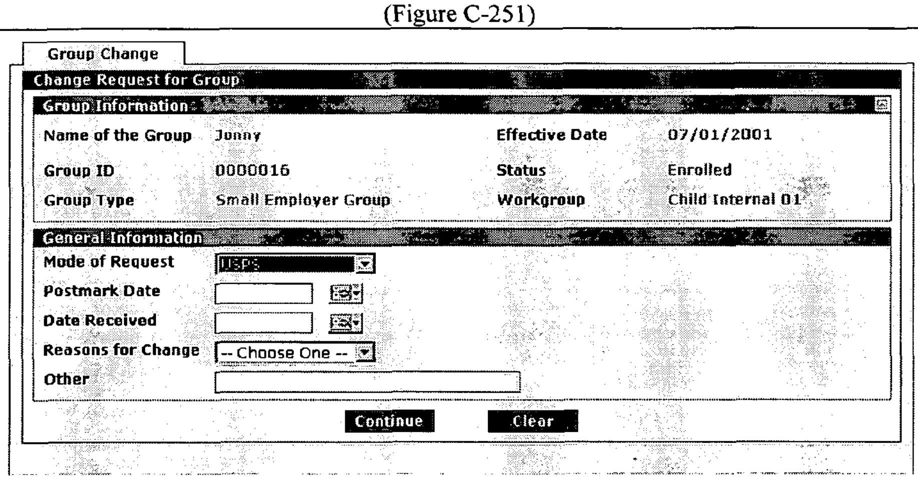
(Figure C-252)

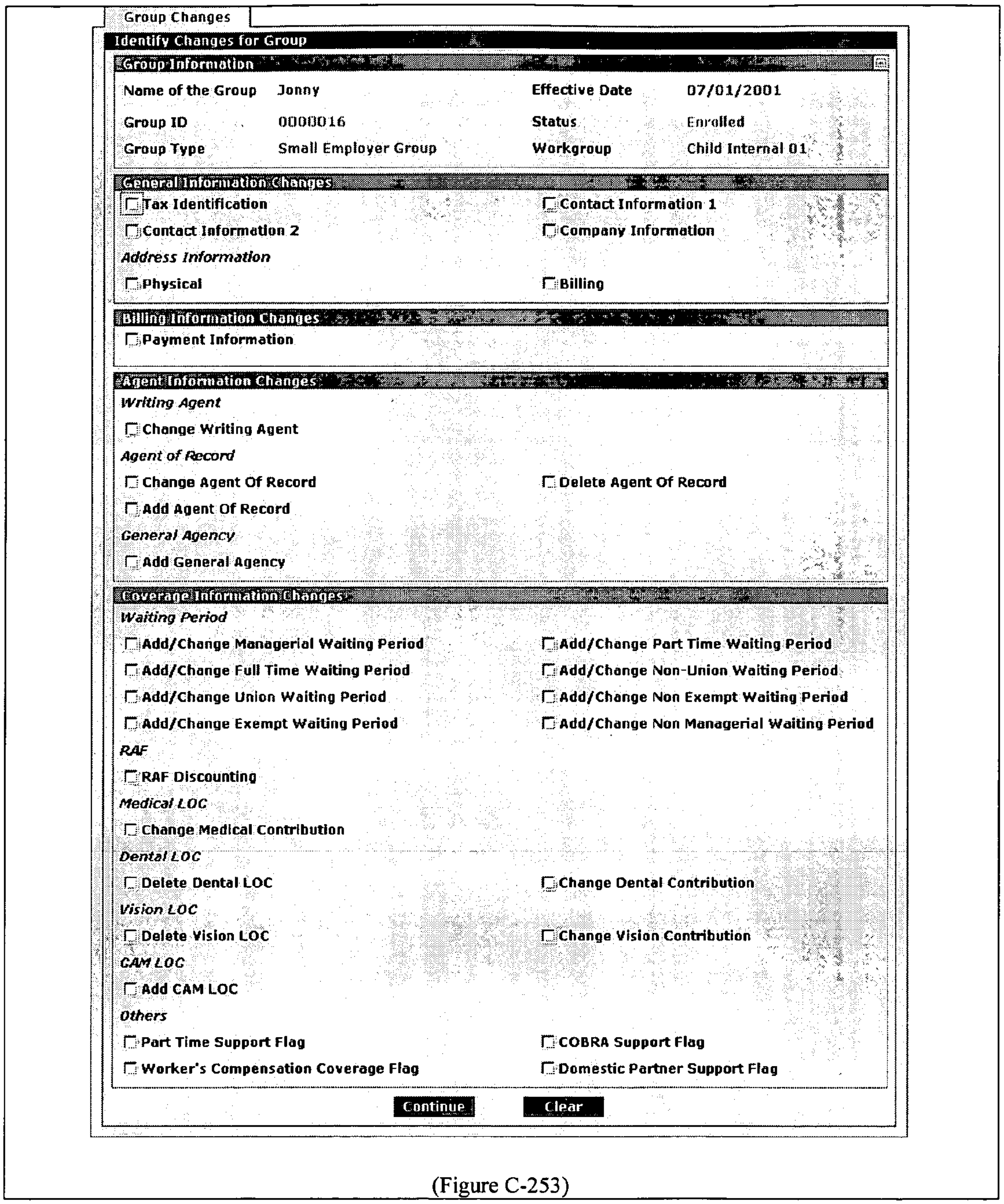
(Figure C-253)

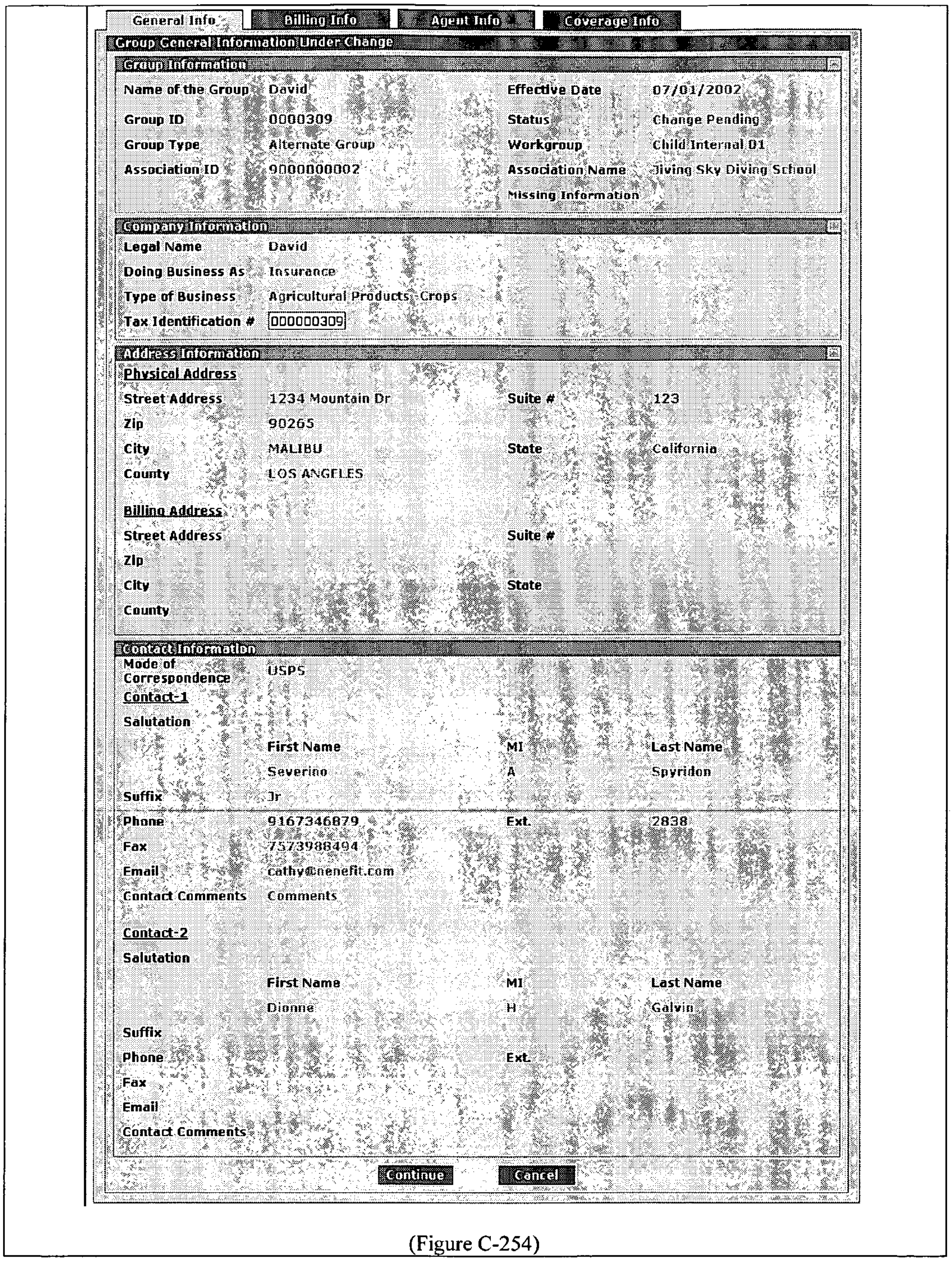

General Info | Billing Info | Agent Info | Coverage Info

Group General Information Under Change

Group Information

| | | | |
|---|---|---|---|
| Name of the Group | David | Effective Date | 07/01/2002 |
| Group ID | 0000309 | Status | Change Pending |
| Group Type | Alternate Group | Workgroup | Child Internal 01 |
| Association ID | 9000000002 | Association Name | Diving Sky Diving School |
| | | Missing Information | |

Company Information

| | |
|---|---|
| Legal Name | David |
| Doing Business As | Insurance |
| Type of Business | Agricultural Products, Crops |
| Tax Identification # | 000000309 |

Address Information

Physical Address

| | | | |
|---|---|---|---|
| Street Address | 1234 Mountain Dr | Suite # | 123 |
| Zip | 90265 | | |
| City | MALIBU | State | California |
| County | LOS ANGELES | | |

Billing Address

| | | | |
|---|---|---|---|
| Street Address | | Suite # | |
| Zip | | | |
| City | | State | |
| County | | | |

Contact Information

Mode of Correspondence: USPS

Contact-1

| | | | |
|---|---|---|---|
| Salutation | | | |
| | First Name | MI | Last Name |
| | Severino | A | Spyridon |
| Suffix | Jr | | |
| Phone | 9167346879 | Ext. | 2838 |
| Fax | 7573988494 | | |
| Email | cathy@nenefit.com | | |
| Contact Comments | Comments | | |

Contact-2

| | | | |
|---|---|---|---|
| Salutation | | | |
| | First Name | MI | Last Name |
| | Dionne | H | Galvin |
| Suffix | | | |
| Phone | | Ext. | |
| Fax | | | |
| Email | | | |
| Contact Comments | | | |

Continue | Cancel (Figure C-254)

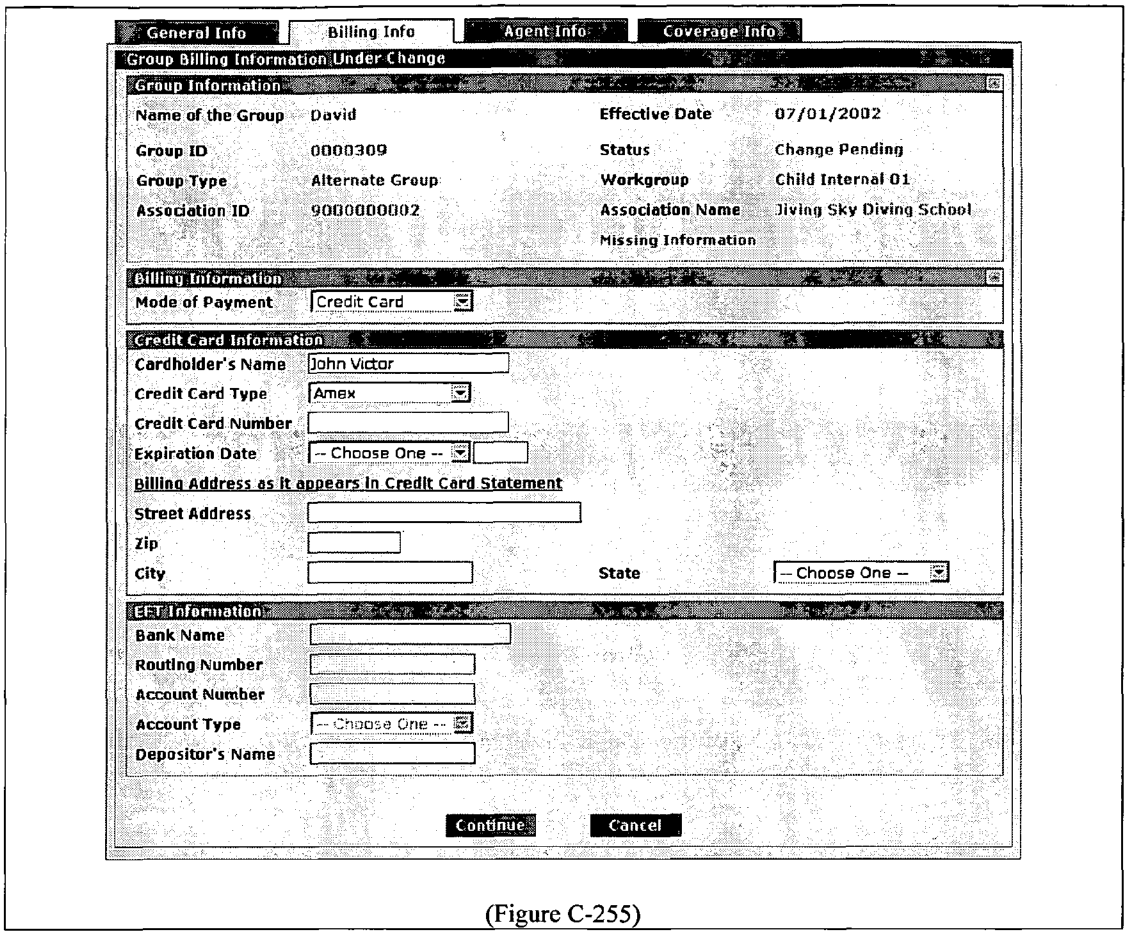
(Figure C-255)

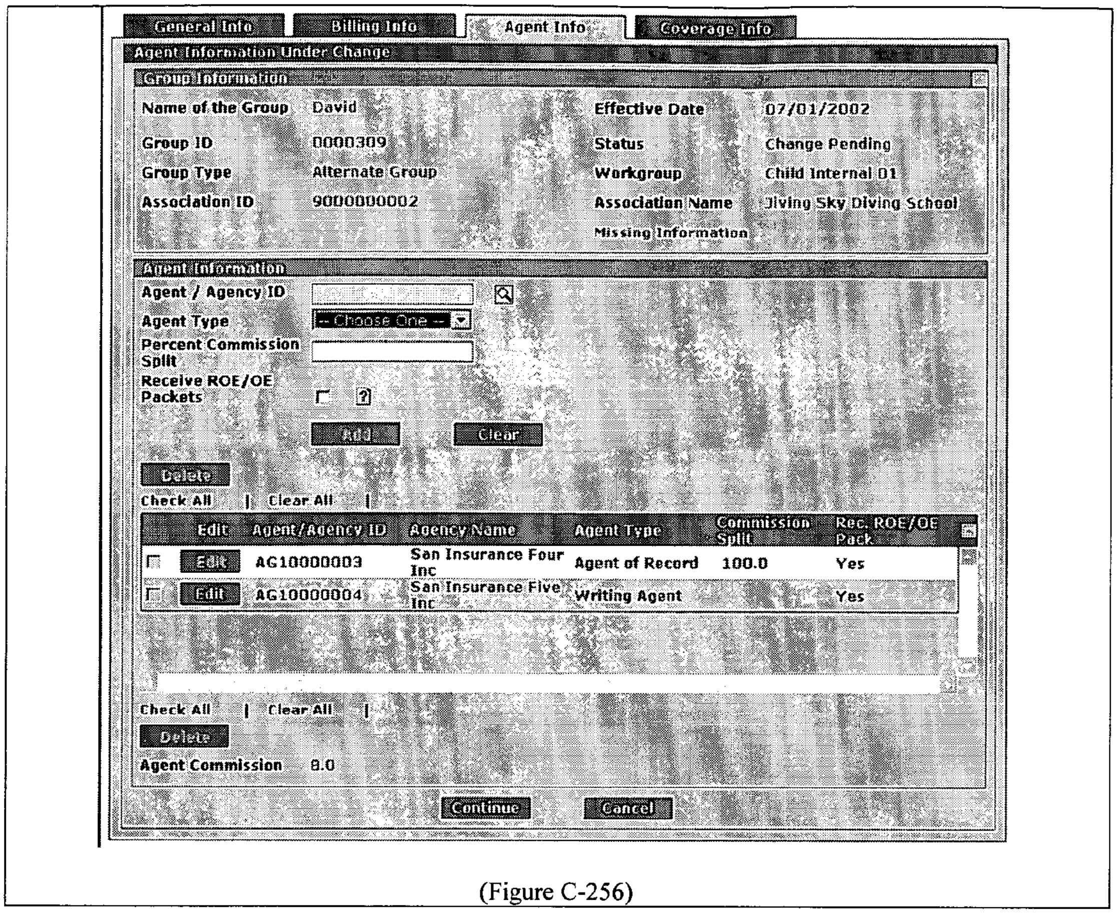
(Figure C-256)

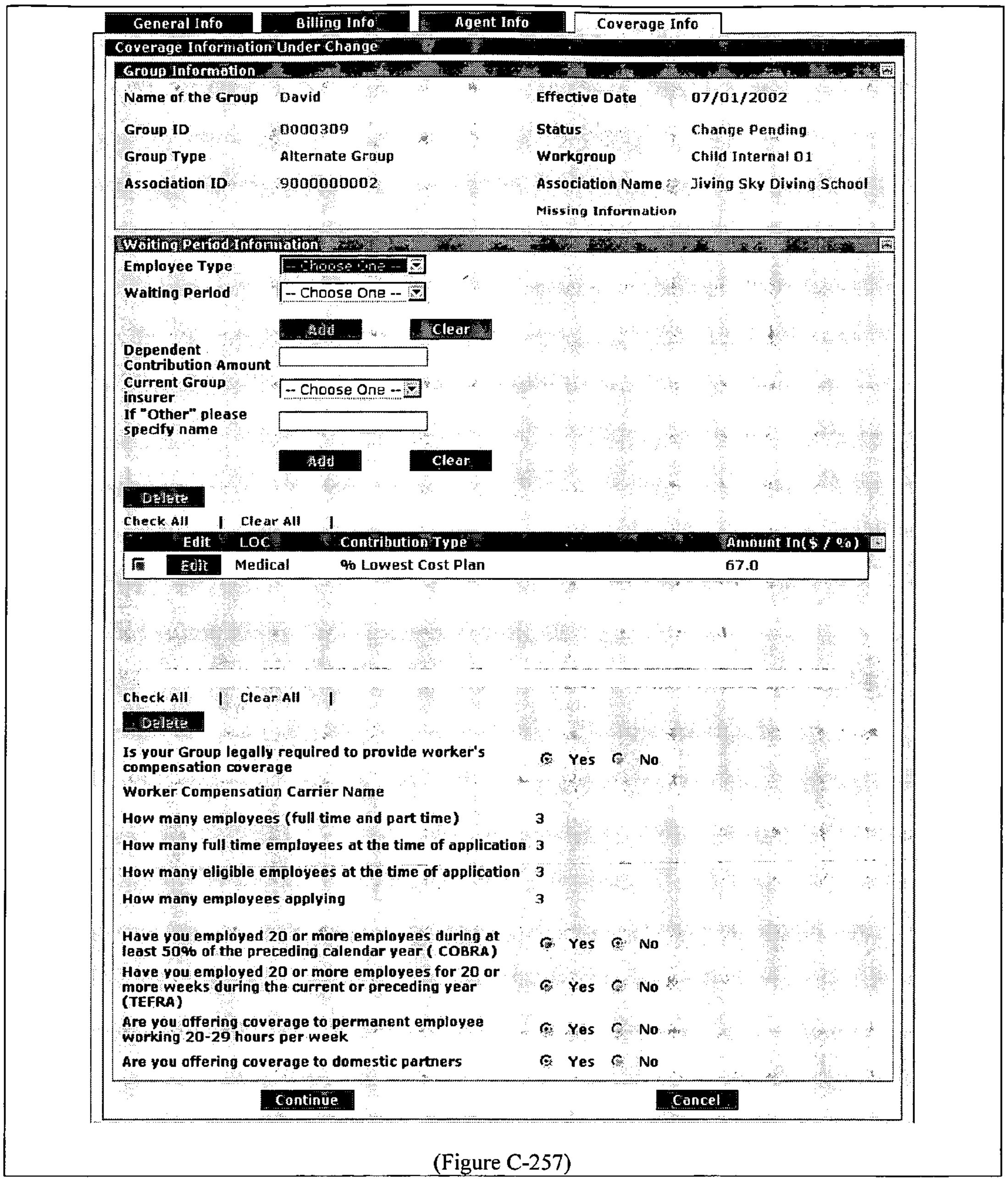
(Figure C-257)

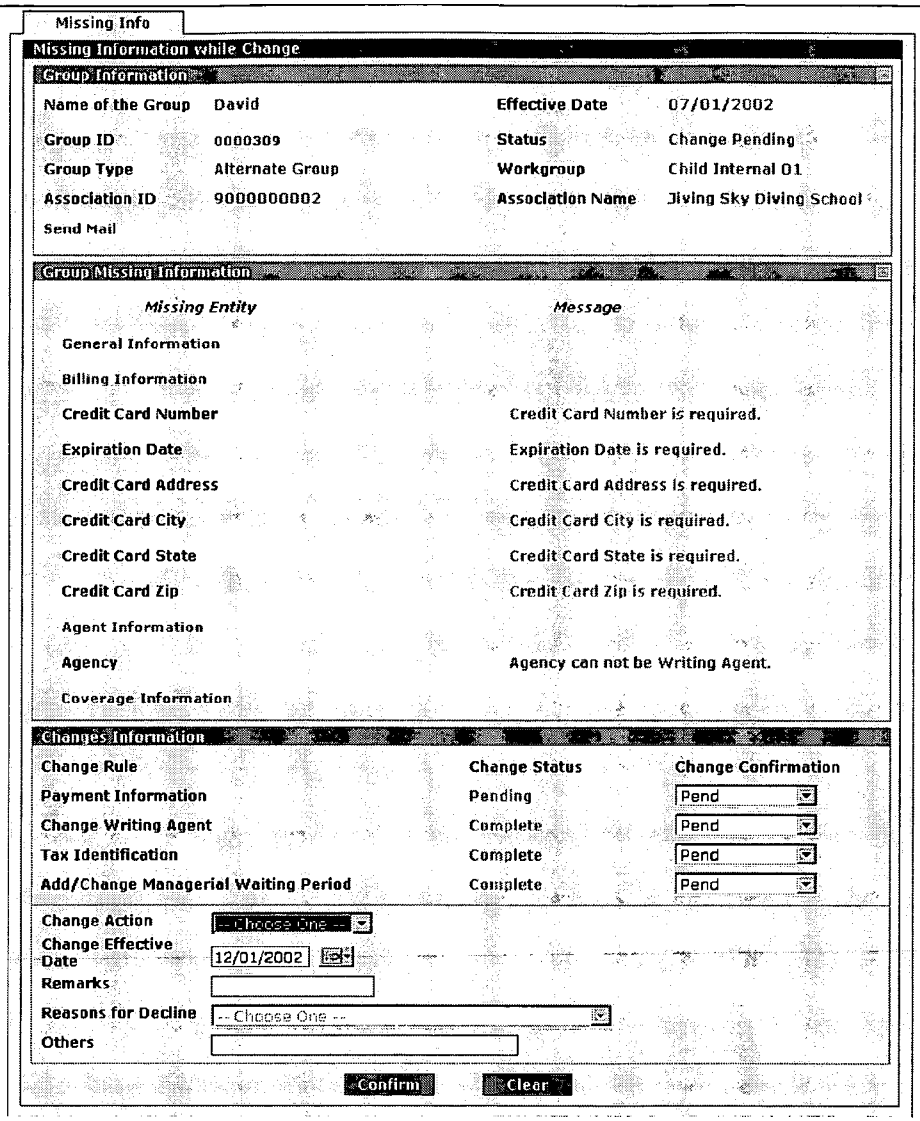
(Figure C-258)
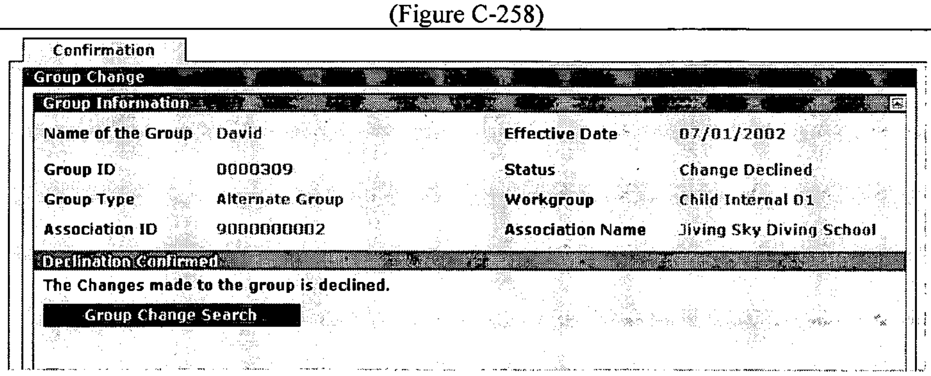
(Figure C-259)

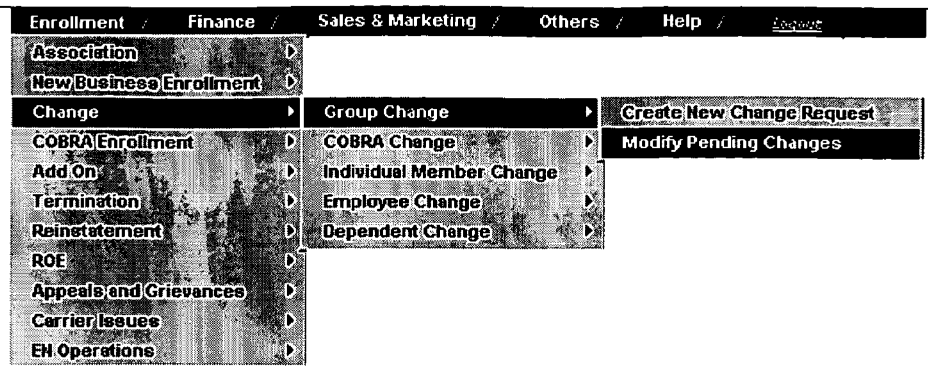
(Figure C-260)
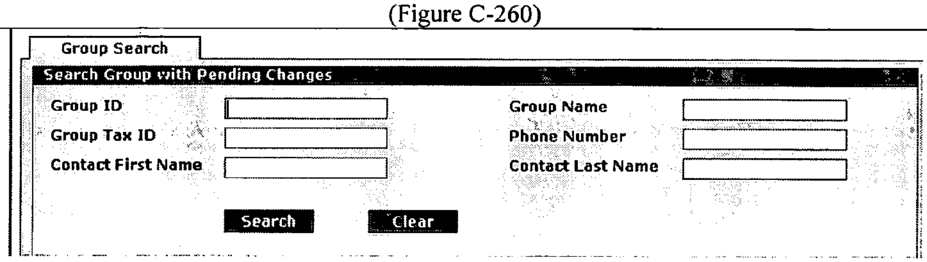
(Figure C-261)
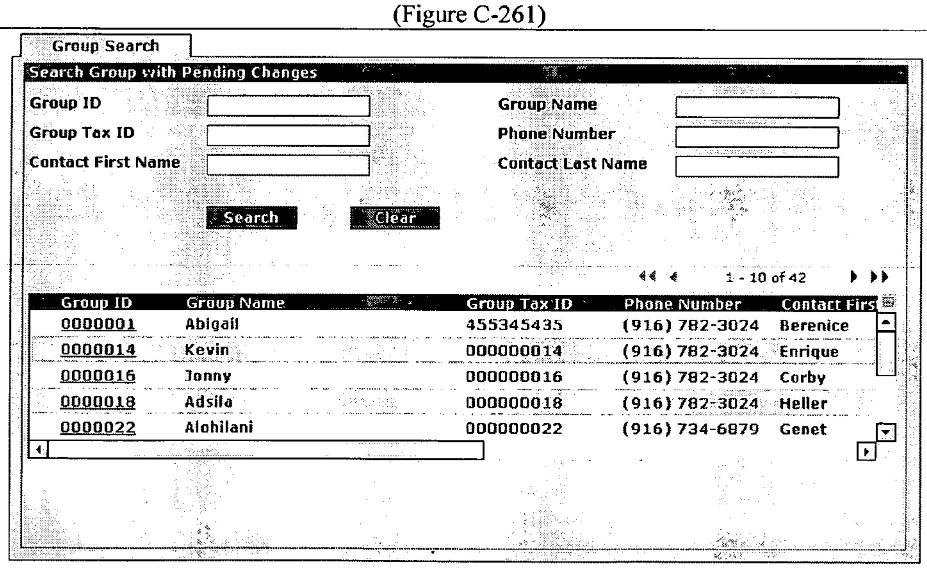
(Figure C-262)

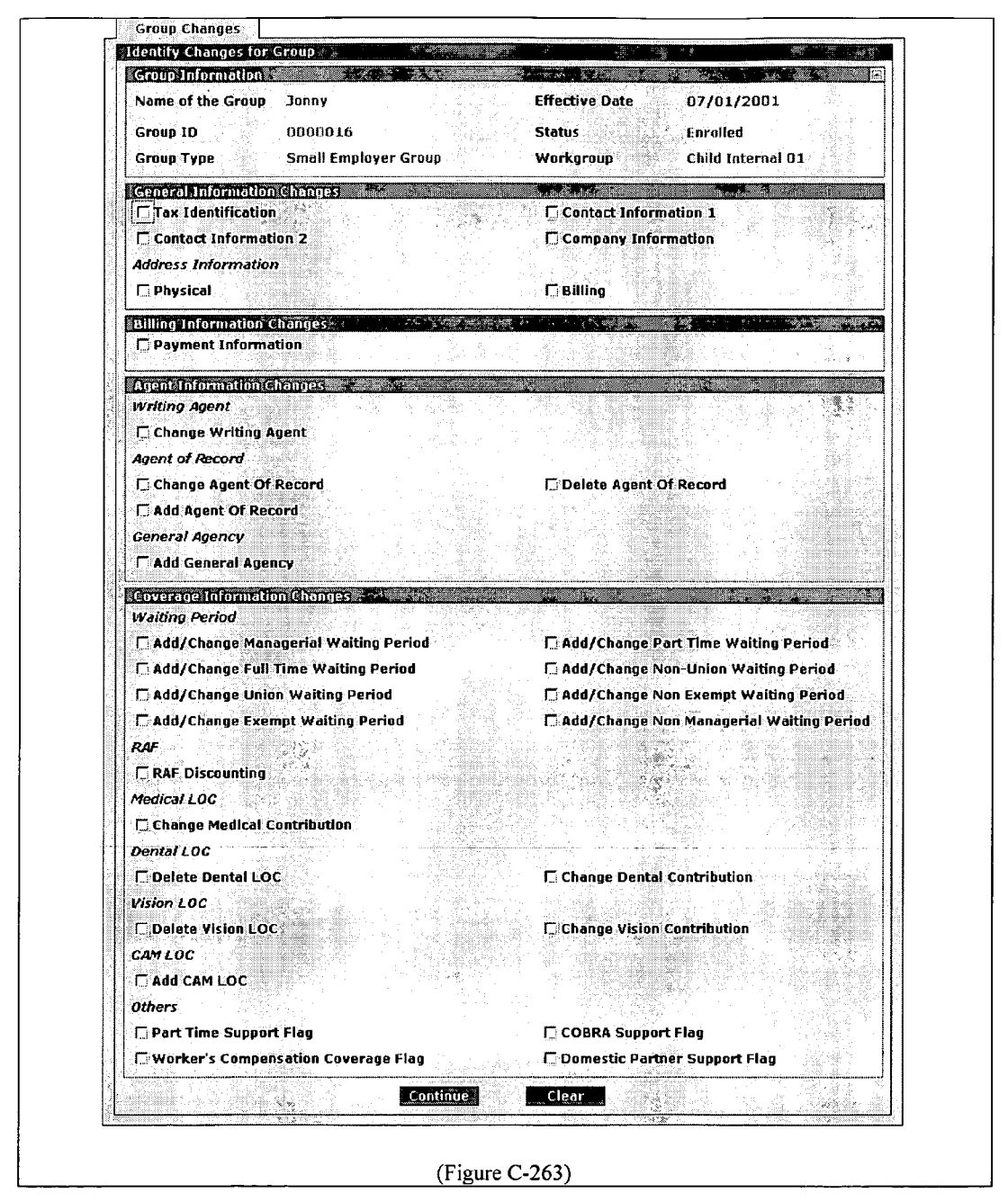

Group Changes

Identify Changes for Group

Group Information

| | | | |
|---|---|---|---|
| Name of the Group | Jonny | Effective Date | 07/01/2001 |
| Group ID | 0000016 | Status | Enrolled |
| Group Type | Small Employer Group | Workgroup | Child Internal 01 |

General Information Changes

- ☐ Tax Identification
- ☐ Contact Information 1
- ☐ Contact Information 2
- ☐ Company Information

*Address Information*

- ☐ Physical
- ☐ Billing

Billing Information Changes

- ☐ Payment Information

Agent Information Changes

*Writing Agent*

- ☐ Change Writing Agent

*Agent of Record*

- ☐ Change Agent Of Record
- ☐ Delete Agent Of Record
- ☐ Add Agent Of Record

*General Agency*

- ☐ Add General Agency

Coverage Information Changes

*Waiting Period*

- ☐ Add/Change Managerial Waiting Period
- ☐ Add/Change Part Time Waiting Period
- ☐ Add/Change Full Time Waiting Period
- ☐ Add/Change Non-Union Waiting Period
- ☐ Add/Change Union Waiting Period
- ☐ Add/Change Non Exempt Waiting Period
- ☐ Add/Change Exempt Waiting Period
- ☐ Add/Change Non Managerial Waiting Period

*RAF*

- ☐ RAF Discounting

*Medical LOC*

- ☐ Change Medical Contribution

*Dental LOC*

- ☐ Delete Dental LOC
- ☐ Change Dental Contribution

*Vision LOC*

- ☐ Delete Vision LOC
- ☐ Change Vision Contribution

*CAM LOC*

- ☐ Add CAM LOC

*Others*

- ☐ Part Time Support Flag
- ☐ COBRA Support Flag
- ☐ Worker's Compensation Coverage Flag
- ☐ Domestic Partner Support Flag Continue Clear (Figure C-263)

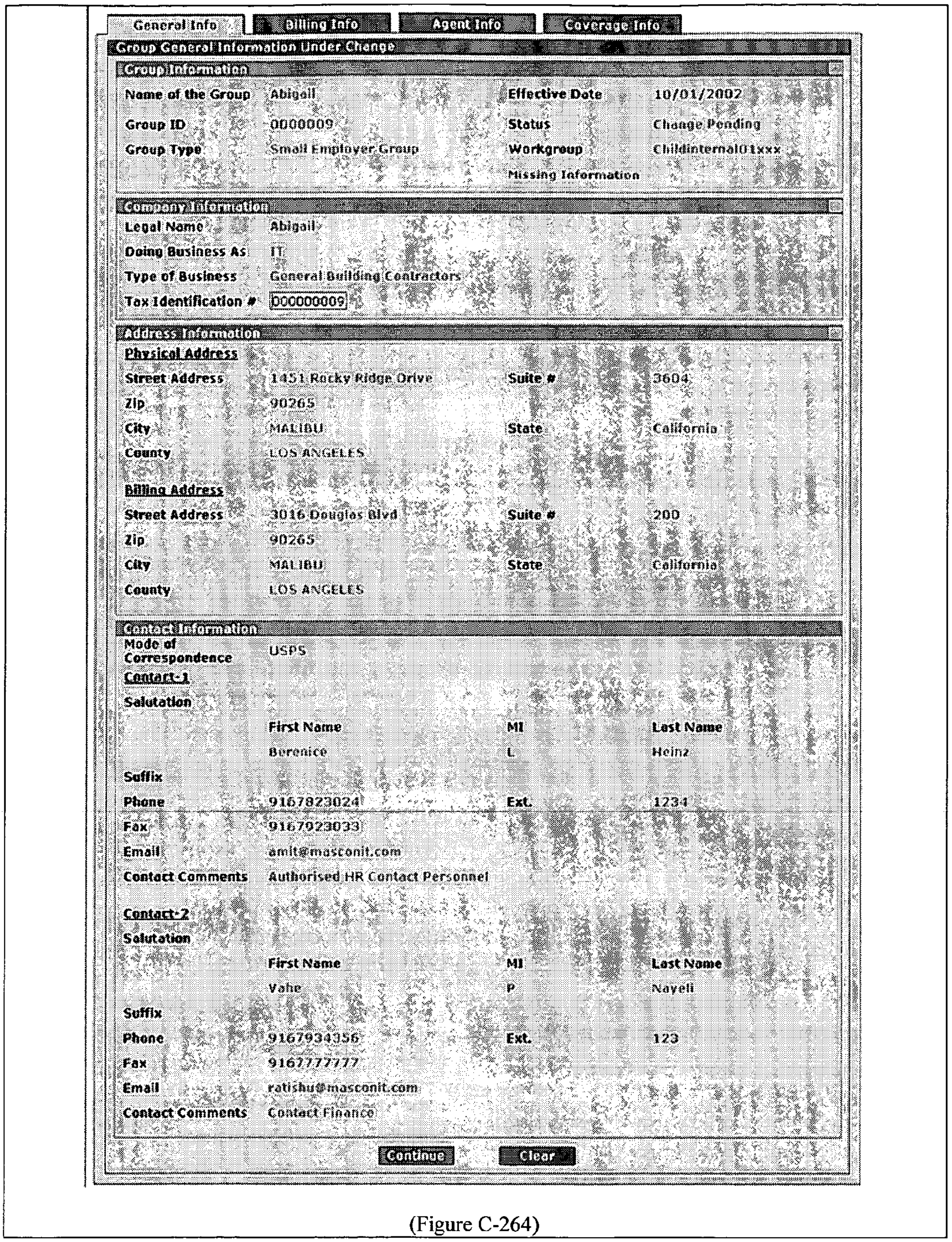
(Figure C-264)

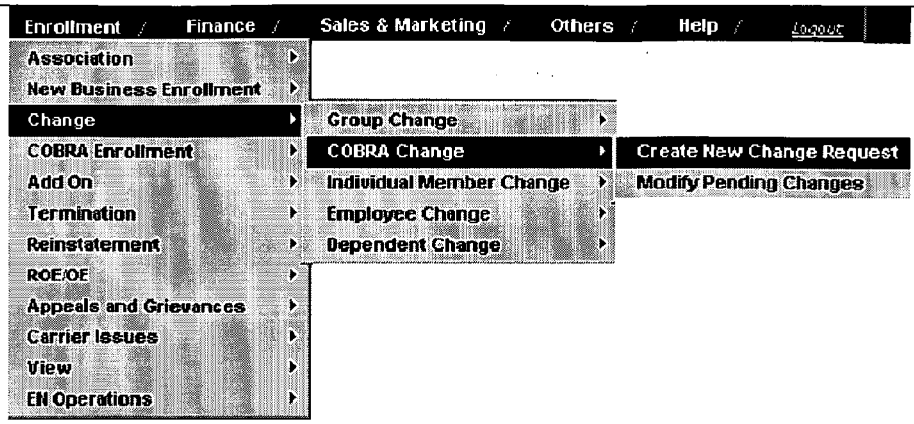
(Figure C-265)
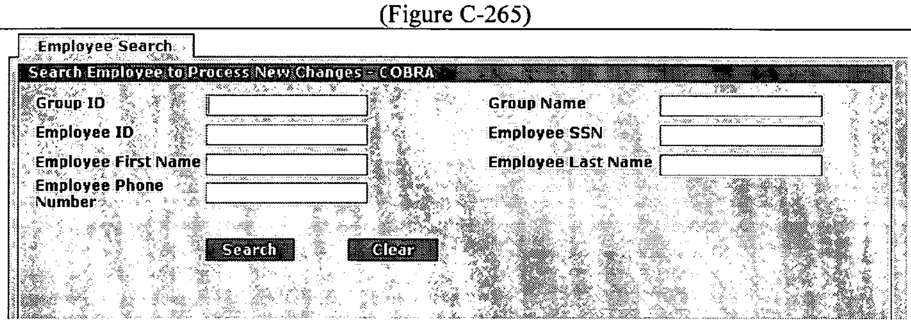
(Figure C-266)
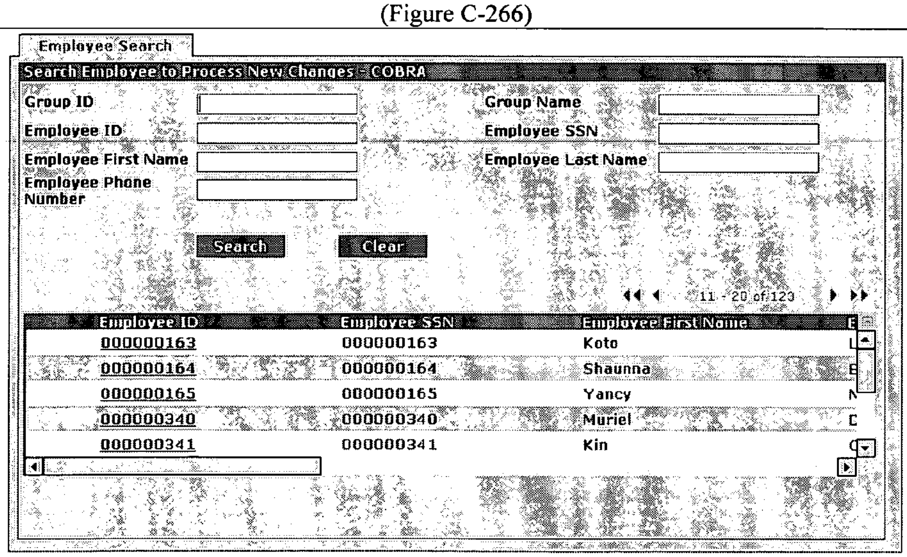
(Figure C-267)

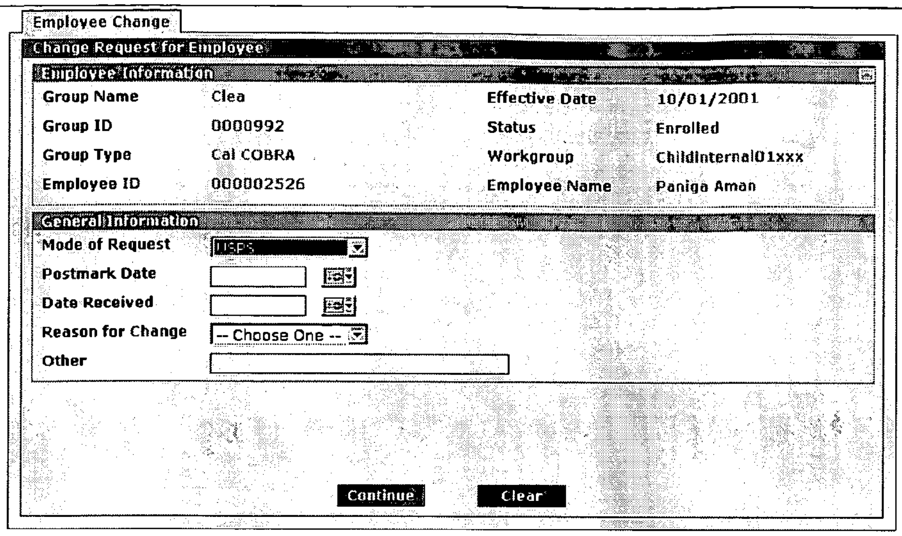
(Figure C-268)
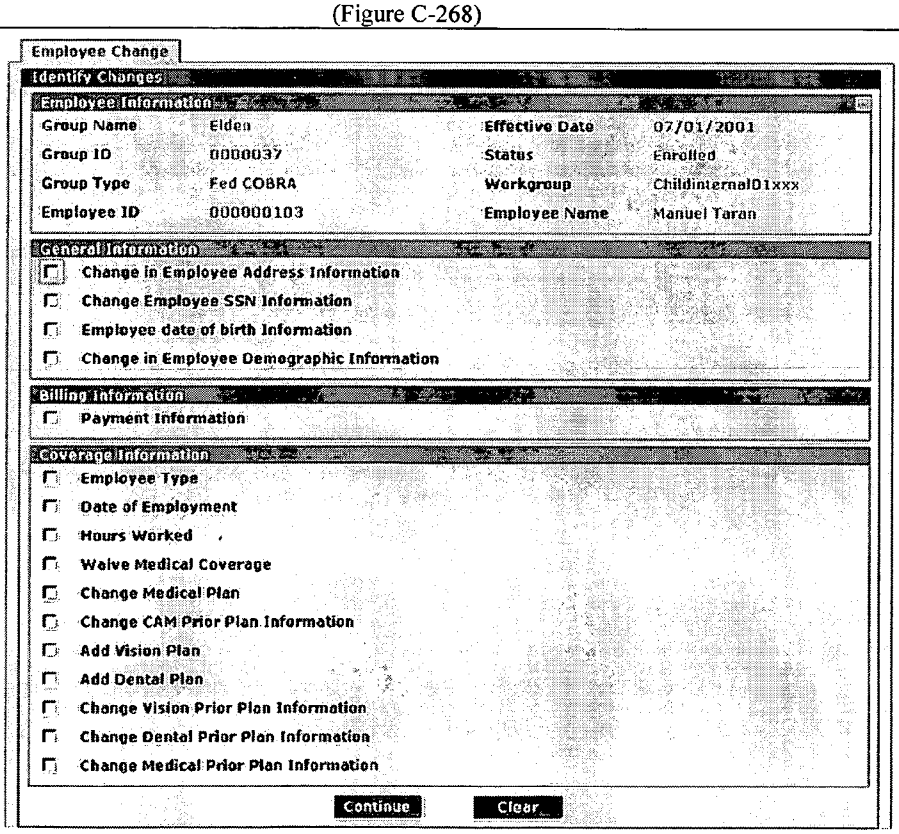
(Figure C-269)

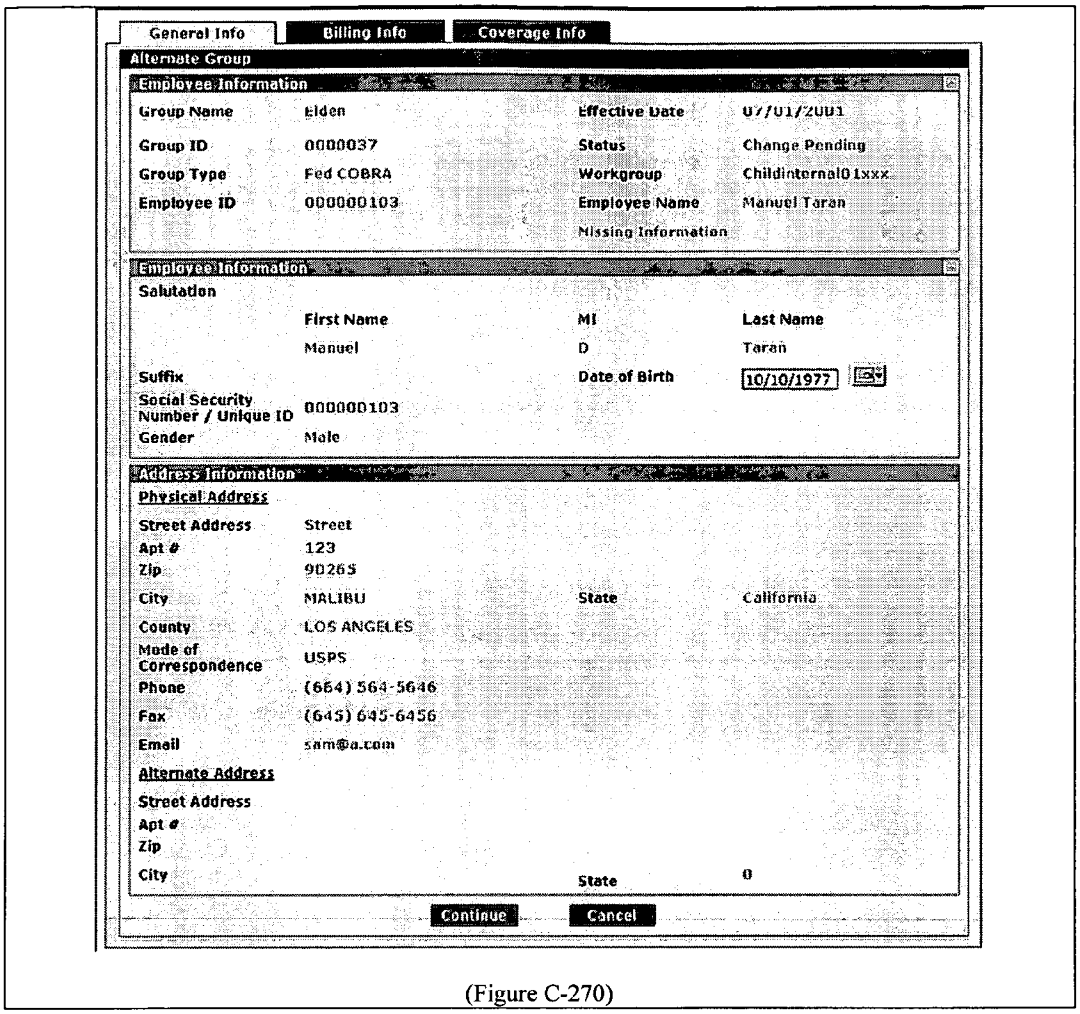

General Info | Billing Info | Coverage Info

Alternate Group

Employee Information

| | | | |
|---|---|---|---|
| Group Name | Elden | Effective Date | 07/01/2001 |
| Group ID | 0000037 | Status | Change Pending |
| Group Type | Fed COBRA | Workgroup | Childinternal01xxx |
| Employee ID | 000000103 | Employee Name | Manuel Taran |
| | | Missing Information | |

Employee Information

| | | | |
|---|---|---|---|
| Salutation | | | |
| | First Name | MI | Last Name |
| | Manuel | D | Taran |
| Suffix | | Date of Birth | 10/10/1977 |
| Social Security Number / Unique ID | 000000103 | | |
| Gender | Male | | |

Address Information

Physical Address

| | | | |
|---|---|---|---|
| Street Address | Street | | |
| Apt # | 123 | | |
| Zip | 90265 | | |
| City | MALIBU | State | California |
| County | LOS ANGELES | | |
| Mode of Correspondence | USPS | | |
| Phone | (664) 564-5646 | | |
| Fax | (645) 645-6456 | | |
| Email | sam@a.com | | |

Alternate Address

| | | | |
|---|---|---|---|
| Street Address | | | |
| Apt # | | | |
| Zip | | | |
| City | | State | 0 |

Continue Cancel (Figure C-270)

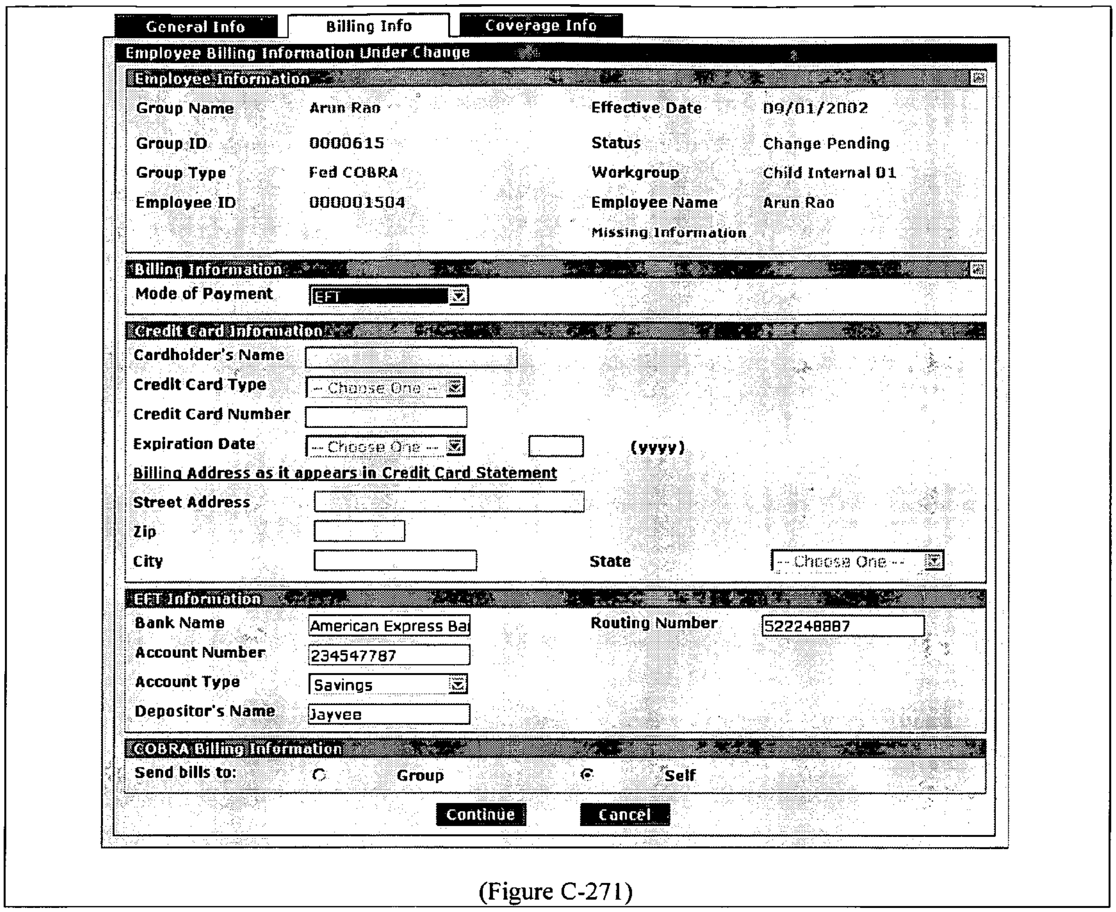
(Figure C-271)

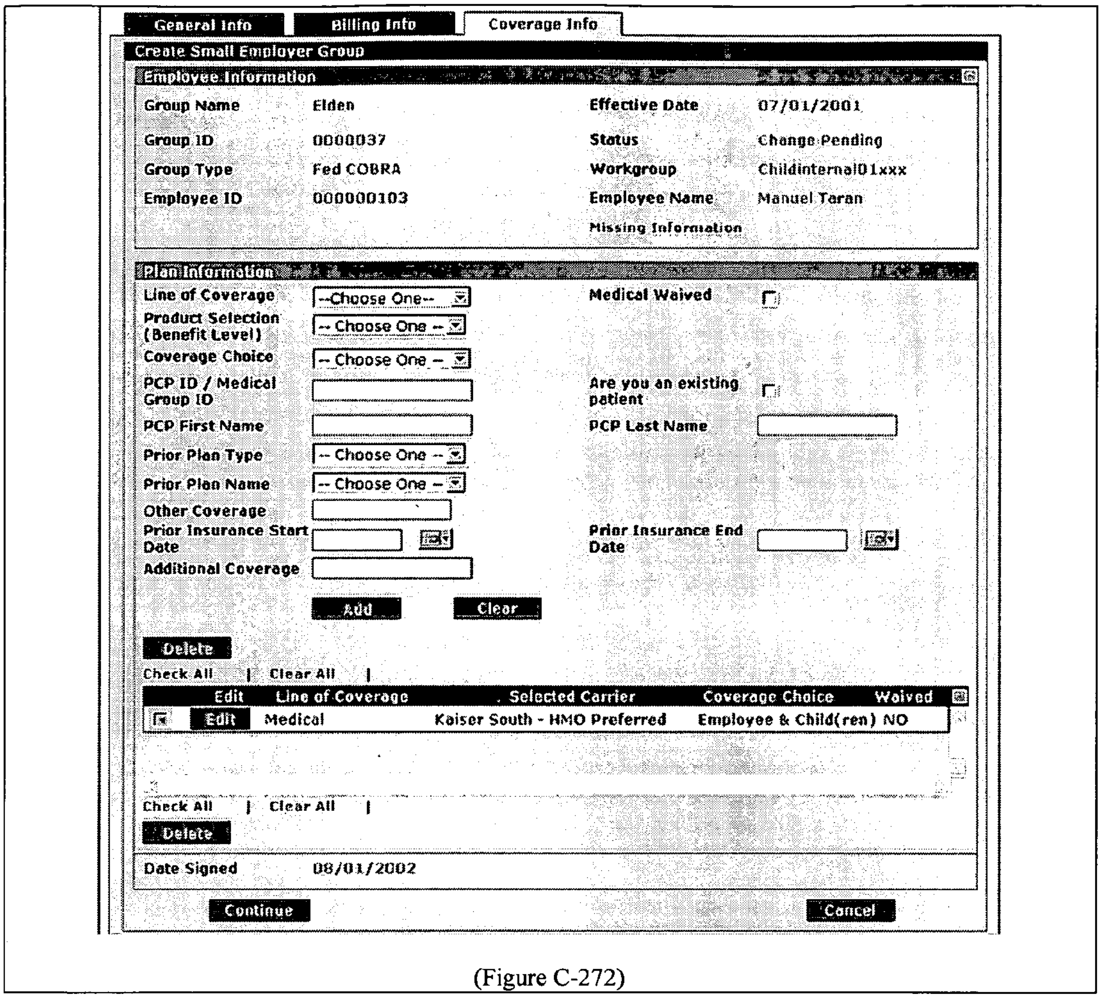
(Figure C-272)

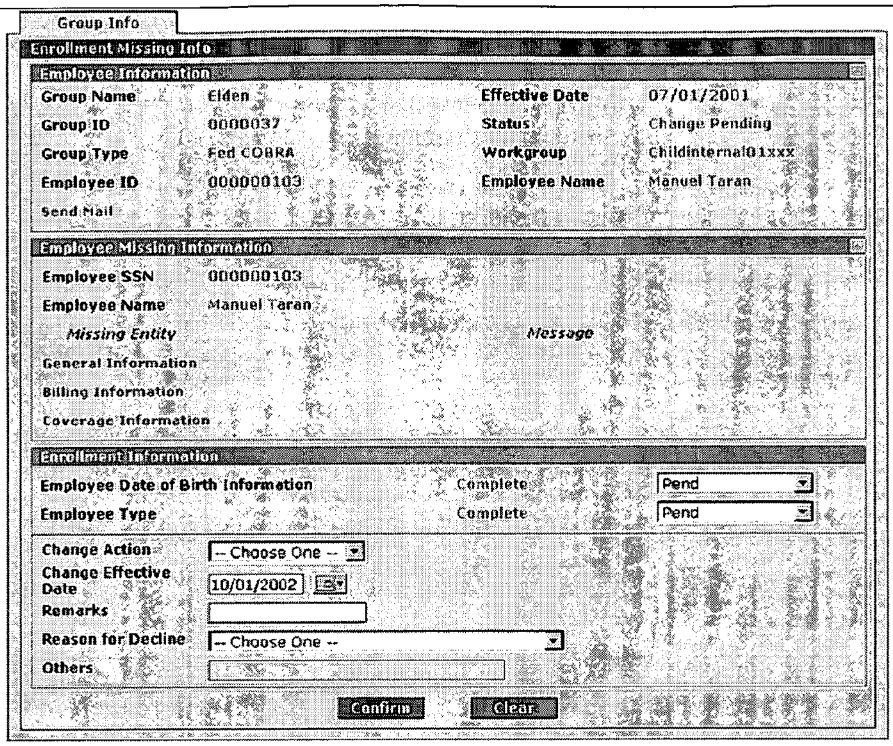
(Figure C-273)
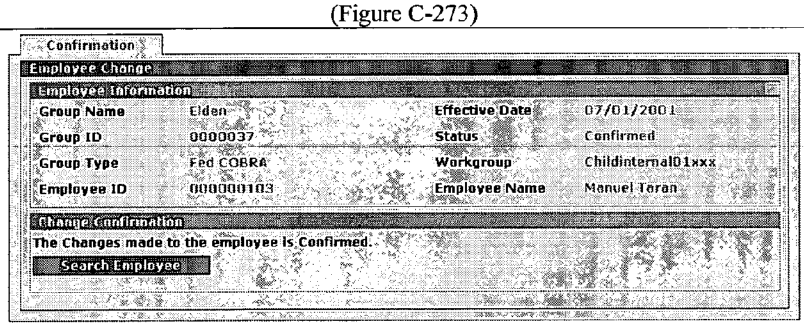
(Figure C-274)
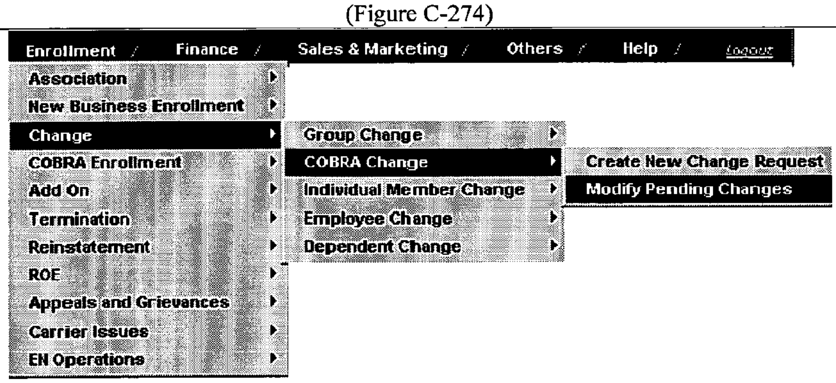
(Figure C-275)

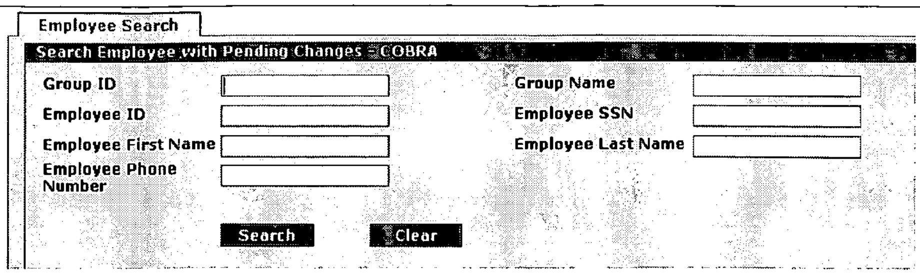
(Figure C-276)
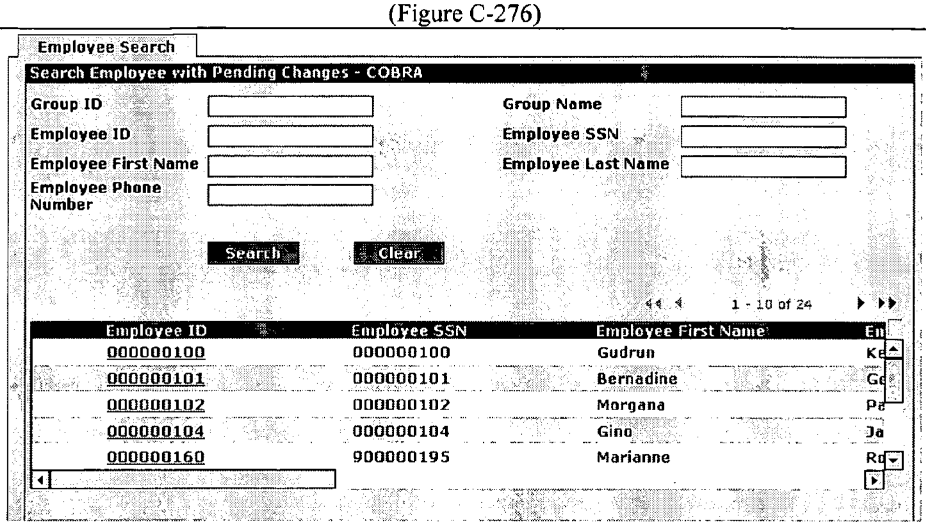
(Figure C-277)

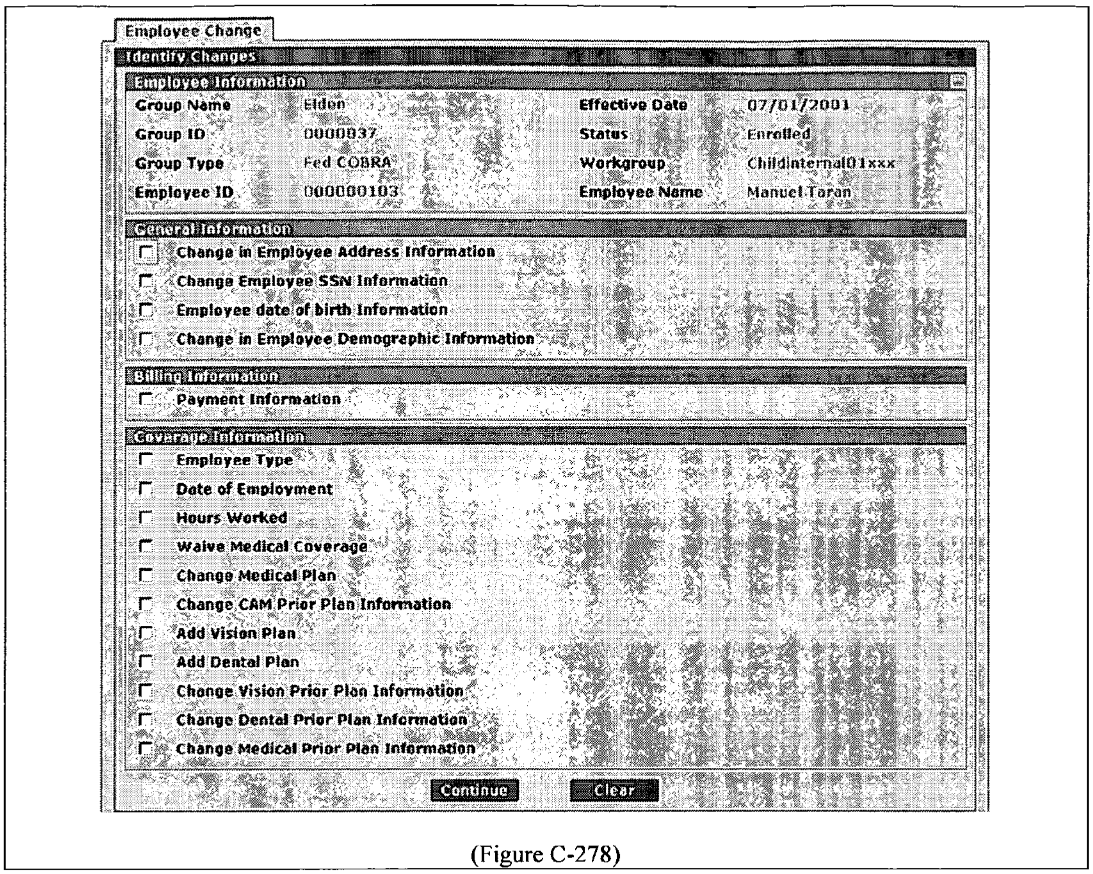
(Figure C-278)

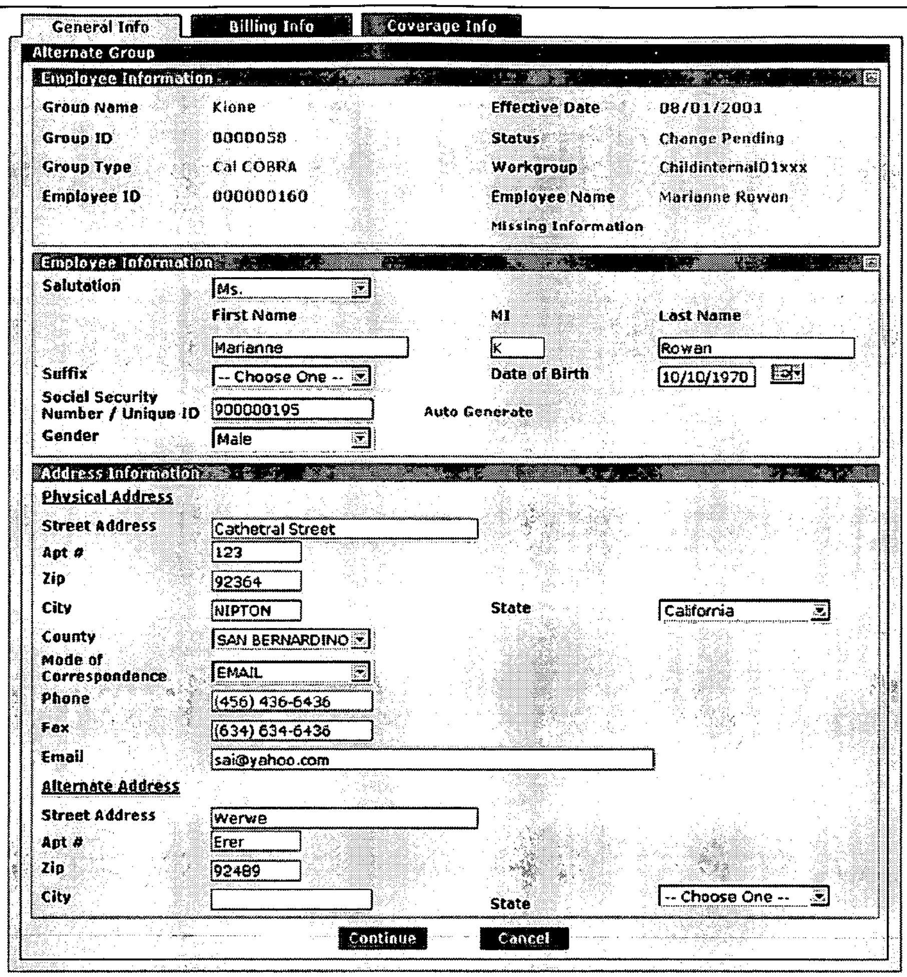
(Figure C-279)
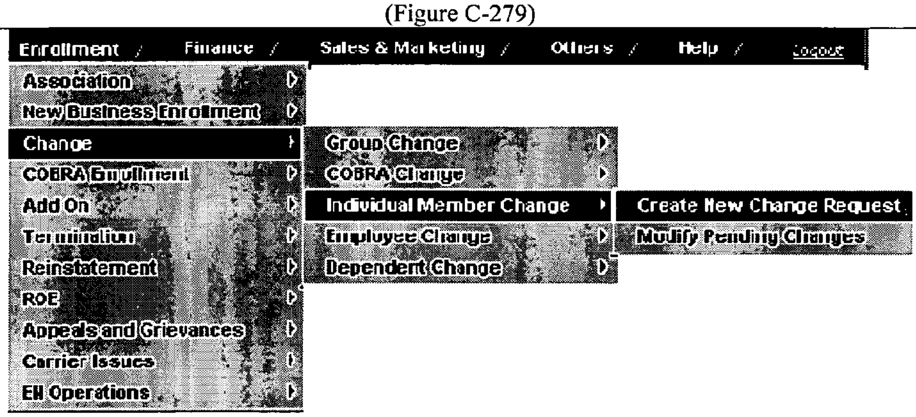
(Figure C-280)

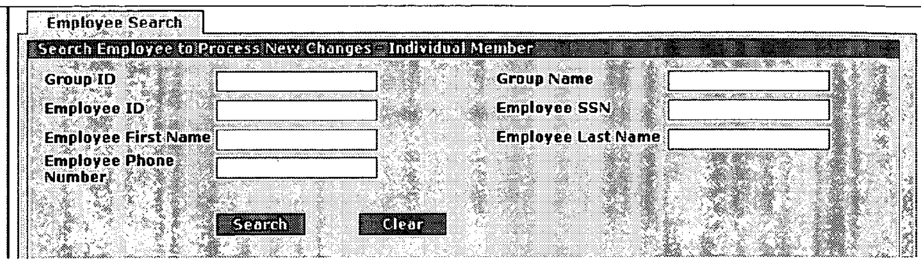
(Figure C-281)
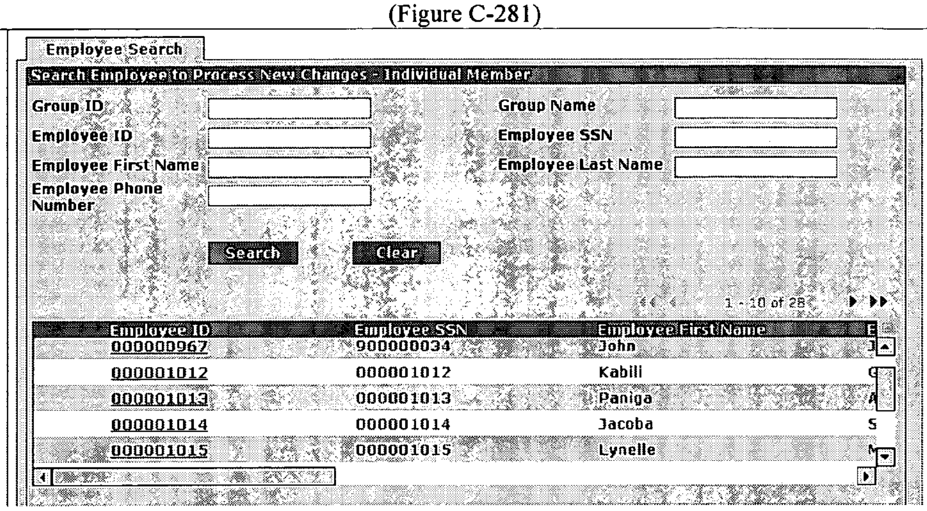
(Figure C-282)
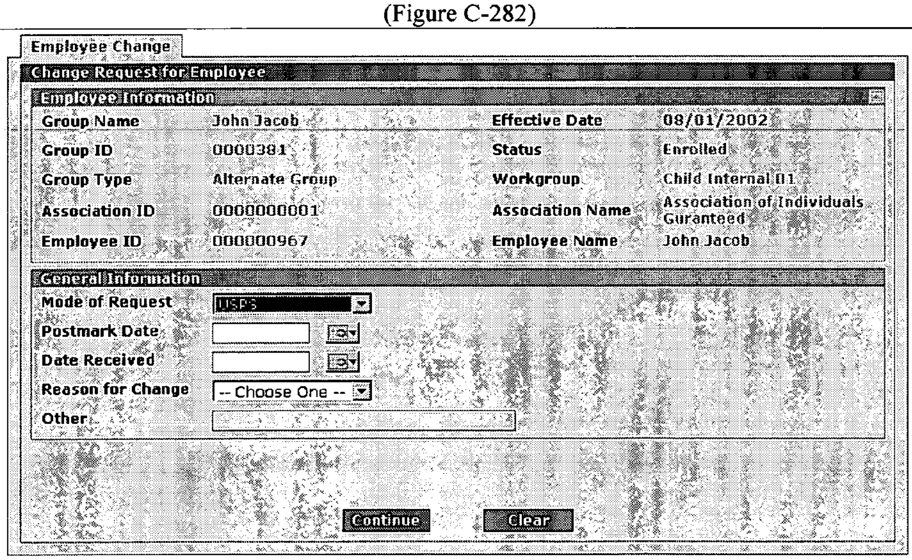
(Figure C-283)

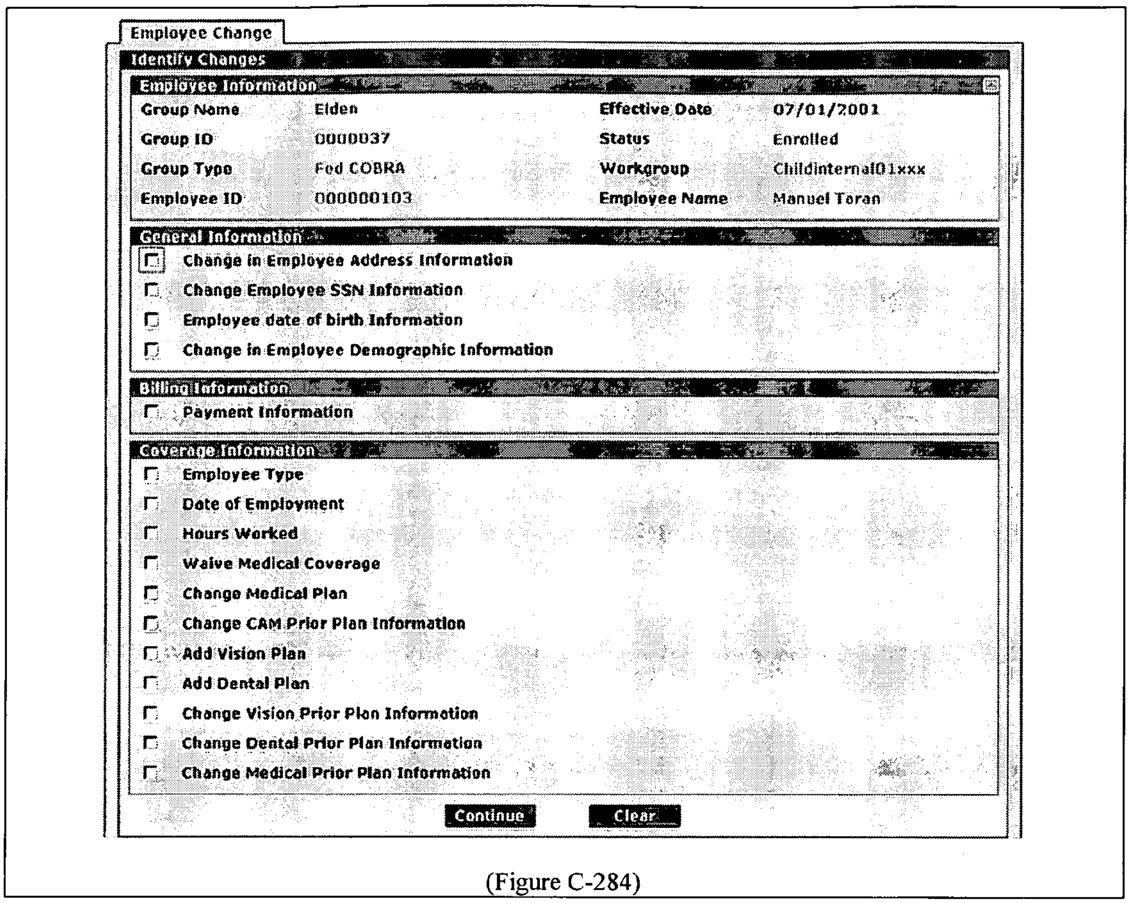
(Figure C-284)

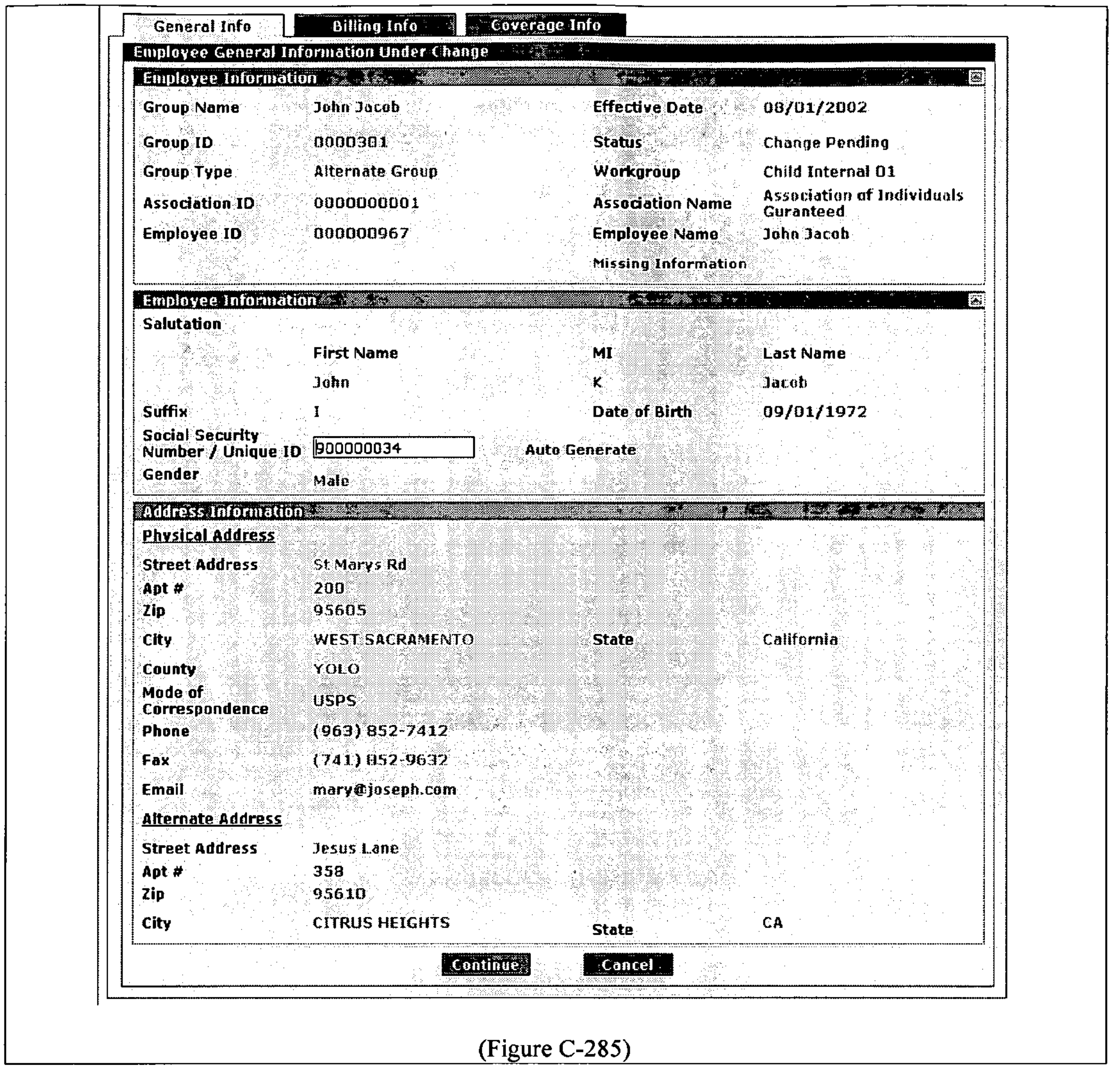
(Figure C-285)

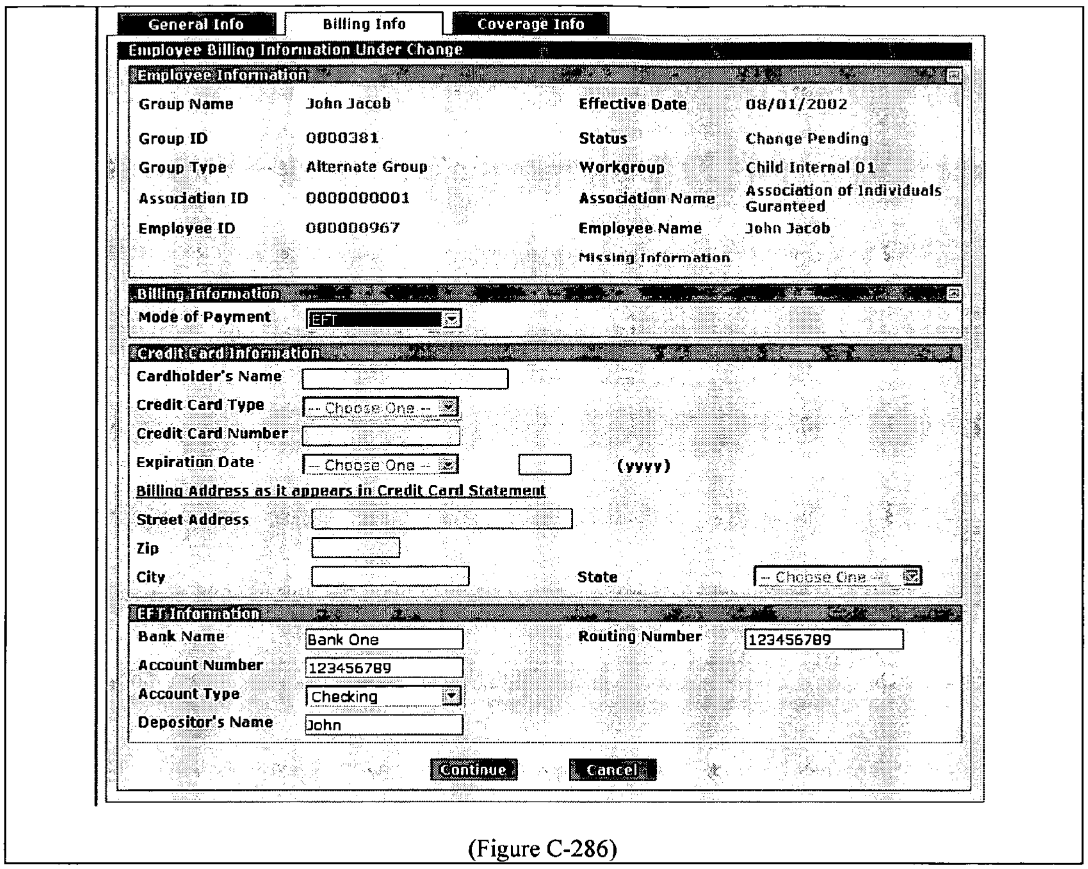
(Figure C-286)

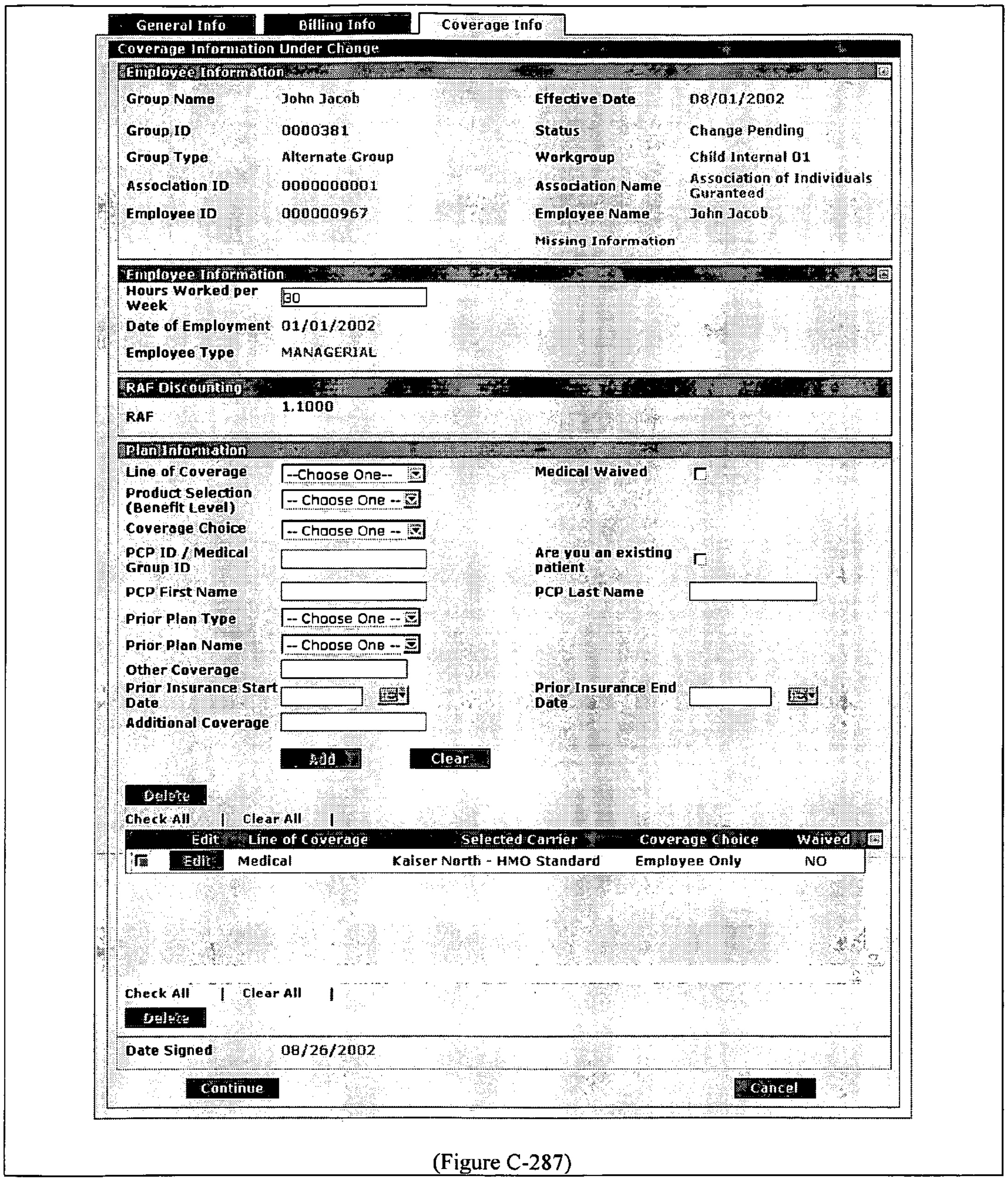
(Figure C-287)

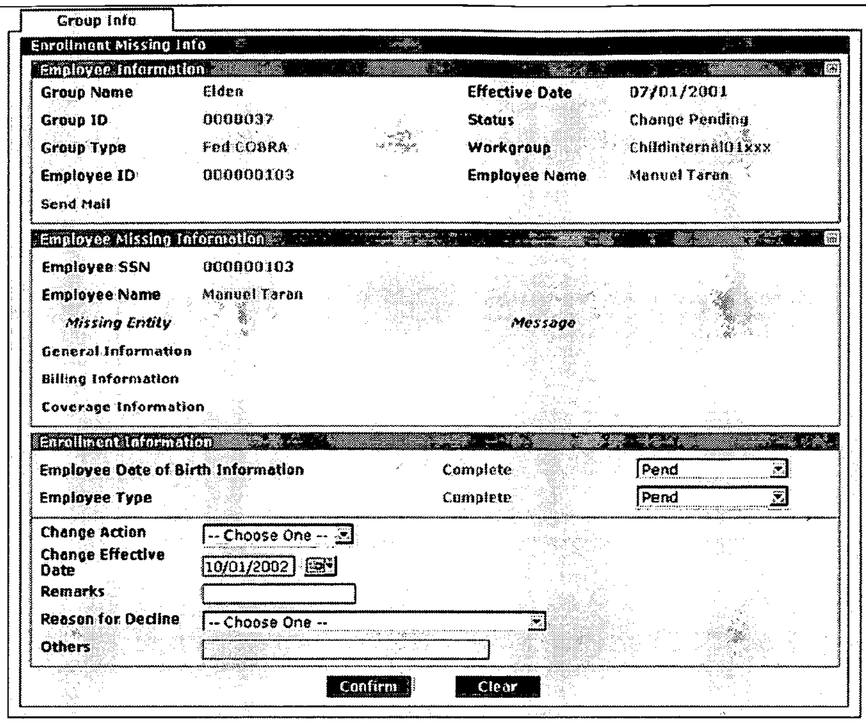
(Figure C-288)
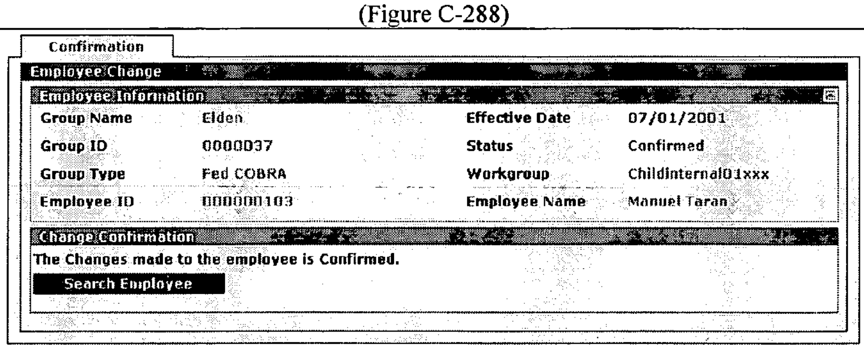
(Figure C-289)
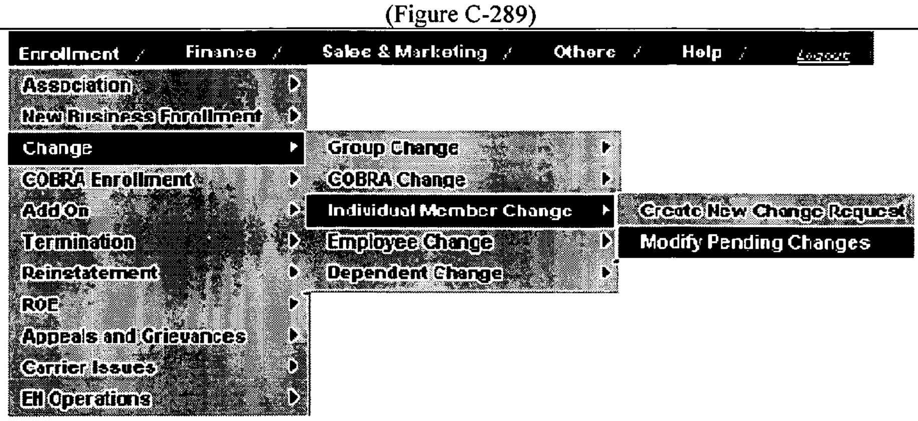
(Figure C-290)

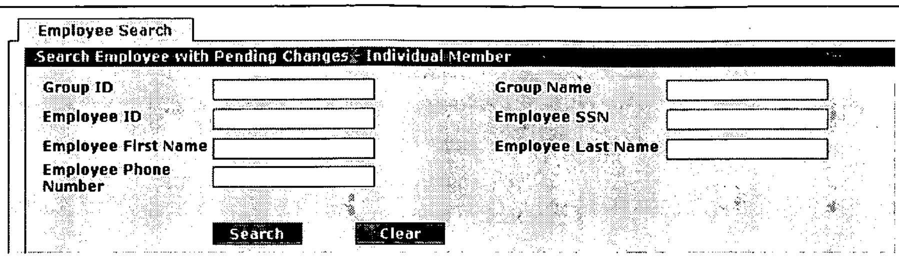
(Figure C-291)
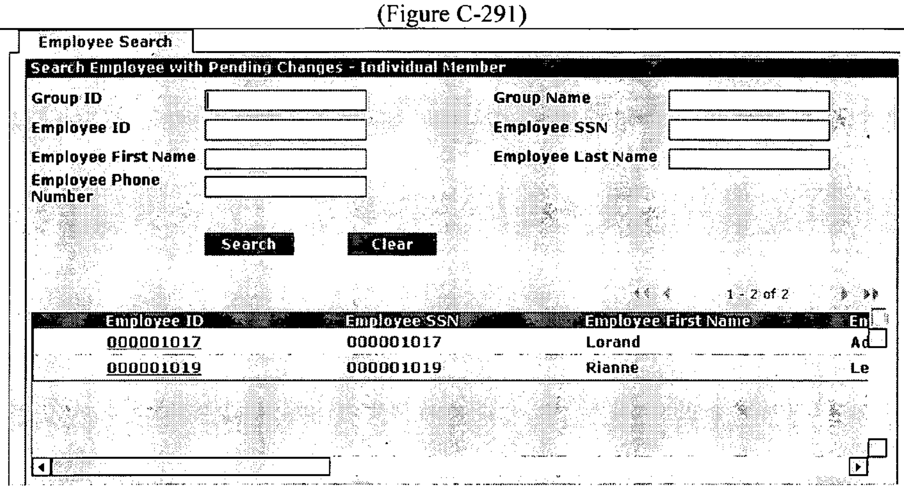
(Figure C-292)

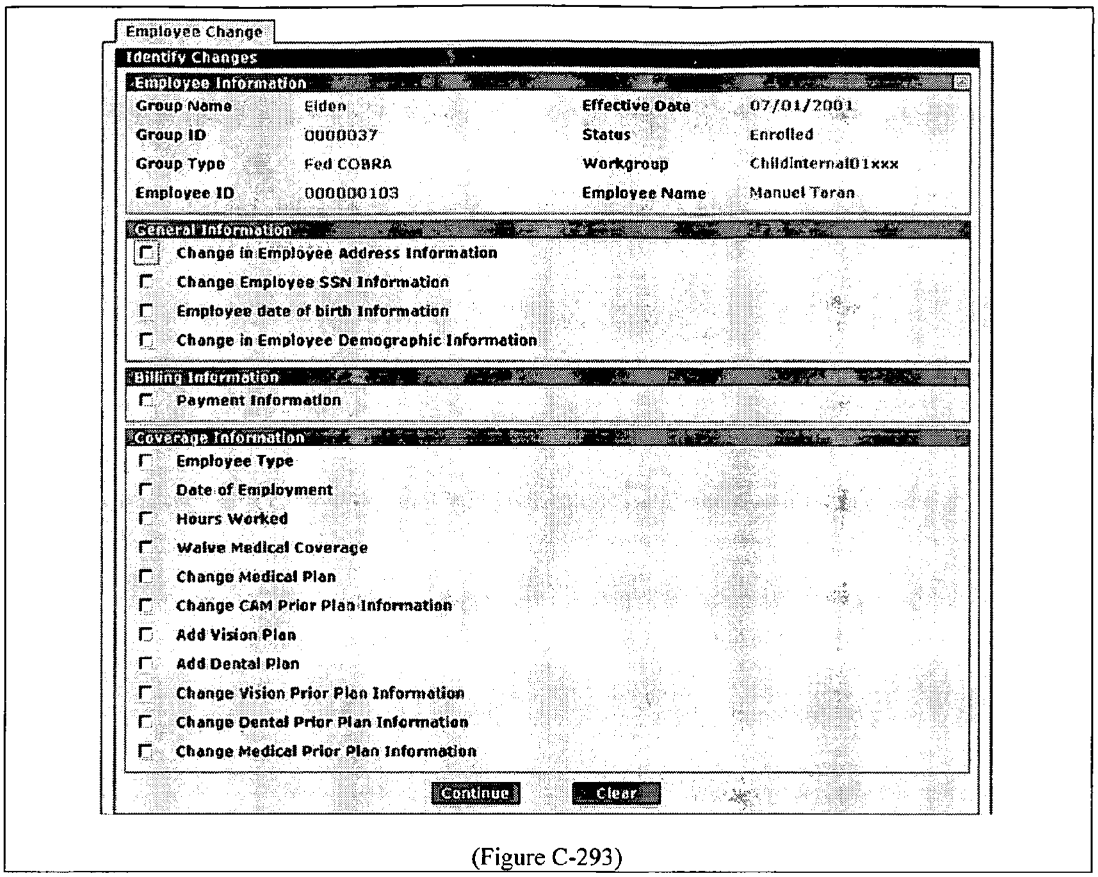
(Figure C-293)

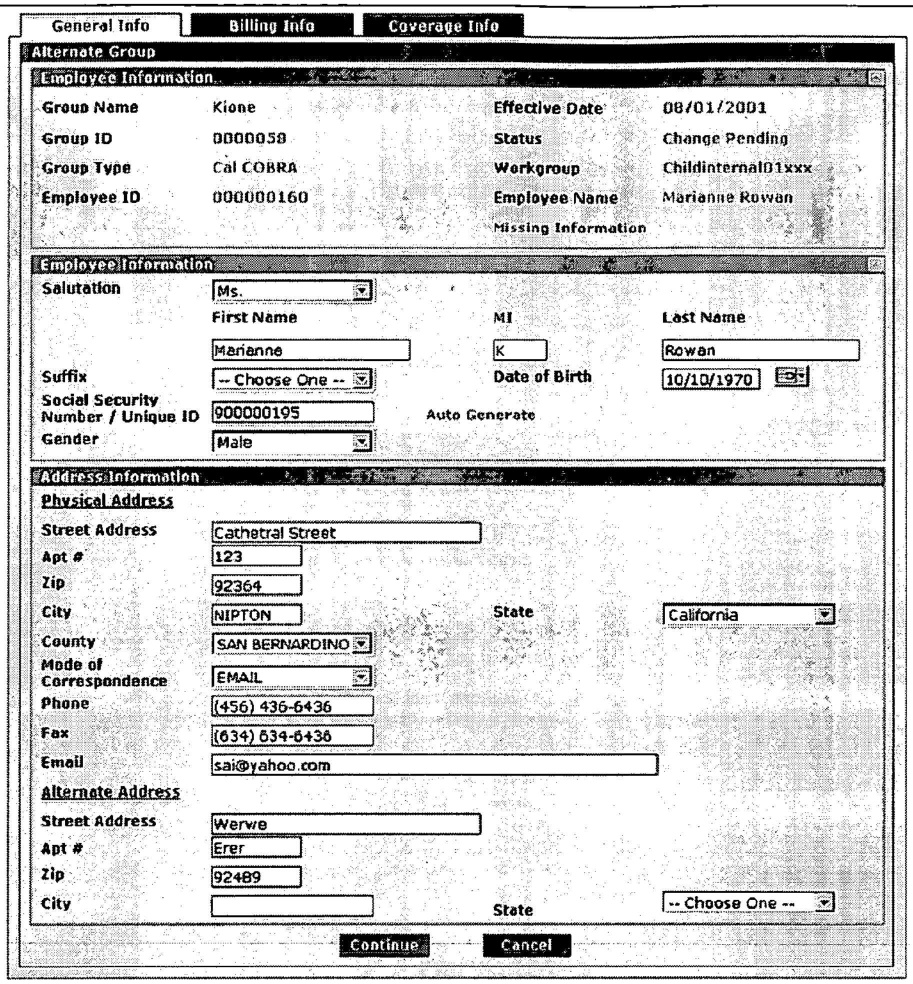
(Figure C-294)
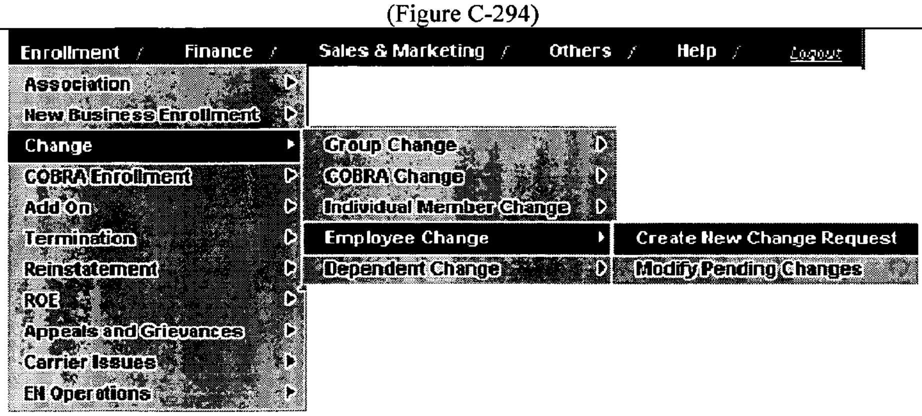
(Figure C-295)

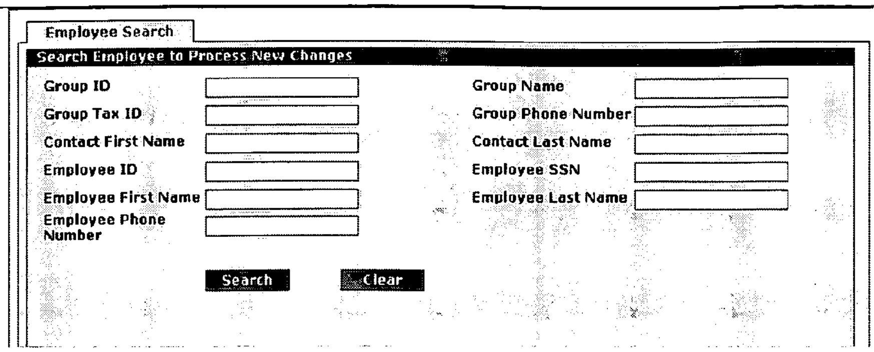
(Figure C-296)
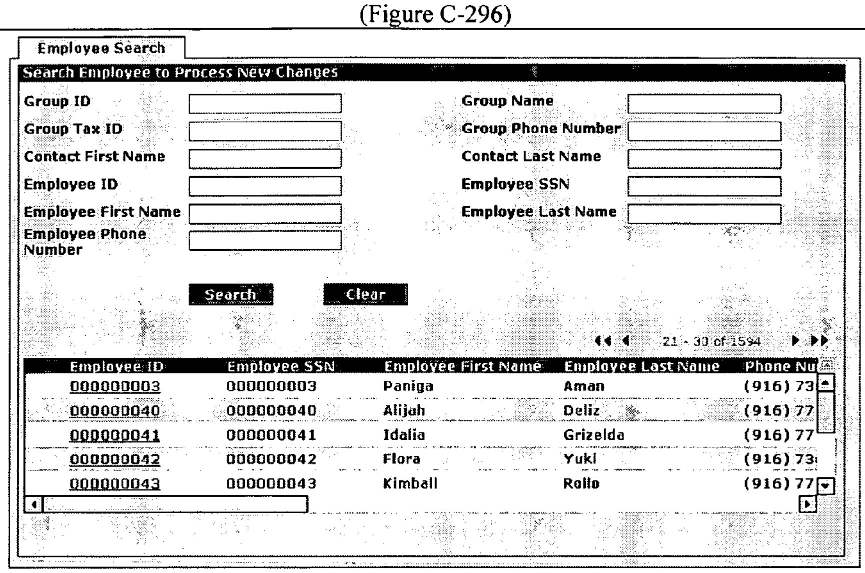
(Figure C-297)
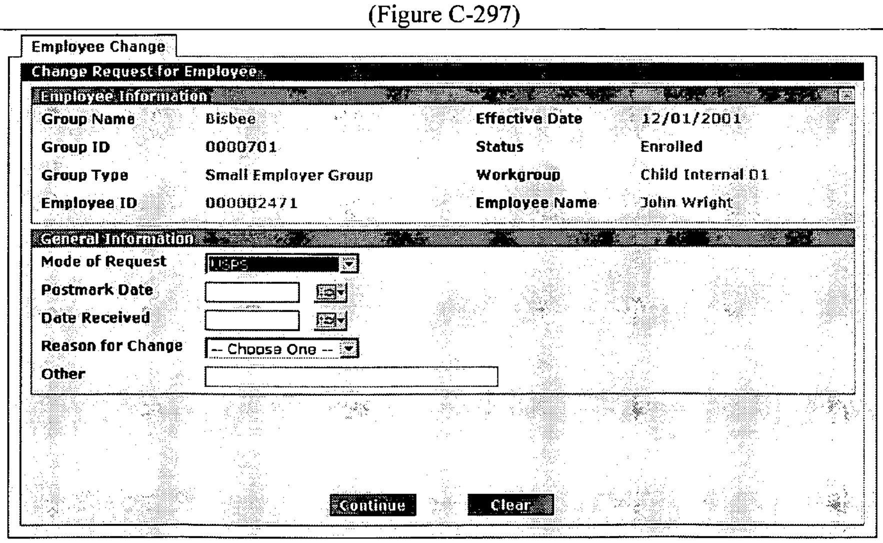
(Figure C-298)

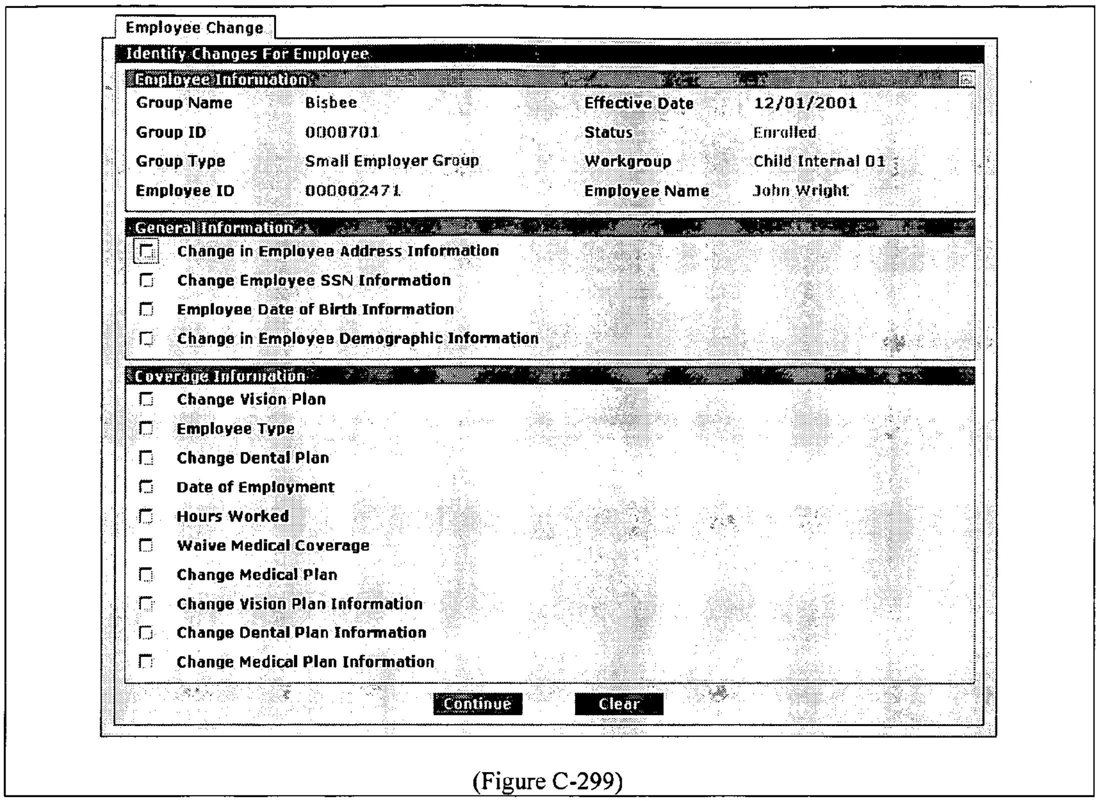
(Figure C-299)

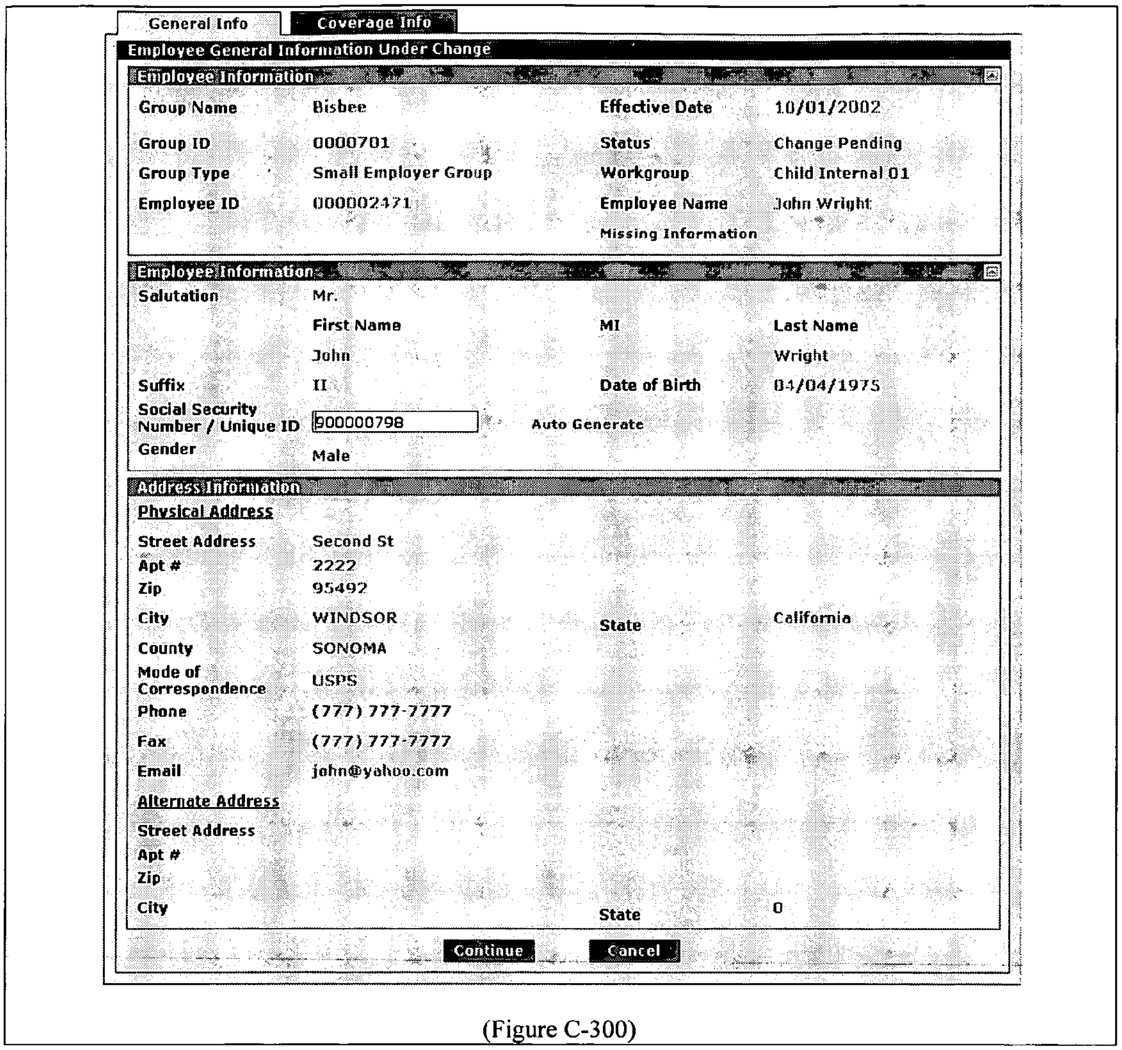

General Info | Coverage Info

Employee General Information Under Change

Employee Information

| | | | |
|---|---|---|---|
| Group Name | Bisbee | Effective Date | 10/01/2002 |
| Group ID | 0000701 | Status | Change Pending |
| Group Type | Small Employer Group | Workgroup | Child Internal 01 |
| Employee ID | 000002471 | Employee Name | John Wright |
| | | Missing Information | |

Employee Information

| | | | |
|---|---|---|---|
| Salutation | Mr. | | |
| | First Name | MI | Last Name |
| | John | | Wright |
| Suffix | II | Date of Birth | 04/04/1975 |
| Social Security Number / Unique ID | 900000798 | Auto Generate | |
| Gender | Male | | |

Address Information

Physical Address

| | | | |
|---|---|---|---|
| Street Address | Second St | | |
| Apt # | 2222 | | |
| Zip | 95492 | | |
| City | WINDSOR | State | California |
| County | SONOMA | | |
| Mode of Correspondence | USPS | | |
| Phone | (777) 777-7777 | | |
| Fax | (777) 777-7777 | | |
| Email | john@yahoo.com | | |

Alternate Address

| | | | |
|---|---|---|---|
| Street Address | | | |
| Apt # | | | |
| Zip | | | |
| City | | State | 0 |

Continue | Cancel (Figure C-300)

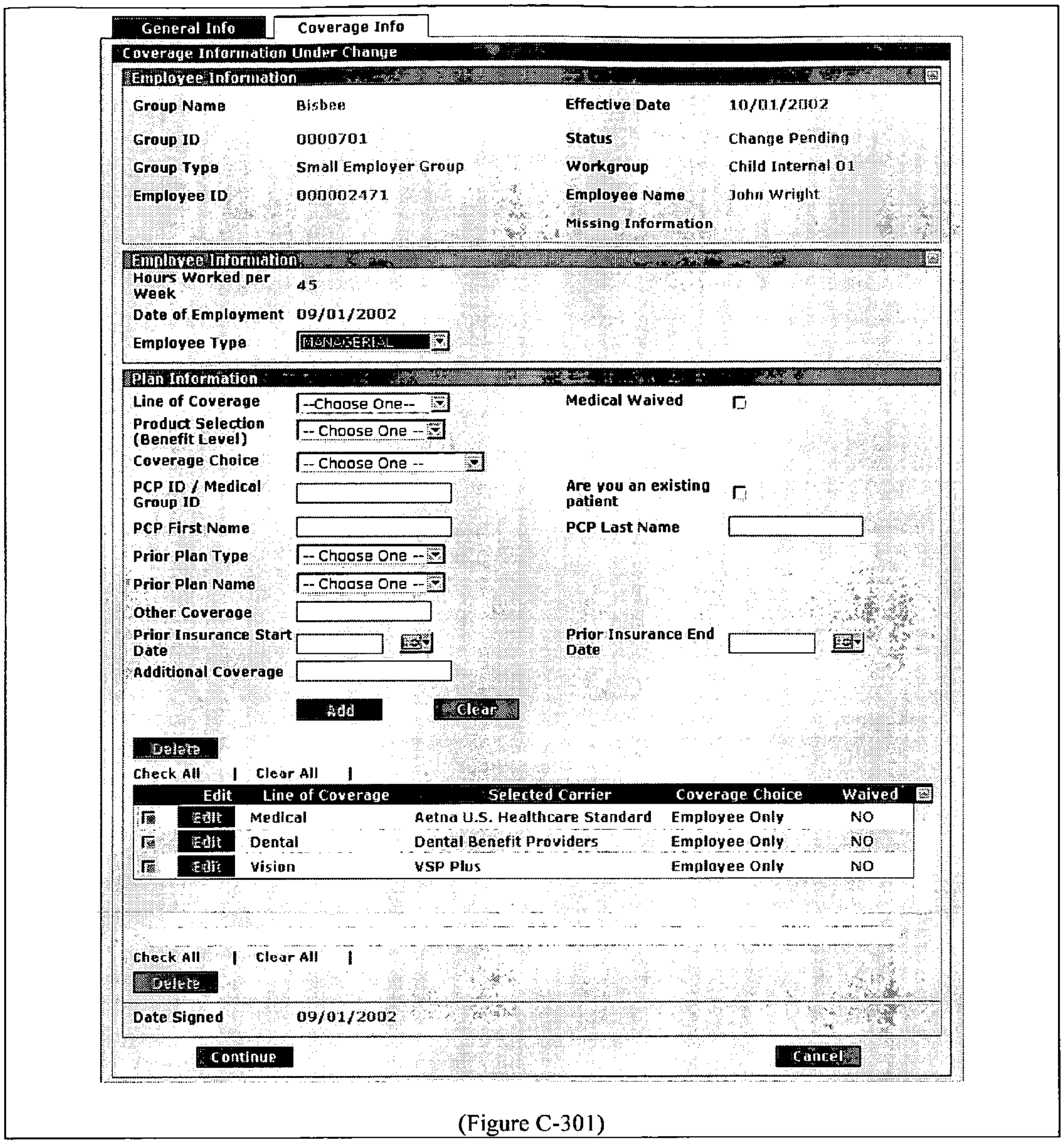
(Figure C-301)

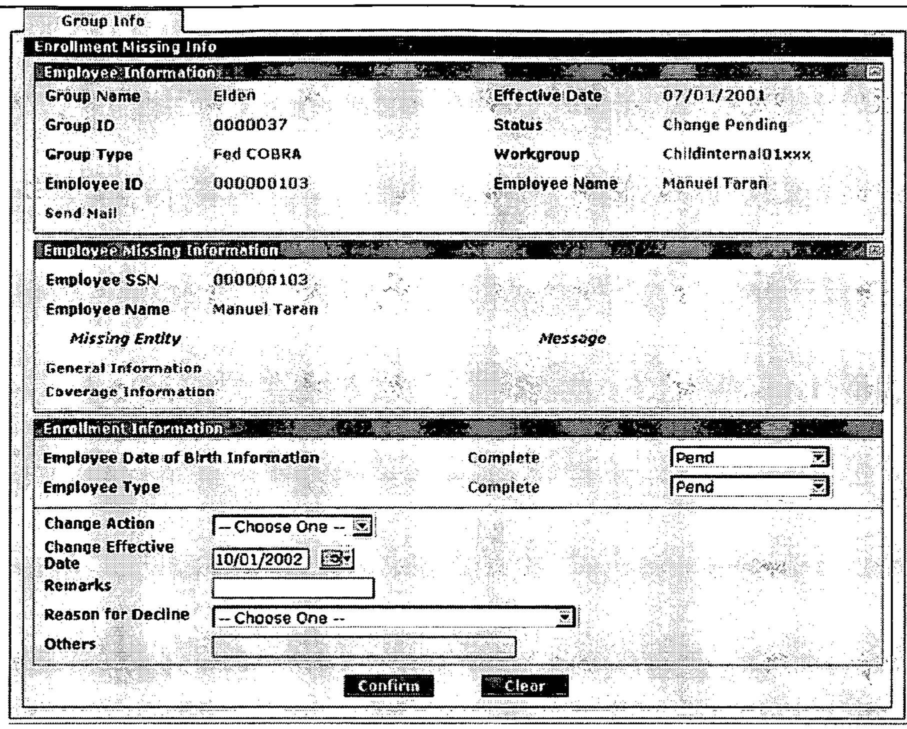
(Figure C-302)
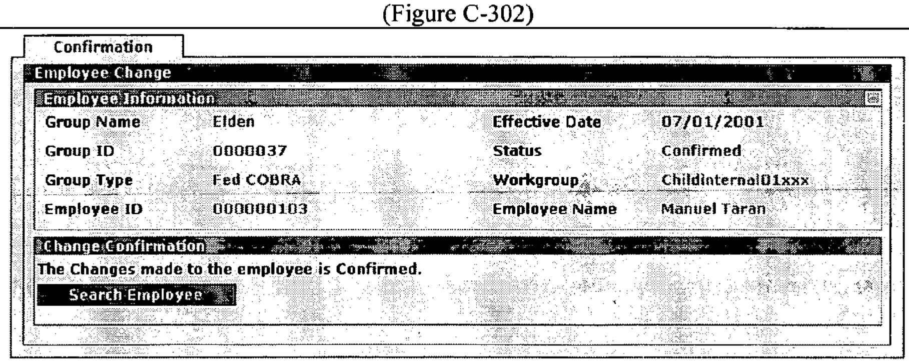
(Figure C-303)
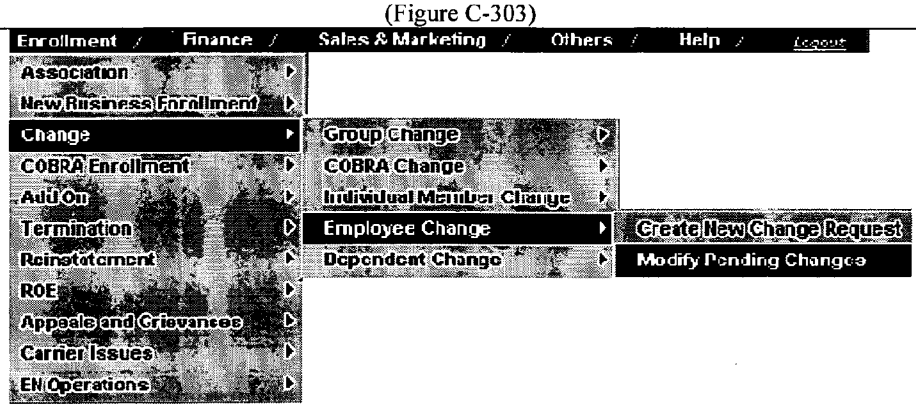
(Figure C-304)

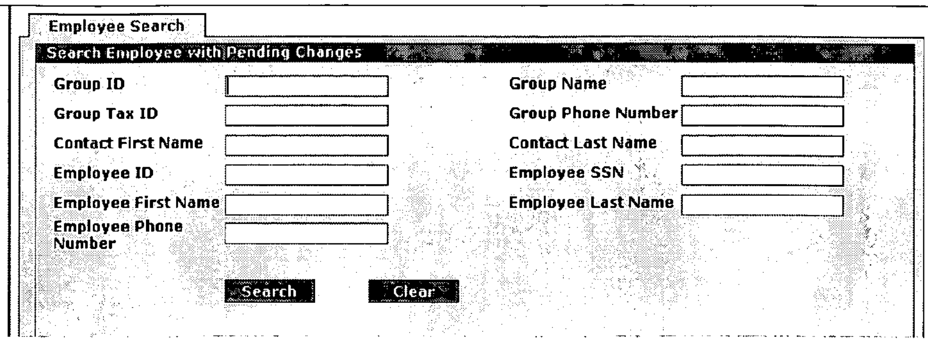
(Figure C-305)
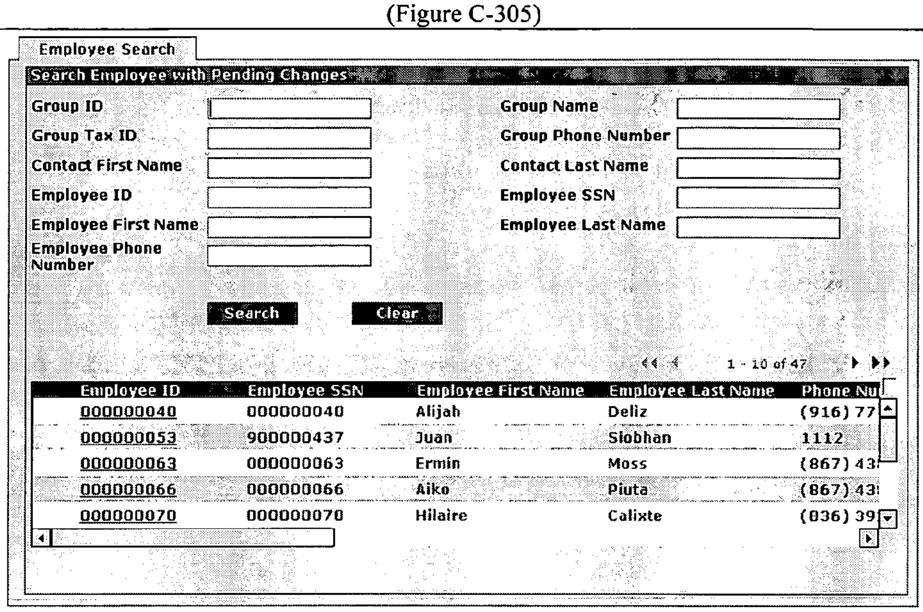
(Figure C-306)

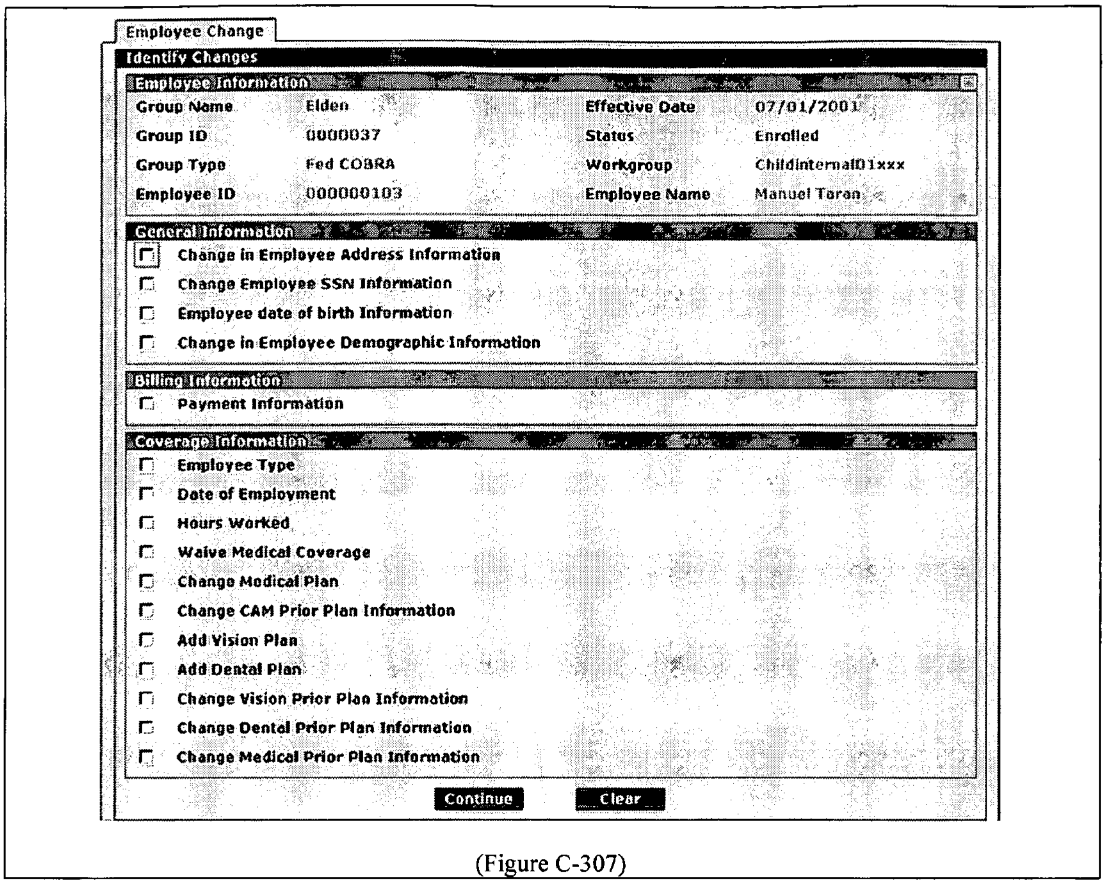
(Figure C-307)

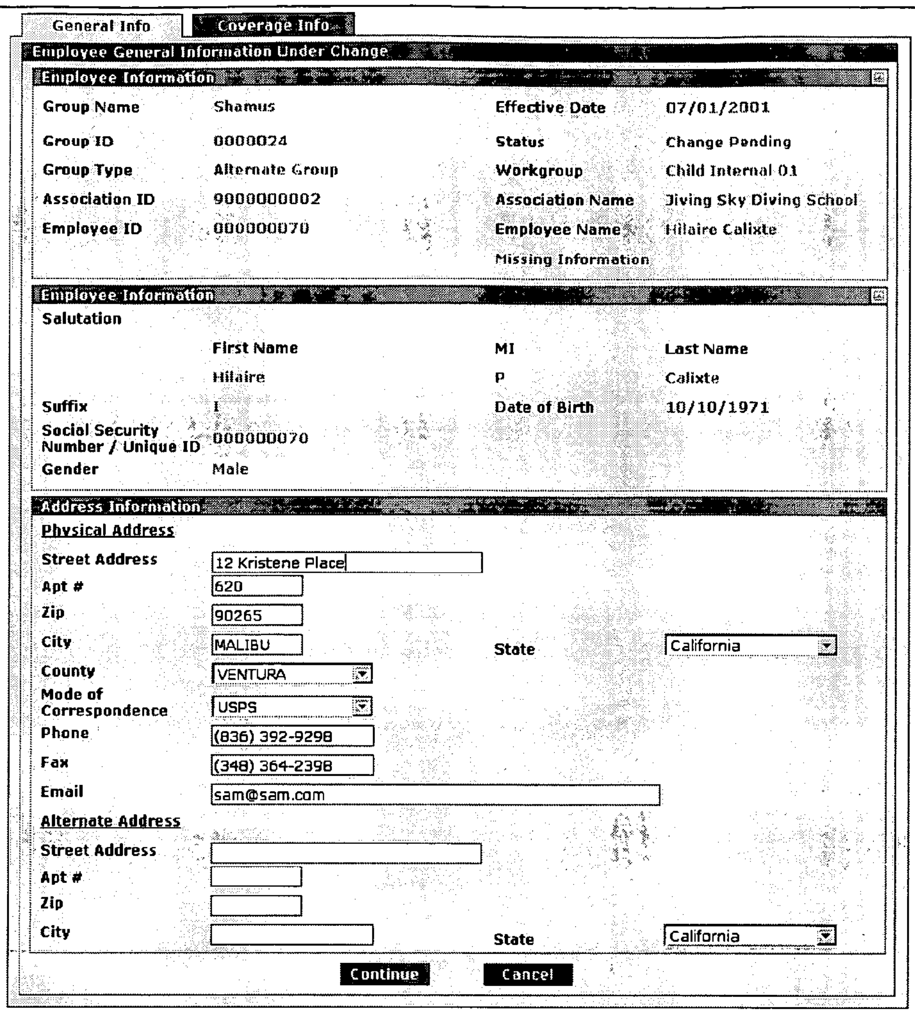
(Figure C-308)
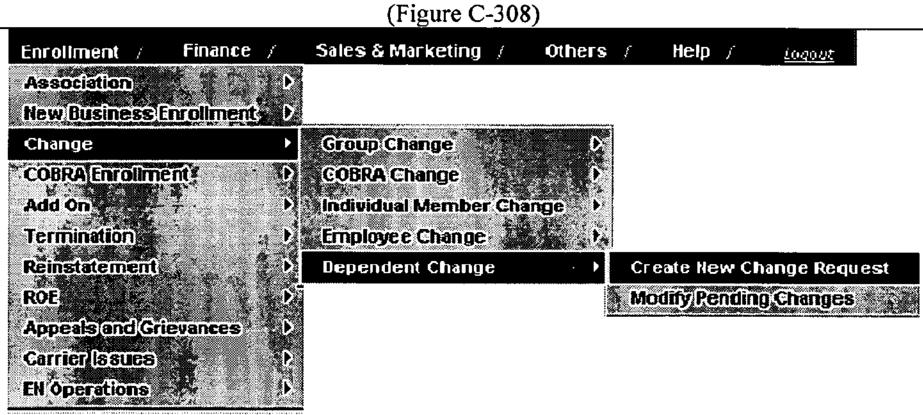
(Figure C-309)

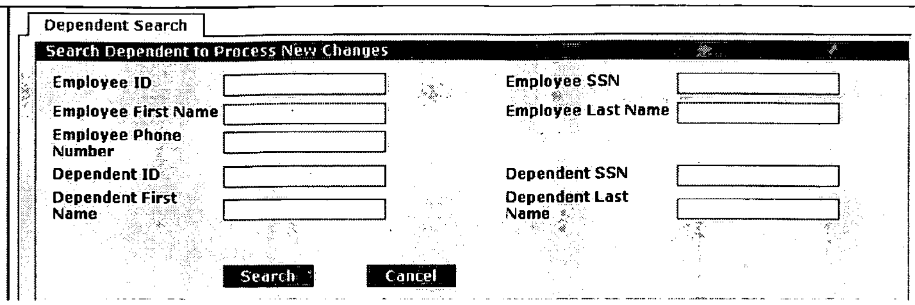
(Figure C-310)
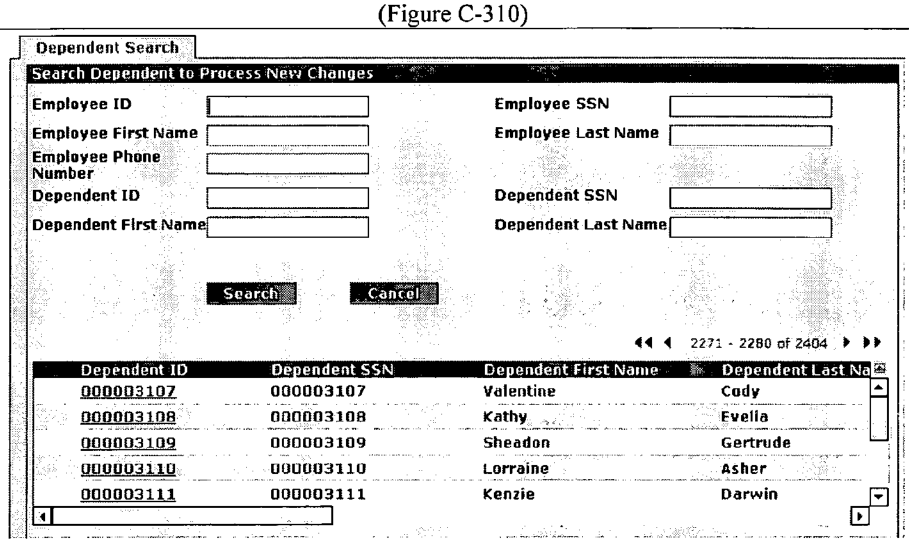
(Figure C-311)
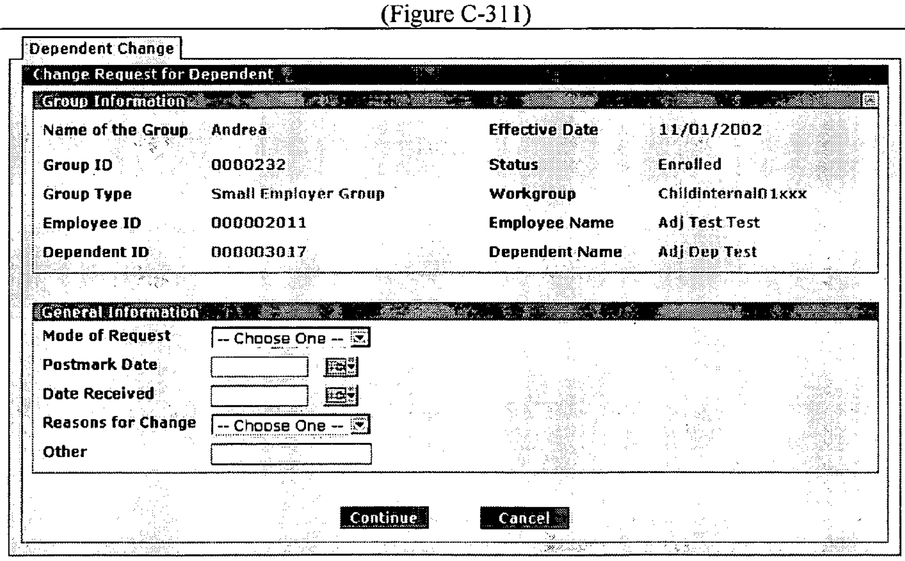
(Figure C-312)

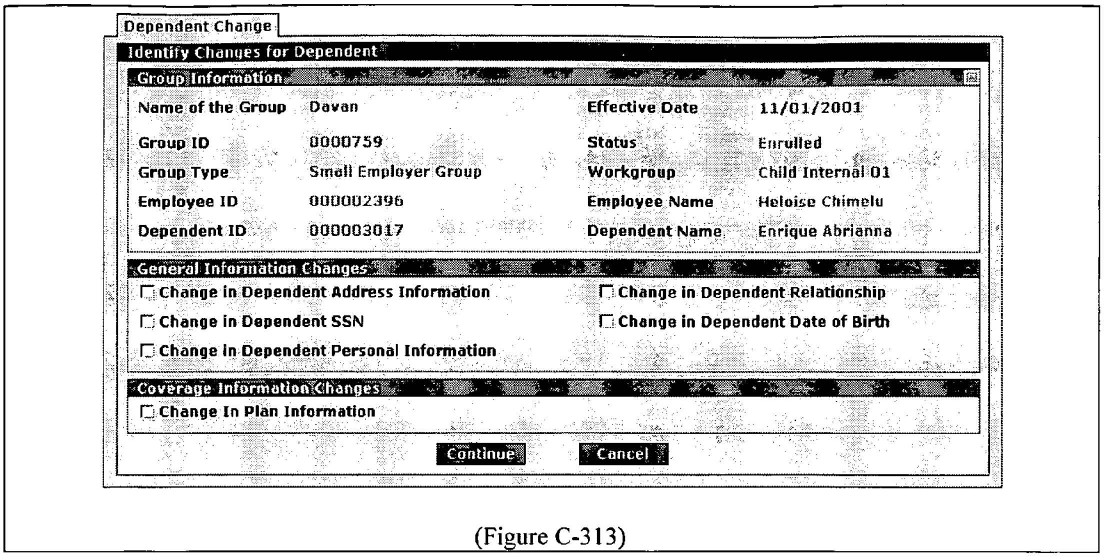
(Figure C-313)

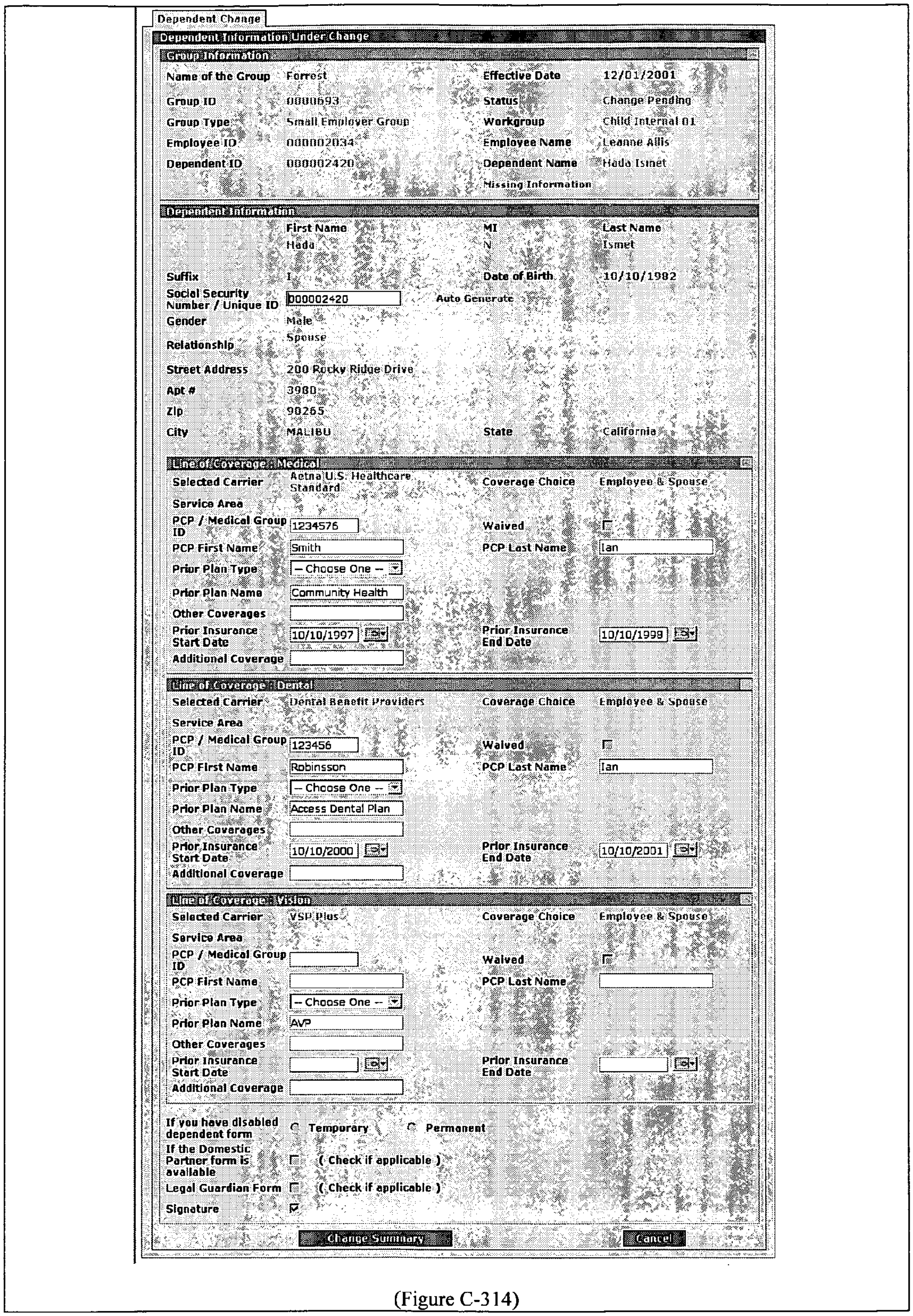

Dependent Change

Dependent Information Under Change

Group Information

| | | | |
|---|---|---|---|
| Name of the Group | Forrest | Effective Date | 12/01/2001 |
| Group ID | 0000693 | Status | Change Pending |
| Group Type | Small Employer Group | Workgroup | Child Internal 01 |
| Employee ID | 000002034 | Employee Name | Leanne Allis |
| Dependent ID | 000002420 | Dependent Name | Hada Ismet |
| | | Missing Information | |

Dependent Information

| | | | |
|---|---|---|---|
| | First Name | MI | Last Name |
| | Hada | N | Ismet |
| Suffix | I | Date of Birth | 10/10/1982 |
| Social Security Number / Unique ID | 000002420 | Auto Generate | |
| Gender | Male | | |
| Relationship | Spouse | | |
| Street Address | 200 Rocky Ridge Drive | | |
| Apt # | 3980 | | |
| Zip | 90265 | | |
| City | MALIBU | State | California |

Line of Coverage : Medical

| | | | |
|---|---|---|---|
| Selected Carrier | Aetna U.S. Healthcare Standard | Coverage Choice | Employee & Spouse |
| Service Area | | | |
| PCP / Medical Group ID | 1234576 | Waived | ☐ |
| PCP First Name | Smith | PCP Last Name | Ian |
| Prior Plan Type | -- Choose One -- | | |
| Prior Plan Name | Community Health | | |
| Other Coverages | | | |
| Prior Insurance Start Date | 10/10/1997 | Prior Insurance End Date | 10/10/1998 |
| Additional Coverage | | | |

Line of Coverage : Dental

| | | | |
|---|---|---|---|
| Selected Carrier | Dental Benefit Providers | Coverage Choice | Employee & Spouse |
| Service Area | | | |
| PCP / Medical Group ID | 123456 | Waived | ☐ |
| PCP First Name | Robinsson | PCP Last Name | Ian |
| Prior Plan Type | -- Choose One -- | | |
| Prior Plan Name | Access Dental Plan | | |
| Other Coverages | | | |
| Prior Insurance Start Date | 10/10/2000 | Prior Insurance End Date | 10/10/2001 |
| Additional Coverage | | | |

Line of Coverage : Vision

| | | | |
|---|---|---|---|
| Selected Carrier | VSP Plus | Coverage Choice | Employee & Spouse |
| Service Area | | | |
| PCP / Medical Group ID | | Waived | ☐ |
| PCP First Name | | PCP Last Name | |
| Prior Plan Type | -- Choose One -- | | |
| Prior Plan Name | AVP | | |
| Other Coverages | | | |
| Prior Insurance Start Date | | Prior Insurance End Date | |
| Additional Coverage | | | |

| | |
|---|---|
| If you have disabled dependent form | ○ Temporary ○ Permanent |
| If the Domestic Partner form is available | ☐ ( Check if applicable ) |
| Legal Guardian Form | ☐ ( Check if applicable ) |
| Signature | ☑ |

Change Summary | Cancel (Figure C-314)

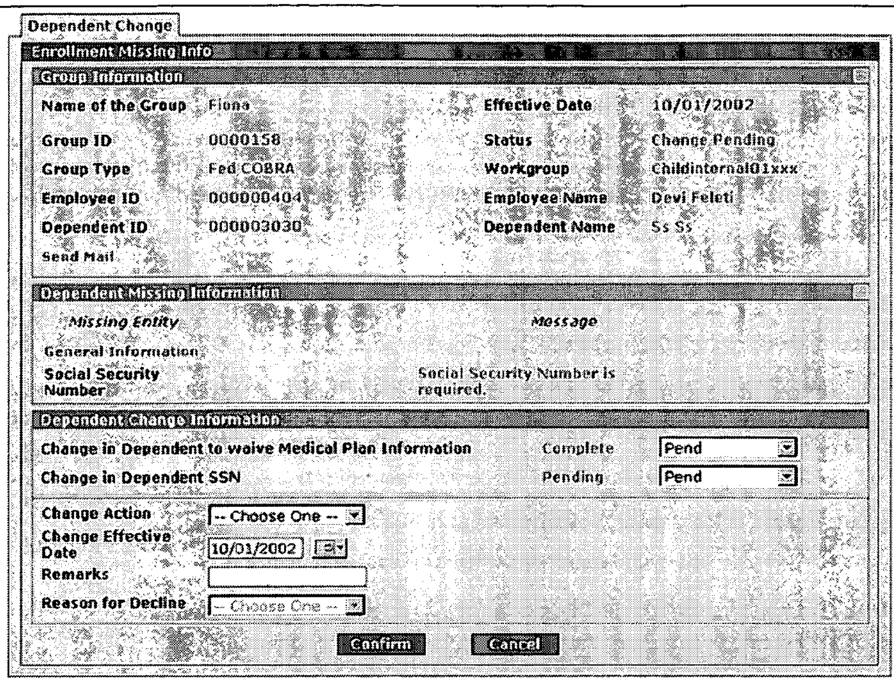
(Figure C-315)
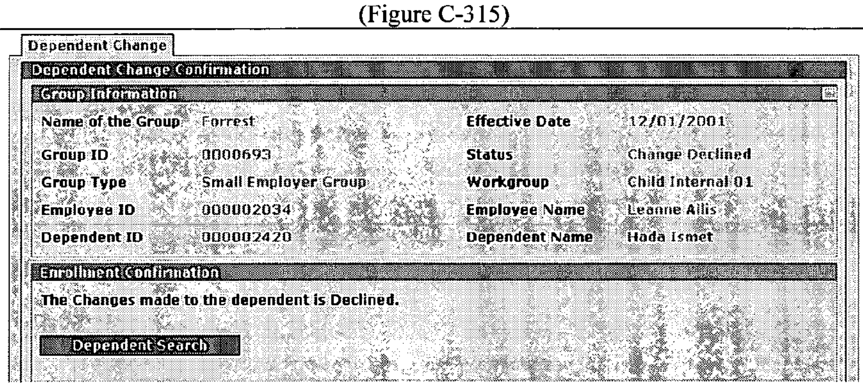
(Figure C-316)
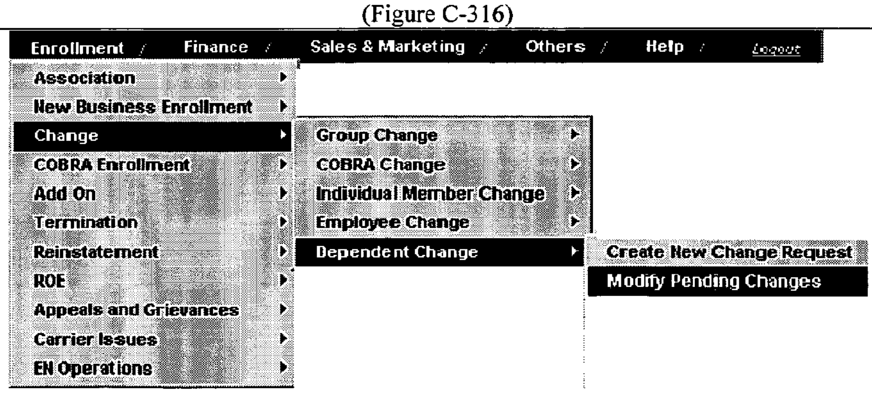
(Figure C-317)

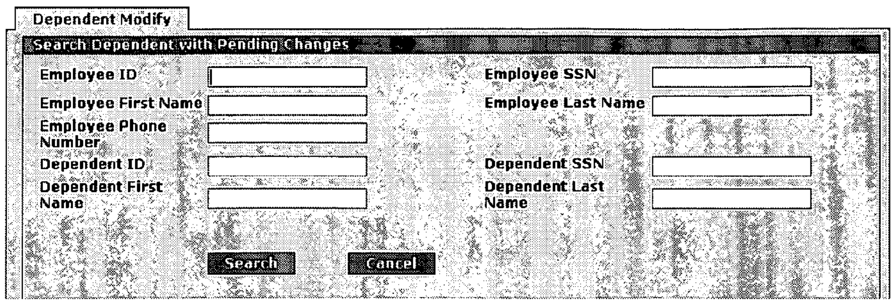
(Figure C-318)
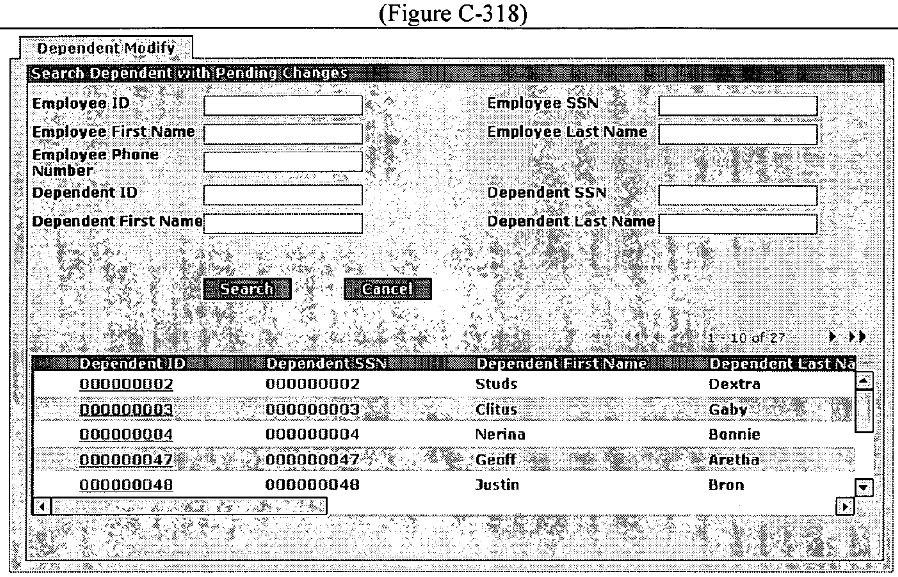
(Figure C-319)
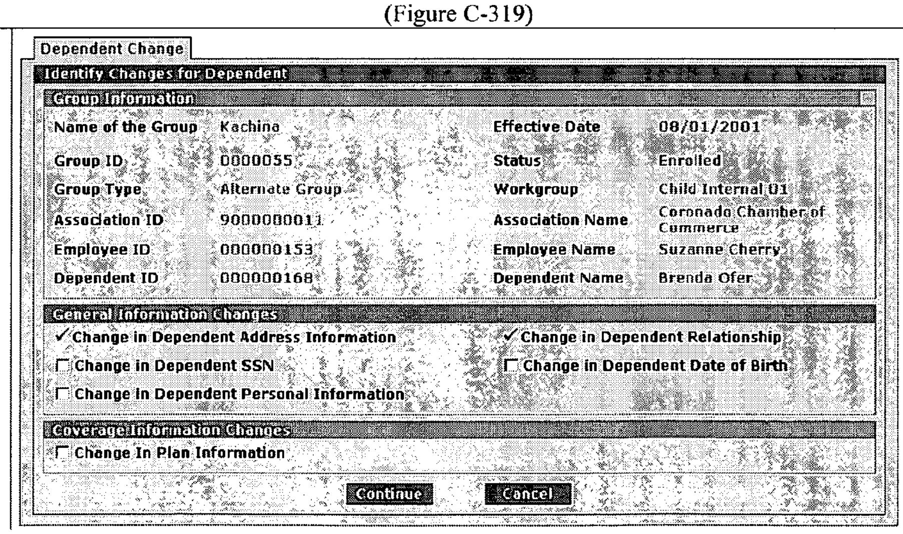
(Figure C-320)

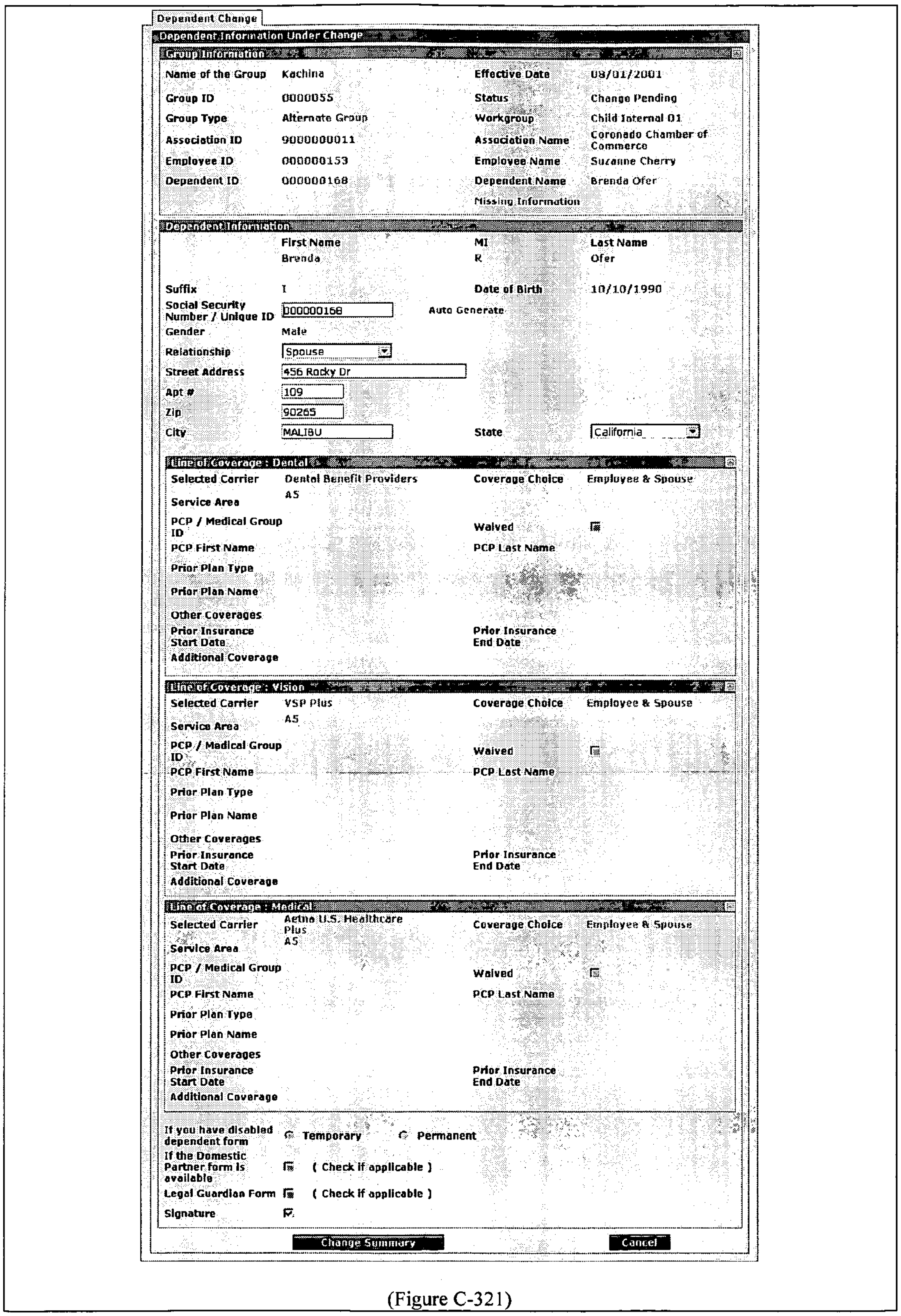
Dependent Change

Dependent Information Under Change

Group Information

| | | | |
|---|---|---|---|
| Name of the Group | Kachina | Effective Date | 08/01/2001 |
| Group ID | 0000055 | Status | Change Pending |
| Group Type | Alternate Group | Workgroup | Child Internal 01 |
| Association ID | 9000000011 | Association Name | Coronado Chamber of Commerce |
| Employee ID | 000000153 | Employee Name | Suzanne Cherry |
| Dependent ID | 000000168 | Dependent Name | Brenda Ofer |
| | | Missing Information | |

Dependent Information

| | | | |
|---|---|---|---|
| | First Name | MI | Last Name |
| | Brenda | R | Ofer |
| Suffix | I | Date of Birth | 10/10/1990 |
| Social Security Number / Unique ID | 000000168 | Auto Generate | |
| Gender | Male | | |
| Relationship | Spouse | | |
| Street Address | 456 Rocky Dr | | |
| Apt # | 109 | | |
| Zip | 90265 | | |
| City | MALIBU | State | California |

Line of Coverage : Dental

| | | | |
|---|---|---|---|
| Selected Carrier | Dental Benefit Providers | Coverage Choice | Employee & Spouse |
| Service Area | AS | | |
| PCP / Medical Group ID | | Waived | |
| PCP First Name | | PCP Last Name | |
| Prior Plan Type | | | |
| Prior Plan Name | | | |
| Other Coverages | | | |
| Prior Insurance Start Date | | Prior Insurance End Date | |
| Additional Coverage | | | |

Line of Coverage : Vision

| | | | |
|---|---|---|---|
| Selected Carrier | VSP Plus | Coverage Choice | Employee & Spouse |
| Service Area | AS | | |
| PCP / Medical Group ID | | Waived | |
| PCP First Name | | PCP Last Name | |
| Prior Plan Type | | | |
| Prior Plan Name | | | |
| Other Coverages | | | |
| Prior Insurance Start Date | | Prior Insurance End Date | |
| Additional Coverage | | | |

Line of Coverage : Medical

| | | | |
|---|---|---|---|
| Selected Carrier | Aetna U.S. Healthcare Plus | Coverage Choice | Employee & Spouse |
| Service Area | AS | | |
| PCP / Medical Group ID | | Waived | |
| PCP First Name | | PCP Last Name | |
| Prior Plan Type | | | |
| Prior Plan Name | | | |
| Other Coverages | | | |
| Prior Insurance Start Date | | Prior Insurance End Date | |
| Additional Coverage | | | |

If you have disabled dependent form — Temporary — Permanent

If the Domestic Partner form is available — ( Check if applicable )

Legal Guardian Form — ( Check if applicable )

Signature

Change Summary — Cancel (Figure C-321)

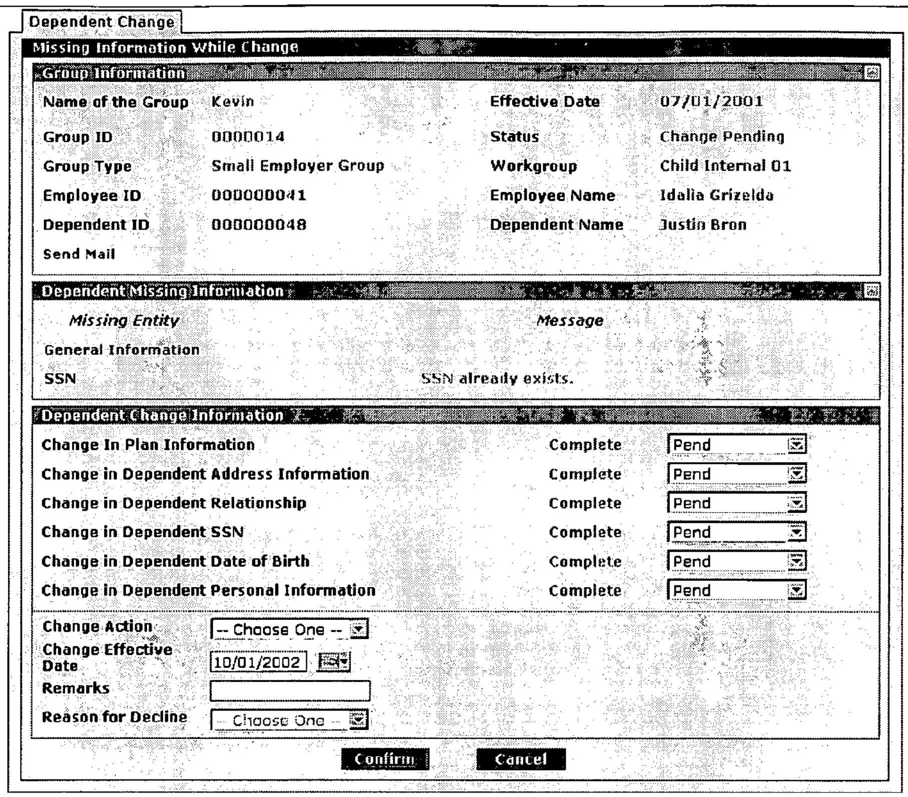
(Figure C-322)
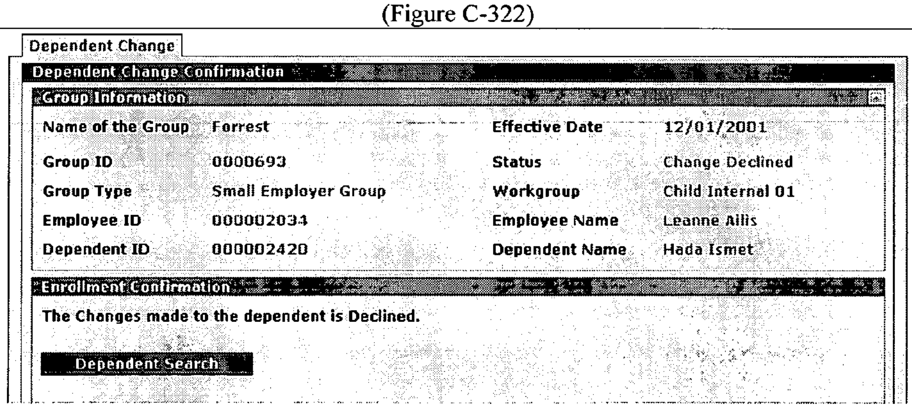
(Figure C-323)

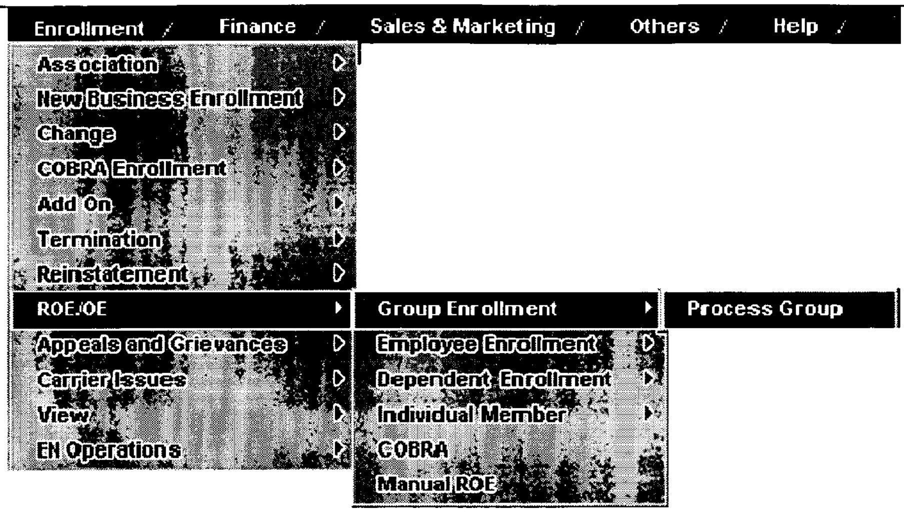
(Figure C-324)
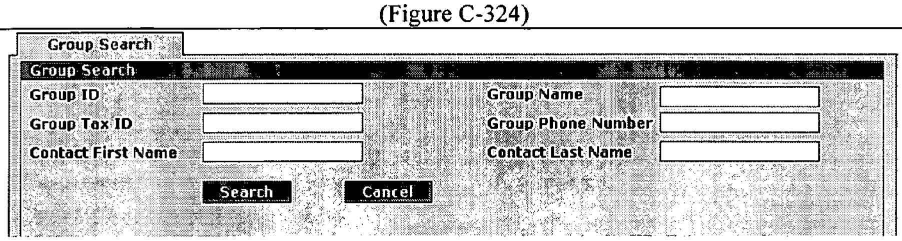
(Figure C-325)
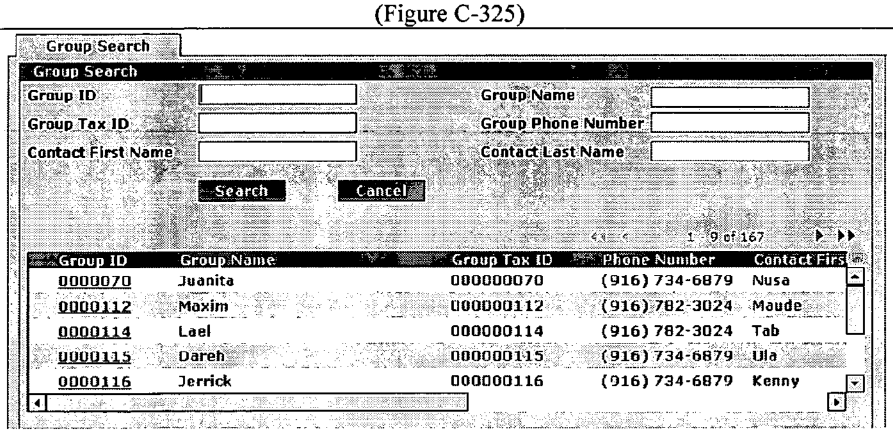
(Figure C-326)

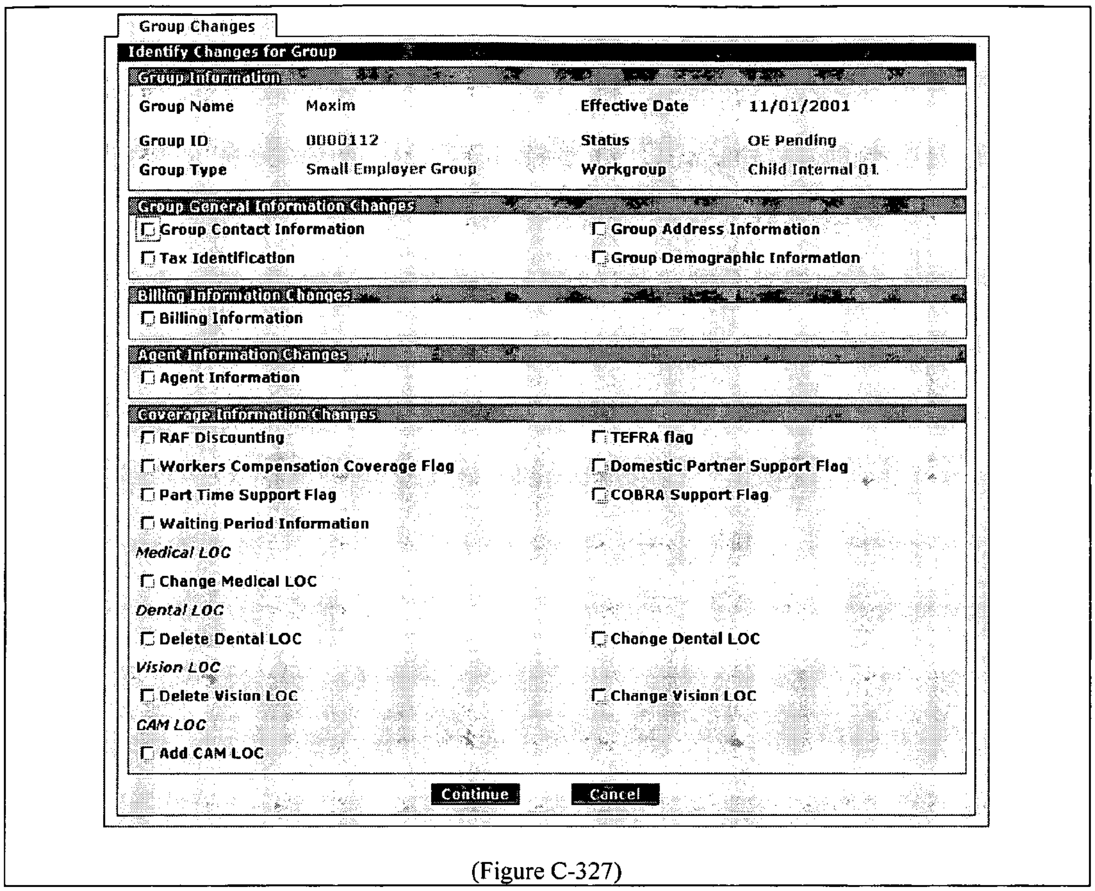
(Figure C-327)

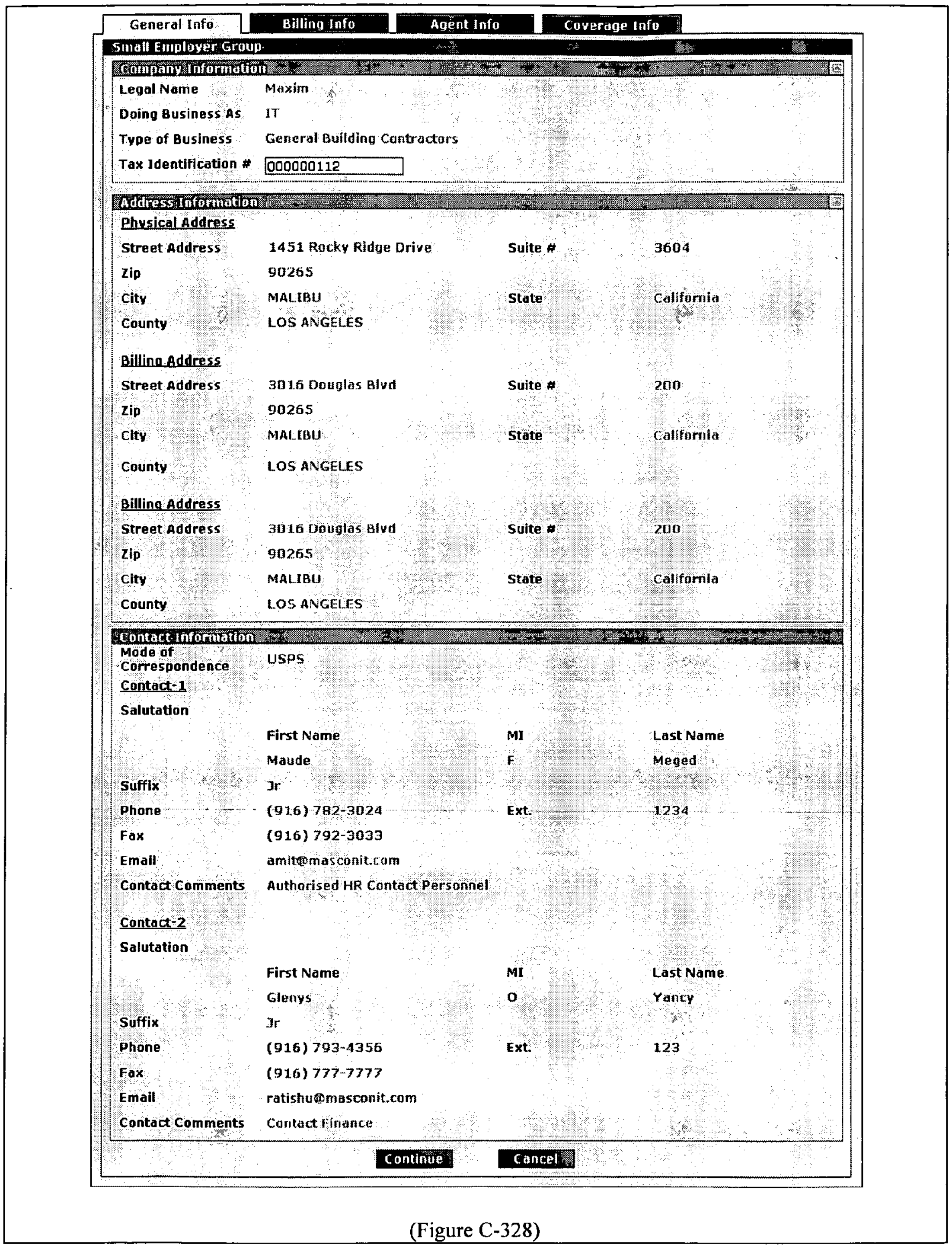
(Figure C-328)

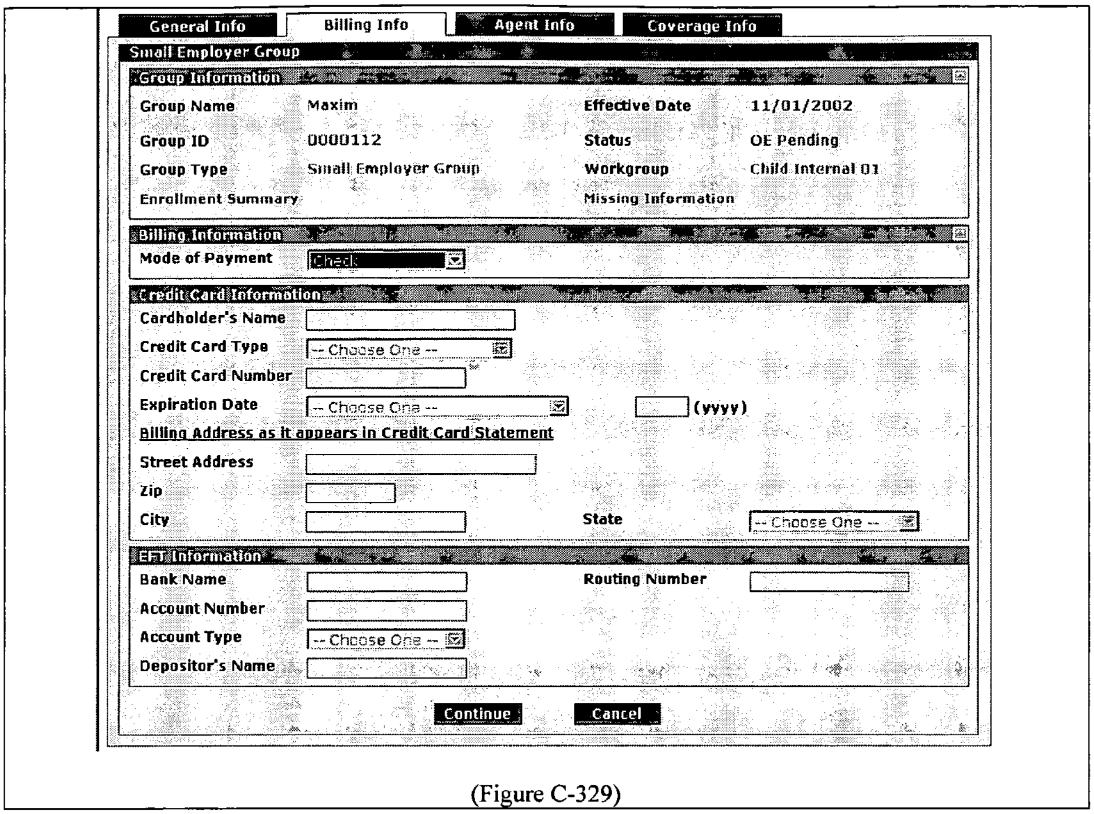
(Figure C-329)

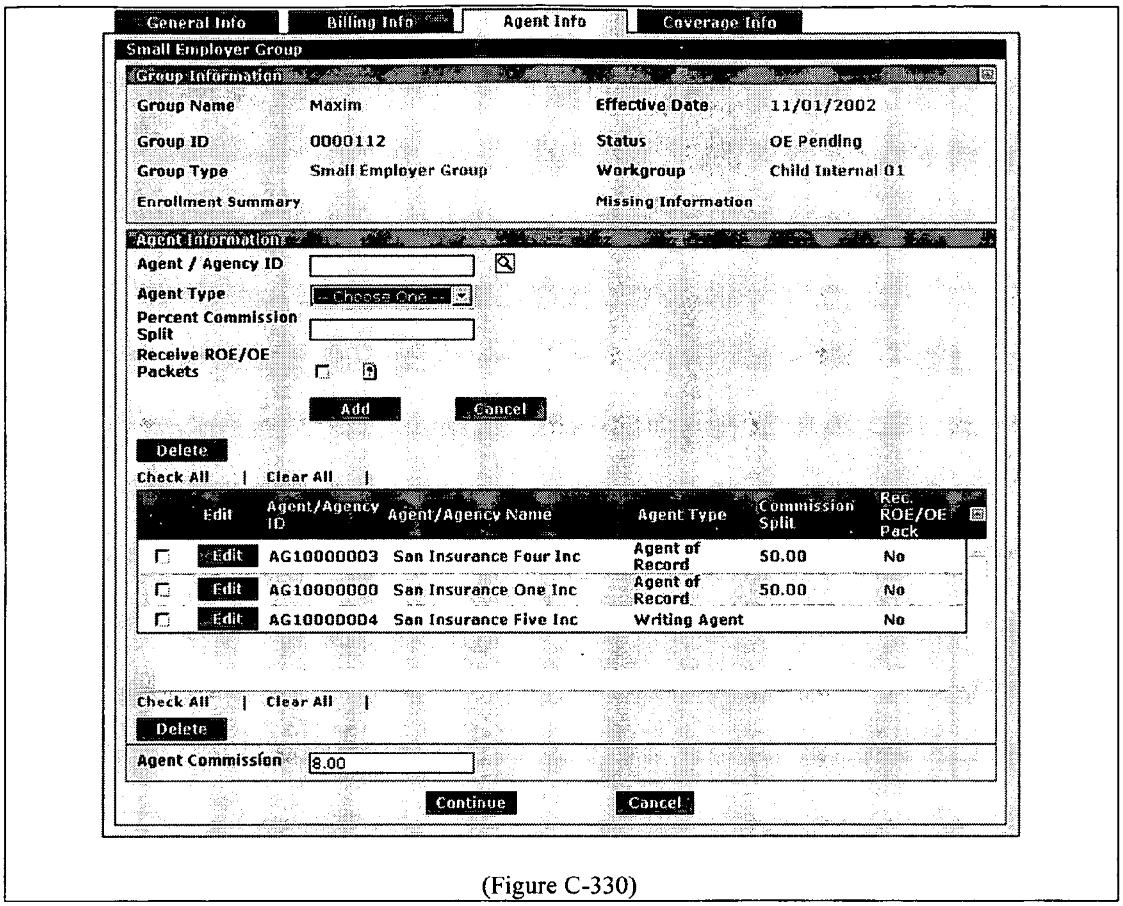
(Figure C-330)

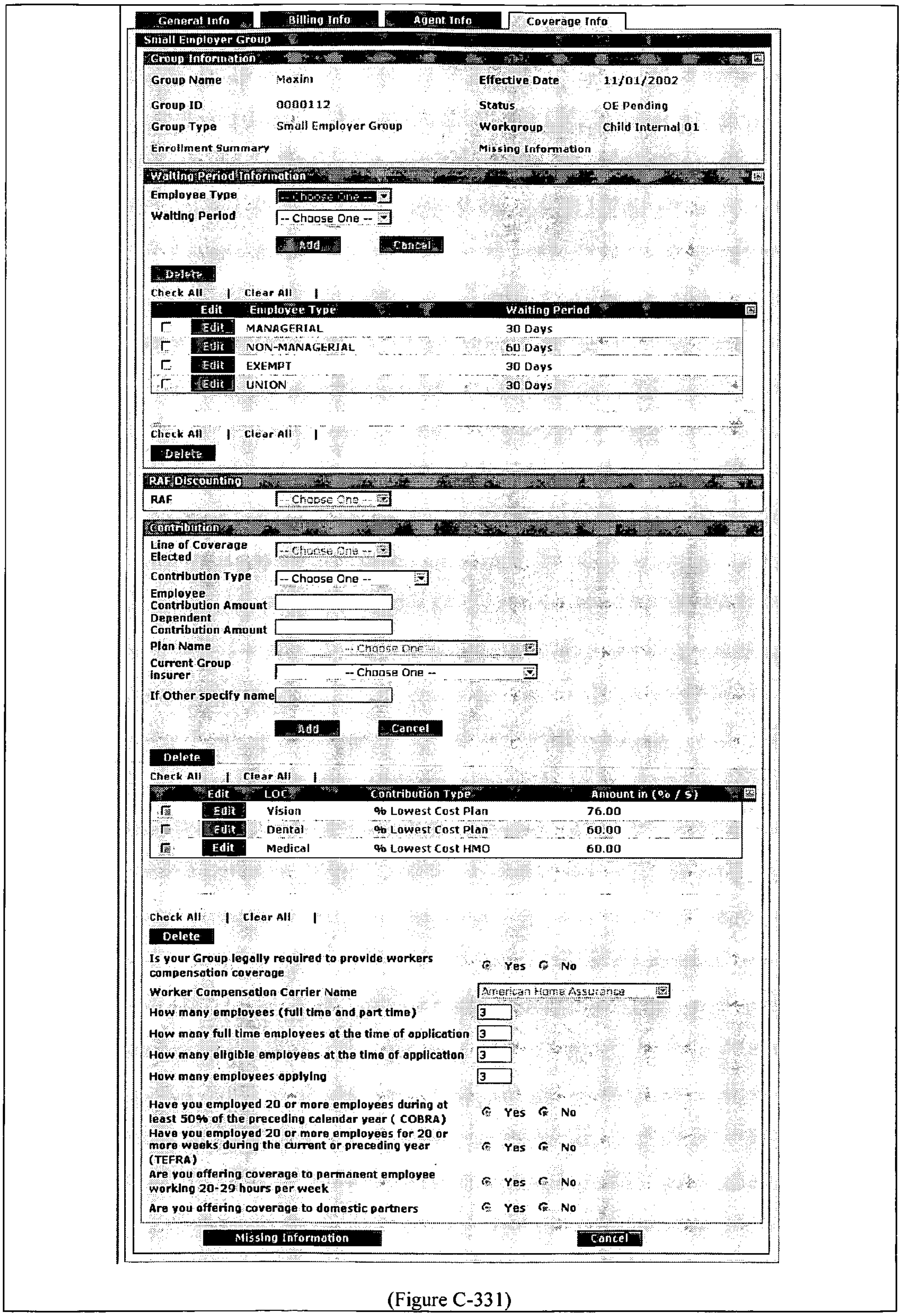
(Figure C-331)

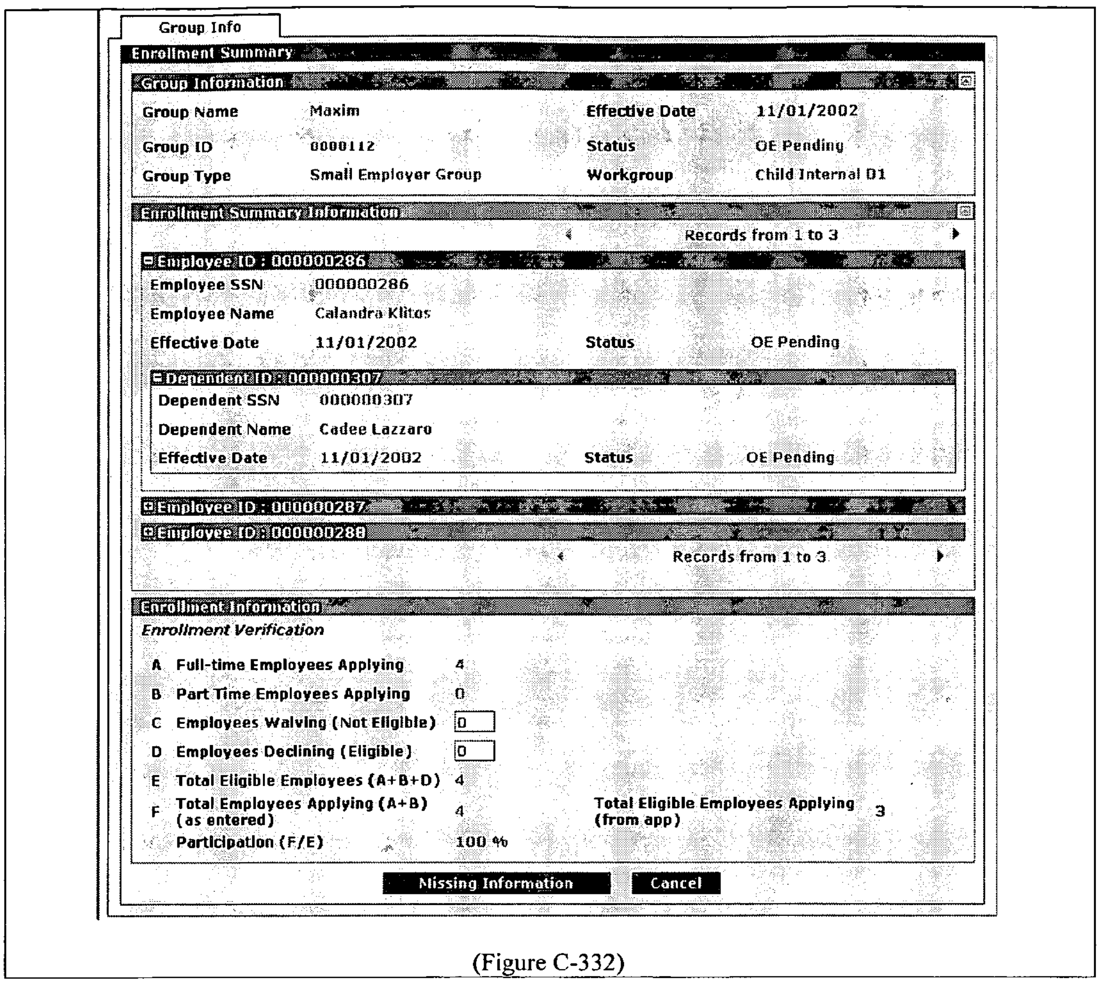
(Figure C-332)

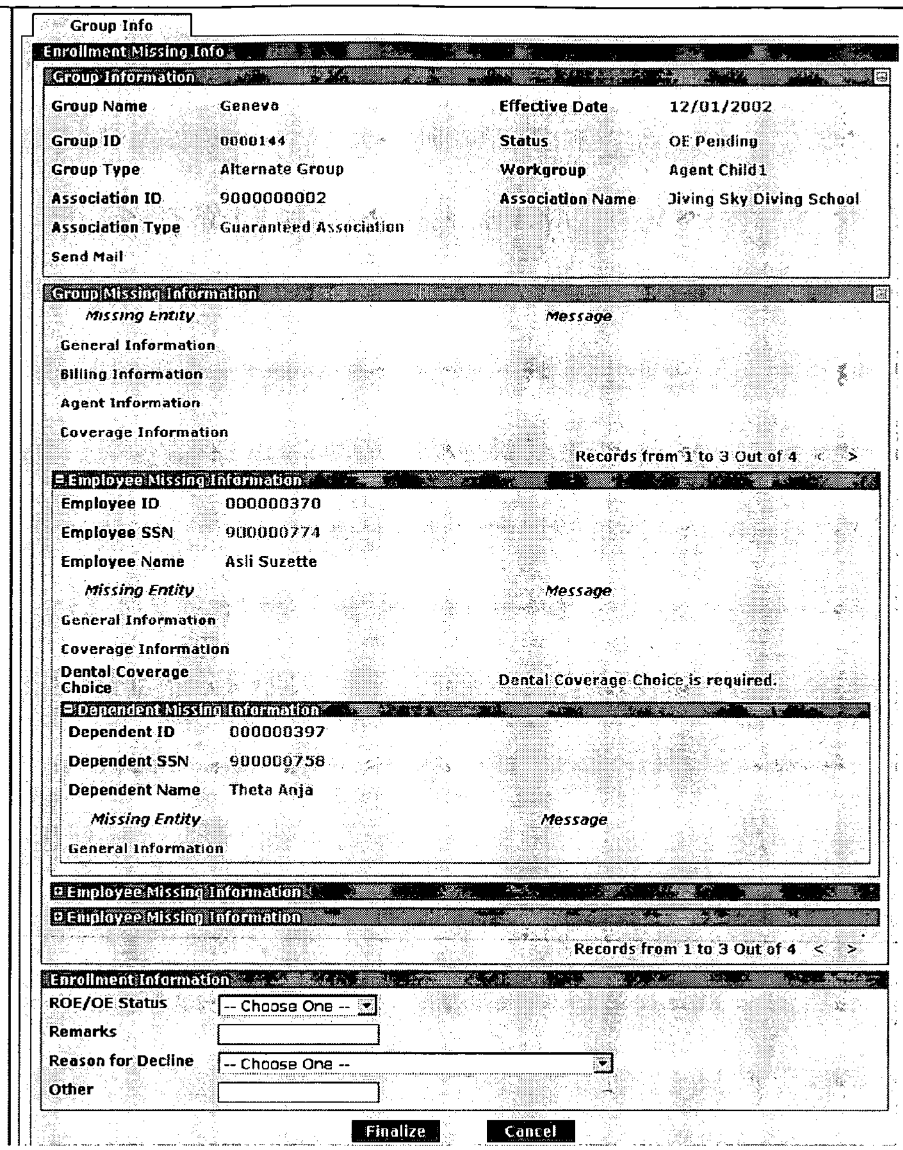
(Figure C-333)
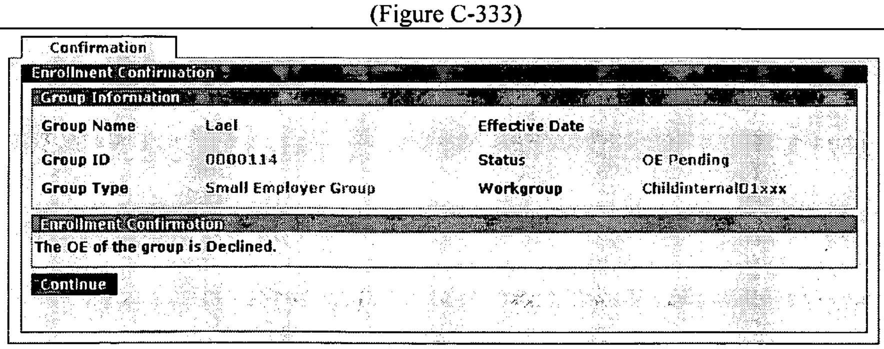
(Figure C-334)

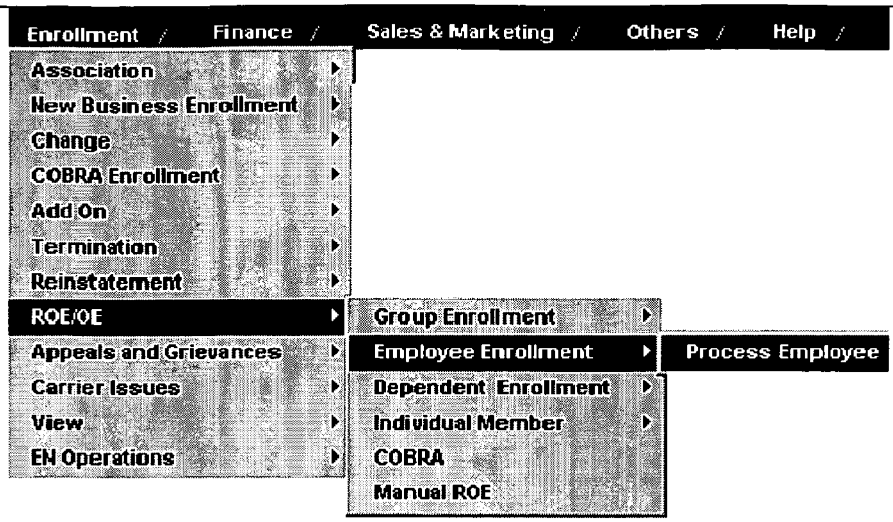
(Figure C-335)
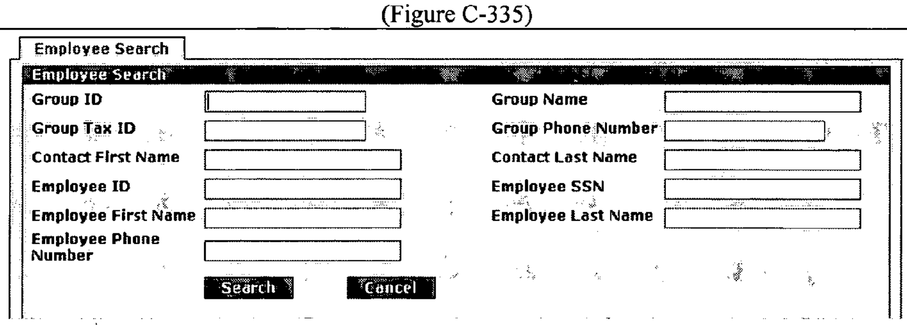
(Figure C-336)
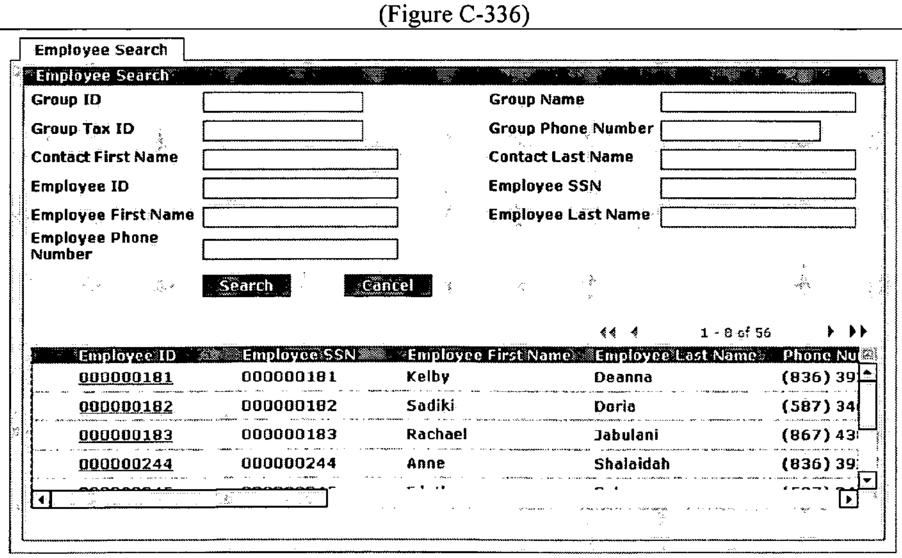
(Figure C-337)

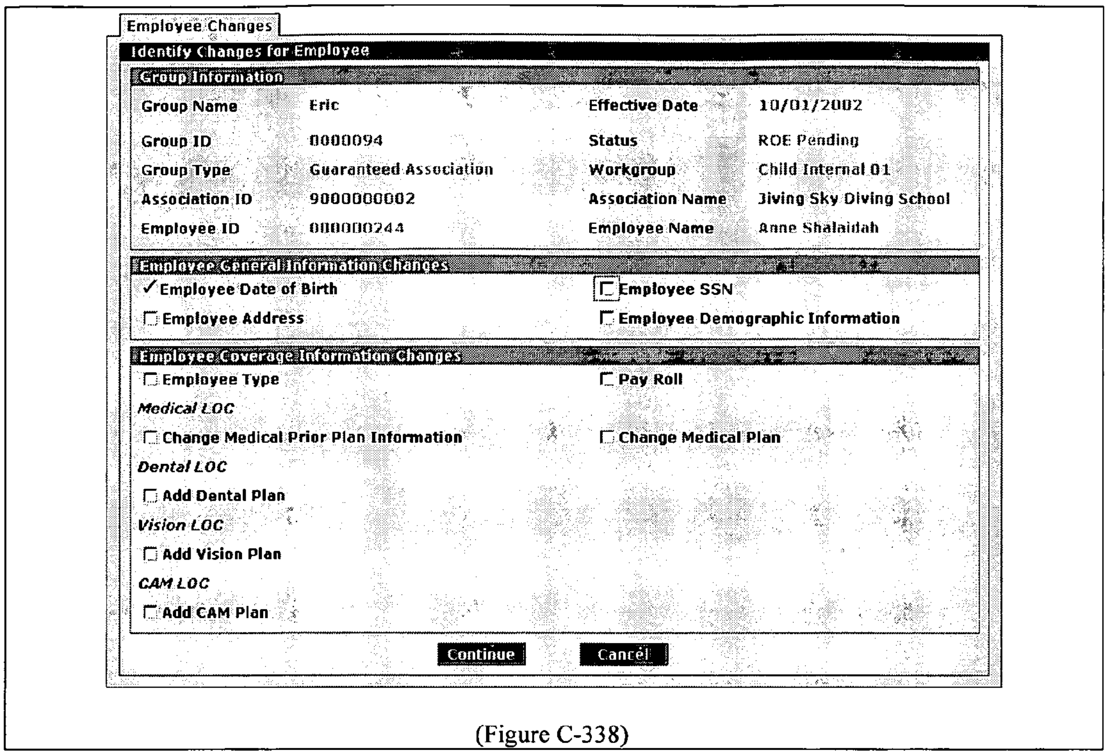
(Figure C-338)

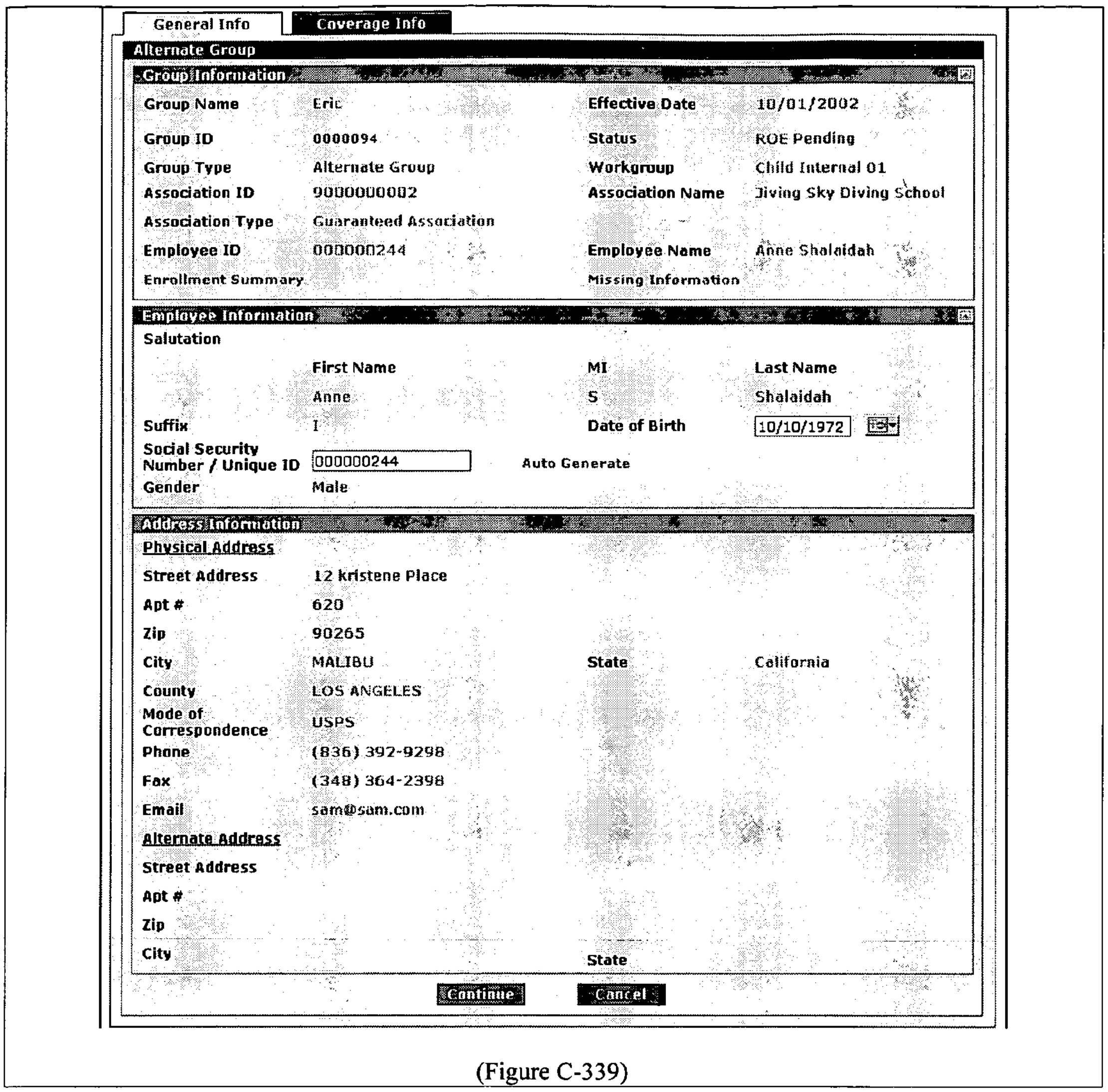
(Figure C-339)

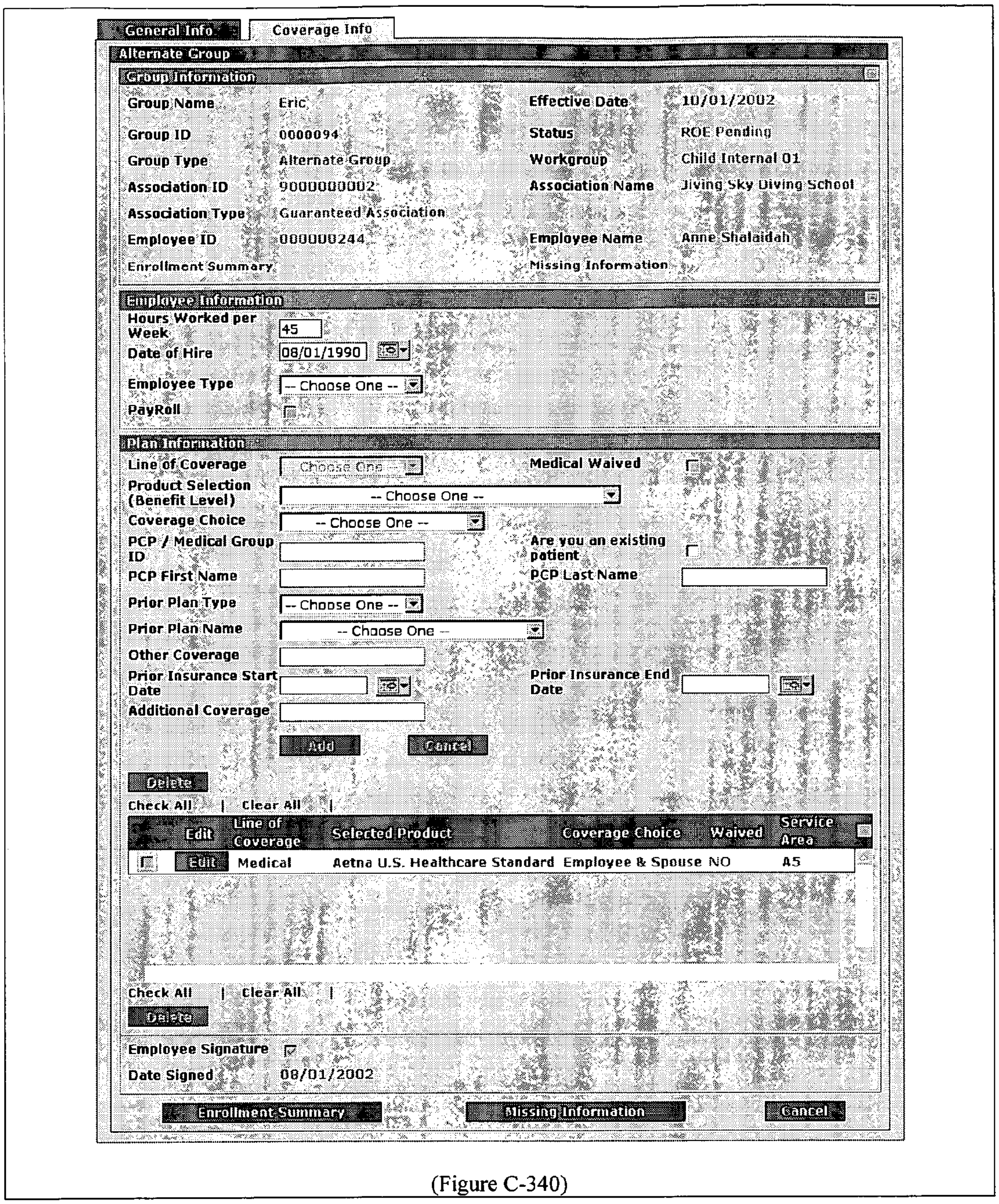
(Figure C-340)

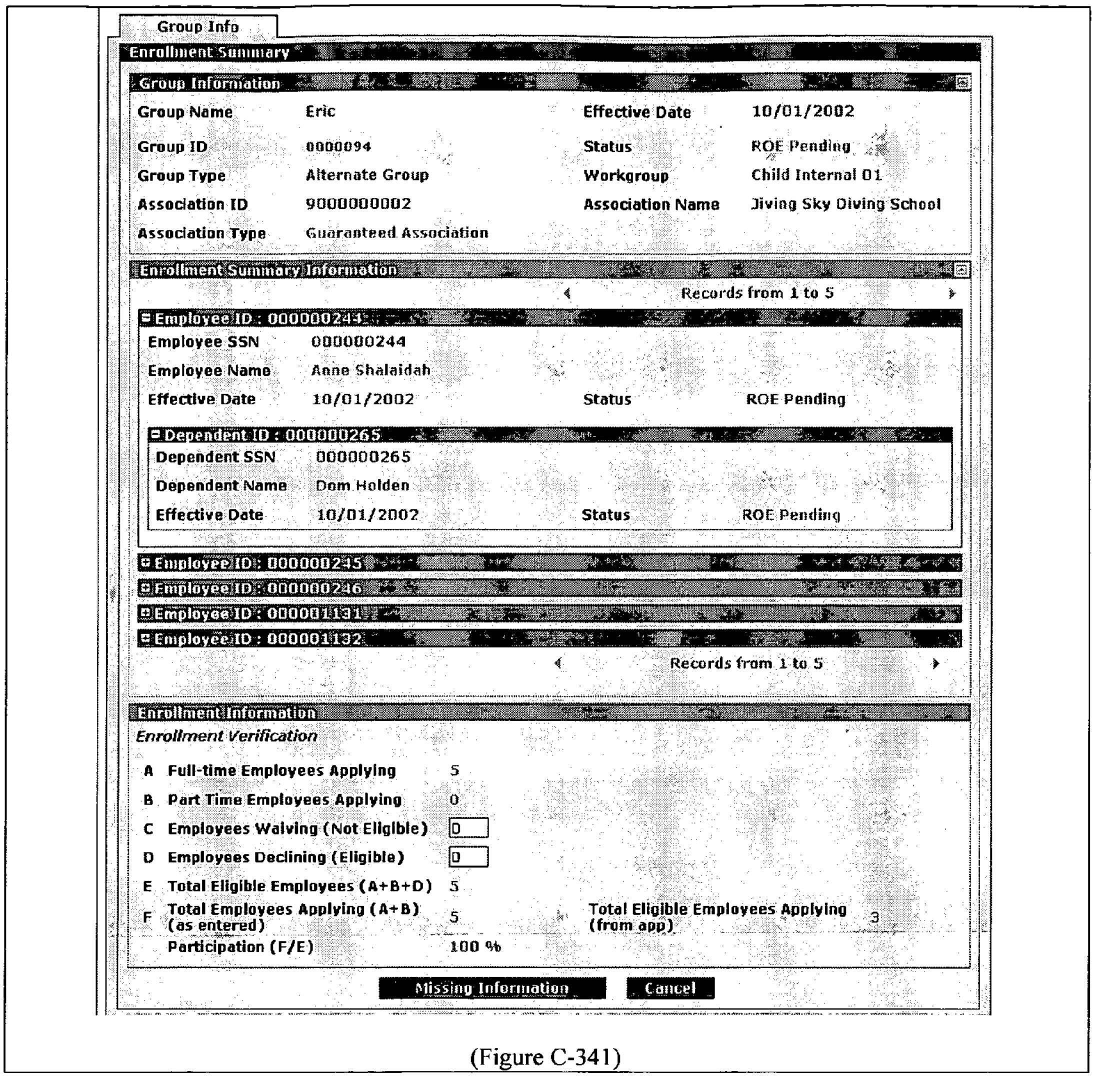
(Figure C-341)

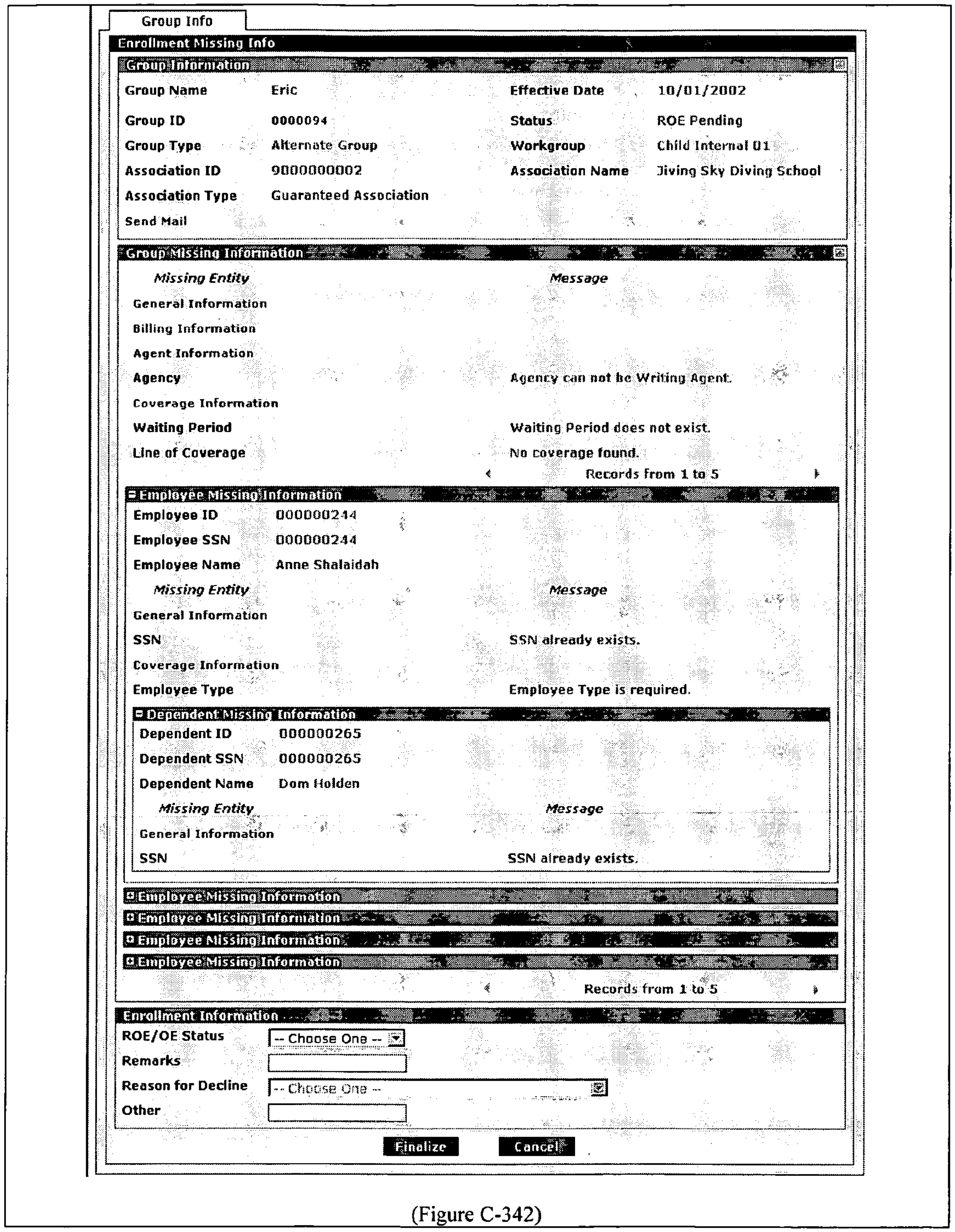
(Figure C-342)

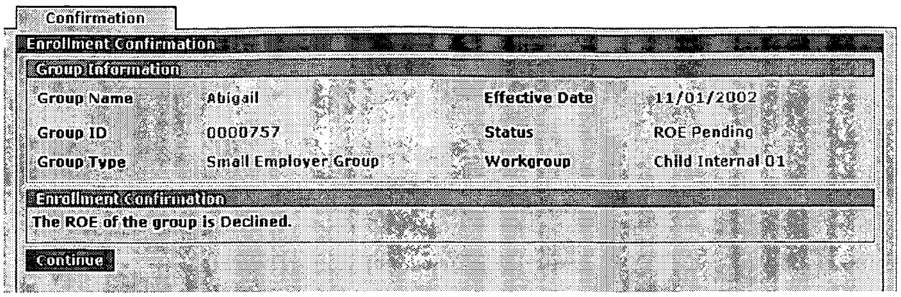
(Figure C-343)
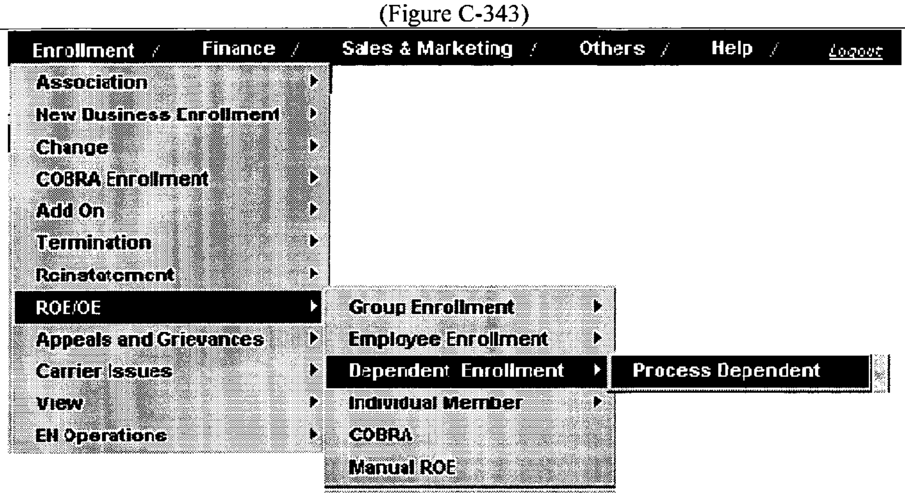
(Figure C-344)
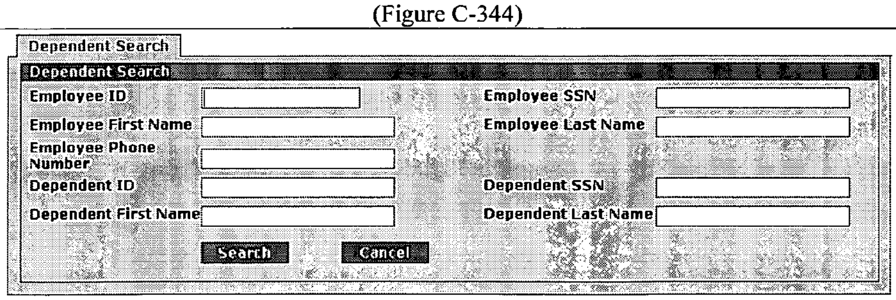
(Figure C-345)

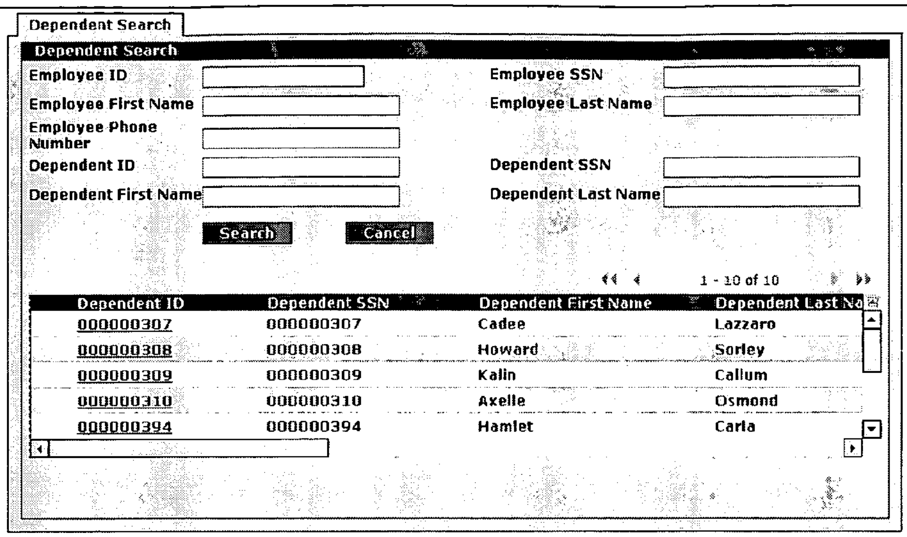
(Figure C-346)
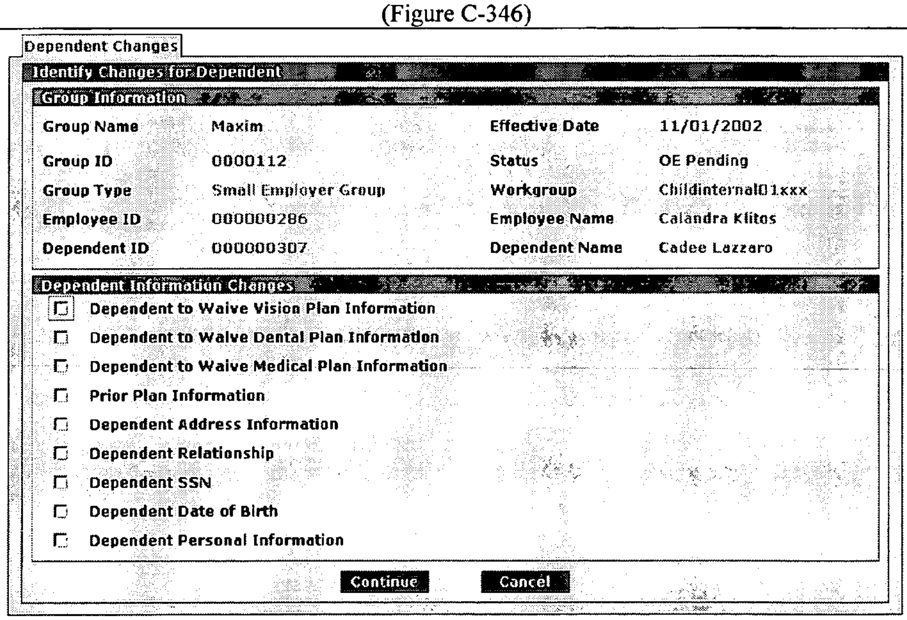
(Figure C-347)

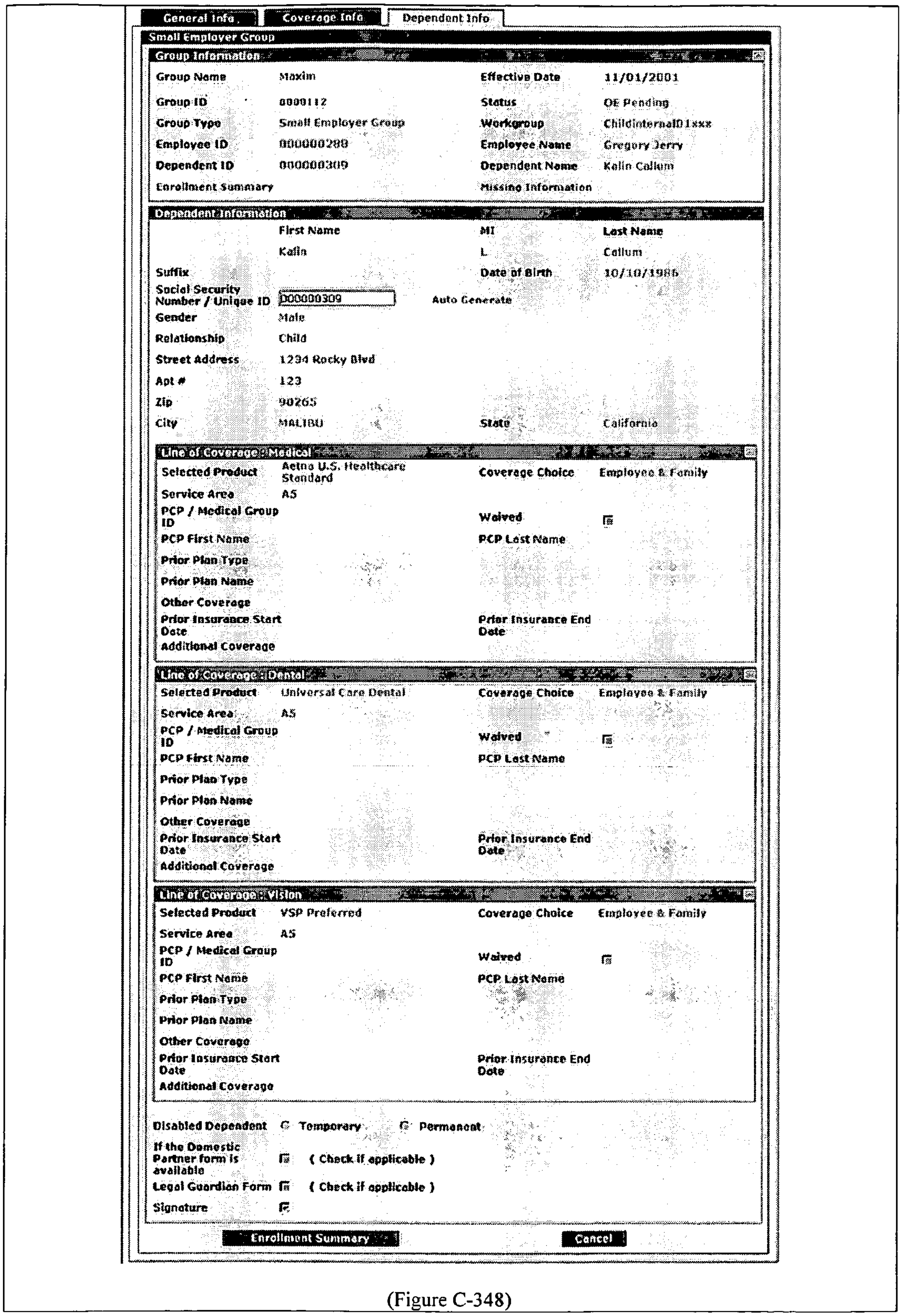
(Figure C-348)

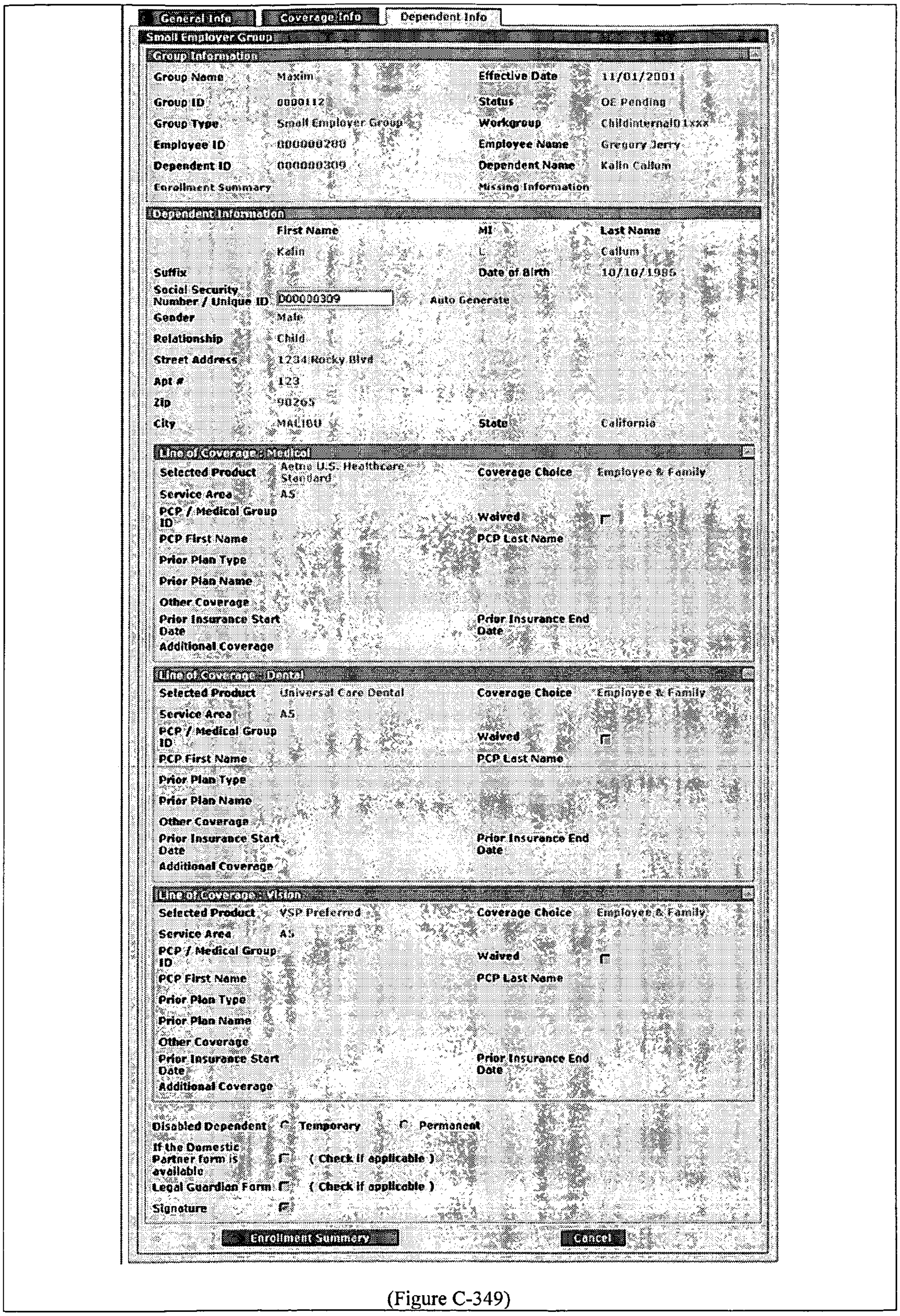
General Info | Coverage Info | Dependent Info

Small Employer Group

Group Information

| | | | |
|---|---|---|---|
| Group Name | Maxim | Effective Date | 11/01/2001 |
| Group ID | 0000112 | Status | OE Pending |
| Group Type | Small Employer Group | Workgroup | ChildinternalD1xxx |
| Employee ID | 000000200 | Employee Name | Gregory Jerry |
| Dependent ID | 000000309 | Dependent Name | Kalin Callum |
| Enrollment Summary | | Missing Information | |

Dependent Information

| | | | |
|---|---|---|---|
| | First Name | MI | Last Name |
| | Kalin | L | Callum |
| Suffix | | Date of Birth | 10/10/1985 |
| Social Security Number / Unique ID | 000000309 | Auto Generate | |
| Gender | Male | | |
| Relationship | Child | | |
| Street Address | 1234 Rocky Blvd | | |
| Apt # | 123 | | |
| Zip | 90265 | | |
| City | MALIBU | State | California |

Line of Coverage : Medical

| | | | |
|---|---|---|---|
| Selected Product | Aetna U.S. Healthcare Standard | Coverage Choice | Employee & Family |
| Service Area | AS | | |
| PCP / Medical Group ID | | Waived | ☐ |
| PCP First Name | | PCP Last Name | |
| Prior Plan Type | | | |
| Prior Plan Name | | | |
| Other Coverage | | | |
| Prior Insurance Start Date | | Prior Insurance End Date | |
| Additional Coverage | | | |

Line of Coverage : Dental

| | | | |
|---|---|---|---|
| Selected Product | Universal Care Dental | Coverage Choice | Employee & Family |
| Service Area | AS | | |
| PCP / Medical Group ID | | Waived | ☐ |
| PCP First Name | | PCP Last Name | |
| Prior Plan Type | | | |
| Prior Plan Name | | | |
| Other Coverage | | | |
| Prior Insurance Start Date | | Prior Insurance End Date | |
| Additional Coverage | | | |

Line of Coverage : Vision

| | | | |
|---|---|---|---|
| Selected Product | VSP Preferred | Coverage Choice | Employee & Family |
| Service Area | AS | | |
| PCP / Medical Group ID | | Waived | ☐ |
| PCP First Name | | PCP Last Name | |
| Prior Plan Type | | | |
| Prior Plan Name | | | |
| Other Coverage | | | |
| Prior Insurance Start Date | | Prior Insurance End Date | |
| Additional Coverage | | | |

Disabled Dependent ○ Temporary ○ Permanent

If the Domestic Partner form is available ☐ ( Check if applicable )

Legal Guardian Form ☐ ( Check if applicable )

Signature ☑

Enrollment Summary | Cancel (Figure C-349)

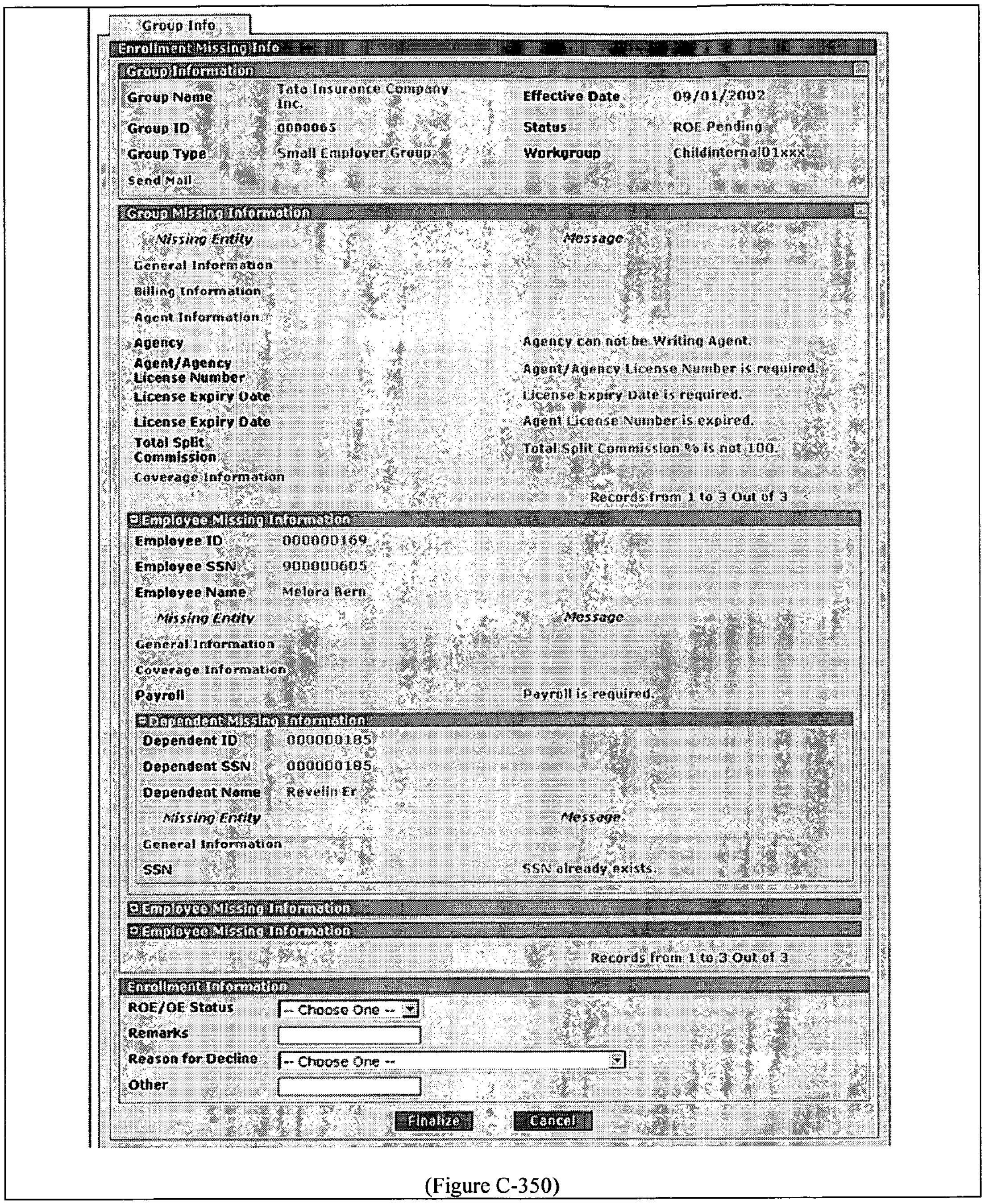

Group Info

Enrollment Missing Info

Group Information

| | | | |
|---|---|---|---|
| Group Name | Tata Insurance Company Inc. | Effective Date | 09/01/2002 |
| Group ID | 0000065 | Status | ROE Pending |
| Group Type | Small Employer Group | Workgroup | ChildInternal01xxx |
| Send Mail | | | |

Group Missing Information

| Missing Entity | Message |
|---|---|
| General Information | |
| Billing Information | |
| Agent Information | |
| Agency | Agency can not be Writing Agent. |
| Agent/Agency License Number | Agent/Agency License Number is required. |
| License Expiry Date | License Expiry Date is required. |
| License Expiry Date | Agent License Number is expired. |
| Total Split Commission | Total Split Commission % is not 100. |
| Coverage Information | |

Records from 1 to 3 Out of 3

Employee Missing Information

| | |
|---|---|
| Employee ID | 000000169 |
| Employee SSN | 900000605 |
| Employee Name | Melora Bern |

| Missing Entity | Message |
|---|---|
| General Information | |
| Coverage Information | |
| Payroll | Payroll is required. |

Dependent Missing Information

| | |
|---|---|
| Dependent ID | 000000185 |
| Dependent SSN | 000000185 |
| Dependent Name | Revelin Er |

| Missing Entity | Message |
|---|---|
| General Information | |
| SSN | SSN already exists. |

Employee Missing Information

Employee Missing Information

Records from 1 to 3 Out of 3

Enrollment Information

| | |
|---|---|
| ROE/OE Status | -- Choose One -- |
| Remarks | |
| Reason for Decline | -- Choose One -- |
| Other | |

Finalize Cancel (Figure C-350)

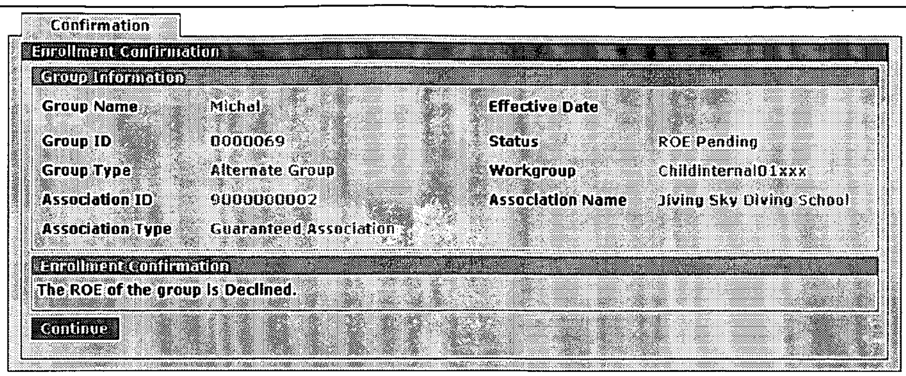
(Figure C-351)
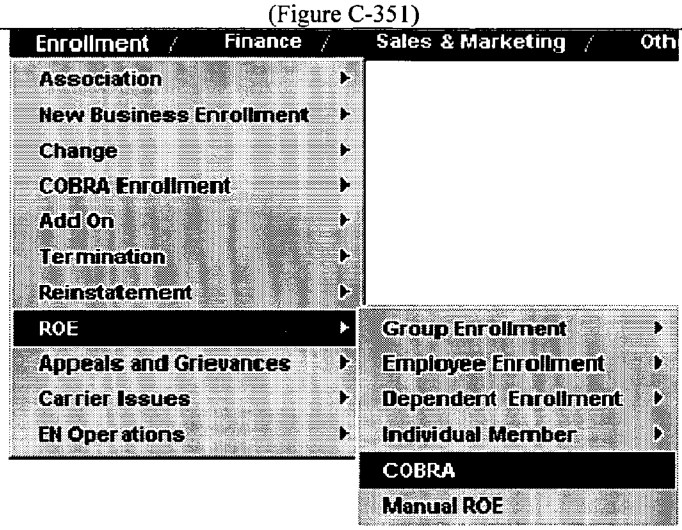
(Figure C-352)
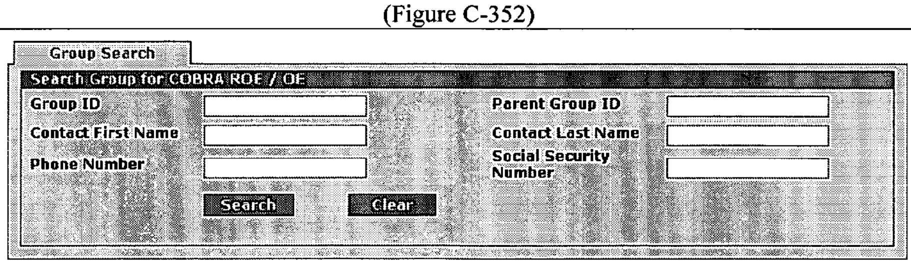
(Figure C-353)

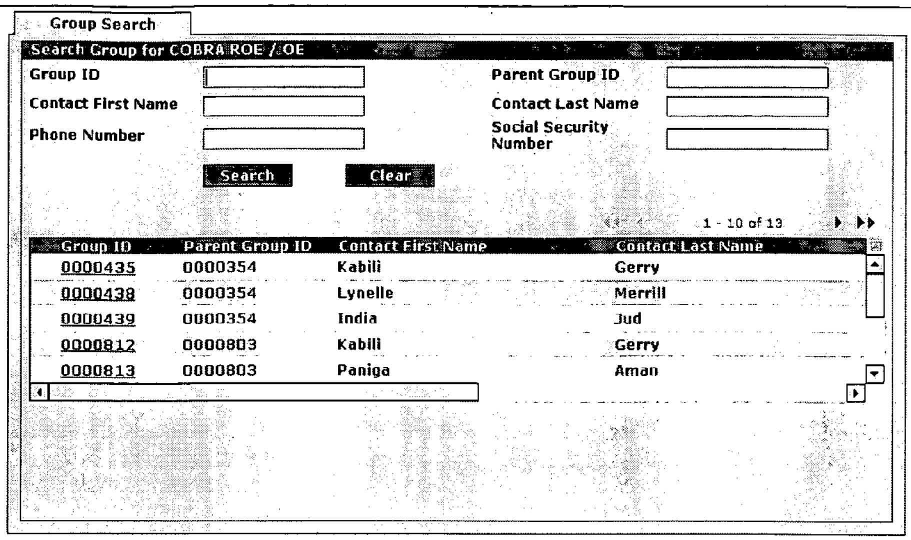
(Figure C-354)
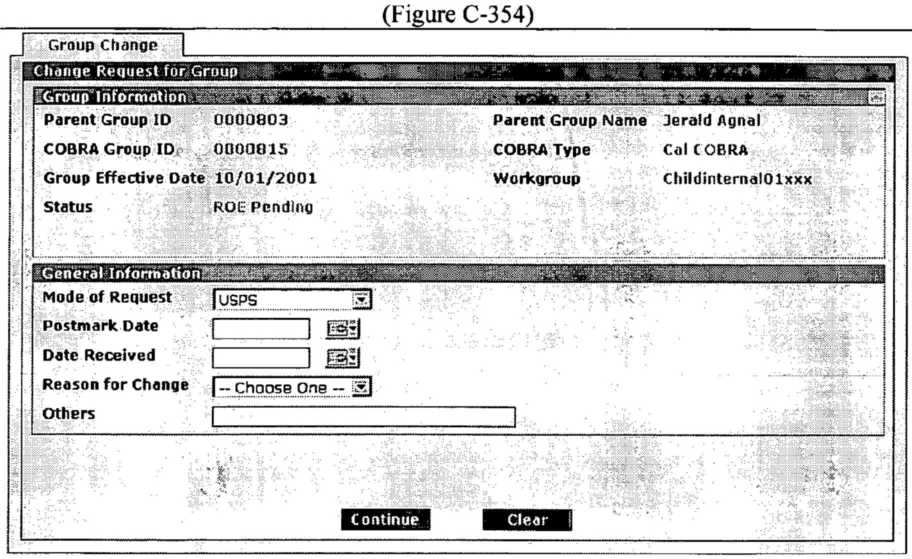
(Figure C-355)

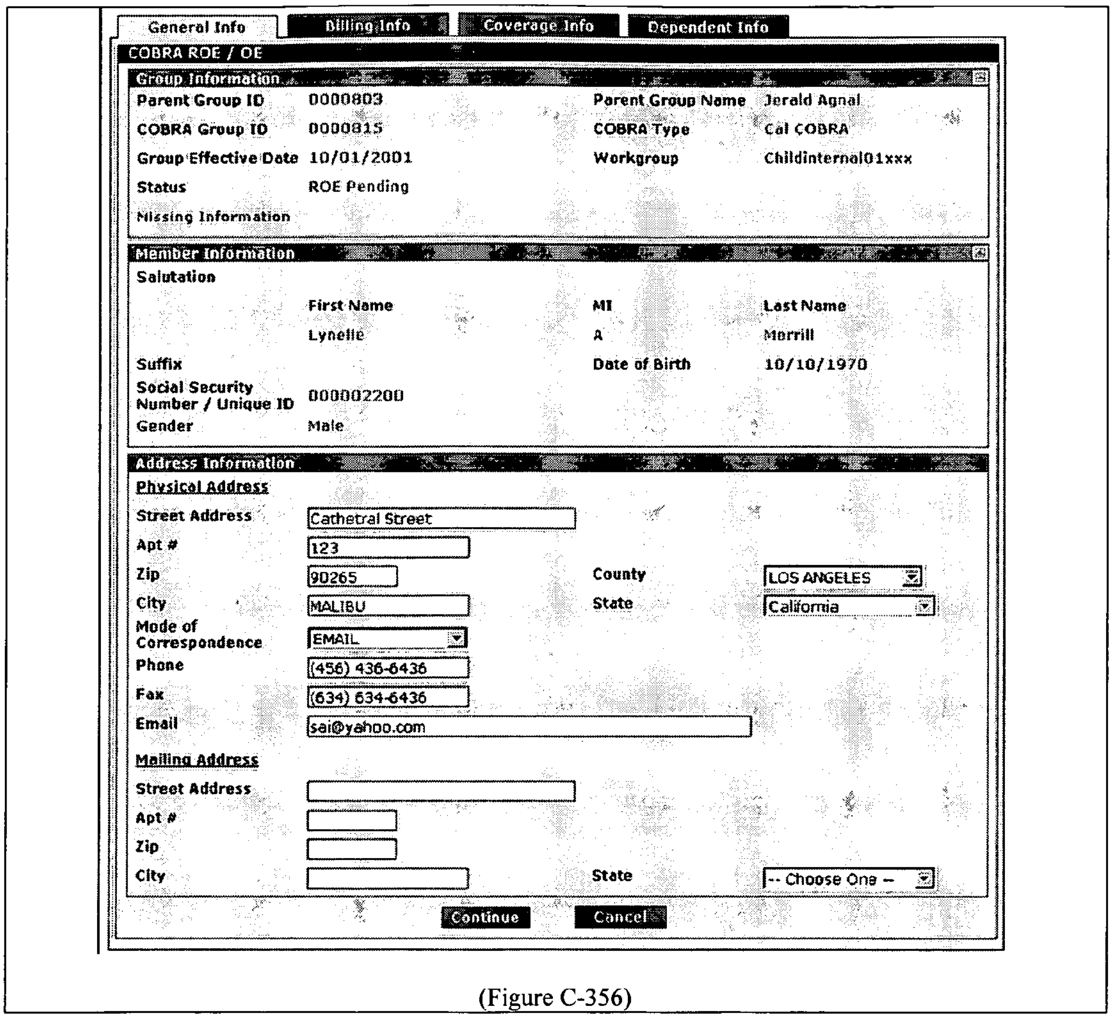
(Figure C-356)

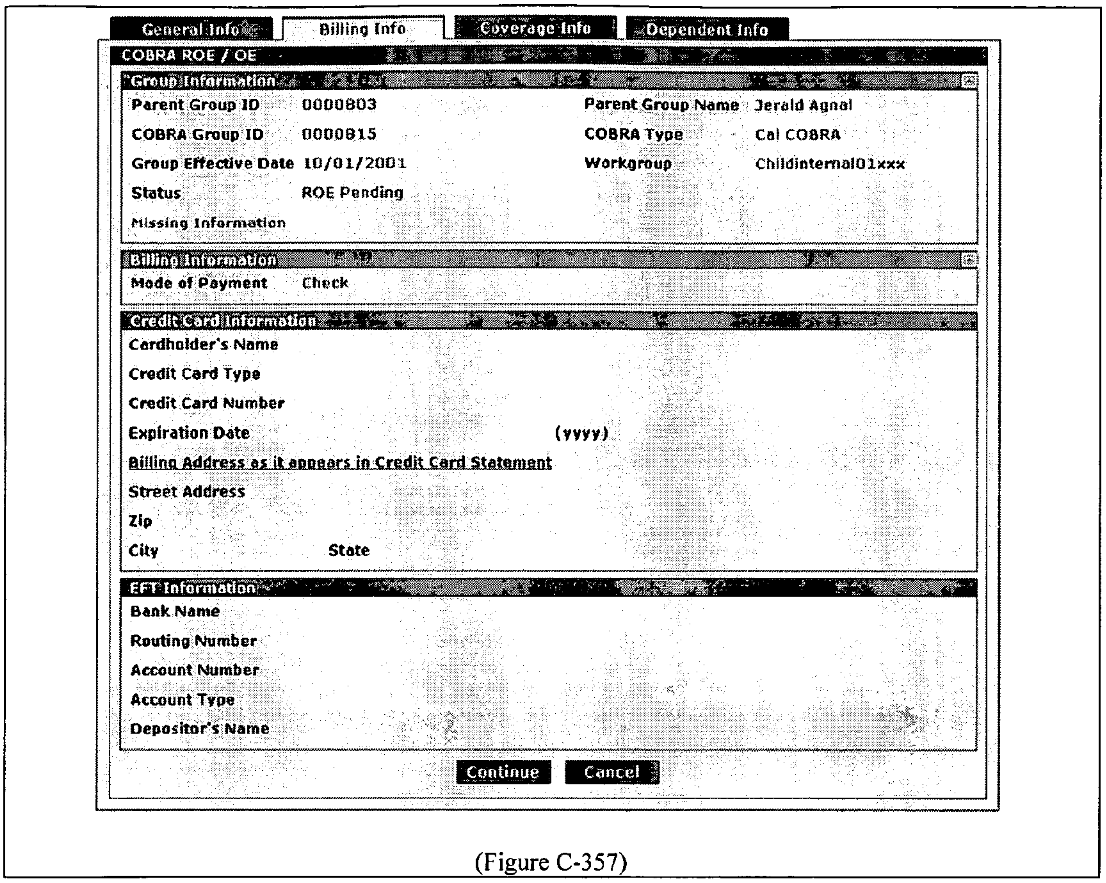
(Figure C-357)

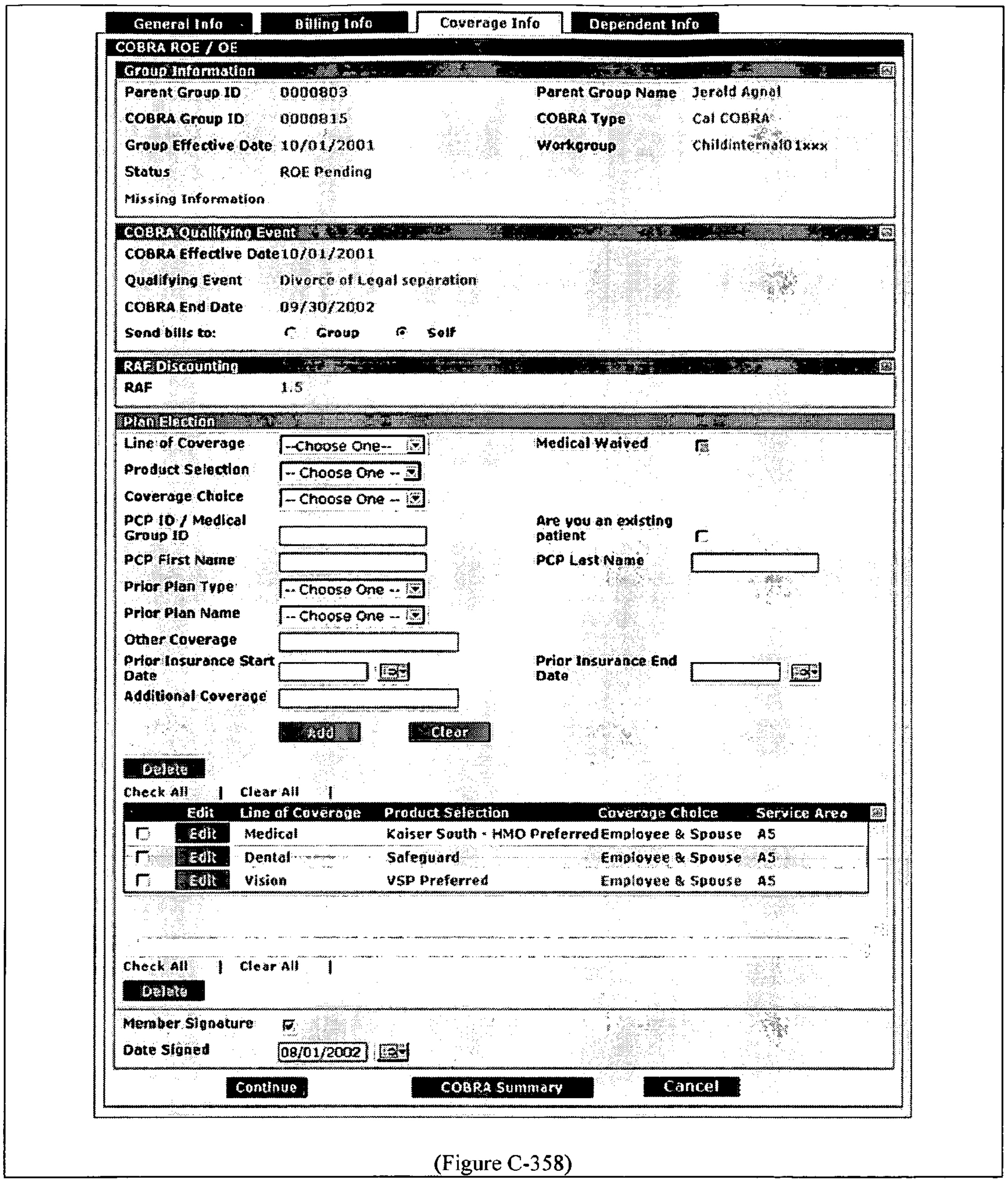
(Figure C-358)

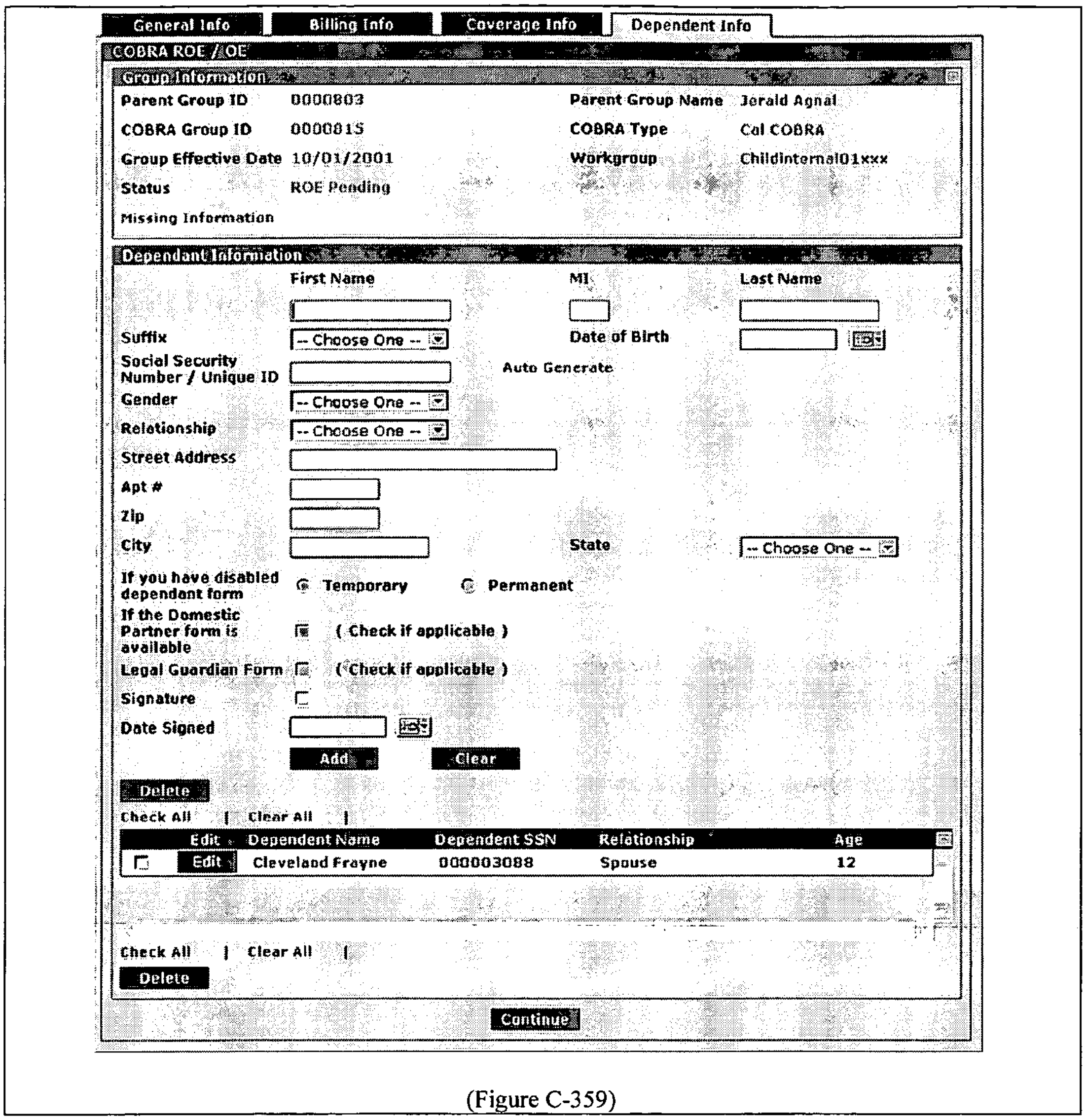
(Figure C-359)

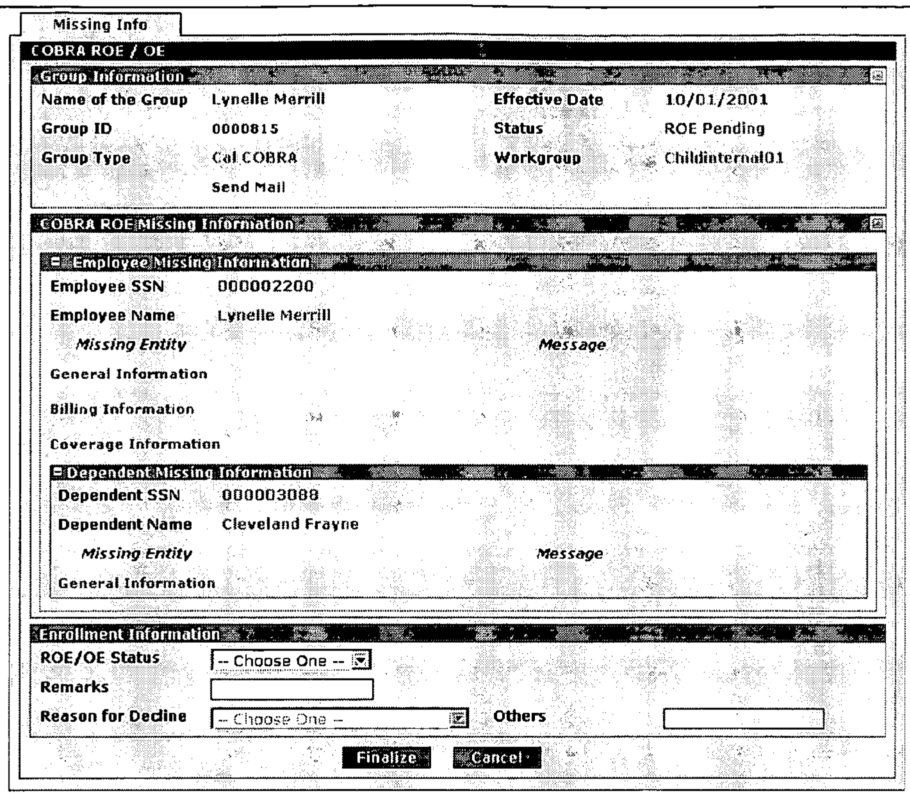
(Figure C-360)
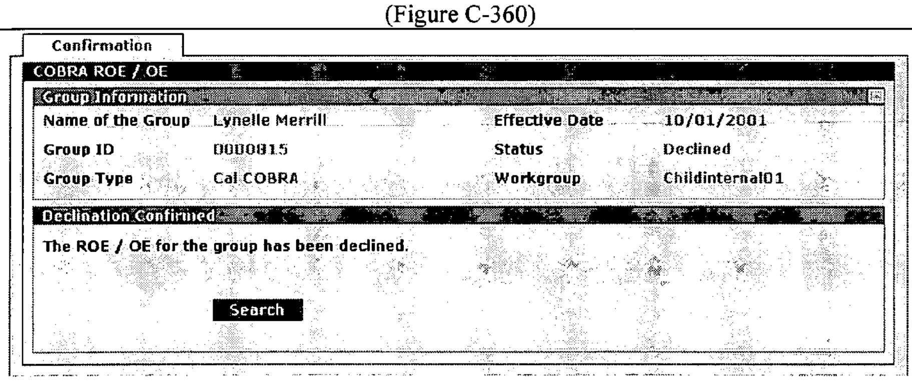
(Figure C-361)

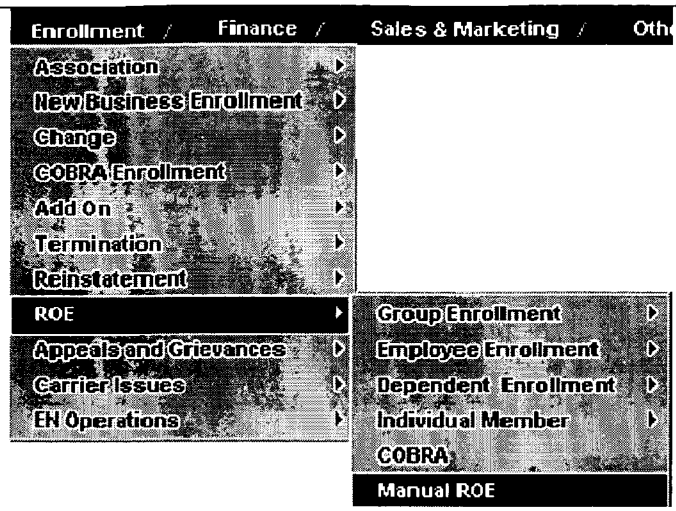
(Figure C-362)
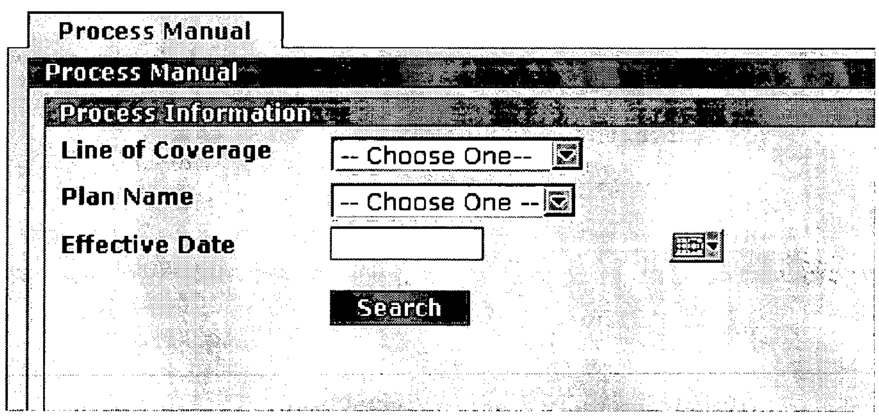
(Figure C-363)
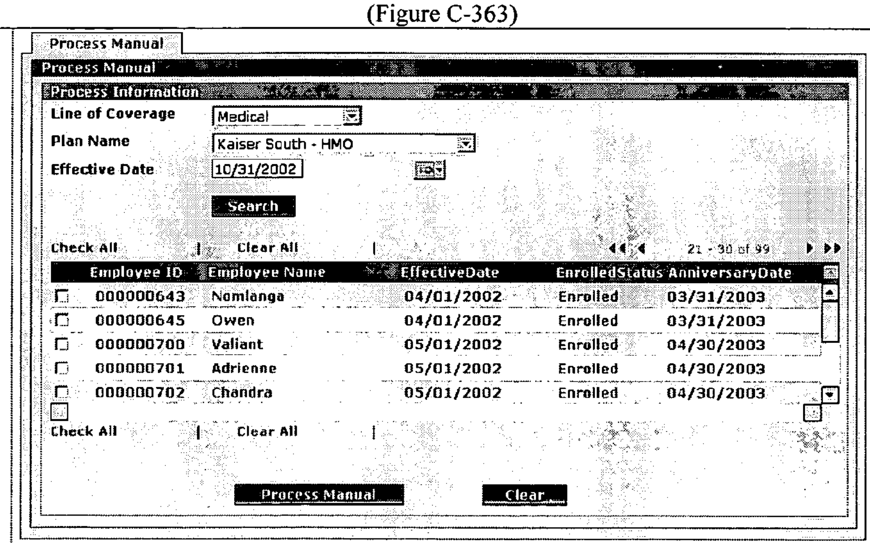
(Figure C-364)

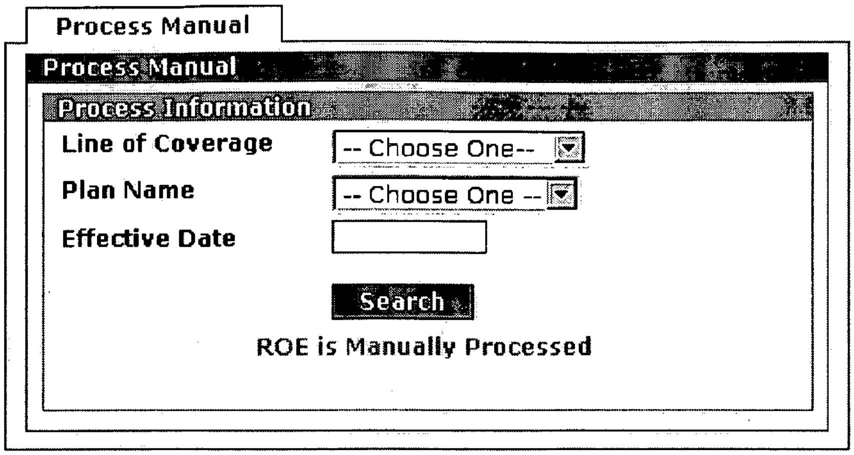
(Figure C-365)
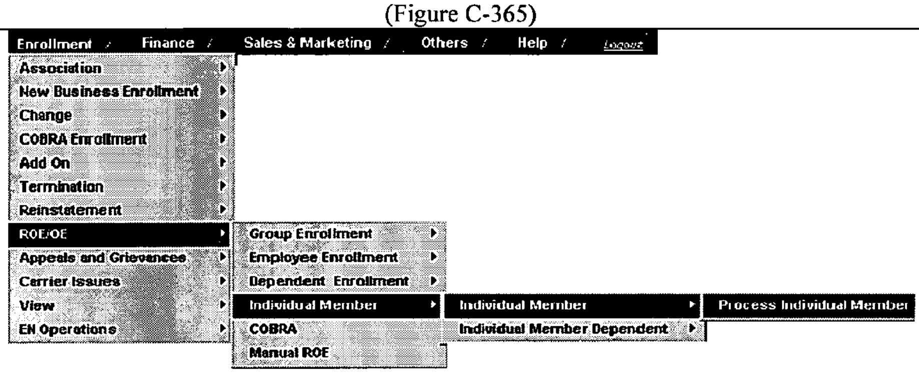
(Figure C-366)
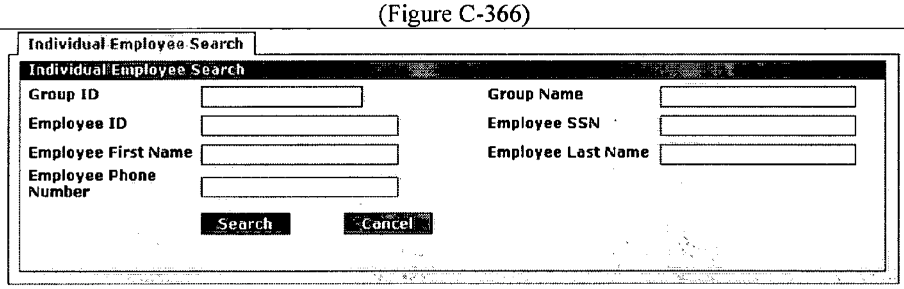
(Figure C-367)

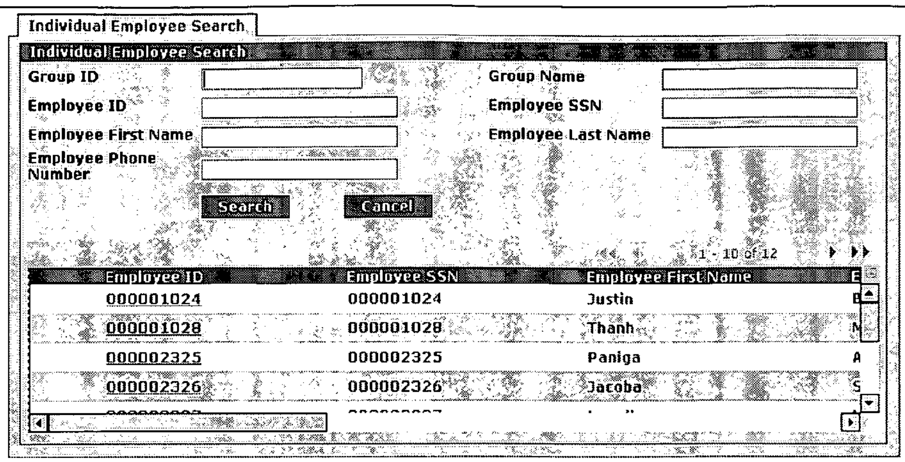
(Figure C-368)
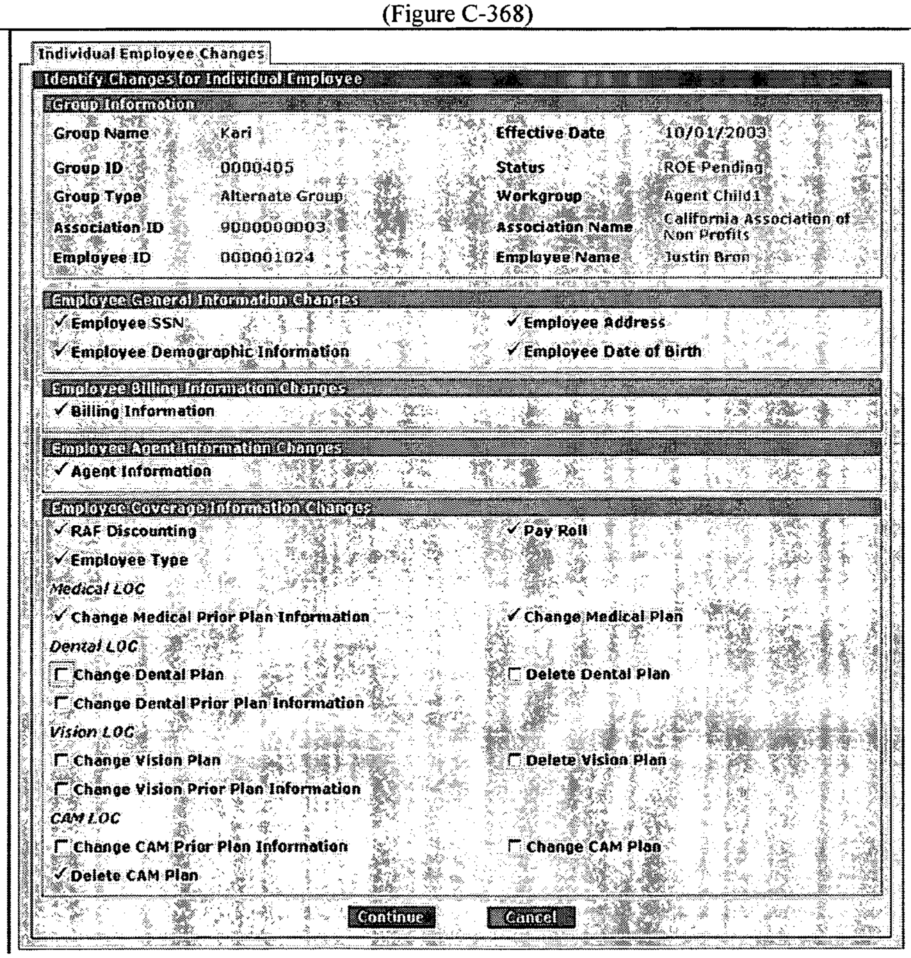
(Figure C-369)

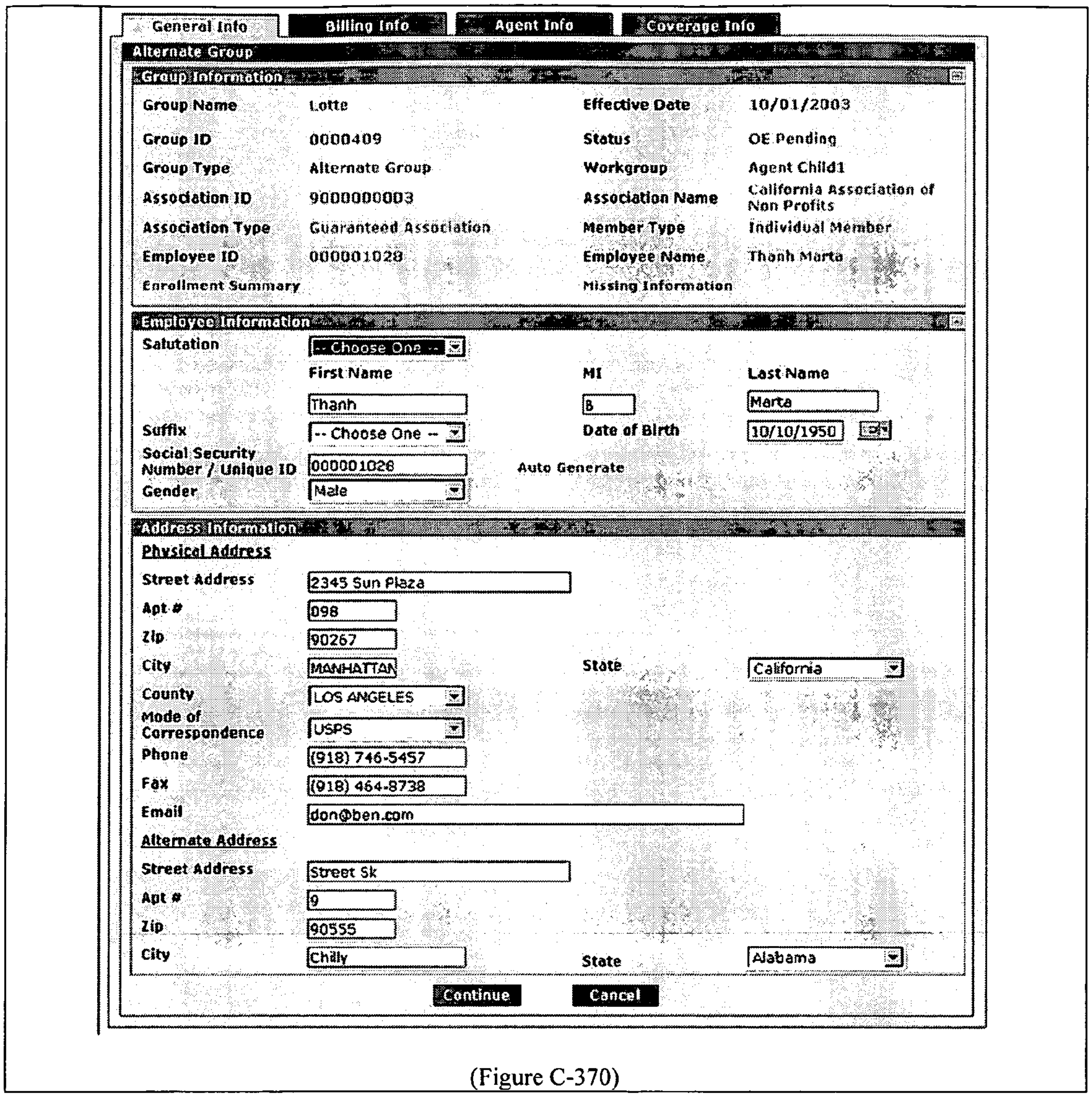
General Info | Billing Info | Agent Info | Coverage Info

Alternate Group

Group Information

| | | | |
|---|---|---|---|
| Group Name | Lotte | Effective Date | 10/01/2003 |
| Group ID | 0000409 | Status | OE Pending |
| Group Type | Alternate Group | Workgroup | Agent Child1 |
| Association ID | 9000000003 | Association Name | California Association of Non Profits |
| Association Type | Guaranteed Association | Member Type | Individual Member |
| Employee ID | 000001028 | Employee Name | Thanh Marta |
| Enrollment Summary | | Missing Information | |

Employee Information

Salutation: -- Choose One --

First Name: Thanh | MI: B | Last Name: Marta

Suffix: -- Choose One -- | Date of Birth: 10/10/1950

Social Security Number / Unique ID: 000001026 | Auto Generate

Gender: Male

Address Information

Physical Address

Street Address: 2345 Sun Plaza

Apt #: 098

Zip: 90267

City: MANHATTAN | State: California

County: LOS ANGELES

Mode of Correspondence: USPS

Phone: (918) 746-5457

Fax: (918) 464-8738

Email: don@ben.com

Alternate Address

Street Address: Street Sk

Apt #: 9

Zip: 90555

City: Chilly | State: Alabama

Continue | Cancel (Figure C-370)

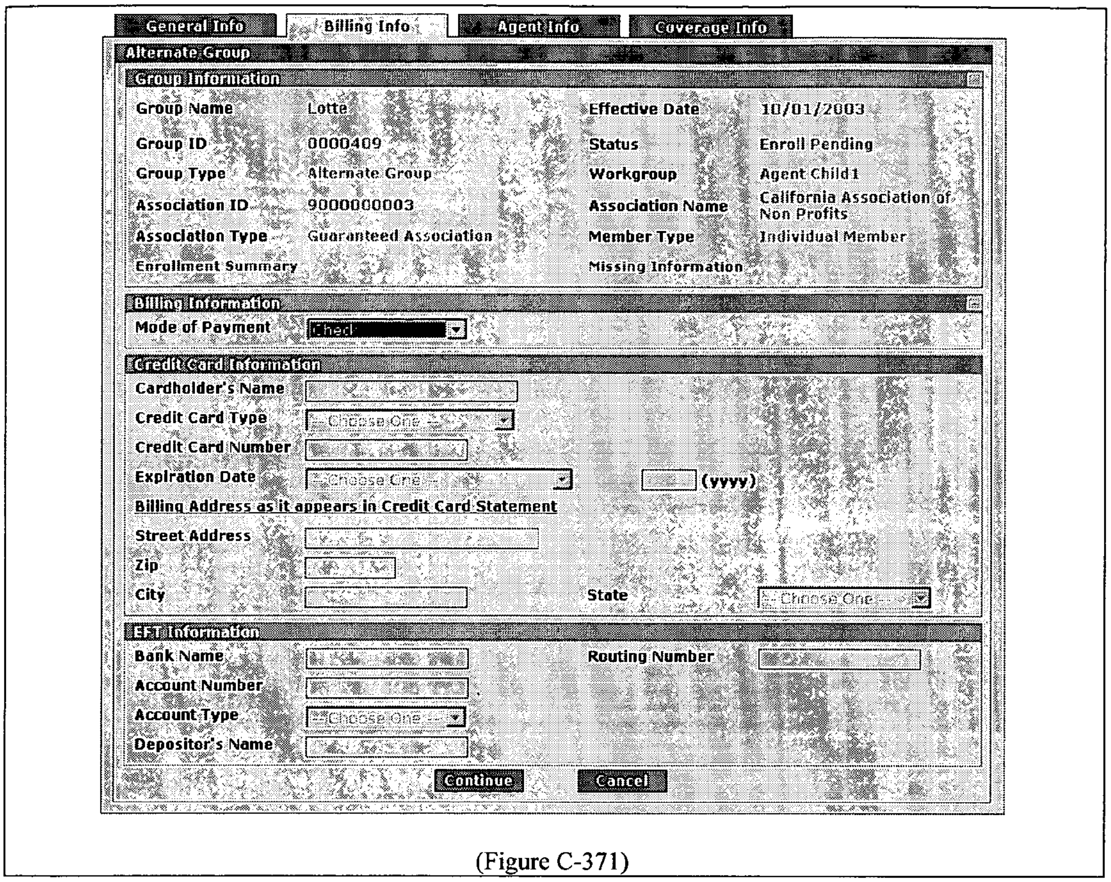
(Figure C-371)

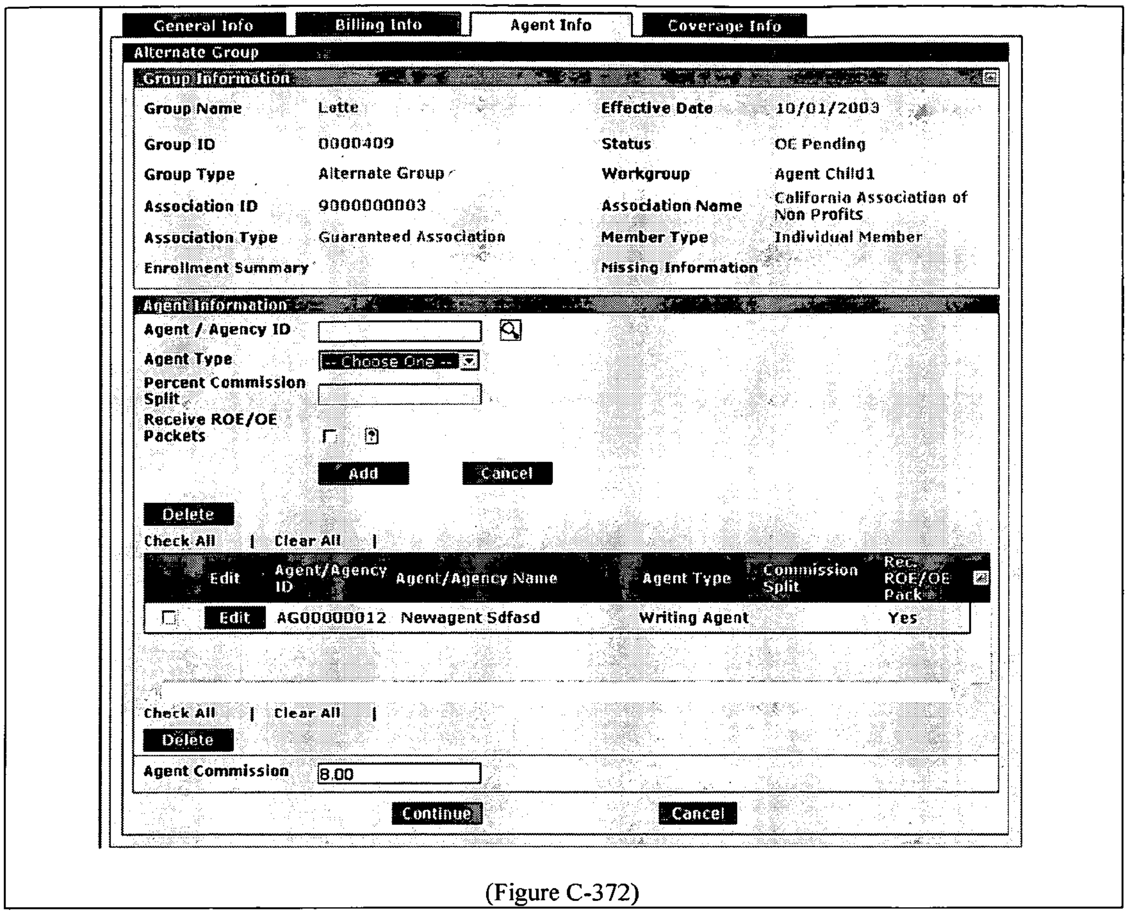
(Figure C-372)

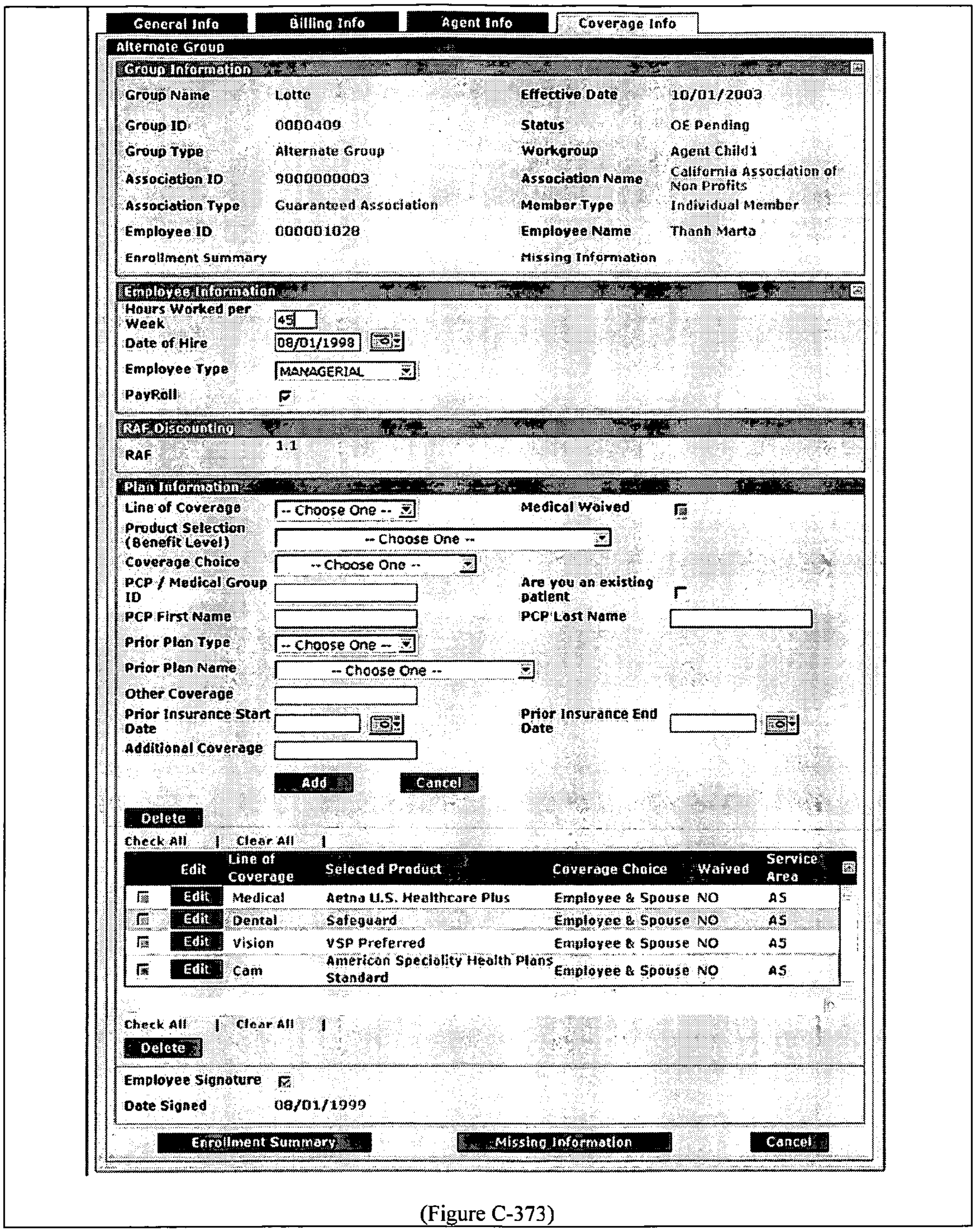
(Figure C-373)

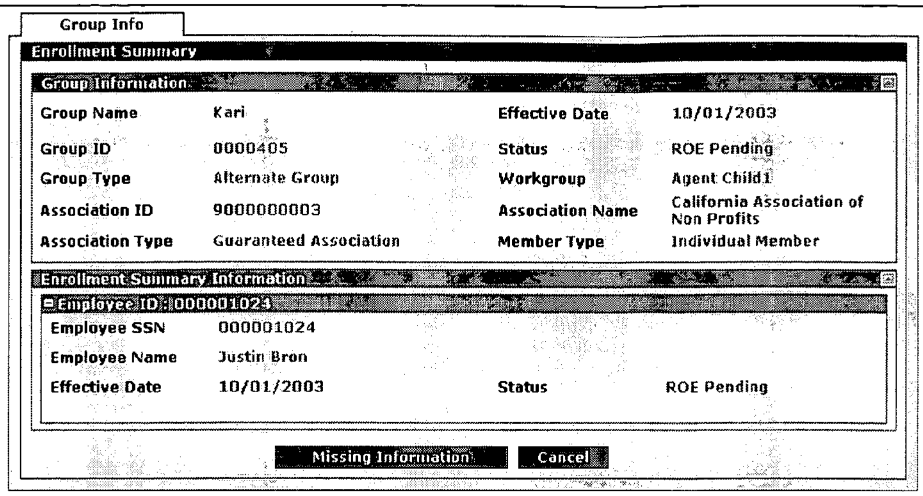
(Figure C-374)
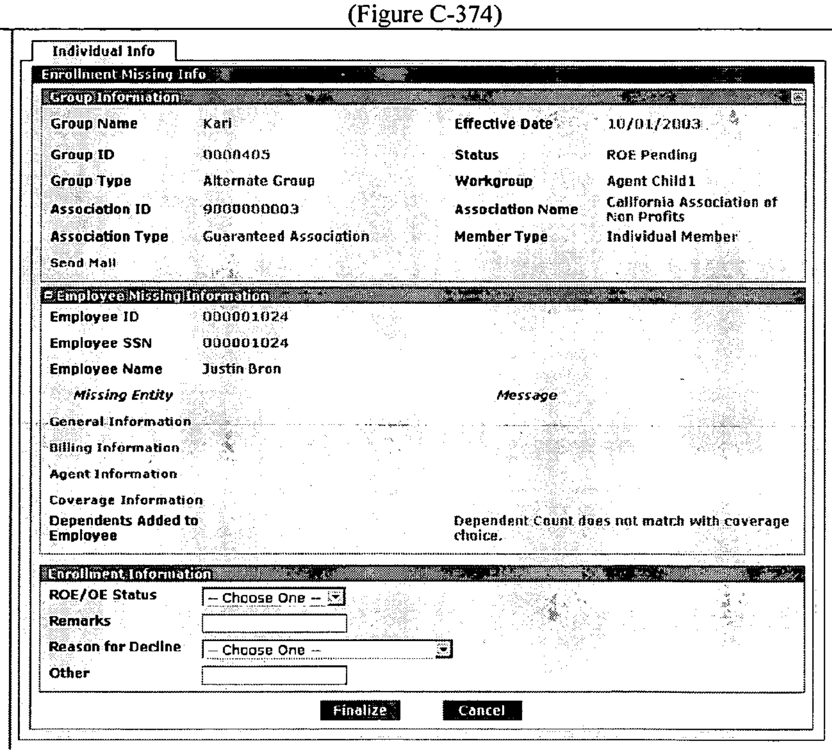
(Figure C-375)

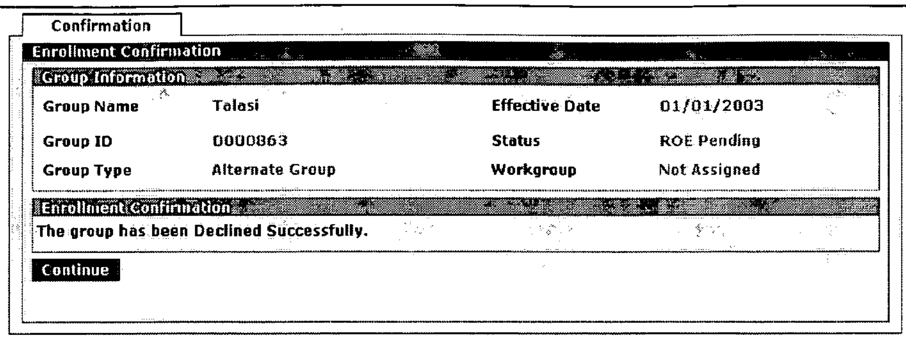
(Figure C-376)
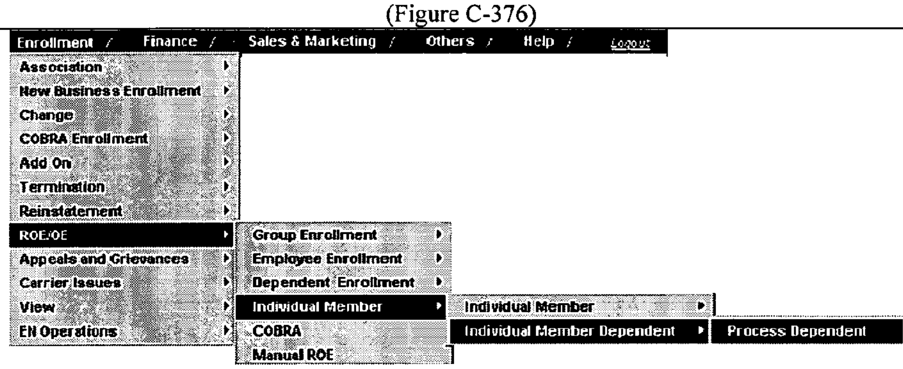
(Figure C-377)
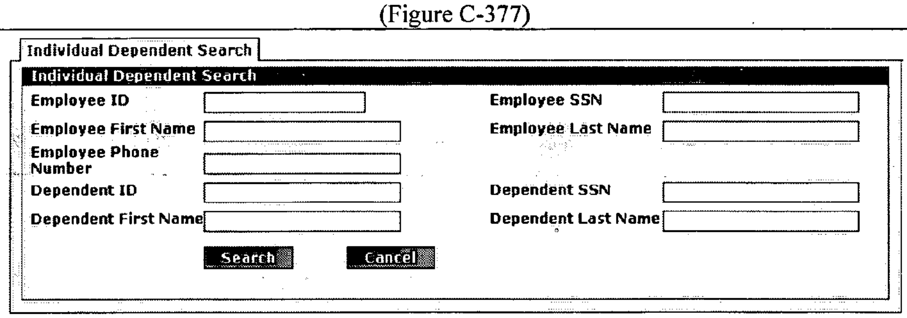
(Figure C-378)

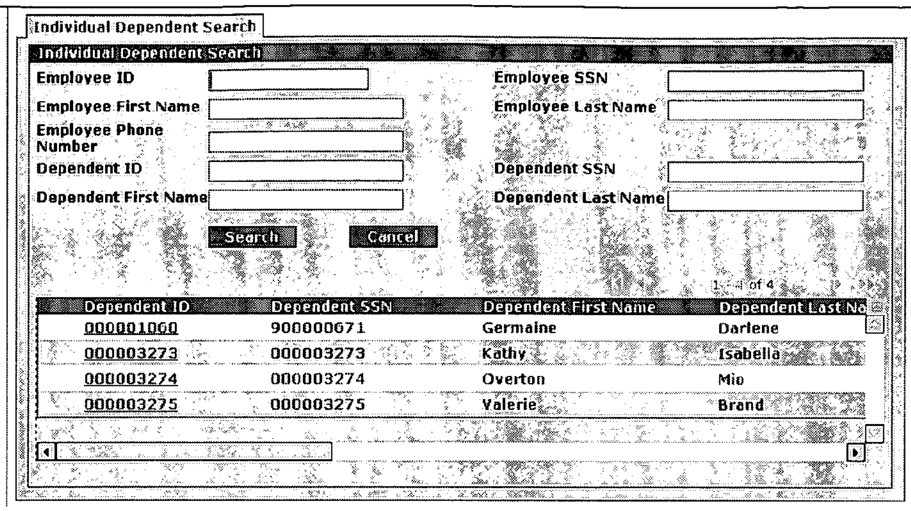
(Figure C-379)
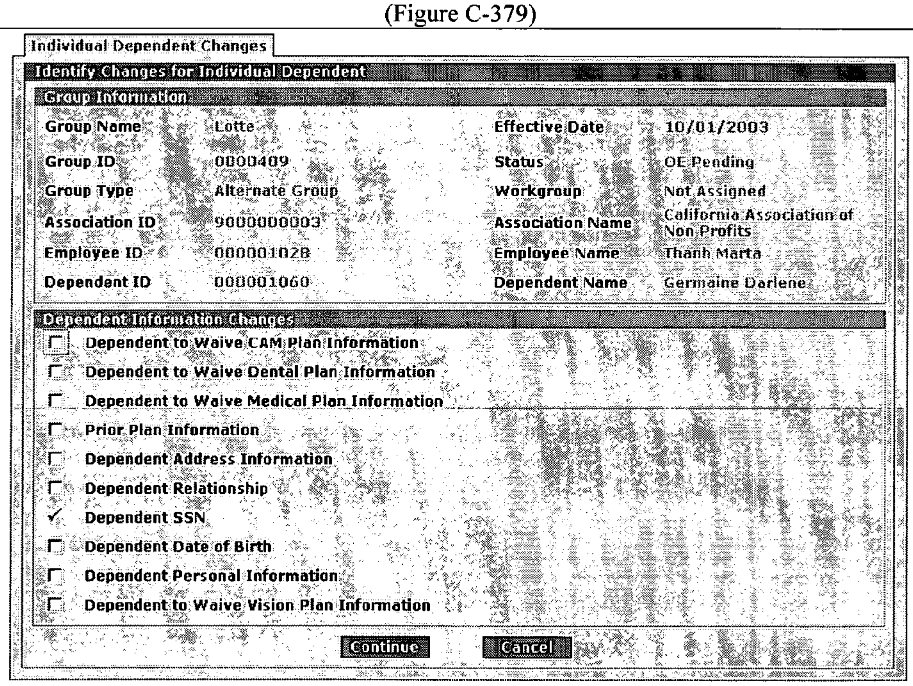
(Figure C-380)

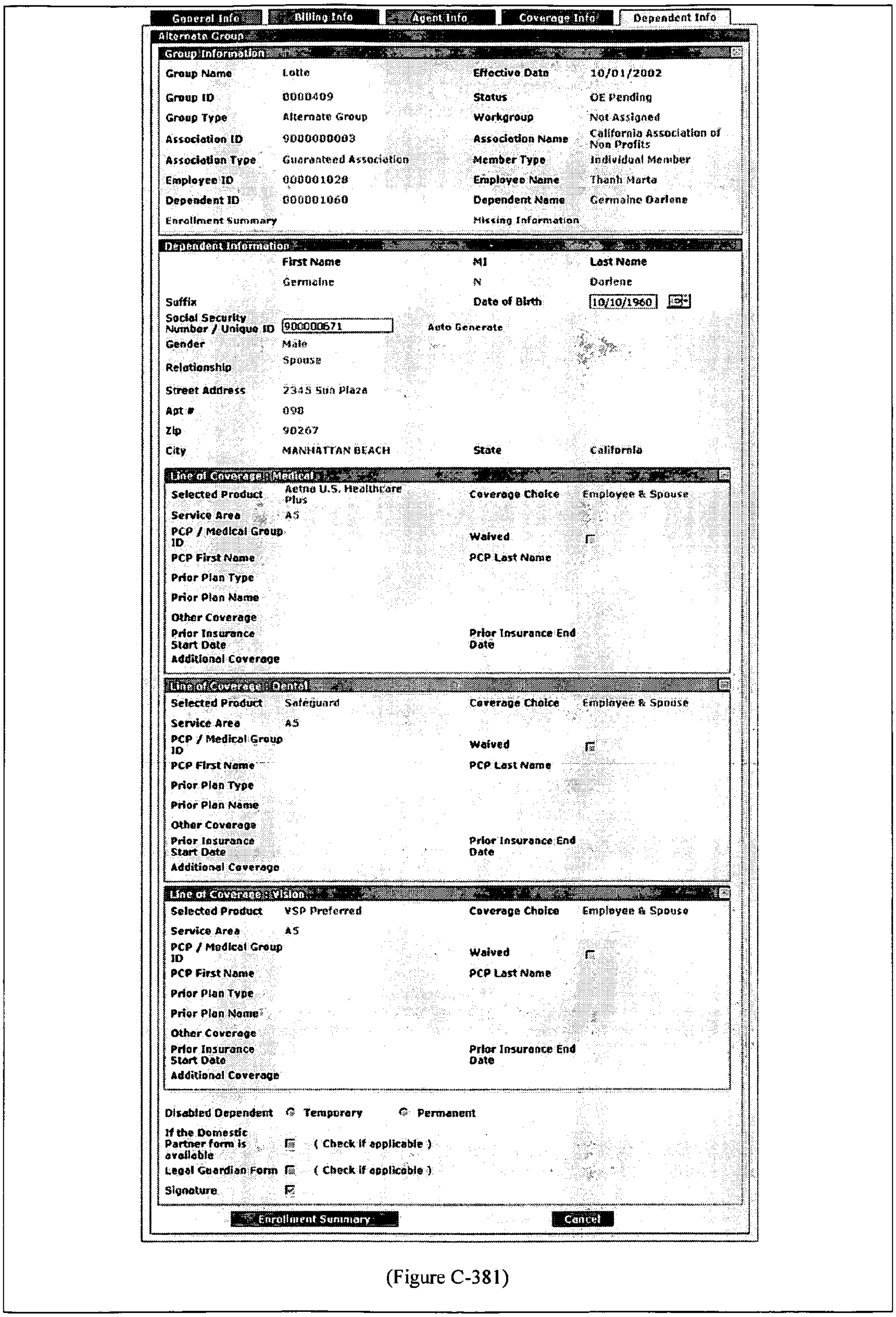
(Figure C-381)

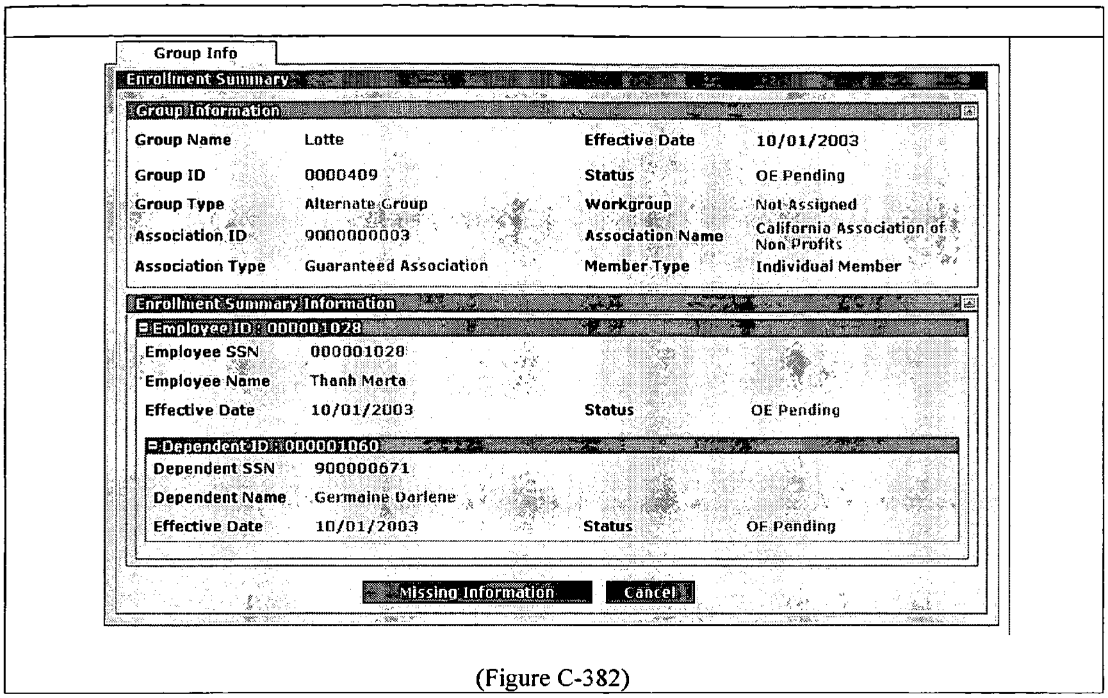
(Figure C-382)

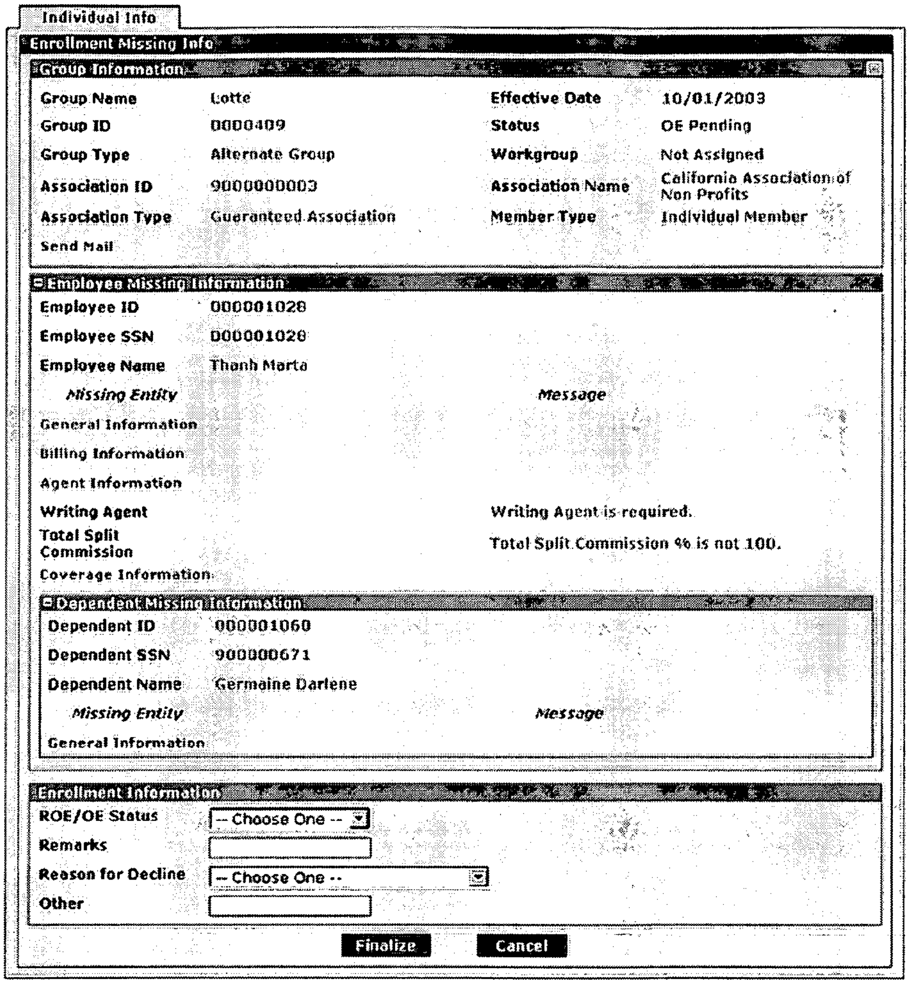
(Figure C-383)
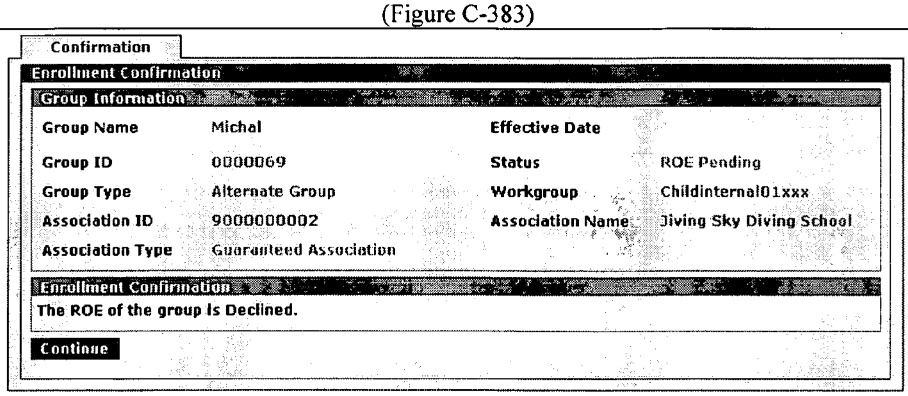
(Figure C-384)

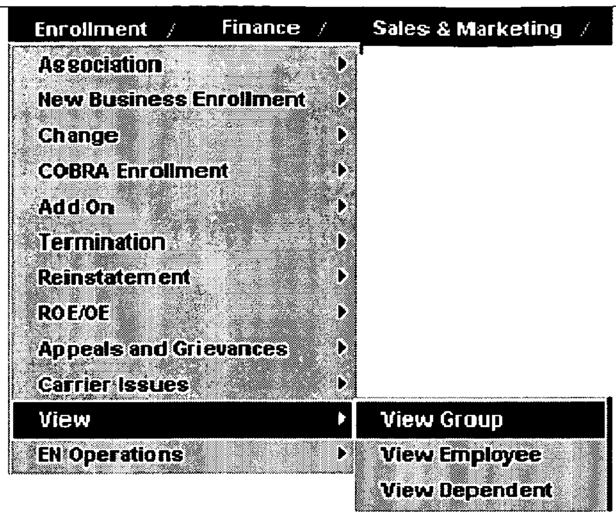
(Figure C-385)
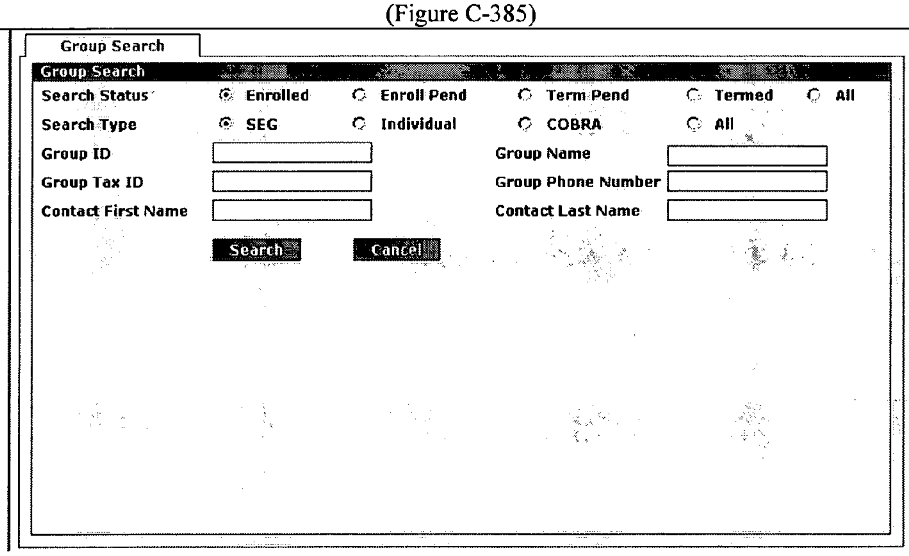
(Figure C-386)

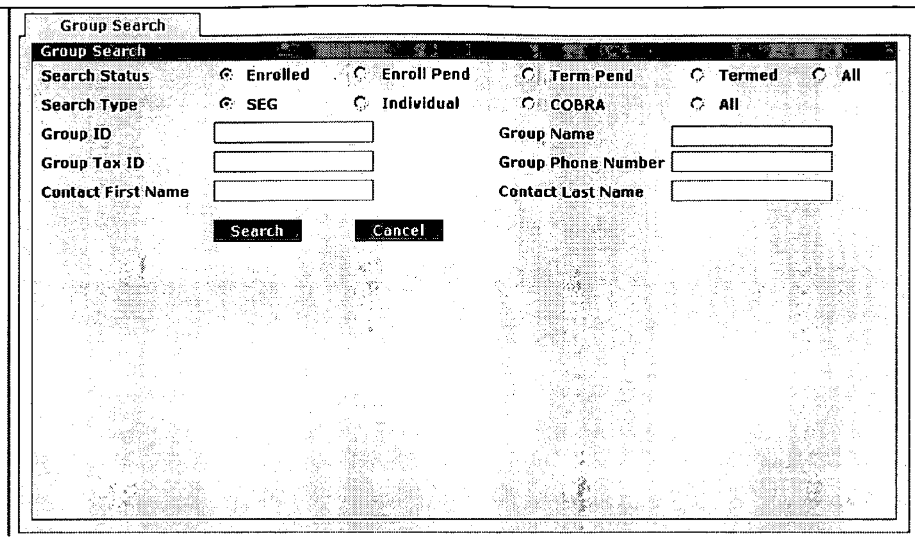
(Figure C-387)
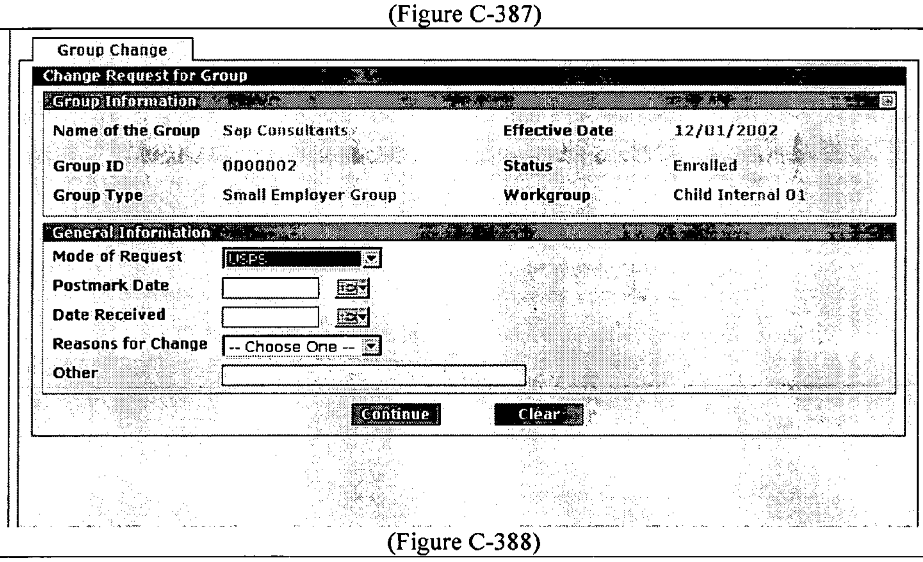
(Figure C-388)

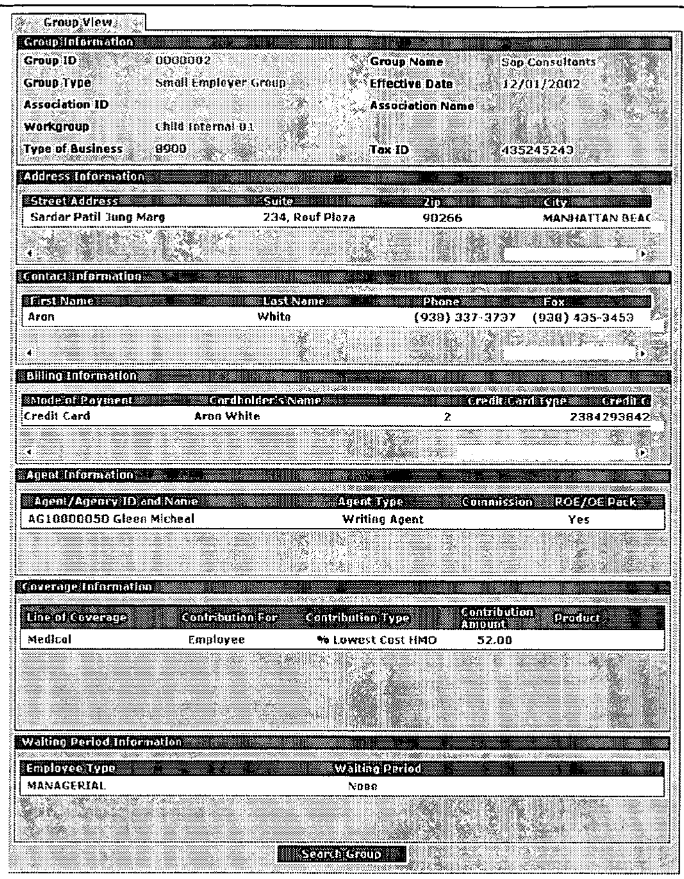
(Figure C-389)
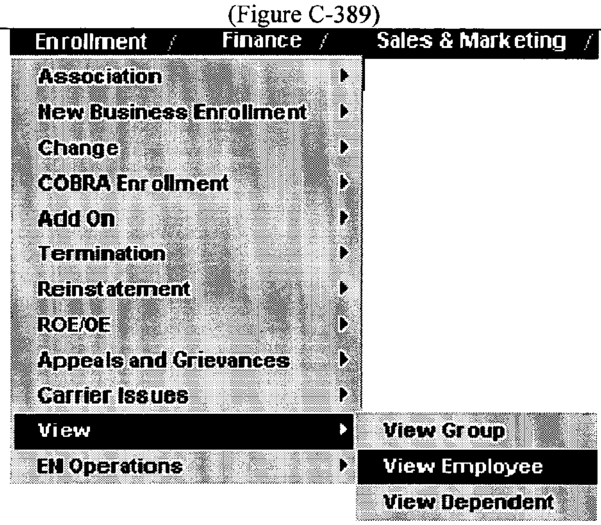
(Figure C-390)

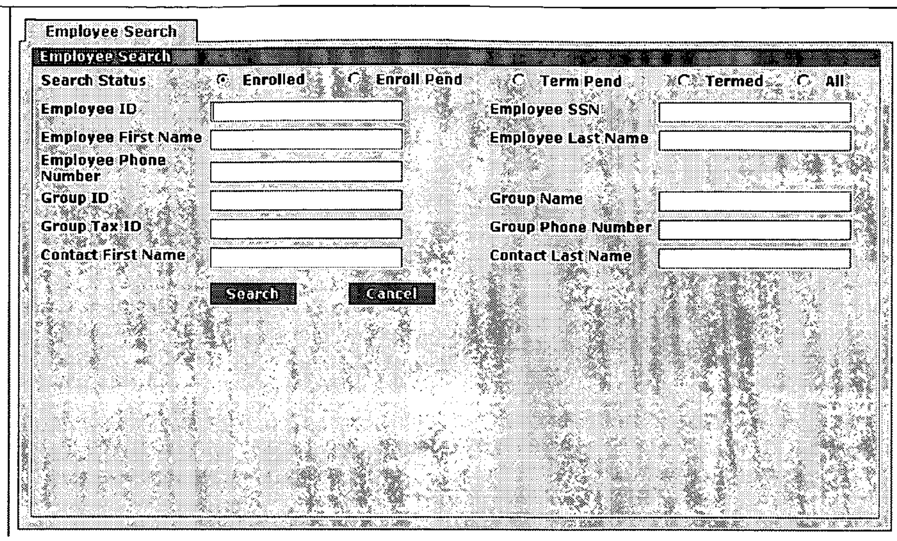
(Figure C-391)
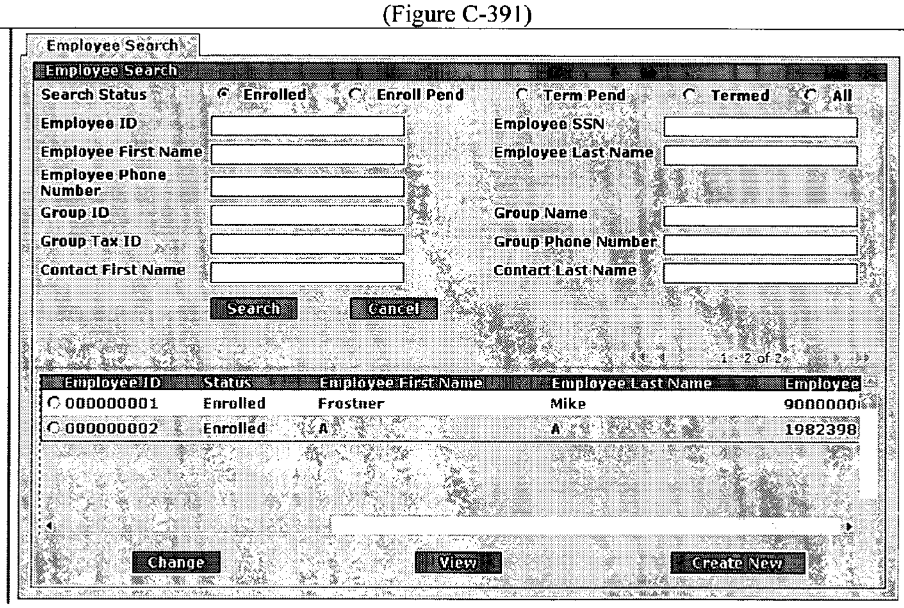
(Figure C-392)

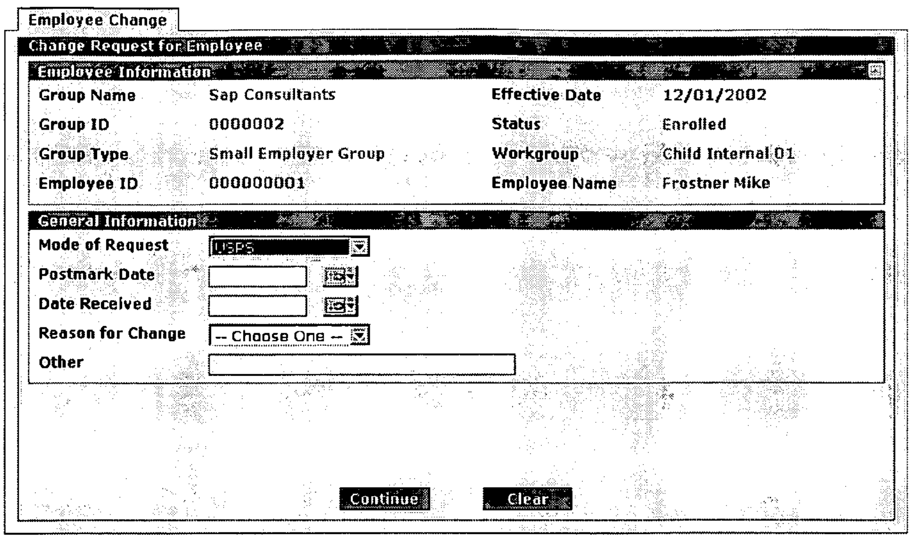
(Figure C-393)
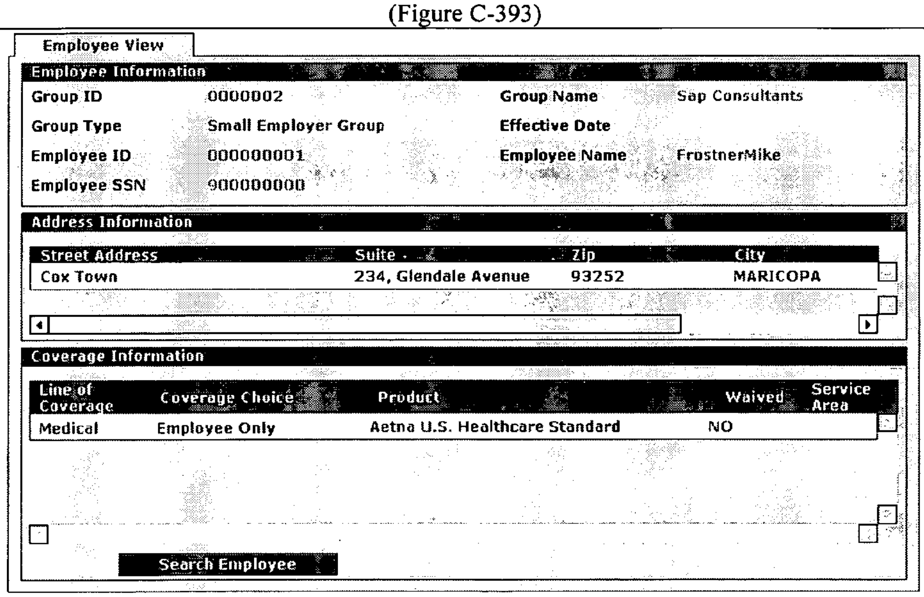
(Figure C-394)

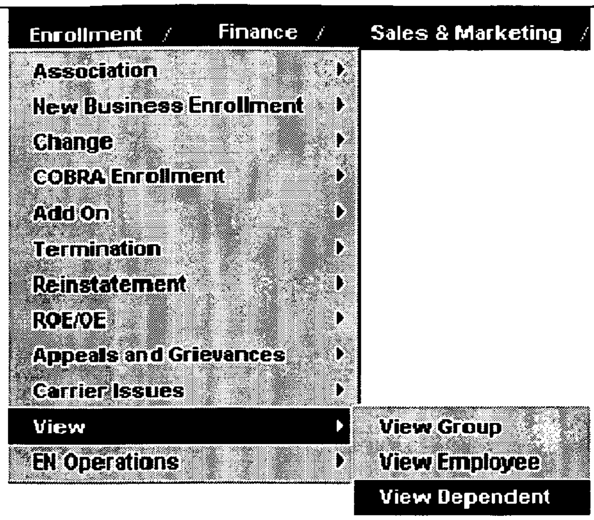
(Figure C-395)
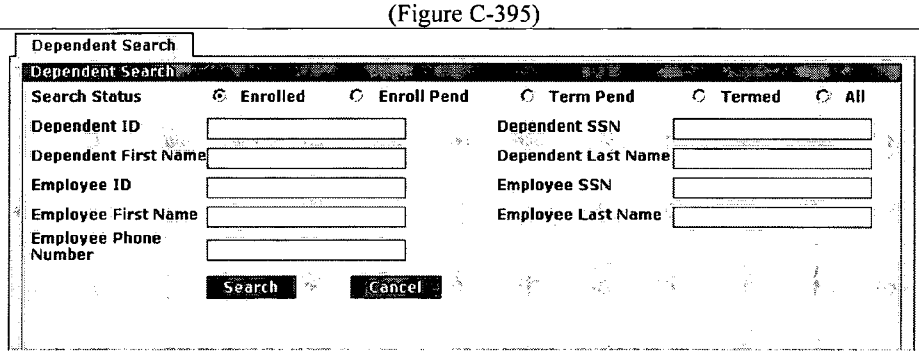
(Figure C-396)
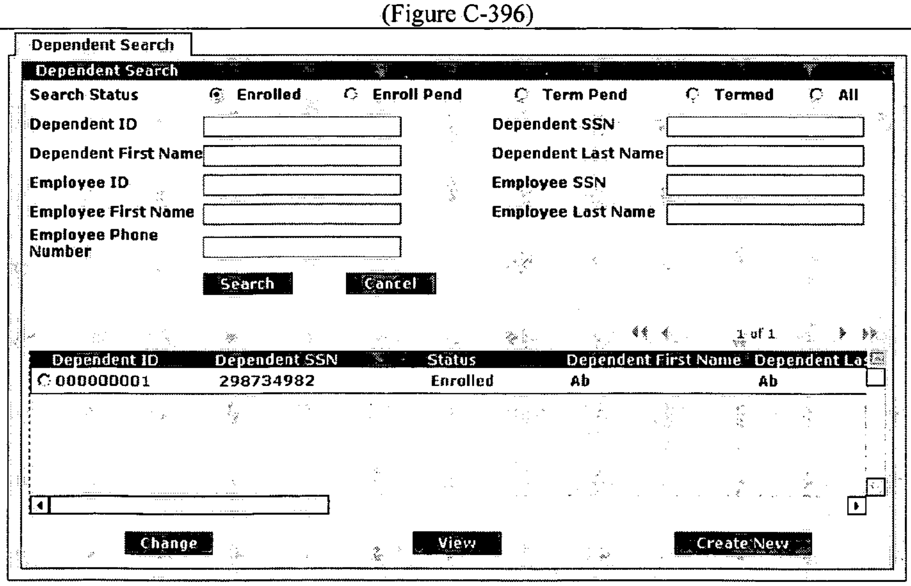
(Figure C-397)

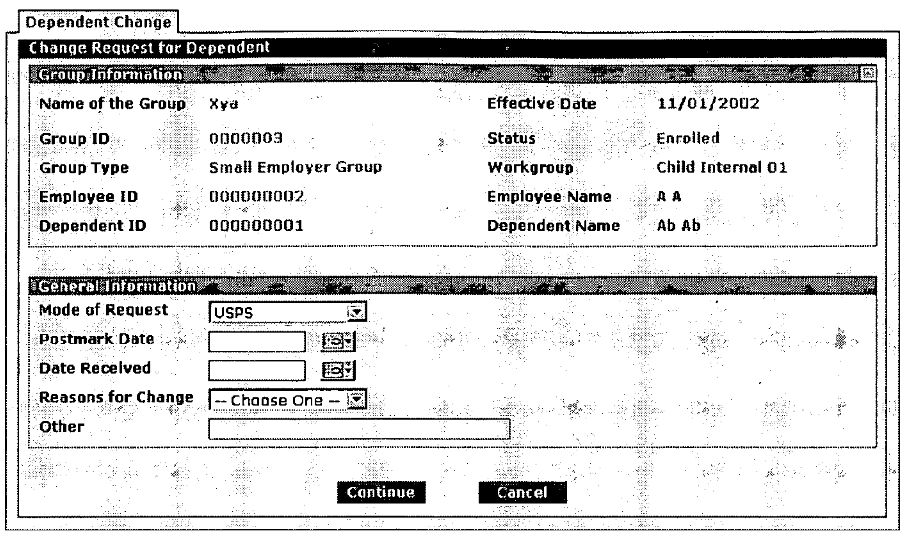
(Figure C-398)
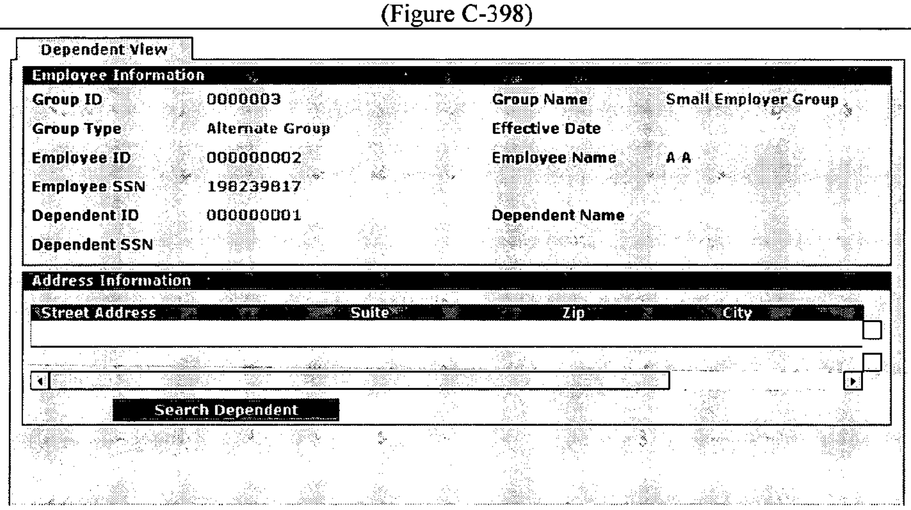
(Figure C-399)

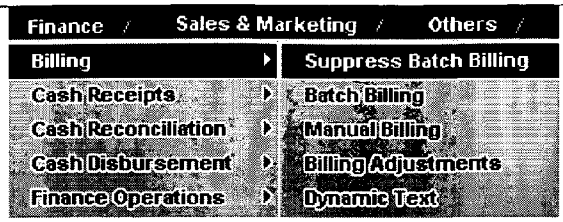
(Figure D-1)
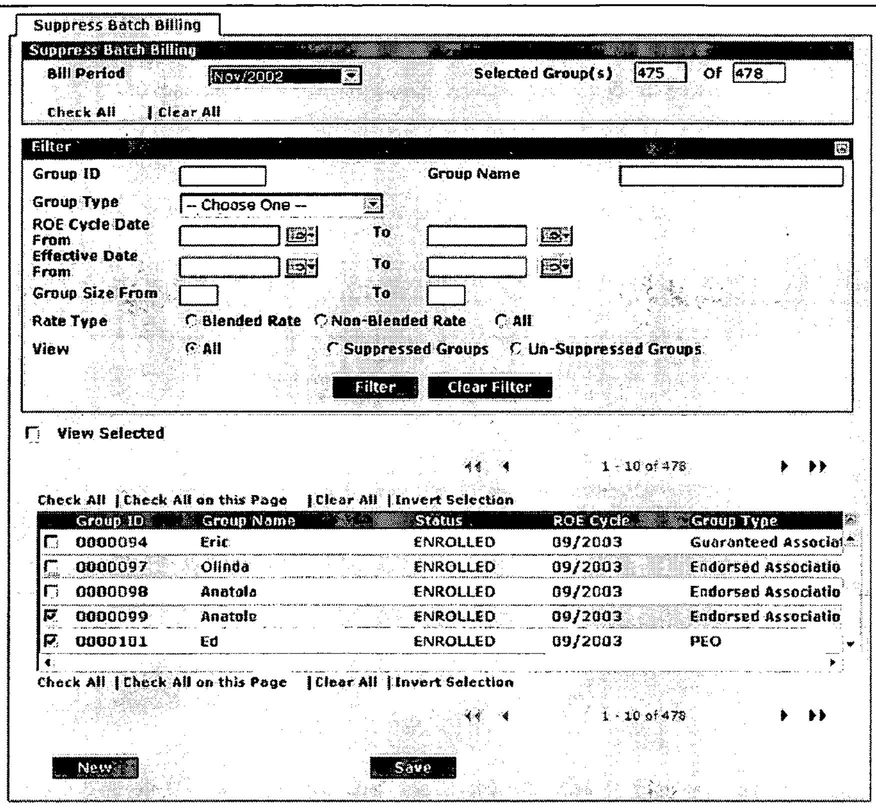
(Figure D-2)
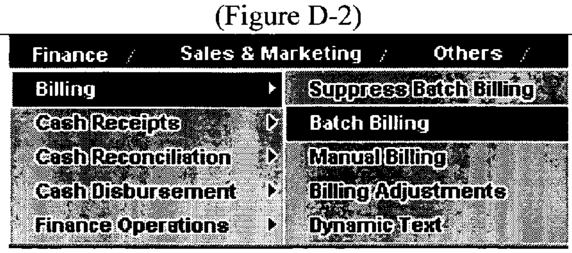
(Figure D-3)

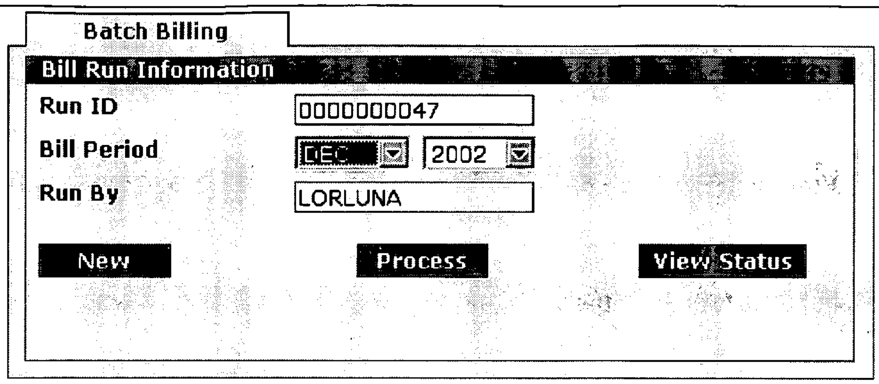
(Figure D-4)
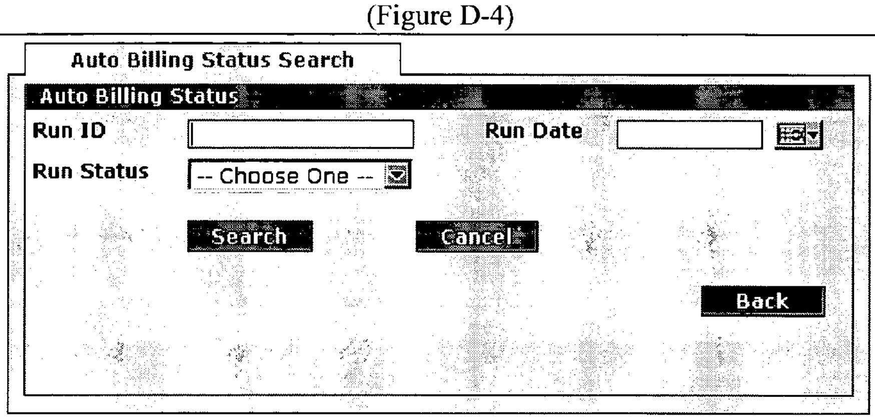
(Figure D-5)
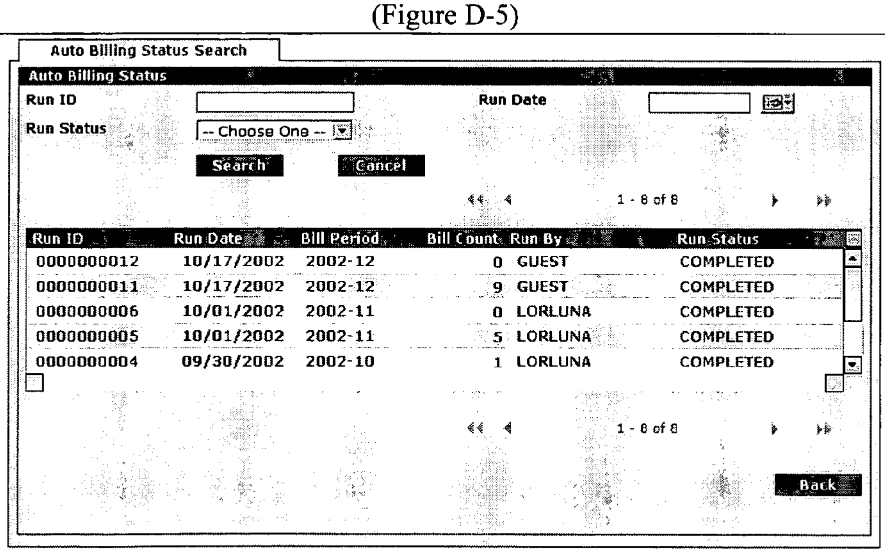
(Figure D-6)

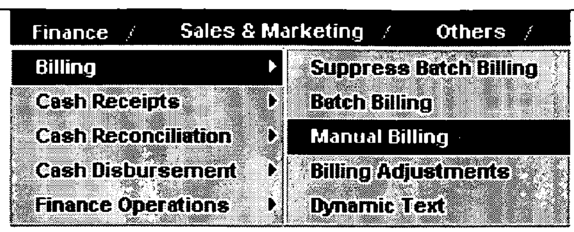
(Figure D-7)

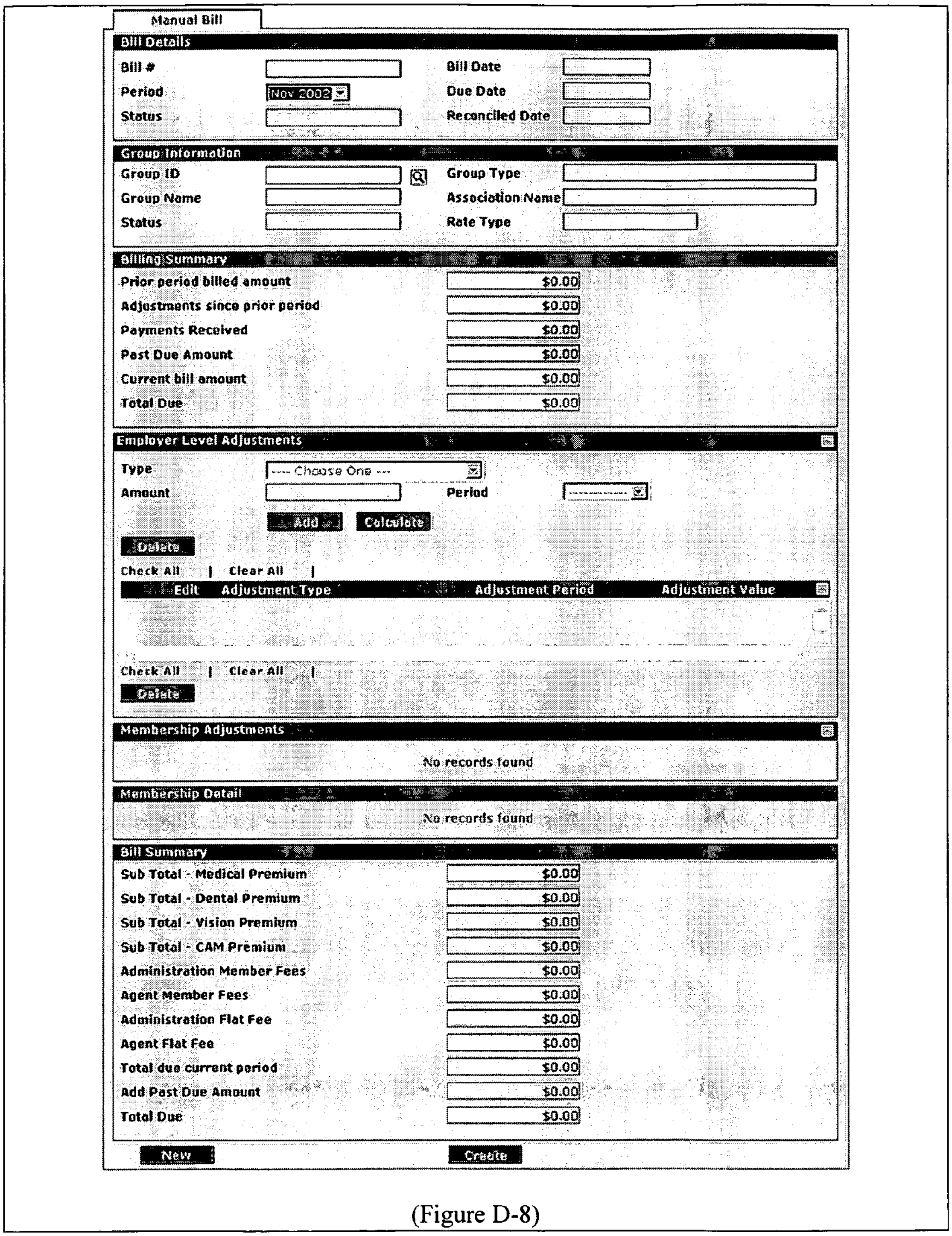
(Figure D-8)

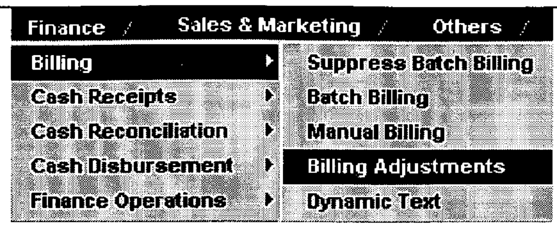
(Figure D-9)
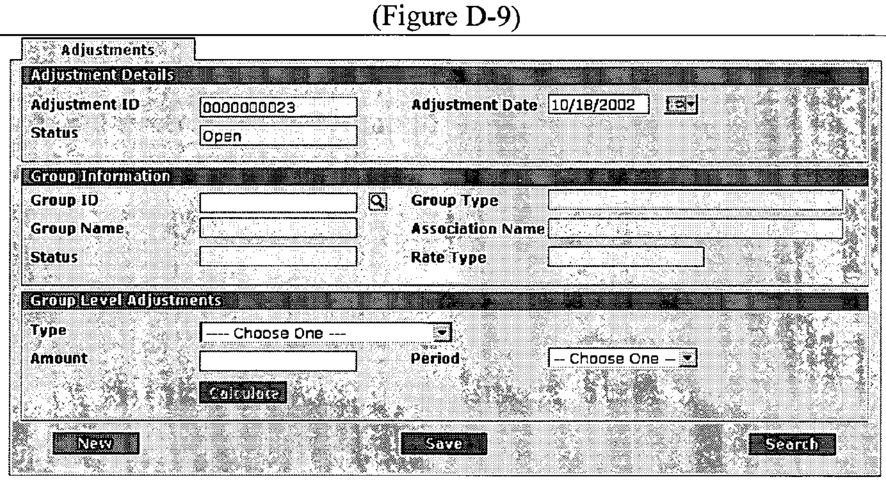
(Figure D-10)
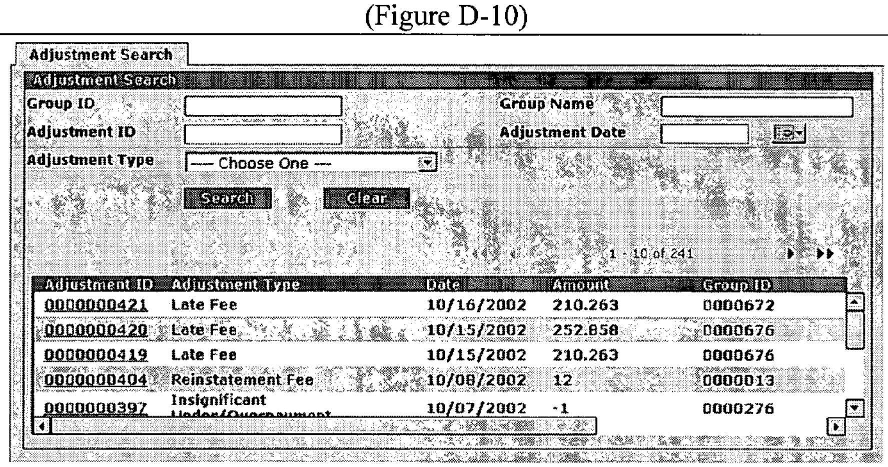
(Figure D-11)

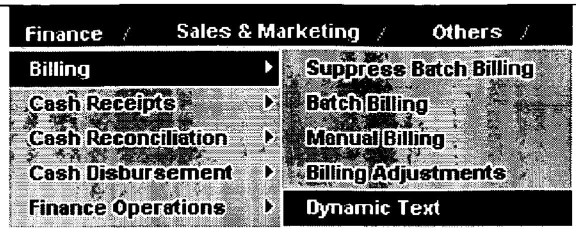
(Figure D-12)
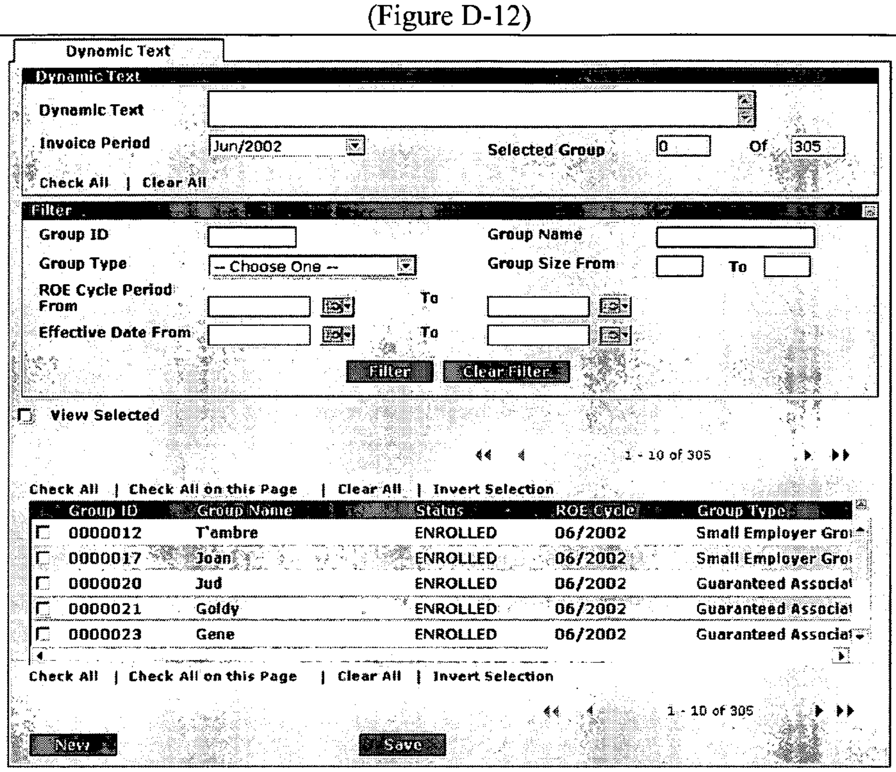
(Figure D-13)
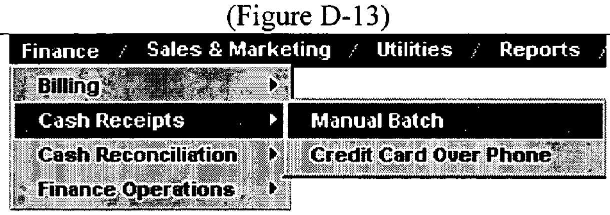
(Figure D-14)

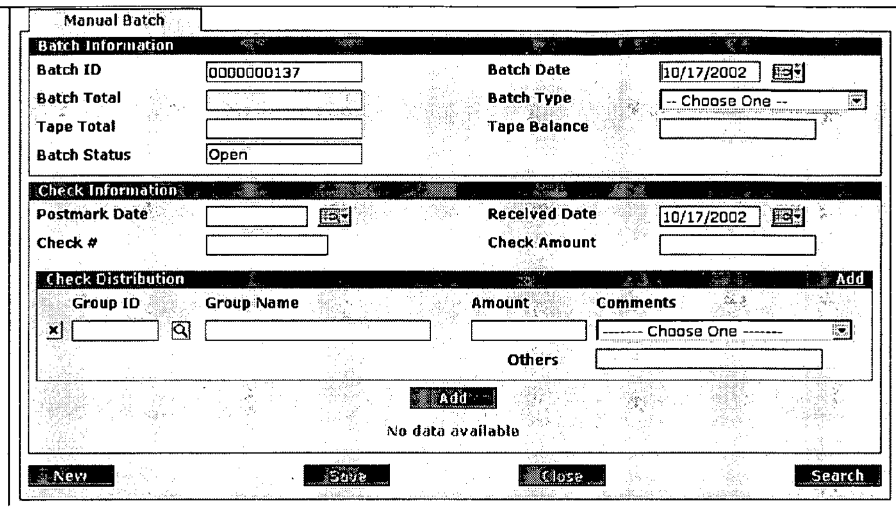
(Figure D-15)
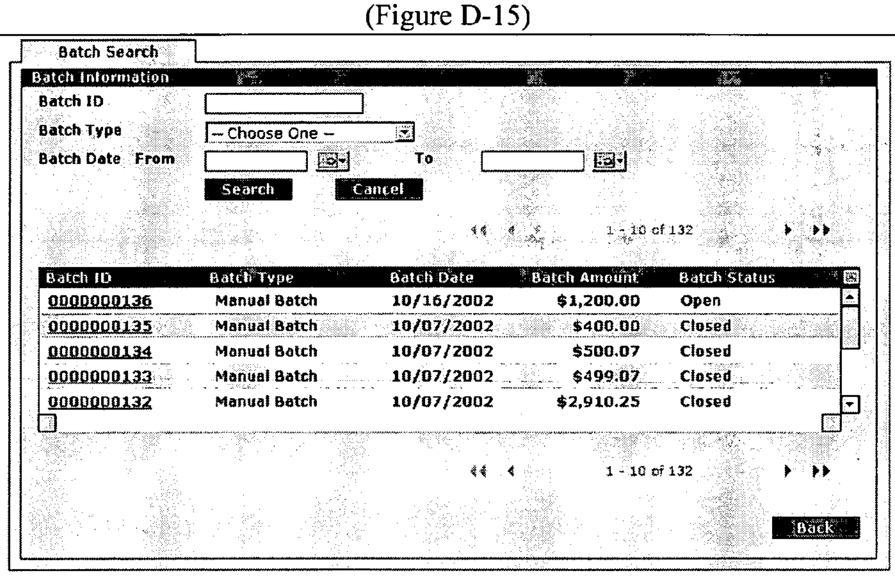
(Figure D-16)
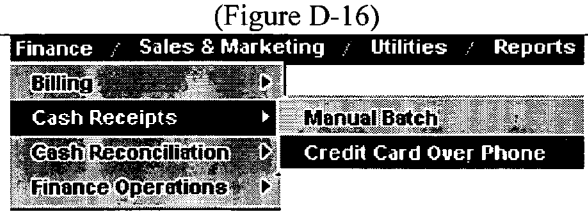
(Figure D-17)

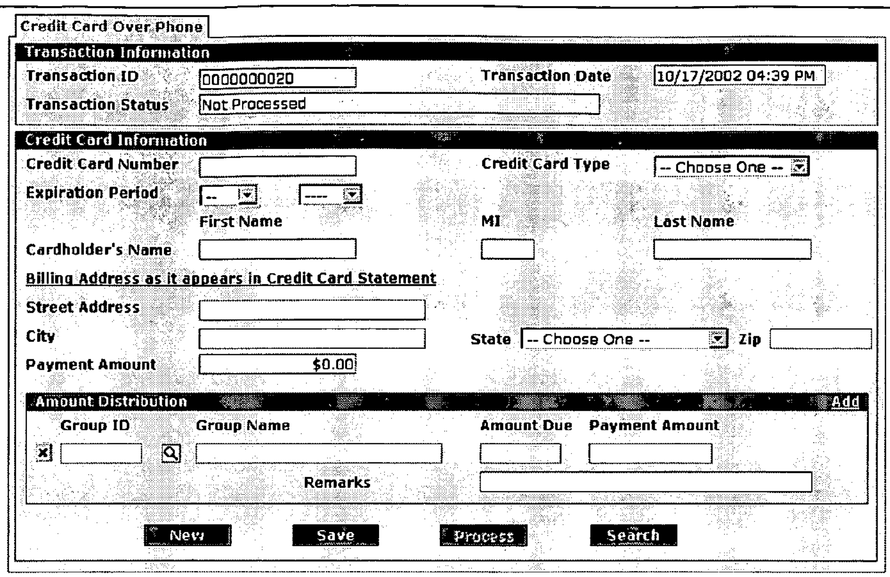
(Figure D-18)
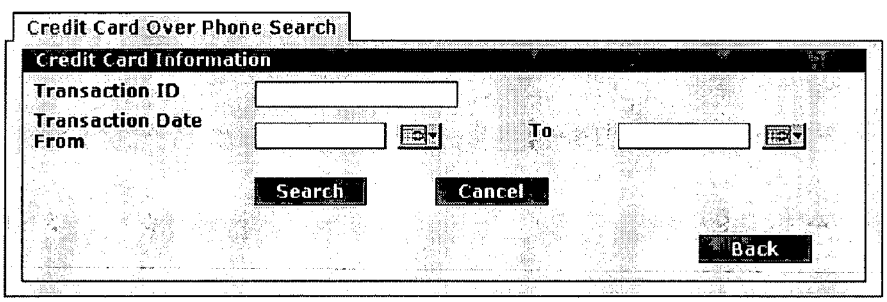
(Figure D-19)

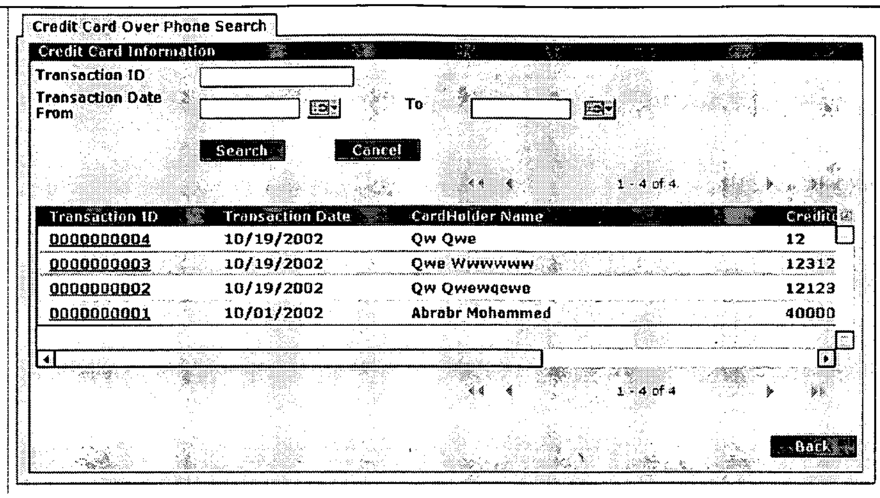
(Figure D-20)
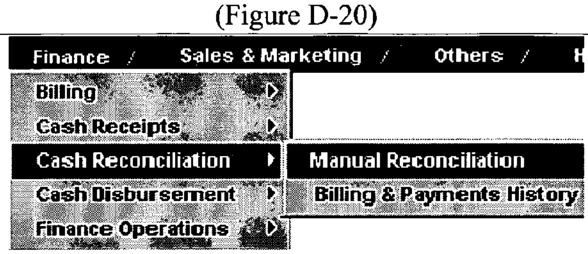
(Figure D-21)
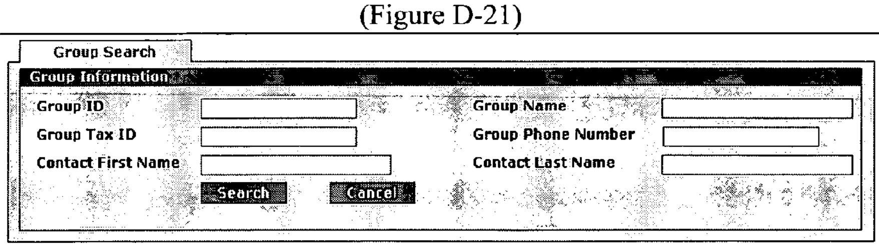
(Figure D-22)

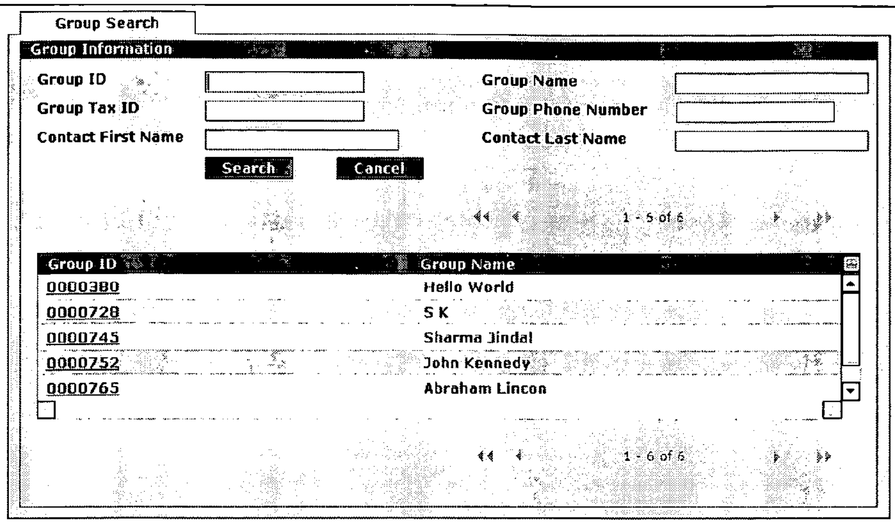
(Figure D-23)
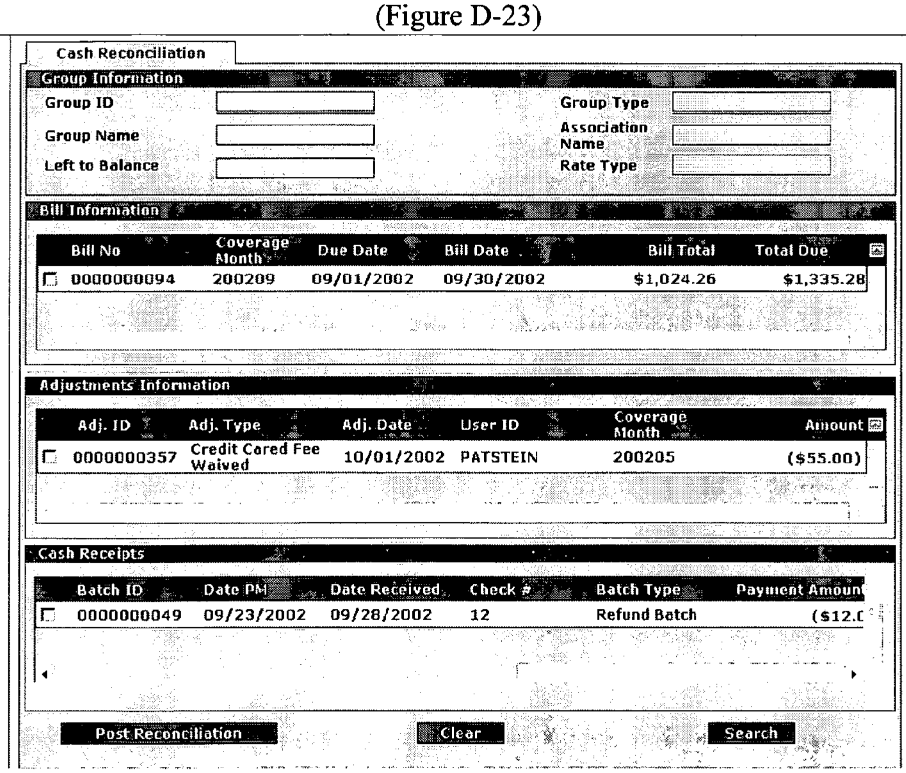
(Figure D-24)

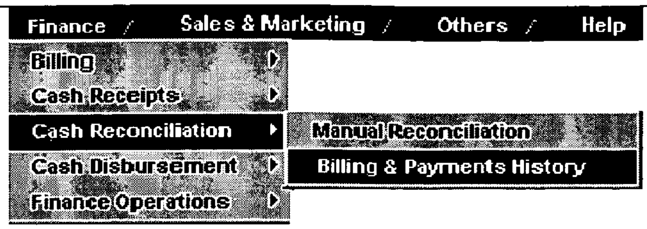
(Figure D-25)
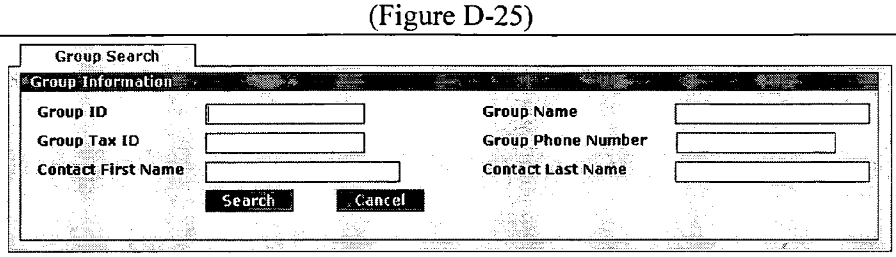
(Figure D-26)
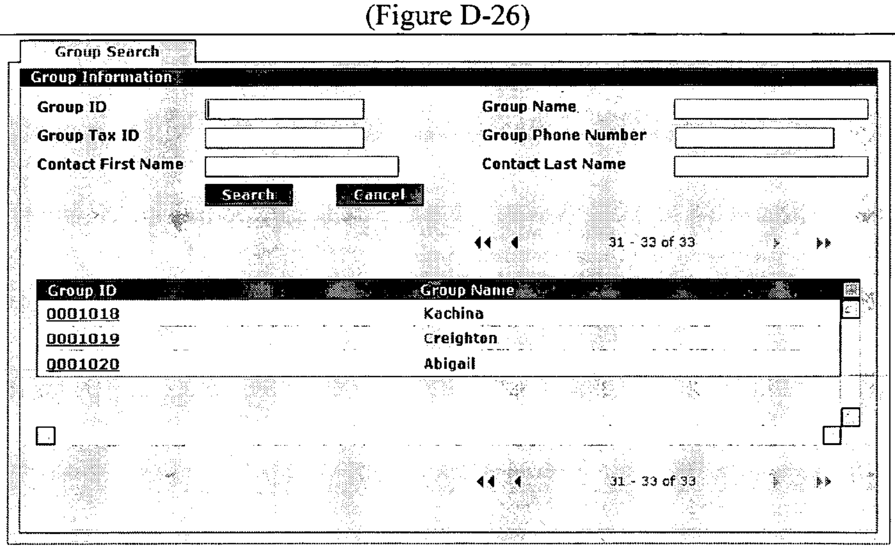
(Figure D-27)

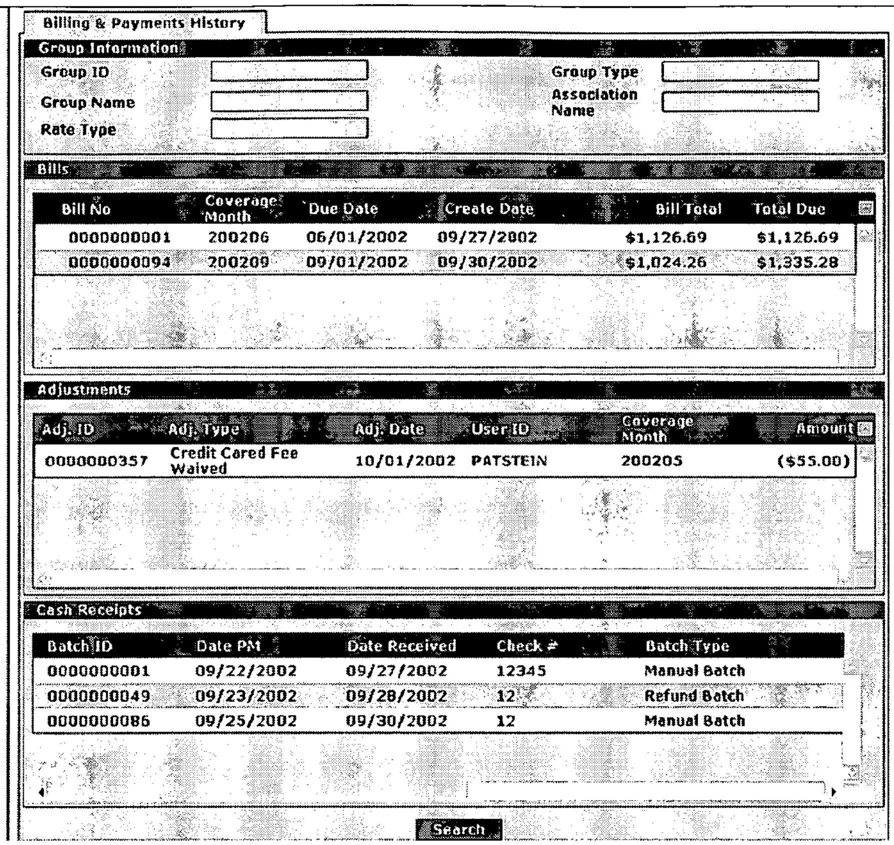
(Figure D-28)
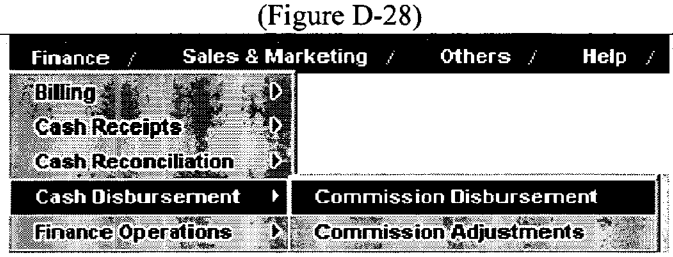
(Figure D-29)

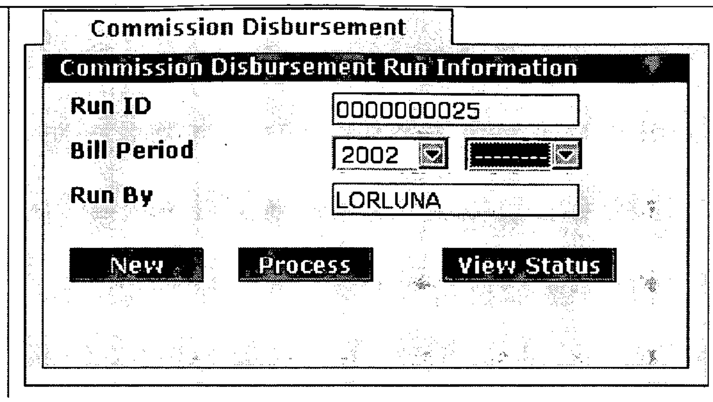
(Figure D-30)
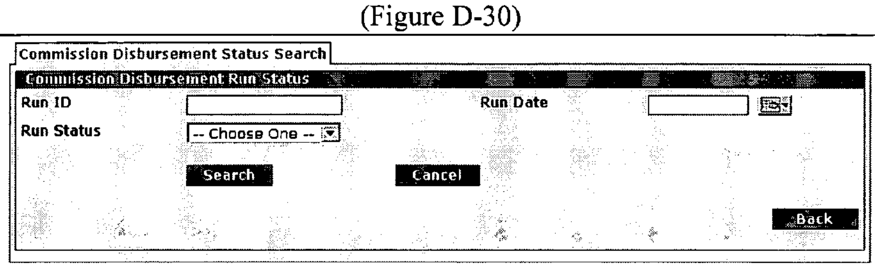
(Figure D-31)
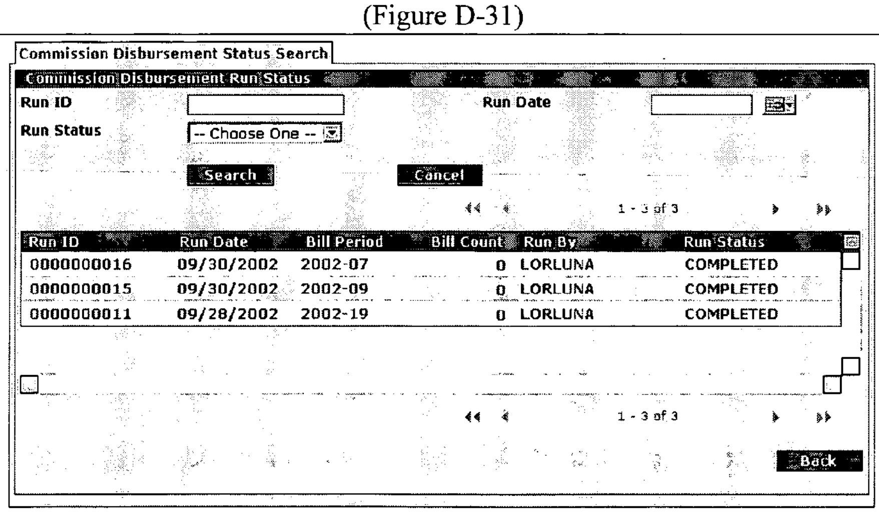
(Figure D-32)

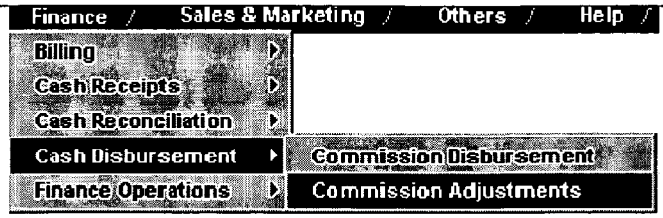
(Figure D-33)
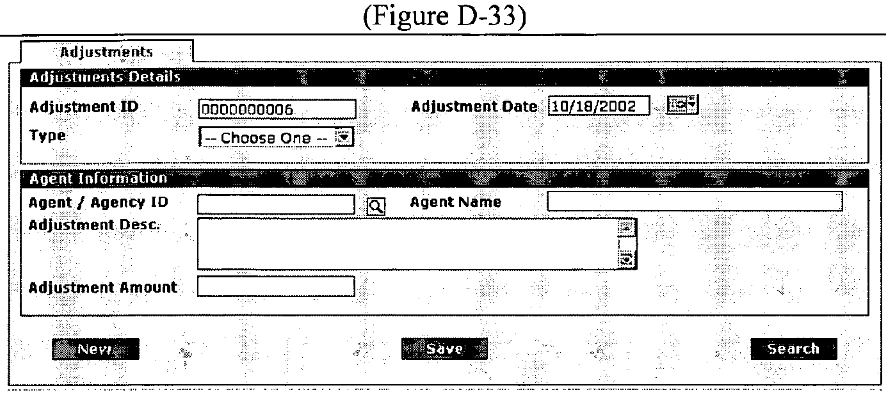
(Figure D-34)
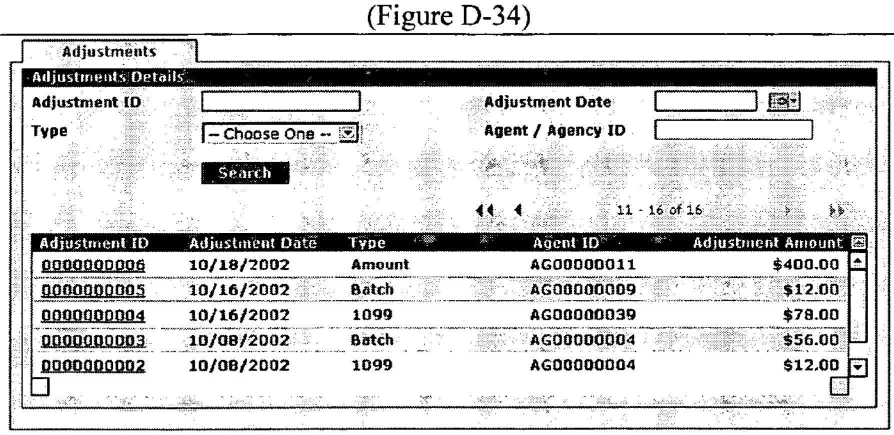
(Figure D-35)
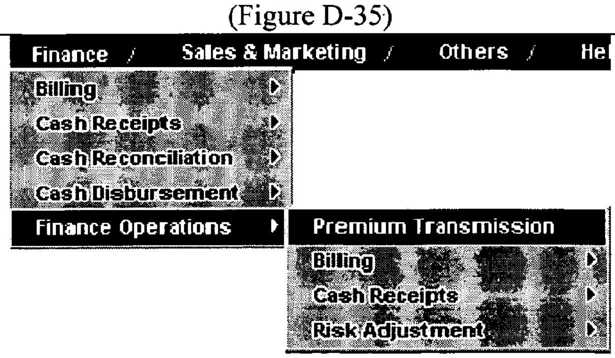
(Figure D-36)

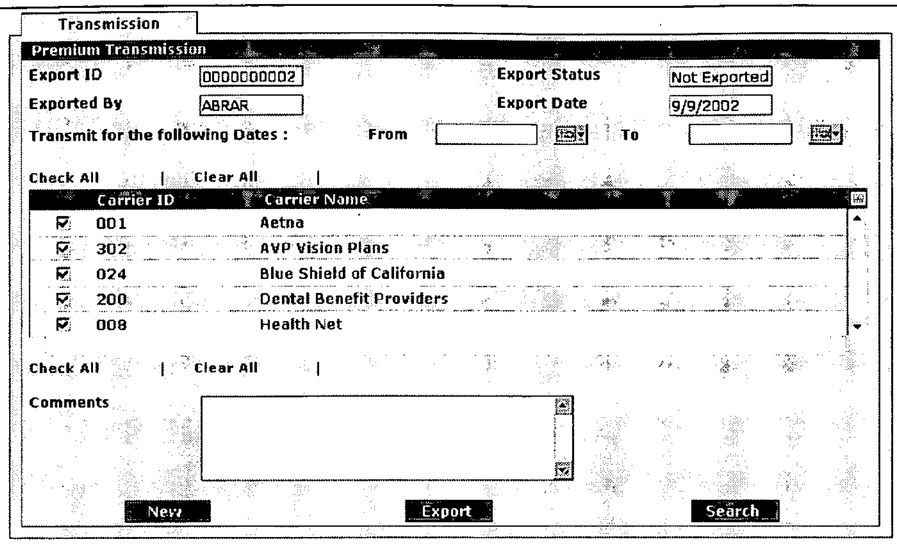
(Figure D-37)
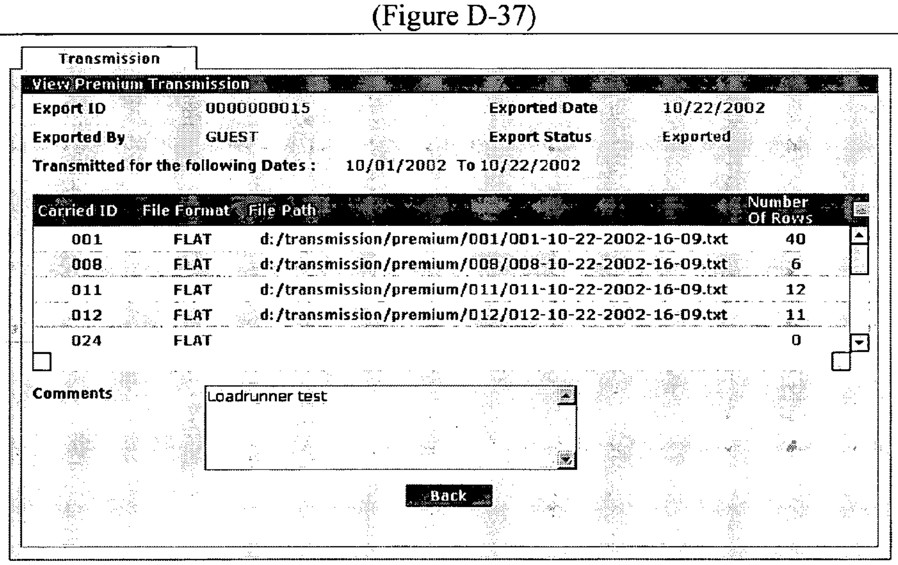
(Figure D-38)

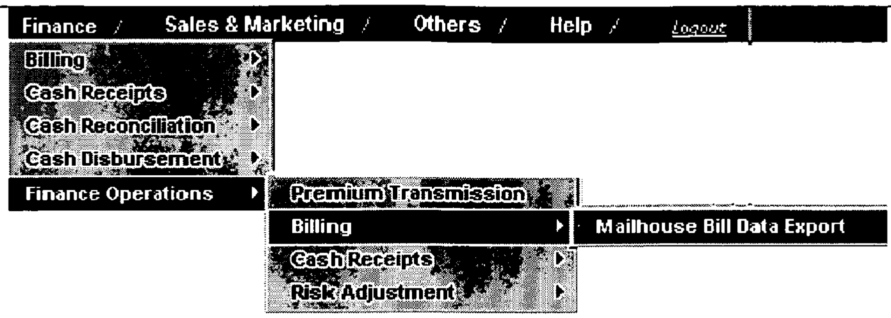
(Figure D-39)
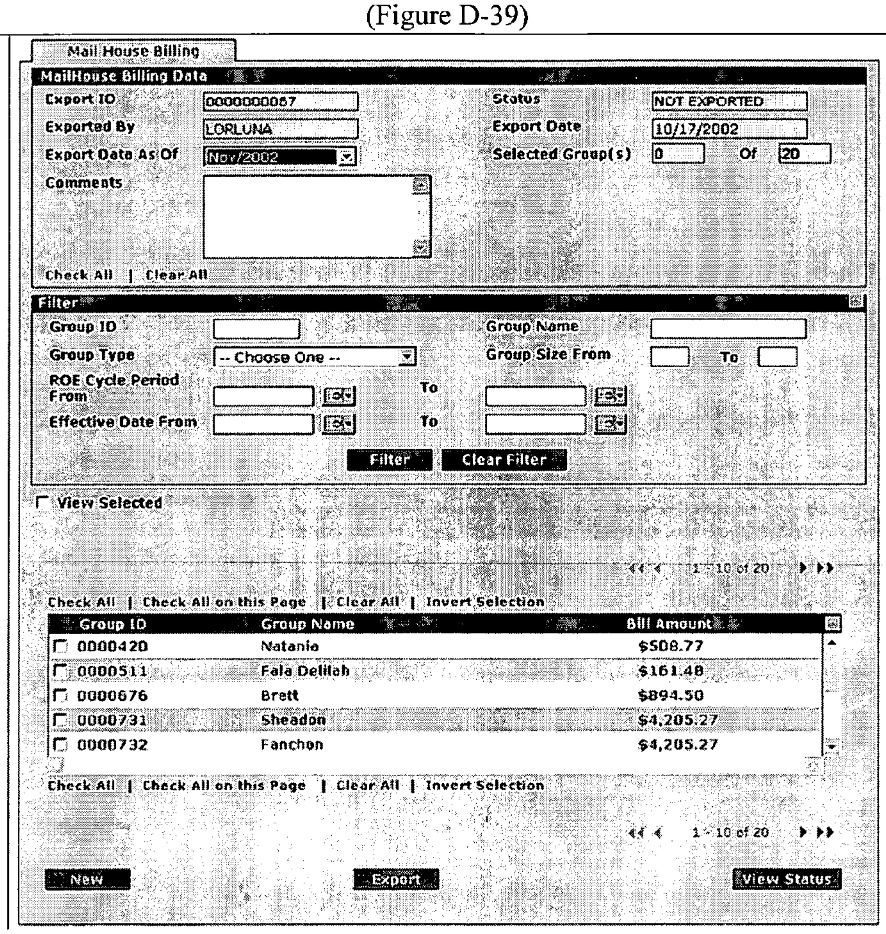
(Figure D-40)

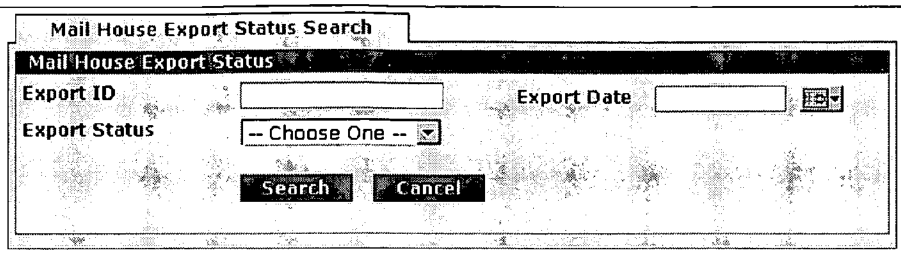
(Figure D-41)
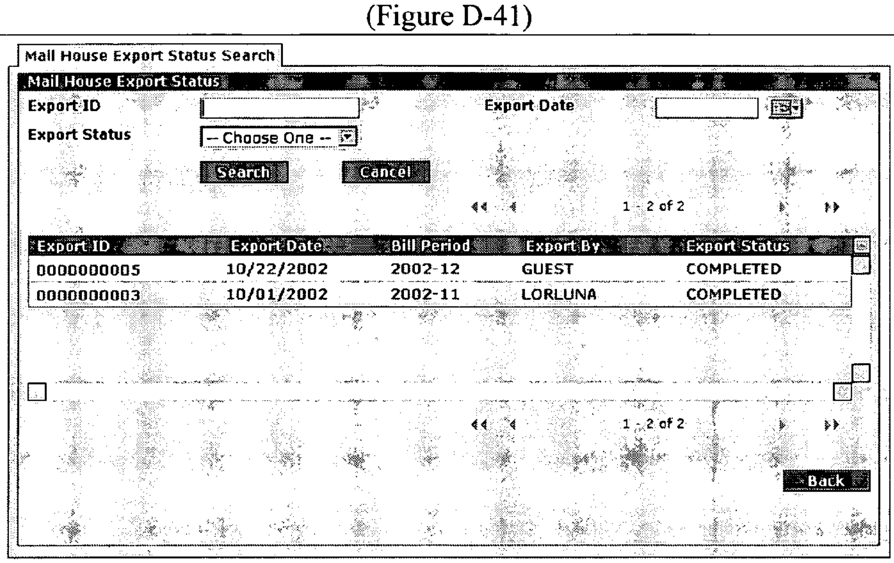
(Figure D-42)
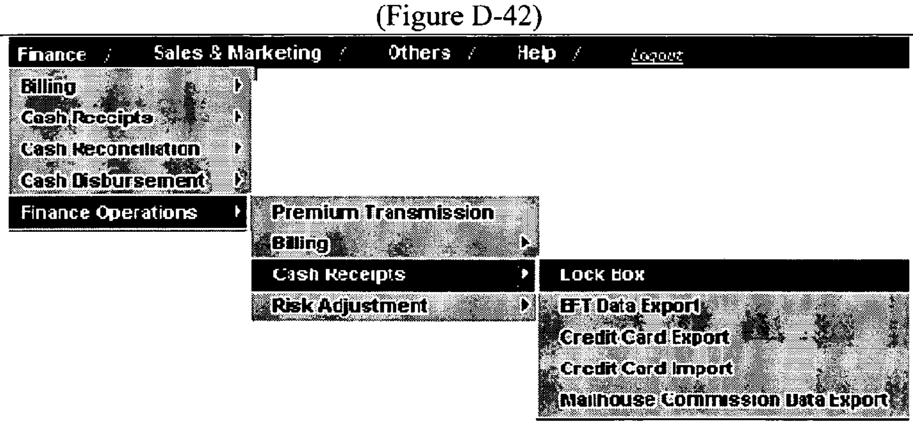
(Figure D-43)

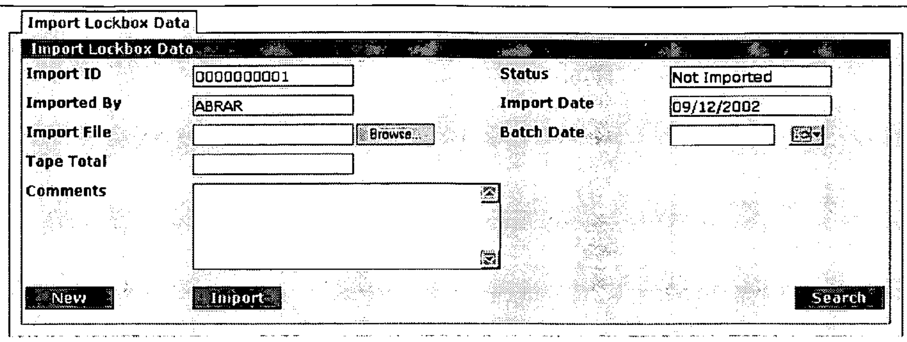
(Figure D-44)
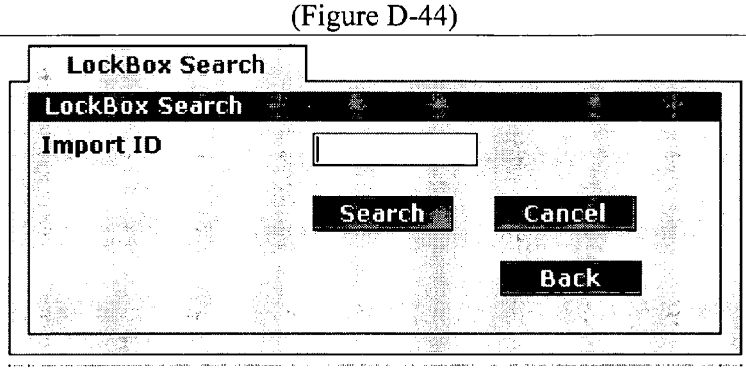
(Figure D-45)
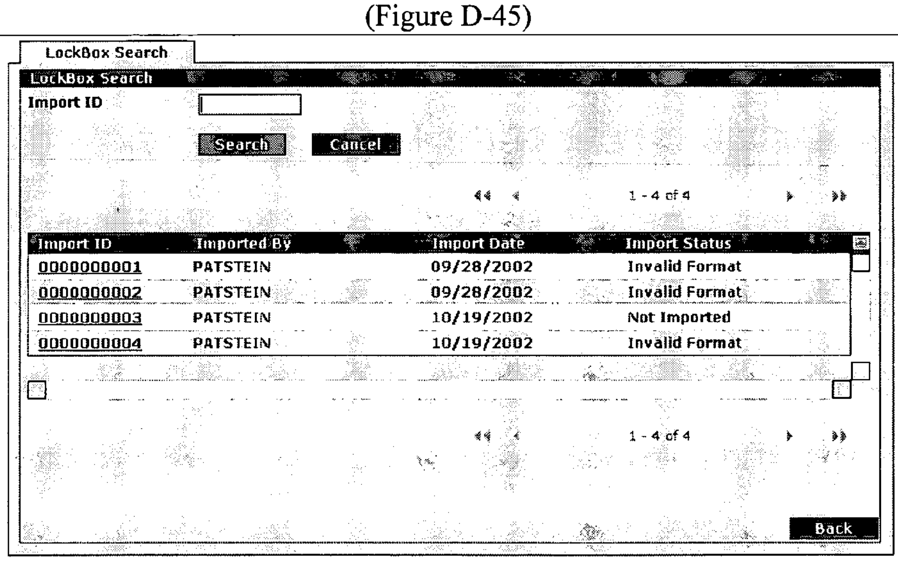
(Figure D-46)

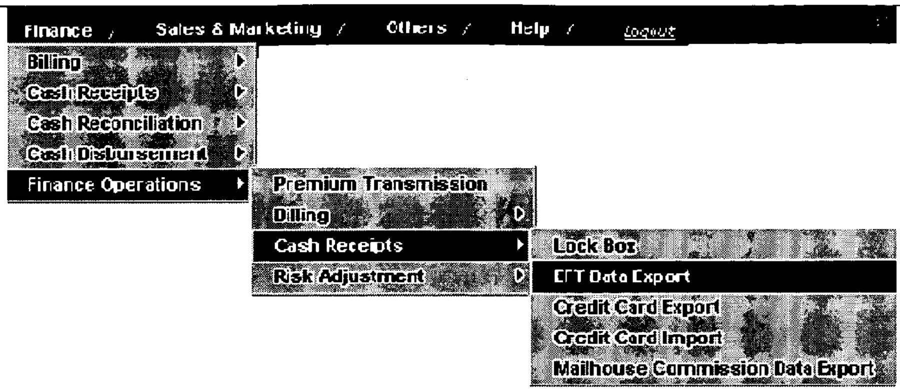
(Figure D-47)
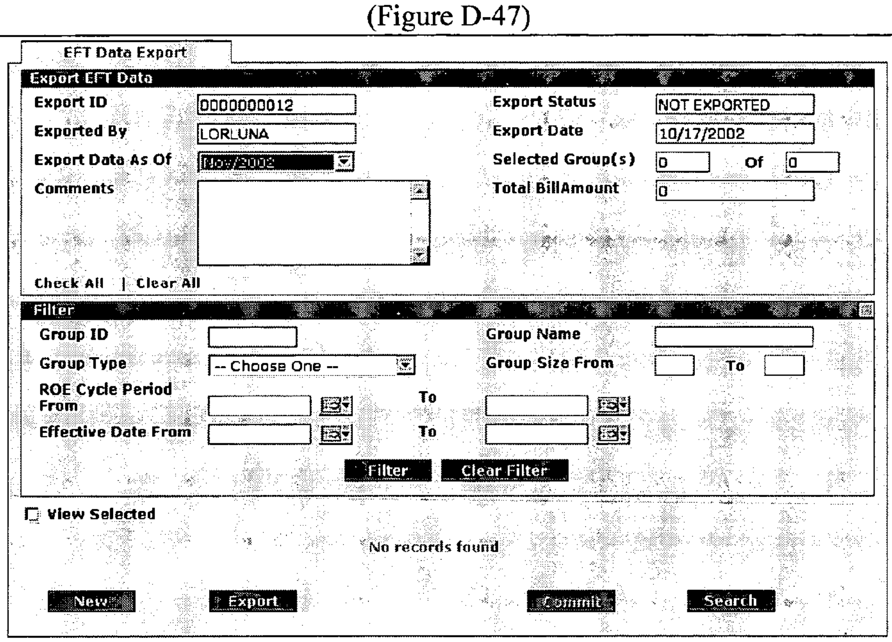
(Figure D-48)
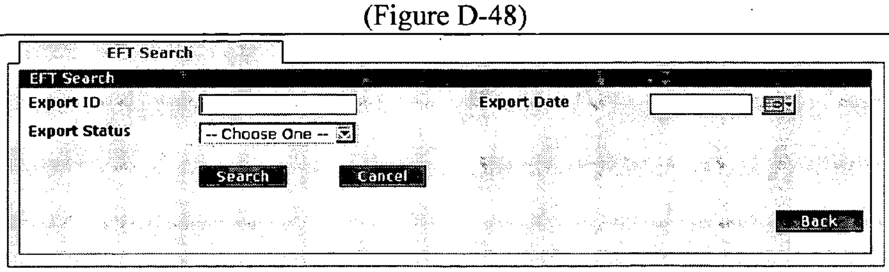
(Figure D-49)

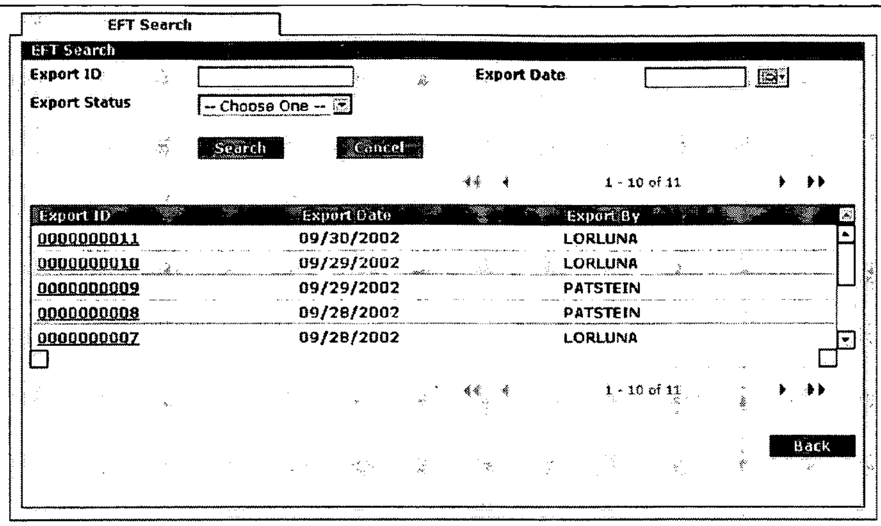
(Figure D-50)
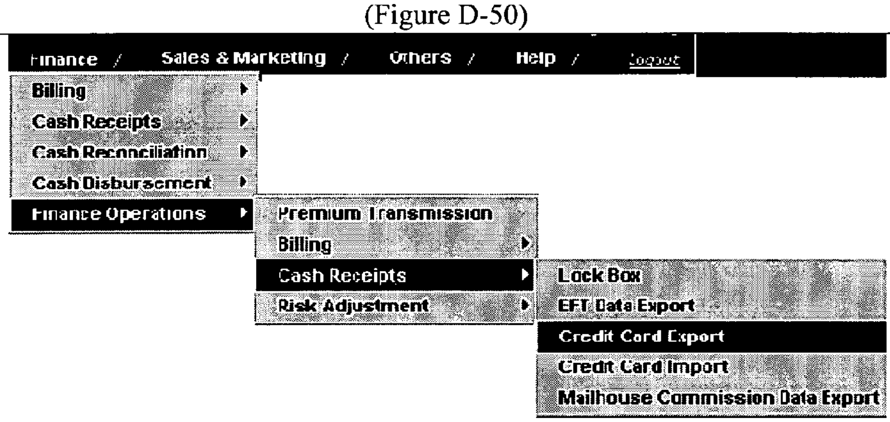
(Figure D-51)

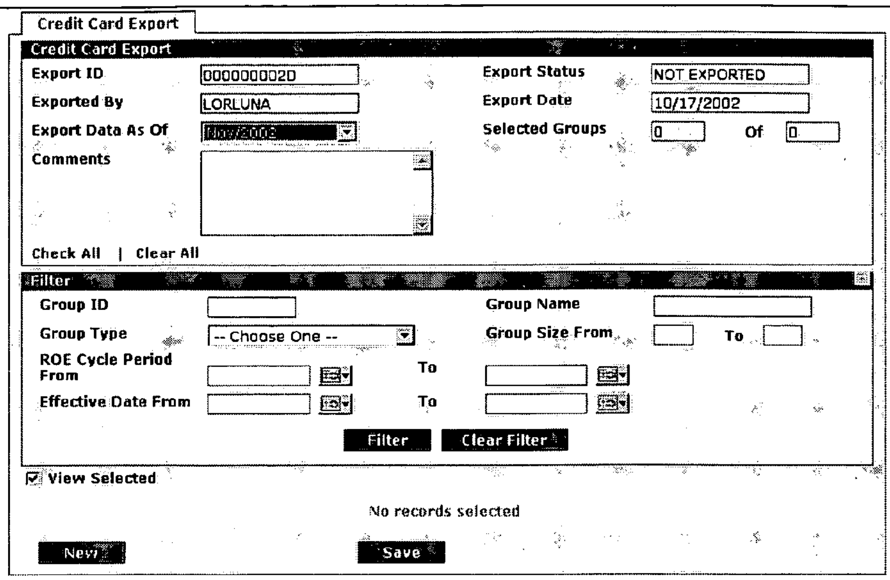
(Figure D-52)
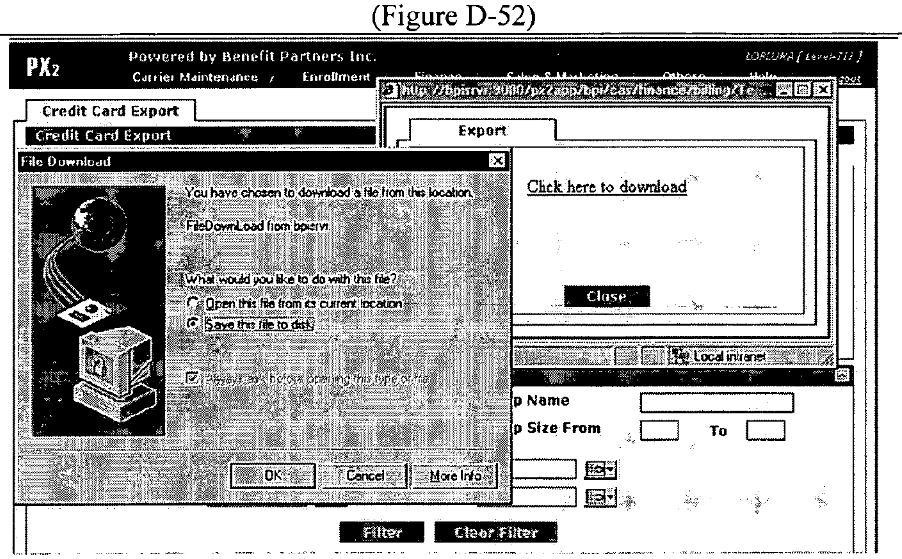
(Figure D-53)

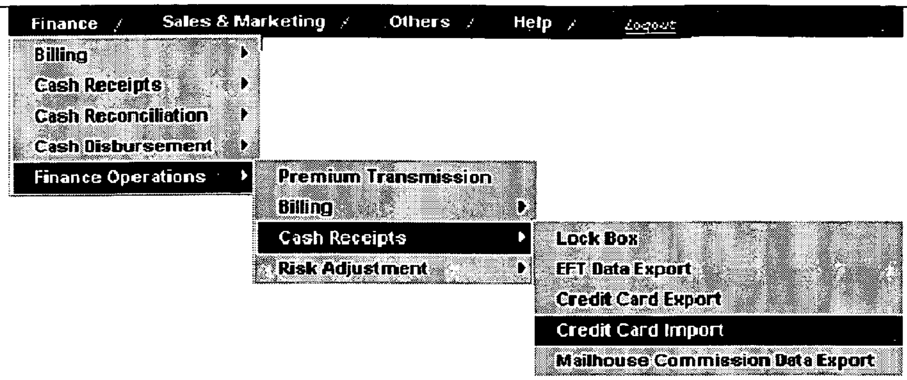
(Figure D-54)
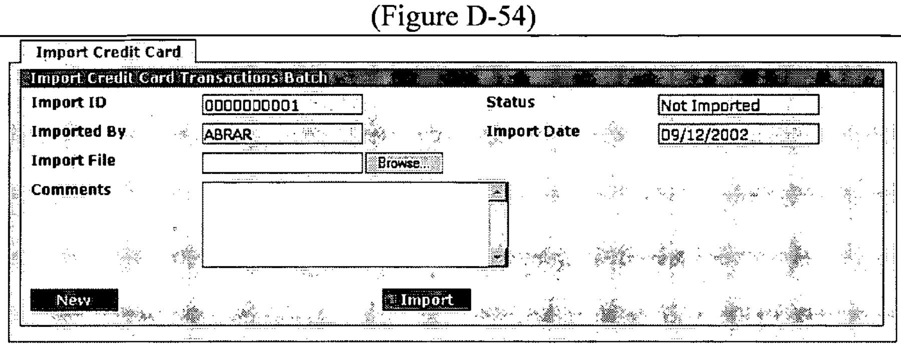
(Figure D-55)
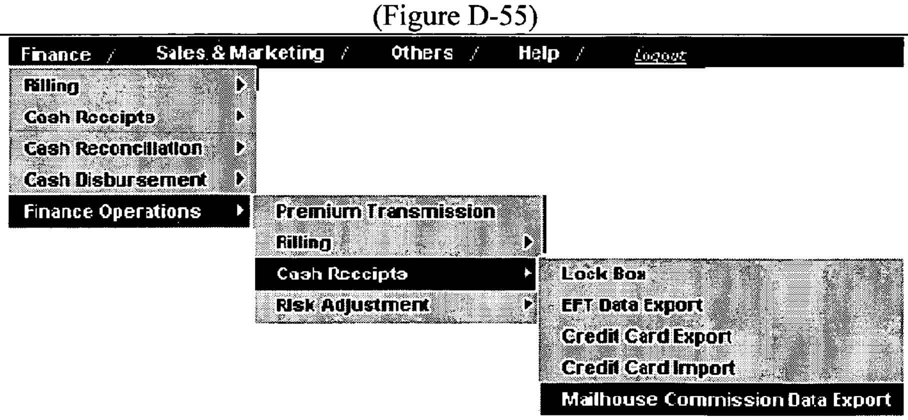
(Figure D-56)

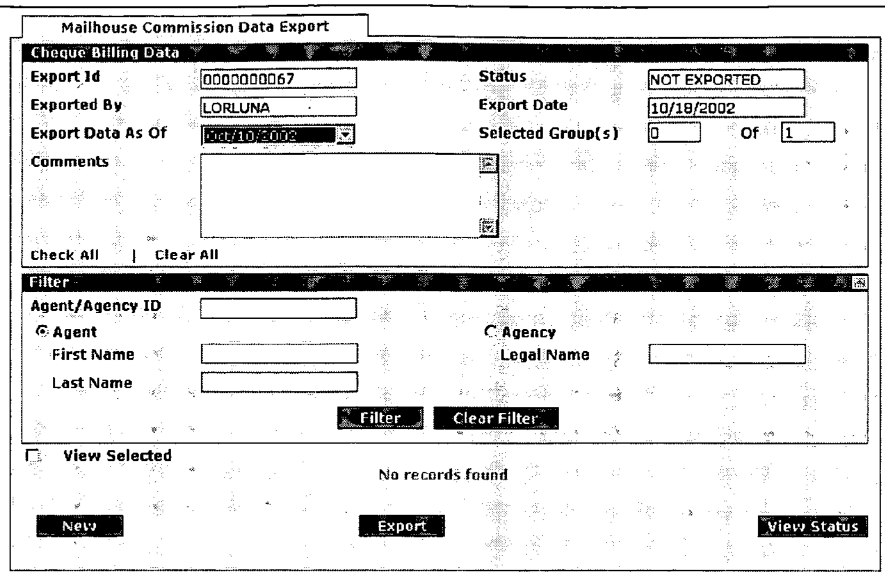
(Figure D-57)
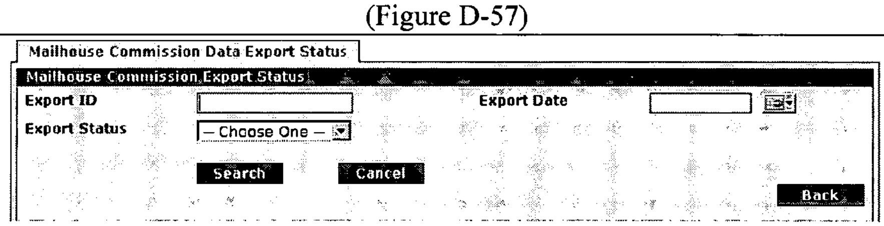
(Figure D-58)
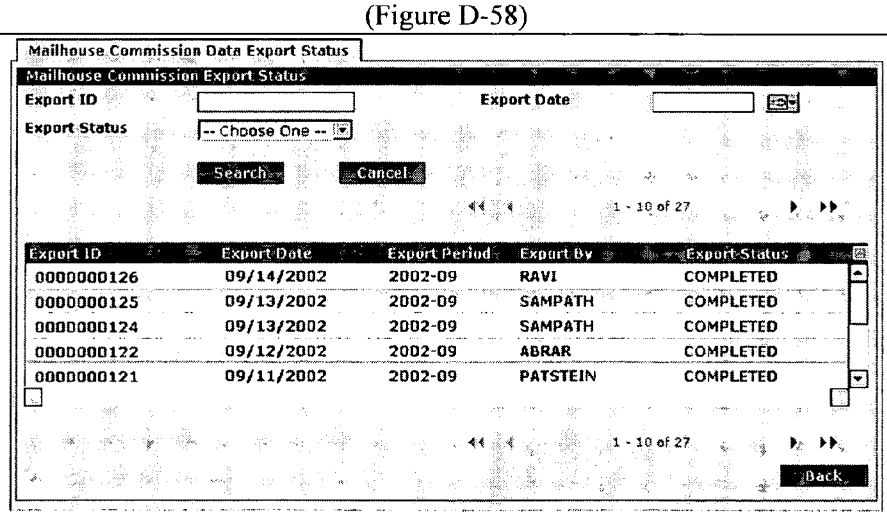
(Figure D-59)

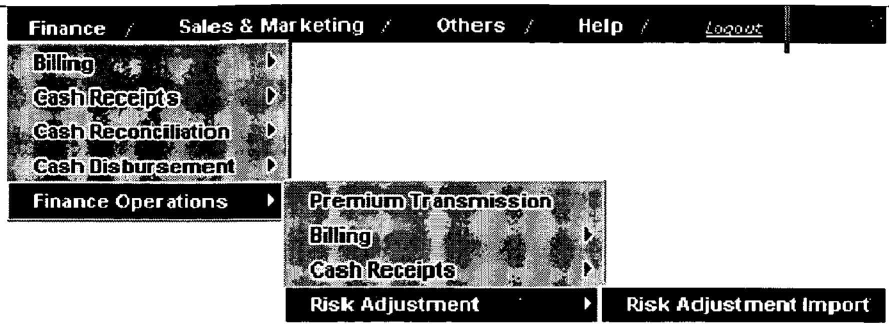
(Figure D-60)
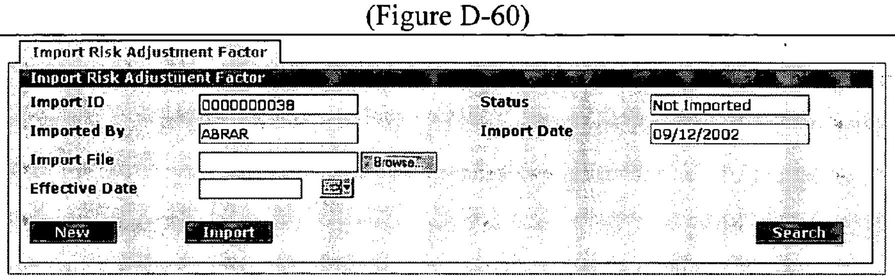
(Figure D-61)
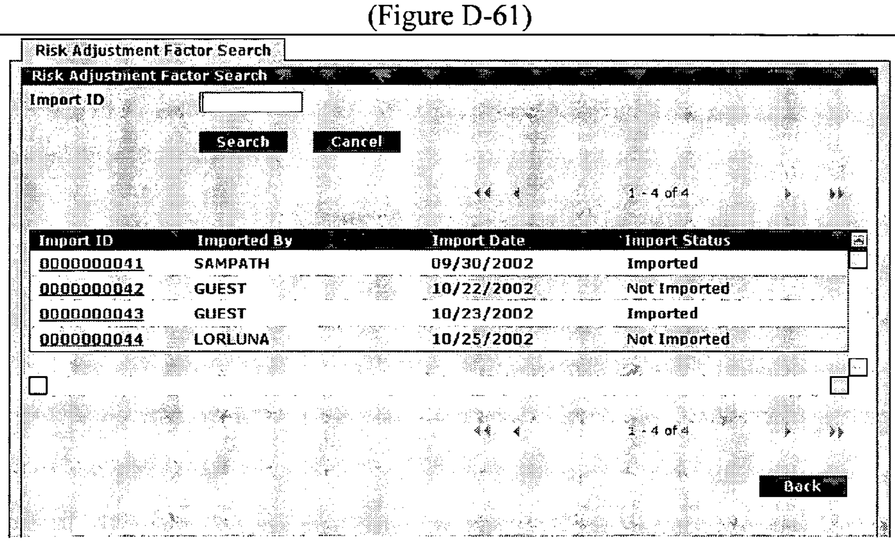
(Figure D-62)

(Figure E-1)
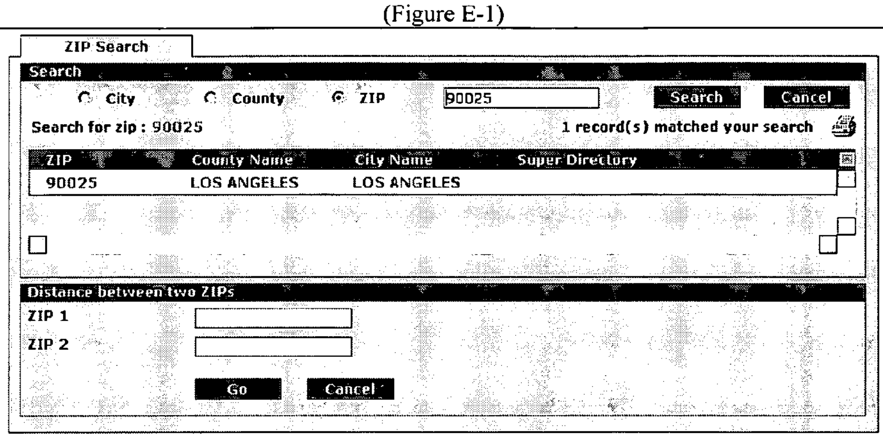
(Figure E-2)
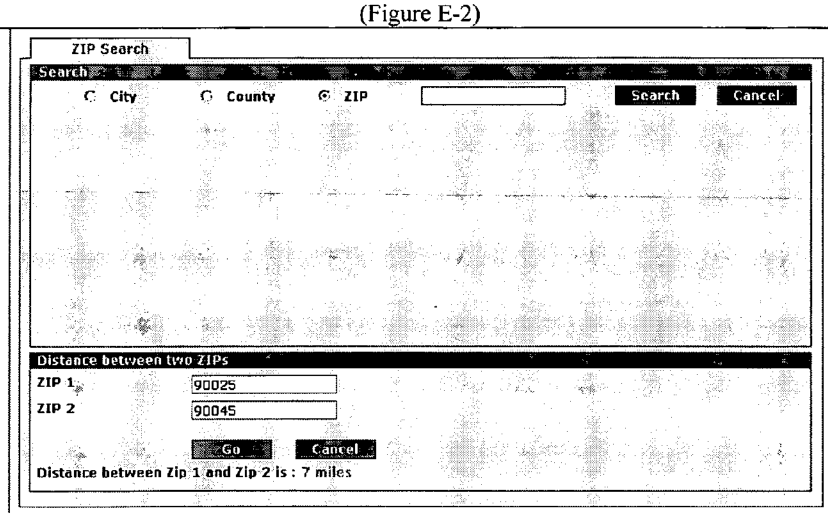
(Figure E-3)
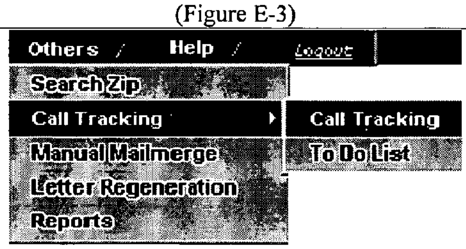
(Figure E-4)

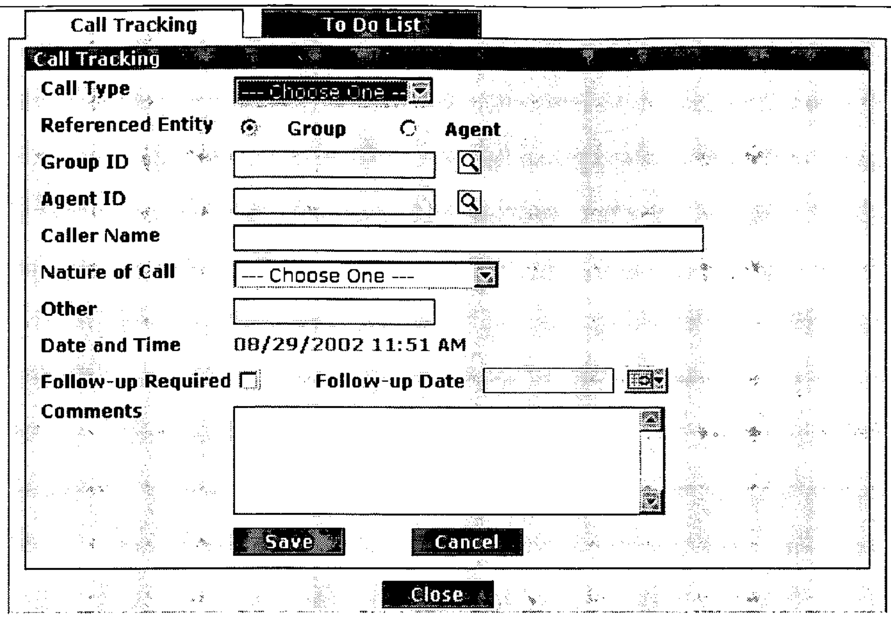
(Figure E-5)
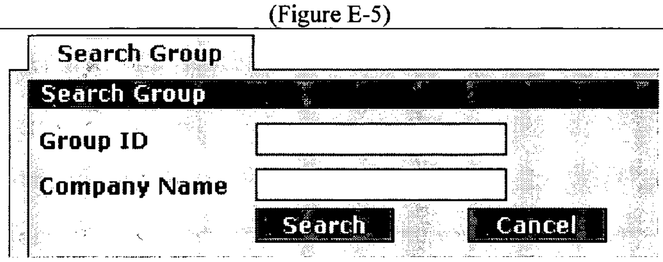
(Figure E-6)
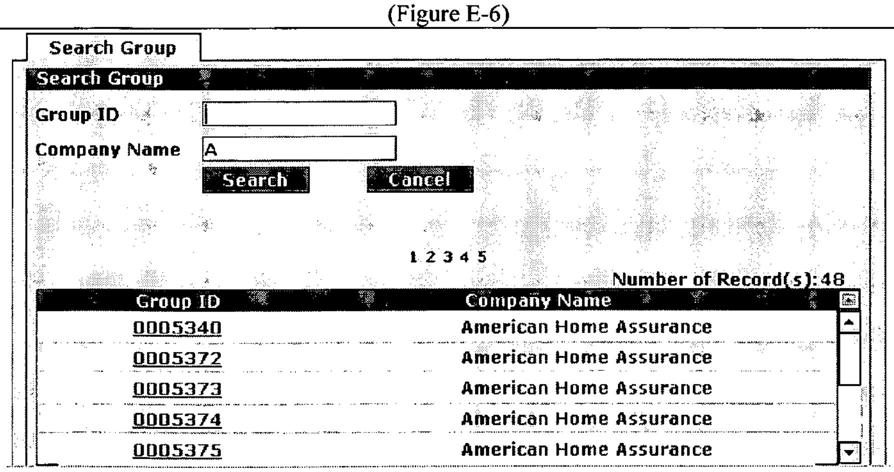
(Figure E-7)

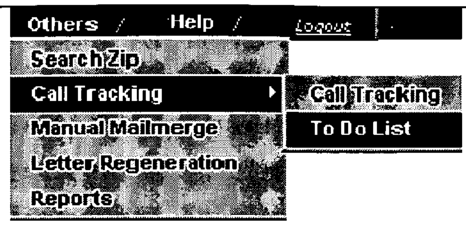
(Figure E-8)
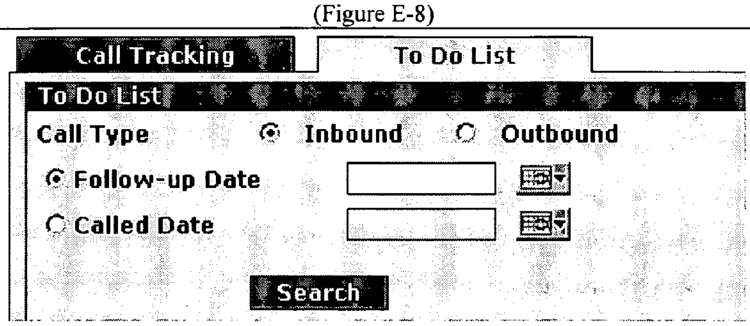
(Figure E-9)
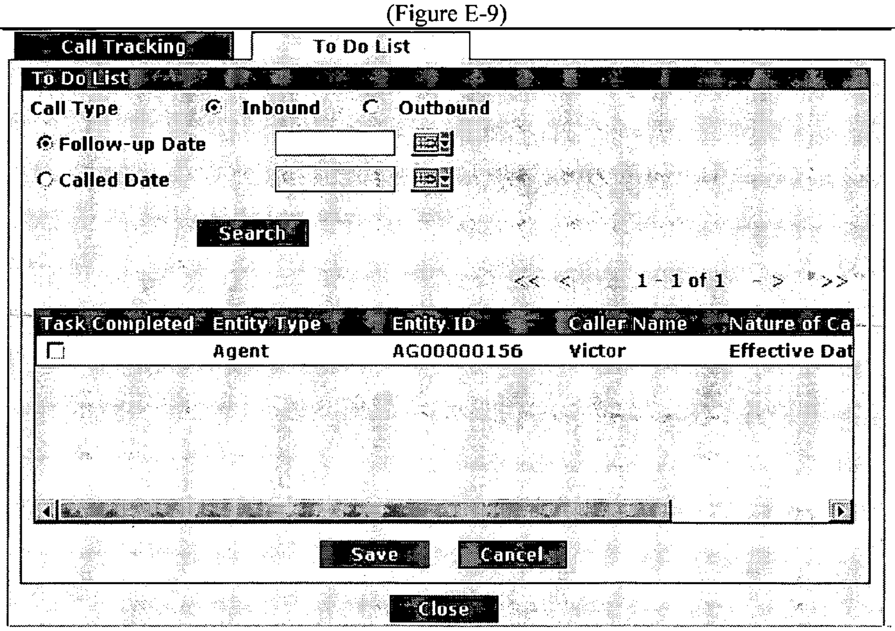
(Figure E-10)
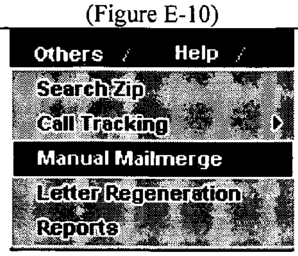
(Figure E-11)

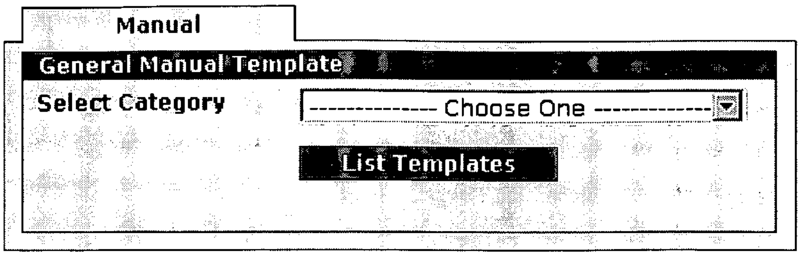
(Figure E-12)
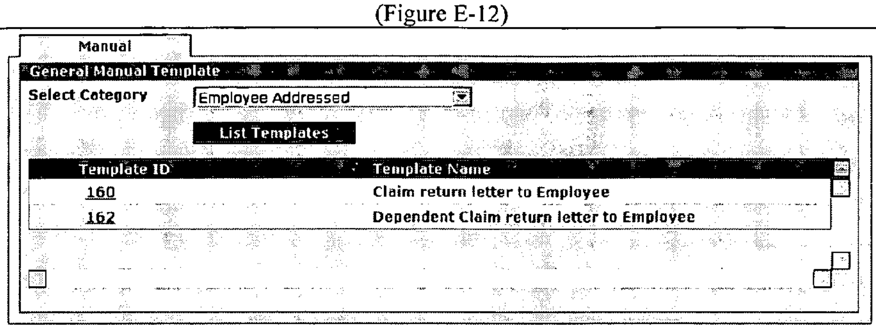
(Figure E-13)
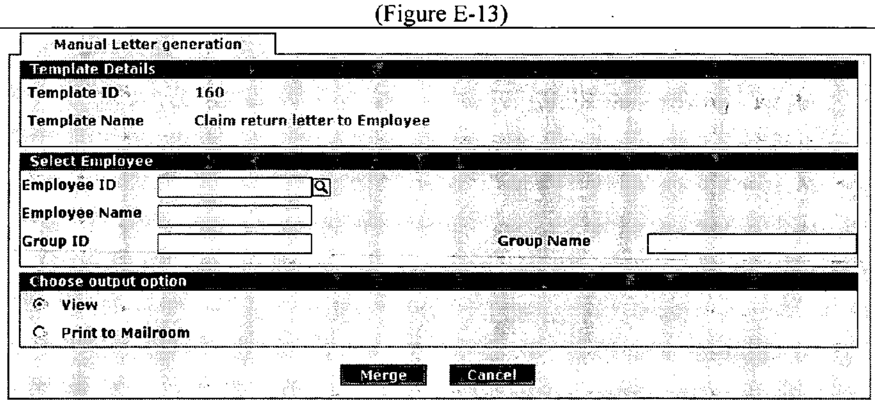
(Figure E-14)
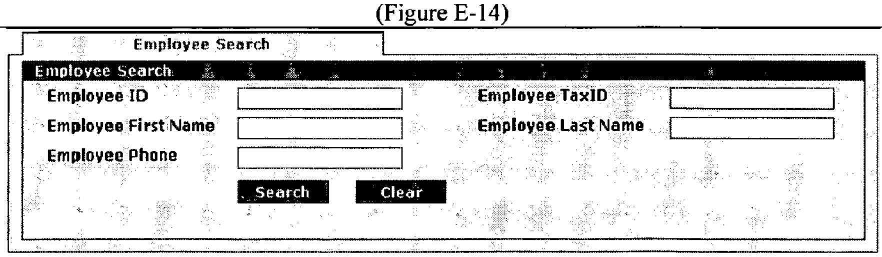
(Figure E-15)

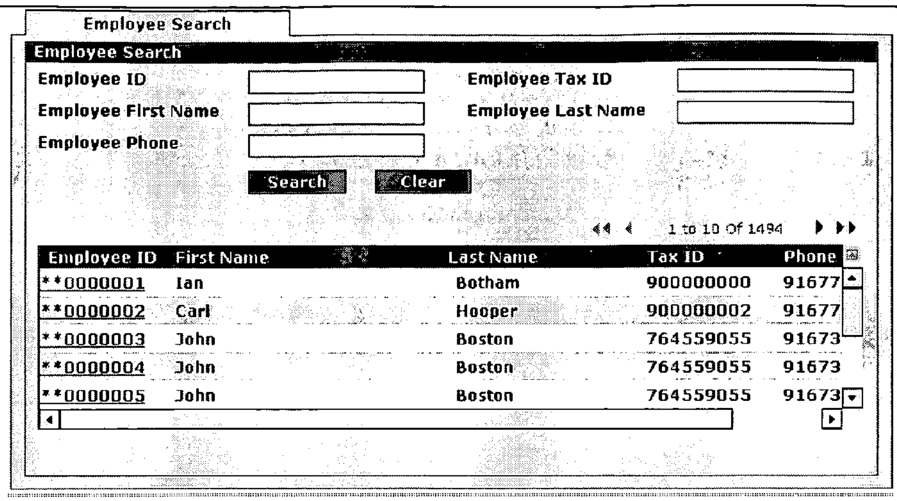
(Figure E-16)
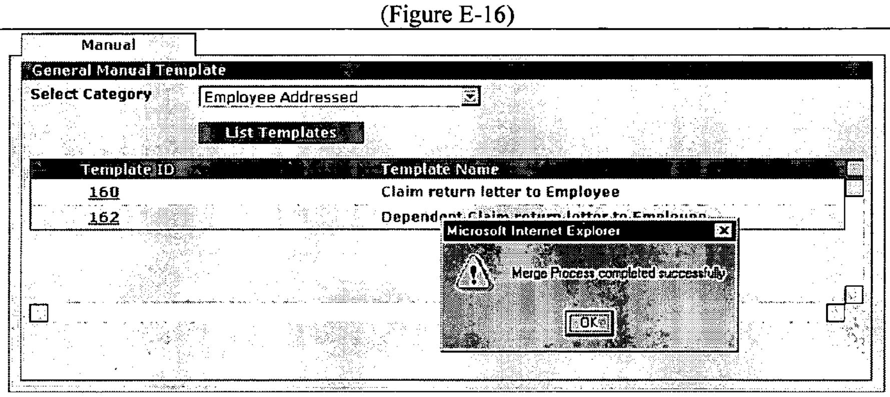
(Figure E-17)
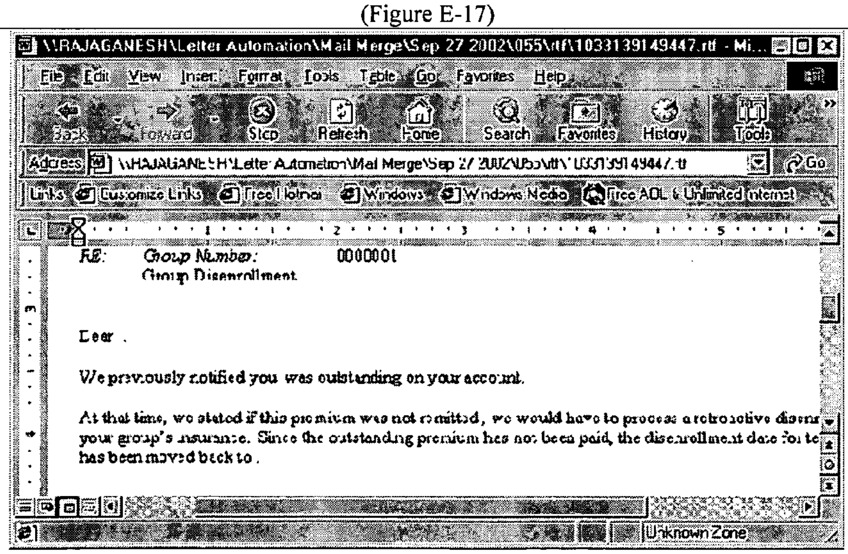
(Figure E-18)

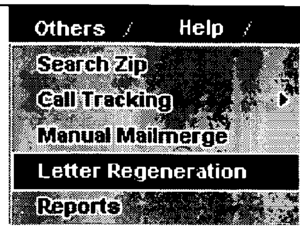
(Figure E-19)
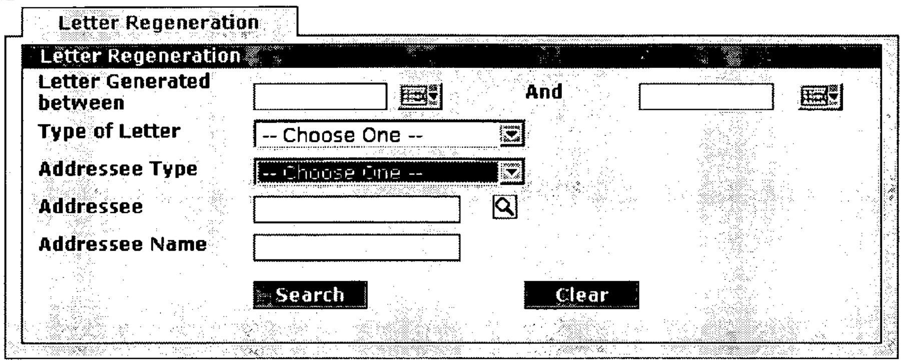
(Figure E-20)
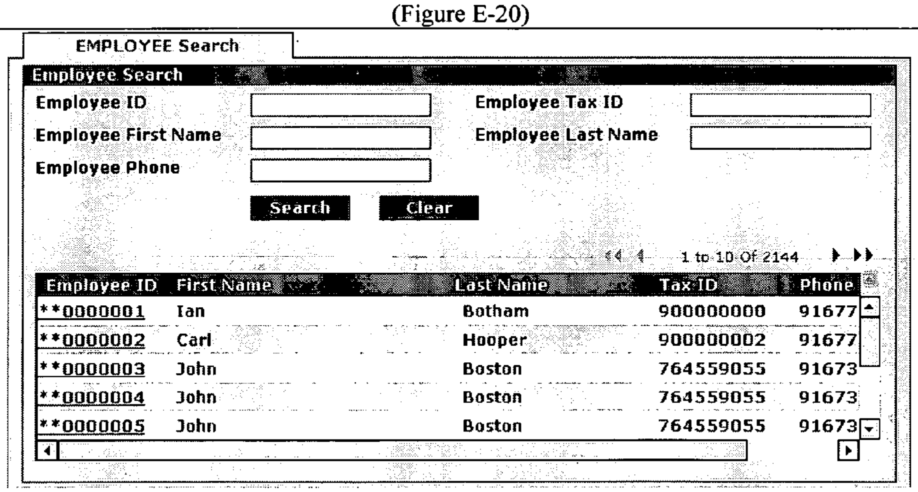
(Figure E-21)
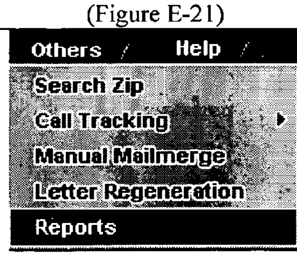
(Figure E-22)

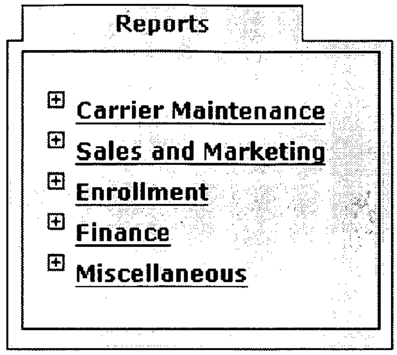
(Figure E-23)
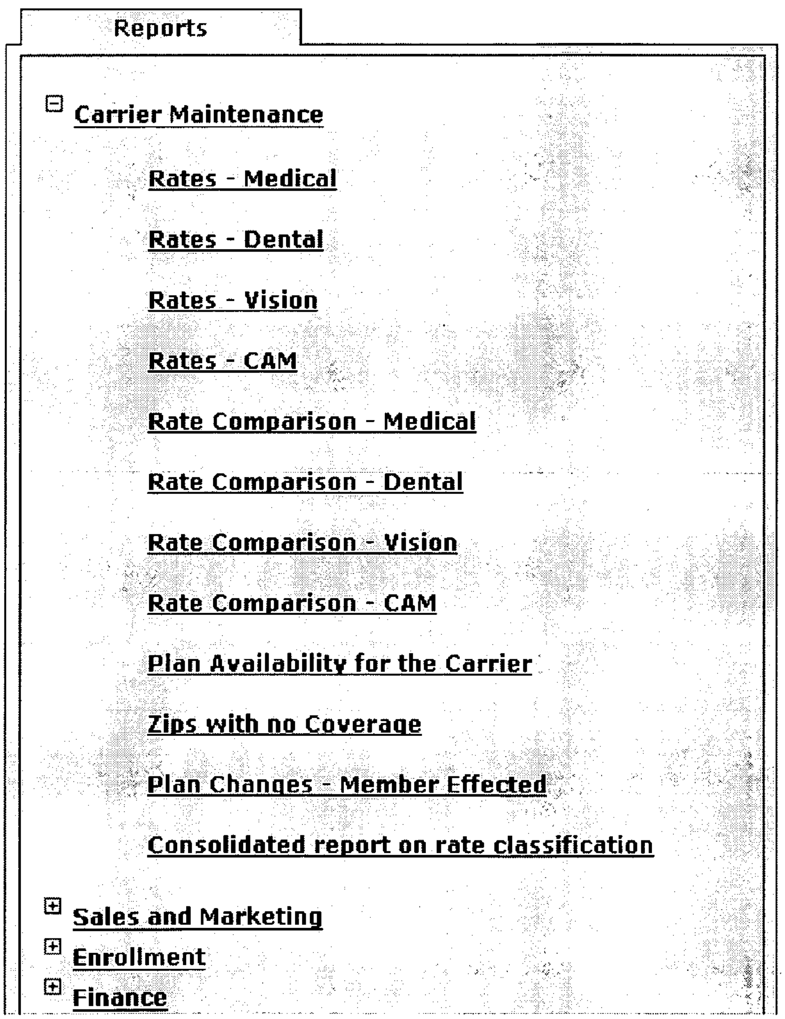
(Figure E-24)

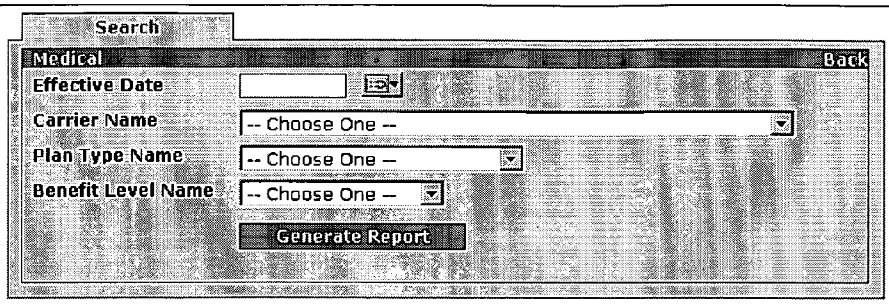
(Figure E-25)
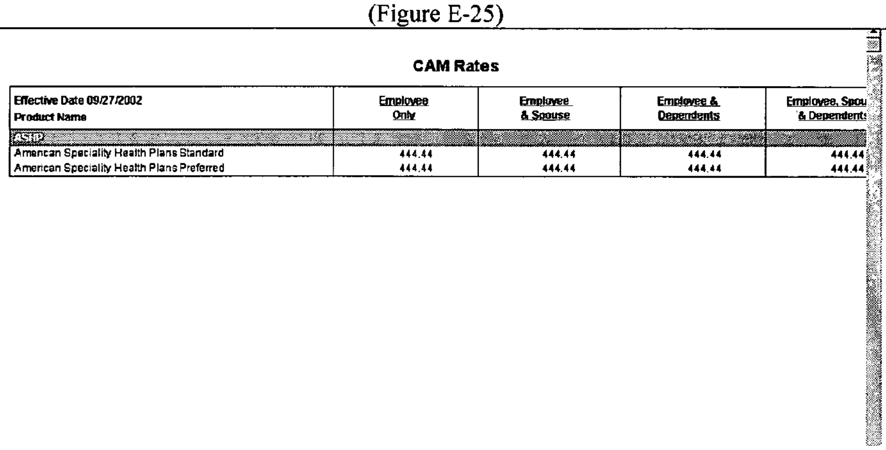
CAM Rates
| Effective Date 09/27/2002<br>Product Name | Employee Only | Employee & Spouse | Employee & Dependents | Employee, Spou & Dependents |
|---|---|---|---|---|
| ASHP | | | | |
| American Speciality Health Plans Standard | 444.44 | 444.44 | 444.44 | 444.44 |
| American Speciality Health Plans Preferred | 444.44 | 444.44 | 444.44 | 444.44 |
(Figure E-26)

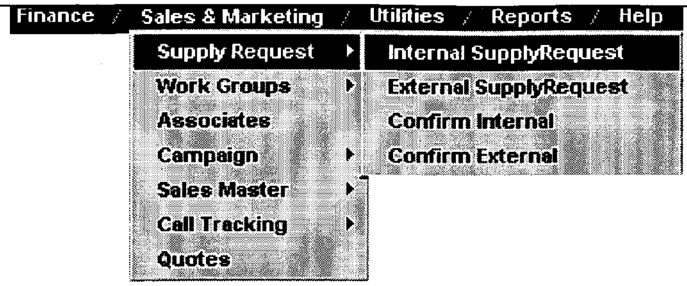
(Figure F-1)
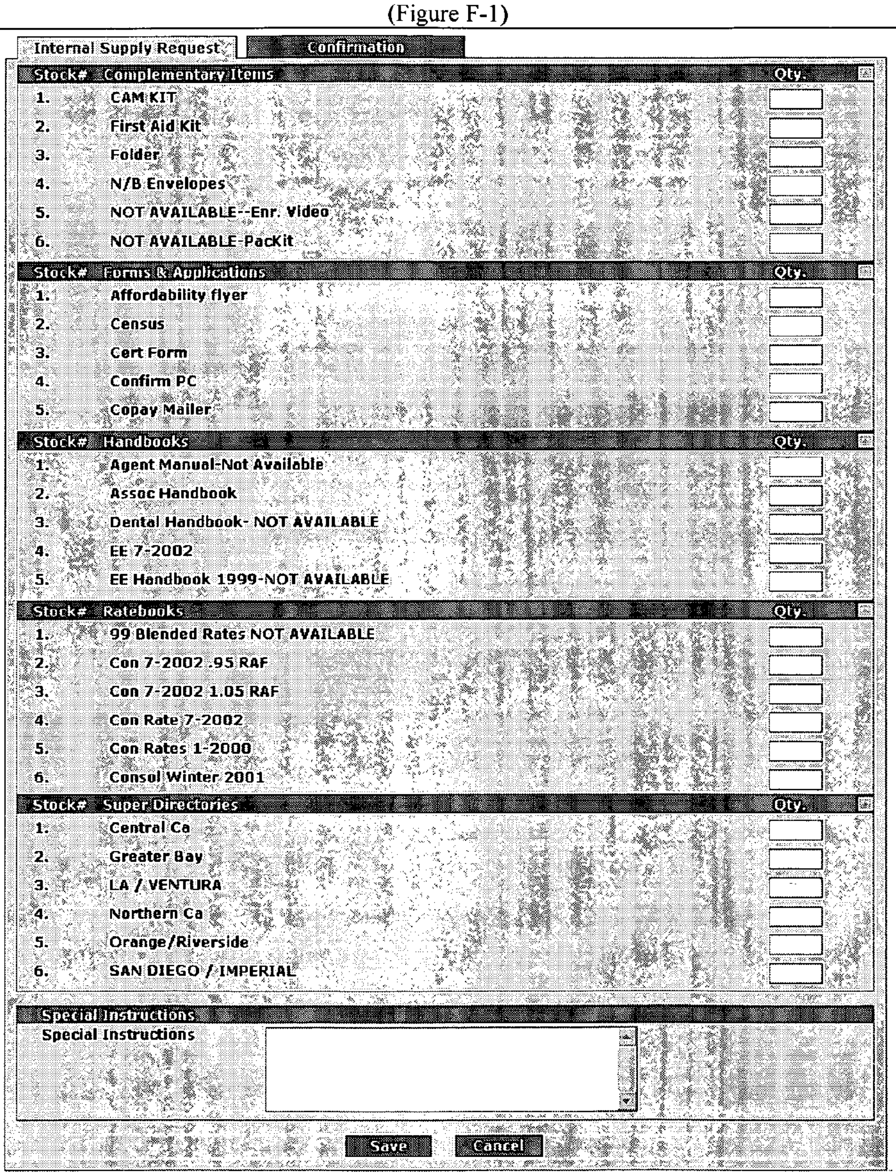
(Figure F-2)

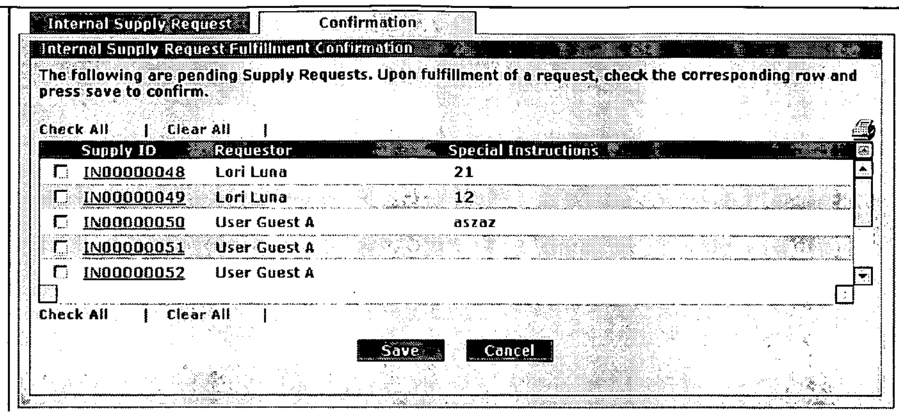
(Figure F-3)
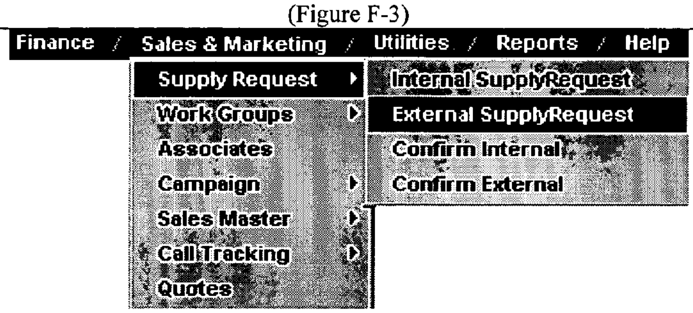
(Figure F-4)

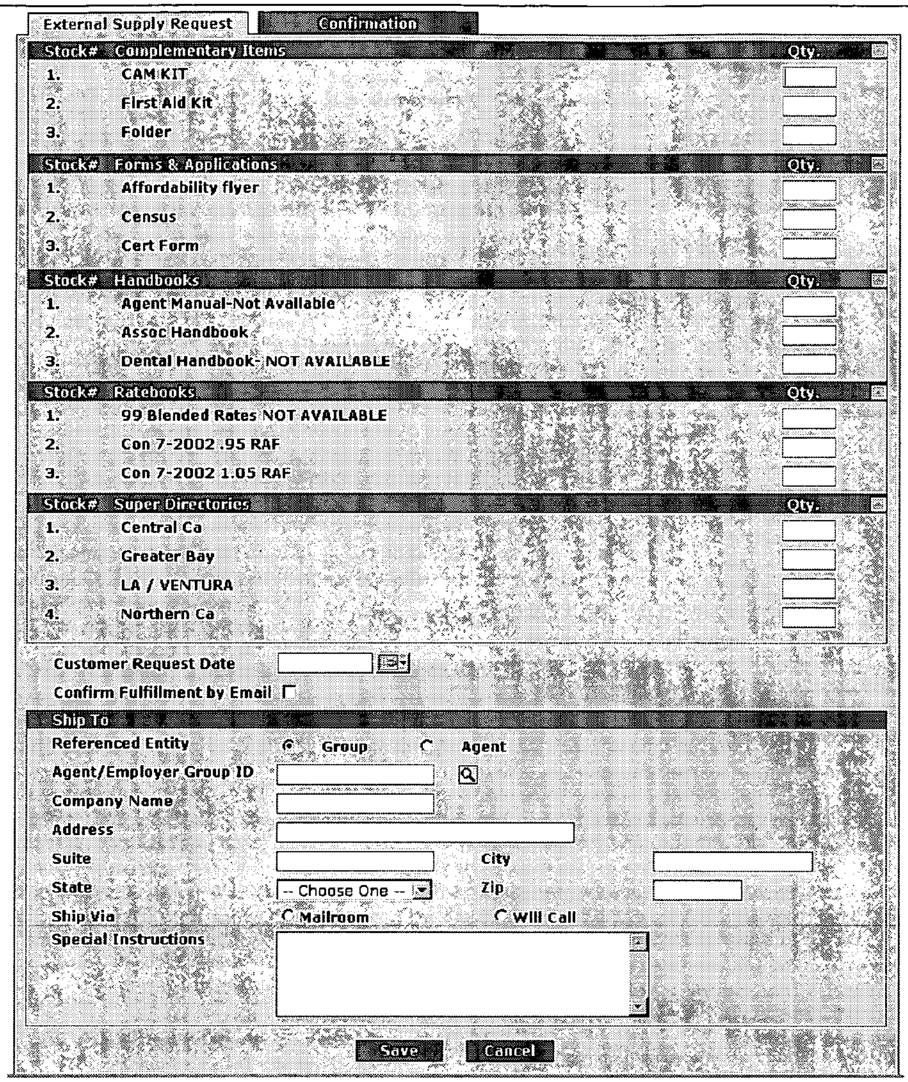
(Figure F-5)
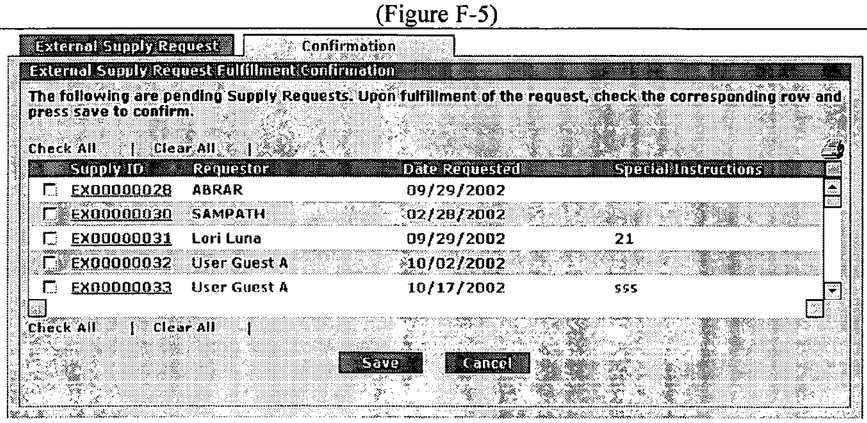
(Figure F-6)

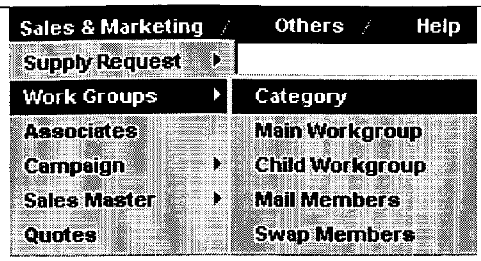
(Figure F-7)
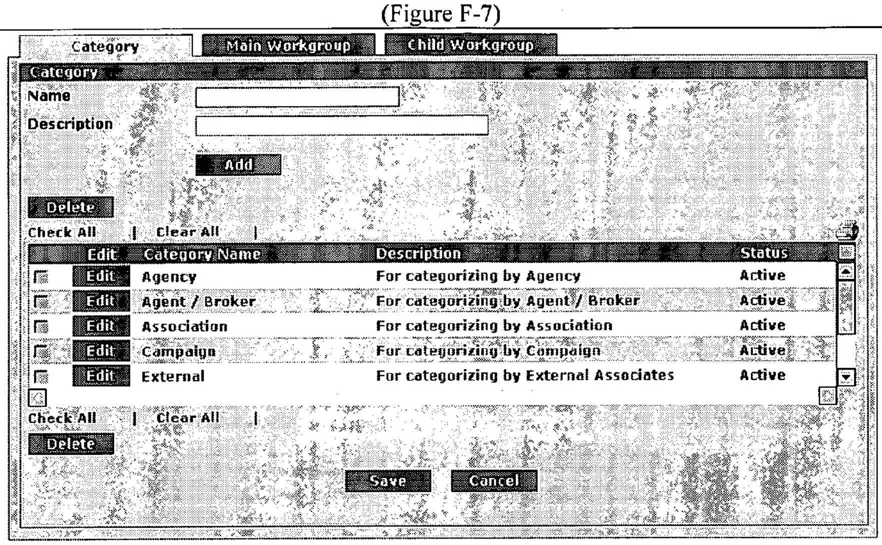
(Figure F-8)
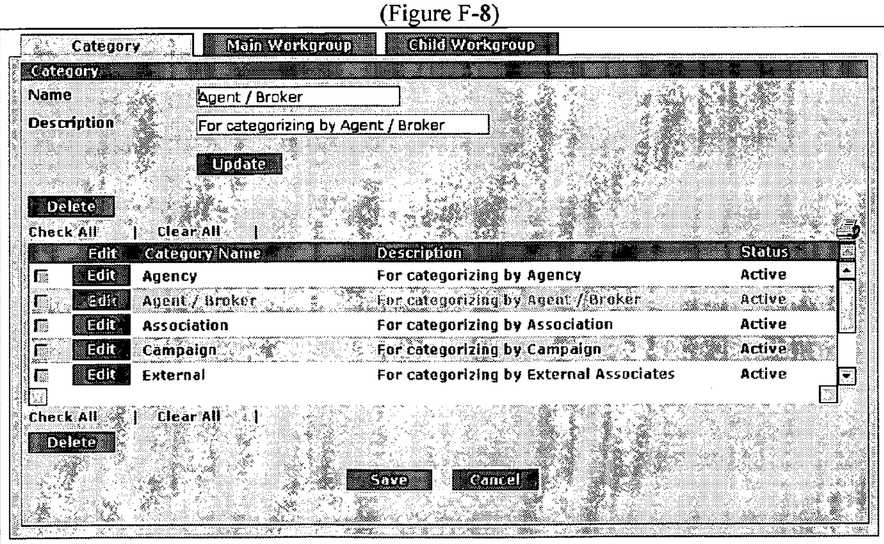
(Figure F-9)

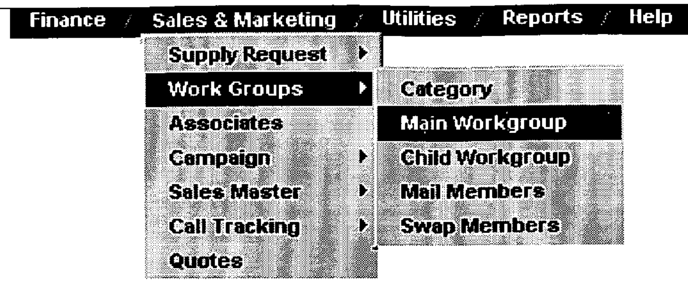
(Figure F-10)
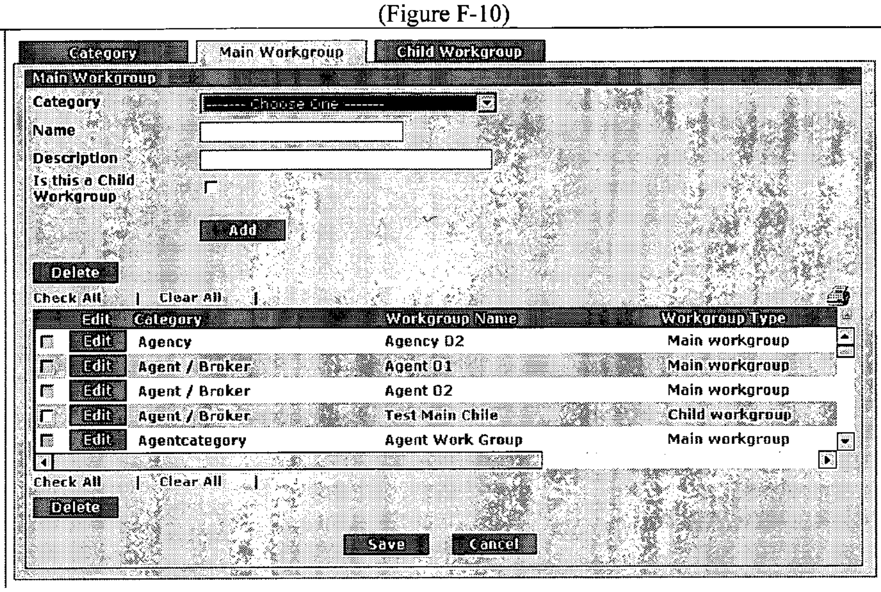
(Figure F-11)
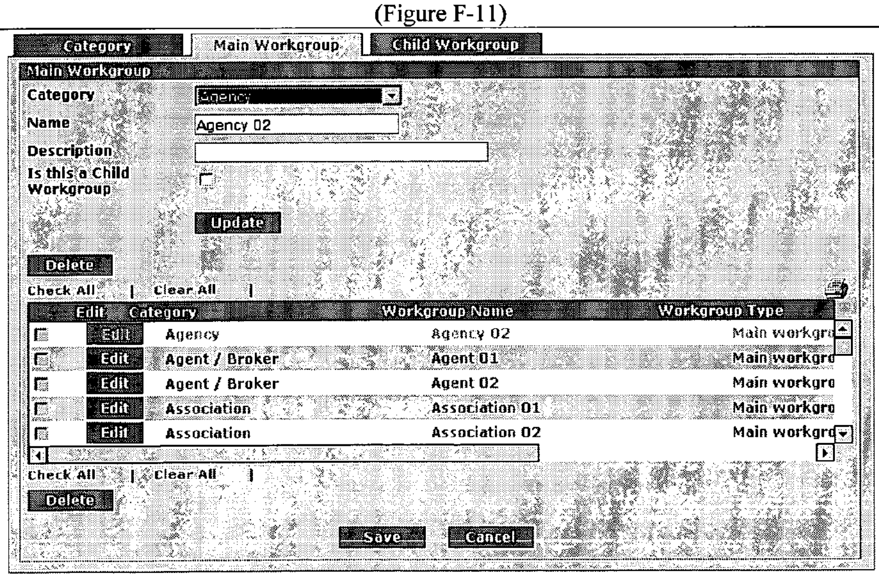
(Figure F-12)

(Figure F-13)
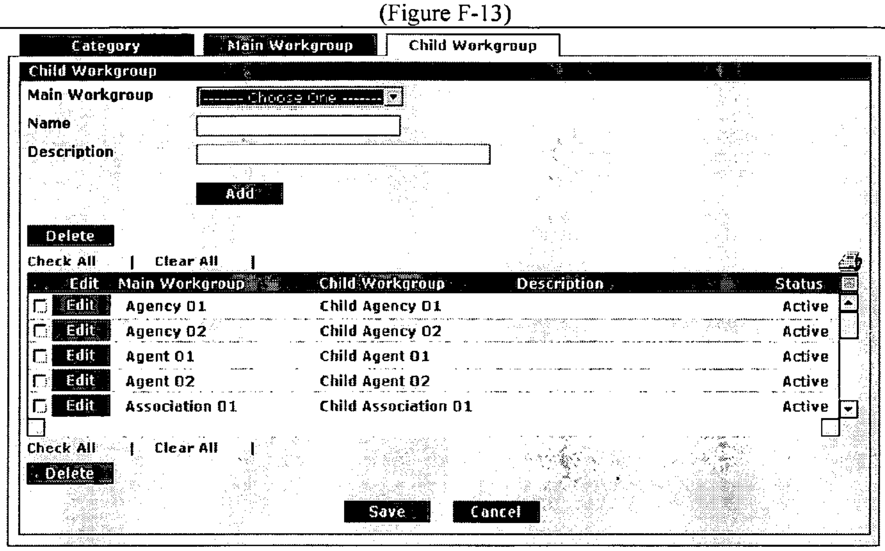
(Figure F-14)
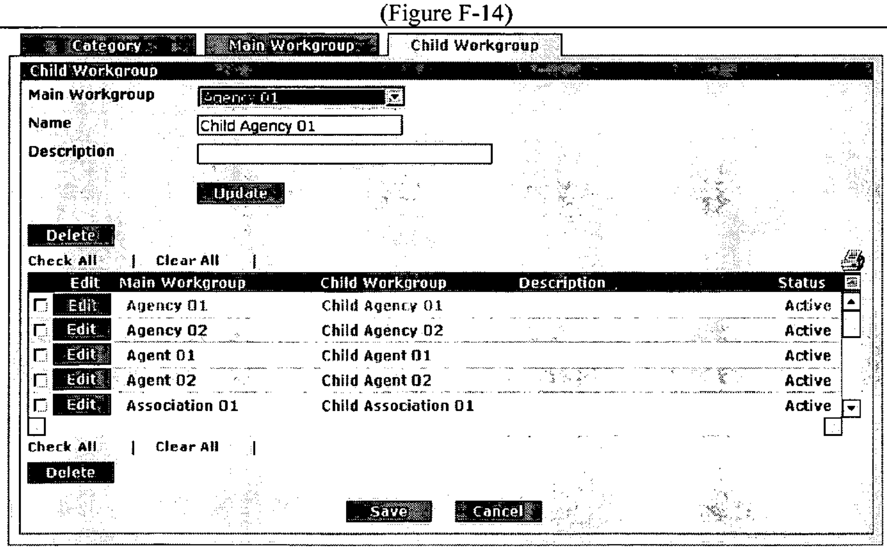
(Figure F-15)

(Figure F-16)
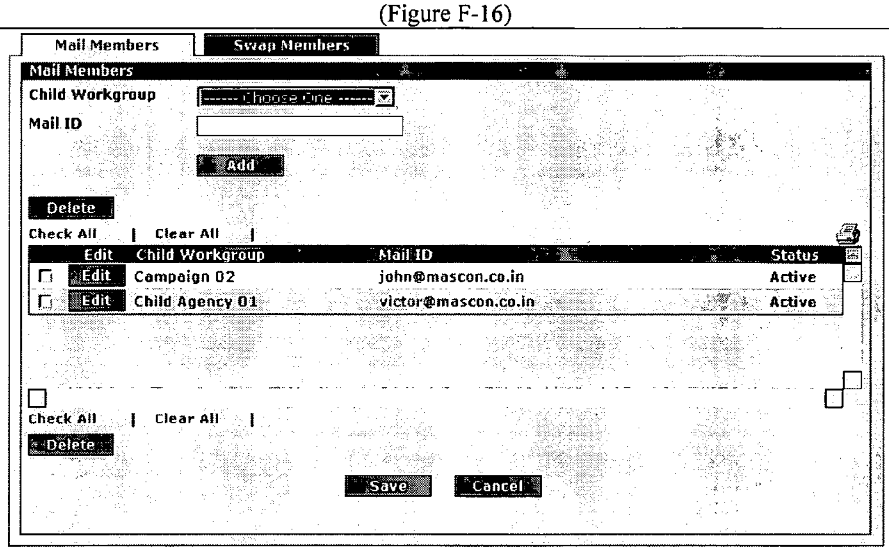
(Figure F-17)
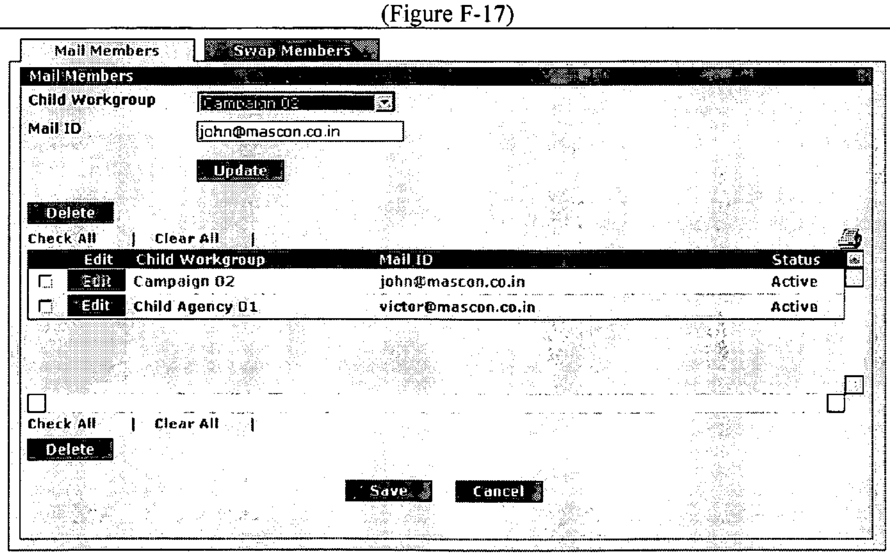
(Figure F-18)

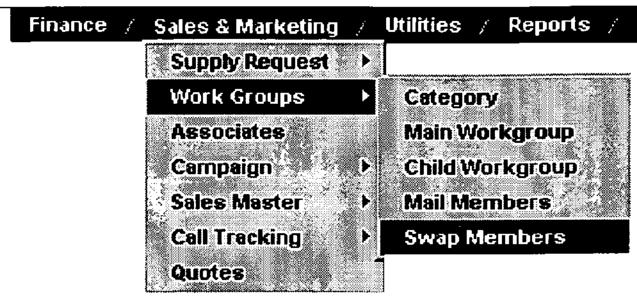
(Figure F-19)
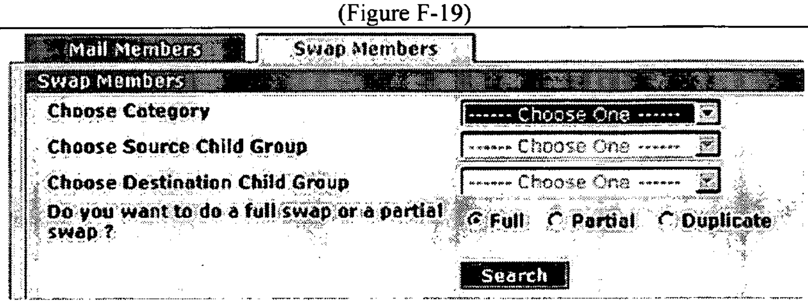
(Figure F-20)
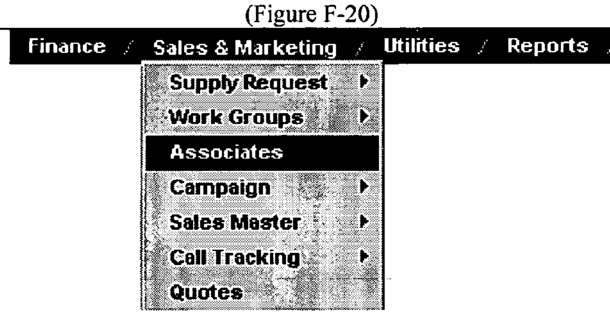
(Figure F-21)

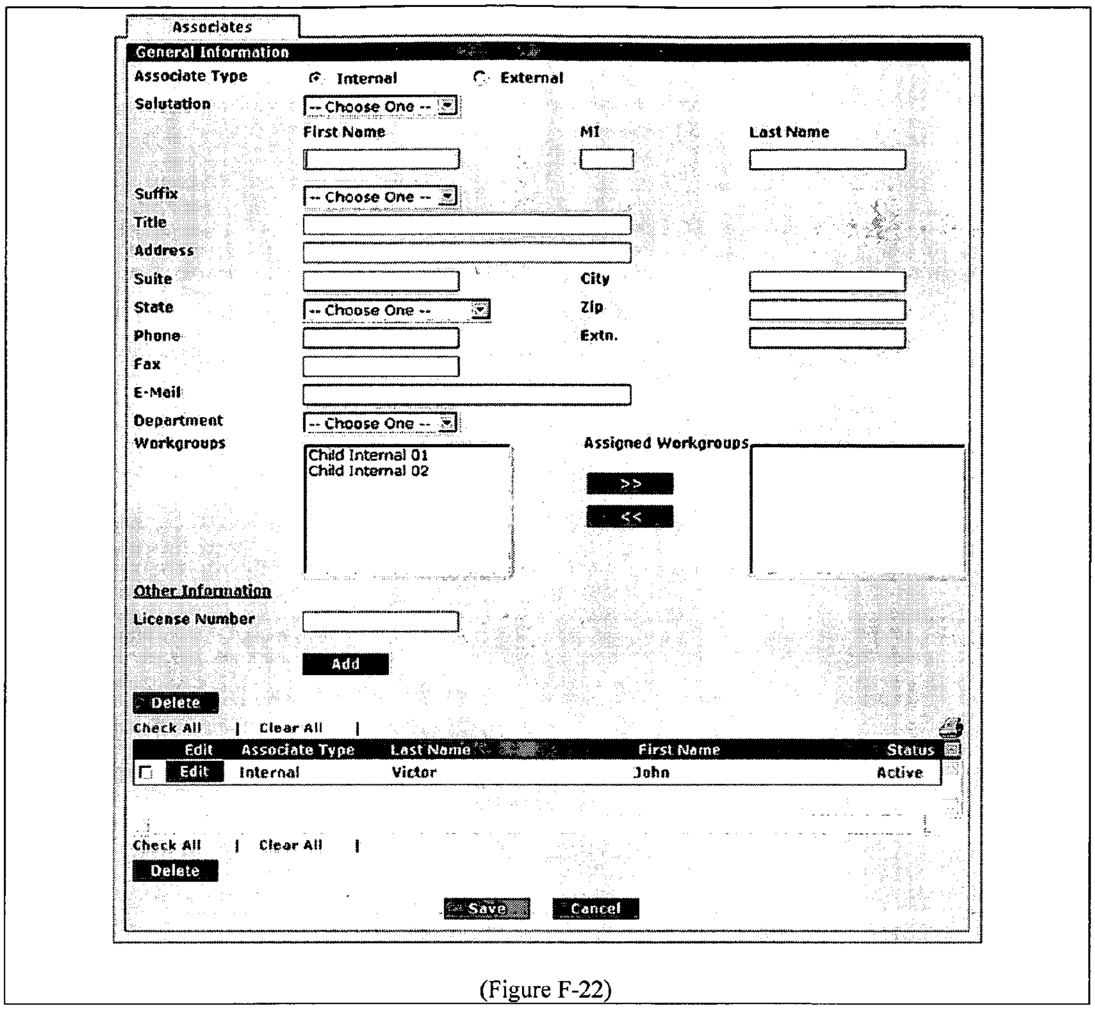
(Figure F-22)

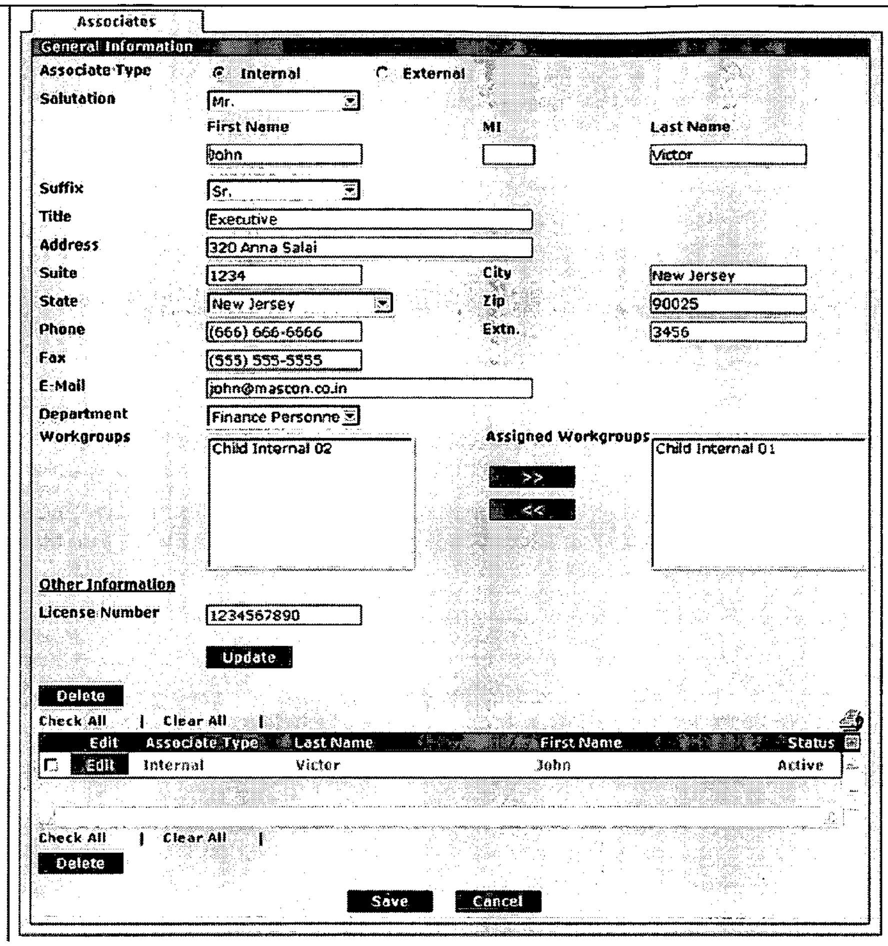
(Figure F-23)
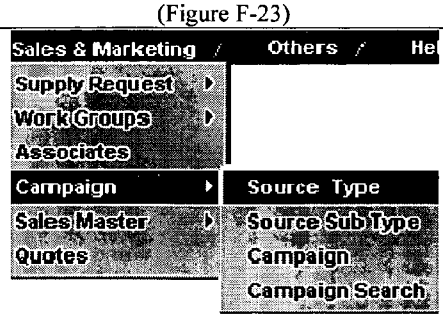
(Figure F-24)

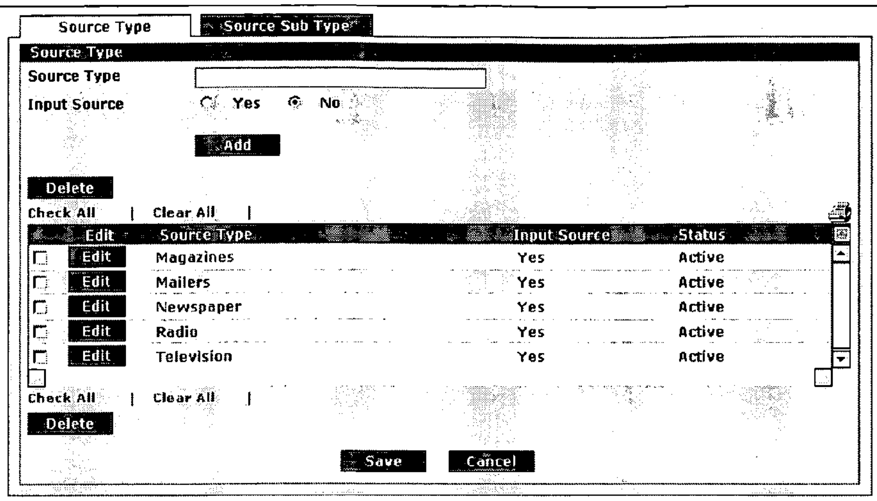
(Figure F-25)
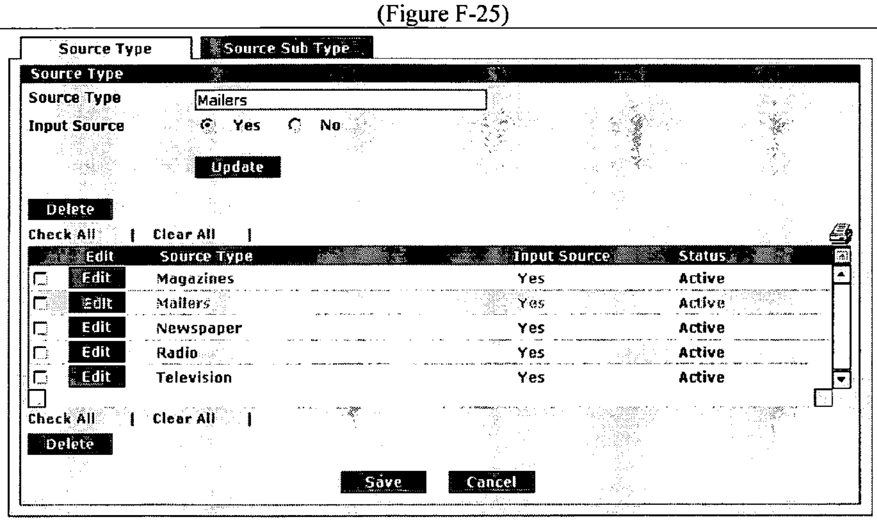
(Figure F-26)
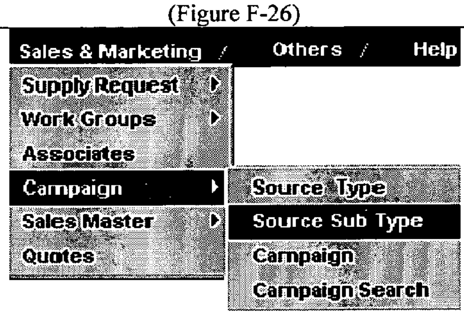
(Figure F-27)

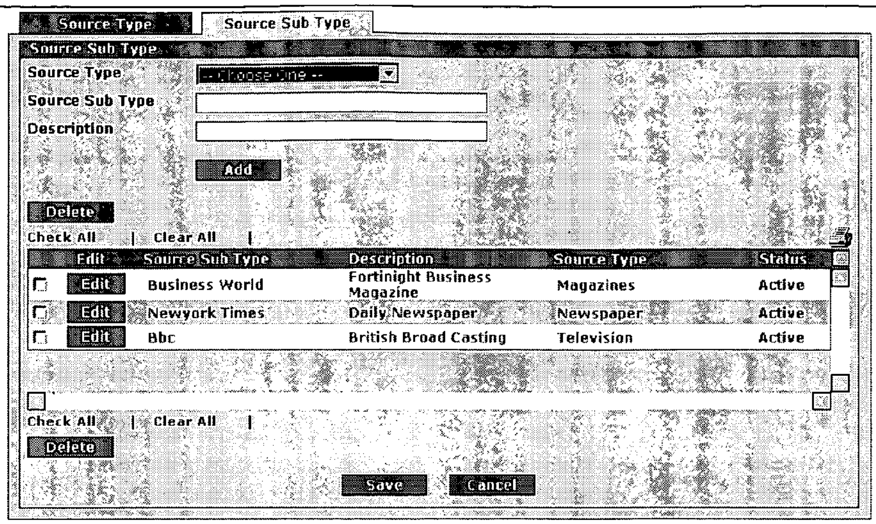
(Figure F-28)
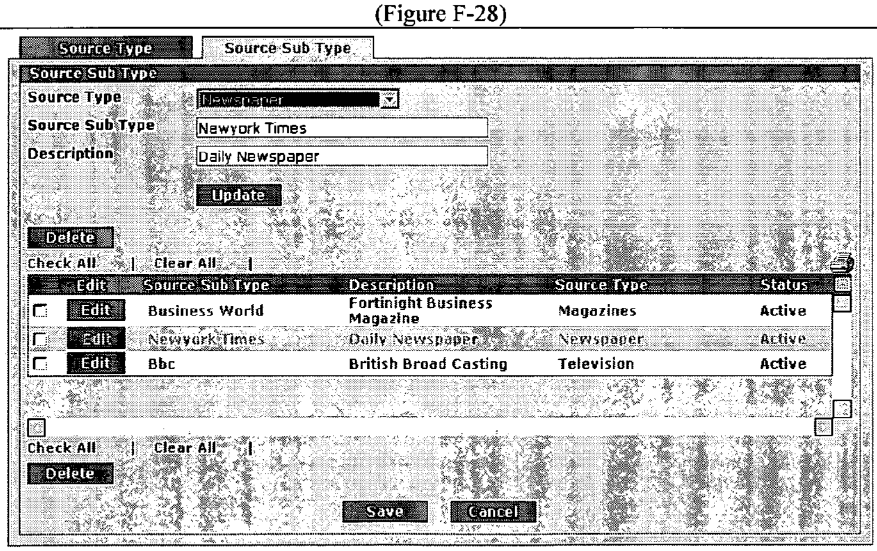
(Figure F-29)
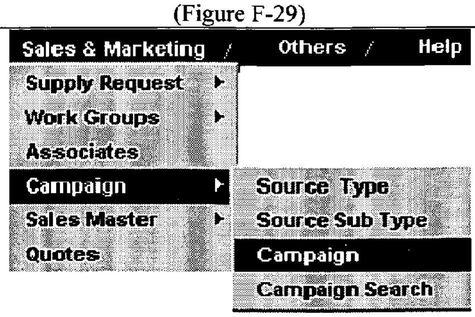
(Figure F-30)

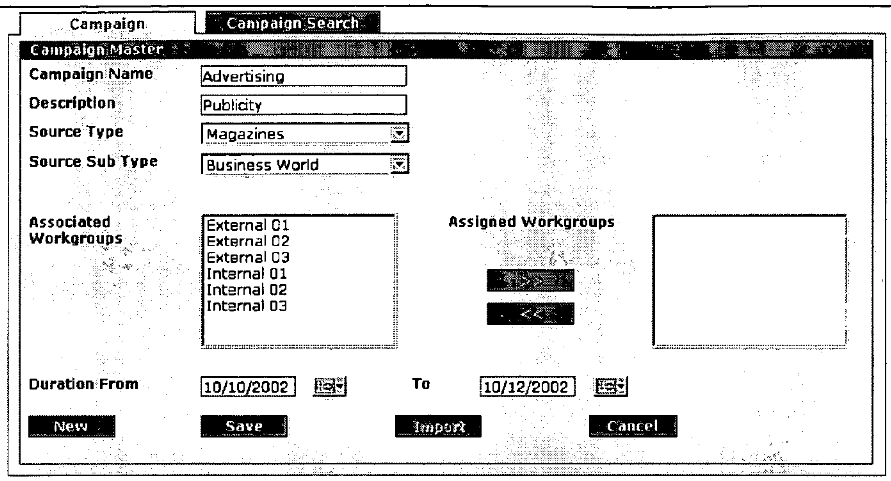
(Figure F-31)
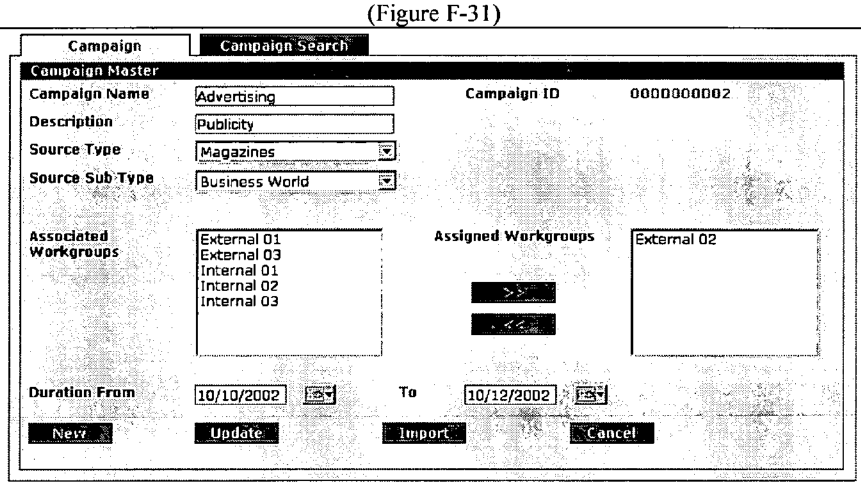
(Figure F-32)
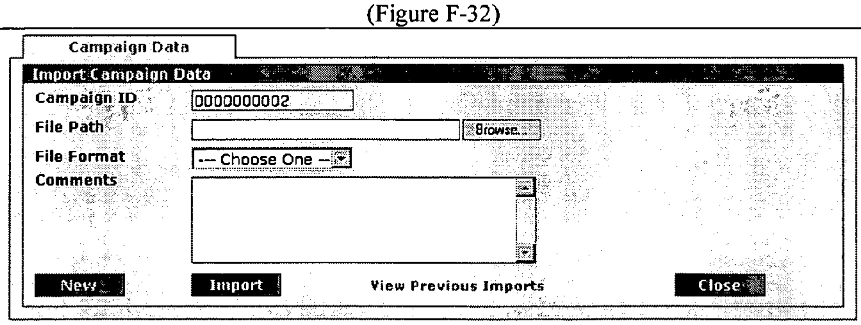
(Figure F-33)

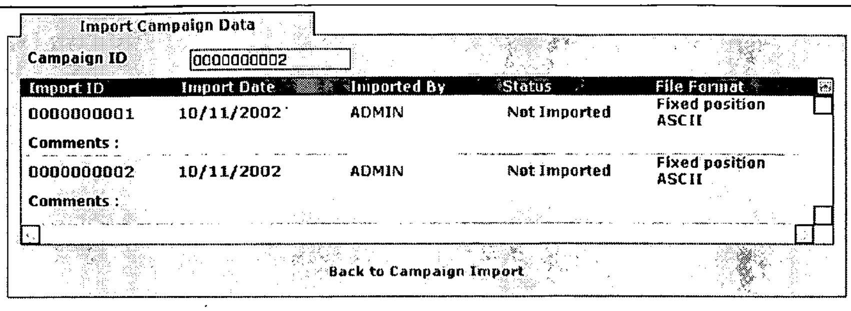
(Figure F-34)
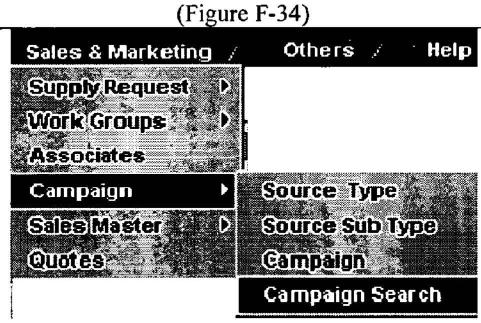
(Figure F-35)
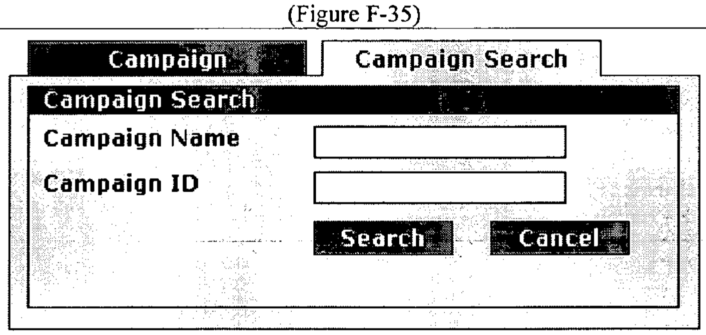
(Figure F-36)
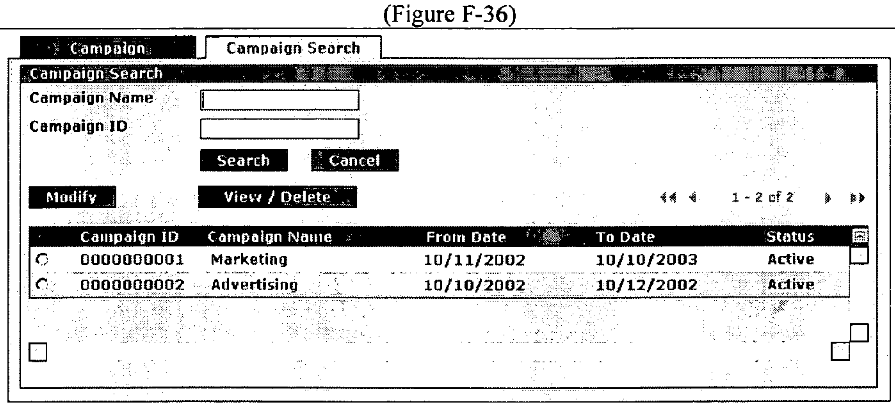
(Figure F-37)

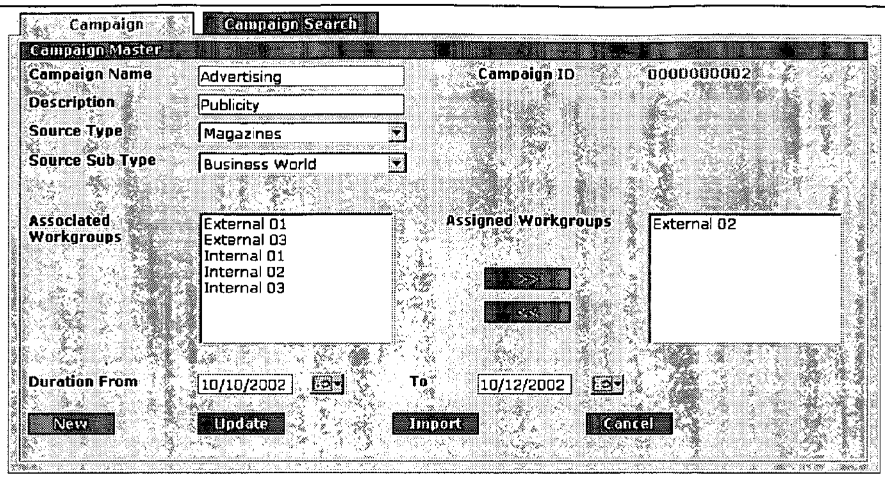
(Figure F-38)
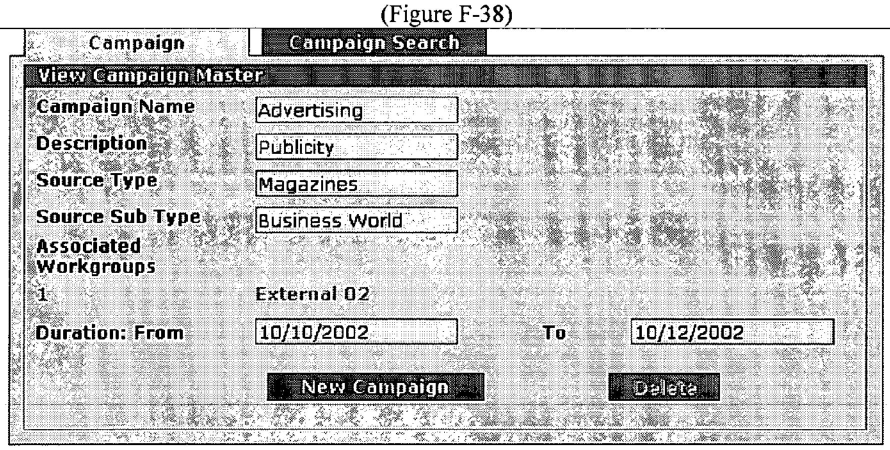
(Figure F-39)

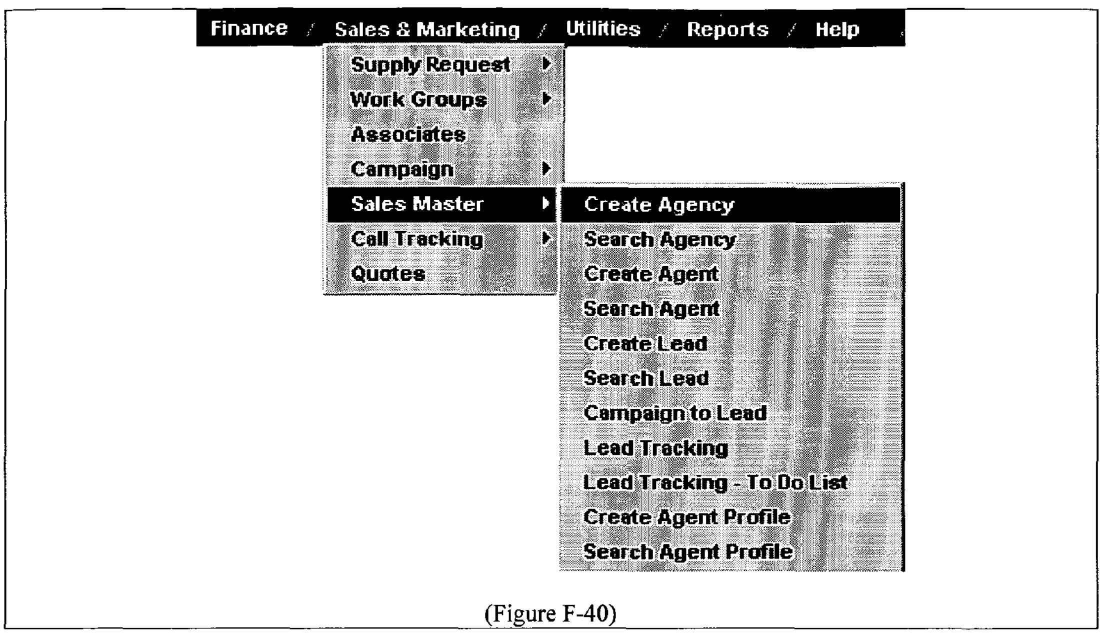
(Figure F-40)

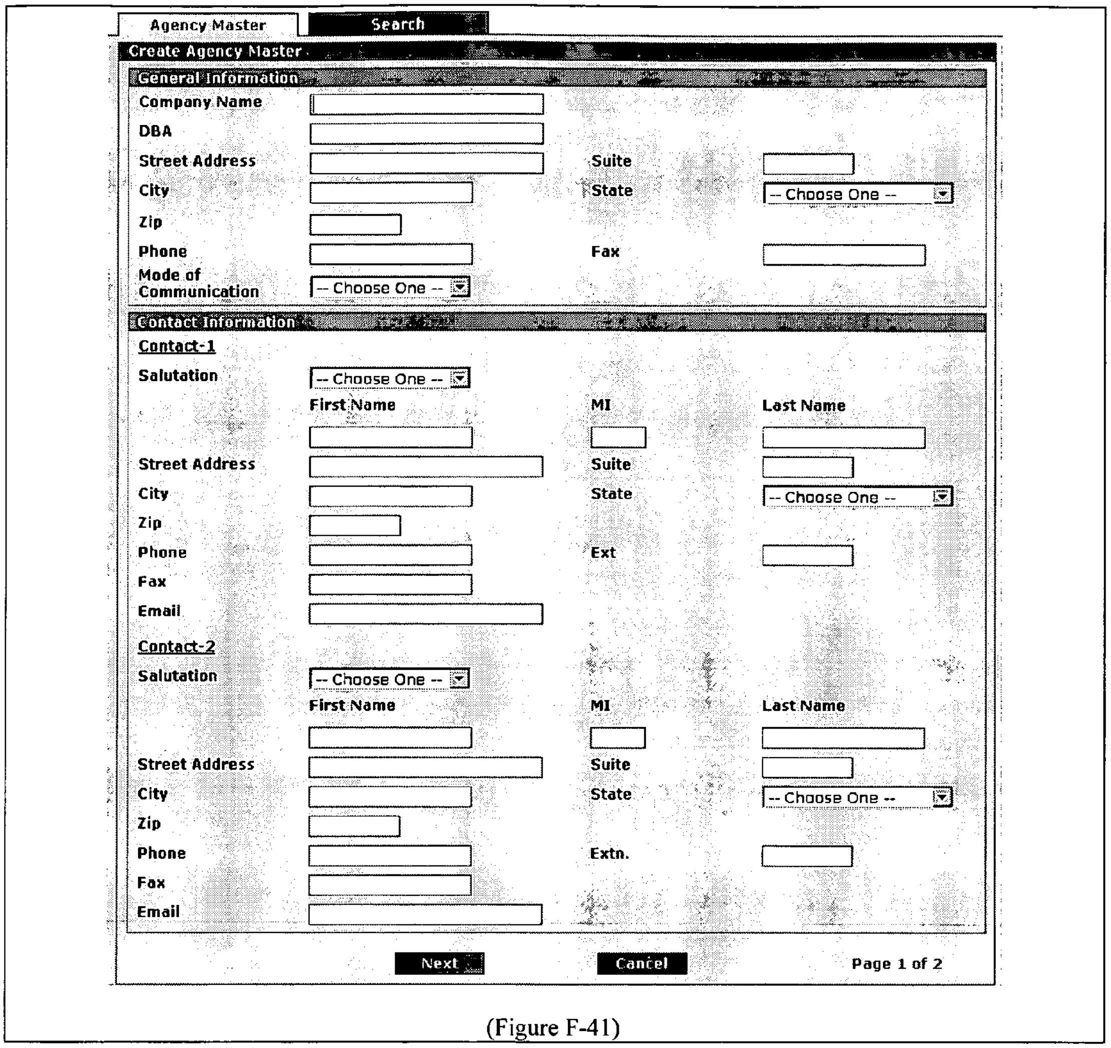
(Figure F-41)

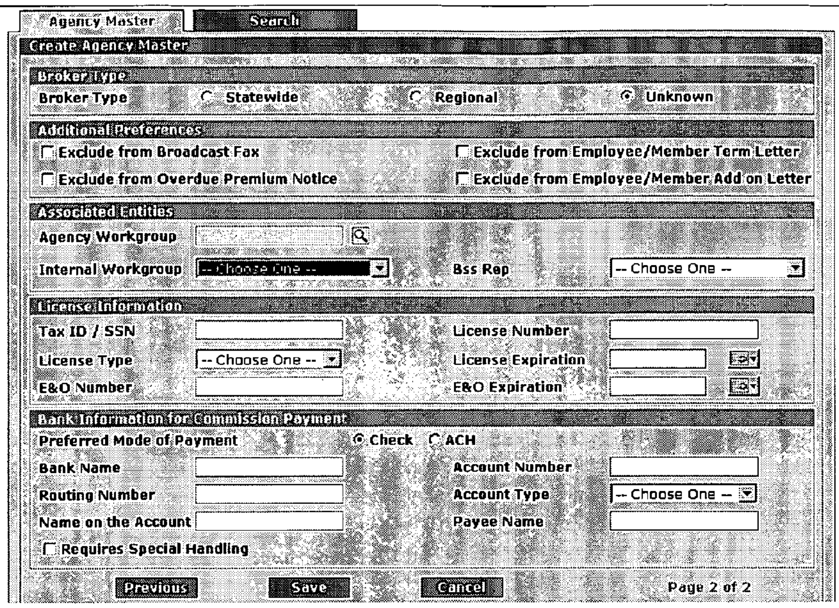
(Figure F-42)
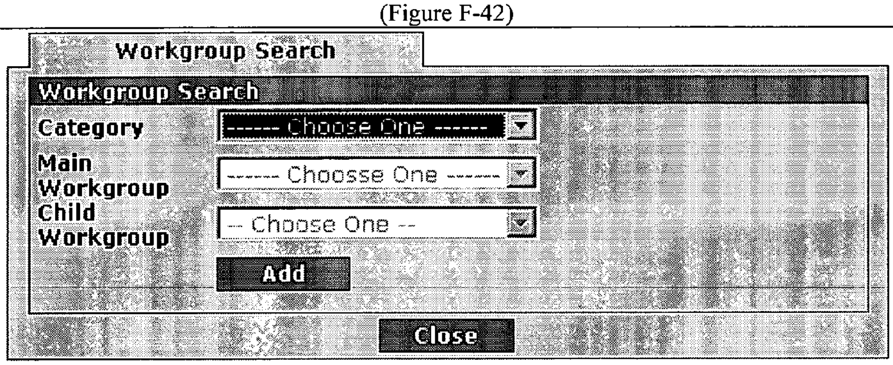
(Figure F-43)

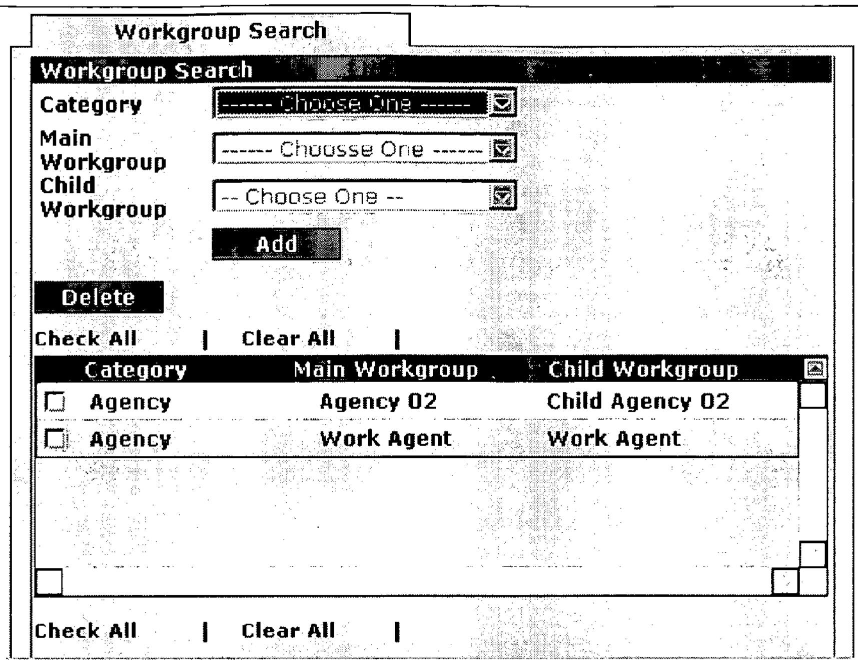
(Figure F-44)
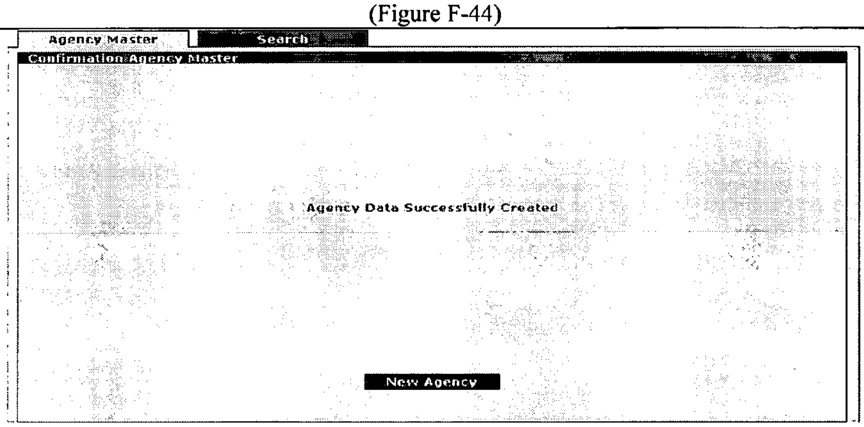
(Figure F-45)

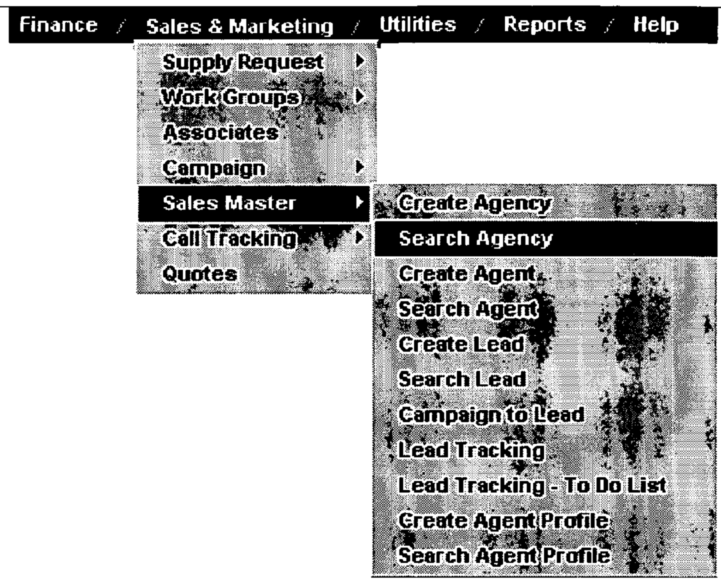
(Figure F-46)
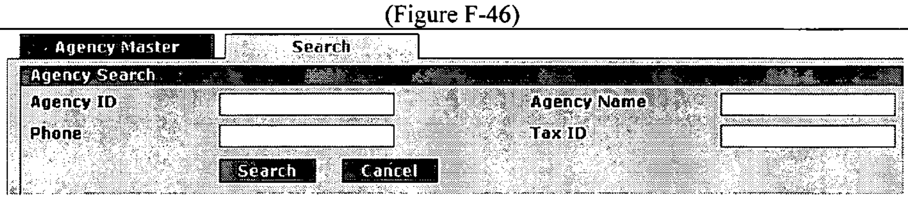
(Figure F-47)
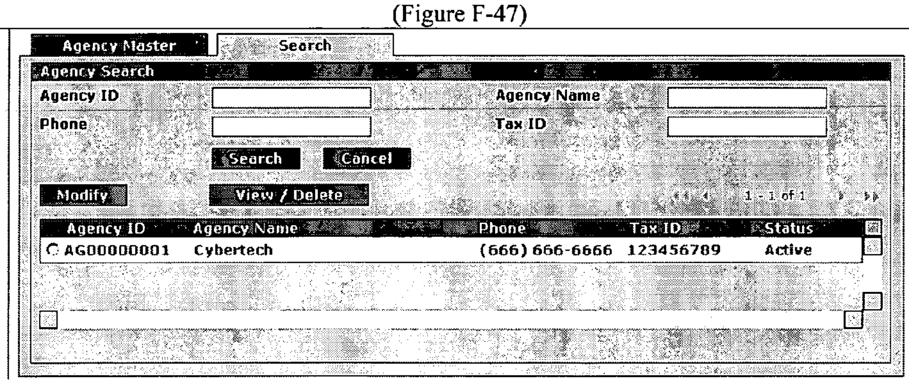
(Figure F-48)

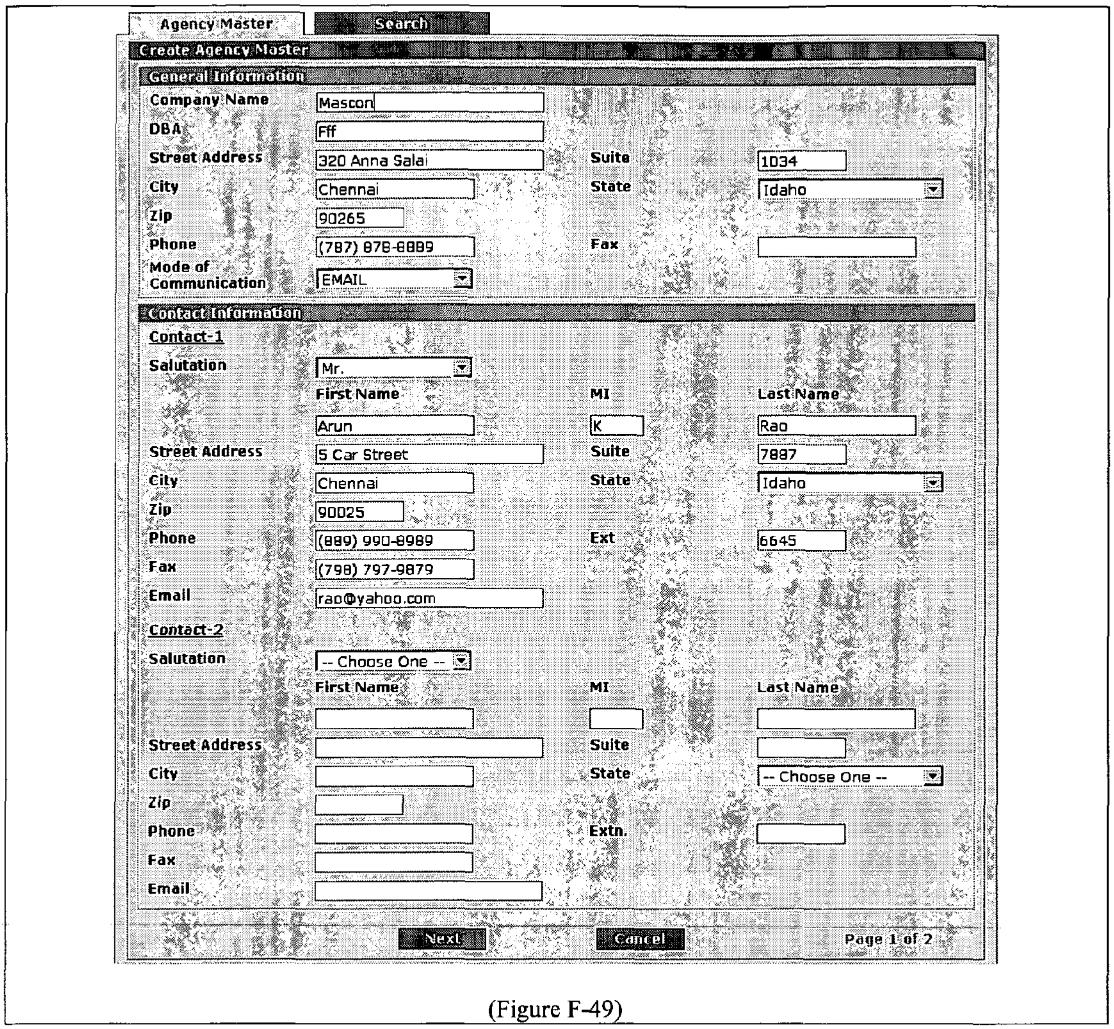
(Figure F-49)

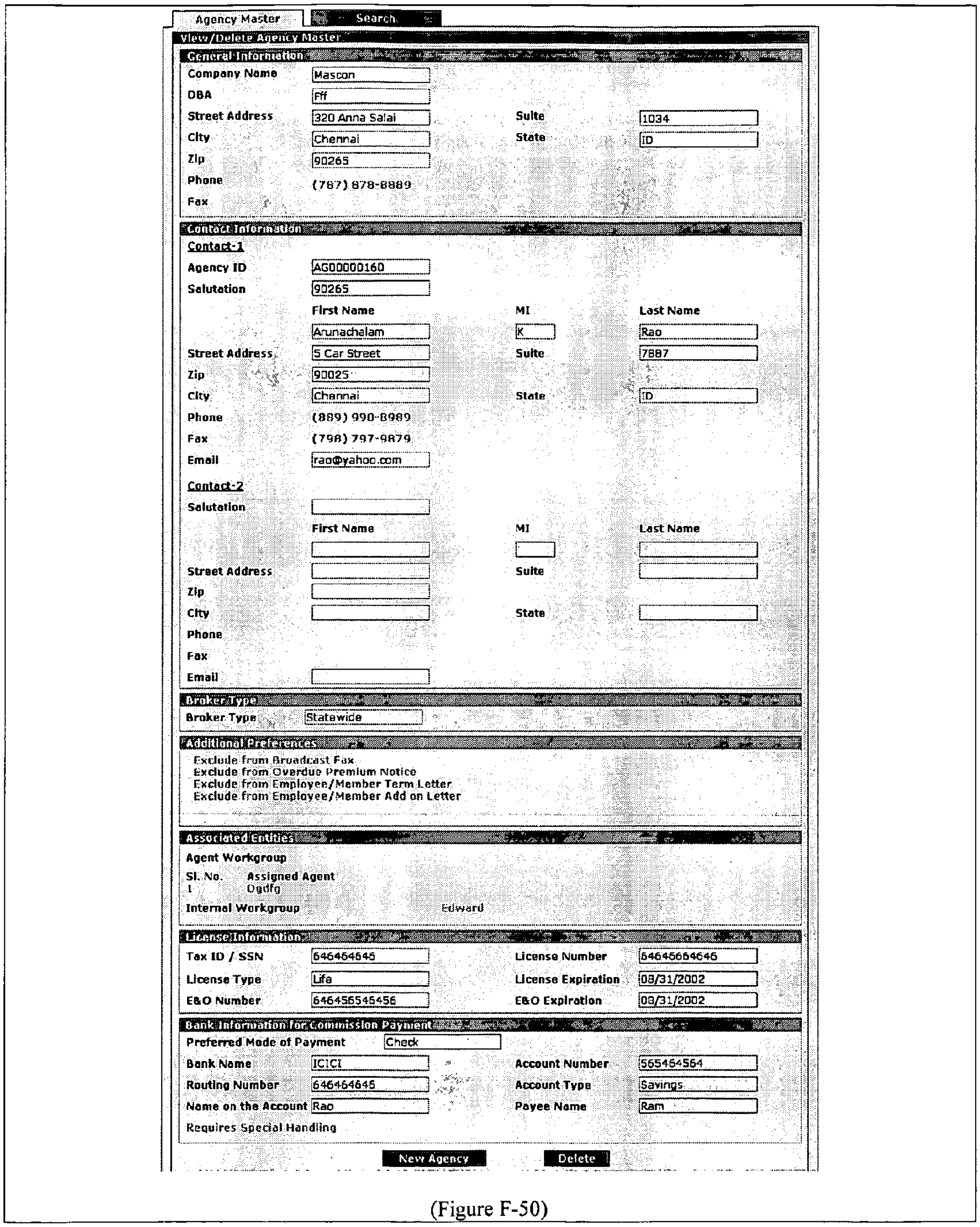
(Figure F-50)

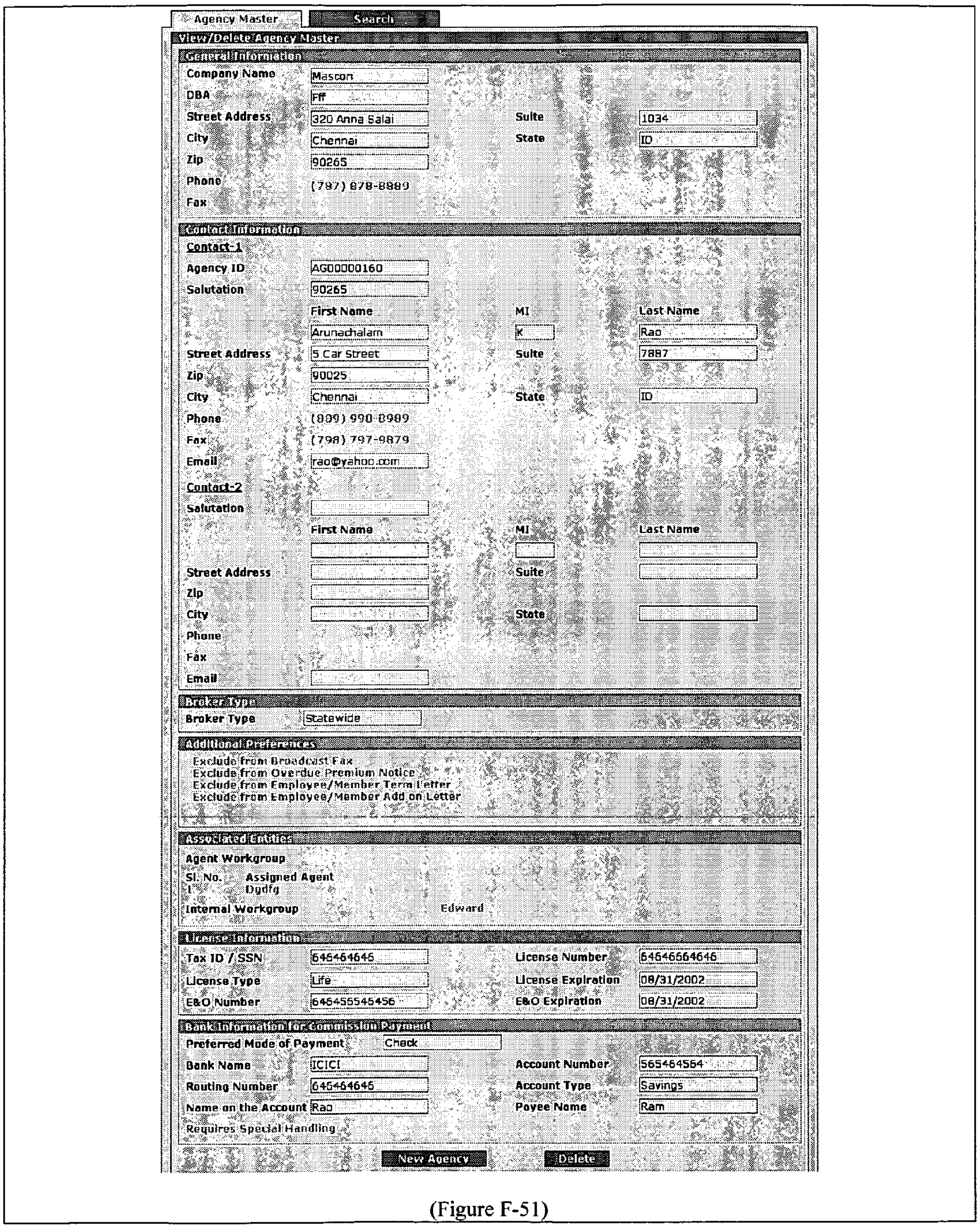
Agency Master | Search

View/Delete Agency Master

General Information

| | | | |
|---|---|---|---|
| Company Name | Mascon | | |
| DBA | Fff | | |
| Street Address | 320 Anna Salai | Suite | 1034 |
| City | Chennai | State | ID |
| Zip | 90265 | | |
| Phone | (787) 878-8889 | | |
| Fax | | | |

Contact Information

Contact-1

| | | | |
|---|---|---|---|
| Agency ID | AG00000160 | | |
| Salutation | 90265 | | |
| | First Name | MI | Last Name |
| | Arunachalam | K | Rao |
| Street Address | 5 Car Street | Suite | 7887 |
| Zip | 90025 | | |
| City | Chennai | State | ID |
| Phone | (809) 990-8989 | | |
| Fax | (798) 797-9879 | | |
| Email | rao@yahoo.com | | |

Contact-2

| | | | |
|---|---|---|---|
| Salutation | | | |
| | First Name | MI | Last Name |
| Street Address | | Suite | |
| Zip | | | |
| City | | State | |
| Phone | | | |
| Fax | | | |
| Email | | | |

Broker Type

Broker Type: Statewide

Additional Preferences

Exclude from Broadcast Fax
Exclude from Overdue Premium Notice
Exclude from Employee/Member Term Letter
Exclude from Employee/Member Add on Letter Associated Entities Agent Workgroup

| Sl. No. | Assigned Agent |
|---|---|
| 1 | Dgdfg |

Internal Workgroup: Edward

License Information

| | | | |
|---|---|---|---|
| Tax ID / SSN | 645464645 | License Number | 64546564646 |
| License Type | Life | License Expiration | 08/31/2002 |
| E&O Number | 645455545456 | E&O Expiration | 08/31/2002 |

Bank Information for Commission Payment

| | | | |
|---|---|---|---|
| Preferred Mode of Payment | Check | | |
| Bank Name | ICICI | Account Number | 565464564 |
| Routing Number | 645464645 | Account Type | Savings |
| Name on the Account | Rao | Payee Name | Ram |
| Requires Special Handling | | | |

New Agency | Delete (Figure F-51)

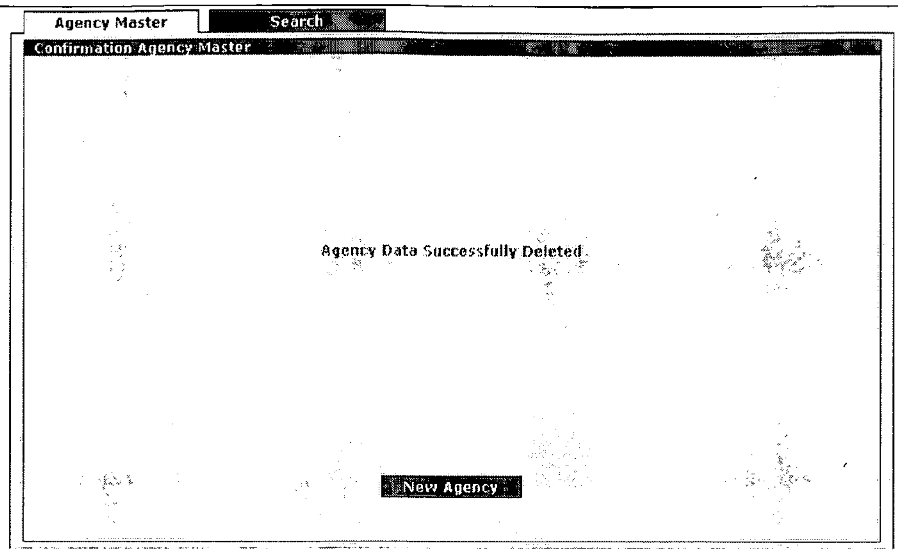
(Figure F-52)
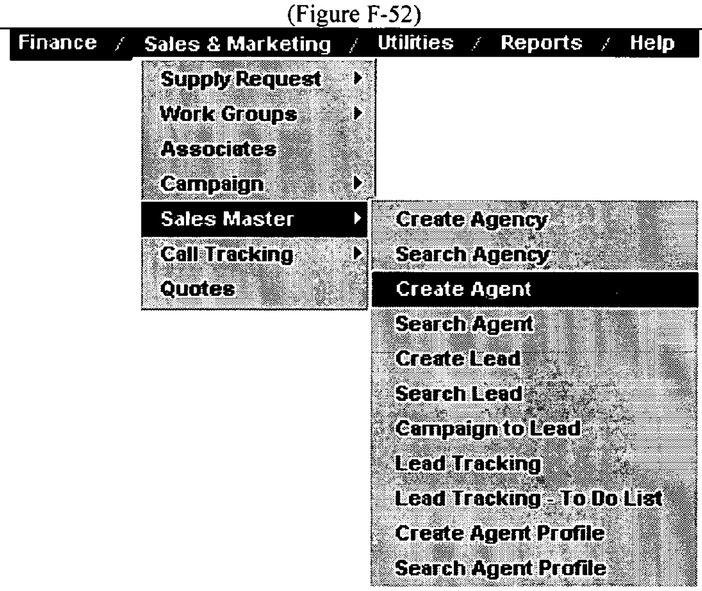
(Figure F-53)

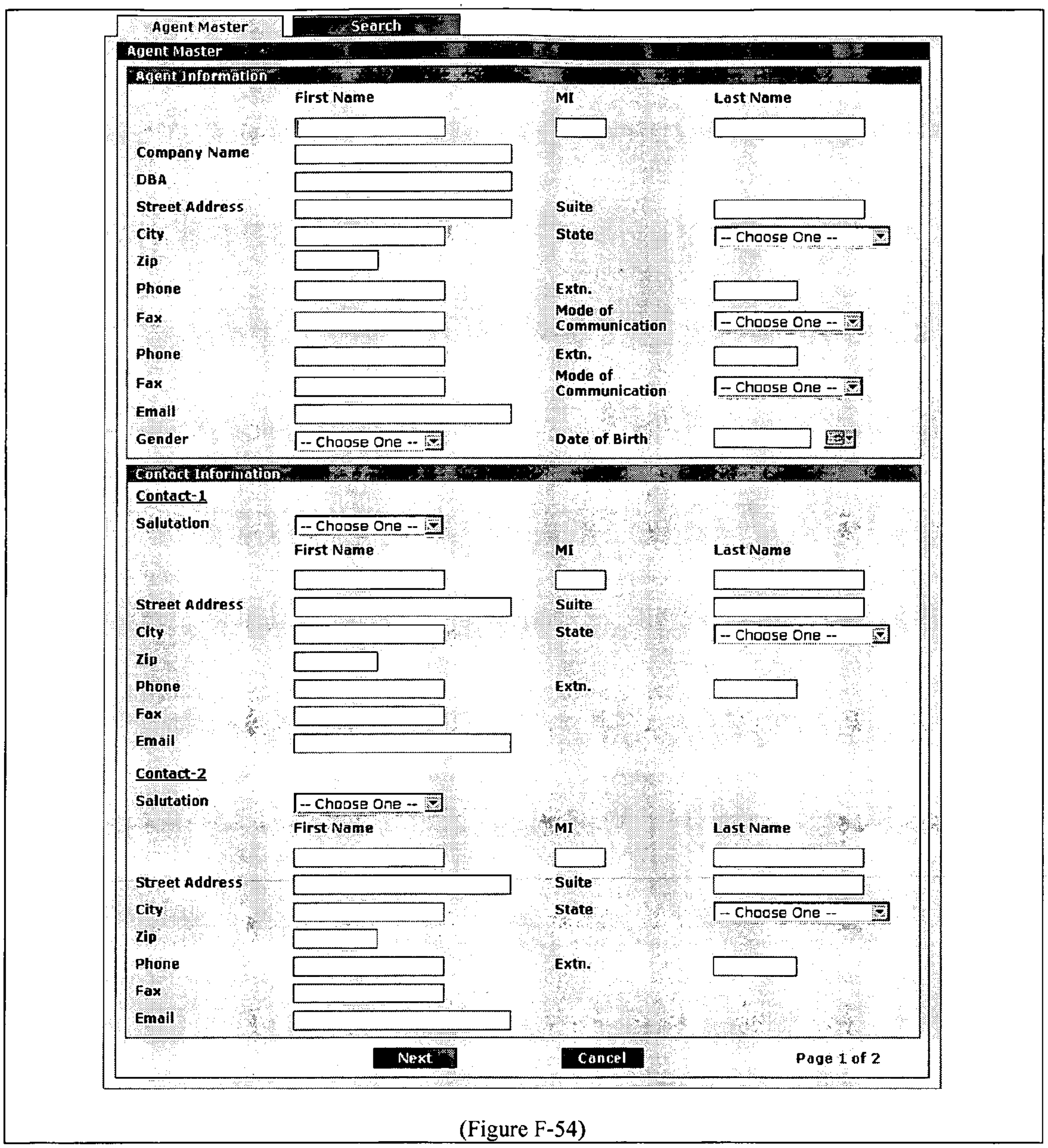
(Figure F-54)

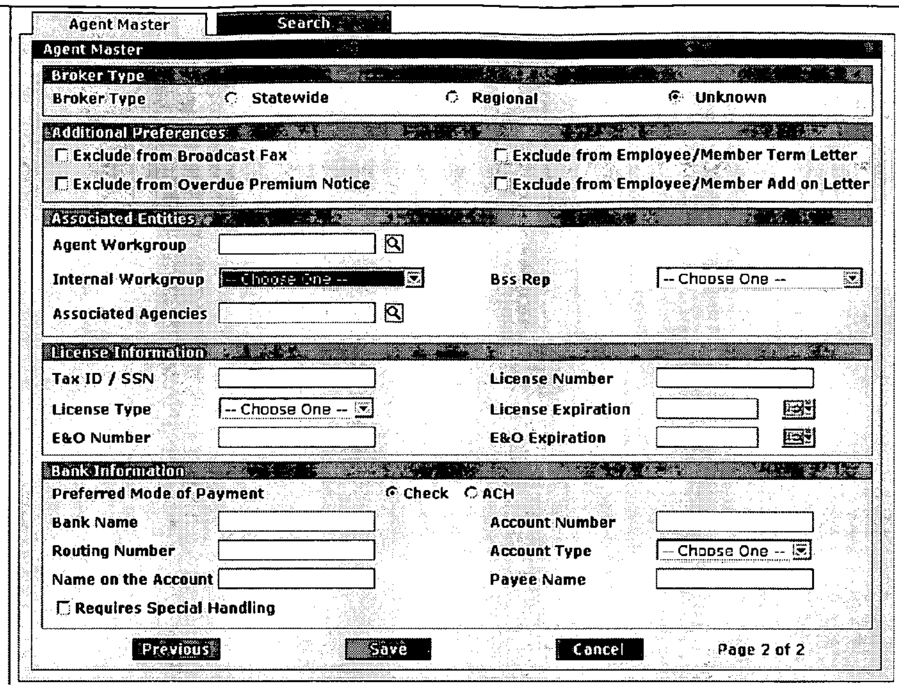
(Figure F-55)
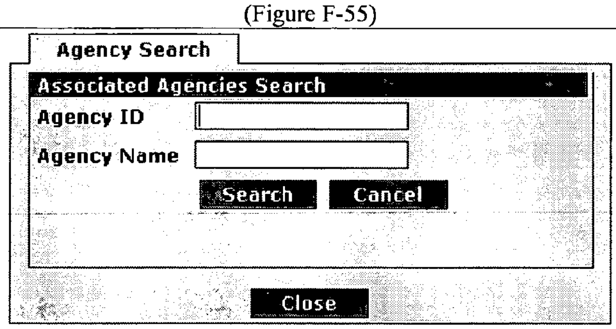
(Figure F-56)

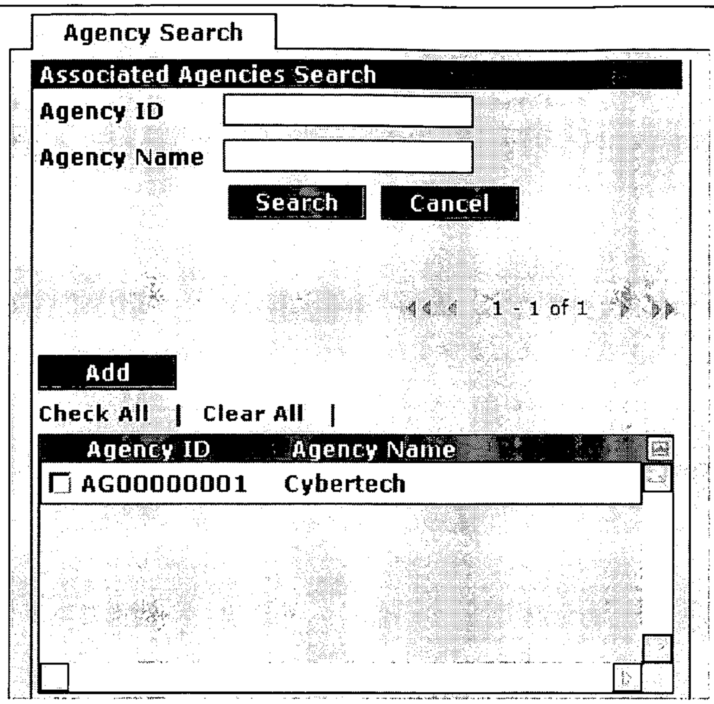
(Figure F-57)
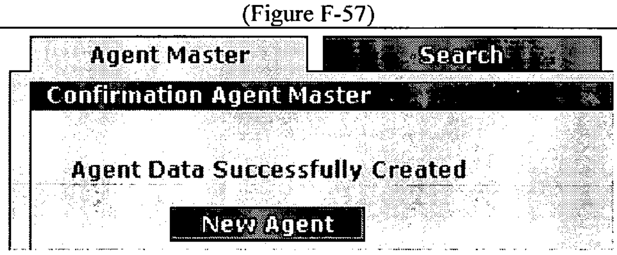
(Figure F-58)

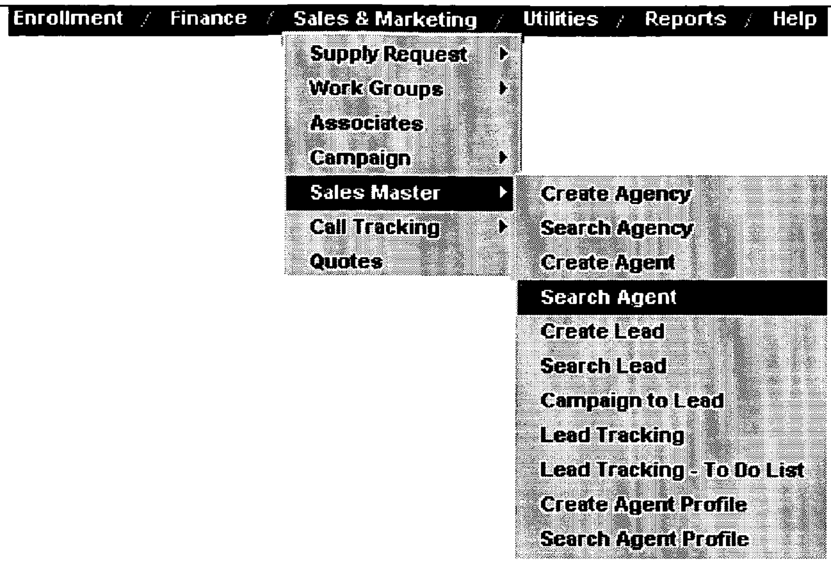
(Figure F-59)
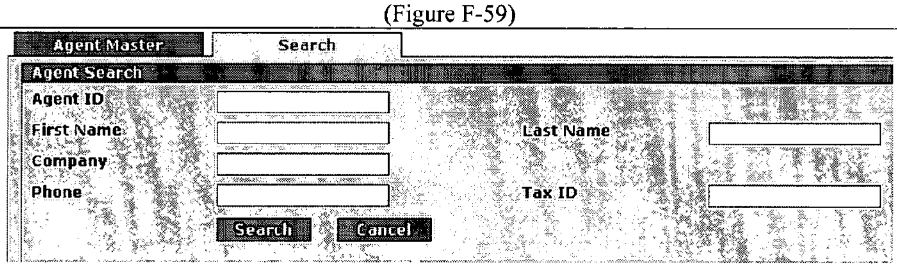
(Figure F-60)
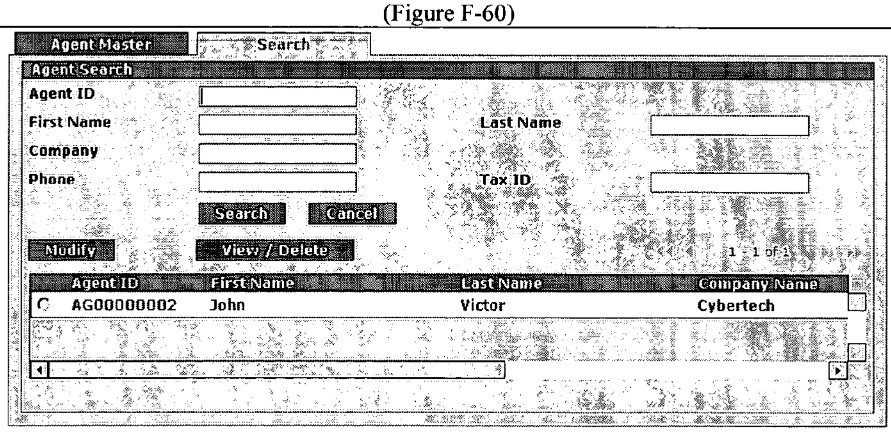
(Figure F-61)

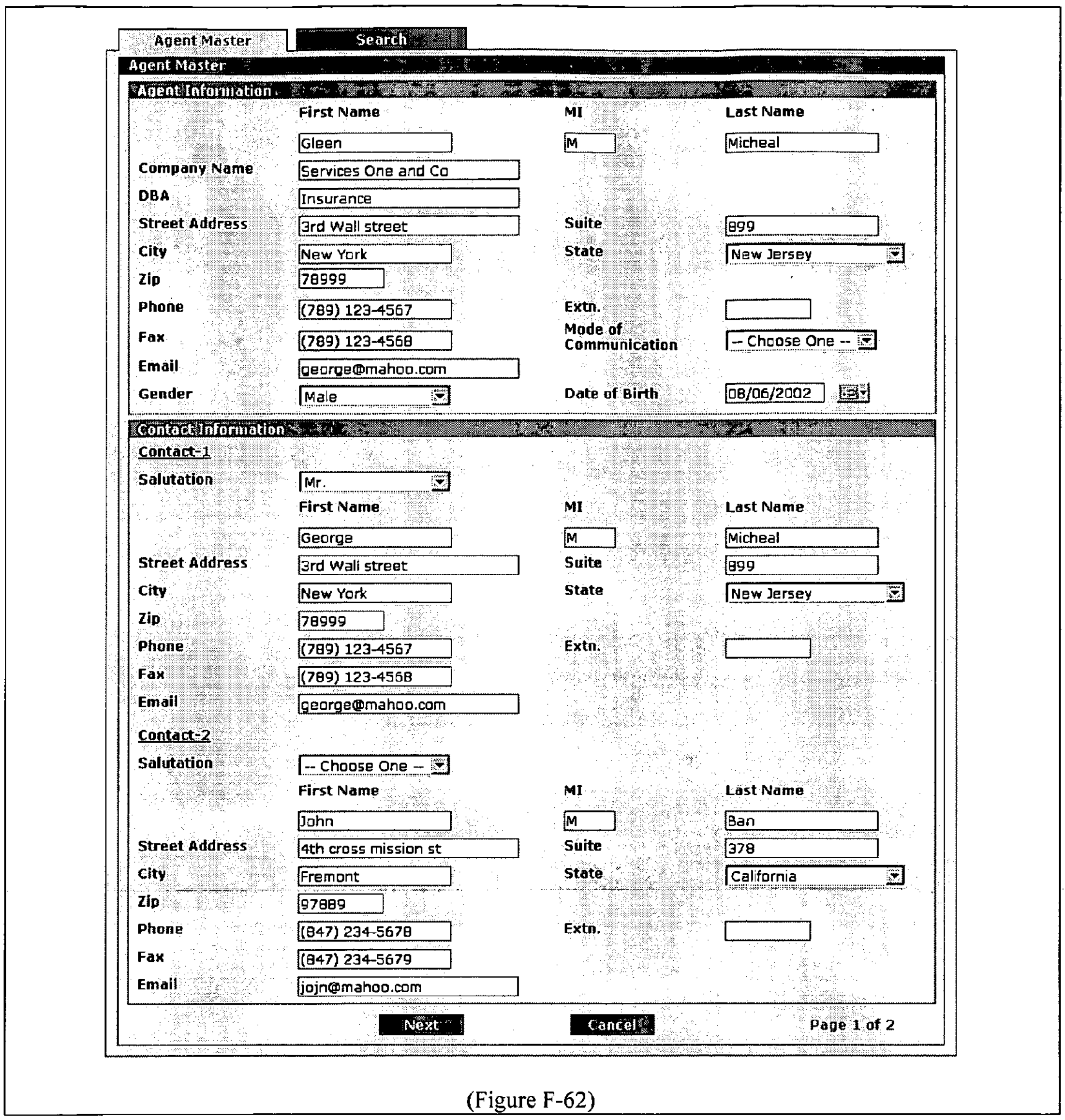

Agent Master | Search

Agent Master

Agent Information

| | | | |
|---|---|---|---|
| | First Name | MI | Last Name |
| | Gleen | M | Micheal |
| Company Name | Services One and Co | | |
| DBA | Insurance | | |
| Street Address | 3rd Wall street | Suite | 899 |
| City | New York | State | New Jersey |
| Zip | 78999 | | |
| Phone | (789) 123-4567 | Extn. | |
| Fax | (789) 123-4568 | Mode of Communication | -- Choose One -- |
| Email | george@mahoo.com | | |
| Gender | Male | Date of Birth | 08/06/2002 |

Contact Information

Contact-1

| | | | |
|---|---|---|---|
| Salutation | Mr. | | |
| | First Name | MI | Last Name |
| | George | M | Micheal |
| Street Address | 3rd Wall street | Suite | 899 |
| City | New York | State | New Jersey |
| Zip | 78999 | | |
| Phone | (789) 123-4567 | Extn. | |
| Fax | (789) 123-4568 | | |
| Email | george@mahoo.com | | |

Contact-2

| | | | |
|---|---|---|---|
| Salutation | -- Choose One -- | | |
| | First Name | MI | Last Name |
| | John | M | Ban |
| Street Address | 4th cross mission st | Suite | 378 |
| City | Fremont | State | California |
| Zip | 97889 | | |
| Phone | (847) 234-5678 | Extn. | |
| Fax | (847) 234-5679 | | |
| Email | jojn@mahoo.com | | |

Next | Cancel | Page 1 of 2

(Figure F-62)

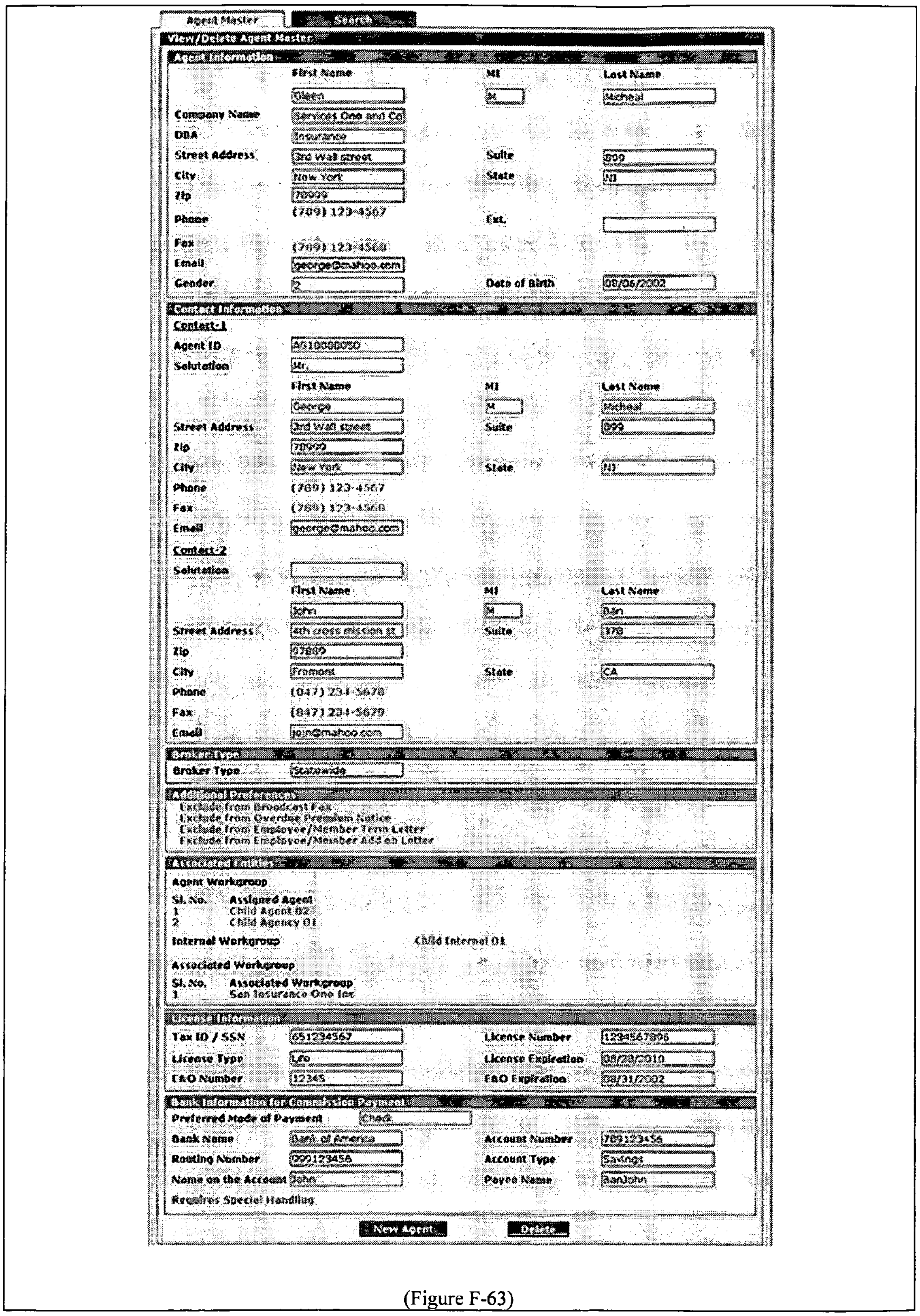
(Figure F-63)

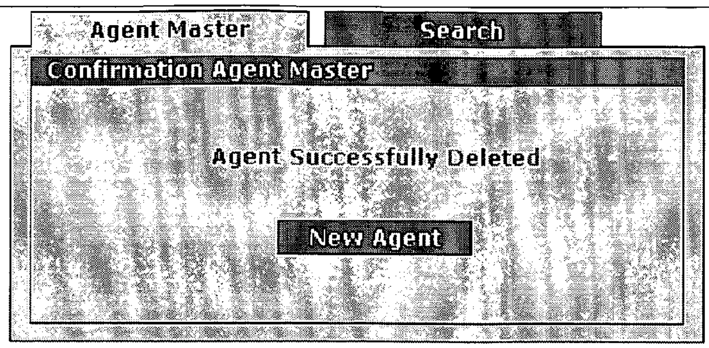
(Figure F-64)
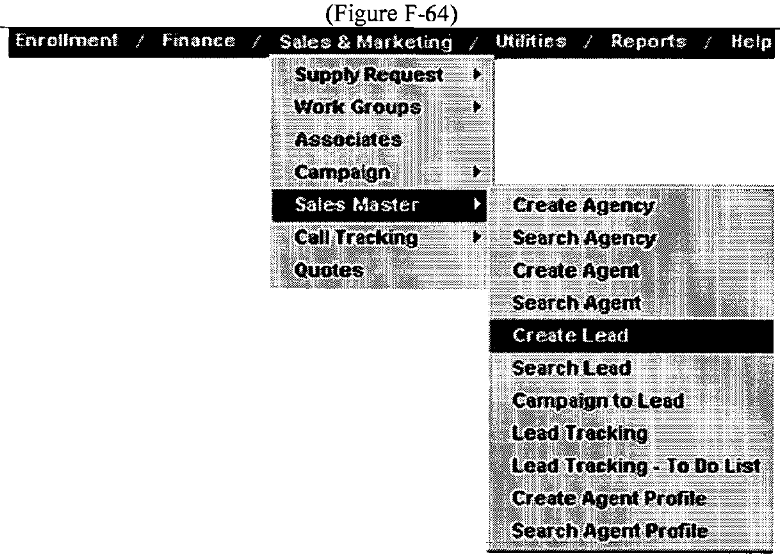
(Figure F-65)

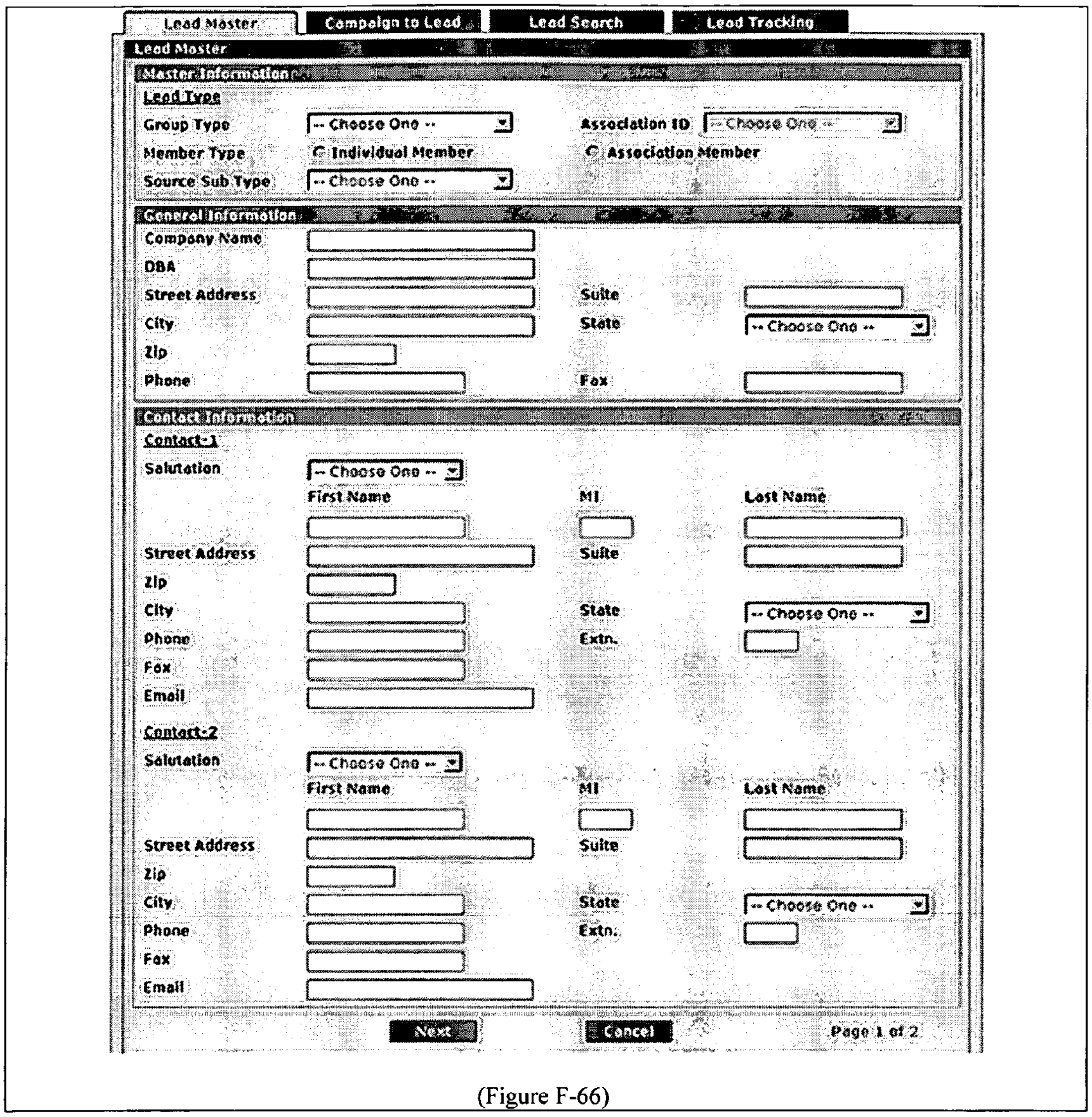
(Figure F-66)

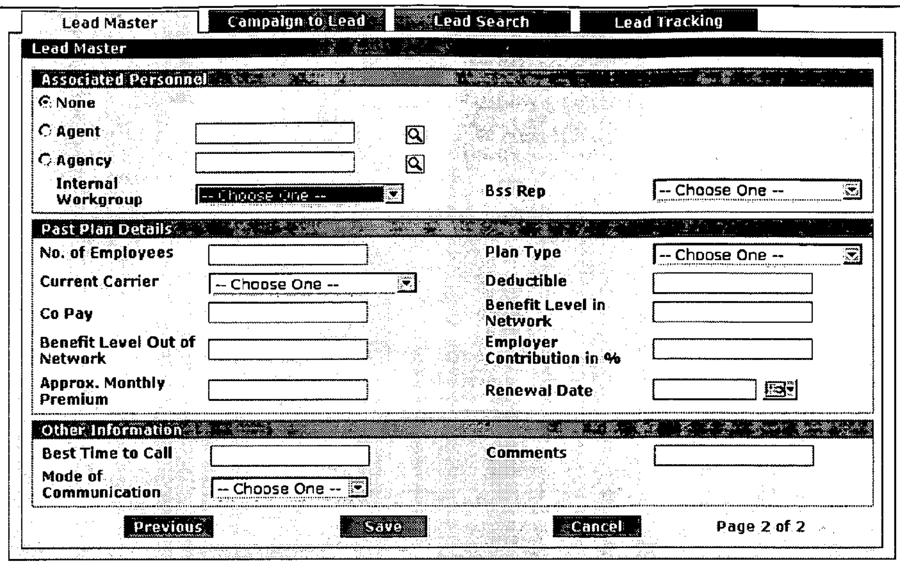
(Figure F-67)
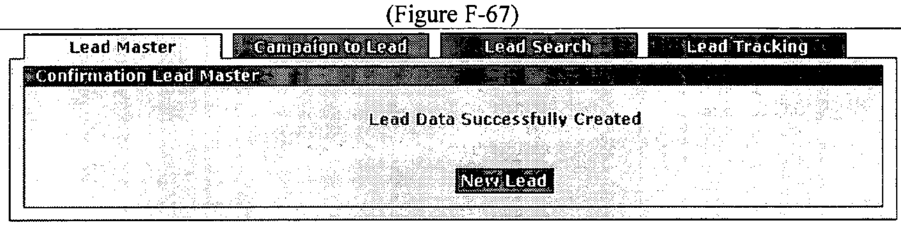
(Figure F-68)
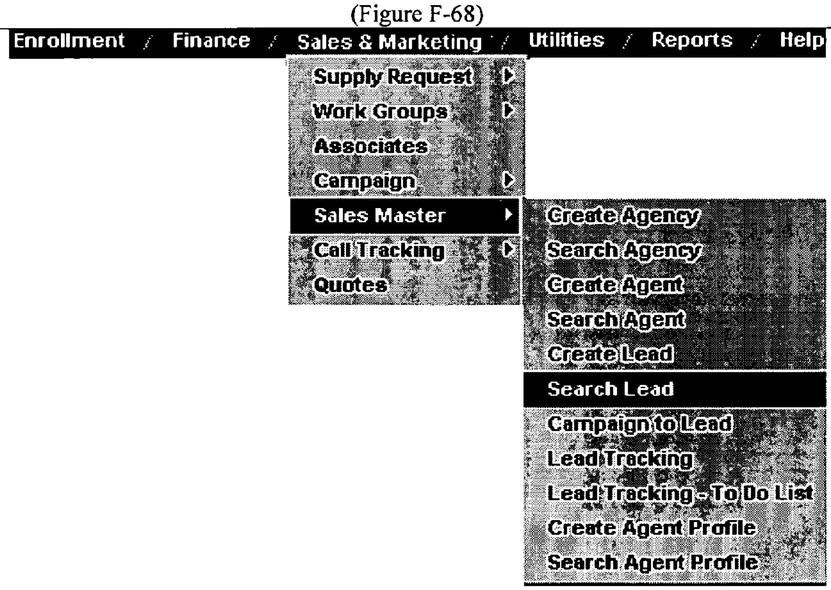
(Figure F-69)

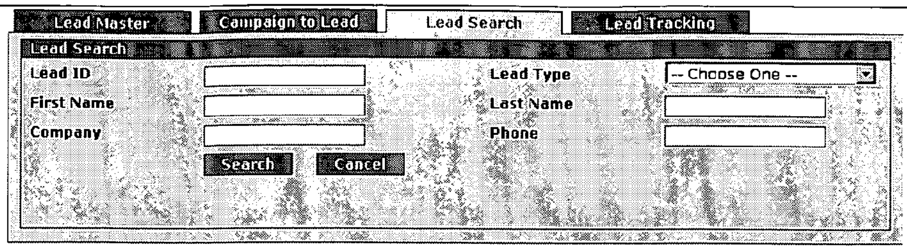
(Figure F-70)
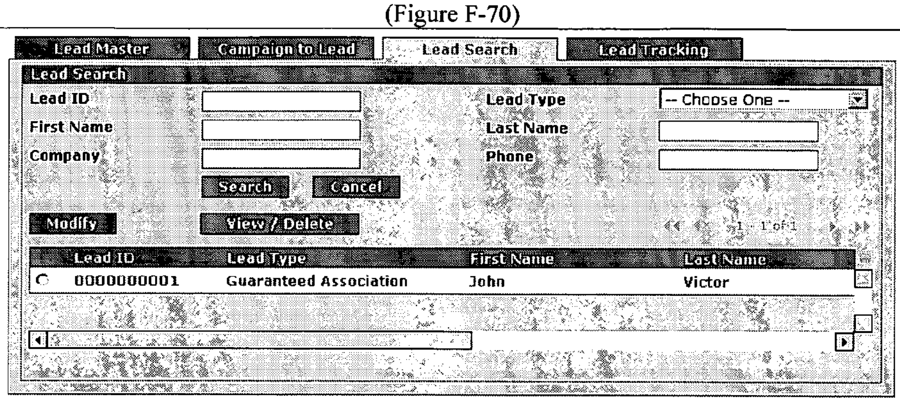
(Figure F-71)

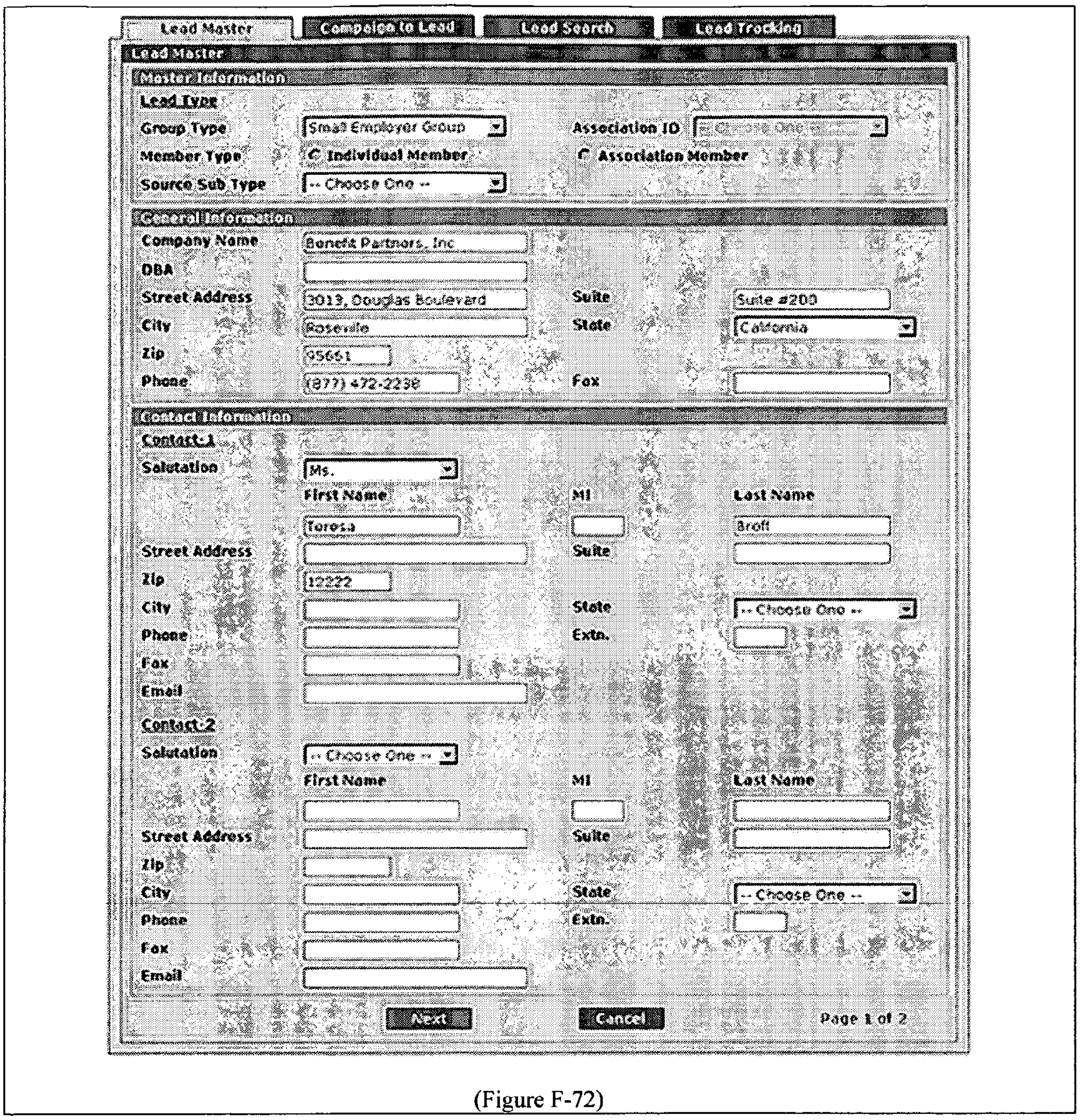
(Figure F-72)

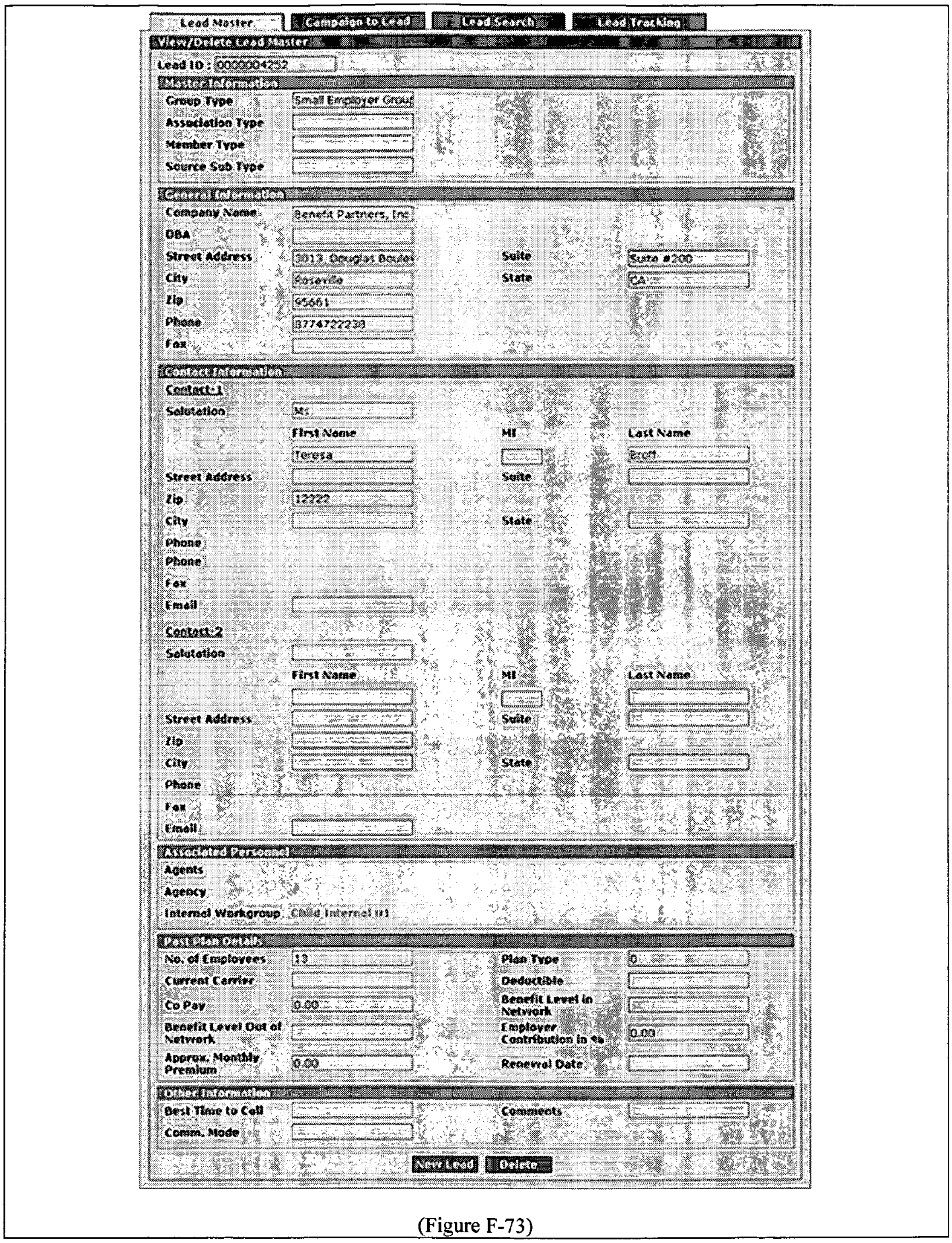
(Figure F-73)

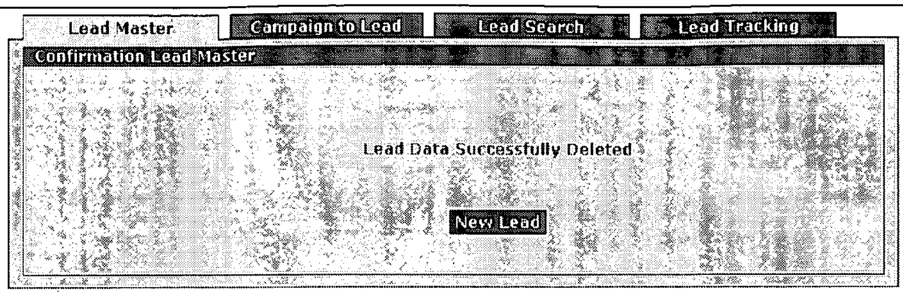
(Figure F-74)
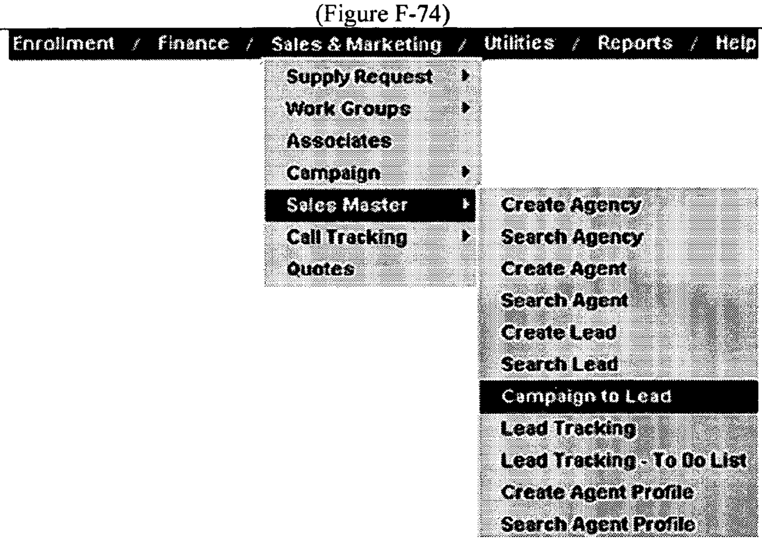
(Figure F-75)
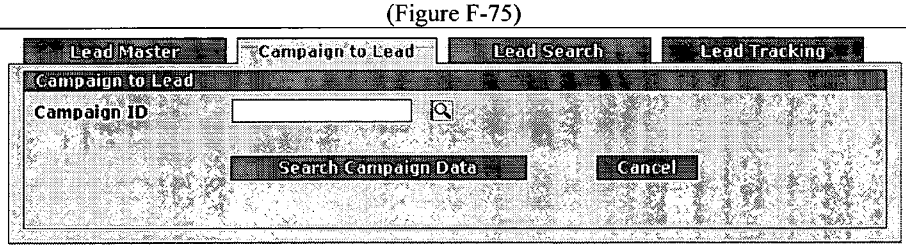
(Figure F-76)
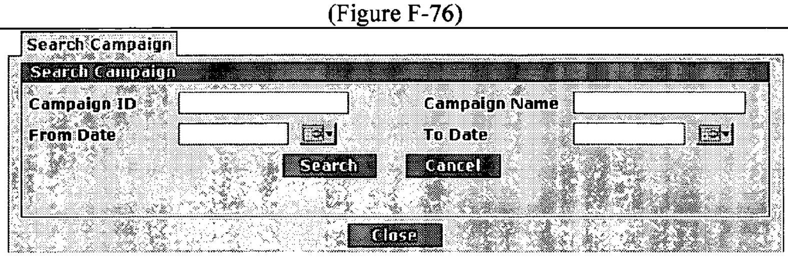
(Figure F-77)

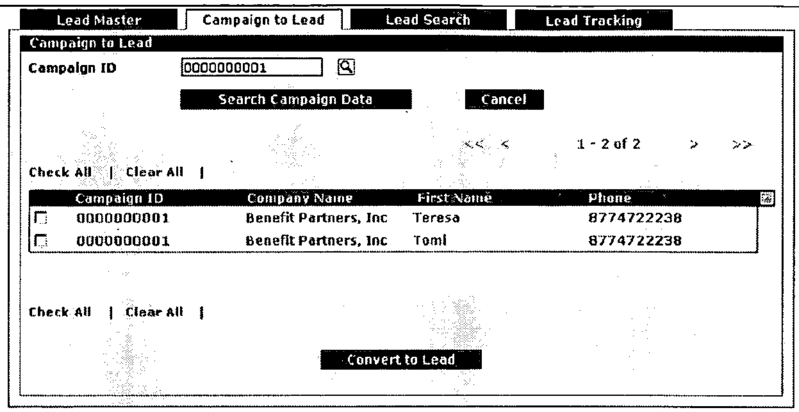
(Figure F-78)
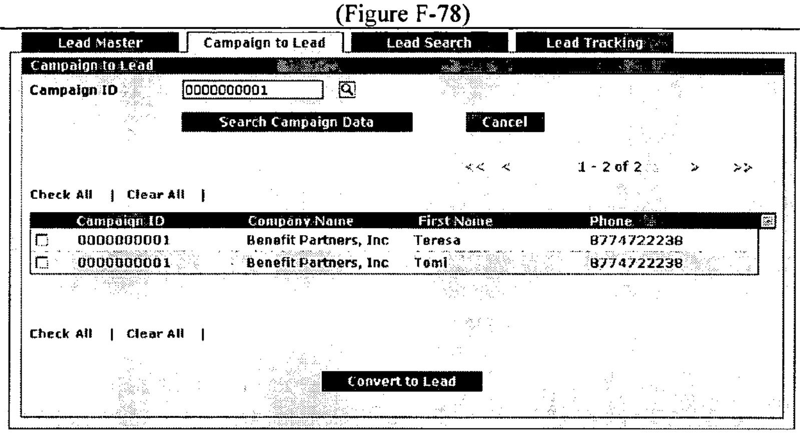
(Figure F-79)
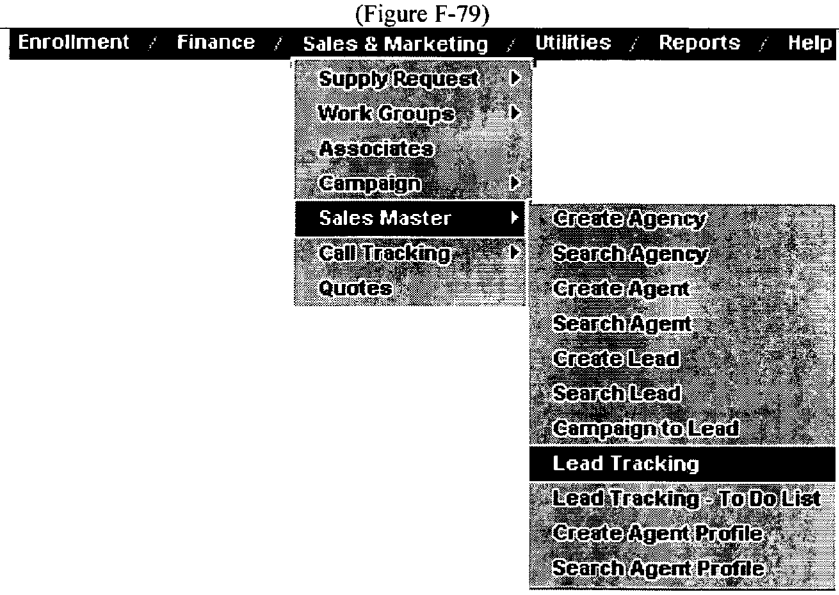
(Figure F-80)

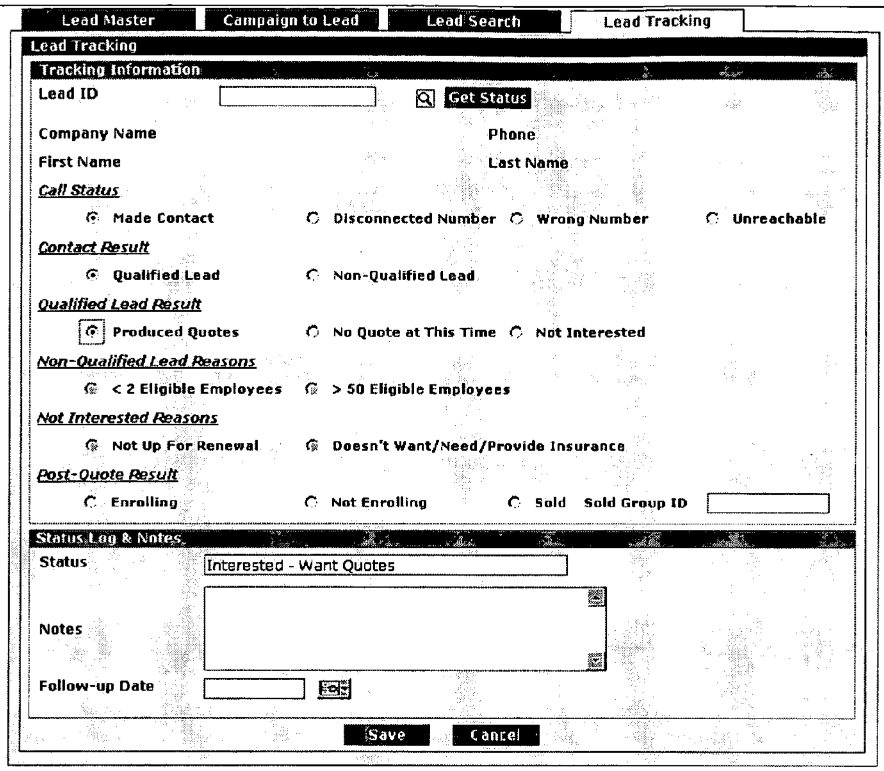
(Figure F-81)
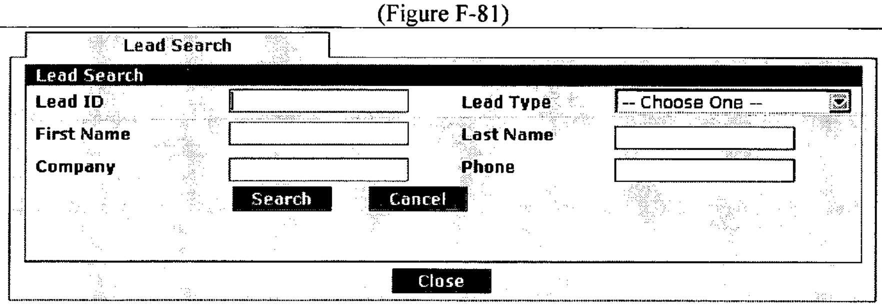
(Figure F-82)

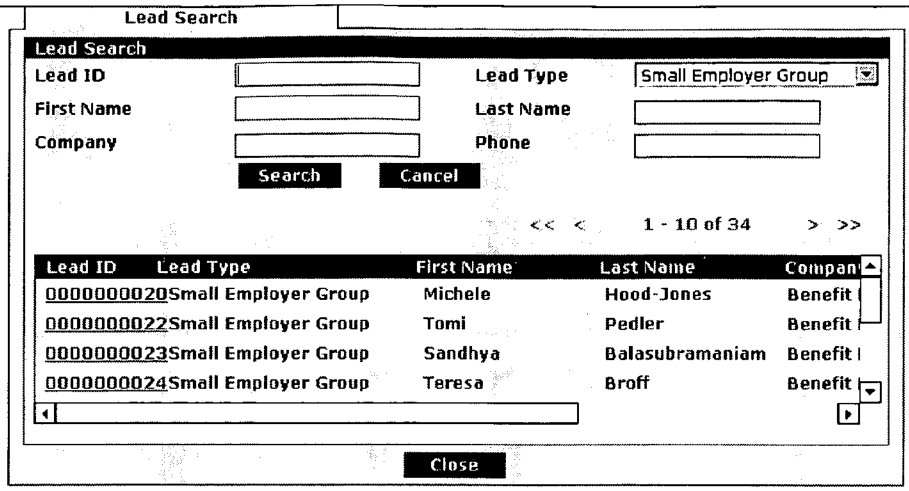
(Figure F-83)
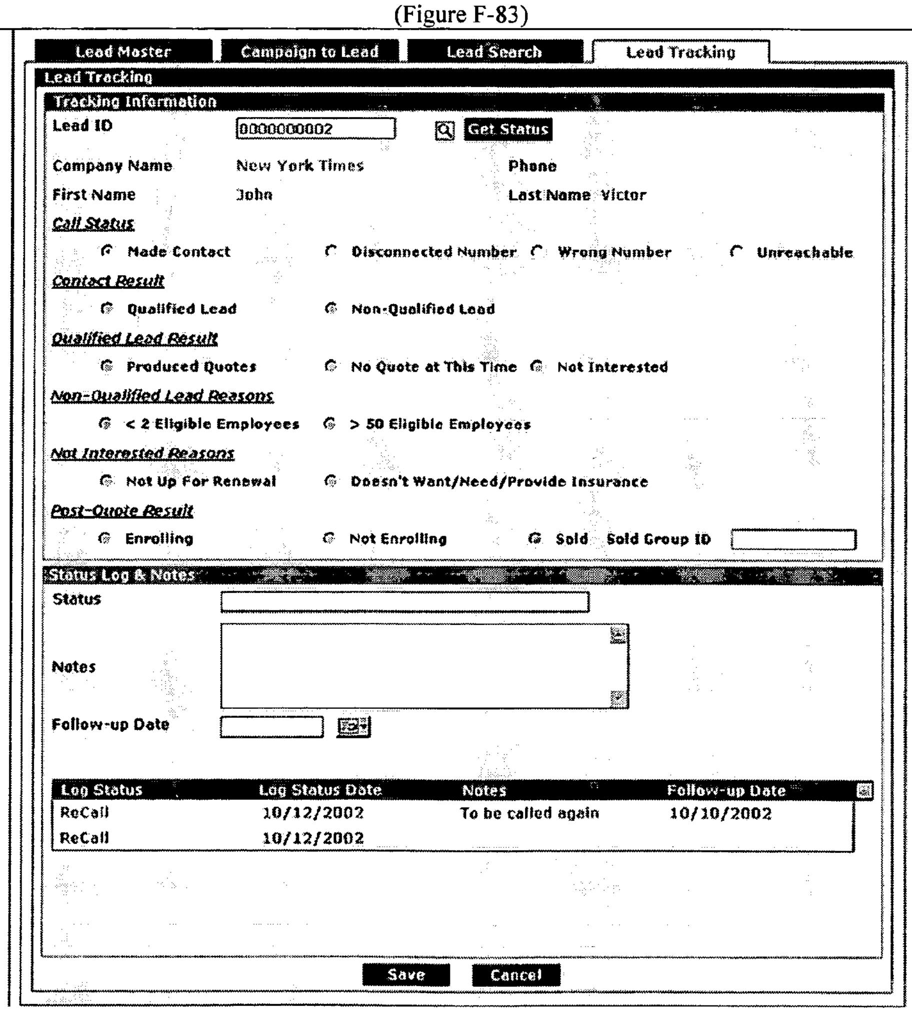
(Figure F-84)

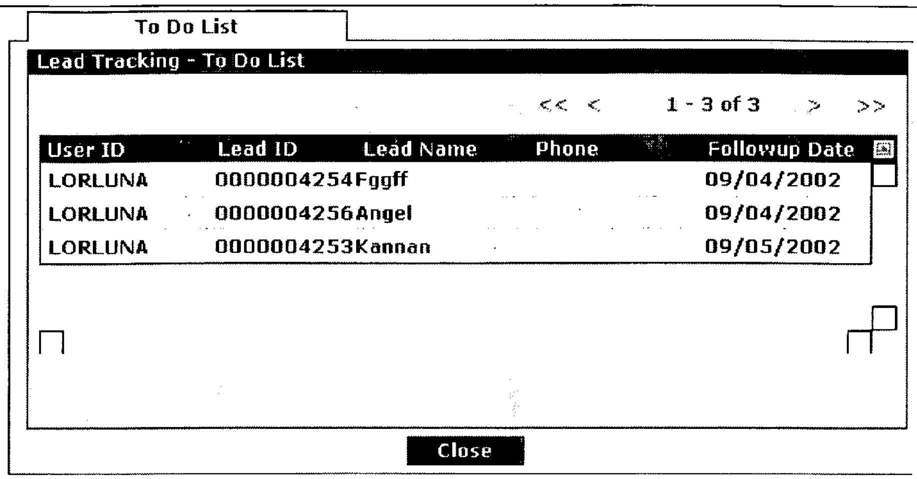
(Figure F-85)
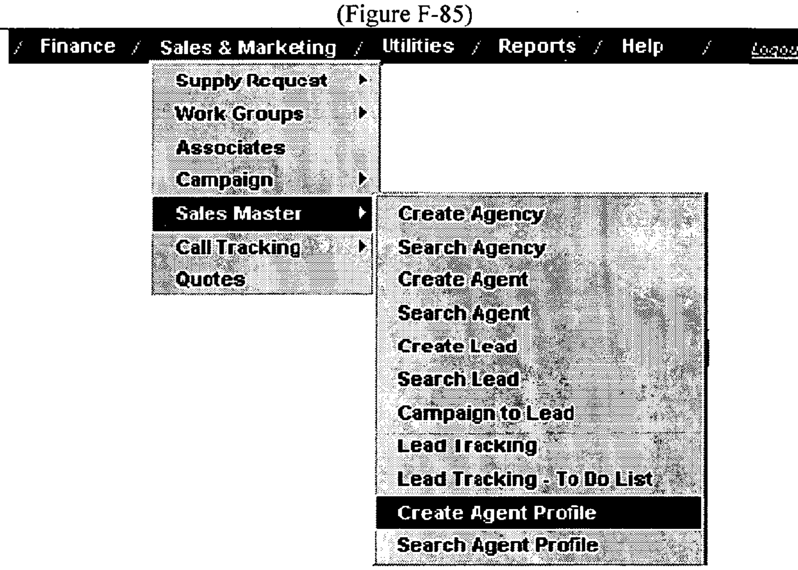
(Figure F-86)

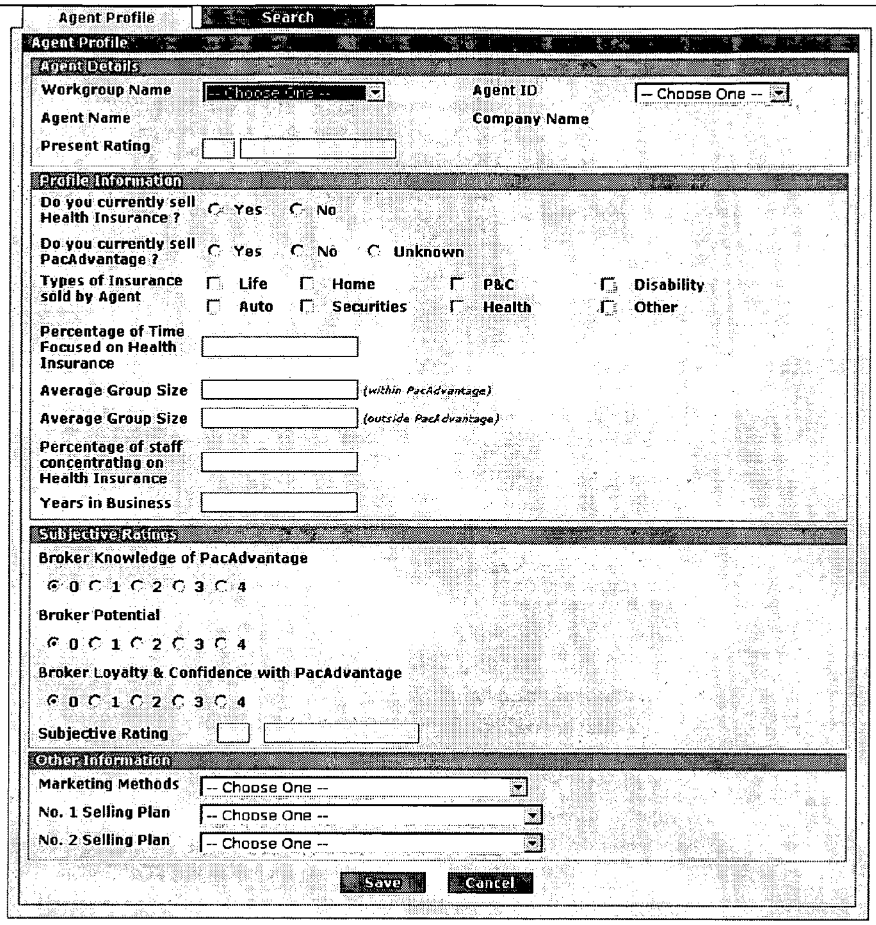
(Figure F-87)
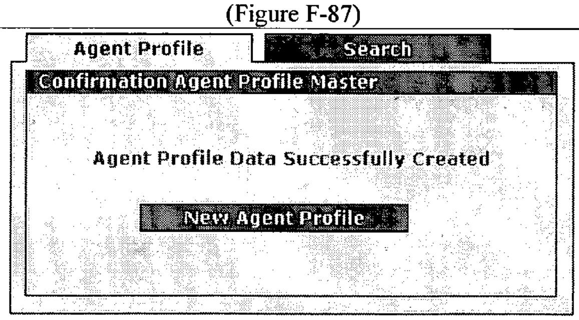
(Figure F-88)

(Figure F-89)
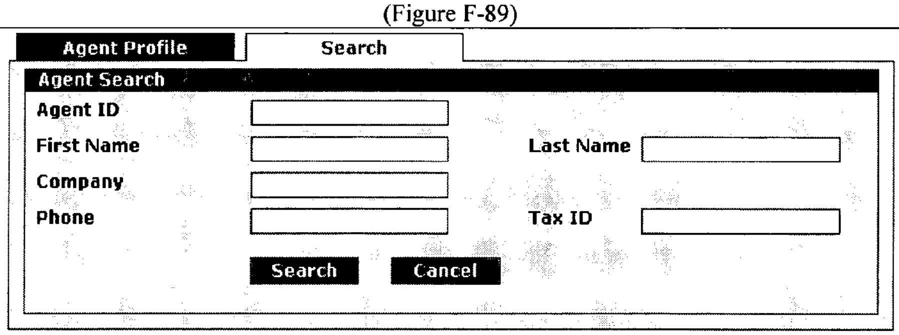
(Figure F-90)
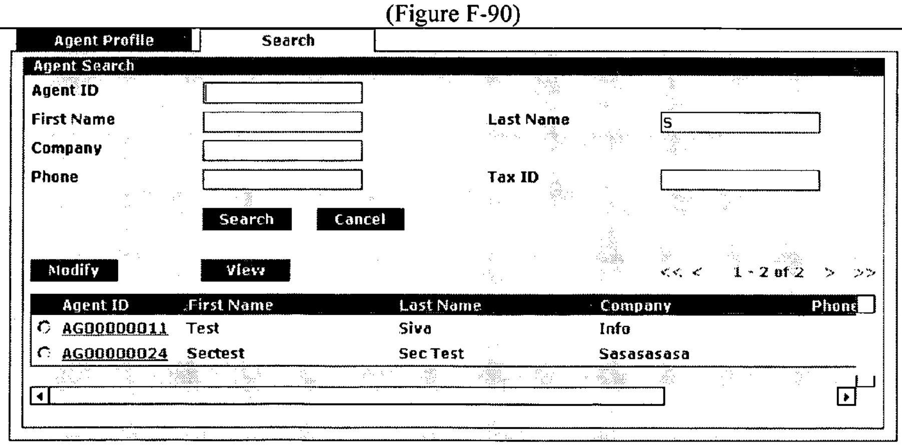
(Figure F-91)

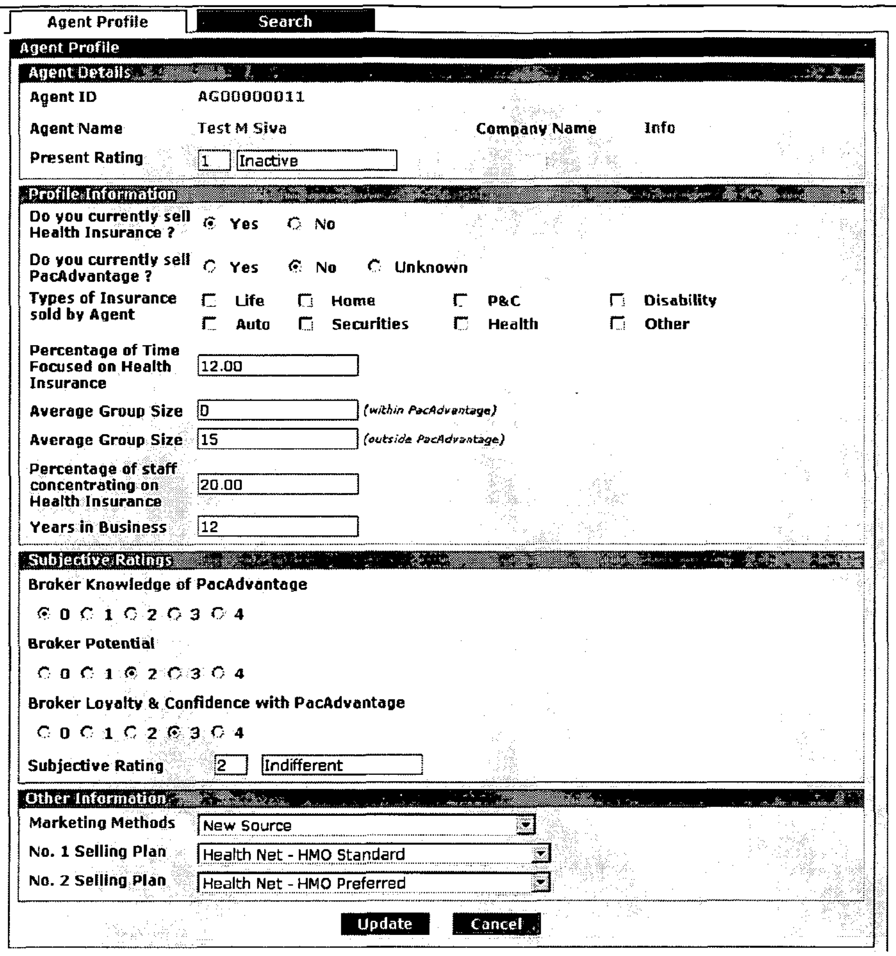
(Figure F-92)
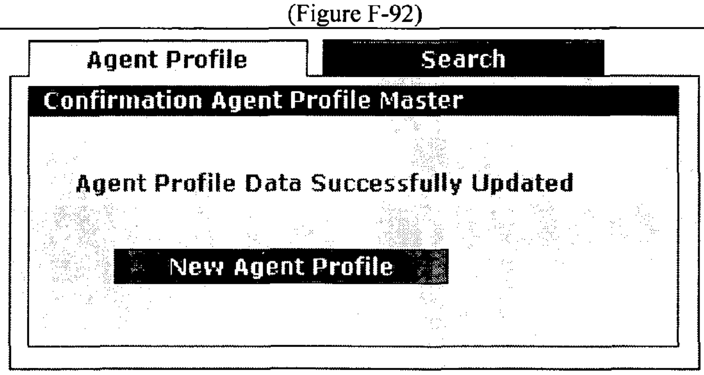
(Figure F-93)

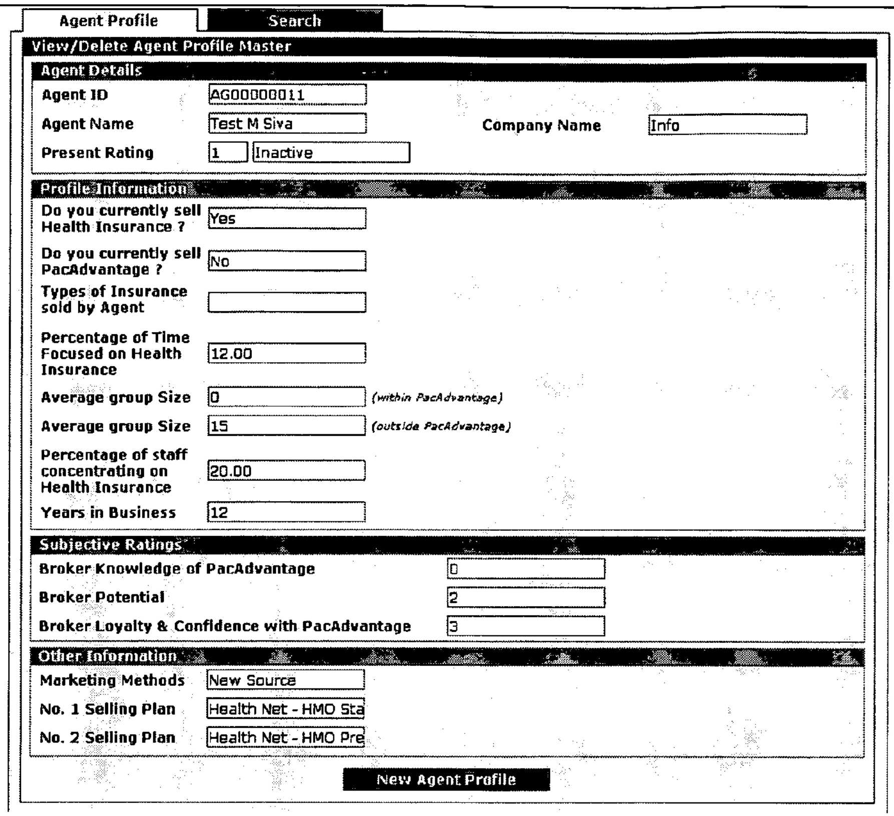
(Figure F-94)
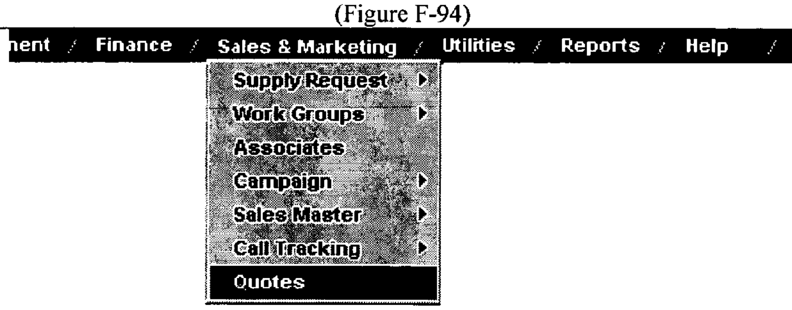
(Figure F-95)

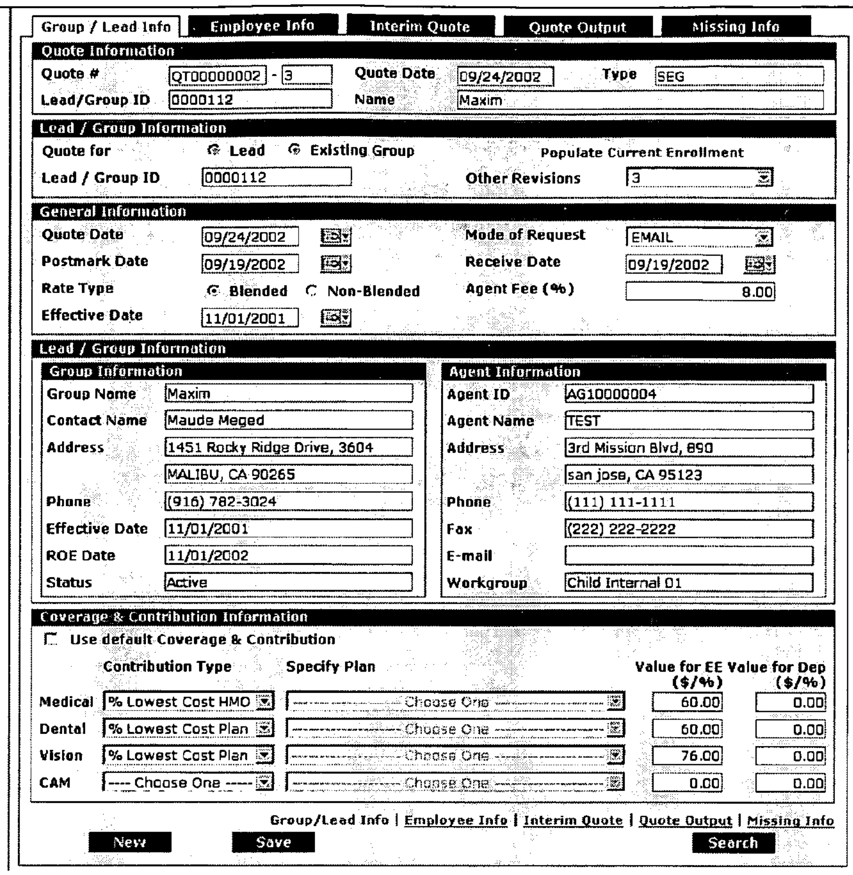
(Figure F-96)
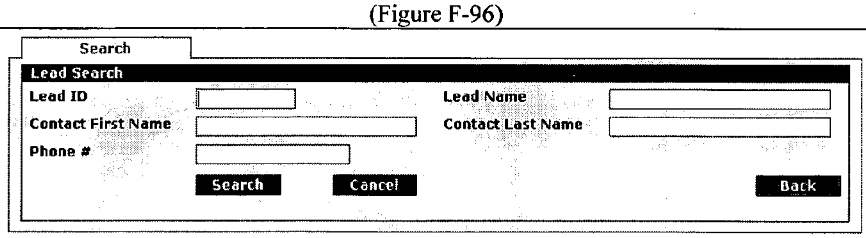
(Figure F-97)
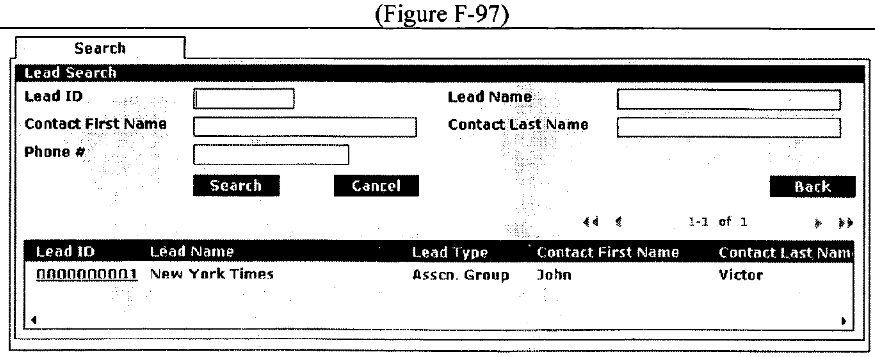
(Figure F-98)

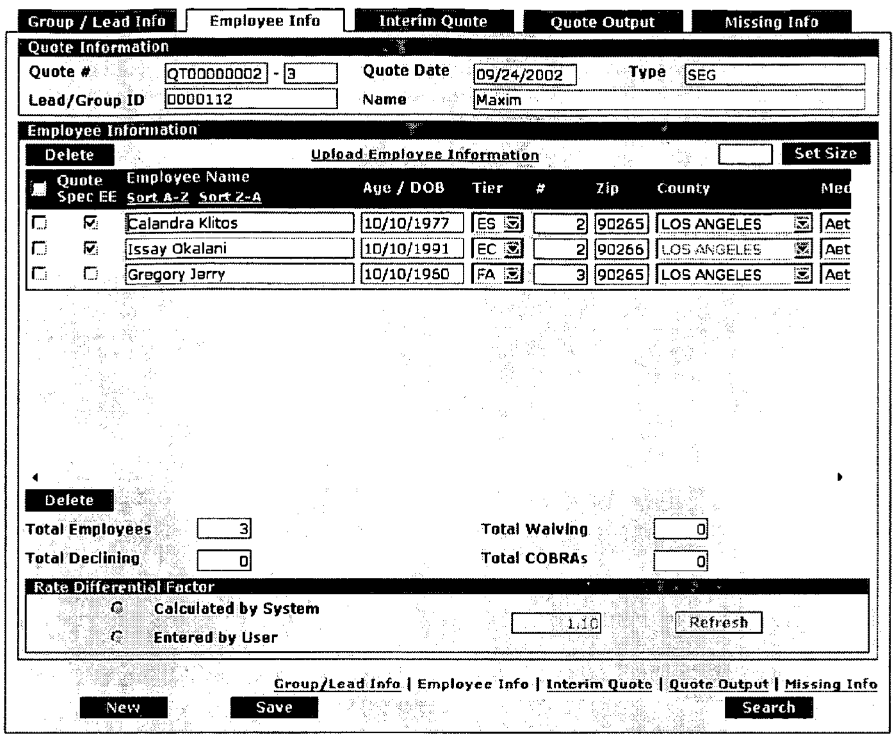
(Figure F-99)
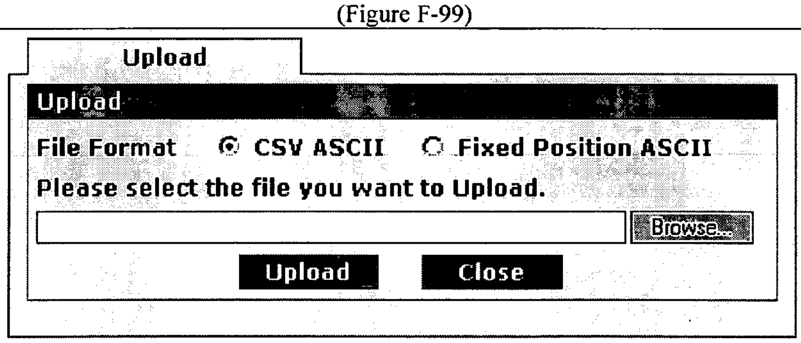
(Figure F-100)

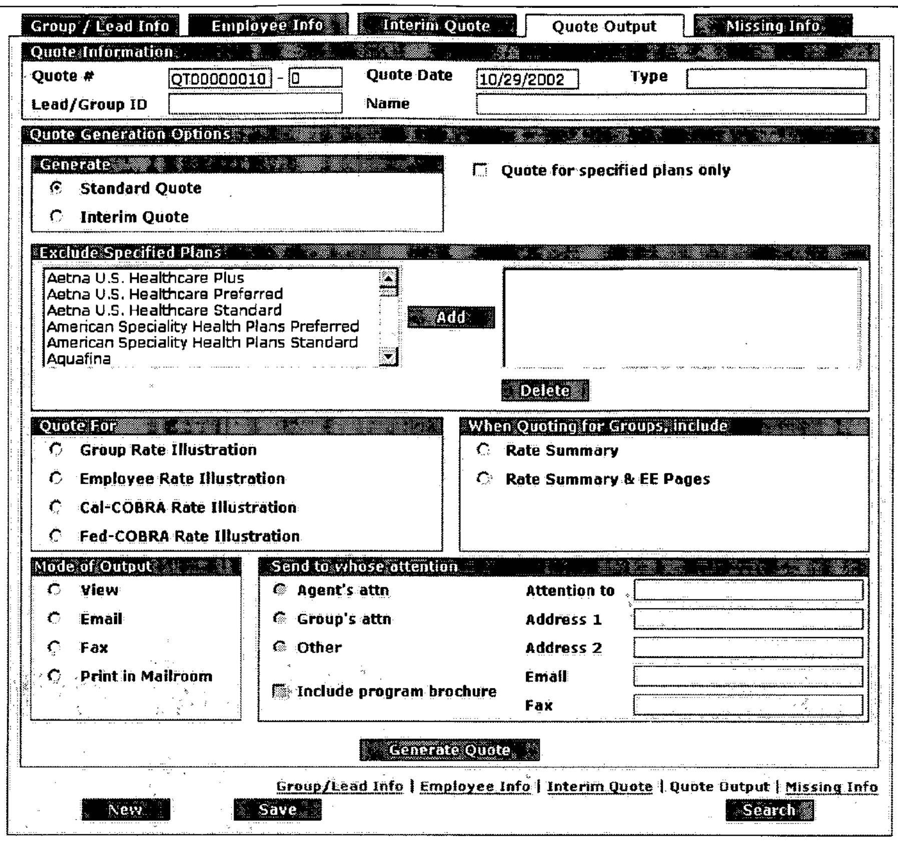
(Figure F-101)
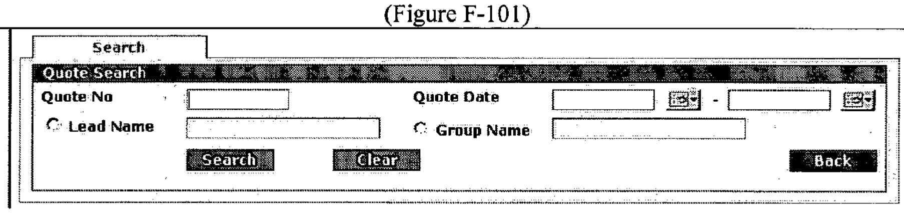
(Figure F-102)
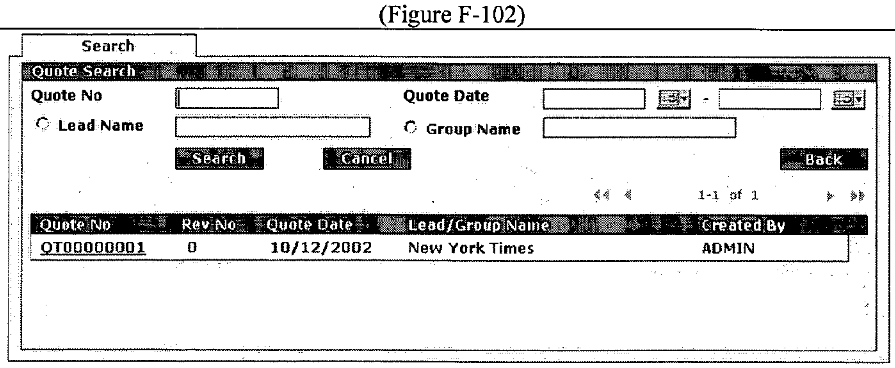
(Figure F-103)

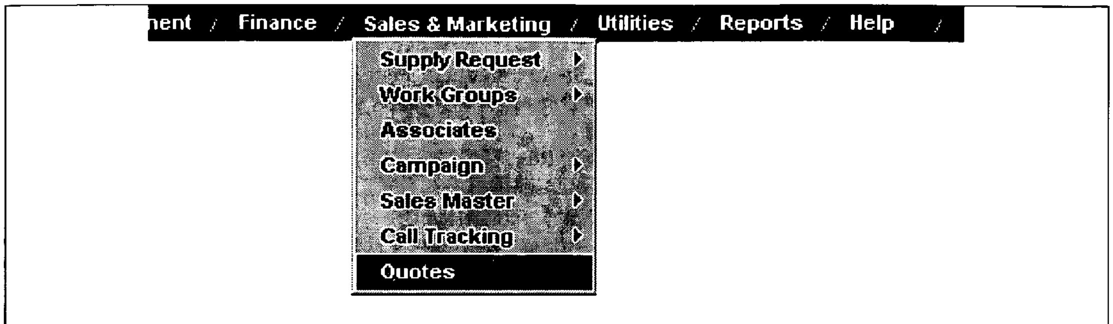
(Figure F-104)
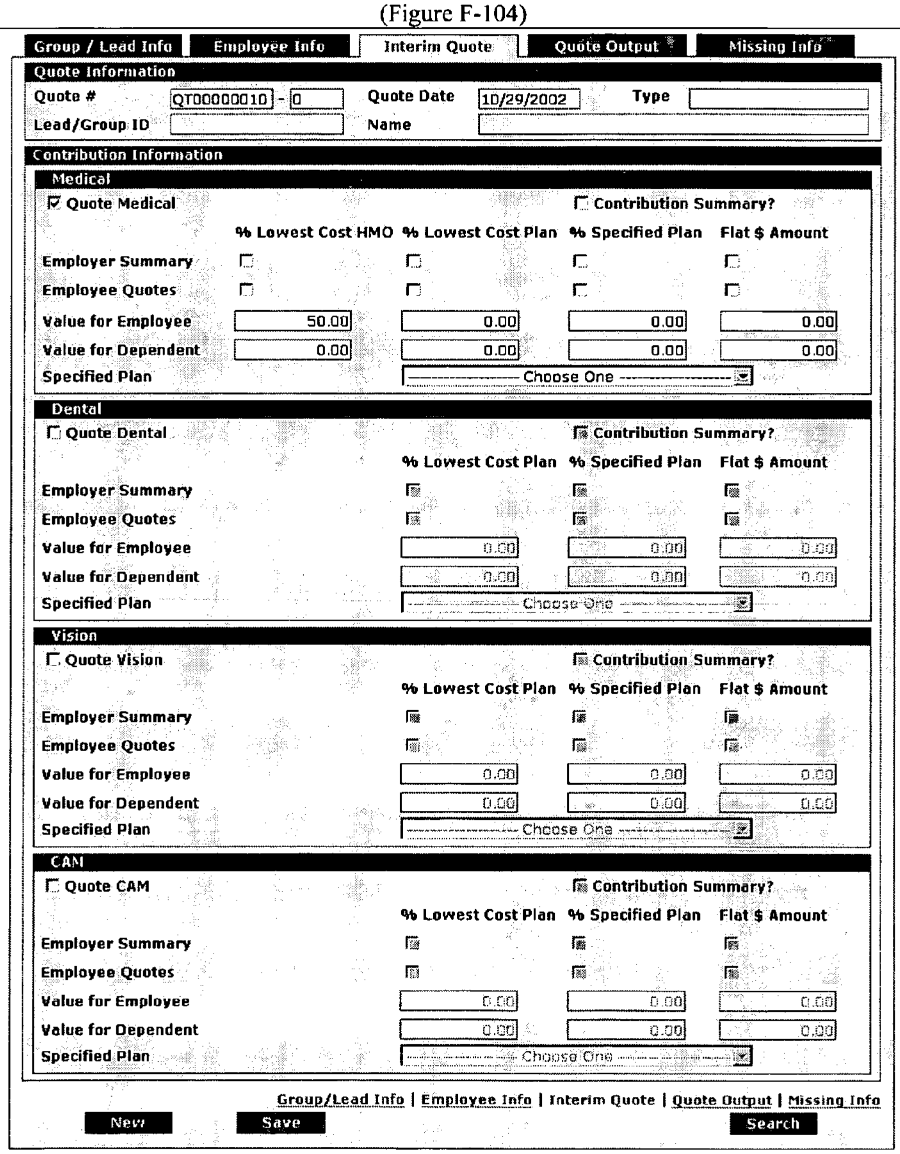
(Figure F-105)

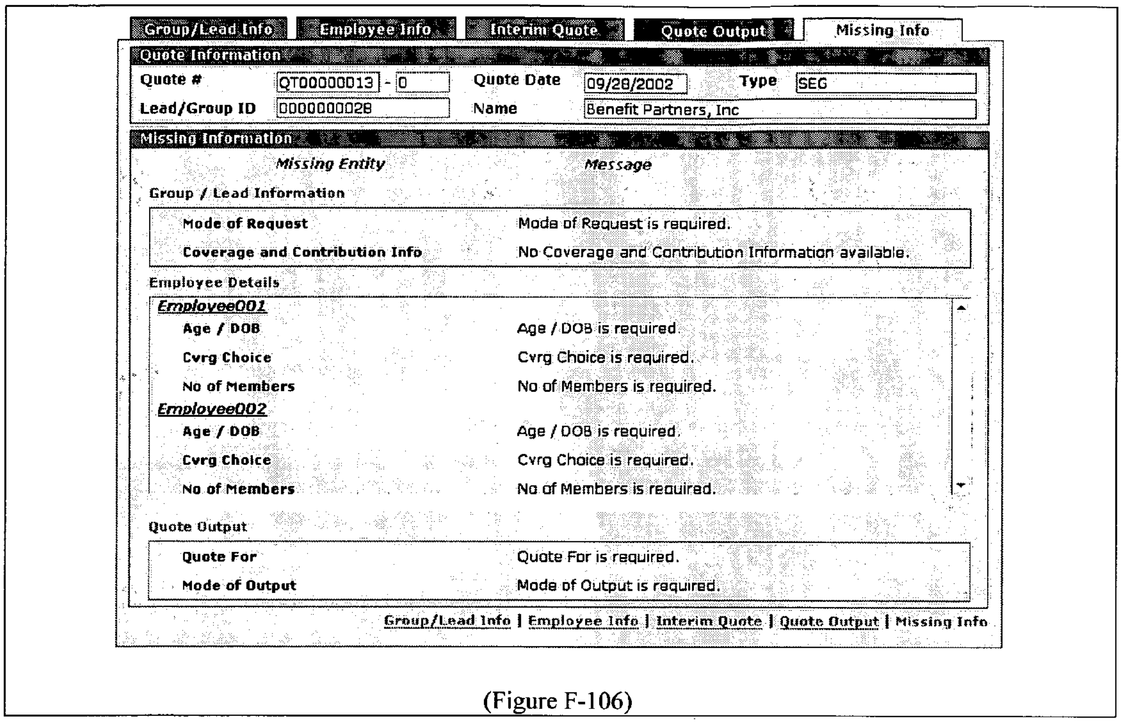
(Figure F-106)

(Figure G-1)
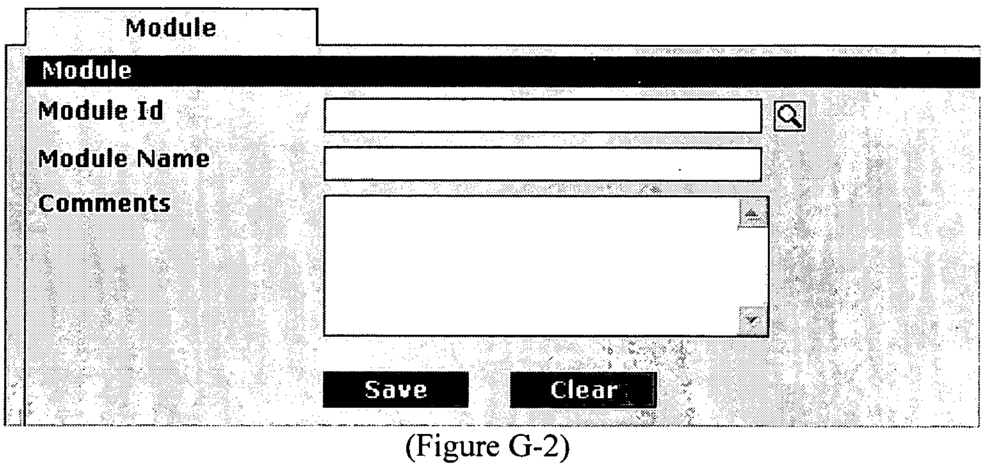
(Figure G-2)
(Figure G-3)
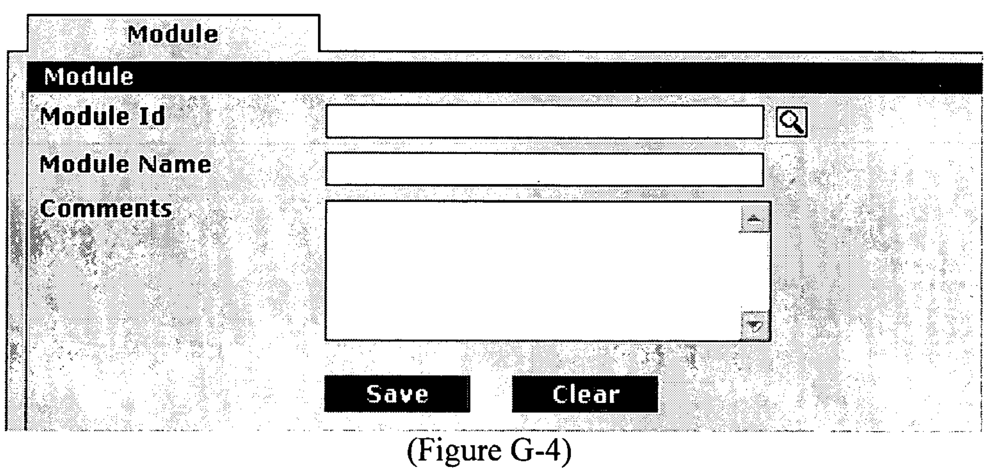
(Figure G-4)

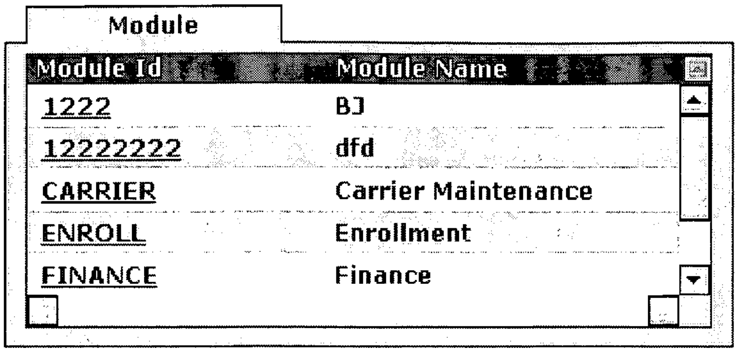
(Figure G-5)
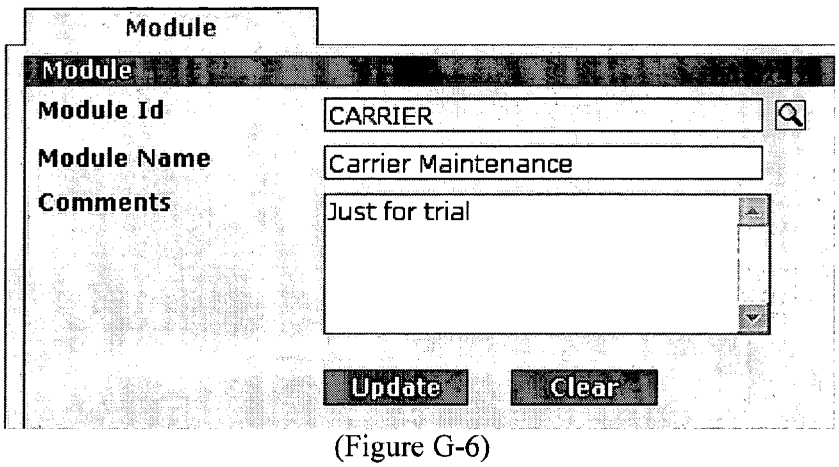
(Figure G-6)
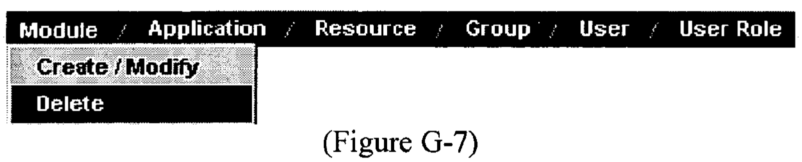
(Figure G-7)
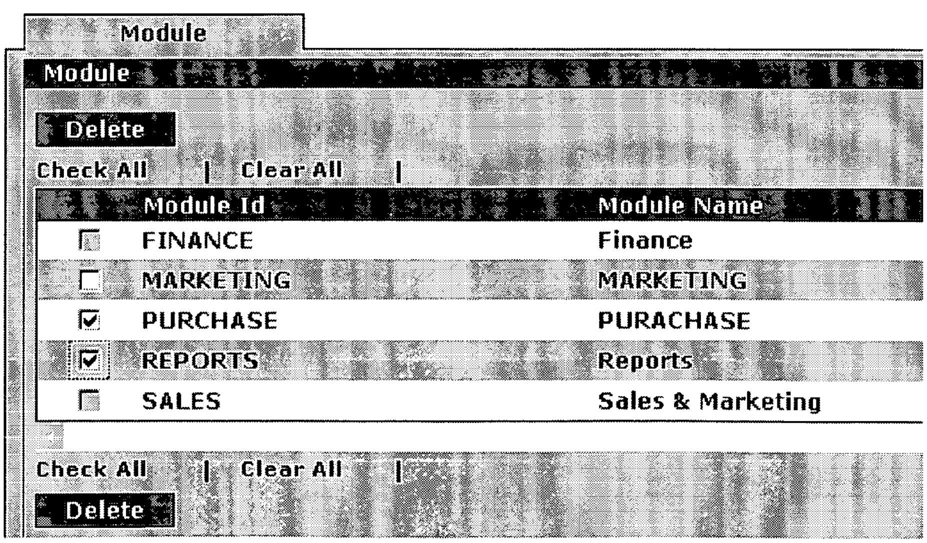
(Figure G-8)

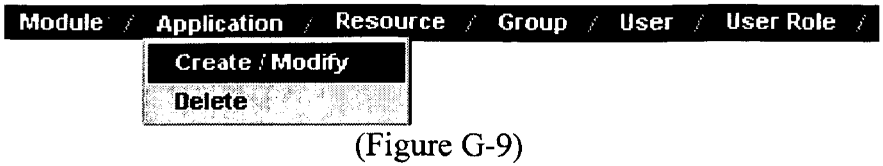
(Figure G-9)
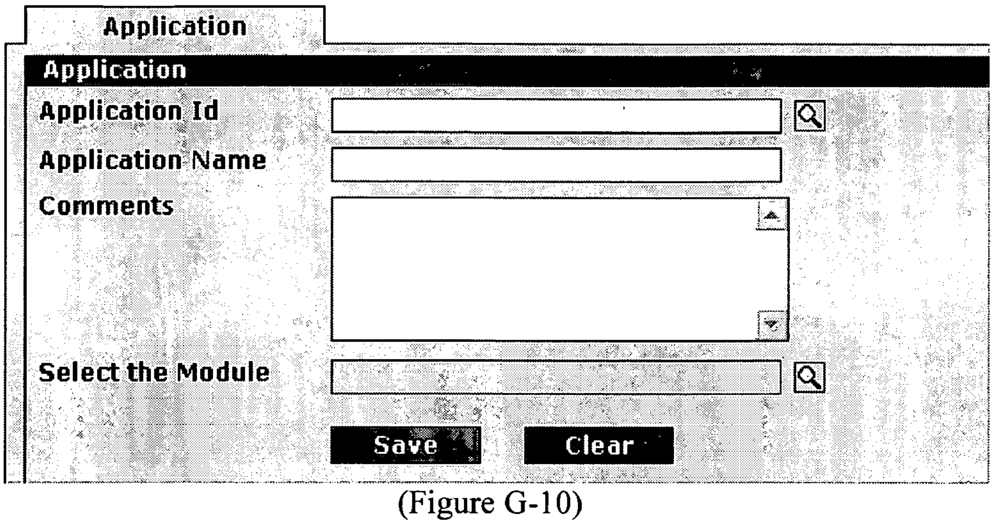
(Figure G-10)
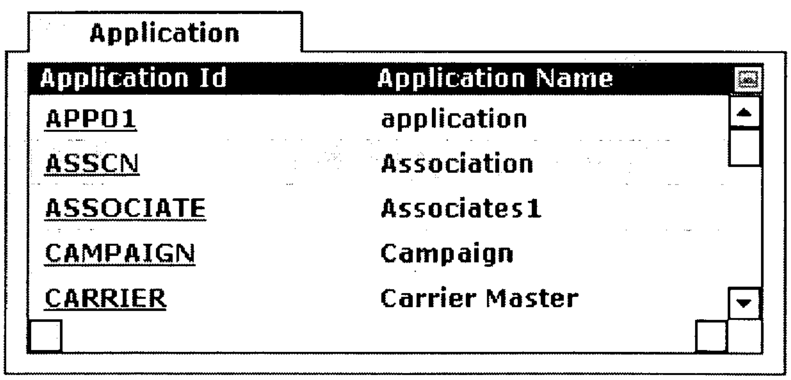
(Figure G-11)
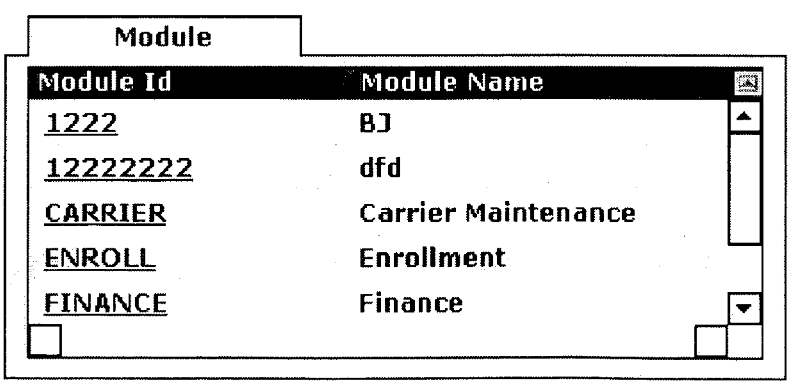
(Figure G-12)

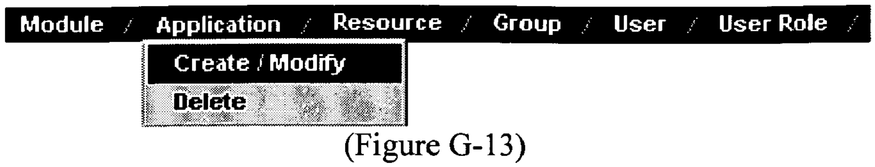
(Figure G-13)
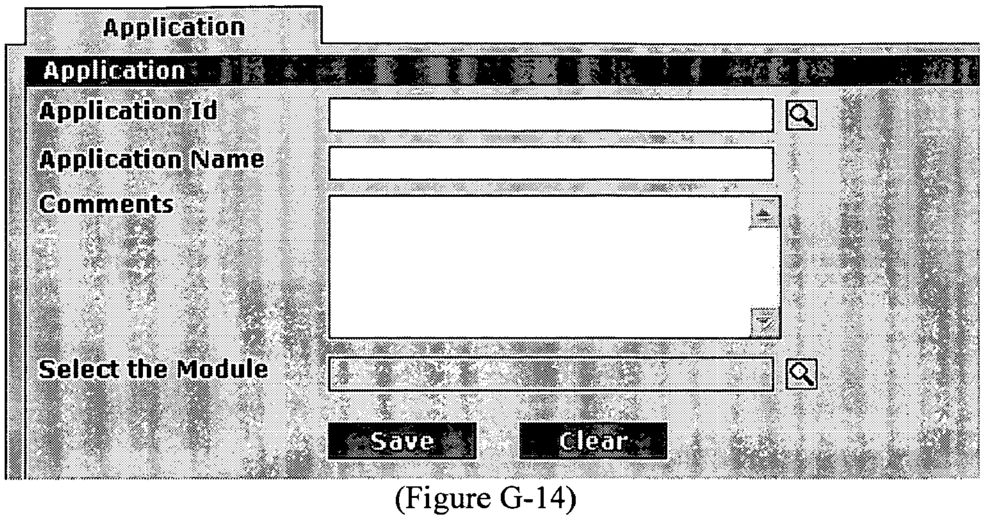
(Figure G-14)
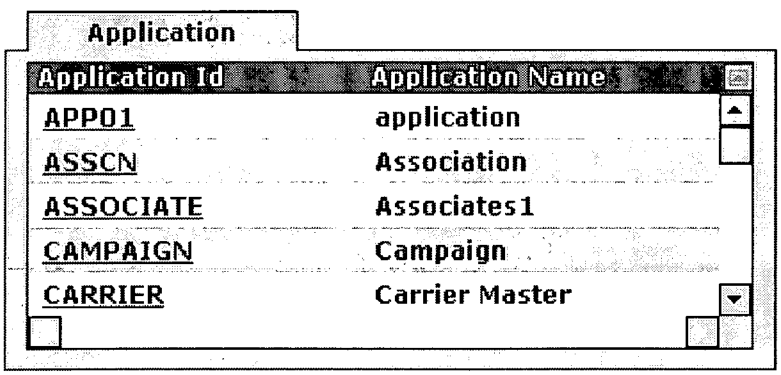
(Figure G-15)
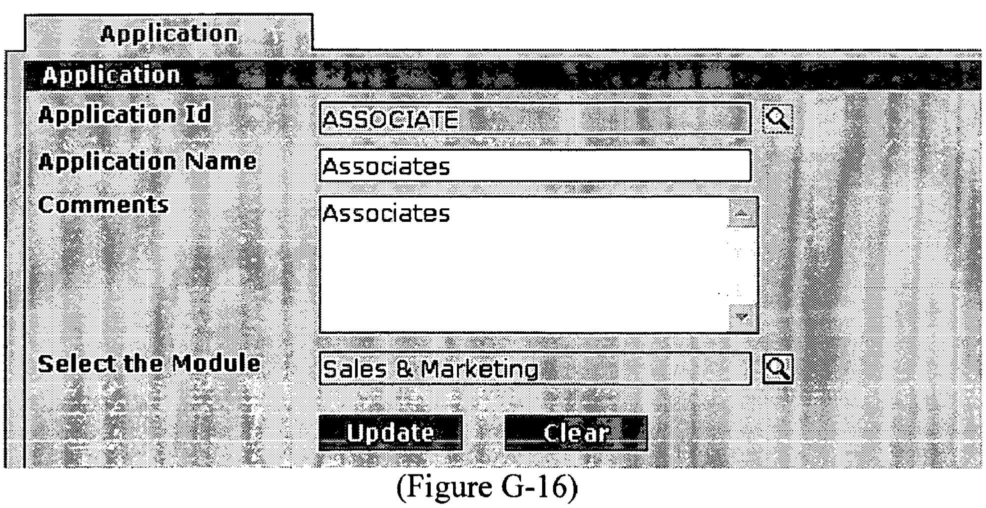
(Figure G-16)

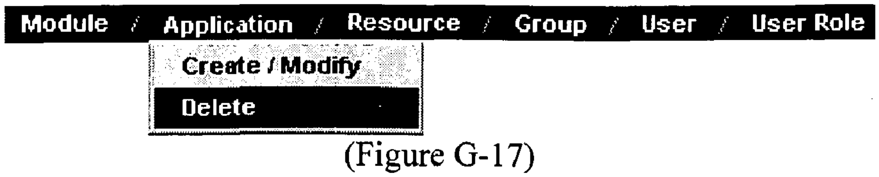
(Figure G-17)
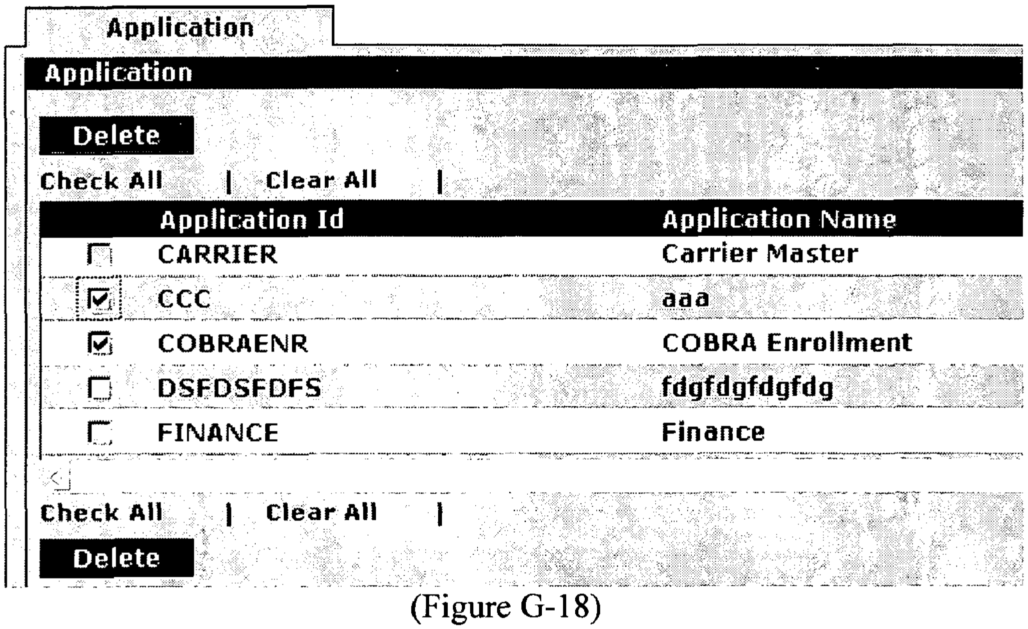
(Figure G-18)
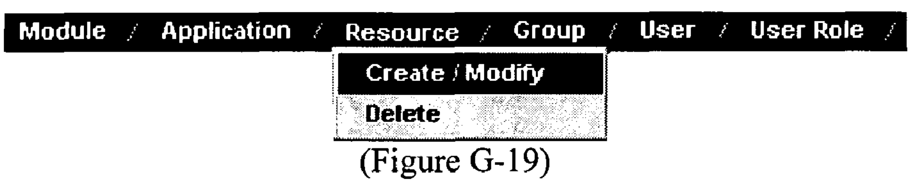
(Figure G-19)
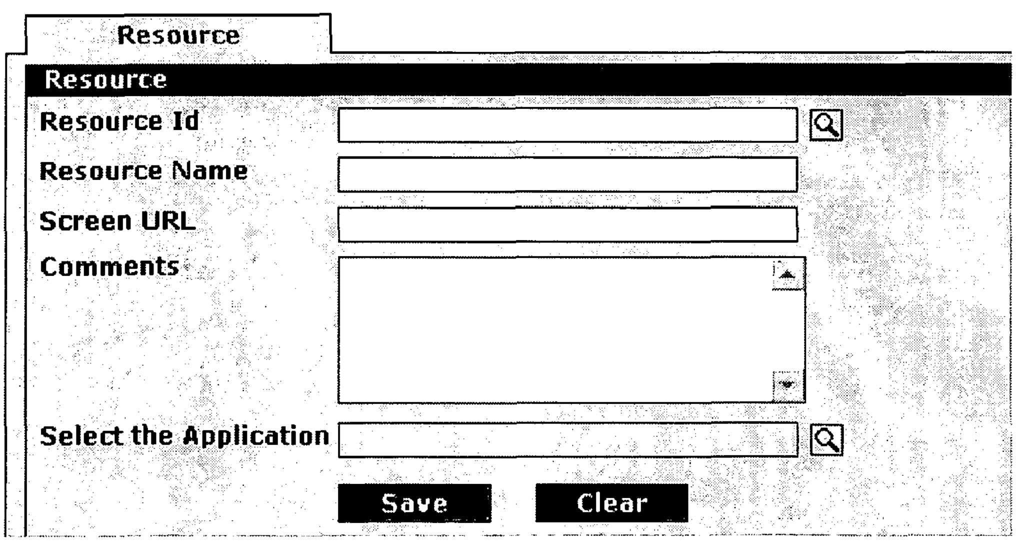
(Figure G-20)

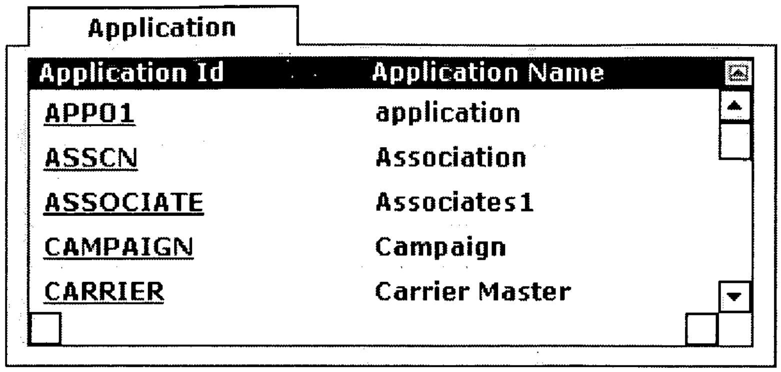
(Figure G-21)
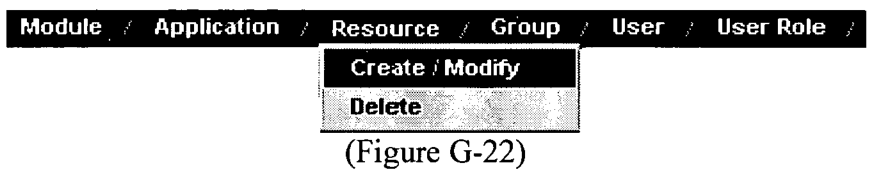
(Figure G-22)
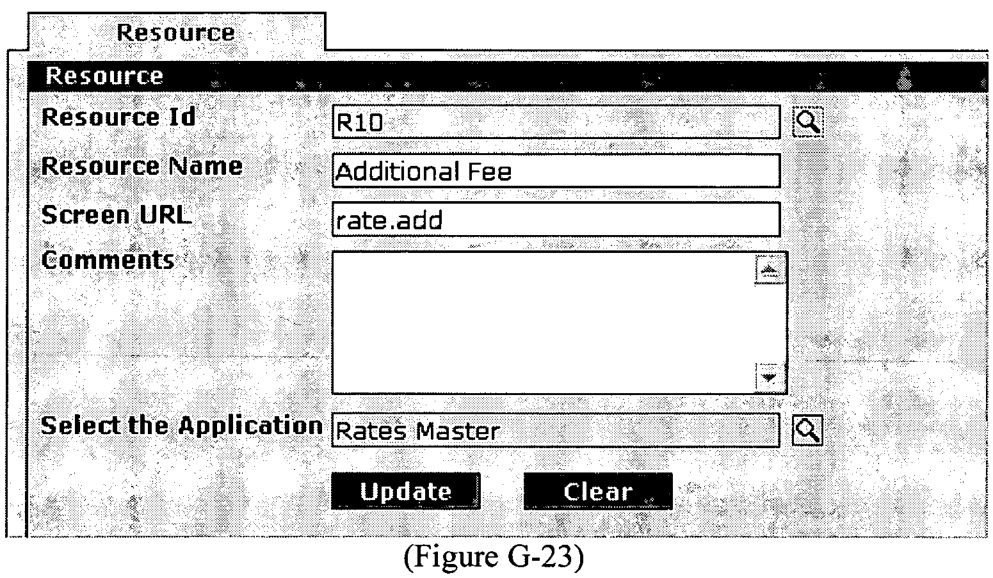
(Figure G-23)
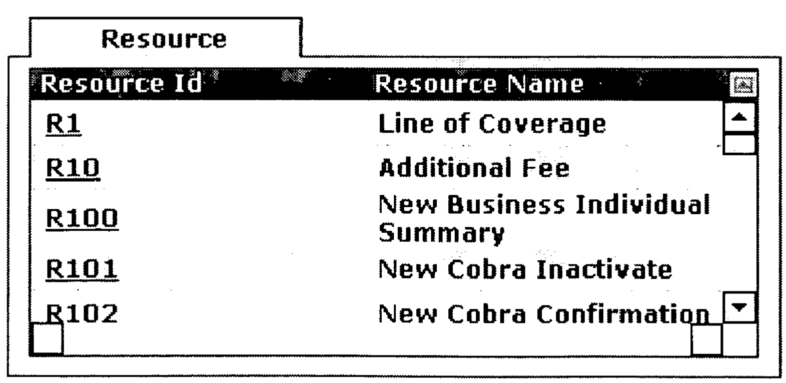
(Figure G-24)

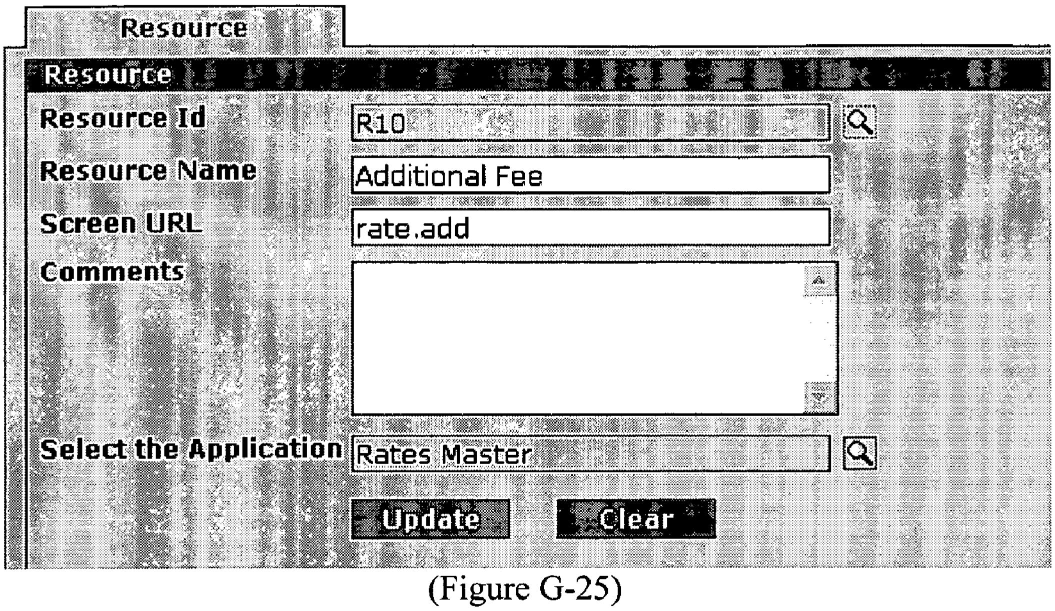
(Figure G-25)
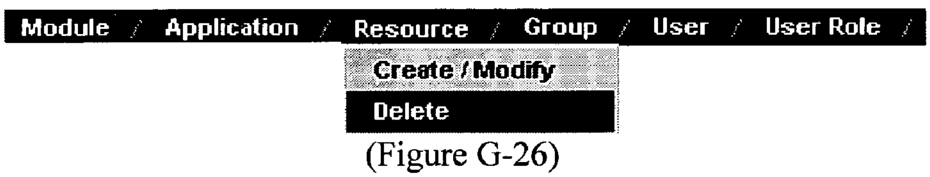
(Figure G-26)
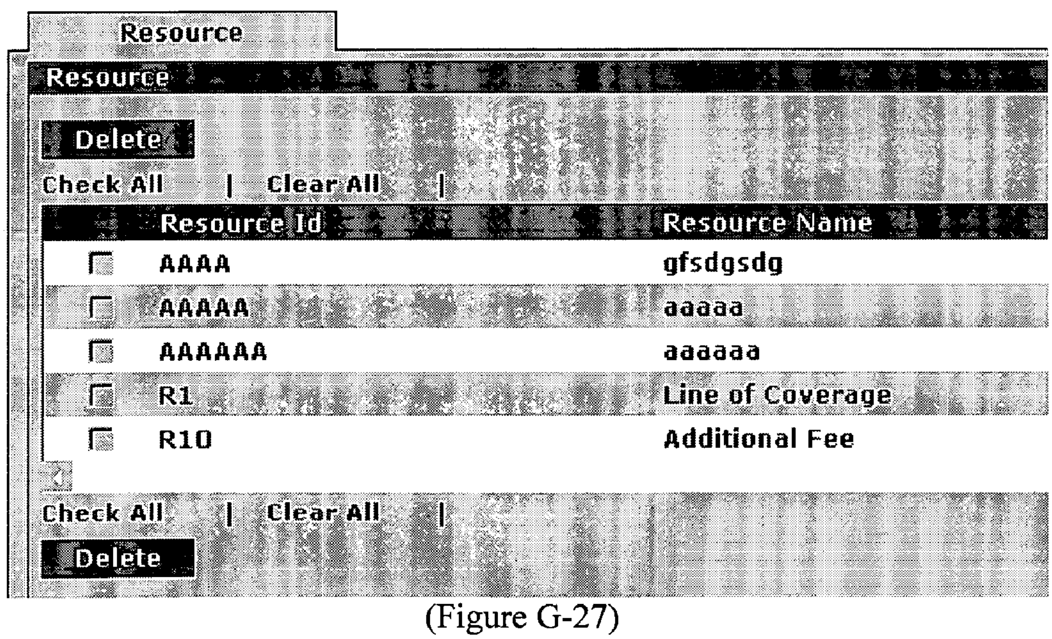
(Figure G-27)
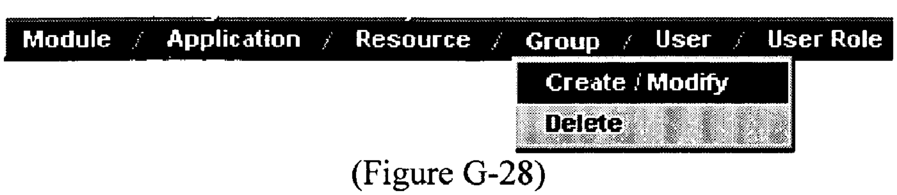
(Figure G-28)

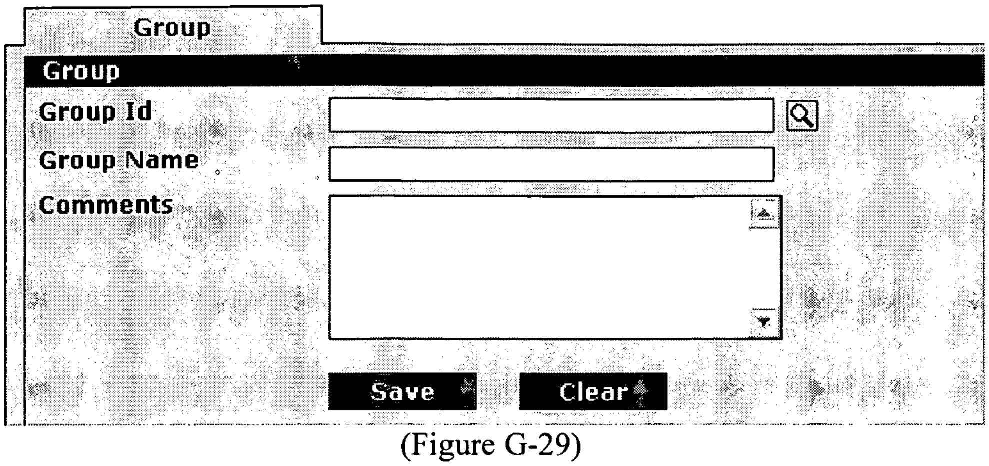
(Figure G-29)
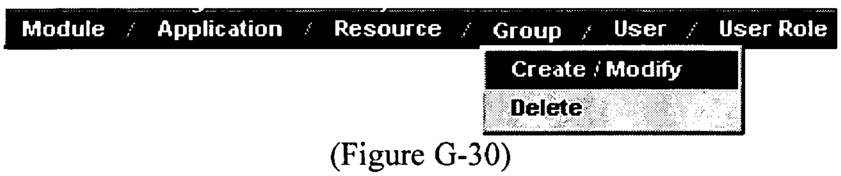
(Figure G-30)
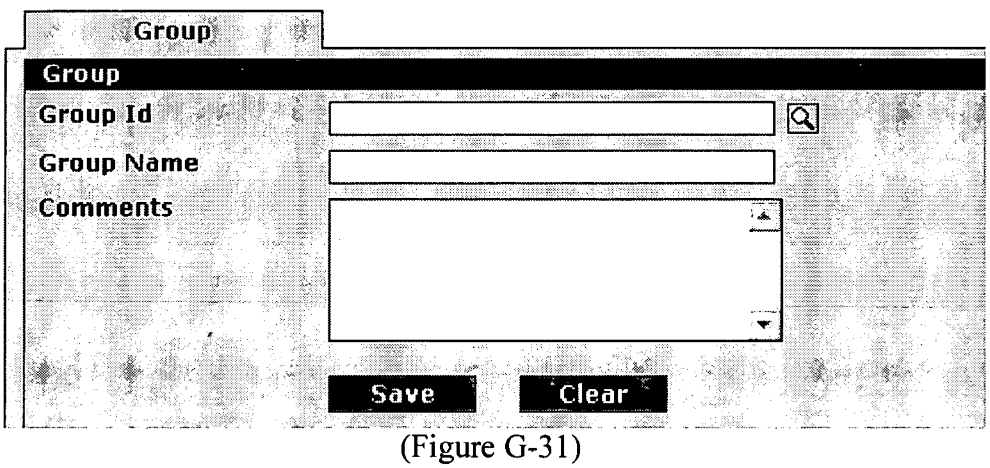
(Figure G-31)
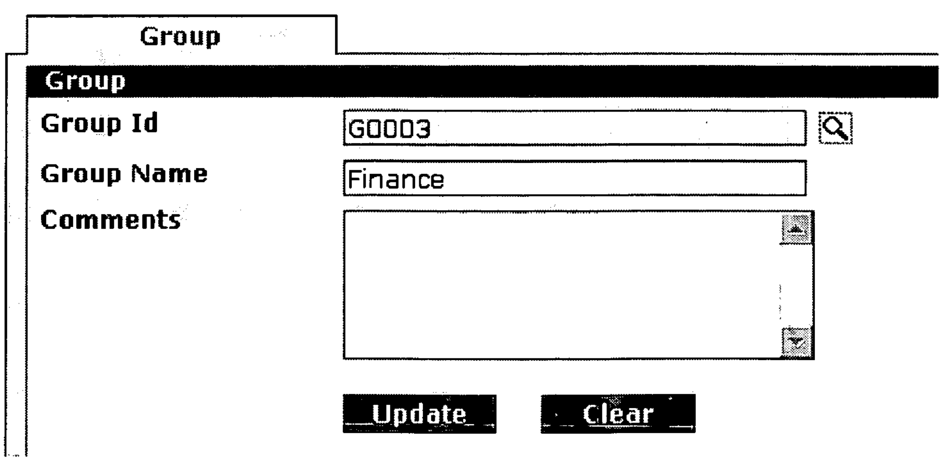
(Figure G-32)

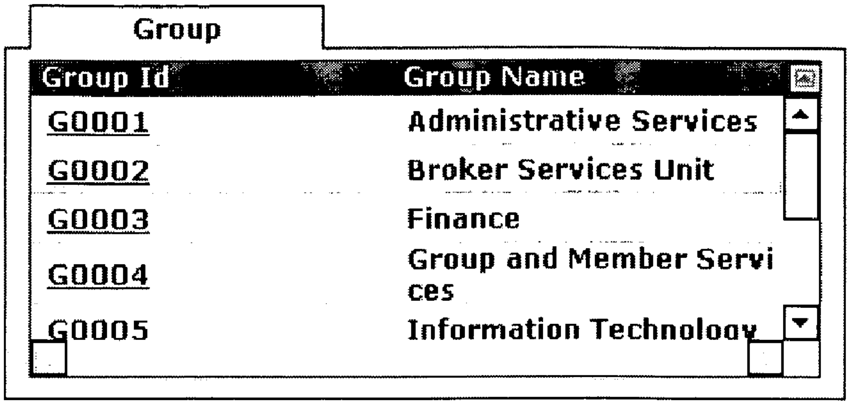
(Figure G-33)
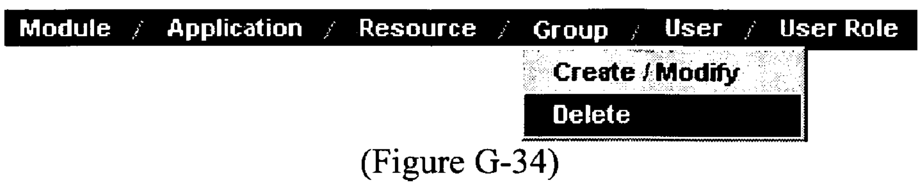
(Figure G-34)
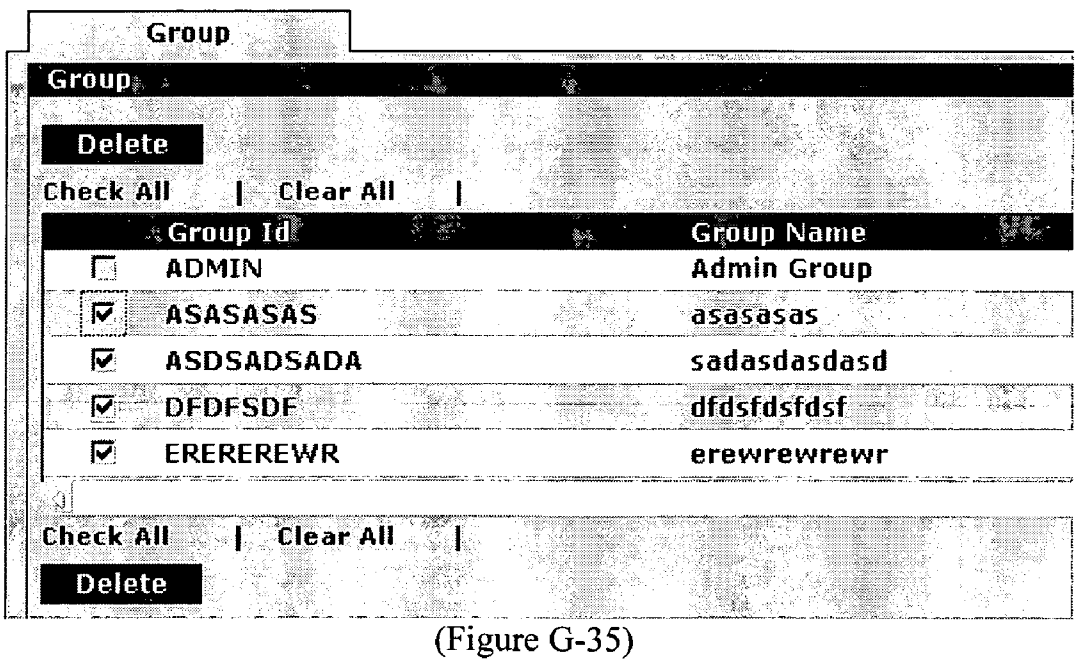
(Figure G-35)
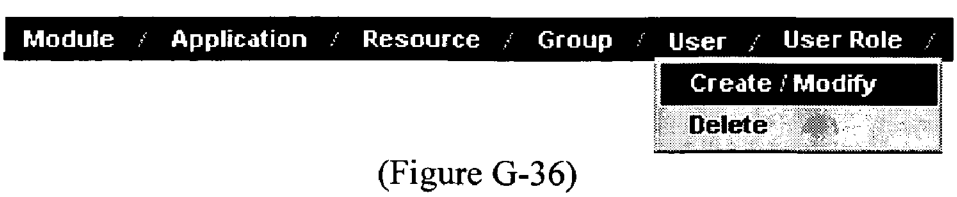
(Figure G-36)

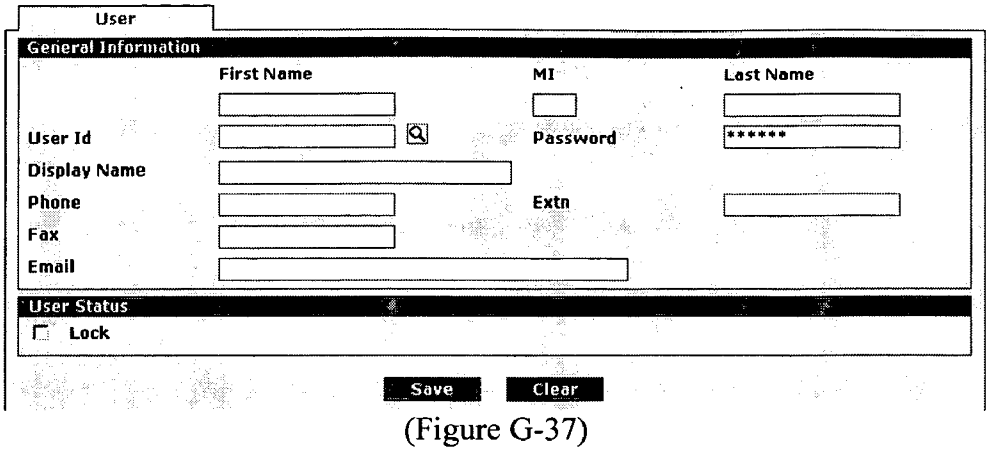
(Figure G-37)
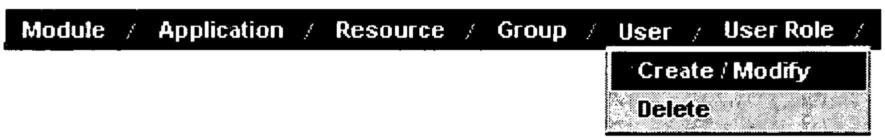
(Figure G-38)
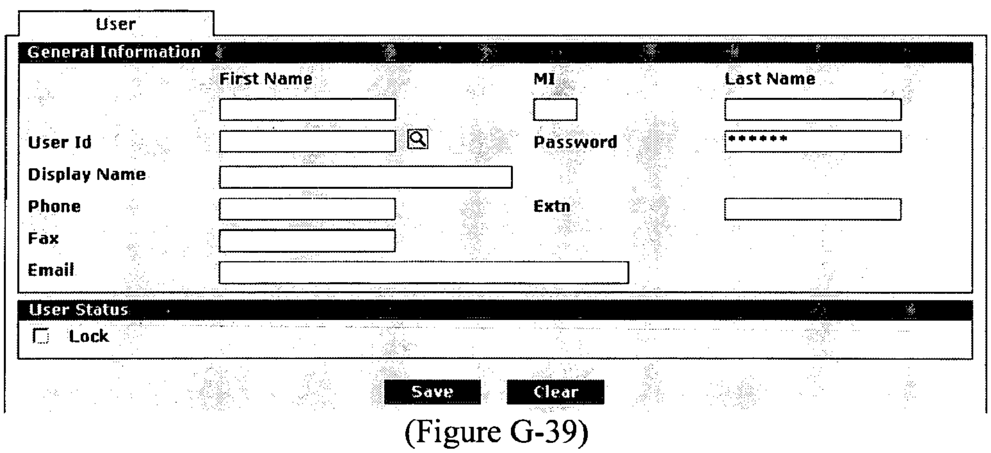
(Figure G-39)
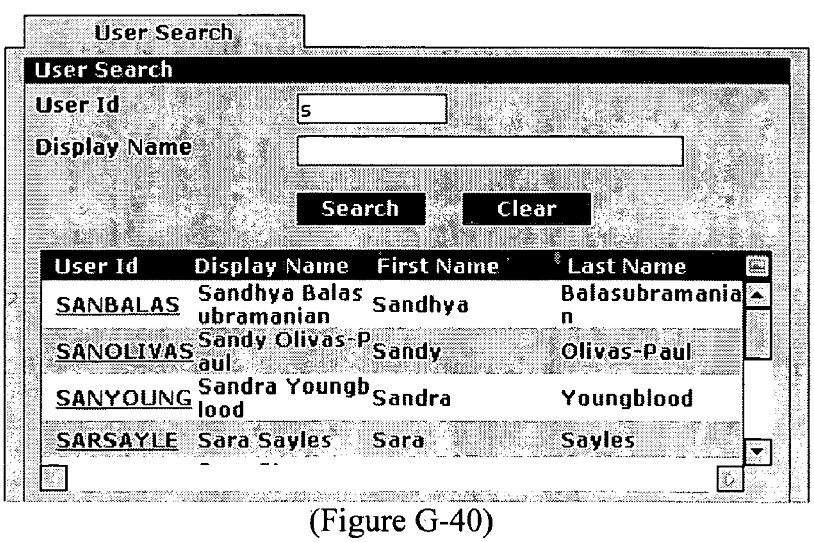
(Figure G-40)

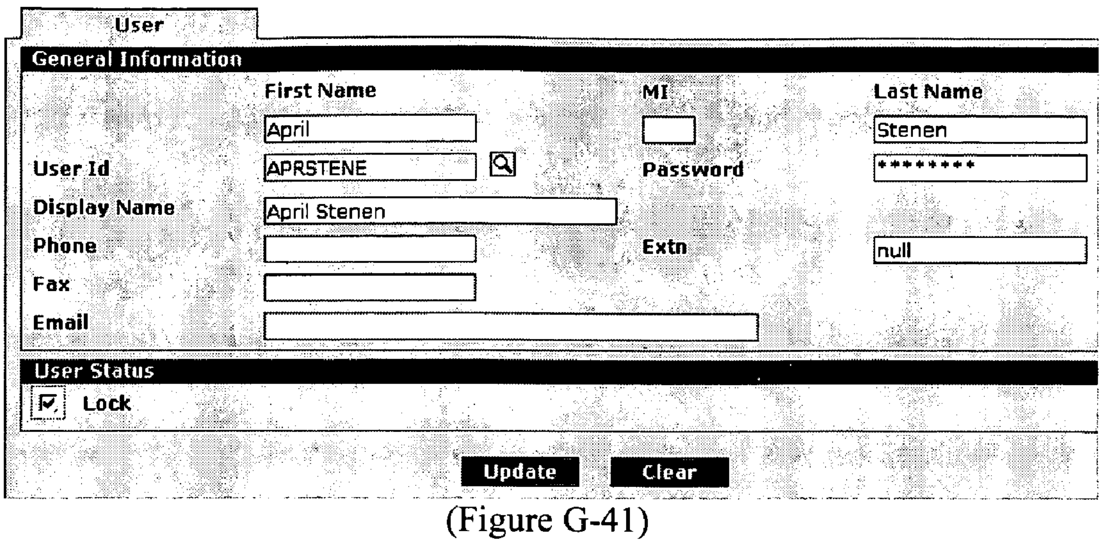
(Figure G-41)
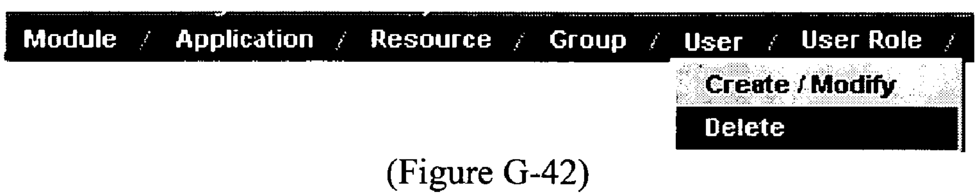
(Figure G-42)
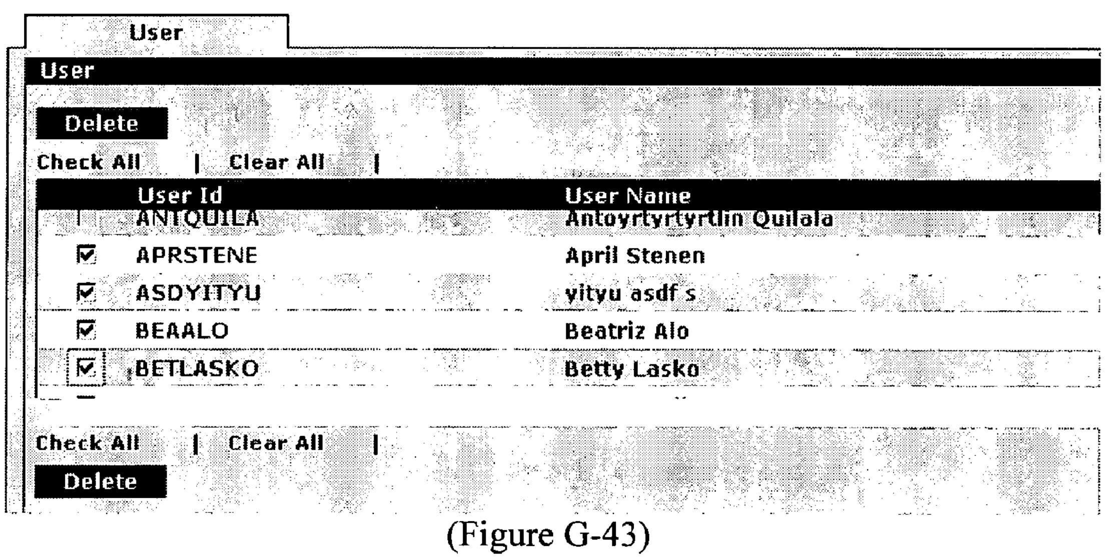
(Figure G-43)
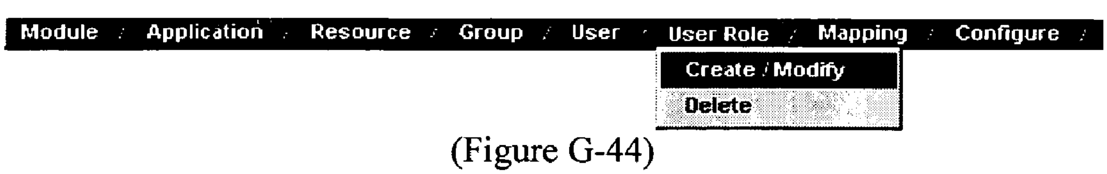
(Figure G-44)

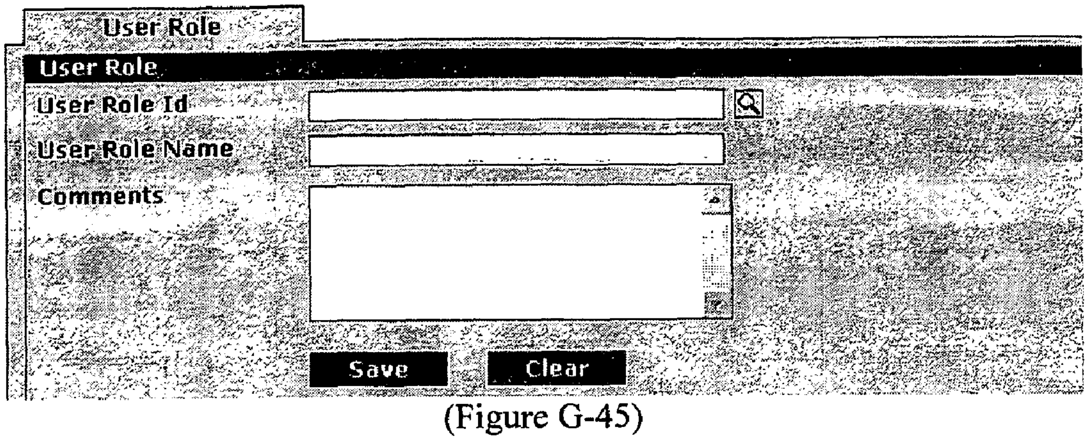
(Figure G-45)
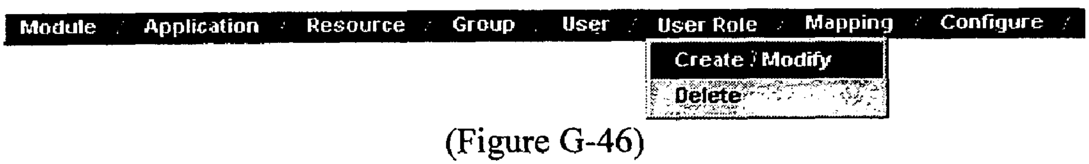
(Figure G-46)
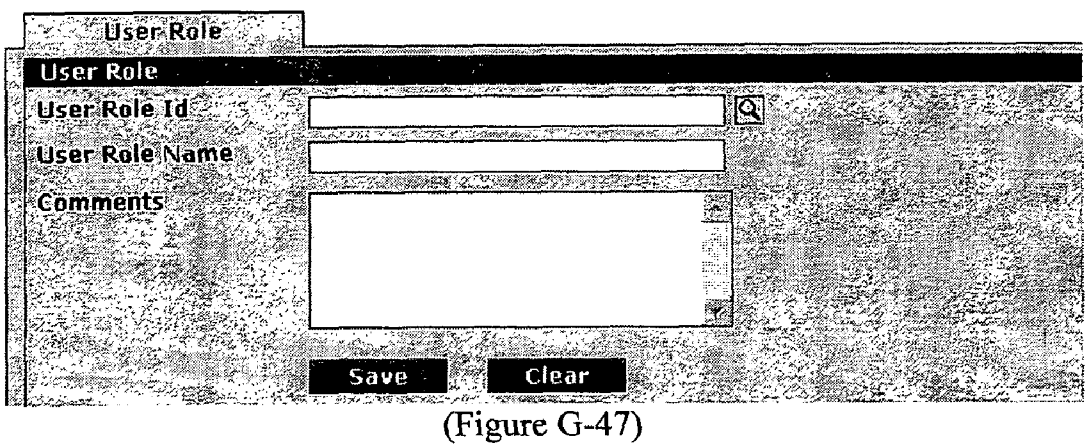
(Figure G-47)
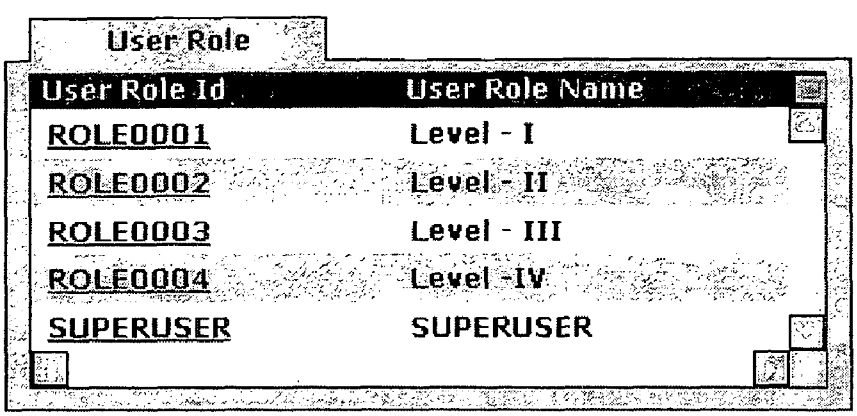
(Figure G-48)

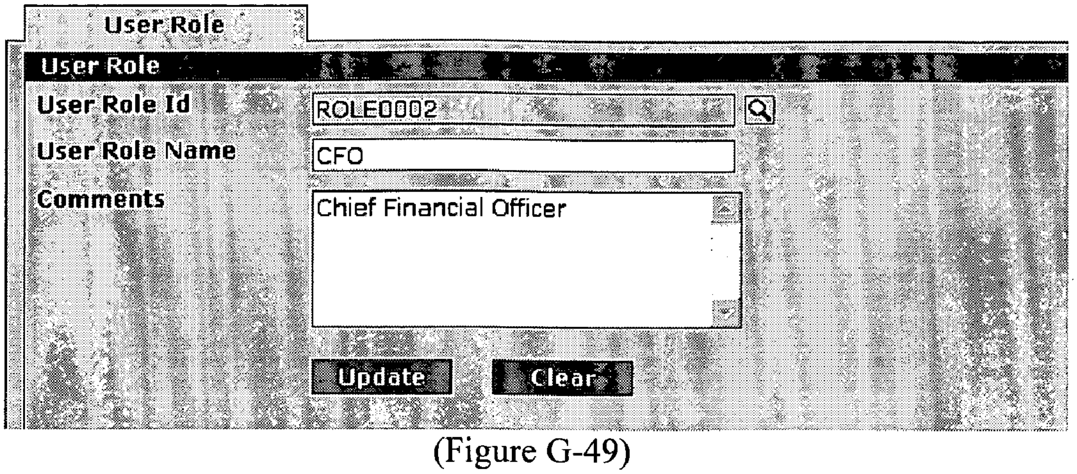
(Figure G-49)
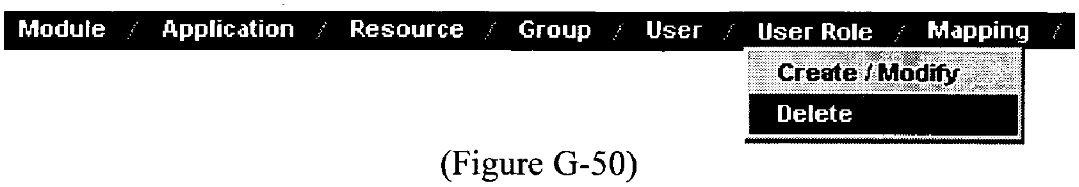
(Figure G-50)
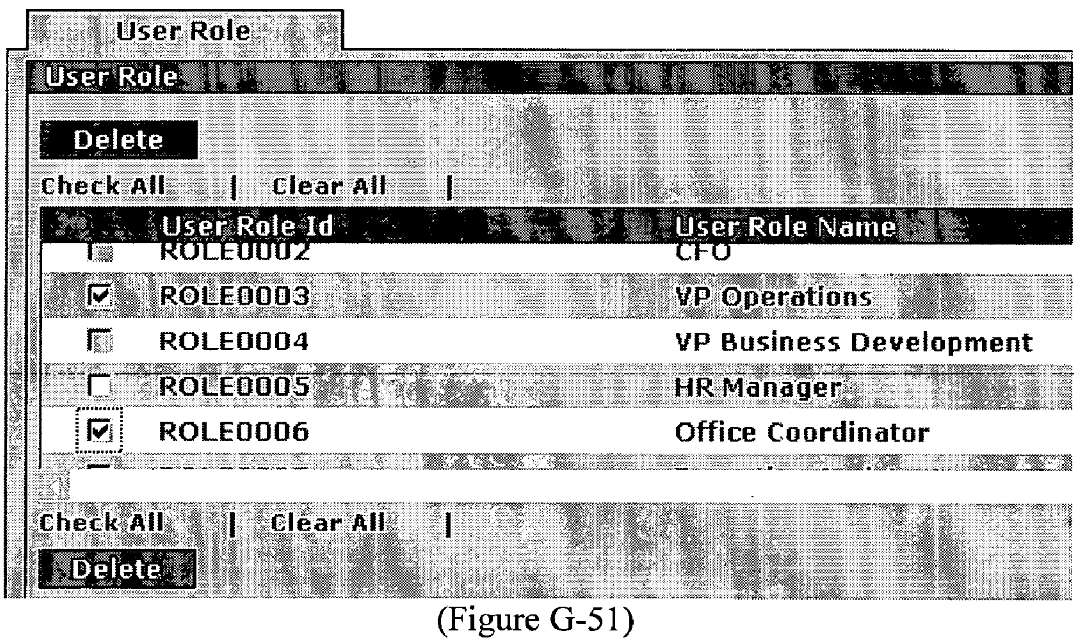
(Figure G-51)
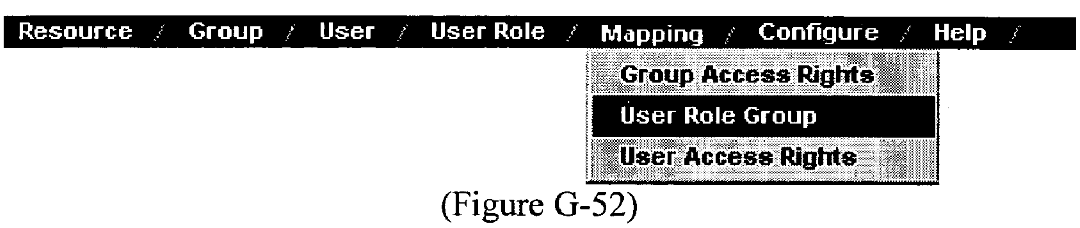
(Figure G-52)

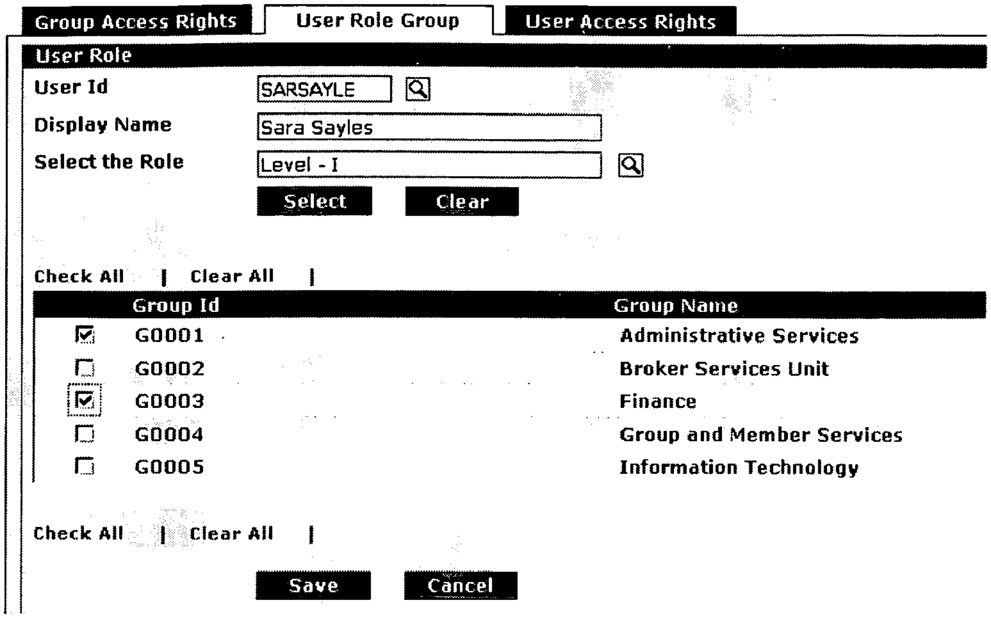
(Figure G-53)
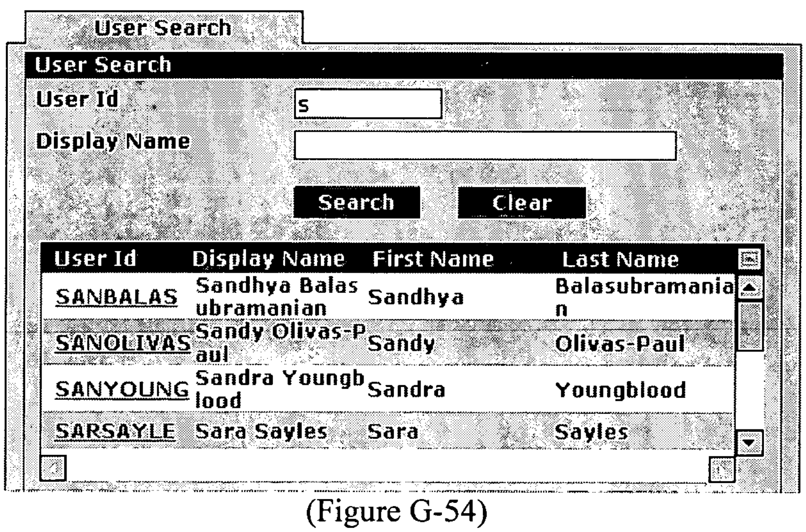
(Figure G-54)
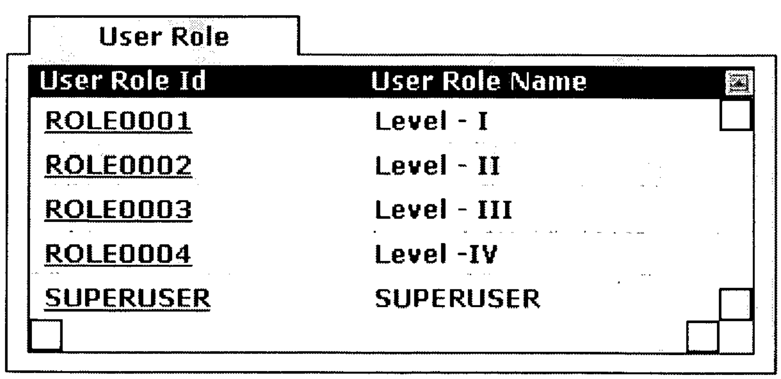
(Figure G-55)

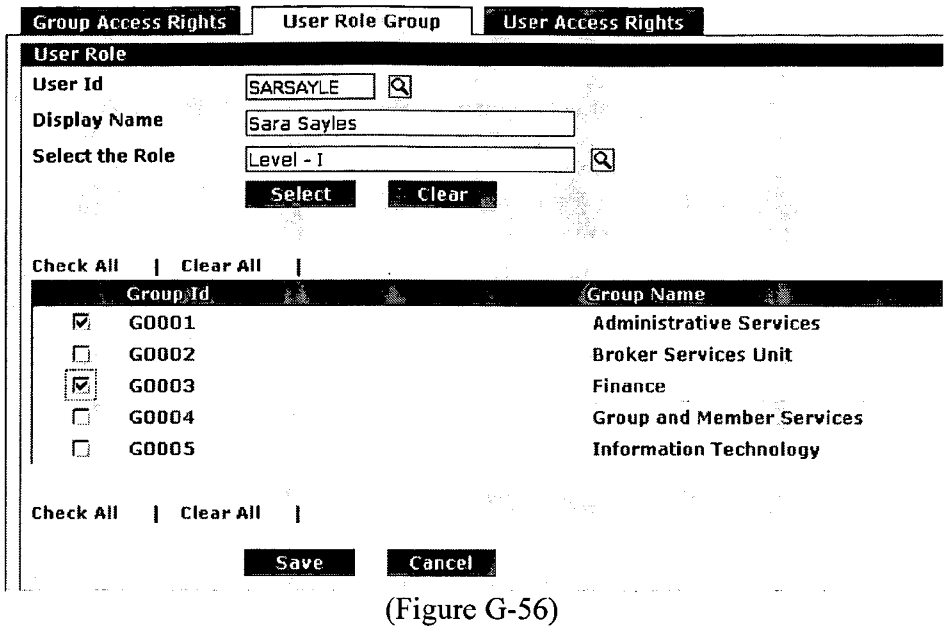
(Figure G-56)
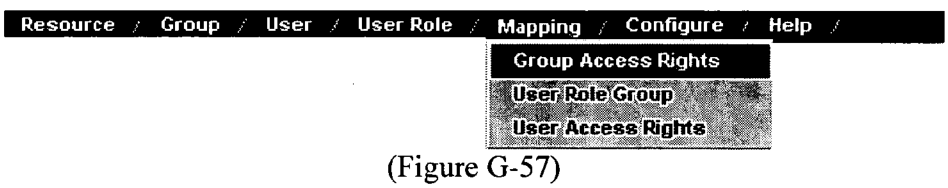
(Figure G-57)
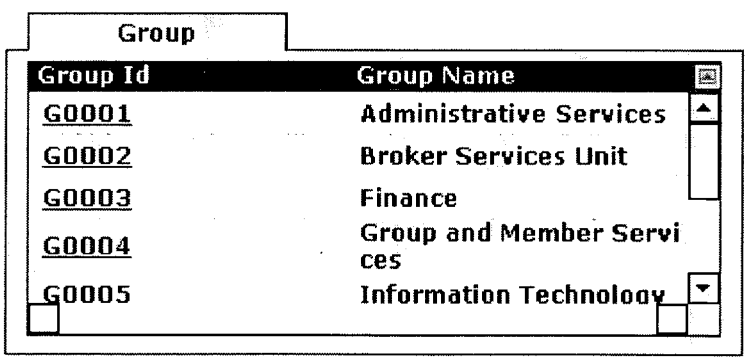
(Figure G-58)
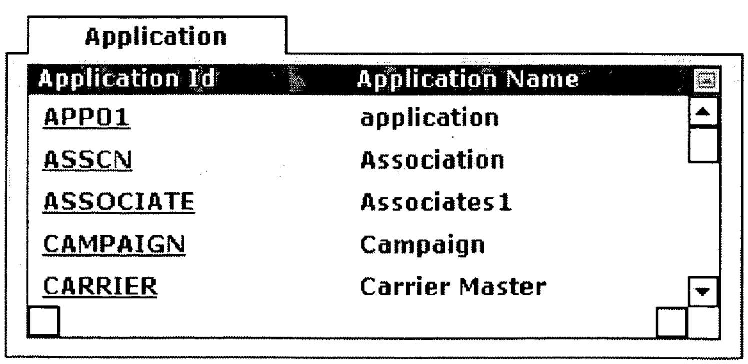
(Figure G-59)

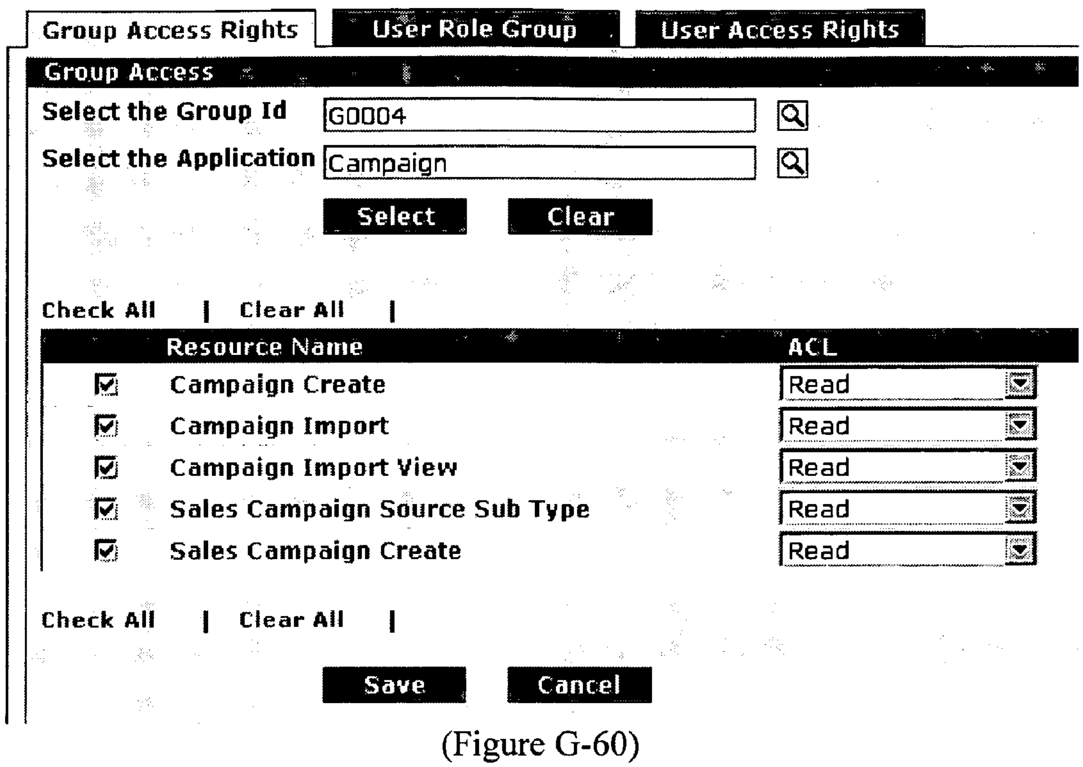
(Figure G-60)
(Figure G-61)

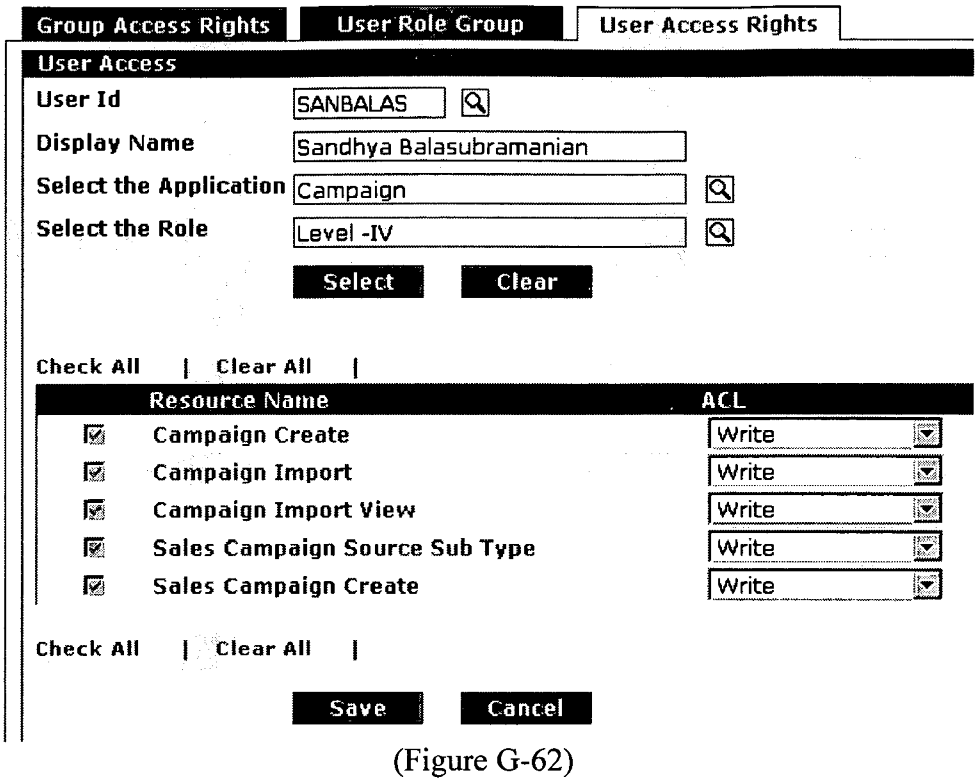
(Figure G-62)
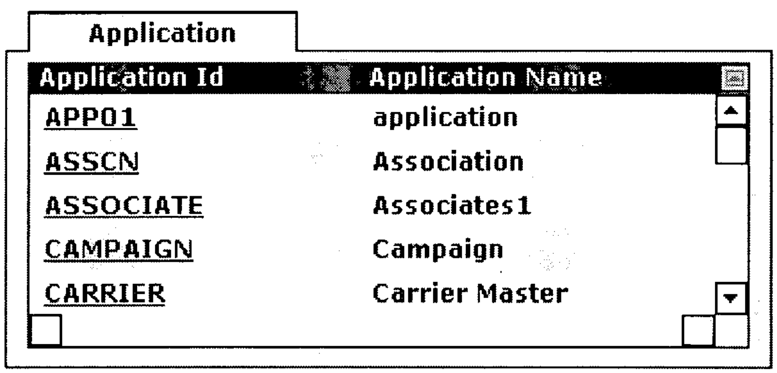
(Figure G-63)
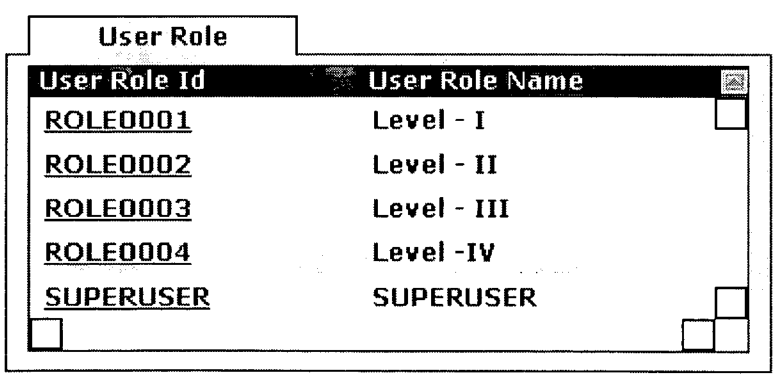
(Figure G-64)

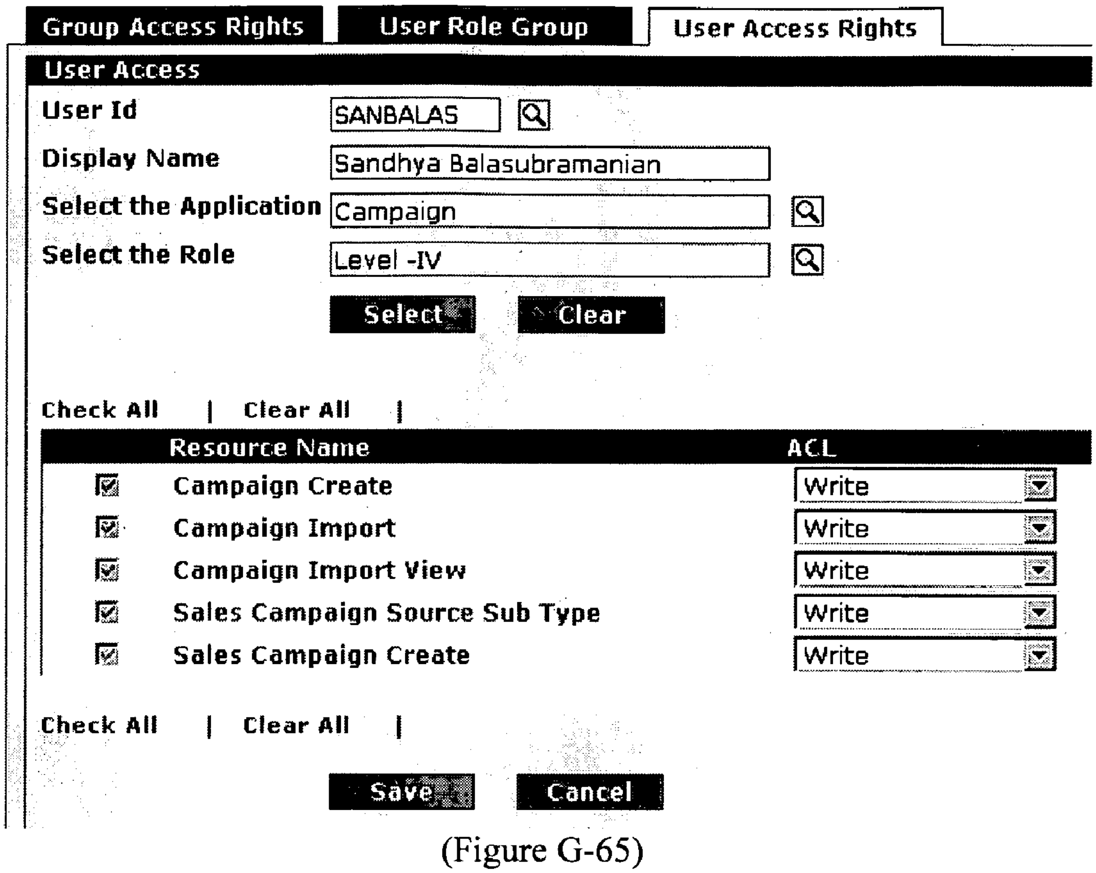
(Figure G-65)
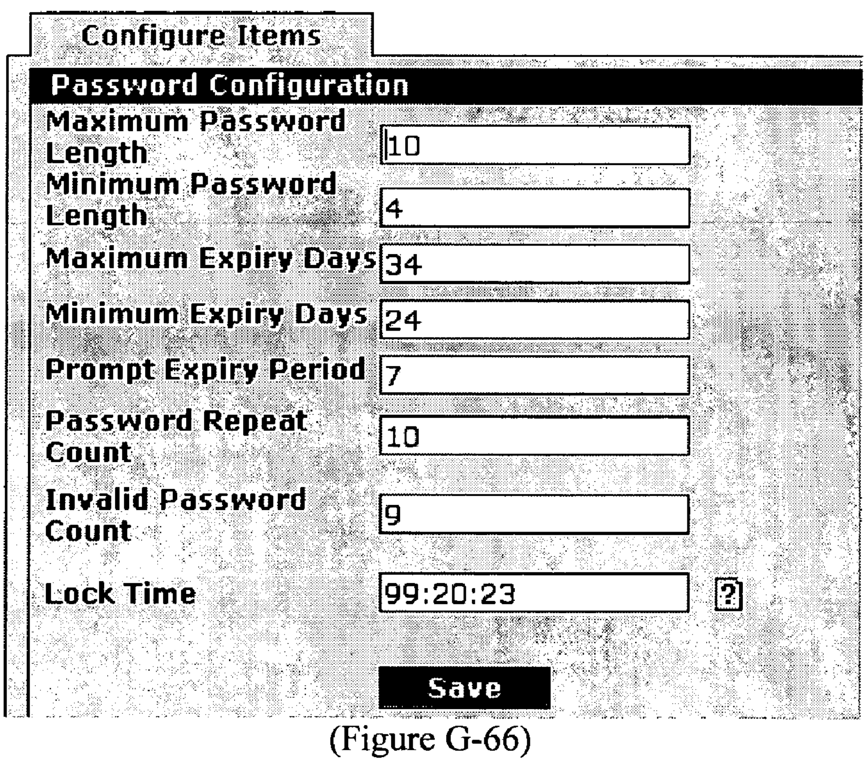
(Figure G-66)

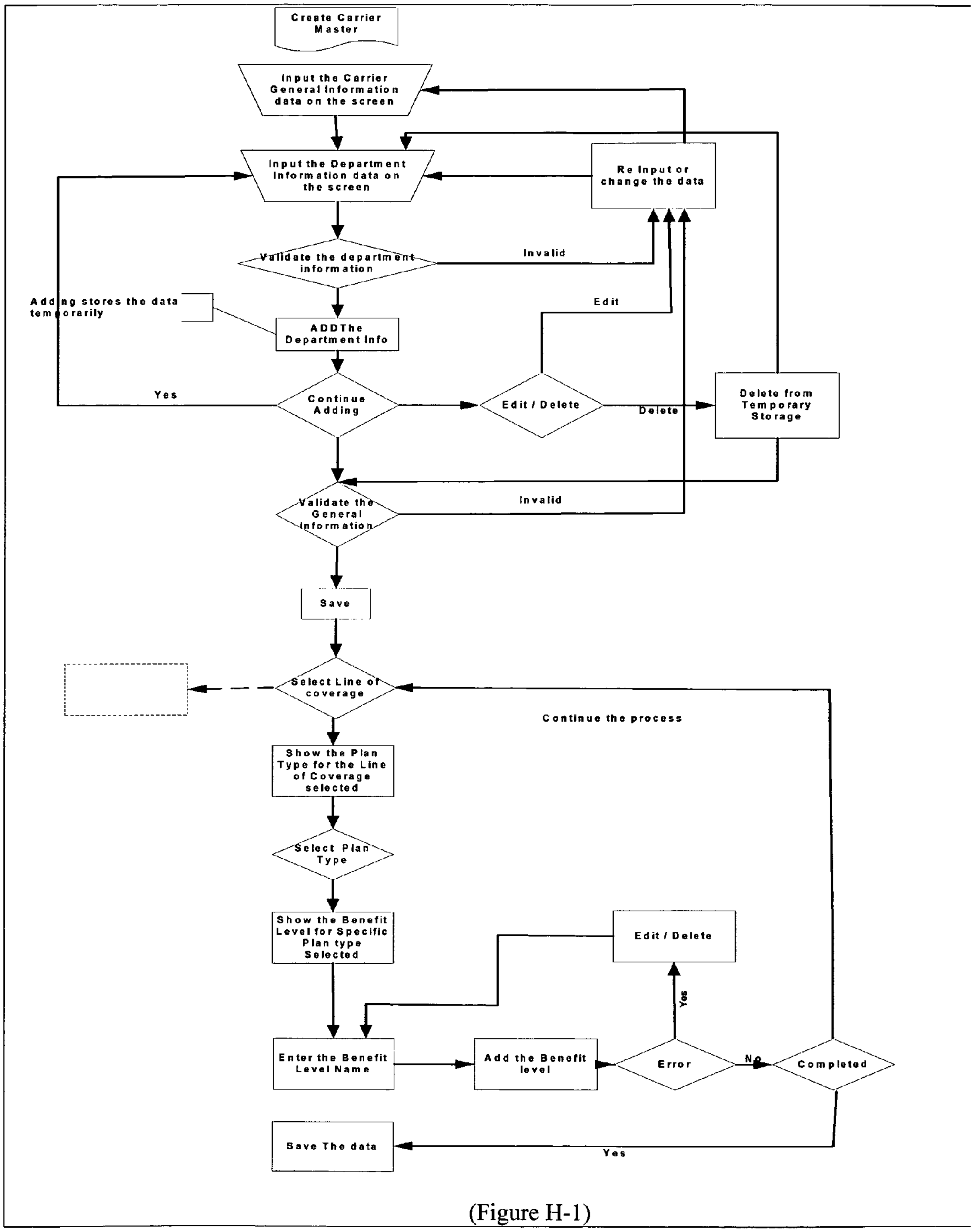
(Figure H-1)

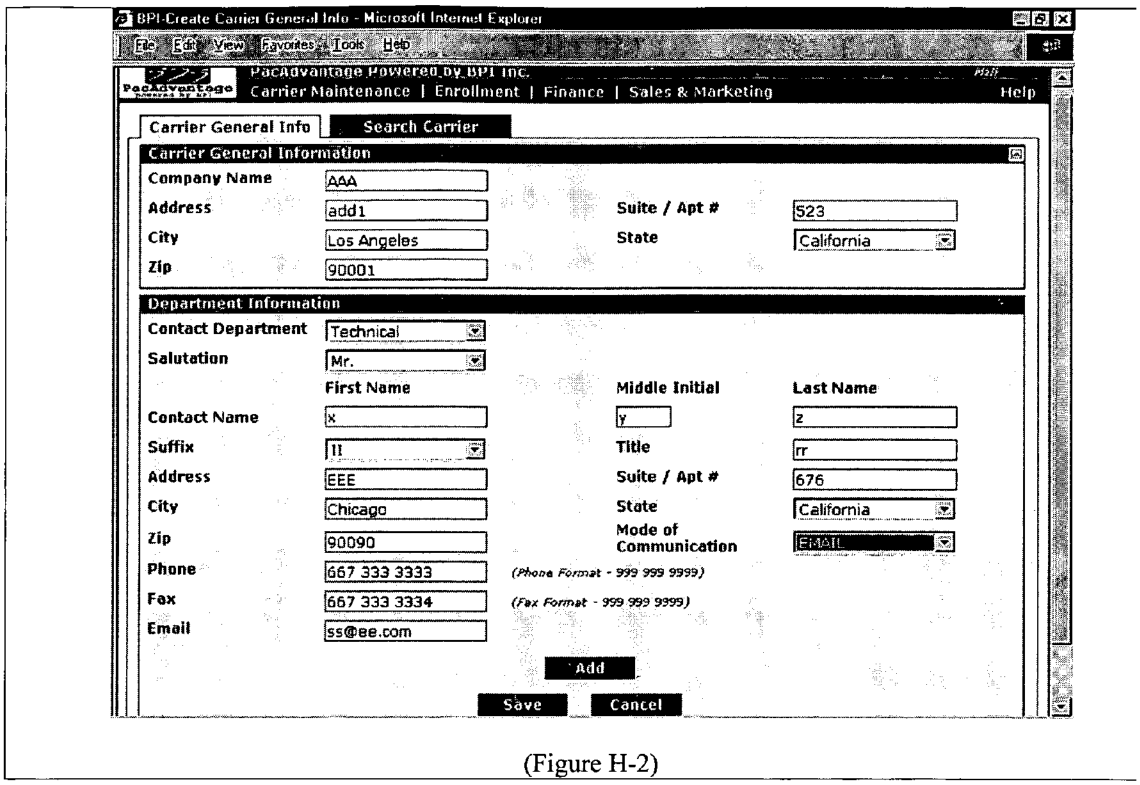
(Figure H-2)

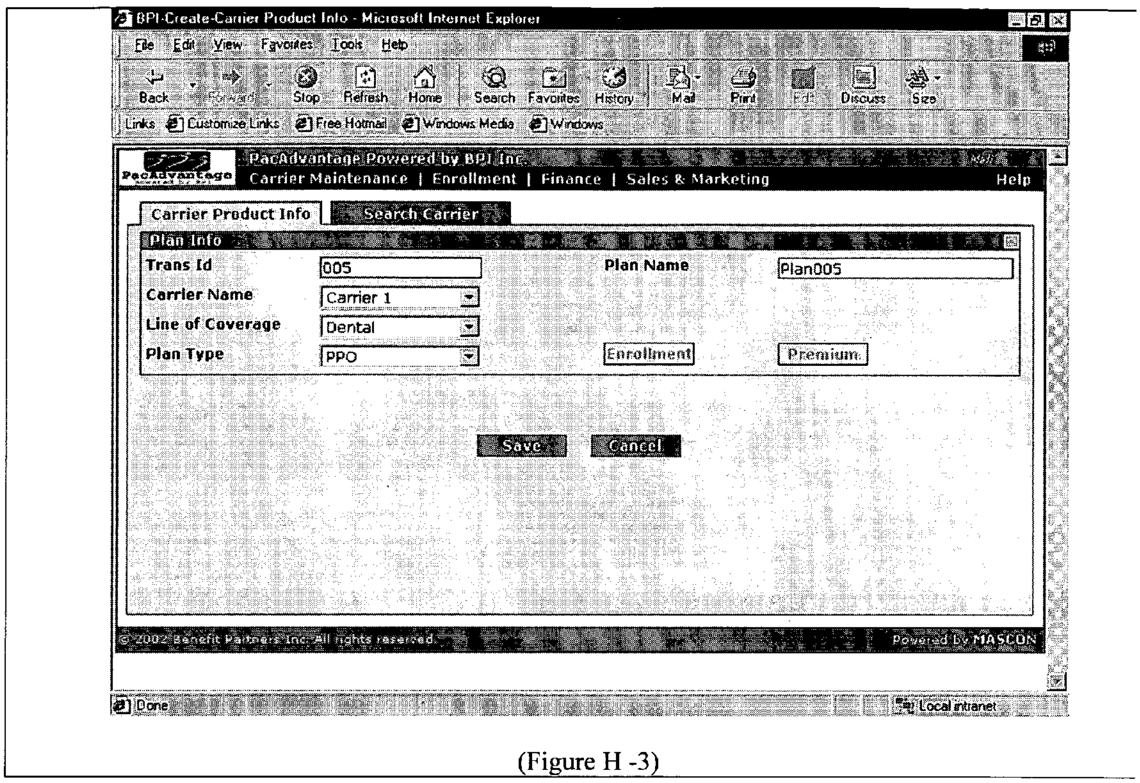
(Figure H -3)

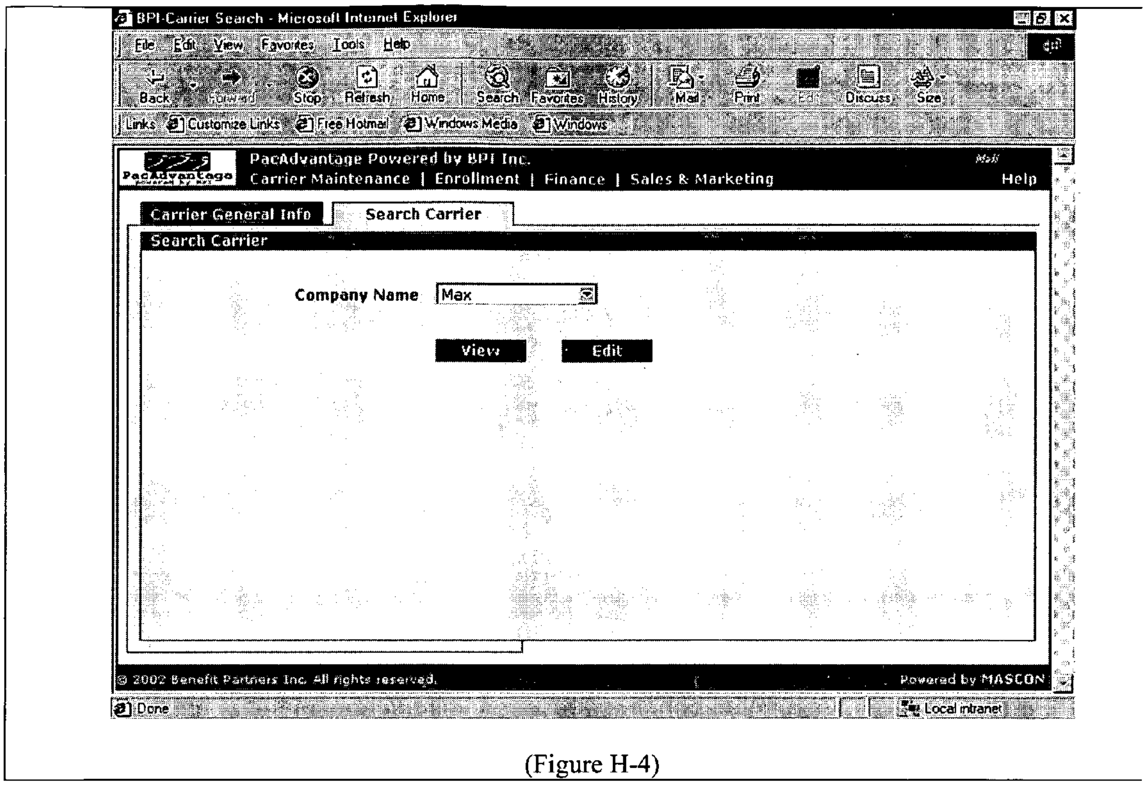
(Figure H-4)

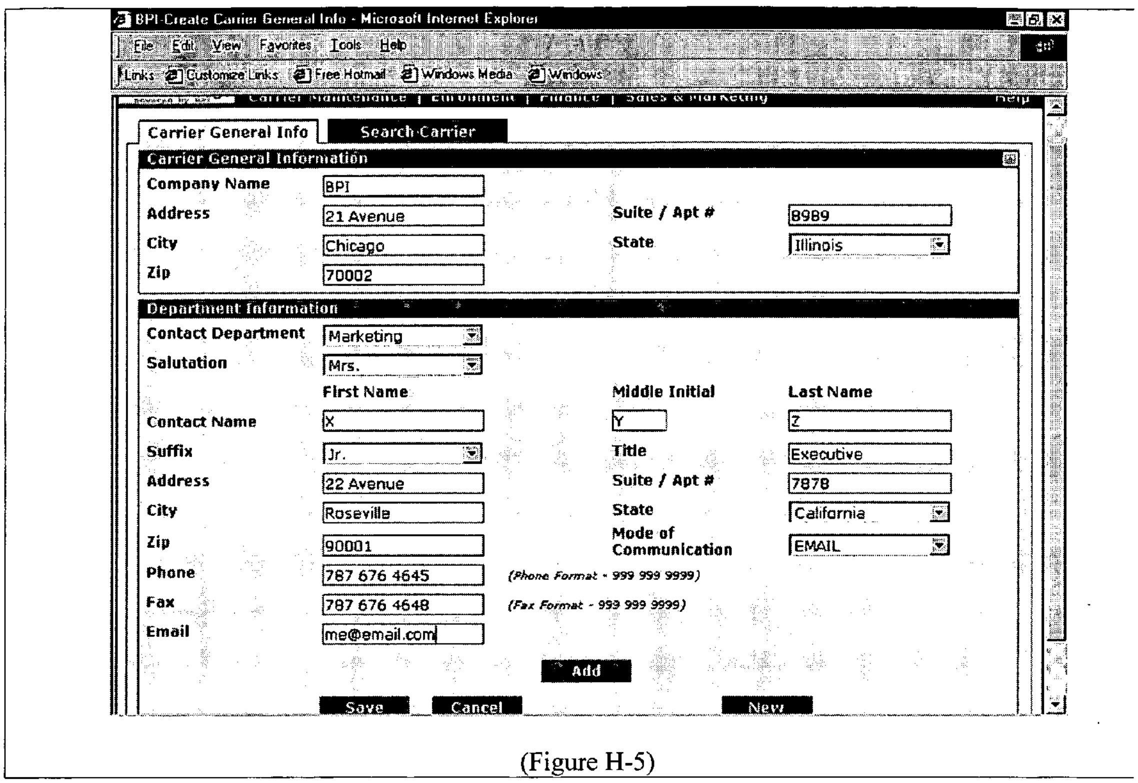
(Figure H-5)

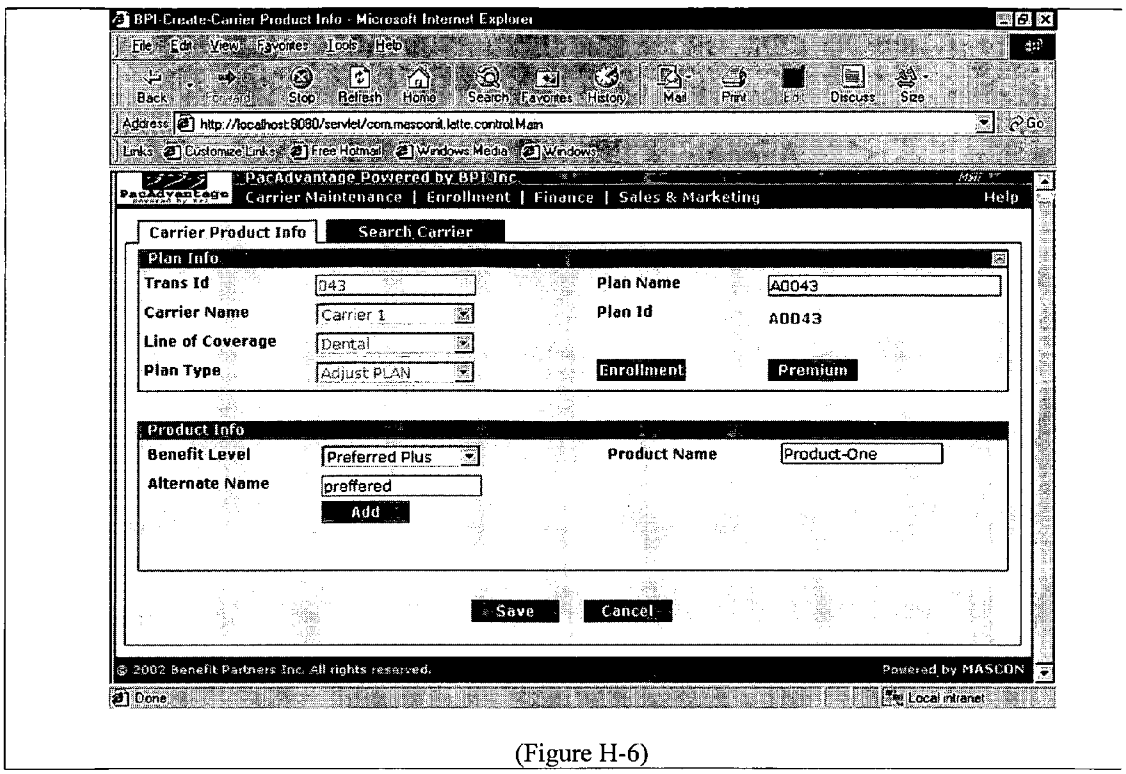
(Figure H-6)

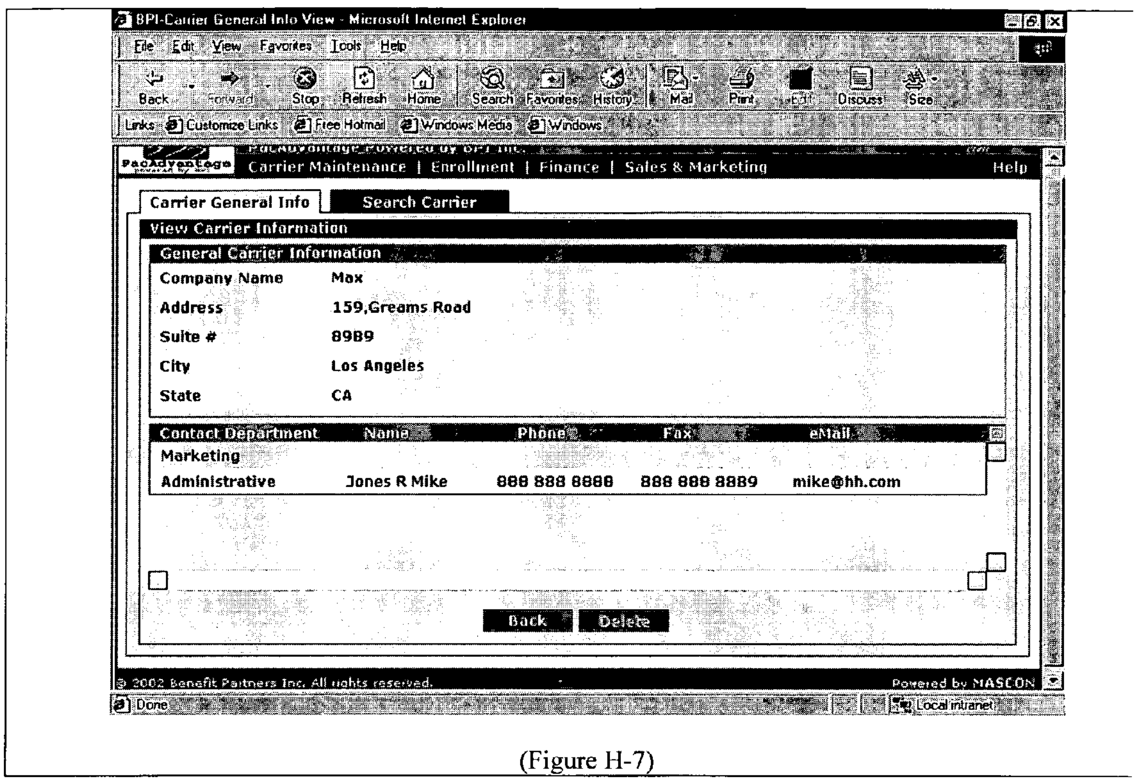
(Figure H-7)

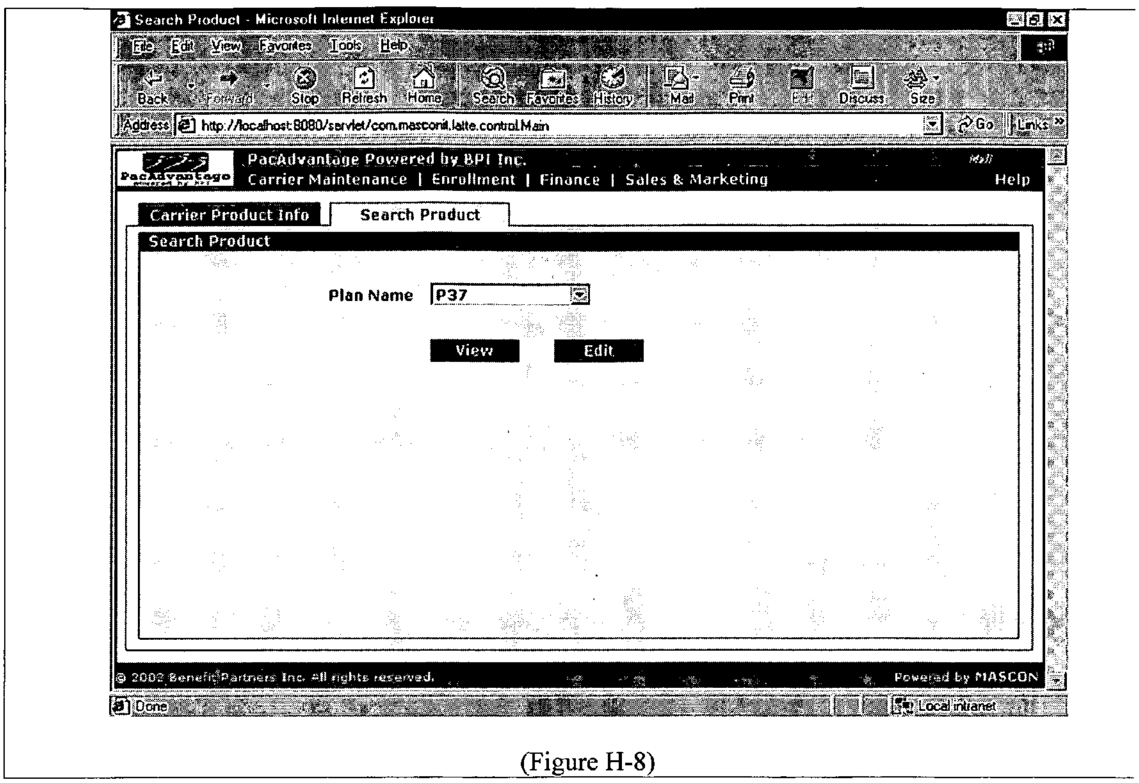
(Figure H-8)

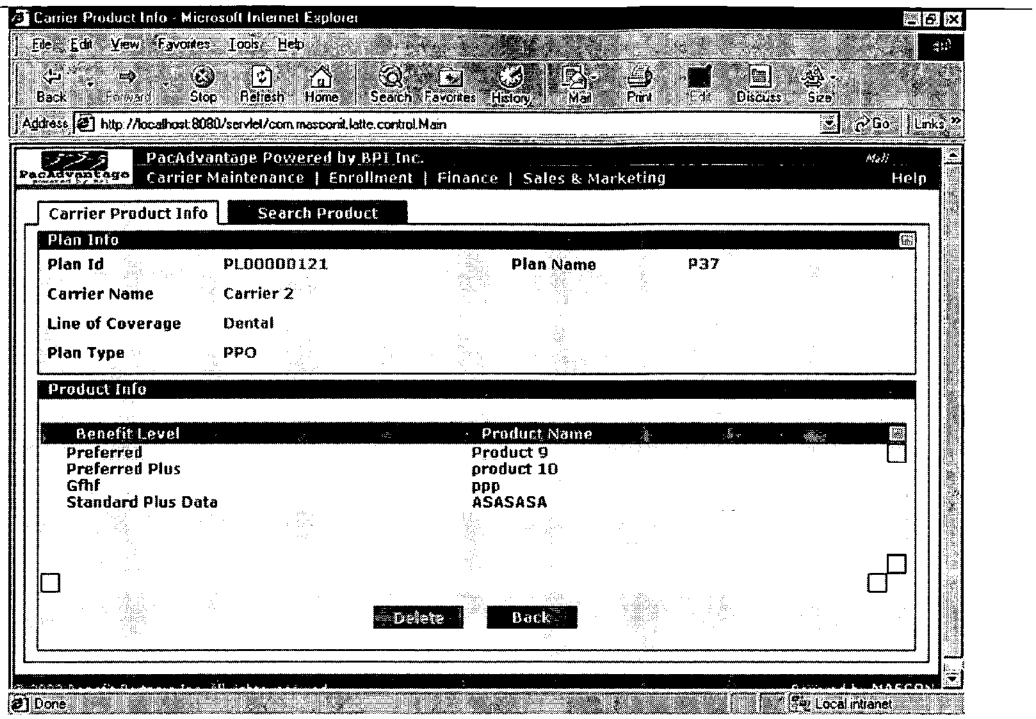
(Figure H-9)
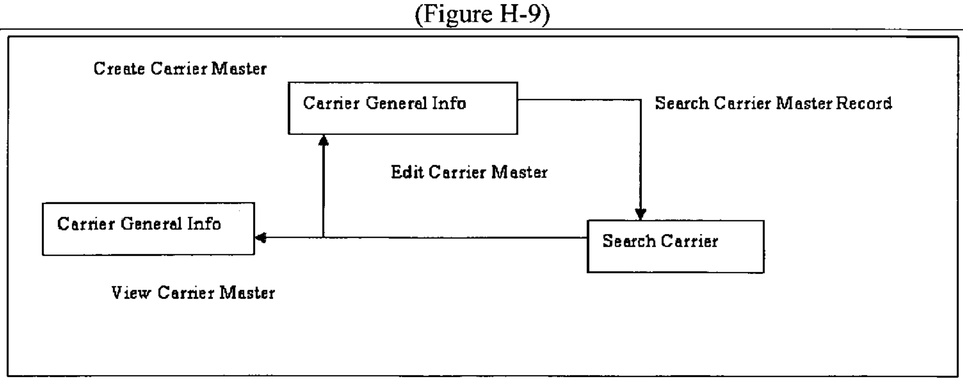
(Figure H-10)

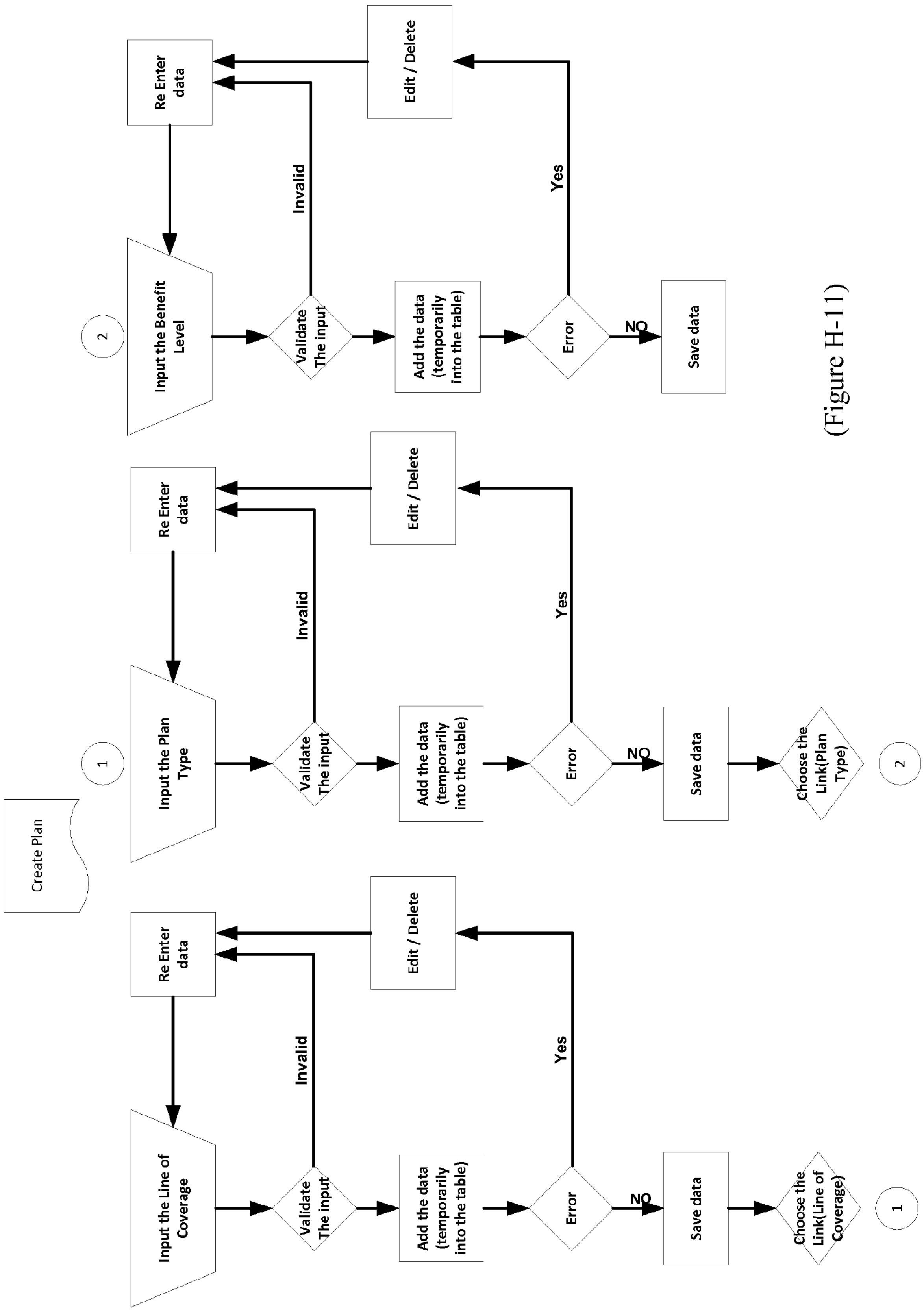
(Figure H-11)

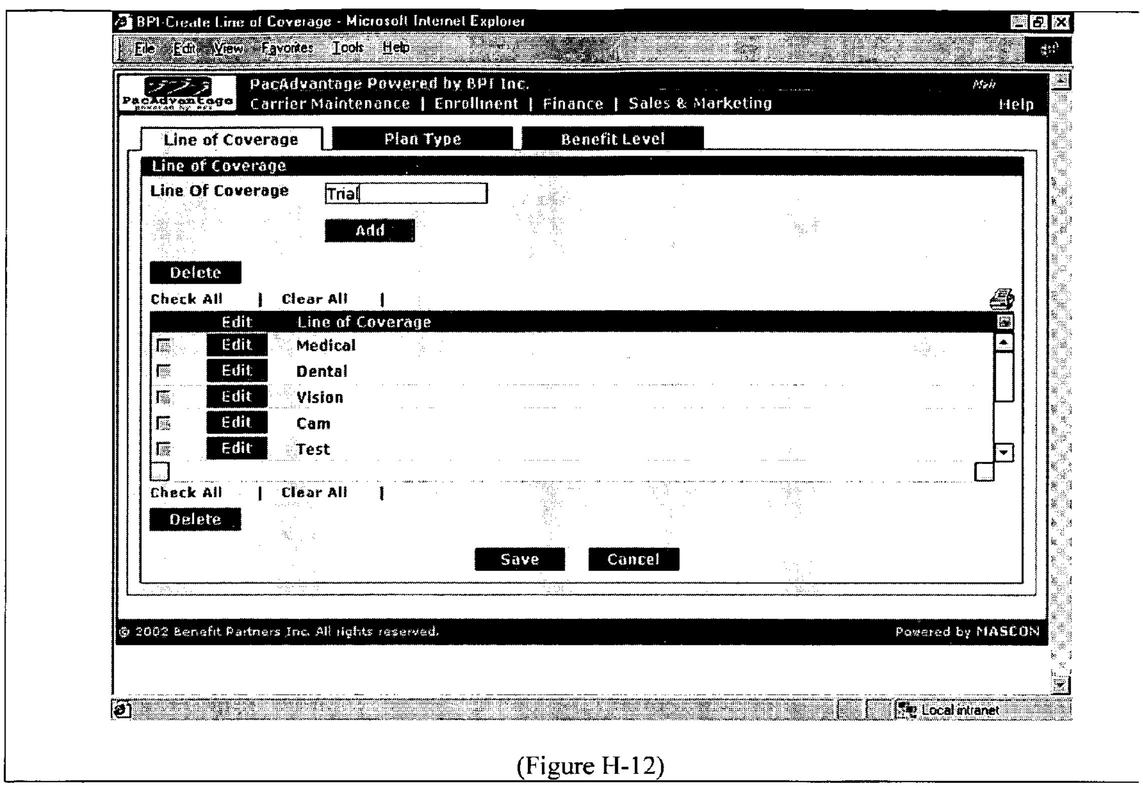
(Figure H-12)

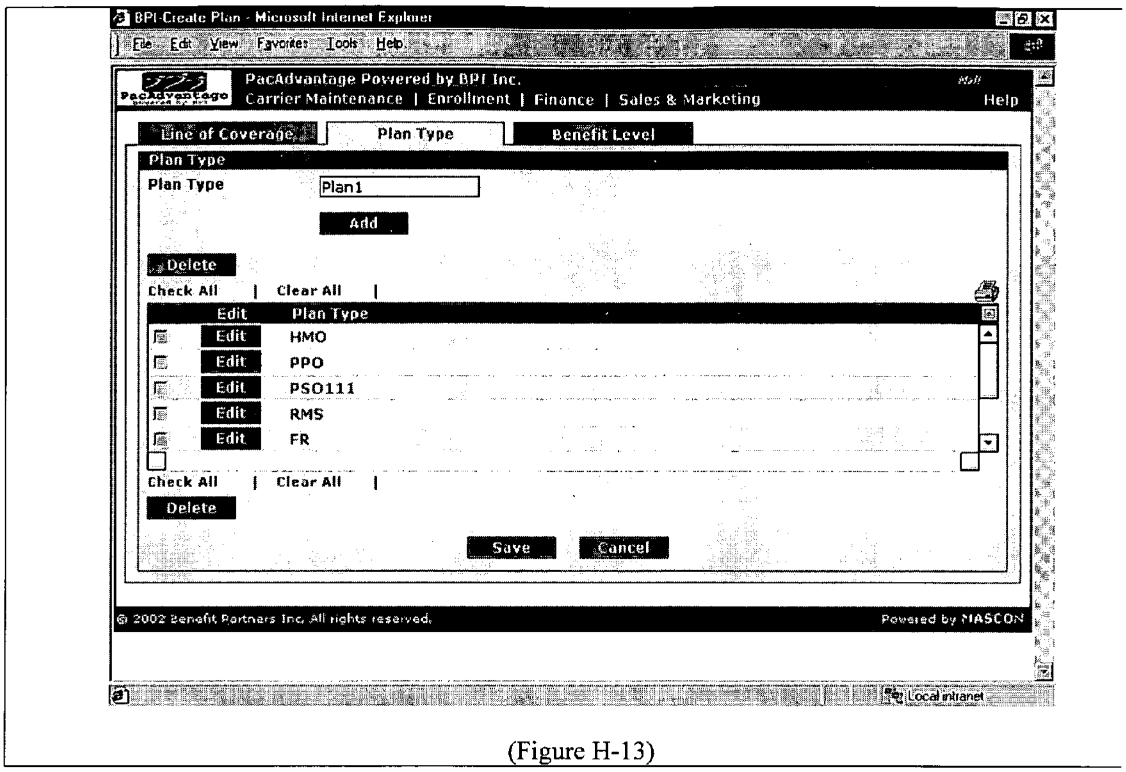
(Figure H-13)

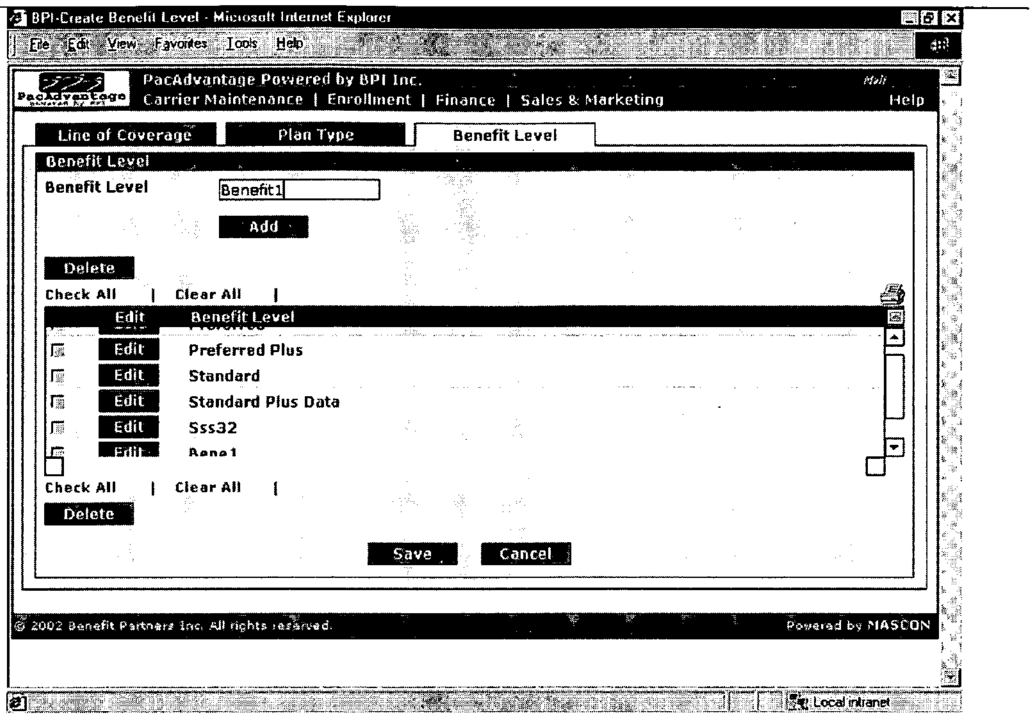
(Figure H-14)
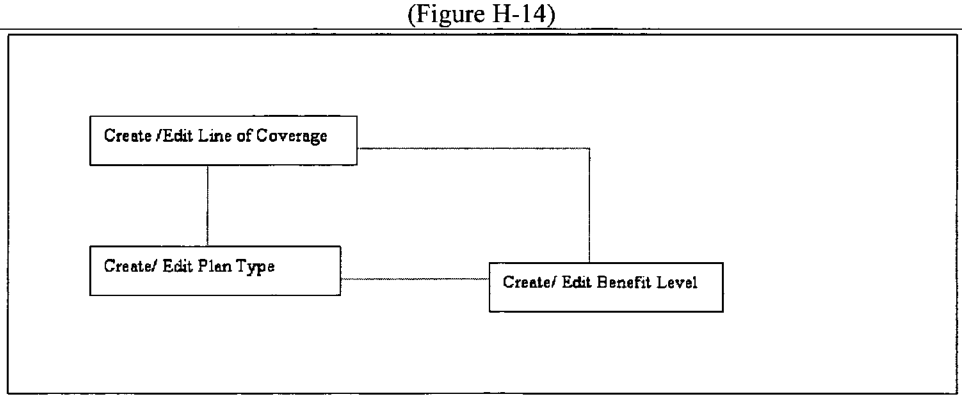
(Figure H-15)

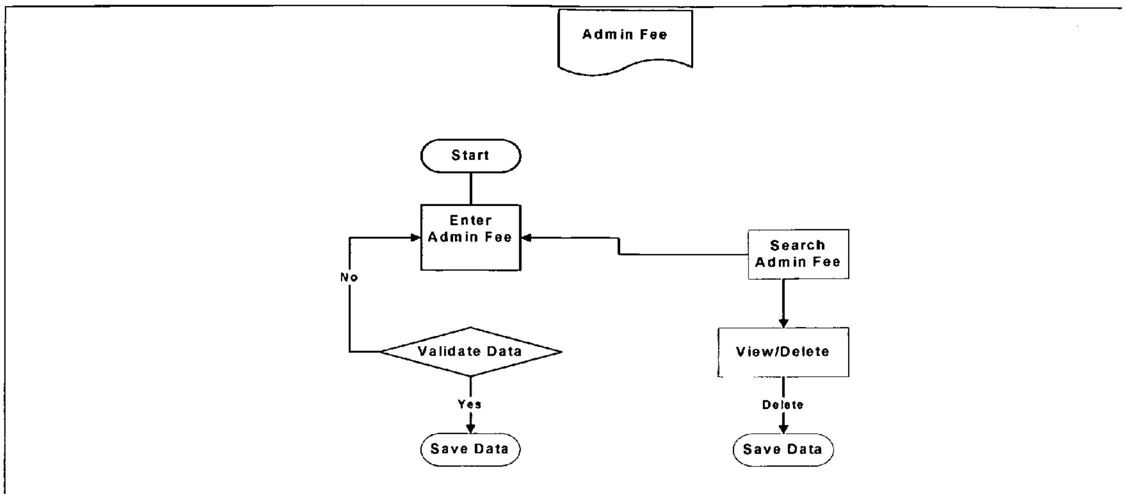
(Figure H-16)
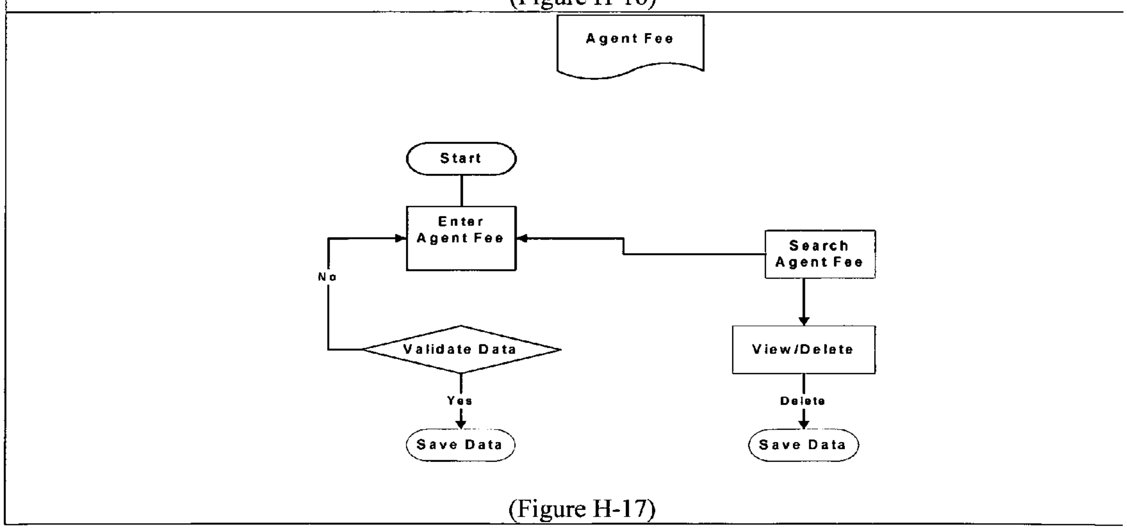
(Figure H-17)

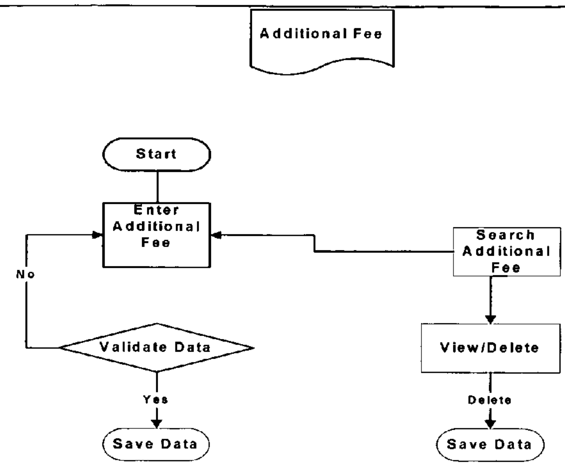
(Figure H-18)
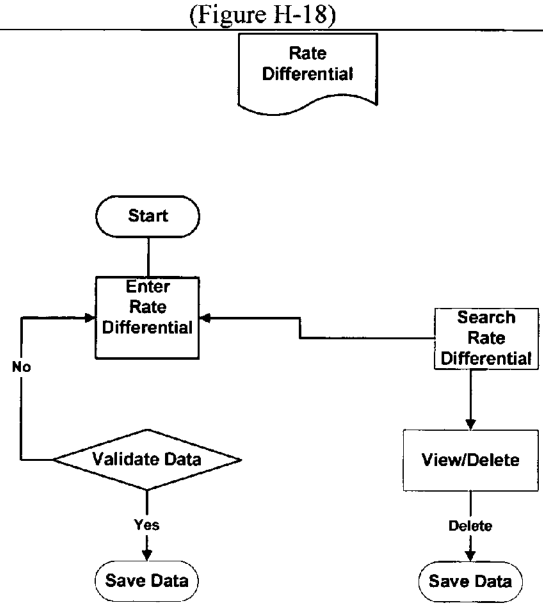
(Figure H-19)

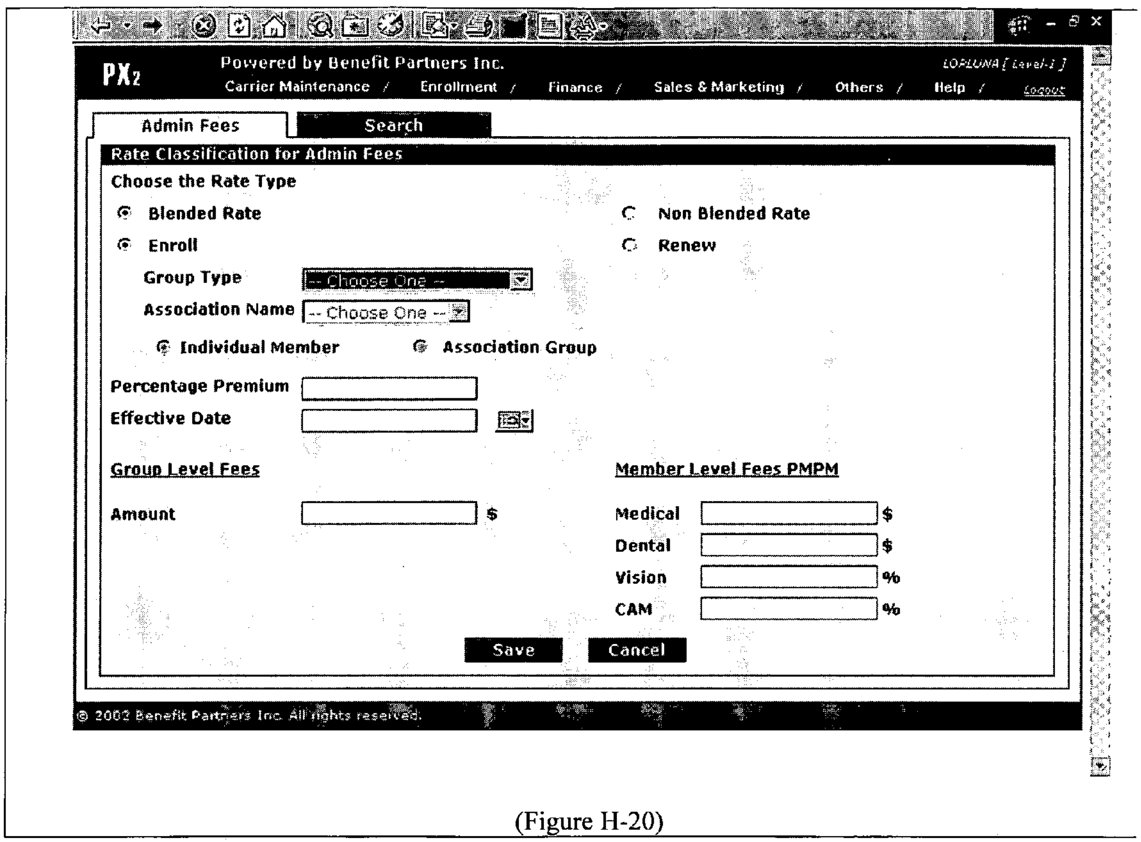
(Figure H-20)

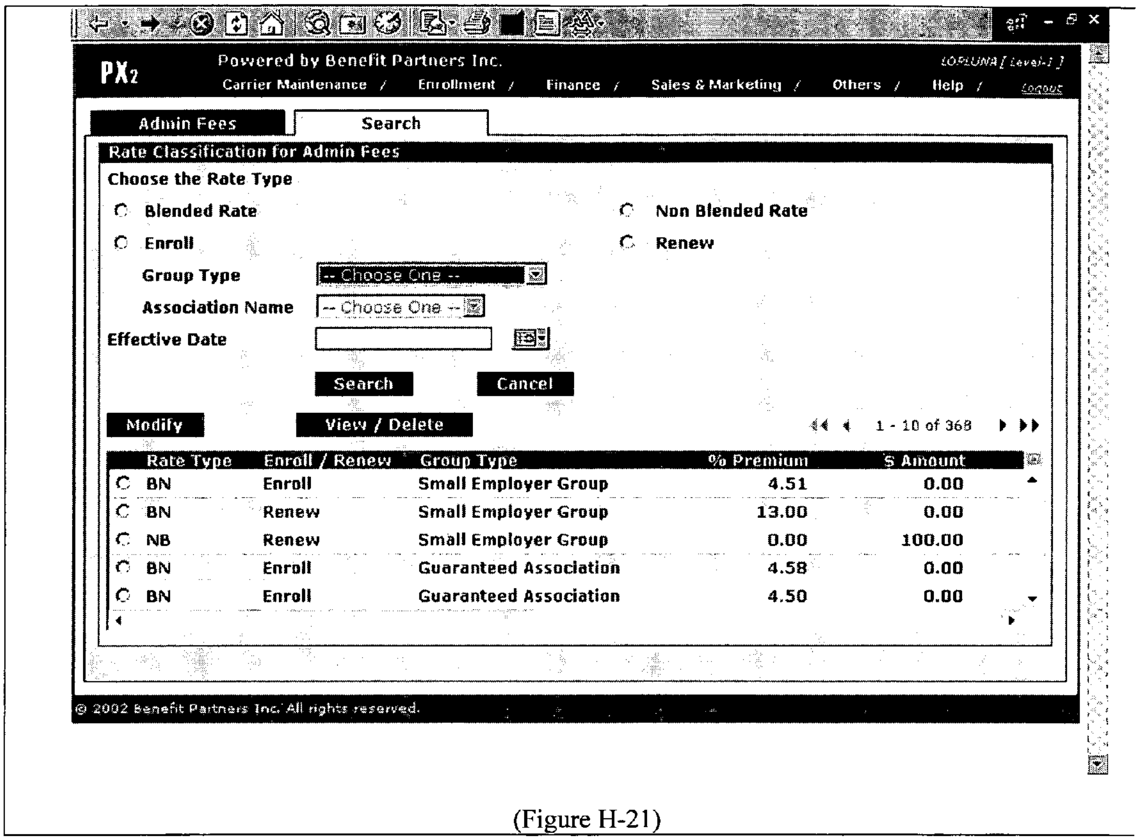
(Figure H-21)

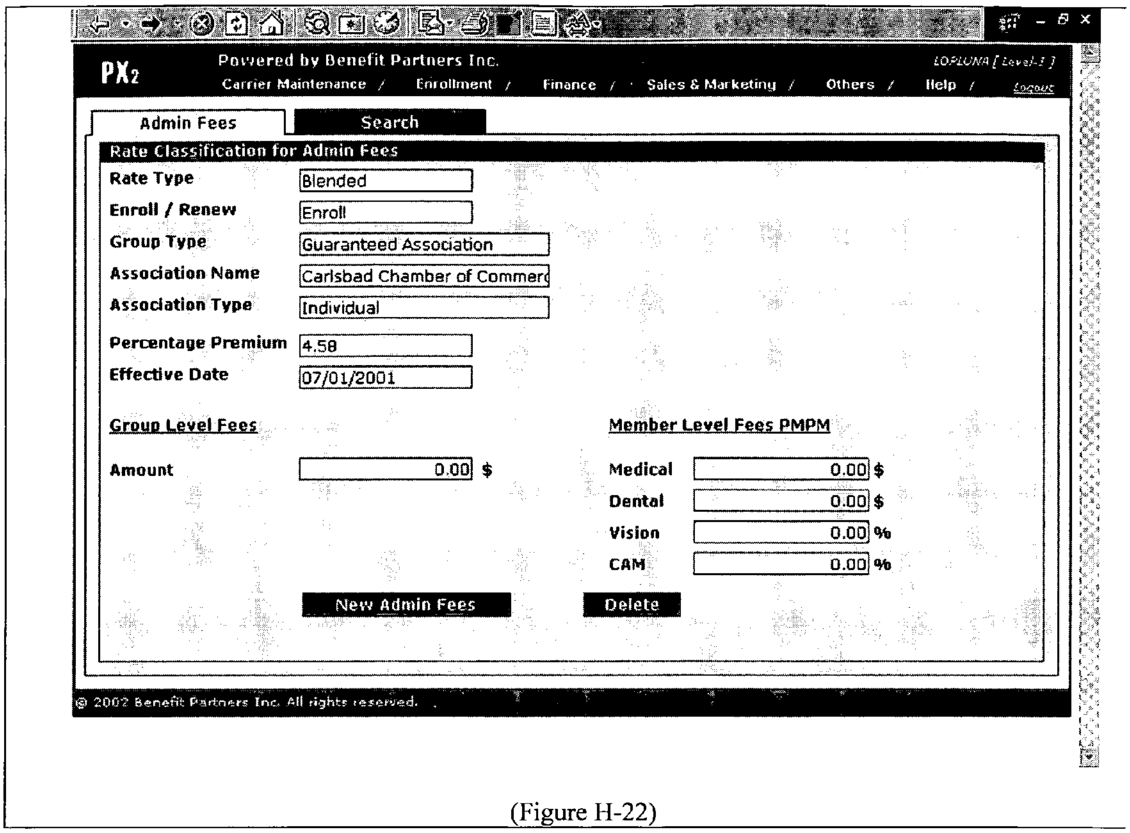
(Figure H-22)

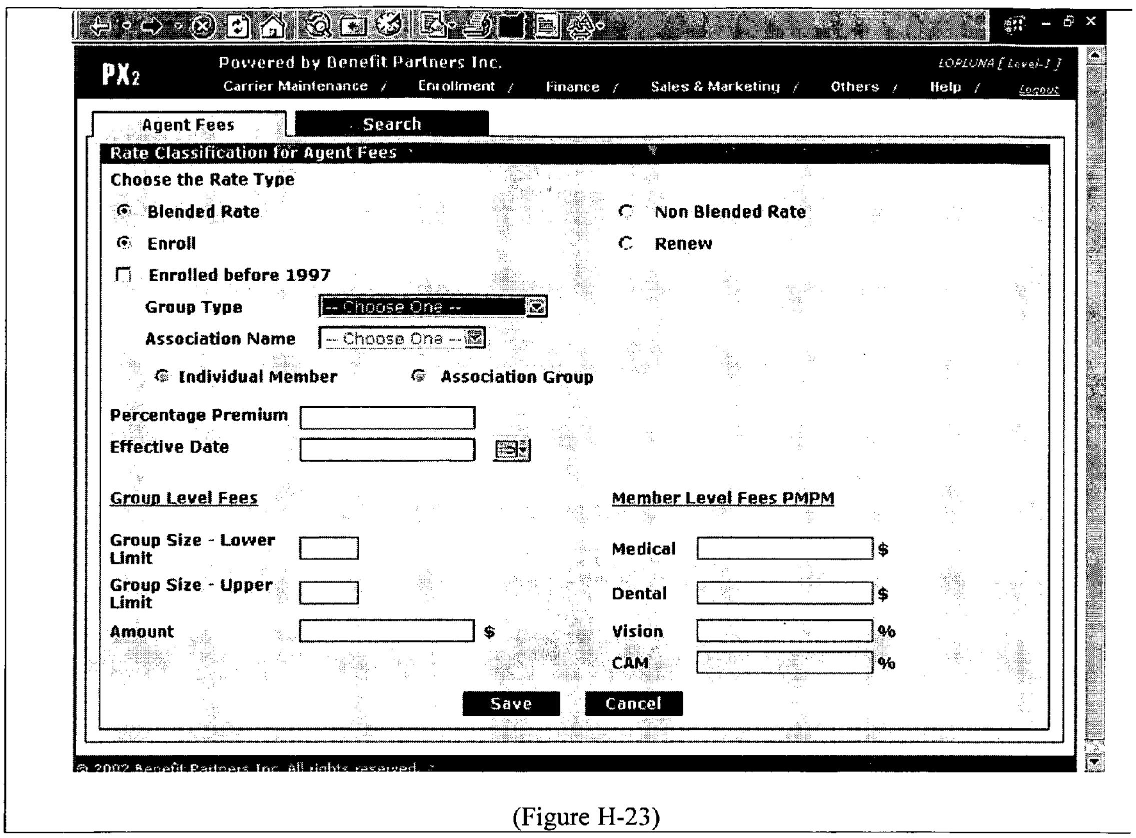
(Figure H-23)

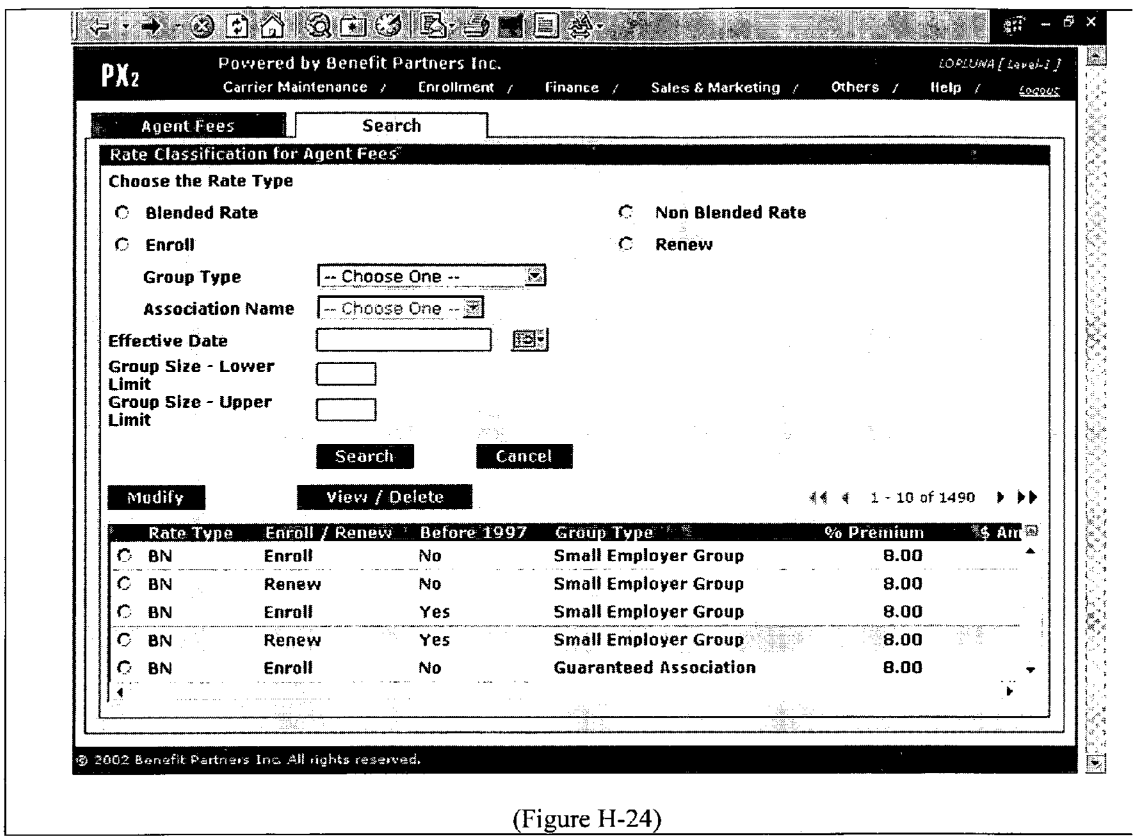
(Figure H-24)

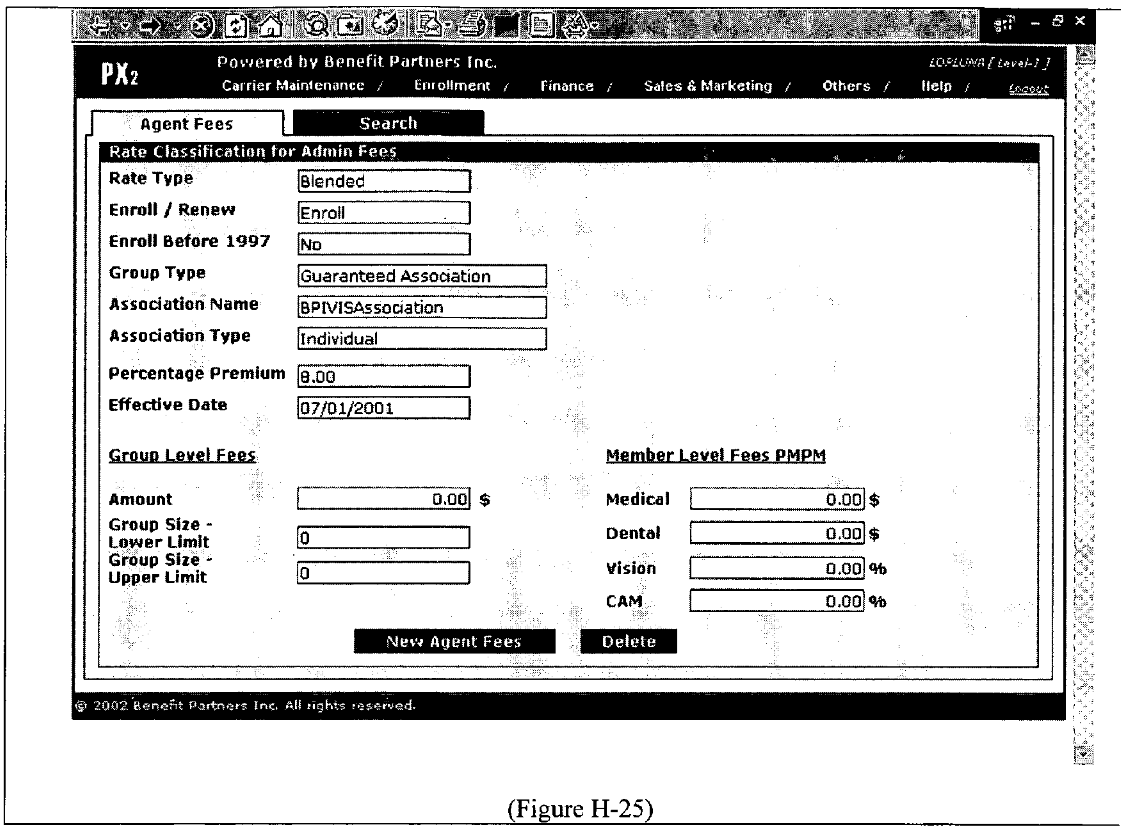
(Figure H-25)

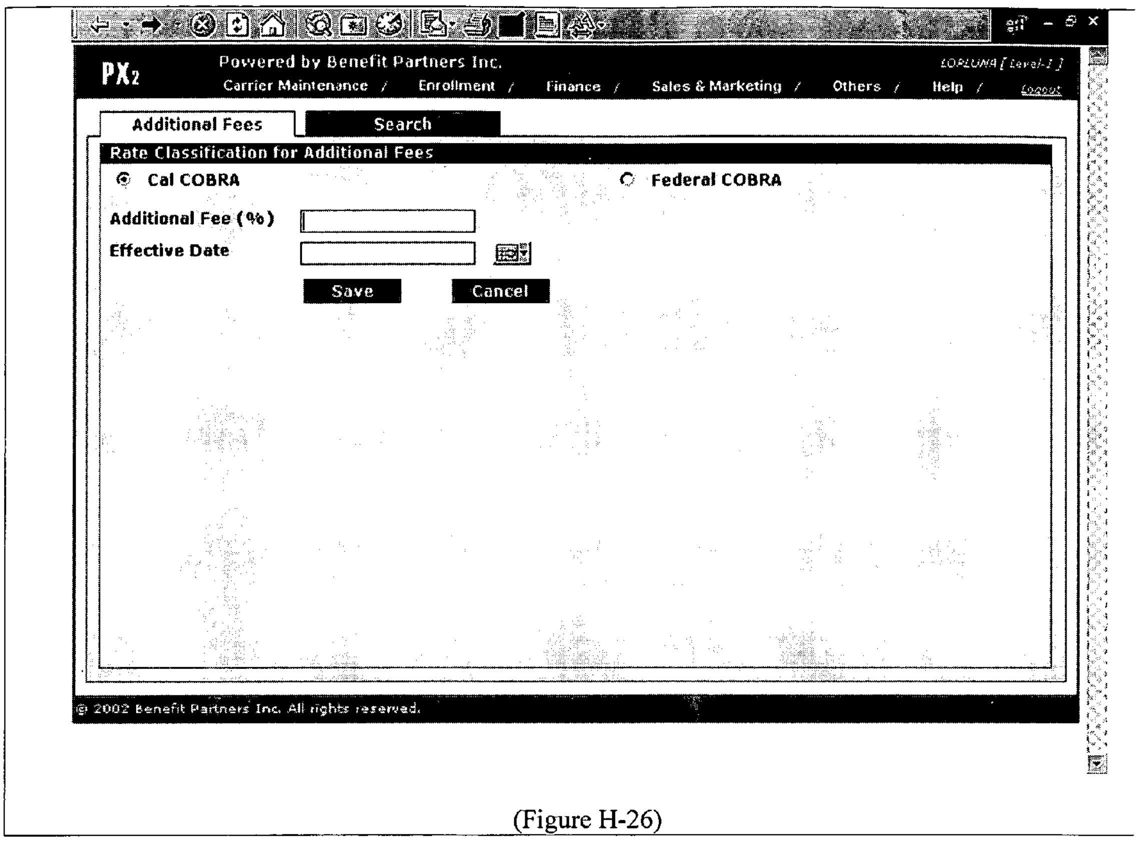
(Figure H-26)

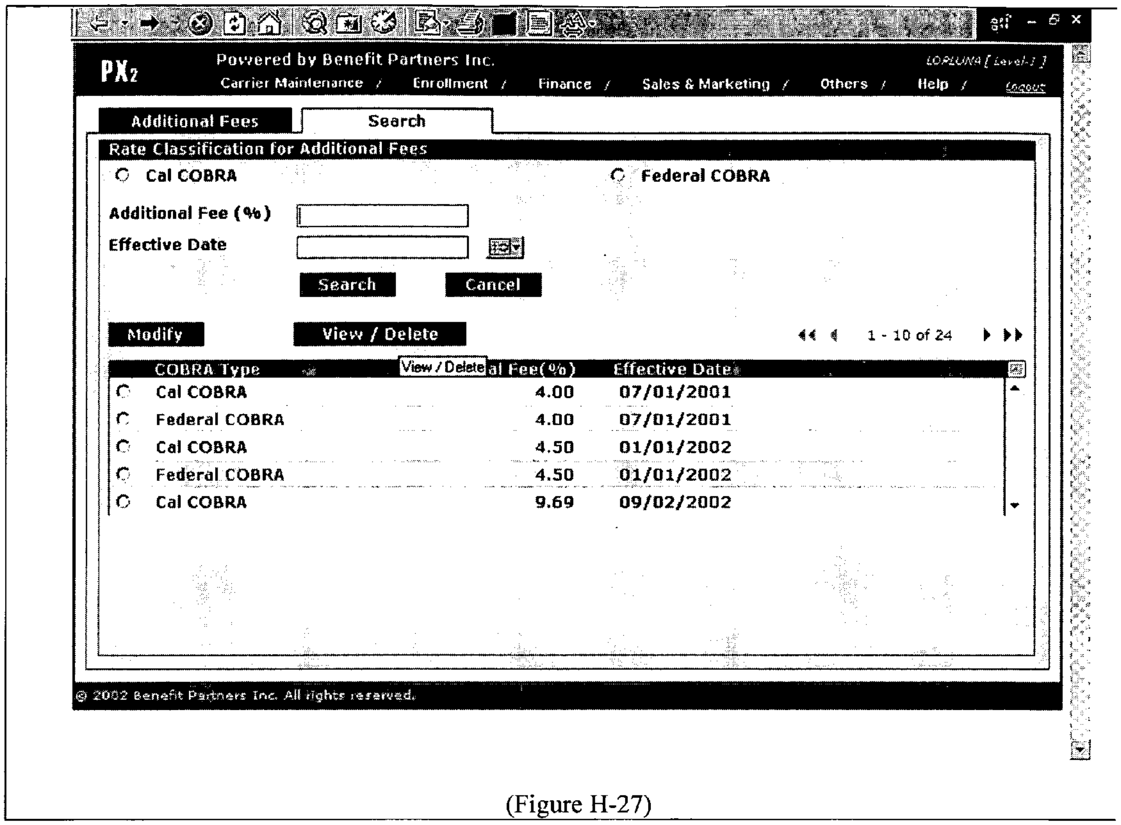
(Figure H-27)

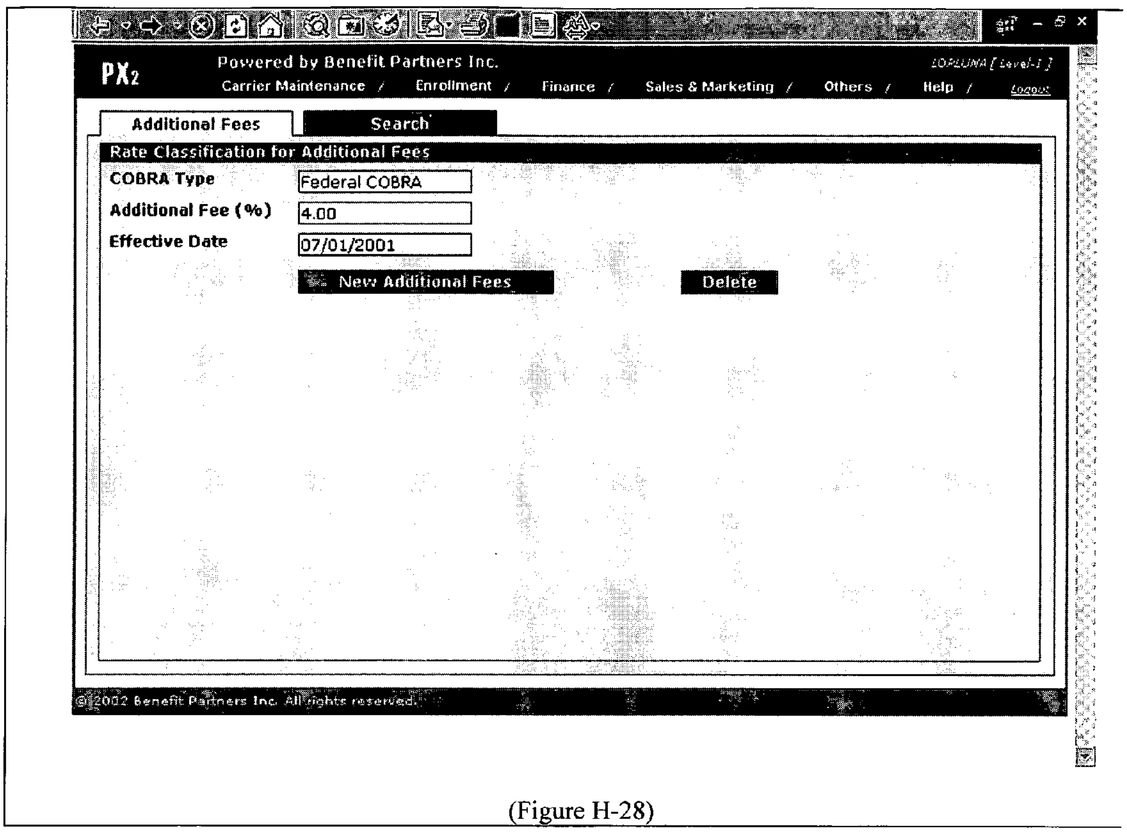
(Figure H-28)

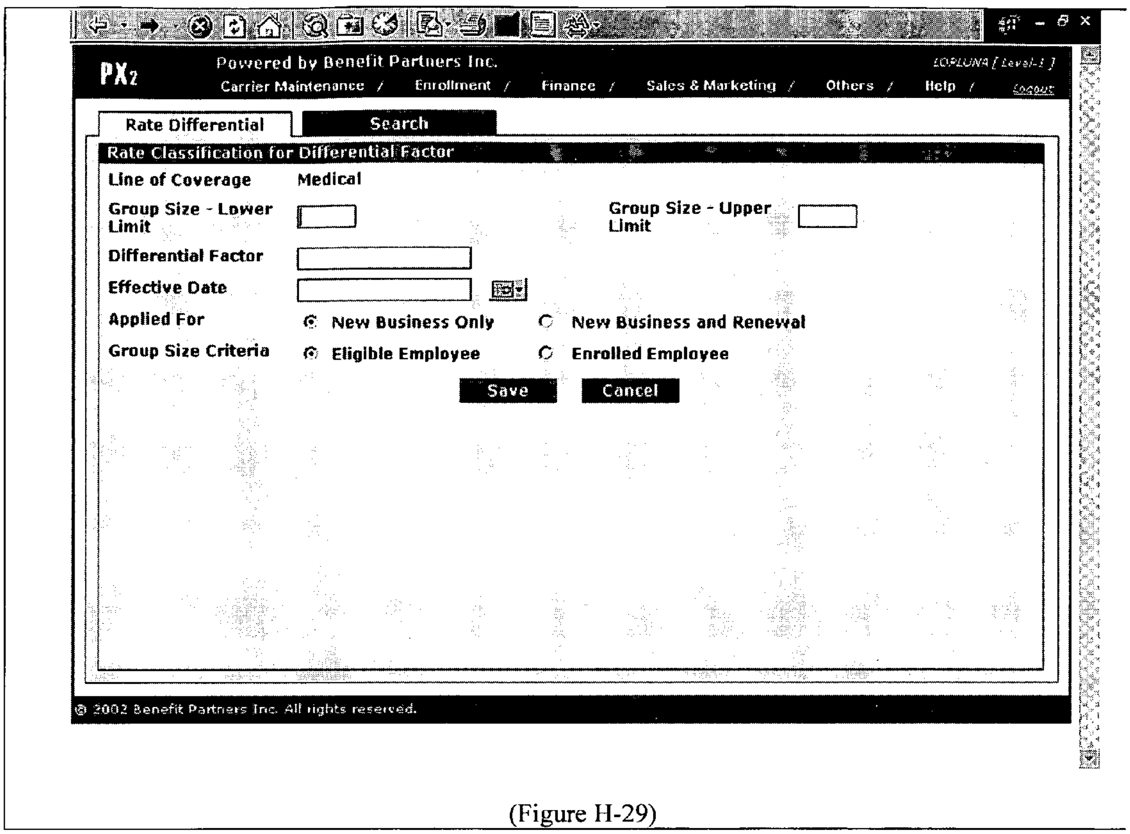
(Figure H-29)

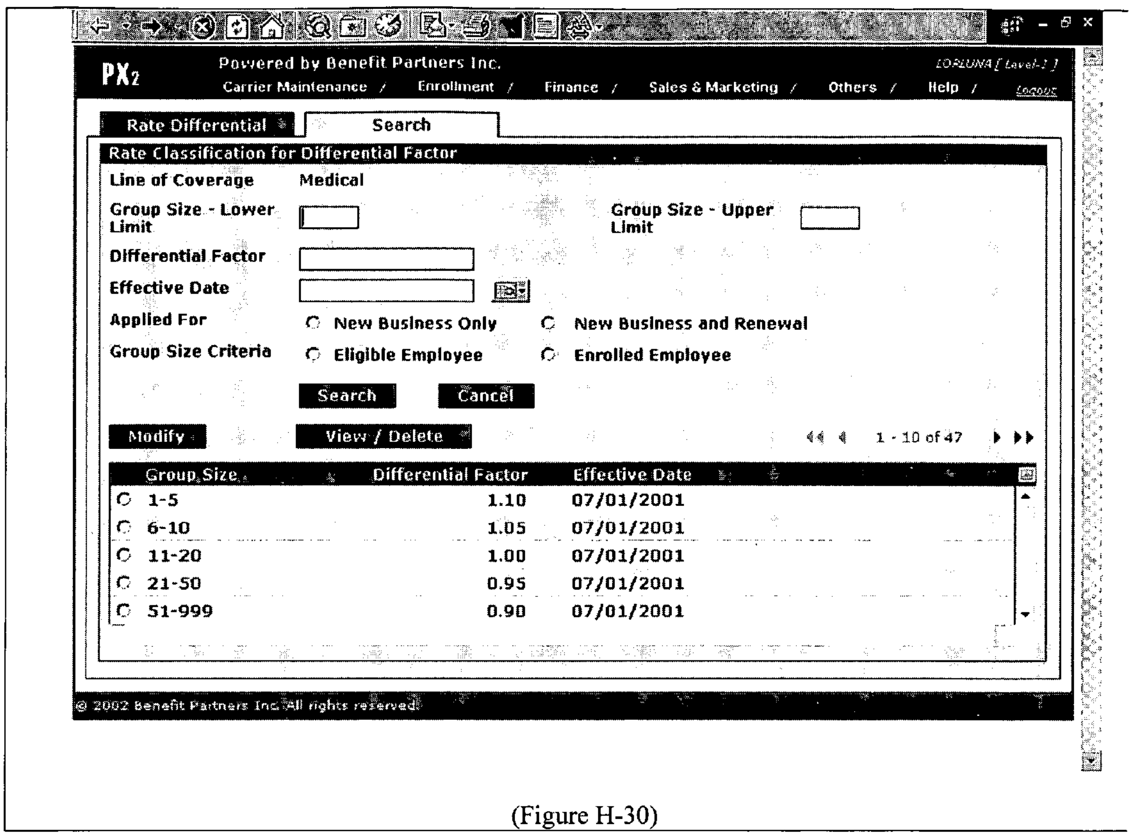
(Figure H-30)

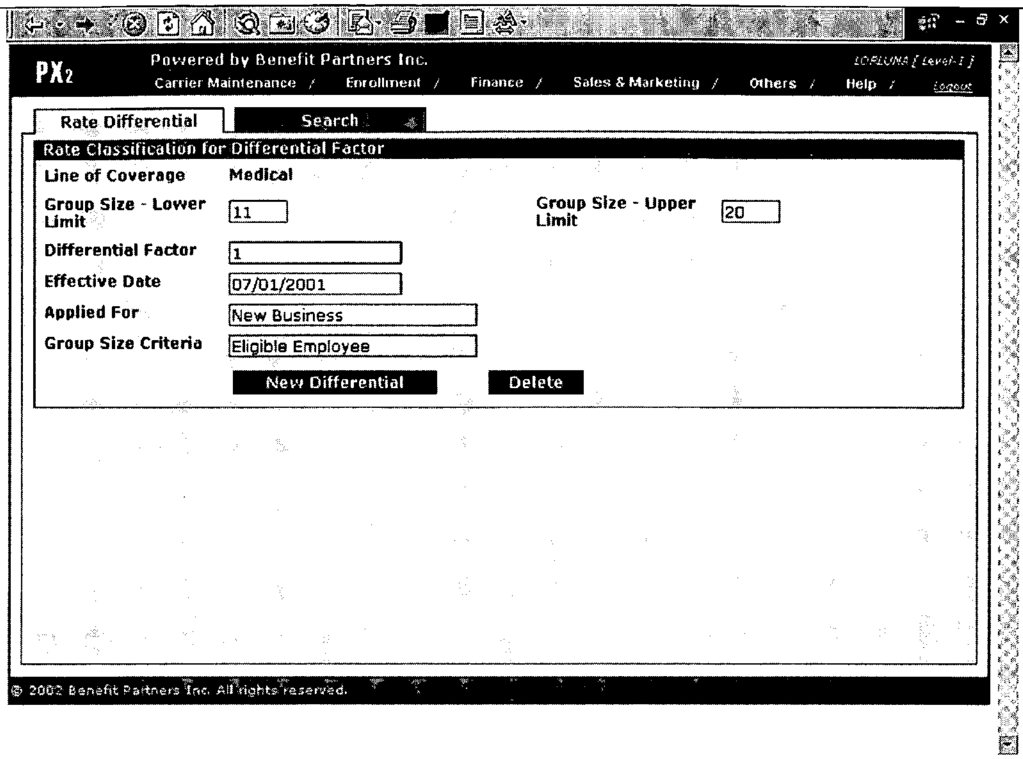
(Figure H-31)
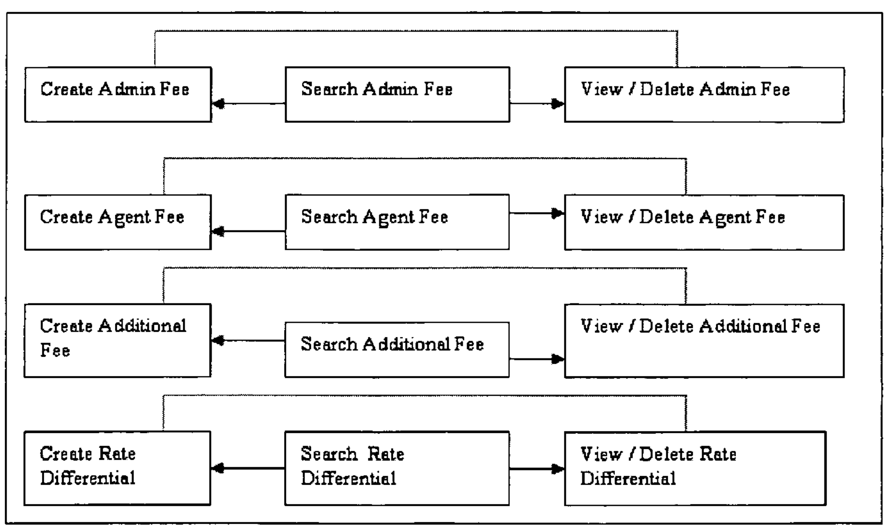
(Figure H-32)

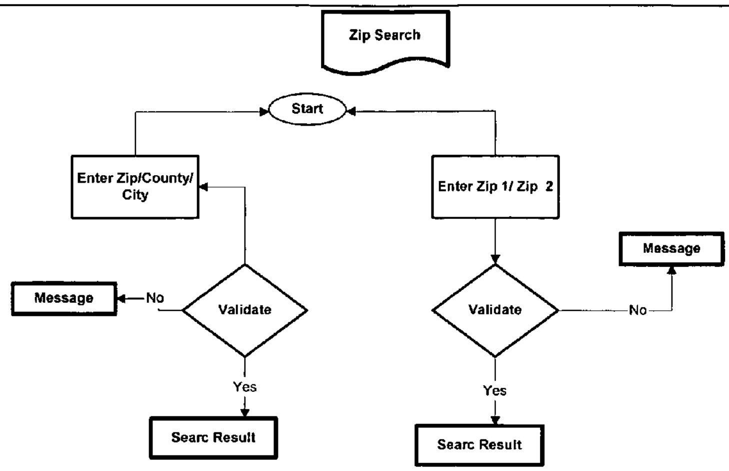
(Figure H-33)
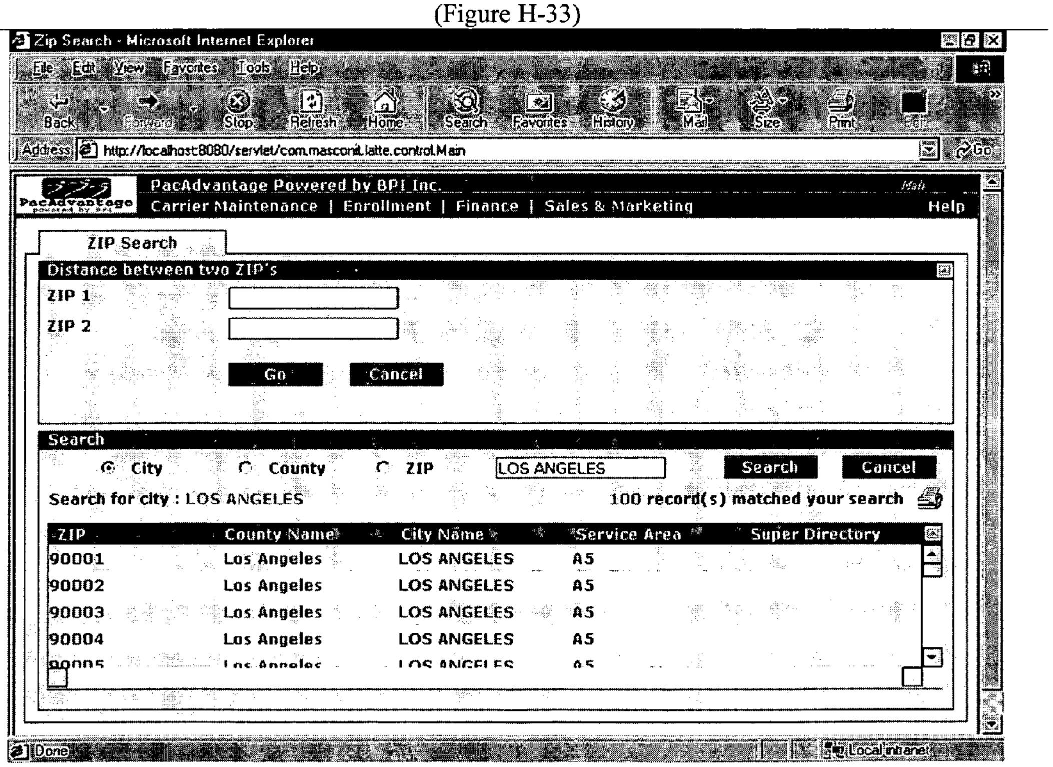
(Figure H-34)

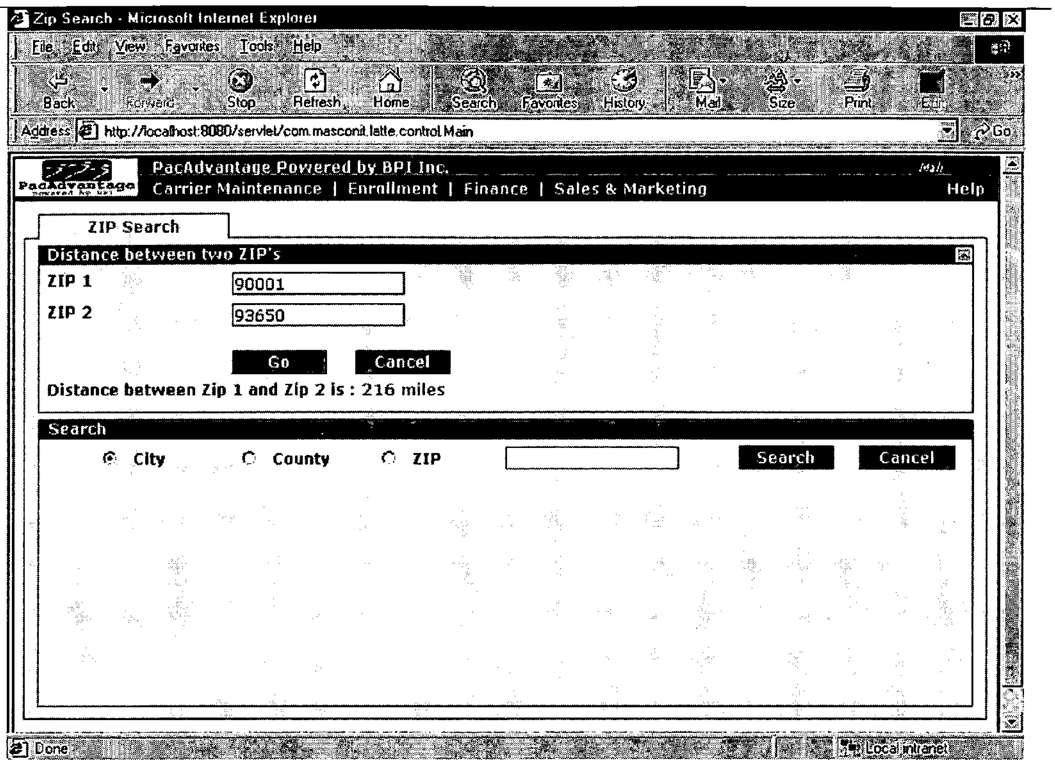
(Figure H-35)
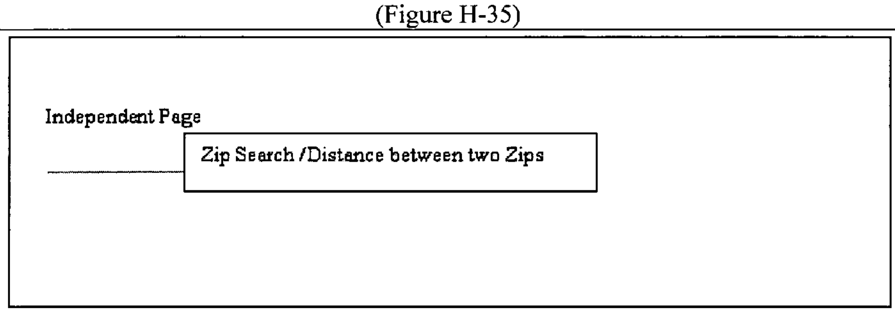
(Figure H-36)

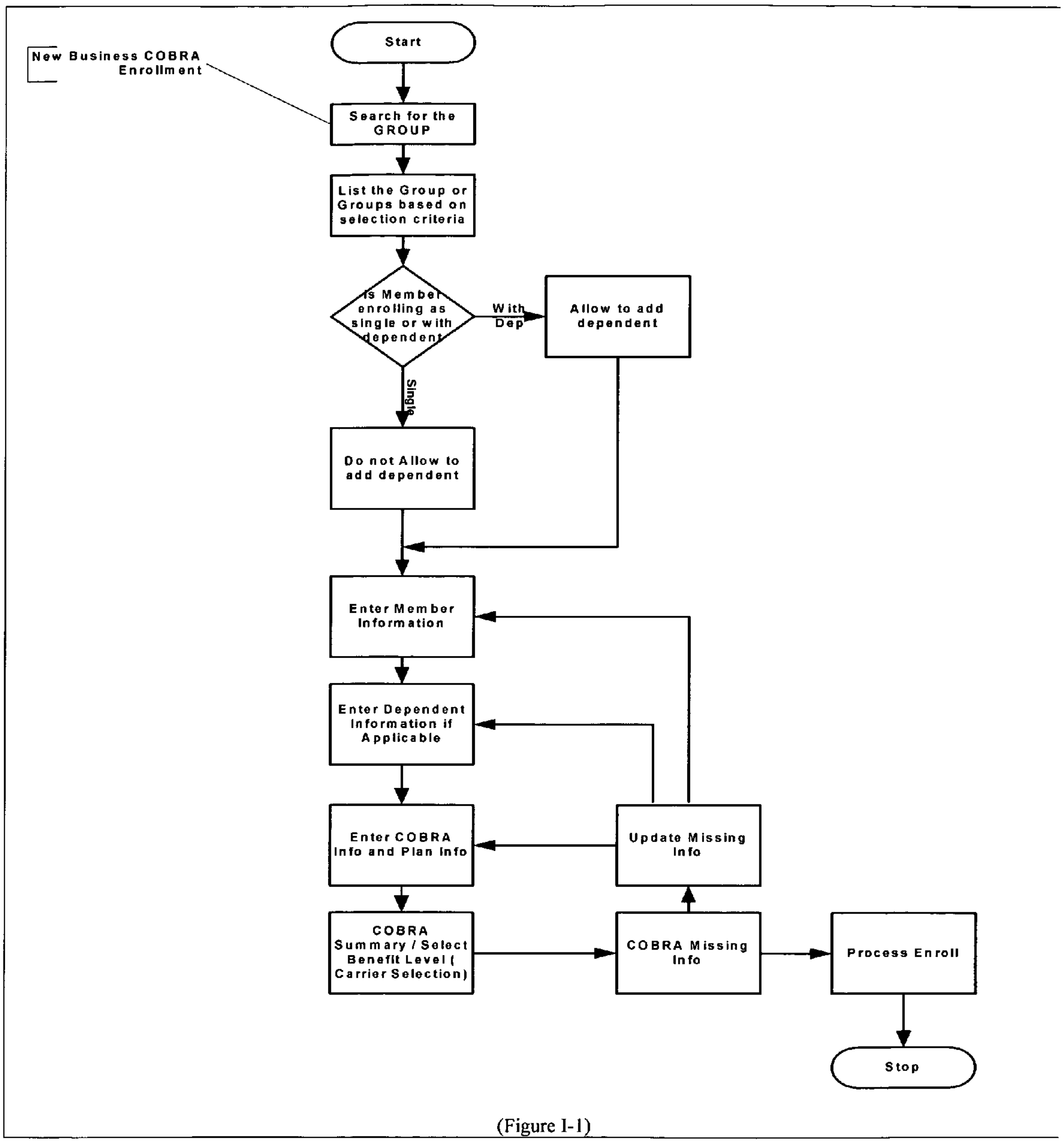
(Figure I-1)

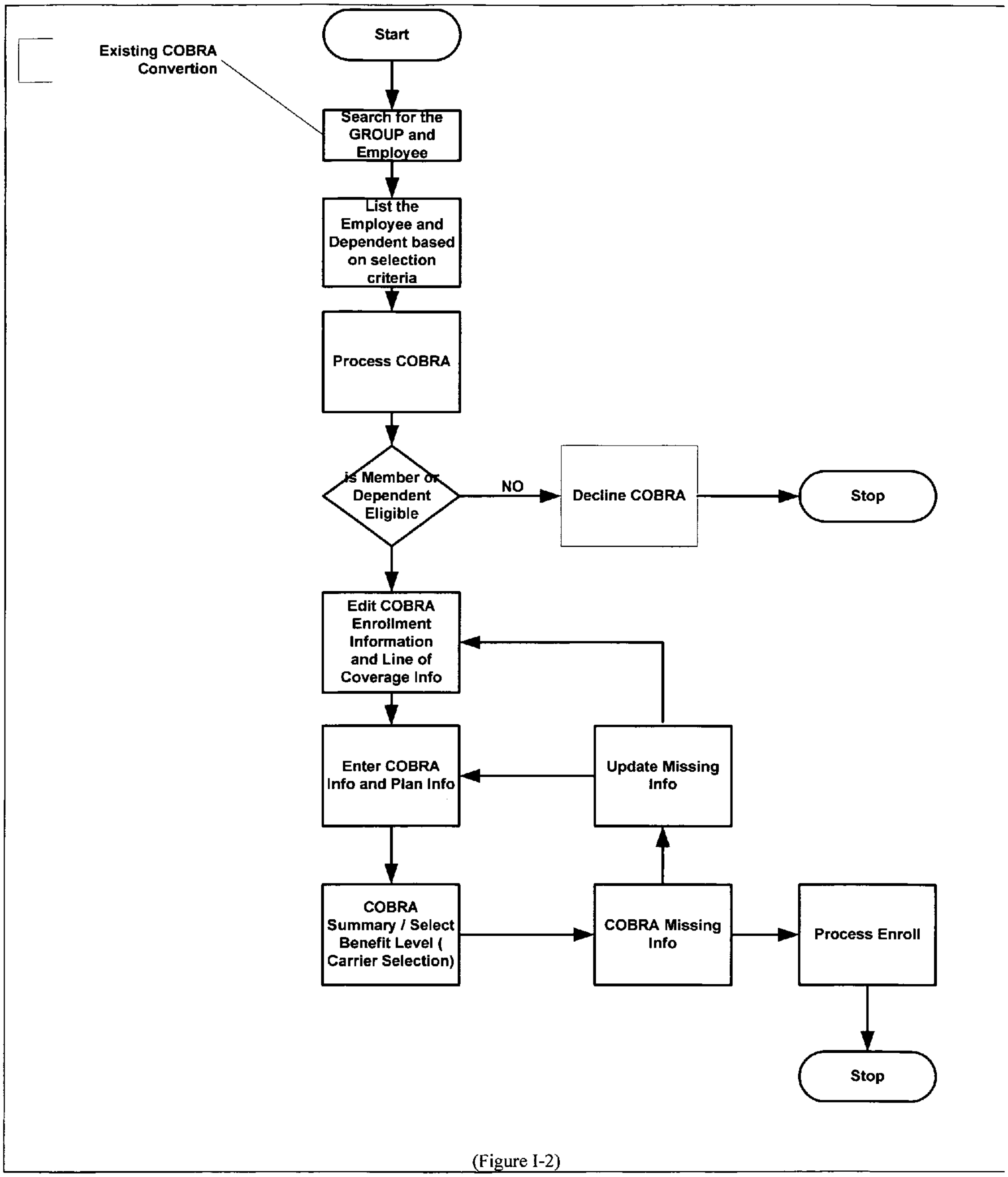
(Figure I-2)

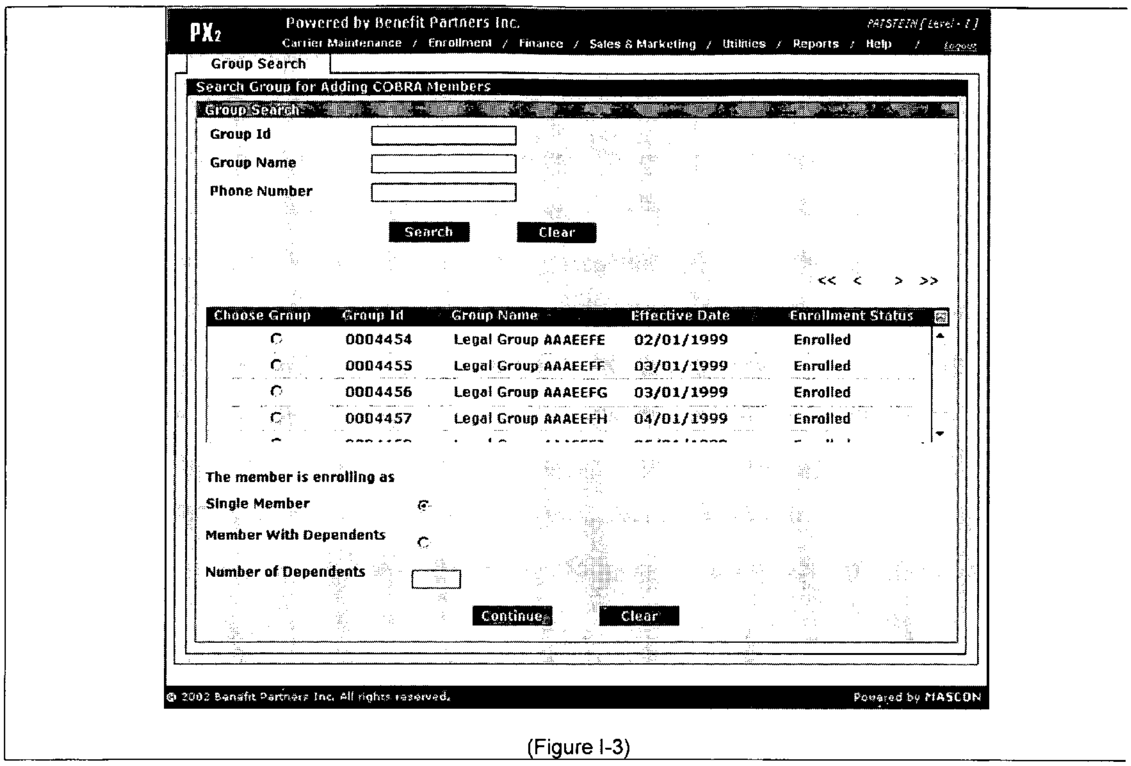
(Figure I-3)

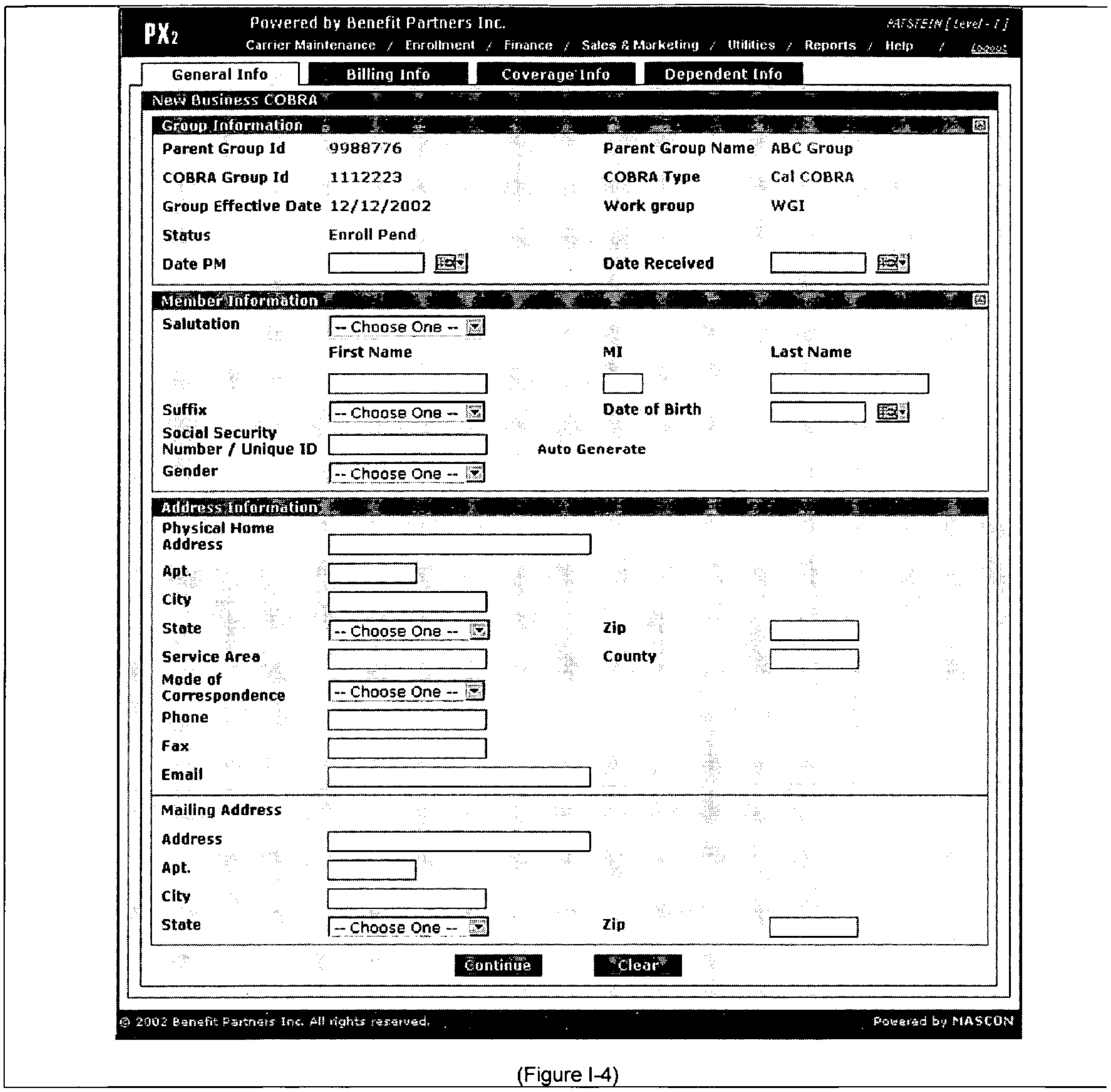
(Figure I-4)

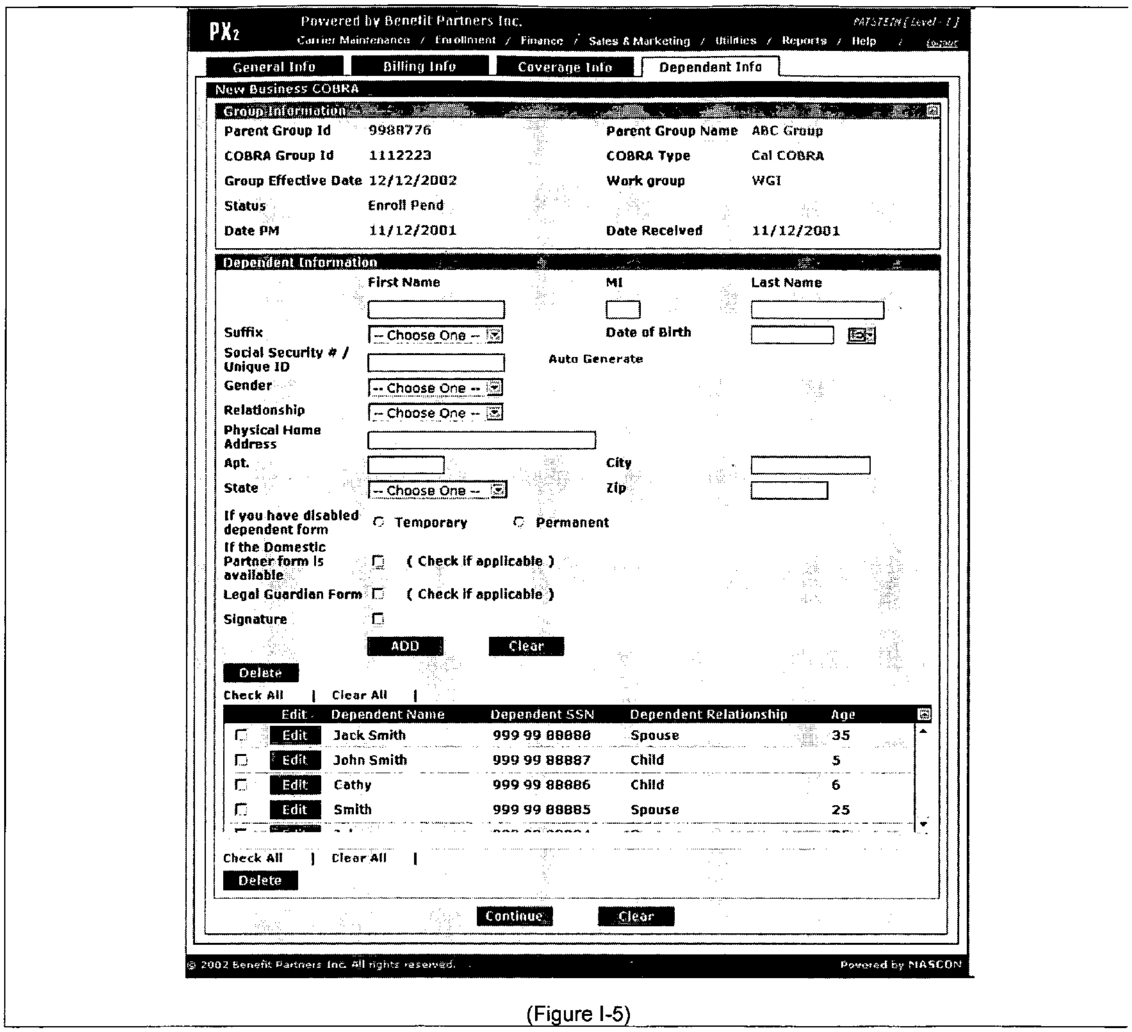
(Figure I-5)

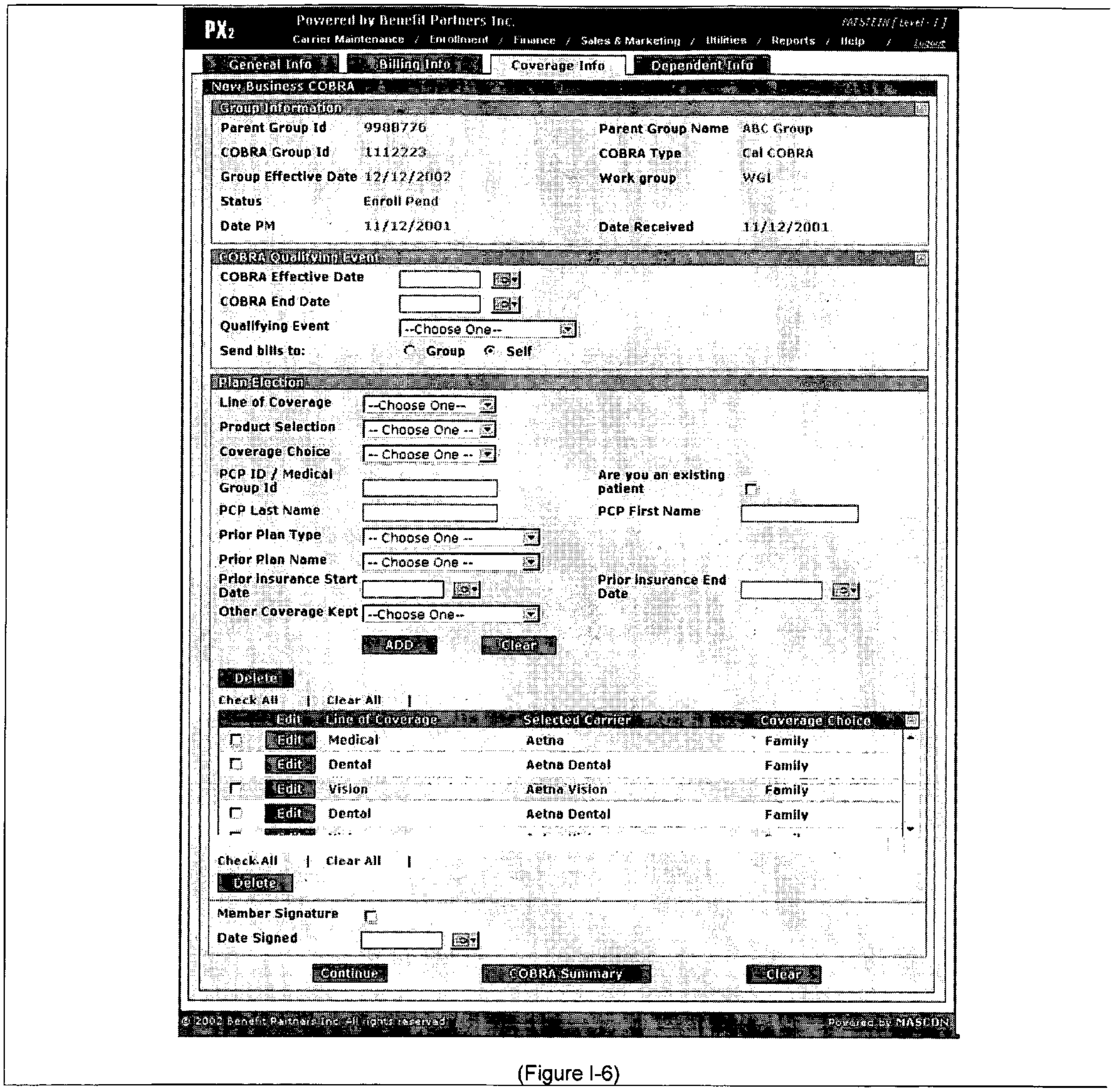
(Figure I-6)

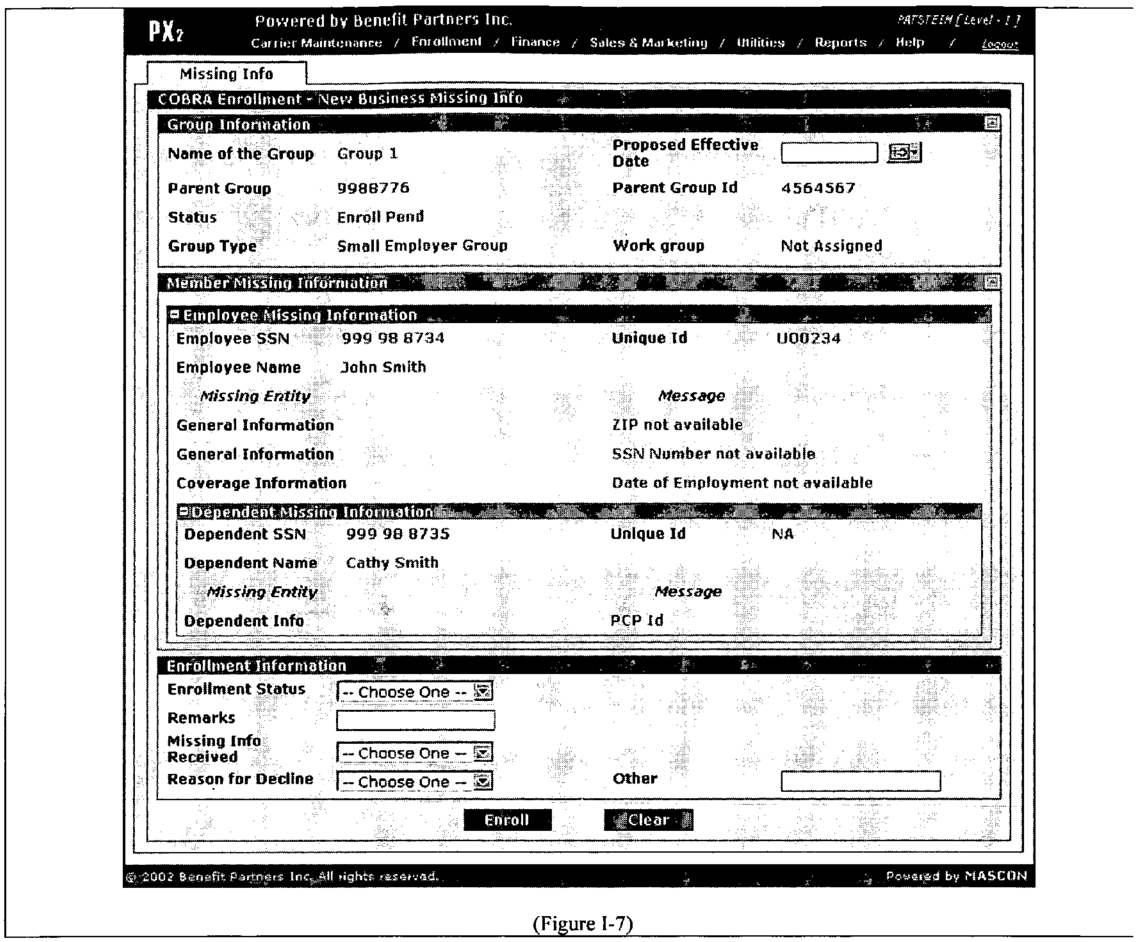
(Figure I-7)

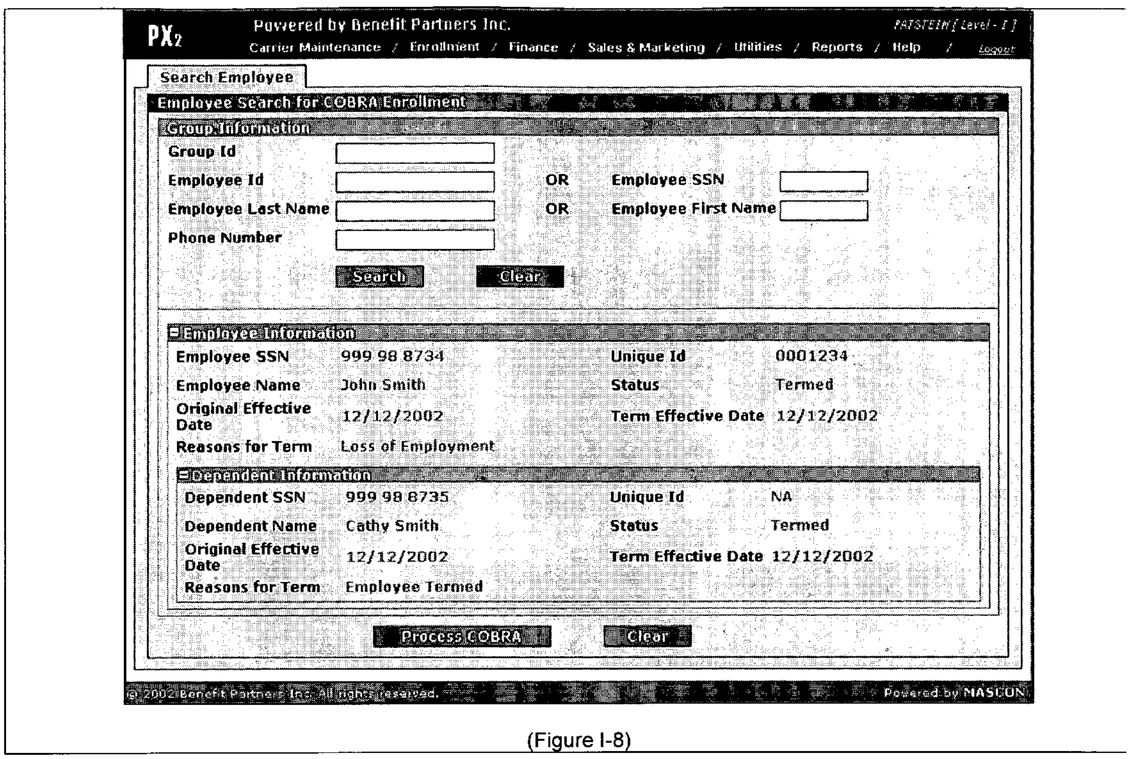
(Figure I-8)

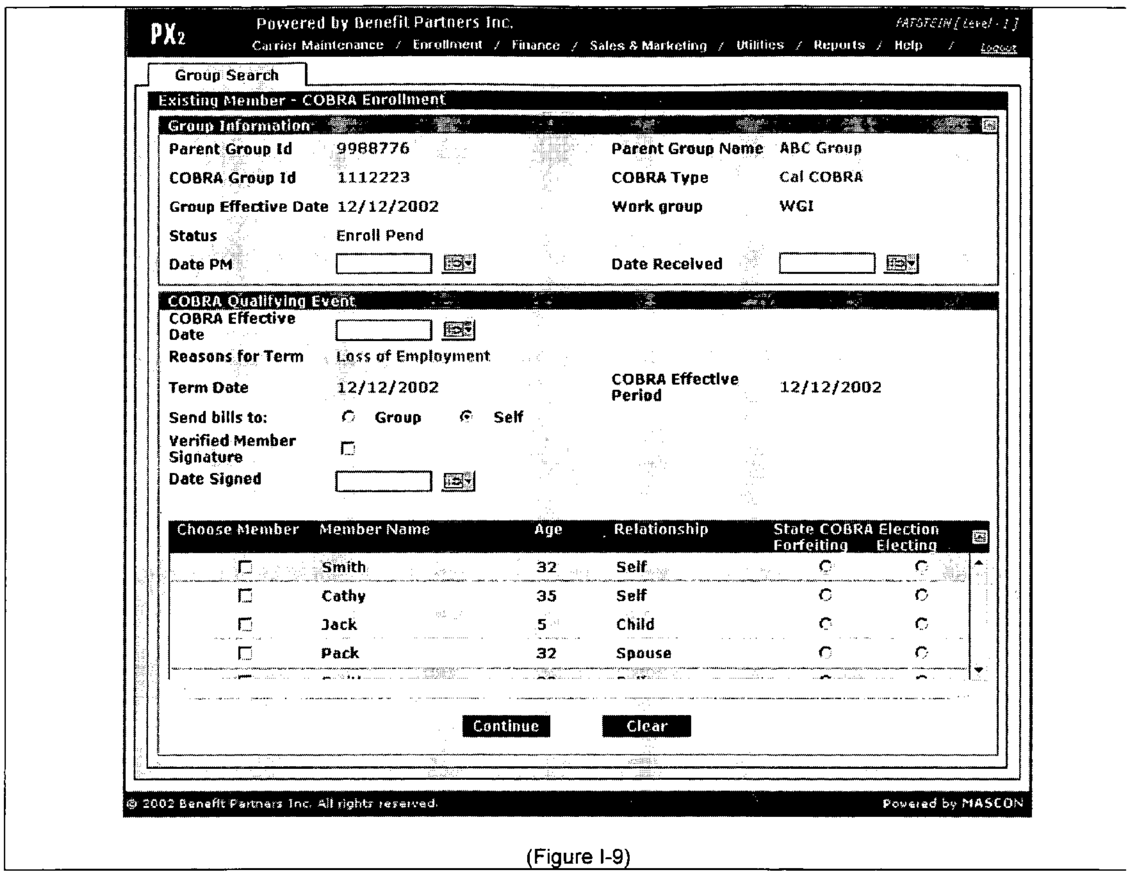
(Figure I-9)

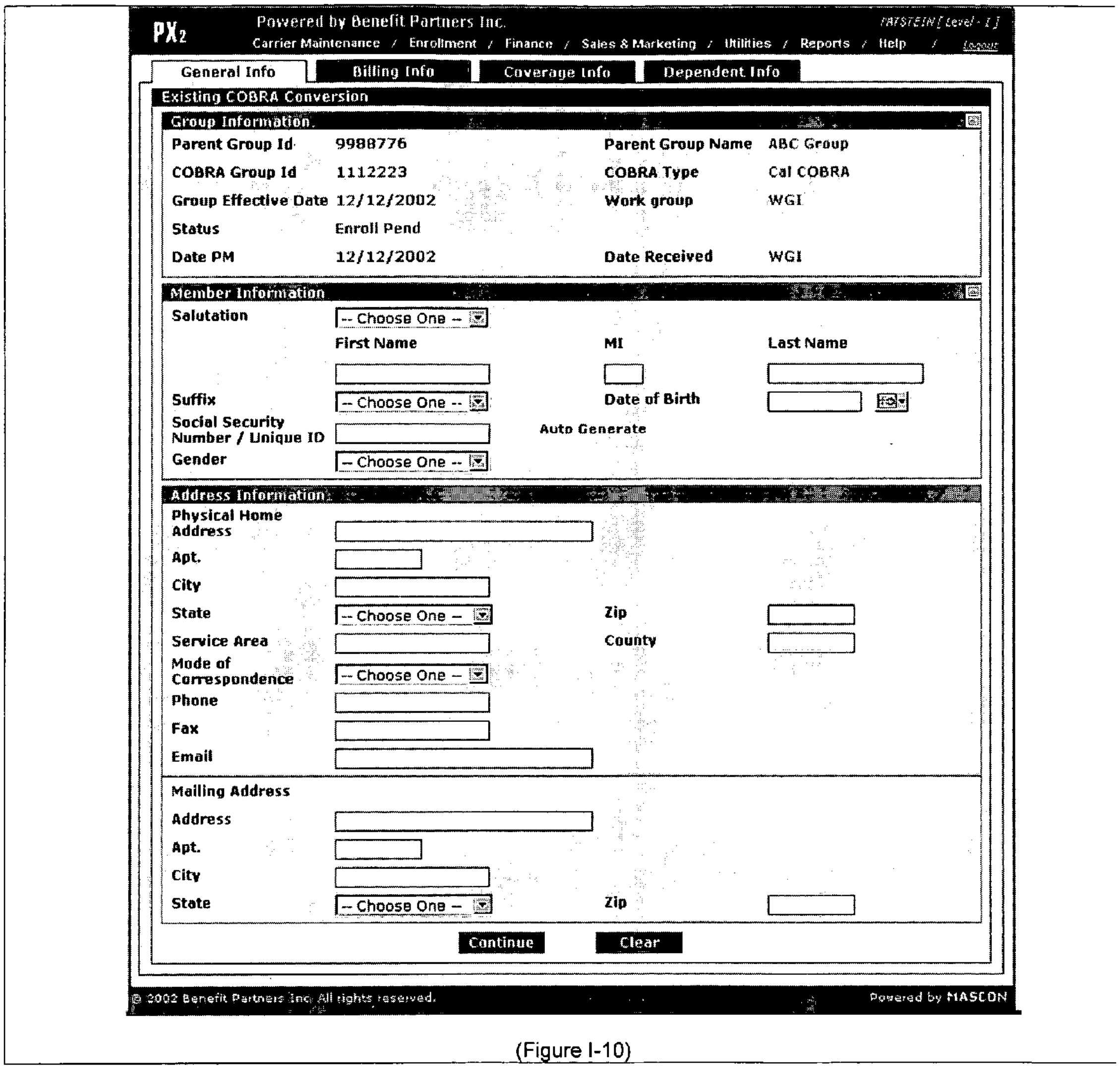
(Figure I-10)

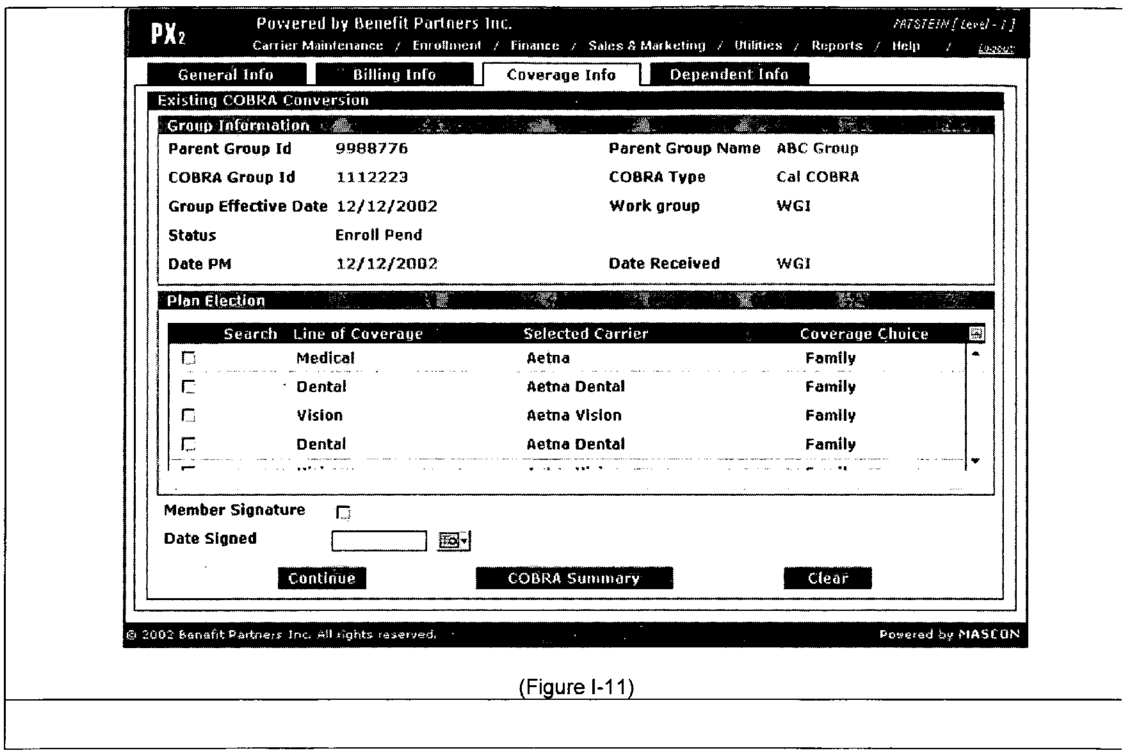
(Figure I-11)

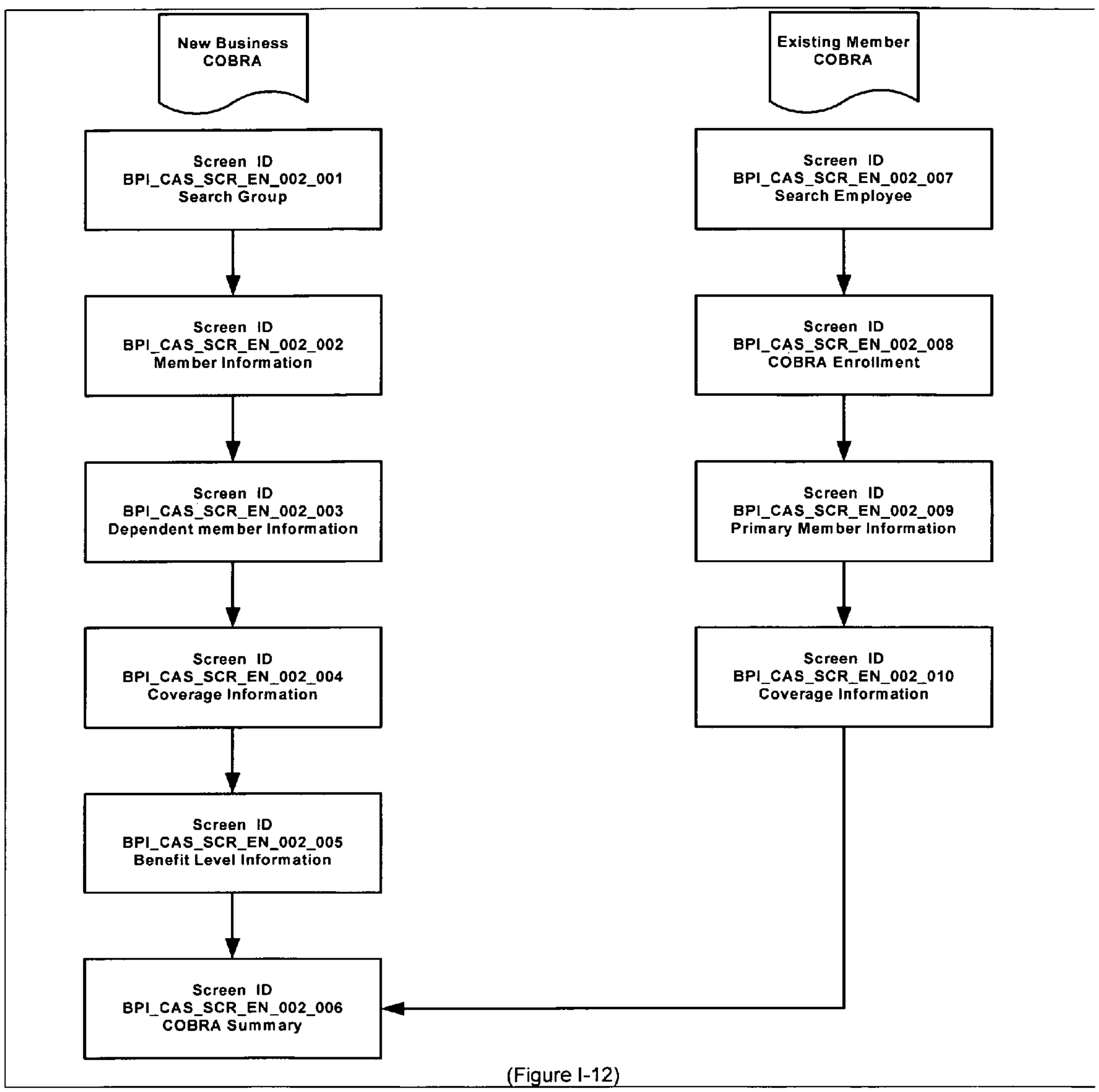
(Figure I-12)

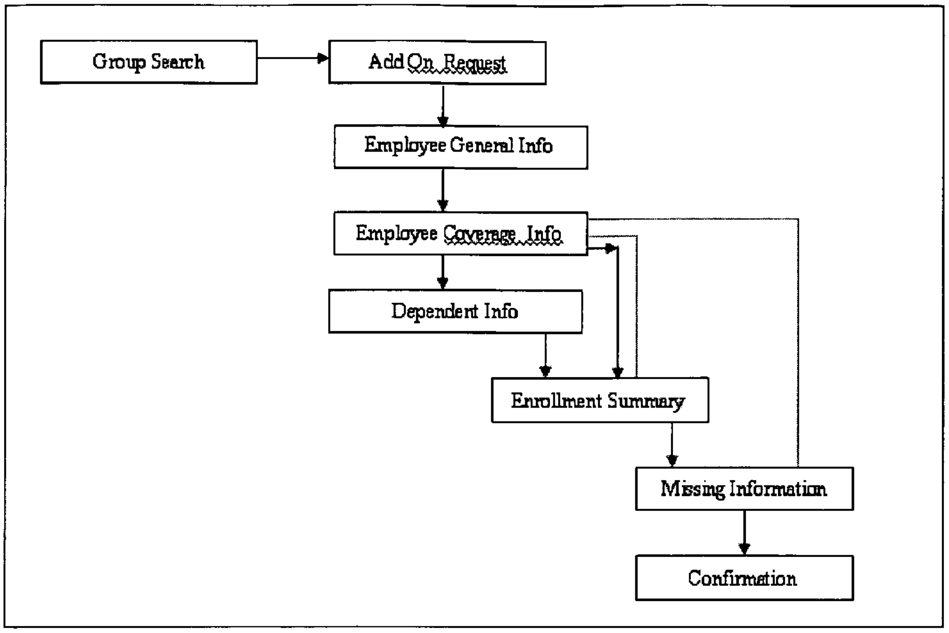
(Figure I-13)
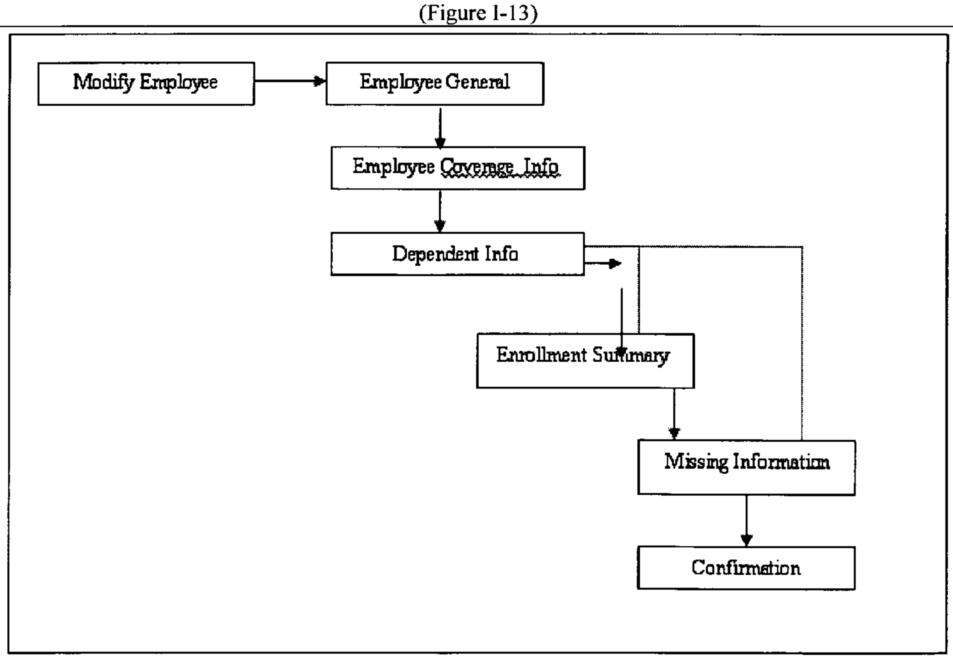
(Figure I-14)

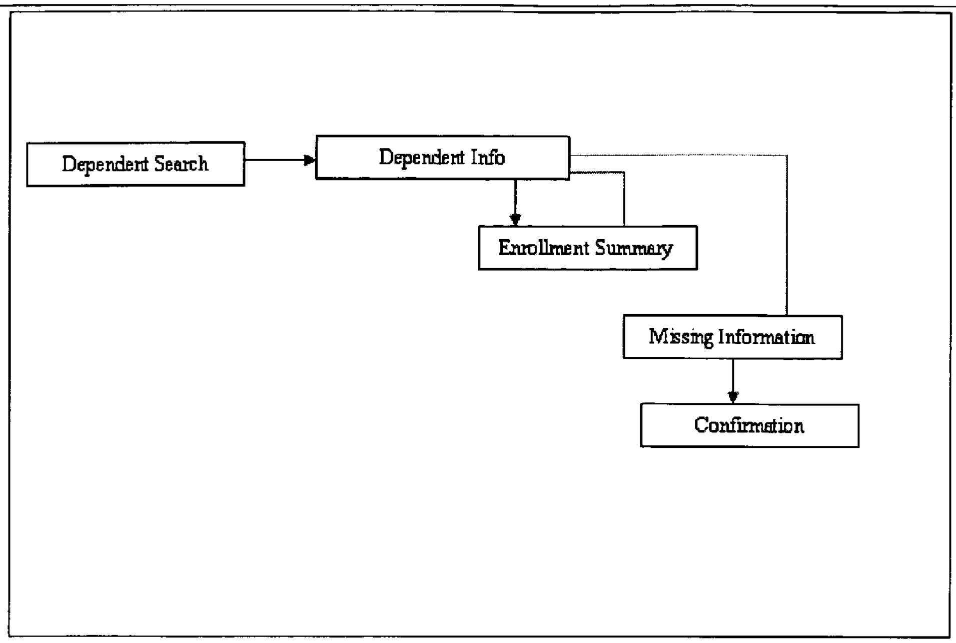
(Figure I-15)
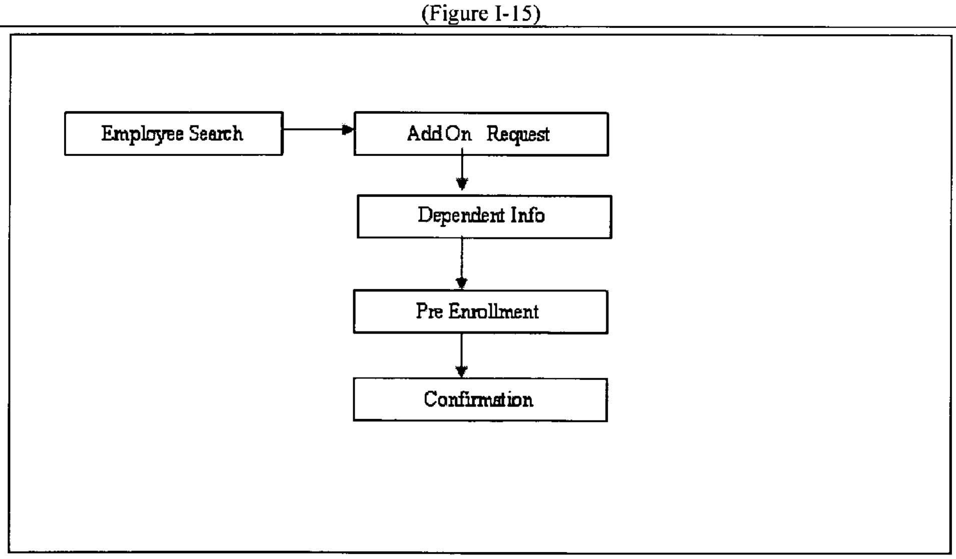
(Figure I-16)

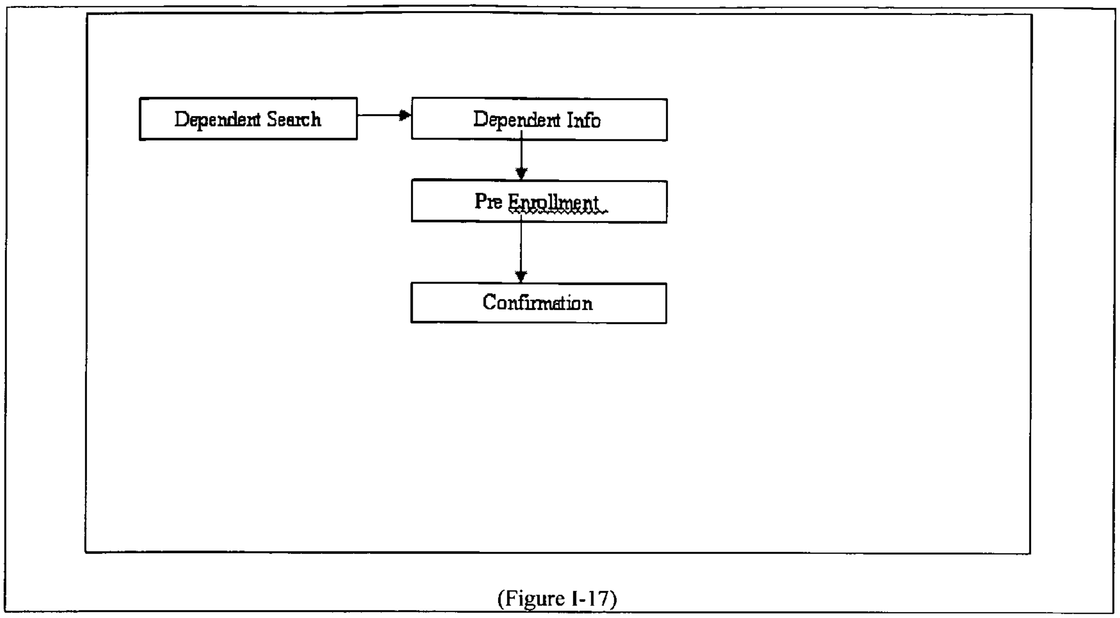
(Figure I-17)

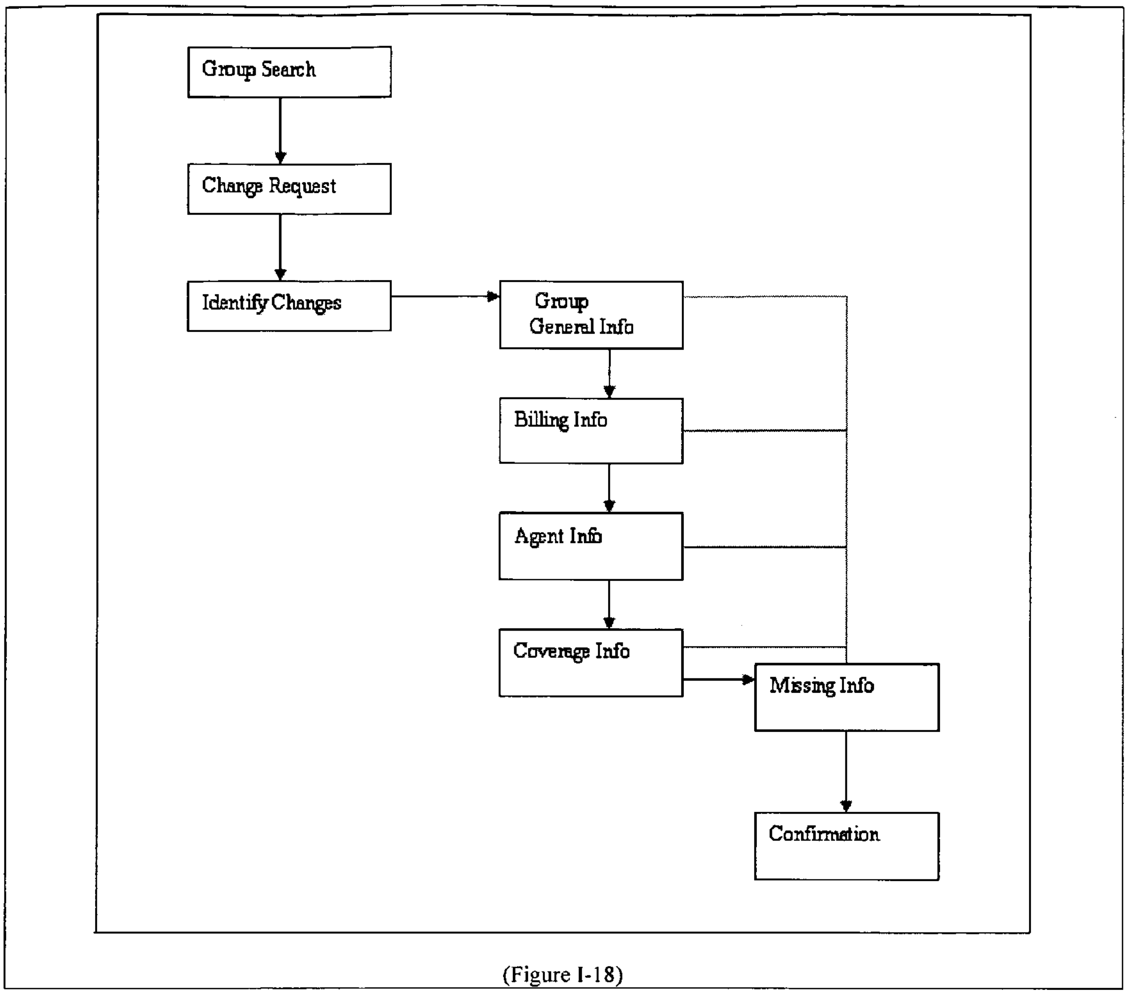
(Figure I-18)

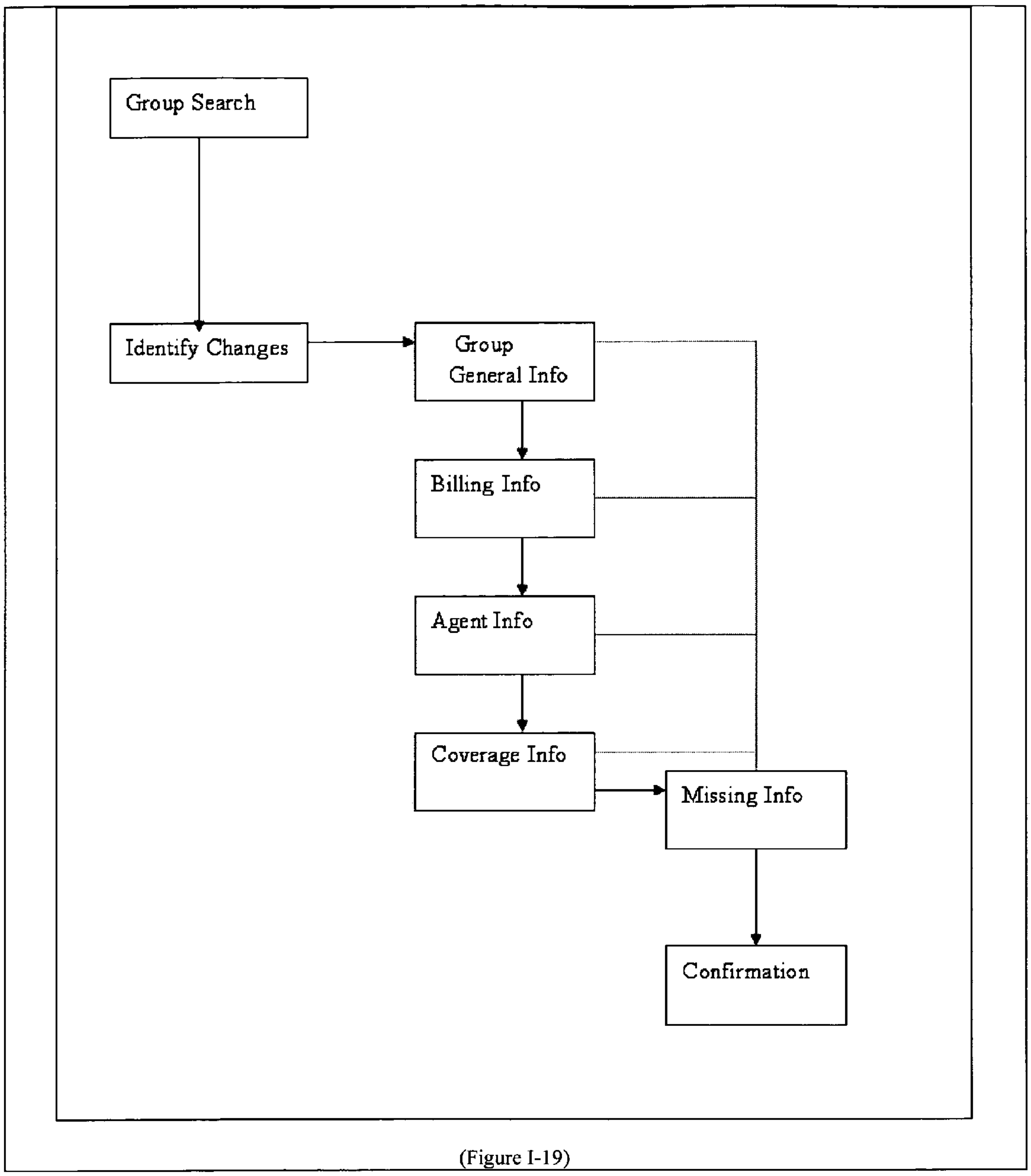
(Figure I-19)

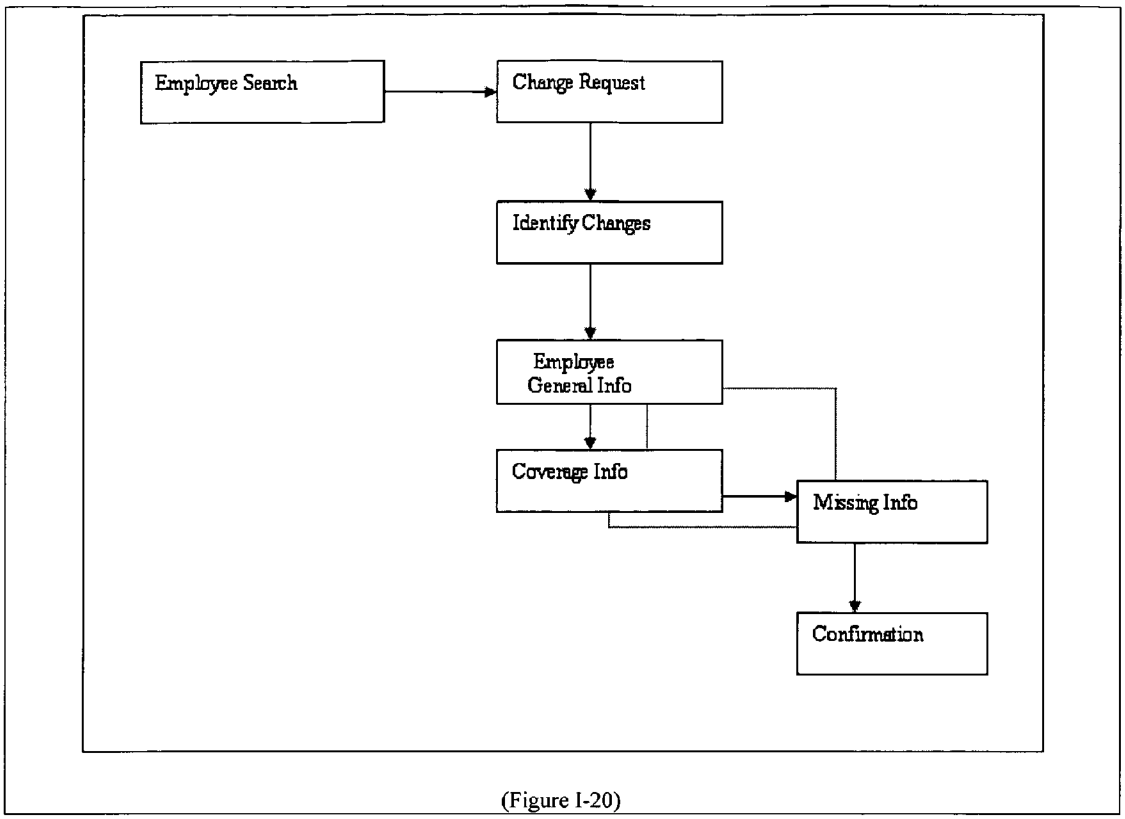
(Figure I-20)

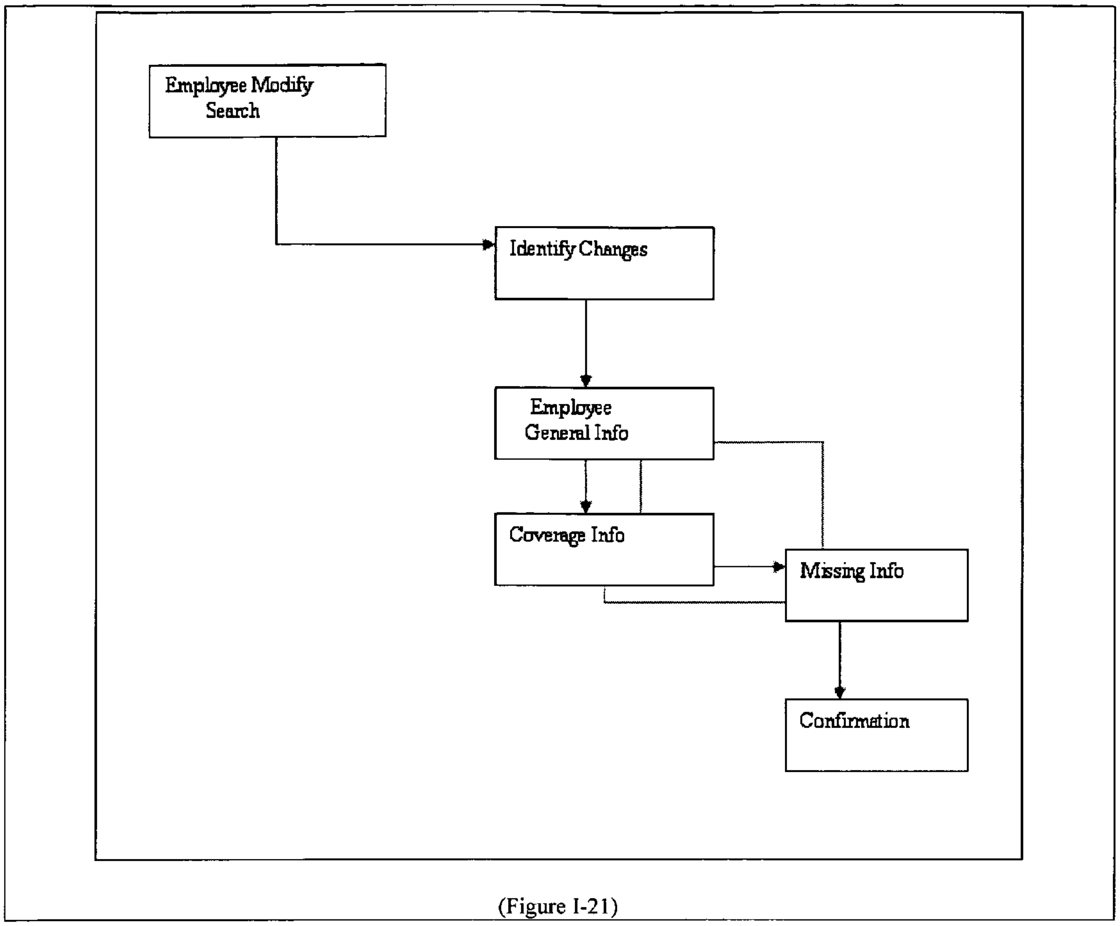
(Figure I-21)

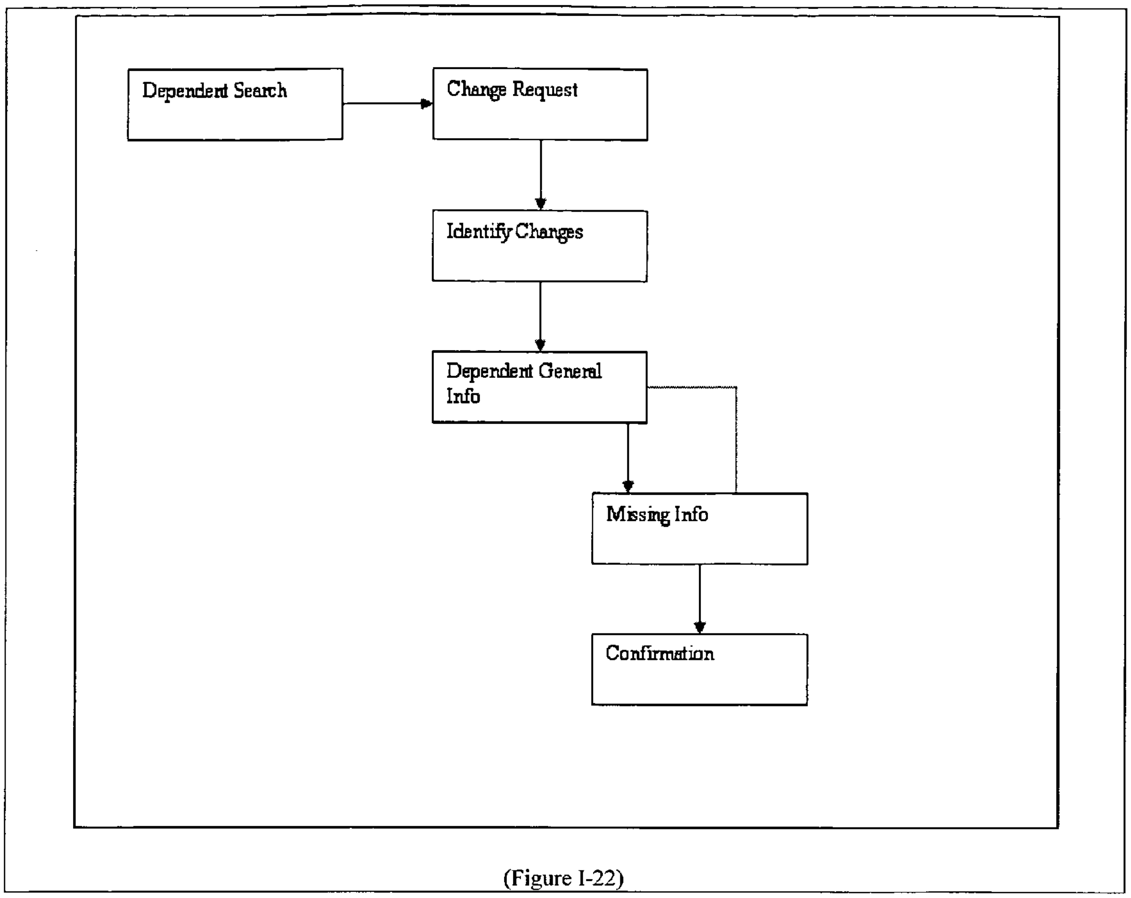
(Figure I-22)

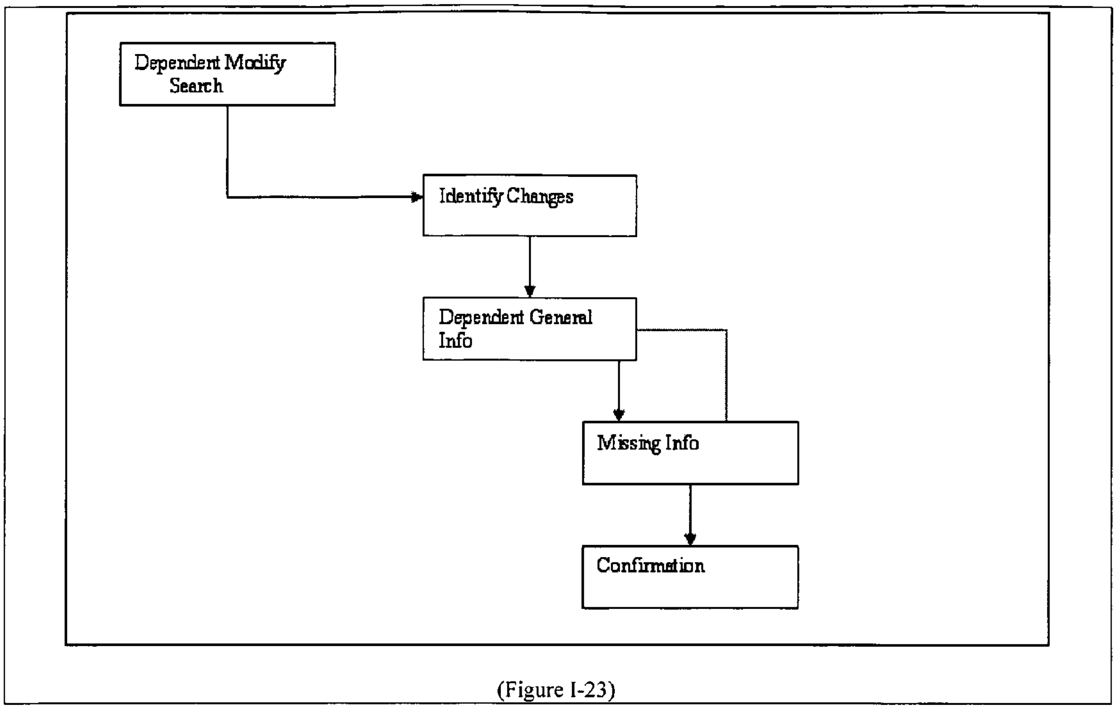
(Figure I-23)

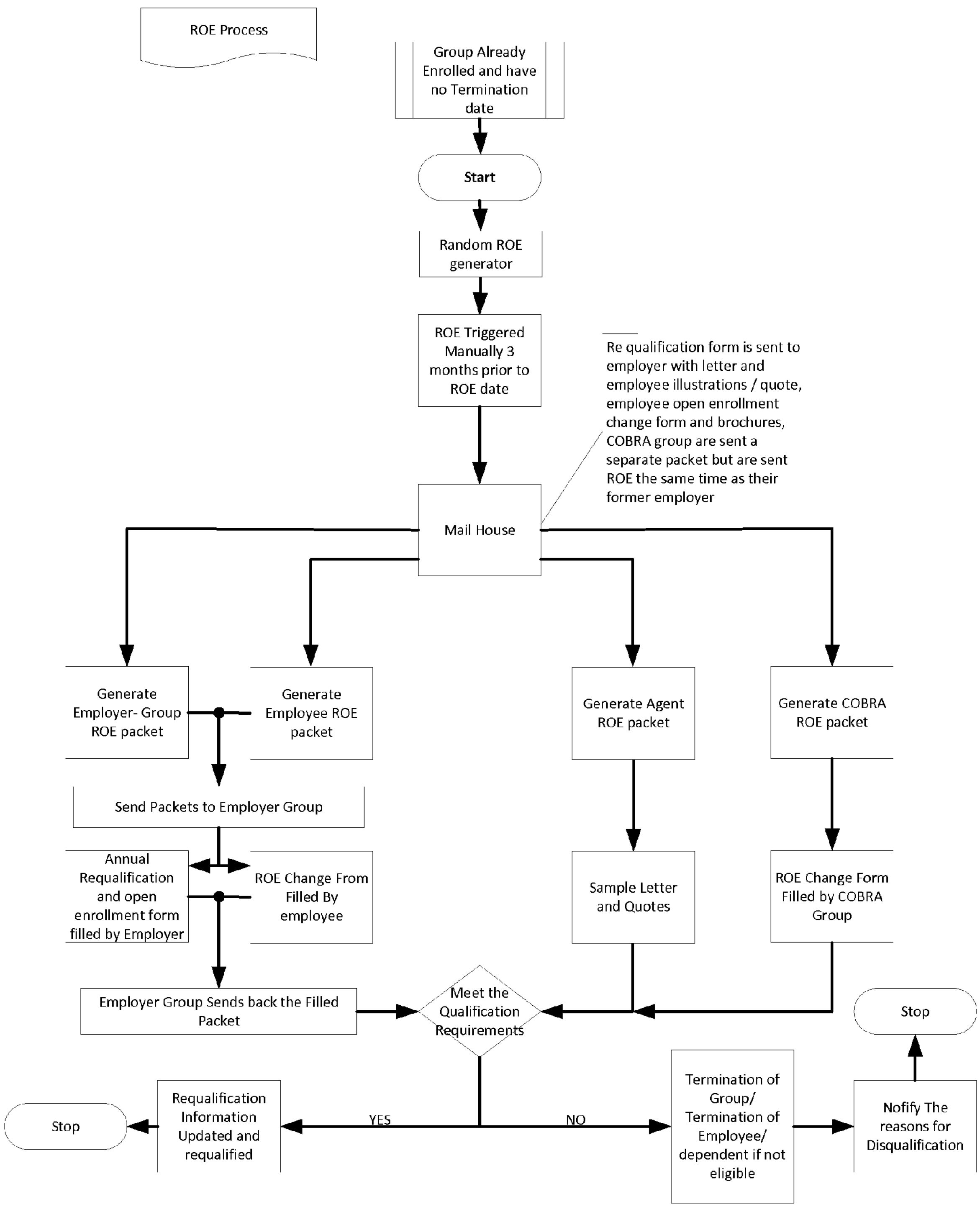
(Figure I-24)

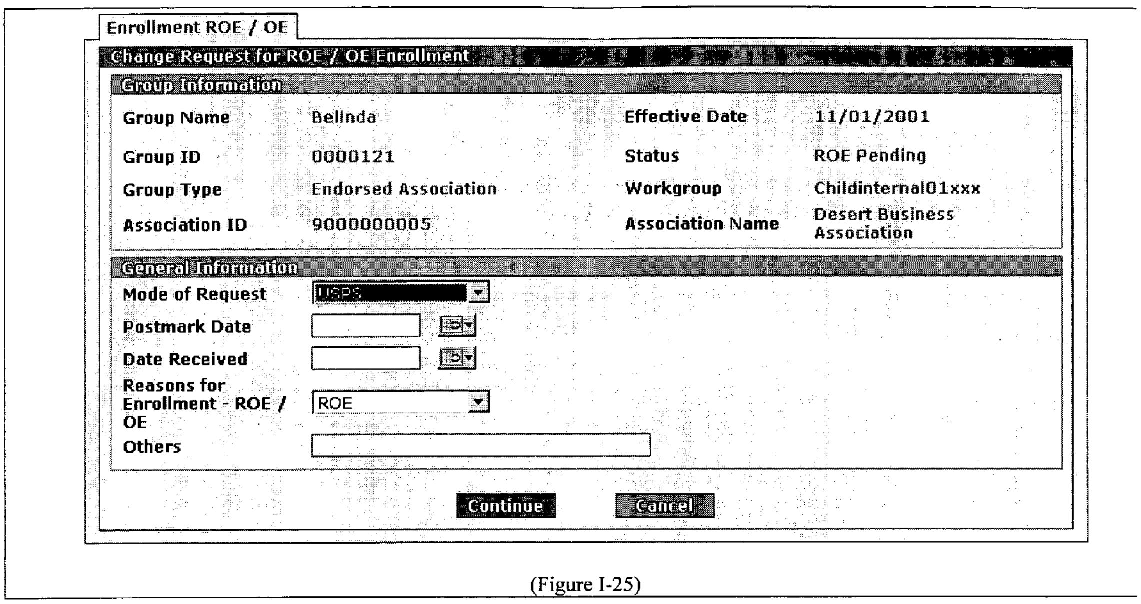
(Figure I-25)

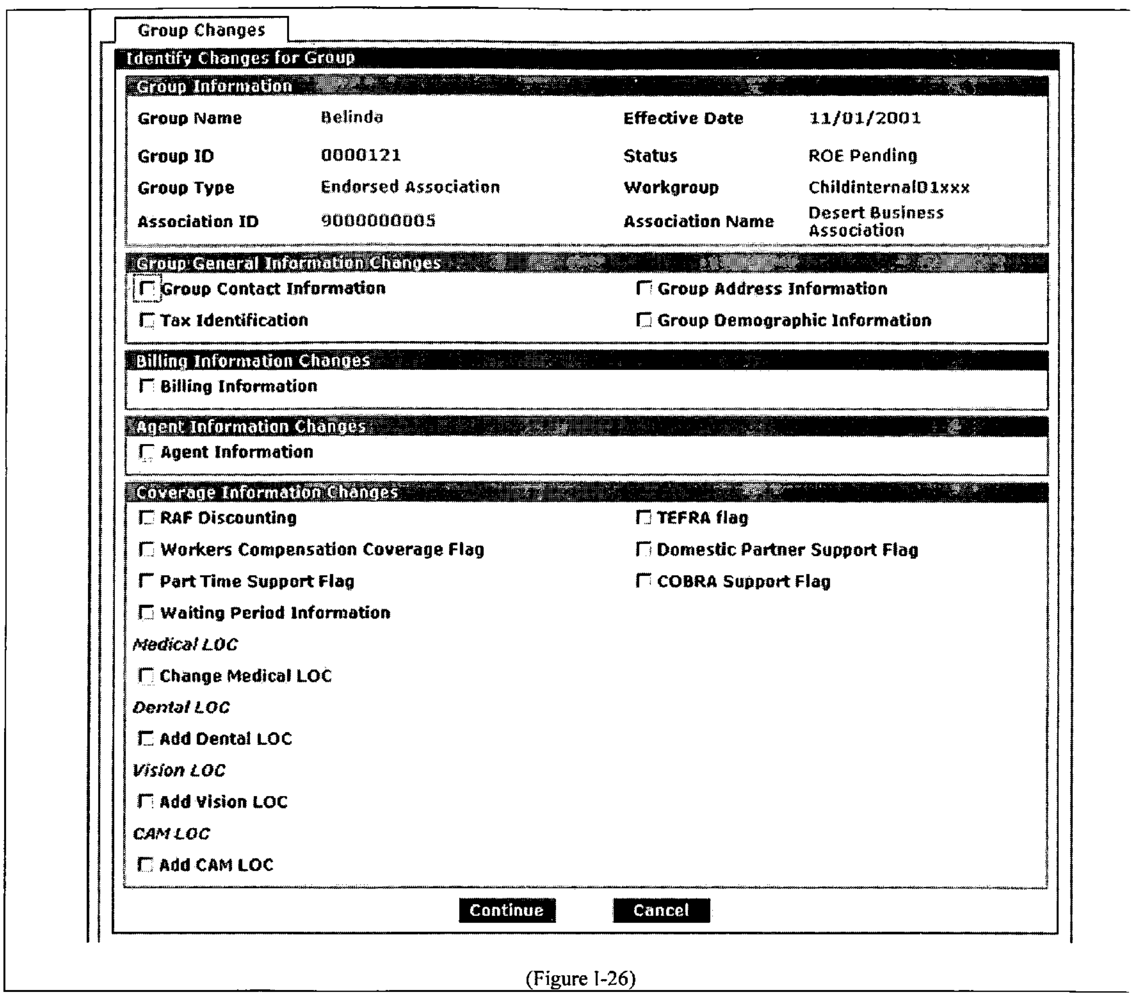
(Figure I-26)

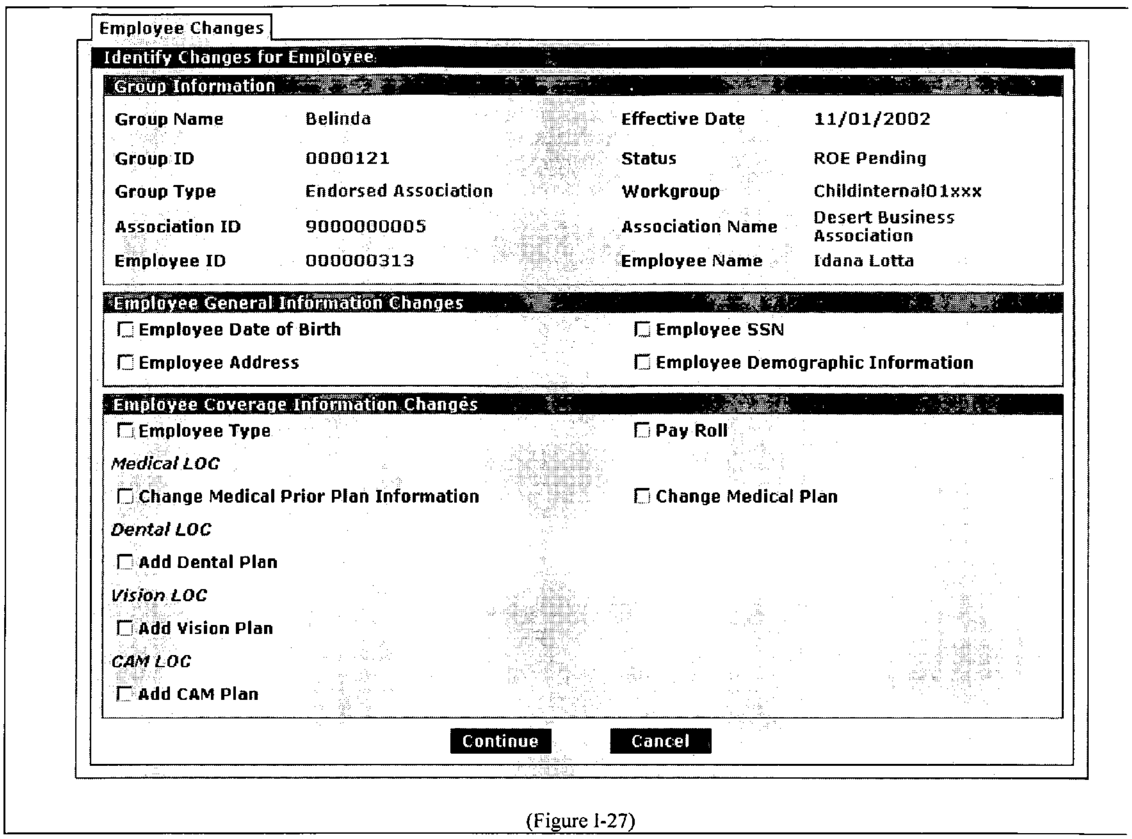
(Figure I-27)

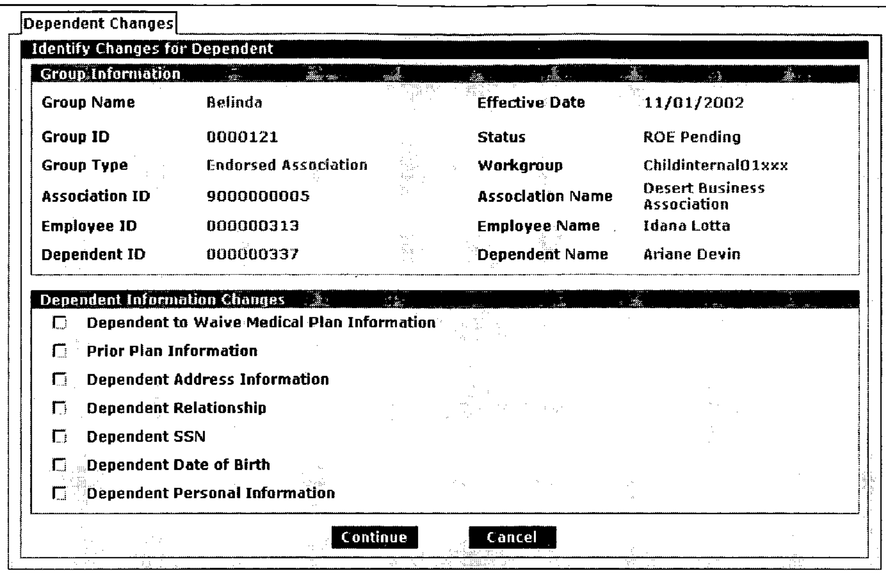
(Figure I-28)
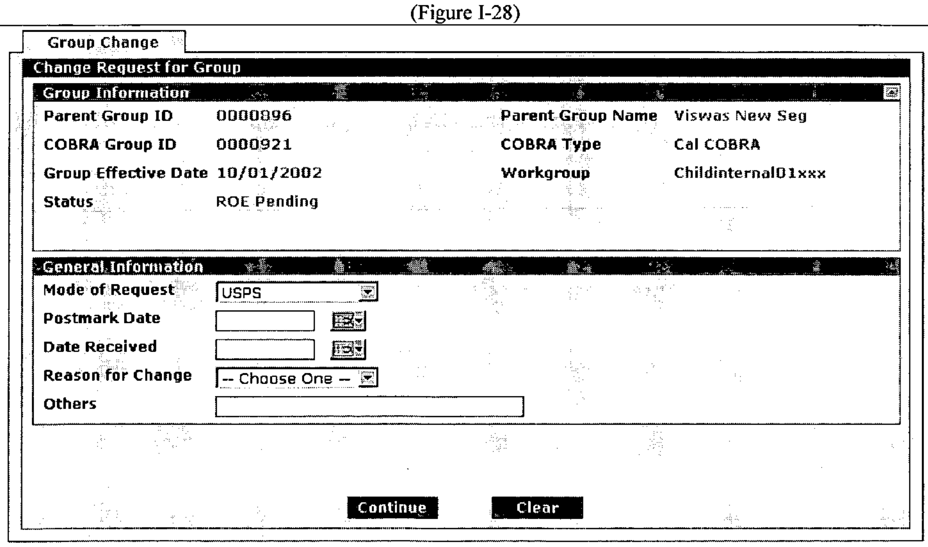
(Figure I-29)

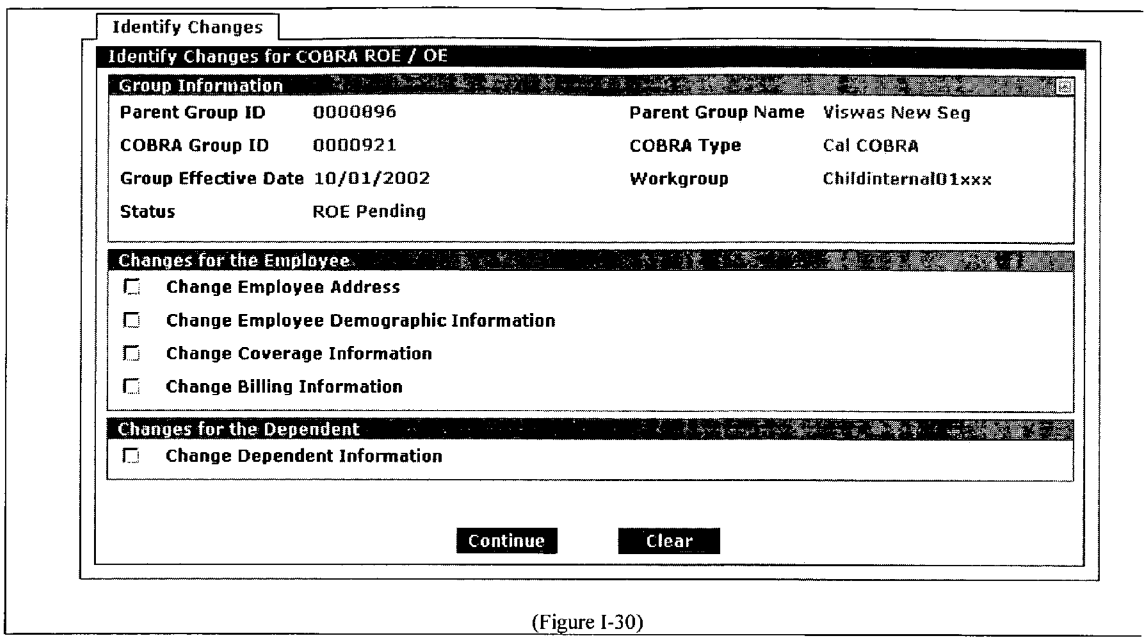
(Figure I-30)

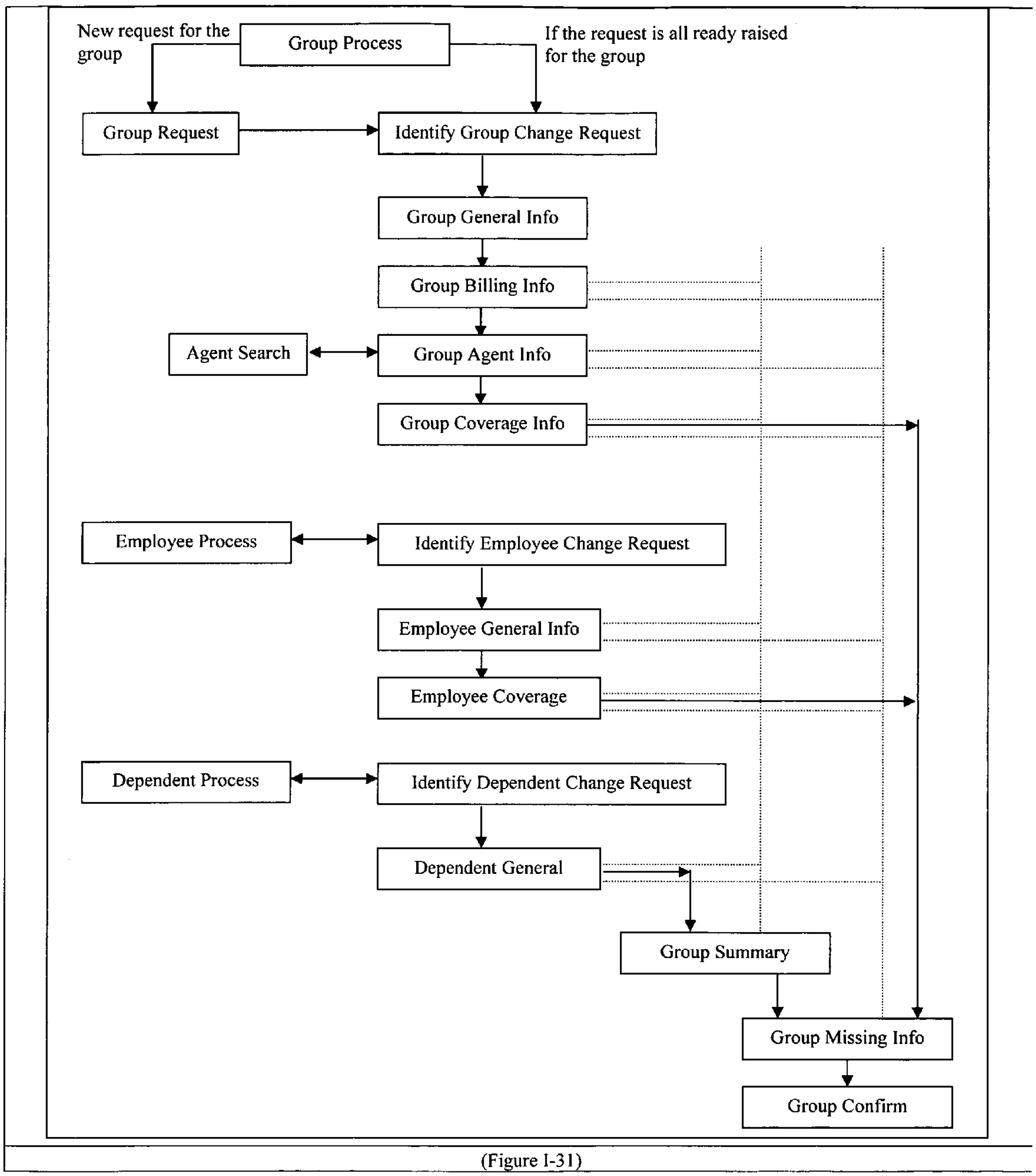
(Figure I-31)

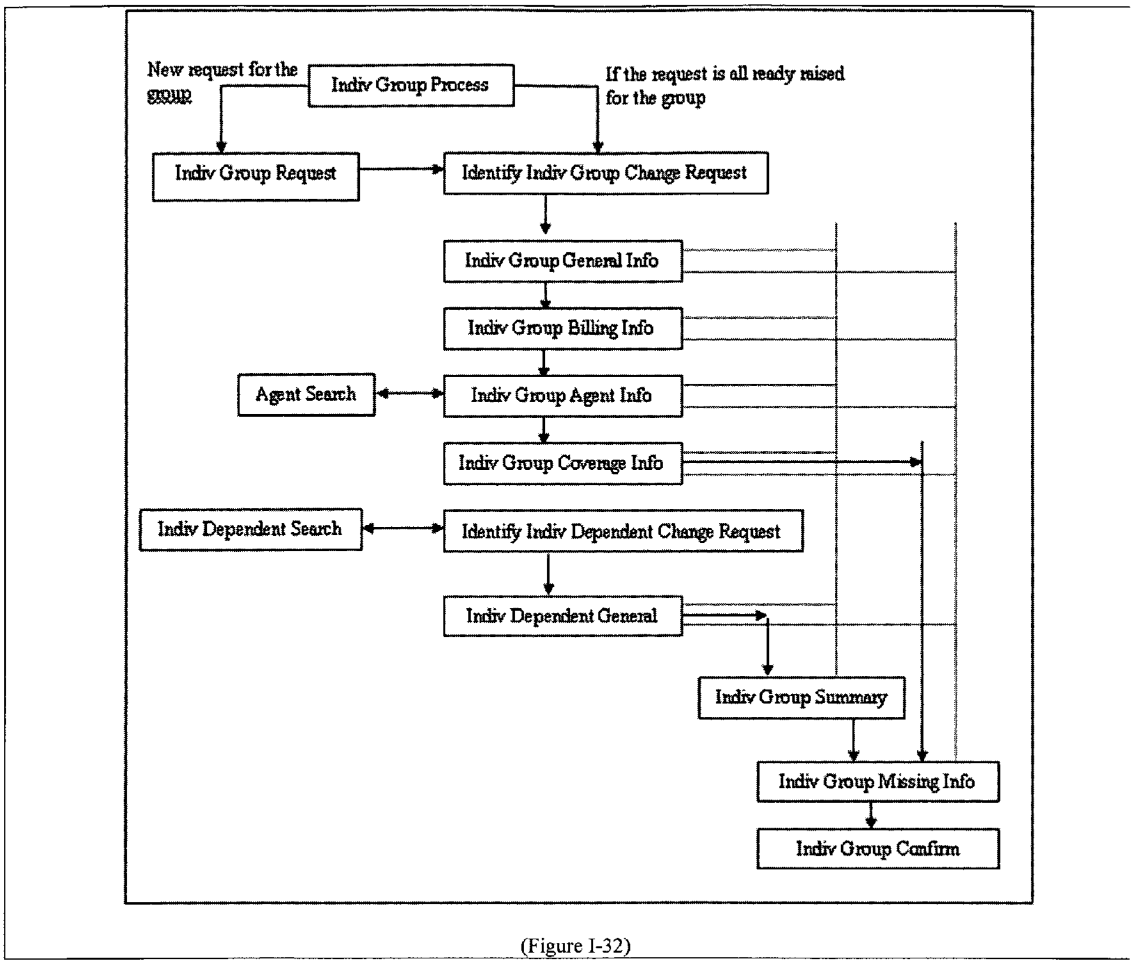
(Figure I-32)

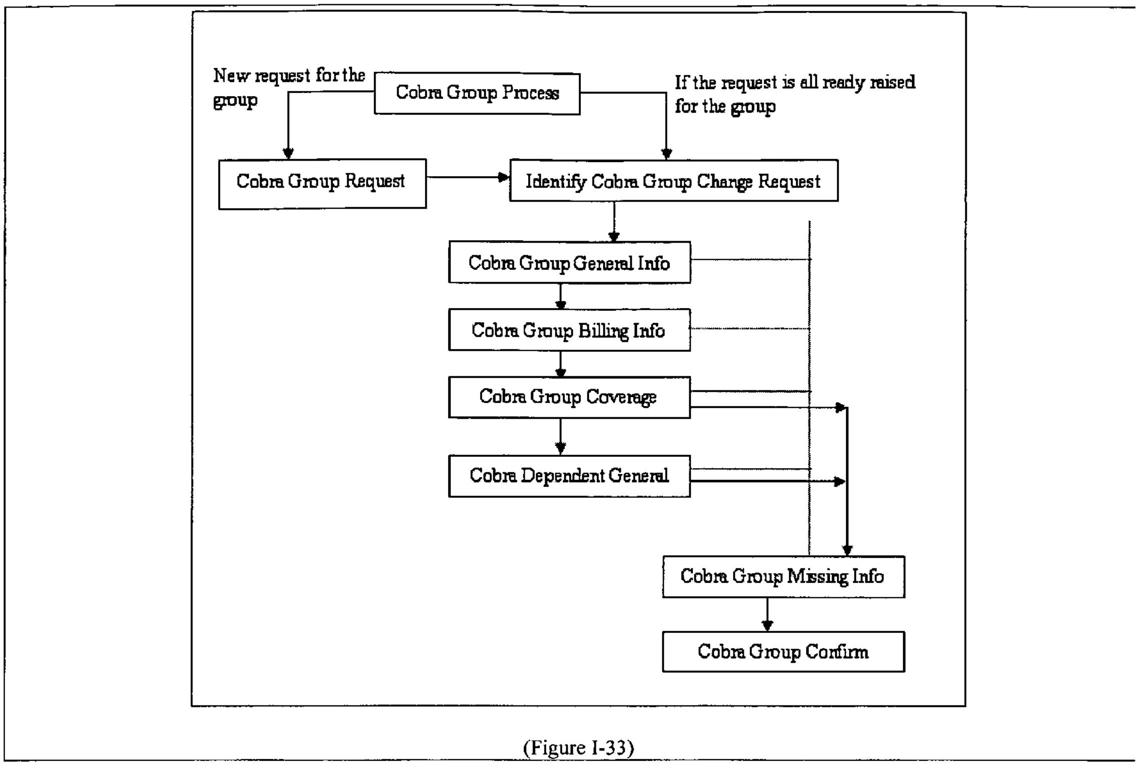
(Figure I-33)

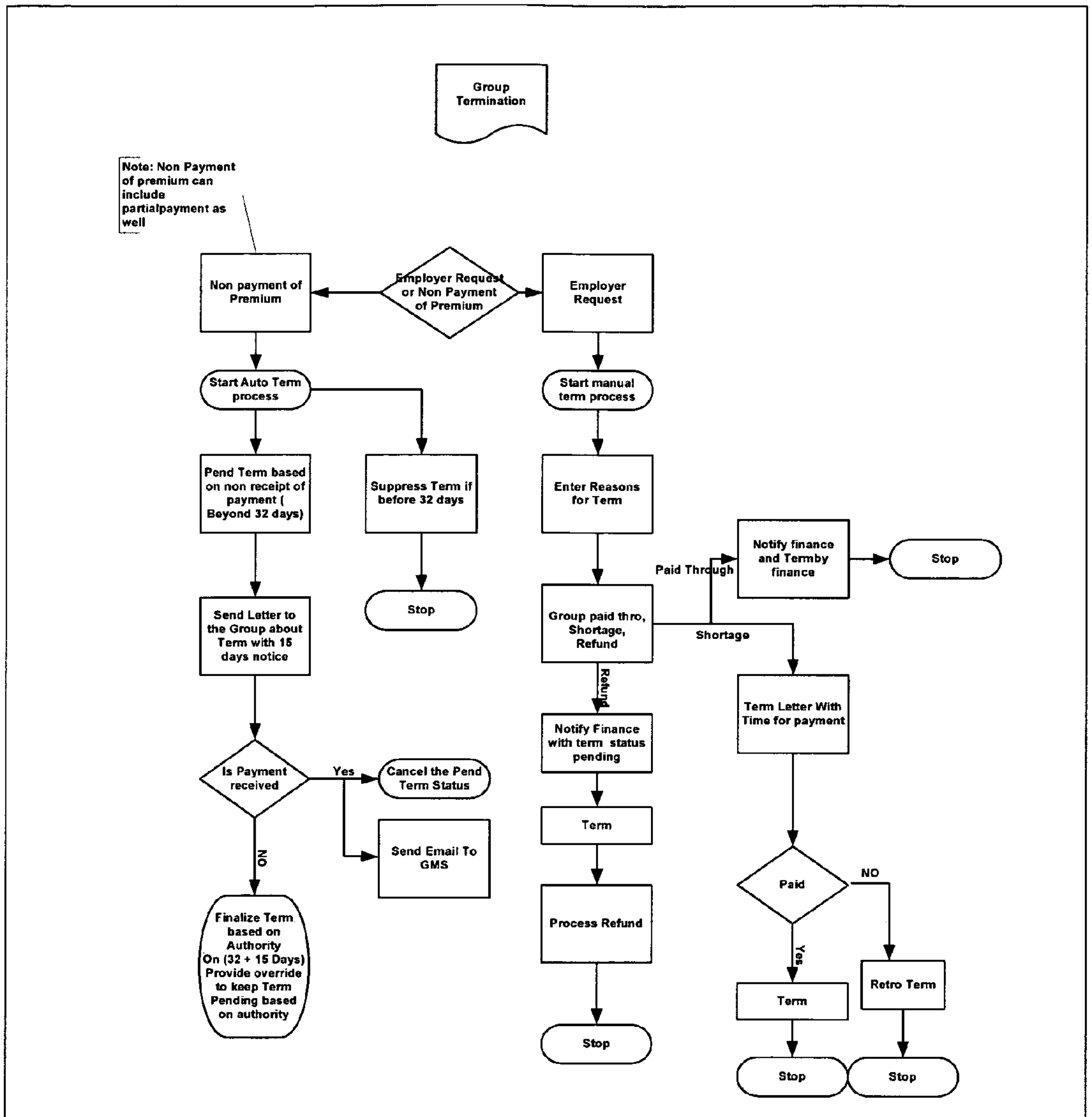
(Figure I-34)
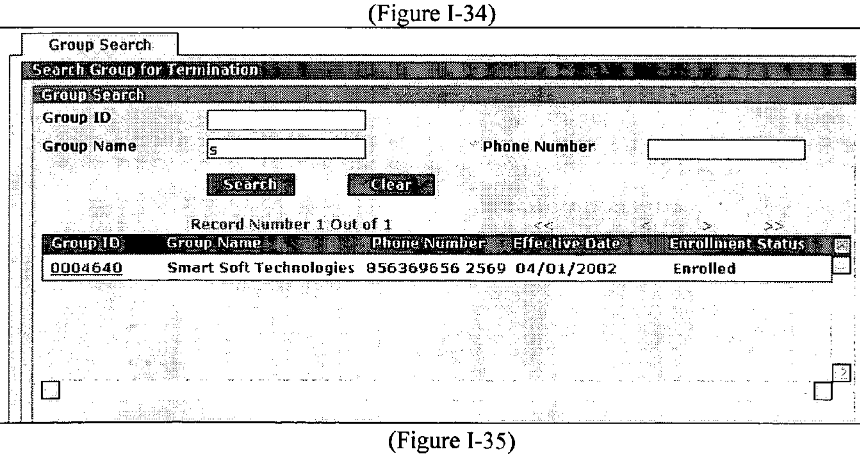
(Figure I-35)

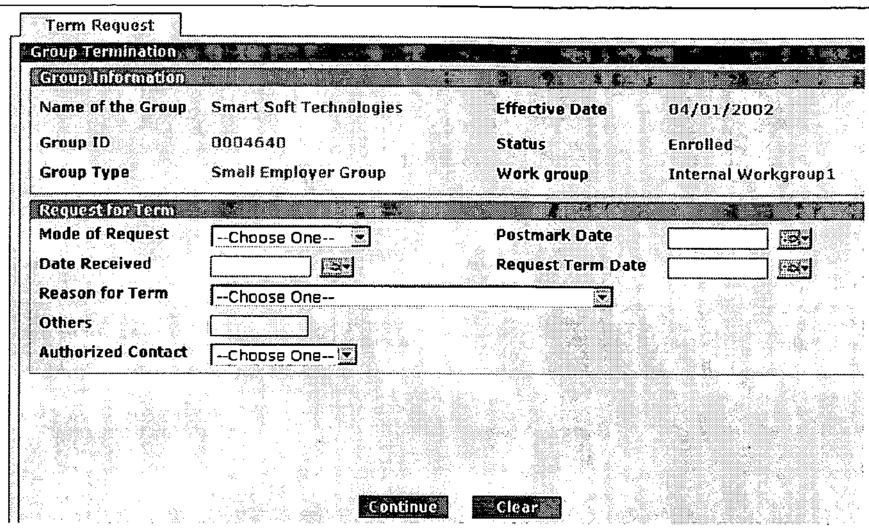
(Figure I-36)
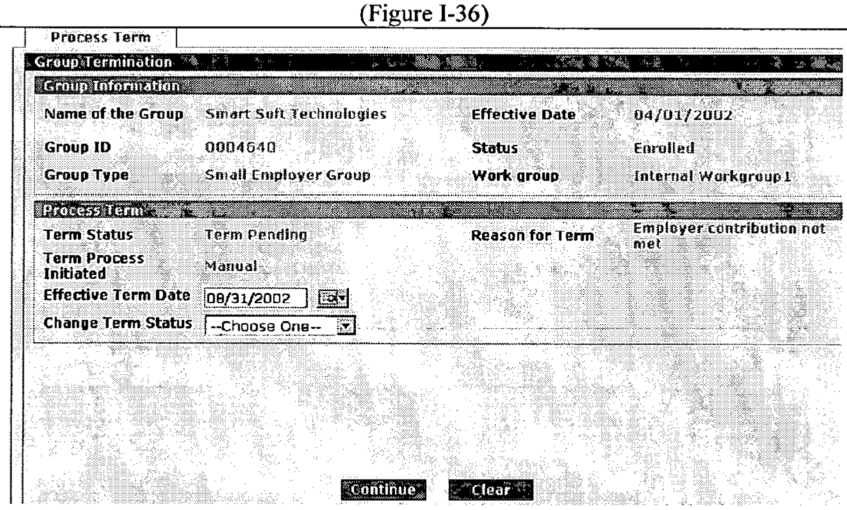
(Figure I-37)
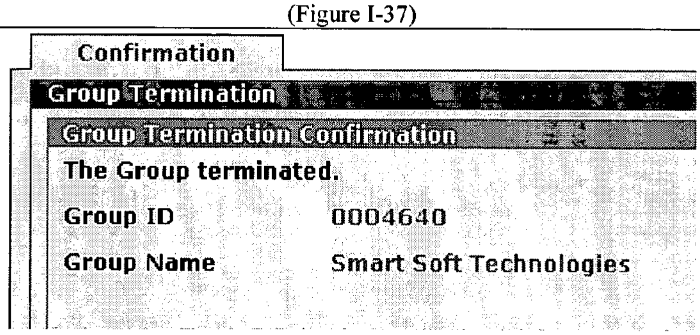
(Figure I-38)

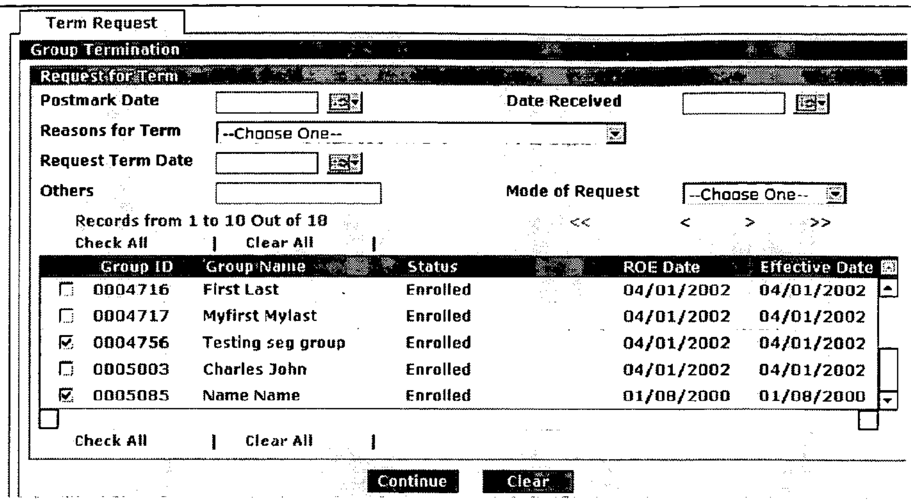
(Figure I-39)
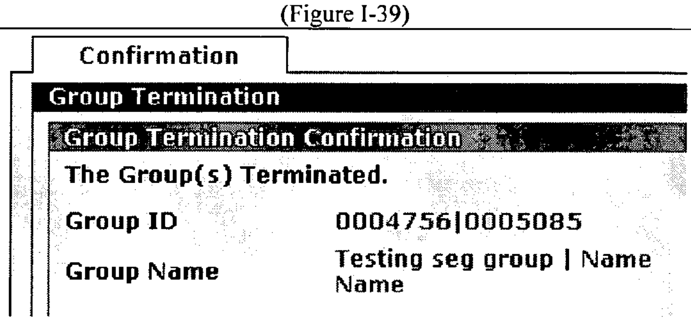
(Figure I-40)
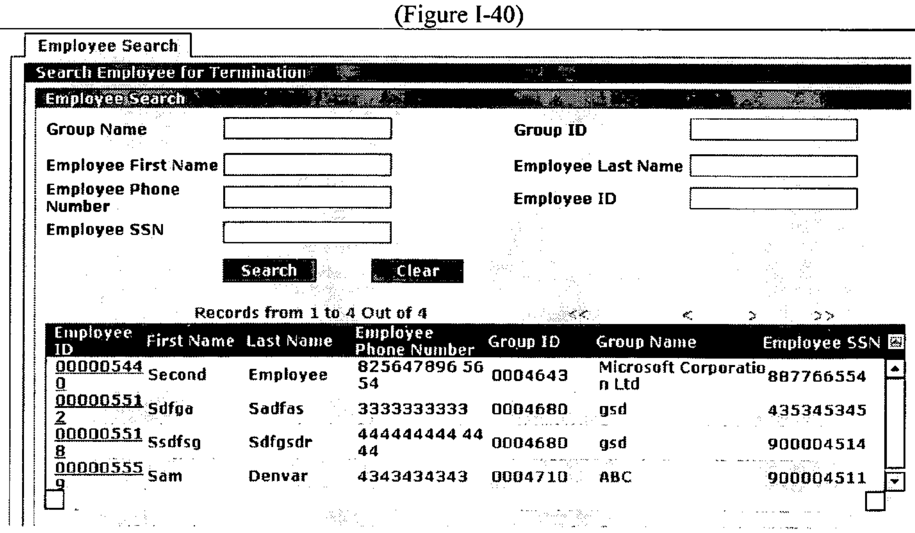
(Figure I-41)

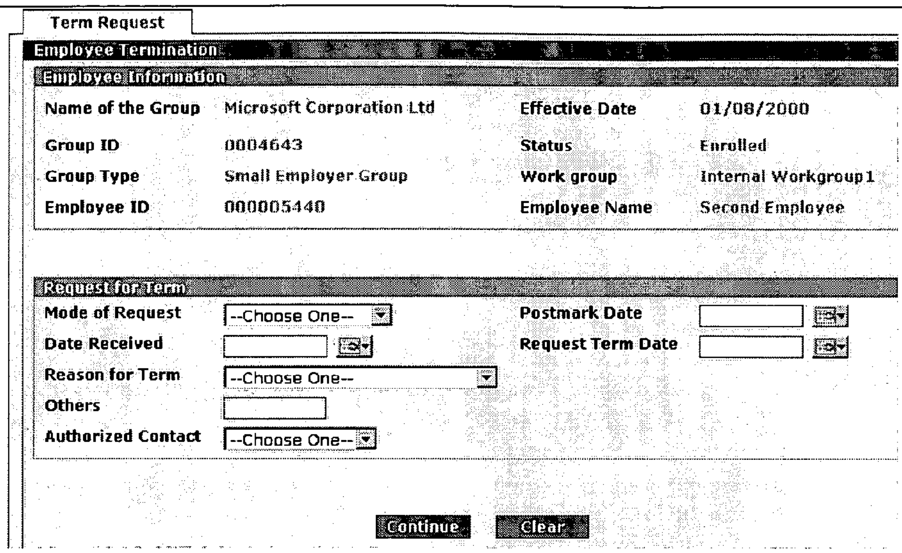
(Figure I-42)
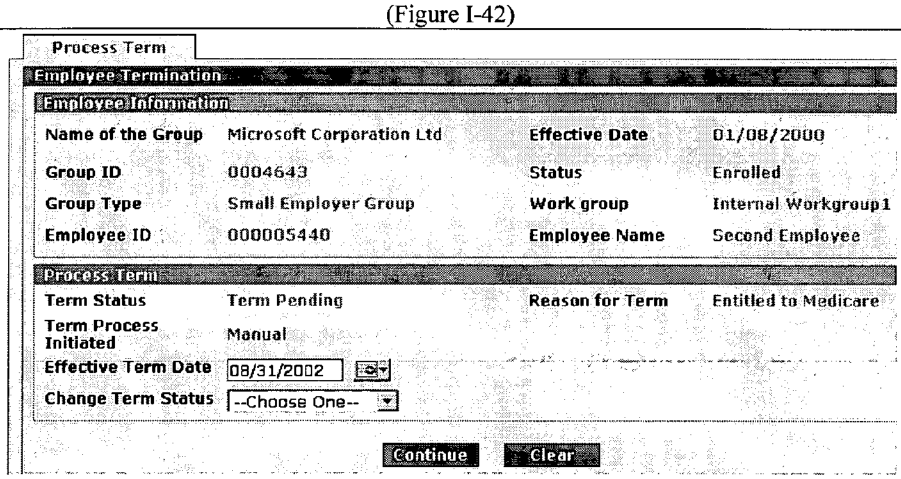
(Figure I-43)
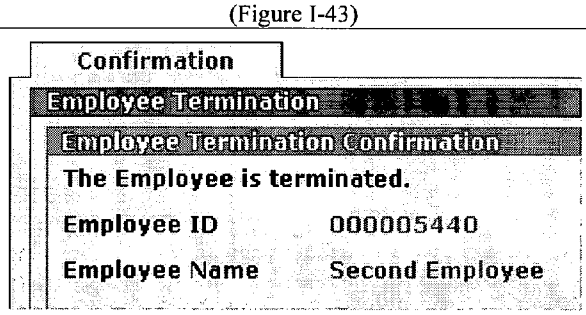
(Figure I-44)

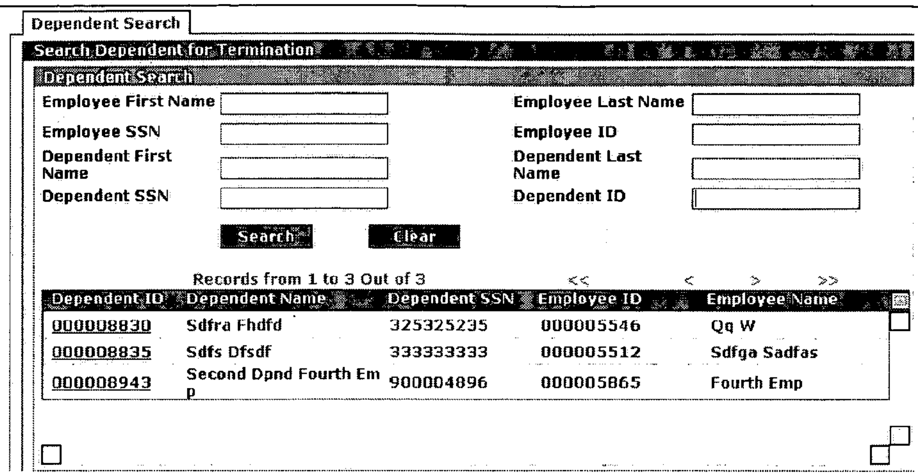
(Figure I-45)
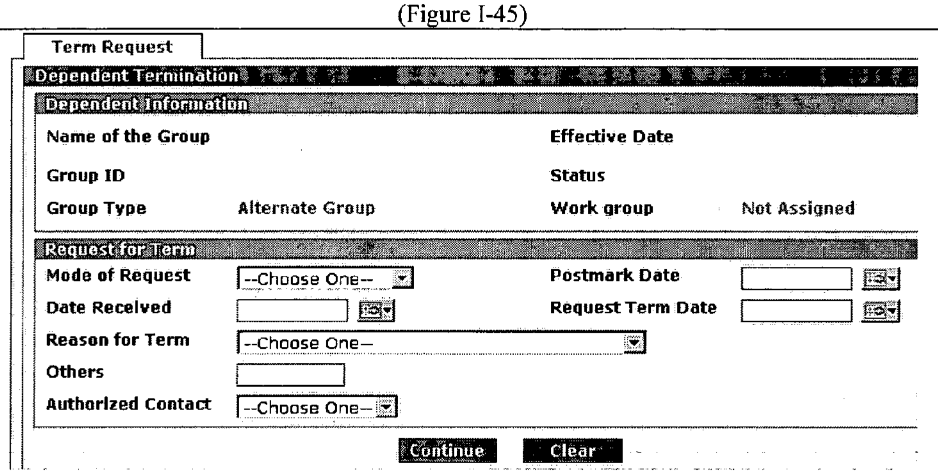
(Figure I-46)

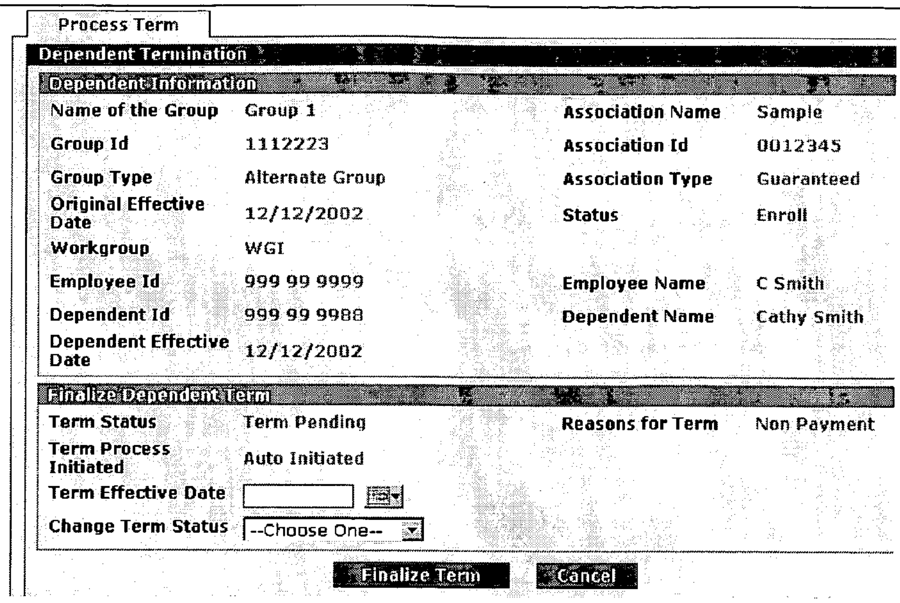
(Figure I-47)
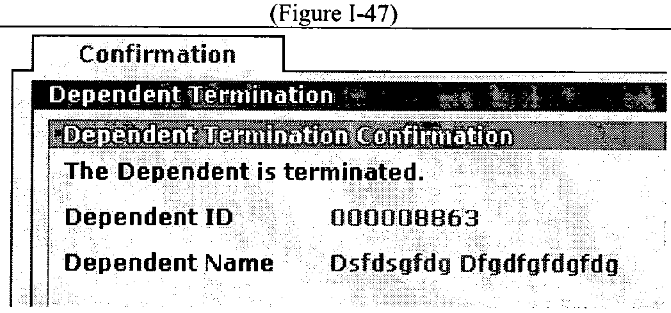
(Figure I-48)
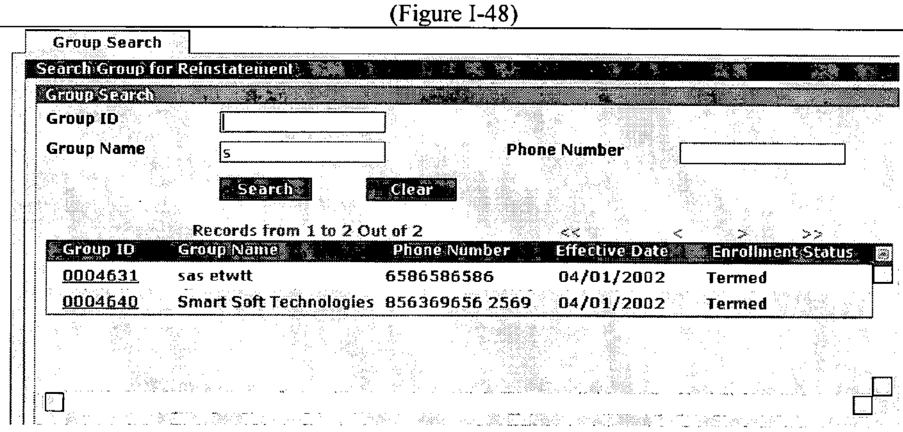
(Figure I-49)

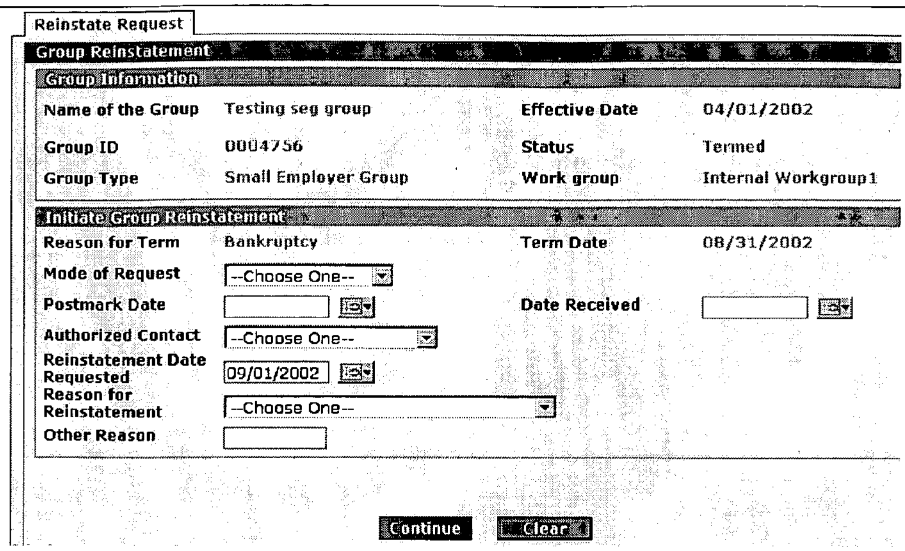
(Figure I-50)
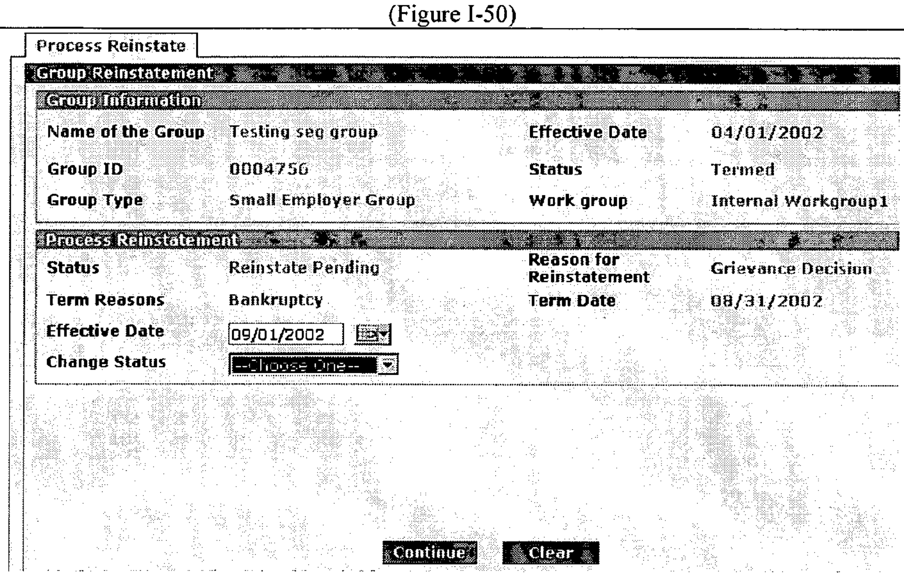
(Figure I-51)
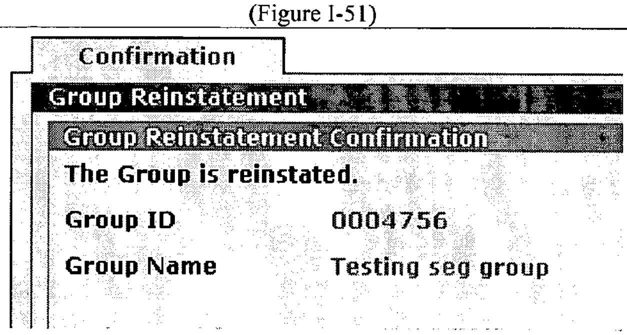
(Figure I-52)

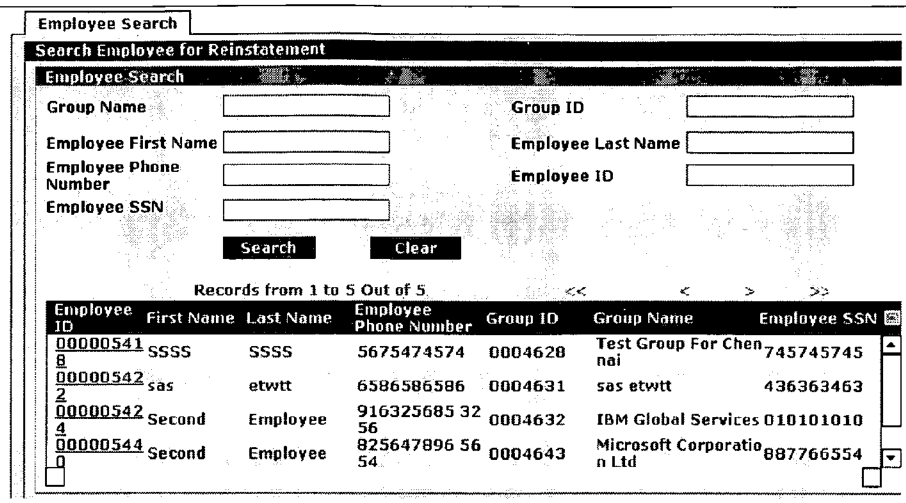
(Figure I-53)
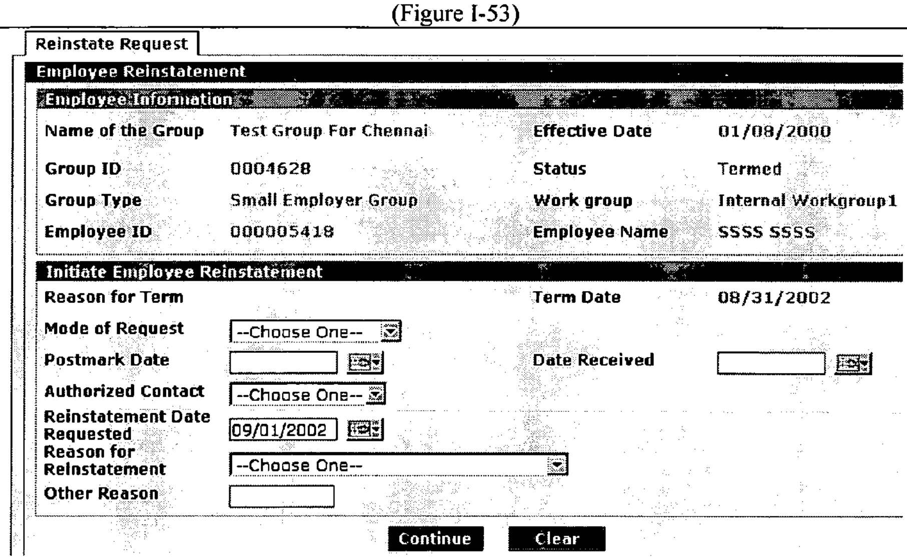
(Figure I-54)

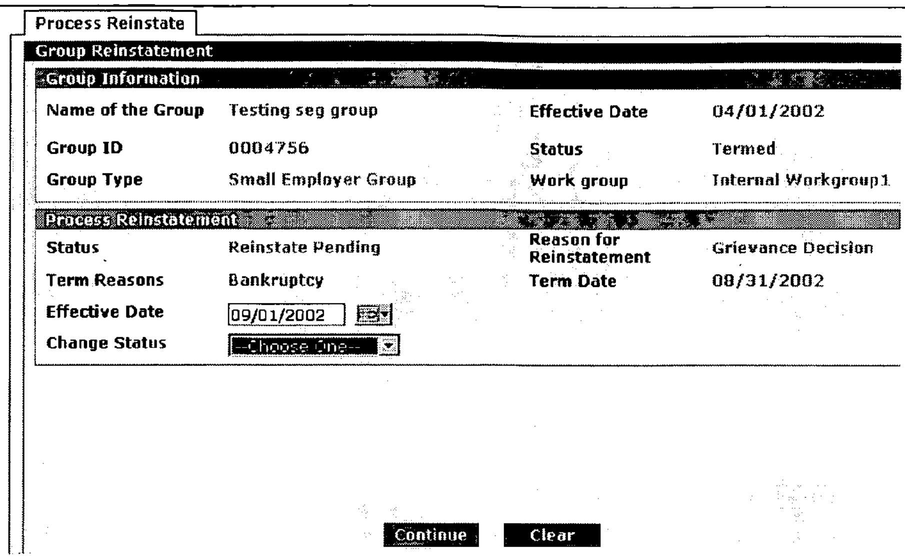
(Figure I-55)
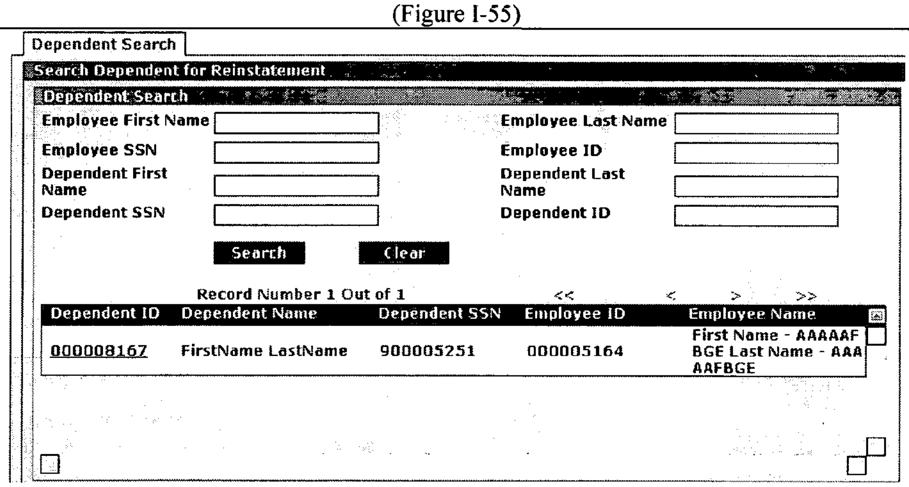
(Figure I-56)

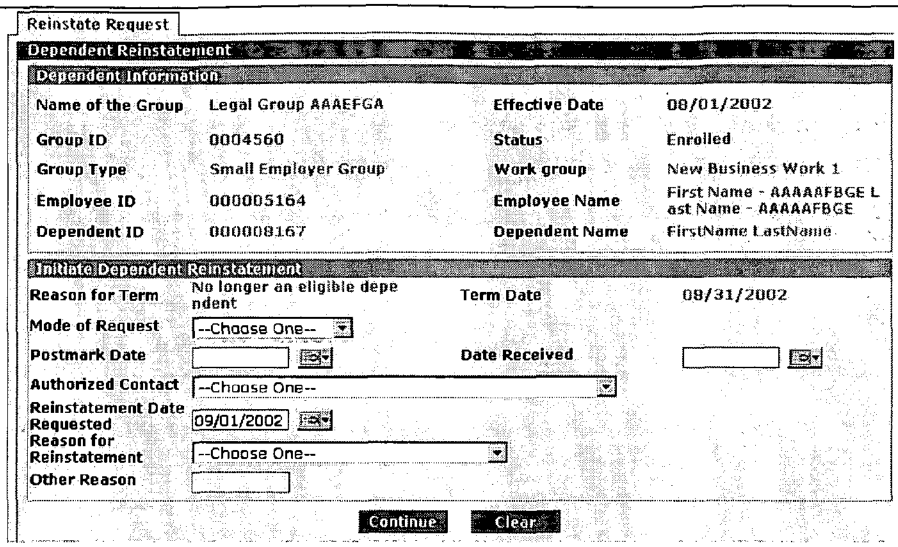
(Figure I-57)
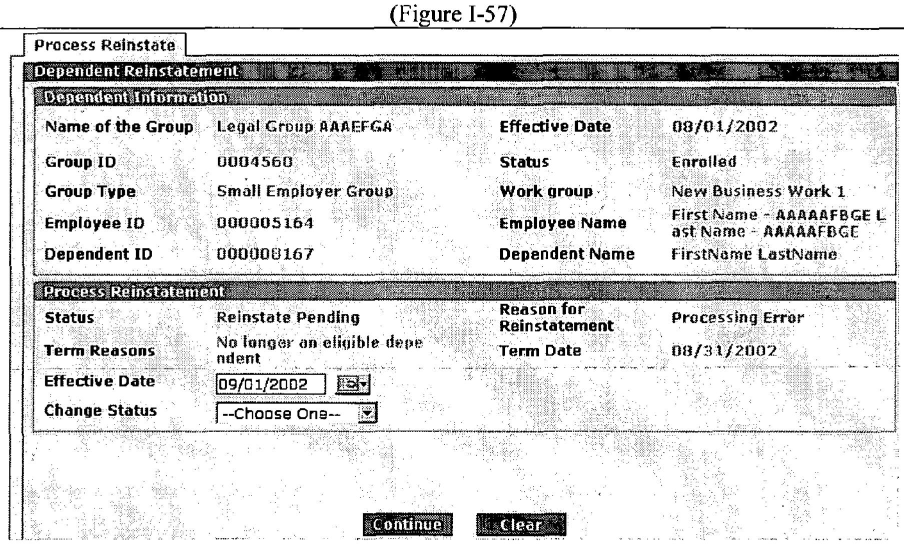
(Figure I-58)
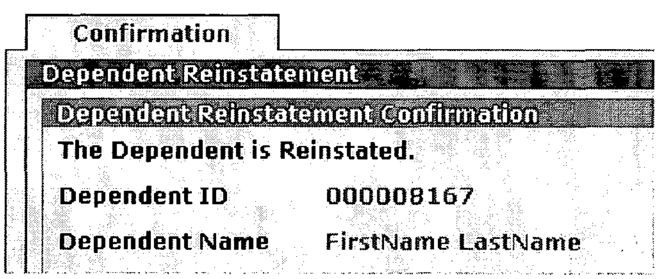
(Figure I-59)

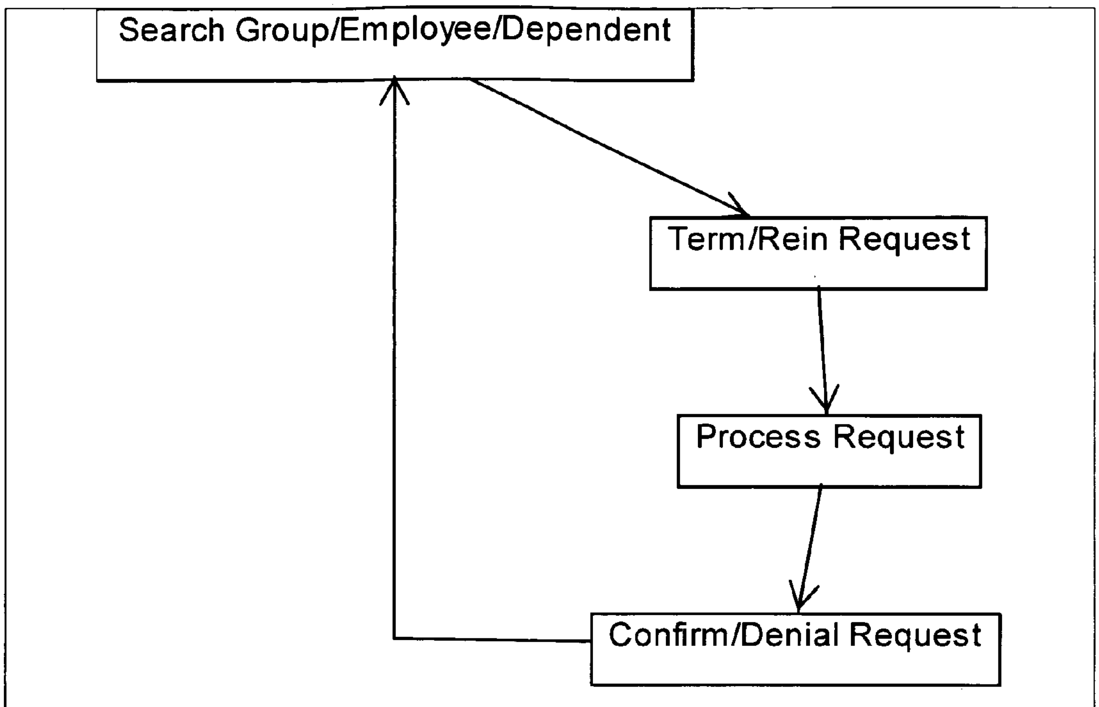
(Figure I-60)
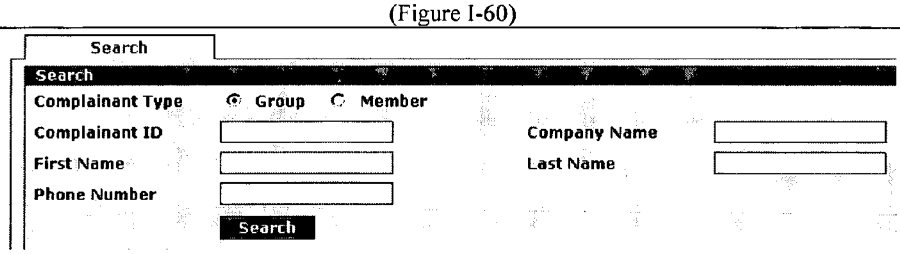
(Figure I-61)
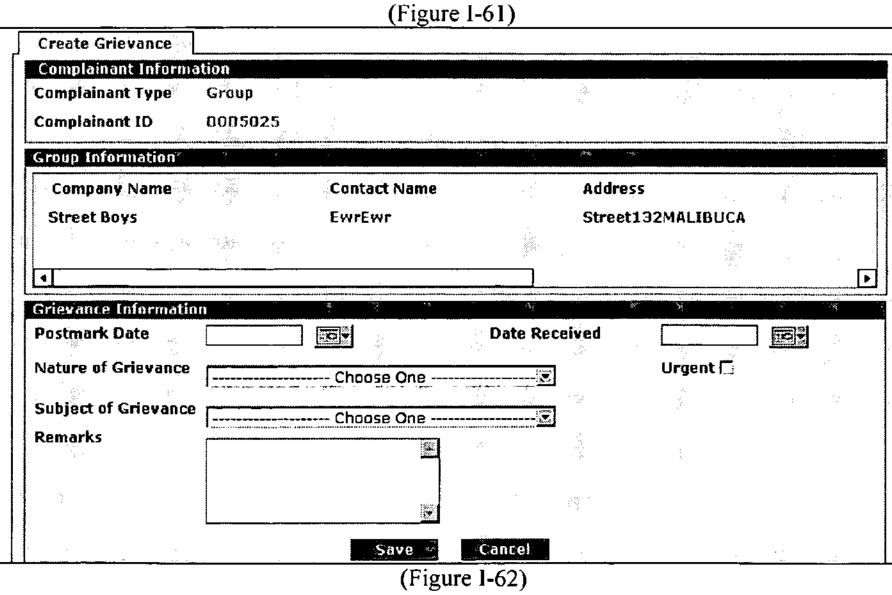
(Figure I-62)

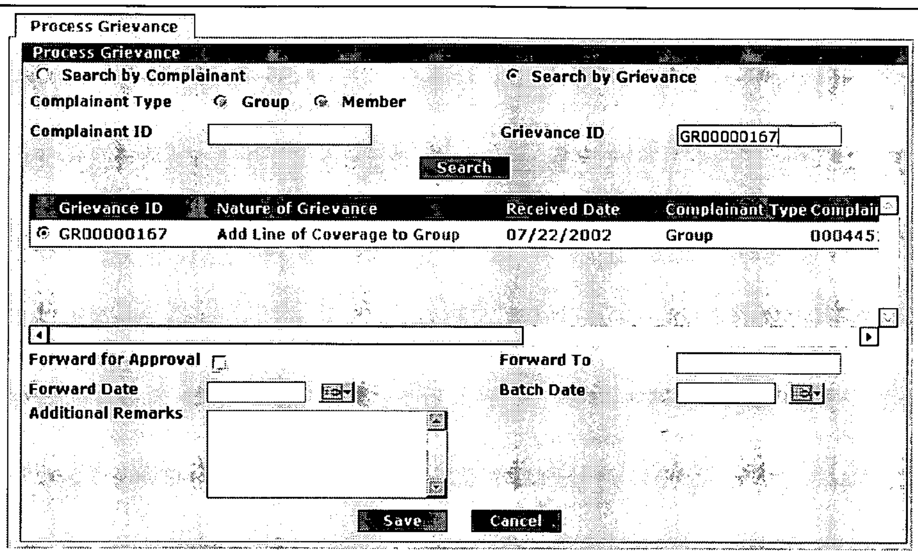
(Figure I-63)
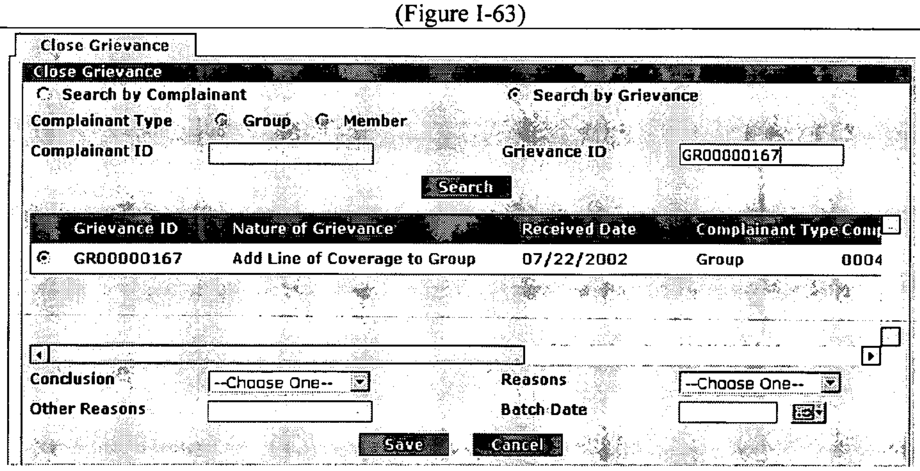
(Figure I-64)

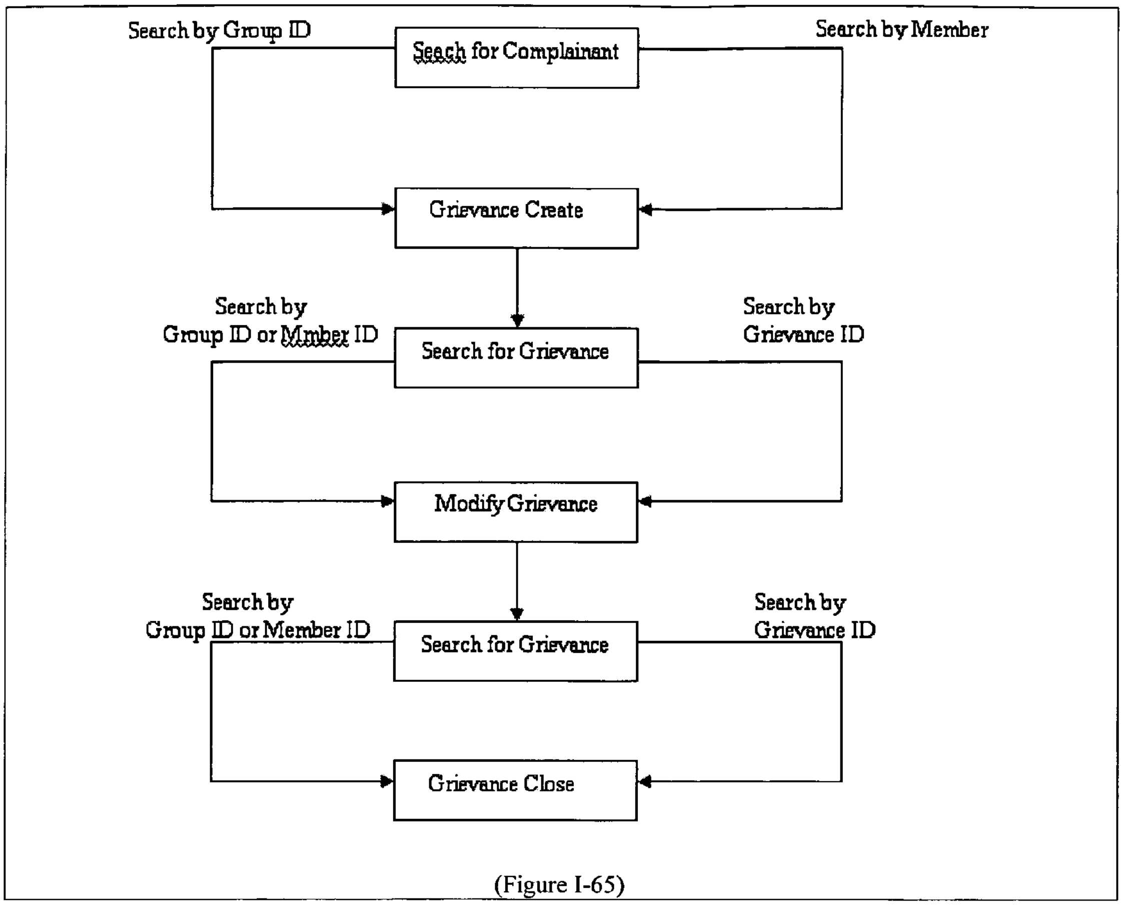
(Figure I-65)

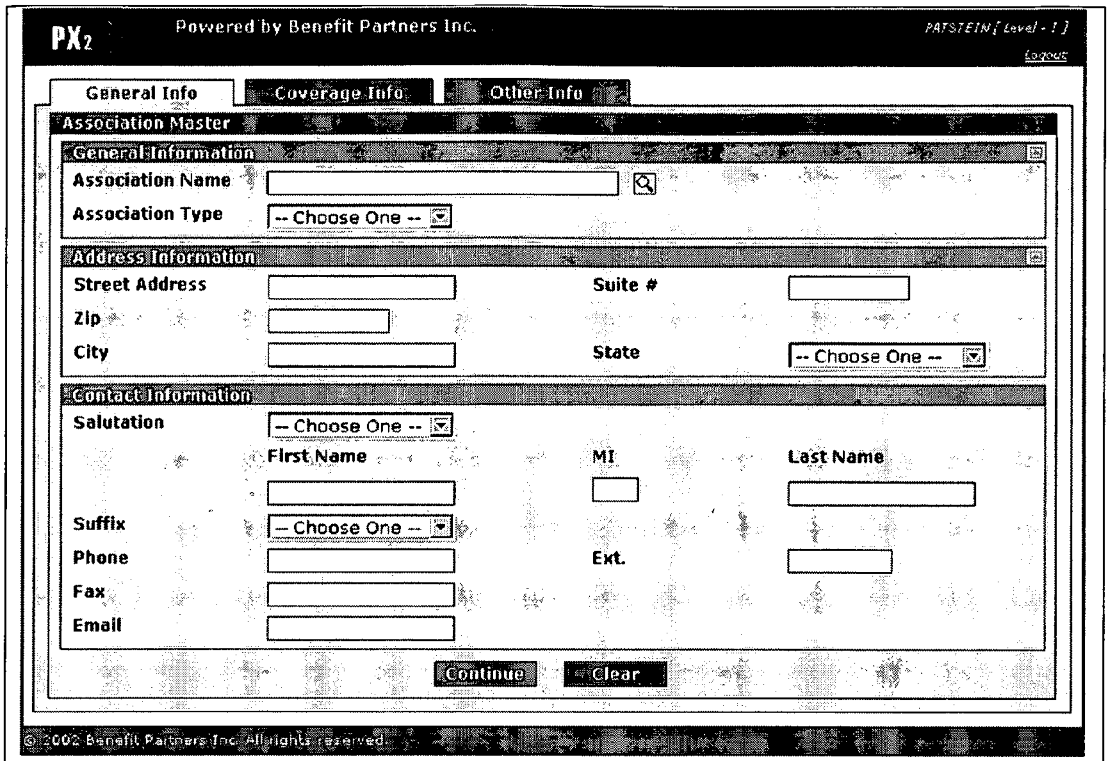
(Figure I-66)
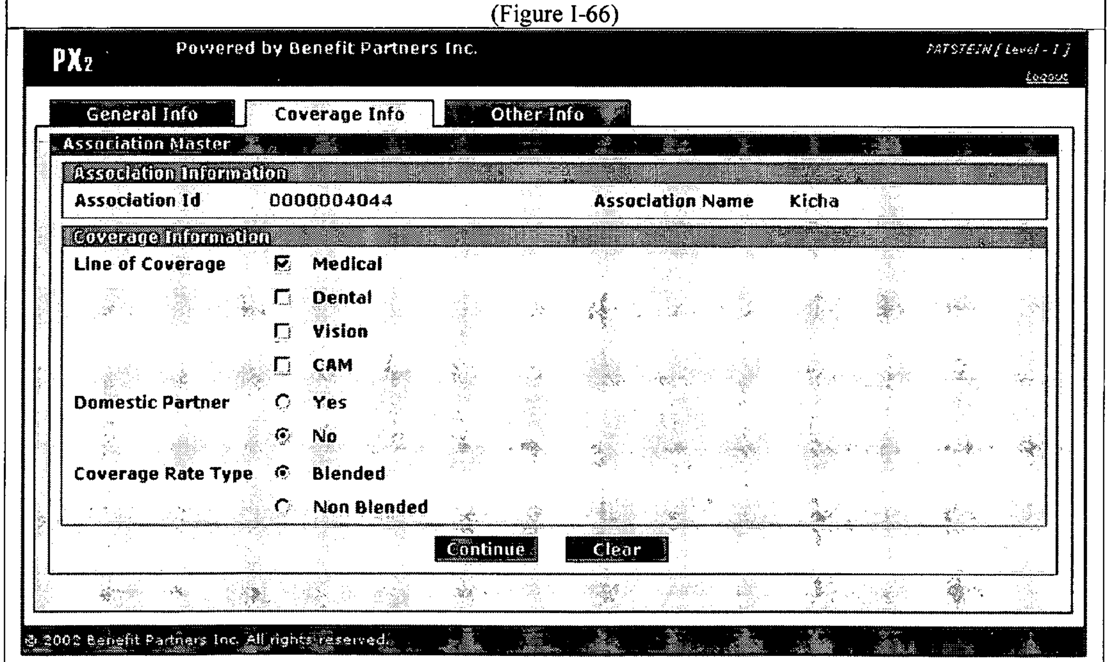
(Figure I-67)

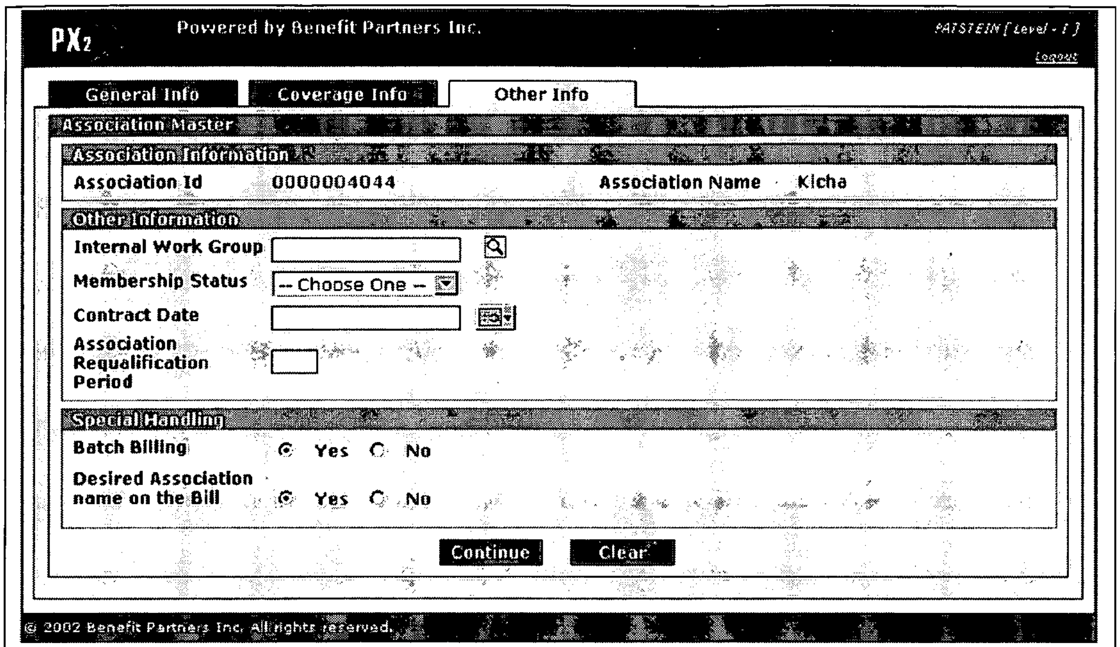
(Figure I-68)
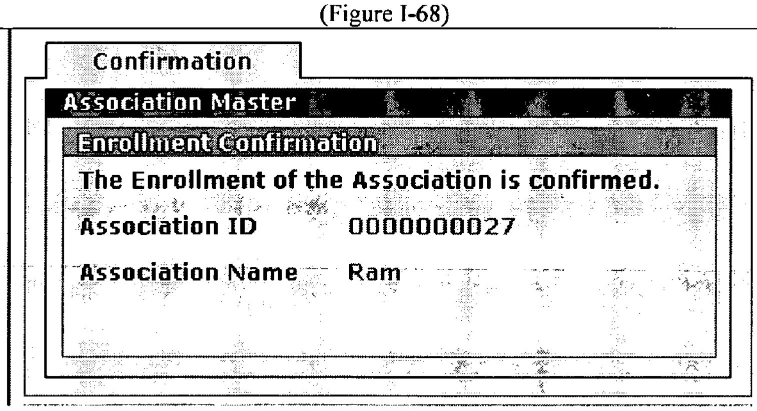
(Figure I-69)
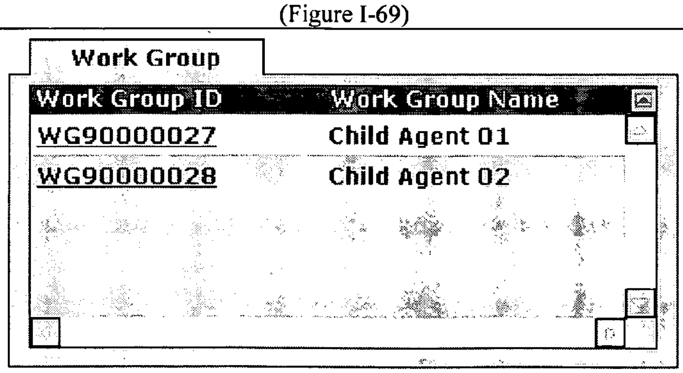
(Figure I-70)

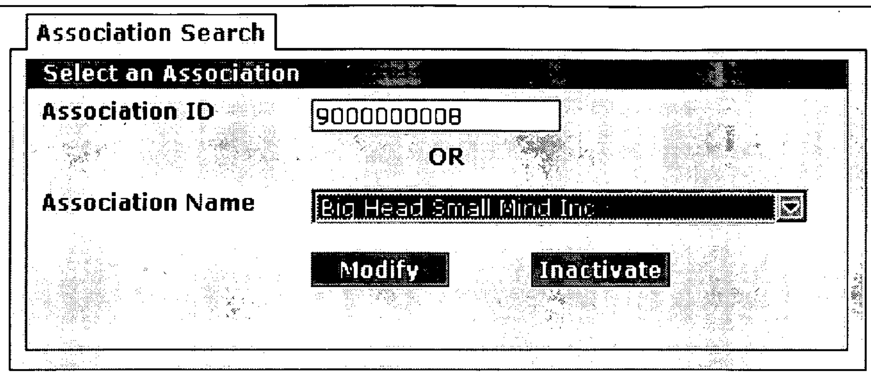
(Figure I-71)
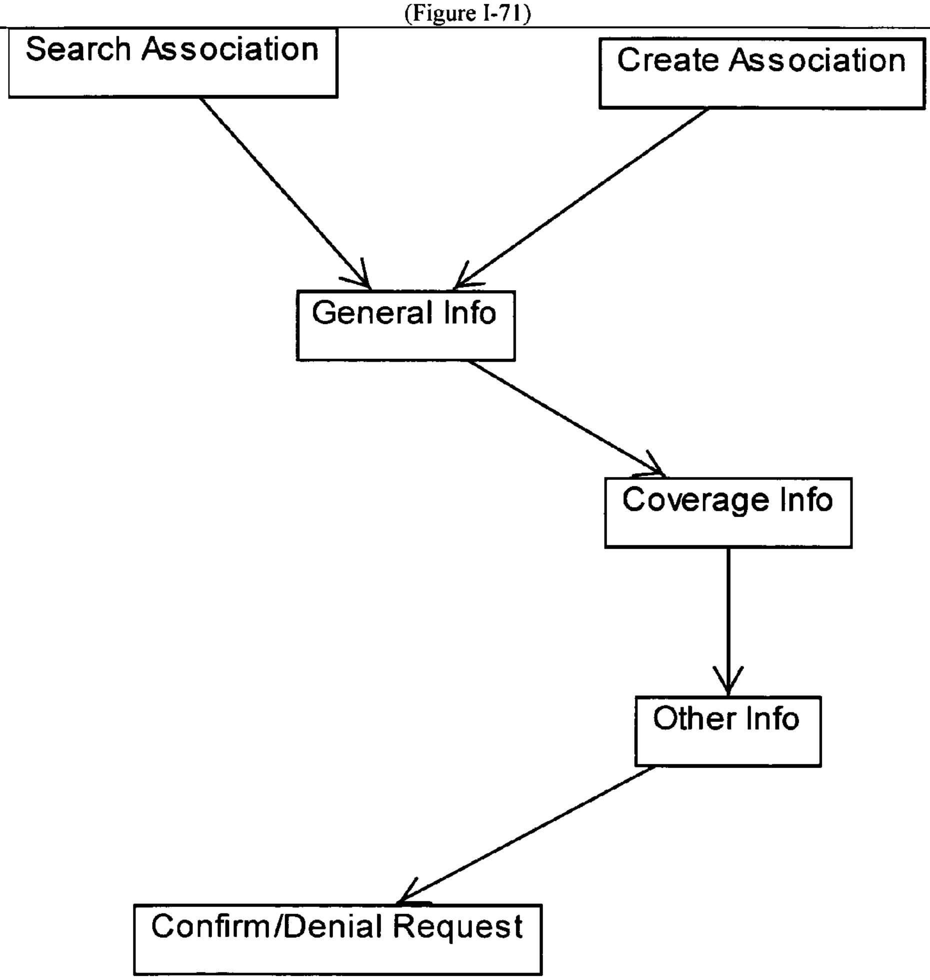
(Figure I-72)

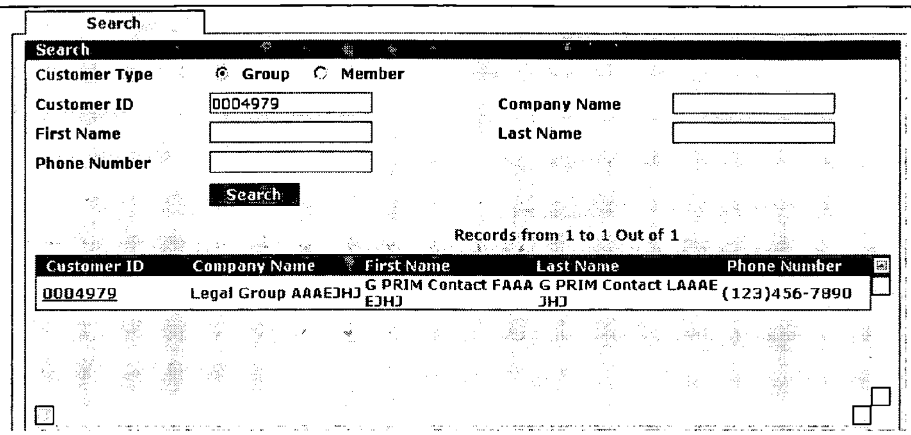
(Figure I-73)
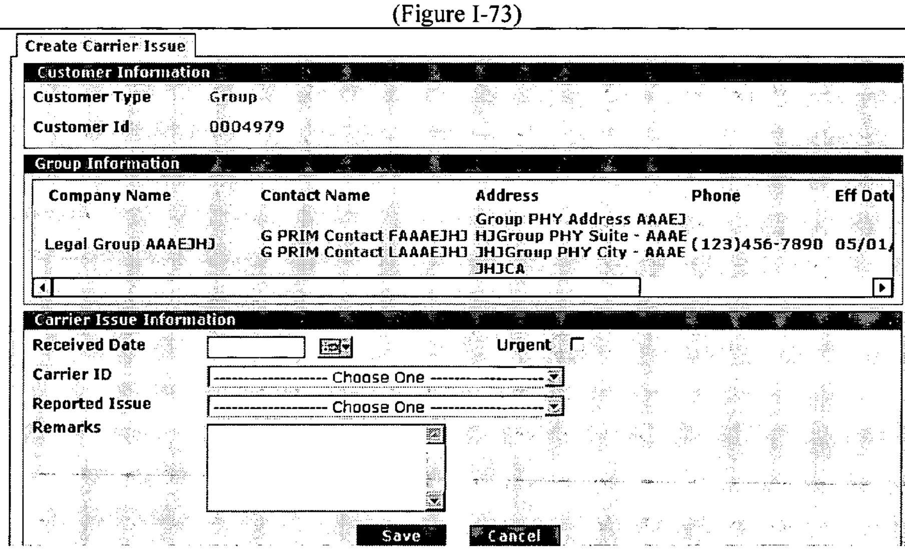
(Figure I-74)
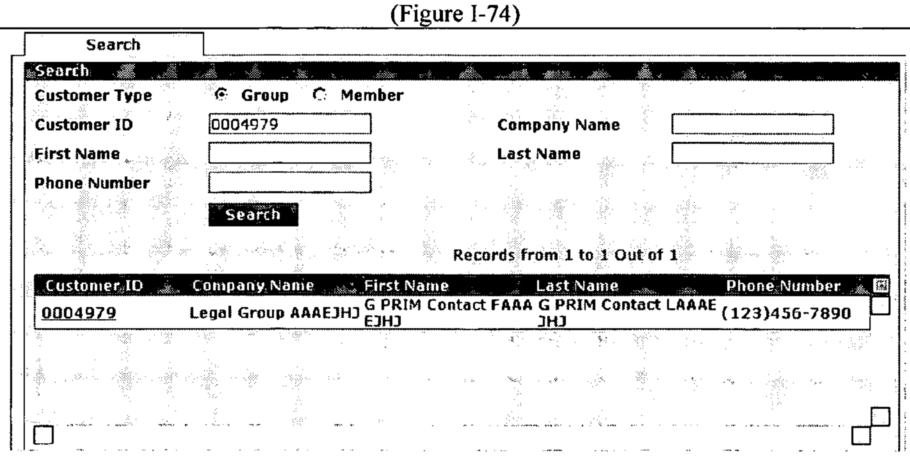
(Figure I-75)

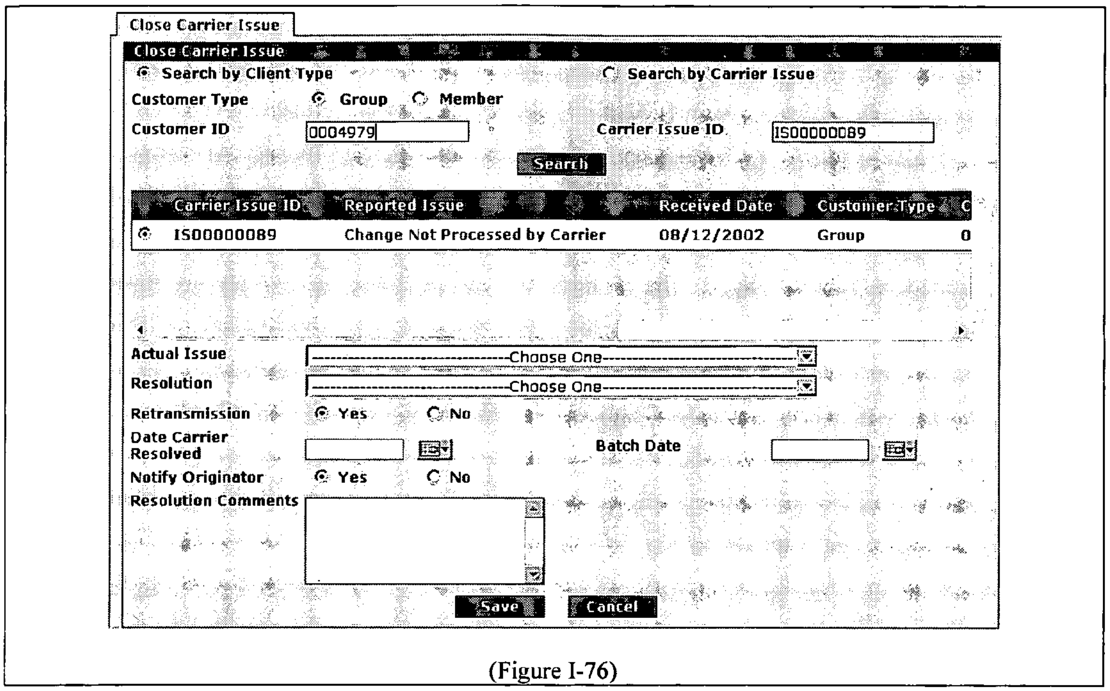
(Figure I-76)

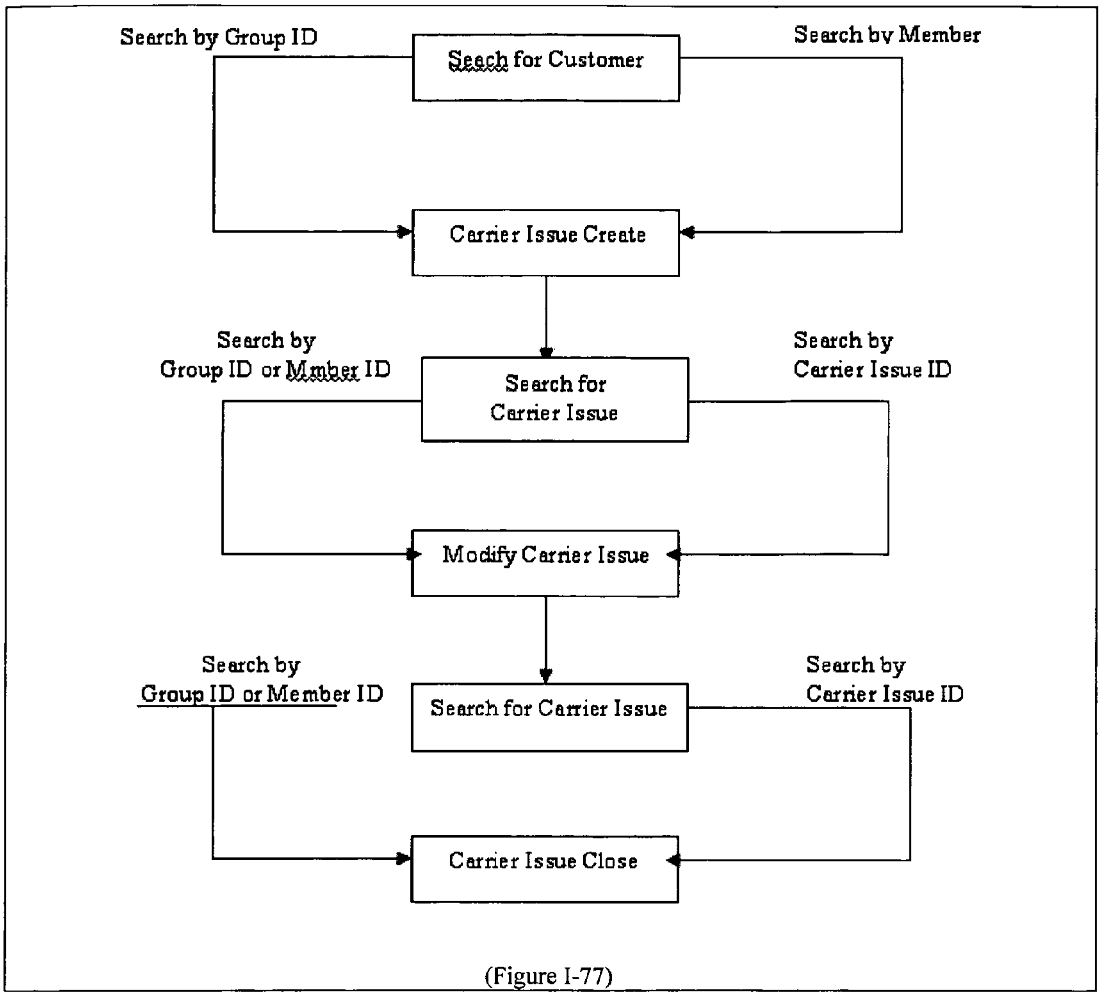
(Figure I-77)

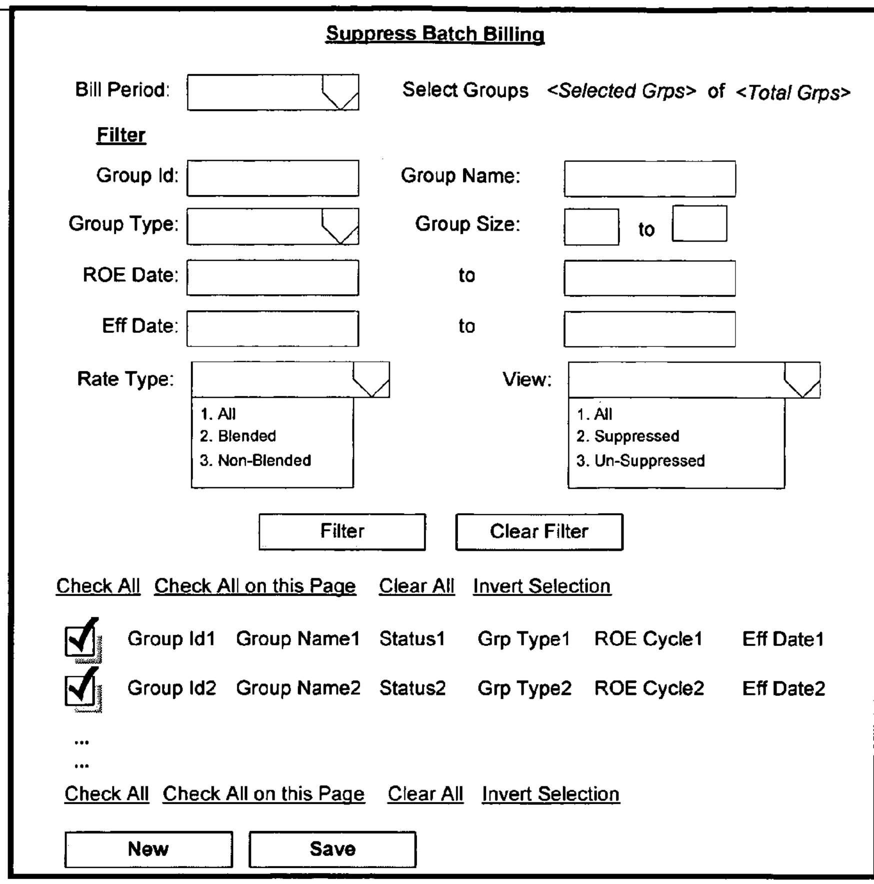
(Figure J-1)
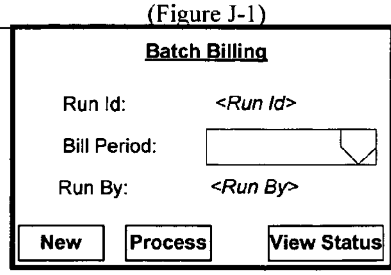
(Figure J-2)

Manual Bill

Bill Details

Bill #: <Bill #> Bill Date: <Bill Date>

Bill Period: [ ] Due Date: <Due Date>

Status: <Bill #> Reconciled Date: <Reconciled Date>

Group Information

Group Id: [ ] [...] Group Type: <Group Type>

Group Name: <Group Name> Association Name<Association Name>

Status: <Status> Rate Type: <Rate Type>

Billing Summary

| | |
|---|---|
| Prior period billed amount | <...> |
| Adjustments since prior period | <...> |
| Payments Received | <...> |
| Past due amount | <...> |
| Current bill amount | <...> |
| Total Due | <...> |

Employer Level Adjustments

Adjustment Type: [ ]

Amount: [ ] Period: [ ]

[Delete]

Check All Clear All

☑ [Edit] <Adjustment Type> <Adjustment Period> <Adjustment Value>

☑ [Edit] <Adjustment Type> <Adjustment Period> <Adjustment Value>

Employee Level Adjustments

<Employee Name> <Period> <Plan Name> <Plan Type> <Cvrg Type> <#Mem> <Premium> <Admin Fees> <Agent Fees> <Total Premium>

... ... ... ... ... ... ... ... ... ... ... ... ... ... ...

Employee Detail

<Employee Name> <Plan Name> <Plan Type> <Cvrg Type> <#Mem> <Premium> <Admin Fees> <Agent Fees> <Total Premium>

... ... ... ... ... ... ... ... ... ... ... ... ... ... ...

Bill Summary

| | |
|---|---|
| Subtotal - Medical Premium | <...> |
| Subtotal - Dental Premium | <...> |
| Administration Member Fee | <...> |
| Agent Member Fee | <...> |
| Administration Flat Fee | <...> |
| Agent Flat Fee | <...> |
| Total Due Current Period | <...> |
| Add Past Amount Due | <...> |
| Total Due | <...> |

[New] [Create]

(Figure J-3)

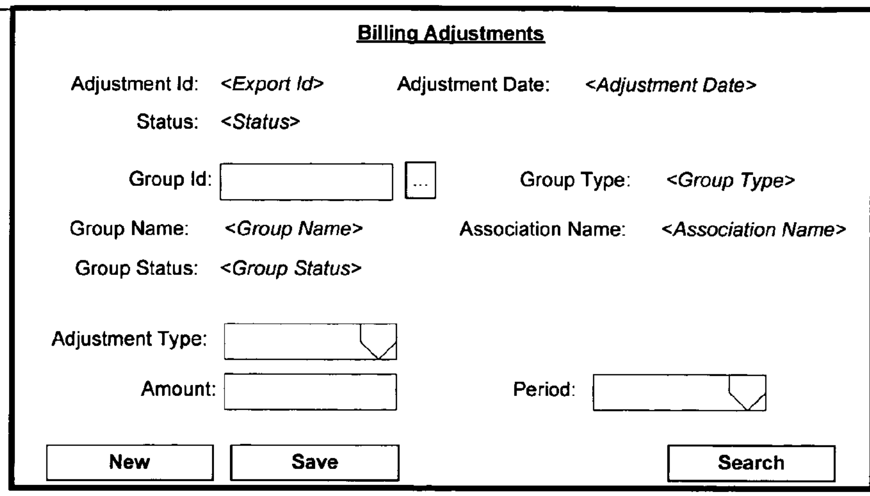
(Figure J-4)
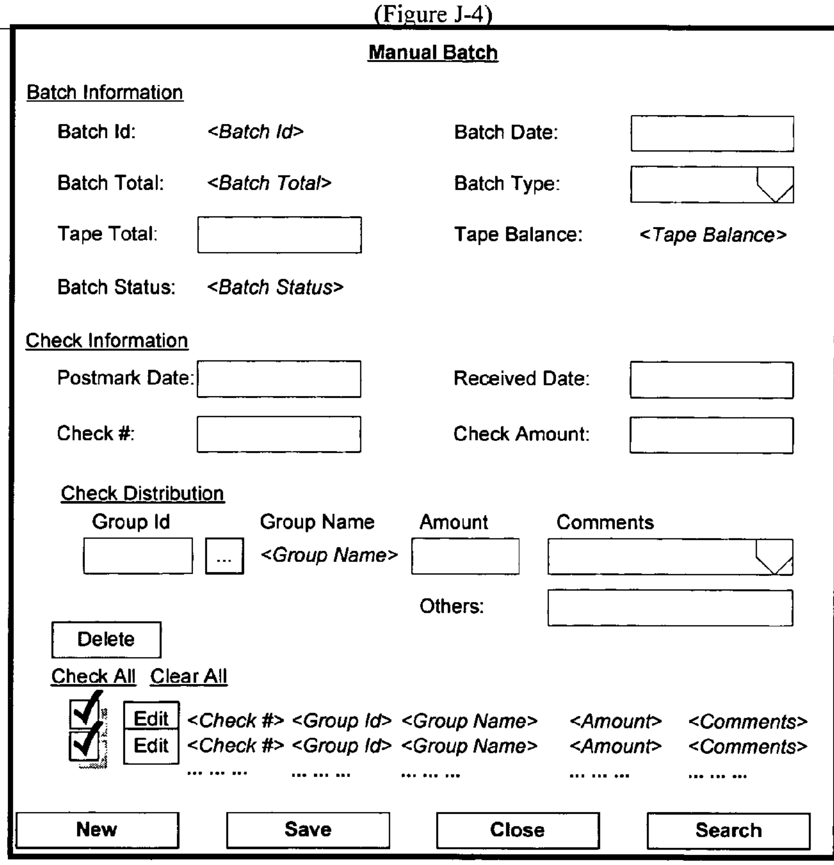
(Figure J-5)

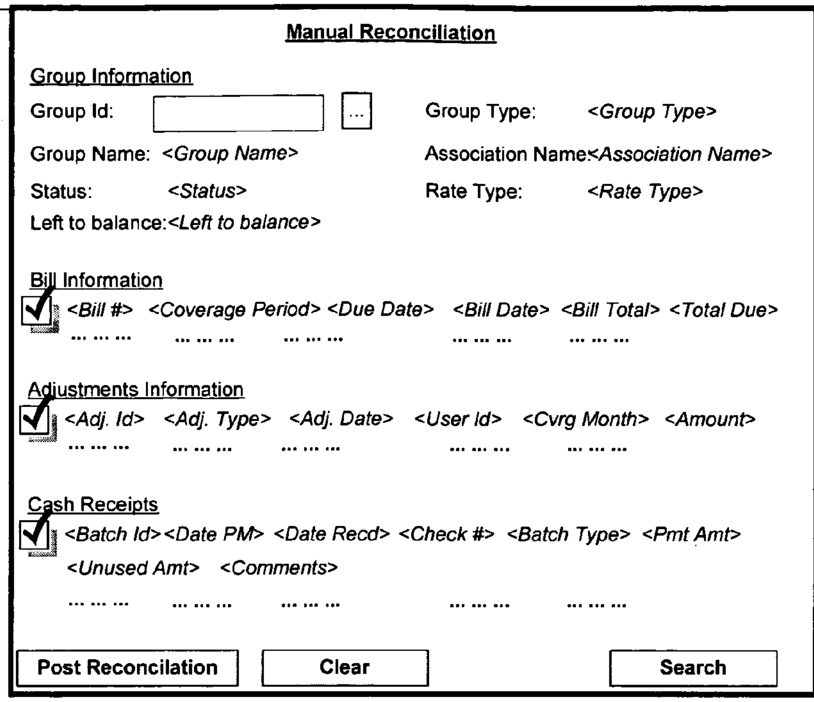
(Figure J-6)
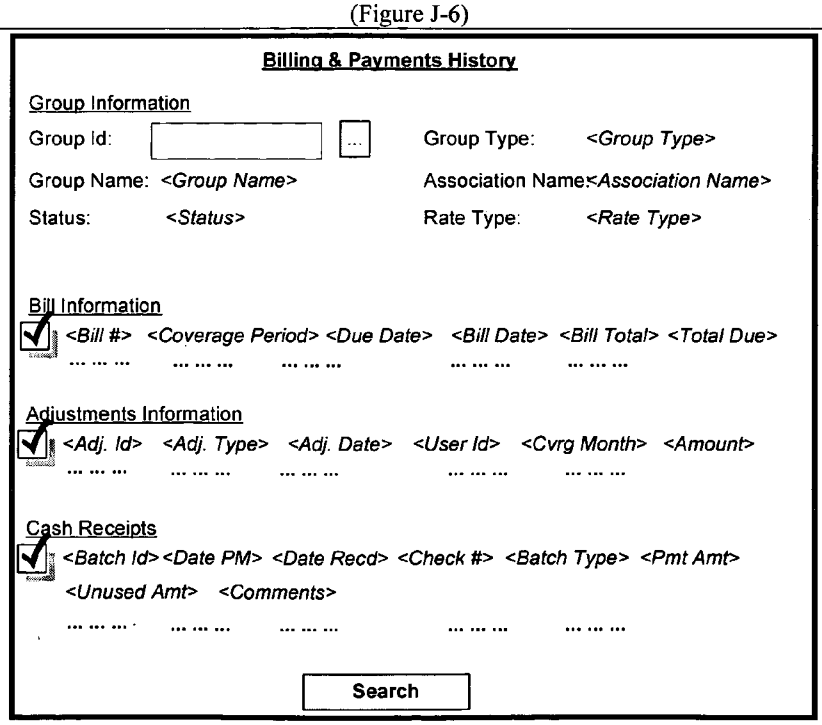
(Figure J-7)

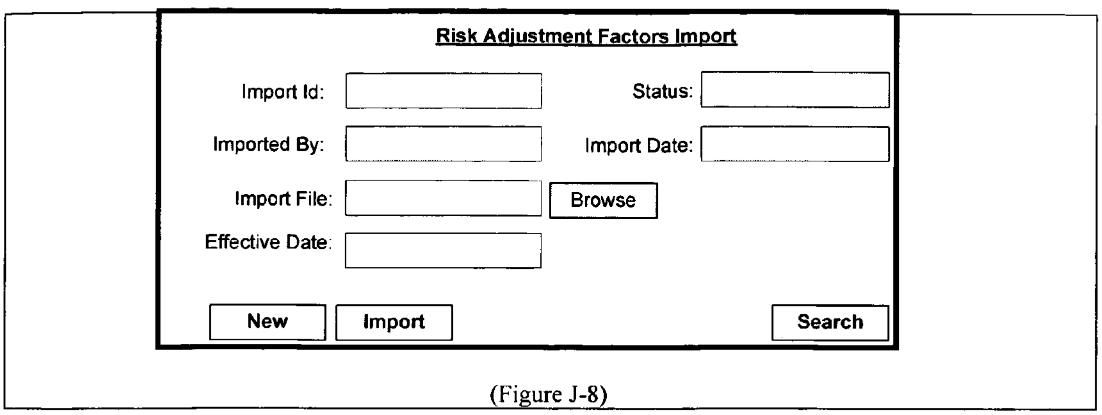
(Figure J-8)

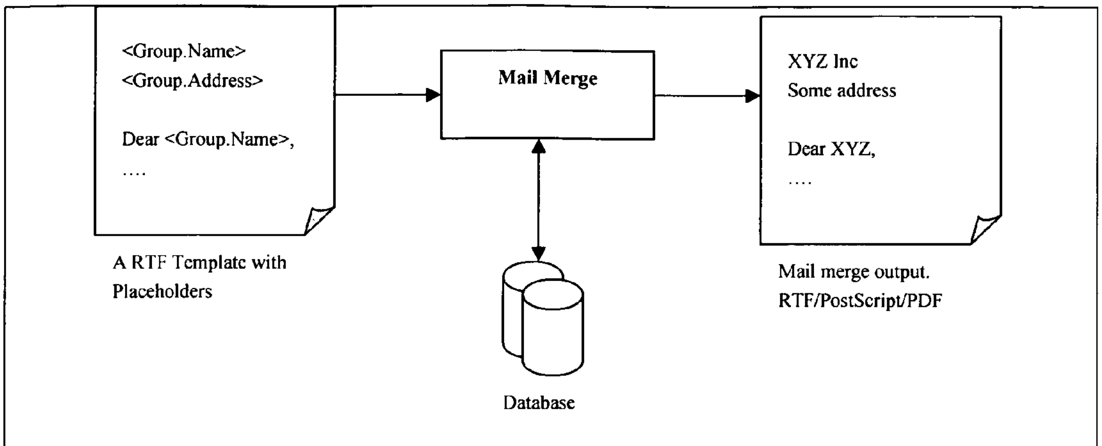
(Figure K-1)
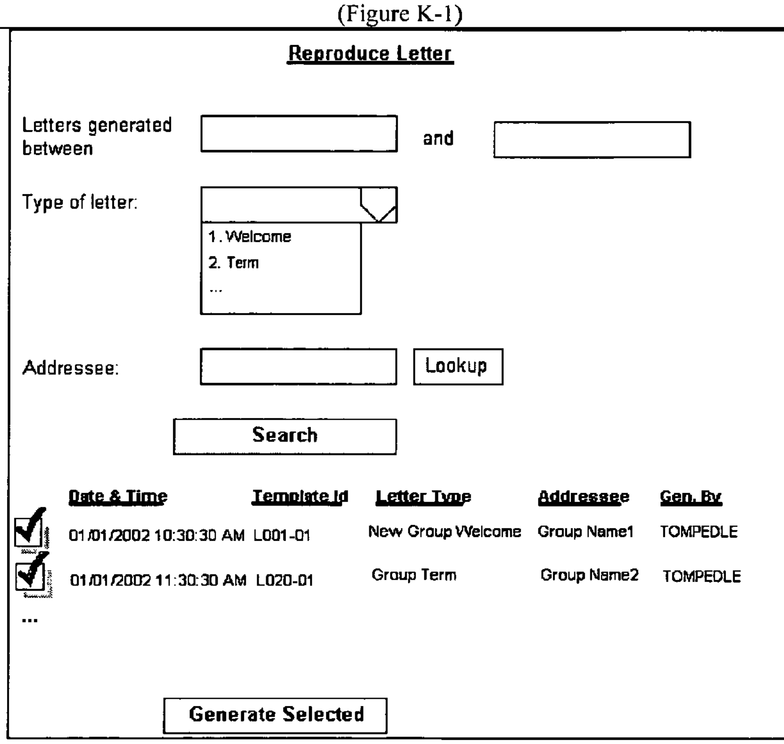
(Figure K-2)

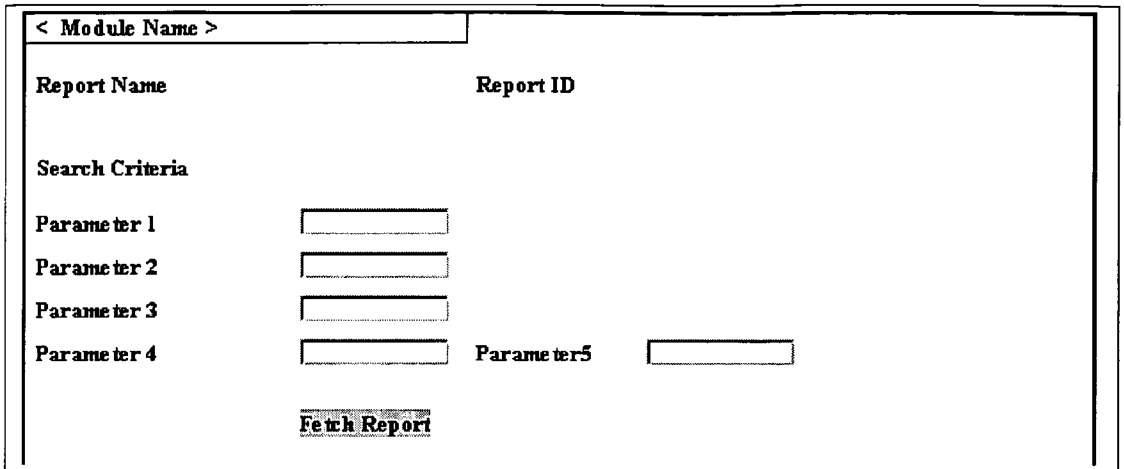
(Figure L-1)
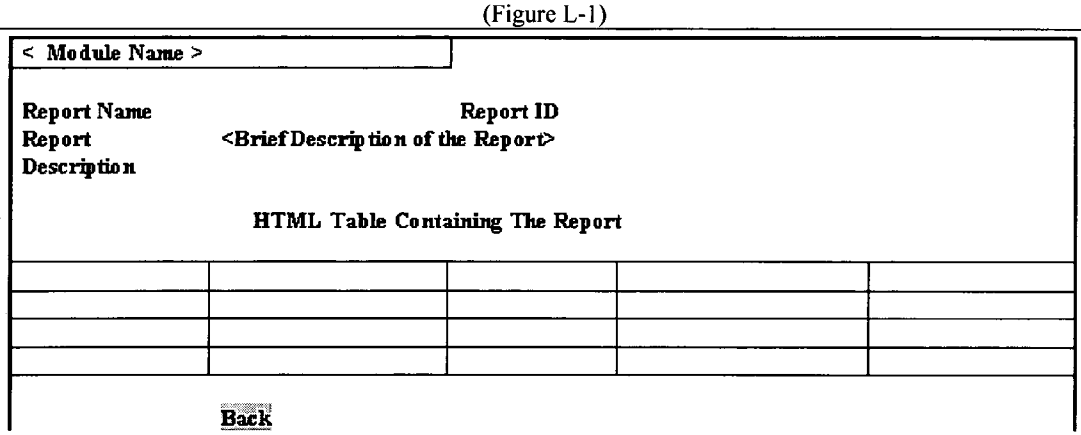
(Figure L-2)

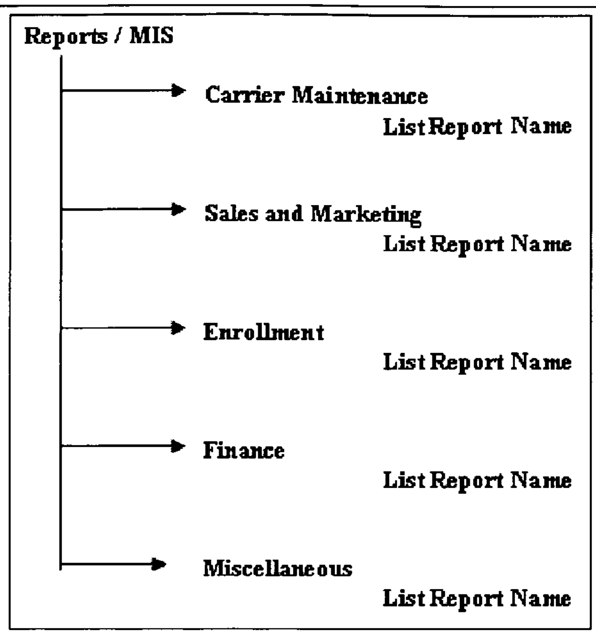
(Figure L-3)

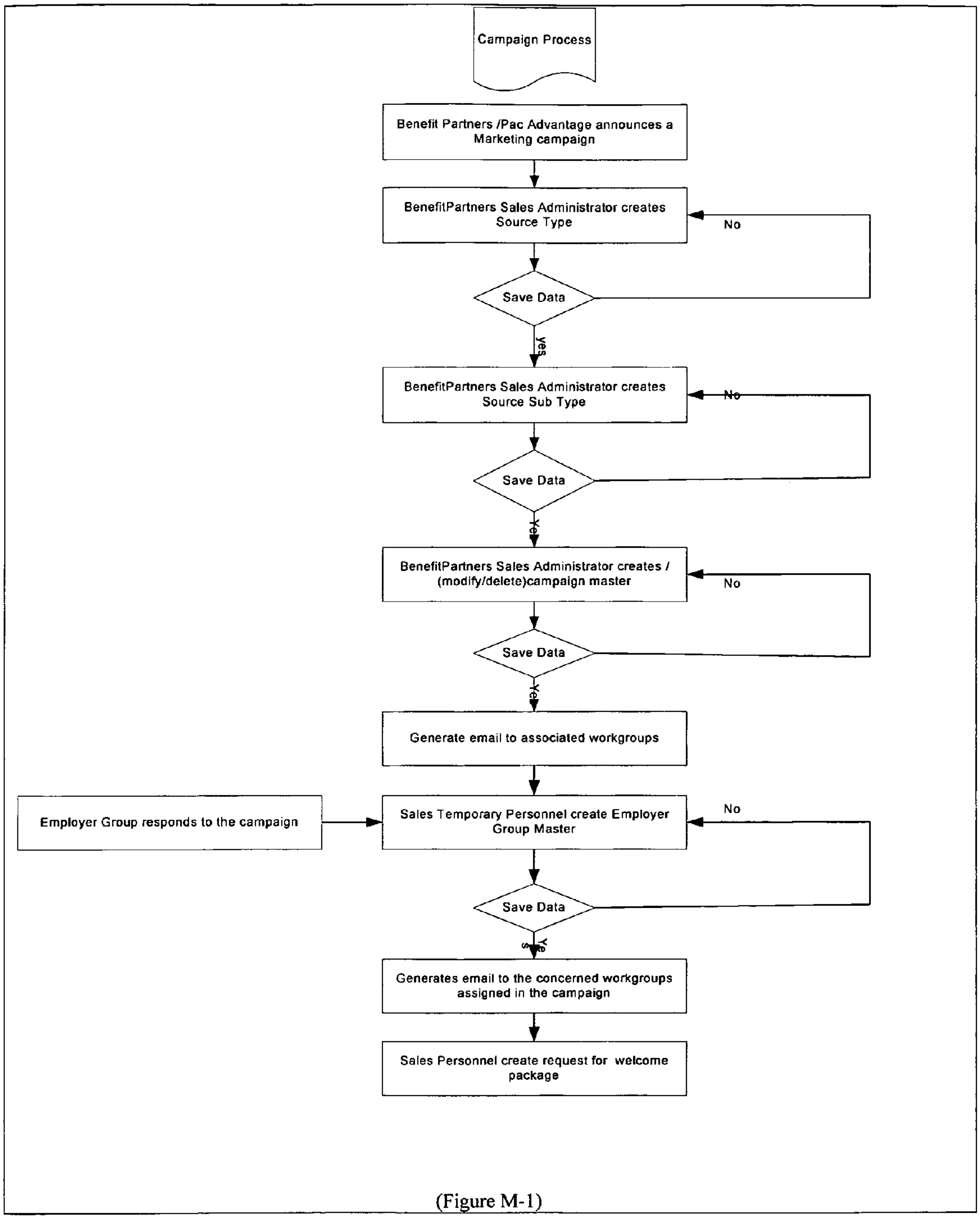
(Figure M-1)

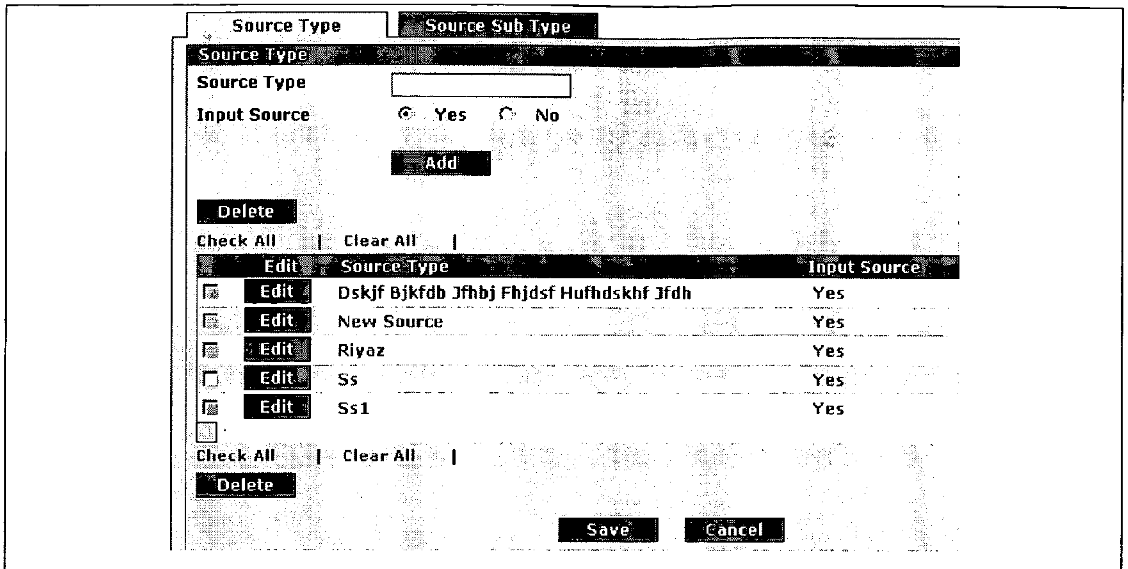
(Figure M-2)
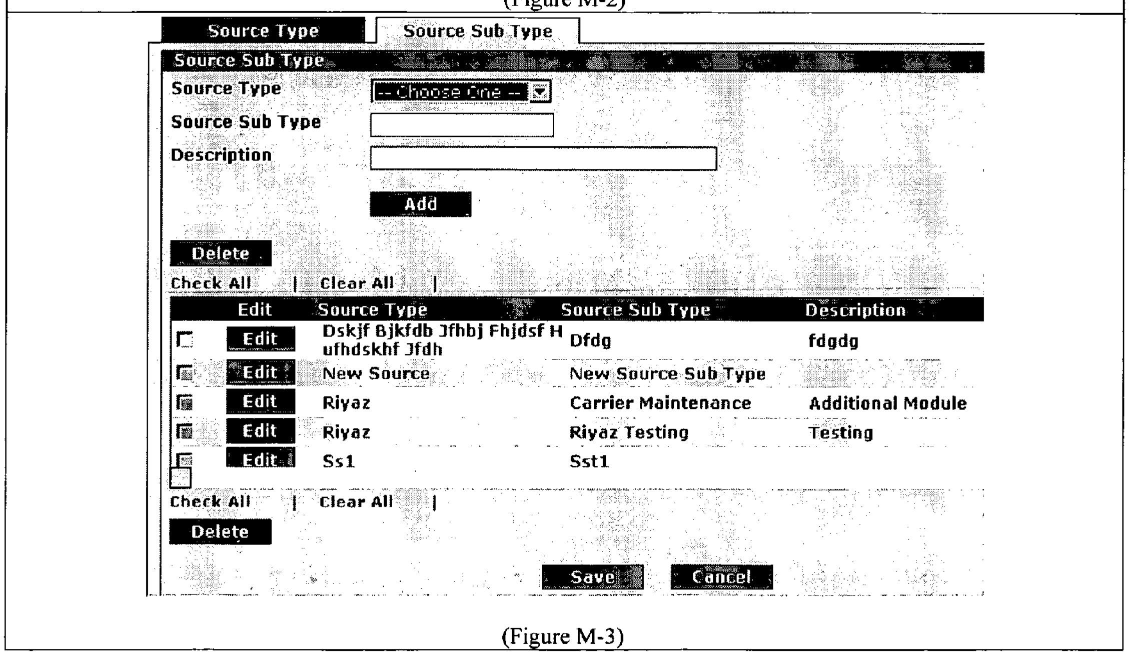
(Figure M-3)

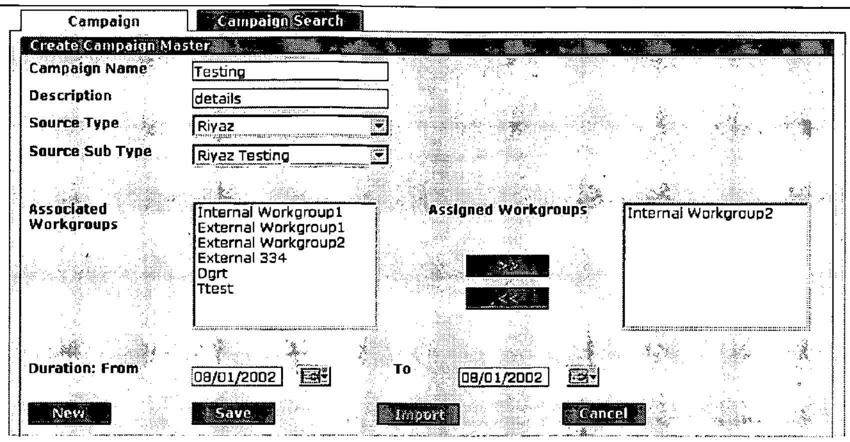
(Figure M-4)
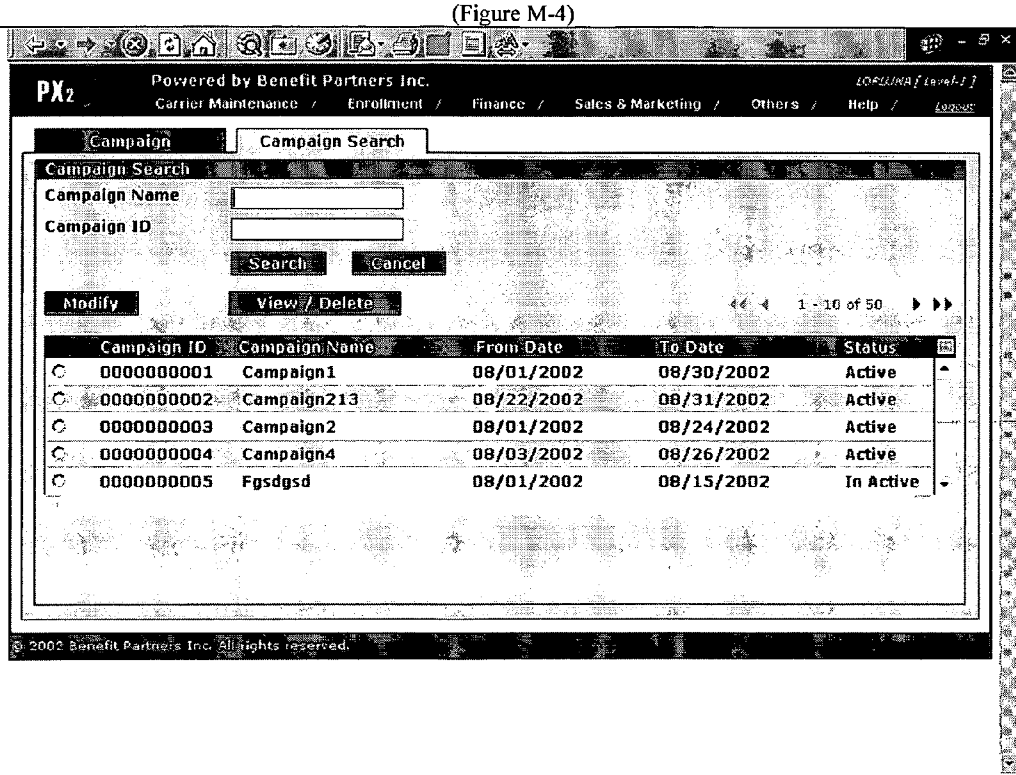
(Figure M-5)

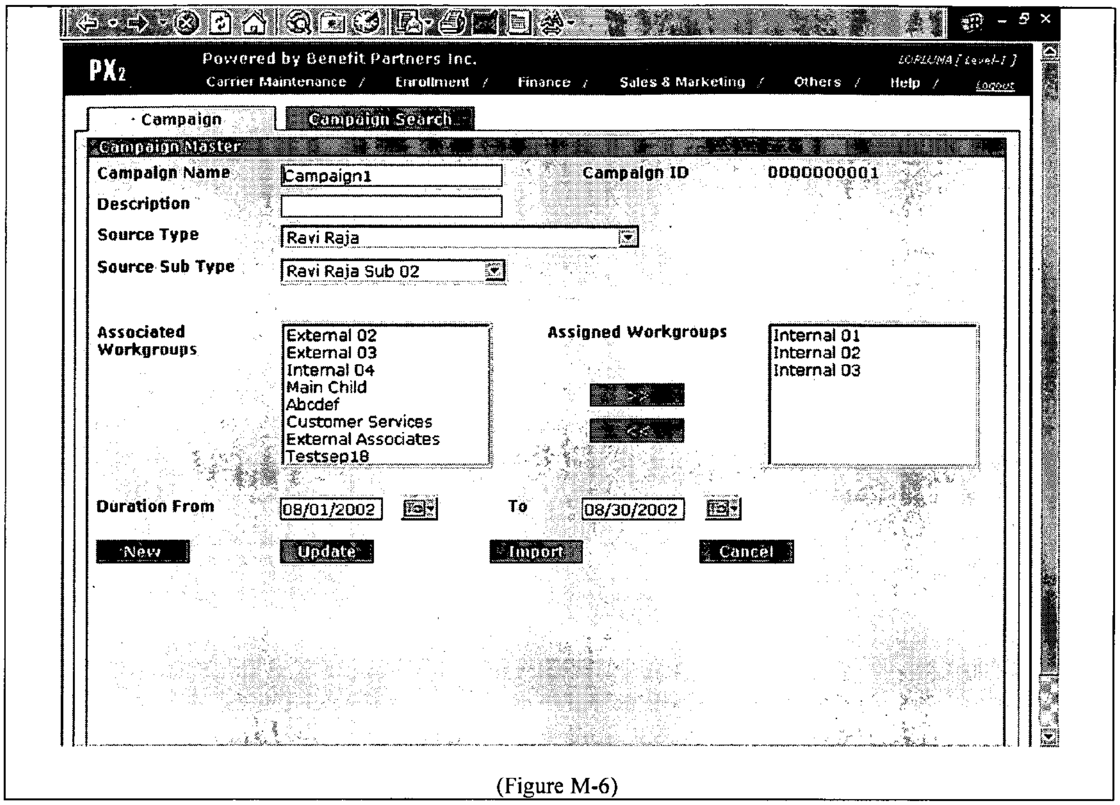
(Figure M-6)

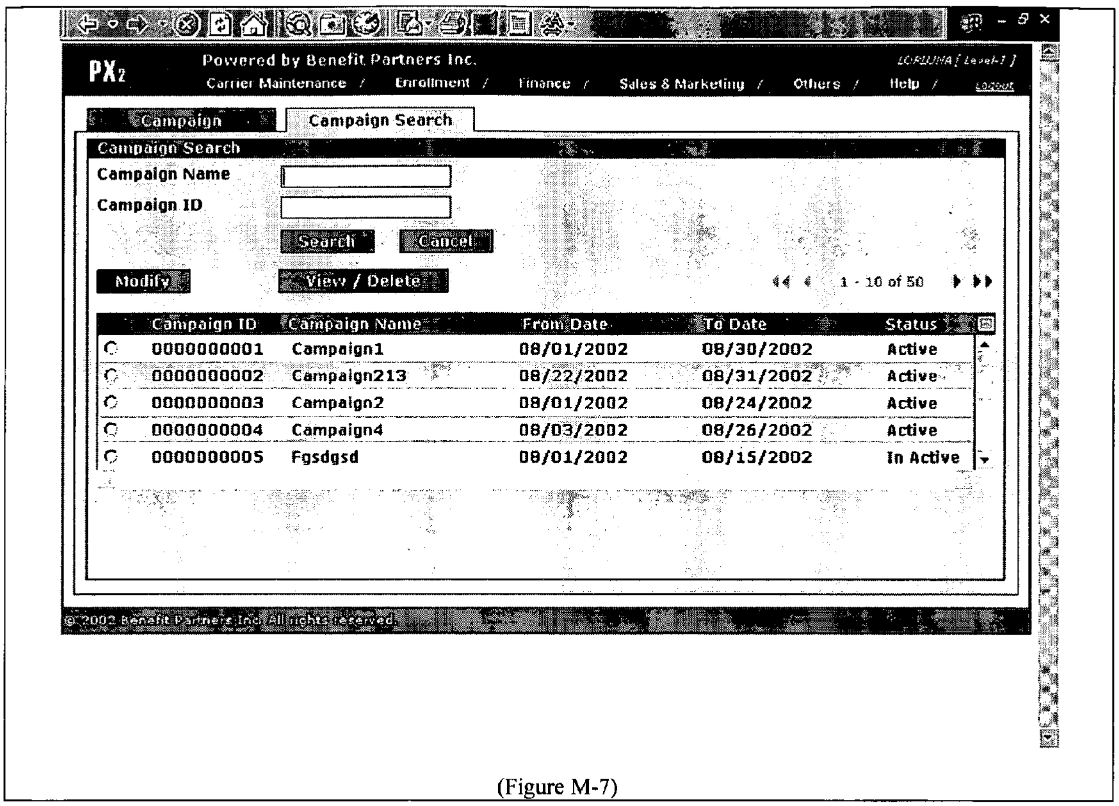
(Figure M-7)

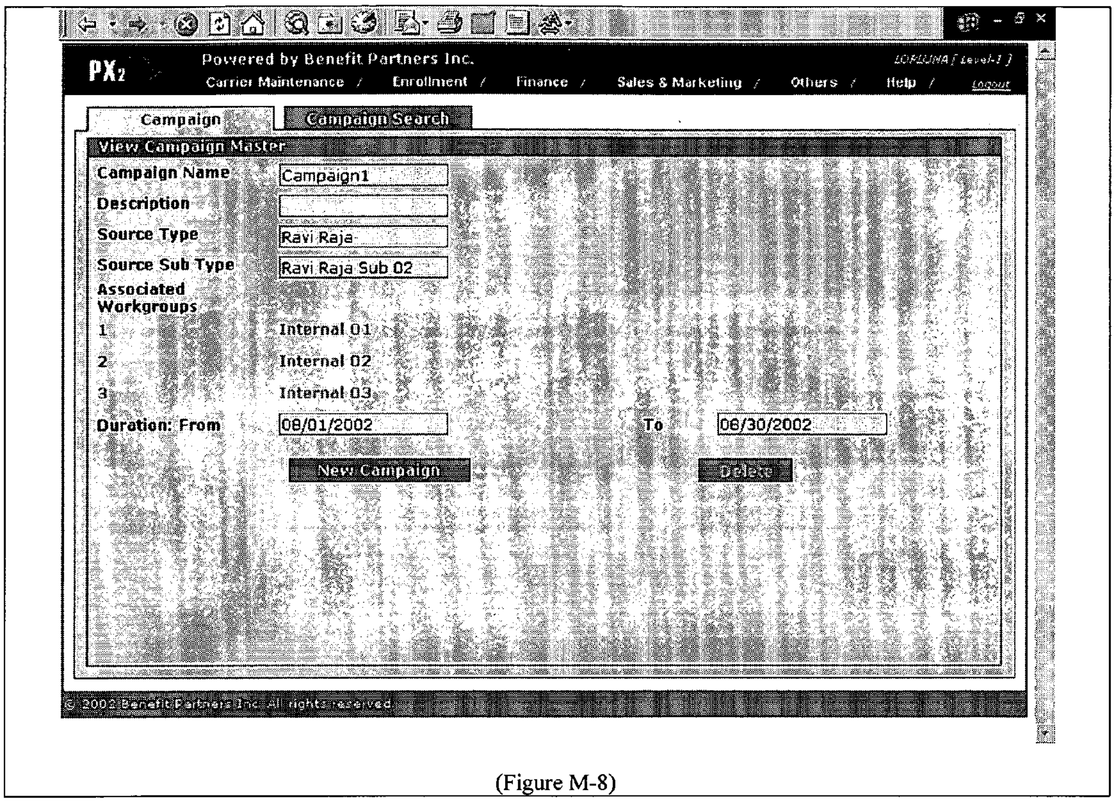
(Figure M-8)

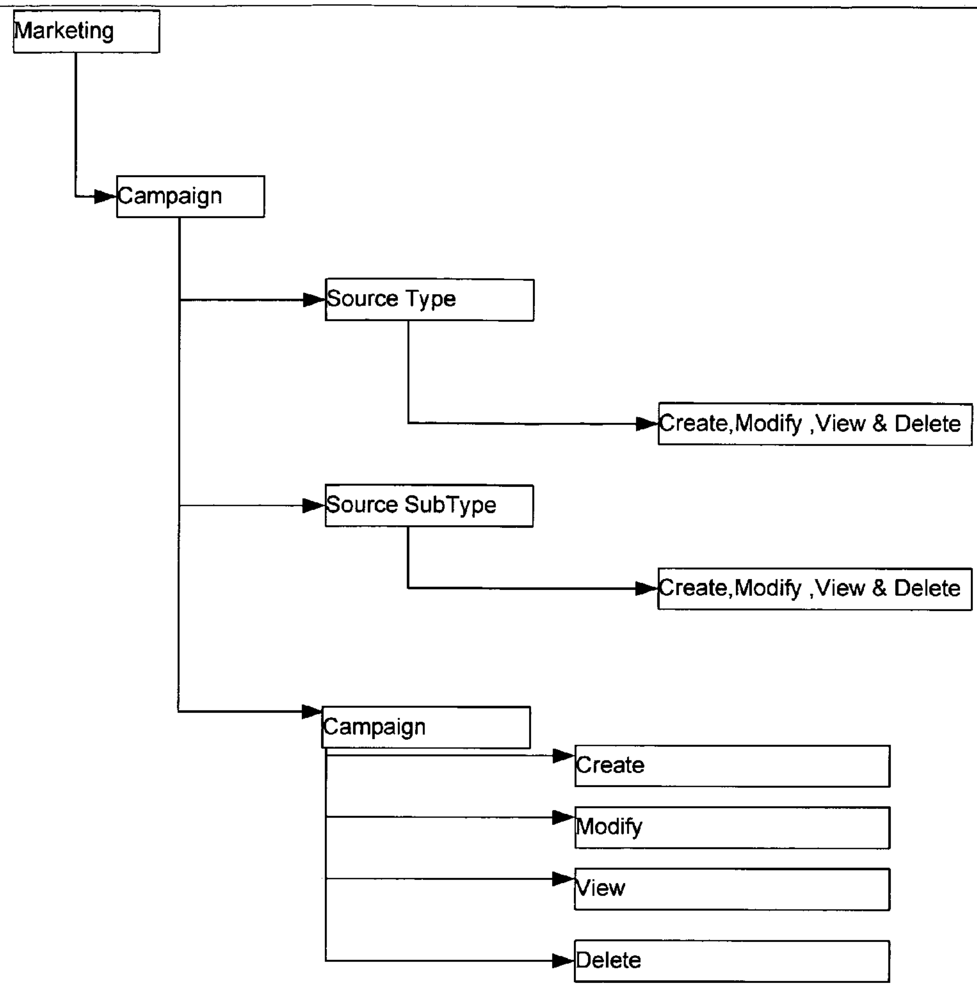
(Figure M-9)

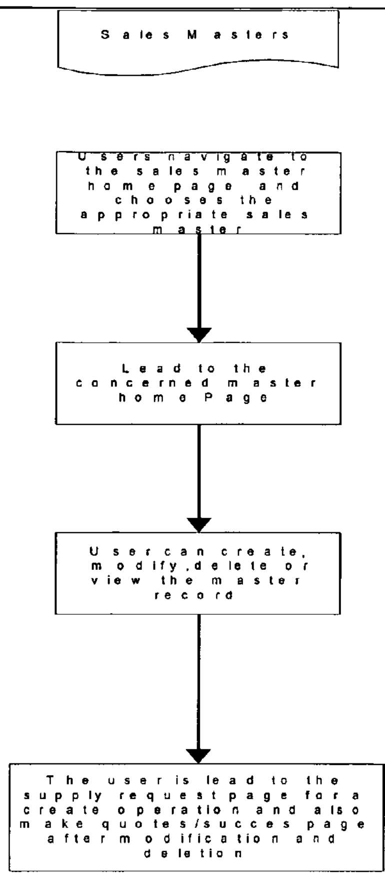
(Figure M-10)

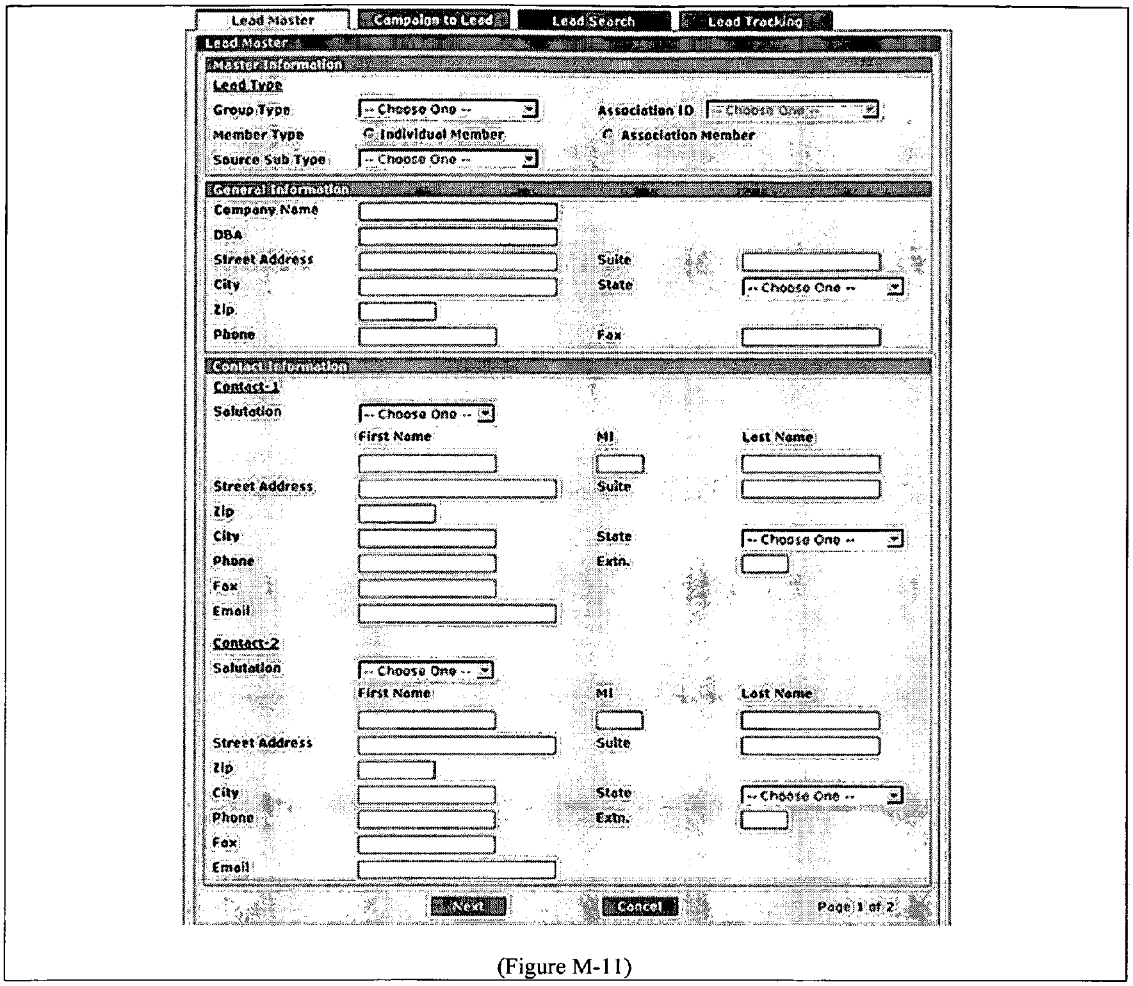
(Figure M-11)

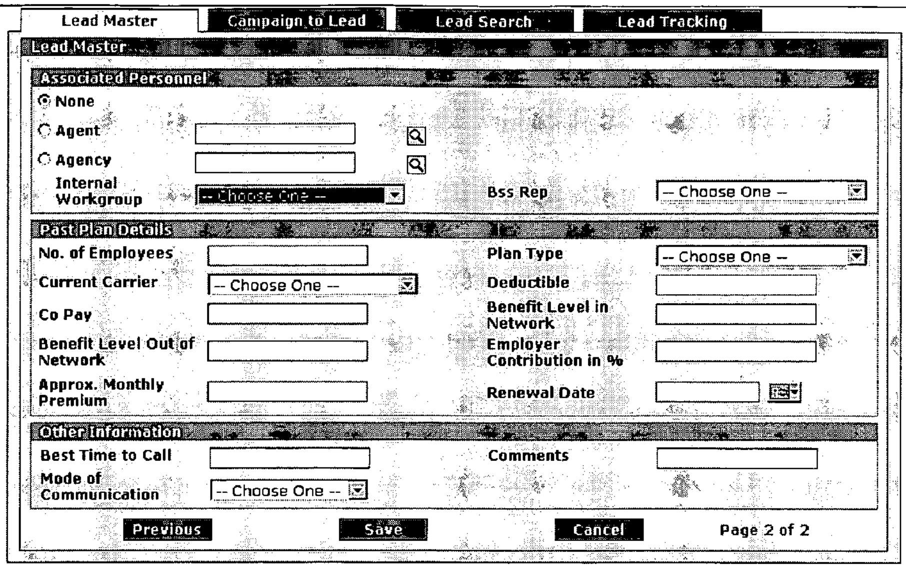
(Figure M-12)
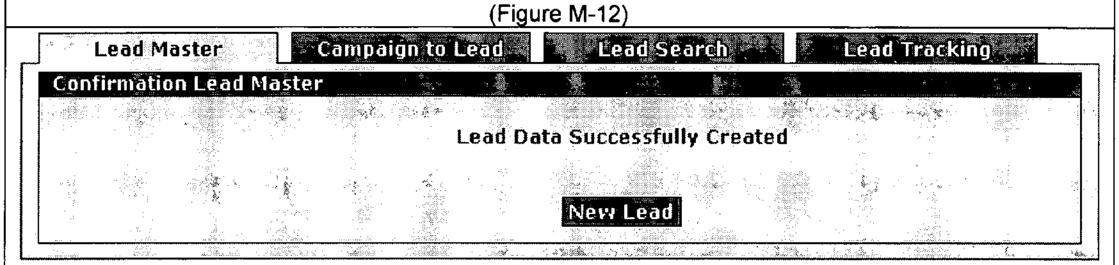
(Figure M-13)
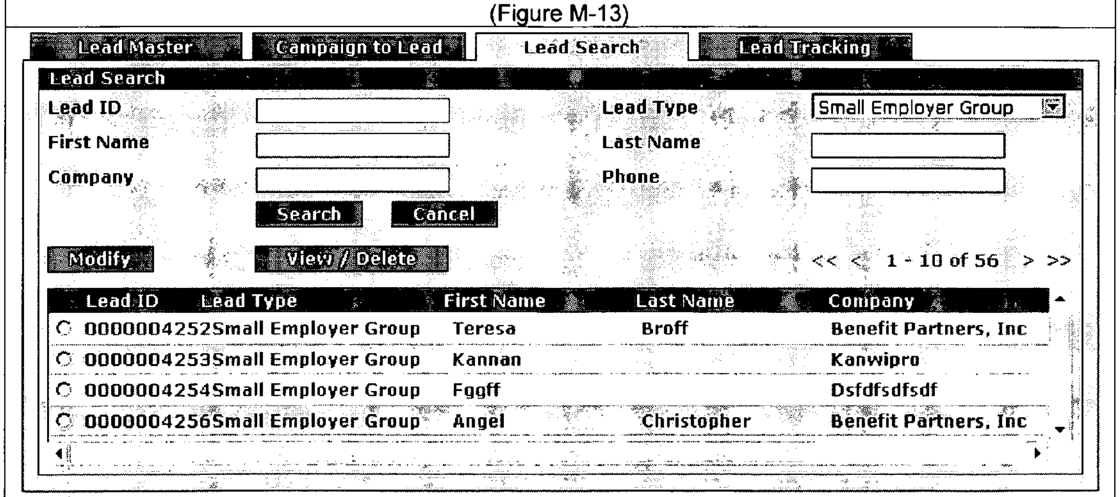
(Figure M-14)

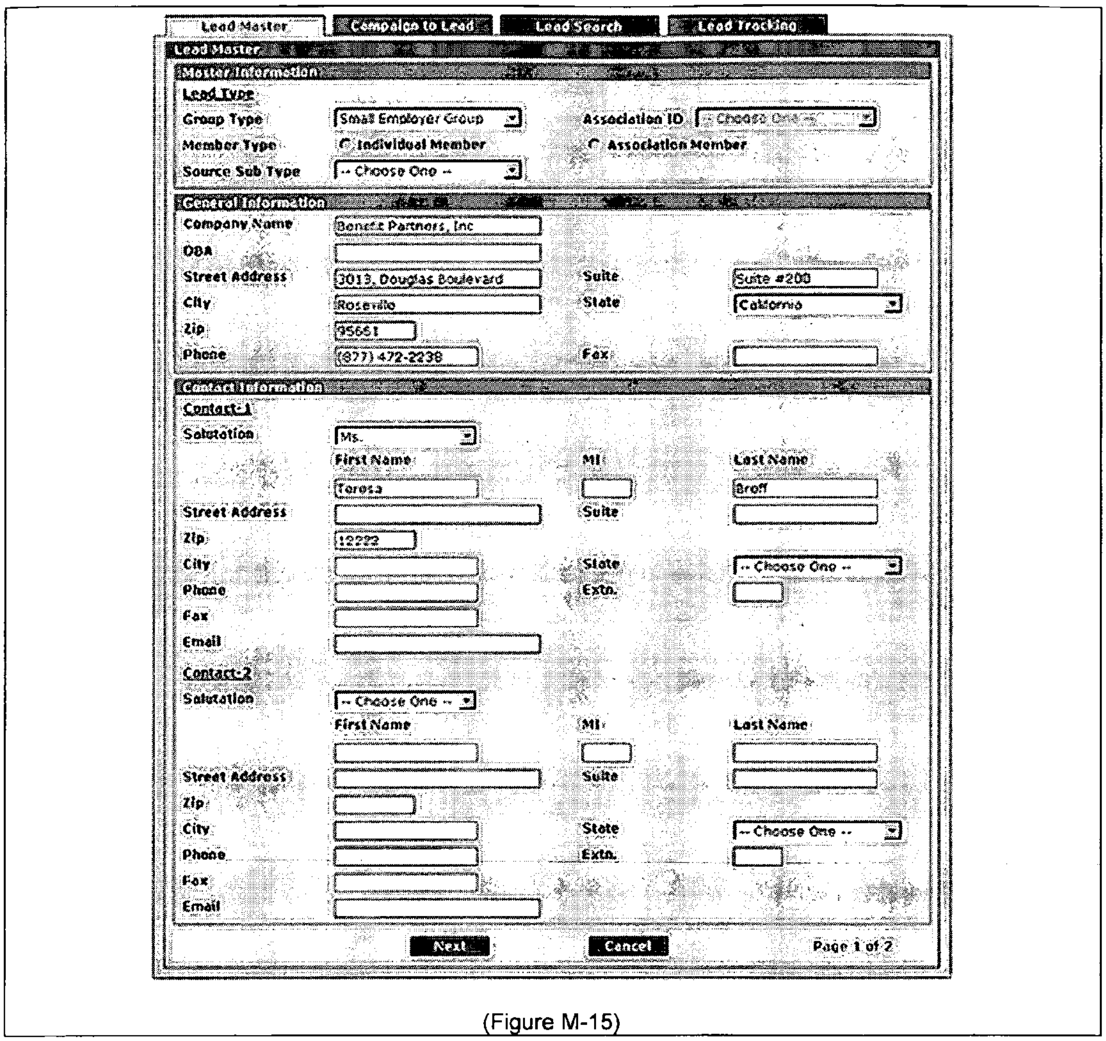
(Figure M-15)

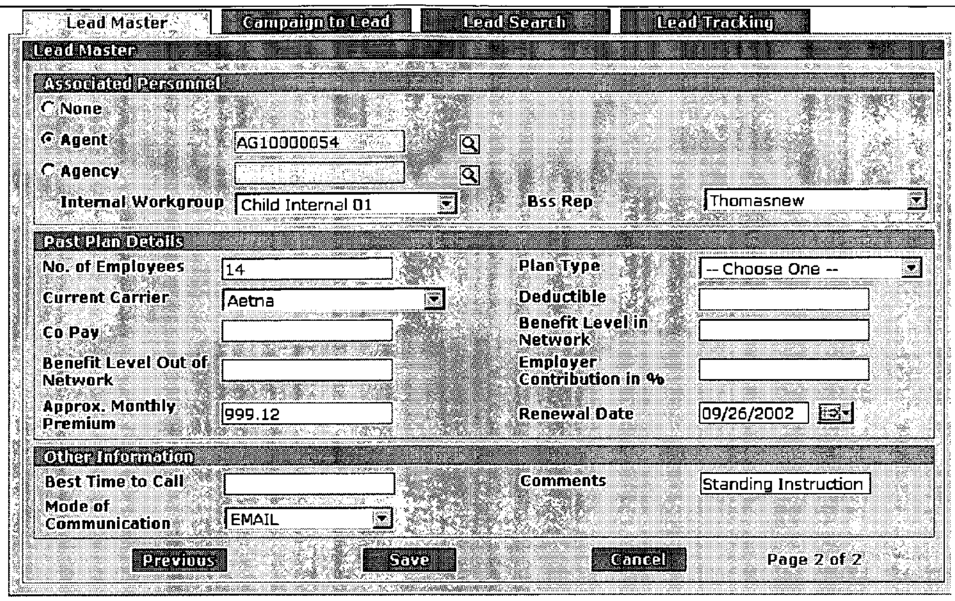
(Figure M-16)
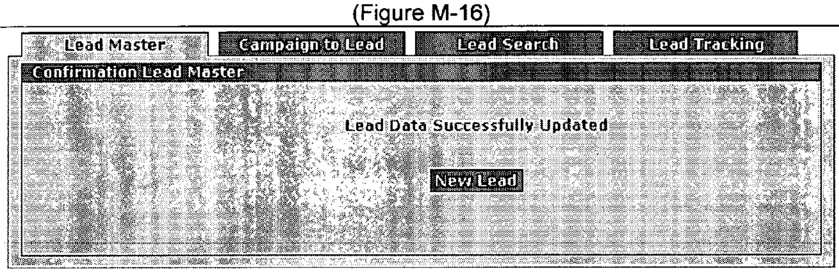
(Figure M-17)

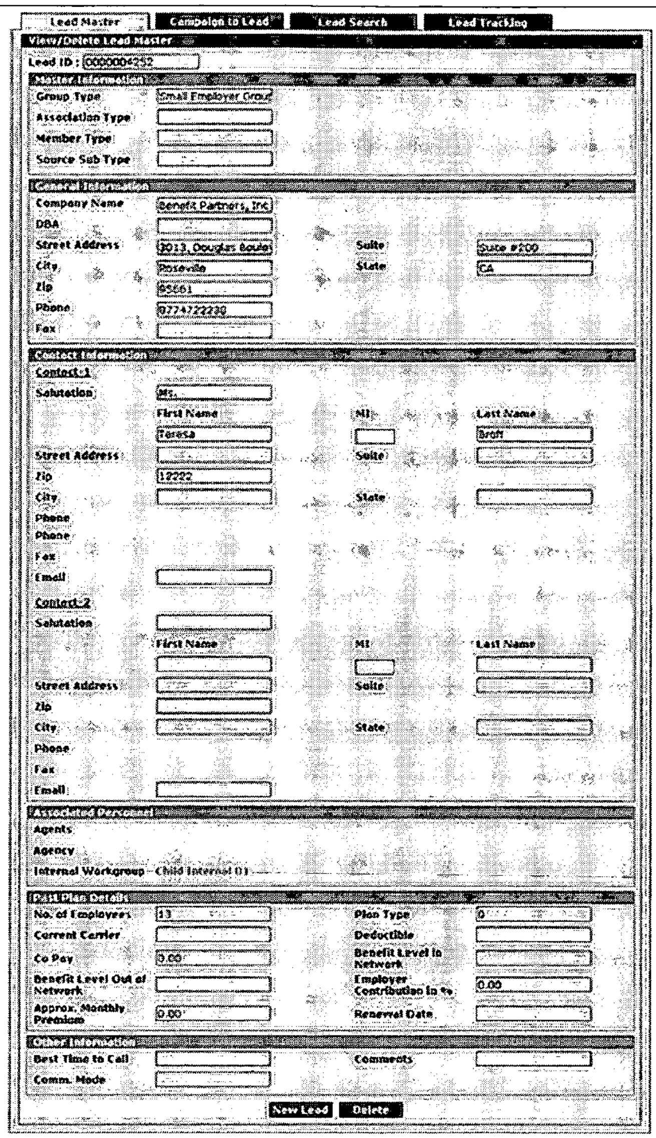
(Figure M-18)

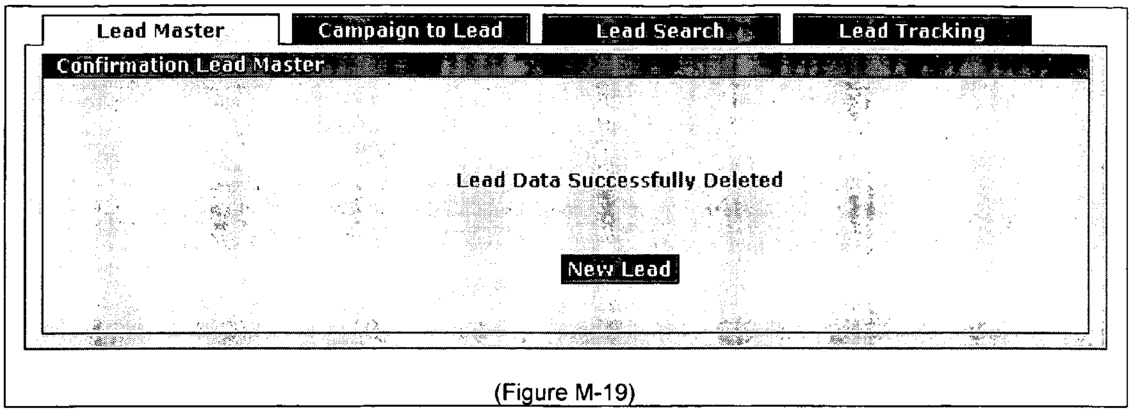
(Figure M-19)

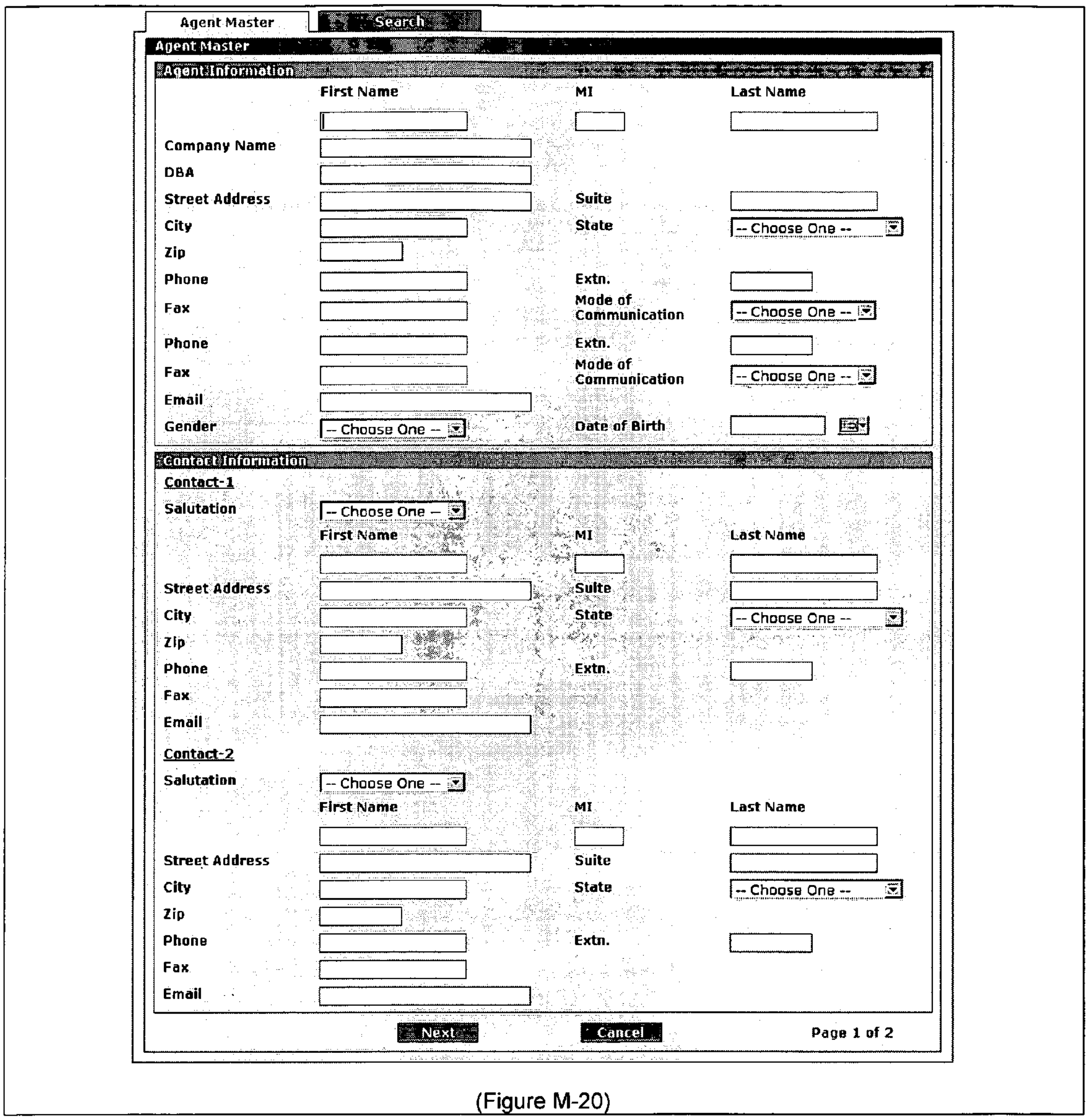
(Figure M-20)

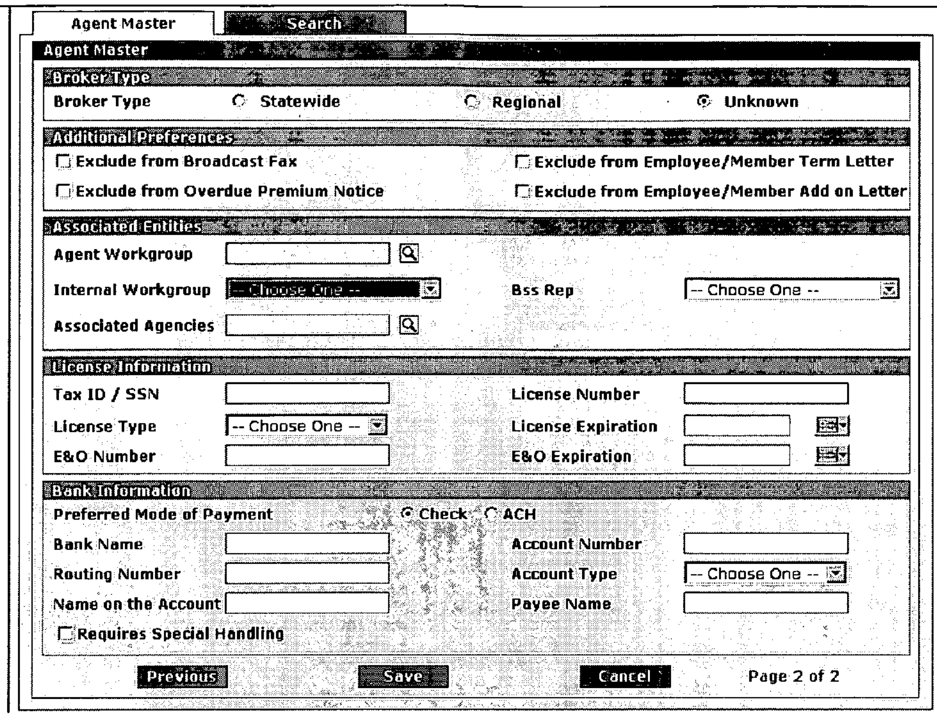
(Figure M-21)
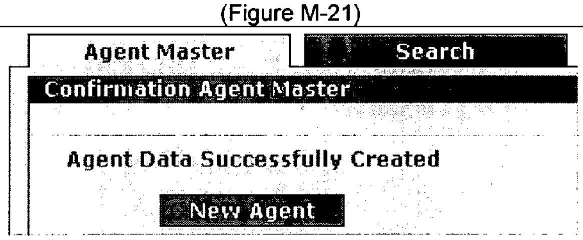
(Figure M-22)

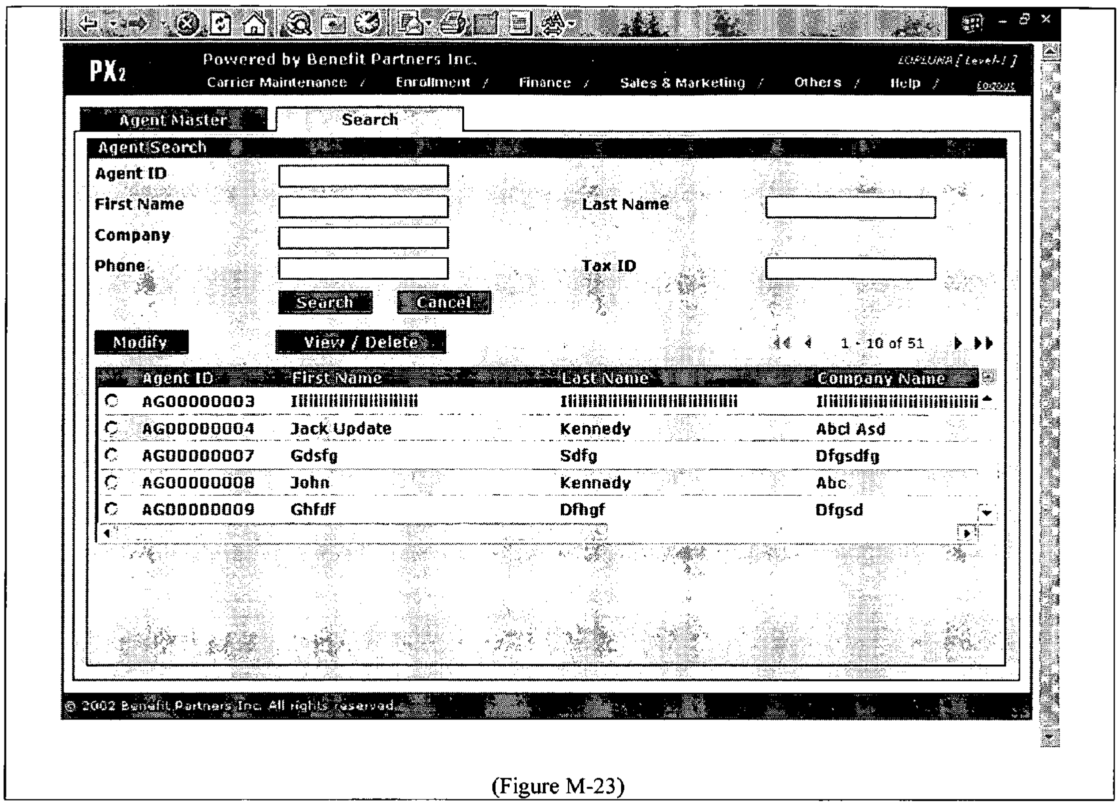
(Figure M-23)

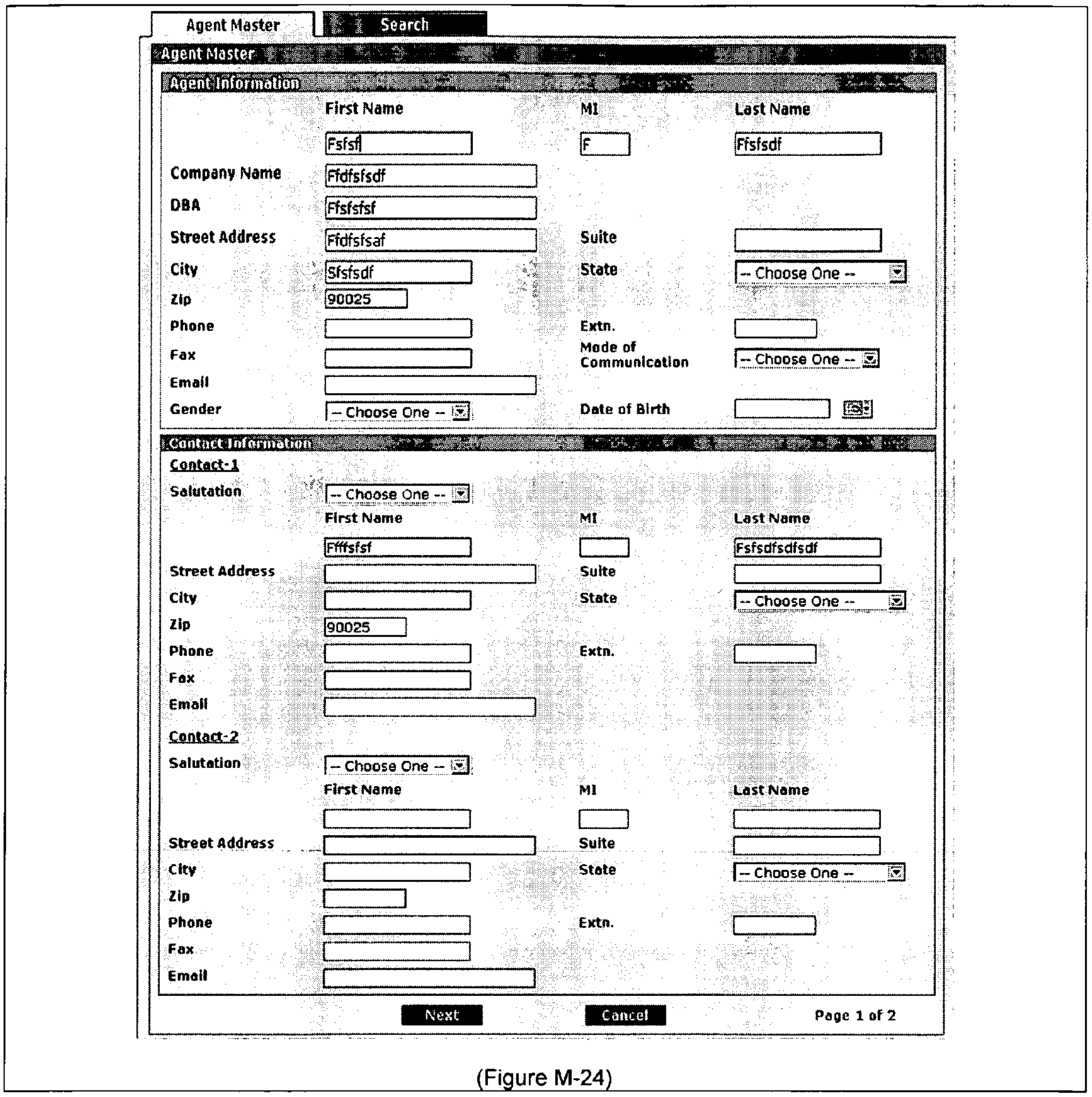
(Figure M-24)

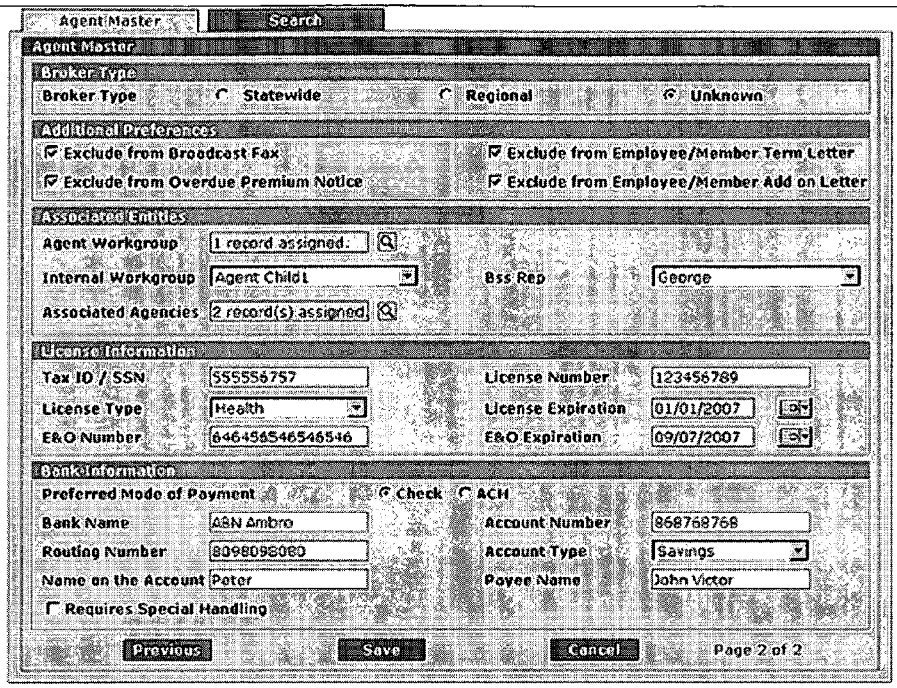
(Figure M-25)
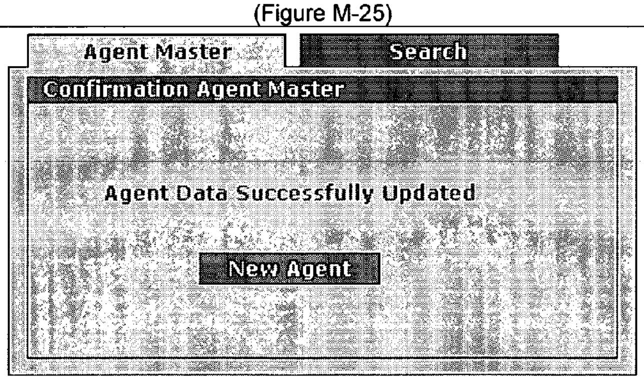
(Figure M-26)

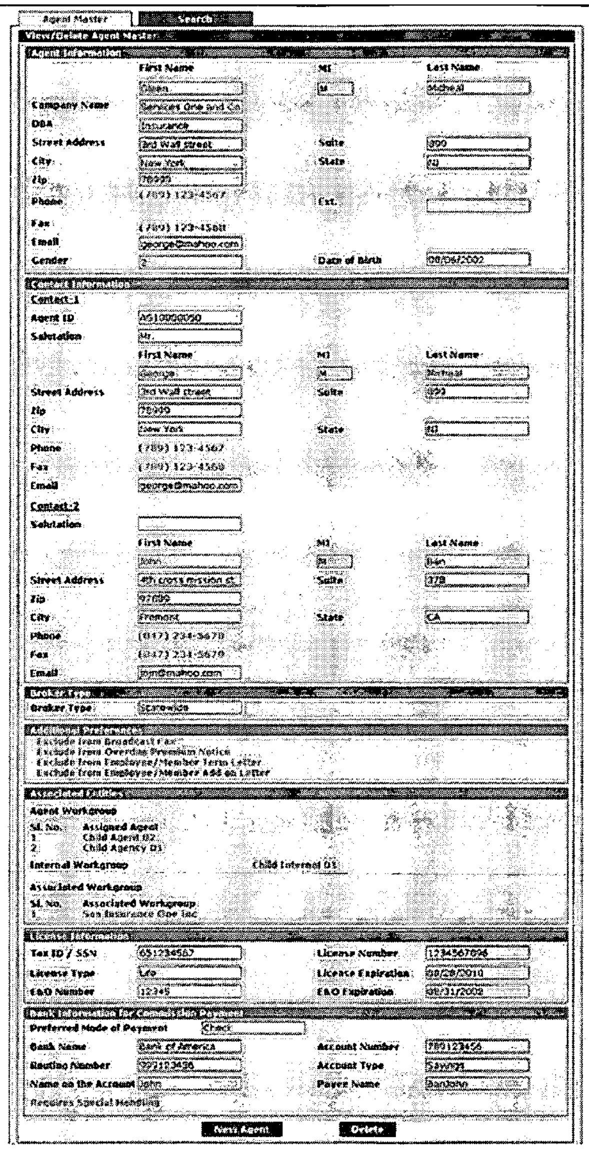
(Figure M-27)

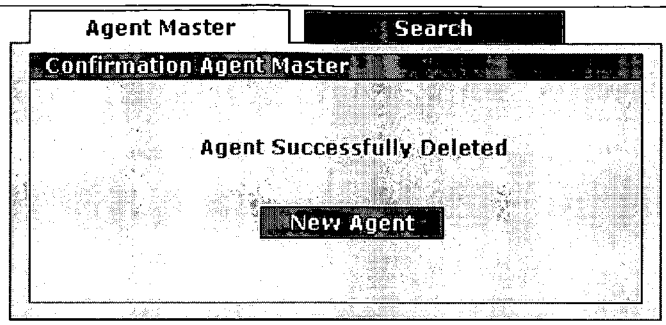
(Figure M-28)
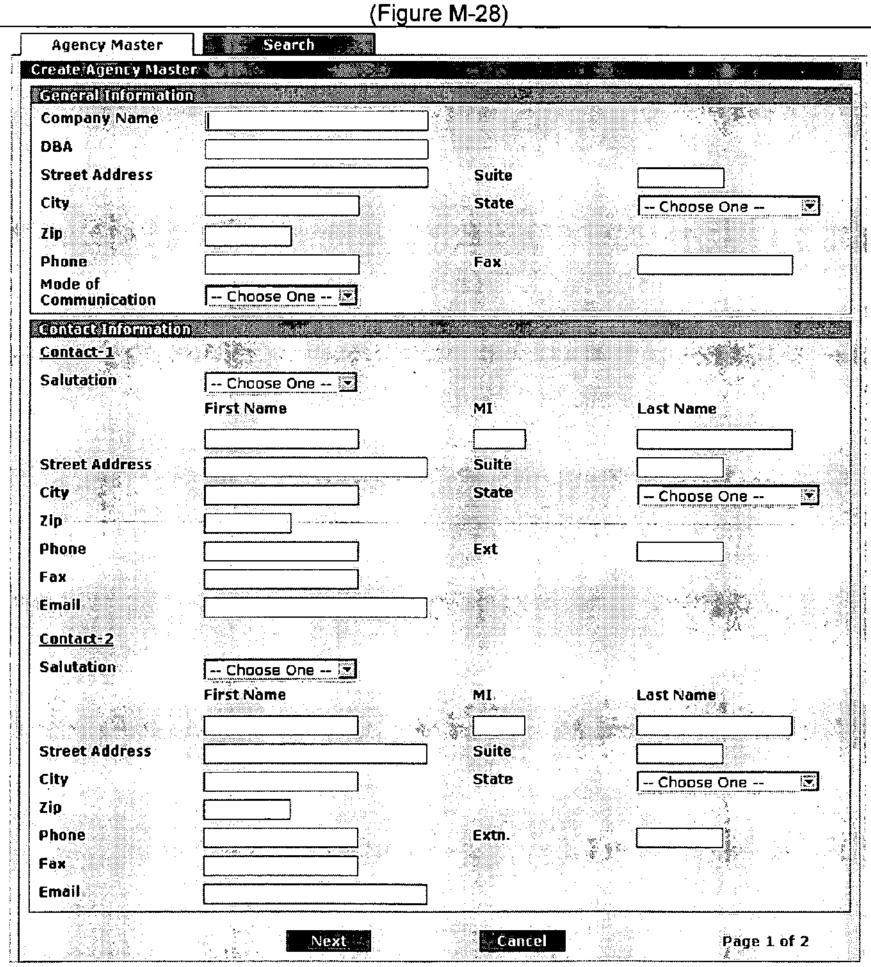
(Figure M-29)

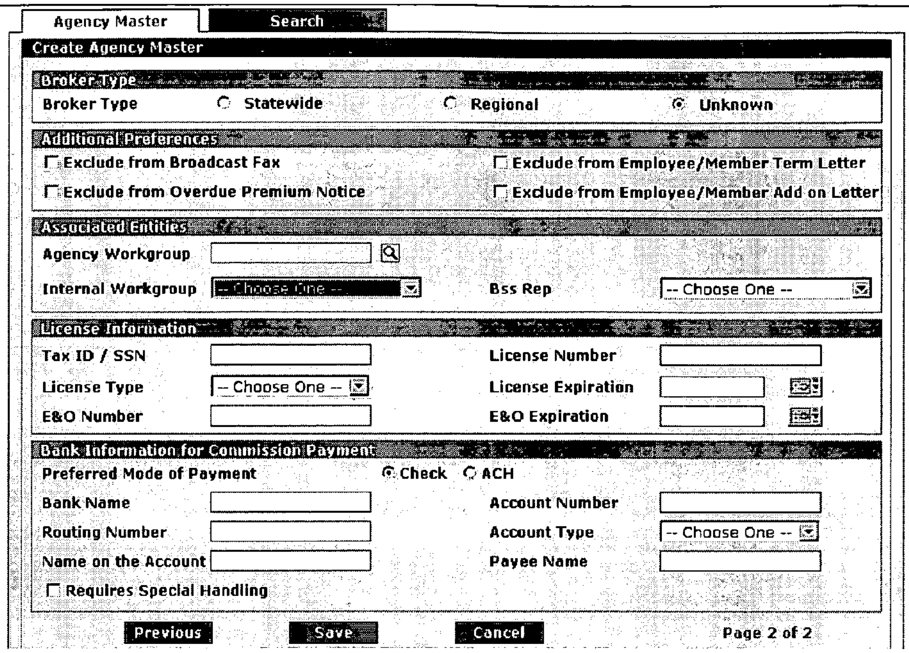
(Figure M-30)
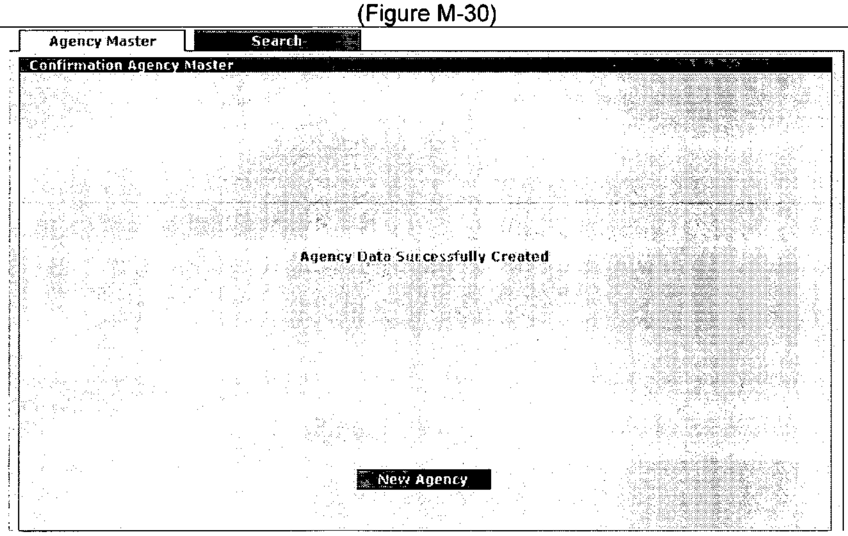
(Figure M-31)

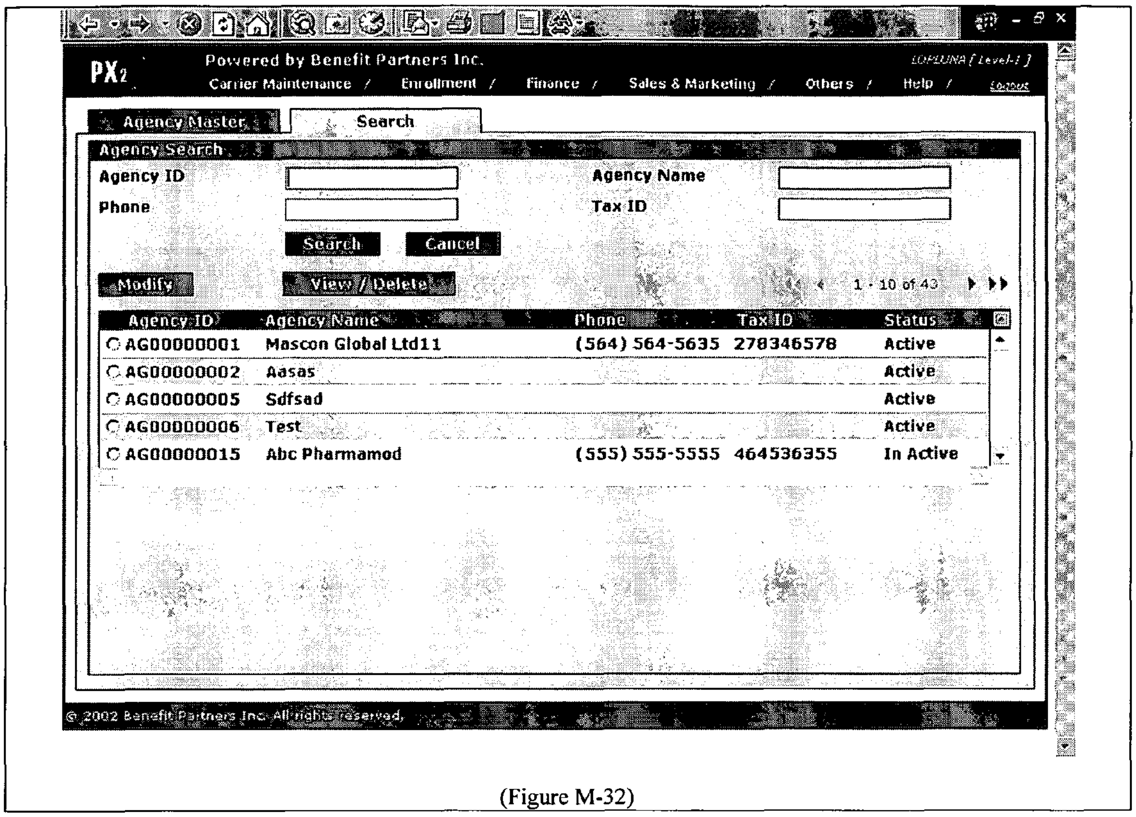
(Figure M-32)

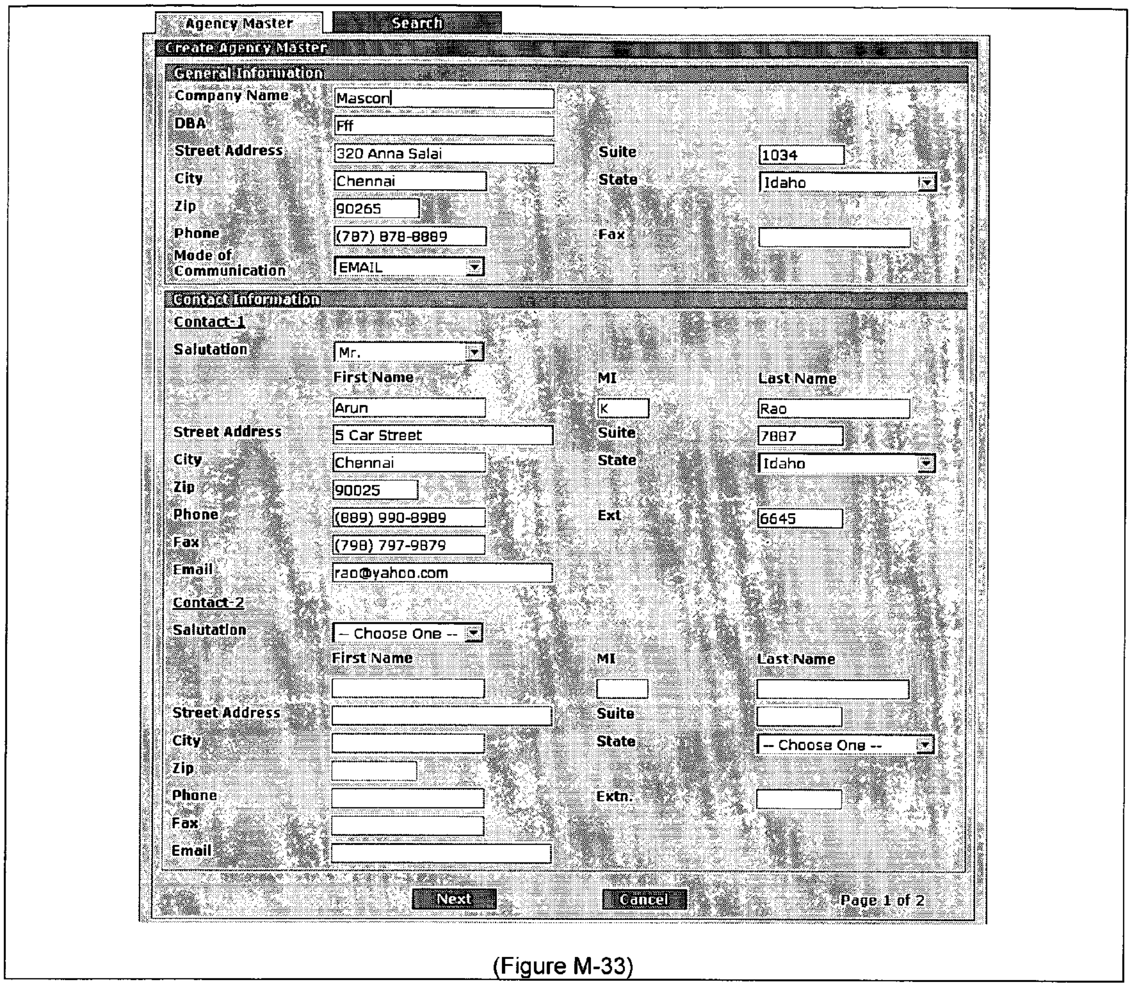
(Figure M-33)

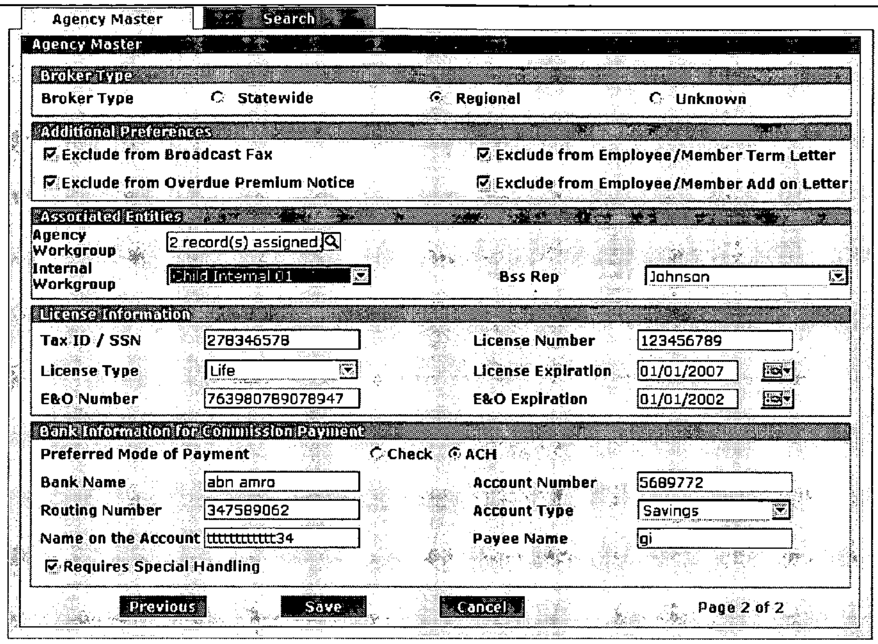
(Figure M-34)
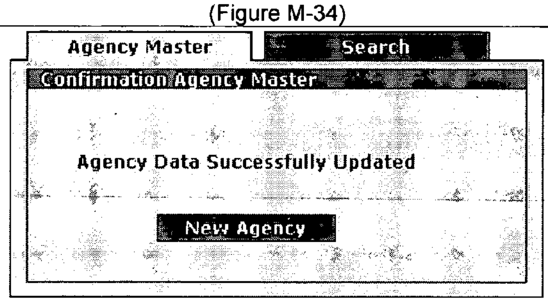
(Figure M-35)

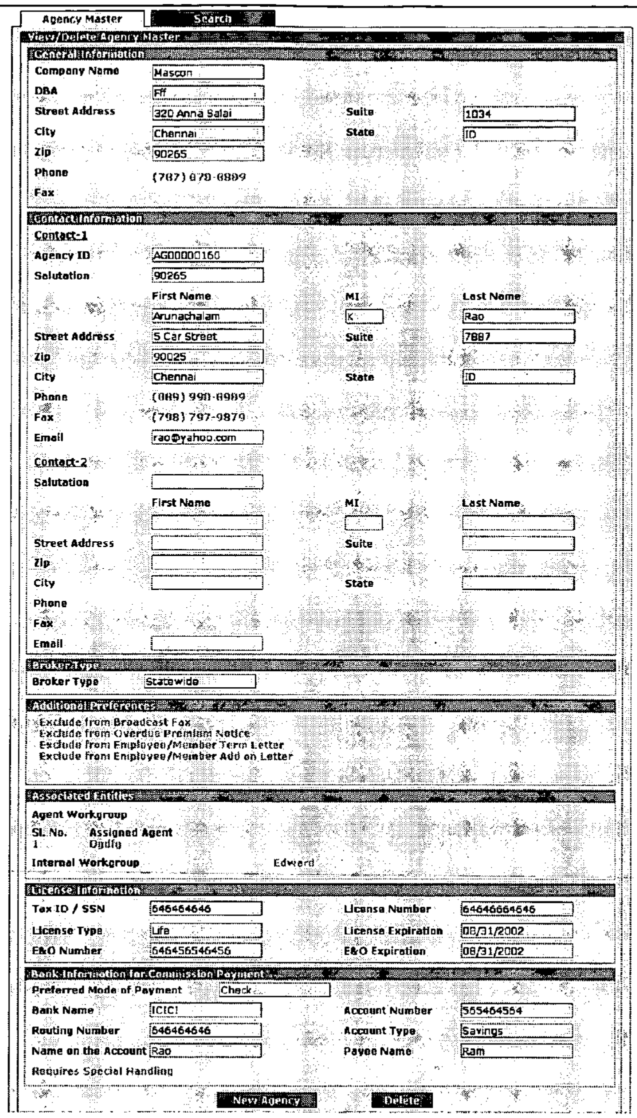
(Figure M-36)

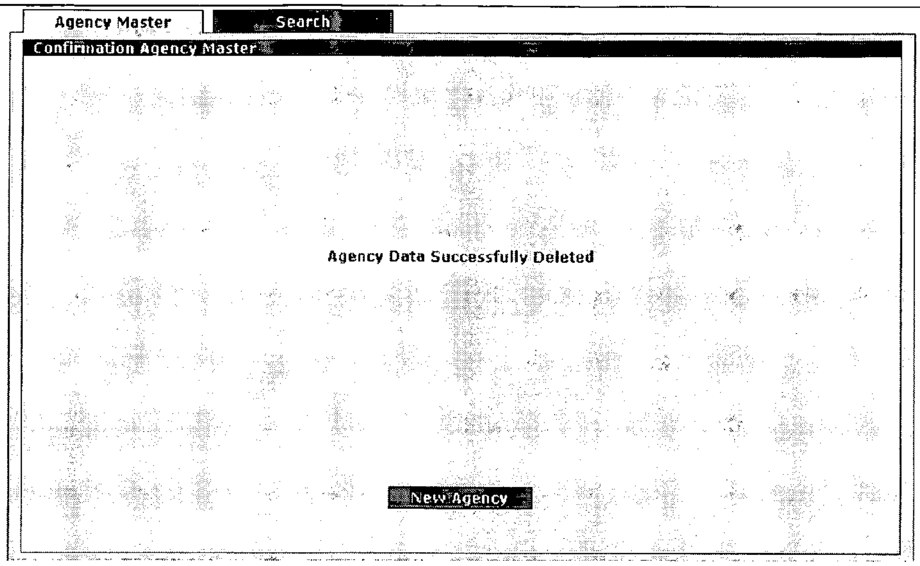
(Figure M-37)
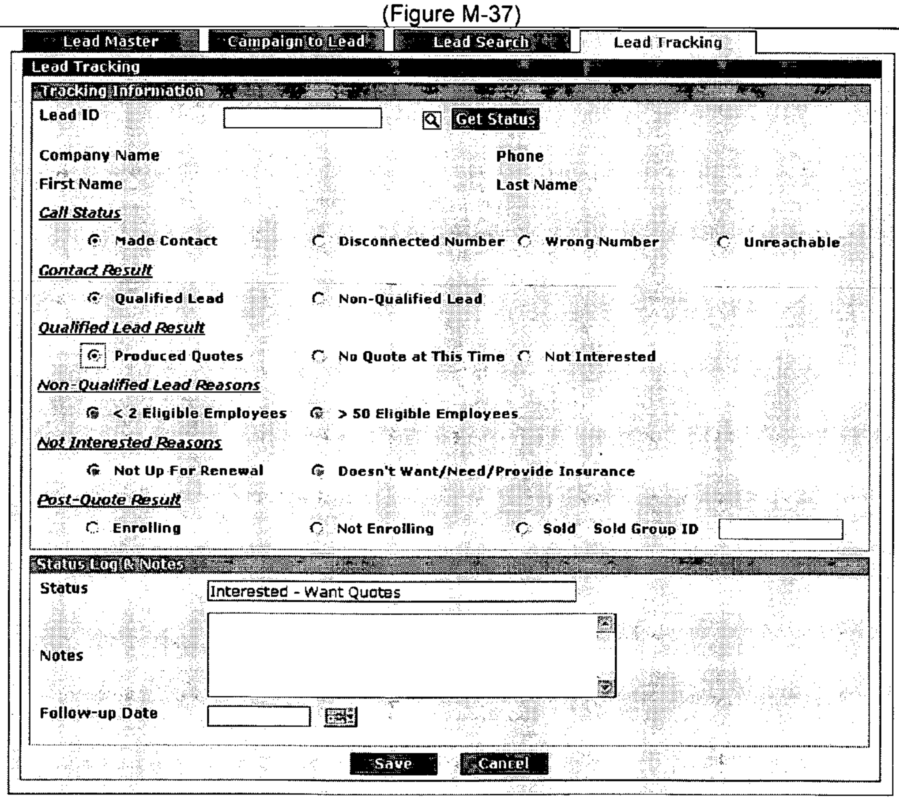
(Figure M-38)

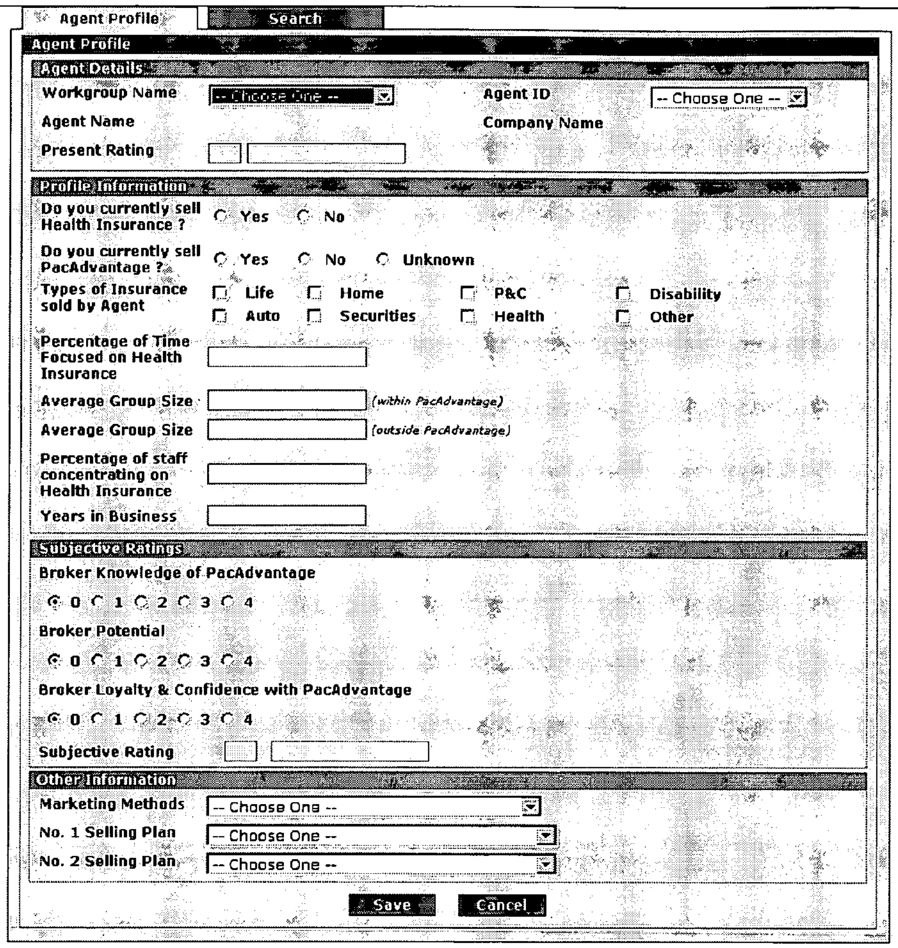
(Figure M-39)
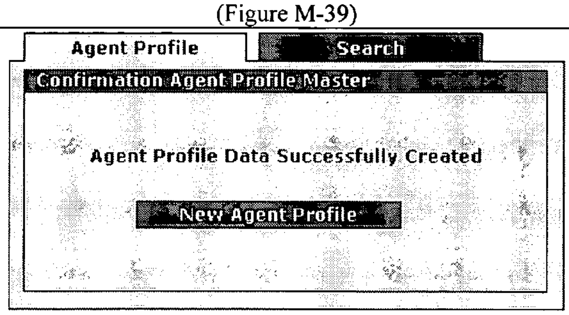
(Figure M-40)

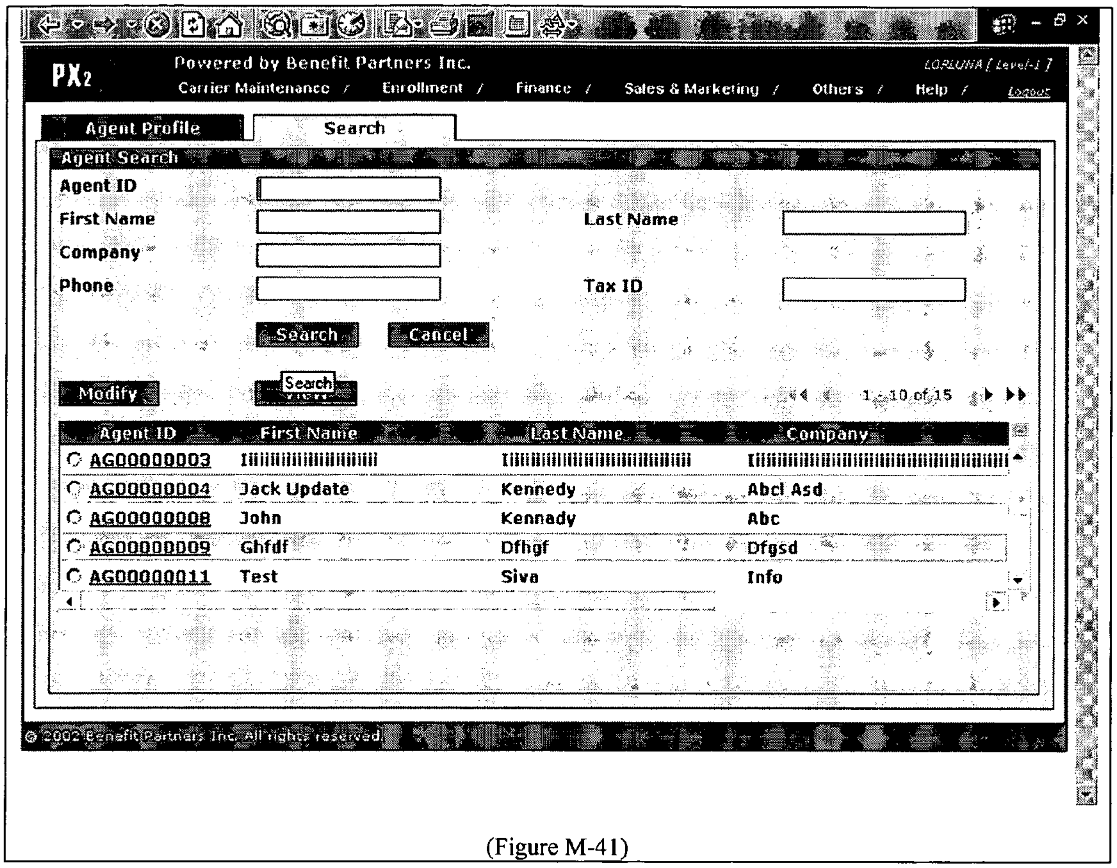
(Figure M-41)

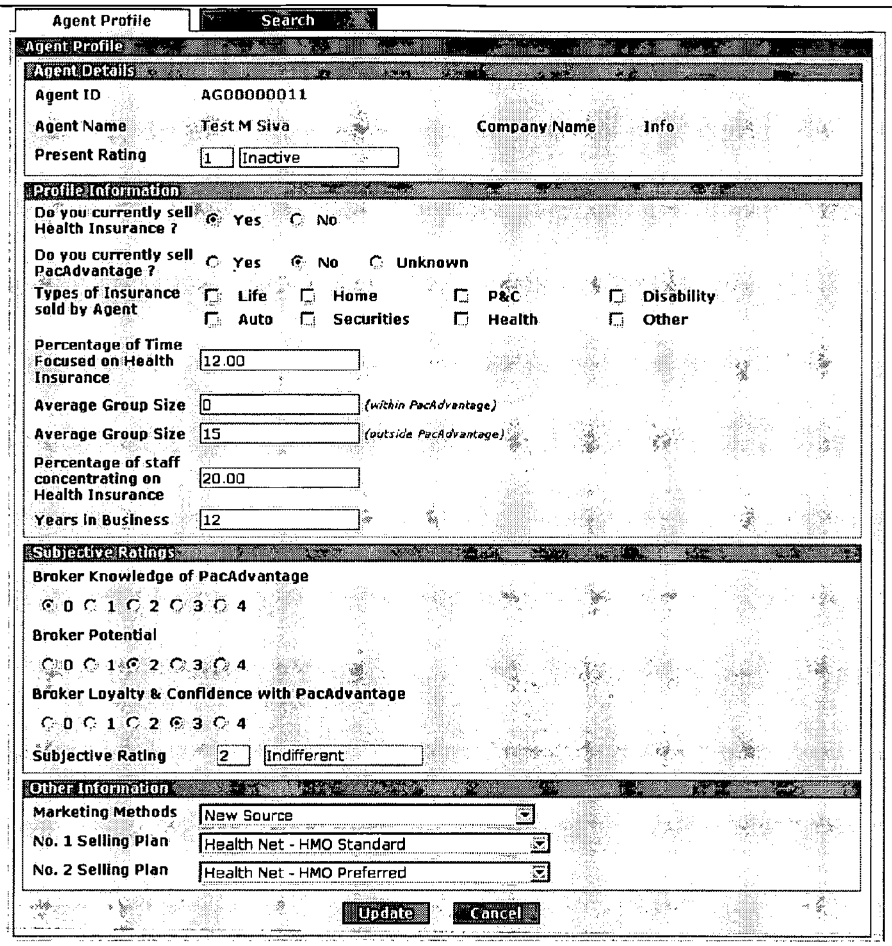
(Figure M-42)
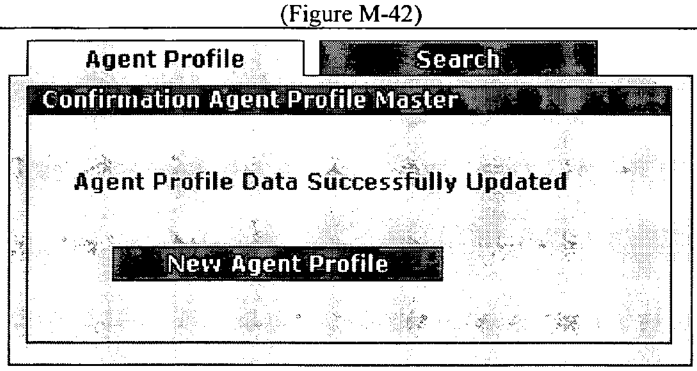
(Figure M-43)

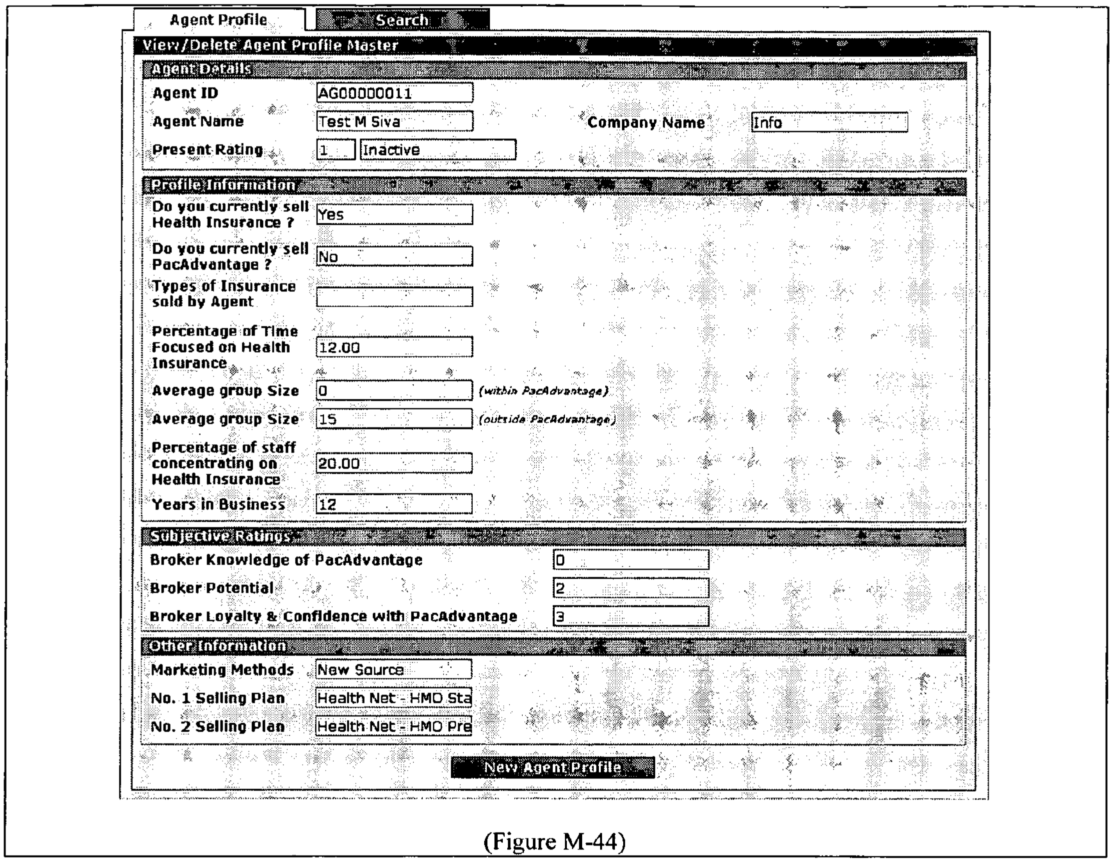
(Figure M-44)

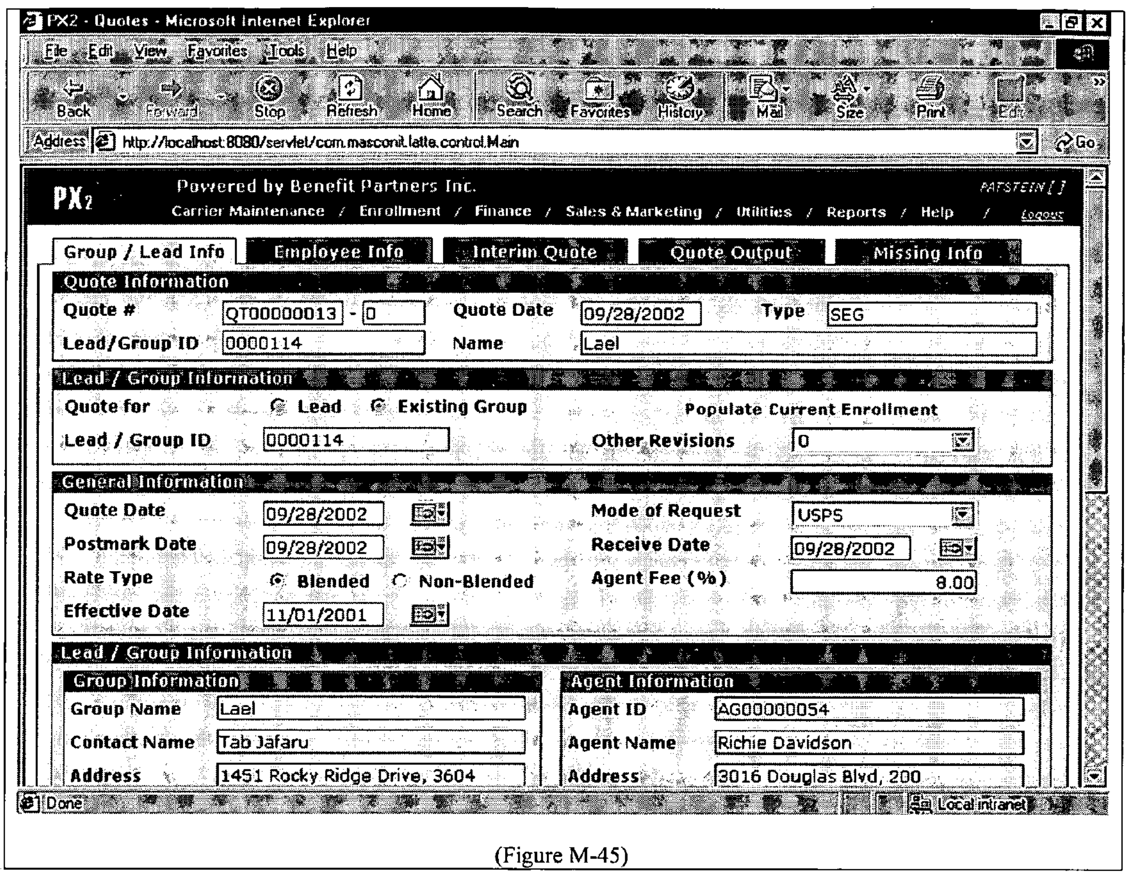
(Figure M-45)

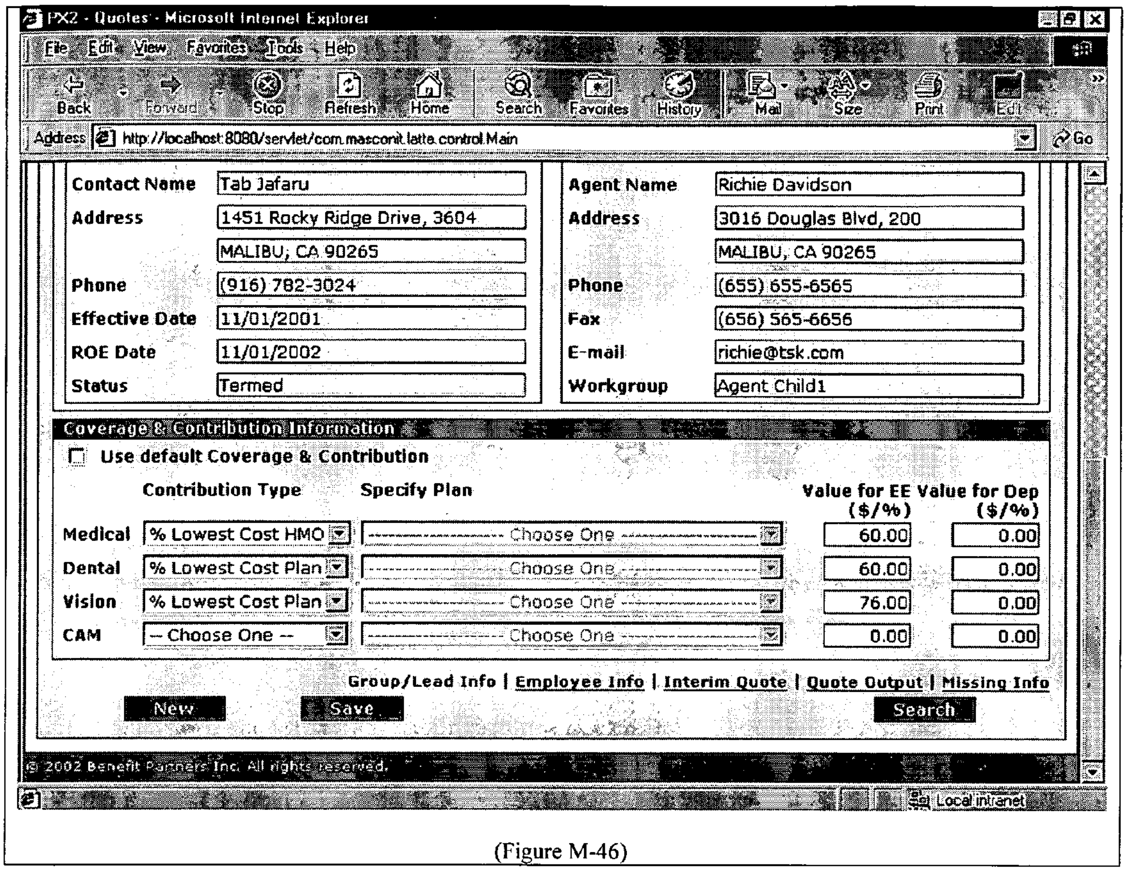
(Figure M-46)

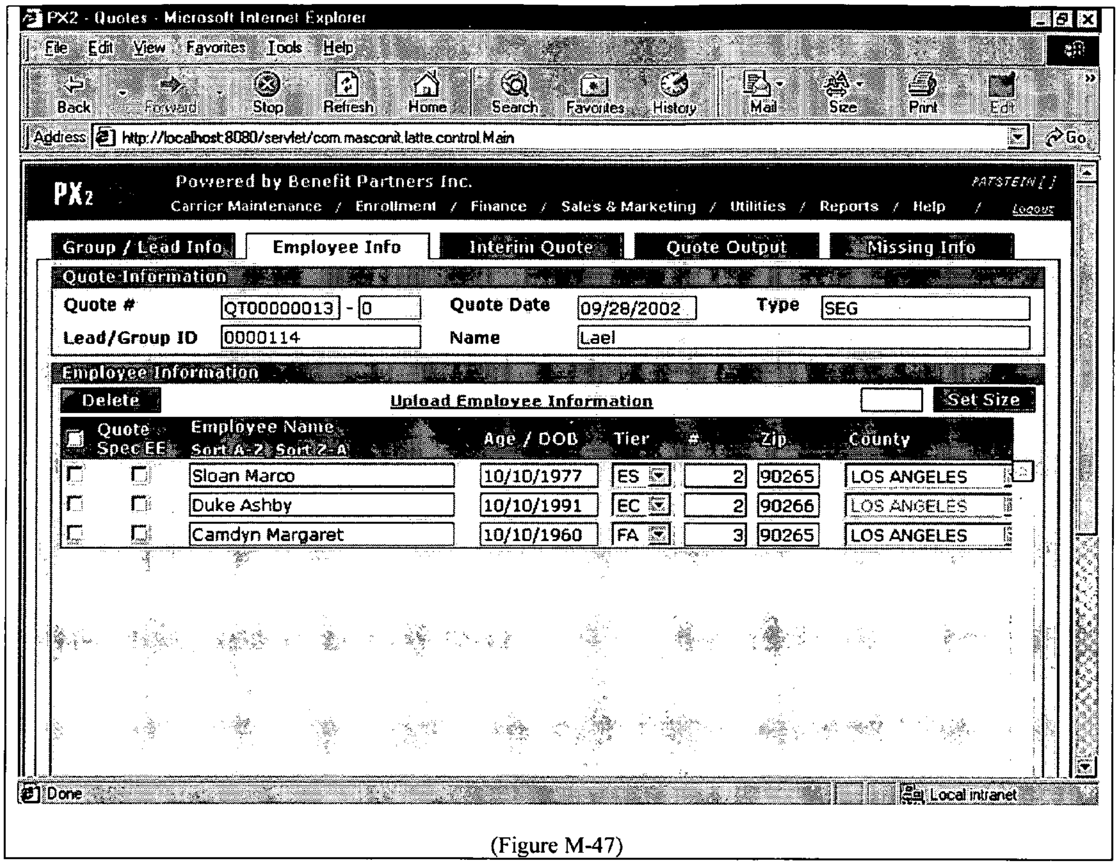
(Figure M-47)

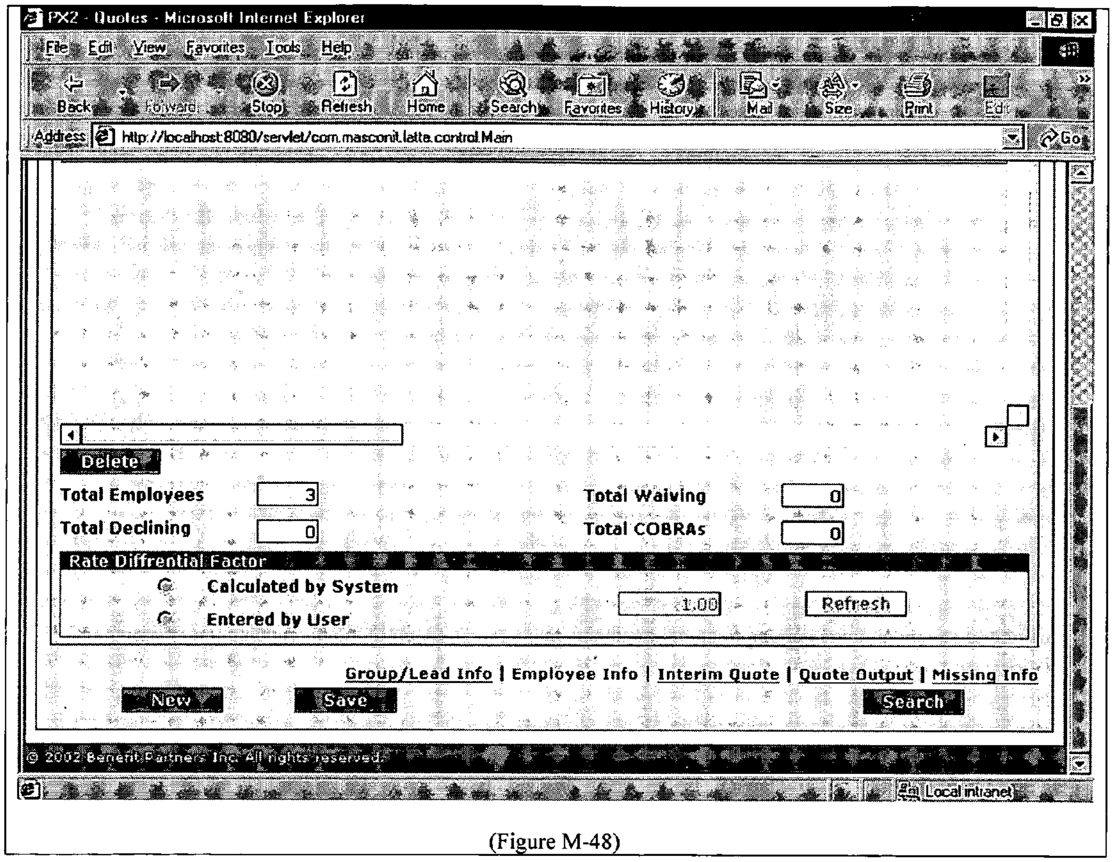
(Figure M-48)

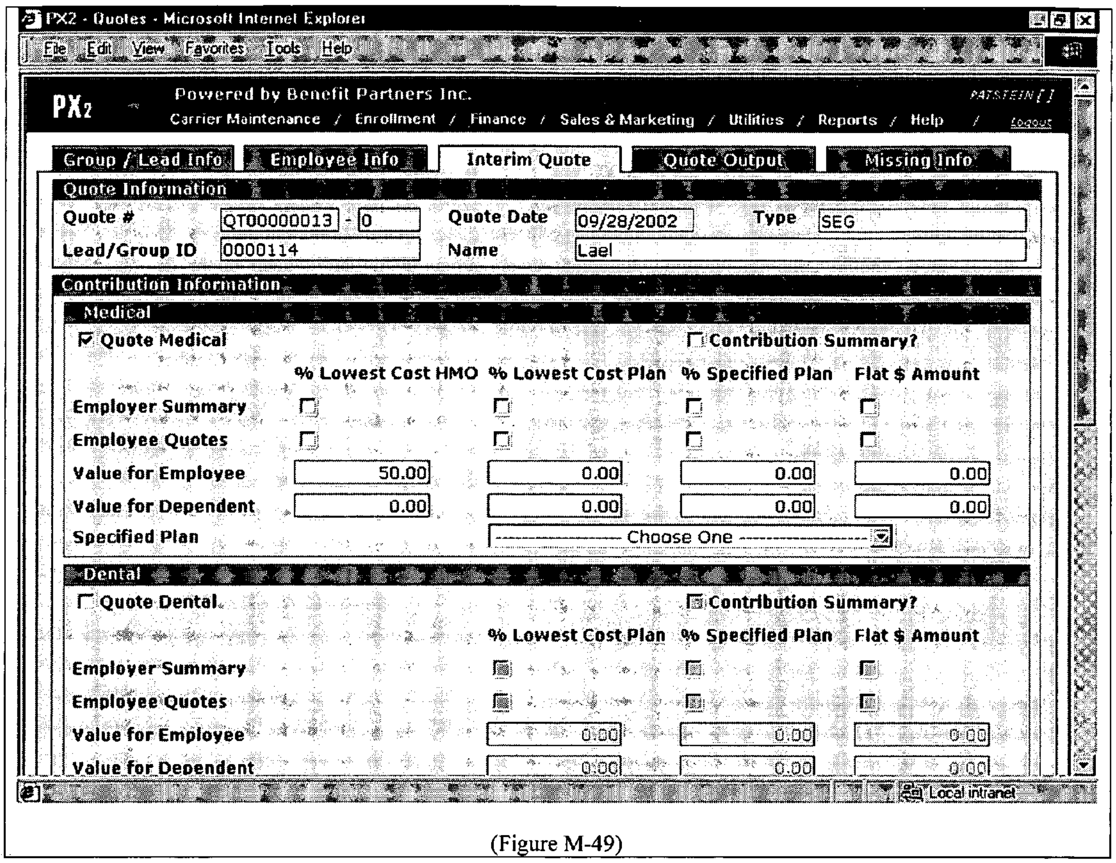
(Figure M-49)

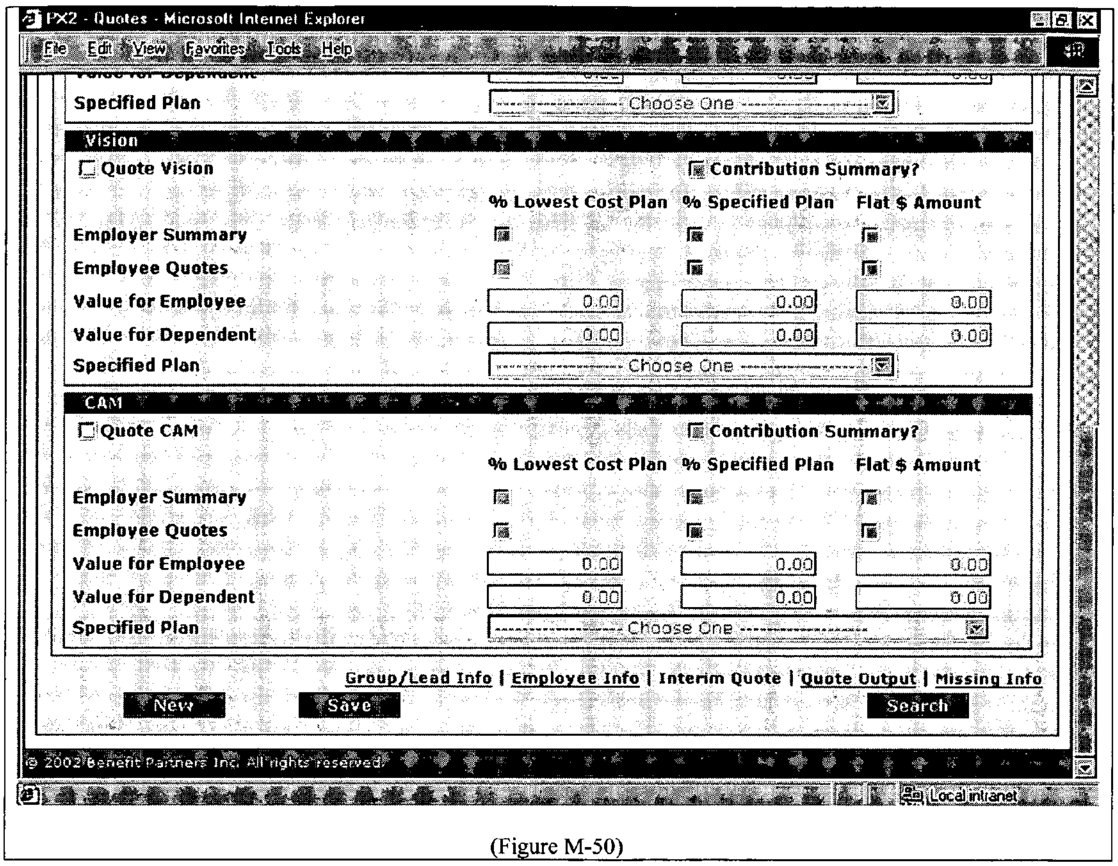
(Figure M-50)

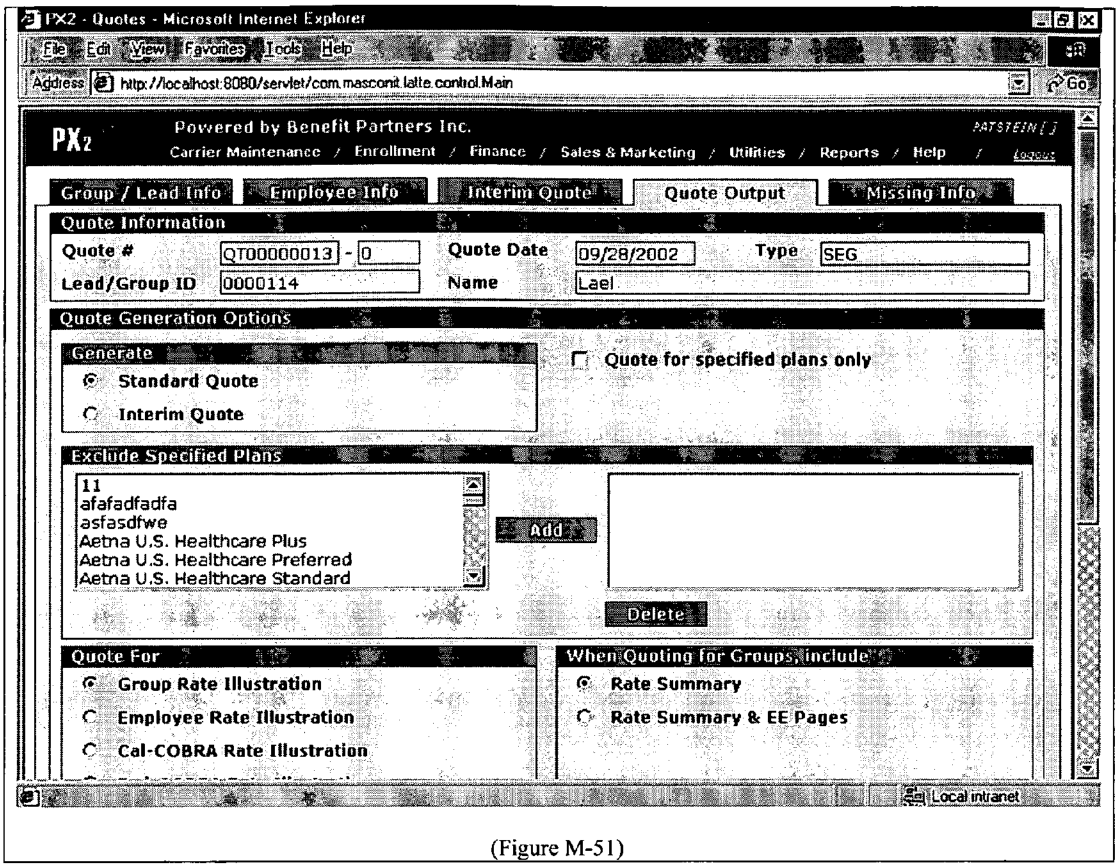
(Figure M-51)

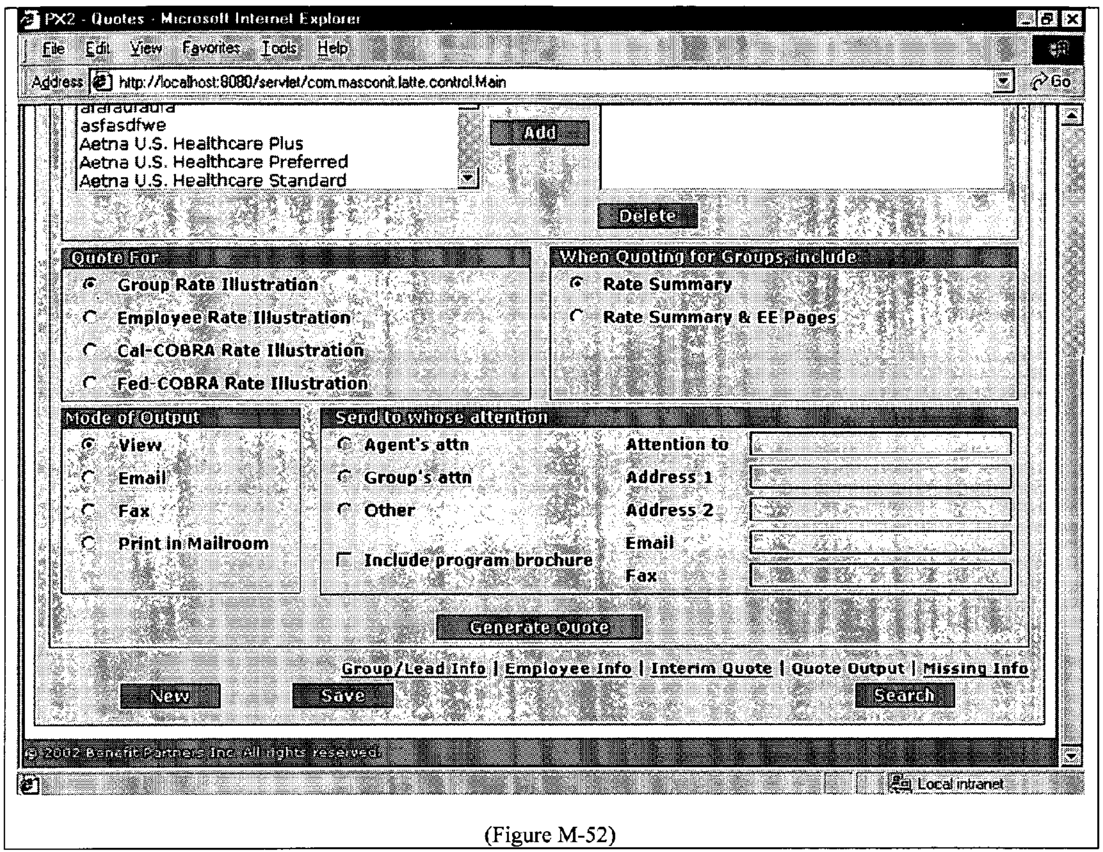
(Figure M-52)

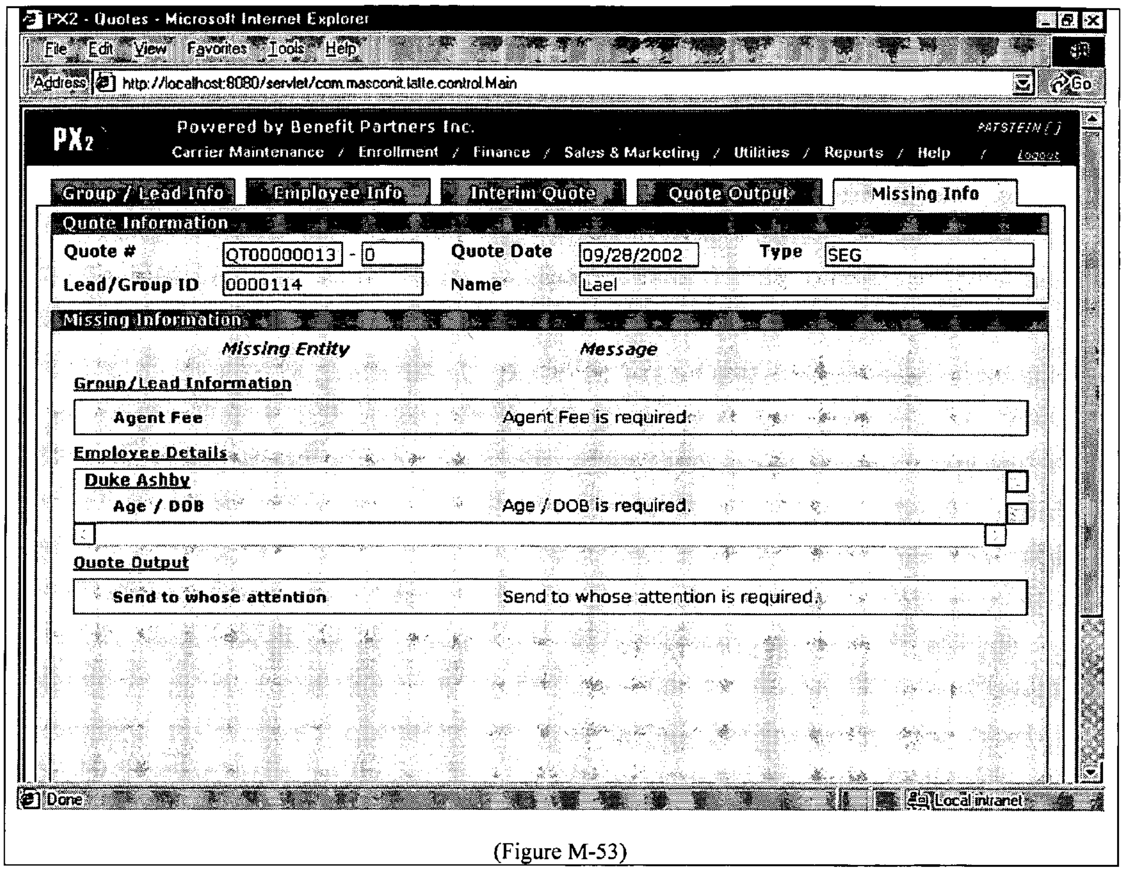
(Figure M-53)

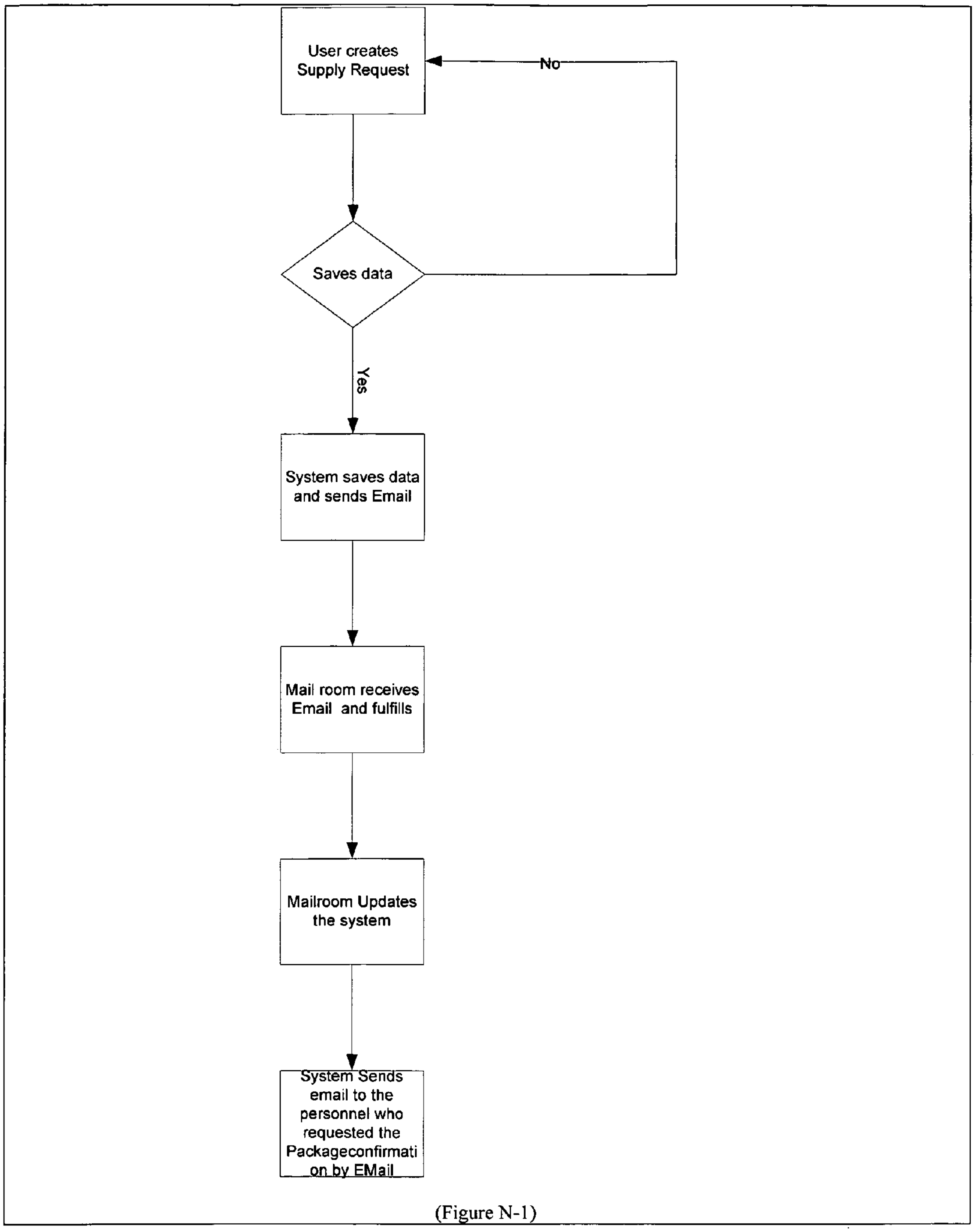
(Figure N-1)

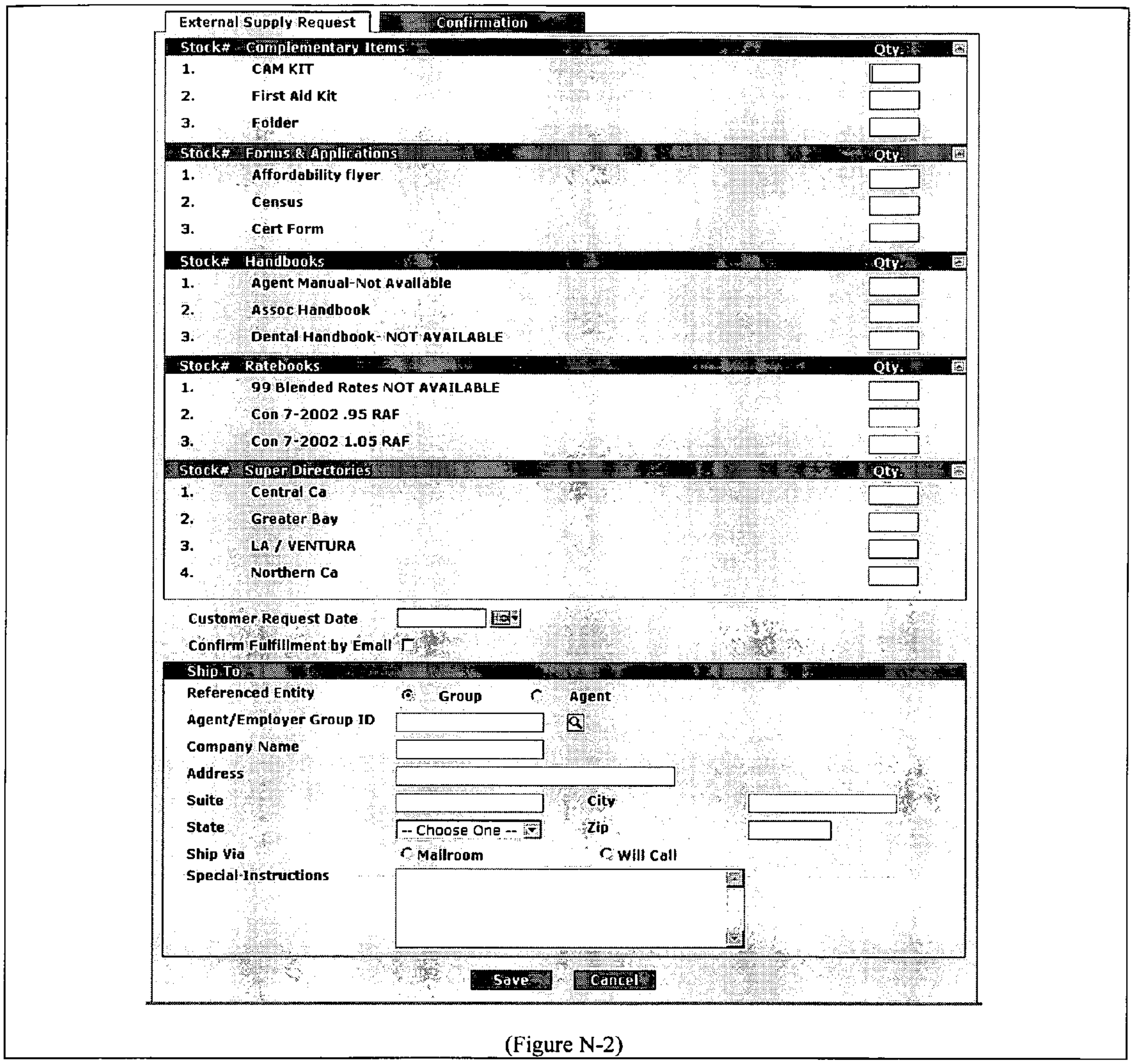
(Figure N-2)

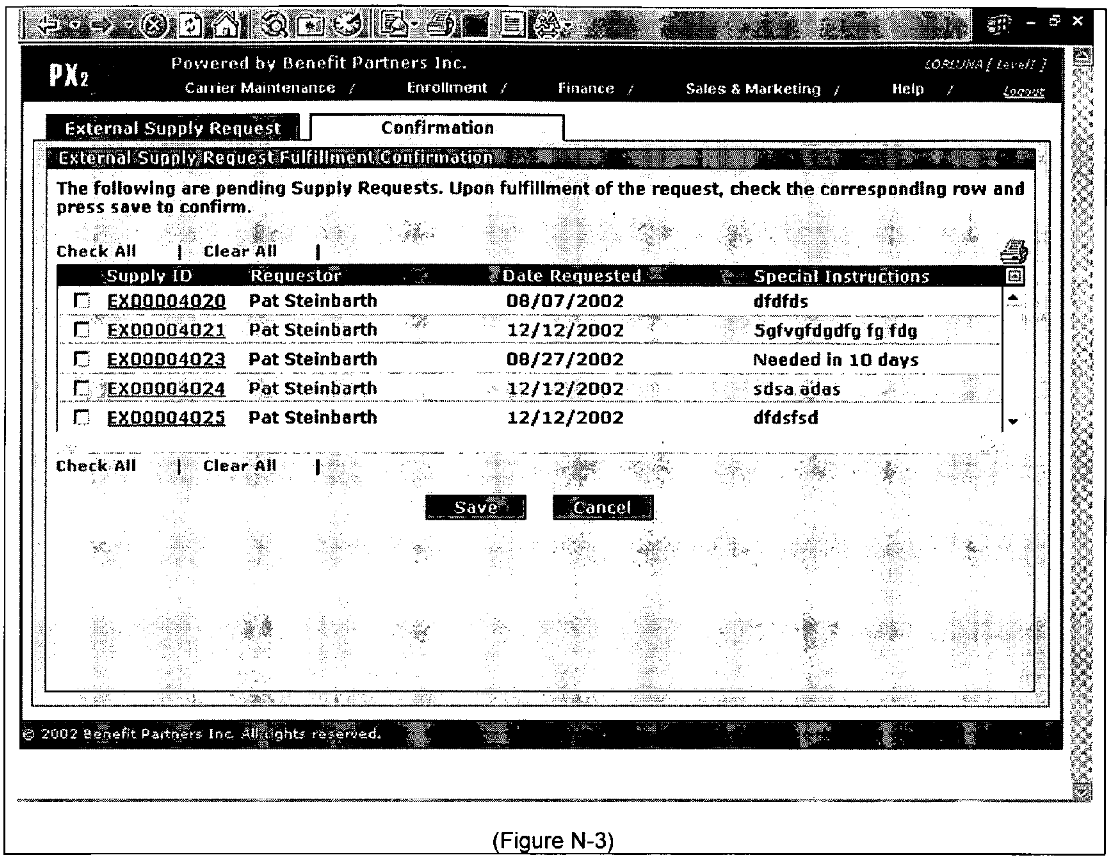
(Figure N-3)

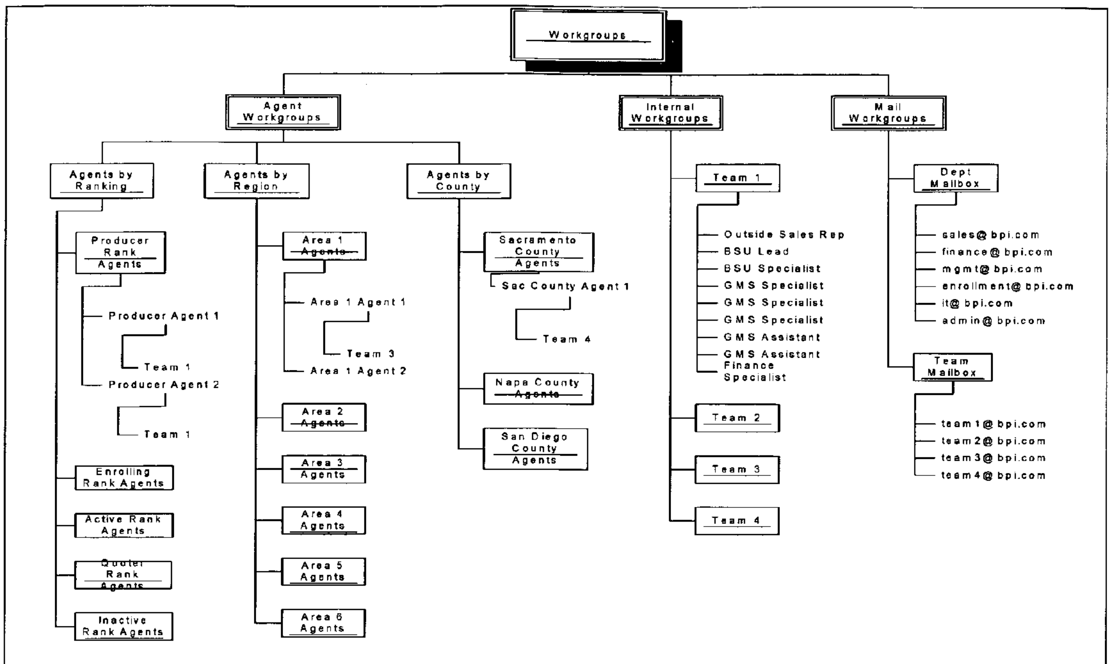
(Figure N-4)
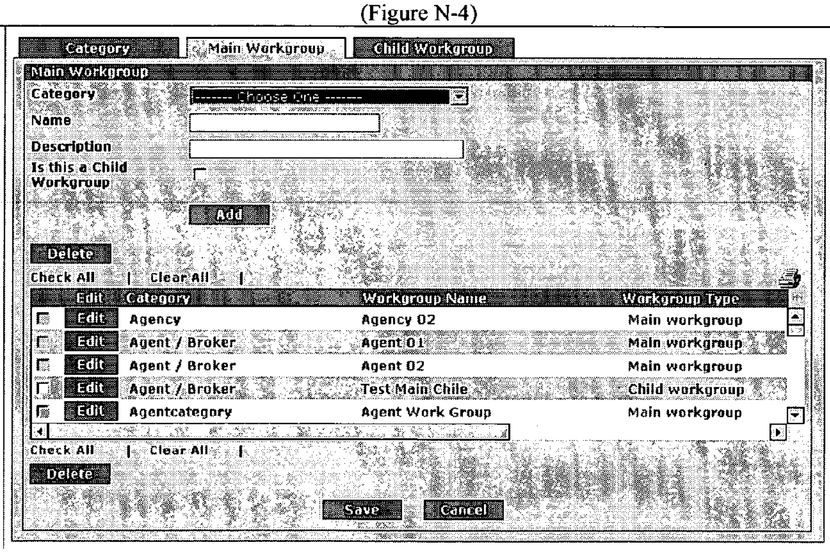
(Figure N-5)

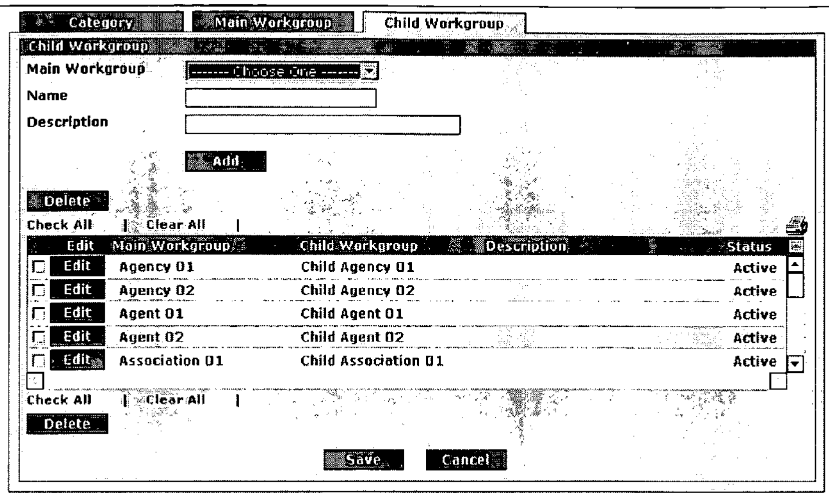
(Figure N-6)
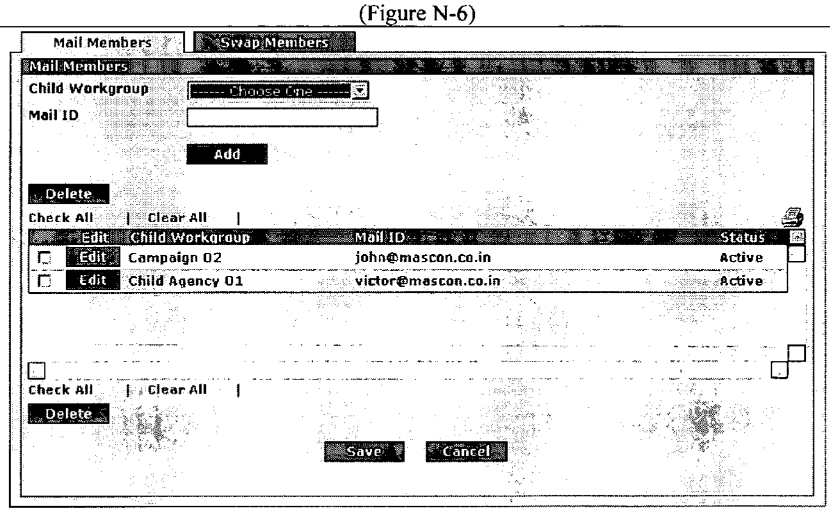
(Figure N-7)

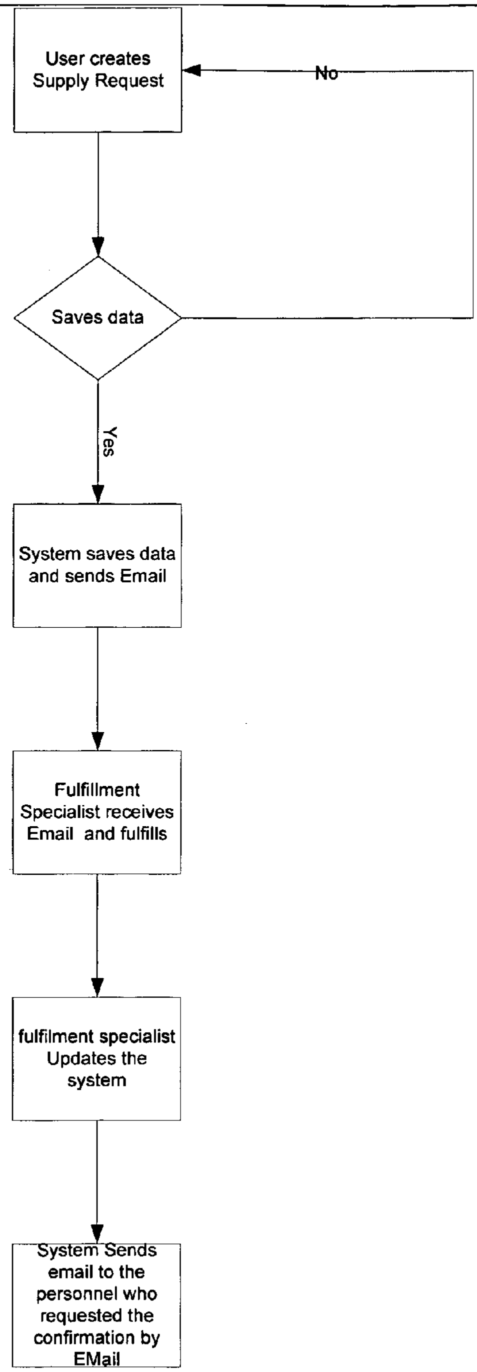
(Figure N-8)

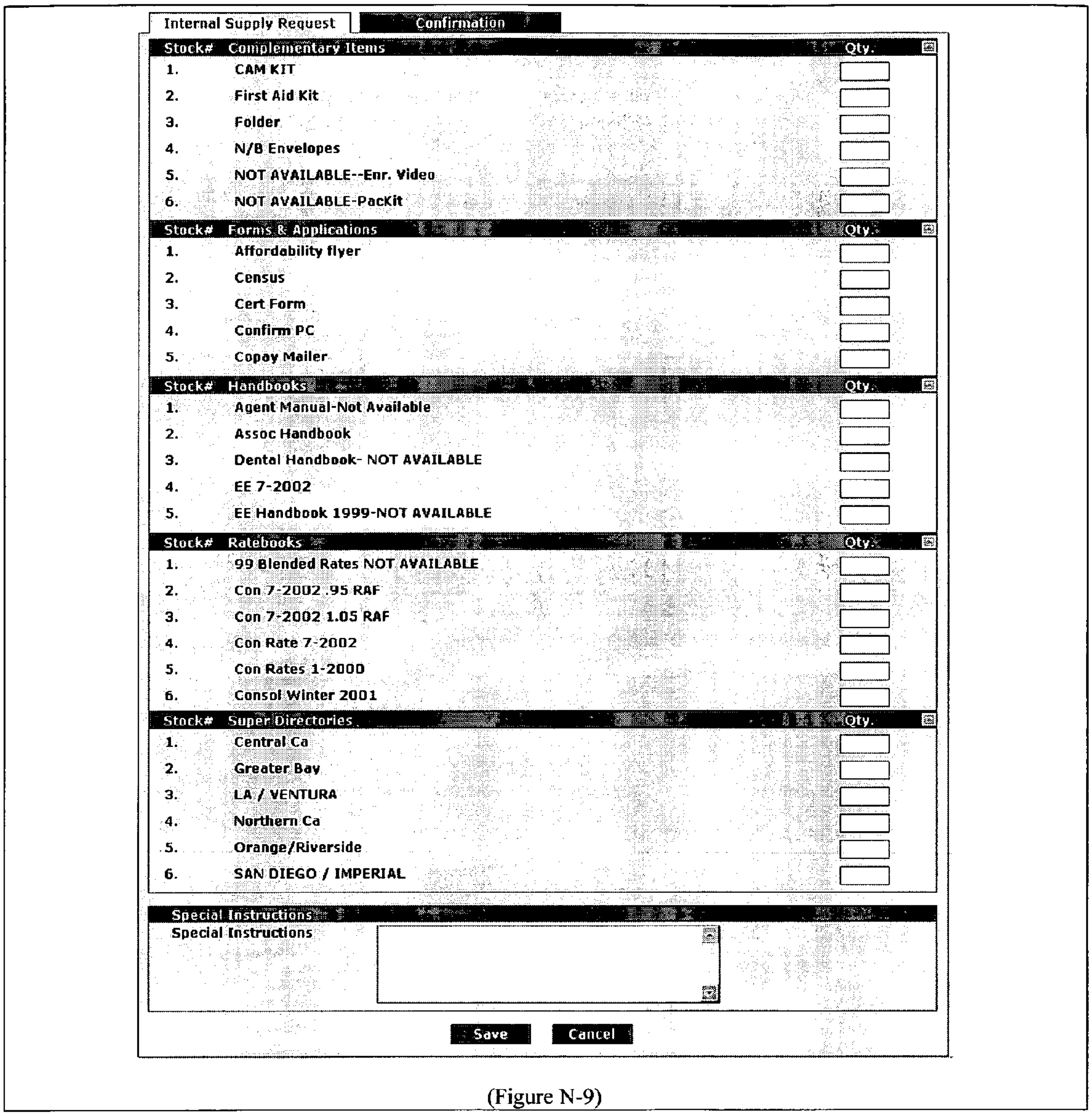
(Figure N-9)

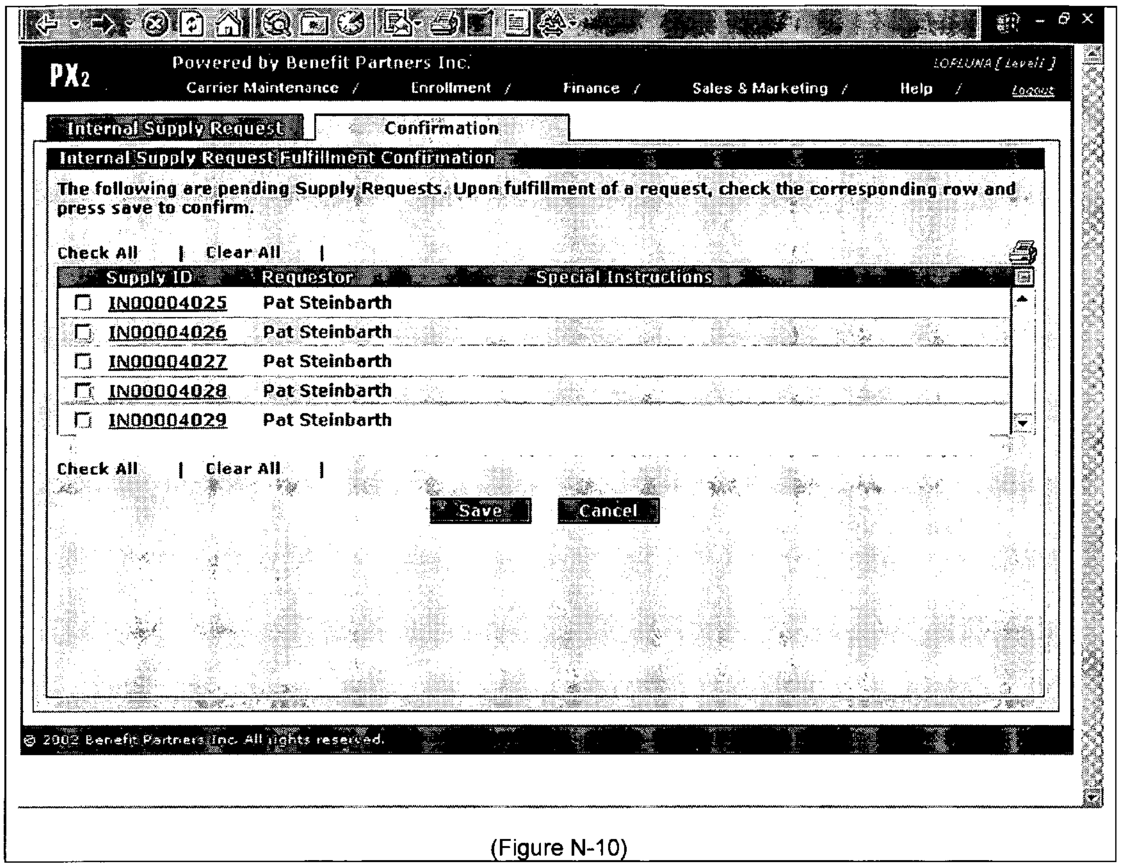
(Figure N-10)

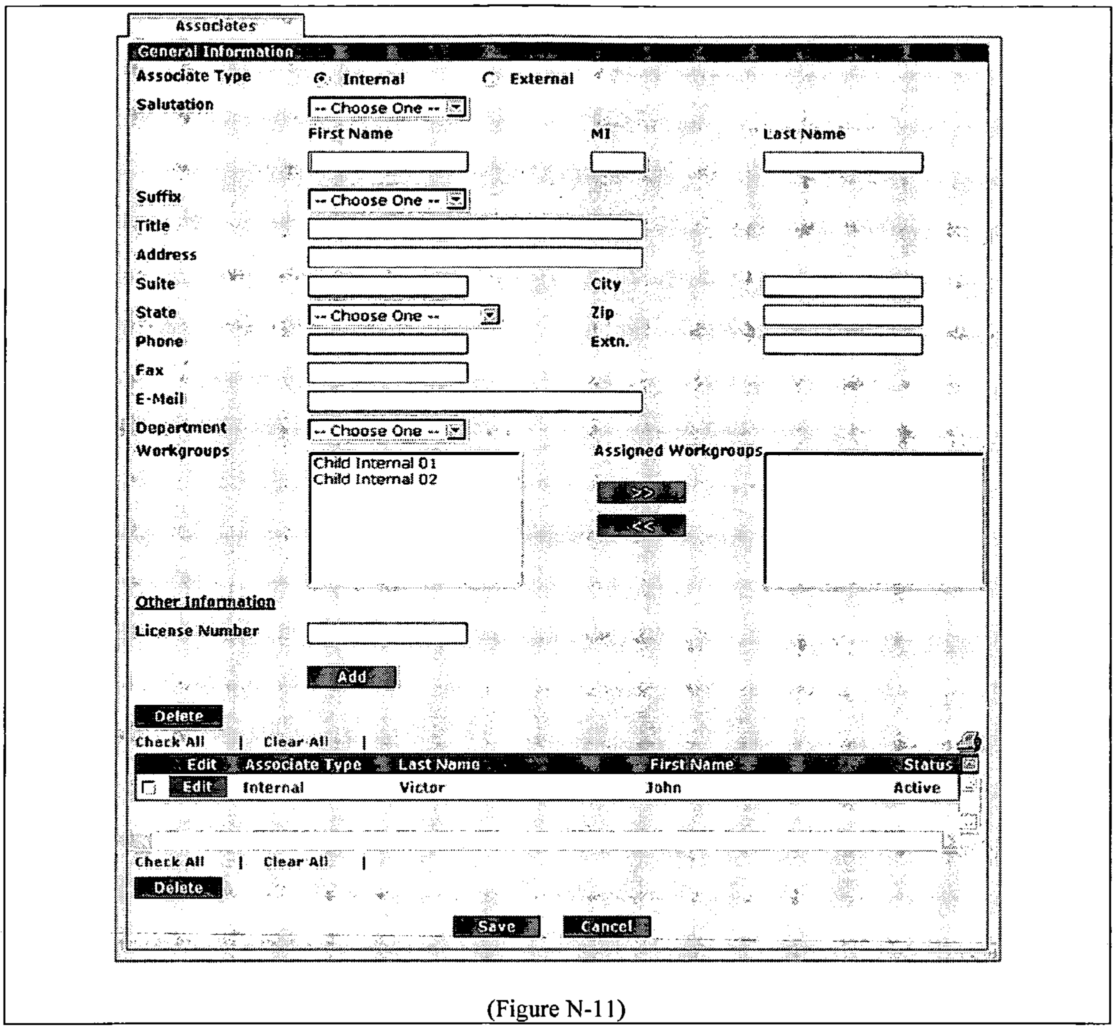
(Figure N-11)

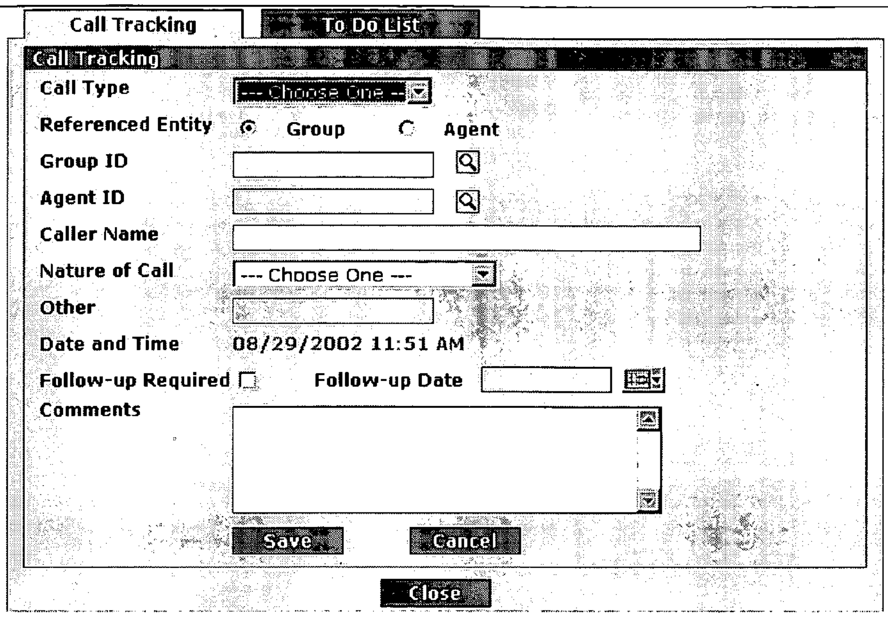
(Figure N-12)
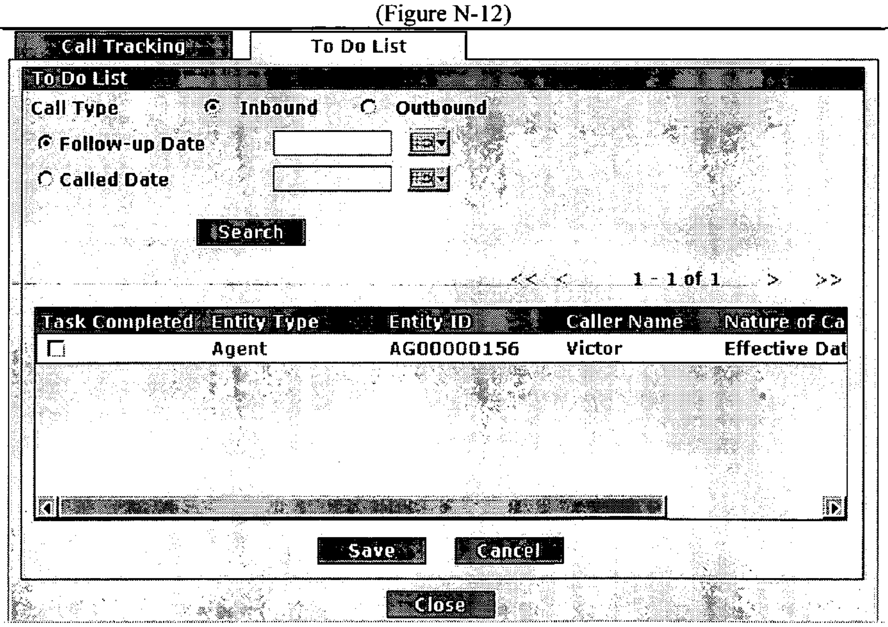
(Figure N-13)

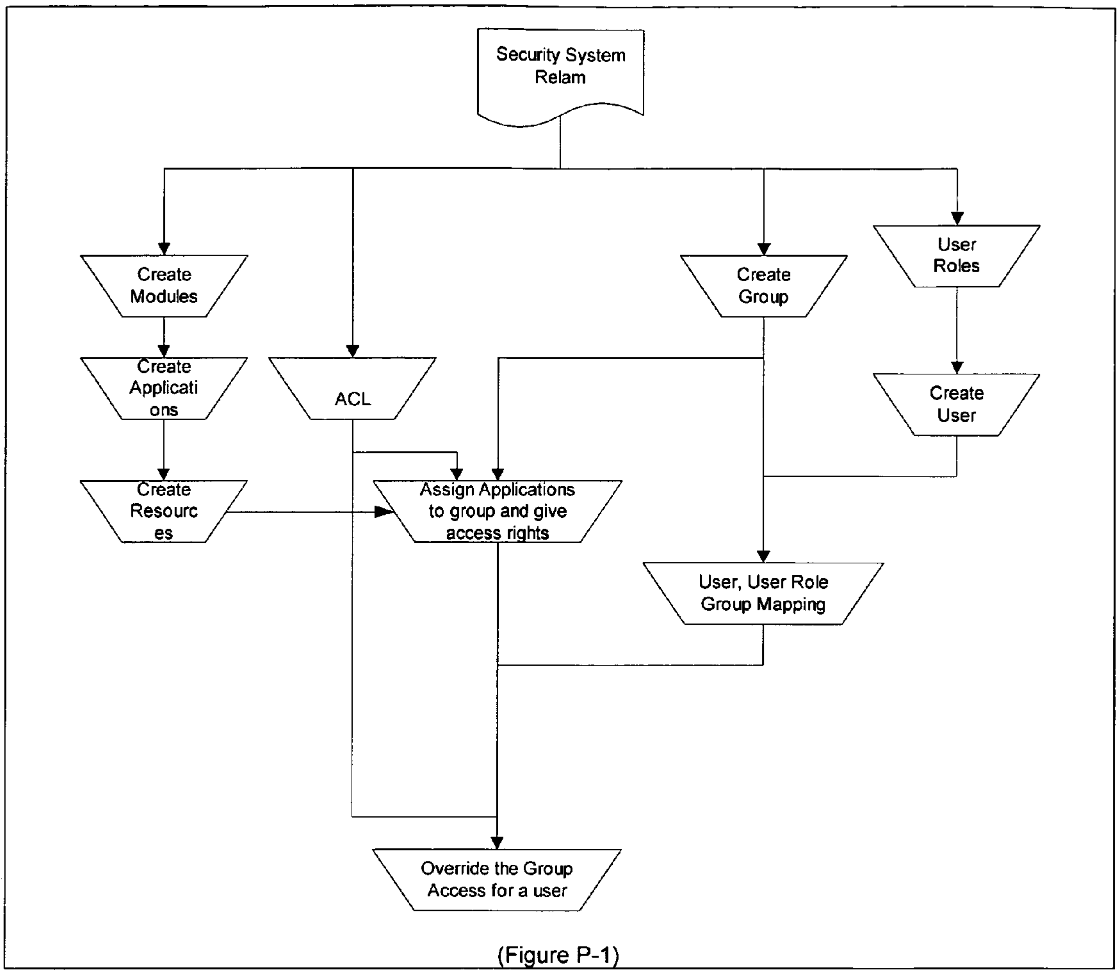
(Figure P-1)

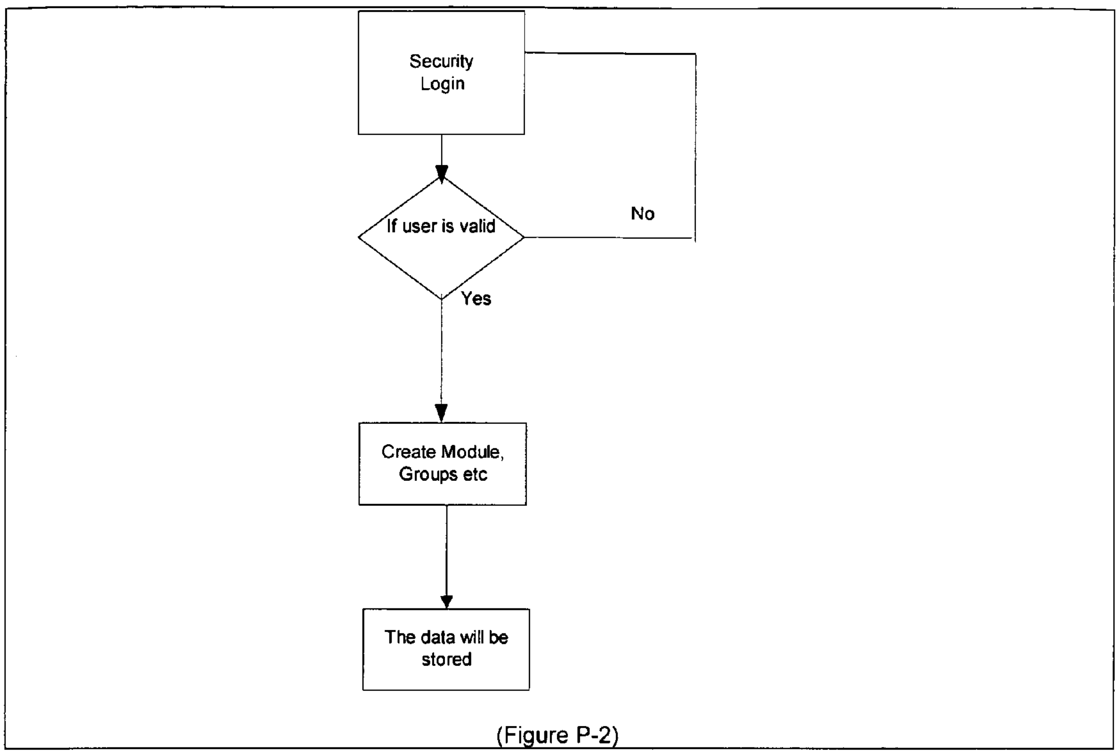
(Figure P-2)

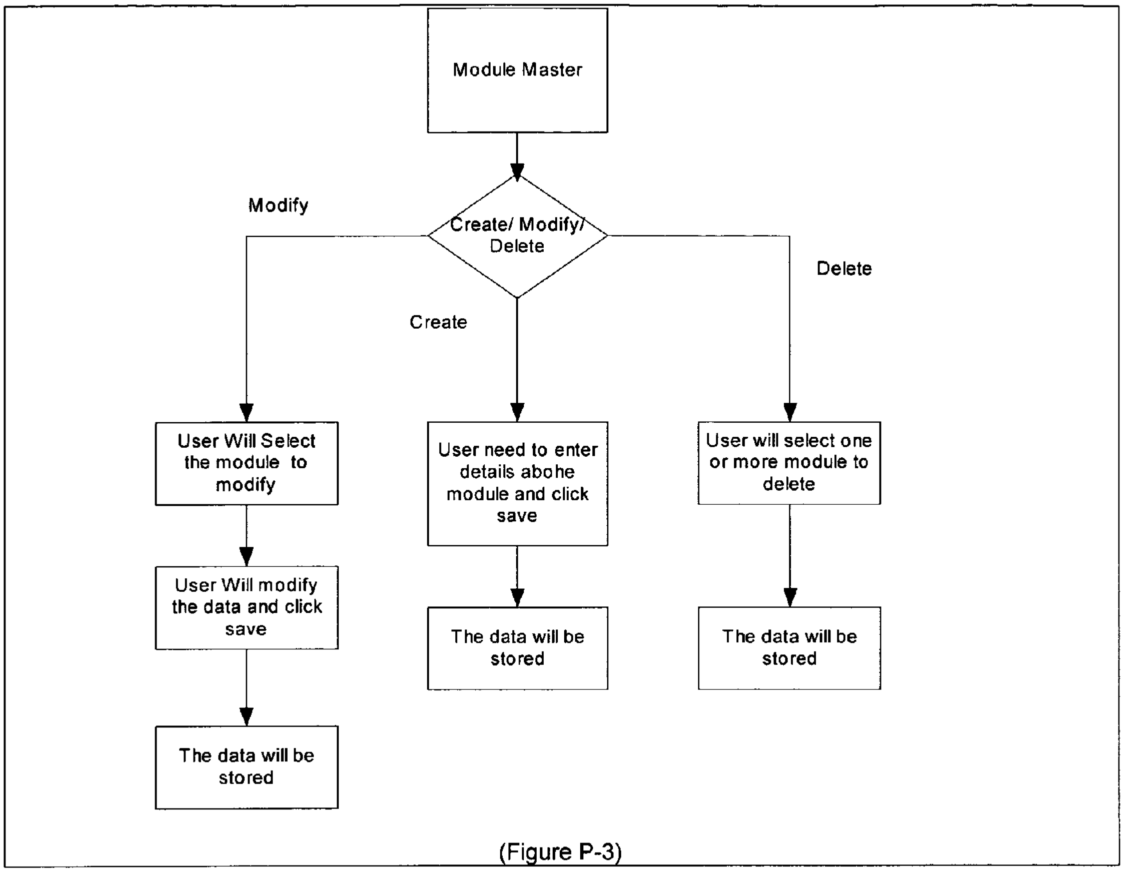
(Figure P-3)

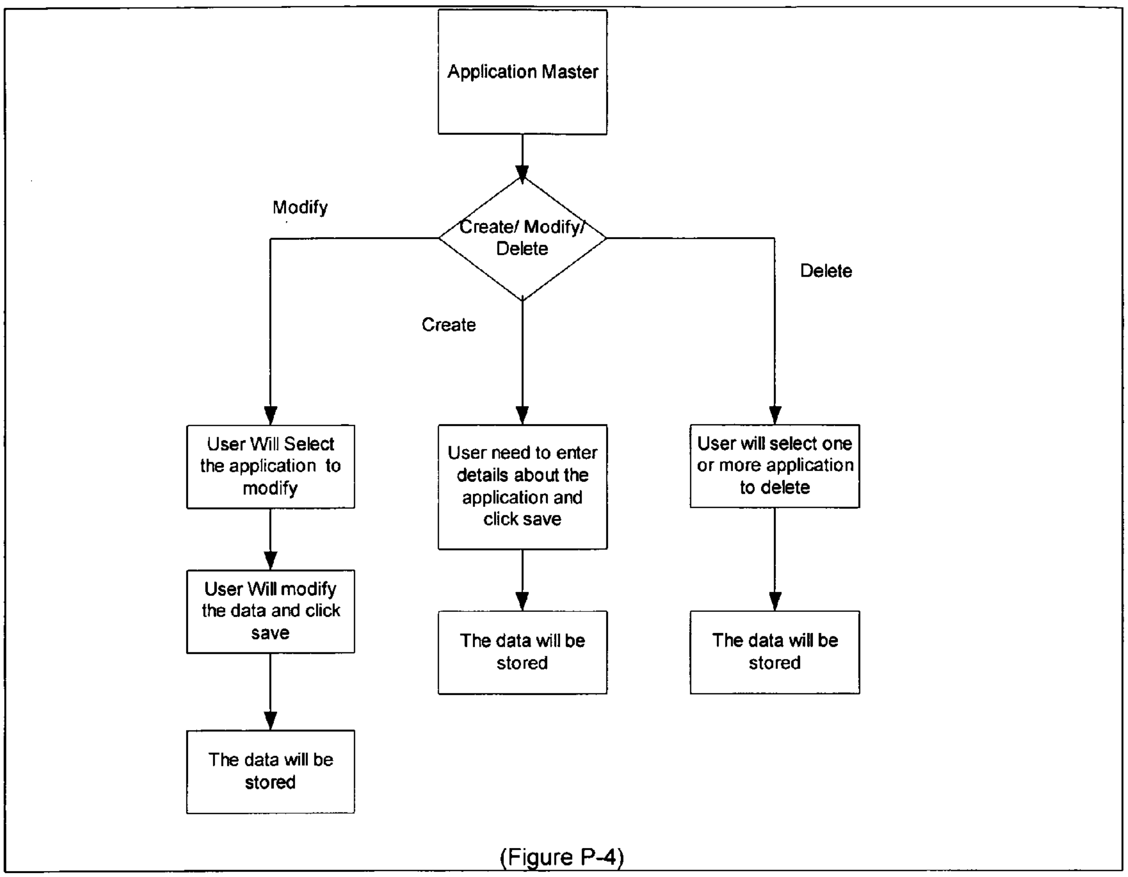
(Figure P-4)

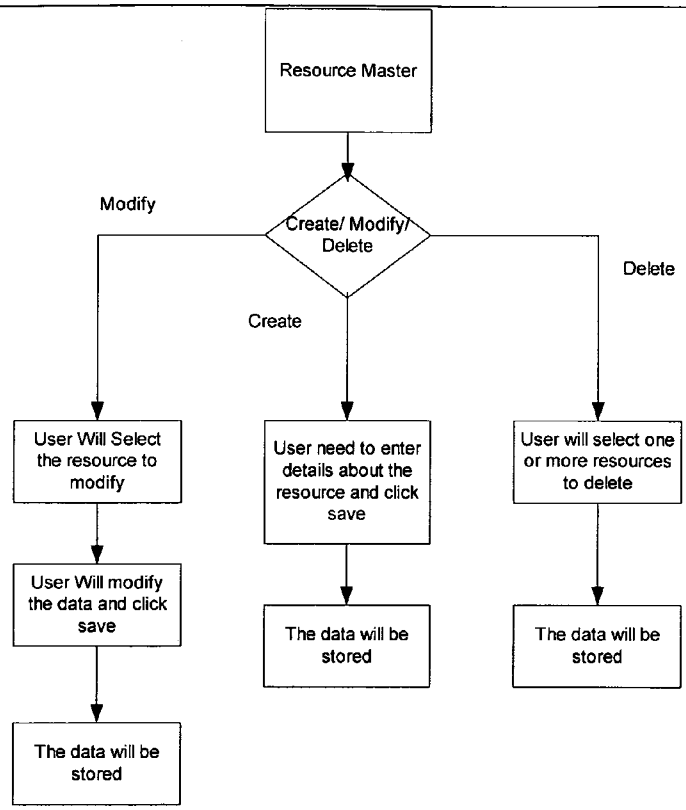
(Figure P-5)

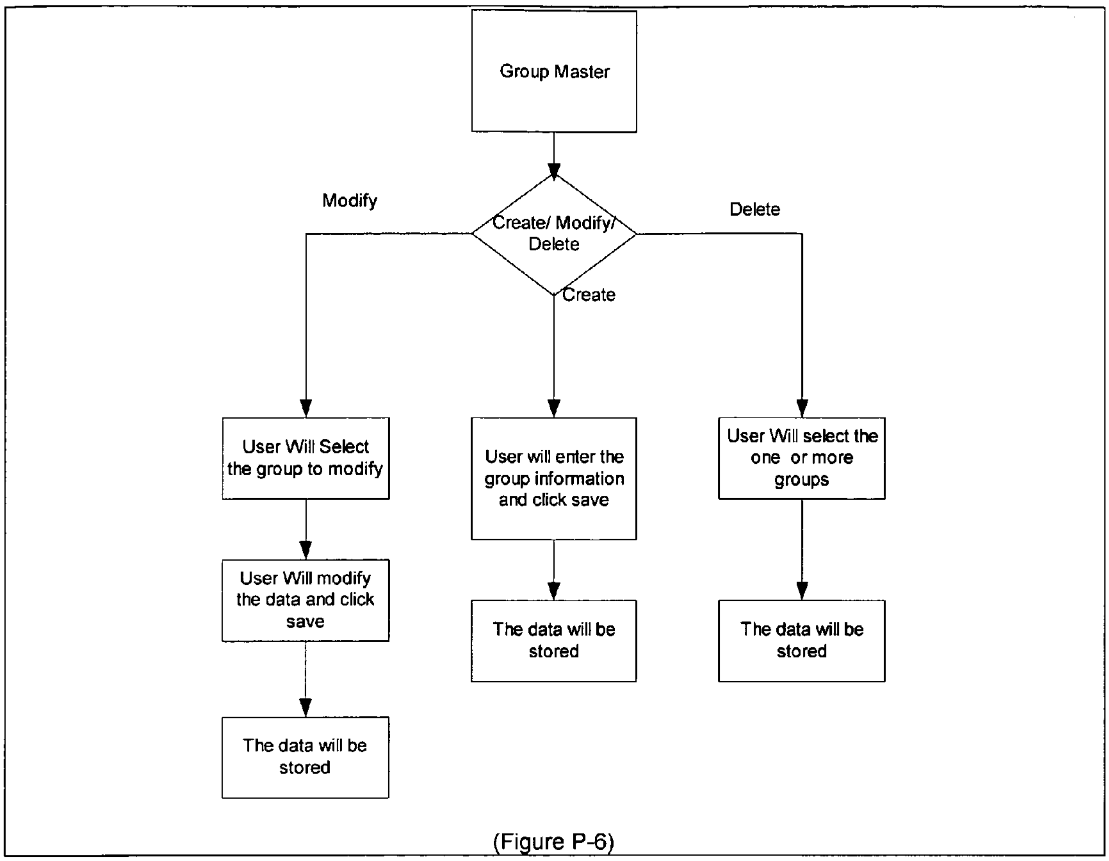
(Figure P-6)

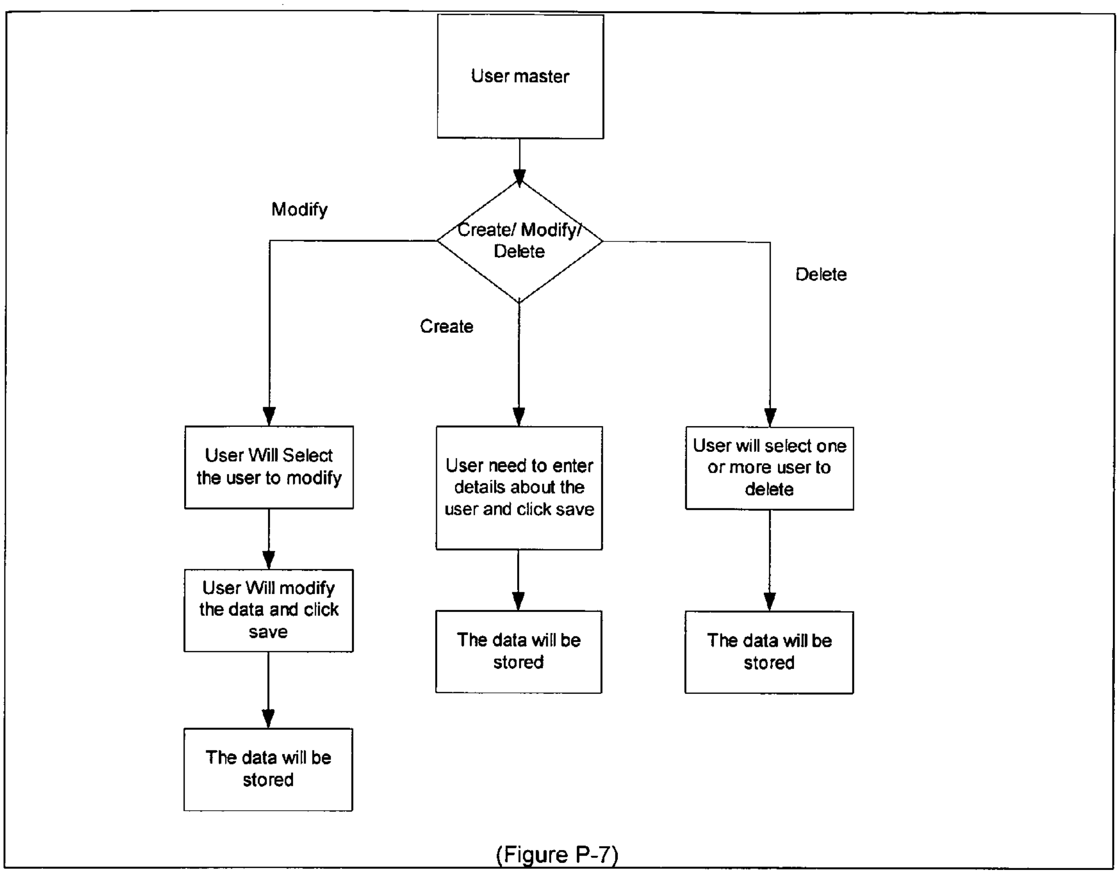
(Figure P-7)

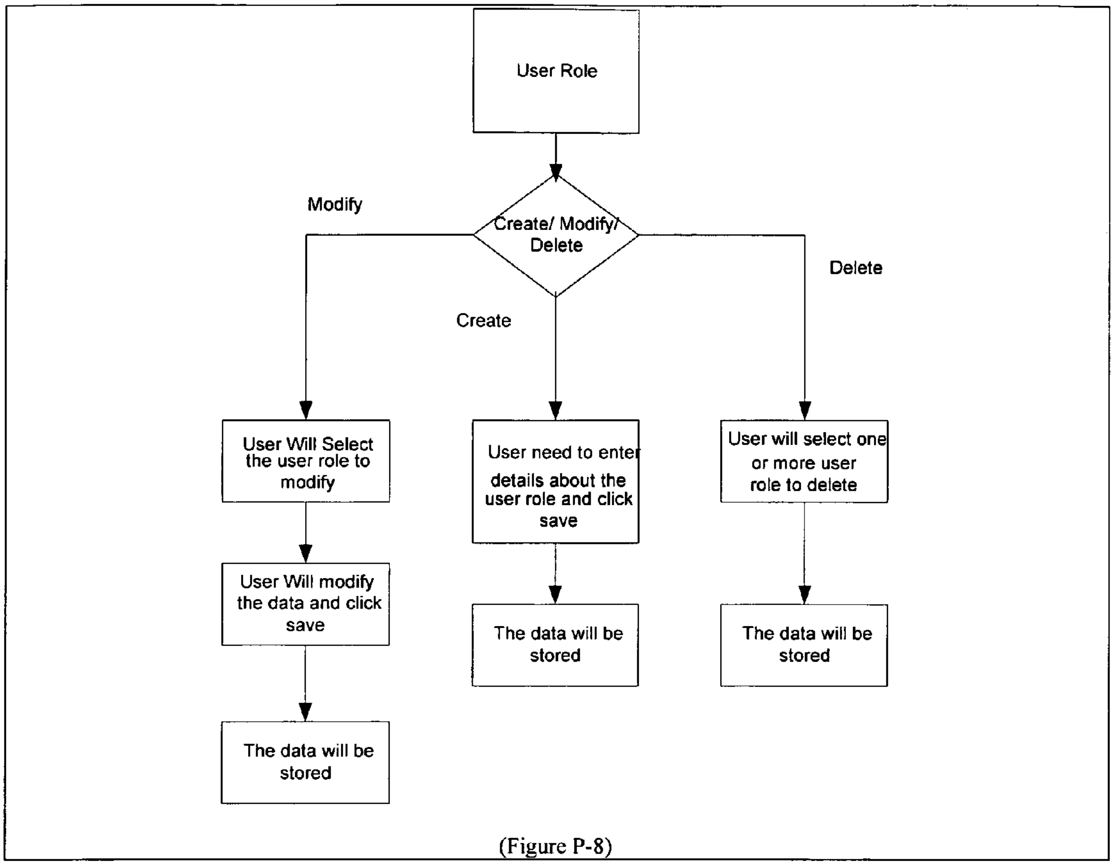
(Figure P-8)

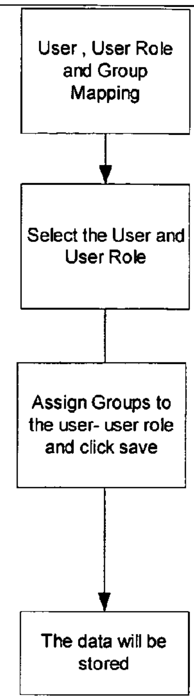
(Figure P-9)
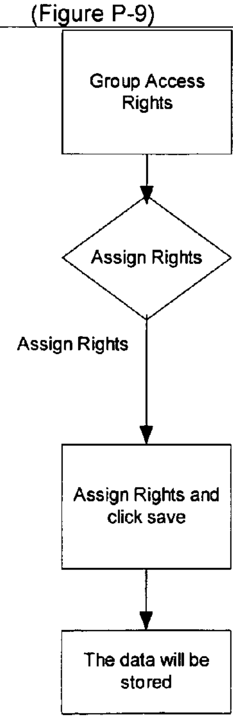
(Figure P-10)

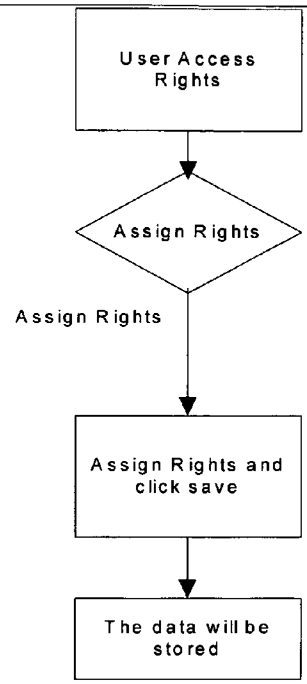
(Figure P-11)
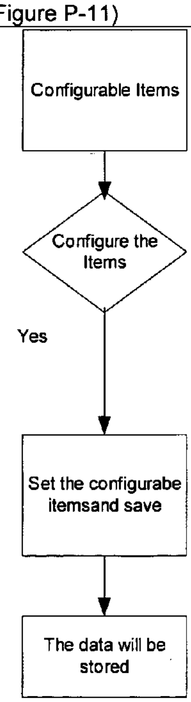
(Figure P-12)

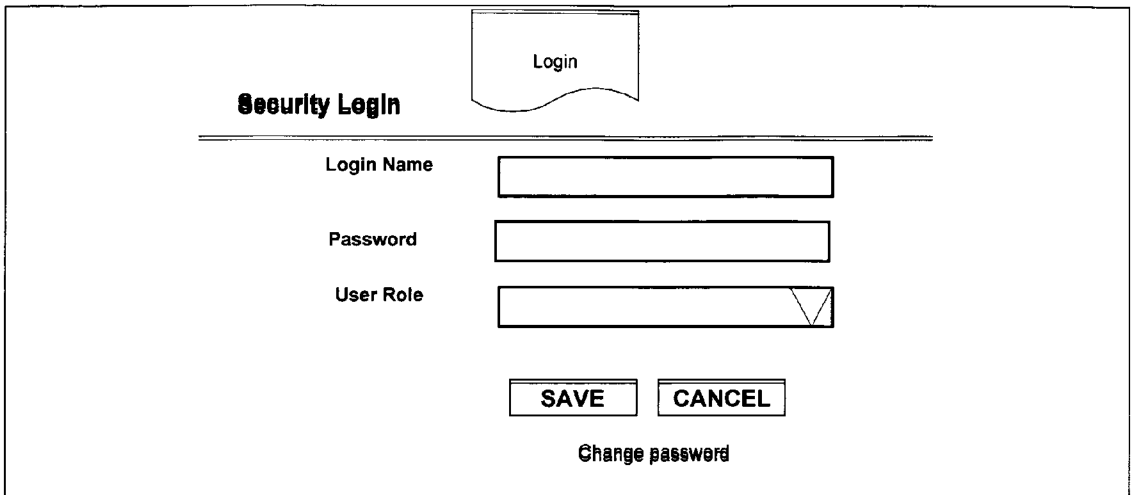
(Figure P-13)
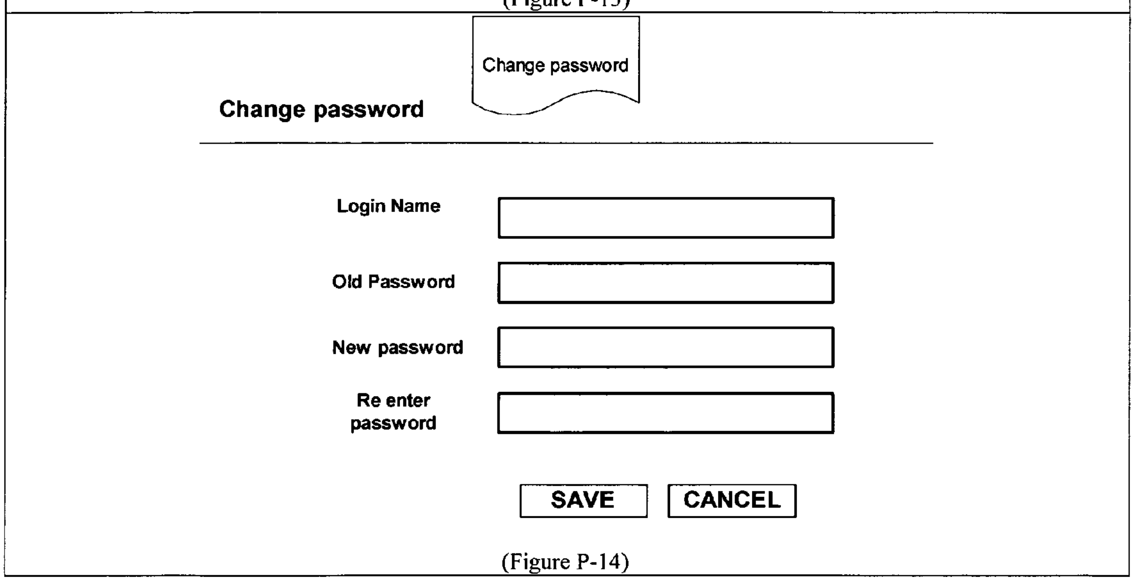
(Figure P-14)

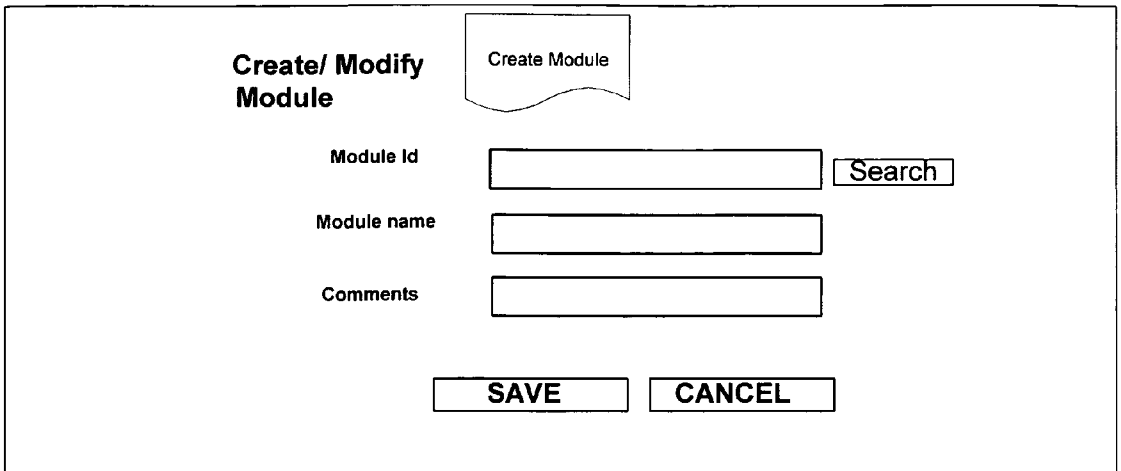
(Figure P-15)
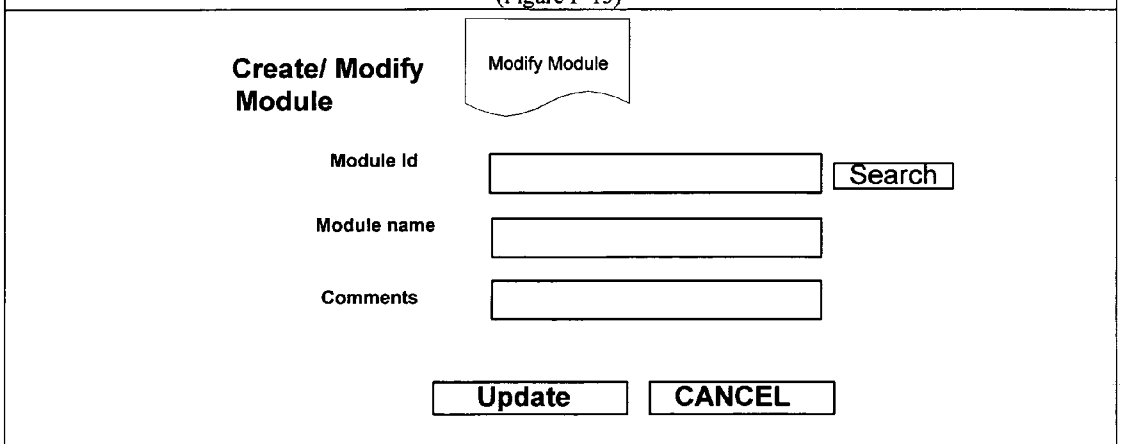
(Figure P-16)
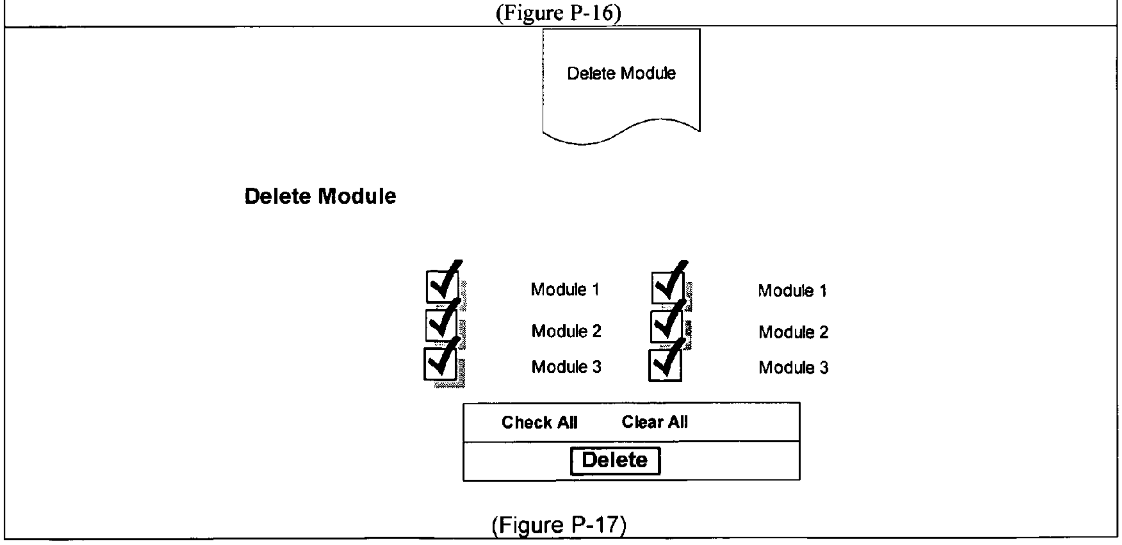
(Figure P-17)

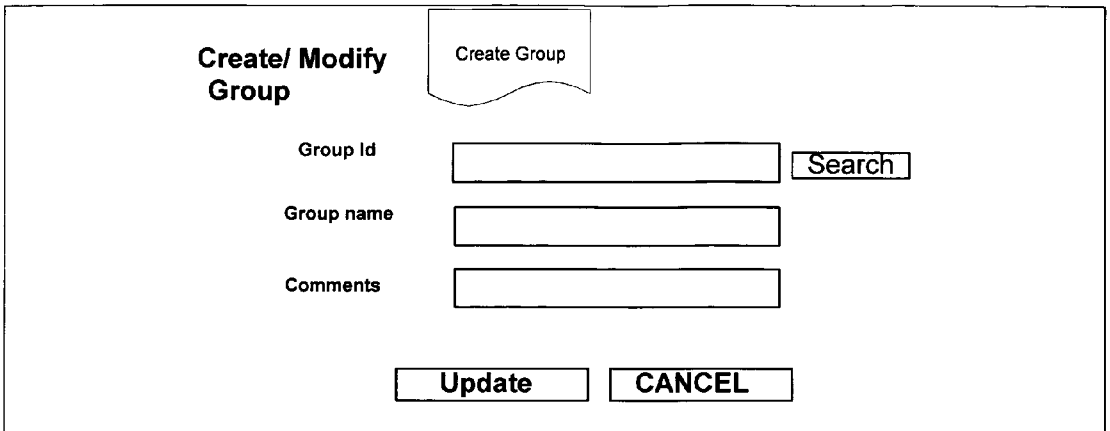
(Figure P-18)
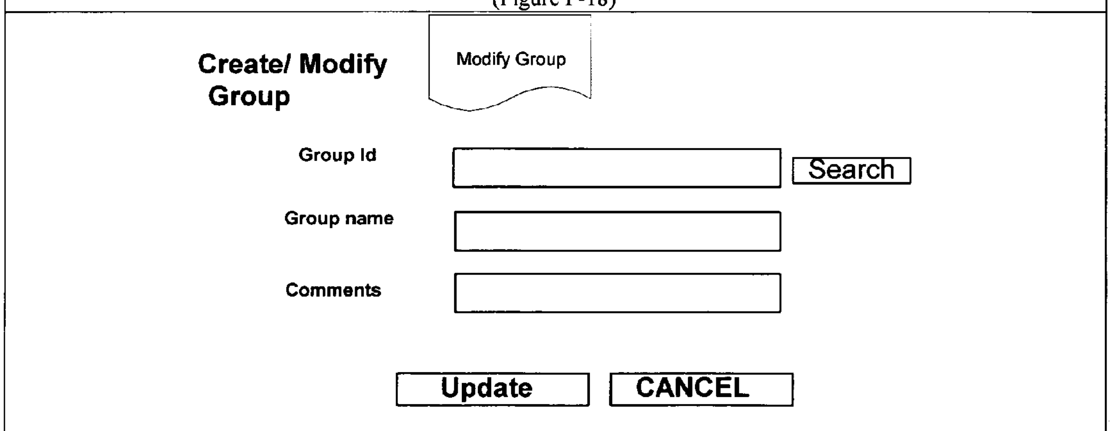
(Figure P-19)
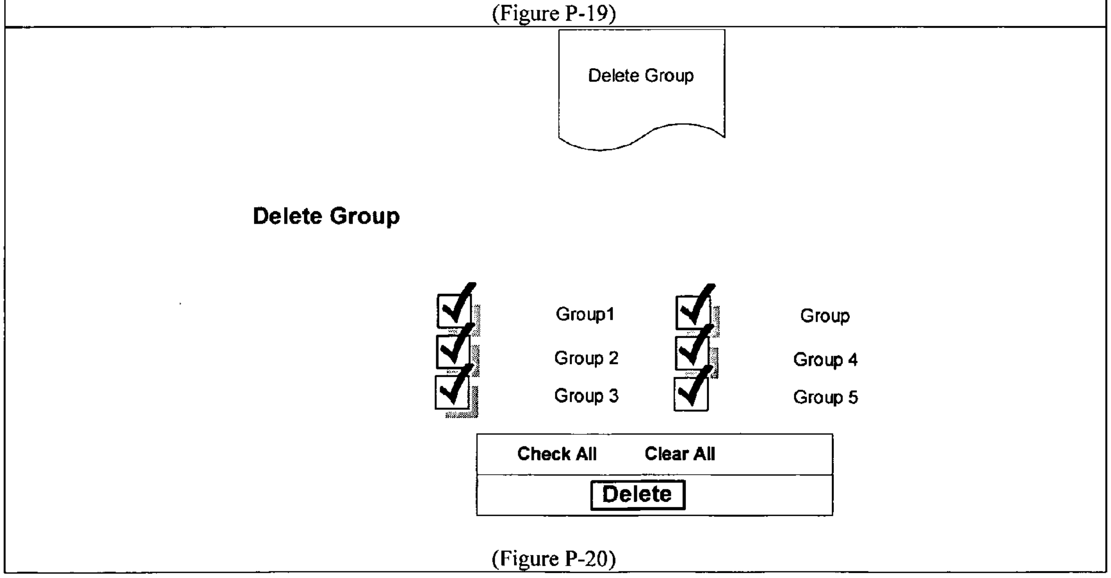
(Figure P-20)

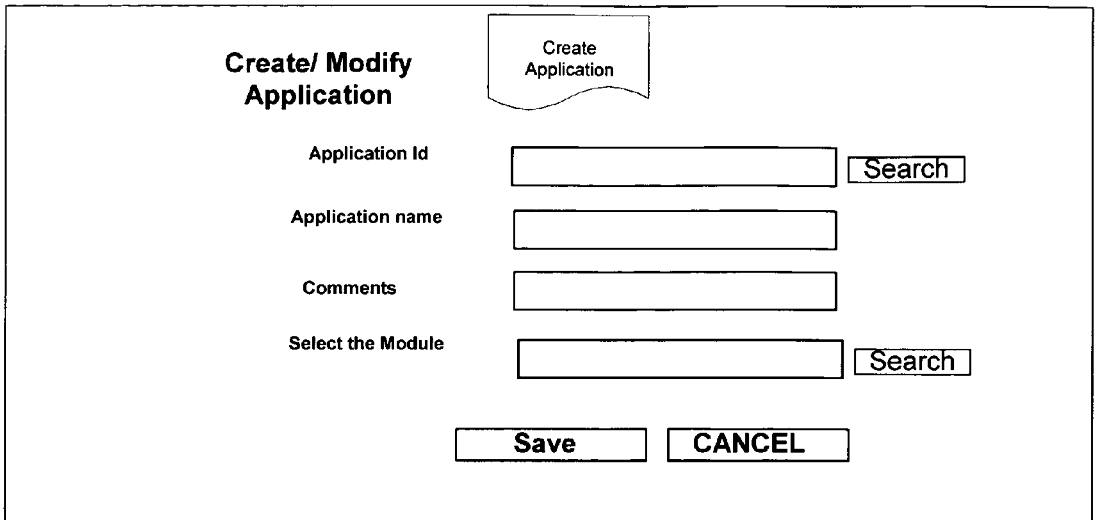
(Figure P-21)
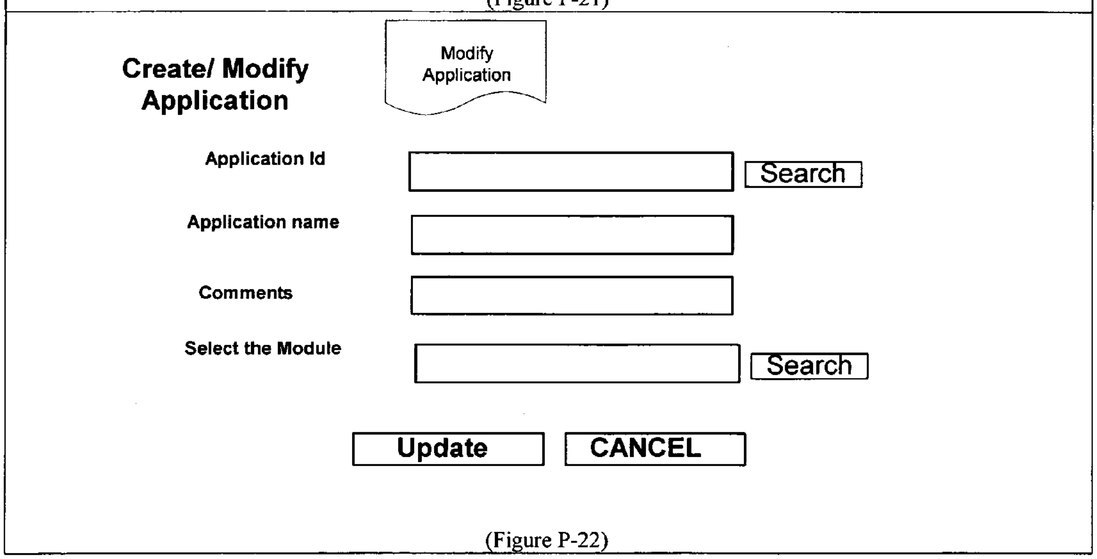
(Figure P-22)

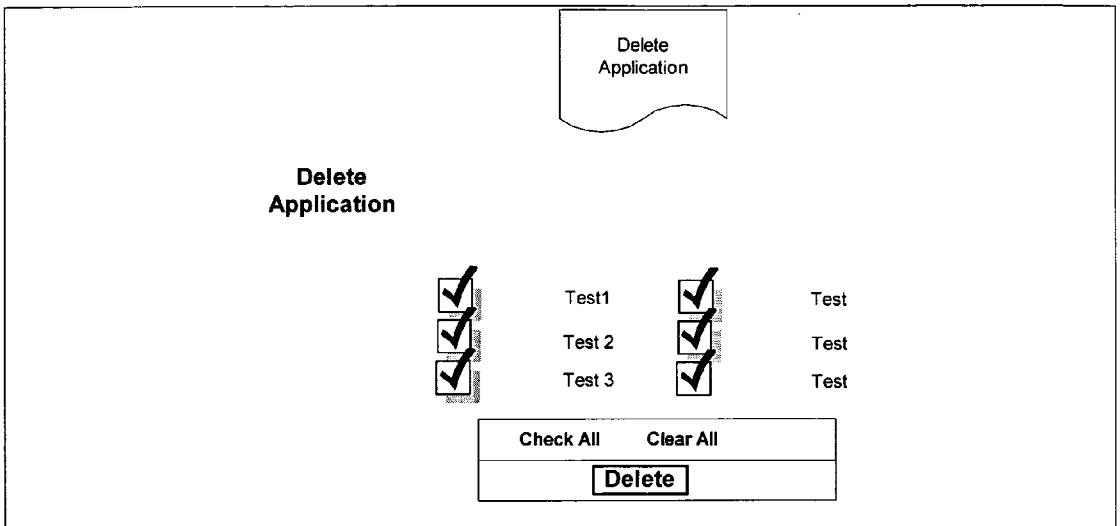
(Figure P-23)
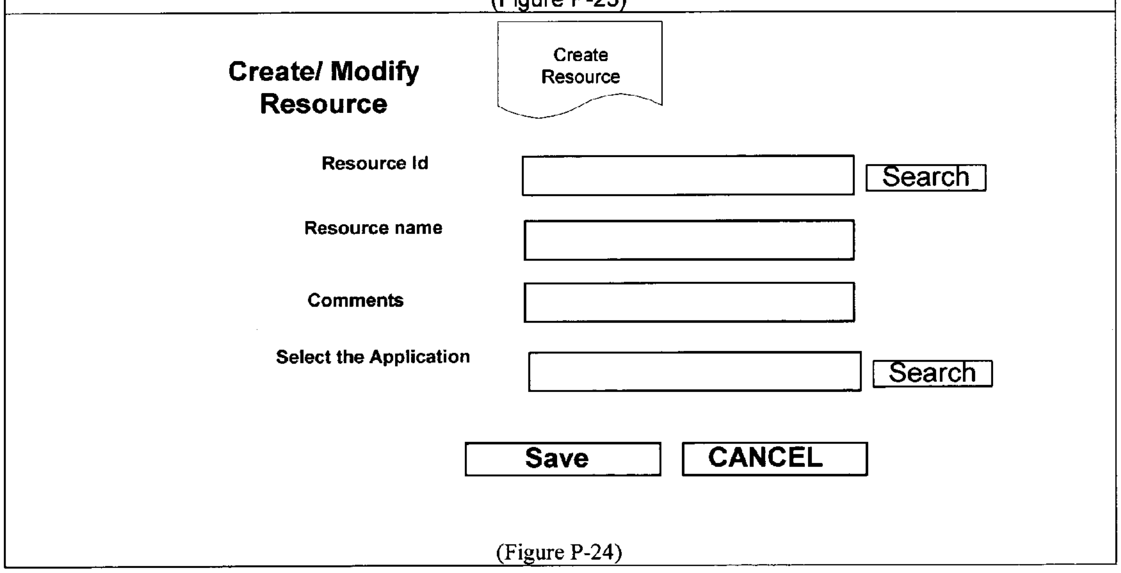
(Figure P-24)

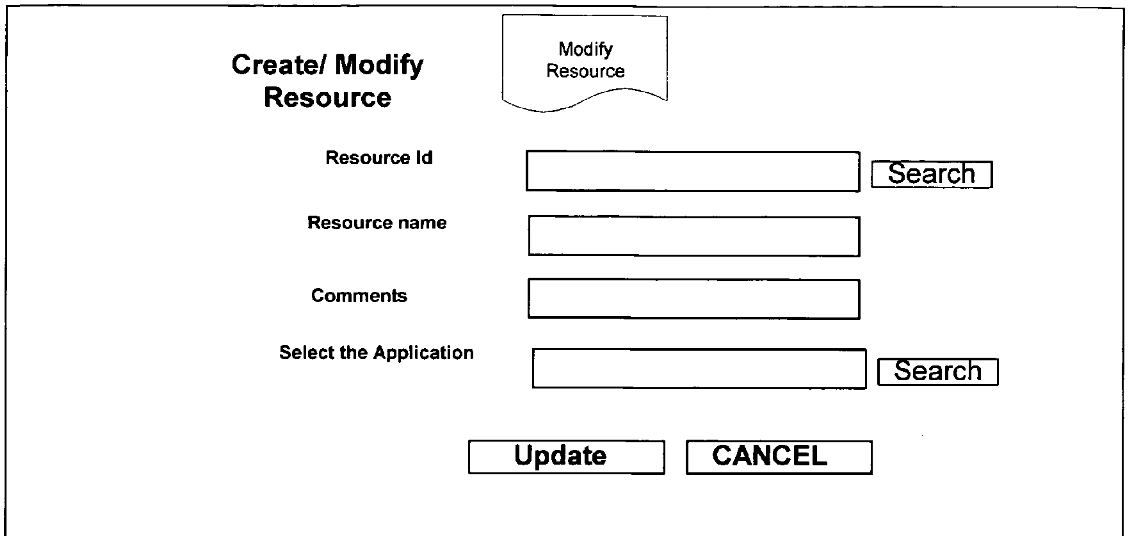
(Figure P-25)
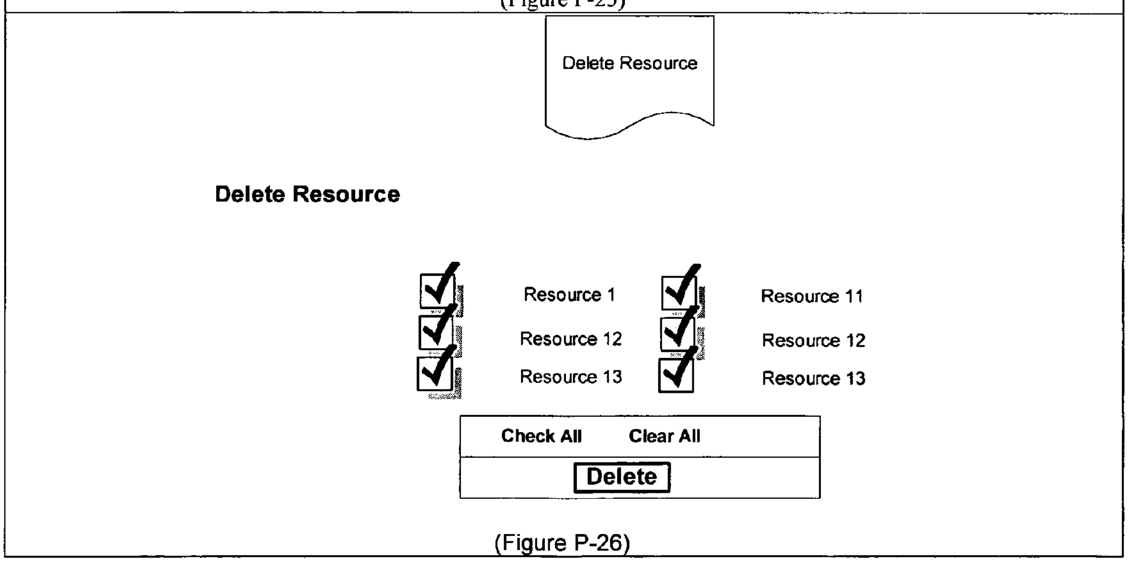
(Figure P-26)

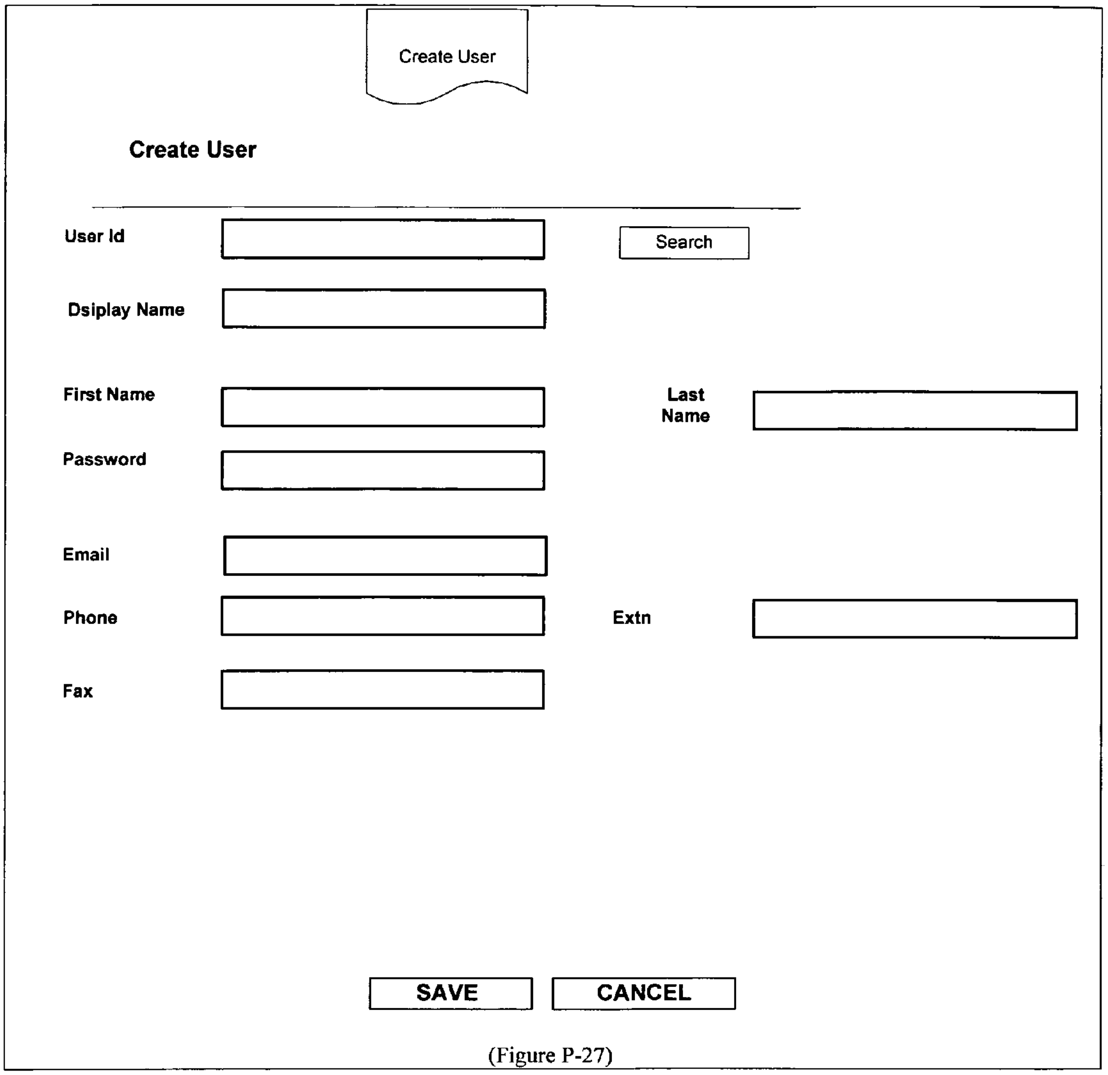
(Figure P-27)

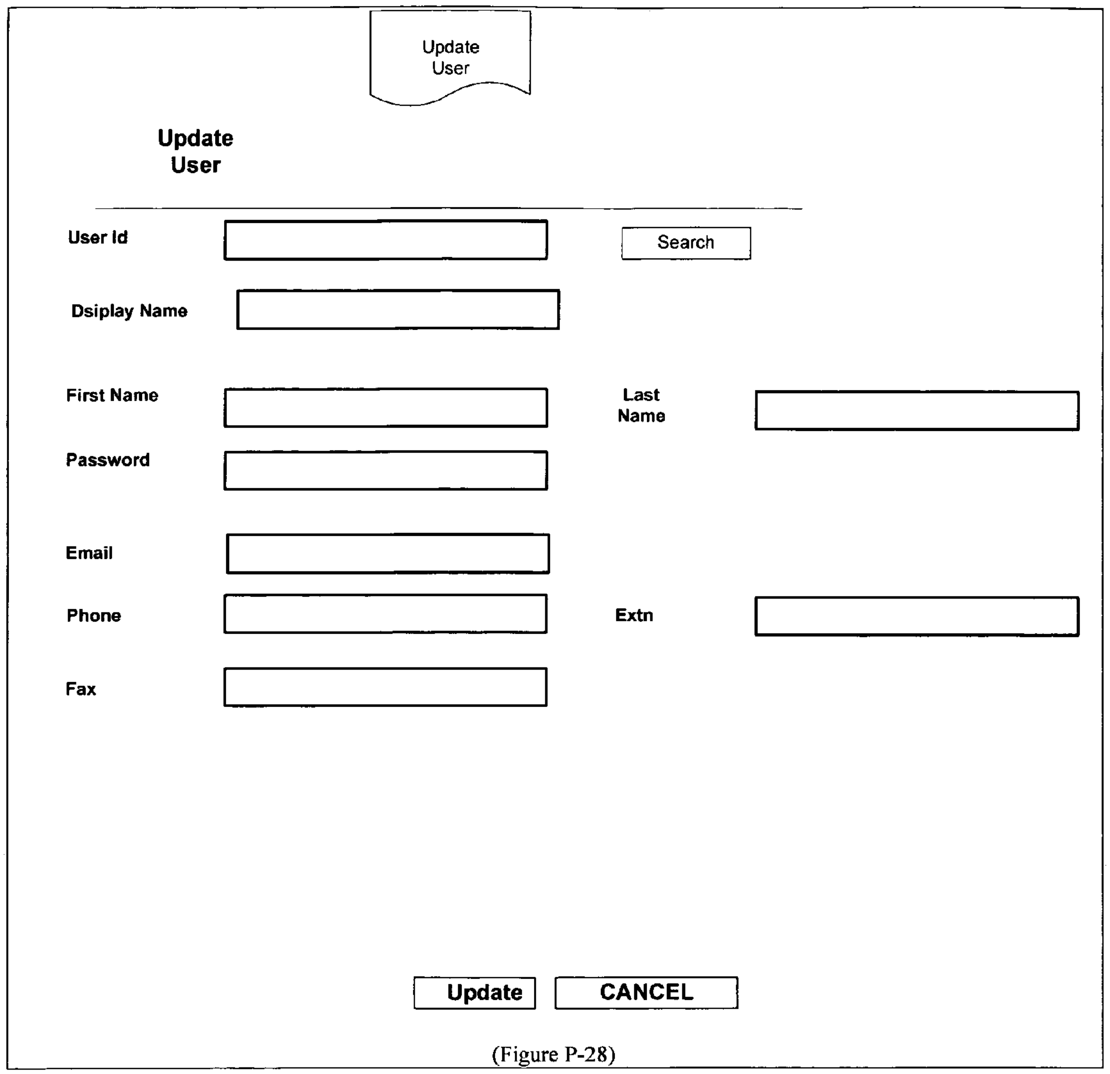
(Figure P-28)

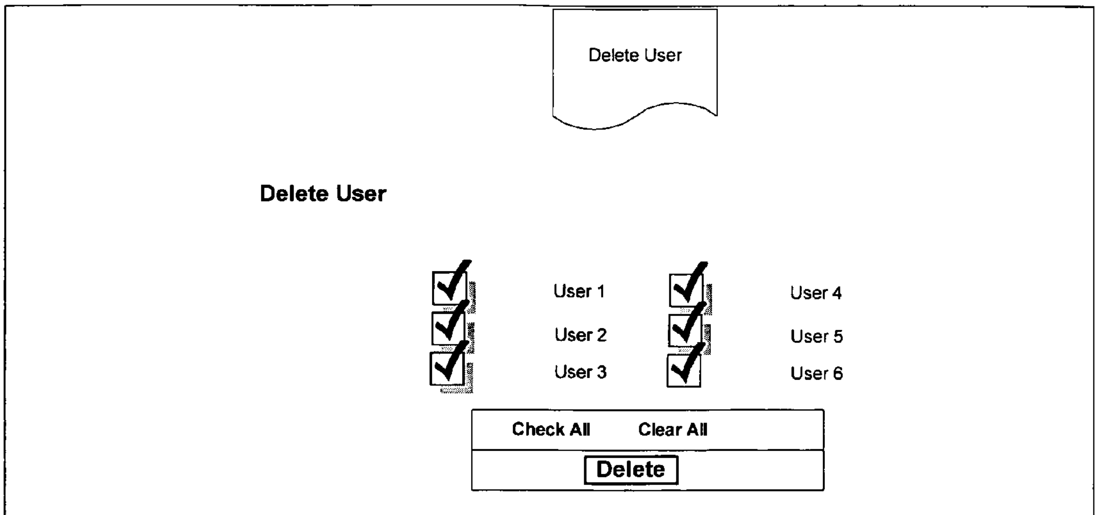
(Figure P-29)
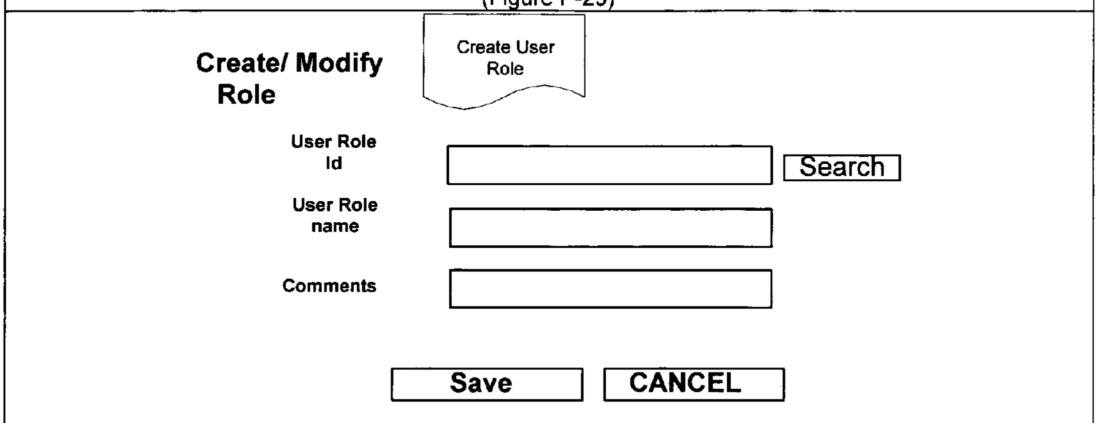
(Figure P-30)
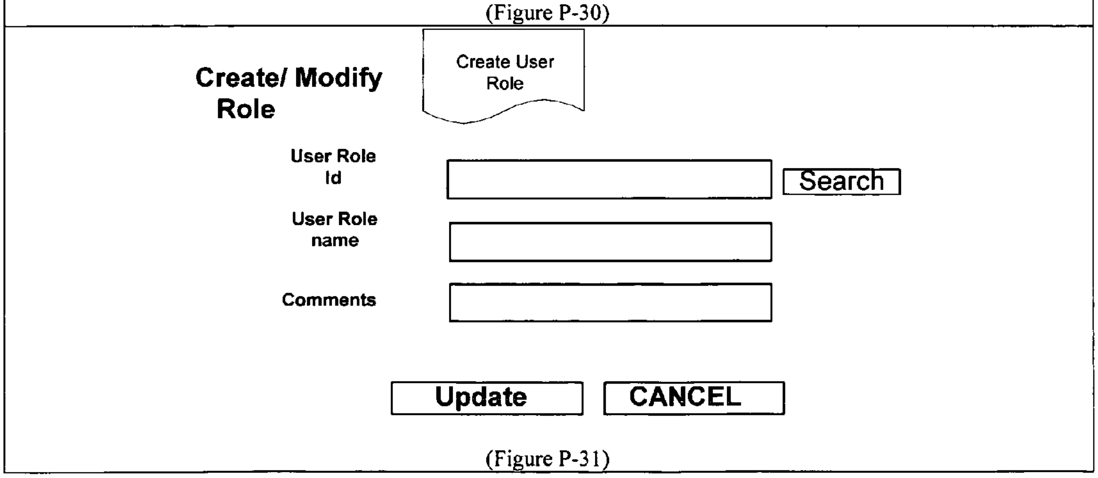
(Figure P-31)

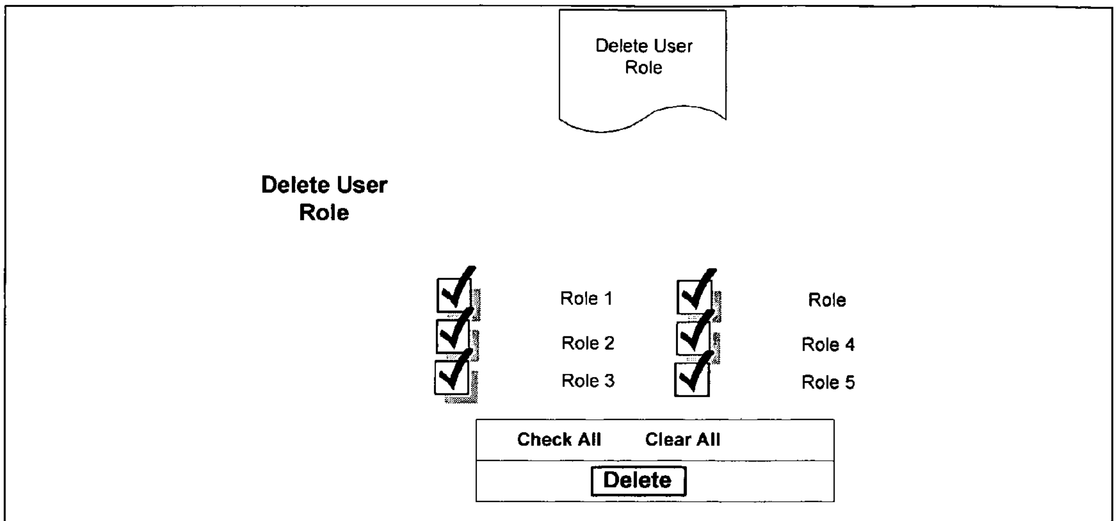
(Figure P-32)
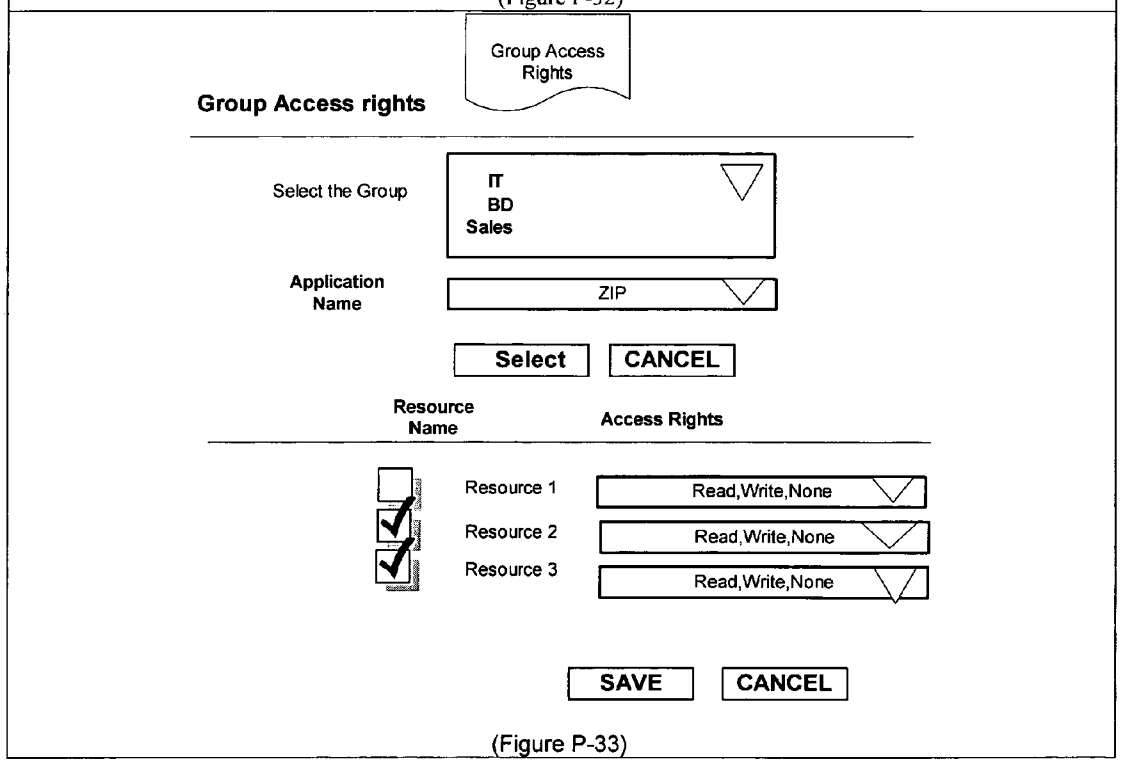
(Figure P-33)

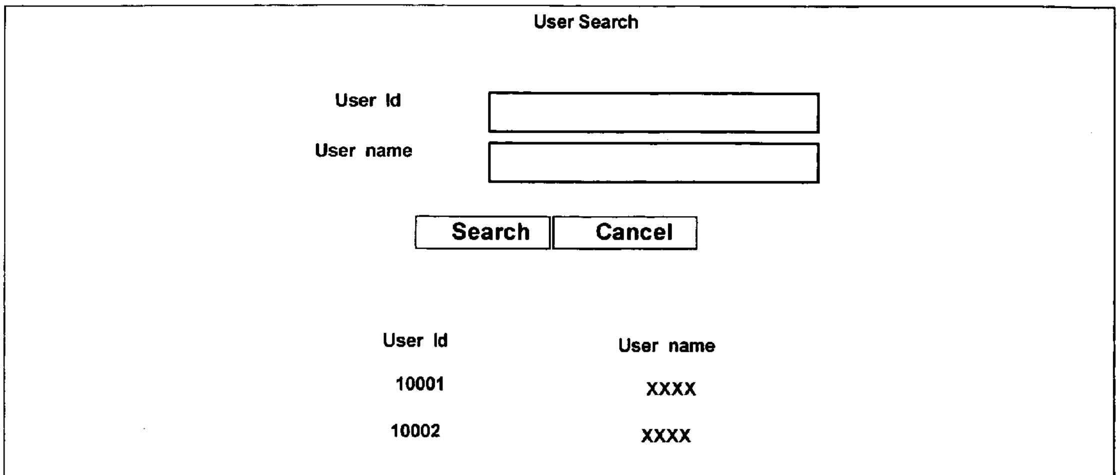
(Figure P-34)
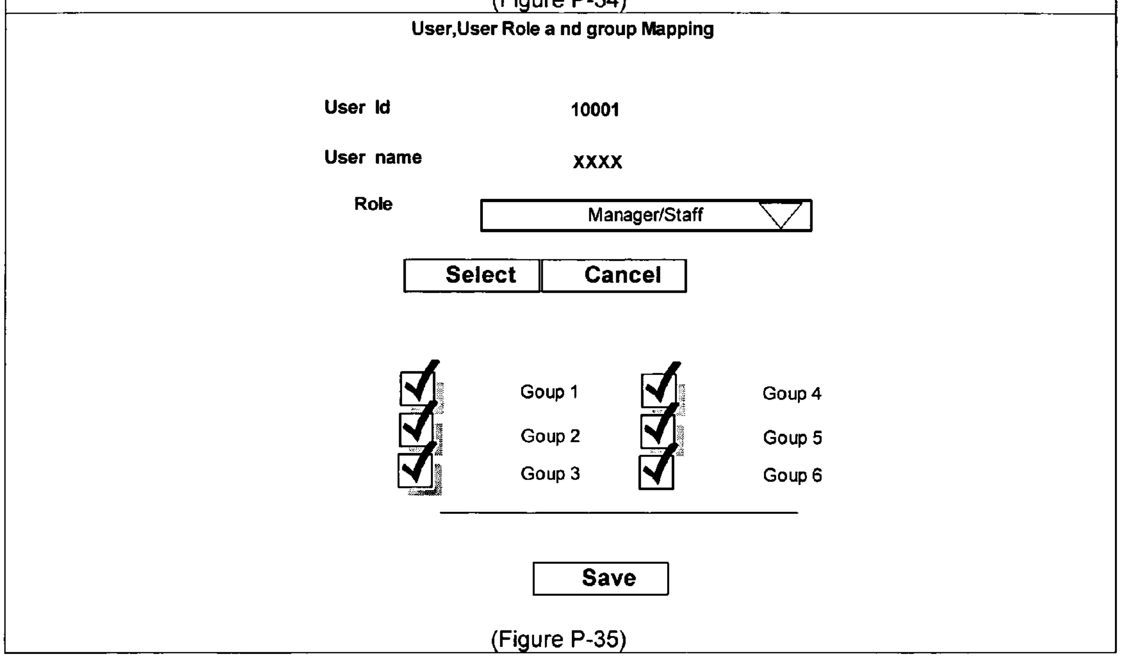
(Figure P-35)

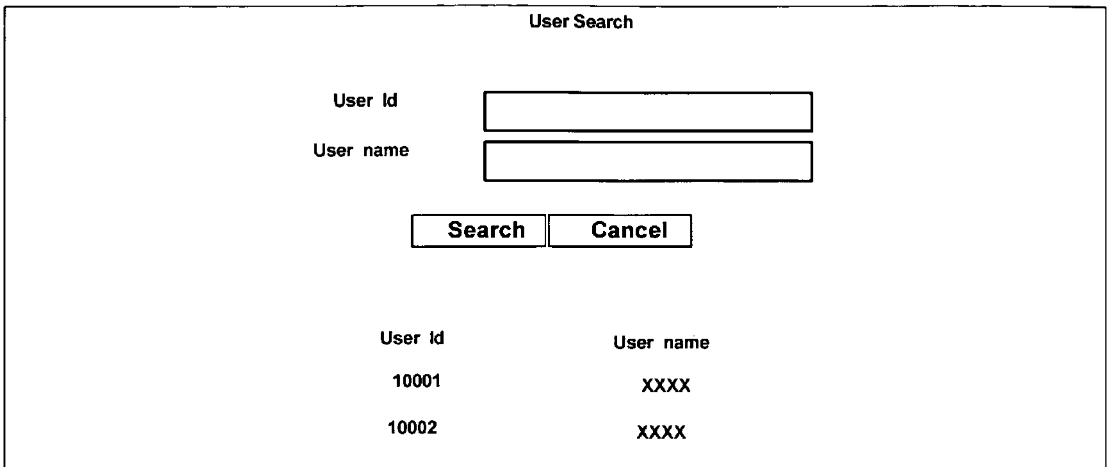
Figure P-36)
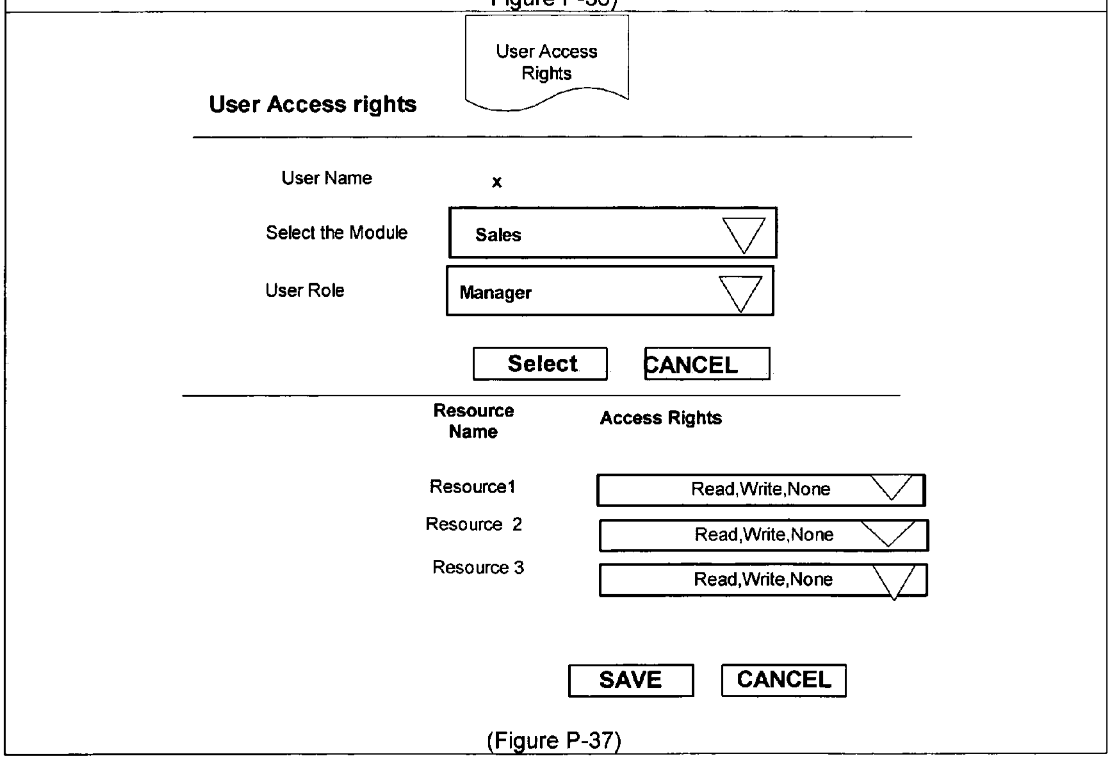
(Figure P-37)

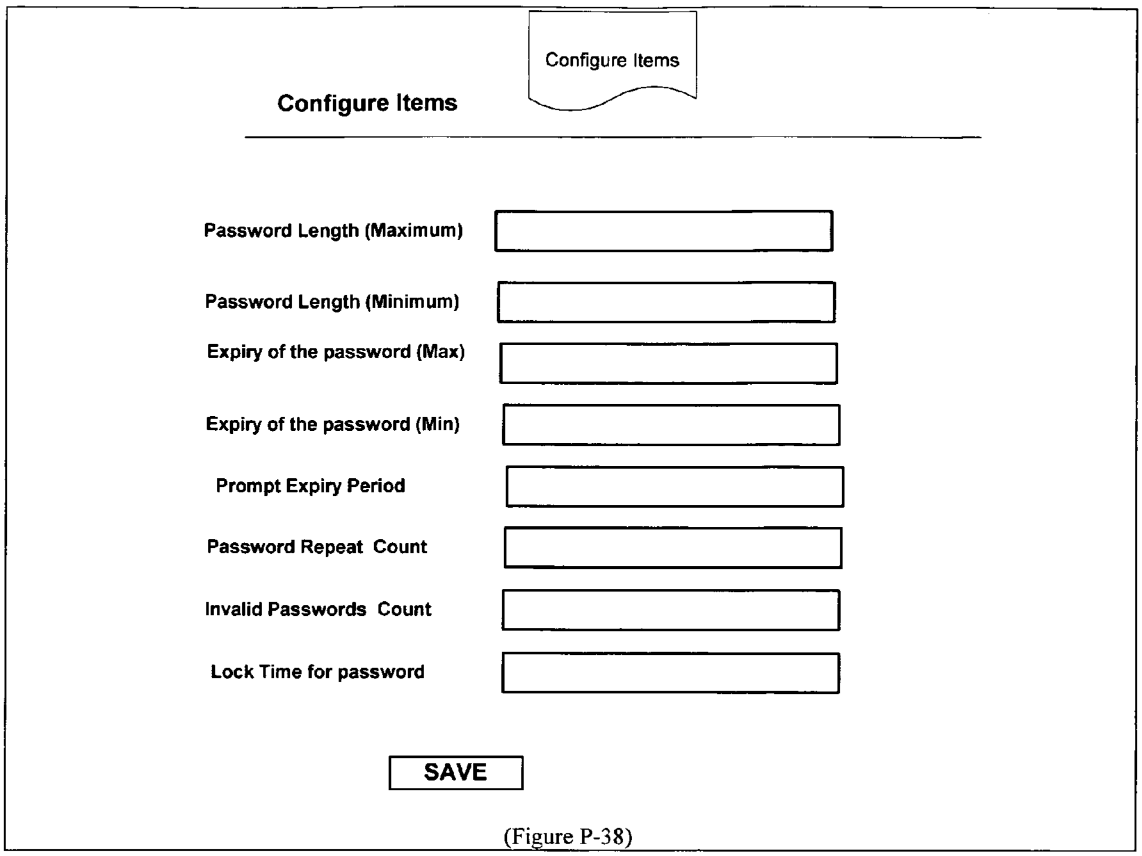
(Figure P-38)

BENEFITS ADMINISTRATION SYSTEM AND METHODS OF USE AND DOING BUSINESS

CROSS REFERENCE TO RELATED APPLICATIONS

This application claims priority through, and hereby incorporates by reference in its entirety, U.S. Provisional Patent Application Ser. No. 60/526,961, filed Dec. 5, 2003, entitled Benefit Administration System and Methods of Use and Doing Business.

The following document is a copyrighted text. All copyrights are reserved as allowed by law.

BACKGROUND

The present invention relates to benefits administration systems and methods of use and doing business. The present invention also relates to automated systems for administering benefits.

In business and industry, benefits plans are common. They often include health care, savings or retirement plan, insurance, and other funding or services for employees. Administration of benefits has long presented a substantial challenge for business and industry.

One prior art automated system designed for administration of benefits has been known as the "Phoenix" system. The Phoenix system automated certain benefits administration tasks and included features such as:

a. enrollment of beneficiaries through a limited-access, private computer network such as an business's internal computer network;

b. automated but limited application of certain basic business rules to inform the user, at the time of entry on-screen only, of certain limited missing information such as a beneficiary's address, birthdate dependents, or benefits plan choice;

c. automated reconciliation of payments provided they exactly match the amount invoiced to the customer;

d. limited automation of physical letter generation such as generation of a welcome letter to a new customer setting forth little more than the effective date of initiation of plan coverage for the customer;

e. automated maintenance of certain limited carrier data, including certain carrier rates and rating areas;

f. limited automation of Cobra enrollment by re-keying data for the Cobra enrollment into the system;

g. limited automation of open enrollment and re-qualification by automated sending out of notices and issuance of failure to re-qualify reports, allowing manual entry of termination if desired by the administrator;

h. automated termination and issuance of termination notice to the carrier upon first termination of a customer and thus well prior to conclusion of the re-instatement option period; and i. limited periodic reconciling of payments actually received in-house by receipt at the system administrator's mailroom, routing to the finance department for entry into the system; if the payments matched exactly the amount of their respective invoices, the finance department would initiate a program through that would reconcile the cash received against the invoice; non-matching payments would require substantial manual involvement in the reconciliation process j. The Phoenix system included numerous limitations and issues, however, including:

k. limited carrier data such as not including data (only zip codes and rates);

l. lack of automated creation of a Cobra record from information already in the system for a given beneficiary;

m. with regard to issuance of notices for enrollment or re-qualification, lacked ability select sub-groups (e.g., groups under 5 employees) for issuance of notices only to them, and also lacked automatic termination of groups that do not re-qualify;

n. providing notice of termination of a group to a carrier prior to expiration of a re-qualification period for the group including Cobra members of the group;

o. lack of automatic changing of employee status upon change of employee coverage (e.g., by changing from employee-only coverage to employee and spouse coverage), along with lack of automated corrected billing as a result of the change;

p. lack of automated reconciliation of cash upon closing of a batch of inputted premium checks, and automatic reconciling of premium notices with payments provided by multiple payments (e.g., multiple checks providing payment for a particular premium amount);

q. limited application of business rules to ensure correct data entry and limiting of enrollment as allowed by the rules, and relatedly, no ability to issue notices other than on-screen notices of certain limited types of information that may be missing;

r. limited ability to generate required notices, and limited or no ability to send notices through differing media (e-mail, mail, fax);

s. no ability to allow system access through remote or separate networks, such as via the Internet;

t. no ability to reconcile payments that do not exactly match invoice amounts, and no ability to issue notices based on matching discrepancies; and u. limited data handling capacity, requiring periodic purge data to run the system.

BRIEF SUMMARY OF CERTAIN ASPECTS OF THE INVENTION

In summary, the present invention relates to an automated benefit administration system and methods of use and doing business. In certain embodiments, a full system includes a wide range of features including application of business rules to enrollment, eligibility, and maintenance data input, making of business decisions based on the specific data entered, and issuing of notices based on business rule discrepancies including notices to third parties when deemed appropriate. The full system also is secure while providing remote access, including through the Internet, limits access based on user hierarchy, allows user customization of various features including communications vehicles (e-mail, letter correspondence, or facsimile) and of the format of certain communications, provides automatic enrollment in COBRA without re-entry of beneficiary data, accomplishes various types of financial reconciliation, accommodates differing organizational structures and groupings of entities, provides business rule over-ride capability for certain users, and provides robust information about carriers and their services.

There are many other novel aspects and aspects of embodiments of the present invention. They will become apparent as the specification proceeds. In this regard, it is to be understood that the scope of the invention is not be determined by whether given subject matter addresses all or particular issues in the prior art noted above or provides all or particular features identified in this brief summary.

BRIEF DESCRIPTION OF THE DRAWINGS

FIGS. A-1 to A-3 are diagrams illustrating aspects of architectures in which embodiments of the present invention may be implemented.

FIGS. B-1 to B-3 illustrate example screens used to create a line of coverage in embodiments of the present invention.

FIGS. B-4 to B-6 illustrate example screens used to create a plan type in embodiments of the present invention.

FIGS. B-7 to B-9 illustrate example screens used to enter details of benefit levels in embodiments of the present invention.

FIGS. B-10 and B-11 illustrate example screens used to enter details about a carrier in embodiments of the present invention.

FIGS. B-12 to B-15 illustrate example screens used to search, view and edit information about available carriers in embodiments of the present invention.

FIGS. B-16 to B-19 illustrate example screens used to add information pertaining to a product and plan in embodiments of the present invention.

FIGS. B-20 to B-23 illustrate example screens used to view and edit/modify information in an existing plan name in embodiments of the present invention.

FIGS. B-24 to B-26 illustrate example screens used to create an admin fee in embodiments of the present invention.

FIGS. B-27 to B-33 illustrate example screens used to search, view and edit admin fee information in embodiments of the present invention.

FIGS. B-34 to B-36 illustrate example screens used to enter details about agent fees in embodiments of the present invention.

FIGS. B-37 to B-43 illustrate example screens used to search, view and edit agent fee information in embodiments of the present invention.

FIGS. B-44 to B-46 illustrate example screens used to enter details about additional fees in embodiments of the present invention.

FIGS. B-47 to B-53 illustrate example screens used to search, view and edit additional fee information in embodiments of the present invention.

FIGS. B-54 to B-56 illustrate example screens used to enter details about rate differentials in embodiments of the present invention.

FIGS. B-57 to B-63 illustrate example screens used to search, view and edit rate differential information in embodiments of the present invention.

FIGS. B-64 to B-67 illustrate example screens used to import zip code information in embodiments of the present invention.

FIGS. B-68 to B-70 illustrate example screens used to commit import IDs in embodiments of the present invention.

FIGS. B-71 to B-73 illustrate example screens used to import rate information in embodiments of the present invention.

FIGS. B-74 to B-78 illustrate example screens used to export rate information in embodiments of the present invention.

FIGS. B-79 to B-81 illustrate example screens used to export loaded rate files in embodiments of the present invention.

FIGS. B-82 to B-84 illustrate example screens used to import plan availability data in embodiments of the present invention.

FIGS. B-85 to B-88 illustrate example screens used to export plan availability data in embodiments of the present invention.

FIGS. C-1 to C-6 illustrate example screens used to enter association details in embodiments of the present invention FIGS. C-7 to C-14 illustrate example screens used to modify the contents of an existing association in embodiments of the present invention.

FIGS. C-15 to C-28 illustrate example screens used to enter group details for a small employer group in embodiments of the present invention.

FIGS. C-29 to C-42 illustrate example screens used to enter group details for an alternate group/individual member in embodiments of the present invention.

FIGS. C-43 to C-58 illustrate example screens used to save or edit group details for an alternate group/individual member in embodiments of the present invention.

FIGS. C-59 to C-69 illustrate example screens used to save or edit group details for a small employer group in embodiments of the present invention.

FIGS. C-70 to C-87 illustrate example screens used to modify employee details, activate or inactivate an employee, or enter or modify employee dependent details in embodiments of the present invention.

FIGS. C-88 to C-105 illustrate example screens used to modify member details, activate or inactivate a member, or enter or modify member dependent details in embodiments of the present invention.

FIGS. C-106 to C-111 and C-113 to C-140 illustrate example screens used in COBRA functions in embodiments of the present invention.

FIGS. C-141 to C-160 illustrate example screens used in termination functions in embodiments of the present invention.

FIGS. C-161 to C-178 illustrate example screens used reinstatement functions in embodiments of the present invention.

FIGS. C-179 to C-191 illustrate example screens used in appeals and grievance functions in embodiments of the present invention.

FIGS. C-192 to C-204 illustrate example screens used to raise issues with carriers in embodiments of the present invention.

FIGS. C-205 to C-233 illustrate example screens used to add or modify details for employees or dependents, in embodiments of the present invention.

FIGS. C-234 to C-248 illustrate example screens used to export data in embodiments of the present invention.

FIGS. C-249 to C-323 illustrate example screens used to change group and member information in embodiments of the present invention.

FIGS. C-324 to C-384 illustrate example screens used in requalification and open enrollment functions in embodiments of the present invention.

FIGS. C-385 to C-399 illustrate example screens used to view group, employee or dependent details in embodiments of the present invention.

FIGS. D-1 to D-13 illustrate example screens used in billing functions in embodiments of the present invention.

FIGS. D-14 to D-20 illustrate example screens used in cash receipts functions in embodiments of the present invention.

FIGS. D-21 to D-28 illustrate example screens used in cash reconciliation functions in embodiments of the present invention.

FIGS. D-29 to D-35 illustrate example screens used in cash disbursement functions in embodiments of the present invention.

FIGS. D-36 to D-62 illustrate example screens used in finance operation functions in embodiments of the present invention.

FIGS. E-1 to E-26 illustrate example screens used in search zip, call tracking, mail merge and report generation in embodiments of the present invention.

FIGS. F-1 to F-6 illustrate example screens used in supply request functions in embodiments of the present invention.

FIGS. F-7 to F-20 illustrate example screens used in work group functions in embodiments of the present invention.

FIGS. F-21 to F-39 illustrate example screens used in associates and campaign functions in embodiments of the present invention.

FIGS. F-40 to F-94 illustrate example screens used in sales master functions in embodiments of the present invention.

FIGS. F-95 to F-106 illustrate example screens used in quotes functions in embodiments of the present invention.

FIGS. G-1 to G-8 illustrate example screens used in module master functions in embodiments of the present invention.

FIGS. G-9 to G-18 illustrate example screens used in application master functions in embodiments of the present invention.

FIGS. G-19 to G-27 illustrate example screens used in resource master functions in embodiments of the present invention.

FIGS. G-28 to G-35 illustrate example screens used in group master functions in embodiments of the present invention.

FIGS. G-36 to G-43 illustrate example screens used in user master functions in embodiments of the present invention.

FIGS. G-44 to G-51 illustrate example screens used in user role master functions in embodiments of the present invention.

FIGS. G-52 to G-66 illustrate example screens used in mapping functions, user role group mapping functions, group access rights functions, user access rights functions, and password configuration functions in embodiments of the present invention.

FIG. H-1 is a flowchart illustrating an example process of creating a master record for a carrier, FIGS. H-2 to H-9 illustrate example screens used in carrier record functions in embodiments of the present invention, and FIG. H-10 shows an associated screen flow.

FIG. H-11 is a flowchart illustrating an example process of creating a plan, FIGS. H-12 to H-14 illustrate example screens used in plan creation functions in embodiments of the present invention, and FIG. H-15 shows an associated screen flow.

FIGS. H-16 to H-19 are flowcharts illustrating example processes for admin fee, agent fee, additional fee and rate differential, FIGS. H-20 to H-31 illustrate example screens used in fee and rate functions in embodiments of the present invention, and FIG. H-32 shows an associated screen flow.

FIG. H-33 is a flowchart illustrating example zip processes, FIGS. H-34 to H-35 illustrate example screens used in zip functions in embodiments of the present invention, and FIG. H-36 shows an associated screen flow.

FIGS. I-1 and I-2 are flowcharts illustrating example COBRA processes, FIGS. I-3 to I-11 illustrate example screens used in COBRA functions in embodiments of the present invention, and FIG. I-12 shows an associated screen flow.

FIGS. I-13 to I-23 show screen flows for screens used in change management in embodiments of the present invention.

FIG. I-24 is a flowchart illustrating example requalification and open enrollment processes, FIGS. I-25 to I-30 illustrate example screens used in requalification and open enrollment functions in embodiments of the present invention, and FIGS. I-31 to I-33 show associated screen flows.

FIG. I-34 is a flowchart illustrating example termination processes, FIGS. I-35 to I-59 illustrate example screens used in termination and reinstatement functions in embodiments of the present invention, and FIG. I-60 show an associated screen flow.

FIGS. I-61 to I-64 illustrate example screens used in appeals and grievances functions in embodiments of the present invention, and FIG. I-65 show an associated screen flow.

FIGS. I-66 to I-71 illustrate example screens used in association masters functions in embodiments of the present invention, and FIG. I-72 show an associated screen flow.

FIGS. I-73 to I-76 illustrate example screens used in carrier issues functions in embodiments of the present invention, and FIG. I-77 show an associated screen flow.

FIGS. J-1 to J-8 illustrate example screens used in billing, cash receipt, cash reconciliation and risk adjustment functions in embodiments of the present invention.

FIG. K-1 is a diagram illustrating an example mail merge process, and FIG. K-2 is an example screen for mail merge functions in embodiments of the present invention.

FIGS. L-1 and L-2 illustrate example screens used in report functions in embodiments of the present invention, and FIG. L-3 show an associated menu outline.

FIG. M-1 is a flowchart illustrating example marketing campaign processes, FIGS. M-2 to M-8 illustrate example screens used in marketing campaign functions in embodiments of the present invention, and FIG. M-9 show an associated screen flow.

FIG. M-10 is a flowchart illustrating example sales masters processes, FIGS. M-11 to M-38 illustrate example screens used in sales masters functions in embodiments of the present invention.

FIGS. M-39 to M-44 illustrate example screens used in agent profiles functions in embodiments of the present invention.

FIGS. M-45 to M-53 illustrate example screens used in quote creation functions in embodiments of the present invention.

FIGS. N-1 and N-8 are flowcharts illustrating example supply request processes, and FIGS. N-2, N-3, N-9 and N-10 illustrate example screens used in supply request functions in embodiments of the present invention.

FIG. N-4 is a flowchart illustrating example work group processes, and FIGS. N-5 to N-7 illustrate example screens used in work group functions in embodiments of the present invention.

FIGS. N-11 to N-13 illustrate example screens used in associates and call tracking functions in embodiments of the present invention.

FIGS. P-1 to P-12 are flowcharts illustrating example security mechanism processes, and FIGS. P-13 to P-38 illustrate example screens used in security mechanism functions in embodiments of the present invention.

DETAILED DESCRIPTION

Certain embodiments of the benefits administration system may (i) apply rules to enrollment, eligibility, and/or group maintenance data input, preferably all such input, and (ii) make business rule decisions based on the specific data entered, preferably including automatic actions related to correct business rules as well as issuance of notices for business rule discrepancies. These capabilities can, in certain embodiments, include business rule over-rides based on user authority level.

For example, in the insurance industry, an enrollment application is required for enrollment into any insurance plan. Enrollment rules may pertain to the input of data from this application into the benefits administration system. An example of an enrollment rule may include inputting a Social Security number (SSN) that has been assigned to another member previously. In certain embodiments, the benefits administration system can produce a notification of a duplicate SSN and may not allow the completion of the member's enrollment utilizing the duplicate SSN.

Another example of an enrollment business rule is the entry of information for a new member who requests family health coverage but does not list any dependents on the new member's enrollment application in the system. In certain embodiments, the business rules within and automatically applied by benefits administration system can require the data entry of one spouse and at least one child in order to comply with family coverage. Without this dependent information, the system may refrain from allowing finalization of the enrollment. In certain embodiments, the system can then automatically designate the member's application as pending and generate one or more notices (such as letters) advising of the need for, or requesting, the missing information.

Eligibility rules may pertain to the specific business rules set up by the insurance companies. For example, to be eligible for a certain type of insurance, an employer group may require at least two employees; or in order for an employee to be eligible, the employee may have to work at least thirty hours per week. In certain embodiments, the benefits administration system may implement these types of specific rules.

For example, if a user seeks to enter an employer group with only one employee, in certain embodiments the system can thus refuse to finalize the enrollment unless another employee's information is entered. As another example, if user enters hours-work-per week for an employee less than the business rule of 30 hours, in certain embodiments, the system will not allow finalization of the enrollment. In certain embodiments, the system may accommodate exceptions such as when a user with a pre-determined authority level, such as a manager, desires to over-ride the eligibility business rule. In certain embodiments, the system can allow the exception based on pre-arranged authority levels within the system.

Group maintenance may pertain to enrollment/eligibility activities that occur after the finalization of a group's enrollment. One example may be the addition a newly hired employee to the employer group's plan. In certain embodiments, once the new employee application is received and data is entered, the system may apply one or more business rules for the waiting period for the new hire within the group within which the new hire is hired. Based on this comparison, the system may either assign a correct effective date or deny the enrollment because the employee has not properly satisfied the waiting period. In additional embodiments, if the employee is enrolled, the system may automatically issue an enrollment letter; or if denied, the system may automatically issue a denial letter.

Yet another group maintenance example may be the receipt of monthly insurance premium payments. In certain embodiments, the system may automatically issue an invoice outlining activity affecting the premium for a given period of time, such as the past month. Such activity may include adding a newly hired employee or dis-enrolling a terminated employee. In certain embodiments, the system may implement business rules to provide automatic reconciliation of the premium to the amount of an invoice.

In certain embodiments, the system may also be flexible enough to take into consideration activity that occurred after the creation of the invoice in reconciling the premium. For example, the monthly invoice to a given customer may total a particular amount. By the due date of the invoice, the employer may have sent notification of an employee disenrollment. The employer may have only sent a payment that deducts the premium for the disenrolled employee. In certain embodiments, the system can automatically reconcile the received payment against the invoice amount and the termination credit for the disenrolled employee.

In certain embodiments, the benefits administration system may implement varying authority levels for data entry and system operation. For example, the system may provide that (i) a data entry position may have authority to enter data but not to finalize enrollment even if all business rules are met; (ii) yet another position may have authority to finalize enrollment if all business rules have been satisfied; (iii) a supervisor may have authority to finalize enrollment with, as possible examples, minor premium shortages or non-eligibility-related missing enrollment information; (iv) managers may have authority to finalize enrollments with significant premium shortages or non-eligibility issues; and (v) a system administrator may have authority to over-ride any business rule.

Certain embodiments may also provide remote access through disparate networks, such as, for example, through the Internet, for enrollment, eligibility, or group maintenance data input. In certain embodiments, the system may then make business rule decisions based on the specific data entered. In certain embodiments, the system also may automatically perform actions related to the business rules. In certain embodiments, the system also may automatically issue notices, including on-line notice in certain embodiments, for business rule discrepancies. In certain embodiments, the system may include business rule over-rides based on the authority level of user.

In certain embodiments, the system can allow an external business customer to process enrollment, eligibility, or group maintenance via the Internet. For example, in the insurance industry, an enrollment application typically is required for enrollment into an insurance plan. In certain embodiments, the benefits administration system may allow this application to be entered remotely through a, preferably secure, Web site.

For example, an employer may request enrollment in a health insurance plan. In certain embodiments, the employer then may access the Web site provided by the system and enter the employer's current employees' demographic and health carrier information. The employer also may pay the first month's premium on-line through the Web site.

Preferably, the system prompts the on-line user for information. While the data is being entertained, in certain embodiments the system may compare the data to the business rules associated with each field. Once the input is completed properly, in certain embodiments the system may present an enrollment summary sheet summarizing enrollment information for the on-line user. For example, in certain embodiments implementing the a wage and tax form requirement for new group enrollments, the system may present the on-line user with the completed form and instructions to return the form to, for example, the insurance company for further processing. In certain embodiments, once the insurer approves enrollment, the system may automatically e-mail or otherwise forward an enrollment acceptance form to the user.

In certain embodiments, business rules remain identical whether for in-network or remote on-line transactions such as, for example, through the Internet.

Group maintenance may involve enrollment/eligibility activity occurring after the finalization of a group's enrollment. For example, if an employer or designated contact person is attempting to enroll a newly hired employee on-line, the employee is hired to work twenty hours per week, and the business rule set up for this particular group is that all employee's must work forty hours per week, in certain embodiments the system may dis-allow the finalization of the enrollment. In certain embodiments, the system may automatically issue a notice informing the group of the non-enrollment and, preferably, the reason(s) for the non-enrollment.

Another group maintenance activity can be employee or dependent disenrollments. In certain embodiments, the employer or designated person may access the appropriate group information on-line and enter the requested termination date. If the requested termination date complies with the business rule, in certain embodiments the system may immediately process the termination, preferably including the sending of a termination notice and COBRA information to the disenrolled employee, adjusting the applicable premium invoice, and notifying the appropriate insurance carrier. If the requested termination date is not within the pertinent business rules, in certain embodiments the system may calculate the termination date and display the date to the on-line user. If the user were to accept this date, in certain embodiments the system may complete the termination and, preferably, issue a notification to the user, such as by e-mail. If the user were to decline the system's proposed termination date, in certain embodiments the system may place the requested employee termination on hold and, preferably automatically, issue a notice of the situation to an appropriate representative.

In certain embodiments, the system may limit the capability to over-ride business rules to in-house personnel (e.g., the personnel of the entity that administers the system).

In certain embodiments, the system can provide a security application or process in order to control access to the system. In certain embodiments, the security framework includes a security information database as well as an administrator login capability. In certain embodiments, the system can allow the administrator to create users, modules, groups, applications, and assign user roles and access control lists (ACLs), etc. Preferably, the system significantly restricts access to the core administrative system.

In certain embodiments, the system generates an ACL for each user at the time the user logs into the system. Access to any resource in the core administrative system may be determined by the ACL, and the determination may be stored in, e.g., a user profile object, which may be stored into the session. A user can include a person working in any of the departments in a company, Internet users, or persons accessing an in-house system from an external location. In certain embodiments, individual user permissions take precedence over group permissions. In certain embodiments, even if the group permission is less restrictive than the user permission, the user permission overrides the group permission.

For example, the agent/broker of a large association group may want to allow the members of the association to enroll through the Internet but to also provide for agent/broker review of applications prior to actual enrollment. In certain embodiments, the system, through its security system, can allow such members to enroll through the Internet (with the application being processed through the enrollment/eligibility business rules), then route the completed application to the agent/broker (versus directly into the system after passing all the business rules), in order to allow the agent/broker to review the application. In certain embodiments, upon completion of such review and approval by the agent/broker, the system can automatically finalize the enrollment.

In certain embodiments, the benefits administration system may also provide the automatic generation of documents and other communications, customizable to the desires of the users. In this regard, the system may provide a flexible mail merge system for handling external business correspondence. In certain embodiments, the merge templates are basically RTF files with placeholders for dynamic data to be merged into them. In certain embodiments, the output is either a RTF file or a PostScript or a PDF document.

In certain embodiments, the system can also maintain a log of mail merge letters generated. The log information may include the template identification, a timestamp, the triggering application, and identification of the user generating the letter and to whom the letter is addressed (i.e., which group or member or agent). In certain embodiments, the templates are readily available, and the system may accommodate a virtually unlimited number of templates.

For example, when the agent/broker provides final approval for association member enrollment, in certain embodiments the system may issue enrollment approval and related correspondence. In certain embodiments, such correspondence or other documentation may be customized through the system to issue on the agent/broker's letterhead.

In certain embodiments, the system may provide for customizable work groups. Workgroups may define the broad categorization of a group of agents, internal working personnel, external working personnel, and mailing groups. In certain embodiments, the workgroup customization process includes creating a hierarchy of one or more parent entities and defining other workgroups under the parent(s).

In this event, a parent may be the highest in the hierarchy of a workgroup. Examples of parent work groups may include agent work groups or internal work groups. Examples of workgroups under the parent group may include groups of agents of differing authority levels within a given agent work group. In certain embodiments, further sub-groups or child groups may be established within the system. An example may include may include agents in a given geographical area or a customer group that has been enrolled in the system. In certain embodiments, the system includes the ability to exchange workgroup members or duplicate workgroup members in whole or in part.

In certain embodiments, the benefits administration system provides automatic but flexible account reconciliation. Cash reconciliation can provide a process of reconciling the cash receipts to individual invoices and reconciling the amount paid by the group. In certain embodiments, the system may provide a rule for reconciliation such as, for example:

a. determine if negative cash is available and reconcile it with the positive cash (e.g., for NSF checks); and
b. identify the oldest unreconciled invoice and reconcile it with the oldest cash.
c. The reconciliation process may include automatic review of all invoices that have not been reconciled for a specific group and reconciling the invoice that has the earliest date with the cash received. It also may match the cash receipt with the invoice amount.
d. In certain embodiments, the reconciliation process can be started automatically when a cash receipt batch is closed to reconcile cash received with invoices.
e. Other functions that may be automatically performed in cash reconciliation may include one or more of the following:

f. Billed amounts and cash receipt: this reconciliation process may reconcile an invoice that has not yet been reconciled for a specific group, determine if the invoice is the earliest unreconciled invoice for the specific group, and reconcile the invoice with the cash received from the group/member;

g. Cash to negative cash: this process may reconcile negative cash with the positive cash received from the group. This may arise from receipt of a NSF (Non-Sufficient Funds) check after the applicable group's invoice has been reconciled. Upon receipt of notification of the NSF check, the NSF cash receipt entry may be created in the system. Upon receipt of a replacement check for the NSF check, the NSF check may be automatically reconciled with the replacement check provided the amount of the replacement check is the same as the amount of the NSF check.

Adjustments to cash: this process may include reconciling a cash receipt with the adjustment that may be available in the next invoice. For example, if the group has received the invoice for the next month and an employee has been terminated during the month but after the generation of invoice, the generated invoice may not identify this adjustment for the termed employees. The applicable group may deduct the adjustments for the terminated employee and forward the cash that does not match the original invoice. In certain embodiments, the system can automatically identify the discrepancy and adjust the cash receipt for the invoice with the termination adjustment taken in to account. In certain embodiments, the next invoice may identify the cash receipt and the adjustment for employee termination.

Adjustment to billed amounts: this process can identify previously billed invoices for the group provide adjustment as needed to the next invoice.

Billed amount to itself if no payment is due: this process can identify if the group has been terminated after the invoice for the group has been created. In certain embodiments, the system automatically creates an invoice for the terminated group and adjusts the amount due based on the previous invoice. In certain embodiments, the system issues a final invoice for the terminated group showing net amount due, if any, or refunded.

Adjustment to adjustment: this process may reconcile invoice adjustments against each other. For example, if a payment late fee accrues but is later waived, in certain embodiments the system may automatically adjust (eliminate) the late fee. Another may involve reinstatement of an employer group termination and associated charging of a reinstatement fee. If such a fee were to then be waived, in certain embodiments the system may automatically reconcile the waived fee.

Certain embodiments of the benefits administration system provide a substantially improved ability to handle much larger data sets and to handle data more efficiently. In addition, certain embodiments utilize an independent platform and portable programming language such as Java. Preferably, the system components are built using object oriented programming concepts. Preferably, these object-oriented components can be reused in other applications with similar requirements or extended further with additional features when and wherever required. Preferably, the system is developed using scalable J2EE standards.

In certain embodiments, the system may allow a given user to work with the system in differing roles or capacities. For example, a manager may seek to perform the role of data entry as well as that of a manager or authorizing entity. In certain embodiments, the system allows modification or addition of user roles as desired. In certain embodiments, the CAS (Core Administration System) system is, however, pre-configured for a basic set of predefined roles.

In certain embodiments, the benefits administration may further provide one or more of the following aspects:

a. selective issuance of notices to sub-groups meeting certain criteria;

b. automated creation of a Cobra record from information in the system for a given beneficiary;

c. automatic issuance of notice to a member prior to termination of the re-qualification period;

d. automatic revision of employee status upon change of employee coverage;

e. automatic issuance of notices when data is not entered correctly or completely, including issuance of other than on-screen notices to one or more system administrators or other entity;

f. ability of a user to customize how the user may be provide notices or correspondence, such as by e-mail, mail, or facsimile; and g. enhanced carrier data maintenance within the system.

The system may be utilized by a benefits provider as part of it business and operation. Alternatively, the system may be utilized by a service provider, such as for or in connection with remuneration provided to the service provider by customers. For example, user fees may be provided by the users of the system, such as benefits providers or employers.

The system may also be utilized by an employer or group of employers, and their employees, to provide automated benefits administration for the employer or group of employers.

In certain embodiments, all features identified above may be provided by the system. The system may thereby provide an automated benefits administration and method of use of the system and doing business in conjunction with it.

The following sections include implementation details, detailed explanations and detailed illustrations of various aspects of embodiments of the present invention. These sections include:

1. an architectural design specification, which proceeds with reference to FIGS. A-1 to A-3;
2. a user manual concerning carrier maintenance, which proceeds with reference to FIGS. B-1 to B-88;
3. a user manual concerning enrollment, which proceeds with reference to FIGS. C-1 to C-399;
4. a user manual concerning finance, which proceeds with reference to FIGS. D-1 to D-62;
5. a user manual concerning other features, which proceeds with reference to FIGS. E-1 to E-26;
6. a user manual concerning sales and marketing, which proceeds with reference to FIGS. F-1 to F-106;
7. a user manual concerning user administration, which proceeds with reference to FIGS. G-1 to G-66;
8. a process specification for various use cases, which proceeds with reference to FIGS. H-1 to H-36;
9. process specifications for COBRA enrollment, change management, ROE/OE processes, termination, reinstatement, appeals and grievances, association masters and carrier issues, which proceed with reference to FIGS. I-1 to I-77;
10. process specifications for billing, cash receipt and cash reconciliation, and risk adjustment, which proceed with reference to FIGS. J-1 to J-8;
11. a functional specification document concerning mail merge, which proceeds with reference to FIGS. K-1 and K-2;
12. a process specification for reports, which proceeds with reference to FIGS. L-1 to L-3;

13. process specifications for campaigns, sales masters, agent profiles and quote creation, which proceed with reference to FIGS. M-1 to M-53;
14. process specifications for supply requests, workgroups, associates and call tracking, which proceed with reference to FIGS. N-1 to N-13;
15. a process specification for security mechanisms, which proceeds with reference to FIGS. P-1 to P-38; and
16. a process specification for common functional features.

Benefit Partners Inc

BPI

Software Architecture Document

Architectural Design Specification Document

Document Id: BPI_CAS_ADS
Version: <1.0>

1. Introduction

The Software Architecture Document will provide an overview of the entire "Software Architecture" that will be used to develop Web Interface Module for BPI.

1.1. Purpose

This document provides a comprehensive architectural overview of the system, using a number of different architectural views to depict different aspects of the system. It is intended to capture and convey the significant architectural decisions that have been made on the system.

1.2. Definitions, Acronyms and Abbreviations

Some of the common acronyms used in this document are as follows:

| Abbreviations | Description |
|---|---|
| EJB | Enterprise Java Beans |
| HTML | Hypertext Markup Language |
| J2EE | Java 2 Enterprise Edition |
| JMS | Java Messaging Services |
| JNDI | Java Naming and Directory Interface |
| JSP | Java Server Pages |
| MVC | Model View Controller |
| W3C | World Wide Web Consortium |
| XML | Extensible Markup Language |
| BPI | Benefit Partners Inc |

1.3. Overview

This Software Architecture Document, at high level, will contain:

a. Architectural representation of proposed system
b. Architectural goals
c. Software requirement
d. Software selection for the proposed system
e. Standards and methodologies that will be adopted for the proposed system 2. Architectural Goals These guidelines will lay a foundation for the design and implementation strategy, selection of development tools, application software, and testing tools. The basic goals of the architectural design are discussed below.

2.1. Portability

Java is a platform independent and portable language. Applications developed in Java are proven to be portable across popular platforms.

2.2. Distribution

The J2EE Standards will be adopted to develop the new application. J2EE standards demonstrate consistency of distributed applications that access various data sources.

2.3. Reusability

The components will be built using Object Oriented concepts. These object-oriented components can be reused in other applications with similar requirements or extended further with additional features when and wherever required.

2.4. Scalability

Applications developed using the J2EE Standards are proven to be scalable. Therefore, the system will be built in conformance with the J2EE Standards.

2.5. Performance

Identifying the latencies within the system and outside the system boundaries enables us to increase the performance of the application. Since most of the threading issues that lower the performance of an application are well handled within the Websphere application server, Websphere server's features and resources will be effectively utilized to achieve performance.

3. Architectural Representation of the Proposed System

The System will be developed based on the J2EE specification and follow the N-tier MVC architecture.

A tier is a logical partition of the separation of concerns in the system. Each tier is assigned its unique responsibility in the system.

J2EE specifications are multi tiered consisting of the Client Tier, Middle Tier (Presentation Layer, Business Layer, and Integration Layer), and the Data source. The J2EE architecture diagram is described below. (See FIG. A-1)

3.1. Client Tier

This tier represents all devices or system clients accessing the system or the application. In this case, the client would be a web browser or other application.

3.2. Middle Tier

The middle tier can be classified into multiple logical layers depending upon the business requirements and programming model. Three basic classifications are discussed below.

3.2.1. Presentation Layer

This tier encapsulates all presentation logic required to service the clients that access the system. The presentation tier intercepts the client requests, provides single sign-on, session management and accesses business services, constructs the response, and delivers the response to the client. Servlets, JSP, HTML reside in this tier.

3.2.2. Business Layer

This tier provides the business services required by the application clients. The tier contains the business data and business logic. All business processing for the application is centralized into this tier. The enterprise bean components are the choice for implementing the business objects in the business tier.

3.2.3. Integration Layer

This tier is responsible for communicating with external resources and systems, such as data stores and legacy applications. The business tier is coupled with the integration tier whenever the business objects require data or services that reside in the resource tier. The components in this tier can use JDBC, J2EE connector technology, or some proprietary middleware to work with the resource tier.

3.3. Data Source

This is the tier that contains the database and external resources such as legacy systems, business-to-business (B2B) systems, and services, such as, credit card authorization and EFT.

3.4. Framework

The following figure depicts the interaction model of a typical Model View Controller or the JSP Model 2 Architecture that is adopted in the Framework. (See FIG. A-2)

Here, the servlet acts as the controller and is in charge of processing the request and creating any objects of the beans used by the JSP. It also redirects, to the respective JSP, based on the Browser's request. There will be very minimal logic present in the JSP regarding the presentation. All the database access and program business logic will be processed within the bean.

There will be different beans for data source access (database, enterprise systems, queue, XML, etc.), error handling, access logging, and module wise application business logic processing. This clearly separates the presentation from the content and enables easy maintenance and scalability.

This model is the widely used and accepted model for application development in Java. This model is also adopted by Apache Struts framework for Java application development.

4. Software Selection for the Proposed System

This section provides an insight on the software selection for the various tiers depicted in this document.

4.1. Software Selection

| Component | Software Name and Version |
|---|---|
| Operating System | Server/Client - Win NT/Win 2000 |
| Browser | IE 5.5 and above |
| Client Side Scripting | HTML 4.0, Java Script 1.2 |
| Server Side Programming | JSP 1.1, Java Servlets 2.2, JDK 1.3 |
| Database Server | DB2 UBD Version V 7.3 |
| Web Server | IBM HTTP Server V 1.3.19 |
| Application Server | Websphere Application Server Advanced Edition Version 4.0 |
| Report Server | Seagate Crystal Reports 8.5 |
| Office Tools | Microsoft Office 2000 (select Word 2000, Excel 2000 and Outlook 2000 and Access 2000), Post Script Printer, Adobe Acrobat 5.0 |
| Servlet, Bean Development | Visual Age 4.0 |
| HTML, JSP, XML, etc. | Dream Weaver 4.0 |
| Testing | JTest 4.5 |
| Data Flow and Class Design | UML Studio |

4.2. API Versions

| API Name | Version | Remarks |
|---|---|---|
| J2EE | Specification 1.2 | Supported by Websphere 4.0 |
| EJB | Specification 1.2 | Supported by Websphere 4.0 |
| JDK | JDK 1.2.2 | Supported by Websphere 4.0 |
| Servlet | Servlet 2.2 | Supported by Websphere 4.0 |
| JSP | JSP 1.1 | Supported by Websphere 4.0 |
| HTTP | HTTP/1.1 | Stable W3C Specification |

5. Standards and Methodologies

The standards and methodologies that will be followed for the application development are discussed below.

5.1. Design Document

Detailed design document will be prepared based on the scope of the application prior to the development. This document will contain the details on graphic user interface, navigation, class diagrams, data dictionary, field validation criteria, and program logic.

5.2. Bean Classification

The types of Java beans that will be used to perform different business logics will be decided during the design stage. The bean types will be classified based on the complexity of the business logic and the scalability.

5.3. Coding

A separate document will be prepared outlining the coding standards that will be adopted in the application development. The document will contain details on program naming conventions to be used while coding. All programs developed will follow this standard.

5.4. Testing

Test plan and test case documents will be prepared for unit and integration testing of the application. The test cases will be used to test the application modules and integration. JTest will be used for testing code construction (white-box testing), code functionality (black-box testing), and code integrity (regression testing).

5.5. Error Handling

All error messages and error codes for the application will be stored in the database. Run time errors will be logged to text files that will be generated periodically by the system. Input validations will occur in both the client tier and the middle tier. The input validation error messages captured in the client tier will be displayed using JavaScript alerts. The input validation error messages captured in the middle tier will be displayed in HTML format, on the same page on which the error has occurred, in a different color.

5.6. Page Design

A Page Design Guidelines document will be created by Mascon, and approved by BPI, prior to the development. All pages in the application will conform to the standards depicted in this document. This document will contain the specifications for fonts, layouts, images, and other relevant details.

5.7. Parameterization

Custom JSP tag libraries will be created for all initial values and parameters used in the application. JSP tag libraries define declarative, modular functionality that can be reused by any JSP page. Tag libraries reduce the necessity to embed large amounts of Java code in JSP pages by moving the functionality provided by the tags into tag implementation classes. In doing so, tag libraries make authoring JSP pages easier and modular.

6. System Architecture and Hardware Selection

This section provides the details of the system architecture with nodes, terminals and their placement within the respective zones.

6.1. Physical Architecture (See FIG. A-3)

6.2. Hardware Selection

| # | Server | Base | Current Configuration | Software/Hardware |
|---|---|---|---|---|
| 1 | Database Server | Intel Pentium Processor, 2 CPU, HD 104 GB, 2 GB RAM, Raid 5 | Intel XEO Processor 1 CPU HDD 34 GB 2 GB RAM CPU 2.4 Ghz. | 1. Windows 2000 Advanced Server 2. IE 5.5 and above 3. IBM DB2 UDB version 7.2.x |
| 2 | Application Server - Intranet | Intel Pentium Processor, CPU 1, HD 18 GB, 2 | Intel XEO Processor 1 CPU | 1. Windows 2000 Advanced Server 2. IE 5.5 and above |

-continued

| # | Server | Base | Current Configuration | Software/Hardware |
|---|---|---|---|---|
| | | GB RAM | HDD 200 GB<br>2 GB RAM<br>CPU 2.4 Ghz. | 3. Websphere Application Server Advanced Edition Version 4.0<br>4. IBM DB2 UDB version 7.2.x (For WAS Repository)<br>5. IBM HTTP Server 1.3.19<br>6. Microsoft Office 2000 (select Word 2000, Excel 2000 and Outlook 2000 and Access 2000), Post Script Printer, Adobe Acrobat 5.0 |
| 3 | Application Server - Internet | Intel Pentium Processor, CPU 1, HD 18 GB, 2 GB RAM | Not Available | 1. Windows 2000 Advanced Server<br>2. IE 5.5 and Netscape 4.7 and above<br>3. Websphere Application Server Advanced Edition Version 4.0<br>4. IBM DB2 UDB version 7.2.x (For WAS Repository)<br>5. Microsoft Office 2000 (select Word 2000, Excel 2000 and Outlook 2000 and Access 2000), Post Script Printer, Adobe Acrobat 5.0 |
| 4 | Report Server - Crystal Reports | Intel Pentium Processor, CPU 1, HD 18 GB, 2 GB RAM | Intel Processor 1 CPU<br>HDD 17 GB<br>2.3 GB RAM<br>CPU 1266 Mhz. | 1. Windows 2000 Advanced Server<br>2. IE 5.5 and above<br>3. Seagate Crystal Reports 8.5<br>4. Microsoft Office 2000 (select Word 2000, Excel 2000 and Outlook 2000 and Access 2000), Post Script Printer, Adobe Acrobat 5.0<br>5. IIS for Crystal reports |
| 5 | Web Server - Internet | Intel Pentium Processor, CPU 1, HD 18 GB, 2 GB RAM | Not Available | 1. Windows 2000 Advanced Server<br>2. IE 5.5 and above<br>3. IBM HTTP Server 1.3.19<br>4. Microsoft Office 2000 (select Word 2000, Excel 2000 and Outlook 2000 and Access 2000), Post Script Printer, Adobe Acrobat 5.0 |

7. Browser Client Application Limitations and Work Around Solutions

The limitations of the Web Browser (thin client) based application, when compared to thick clients, are as follows:

a. Input field masking, such as automatic date formatting and phone number formatting, are not easily handled in this environment. The thin client user interface is not as easy and robust as the thick client user interface. A work around must be designed to force the user to enter values in the required format.

b. Due to the limitations of different browsers, a common methodology will be adopted that will work for all indicated browsers. This narrows down the user interface implementation features in a browser.

c. Because of the lower level on interactivity, some actions that are presented entirely on one screen in the thick client may span multiple screens. Since each screen presentation involves a round trip to the server, this will result in slightly slower screen response when compared to the single screen approach. This can be minimized with some re-design of the user interface workflow, but overall, thin clients require more "clicks" than thick clients.

d. Hot-keys validation scripts are cumbersome and take longer to download. Thus, hot-key functionality will be limited.

PX2 User Manual

Carrier Maintenance

1 Introduction

Carrier Maintenance is the master module that encompasses the process of creating and maintaining all master information that is required for the PX2 System like Master Plan, Carrier Master, Product Profile, Rate Administration and Carrier Maintenance operations like import and export utilities.

The Applications

The above-mentioned processes are accomplished in several applications embedded into the Carrier Maintenance Module. These applications steer the tasks of creating, and maintaining master information for the PX2 entities, thereby helping achieve the goals of the Carrier Maintenance.

Master Plan—Master plan is to setup high-level information from a broad spectrum of coverages, plan and benefits offered by PacAdvantage. This includes line of coverage like Medical, Dental Vision and Chiropractic, plan type like HMO, PPO, POS, indemnity etc. and benefit level like Standard, Preferred Plus etc.

Carrier Master—Carrier Master is to setup information on the carriers. This provides demographic information about the carrier.

Product Profile—Product Profile is the product or the plan offered by each carrier based on the broad spectrum of master plan provided by PacAdvantage. The product includes wide range of benefits provide by the carriers. For example Blue Shield—HMO, American Specialty Health Plan etc. This also includes information about premium and enrollment data transmission profiles of each carrier for the specific plan.

Rate Administration—Rate administration is to administer various rate and fees to calculate the premium amount. These different fees structures are classified as admin fees, agent fees, additional fees and differential factor.

Carrier Maintenance Operations—Various utility operations are performed for the maintenance of the Carrier Master Module. These utilities include import and export of data into or from the PX2 System. Various Carrier Maintenance operations are.

Import Zip Codes—is to upload all zip codes in the state of California or USA. This information would be used for rates calculation based on employee's zip code of residence.

Import and Export Rates—is to upload raw rates for all the plans and export the rates in the given formats.

Import and Export Plan Availability—is to upload the Plans available for the specific carrier in the specific service area/county/zip and export the plans available for the specific carrier in the specific Service area/county/zip in a given format.

2 Master Plan

MPlan (Master Plan) is to setup basic information like Line of Coverage, Plan Type, Benefit Level offered through PACAdvantage. All Benefit Level, Plan type and the line of coverage offered by PACAdvantage is available in the Master Plan.

Access

The application can be accessed from the main menu as follows:

Carrier Maintenance→Master Plan→Line of Coverage.
Carrier Maintenance→Master Plan→Plan Type.
Carrier Maintenance→Master Plan→Benefit Level.

Pre-Requisites.

There are no pre-requisites for using this application.

Application Functions

This application has the following functions:

Line of Coverage—to create, edit and delete Line of Coverage.
Plan Type—to create, edit and delete Plan Type.
Benefit Level—to create, edit and delete Benefit Level.

Line of Coverage

The line of coverage screen is to enter the details of line of coverage (LOC). The screen provides functionality to add, modify, view, and delete line of coverage.

The sequential steps involved in the creation of a line of coverage are listed below.

Step—1: After successful logon, click the menu Carrier Maintenance. Select Master Plan and then Line of Coverage. (See FIG. B-1)
Step—2: Enter the values in the respective field, as per the format briefed in field's explanation section. (See FIG. B-2)
Step—3: Click Add button to have a temporary storage.
Step—4: Also Edit button can be clicked for any modifications.
Step—5: Change the contents to be modified and click Update. (See FIG. B-3)
Step—6: Click Save button to save the contents.

Fields Explanation

| Element | Description |
|---|---|
| Line of coverage | The text for line of coverage. Accepts alphabets and numeric values of length not exceeding 20 characters. Entry to this field is mandatory. Line of Coverage does not accept duplicate values |

Button Functionality

| Element | Description |
|---|---|
| Add | Add the name of line of coverage. It is only a temporary addition. Becomes permanent record only after saving |
| Edit | Edit button will allow for editing a specific record in the table. |
| Update | Update the contents of line of coverage. It is only a temporary updation. Becomes permanent record only after saving |

-continued

| Element | Description |
|---|---|
| Delete | Delete button will delete the records in the table checked for deletion. It is only a temporary deletion. Only the records that does not have reference elsewhere can be deleted. Becomes permanent record only after saving |
| Print | The Print will pops up a screen displaying the content of the table created and enables the user to have print out of the same. |
| Check Box | Check box will be disabled which has any reference to other fields. Otherwise the checkbox will be enabled to have the utility of check all/clear all. |
| Check All | The "Check All" Link will check all the enabled records in the table |
| Clear All | The "Clear All" Link will uncheck all the enabled records in the table that are checked. |
| Save | Saves the entered line of coverage in the database. The page gets refreshed and the contents entered in the fields are cleared. |
| Cancel | Clears the contents entered in the fields and restore to the previous state as was before saving the changes. |

Plan Type

The plan type screen is to enter the details of plan type. The screen provides functionality to add, modify, view, and delete plan type.

The sequential steps involved in the creation of a plan type are listed below.

Step—1: After successful logon, click the menu Carrier Maintenance. Select Master Plan and then Plan Type. (See FIG. B-4)
Step—2: Enter the values in the respective fields, as per the format briefed in fields' explanation section
Step—3: Click Add button to have a temporary storage. (See FIG. B-5)
Step—4: Also Edit button can be clicked for any modifications.
Step—5: Change the contents to be modified and click update. (See FIG. B-6)
Step—6: Click Save button to save the contents Fields Explanation Element Description The text for plan type. Accepts alphabets and numeric values of length not exceeding 25 characters. Entry to this field is mandatory. Does not accept duplicate values Button Functionality

| Element | Description |
|---|---|
| Add | Add the name of plan. It is only a temporary addition. Becomes permanent record only after saving |
| Edit | Edit button will allow for editing a specific record in the table. |
| Update | Update the contents of Plan Type. It is only a temporary update. Becomes permanent record only after saving |
| Check Box | Check box will be disabled which has any reference to other fields. Otherwise the checkbox will be enabled to have the utility of check all/clear all. |
| Delete | Delete button will delete the records in the table checked for deletion. It is only a temporary deletion. Only the records that does not have reference elsewhere can be deleted. Becomes permanent record only after saving |

-continued

| Element | Description |
|---|---|
| Print | The Print will pops up a screen displaying the content of the table created and enables the user to have print out of the same. |
| Check All | The "Check All" Link will check all the enabled records in the table |
| Clear All | The "Clear All" Link will uncheck all the enabled records in the table that are checked. |
| Save | Saves the entered plan type in the database. The page gets refreshed and the contents entered in the fields are cleared. |
| Cancel | Clears the contents entered in the fields and restore to the previous state as was before saving the changes. |

Benefit Level

The Benefit Level screen is to enter the details of benefit level. The screen provides functionality to add, modify, view, and delete benefit level.

The sequential steps involved in the creation of a benefit level are listed below.

Step—1: After successful logon, click the menu Carrier Maintenance. Select Master Plan and then Benefit Level. (See FIG. B-7)

Step—2: Enter the values in the respective fields, as per the format briefed in fields' explanation section. (See FIG. B-8)

Step—3: Click Add button to have a temporary storage.

Step—4: Also Edit button can be clicked for any modifications.

Step—5: Change the contents to be modified and click Update. (See FIG. B-9)

Step—6: Click Save button to save the contents

Fields Explanation

| Element | Description |
|---|---|
| Benefit level | The text for benefit level. Accepts alphabets and numeric values of length not exceeding 255 characters. Entry to this field is mandatory. Does not accept duplicate values |

Button Functionality

| Element | Description |
|---|---|
| Add | Add the name of benefit level. It is only a temporary addition. Becomes permanent record only after saving |
| Save | Saves the entered benefit level in the database. The page gets refreshed. |
| Edit | Edit button will allow for editing a specific record in the table. |
| Update | Update the contents of Benefit Level. It is only a temporary update. Becomes permanent record only after saving |
| Delete | Delete button will delete the records in the table checked for deletion. It is only a temporary deletion. Only the records that does not have reference elsewhere can be deleted. Becomes permanent record only after saving |
| Print | The Print will pops up a screen displaying the content of the table created and enables the user to have print out of the same. |

-continued

| Element | Description |
|---|---|
| Check Box | Check box will be disabled which has any reference to other fields. Otherwise the checkbox will be enabled to have the utility of check all/clear all. |
| Check All | The "Check All" Link will check all the enabled records in the table |
| Clear All | The "Clear All" Link will uncheck all the enabled records in the table that are checked. |
| Cancel | Clears the contents entered in the fields and restore to the previous state as was before saving the changes. |

Related Applications

There are no related applications.

3 Carrier Master

Carrier Master is to setup basic information about carriers who provide coverage to plans offered through PACAdvantage. This holds master record for the carriers alternatively called "Health Insurance Service provider" and provides facility to create/edit or modify/inactivate the Carrier Master records.

Access

The application can be accessed from the main menu as follows:

Carrier Maintenance→Carrier Master→Create Carrier Master

Carrier Maintenance→Carrier Master→Search Carrier Master

Pre-Requisites

There are no pre-requisites for using this application.

Application Functions

This application has the following functions:

Carrier Information—to input details of a carrier

Search Carrier—to search a specific carrier record

Create Carrier Master

The carrier information screen is to enter details of a carrier. The screen provides functionality to add, modify, view, and delete carrier details.

The sequential steps involved in the creation of a new module are listed below.

Step—1: After successful logon, click the menu Carrier Maintenance. Select Carrier Master and then Create Carrier Master. (See FIG. B-10)

Step—2: Enter the values in the respective field, as per the format briefed in fields explanation section Field Explanation, and click Save button. (See FIG. B-11)

Fields Explanation

The following table provides explanations for each of the screen fields.

| Element | Description |
|---|---|
| | General Information |
| Company Name | The text for company name. Accepts alphabets, numeric and special characters except double quotes with values not exceeding 50 characters. Entry to this field is mandatory. Company Name does not accept duplicate values |
| Address | The text for company address. Accepts alphabets, numeric and special characters except double quotes with values not exceeding 35 characters. Entry to this field is mandatory. |
| Suite | The text for company suite. Accepts alphabets, numeric and special characters except double quotes with values not exceeding 35 characters. |

-continued

| Element | Description |
|---|---|
| City | The text for city. Accepts alphabets not exceeding 30 characters. Entry to this field is mandatory. |
| State | Choose the name of the state from the drop down list of States available in United States of America Entry to this field is mandatory. |
| Zip | The text for zip. Accepts numeric of exactly 5 digits. Entry to this field is mandatory. |
| | Department Information |
| Contact Department | Choose the name of the contact department from the drop down list of contact departments available. Entry to this field is mandatory |
| Salutation | Choose the salutation from the drop down list of salutations available. |
| First Name | The text for contact first name. Accepts alphabets, numeric and special characters except double quotes with values not exceeding 25 characters. |
| Middle Initial | The text for middle initial. Accepts alphabets not exceeding 1 character. |
| Last Name | The text for contact last name. Accepts alphabets, numeric and special characters except double quotes with values not exceeding 35 characters. |
| Suffix | Choose the suffix from the drop down list of suffixes available. |
| Title | The text for title. Accepts alphabets, numeric, and special characters except double quotes with values not exceeding 255 characters. |
| Address | The text for company address. Accepts alphabets, numeric and special characters except double quotes with values not exceeding 35 characters. Entry to this field is mandatory. |
| Suite | The text for company suite. Accepts alphabets, numeric and special characters except double quotes with values not exceeding 35 characters. |
| City | The text for city. Accepts alphabets not exceeding 30 characters. Entry to this field is mandatory. |
| State | Choose the name of the state from the drop down list of States available in United States of America Entry to this field is mandatory. |
| Zip | The text for zip. Accepts numeric of exactly 5 digits. Entry to this field is mandatory. |
| Mode of Communication | Choose the mode of communication from the drop down list of modes available. Based on the selection, the respective fields are mandatory. |
| Phone | The text for telephone number of the contact person. Accepts numeric values not exceeding 10 digits. The format is (999) 999-9999. |
| Fax | The text for fax number of the contact person. Accepts numeric values not exceeding 10 digits. The format is (999) 999-9999. |
| E-mail | The text for email of the contact person. Accepts alphabets, numeric and special characters in the standard email format with length not exceeding 100 characters. |

Button Functionality

The following table provides explanation for each button in the screen.

| Element | Description |
|---|---|
| Save | Saves the carrier information, department information if any that has been added to the table, into the database. The page gets refreshed and the contents entered in the general Information fields are shown. |
| Add | Add the contents of department information. It is only a temporary addition. Becomes permanent record only after saving |
| Edit | Edit button will allow for editing a specific record in the table. |
| Delete | Delete button will delete the records in the table checked for deletion. It is only a temporary deletion. Becomes permanent record only after saving |

-continued

| Element | Description |
|---|---|
| Update | Update the contents of department information. It is only a temporary update. Becomes permanent record only after saving |
| Print | The Print will pops up a screen displaying the content of the table created and enables the user to have print out of the same. |
| Check All | The “Check All” Link will check all the records in the table |
| Clear All | The “Clear All” Link will uncheck all the records in the table that are checked. |
| New | New button will create a new carrier general info page for entering the new set of data for the carrier. |
| Cancel | Clears the contents entered in the fields and restore to the previous state as was before saving the changes. |

Search Carrier

The search carrier screen displays the available carrier names. The screen provides the option to view, edit and delete the contents of Carrier Information.

The sequential steps involved in searching an existing carrier are listed below.

Step—1: After successful logon, click the menu Carrier Maintenance. Select Carrier Master and then Search Carrier. (See FIG. B-12)

Step—2: Company name has to be selected from the drop down list (See FIG. B-13)

Step—3: Select either View/Delete or Edit to display the contents of selected company name. If the selected option is View/Delete, Displays the contents for viewing or deleting. (See FIG. B-14)

Step—4: To go back again to search screen, click Back.

Step—5: If the selected option is Edit, displays the contents and allows to modify.

Step—6: Modifications can be made for both the general information, as well as department information. Also choosing a record by clicking Edit button can modify department information. (See FIG. B-15)

Step—7: Change the contents to be modified and click Update.

Step—8: Click Save button to save the contents.

Fields Explanation

The following table provides explanations for each of the screen fields.

| Element | Description |
|---|---|
| | General Information |
| Company Name | The text for company name. Accepts alphabets, numeric and special characters except double quotes with values not exceeding 50 characters. Entry to this field is mandatory. Company Name does not accept duplicate values |
| Address | The text for company address. Accepts alphabets, numeric and special characters except double quotes with values not exceeding 35 characters. Entry to this field is mandatory. |
| Suite | The text for company suite Accepts alphabets, numeric and special characters except double quotes with values not exceeding 35 characters. |
| City | The text for city. Accepts alphabets not exceeding 30 characters. Entry to this field is mandatory. |
| State | Choose the name of the state from the drop down list of States available in United States of America. |
| Zip | The text for zip. Accepts numeric of exactly 5 digits. Entry to this field is mandatory. |
| | Department Information |

-continued

| Element | Description |
|---|---|
| Contact Department | Choose the name of the contact department from the drop down list of contact departments available. |
| Salutation | Choose the salutation from the drop down list of salutations available. |
| First Name | The text for contact first name. Accepts alphabets, numeric and special characters except double quotes with values not exceeding 25 characters. |
| Middle Initial | The text for middle initial. Accepts alphabets not exceeding 1 character. |
| Last Name | The text for contact last name. Accepts alphabets, numeric and special characters except double quotes with values not exceeding 35 characters. |
| Suffix | Choose the suffix from the drop down list of suffixes available. |
| Title | The text for title. Accepts alphabets, numeric and special characters except double quotes with values not exceeding 255 characters. |
| Address | The text for company address. Accepts alphabets, numeric and special characters except double quotes with values not exceeding 35 characters. Entry to this field is mandatory. |
| Suite | The text for company suite. Accepts alphabets, numeric and special characters except double quotes with values not exceeding 35 characters. |
| City | The text for city. Accepts alphabets not exceeding 30 characters. Entry to this field is mandatory. |
| State | Choose the name of the state from the drop down list of States available in United States of America Entry to this field is mandatory. |
| Zip | The text for zip. Accepts numeric of exactly 5 digits. Entry to this field is mandatory. |
| Mode of Communication | Choose the mode of communication from the drop down list of modes available. |
| Phone | The text for telephone number of the contact person. Accepts numeric values not exceeding 10 digits. The format is (999) 999-9999. |
| Fax | The text for fax number of the contact person. Accepts numeric values not exceeding 10 digits. The format is (999) 999-9999. |
| E-mail | The text for email of the contact person. Accepts alphabets, numeric and special characters in the standard email format with length not exceeding 100 characters. |

Button Functionality

The following table provides explanation for each button in the screen.

| Element | Description |
|---|---|
| Save | Saves the carrier information, department information if any that has been added to the table, into the database. The page gets refreshed and the contents entered in the general Information fields are shown. |
| Add | Add the contents of department information. It is only a temporary addition. Becomes permanent record only after saving |
| Edit | Edit button will allow for editing a specific record in the table. |
| Delete | Delete button will delete the records in the table checked for deletion. It is only a temporary deletion. Becomes permanent record only after saving |
| Update | Update the contents of department information. It is only a temporary update. Becomes permanent record only after saving |
| Print | The Print will pops up a screen displaying the content of the table created and enables the user to have print out of the same. |
| Check All | The "Check All" Link will check all the records in the table |
| Clear All | The "Clear All" Link will uncheck all the records in the table that are checked. |
| New | New button will create a new carrier general info page for entering the new set of data for the carrier. |

-continued

| Element | Description |
|---|---|
| Cancel | Clears the contents entered in the fields and restore to the previous state as was before saving the changes. |

Related Applications

There are no related applications.

4 Product Profile

Product Profile is to create information on Product and Plan pertaining to a carrier. This is also used to create transmission profiles for Enrollment and Premium. It facilities to create/Edit or modify carrier product information.

Access

The application can be accessed from the main menu as follows:

Carrier Maintenance→Product Profile→Create Product Profile

Carrier Maintenance→Product Profile→Search Product Profile

Pre-Requisites

Master Plan records must be available in the system.

Carrier Master records must be available in the system.

Application Functions

This application has the following functions:

Create Product Profile—to enter the information pertaining to a product and plan Search Product—to search a product and plan Create Product Profile The carrier product info screen is to add the information pertaining to a product and plan.

The sequential steps involved in the creation of carrier product information are listed below.

Step—1: After successful logon, click Carrier Maintenance. Select Product Profile and then Create Product Profile. (See FIG. B-16)

Step—2: Enter the values in the respective fields, as per the format briefed in field's explanation section. (See FIG. B-17)

Step—3: The enrollment transmission is mainly meant for entering information and schedule for a transmission for a plan. Also Premium Transmission can be navigated from this screen. (See FIG. B-18)

Step—4: The premium transmission is mainly meant for entering information and schedule for a transmission for a plan. Also Enrollment Transmission can be navigated from this screen (See FIG. B-19)

Step—5: Click Save button to save the contents

Fields Explanation

| Element | Description |
|---|---|
| Trans Id | Enter the value of trans id. Accepts numeric value of exactly 3 digits. Once clicking save button creates a trans id, it gets disabled not to modify the trans id. This is mandatory field |
| Plan Name | Enter the text for plan name. Plan name accepts alphanumeric and special characters except double quotes with values not exceeding 50 characters. This is mandatory field |
| Carrier Name | Choose the name of the carrier from the drop down list of carrier names available. This is mandatory field |
| Plan ID | System generated field with Plan ID. This is a read only field. |

-continued

| Element | Description |
|---|---|
| Line of coverage | Choose a name from the drop down list of line of coverage available. This is mandatory field |
| Plan Type | Choose a name from the drop down list of plan type available. This is mandatory field |
| Product Required | Click the check box to enter the details of information pertaining to a product. By default, it will be unchecked state. If this is unchecked then default Benefit will be added in to the Product Info table below. |
| Benefit level | Choose a name from the drop down list of benefit levels available. This is mandatory field if Product Required option is checked. |
| Product Name | Enter the text for product name. The field is alphabets, numeric and special character except double quotes with values not exceeding 60 characters. This is mandatory field if Product Required option is checked. |
| Alternate Name | Enter the text for product name. The field is alphabets, numeric and special character except double quotes with values not exceeding 255 characters. |
| | Enrollment Transmission |
| Plan Id | Read only field. System generated Plan ID. |
| Plan Name | Read only field. Displays the Plan Name. |
| Carrier requires Enrollment transmission | Choose an option from the check box to have enrollment transmission. Upon selection of this, will enable to enter details for transmission information and transmission schedule. The field is mandatory |
| Data format | Choose a format from the drop down list of data formats available. |
| Mode of transmission | Choose a mode from the drop down list of modes available. Upon selecting the mode, will enable the carrier profile id for entering data. Only when the selection is carrier's ftp, carrier URL, user id, password fields will be enabled for entry. |
| Carrier profile id | Enter the text for carrier profile id. Accepts alphanumeric of 10 digits only |
| Carrier URL | Enter the text for URL. Accepts a valid URL not exceeding 60 characters. |
| Carrier User Id | Enter the text for user id. Accepts alphanumeric value not exceeding 20 characters. |
| Carrier Password | Enter the text for password. Accepts alphanumeric character not exceeding 20 characters. |
| Confirm file required | Choose an option from the check box to have confirmation file |
| Transmission periodicity | Choose a type of transmission from the drop down list for transmission periodicity. Upon the selecting the value namely, hourly, daily, weekly, monthly corresponding field will only be enabled for entry others will get disabled. |
| Start time | Enter the time for start time in the format HH:MM. Accepts only numeric values of 5 digits. |
| Days | Choose the days from the available checkboxes for the days required for transmission. This field will be enabled only upon if the selection is daily in the transmission periodicity field. |
| Week day | Choose a weekday from the drop down list of weekdays available. This field will be enabled only upon if the selection is daily in the transmission periodicity field. |
| Day of month | Choose a day from the drop down list of days in a month available. This field will be enabled only upon if the selection is daily in the transmission periodicity field. |
| Disable transmission | Choose an option from the check box to have transmission disabled. |
| | Premium Transmission |
| Plan Id | Read only field. System generated Plan ID. |
| Plan Name | Read only field. Displays the Plan Name |
| Carrier requires Enrollment transmission | Choose an option from the check box to have enrollment transmission. Upon selection of this, will enable to enter details for transmission information and transmission schedule. The field is mandatory |
| Mode of transmission | Choose a mode from the drop down list of modes available. Upon selecting the mode, will enable the carrier profile id for entering data. Only when the selection is carrier's ftp, carrier URL, user id, password fields will be enabled for entry. |

-continued

| Element | Description |
|---|---|
| Carrier profile id | Enter the text for carrier profile id. Accepts alphanumeric of 10 digits only |
| Carrier URL | Enter the text for URL. Accepts a valid URL not exceeding 60 characters. |
| Carrier User Id | Enter the text for user id. Accepts alphanumeric value not exceeding 20 characters. |
| Carrier Password | Enter the text for password. Accepts alphanumeric character not exceeding 20 characters. |
| Confirm file required | Choose an option from the check box to have confirmation file |
| Transmission periodicity | Choose a type of transmission from the drop down list for transmission periodicity. Upon the selecting the value namely, hourly, daily, weekly, monthly corresponding field will only be enabled for entry others will get disabled. |
| Start time | Enter the time for start time in the format HH:MM. Accepts only numeric values of 5 digits. |
| Days | Choose the days from the available checkboxes for the days required for transmission. This field will be enabled only upon if the selection is daily in the transmission periodicity field. |
| Week day | Choose a weekday from the drop down list of weekdays available. This field will be enabled only upon if the selection is daily in the transmission periodicity field. |
| Day of month | Choose a day from the drop down list of days in a month available. This field will be enabled only upon if the selection is daily in the transmission periodicity field. |
| Disable transmission | Choose an option from the check box to have transmission disabled. |

Button Functionality

| Element | Description |
|---|---|
| Save | Click on save button to save contents of product information and plan information. |
| Edit | Edit button will allow for editing a specific record in the table. |
| Update | Update the contents of Product. It is only a temporary update. Becomes permanent record only after saving |
| Delete | Delete button will delete the records in the table checked for deletion. It is only a temporary deletion. Only the records that does not have reference elsewhere can be deleted. Becomes permanent record only after saving |
| Check All | The "Check All" Link will check all the records in the table |
| Clear All | The "Clear All" Link will uncheck all the records in the table that are checked. |
| New | Click on new button to add a new product and plan information. |
| Cancel | Click on the cancel button to clear the data entered on the screen and returns the same screen to proceed. |
| | Enrollment and Premium Transmissions |
| Save | Click on save button to save contents of transmission information. |
| Back | Click on back button will navigate back to carrier product info screen. |

Search Product

The search product screen is to view and edit/modify the information in an existing plan name. Choosing a plan name from the drop down list of plan names available can carry out the search.

The sequential steps involved in searching an existing product are listed below.

Step—1: After successful logon, click the menu Carrier Maintenance. Select Product Profile and then Search Product. (See FIG. B-20)

Step—2: Plan name has to be selected from the drop down list (See FIG. B-21)

Step—3: Select either View/Delete or Edit to display the contents of selected plan name.

If the selected option is View/Delete, displays the contents for viewing and deleting. (See FIG. 22) (See FIG.

Step—4: To go back again to search screen, click Back.

Step—5: If the selected option is Edit, displays the contents and allows to have modifications. Click Save. (See FIG. B-23)

Fields Explanation

Refer field explanations provided for Create Product Profile

Button Functionality

Refer Button Functionality explanations provided for Create Product Profile

Related Applications

Related applications are:

Carrier Master

Master Plan

5 Rate Administration

Rate Master is to setup basic information about various types of rates offered through PACAdvantage. Rates are the rates for the products offered by each carrier and their classification into various fee structures. The rates are classified as Admin Fees, Agent fees, Additional Fees and Rate Differential. These classifications are applied to the raw rate to arrive to the actual premium payable by group/member.

Access

The application can be accessed from the main menu as follows:

Carrier Maintenance→Rate Administration→Admin Fees

Carrier Maintenance→Rate Administration→Admin Fees Search

Carrier Maintenance→Rate Administration→Agent Fees

Carrier Maintenance→Rate Administration→Agent Fees Search

Carrier Maintenance→Rate Administration→Additional Fees

Carrier Maintenance→Rate Administration→Additional Fees Search

Carrier Maintenance→Rate Administration→Rate Differential

Carrier Maintenance→Rate Administration→Rate Differential Search

Pre-Requisites

Pre requisites for Rate Administrations are following:

Association Master—Association master must be created and available in the system for assigning the rate for association groups.

Association Acronym—Association acronym is to display the association name in an abbreviated form inside the table for display. A mapping file has to be configured to ensure that each Association ID/Association name is mapped with the Acronym name in the mapping file as in PX2 system.

The mapping file can usually be located in the following path:

<config_root>/bpicas/assacyronym.xml

Sample mapping

<asst id="0000000001"> Here goes the acronym name as defined by user</asst> asst id=Should have a valid association ID from the PX2 System.

Acronym name should be edited in area shown in bold not exceeding 25 characters.

Application Functions

This application has the following functions:

Admin Fees—to create/edit details of Admin Fees

Admin Fees Search—to search the details of admin fee for view, modification or deletion Agent Fees—to create/edit details of Agent Fees Agent Fees Search—to search the details of Agent Fees for view, modification or deletion Additional Fees—to create/edit details of Additional Fees Additional Fees Search—to search the details of Additional Fees for view, modification or deletion Rate Differential—to create/edit details of Rate Differential Rate Differential Search—to search the details of Rate Differential for view, modification or deletion Admin Fees The admin fees screen is to enter the details of rate type, whether the rate classification is for enrollment or renewal, group type, association Ids for a chosen association only, Individual Member or Association Group for a guaranteed association, percentage premium, effective date, group level fees, and member level fees. The screen provides functionality to save, edit or add new admin fees. Admin fees is broadly defined for two types of rates, namely consolidated [blended] and unconsolidated [non-blended].

The sequential steps involved in the creation of admin fees are listed below.

Step—1: After successful logon, click menu Carrier Maintenance. Select Rate Administration and then Admin Fees. (See FIG. B-24)

Step—2: Enter the values in the respective fields, as per the format briefed in field's explanation section. (See FIG. B-25)

Step—3: Click Save button to save the contents. (See FIG. B-26)

Fields Explanation

| Element | Description |
|---|---|
| Rate Type | Choose the rate type from the option button. Rate type can be either blended or non-blended. Blended rates will allow for entering only percent premium based on effective date for a specific group type. Non-blended rates will allow for entering group level fees which includes flat $ amount and member level fees which includes flat $ amount for medical and dental, percent premium for vision and cam [lines of coverage]. |
| Enroll/Renew | Choose this option to create the admin fee for groups during enrollment or renewal. |
| Group Type | Choose the group type from the drop down list of group types available. Only group type of guaranteed association would allow choosing individual member or association groups. |
| Association Name | Choose the association name from the drop down list of ids for the association available. Association name would be enabled only if the group type has guaranteed, endorsed, PEO's and chambers. |
| Member type | Choose the member type from the option buttons. Only group type of guaranteed association would allow choosing individual member or association groups [member type]. |
| Percentage Premium | Enter the value for percentage premium. Accepts numeric value in the range of 0 to 100 with decimal points (example 99.99) |
| Effective Date | Enter the date or choose from the calendar icon. Date accepts the format in MM/DD/YYYY. |
| Group Level Fees | Enter the value for group level fees. Accepts value in the format of currency (example 999999999.99 or 99999999999) |

-continued

| Element | Description |
|---|---|
| Member Level Fees | Enter the value for member level fees. Accepts value in the format of currency (example 999999999.99 or 99999999999) for fees in $ and accepts numeric value in the range of 0 to 100 for fees in percentage. |

Button Functionality

| Element | Description |
|---|---|
| Save | Saves the entered admin fees in the database and navigates to the confirmation page. |
| Cancel | Clears the contents entered in the fields and restore to the previous state as was before saving the changes. |
| New Admin Fee | Navigates to admin fee screen for creating a new one |

Admin Fees Search

The admin fees search screen displays the available admin fees. The screen provides the option to view, edit and delete the contents of Admin Fee The sequential steps involved in the Searching for admin fees are listed below.

Step—1: After successful logon, click menu Carrier Maintenance. Select Rate Administration and then Admin Fees Search. (See FIG. B-27)

Step—2: Choose a rate type, Enrolled/Renew Status, group type, association name and effective date to have a search option. (See FIG. B-28)

Step—3: This displays a screen with search result. (See FIG. B-29)

Step—4: Choose a Rate type either to Modify or View/Delete.

Step—5: If the option is Modify the following will be the screen to have any modifications. (See FIG. B-30)

Step—6: Update the contents and click Save. Navigates to confirmation Screen (See FIG. B-31)

Step—7: If the option is View/Delete the contents are displayed to view and delete (See FIG. B-32)

Step—8: Clicking Delete will have the confirmation screen as follows. (See FIG. B-33)

Fields Explanation

Refer field explanations provided for Admin Fees

Button Functionality

Refer button functionality provided for Admin Fees

Agent Fees

The agent fees screen is to enter the details of rate type, group type, percentage of premium, effective date, group size like lower limit and upper limit with Amount and member level fees. The screen provides functionality to save, edit or add new admin fees. Agent fees is broadly defined for two types of rates, namely consolidated [blended] and unconsolidated [non-blended].

The sequential steps involved in the creation of agent fees are listed below.

Step—1: After successful logon, click Carrier Maintenance.

Select Rate Administration and then Agent Fees. (See FIG. B-34)

Step—2: Enter the values in the respective fields, as per the format briefed in field's explanation section. (See FIG. B-35)

Step—3: Click Save button to save the contents. (See FIG. B-36)

Fields Explanation

| Element | Description |
|---|---|
| Rate Type | Choose the rate type from the option button. Rate type can be either blended or non-blended. Blended rates will allow for entering only percent premium based on effective date for a specific group type. Non-blended rates will allow for entering group level fees which includes group size lower limit, group size upper limit flat $ amount and member level fees which includes flat $ amount for medical and dental, percent premium for vision and cam [lines of coverage]. Group size lower limit should not be greater than the group size upper limit. |
| Enroll/Renew | Choose this option to create the admin fee for groups during enrollment or renewal. |
| Enrolled before 1997 | Check this field if the agent fees is for the groups enrolled before 1997. |
| Group Type | Choose the group type from the drop down list of group types available. Only group type of guaranteed association would allow choosing individual member or association groups. |
| Association Name | Choose the association name from the drop down list of names for the association available. Association name would be enabled only if the group type has guaranteed, endorsed PEO's and chambers. |
| Member type | Choose the member type from the option buttons. Only group type of guaranteed association would allow choosing individual member or association groups [member type]. |
| Percentage Premium | Enter the value for percentage premium. Accepts numeric value in the range of 0 to 100 |
| Effective Date | Enter the date or choose from the calendar icon. Date accepts the format in MM/DD/YYYY. |
| Group size lower limit | Enter the value for group size lower limit. Accepts numeric values of maximum 3 digits. Lower limit value should be less than the value of upper limit. |
| Group size upper limit | Enter the value for group size upper limit. Accepts numeric values of maximum 3 digits. Upper limit value should not be less than lower limit value. |
| Amount | Enter the value for group level fees. Enter the value for group level fees. Accepts value in the format of currency (example 999999999.99 or 99999999999) |
| Member Level Fees | Enter the value for member level fees. Accepts value in the format of currency (example 999999999.99 or 99999999999) for fees in $ and accepts numeric value in the range of 0 to 100 for fees in percentage. |

Button Functionality

| Element | Description |
|---|---|
| Save | Saves the entered agent fees in the database and navigates to confirmation screen |
| Cancel | Clears the contents entered in the fields and restore to the previous state as was before saving the changes. |
| New Agent Fee | Navigates to agent fee screen for creating a new one |

Agent Fees Search

The agent fees search screen displays the available agent fees. The screen provides the option to view, edit and delete the contents of agent fee The sequential steps involved in the searching admin fees are listed below.

Step—1: After successful logon, click menu Carrier Maintenance. Select Rate Administration and then Agent Fees Search. (See FIG. B-37)

Step—2: Choose a rate type, enroll/renew option, group type, association name and effective date to have a search operation. (See FIG. B-38)

Step—3: This displays a screen with search result. (See FIG. B-39)

Step—4: Choose a Rate type either to Modify or View/Delete.

Step—5: If the option is Modify the following will be the screen to have any modifications. (See FIG. B-40)

Step—6: Update the contents and click Save. On saving displays the confirmation screen. (See FIG. B-41)

Step—7: If the option is View/Delete the contents are displayed to view and delete (See FIG. B-42)

Step—8: Clicking Delete will have the confirmation screen as follows. (See FIG. B-43)

Fields Explanation

Refer field explanations provided for Agent Fees

Button Functionality

Refer button functionality provided for Agent Fees

Additional Fees

The additional fees screen is to enter the details of COBRA type, percentage of additional fees, effective date. The screen provides functionality to save, edit or add new additional fees. Additional fees is broadly defined for two types namely Cal COBRA and Federal COBRA.

The sequential steps involved in the creation of additional fees are listed below.

Step—1: After successful logon, click Carrier Maintenance. Select Rate Administration and then Additional Fees. (See FIG. B-44)

Step—2: Enter the values in the respective fields, as per the format briefed in field's explanation section. (See FIG. B-45)

Step—3: Click Save button to save the contents. (See FIG. B-46)

Fields Explanation

| Element | Description |
|---|---|
| Rate Type | Choose the rate type from the option button. Rate type can be either Cal COBRA or Federal COBRA. |
| Percentage of Additional Fees | Enter the value for percentage premium. Accepts numeric value in the range 0 to 100. |
| Effective Date | Enter the date or choose from the calendar icon. Date accepts the format in MM/DD/YYYY. |

Button Functionality

| Element | Description |
|---|---|
| Save | Saves the entered additional fees in the database and navigates to confirmation screen. |
| Cancel | Clears the contents entered in the fields and restore to the previous state as was before saving the changes. |
| New Additional Fee | Navigates to additional fee screen for creating a new one |

Additional Fees Search

The additional fees search screen displays the available additional fees. The screen provides the option to view, edit and delete the contents of additional fee The sequential steps involved in the Searching additional fees are listed below.

Step—1: After successful logon, click menu Carrier Maintenance. Select Rate Administration and then Additional Fees Search. (See FIG. B-47)

Step—2: Choose Cal Cobra or Federal Cobra and enter Additional Fee % and Effective Date to have a search operation. (See FIG. B-48)

Step—3: This displays a screen with search result. (See FIG. B-49)

Step—4: Choose a Rate type either to have Modify or View/Delete.

Step—5: If the option is Modify the following will be the screen to have any modifications. (See FIG. B-50)

Step—6: Update the contents and click Save. Displays the confirmation screen (See FIG. B-51)

Step—7: If the option is View/Delete the contents are displayed to view and delete (See FIG. B-52)

Step—8: Clicking Delete will have the confirmation screen as follows. (See FIG. B-53)

Fields Explanation

Refer field explanations provided for Additional Fees

Button Functionality

Refer button functionality provided for Additional Fees

Rate Differential

The Rate Differential screen is to enter the details of New Business Enrollment or New Business Enrollment & Renewal, Group Size criteria, group size lower limit, group size upper limit, differential factor, and effective date. The screen provides functionality to save, edit or add new Rate Differential.

The sequential steps involved in the creation of Rate Differential are listed below Step—1: After successful logon, click Carrier Maintenance. Select Rate Administration and then Rate Differential. (See FIG. B-54)

Step—2: Enter the values in the respective fields, as per the format briefed in field's explanation section. (See FIG. B-55)

Step—3: Click Save button to save the contents. (See FIG. B-56)

Fields Explanation

| Element | Description |
|---|---|
| Line of coverage | The field is a read only and will always have the value as Medical. |
| Group size lower limit | Enter the value for group size lower limit. Accepts numeric values of maximum 3 digits. Lower limit value should be less than the value of upper limit. Entry to this field is mandatory |
| Group size upper limit | Enter the value for group size upper limit. Accepts numeric values of maximum 3 digits. Upper limit value should not be less than lower limit value. Entry to this field is mandatory |
| Differential factor | Enter the value for differential factor. Accepts decimal values of positive integer with max of 6 digits, example 99.999. Differential factor cannot have zero or negative values. Entry to this field is mandatory |
| Effective Date | Enter the date or choose from the calendar icon. Date accepts the format in MM/DD/YYYY. Entry to this field is mandatory |
| Applied For | Choose the option as new business enrollment or new business enrollment and renewal |
| Group Size Criteria | Choose the option as enrolled employee or eligible employee |

Button Functionality

| Element | Description |
|---|---|
| Save | Saves the entered Rate Differential in the database and navigates to confirmation screen |
| Cancel | Clears the contents entered in the fields and restore to the previous state as was before saving the changes. |
| New Rate Differential Fee | Navigates to rate differential fee screen for creating a new one |

Rate Differential Search

The rate differential search screen displays the available Rate Differential. The screen provides the option to view, edit and delete the contents of Rate Differential The sequential steps involved in the creation of Rate Differential are listed below.

Step—1: After successful logon, click menu Carrier Maintenance. Select Rate Administration and then Rate Differential Search. (See FIG. B-57)

Step—2: Choose the option for applicable for, group size criteria, group size lower and upper limit, differential factor and effective date to have a search operation. (See FIG. B-58)

Step—3: This displays a screen with search result. (See FIG. B-59)

Step—4: Choose a Rate type either to have Modify or View/Delete.

Step—5: If the option is Modify the following will be the screen to have any modifications. (See FIG. B-60)

Step—6: Update the contents and click Save. Displays confirmation screen (See FIG. B-61)

Step—7: If the option is View/Delete the contents are displayed only to have view and delete can be done. (See FIG. B-62)

Step—8: Clicking Delete will have the confirmation screen as follows. (See FIG. B-63)

Fields Explanation

Refer field explanations provided for Rate Differential

Button Functionality

Refer button functionality provided for Rate Differential

Related Applications

Related applications are as follows.

Association Master—Refer User manual for Association Master.

6 Import Zip Codes

Import Zip Codes is the functionality to provide for import of zip code data and any updates of the same.

Access

The application can be accessed from the main menu as follows:

Carrier Maintenance→CM Operations→Import Zip

Pre-Requisites

The latest zip code and zip code with multiple counties database from TPS Products and Services, Inc should be available for import. The format of the database files has to be either Comma Delimited ASCII (CSV) or Fixed Column ASCII, the 2 formats currently supported by PX2.

Application Functions

This application has the following functions:

Import Zip Codes

Commit Import of Zip Codes

Import Zip

Zip import will enable to bring the zip codes and zip counties in a specified format namely CSV ASCI [comma separated value] and Fixed position ASCII, which will transform the data in other format to these formats and will ease to read and store the data in database.

The sequential steps involved in importing a zip code are listed below.

Step—1: After successful logon, click the menu Carrier Maintenance. Select CM Operations and then Import Zip. (See FIG. B-64)

Step—2: Enter the values in the respective fields, as per the format briefed in field's explanation section. (See FIG. B-65)

Step—3: Click Import button. (See FIG. B-66)

Step—4: Click Commit button. (See FIG. B-67)

Fields Explanation

| Element | Description |
|---|---|
| Import Id | Read only field to display import id value |
| Status | Read only field to display the status of import |
| Imported By | Read only field to display the user who imported the files |
| Import Date | Read only field to display the import date |
| Committed By | Read only field. |
| Committed Date | Read only field to display the commit date. |
| Zip File Path | Enter the file path of zip file or select the path by clicking browse button. The field is mandatory. |
| Zip File Format | Choose a format from drop down list for zip file format, which should match with selection of zip file. The field is mandatory. |
| Zip Counties File Path | Enter the file path of zip county or select the path by clicking browse button. The field is mandatory. |
| Zip Counties File Format | Choose a format from drop down list for zip county format, which should match with selection of zip county. The field is mandatory |

Button Functionality

| Element | Description |
|---|---|
| New | Click on new button enables to have a new import of files. |
| Import | Click on import button will perform the action of importing the selected valid files temporally. Once an import action is carried out, will enable the commit button. |
| Search | Click on search button navigates to a screen to have a search on entering Import id. |
| Commit | Initially commit button will be in disabled state. Once an import activity is carried out, commit button will be enabled to have a permanent storage in the selected file formats. |
| View Import Log | Click on view import log to have a pop up display showing the status of imported files |
| Hide Import Log | Click on hide import log to hide the pop up display message. |

Commit Import Zip Codes

Commit zip codes can also be done by searching an import id.

The sequential steps involved in committing an import id are listed below.

Step—1: Click Search button to search an import id.

Step—2: This opens up a new screen to displaying import id to search. (See FIG. B-68)

Step—3: Import ids can be selected by either entering import id and clicking search button or Click an import id, which are imported and are not committed. Back button is to go back to search screen without selecting an import id for commit.

Step—4: Screen navigates displaying the selected import id, enabling commit button. (See FIG. B-69)

Step—5: Click Commit button.

Step—6: Screen gets refreshed and displays the confirmation as committed in the status field. (See FIG. B-70)

Fields Explanation

| Element | Description |
|---|---|
| Import Id | Read only field to display import id value |
| Status | Read only field to display the status of import |
| Imported By | Read only field to display the user who imported the files |
| Import Date | Read only field to display the import date |
| Committed By | Read only field. |
| Committed Date | Read only field to display the commit date. |
| Zip File Path | Enter the file path of zip file or select the path by clicking browse button. The field is mandatory. |
| Zip File Format | Choose a format from drop down list for zip file format, which should match with selection of zip file. The field is mandatory. |
| Zip Counties File Path | Enter the file path of zip county or select the path by clicking browse button. The field is mandatory. |
| Zip Counties File Format | Choose a format from drop down list for zip county format, which should match with selection of zip county. The field is mandatory |

Button Functionality

| Element | Description |
|---|---|
| New | Click on new button enables to have a new import of files. |
| Import | Click on import button will perform the action of importing the selected valid files temporally. Once an import action is carried out, will enable the commit button. |
| Search | Click on search button navigates to a screen to have a search on entering Import id. |
| Commit | Initially commit button will be in disabled state. Once an import activity is carried out, commit button will be enabled to have a permanent storage in the selected file formats. |
| View Import Log | Click on view import log to have a pop up display showing the status of imported files |
| Hide Import Log | Click on hide import log to hide the pop up display message. |
| Back | Click back button to go back to the search screen. |

Related Applications

There is no related application.

7 Rate Files

Import Rates provides for import of rates information received from PacAdvantage and export of rates information to carriers for verification.

Access

The application can be accessed from the main menu as follows:

Carrier Maintenance→CM Operations→Import Rate Files

Carrier Maintenance→CM Operations→Export Rate Files

Pre-Requisites

Before importing rate files, a mapping file has to be configured to ensure that each plan/product listed in the rate file has an entry in the mapping file and is mapped to the corresponding plan id/product id as in PX2 system.

The mapping file can usually be located in the following path:

<config_root>/bpicas/ec/conf/DataMap.xml

Here <config_root> refers to the root directory where all configuration files required for PX2 system are placed. Ask for your System Administrator's assistance in locating the configuration root in the system in which PX2 is installed.

Open the mapping file using any standard text editors (e.g. Notepad). In the file you will be able to locate entries like <productId keyName="1,AETNA,HMO,PLUS" keyValue="PL001-02,PL001"/>

These are the entries that establish the mapping between plan/product listed in the rate file and the corresponding plan id/product id as in PX2 system.

The entries have a format like this

<productId keyName= "<LOC_CODE>,<PLAN_NAME,<PLAN_TYPE>, <COPAY>" keyValue= "<PX2_PRODUCT_ID>,PX2_PLAN_ID"/> where

LOC CODE is a codification for the line of coverage; 1 stands for Medical, 2 for Dental, 3 for Vision and 4 for CAM PLAN_NAME is the name of the plan as in the Excel file; this usually corresponds to the value of the 1st column in the Excel sheet PLAN_TYPE is the type of plan; whether HMO, PPO, POS etc; this usually corresponds to the value of the 2nd column in the Excel sheet; an exception is the worksheet for CAM which doesn't have a plan type COPAY is the copay option of the plan; whether Standard, Plus or Preferred; this usually corresponds to the value of the 3rd column in the Excel sheet; an exception is the worksheet for CAM which has this information in the 2nd column PX2_PRODUCT_ID is the product id that corresponds to the product id in the excel sheet PX2_PLAN_ID is the plan id that corresponds to the plan id in the excel sheet If required, suitably modify these entries to ensure that a correct mapping has been established between the plan/products in the Excel sheet to the plans/products in PX2 system. After modifying, save and close the mapping file.

Application Functions

This application has the following functions:

Import Rates

Export Rates

Import Rate

Rate import will enable to import the files pertaining to medical, dental, vision, CAM with effective date. Rate export can also be navigated from this screen.

The sequential steps involved in importing a rate are listed below.

Step—1: Before start of importing, open the rates file (.xls) in Microsoft Excel. Rates for all the 4 line of coverage, namely Medical, Dental, Vision and CAM would be available in the Excel as 4 separate worksheets. Switch to Medical worksheet. Save the work sheet in "Comma-delimited" format using the File, Save As menu. Repeat this procedure for Dental, Vision and CAM worksheets. All these 4 CSV files will be used for rates import.

Step—2: After successful logon, click the menu Carrier Maintenance. Select CM Operations and then Import Rate Files. (See FIG. B-71)

Step—3: Enter the values in the respective fields, as per the format briefed in field's explanation section. (See FIG. B-72)

Step—4: Import ids can be either entered directly or can be chosen by clicking search button. Respective file paths can be selected by clicking browse button. Click import button. Following is the screen shot showing the status after entering all the fields (See FIG. B-73)

Fields Explanation

| Element | Description |
|---|---|
| Import Id | Read only field to display import id value |
| Status | Read only field to display the status of import |
| Imported By | Read only field to display the user who imported the files |
| Import Date | Read only field to display the import date |
| Medical file path | Enter the file path of medical file or select the path by clicking browse button. If the status is imported or not imported this fields would not be editable. At least one file path is required |
| Dental file path | Enter the file path of dental file or select the path by clicking browse button. If the status is imported or not imported this fields would not be editable. At least one file path is required |
| CAM file path | Enter the file path of CAM file or select the path by clicking browse button. If the status is imported or not imported this fields would not be editable At least one file path is required. |
| Vision file path | Enter the file path of vision file or select the path by clicking browse button. If the status is imported or not imported this fields would not be editable. At least one file path is required |
| Effective Date | Enter the date or choose from the calendar icon. Date accepts the format in MM/DD/YYYY. The field is mandatory |

Button Functionality

| Element | Description |
|---|---|
| New | Click on new button enables to have a new import of files. |
| Import | Click on import button will perform the action of importing the selected valid files to have a permanent storage in the selected file formats. |
| Search | Click on search button navigates to a screen to have a search on entering Import id. |
| View Import Log | Click on view import log to have a pop up display showing the status of imported files |
| Hide Import Log | Click on hide import log to hide the pop up display message. |
| Back | Click back button to go back to the import screen |

Export Rate Files

Rate export will enable to export a product from selecting a product id by clicking product search icon. Rate import can also be navigated from this screen.

The sequential steps involved in rates export are listed below.

Step—1: After successful logon, click the menu Carrier Maintenance. Select CM Operations and then Export Rate Files (See FIG. B-74)

Step—2: Enter the values in the respective fields, as per the format briefed in field's explanation section. (See FIG. B-75)

Step—3: Export ids can be selected by either entering export id and clicking search button or Click an export id. Back button is to go back to export screen without selecting an export id for commit (See FIG. B-76)

Step—4: Click Export button. (See FIG. B-77)

Step—5: Click Ok to download the file. (See FIG. B-78)

Fields Explanation

| Element | Description |
|---|---|
| Export Id | Read only field to display export id value |
| Status | Read only field to display the status of export |
| Exported By | Read only field to display the user who exported the files |
| Export Date | Read only field to display the export date |
| Product Id | Read only field. Choose a product id by clicking the product id search icon |
| Product Name | Read only field. Displays the corresponding value of the product id selected. |
| Effective Date | Enter the date for effective date or select a date by clicking calendar icon. The field is mandatory. Date accepts the format in MM/DD/YYYY |

Button Functionality

| Element | Description |
|---|---|
| New | Click on new button enables to have a new export of a product id. |
| Export | Click on export button will perform the action of exporting the selected product id. Once it is exported, export button will be in a disabled state. For any further export of files, click on new button |
| View Export Log | Click on view export log to have a pop up display showing the status of exported files |
| Hide Export Log | Click on hide export log to hide the pop up display message. |
| Search | Click on search button navigates to a screen to have a search on entering product id. |
| Back | Click back button to go back to the search screen |

Export Loaded Rate Files

Export loaded rate files will enable to know the status of the selected files for export.

The sequential steps involved in export loaded rate files are listed below.

Step—1: After successful logon, click the menu Carrier Maintenance. Select CM Operations and then Export Rate Files (See FIG. B-79)

Step—2: Screen navigates to Export Loaded Rates. (See FIG. B-80)

Step—3: Enter Effective date and other related fields as per the format briefed in fields' explanation table Step—4: Click Export button.

Step—5: Click Search to know the status of the export id generated. (See FIG. B-81)

Step—6: Click back to go back to Export Imported Rate File screen.

Fields Explanation

| Element | Description |
|---|---|
| Export Id | Read only field to display export id value |
| Status | Read only field to display the status of export |
| Exported By | Read only field to display the user who exported the files |
| Export Date | Read only field to display the export date |
| Effective Date | Enter the date for effective date or select a date by clicking calendar icon. The field is mandatory. Date accepts the format in MM/DD/YYYY |
| Product Id | Read only field. Choose a product id by clicking the product id search icon |
| Line of Coverage | Choose a line of coverage from the drop down list available |
| Rate Type | Choose a rate type either from the available option say Blended or Non-Blended |

-continued

| Element | Description |
|---|---|
| RAF | Based on the selected value, RAF will be enabled for entering. Accepts numeric value. |
| Agent Fee | Text for agent fee. Accepts numeric values ranging from the values of 0-100 |
| Admin Fee | Text for admin fee. Accepts numeric values ranging from the values of 0-100 |
| CAL Cobra Fee | Text for CAL Cobra fee. Accepts numeric values ranging from the values of 0-100 |
| Product Name | Read only field. Displays the corresponding value of the product id selected. |

Button Functionality

| Element | Description |
|---|---|
| New | Click on new button enables to have a new export of a product id. |
| Export | Click on export button will perform the action of exporting the selected product id. Once it is exported, export button will be in a disabled state. For any further export of files, click on new button |
| View Export Log | Click on view export log to have a pop up display showing the status of exported files |
| Hide Export Log | Click on hide export log to hide the pop up display message. |
| Search | Click on search button navigates to a screen to have a search on entering product id. |
| Back | Click back button to go back to the search screen |

Related Applications

Related applications are:

Product Profile

8 Plan Availability Files

Plan Availability is to provide for export & import of existing plan availability data to carriers and import of plan availability data received from carriers.

Access

The application can be accessed from the main menu as follows:

Carrier Maintenance→CM Operations→Import Plan Availability

Carrier Maintenance→CM Operations→Export Plan Availability

Pre-Requisites

The plan for which data has to be imported/exported should have already been defined in the PX2 system.

The format for records in the import file is shown below:

[00539]<COUNTY_NAME><TAB><COUNTY_CODE><TAB><ZIP_CODE><TAB>

<RATING_REGION><TAB><AVAILABLE_FLAG> where

TAB denotes a single TAB character

COUNTY_NAME is county name

COUNTY_CODE is the 5-character county code comprising 2-character state+3-character county code (FIPS code)

ZIP_CODE is the 5-digit zip code

RATING_REGION is the 2-character rating region

AVAIL_FL indicates whether the plan is available at the specific zip code (and county) or not; a value of X indicates availability and a blank value indicates non-availability Application Functions This application has the following functions:

Import Plan Availability

Export Plan Availability

Import Plan Availability

Plan availability import will enable to import a file under a plan type. Also Plan availability export can be navigated from this screen.

The sequential steps involved in importing plan availability data are listed below.

Step—1: After successful logon, click the menu Carrier Maintenance. Select CM Operations and then Import Plan Availability. (See FIG. B-82)

Step—2: Enter the values in the respective fields, as per the format briefed in field's explanation section. (See FIG. B-83)

Step—3: Click Import button

Step—4: Also import id for plan availability can be selected by clicking search button. This leads to a screen displaying import ids. Click it to select an id (See FIG. B-84)

Fields Explanation

| Element | Description |
|---|---|
| Import Id | Read only field to display import id value |
| Status | Read only field to display the status of import |
| Imported By | Read only field to display the user who imported the files |
| Import Date | Read only field to display the import date |
| Plan | Choose a plan from the drop down list from the plan name available |
| Import File | Enter the file path or select the path by clicking browse button. The field is mandatory |
| Effective Date | Enter the date for effective date or select a date by clicking calendar icon. The field is mandatory. Date accepts the format MM/DD/YYYY |

Button Functionality

| Element | Description |
|---|---|
| New | Click on new button enables to have a new import of plan availability. |
| Import | Click on import button will perform the action of importing the selected valid to have a permanent storage in the selected file formats. |
| Search | Click on search button navigates to a screen to have a search on entering Import id. |
| View Import Log | Click on view import log to have a pop up display showing the status of imported files |
| Hide Import Log | Click on hide import log to hide the pop up display message. |
| Back | Click back button to go back to the import screen |

Export Plan Availability

Plan availability export will enable to import a file under a plan type. Also Plan availability import can be navigated from this screen.

The sequential steps involved in exporting plan availability are listed below.

Step—1: After successful logon, click the menu Carrier Maintenance. Select CM Operations and then Export Plan Availability (See FIG. B-85)

Step—2: Enter the values in the respective fields, as per the format briefed in field's explanation section. (See FIG. B-86)

Step—3 Also export id for plan availability can be selected by clicking search button. This leads to a screen displaying export ids. Click an id to select (See FIG. B-87)

Step—4: Click Export button.

Step—5: Click Ok to download the file. (See FIG. B-88)

Fields Explanation

| Element | Description |
|---|---|
| Export Id | Read only field to display export id value |
| Status | Read only field to display the status of export |
| Exported By | Read only field to display the user who exported the files |
| Export Date | Read only field to display the export date |
| Plan | Choose a plan from the drop down list from the plan name available |
| Effective Date | Enter the date or choose from the calendar icon. Date accepts the format in MM/DD/YYYY. Field is mandatory |

Button Functionality

| Element | Description |
|---|---|
| New | Click on new button enables to have a new export of plan availability. |
| Export | Click on export button will perform the action of importing the selected valid plans. Once it is exported, export button will be in a disabled state. For any further export of plans, click on new button |
| View Export Log | Click on view export log to have a pop up display showing the status of exported plans |
| Hide Export Log | Click on hide export log to hide the pop up display message. |
| Search | Click on search button navigates to a screen to have a search on entering export id. |
| Back | Click back button to go back to the search screen |

Related Applications

Related applications are:

Product Profile

PX2 User Manual

Enrollment

1 Introduction

Enrollment is the transaction module that encompasses the process of creating and maintaining all information about the groups and Members who participate in the PacAdvantage program. The enrollment module within PX2 system is classified broadly into following transactions to accommodate the business rules. They are New Business Enrollment, COBRA enrollment, Add-On and Changes, ROE/OE, Termination and Reinstatement, Appeals and Grievance and Carrier Issues and Enrollment Operations.

The Applications

The above-mentioned processes are accomplished in several applications embedded into the Enrollment Module. These applications steer the tasks of creating, and maintaining operational information for the small employer groups, employee, dependent and members like individual association member, COBRA member etc in the PX2 entities, thereby helping achieve the goals of the Enrollment.

The basic process of enrollment can be sub divided into following applications.

Association—Association is to setup high-level information associations within the State of California who can participate in the PacAdvantage program. They are classified as Guaranteed, Endorsed, PEO's or Chambers with each association having a set of business rules to participate in the PacAdvantage program.

New Business Enrollment—New Business Enrollment is the process of Enrolling the Employer Group and members to the PacAdvantage program. The groups and members who can participate in the program are Small Employer Group with employees and dependent, Association Groups with employees and dependents and individual members with dependents. Each group and member must qualify the eligibility rules as applicable to participate in the PacAdvantage program.

COBRA Enrollment—COBRA enrollment is the process of enrolling the members for COBRA coverage. California State laws and federal laws govern COBRA Rules based on whether it is Cal COBRA or Federal COBRA. COBRA eligibility and the coverage are governed by set of California State laws and federal laws. COBRA enrollment can be further sub divided into two streams. Namely, Enrollment of New Business COBRA wherein the Group enrolling with the program bring in their COBRA members also to participate in the program. Existing COBRA Enrollment wherein the members terminated from the existing groups are enrolled as COBRA group/member.

Add-On—Add-On is the process of adding new members like employee and dependents to the existing groups and employees respectively. Add-On process has business rules attached based on which the Add-On process is either accepted or denied.

Changes—Changes are the process of accommodating the changes that the group and or member sought during their participation in the PacAdvantage program. Change process has business rules attached based on which the Change process is either accepted or denied.

ROE/OE—ROE (Re-qualification and open enrollment) is the process of Re-qualifying the Group and Members on their anniversary. Once a year, on the anniversary date of a group's enrollment in PacAdvantage, the group's participation, contribution and qualification is reviewed. This review is to ensure that the group meets the qualification requirement. The main objective of this process is to review these criteria and re qualify as needed, notify them of rate changes and provide an opportunity for employees of the group to make changes to their enrollment.

OE (Open Enrollment) is the process during the anniversary of the group wherein the group has the privilege to make the changes to the plan, waiting period etc that were earlier not open for changes.

Termination and Reinstatement—Termination is the process of terminating the Groups and or members from the PacAdvantage program due to various reasons governed by business rules. The reasons for termination can be non-payment of premium, group's request for termination etc. Reinstatement is the process of revoking the terminated groups and or members based on the reasons governed by business rules. The reasons for reinstatement can be Premium paid through, processing error etc.

Appeals and Grievances—Appeals and Grievance is the process of maintaining a status for all Appeals and Grievances received from the customer and follow up with the decision made either by PacAdvantage-Roseville or PacAdvantage-SF.

Carrier Issues—Carrier Issues is the process of maintaining a status for all Carrier Issues received from the customer and follow up with the carrier for resolution and inform the customer of resolution.

Enrollment Operation—Enrollment operation is the process of generating out data for transmission of enrollment date. This consists of Member Data Transmission, Enrollment Data Transmission, PacAdvantage Transmission, ROE/OE Transmission

2 Association

Association is the master module that encompasses the process of creating and maintaining all master information that is required for maintaining the Association information in the PX2 System.

Associations are basically a body of groups/members representing certain types of associations within the State of California. Association Groups and Association Members can participate in the PacAdvantage program similar to small employer groups or members. Associations are classified as Guaranteed, Endorsed, PEO's or Chambers. Each of the associations classified have specific business rules when participating in PacAdvantage program Access The application can be accessed from the main menu as follows:

Enrollment→Association→Create Association

Enrollment→Association→Modify Association

Pre-Requisites

There are no pre-requisites for using this application.

Application Functions

This application has the following functions:

Create Association—to input details of a association

Modify Association—to search a specific association record

Create Association

The create association screen is to enter details of an association. The screen provides functionality to save, edit or add new association details.

The sequential steps involved in the creation of a new association are listed below.

Step—1: After successful logon, click the menu Enrollment. Select Association and select the option Create Association. (See FIG. C-1)

Step—2: Enter the values in the respective field, as per the format briefed in fields' explanation section Field Explanation, and click Continue button. (See FIG. C-2)

Step—3: Screen navigates to coverage information with auto generated association id. Choose relevant information pertaining to coverage and click Continue button. (See FIG. C-3)

Step—4: Screen navigates to other information. (See FIG. C-4)

Step—5: For internal work group click search icon. This pops up a screen to select internal work group.

Step—6: Click on any internal work group for selection. (See FIG. C-5)

Step—7: After filling the relevant information for other information and special handling as per the format briefed in fields' explanation section, click Continue button Step—8: Screen navigates to confirming successful creation of an association. (See FIG. C-6)

Fields Explanation

The following table provides explanations for each of the screen fields.

| Element | Description |
|---|---|
| | General Info Tab |
| Association Name | The text for association name. Accepts alphanumeric and special characters not exceeding 60 characters. Entry to this field is mandatory. |
| Association Type | Choose a type of association from the drop down list. Entry to this field is mandatory |
| Street Address | The text for association address. Accepts alphanumeric and special characters not exceeding 35 characters. Entry to this field is mandatory |
| Suite # | The text for suite #. Accepts alphanumeric and special characters not exceeding 35 characters. Entry to this field is mandatory |
| City | The text for city. Accepts alphabets and space between two words not exceeding 30 characters. Entry to this field is mandatory |
| State | Choose the name of the state from the drop down list of States available in United States of America. Entry to this field is mandatory |
| Zip | The text for zip. Accepts numeric of either 5 or 9 digits. Entry to this field is mandatory |
| Salutation | Choose the salutation from the drop down list of salutations available. Entry to this field is mandatory |
| First Name | The text for first name. Accepts alphabets and special character like hyphen and single quotes not exceeding 25 characters. Entry to this field is mandatory |
| Middle Initial | The text for middle initial. Accepts alphabets not exceeding 1 character. |
| Last Name | The text for Last name. Accepts alphabets and special character like hyphen and single quotes not exceeding 35 characters. Entry to this field is mandatory |
| Suffix | Choose the suffix from the drop down list of suffixes available. |
| Phone | The text for telephone number of the contact name. Accepts numeric values not exceeding 10 digits. The format is (999) 999-9999. Entry to this field is mandatory |
| Extension | The text for telephone extension number. Accepts numeric values not exceeding 5 digits. The format is 9999 |
| Fax | The text for fax number of the contact name. Accepts numeric values not exceeding 10 digits. The format is (999) 999-9999. Entry to this field is mandatory |
| E-mail | The text for email of the contact name. Accepts alphabets, numeric and special characters in the standard email format of length not exceeding 100 characters. |
| | Coverage Info Tab |
| Association ID | Text for association id. This is a read only field |
| Association Name | Text for association name. This is a read only field |
| Line of Coverage | Choose the line of coverage offered by the association by checking the check box/boxes. |
| Domestic Partner | Choose yes or no to state if domestic partner coverage is offered. |
| Coverage Rate Type | Choose yes or no to state the rate type (Blended or Non Blended) |
| | Other Info |
| Association ID | Text for association id. This is a read only field |
| Association Name | Text for association name. This is a read only field |
| Internal Work Group | Choose a internal work group by clicking search icon |
| Membership Status | Select a value for membership status from the drop down list Values can be active, closed, frozen. |
| Contract Date | Choose a date of contract by clicking calendar icon. The date can be in the format MM/DD/YYYY |
| Association Re-qualification Period | The text for re-qualification period. Accepts numeric values not exceeding 2 digits. The value states number of months for Association Re-qualification Period |
| Batch Billing | Choose the option of batch billing if the association if preferred by association. |
| Desired Association Name on the Bill | Choose the option to have name of association on the bill if preferred by association. |

Button Functionality

The following table provides explanation for each button in the screen.

| Element | Description |
|---|---|
| Continue | Saves the entered information and navigates to next level. The flow screen is from general info to coverage info then to other info. Screen flow should start from general info. Switchover in between the screens is possible only if clicking the Continue button saves the first screen "General Info". |
| Cancel | Cancel the contents entered in the fields and restore to the previous state as was before saving the changes. |

Modify Association

The modify association enables to modify the contents of an existing association. Alternatively you can also modify the record for the association by clicking the "Search Icon" for selecting the Association name or ID for modification when in create mode.

The sequential steps involved in modifying an existing association are listed below.

Step—1: After successful logon, click the menu Enrollment. Select Association and select the option Modify Association. (See FIG. C-7)

Step—2: Association name has to be selected from the drop down list or association id has to be entered for selecting an association. (See FIG. C-8)

Step—3: Modify the values in the respective field, as per the format briefed in fields explanation section Field Explanation, and click Continue button. (See FIG. C-9)

Step—4: Screen navigates to coverage information for any modifications. Modify relevant information pertaining to coverage and click Continue button. (See FIG. C-10)

Step—5: Screen navigates to other information. (See FIG. C-11)

Step—6: For internal work group click search icon. This pops up a screen to select internal work group. (See FIG. C-12)

Step—7: Click on any internal work group for selection.

Step—8: After modifying the information of other information and special handling as per the format briefed in field's explanation section, click Continue button Step—9: Screen navigates to confirming successful creation of an association. (See FIG. C-13)

Step—10: If the option is Inactivate and confirming the inactivation, the following screen appears. (See FIG. C-14)

Fields Explanation

Refer field explanation provided for create association. In case of modify association, either association id can be entered or association name can be selected from the drop down list. In case of association id, it accepts alphanumeric values. The difference in modify mode the data available is populated for making modifications, if required.

Button Functionality

The following table provides explanation for each button in the screen.

| Element | Description |
|---|---|
| Modify | Clicking the Modify Button navigates to the General Info screen populating the records for the association name selected or association ID entered. |
| Inactivate | Clicking the Inactivate button would inactivate the records for the association name selected or association ID entered. |
| Continue | Saves the entered information and navigates to next level. The flow from general info to coverage info then to other info. Screen flow should start from general info. Switchover in between the screens is possible only if the first screen "General Info" is saved by clicking the Continue button or if the mode is Modify. |
| Cancel | Cancel the contents entered in the fields or restore to the previous state as was before saving the changes. |

Related Applications

There is no related application.

3 New Business Enrollment

New Business Enrollment is the transaction module that encompasses the process of enrolling and maintaining all information that is required for various entities that are eligible to participate in the PacAdvantage program in the PX2 System. This module captures all the relevant information required to enroll a group and members to the program. The group and member must satisfy certain eligibility criteria to enroll themselves.

Various groups and members are classified as "Small Employer Group with employees and their dependents, Association Group (Groups affiliated to an associations) with employees and their dependents, Individual Member (Members affiliated to an association) with or without dependents.

Access

The application can be accessed from the main menu as follows:

Enrollment→New Business Enrollment
- →Group Enrollment
  - →Create New Group
  - →Modify Group
  - →Inactivate Group
- →Employee Enrollment
  - →Create Employee
  - →Modify Employee
  - →Inactivate Employee
- →Dependent Enrollment
  - →Create Dependent
  - →Modify Dependent
  - →Inactivate Dependent
- →Individual Member
  - →Individual Member
  - →Modify Individual Member
  - →Inactivate Individual Member
- Individual Member Dependent
  - →Create Dependent
  - →Modify Dependent
  - →Inactivate Dependent Pre-Requisites All master records must be available in the system for a successful enrollment. Master Records are as follows:

Carrier Maintenance—Refer "User Manual for Carrier Maintenance" for further information on the master records.

Agent/Agency—Refer "User Manual for Sales and Marketing" for further information on the Agent/Agency records.

Work Group—Refer "User Manual for Sales and Marketing" for further information on the Work Group records.

Internal Associates—Refer "User Manual for Sales and Marketing" for further information on the Internal Associates records.

Association Master—Association Master must be available in the system. Refer Section 2 of this document on "Association Master".

Eligibility Criteria—Business rules identifies the eligibility criteria for the Groups and member for participating in the PacAdvantage Program. For a successful enrollment the business rules must be met with.

For entering Employee records the group must be available in the system and the enrolled status must be "Enroll Pend".

For entering Dependent records the Employee must be available in the system and the enrolled status must be "Enroll Pend".

Application Functions

This application can be sub divided into following major functions:

Group Enrollment—Group Enrollment consist of the following operations:

- Create Small Employer Group—to input details of a Small Employer Group.
- Create Alternate Group—to input details of an Alternate Group
- Create Individual Association Member—to input details of an Individual Association Member.
- Modify Group—to search a specific group for modification prior to enrollment. This search feature would allow searching for Small Employer Group or Association Group.
- Inactivate Group—to search a specific Small Employer Group or Association Group and make inactive.

Employee Enrollment—Employee Enrollment consist of the following operations:

- Create Employee—to input details of an Employee for a specific group.
- Modify Employee—to search a specific employee for modification prior to enrollment. This search feature would allow searching employees attached to Small Employer Group or Association Group.
- Inactivate Employee—to search a specific Employee attached to Small Employer Group or Association—Group and make inactive.

Dependent Enrollment—Dependent Enrollment consist of the following operations:

- Create Dependent—to input details of a Dependent of a specific employee.
- Modify Dependent—to search a specific dependent for modification prior to enrollment. This search feature would allow searching for dependent attached to an employee of a Small Employer Group or Association Group.
- Inactivate Dependent—to search a specific Dependent attached to an employee of Small Employer Group or Association Group and make inactive.

Individual Member Enrollment—Individual Member Enrollment consist of the following operations:

- Modify Individual member—to search a specific member for modification prior to enrollment. This search feature would allow searching only for individual member who are attached to a guaranteed association.
- Inactivate Individual Member—to search a specific member those attached to a guaranteed association and make inactive.
- Create Individual Member Dependent—to input details of a Dependent of a specific individual member.
- Modify Individual Member Dependent member—to search a dependent of a specific individual member for modification prior to enrollment. This search feature would allow searching only for dependent of an individual member who is attached to a guaranteed association.
- Inactivate Dependent of Individual Member—to search a dependent of a specific individual member who are attached to a guaranteed association and make inactive.

Create Group (Small Employer Group)

The create group screen is to enter details of a group. The screen provides functionality to save, edit or add new group details.

The sequential steps involved in the creation of a new group by selecting small employer group are listed below.

Step—1: After successful logon, click the menu Enrollment and select New Business Enrollment. Then select the option Group Enrollment and Create Group. (See FIG. C-15)

Step—2: Screen displays with the option of selecting a group hierarchy. (See FIG. C-16)

Step—3: On choosing Small Employer Group and Clicking continue button screen navigates to General Info. Enter the values in the respective field, as per the format briefed in fields explanation section Field Explanation, and click Continue. (See FIG. C-17)

Field Explanation

The following table provides explanation for each button in the screen.

| Element | Description |
|---|---|
| Post Mark Date | Text for post mark date. Choose a date by clicking calendar icon. Accepts in the format MM/DD/YYYY |
| Received Date | Text for received date. Choose a date by clicking calendar icon. Accepts in the format MM/DD/YYYY |
| Company Information | |
| Legal Name | The text for name of the group. Accepts alphanumeric and special characters not exceeding 60 characters. Field is mandatory |
| Doing Business As | The text for business nature. Accepts alphanumeric and special characters not exceeding 60 characters. Field is optional |
| Type of Business | Choose the type of business from the drop down list available |
| Tax Identification | The text for tax identification. Accepts numeric values of exactly 9 digits |
| Address Information: Physical and Billing Address - Note: Enter Billing Address if different from the Physical Address. | |
| Street Address | The text for company address. Accepts alphanumeric and special characters not exceeding 35 characters |
| Suite | The text for company suite/apt # Accepts alphanumeric and special characters not exceeding 35 characters |
| Zip | The text for zip. Accepts numeric value of either 5 or 9 digits. City, State and County are populated automatically on entering the correct zip code and entering the tab key. |
| City | The text for city. Accepts alphabets and space between two words not exceeding 30 characters. |
| State | Choose the name of the state from the drop down list of States available in United States of America |
| County | Choose the name of the county from the drop down list of counties available for the ZIP Code entered. |

-continued

| Element | Description |
|---|---|
| | Contact Information |
| Mode of Correspondence | Choose the mode of correspondence from the drop down list available. |
| Contact 1 and Contact 2 - Fill in the relevant for Contact 1 and 2. | |
| Salutation | Choose the salutation from the drop down list of salutations available. |
| First Name | The text for contact name. Accepts alphabets and special characters like hyphen and single quotes not exceeding 25 characters. |
| Middle Initial | The text for middle initial. Accepts alphabets not exceeding 1 character. |
| Last Name | The text for contact name. Accepts alphabets and special characters like hyphen and single quotes not exceeding 35 characters. |
| Suffix | Choose the suffix from the drop down list of suffixes available. |
| Phone Number | The text for telephone number of the contact person. Accepts numeric values of exactly 10 digits. The format is (999) 999-9999 |
| Extension | The text for extension number of the contact person. Accepts numeric values not exceeding 5 digits. |
| Fax | The text for fax number of the contact person. Accepts numeric values of exactly 10 digits. The format is (999) 999-9999 |
| Email | The text for email of the contact person. Accepts alphabets, numeric and special characters in the standard email format of length not exceeding 100 characters |
| Contact Comments | The text for comments. Accepts alphabets, numeric and special characters. Field is optional |

Button Functionality

The following table provides explanation for each button in the screen.

| Element | Description |
|---|---|
| Continue | Saves the data and navigates to Billing Information screen and the system generates Group ID. |
| Cancel | Clears the contents entered in the fields or restore to the previous state as was before saving the changes |
| Tabs | General Info, Billing Info, Agent Info, Coverage Info and Add Employees are the tabs visible on this screen. The navigation between tabs is possible only if there is a valid group ID generated and assigned to the group. Also while navigating through the tab the content that are changed on the screen are not saved unless explicitly saved by other operations on the screen. |

Step—4: Screen navigates to billing information. Enter the values in the respective fields, as per the format briefed in field's explanation section and click Continue. (See FIG. C-18)

Field Explanation

The following table provides explanation for each button in the screen.

| Element | Description |
|---|---|
| Mode of payment | Choose a mode of payment from the drop down list available. Based on selection corresponding fields will enable to enter the values. For e.g. if the value selected is card payment, EFT will be disabled and allows only entering card details and vice versa. |
| | Credit Card Information |
| Cardholder's Names | The text for cardholder's name. Accepts alphabets and space between two words. |
| Credit Card Type | Choose the type of credit card from the drop down list available. |
| Credit Card No | The text for credit card number. Accepts numeric values not exceeding 30 digits |
| Expiration Date | Choose a month of expiration from the drop down list available |
| Expiration Year | The text for expiration year. Accepts numeric values of exactly 4. Example 2002. |
| Billing Address | As it appears on the credit Card |
| Street Address | The text for company address. Accepts alphanumeric and special characters not exceeding 35 characters. |
| ZIP | The text for zip. Accepts numeric value of either 5 or 9 digits. |
| State | The text for city. Accepts alphabets and space between two words not exceeding 30 characters. |
| City | Choose the name of the state from the drop down list of States available in United States of America |
| | EFT Information |
| Bank Name | The text for bank name. Accepts alphabets and space between two words. |
| Routing Number | The text for routing number. Accepts numeric values not exceeding 9 digits. |
| Account Number | The text for account number. Accepts numeric values not exceeding 9 digits. |
| Account Type | Choose the type of account from the drop down list available. |
| Depositor's Name | The text for depositor's name. Accepts alphabets and space between two words. |
| | Initial Payment Information |
| Amount Received | The text for amount received. Accepts only numeric values in the format 999999999.99 |
| Date Receive | The text for date received. Choose from the calendar icon in the format MM/DD/YYYY. |
| Check # | The text for check number. Accepts numeric values not exceeding 9 digits. |
| No Check Received | Check the option of no checks received for any non-receipt of checks. |

Button Functionality

The following table provides explanation for each button in the screen.

| Element | Description |
|---|---|
| Continue | Saves the data and Navigates to Agent Information screen. |
| Cancel | Clears the contents entered in the fields or restore to the previous state as was before saving the changes |
| Enrollment Summary | Click enrollment summary refreshes the screen and display the summary of information entered for group. |
| Missing Information | Click missing information refreshes the screen and displays the missed information for the group. |
| Tabs | General Info, Billing Info, Agent Info, Coverage Info and Add Employees are the tabs visible on this screen. The navigation between tabs is possible only if there is a valid group ID generated and assigned to the group. Also while navigating through the tab the content that are changed on the screen are not saved unless explicitly saved by other operations on the screen. |

Step—5: Screen navigates to Agent Info screen. Agent/Agency ID is selected by clicking search icon. (See FIG. C-19)

Step—6: This pops up a screen to select agent/agency id. Enter value in any one of the fields, or simply click search button to perform search operation. (See FIG. C-20)

Step—7: Click on agent/agency id for selection. (See FIG. C-21)

Step—8: Add the Agent information to the table for temporary storage. After filling other relevant information in agent info screen, as per the format briefed in field's explanation section and click Continue Field Explanation The following table provides explanation for each button in the screen.

| Element | Description |
|---|---|
| Agent ID | Choose an agent id by clicking search icon |
| Agent Type | Choose an agent type from the drop down list available. Based on the selection of the agent type the percent commission split entry and the Receive ROE packets option would be available. |
| Percent commission split | The text for percent commission. Accepts numeric values in the range of 1-100 (Example 100.00). This will be enabled only if the Agent type selected is "Agent Of Record" Sum of the percentage for all the Agent of Record added should be equal to 100.00. |
| Receive ROE/OE packets | Click the check box to receive ROE/OE packets for agent. This option will not be available for Agent Type "General Agent". |
| Agent Commission | The text for agent commission. Defaults the value defined in CM - rate Administration for Agent Commission. Accepts numeric values less than or equal to the defaulted value in the in the range of 1-100 (Example 4.45) |
| Check the box if the group is without an agent | Click the check box for a group with out an agent. This option will be available only for the Agent Type, "Agent of Record and Writing Agent". |

Button Functionality

The following table provides explanation for each button in the screen.

| Element | Description |
|---|---|
| Add | Add the contents of agent information. It is only a temporary addition. Becomes permanent only on saving the record. |
| Edit | Edit button will allow for editing a specific record in the table. |
| Update | Update the contents of agent information. It is only a temporary update. Becomes permanent only on saving the record |
| Delete | Delete button will delete the records in the table checked for deletion. It is only a temporary deletion. Becomes permanent only on saving the record |
| Check All | The "Check All" Link will check all the records in the table |
| Clear All | The "Clear All" Link will uncheck all the records in the table that are checked. |
| Enrollment Summary | Click enrollment summary refreshes the screen and display the summary of information entered for group creation |
| Missing Information | Click missing information refreshes the screen and displays the missed information. For a successful creation of a group, there should be no missing information |
| Continue | Saves the data and navigates to Coverage Information screen. |
| Cancel | Clears the contents entered in the fields or restore to the previous state as was before saving the changes |
| Tab | General Info, Billing Info, Agent Info, Coverage Info and Add Employees are the tabs visible on this screen. The navigation between tabs is possible only if there is a valid group ID generated and assigned to the group. Also while navigating through the tab the content that are changed on the screen are not saved unless explicitly saved by other operations on the screen |

Step—9: Screen navigates to coverage information. Enter the values in the respective fields, as per the format briefed in field's explanation section and click Continue. (See FIG. C-22)

Field Explanation

The following table provides explanation for each button in the screen.

| Element | Description |
|---|---|
| Waiting Period Information | |
| Employee Type | Choose an Employee Type from the drop down list available |
| Waiting Period | Choose a waiting period from the drop down list available |
| RAF Discounting | |
| RAF | List the RAF tier applicable for the group based on the RAF tier available on group's effective date. |
| Contribution | |
| Line of Coverage elected | Choose a line of coverage from the drop down list available |
| Contribution For | Choose a contribution for from the drop down list available. Contribution can be for an employee or dependent. |
| Contribution Type | Choose a contribution type from the drop down list available. List the contribution type "% Lowest Cost HMO", "% Lowest Cost Plan", "% Specified Plan", "Flat $ Amount". On Selecting % Specified Plan the page would get refreshed and the Plan Name for the Specified LOC would be populated in the Drop Down List "Plan Name" |
| Contribution Amount | The text for contribution amount. Accepts numeric values in the format 99999999.99 for flat $ amount and for the rest of the option it accepts as % value say 100.00 |
| Plan Name | Choose a plan name from the drop down list available if the Contribution Type selected is "% Specified Plan". |
| Current Group Insurer | Choose a group insurer from the drop down list available |
| Whether group legally required to provide workers compensation coverage | Click the option yes or no |
| Workers compensation carrier name | Choose a compensation carrier name from the drop down list available |
| Number of Employees (Full time and part time) | The text for total number of employees including full time and part time. Accepts numeric values |
| Number of full time employees at the time of application | The text for number of full time employees at the time of applying. Accepts numeric values |
| Number of eligible employees at the time of application | The text for number of eligible employees at the time of applying. Accepts numeric values |
| Number of employee applying | The text for number of employees at the time of applying. Accepts numeric values |
| Have you employed 20 or more employees for 20 or more weeks during the current or preceding year (TEFRA) | Click the option yes or no |
| Have you employed 20 or more employees during at least 50% of the preceding calendar year (COBRA) | Click the option yes or no |
| Are you offering coverage to employees working | Click the option yes or no |

-continued

| Element | Description |
| --- | --- |
| more 20-29 hours per week | |
| Are you offering coverage to domestic partners | Click the option yes or no |
| Are you offering coverage to 1099 | Click the option yes or no |
| Employer's Signature | Check this Check box if Employer's signature is verified. |
| Date Signed | The text for Date Signed. Choose a date by clicking calendar icon. Date accepts the format MM/DD/YYYY. |

Button Functionality

The following table provides explanation for each button in the screen.

| Element | Description |
| --- | --- |
| Add (Waiting Period Information) | Add the contents of Waiting Period information. It is only a temporary addition. Becomes permanent only on saving the record. |
| Add (Contribution) | Add the contents of Contribution and Coverage elected. It is only a temporary addition. Becomes permanent only on saving the record. |
| Update (Waiting Period Information) | Updates the contents of Waiting Period information. It is only a temporary update. Becomes permanent only on saving the record. |
| Update (Contribution) | Update the contents of Contribution and Coverage elected. It is only a temporary update. Becomes permanent only on saving the record. |
| Cancel | Cancels the operation that was currently performed prior to saving the record. |
| Edit | Edit button will allow for editing a specific record in the table. |
| Delete | Delete button will delete the records in the table checked for deletion. It is only a temporary deletion. Becomes permanent only on saving the record. |
| Check All | The "Check All" Link will check all the records in the table |
| Clear All | The "Clear All" Link will uncheck all the records in the table that are checked. |
| Enrollment Summary [Link] | Click enrollment summary refreshes the screen and display the summary information entered for group creation |
| Missing Information [Link] | Click missing information refreshes the screen and displays the missed information. For a successful creation of a group, there should be no missing information |
| Missing Info | Saves the data and navigates to Missing Information Page |
| Continue/Add EE | Saves the data and navigates to Add Employee screen. |
| Create New Group | Saves the data entered and navigates to the screen Group Hierarchy for creating New Group. |
| Cancel | Clears or restores the content entered in the fields only prior to saving the records. |
| Tab | General Info, Billing Info, Agent Info, Coverage Info and Add Employees are the tabs visible on this screen. The navigation between tabs is possible only if there is a valid group ID generated and assigned to the group. Also while navigating through the tab the content that are changed on the screen are not saved unless explicitly saved by other operations on the screen |

Step—10: Screen navigates to add employee general information. Enter the values in the respective fields, as per the format briefed in field's explanation section. (See FIG. C-23)

Field Explanation

The following table provides explanation for each button in the screen.

| Element | Description |
| --- | --- |
| Employee Information | |
| Salutation | Choose the salutation from the drop down list of salutations available. |
| First Name | The text for first name. Accepts alphabets and special character like hyphen and single quotes not exceeding 25 characters. First name is mandatory. |
| Middle Initial | The text for middle initial. Accepts alphabets not exceeding 1 character. |
| Last Name | The text for last name Accepts alphabets and special character like hyphen and single quotes not exceeding 35 characters. Last name is mandatory. |
| Suffix | Choose the suffix from the drop down list of suffixes available. |
| Date of Birth | The text for date of birth. Choose a date by clicking calendar icon. Date accepts the format MM/DD/YYYY. Birth date cannot be later than the current date. |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| Address Information: Physical and Alternate Address - Note: Enter Alternate Address if different from the Physical Address. | |
| Street Address | The text for address. Accepts alphanumeric and special characters with values not exceeding 35 characters |
| Apt | The text for suite/apt # . . . Accepts alphanumeric and special characters with values not exceeding 35 characters |
| Zip | The text for zip. Accepts numeric value of either 5 or 9 digits. City, State and County are populated automatically on entering the correct zip code and entering the tab key. |
| City | The text for city. Accepts alphabets and space between two words not exceeding 30 characters. |
| State | Choose the name of the state from the drop down list of States available in United States of America |
| County | Choose the name of the county from the drop down list of States available in United States of America |
| Mode of Correspondence | Choose the mode of correspondence from the drop down list available |
| Phone Number | The text for telephone number of the employee. Accepts numeric values not exceeding 10 digits. The format is (999) 999-9999 |
| Extension | The text for extension number of the employee. Accepts numeric values not exceeding 5 digits |
| Fax | The text for fax number of the employee. Accepts numeric values not exceeding 10 digits. The format is (999) 999-9999 |
| Email | The text for email of the employee. Accepts alphabets, numeric and special characters in the standard email format of length not exceeding 100 characters |

Button Functionality

The following table provides explanation for each button in the screen.

| Element | Description |
| --- | --- |
| Continue | Saves the data and navigates to coverage information for employees. |
| Cancel | Clears the contents entered in the fields or restore to the previous state as was before saving the changes |
| Enrollment Summary | Click enrollment summary refreshes the screen and display the summary information entered for group creation |
| Missing Information | Click missing information refreshes the screen and displays the missed information. For a successful creation of a group, there should be no missing information |
| Group ID | Click Group ID to navigates to the Group's general info screen. |

-continued

| Element | Description |
|---|---|
| Tab | General Info, Coverage Info, Add Dependent are the tabs visible on this screen. The navigation between the tabs is possible only if there is a valid Employee ID generated and assigned to the employee. Also while navigating through the tab the content that are changed on the screen are not saved unless explicitly saved by other operations on the screen |

Step—11: Screen navigates to coverage information. Enter the values in the respective fields, as per the format briefed in field's explanation section and click Continue. (See FIG. C-24)

Field Explanation

The following table provides explanation for each button in the screen.

| Element | Description |
|---|---|
| | Employee Information |
| Hours worked per week | The text for worked hours per week. Accepts numeric values not exceeding 2 digits. |
| Date of employment | The text for date of employment. Choose a date by clicking calendar icon. Date accepts the format MM/DD/YYYY. |
| Employee type | Choose an employee type from the drop down list available |
| | Plan Information |
| Line of coverage | Choose a line of coverage from the drop down list available |
| Medical waived | Click the check box for medical waive if the employee is waiving medical. |
| Carrier selection (Benefit level) | Choose a carrier selection from the drop down list available |
| Coverage choice | Choose a coverage from the drop down list available |
| PCP ID/Medical group ID | The text for PCP ID. Accepts alphabets and numeric values not exceeding 10 characters. |
| Are you an existing patient | Click the check box if you are an existing patient |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Prior plan type | Choose a plan type from the drop down list available |
| Prior plan name | Choose a plan name from the drop down list available |
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Other coverage kept | The text for other coverage. Accepts alphabets with values not exceeding 50 characters. |
| Employee signature | Click the check box, to have employee signature |
| Date signed | The text for date signed. Choose a date by clicking calendar icon. Date accepts the format MM/DD/YYYY. Date cannot accept future date. |

Button Functionality

The following table provides explanation for each button in the screen.

| Element | Description |
|---|---|
| Add | Add the contents of employee coverage information. It is only a temporary addition. Becomes permanent only on saving the record. |

-continued

| Element | Description |
|---|---|
| Edit | Edit button will allow for editing a specific record in the table. |
| Update | Update the contents of Plan Information. It is only a temporary update. Becomes permanent only on saving the record. |
| Cancel | Cancels the operation that was currently performed prior to saving the record. |
| Delete | Delete button will delete the records in the table checked for deletion. It is only a temporary deletion. Becomes permanent only on saving the record. |
| Check All | The "Check All" Link will check all the records in the table |
| Clear All | The "Clear All" Link will uncheck all the records in the table that are checked. |
| Enrollment Summary [Link] | Click enrollment summary refreshes the screen and display the summary of information entered for group creation |
| Missing Information [Link] | Click missing information refreshes the screen and displays the missed information. For a successful creation of a group, there should be no missing information |
| Group ID | Click Group ID to navigates to the Group's general info screen. |
| Continue | Saves the data and navigates to Coverage Information screen. |
| Enrollment Summary | Click enrollment summary refreshes the screen and display the summary of information entered for group creation |
| Cancel | Clears the contents entered in the fields or restore to the previous state as was before saving the changes |
| Tab | General Info, Coverage Info, Add Dependent are the tabs visible on this screen. The navigation between the tabs are possible only if there is a valid Employee ID generated and assigned to the employee Also while navigating through the tab the content that are changed on the screen are not saved unless explicitly saved by other operations on the screen |

Step—12: Screen navigates to add dependent information. Enter the values in the respective fields, as per the format briefed in field's explanation section and click anyone of the button shown for subsequent operation. (See FIG. C-25)

Field Explanation

The following table provides explanation for each button in the screen.

| Element | Description |
|---|---|
| | Dependent Information |
| First Name | The text for first name. Accepts alphabets and special character like hyphen and single quotes not exceeding 25 characters. First name is mandatory. |
| Middle Initial | The text for middle initial. Accepts alphabets not exceeding 1 character. |
| Last Name | The text for last name. Accepts alphabets and special characters like hyphen and single quotes not exceeding 35 characters. Last name is mandatory. |
| Suffix | Choose the suffix from the drop down list of suffixes available. |
| Date of Birth | The text for date of birth. Choose a date by clicking calendar icon. Date accepts the format MM/DD/YYYY. Birth date cannot be later than the current date. |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| Relationship | Choose the relationship from the drop down list available. |

-continued

| Element | Description |
|---|---|
| Street Address | The text for address. Accepts alphanumeric and special characters with values not exceeding 35 characters |
| Suite | The text for suite/apt # . . . Accepts alphanumeric and special characters with values not exceeding 35 characters |
| Zip | The text for zip. Accepts numeric value of either 5 or 9 digits. City, and State are populated automatically on entering the correct zip code and entering the tab key. |
| City | The text for city. Accepts alphabets not exceeding 30 characters. |
| State | Choose the name of the state from the drop down list of States available in United States of America |
| Line of Coverage | |
| Selected carrier | The text for selected carrier. It is a read only field |
| Coverage choice | The text for coverage. It is a read only field |
| Service area | The text for service area. It is a read only field |
| Prior plan type | Choose a plan type from the drop down list available |
| Prior plan | The text for plan name. Accepts alphabets |
| Waived | Click the check box if Line of Coverage is waived. |
| Start date | The text for insurance start date. Choose a date by clicking calendar icon. Date accepts the format MM/DD/YYYY. |
| End date | The text for insurance end date. Choose a date by clicking calendar icon. Date accepts the format MM/DD/YYYY. |
| PCP ID/ | The text for PCP ID. Accepts alphabets and numeric values not exceeding 10 characters. |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Disabled dependent | Click the option of temporary or permanent. This is enable if the relationship opted is child |
| Domestic partner | Click the option for domestic partner. It depends on the value selected in relationship |
| Legal guardian | Click the option for legal guardian. It depends on the value selected in relationship |
| Signature | Click the check box if the signature is opted |

Button Functionality

The following table provides explanation for each button in the screen.

| Element | Description |
|---|---|
| Add Employee | Saves the data and navigates to the screen for adding employees. |
| Add Dependent | Saves the data and navigates to the screen for adding dependent |
| Enrollment Summary | Click enrollment summary refreshes the screen and display the summary of information entered for group creation |
| Missing Information | Click missing information refreshes the screen and displays the missed information. For a successful creation of a group, there should be no missing information |
| Cancel | Clears the contents entered in the fields or restore to the previous state as was before saving the changes |
| Tab | General Info, Coverage Info, Add Dependent are the tabs visible on this screen. The navigation between the tabs are possible only if there is a valid Employee ID generated and assigned to the employee Also while navigating through the tab the content that are changed on the screen are not saved unless explicitly saved by other operations on the screen |

Step—13: Clicking enrollment summary button screen navigates to enrollment summary. This screen shows the overall information that is entered. Enter the values in the respective fields, as per the format briefed in field's explanation section and click Pre Enrollment button for checking the eligibility criteria for the Group and Members. (See FIG. C-26)

Field Explanation

The following table provides explanation for each element in the screen.

| Element | Description |
|---|---|
| Group Information Header | Contains header information of the Group |
| Name of the Group | Text for the Name of the Group |
| Group ID | Text and Link for the Group ID to navigate to the Group General Info screen |
| Group Type | Specifies the Type of the Group like Small Employer Group |
| Proposed Effective Date | The text for Proposed Effective Date. Choose a date by clicking calendar icon. Date accepts the format MM/DD/YYYY. Default effective date is first of the following month. Effective date cannot be past date |
| Status | Text to specify the status of the group. |
| Work Group | Text for Work Group. This specifies the internal work group attached to the Group. This is based on the writing agent's work group. |
| Enrollment Summary Information | Enrollment Summary Information is broken down into tree structure. The tree can by expanded or collapsed. The level of the tree is as per the example given below:<br>– Employee<br>  – Dependent<br>  – Dependent<br>– Employee<br>  – Dependent<br>– Employee<br>+ Employee<br>– Employee<br>  + Dependent<br>+– Employee<br>Where (–) signifies expanded view and (+) signifies collapsed view. |
| Employee ID | Text for Employee ID |
| Employee SSN | Text for Employee SSN |
| Employee Name | Text for employee Name (First Name and Last Name) |
| Effective Date | Text for Employee Effective date. Choose a date by clicking calendar icon. Date accepts the format MM/DD/YYYY. Defaults effective date of the Group. Effective date cannot be past date |
| Status | Text to specify the status of the employee. |
| Dependent ID | Text for Dependent ID |
| Dependent SSN | Text for Dependent SSN |
| Dependent Name | Text for Dependent Name (First Name and Last Name) |
| Effective Date | Text for Dependent Effective date. Choose a date by clicking calendar icon. Date accepts the format MM/DD/YYYY. Defaults effective date of the Employee. Effective date cannot be past date |
| Status | Text to specify the status of the Dependent. |
| Enrollment Information | There are two part of this information:<br>1) Entered based on verification<br>2) Based on the information provide on the Coverage Info screen |
| | Entered based on verification |
| Total Full Time Applied (A) | Value is shown based on the actual full time employee applied (System Identified) |
| Total part Time Applied (B) | Value is shown based on the actual part time employee applied (System Identified) |
| Employee Waived (C) | Text to enter Employee Waived. Contains only whole number. Accepts numbers not exceeding 5 digits. Manually entered based on verification. |
| Employee Declined (D) | Text to enter Employee Declined. Contains only whole number. Accepts numbers not exceeding 5 digits. Manually entered based on verification. |
| Total Eligible Employee (E) = | Text to display total eligible employee. Employee Applying is sum total of A + B + D. |
| Total Employee | Text to display total employee applying. Employee |

-continued

| Element | Description |
|---|---|
| Applying (F) | Applying is sum total of A + B. |
| % Participation | Test to display % participation. Participation is % of E/F |
| | Based on Info Provided |
| Total Full Time Applied (A) | Text for Total Full Time Applied. Based on the information provide on the Coverage Info screen |
| Total part Time Applied (B) | Text for Total Part Time Applied. Based on the information provide on the Coverage Info screen |
| Total Employees Applied | Text to display total employee applied. Employee Applied is sum total of A + B |

Button Functionality

The following table provides explanation for each button in the screen.

| Element | Description |
|---|---|
| Missing Information | Click missing information refreshes the screen and displays the missed information. For a successful creation of a group, there should be no missing information |
| Cancel | Clears the contents entered in the fields or restore to the previous state as was before saving the changes |
| <<, <, >, >> | The enrollment summary shows record for 5 employees on single screen. If the employee size increases more than 5. These buttons are used for navigating to the next and previous records for viewing.<br><< - Show first record(s)<br>< - Show previous record(s)<br>> - Show next record(s)<br>>> - Show last record(s) |
| Group ID | Click Group ID to navigates to the Group's general info screen. |

Step—14: Clicking pre enrollment navigates to missing info screen. Missing information screen provide information on the data that is required to complete an enrollment process. This also checks for the eligibility of the group and member for enrolling into PacAdvantage Program. For a successful creation of a group the missing information should be empty. The user role and authority can overrule certain missing information.

Enter the values in the respective fields, as per the format briefed in field's explanation section and click Enroll button for enrolling the Group and Members. (See FIG. C-27)

Field Explanation

The following table provides explanation for each element in the screen.

| Element | Description |
|---|---|
| Group Information Header | Contains header information of the Group |
| Name of the Group | Text for the Name of the Group |
| Group ID | Text and Link for the Group ID to navigate to the Group General Info screen |
| Group Type | Specifies the Type of the Group like Small Employer Group |
| Proposed Effective Date | The text for Proposed Effective Date. Choose a date by clicking calendar icon. Date accepts the format MM/DD/YYYY. Default effective date is first of the following month. Effective date cannot be past date |
| Status | Text to specify the status of the group. |

-continued

| Element | Description |
|---|---|
| Work Group | Text for Work Group. This specifies the internal work group attached to the Group. Internal is based on the writing agent's work group. |
| Tree Structure | Enrollment Missing Information is broken down into tree structure. The tree can by expanded or collapsed. The level of the tree is as per the example given below:<br>– Employee<br>– Dependent<br>– Dependent<br>– Employee<br>– Dependent<br>– Employee<br>+ Employee<br>– Employee<br>+ Dependent<br>+– Employee<br>Where (–) signifies expanded view and (+) signifies collapsed view. |
| Group Missing Info | This identifies all the eligibility rules and the information that are incomplete on Group level for completing the enrollment process. |
| Missing Entities | List the missing entities for the group. Provides a link to go to the respective screen to fill in the relevant information to complete all the required entries. |
| Message | List the message against each missing entities. |
| Employee Missing Info | This identifies all the eligibility rules and the information that are incomplete on Employee level for completing the enrollment process. |
| Missing Entities | List the missing entities for the employee. Provides a link to go to the respective screen to fill in the relevant information to complete all the required entries. |
| Message | List the message against each missing entities. |
| Dependent Missing Info | This identifies all the eligibility rules and the information that are incomplete on dependent level for completing the enrollment process. |
| Missing Entities | List the missing entities for the dependent. Provides a link to go to the respective screen to fill in the relevant information to complete all the required entries. |
| Message | List the message against each missing entities. |
| Enrollment Action | Choose from the drop down list the action to be performed for enrollment. Enroll/Decline |
| Remarks | Text for remarks if any. |
| Reasons for Decline | Choose from the drop down list the reasons for decline. |
| Reasons for Other | Text for other reason. If the reason for decline is other than the reasons available. |

Button Functionality

The following table provides explanation for each button in the screen.

| Element | Description |
|---|---|
| Send mail | Click this link to send missing information to the Internal Work Group (GMS representatives) attached to this Group. |
| Preview Invoice | Click this Link to preview the Invoice details prior to generation of invoice. |
| Enroll | Saves the data if there are no missing information and navigates to enrollment confirmation page. |
| Cancel | Clears the contents entered in the fields or restore to the previous state as was before saving the changes |
| <<, <, >, >> | The enrollment missing information shows record for 5 employees on single screen. If the employee size increases more than 5. These buttons are used for navigating to the next and previous records for viewing.<br><< - Show first record (s)<br>< - Show previous record (s)<br>> - Show next record (s)<br>>> - Show last record (s) |
| Group ID | Click Group ID to navigates to the Group's general info screen. |
| Preview Invoice | Click Preview Invoice to pop up a new browser window to preview the invoice for the group |

Missing Information

The following table provides explanation for each missing information and what needs to be done to remove missing information from the screen

| Missing Entity | Message | Reasons/Remedy |
|---|---|---|
| | Group Level | |
| General Information | These are missing information pertains to the Group Level information required in the Group General Information Screen | |
| Employer Tax ID | Employer Tax ID is not specified | Fill in the Employer tax ID in the Group General Info Screen |
| Type of Business | Type of Business is not specified | Choose the Type of Business Listed from the list in Group General Info Screen |
| Address | Address information is not specified | Fill in the address information in the Group General Info Screen |
| ZIP | ZIP Code is not specified | Fill in the zip code in the Group General Info Screen |
| City | City name is not specified | Fill in the City name in the Group General Info Screen |
| County | County is not specified | Choose County for Group from the list in group general info screen |
| State | State name is not specified | Choose the State from the list in group general info screen |
| Mode of Correspondence | Mode of Correspondence is not specified | Choose the Mode of Correspondence for Contact 1 from the list in group general info screen |
| Contact First Name | Contact first name for Contact 1 is not specified | Fill in the Contact first in the Group General Info Screen |
| Contact Last name | Contact last name for Contact 1 is not specified | Fill in the Contact last in the Group General Info Screen |
| Phone | Phone for Contact 1 is not specified | Fill in the Contact Phone in the Group General Info Screen |
| Email | Email for Contact 1 is not specified | This is required if the mode of correspondence selected is Email. Fill in the Contact Email in the Group General Info Screen |
| Billing Information | These missing information pertains to the Group Level information required in the Billing Information Screen | |
| Mode of payment | Mode of payment is not specified | Choose the Mode of Payment for the group from the list in Group Billing Info Screen |
| Check Number | Check Number is not specified. | Fill in the Check number in the Group Billing Info Screen |
| Check Date | Date Check received is not specified | Fill in the Date received in the Group Billing Info Screen |
| Check Number | Check Number received is not specified | Fill in the Check Number in the Group Billing Info Screen |
| Initial Payment | Initial payment not received | If initial payment check is received then uncheck the box "No Check Received" in the Group Billing Info Screen |
| Initial Payment | Initial Payment is not sufficient to get enrolled | If initial payment check is received but there is a shortfall in the amount this message would be shown. Check the short |

-continued

| Missing Entity | Message | Reasons/Remedy |
|---|---|---|
| | | fall by previewing the invoice with the amount received. The variation in amount received by more than (−) $2 will allow user with level II and above only to enroll. The variation in amount received by more than (−) $50 will allowing user with level III and above only to enroll The variation in amount received by more than (−) $100 will allow user with level IV and above only to enroll |
| Cardholder's Name | Cardholder's name is not specified | This is required if the mode of payment opted by group is Credit Card. Fill in the Cardholder's name in the Group Billing Info Screen. |
| Credit Card Type | Credit Card Type is not specified. | This is required if the mode of payment opted by group is Credit Card Choose the Credit Card Type for the group from the list in Group Billing Info Screen |
| Credit Card Number | Credit Card Number is not specified | This is required if the mode of payment opted by group is Credit Card. Fill in the Credit Card Number in the Group Billing Info Screen. |
| Expiration Date | Credit Card Expiration Date is not specified | This is required if the mode of payment opted by group is Credit Card. Fill in the Credit Card Expiration Date in the Group Billing Info Screen. |
| Bank Name | Bank name is not specified | This is required if the mode of payment opted by group is EFT. Fill in the Bank Name in the Group Billing Info Screen. |
| Routing Number | Routing Number is not specified | This is required if the mode of payment opted by group is EFT. Fill in the Routing Number in the Group Billing Info Screen. |
| Account Type | Account Type is not specified | This is required if the mode of payment opted by group is EFT. Fill in the Account Type in the Group Billing Info Screen |
| Depositor's Name | Depositor's Name is not specified | This is required if the mode of payment opted by group is EFT. Fill in the Depositor's Name in the Group Billing Info Screen |
| Agent Information | These missing information pertains to the Group Level information required in the Agent Information Screen | |
| Writing Agent | Writing Agent is not specified | Choose the Writing Agent for the Group in the Group Agent Info Screen |
| Agent of Record | Agent of Record is not specified | This is required if commission for the agent exists. Choose the Agent of Record for the Group in the Group Agent Info Screen |
| Agent License Number | Agent License Number is not specified | Go to Agent/Agency Master Screen, search for the agent/agency |

-continued

| Missing Entity | Message | Reasons/Remedy |
|---|---|---|
| | | attached with group and fill in the License information. |
| License Expiry Date | License Expiry Date is not specified | Go to Agent/Agency Master Screen, search for the agent/agency attached with group and fill in the License information. |
| License Expiry Date | Agent License Number is expired | Go to Agent/Agency Master Screen, search for the agent/agency attached with group and modify the license expiry date. |
| Commission | % Commission split is not specified | Check if the commission split for the agent of record exists. If not edit the corresponding agent of record and enter % commission split for the Agent of Record in the Group Agent Info Screen |
| Total Commission Split | % Split in commission is less than 100% | Check if the total of the commission split's for the agent of record is 100. If not edit the corresponding agent of record and make changes to make commission split total to 100% in the Group Agent Info Screen |
| Coverage Information | These missing information pertains to the Group Level information required in the Coverage Information Screen | |
| RAF | Rate Differential factor is not specified | This is required to arrive to the Premium Calculation for the Group. Select the RAF from the list in Group Coverage Info Screen |
| Workers compensation coverage | Is your Group legally required to provide workers compensation coverage? | Choose the Option Yes or No in Group Coverage Info Screen |
| Worker Compensation Carrier Name | Worker Compensation Carrier Name is not specified | This is required if the Workers compensation coverage opted is yes. Choose the Worker Compensation Carrier Name from the list in Group Coverage Info Screen |
| Total Employee | How many employees (full time and part time) available with the Group | Fill in the "How many employees (full time and part time)" available with the Group in the Group Coverage Info Screen |
| Full Time Employee | How many full time employees available with the Group | Fill in the "How many full time employees" available with the Group in the Group Coverage Info Screen |
| Eligible Employee | How many eligible employees at the time of application | Fill in the "How many eligible employees at the time of application" available with the Group in the Group Coverage Info Screen |
| Employees Applying | How many employees applying | Fill in the "How many employees applying" in the Group Coverage Info Screen |
| TEFRA | Have you employed 20 or more employees for 20 or more weeks during the current or preceding year (TEFRA) | Choose the Option Yes or No in Group Coverage Info Screen |

-continued

| Missing Entity | Message | Reasons/Remedy |
|---|---|---|
| COBRA | Have you employed 20 or more employees during at least 50% of the preceding calendar year (COBRA) | Choose the Option Yes or No in Group Coverage Info Screen |
| Part time Coverage | Are you offering coverage to permanent employee working 20-29 hours per week? | Choose the Option Yes or No in Group Coverage Info Screen |
| Domestic Partner Coverage | Are you offering coverage to domestic partners? | Choose the Option Yes or No in Group Coverage Info Screen |
| Waiting Period | Waiting Period for the employees is not specified | Add waiting period for the employee based on the employee type in Group Coverage Info Screen |
| Waiting Period | Managerial Employee Waiting period not specified | Edit the waiting period information and update the waiting period for the employee type in Group Coverage Info Screen |
| Waiting Period | Non- Managerial Employee Waiting period not specified | Edit the waiting period information and update the waiting period for the employee type in Group Coverage Info Screen |
| Waiting Period | Exempt Employee Waiting period not specified | Edit the waiting period information and update the waiting period for the employee type in Group Coverage Info Screen |
| Waiting Period | Non - Exempt Employee Waiting period not specified | Edit the waiting period information and update the waiting period for the employee type in Group Coverage Info Screen |
| Waiting Period | Union Employee Waiting period not specified | Edit the waiting period information and update the waiting period for the employee type in Group Coverage Info Screen |
| Waiting Period | Non- Union Employee Waiting period not specified | Edit the waiting period information and update the waiting period for the employee type in Group Coverage Info Screen |
| Waiting Period | Full-Time Employee Waiting period not specified | Edit the waiting period information and update the waiting period for the employee type in Group Coverage Info Screen |
| Waiting Period | Part-Time Employee Waiting period not specified | Edit the waiting period information and update the waiting period for the employee type in Group Coverage Info Screen |
| Line of Coverage | Line of coverage not specified | Add Line of Coverage in Group Coverage Info Screen |
| Contribution Type | Employee Contribution type not specified | Edit the Line of coverage wherein the Contribution Type is not specified and update the Contribution Type in Group Coverage Info Screen |
| Contribution Amount | Employee Contribution Amount not specified | Edit the Line of coverage wherein the Contribution Amount is not specified and update the Contribution Amount in Group Coverage Info Screen |
| Contribution Type | Dependent Contribution type not specified | Edit the Line of coverage wherein the Contribution Type is not specified and update the Contribution Type in Group Coverage Info Screen |

-continued

| Missing Entity | Message | Reasons/Remedy |
|---|---|---|
| Contribution Amount | Dependent Contribution Amount not specified | Edit the Line of coverage wherein the Contribution Amount is not specified and update the Contribution Amount in Group Coverage Info Screen |
| Contribution Type Variation | Contribution Type for Employee and Dependent differs. | Employee and Dependent must have same Contribution Type. Edit the Line of coverage wherein the Contribution Type varies and update the Contribution Type in Group Coverage Info Screen |
| Plan Name | Plan not selected for Contribution Type "% Specified Plan" | Edit the Line of coverage wherein the Plan Name is not specified and update the Plan Name in Group Coverage Info Screen |
| Employee General Information | These missing information pertains to the Employee Level information required in the Employee General Information Screen | |
| Address | Address information is not specified | Fill in the address information in the Employee General Info Screen |
| City | City is not specified | Fill in the City in the Employee General Info Screen |
| State | State is not specified | Fill in the City in the Employee General Info Screen |
| ZIP Code | ZIP Code is not specified | Fill in the ZIP Code in the Employee General Info Screen |
| Date of Birth | Date of Birth is not specified | Fill in the Date of Birth in the Employee General Info Screen |
| Gender | Gender is not specified | Choose the Gender in the Employee General Info Screen |
| SSN | SSN is not specified | Fill in the SSN in the Employee General Info Screen. If the employee refuse to provide SSN then click auto generate SSN/Unique ID in the Employee General Info Screen. Auto generation of SSN/Unique ID will be available only for the user with role as level II and above |
| Mode of Correspondence | Mode of Correspondence is not specified | Choose the Mode of Correspondence for Employee from the list in Employee general info screen |
| Email | Email for Employee is not specified | This is required if the mode of correspondence selected is Email. Fill in the Email in the Employee general info screen |
| Employee Coverage Information | These missing information pertains to the Employee Level information required in the Employee Coverage Information Screen | |
| Hours Worked | Hours worked per week not specified | Fill in the Hours worked per week in the Employee Coverage Info Screen |
| Date of Employment | Date of employment not specified | Fill in the Date of Employment in the Employee Coverage Info Screen |

-continued

| Missing Entity | Message | Reasons/Remedy |
|---|---|---|
| Employee Signature | Employee signature is missing | Verify employee's signature and check Employee Signature checkbox in the Employee Coverage Info Screen |
| Date Signed | Date Signed is missing | Verify Date signed and fill in the Date Signed in the Employee Coverage Info Screen |
| Employee Type | Employee Type not specified | Choose the Employee Type for Employee Type from list in Employee Coverage info screen |
| Employee Type - Waiting Period | Variation in Employee Type at Group and Employee Level | Check for the Employee Type specified in the Group Coverage Info and the Employee Coverage Info. Employee Type specified in The Group Level and the Employee Level can have variation. Either change the Employee Type in Employee Coverage Info screen or add the Employee Type in the Group Coverage Info. |
| Employee Coverage | Employee's Line of Coverage not specified | Choose the Line of Coverage for the Employee in Employee Coverage info screen |
| Medical Coverage | Medical Line of Coverage not specified | Choose the Line of Coverage for the Employee in Employee Coverage info screen. If the employee waives medical coverage check the checkbox Medical Waived. |
| Dental Coverage | Dental Line of Coverage not specified | This is required if the Group offers optional benefits. Choose the Line of Coverage for the Employee in Employee Coverage info screen |
| Vision Coverage | Vision Line of Coverage not specified | This is required if the Group offers optional benefits. Choose the Line of Coverage for the Employee in Employee Coverage info screen |
| CAM Coverage | CAM Line of Coverage not specified | This is required if the Group offers optional benefits. Choose the Line of Coverage for the Employee in Employee Coverage info screen |
| Coverage Choice | Coverage Choice between the Line of Coverage differs | Choose the appropriate coverage choices as per the illustration provided in the column below and edit the coverage choice for the specific Line of Coverage and update in Employee Coverage info screen. Or In dependent Info Screen waive the Optional coverage choice for dependent under 2 by checking the check box Waive. |
| Coverage Choice Illustration | Coverage choice for the Medical should have highest precedence. There are Four Coverage Choices<br>1 - Employee Family<br>2 - Employee Child<br>3 - Employee Spouse<br>4 - Employee Only<br>Case 1: | |

-continued

| Missing Entity | Message | Reasons/Remedy |
|---|---|---|
| | If coverage choice for medical is Employee Child, Optional benefit cannot have employee spouse. It should be Employee Child or Employee Only provided child is under 2<br>Case 2:<br>If Coverage Choice for Medical is Employee Spouse optional benefits cannot have employee child. It should also be Employee Spouse<br>Case 3:<br>If Coverage Choice for Medical is Employee Child optional benefits cannot have employee only if at least one child is above 2 years of age. It should also be Employee child | |
| Dependent Count | Number of Dependents is not sufficient to satisfy Coverage Choice. | This would be the case when the dependent information is not entered into the system. Add Dependent.<br>This can also occur if the number of dependent as specified in coverage choice does not match with the dependents available. Add or Inactivate dependent as applicable. |
| Dependent | Dependent information is not specified | This would occur if the Coverage choice specified is other than employee only and depended record is not entered. Add Dependent |
| Dependent Information | These missing information pertains to the Dependent Level information required in the Dependent Information Screen | |
| Date of Birth | Date of Birth is not specified | Fill in the Date of Birth in the Dependent General Info Screen |
| Gender | Gender is not specified | Choose the Gender in the Dependent General Info Screen |
| SSN | SSN is not specified | Fill in the SSN in the Dependent General Info Screen. If the dependent refuse to provide SSN then click auto generate SSN/Unique ID in the Dependent General Info Screen. Auto generation of SSN/Unique ID will be available only for the user with role as level II and above |
| Relationship | Relationship of the dependent with the employee not specified | Choose the dependent relationship from the Dependent Info Screen |
| Relationship - Child | Relationship, child is specified for child above 23 years of age | Verify if the child is disabled and choose if Disabled Permanent or Temporary. |
| Signature | Dependent signature is missing | This is required if the dependent age is above 18. Verify the signature for the dependent and check the checkbox Signature in the dependent info screen |
| Relationship | Number of spouse is more than one | Check for the relationship in the dependent info screen. There can only be one of the following relationship for the dependent:<br>Spouse or Ex - Spouse or domestic partner.<br>Choose different relationship for the other dependent in the dependent info screen or inactivate the other dependent |
| General Missing Information on All Level | This missing information pertains to the All Level of information. This may be due to non availability of sufficient master record to process enrollment or may require business decisions or administrative changes in the system to overcome this missing information | |
| Employee Record | Employee Record Does not exist | Probably the entries for the employees are not made. Add employees to satisfy this eligibility rule. |
| Group Size | Group Size cannot be less than 2 Employees | Probably the entries for the employees are not made or less that two employee records only exist in the system. Add at least 2 employees to satisfy this eligibility rule. |
| Group Size | Group Size cannot be greater than 50 Employees | Probably the entries for the employees are more than 50 records. This does not satisfy eligibility criteria rule for Small Employer Group. Group cannot be enrolled. |
| Participation Rule | Participation Rule is not satisfied | Participation rule states that 65% of the eligible employees need to enroll if the group size is >3 and 100% of the eligible employees need to enroll if the group size is <=3. Check if this is met with. If not then the group does not satisfy the eligibility rule. Group cannot be enrolled. Check this in Group Summary Screen. |
| Contribution Rule | Contribution Rule for Medical is not satisfied | The employer contribution for the Medical Line of Coverage is not satisfied. Check the Contribution Amount. Edit the Line of coverage and change the contribution Amount and update in the Group Coverage Info Screen. |
| Contribution Rule | Contribution Rule for Dental is not satisfied | The employer contribution for the Line of Coverage is not satisfied. Check the Contribution Amount. Edit the Line of coverage and change the contribution Amount and update in the Group Coverage Info Screen. |
| Contribution Rule | Contribution Rule for Vision is not satisfied | The employer contribution for the Line of Coverage is not satisfied. Check the Contribution Amount. Edit the Line of coverage and change the contribution Amount and update in the Group Coverage Info Screen. |
| Contribution Rule | Contribution Rule for CAM is not satisfied | The employer contribution for the Line of Coverage is not satisfied. Check the Contribution Amount. Edit the Line of coverage and change the contribution Amount and |

-continued

| Missing Entity | Message | Reasons/Remedy |
|---|---|---|
| | | update in the Group Coverage Info Screen. |
| Rate Availability | Rate is not available for the Plan opted by the Employee | This is possible if the Rates are not loaded for the Group's effective date of enrollment. Load the rates for the specific plan from the Carrier Maintenance - Rate Import utility. |
| Admin Fees | Admin Fees for the Small Employer Group is not specified | This is possible if the Admin Fees is not specified for the Group's Effective date. Add Admin fees from the Carrier Maintenance - Rate Administration |
| Agent Commission | Agent Commission for the Small Employer Group is not specified | This is possible if the Agent Commission is not specified for the Group's Effective date. Add Agent Commission from the Carrier Maintenance - Rate Administration |
| Rate Differential Factor | Rate Differential Factor for the Small Employer Group is not specified | This is possible if the Rate Differential Factor is not specified for the Group's Effective date. Add Rate Differential Factor from the Carrier Maintenance - Rate Administration |
| Plan availability | Medical Plan selected by the Employees not available in the service area. | Normally the Plan for the employee is listed based on the Plan available in the employees Service Area. Rare cases if the User Modifies the ZIP Code in the Employee General Info Screen and fails to update the Plan for the specific ZIP code, Service Area combination this message would be shown. Pick the plans that are available for the Employee in the Employee Coverage Info screen. |
| Plan availability | Dental Plan selected by the Employees not available in the service area. | Normally the Plan for the employee is listed based on the Plan available in the employees Service Area. Rare cases if the User Modifies the ZIP Code in the Employee General Info Screen and fails to update the Plan for the specific ZIP code, Service Area combination this message would be shown. Pick the plans that are available for the Employee in the Employee Coverage Info screen. |
| Plan availability | Vision Plan selected by the Employees not available in the service area. | Normally the Plan for the employee is listed based on the Plan available in the employees Service Area. Rare cases if the User Modifies the ZIP Code in the Employee General Info Screen and fails to update the Plan for the specific ZIP code, Service Area combination this message would be shown. Pick the plans |

-continued

| Missing Entity | Message | Reasons/Remedy |
|---|---|---|
| | | that are 'available for the Employee in the Employee Coverage Info screen. |
| Plan availability | CAM Plan selected by the Employees not available in the service area. | Normally the Plan for the employee is listed based on the Plan available in the employees Service Area. Rare cases if the User Modifies the ZIP Code in the Employee General Info Screen and fails to update the Plan for the specific ZIP code, Service Area combination this message would be shown. Pick the plans that are available for the Employee in the Employee Coverage Info screen. |

Step—15: On completing all the relevant information that is required for a successful enrollment of a group, the following is the sample screen for a successful enrollment of a group. (See FIG. C-28)

Create Group (Alternate Group—Individual Member)

The create group screen is to enter details of a group. The screen provides functionality to save, edit or add new group details.

The sequential steps involved in the creation of a new group by selecting group under alternate group are listed below.

Step—1: After successful logon, click the menu Enrollment and select New Business Enrollment. Then select the option Group Enrollment and Create Group. (See FIG. C-29)

Step—2: Screen displays with the option of selecting a group hierarchy. (See FIG. C-30)

Step—3: Screen navigates select an alternate group. Enter a 10-digit number or choose an association name. (See FIG. C-31)

Step—4: Choose the option of individual member and click Continue. (See FIG. C-32)

Step—5: Clicking continue button screen navigates to general info. Enter the values in the respective field, as per the format briefed in fields explanation section Field Explanation, and click Continue. (See FIG. C-33)

Field Explanation

The following table provides explanation for each button in the screen.

| Element | Description |
|---|---|
| Post Mark Date | Text for post mark date. Choose a date by clicking calendar icon. Accepts in the format MM/DD/YYYY |
| Received Date | Text for received date. Choose a date by clicking calendar icon. Accepts in the format MM/DD/YYYY |
| Employee Information | |
| Salutation | Choose the salutation from the drop down list of salutations available. |
| First Name | The text for first name. Accepts alphabets and special character like hyphen and single quotes not exceeding 25 characters. First name is mandatory. |
| Middle Initial | The text for middle initial. Accepts alphabets not exceeding 1 character. |

-continued

| Element | Description |
|---|---|
| Last Name | The text for contact name. Accepts alphabets and special character like hyphen and single quotes not exceeding 35 characters. Last name is mandatory |
| Suffix | Choose the suffix from the drop down list of suffixes available. |
| Date of Birth | The text for date of birth. Choose a date by clicking calendar icon |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| Address Information; Physical and Alternate Address- Note: Enter Alternate Address if different from the Physical Address. | |
| Street Address | The text for address. Accepts alphanumeric and special characters not exceeding 35 characters |
| Suite | The text for suite/apt # Accepts alphanumeric and special characters not exceeding 35 characters |
| Zip | The text for zip. Accepts numeric value of either 5 or 9 digits. City, State and County are populated automatically on entering the correct zip code and entering the tab key. |
| City | The text for city. Accepts alphabets and space between two words not exceeding 30 characters. |
| State | Choose the name of the state from the drop down list of States available in United States of America |
| County | Choose the name of the county from the drop down list of counties available for the ZIP Code entered. |
| Mode of Correspondence | Choose the mode of correspondence from the drop down list available. |
| Phone Number | The text for telephone number of the contact person. Accepts numeric values not exceeding 10 digits. The format is (999) 999-9999 |
| Extension | The text for extension number of the contact person. Accepts numeric values not exceeding 5 digits. |
| Fax | The text for fax number of the contact person Accepts numeric values not exceeding 10 digits. The format is (999) 999-9999 |
| Email | The text for email of the contact person. Accepts alphabets, numeric and special characters in the standard email format of length not exceeding 100 characters |

Button Functionality

The following table provides explanation for each button in the screen.

| Element | Description |
|---|---|
| Continue | Navigates to Billing Information screen. |
| Cancel | Clears the contents entered in the fields or restore to the previous state as was before saving the changes |
| Tabs | General Info, Billing Info, Agent Info, Coverage Info and Add Employees are the tabs visible on this screen. The navigation between tabs is possible only if there is a valid group ID generated and assigned to the group. Also while navigating through the tab the content that are changed on the screen are not saved unless explicitly saved by other operations on the screen. |

Step—6: Screen navigates to billing information. Enter the values in the respective fields, as per the format briefed in field's explanation section and click Continue. (See FIG. C-34)

Field Explanation

Refer field explanation provided for Small Employer Group—Billing Info.

Button Functionality

Refer button functionality provided for Small Employer Group—Billing Info

Step—7: Screen navigates to Agent Info screen. Agent/Agency ID is selected by clicking search icon. (See FIG. C-35)

Step—8: This pops up a screen to select agency id Enter value in any one of the field or simply click Search button to perform search operation. (See FIG. C-36)

Step—9: Click on agency id for selection. (See FIG. C-37)

Step—10: After filling other relevant information in agent info screen, as per the format briefed in field's explanation section and click Continue Field Explanation Refer field explanation provided for Small Employer Group—Agent Info.

Button Functionality

Refer button functionality provided for Small Employer Group—Agent Info.

Step—11: Screen navigates to coverage information. Enter the values in the respective fields, as per the format briefed in field's explanation section and click Continue. (See FIG. C-38)

Field Explanation

The following table provides explanation for each button in the screen.

| Element | Description |
|---|---|
| Hours worked per week | The text for worked hours per week. Accepts numeric values. |
| Date of hire | The text for date of employment. Choose a date by clicking calendar icon. Date accepts the format MM/DD/YYYY. |
| Employee type | Choose an employee type from the drop down list available |
| Pay Roll | Check box for Pay Roll verification. Check this if pay roll is verified. |
| RAF | Text to display the RAF applicable for the Individual Association Member. |
| Line of coverage | Choose a line of coverage from the drop down list available |
| Medical waived | Click the check box for medical waive if the employee is waiving medical. |
| Carrier selection (Benefit level) | Choose a carrier selection from the drop down list available |
| Coverage choice | Choose a coverage from the drop down list available |
| PCP ID/Medical group ID | The text for PCP ID. Accepts alphabets and numeric values not exceeding 10 characters. |
| Are you an existing patient | Click the check box if you are an existing patient |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Prior plan type | Choose a plan type from the drop down list available |
| Prior plan name | Choose a plan name from the drop down list available |
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Other coverage kept | The text for other coverage. Accepts alphabets with values not exceeding 50 characters. |
| Employee signature | Click the check box, to have employee signature |
| Additional coverage | The text for any additional coverage. Accepts alphabets with values not exceeding 50 characters. |
| Date signed | The text for date signed. Choose a date by clicking calendar icon. Date accepts the format MM/DD/YYYY. Date cannot accept future date. |

Button Functionality

The following table provides explanation for each button in the screen.

| Element | Description |
|---|---|
| Add | Add the contents of employee coverage information. It is only a temporary addition. Becomes permanent only on saving. |
| Edit | Edit button will allow for editing a specific record in the table. |
| Update | Update the contents of Plan Information. It is only a temporary update. Becomes permanent only on saving. |
| Cancel | Cancels the operation that was currently performed prior to saving the record. |
| Delete | Delete button will delete the records in the table checked for deletion. It is only a temporary deletion. Becomes permanent only on saving. |
| Check All | The "Check All" Link will check all the records in the table |
| Clear All | The "Clear All" Link will uncheck all the records in the table that are checked. |
| Enrollment Summary | Click enrollment summary refreshes the screen and display the summary of information entered for group creation |
| Missing Information | Click missing information refreshes the screen and displays the missed information. For a successful creation of a group, there should be no missing information |
| Group ID | Click Group ID to navigates to the Group's general info screen. |
| Continue | Saves the data and navigates to Coverage Information screen. . |
| Cancel | Clears the contents entered in the fields or restore to the previous state as was before saving the changes |
| Tab | General Info, Billing Info, Agent Info, Coverage Info and Add Employees are the tabs visible on this screen.The navigation between tabs is possible only if there is a valid group ID generated and assigned to the group. Also while navigating through the tab the content that are changed on the screen are not saved unless explicitly saved by other operations on the screen |

Step—12: Screen navigates to add dependent information. First name and last name fields are mandatory and other fields are optional. Enter the values in the respective fields, as per the format briefed in field's explanation section and click Continue. (See FIG. C-39)

Field Explanation

Refer field explanation provided for Small Employer Group—Add Dependent.

Button Functionality

The following table provides explanation for each button in the screen.

| Element | Description |
|---|---|
| Add Dependent | Saves the data and navigates to the screen for adding dependent |
| Enrollment Summary | Click enrollment summary refreshes the screen and display the summary of information entered for group creation |
| Missing Information | Click missing information refreshes the screen and displays the missed information. For a successful creation of a group, there should be no missing information |
| Cancel | Clears the contents entered in the fields or restore to the previous state as was before saving the changes |
| Tabs | General Info, Coverage Info, Add Dependent are the tabs visible on this screen. The navigation between the tabs are possible only if there is a valid Employee ID generated and assigned to the employee Also while navigating through the tab the content that are changed on the screen are not saved unless explicitly saved by other operations on the screen |

Step—13: Clicking enrollment summary button screen navigates to enrollment summary. This screen shows the overall information that are entered will be shown. (See FIG. C-40)

Field Explanation

The following table provides explanation for each element in the screen.

| Element | Description |
|---|---|
| Group Information Header | Contains header information of the Group |
| Name of the Group | Text for the Name of the Group |
| Group ID | Text and Link for the Group ID to navigate to the Group General Info screen |
| Group Type | Specifies the Type of the Group like Small Employer Group |
| Proposed Effective Date | The text for Proposed Effective Date. Choose a date by clicking calendar icon. Date accepts the format MM/DD/YYYY. Default effective date is first of the following month. Effective date cannot be past date |
| Status | Text to specify the status of the group. |
| Work Group | Text for Work Group. This specifies the internal work group attached to the Group. Internal is based on the writing agent's work group. |
| Association ID | Text to specify the Association ID |
| Association Name | Text to specify the Association Name |
| Enrollment Summary Information | Enrollment Summary Information is broken down into tree structure. The tree can by expanded or collapsed. The level of the tree is as per the example given below:<br>– Employee<br>– Dependent<br>– Dependent<br>+ Dependent<br>Where (–) signifies expanded view and (+) signifies collapsed view. |
| Employee ID | Text for Employee ID |
| Employee SSN | Text for Employee SSN |
| Employee Name | Text for employee Name (First Name and Last Name) |
| Effective Date | Text for Employee Effective date. Choose a date by clicking calendar icon. Date accepts the format MM/DD/YYYY. Defaults effective date of the Group. Effective date cannot be past date |
| Status | Text to specify the status of the employee. |
| Dependent ID | Text for Dependent ID |
| Dependent SSN | Text for Dependent SSN |
| Dependent Name | Text for Dependent Name (First Name and Last Name) |
| Effective Date | Text for Dependent Effective date. Choose a date by clicking calendar icon. Date accepts the format MM/DD/YYYY. Defaults effective date of the Employee. Effective date cannot be past date |
| Status | Text to specify the status of the Dependent. |

Button Functionality

The following table provides explanation for each button in the screen.

| Element | Description |
|---|---|
| Missing Information | Click missing information refreshes the screen and displays the missed information. For a successful creation of a group, there should be no missing information |
| Cancel | Clears the contents entered in the fields or restore to the previous state as was before saving the changes |
| Group ID | Click Group ID to navigates to the Group's general info screen. |

Step—14: Clicking pre enrollment navigates to missing info screen. It gives the information that is left out while entering input for creating a group. For a successful creation of a group the missing information should be empty. (See FIG. C-41)

Field Explanation

The following table provides explanation for each element in the screen.

| Element | Description |
|---|---|
| Group Information Header | Contains header information of the Group |
| Name of the Group | Text for the Name of the Group |
| Group ID | Text and Link for the Group ID to navigate to the Group General Info screen |
| Group Type | Specifies the Type of the Group like Small Employer Group |
| Proposed Effective Date | The text for Proposed Effective Date. Choose a date by clicking calendar icon. Date accepts the format MM/DD/YYYY. Default effective date is first of the following month. Effective date cannot be past date |
| Status | Text to specify the status of the group. |
| Work Group | Text for Work Group. This specifies the internal work group attached to the Group. Internal is based on the writing agent's work group. |
| Association ID | Text to specify the Association ID |
| Association Name | Text to specify the Association Name |
| Tree Structure | Enrollment Missing Information is broken down into tree structure. The tree can by expanded or collapsed. The level of the tree is as per the example given below:<br>– Employee<br>  – Dependent<br>  – Dependent<br>Where (–) signifies expanded view and (+) signifies collapsed view. |
| Group Missing Info | This identifies all the eligibility rules and the information that are incomplete on Group level for completing the enrollment process. |
| Missing Entities | List the missing entities for the group. Provides a link to go to the respective screen to fill in the relevant information to complete all the required entries. |
| Message | List the message against each missing entities. |
| Employee Missing Info | This identifies all the eligibility rules and the information that are incomplete on Employee level for completing the enrollment process. |
| Missing Entities | List the missing entities for the employee. Provides a link to go to the respective screen to fill in the relevant information to complete all the required entries. |
| Message | List the message against each missing entities. |
| Dependent Missing Info | This identifies all the eligibility rules and the information that are incomplete on dependent level for completing the enrollment process. |
| Missing Entities | List the missing entities for the dependent. Provides a link to go to the respective screen to fill in the relevant information to complete all the required entries. |
| Message | List the message against each missing entities. |
| Enrollment Action | Choose from the drop down list the action to be performed for enrollment. Enroll/Decline |
| Remarks | Text for remarks if any. |
| Reasons for Decline | Choose from the drop down list the reasons for decline. |
| Reasons for Other | Text for other reason. If the reason for decline is other enter the reasons here. |

Button Functionality

The following table provides explanation for each button in the screen.

| Element | Description |
|---|---|
| Enroll | Saves the data if there are no missing information and navigates to enrollment confirmation page. |
| Cancel | Clears the contents entered in the fields or restore to the previous state as was before saving the changes |
| Group ID | Click Group ID to navigates to the Group's general info screen. |

Missing Information

The following table provides explanation for each missing information and what needs to be done to remove missing information from the screen

| Missing Entity | Message | Reasons/Remedy |
|---|---|---|
| | Member Level | |
| Employee General Information | These missing information pertains to the Member Level information required in the General Information Screen | |
| Address | Address information is not specified | Fill in the address information in the Employee General Info Screen |
| City | City is not specified | Fill in the City in the Employee General Info Screen |
| State | State is not specified | Fill in the City in the Employee General Info Screen |
| ZIP Code | ZIP Code is not specified | Fill in the ZIP Code in the Employee General Info Screen |
| Date of Birth | Date of Birth is not specified | Fill in the Date of Birth in the Employee General Info Screen |
| Gender | Gender is not specified | Choose the Gender in the Employee General Info Screen |
| SSN | SSN is not specified | Fill in the SSN in the Employee General Info Screen. If the employee refuse to provide SSN then click auto generate SSN/Unique ID in the Employee General Info Screen. Auto generation of SSN/Unique ID will be available only for the user with role as level II and above |
| Mode of Corre-spondence | Mode of Correspondence is not specified | Choose the Mode of Correspondence for Employee from the list in Employee general info screen |
| Email | Email for Employee is not specified | This is required if the mode of correspondence selected is Email. Fill in the Email in the Employee general info screen |
| Billing Information | These missing information pertains to the Member Level information required in the Billing Information Screen | |
| Mode of payment | Mode of payment is not specified | Choose the Mode of Payment for the group from the list in Group Billing Info Screen |
| Check Number | Check Number is not specified. | Fill in the Check number in the Group Billing Info Screen |
| Check Date | Date Check is received is not specified | Fill in the Date received in the Group Billing Info Screen |

-continued

| Missing Entity | Message | Reasons/Remedy |
|---|---|---|
| Check Number | Check Number is received is not specified | Fill in the Check Number in the Group Billing Info Screen |
| Initial Payment | Initial payment not received | If initial payment check is received then uncheck the box "No Check Received" in the Group Billing Info Screen |
| Initial Payment | Initial Payment is not sufficient to get enrolled | If initial payment check is received but there is a shortfall in the amount this message would be shown. Check the short fall by previewing the invoice with the amount received. The variation in amount received by more than (-) $2 will allow user with level II and above only to enroll. The variation in amount received by more than (-) $50 will allowing user with level III and above only to enroll The variation in amount received by more than (-) $100 will allow user with level IV and above only to enroll |
| Cardholder's Name | Cardholder's name is not specified | This is required if the mode of payment opted by group is Credit Card. Fill in the Cardholder's name in the Group Billing Info Screen. |
| Credit Card Type | Credit Card Type is not specified. | This is required if the mode of payment opted by group is Credit Card Choose the Credit Card Type for the group from the list in Group Billing Info Screen |
| Credit Card Number | Credit Card Number is not specified | This is required if the mode of payment opted by group is Credit Card. Fill in the Credit Card Number in the Group Billing Info Screen. |
| Expiration Date | Credit Card Expiration Date is not specified | This is required if the mode of payment opted by group is Credit Card. Fill in the Credit Card Expiration Date in the Group Billing Info Screen. |
| Bank Name | Bank name is not specified | This is required if the mode of payment opted by group is EFT. Fill in the Bank Name in the Group Billing Info Screen. |
| Routing Number | Routing Number is not specified | This is required if the mode of payment opted by group is EFT. Fill in the Routing Number in the Group Billing Info Screen. |
| Account Type | Account Type is not specified | This is required if the mode of payment opted by group is EFT. Fill in the Account Type in the Group Billing Info Screen |
| Depositor's Name | Depositor's Name is not specified | This is required if the mode of payment opted by group is EFT. Fill in the Depositor's Name in the Group Billing Info Screen |

-continued

| Missing Entity | Message | Reasons/Remedy |
|---|---|---|
| Agent Information | These missing information pertains to the Member Level information required in the Agent Information Screen | |
| Writing Agent | Writing Agent is not specified | Choose the Writing Agent for the Group in the Group Agent Info Screen |
| Agent of Record | Agent of Record is not specified | This is required if commission for the agent exists. Choose the Agent of Record for the Group in the Group Agent Info Screen |
| Agent License Number | Agent License Number is not specified | Go to Agent/Agency Master Screen, search for the agent/agency attached with group and fill in the License information. |
| License Expiry Date | License Expiry Date is not specified | Go to Agent/Agency Master Screen, search for the agent/agency attached with group and fill in the License information. |
| License Expiry Date | Agent License Number is expired | Go to Agent/Agency Master Screen, search for the agent/agency attached with group and modify the license expiry date. |
| Commission | % Commission is split is not specified | Check if the commission split for the agent of record exists. If not edit the corresponding agent of record and enter % commission split for the Agent of Record in the Group Agent Info Screen |
| Total Commission Split | % Split in commission is less than 100% | Check if the total of the commission split's for the agent of record is 100. If not edit the corresponding agent of record and make changes to make commission split total to 100% in the Group Agent Info Screen |
| Coverage Information | These missing information pertains to the Member Level information required in the Coverage Information Screen | |
| Hours Worked | Hours worked per week not specified | Fill in the Hours worked per week in the Employee Coverage Info Screen |
| Date of Employment | Date of employment not specified | Fill in the Date of Employment in the Employee Coverage Info Screen |
| Employee Signature | Employee signature is missing | Verify employee's signature and check Employee Signature checkbox in the Employee Coverage Info Screen |
| Date Signed | Date Signed is missing | Verify Date signed and fill in the Date Signed in the Employee Coverage Info Screen |
| Employee Type | Employee Type not specified | Choose the Employee Type for Employee Type from list in Employee Coverage info screen |
| Employee Coverage | Employee's Line of Coverage not specified | Choose the Line of Coverage for the Employee in Employee Coverage info screen |
| Medical Coverage | Medical Line of Coverage not specified | Choose the Line of Coverage for the Employee in Employee Coverage info screen. If |

-continued

| Missing Entity | Message | Reasons/Remedy |
|---|---|---|
| | | the employee waives medical coverage check the checkbox Medical Waived. |
| Dental Coverage | Dental Line of Coverage not specified | This is required if the Association offers optional benefits. Choose the Line of Coverage for the Employee in Employee Coverage info screen |
| Vision Coverage | Vision Line of Coverage not specified | This is required if the Association offers optional benefits. Choose the Line of Coverage for the Employee in Employee Coverage info screen |
| CAM Coverage | CAM Line of Coverage not specified | This is required if the Association offers optional benefits. Choose the Line of Coverage for the Employee in Employee Coverage info screen |
| Coverage Choice | Coverage Choice between the Line of Coverage differs | Choose the appropriate coverage choices as per the illustration provided in the column below and edit the coverage choice for the specific Line of Coverage and update in Employee Coverage info screen. Or In dependent Info Screen waive the Optional coverage choice for dependent under 2 by checking the check box Waive. |
| Coverage Choice Illustration | Coverage choice for the Medical should have highest precedence. There are Four Coverage Choices<br>1- Employee Family<br>2 - Employee Child<br>3- Employee Spouse<br>4 - Employee Only<br>Case 1:<br>If coverage choice for medical is Employee Child, Optional benefit cannot have employee spouse. It should be Employee Child or Employee Only provided child is under 2<br>Case 2:<br>If Coverage Choice for Medical is Employee Spouse optional benefits cannot have employee child. It should also be Employee Spouse<br>Case 3:<br>If Coverage Choice for Medical is Employee Child optional benefits cannot have employee only if at least one child his above 2. It should also be Employee child | |
| Dependent Count | Number of Dependents is not sufficient to satisfy Coverage Choice. | This would be the case when the dependent information is not entered into the system. Add Dependent.<br>This can also occur if the number of dependent as specified in coverage choice does not match with the dependents available. Add Dependent. |
| Dependent | Dependent information is not specified | This would occur if the Coverage choice specified is other than employee and depended record is not entered. Add Dependent |
| 1099's | 1099 not provided for verification | Manually verify 1099 for the employee and check the 1099's Flag in the . Enrollment summary for the specific employee. |

-continued

| Missing Entity | Message | Reasons/Remedy |
|---|---|---|
| DE6 | DE6 not provided for verification | Manually verify DE6 for the employee and check the DE6 Flag in the Enrollment summary for the specific employee. |
| Dependent Information | These missing information pertains to the Dependent Level information required in the Dependent Information Screen | |
| Date of Birth | Date of Birth is not specified | Fill in the Date of Birth in the Dependent General Info Screen |
| Gender | Gender is not specified | Choose the Gender in the Dependent General Info Screen |
| SSN | SSN is not specified | Fill in the SSN in the Dependent General Info Screen. If the dependent refuse to provide SSN then click auto generate SSN/Unique ID in the Dependent General Info Screen. Auto generation of SSN/Unique ID will be available only for the user with role as level II and above |
| Relationship | Relationship of the dependent with the employee not specified | Choose the dependent relationship from the Dependent Info Screen |
| Relationship - Child | Relationship, child is specified for child above 23 years of age | Verify if the child is disabled and choose if Disabled Permanent or Temporary. |
| Signature | Dependent signature is missing | This is required if the dependent age is above 18. Verify the signature for the dependent and check the checkbox Signature in the dependent info screen |
| Relationship | Number of spouse is more than one | Check for the relationship in the dependent info screen. There can only be one of the following relationship for the dependent:<br>Spouse or Ex - Spouse or domestic partner.<br>Choose different relationship for the other dependent in the dependent info screen |
| General Missing Information on All Level | These are missing information pertains to the all level of information. This may be due to non availability of sufficient master record to process enrollment or may require business decisions or administrative changes in the system to overcome this missing information | |
| Employee Record | Employee Record Does not exist | Probably the entries for the employees are not made. Add employees to satisfy this eligibility rule. |
| Rate Availability | Rate is not available for the Plan opted by the Employee | This is possible if the Rates are not loaded for the Individual Member's effective date of enrollment. Load the rates for the specific plan from the Carrier Maintenance - Rate Import utility. |
| Admin Fees | Admin Fees for the Small Employer Group is not specified | This is possible if the Admin Fees is not specified for the Individual Member's Effective date. Add Admin fees from the Carrier |

-continued

| Missing Entity | Message | Reasons/Remedy |
|---|---|---|
| | | Maintenance - Rate Administration |
| Agent Commission | Agent Commission for the Small Employer Group is not specified | This is possible if the Agent Commission is not specified for the Individual Member's Effective date. Add Agent Commission from the Carrier Maintenance - Rate Administration |
| Rate Differential Factor | Rate Differential Factor for the Small Employer Group is not specified | This is possible if the Rate Differential Factor is not specified for the Agent Commission Effective date. Add Rate Differential Factor from the Carrier Maintenance - Rate Administration |
| Plan availability | Medical Plan selected by the Employees not available in the service area. | Normally the Plan for the employee is listed based on the Plan available in the employees Service Area. Rare cases if the User Modifies the ZIP Code in the Employee General Info Screen and fails to update the Plan for the specific ZIP code, Service Area combination this message would be shown. Pick the plans that are available for the Employee in the Employee Coverage Info screen. |
| Plan availability | Dental Plan selected by the Employees not available in the service area. | Normally the Plan for the employee is listed based on the Plan available in the employees Service Area. Rare cases if the User Modifies the ZIP Code in the Employee General Info Screen and fails to update the Plan for the specific ZIP code, Service Area combination this message would be shown. Pick the plans that are available for the Employee in the Employee Coverage Info screen. |
| Plan availability | Vision Plan selected by the Employees not available in the service area. | Normally the Plan for the employee is listed based on the Plan available in the employees Service Area. Rare cases if the User Modifies the ZIP Code in the Employee General Info Screen and fails to update the Plan for the specific ZIP code, Service Area combination this message would be shown. Pick the plans that are available for the Employee in the Employee Coverage Info screen. |
| Plan availability | CAM Plan selected by the Employees not available in the service area. | Normally the Plan for the employee is listed based on the Plan available in the employees Service Area. Rare cases if the User Modifies the ZIP Code in the Employee General Info Screen and fails to update the Plan for the specific ZIP code, Service Area combination this message would be shown. Pick the plans that are available for the Employee in the Employee Coverage Info screen. |

Step—15: On completing all the relevant information that is required for a successful enrollment of a group, the following is the sample screen for a successful enrollment of an individual association member. (See FIG. C-42)

Create Group (Alternate Group—Small Employer Group)

The create group screen is to enter details of a group The screen provides functionality to save, edit or add new group details.

There are three different ways of creation, namely creating a group, through small employer group, alternate group that has again two methods namely individual member and group.

The sequential steps involved in the creation of a new group by selecting group under alternate group are listed below.

Step—1: After successful logon, click the menu Enrollment and select New Business Enrollment. Then select the option Group Enrollment and Create Group. (See FIG. C-43)

Step—2: Screen displays with the option of selecting a group hierarchy. (See FIG. C-44)

Step—3: Screen navigates select an alternate group. Enter a 10 digit number or choose an association. (See FIG. C-45)

Step—4: Choose the option of group and click Continue. (See FIG. C-46)

Step—5: Clicking continue button screen navigates to general info. Enter the values in the respective field, as per the format briefed in fields explanation section Field Explanation, and click Continue. (See FIG. C-47)

Field Explanation

Refer field explanation provided for Small Employer Group—General Info.

Button Functionality

Refer button functionality provided for Small Employer Group—General Info.

Step—6: Screen navigates to billing information. Enter the values in the respective fields, as per the format briefed in field's explanation section and click Continue. (See FIG. C-48)

Field Explanation

Refer field explanation provided for Small Employer Group—Billing Info.

Button Functionality

Refer button functionality provided for Small Employer Group—Billing Info.

Step—7: Screen navigates to Agent Info screen. Agent/Agency ID is selected by clicking search icon. (See FIG. C-49)

Step—8: This pops up a screen to select agency id Enter the first letter of agent name or first digit of agent id to perform search operation. (See FIG. C-50)

Step—9: Click on agency id for selection. (See FIG. C-51)

Step—10: After filling other relevant information in agent info screen, as per the format briefed in field's explanation section and click Continue Field Explanation Refer field explanation provided for Small Employer Group—Agent Info.

Button Functionality

Refer button functionality provided for Small Employer Group—Agent Info.

Step—11: Screen navigates to coverage information. Even though the fields are optional, enter the values in the respective fields, as per the format briefed in field's explanation section and click Continue. (See FIG. C-52)

Field Explanation

Refer field explanation provided for Small Employer Group—Coverage Info.

Button Functionality

Refer button functionality provided for Small Employer Group—Coverage Info.

Step—12: Screen navigates to add employee general information. First and Last name are mandatory other fields are optional. Enter the values in the respective fields, as per the format briefed in field's explanation section. (See FIG. C-53)

Field Explanation

Refer field explanation provided for Small Employer Group—Add Employee General Info.

Button Functionality

Refer button functionality provided for Small Employer Group—Add Employee General Info.

Step—13: Screen navigates to coverage information. Even though the fields are optional, enter the values in the respective fields, as per the format briefed in field's explanation section and click Continue. (See FIG. C-54)

Field Explanation

Refer field explanation provided for Small Employer Group—Add Employee Coverage Info.

Button Functionality

Refer button functionality provided for Small Employer Group—Add Employee Coverage Info.

Step—14: Screen navigates to add dependent information. Enter the values in the respective fields, as per the format briefed in field's explanation section and click anyone of the button shown for subsequent operation. (See FIG. C-55)

Field Explanation

Refer field explanation provided for Small Employer Group—Add Dependent

Button Functionality

Refer button functionality provided for Small Employer Group—Add Employee Add Dependent.

Step—15: Clicking enrollment summary button screen navigates to enrollment summary. This screen shows the overall information that is entered. Enter the values in the respective fields, as per the format briefed in field's explanation section and click Pre Enrollment button for checking the eligibility criteria for the Group and Members. (See FIG. C-56)

Field Explanation

Refer field explanation provided for Small Employer Group—Enrollment Summary.

Button Functionality

Refer button functionality provided for Small Employer Group—Enrollment Summary.

Step—16: Clicking pre enrollment navigates to missing info screen. Missing information screen provide information on the data that is required to complete an enrollment process. This also checks for the eligibility of the group and member for enrolling into PacAdvantage Program. For a successful creation of a group the missing information should be empty. The user role and authority can overrule certain missing information.

Enter the values in the respective fields, as per the format briefed in field's explanation section and click Enroll button for enrolling the Group and Members. (See FIG. C-57)

Field Explanation

Refer field explanation provided for Small Employer Group—Enrollment Missing Info Button Functionality Refer button functionality provided for Small Employer Group—Enrollment Missing Info Missing Information Refer missing information provided for Small Employer Group—Missing Information Step—17: On completing all the relevant information that is required for a successful enrollment of a group, the following is the sample screen for a successful enrollment of a group. (See FIG. C-58)

Modify Group (Small Employer Group)

The modify group screen is to modify details of a group for the existing groups. The screen provides functionality to save, edit or add new group details.

The sequential steps involved in the modify group are listed below.

Step—1: After successful logon, click the menu Enrollment and select New Business Enrollment. Then select the option Group Enrollment and Modify Group. (See FIG. C-59)

Step—2: Navigates to search screen. Enter value in any one of the field or simply click search button to perform search operation. (See FIG. C-60)

Step—3: This pop ups a screen with the search result. (See FIG. C-61)

Step—4: Click on any group id for selection This navigates to general information of the group. The process of modification is similar to the process of flow as explained in Creation of Group. Refer Section Create Group (Small Employer Group)

Inactivate Group

The inactivate group screen is to make a group from activate state to inactivate.

The sequential steps involved in the inactivate group are listed below.

Step—1: After successful logon, click the menu Enrollment and select New Business Enrollment. Then select the option Group Enrollment and Inactivate Group. (See FIG. C-62)

Step—2: Navigates to search screen. Enter value in any one of the fields or simply click search button to perform search operation. (See FIG. C-63)

Step—3: This pop ups a screen with the search result. (See FIG. C-64)

Step—4: Click on any group id for selection. This navigates to a screen confirming for the selected group to make inactivate. Click Inactivate button. (See FIG. C-65)

Step—5: Confirms the status Click Search to navigate back to Group Search screen. (See FIG. C-66)

Create Employee

The create employee screen is to enter details of a employee The screen provides functionality to save, edit or add new employee details.

The sequential steps involved in the creation of an employee are listed below.

Step—1: After successful logon, click the menu Enrollment and select New Business Enrollment. Then select the option Employee Enrollment and Create Employee. (See FIG. C-67)

Step—2: This navigates to group search screen, to create an employee for an employer Enter value in any one of the fields, or simply click search button to perform search operation. (See FIG. C-68)

Step—3: This pops up a screen with the search result. (See FIG. C-69)

Step—4: Click on any employer/group id for selection.

Step—5: This navigates to general information screen pertaining to an employee. The process of creating an employee is similar to the process explained for Small Employer Group Modify Employee The modify employee screen is to modify details of a employee The screen provides functionality to save, edit or add new employee details.

The sequential steps involved for modifying an employee are listed below.

Step—1: After successful logon, click the menu Enrollment and select New Business Enrollment. Then select the option Employee Enrollment and Modify Employee. (See FIG. C-70)

Step—2: This navigates to employee search screen. (See FIG. C-71)

Step—3: Enter value in any one of the fields or simply click search button to perform search operation. Navigates to Search result screen. (See FIG. C-72)

Step—4: Click on any employee id for selection

Step—5: This displays General Info screen of an employee with contents ready for any modification. The procedure and flow of modification are similar to the procedures explained for Small Employer Group Inactivate Employee The inactivate employee screen is to make a employee from activate state to inactivate.

The sequential steps involved in the inactivate employee are listed below.

Step—1: After successful logon, click the menu Enrollment and select New Business Enrollment. Then select the option Employee Enrollment and Inactivate Employee. (See FIG. C-73)

Step—2: Navigates to search screen for employees. Either enters the id or first letter of employee name to perform search. Click search button. (See FIG. C-74)

Step—3: This pop ups a screen with the search result. (See FIG. C-75*a*)

Step—4: Click on any employee id for selection. This navigates to a screen confirming for the selected employee to make inactivate. Click Inactivate button. (See FIG. C-75*b*)

Step—5: Confirms the status Click Search to navigate back to Employee search screen. (See FIG. C-76)

Create Dependent

The create dependent screen is to enter details of a employee The screen provides functionality to save, edit or add new dependent details.

The sequential steps involved in the creation of an dependent are listed below.

Step—1: After successful logon, click the menu Enrollment and select New Business Enrollment. Then select the option Dependent Enrollment and Create Dependent. (See FIG. C-77)

Step—2: Navigates to search screen for employees. Either enters the id or first letter of employee name to perform search operation. Click search button. (See FIG. C-78)

Step—3: This pops up a screen with the search result. (See FIG. C-79)

Step—4: Click on any employee id for selection

Step—5: This navigates to add dependent screen pertaining to an employee. The process of creating a dependent is similar to the process explained for Small Employer Group Modify Dependent The modify dependent screen is to modify details of a dependent.

The screen provides functionality to save, edit or add new dependent details.

The sequential steps involved in the modify dependent are listed below.

Step—1: After successful logon, click the menu Enrollment and select New Business Enrollment. Then select the option Dependent Enrollment and Modify Dependent. (See FIG. C-80)

Step—2: This navigates to dependent search screen. (See FIG. C-81)

Step—3: Enter value in any one of the fields or simply click search button to perform search operation. (See FIG. C-82)

Step—4: Click on any dependent id for selection

Step—5: This displays a screen with contents ready for any modification. The procedure and flow of modification are similar to the procedures explained for Small Employer Group Inactivate Dependent The inactivate dependent screen is to make a employee from activate state to inactivate.

The sequential steps involved in the inactivate dependent are listed below.

Step—1: After successful logon, click the menu Enrollment and select New Business Enrollment. Then select the option Dependent Enrollment and Inactivate Dependent. (See FIG. C-83)

Step—2: This navigates to dependent search screen. (See FIG. C-84)

Step—3: This pop ups a screen with the search result. (See FIG. C-85)

Step—4: Click on any dependent id for selection. This navigates to a screen confirming for the selected employee to make inactivate. Click Inactivate button. (See FIG. C-86)

Step—5: Confirms the status Click search button navigates to Dependent search screen. (See FIG. C-87)

Modify Individual Member

The screen is to have modification of details pertaining to an individual member. The screen provides functionality to save, edit or add new individual member details.

The sequential steps involved in modify individual member are listed below.

Step—1: After successful logon, click the menu Enrollment and select New Business Enrollment. Select the option Individual Member. Then Select Individual member and modify individual member. (See FIG. C-88)

Step—2: Navigates to search screen individual employee. Either enters the id or first letter of employee name to perform search operation. Click search button. (See FIG. C-89)

Step—3: This pops up a screen with the search result. (See FIG. C-90)

Step—4: Click on any employee id for selection

Step—5: This navigates to general information pertaining to individual employee screen. The process of modifying individual member is similar to the process explained for Individual Member.

Inactivate Individual Member

The screen is to inactivate individual member from active state.

The sequential steps involved in inactivate individual member are listed below.

Step—1: After successful logon, click the menu Enrollment and select New Business Enrollment. Select the option Individual Member. Then Select Individual member and inactivate individual member. (See FIG. C-91)

Step—2: Navigates to search screen individual employee. Enter value in any one of the fields or simply click search button to perform search operation.

Step—3: This pops up a screen with the search result. (See FIG. C-92)

Step—4: Click on any employee id for selection. This navigates to a screen confirming for the selected employee to make inactivate. Click Inactivate button. (See FIG. C-93)

Step—5: Confirms the status. Click search to navigate back to Group search screen. (See FIG. C-94)

Create Dependent

The screen is to create a dependent for an individual employee member.

The sequential steps involved in creating a dependent for an individual member are listed below.

Step—1: After successful logon, click the menu Enrollment and select New Business Enrollment. Select the option Individual Member. Then Select Individual member dependent and create dependent. (See FIG. C-95)

Step—2: Navigates to search screen individual employee. Enter value in any one of the field. (See FIG. C-96)

Step—3: This pops up a screen with the search result. (See FIG. C-97)

Step—4: Click on any employee id for selection. This navigates to add dependent screen. The process of creating a dependent is similar to the process explained for Individual Member creating a group by alternate with option.

Modify Dependent

The screen is to create a dependent for an individual member.

The sequential steps involved in creating a dependent for an individual member are listed below.

Step—1: After successful logon, click the menu Enrollment and select New Business Enrollment. Select the option Individual Member. Then Select Individual member dependent and modify dependent. (See FIG. C-98)

Step—2: Navigates to search screen individual dependent. Either enters the id or first letter of employee name to perform search operation. Click search button. (See FIG. C-99)

Step—3: This pops up a screen with the search result. (See FIG. C-100)

Step—4: Click on any dependent id for selection. This navigates to add dependent screen. The process of creating a dependent is similar to the process explained for Individual Member creating a group by alternate with option Inactivate Dependent The screen is to inactivate a dependent for an individual member.

The sequential steps involved in creating a dependent for an individual member are listed below.

Step—1: After successful logon, click the menu Enrollment and select New Business Enrollment. Select the option Individual Member. Then Select Individual member dependent and inactivate dependent. (See FIG. C-101)

Step—2: Navigates to search screen individual dependent. Either enters the id or first letter of employee name to perform search operation. Click search button. (See FIG. C-102)

Step—3: This pops up a screen with the search result. (See FIG. C-103)

Step—4: Click on any employee id for selection. This navigates to a screen confirming for the selected employee to make inactivate. Click Inactivate button. (See FIG. C-104)

Step—5: Confirms the status of inactivation. Click search button to navigate back to dependent search. (See FIG. C-105)

4 COBRA Enrollment

Access

The application can be accessed from the main menu as follows:

Enrollment→COBRA Enrollment→New COBRA to Existing COBRA

Pre-Requisites

All master records must be available in the system for a successful enrollment. Master Records are as follows:

Carrier Maintenance—Refer "User Manual for Carrier Maintenance" for further information on the master records.

Work Group—Refer "User Manual for Sales and Marketing" for further information on the Work Group records.

Internal Associates—Refer "User Manual for Sales and Marketing" for further information on the Internal Associates records.

Association Master—Refer Section 2 of this document on "Association".

Eligibility Criteria (New Business COBRA)—members must satisfy eligibility rule for COBRA.

Member for existing COBRA Enrollment must be in termed status.

Application Functions

This application can be sub divided into following major functions:

New COBRA Enrollment—New COBRA Enrollment for the Group who bring in their existing COBRA members into the PacAdvantage consist of the following operations:

- Create New COBRA—to input details of a COBRA members is for a specific group.
- Modify New COBRA—to search a COBRA prior to enrollment for making modifications.
- Inactivate New COBRA—to search a COBRA prior to enrollment for making inactive.

Existing COBRA Enrollment—Existing COBRA Enrollment is for those employee and or dependents that have terminated from the existing group due to various reasons. This consist of the following operations:

- Create Existing COBRA—to input details of a COBRA members for a specific group wherein the members are terminated.

Modify Existing COBRA—to search a COBRA Group of the termed members for making modifications prior to enrollment.

Inactivate Existing COBRA—to search a COBRA Group of the termed members for inactivating prior to enrollment.

Create COBRA (New Business)

The screen is to create new COBRA. The screen provides functionality to save, edit or add new COBRA.

The sequential steps involved in create new COBRA are listed below.

Step—1: After successful logon, click the menu Enrollment and select COBRA Enrollment. Select the New COBRA and then select Create COBRA. (See FIG. C-106)

Step—2: The screen navigates to group search for adding COBRA. Enter value in any one of the fields, or simply click Search to perform search operation. (See FIG. C-107)

Step—3: The screen displays the search result. (See FIG. C-108)

Step—4: Choose a group id.

Step—5: Choose the option of enrolling as single or member with dependents. If the option is with dependents, enter number of dependents.

Step—6: Click continue button

Step—7: Screen navigates to general info for new business COBRA group. First name and last name are mandatory and other fields are optional. Enter the values in the respective field as per the format briefed in field's explanation section. Click continue button. (See FIG. C-109)

Field Explanation

The following table provides explanation for each button in the screen.

| Element | Description |
|---|---|
| Parent Group ID | Text to display the Parent Group ID. |
| Parent Group Name | Text to display the Parent Group Name. |
| COBRA Group ID | Text to display the COBRA Group ID. |
| COBRA Type | Text to display the COBRA Group Type whether Cal COBRA or Federal COBRA. |
| Group Effective Date | Text to display effective date of the parent group. |
| Work Group | Text to Display the internal Work group associated with the Parent Group |
| Status | Text to display status of the group. |
| Post Mark Date | Text for post mark date. Choose a date by clicking calendar icon. Accepts in the format MM/DD/YYYY |
| Received Date | Text for received date. Choose a date by clicking calendar icon. Accepts in the format MM/DD/YYYY |
| Salutation | Choose the salutation from the drop down list of salutations available. |
| First Name | The text for first name. Accepts alphabets and special character like hyphen and single quotes not exceeding 25 characters. First name is mandatory. |
| Middle Initial | The text for middle initial. Accepts alphabets not exceeding 1 character. |
| Last Name | The text for last name. Accepts alphabets and special characters like hyphen and single quotes not exceeding 35 characters. Last name is mandatory. |
| Suffix | Choose the Suffix from the drop down list of salutations available. |
| Date of Birth | The text for date of birth. Choose a date by clicking calendar icon |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| Address Information: Physical Home Address or Mailing Address | |
| Address | The text for company address. Accepts alphabets and numeric values not exceeding 35 characters |
| Apt | The text for company suite/apt # Accepts alphabets and numeric values of not exceeding 35 characters |
| Zip | The text for zip. Accepts numeric of either 5 or 9 digits. City, State and County are populated automatically for the correct zip code. |
| City | The text for city. Accepts alphabets of not exceeding 30 characters. |
| State | Choose the name of the state from the drop down list of States available in United States of America |
| County | Choose the name of the county from the drop down list of States available in United States of America |
| Mode of Correspondence | Choose the mode of correspondence from the drop down list available |
| Phone Number | The text for telephone number of the contact person. Accepts numeric values of not exceeding 10 digits. The format is (999) 999-9999 |
| Extension | The text for telephone number of the contact person. Accepts numeric values of not exceeding 5 digits. The format is (999) 999-9999 |
| Fax | The text for fax number of the contact person. Accepts numeric values of not exceeding 10 digits. The format is 9999 |
| Email | The text for email of the contact person. Accepts alphabets, numeric and special characters in the standard email format of length not exceeding 100 characters |

Button Functionality

The following table provides explanation for each button in the screen.

| Element | Description |
|---|---|
| Continue | Saves the data and navigates to Billing Information screen and the system generates Group ID. |
| Clear | Clears the contents entered in the fields or restore to the previous state as was before saving the changes |
| Tabs | General Info, Billing Info, Coverage Info and Add Employees are the tabs visible on this screen. The navigation between is tabs are possible only if there is a valid group ID generated and assigned to the group. Also while navigating through the tab the content that are changed on the screen are not saved unless explicitly saved by other operations on the screen. |

Step—8: Screen navigates billing info of group. Enter the values in the respective field as per the format briefed in field's explanation section. Click continue. (See FIG. C-110)

Field Explanation

The following table provides explanation for each button in the screen.

| Element | Description |
|---|---|
| Mode of payment | Choose a mode of payment from the drop down list available. Based on selection corresponding fields will enable to enter the values. For e.g. if the value selected is card payment, EFT will be disabled and allows only entering card details and vice versa. |
| Credit Card Information | |
| Cardholder's Names | The text for cardholder's name. Accepts alphabets and space between two words. |
| Credit Card Type | Choose the type of credit card from the drop down list available. |
| Credit Card No | The text for credit card number. Accepts numeric values not exceeding 30 digits |
| Expiration Date | Choose a month of expiration from the drop down list available |
| Expiration Year | The text for expiration year. Accepts numeric values of exactly 4. Example 2002. |
| Billing Address As it appears on the credit Card | |
| Street Address | The text for company address. Accepts alphanumeric and special characters not exceeding 35 characters. |
| ZIP | The text for zip. Accepts numeric value of either 5 or 9 digits. |
| State | The text for city. Accepts alphabets and space between two words not exceeding 30 characters. |
| City | Choose the name of the state from the drop down list of States available in United States of America |
| EFT Information | |
| Bank Name | The text for bank name. Accepts alphabets and space between two words. |
| Routing Number | The text for routing number. Accepts numeric values not exceeding 9 digits. |
| Account Number | The text for account number. Accepts numeric values not exceeding 9 digits. |
| Account Type | Choose the type of account from the drop down list available. |
| Depositor's Name | The text for depositor's name. Accepts alphabets and space between two words. |
| Initial Payment Information | |
| Amount Received | The text for amount received. Accepts only numeric values in the format 999999999.99 |
| Date Receive | The text for date received. Choose from the calendar icon in the format MM/DD/YYYY. |
| Check # | The text for check number. Accepts numeric values not exceeding 9 digits. |
| No Check Received | Check the option of no checks received for any non-receipt of checks. |

Button Functionality

The following table provides explanation for each button in the screen.

| Element | Description |
|---|---|
| Continue | Saves the data and Navigates to coverage Information screen. |
| Cancel | Clears the contents entered in the fields or restore to the previous state as was before saving the changes |
| Tabs | General Info, Billing Info, Coverage Info and Add Employees are the tabs visible on this screen. The navigation between is tabs are possible only if there is a valid group ID generated and assigned to the group. Also while navigating through the tab the content that are changed on the screen are not saved unless explicitly saved by other operations on the screen. |

Step—9: Screen navigates coverage info of group. Enter the values in the respective field as per the format briefed in field's explanation section. Click continue. (See FIG. C-111)

Field Explanation

The following table provides explanation for each button in the screen.

| Element | Description |
|---|---|
| COBRA effective date | The text for COBRA effective date. Choose a date by clicking calendar icon |
| Qualifying event | Choose a qualifying even from the drop down list available |
| COBRA end date | The text for COBRA end date. Choose a date by clicking calendar icon |
| Send bill to | Choose the option of sending the bills either to group or self (individual) |
| Plan Information | |
| Line of coverage | Choose a line of coverage from the drop down list available |
| Medical waived | Click the check box for medical waive if the employee is waiving medical. |
| Carrier selection (Benefit level) | Choose a carrier selection from the drop down list available |
| Coverage choice | Choose a coverage from the drop down list available |
| PCP ID/Medical group ID | The text for PCP ID. Accepts alphabets and numeric values not exceeding 10 characters. |
| Are you an existing patient | Click the check box if you are an existing patient |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Prior plan type | Choose a plan type from the drop down list available |
| Prior plan name | Choose a plan name from the drop down list available |
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Other coverage kept | The text for other coverage. Accepts alphabets with values not exceeding 50 characters. |
| RAF | The text to display RAF applicable for the Primary Group. |
| Employee signature | Click the check box, to have employee signature |
| Date signed | The text for date signed. Choose a date by clicking calendar icon. Date accepts the format MM/DD/YYYY. Date cannot accept future date. |

Button Functionality

The following table provides explanation for each button in the screen.

| Element | Description |
|---|---|
| Add | Add the contents of employee coverage information. It is only a temporary addition. Becomes permanent only on saving the record. |
| Edit | Edit button will allow for editing a specific record in the table. |
| Delete | Delete button will delete the records in the table checked for deletion. It is only a temporary deletion. Becomes permanent only on saving the record. |
| Check All | The "Check All" Link will check all the records in the table |
| Clear All | The "Clear All" Link will uncheck all the records in the table that are checked. |

-continued

| Element | Description |
|---|---|
| COBRA Summary | Click COBRA summary refreshes the screen and display the summary of information entered for COBRA creation |
| Continue | Navigates add dependent screen. |
| Cancel | Clears the contents entered in the fields or restore to the previous state as was before saving the changes |
| Tabs | General Info, Billing Info, Coverage Info and Add Employees are the tabs visible on this screen. The navigation between is tabs are possible only if there is a valid group ID generated and assigned to the group. Also while navigating through the tab the content that are changed on the screen are not saved unless explicitly saved by other operations on the screen. |

Step—10: Screen navigates to add dependent screen. Enter the values in the respective field as per the format briefed in field's explanation section. Click Continue. (See FIG. C-113)

Field Explanation

The following table provides explanation for each button in the screen.

| Element | Description |
|---|---|
| First Name | The text for first name. Accepts alphabets and special character like hyphen and single quotes not exceeding 25 characters. First name is mandatory. |
| Middle Initial | The text for middle initial. Accepts alphabets not exceeding 1 character. |
| Last Name | The text for last name. Accepts alphabets and special characters like hyphen and single quotes not exceeding 35 characters. Last name is mandatory. |
| Suffix | Choose the suffix from the drop down list of suffixes available. |
| Date of Birth | The text for date of birth. Choose a date by clicking calendar icon. Date accepts the format MM/DD/YYYY. Birth date cannot be later than the current date. |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| Relationship | Choose the relationship from the drop down list available. |
| Street Address | The text for address. Accepts alphanumeric and special characters with values not exceeding 35 characters |
| Suite | The text for suite/apt #. Accepts alphanumeric and special characters with values not exceeding 35 characters |
| Zip | The text for zip. Accepts numeric value of either 5 or 9 digits. City, and State are populated automatically on entering the correct zip code and entering the tab key. |
| City | The text for city. Accepts alphabets not exceeding 30 characters. |
| State | Choose the name of the state from the drop down list of States available in United States of America |
| Selected carrier | The text for selected carrier. It is a read only field |
| Coverage choice | The text for coverage. It is a read only field |
| Service area | The text for service area. It is a read only field |
| Prior plan type | Choose a plan type from the drop down list available |
| Prior plan | The text for plan name. Accepts alphabets |
| Waived | Click the check box if medical is waived |
| Start date | The text for start date. Choose a date by clicking calendar icon |
| End date | The text for end date. Choose a date by clicking calendar icon |
| PCP ID/ | The text for PCP ID. Accepts alphabets |
| PCP last name | The text for PCP last name. Accepts alphabets and special character like hyphen and single quotes |

-continued

| Element | Description |
|---|---|
| PCP first name | The text for PCP first name. Accepts alphabets and special character like hyphen and single quotes |
| Disabled dependent | Click the option of temporary or permanent. This is enable if the relationship opted is child |
| Domestic partner | Click the option for domestic partner. It depends on the value selected in relationship |
| Legal guardian | Click the option for legal guardian. It depends on the value selected in relationship |
| Signature | Click the check box if the signature is opted |

Button Functionality

The following table provides explanation for each button in the screen.

| Element | Description |
|---|---|
| Add | Add the contents of dependent information. It is only a temporary addition. |
| Edit | Edit button will allow for editing a specific record in the table. |
| Delete | Delete button will delete the records in the table checked for deletion. It is only a temporary deletion. |
| Check All | The "Check All" Link will check all the records in the table |
| Clear All | The "Clear All" Link will uncheck all the records in the table that are checked. |
| Clear | Clears the contents entered in the fields or restore to the previous state as was before saving the changes |
| Continue | Screen navigates to Missing info. |
| Tabs | General Info, Billing Info, Coverage Info and Add Employees are the tabs visible on this screen. The navigation between is tabs are possible only if there is a valid group ID generated and assigned to the group. Also while navigating through the tab the content that are changed on the screen are not saved unless explicitly saved by other operations on the screen. |

Step—11: Missing info screen displays the information that is left out while creating a COBRA. Enter the values in the respective field as per the format briefed in field's explanation section. Click Enroll. (See FIG. C-114)

Field Explanation

The following table provides explanation for each button in the screen.

| Element | Description |
|---|---|
| Group Information Header | Contains header information of the Group |
| Name of the Group | Text for the Name of the Group |
| Group ID | Text and Link for the Group ID to navigate to the Group General Info screen |
| Group Type | Specifies the Type of the Group like Small Employer Group |
| Proposed Effective Date | The text for Proposed Effective Date. Choose a date by clicking calendar icon. Date accepts the format MM/DD/YYYY. Default effective date is first of the following month. Effective date cannot be past date |
| Status | Text to specify the status of the group. |
| Work Group | Text for Work Group. This specifies the internal work group attached to the Group. Internal is based on the writing agent's work group. |
| Tree Structure | Enrollment Missing Information is broken down into tree structure. The tree can by expanded or collapsed. The level of the tree is as per the example given below:<br>– Employee<br>– Dependent<br>– Dependent |

-continued

| Element | Description |
|---|---|
| | Where (−) signifies expanded view and (+) signifies collapsed view. |
| Group Missing Info | This identifies all the eligibility rules and the information that are incomplete on Group level for completing the enrollment process. |
| Missing Entities | List the missing entities for the group. Provides a link to go to the respective screen to fill in the relevant information to complete all the required entries. |
| Message | List the message against each missing entities. |
| Employee Missing Info | This identifies all the eligibility rules and the information that are incomplete on Employee level for completing the enrollment process. |
| Missing Entities | List the missing entities for the employee. Provides a link to go to the respective screen to fill in the relevant information to complete all the required entries. |
| Message | List the message against each missing entities. |
| Dependent Missing Info | This identifies all the eligibility rules and the information that are incomplete on dependent level for completing the enrollment process. |
| Missing Entities | List the missing entities for the dependent. Provides a link to go to the respective screen to fill in the relevant information to complete all the required entries. |
| Message | List the message against each missing entities. |
| Enrollment Action | Choose from the drop down list the action to be performed for enrollment. Enroll/Decline |
| Remarks | Text for remarks if any. |
| Reasons for Decline | Choose from the drop down list the reasons for decline. |
| Reasons for Other | Text for other reason. If the reason for decline is other than the reasons available. |

Button Functionality

The following table provides explanation for each button in the screen.

| Element | Description |
|---|---|
| Enroll | Saves the data if there are no missing information and navigates to enrollment confirmation page. |
| Clear | Clears the contents entered in the fields or restore to the previous state as was before saving the changes |
| <<, <, >, >> | The enrollment missing information shows record for 5 employees on single screen. If the employee size increases more than 5. These buttons are used for navigating to the next and previous records for viewing.<br><< - Show first record(s)<br>< - Show previous record(s)<br>> - Show next record(s)<br>>> - Show last record(s) |
| Group ID | Click Group ID to navigates to the Group's general info screen. |
| Preview Invoice | Click Preview Invoice to pop up a new browser window to preview the invoice for the group |

Missing Information

The following table provides explanation for each missing information and what needs to be done to remove missing information from the screen

| Missing Entity | Message | Reasons/Remedy |
|---|---|---|
| | Member Level | |
| General Information | These are missing information pertains to the Member Level information required in the COBRA Member General Information Screen | |
| Address | Address information is not specified | Fill in the address information in the Employee General Info Screen |
| City | City is not specified | Fill in the City in the Employee General Info Screen |
| State | State is not specified | Fill in the City in the Employee General Info Screen |
| ZIP Code | ZIP Code is not specified | Fill in the ZIP Code in the Employee General Info Screen |
| Date of Birth | Date of Birth is not specified | Fill in the Date of Birth in the Employee General Info Screen |
| Gender | Gender is not specified | Choose the Gender in the Employee General Info Screen |
| SSN | SSN is not specified | Fill in the SSN in the Employee General Info Screen. If the employee refuse to provide SSN then click auto generate SSN/Unique ID in the Employee General Info Screen. Auto generation of SSN/Unique ID will be available only for the user with role as level II and above |
| Mode of Correspondence | Mode of Correspondence is not specified | Choose the Mode of Correspondence for Employee from the list in Employee general info screen |
| Email | Email for Employee is not specified | This is required if the mode of correspondence selected is Email. Fill in the Email in the Employee general info screen |
| Billing Information | These missing information pertains to the Group Level information required in the Billing Information Screen | |
| Mode of payment | Mode of payment is not specified | Choose the Mode of Payment for the group from the list in Group Billing Info Screen |
| Check Number | Check Number is not specified. | Fill in the Check number in the Group Billing Info Screen |
| Check Date | Date Check received is not specified | Fill in the Date received in the Group Billing Info Screen |
| Check Number | Check Number received is not specified | Fill in the Check Number in the Group Billing Info Screen |
| Cardholder's Name | Cardholder's name is not specified | This is required if the mode of payment opted by group is Credit Card. Fill in the Cardholder's name in the Group Billing Info Screen. |
| Credit Card Type | Credit Card Type is not specified. | This is required if the mode of payment opted by group is Credit Card Choose the Credit Card Type for the group from the list in Group Billing Info Screen |
| Credit Card Number | Credit Card Number is not specified | This is required if the mode of payment opted by group is Credit Card. Fill in the Credit Card Number in the Group Billing Info Screen. |
| Expiration Date | Credit Card Expiration Date is not specified | This is required if the mode of payment opted by group is Credit Card. Fill |

-continued

| Missing Entity | Message | Reasons/Remedy |
|---|---|---|
| | | in the Credit Card Expiration Date in the Group Billing Info Screen. |
| Bank Name | Bank name is not specified | This is required if the mode of payment opted by group is EFT. Fill in the Bank Name in the Group Billing Info Screen. |
| Routing Number | Routing Number is not specified | This is required if the mode of payment opted by group is EFT. Fill in the Routing Number in the Group Billing Info Screen. |
| Account Type | Account Type is not specified | This is required if the mode of payment opted by group is EFT. Fill in the Account Type in the Group Billing Info Screen |
| Depositor's Name | Depositor's Name is not specified | This is required if the mode of payment opted by group is EFT. Fill in the Depositor's Name in the Group Billing Info Screen |
| Coverage Information | These missing information Level information required Information Screen | pertains to the Group in the Coverage |
| COBRA Qualifying Event | Qualifying Event is not specified | Choose the Qualifying Event for the group from the list in Coverage Information Screen |
| COBRA End Date | COBRA End Date not specified | Choose the Qualifying Event for the group from the list in Coverage Information Screen to automatically calculate the COBRA end date based on the Qualifying event |
| Send Bill To | Where COBRA bill needs to be sent is not specified | Choose one of the option specified (Group or Self) in Coverage Information Screen |
| Line of Coverage | No line of Coverage is opted by the member | Choose one of the line of coverage in Coverage Information Screen |
| Plan Selection | No Plan is elected by the member | Choose one of the plan in Coverage Information Screen |
| Medical LOC | Medical Line of coverage not elected by Member | Medical line of coverage is required to decide the Coverage Choice. Choose Medical line of coverage in Coverage Information Screen |
| Coverage Choice | No coverage choice specified for Medical Line of coverage | Medical line of coverage is required to decide the Coverage Choice. Choose coverage choice in Coverage Information Screen |
| Coverage Choice - Dental | No coverage choice specified for Dental Line of coverage | This is required if the member opts for Dental Plan. Choose coverage choice in Coverage Information Screen |
| Coverage Choice - Vision | No coverage choice specified for Vision Line of coverage | This is required if the member opts for Vision Plan. Choose coverage choice in Coverage Information Screen |
| Coverage Choice - CAM | No coverage choice specified for CAM Line of coverage | This is required if the member opts for CAM Plan. Choose coverage choice in Coverage Information Screen |
| Dependent Count | Number of Dependents is not sufficient to satisfy Coverage Choice. | This would be the case when the dependent information is not entered |

-continued

| Missing Entity | Message | Reasons/Remedy |
|---|---|---|
| | | into the system. Add Dependent. This can also occur if the number of dependent as specified in coverage choice does not match with the dependents available. Add Dependent. |
| Employee Signature | Employee signature is missing | Verify employee's signature and check Employee Signature checkbox in the Employee Coverage Info Screen |
| Date Signed | Date Signed is missing | Verify Date signed and fill in the Date Signed in the Employee Coverage Info Screen |
| Plan availability | Medical Plan selected by the Employees not available in the service area. | Normally the Plan for the employee is listed based on the Plan available in the employees Service Area. Rare cases if the User Modifies the ZIP Code in the Employee General Info Screen and fails to update the Plan for the specific ZIP code, Service Area combination this message would be shown. Pick the plans that are available for the Employee in the Employee Coverage Info screen. |
| Plan availability | Dental Plan selected by the Employees not available in the service area. | Normally the Plan for the employee is listed based on the Plan available in the employees Service Area. Rare cases if the User Modifies the ZIP Code in the Employee General Info Screen and fails to update the Plan for the specific ZIP code, Service Area combination this message would be shown. Pick the plans that are available for the Employee in the Employee Coverage Info screen. |
| Plan availability | Vision Plan selected by the Employees not available in the service area. | Normally the Plan for the employee is listed based on the Plan available in the employees Service Area. Rare cases if the User Modifies the ZIP Code in the Employee General Info Screen and fails to update the Plan for the specific ZIP code, Service Area combination this message would be shown. Pick the plans that are available for the Employee in the Employee Coverage Info screen. |
| Plan availability | CAM Plan selected by the Employees not available in the service area. | Normally the Plan for the employee is listed based on the Plan available in the employees Service Area. Rare cases if the User Modifies the ZIP Code in the Employee General Info Screen and fails to update the Plan for the specific ZIP code, |

-continued

| Missing Entity | Message | Reasons/Remedy |
|---|---|---|
| | | Service Area combination this message would be shown. Pick the plans that are available for the Employee in the Employee Coverage Info screen. |
| Dependent Information | These missing information pertains to the Dependent Level information required in the Dependent Information Screen | |
| Date of Birth | Date of Birth is not specified | Fill in the Date of Birth in the Dependent General Info Screen |
| Gender | Gender is not specified | Choose the Gender in the Dependent General Info Screen |
| SSN | SSN is not specified | Fill in the SSN in the Dependent General Info Screen. If the dependent refuse to provide SSN then click auto generate SSN/Unique ID in the Dependent General Info Screen. Auto generation of SSN/Unique ID will be available only for the user with role as level II and above |
| Relationship | Relationship of the dependent with the employee not specified | Choose the dependent relationship from the Dependent Info Screen |
| Relationship - Child | Relationship, child is specified for child above 23 years of age | Verify if the child is disabled and choose if Disabled Permanent or Temporary. |
| Signature | Dependent signature is missing | This is required if the dependent age is above 18. Verify the signature for the dependent and check the checkbox Signature in the dependent info screen |
| Relationship | Number of spouse is more than one | Check for the relationship in the dependent info screen. There can only be one of the following relationship for the dependent: Spouse or Ex - Spouse or domestic partner. Choose different relationship for the other dependent in the dependent info screen |

Step—12: On clicking enroll button, screen navigates to confirmation screen, for having created a group under COBRA Enrollment. Click search button to navigate back to Group Search screen. (See FIG. C-115)

Modify COBRA

The screen is to have modification of details pertaining to a COBRA member. The screen provides functionality to save, edit or add new member details.

The sequential steps involved in modify COBRA are listed below.

Step—1: After successful logon, click the menu Enrollment and select New Business Enrollment. Select the option COBRA Enrollment. Then New COBRA and modify COBRA. (See FIG. C-116)

Step—2: Navigates to group COBRA search screen. Enter value in any one of the fields, or simply click Search to perform search operation. (See FIG. C-117)

Step—3: This pops up a screen with the search result. (See FIG. C-118)

Step—4: Click on any group id for selection

Step—5: This navigates to general information pertaining to group screen. The process of modifying group is similar to the process explained vide from step 7 through step 12 of creating a COBRA group Inactivate COBRA The screen is to inactivate a COBRA from the active status.

The sequential steps involved in inactivate a COBRA are listed below.

Step—1: After successful logon, click the menu Enrollment and select New Business Enrollment. Select the option COBRA Enrollment. Then select New COBRA and inactivate COBRA. (See FIG. C-119)

Step—2: Navigates to group COBRA screen. Enter value in any one of the fields, or simply click Search to perform search operation. (See FIG. C-120)

Step—3: This pops up a screen with the search result. (See FIG. C-121)

Step—4: Click on any group id for selection. This navigates to a screen confirming for the selected group to make inactivate. Click Inactivate button. (See FIG. C-122)

Step—5: Confirms the status. (See FIG. C-123)

Existing COBRA—Create COBRA

The screen is to create COBRA for existing type. The screen provides functionality to save, edit or add new COBRA.

The sequential steps involved in create new COBRA are listed below.

Step—1: After successful logon, click the menu Enrollment and select COBRA Enrollment. Select the Existing COBRA and then select Create COBRA. (See FIG. C-124)

Step—2: The screen navigates to employee search for adding COBRA. Enter employee id or enter first letter of employee name for search. Click Search button. (See FIG. C-125)

Step—3: The screen displays the search result. (See FIG. C-126)

Step—4: Click on employee id.

Step—5: Choose the option of sending bill either to group or self. Enter the date by clicking calendar icon, provided if the check box is clicked for verified member signature. (See FIG. C-127)

Step—6: Choose the Member and state COBRA Election options for each member from the table and clicks continue.

Step—7: Screen navigates to general info of group. First name and last name are mandatory and other fields are optional. Enter the values in the respective field, as per the format briefed in field's explanation section. (See FIG. C-128)

Field Explanation

The following table provides explanation for each button in the screen.

| Element | Description |
|---|---|
| Parent Group ID | Text to display the Parent Group ID. |
| Parent Group Name | Text to display the Parent Group Name. |
| COBRA Group ID | Text to display the COBRA Group ID. |
| COBRA Type | Text to display the COBRA Group Type whether Cal COBRA or Federal COBRA. |
| Group Effective Date | Text to display effective date of the parent group. |

-continued

| Element | Description |
|---|---|
| Work Group | Text to Display the internal Work group associated with the Parent Group |
| Status | Text to display status of the group. |
| Post Mark Date | Text for post mark date. Choose a date by clicking calendar icon. Accepts in the format MM/DD/YYYY |
| Received Date | Text for received date. Choose a date by clicking calendar icon. Accepts in the format MM/DD/YYYY |
| Salutation | Choose the salutation from the drop down list of salutations available. |
| First Name | The text for first name. Accepts alphabets and special character like hyphen and single quotes not exceeding 25 characters. First name is mandatory. |
| Middle Initial | The text for middle initial. Accepts alphabets not exceeding 1 character. |
| Last Name | The text for last name. Accepts alphabets and special characters like hyphen and single quotes not exceeding 35 characters. Last name is mandatory. |
| Suffix | Choose the Suffix from the drop down list of salutations available. |
| Date of Birth | The text for date of birth. Choose a date by clicking calendar icon |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| Address Information: Physical Home Address or Mailing Address | |
| Address | The text for company address. Accepts alphabets and numeric values not exceeding 35 characters |
| Apt | The text for company suite/apt # Accepts alphabets and numeric values of not exceeding 35 characters |
| Zip | The text for zip. Accepts numeric of either 5 or 9 digits. City, State and County are populated automatically for the correct zip code. |
| City | The text for city. Accepts alphabets of not exceeding 30 characters. |
| State | Choose the name of the state from the drop down list of States available in United States of America |
| County | Choose the name of the county from the drop down list of States available in United States of America |
| Mode of Correspondence | Choose the mode of correspondence from the drop down list available |
| Phone Number | The text for telephone number of the contact person. Accepts numeric values of not exceeding 10 digits. The format is (999) 999-9999 |
| Extension | The text for telephone number of the contact person. Accepts numeric values of not exceeding 5 digits. The format is (999) 999-9999 |
| Fax | The text for fax number of the contact person. Accepts numeric values of not exceeding 10 digits. The format is 9999 |
| Email | The text for email of the contact person. Accepts alphabets, numeric and special characters in the standard email format of length not exceeding 100 characters |

Button Functionality

The following table provides explanation for each button in the screen.

| Element | Description |
|---|---|
| Continue | Saves the data and navigates to Billing Information screen and the system generates Group ID. |
| Cancel | Clears the contents entered in the fields or restore to the previous state as was before saving the changes |
| Tabs | General Info, Billing Info, Coverage Info and Add Employees are the tabs visible on this screen. The navigation between is tabs are possible only if there is a valid group ID generated and assigned to the group. Also while navigating through the tab the content that are changed on the screen are not saved unless explicitly saved by other operations on the screen. |

Step—8: Enter the values in the respective field, as per the format briefed in field's explanation section. Screen can be navigated to Billing Info by either clicking continue button or through other respective tabs. (See FIG. C-129)

Field Explanation

The following table provides explanation for each button in the screen.

| Element | Description |
|---|---|
| Mode of payment | Choose a mode of payment from the drop down list available. Based on selection corresponding fields will enable to enter the values. For e.g. if the value selected is card payment, EFT will be disabled and allows only entering card details and vice versa. |
| Credit Card Information | |
| Cardholder's Names | The text for cardholder's name. Accepts alphabets and space between two words. |
| Credit Card Type | Choose the type of credit card from the drop down list available. |
| Credit Card No | The text for credit card number. Accepts numeric values not exceeding 30 digits |
| Expiration Date | Choose a month of expiration from the drop down list available |
| Expiration Year | The text for expiration year. Accepts numeric values of exactly 4. Example 2002. |
| Billing Address | As it appears on the credit Card |
| Street Address | The text for company address. Accepts alphanumeric and special characters not exceeding 35 characters. |
| ZIP | The text for zip. Accepts numeric value of either 5 or 9 digits. |
| State | The text for city. Accepts alphabets and space between two words not exceeding 30 characters. |
| City | Choose the name of the state from the drop down list of States available in United States of America |
| EFT Information | |
| Bank Name | The text for bank name. Accepts alphabets and space between two words. |
| Routing Number | The text for routing number. Accepts numeric values not exceeding 9 digits. |
| Account Number | The text for account number. Accepts numeric values not exceeding 9 digits. |
| Account Type | Choose the type of account from the drop down list available. |
| Depositor's Name | The text for depositor's name. Accepts alphabets and space between two words. |
| Initial Payment Information | |
| Amount Received | The text for amount received. Accepts only numeric values in the format 999999999.99 |
| Date Receive | The text for date received. Choose from the calendar icon in the format MM/DD/YYYY. |
| Check # | The text for check number. Accepts numeric values not exceeding 9 digits. |
| No Check Received | Check the option of no checks received for any non-receipt of checks. |

Button Functionality

The following table provides explanation for each button in the screen.

| Element | Description |
|---|---|
| Continue | Saves the data and Navigates to coverage Information screen. |
| Clear | Clears the contents entered in the fields or restore to the previous state as was before saving the changes |
| Tabs | General Info, Billing Info, Coverage Info and Add Employees are the tabs visible on this screen. The navigation between is tabs are possible only if there is a valid group ID generated and assigned to the group. |

-continued

| Element | Description |
|---|---|
| | Also while navigating through the tab the content that are changed on the screen are not saved unless explicitly saved by other operations on the screen. |

Step—9: Screen can be navigated to Coverage Info by either clicking continue button or through other respective tabs. Enter the values in the respective field, as per the format briefed in field's explanation section. (See FIG. C-130)

Fields Explanation

The following table provides explanation for each button in the screen.

| Element | Description |
|---|---|
| | Plan Election |
| Choose Plan | Click on the check box to select the plan. |
| Send bills to | Choose the Option Group or Self for "Send bill to". |
| Member Signature | Check this if member signature is verified |
| Date Signed | The text for Date Signed. Choose a date by clicking calendar icon. Date accepts the format MM/DD/YYYY. |

Button Functionality

The following table provides explanation for each button in the screen.

| Element | Description |
|---|---|
| Continue | Saves the data and Navigates to either Dependent Info Screen or COBRA Summary screen. |
| Cobra Summary | Saves the data and Navigates COBRA Summary screen. |
| Clear | Clears the contents entered in the fields or restore to the previous state as was before saving the changes |
| Tabs | General Info, Billing Info, Coverage Info and Add Employees are the tabs visible on this screen. The navigation between is tabs are possible only if there is a valid group ID generated and assigned to the group. Also while navigating through the tab the content that are changed on the screen are not saved unless explicitly saved by other operations on the screen. |

Step—10: Screen can be navigated to Dependent Info by either clicking continue button or through other respective tabs. (See FIG. C-131)

Step—11: Dependent Screen for COBRA is Display only screen. Click continue to navigate to COBRA Missing Info screen. (See FIG. C-132)

Field Explanation

The following table provides explanation for each button in the screen.

| Element | Description |
|---|---|
| Group Information Header | Contains header information of the Group |
| Name of the Group | Text for the Name of the Group |
| Group ID | Text and Link for the Group ID to navigate to the Group General Info screen |

-continued

| Element | Description |
|---|---|
| Group Type | Specifies the Type of the Group like Small Employer Group |
| Proposed Effective Date | The text for Proposed Effective Date. Choose a date by clicking calendar icon. Date accepts the format MM/DD/YYYY. Default effective date is first of the following month. Effective date cannot be past date |
| Status | Text to specify the status of the group. |
| Pend Date | |
| Date Finalized | |
| Work Group | Text for Work Group. This specifies the internal work group attached to the Group. Internal is based on the writing agent's work group. |
| Tree Structure | Enrollment Missing Information is broken down into tree structure. The tree can by expanded or collapsed. The level of the tree is as per the example given below:<br>– Employee<br>– Dependent<br>– Dependent<br>Where (–) signifies expanded view and (+) signifies collapsed view. |
| Group Missing Info | This identifies all the eligibility rules and the information that are incomplete on Group level for completing the enrollment process. |
| Missing Entities | List the missing entities for the group. Provides a link to go to the respective screen to fill in the relevant information to complete all the required entries. |
| Message | List the message against each missing entities. |
| Employee Missing Info | This identifies all the eligibility rules and the information that are incomplete on Employee level for completing the enrollment process. |
| Missing Entities | List the missing entities for the employee. Provides a link to go to the respective screen to fill in the relevant information to complete all the required entries. |
| Message | List the message against each missing entities. |
| Dependent Missing Info | This identifies all the eligibility rules and the information that are incomplete on dependent level for completing the enrollment process. |
| Missing Entities | List the missing entities for the dependent. Provides a link to go to the respective screen to fill in the relevant information to complete all the required entries. |
| Message | List the message against each missing entities. |
| Enrollment Action | Choose from the drop down list the action to be performed for enrollment. Enroll/Decline |
| Remarks | Text for remarks if any. |
| Reasons for Decline | Choose from the drop down list the reasons for decline. |
| Reasons for Other | Text for other reason. If the reason for decline is other than the reasons available. |

Button Functionality

The following table provides explanation for each button in the screen.

| Element | Description |
|---|---|
| Enroll | Saves the data if there are no missing information and navigates to enrollment confirmation page. |
| Clear | Clears the contents entered in the fields or restore to the previous state as was before saving the changes |
| <<, <, >, >> | The enrollment missing information shows record for 5 employees on single screen. If the employee size increases more than 5. These buttons are used for navigating to the next and previous records for viewing.<br><< - Show first record(s)<br>< - Show previous record(s)<br>> - Show next record(s)<br>>> - Show last record(s) |
| Group ID | Click Group ID to navigates to the Group's general info screen. |
| Preview Invoice | Click Preview Invoice to pop up a new browser window to preview the invoice for the group |

Step—12: On clicking enroll button, screen navigates to confirmation screen, for having created a group under COBRA Enrollment. Click search button to navigate back to Group Search screen. (See FIG. C-133)

Modify COBRA

The screen is to modify COBRA details for existing type. The screen provides functionality to save, edit or add new COBRA.

The sequential steps involved in modify COBRA are listed below.

Step—1: After successful logon, click the menu Enrollment and select New Business Enrollment. Select the Existing COBRA and then select New COBRA. (See FIG. C-134)

Step—2: The screen navigates to group search for adding COBRA. Enter group id or enter first letter of group name for search. Click Search button. (See FIG. C-135)

Step—3: This pops up a screen with the search result.

Step—4: Click on any group id for selection. Screen navigates to general info screen pertaining to group. The process and flow for modification are similar to that of creating a group, which are explained vide step 7 through step 11

Inactivate COBRA

The screen is to inactivate a COBRA details from its active in existing type. (See FIG. C-136)

The sequential steps involved in inactivating COBRA are listed below.

Step—1: After successful logon, click the menu Enrollment and select New Business Enrollment. Select the Existing COBRA and then select Inactivate COBRA. (See FIG. C-137)

Step—2: The screen navigates to group search for COBRA. Enter group id or enter first letter of group name for search. Click Search button. (See FIG. C-138)

Step—3: This pops up a screen with the search result.

Step—4: Click on any group id for selection. This navigates to a screen confirming for the selected group to make inactivate. Click Inactivate button. (See FIG. C-139)

Step—5: Confirms the status. Click Search navigates employee search screen. (See FIG. C-140)

5 Termination

Termination is the transaction module that encompasses the process of terminating the group and member enrolled with PacAdvantage in the PX2 System. This process allows terminating Groups, Members and dependent from the PacAdvantage program.

Access

The application can be accessed from the main menu as follows:

Enrollment→Termination→Group Termination
→Employee Termination
→Dependent Termination
→Multiple Group Termination Pre-Requisites The groups and member must exist in the system for the termination process to occur.

Application Functions

This application has the following functions for termination:

Group Termination—to terminate a group

Employee Termination—to terminate an employee

Dependent Termination—to terminate a dependent

Multiple Group Termination—to terminate multiple groups

Group Termination

The screen is to terminate a group.

The sequential steps involved in terminating a group are listed below.

Step—1: After successful logon, click the menu Enrollment and select Termination. Then select Group Termination. (See FIG. C-141)

Step—2: The screen navigates to group search to select a group. Enter value in any one of the field or simply click Search button to perform search operation. (See FIG. C-142)

Step—3: This pops up a screen with search result. (See FIG. C-143)

Step—4: Click on any group id for selection. The screen navigates to term request (See FIG. C-144)

Step—5: Enter the fields with appropriate values as per the format briefed in field's explanation. Click continue.

Step—6: Screen navigates to process term. Enter the details of effective term date and change term status and click Continue. (See FIG. C-145)

Step—7: Confirms the termination of a group. (See FIG. C-146)

Step—8: Click Search button to go back to Group Search screen.

Field Explanation

The following table provides explanation for each button in the screen.

| Element | Description |
|---|---|
| | Request for Term |
| Mode of Request | Choose a mode of request from the drop down list available. The field is mandatory. |
| Post Mark Date | The text for post mark date. Choose a date in the format MM/DD/YYYY by clicking calendar icon. The postmark date cannot be greater than system date. The field is mandatory. |
| Date Received | The text for received date. Choose a date in the format MM/DD/YYYY by clicking calendar icon. The received date cannot be greater than system date. The field is mandatory. |
| Request Term Date | The text for request term date. Choose a date in the format MM/DD/YYYY by clicking calendar icon. The request term date should be the last day of that particular month except in case of death. The field is mandatory. |
| Reason for Term | Choose a reason from the drop down list The field is mandatory. |
| Others | The text for narrating other info, provided the option for reason for terms is others |
| Authorized contact | Choose Authorized contact from the list. The field is mandatory. |
| | Process Term |
| Effective Term Date | The text for request term date. Choose a date in the format MM/DD/YYYY by clicking calendar icon. |
| Change Term Status | Choose a status from the drop down list for change term |

Button Functionality

The following table provides explanation for each button in the screen.

| Element | Description |
|---|---|
| Search | Search is performed based on the input |
| Continue | Saves the data and navigates to next screen in the flow of termination. |
| Clear | Clears the contents entered in the fields or restore to the previous state as was before saving the changes |

Employee Termination

The screen is to terminate an employee.

The sequential steps involved in terminating an employee are listed below.

Step—1: After successful logon, click the menu Enrollment and select Termination. Then select Employee Termination. (See FIG. C-147)

Step—2: The screen navigates to employee search to select a group. Enter value in any of the field or simply click Search button to perform. search operation. (See FIG. C-148)

Step—3: This pops a screen with search result.

Step—4: Click on any employee id for selection. The screen navigates to term request. (See FIG. C-149)

Step—5: Enter the fields with appropriate values as per the format briefed in field's explanation. Click continue.

Step—6: Screen navigates to process term. Enter the details of effective term date and change term status and click Continue. (See FIG. C-150)

Step—7: Confirms the termination of a employee. (See FIG. C-151)

Step—8: Clicking Search button leads to Employee search screen.

Field Explanation

The following table provides explanation for each button in the screen.

| Element | Description |
|---|---|
| | Request for Term |
| Mode of Request | Choose a mode of request from the drop down list available. This field is mandatory. |
| Post Mark Date | The text for post mark date. Choose a date in the format MM/DD/YYYY by clicking calendar icon. The postmark date cannot be greater than system date This field is mandatory. |
| Date Received | The text for received date. Choose a date in the format MM/DD/YYYY by clicking calendar icon. The Date received cannot be greater than system date. This field is mandatory. |
| Request Term Date | The text for request term date. Choose a date in the format MM/DD/YYYY by clicking calendar icon. The request term date should be the last day of that particular month. This field is mandatory. |
| Reason for Term | Choose a reason from the drop down list |
| Others | The text for narrating other info, provided the option for reason for terms is others |
| Authorized contact | The text for authorized contact. The field is mandatory. |
| | Process Term |
| Effective Term Date | The text for request term date. Choose a date in the format MM/DD/YYYY by clicking calendar icon. |
| Change Term Status | Choose a status from the drop down list for change term |

Button Functionality

The following table provides explanation for each button in the screen.

| Element | Description |
|---|---|
| Search | Search is performed based on the input |
| Continue | Saves the data and navigates to next screen in the flow of termination. |
| Clear | Clears the contents entered in the fields or restore to the previous state as was before saving the changes |

Dependent Termination

The screen is to terminate a dependent.

The sequential steps involved in terminating a dependent are listed below.

Step—1: After successful logon, click the menu Enrollment and select Termination. Then select Dependent Termination. (See FIG. C-152)

Step—2: The screen navigates to dependent search to select a group. Enter value in any one of the field or simply click Search button to perform search operation. (See FIG. C-153)

Step—3: This pops a screen with search result. (See FIG. C-154)

Step—4: Click on any dependent id for selection. The screen navigates to term request. (See FIG. C-155)

Step—5: Enter the fields with appropriate values as per the format briefed in field's explanation. Click continue.

Step—6: Screen navigates to process term. Enter the details of effective term date and change term status and click Continue. (See FIG. C-156)

Step—7: Confirms the termination of a dependent. (See FIG. C-157)

Step—8: Click Search button to navigate back to Dependent Search screen.

Field Explanation

The following table provides explanation for each button in the screen.

| Element | Description |
|---|---|
| | Request for Term |
| Mode of Request | Choose a mode of request from the drop down list available. The field is mandatory. |
| Post Mark Date | The text for postmark date. Choose a date in the format MM/DD/YYYY by clicking calendar icon. The postmark date cannot be greater than system date. The field is mandatory. |
| Date Received | The text for received date. Choose a date in the format MM/DD/YYYY by clicking calendar icon. The Date Received cannot be greater than system date. The field is mandatory. |
| Request Term Date | The text for request term date. Choose a date in the format MM/DD/YYYY by clicking calendar icon. The request term date should be the last day of that particular month. The field is mandatory. |
| Reason for Term | Choose a reason from the drop down list. The field is mandatory. |
| Others | The text for narrating other info, provided if the option for reason for terms is others |
| Authorized contact | The text for authorized contact. The field is mandatory. |
| | Process Term |
| Effective Term Date | The text for request term date. Choose a date in the format MM/DD/YYYY by clicking calendar icon. |
| Change Term Status | Choose a status from the drop down list for change term |

Button Functionality

The following table provides explanation for each button in the screen.

| Element | Description |
|---|---|
| Search | Search is performed based on the input |
| Continue | Saves the data and navigates to next screen in the flow of termination. |
| Clear | Clears the contents entered in the fields or restore to the previous state as was before saving the changes |

Multiple Group Termination

The screen is to terminate multiple groups.

The sequential steps involved in terminating multiple groups are listed below.

Step—1: After successful logon, click the menu Enrollment and select Termination. Then select Multiple Group Termination. (See FIG. C-158)

Step—2: The screen navigates to term request Enter the fields with appropriate values as per the format briefed in field's explanation. Click continue. (See FIG. C-159)

Step—3: Confirms the termination of a groups. (See FIG. C-160)

Step—4: Click search button to navigate back to Group Termination screen.

Field Explanation

The following table provides explanation for each button in the screen.

| Element | Description |
|---|---|
| | Request for Term |
| Mode of Request | Choose a mode of request from the drop down list available |
| Post Mark Date | The text for post mark date. Choose a date in the format MM/DD/YYYY by clicking calendar icon. The post mark date cannot be greater than system date |
| Date Received | The text for received date. Choose a date in the format MM/DD/YYYY by clicking calendar icon. The post mark date cannot be greater than system date |
| Request Term Date | The text for request term date. Choose a date in the format MM/DD/YYYY by clicking calendar icon. The request term date should be the last day of that particular month |
| Reason for Term | Choose a reason from the drop down list |
| Others | The text for narrating other info, provided if the option for reason for terms is others |

Button Functionality

The following table provides explanation for each button in the screen.

| Element | Description |
|---|---|
| Search | Search is performed based on the input |
| Continue | Saves the data and navigates to next screen in the flow of termination. |
| Clear | Clears the contents entered in the fields or restore to the previous state as was before saving the changes |

6 Reinstatement

Reinstatement is the transaction module that encompasses the process of reinstating the group and member enrolled with PacAdvantage in the PX2 System. This process allows reinstating Groups, Members and dependent to the PacAdvantage program.

Access

The application can be accessed from the main menu as follows:

Enrollment→Reinstatement→Group Reinstatement
→Employee Reinstatement
→Dependent Reinstatement Pre-Requisites The groups and member must exist in the system and also terminated for processing reinstatement.

Application Functions

This application has the following functions for reinstatement:

Group Reinstatement—to reinstate a group

Employee Reinstatement—to reinstate an employee

Dependent Reinstatement—to reinstate a dependent

Group Reinstatement

The screen is to reinstate a group.

The sequential steps involved in reinstating a group are listed below.

Step—1: After successful logon, click the menu Enrollment and select Reinstatement. Then select Group Reinstatement. (See FIG. C-161)

Step—2: The screen navigates to group search to select a group. Enter value in any one of the fields, or simply click search button to perform search operation. (See FIG. C-162)

Step—3: This pops up a screen with search result. (See FIG. C-163)

Step—4: Click on any group id for selection. The screen navigates to reinstate request. (See FIG. C-164)

Step—5: Enter the fields with appropriate values as per the format briefed in field's explanation. Click continue Step—6: Screen navigates to process reinstate. Enter the details of effective term date and change term status and click Continue. (See FIG. C-165)

Step—7: Confirms the reinstatement of a group. (See FIG. C-166)

Step—8: Click Search button to go back to Group Search screen.

Field Explanation

The following table provides explanation for each button in the screen.

| Element | Description |
|---|---|
| | Initiate Group Reinstatement |
| Mode of Request | Choose a mode of request from the drop down list available. The field is mandatory. |
| Post Mark Date | The text for post mark date. Choose a date in the format MM/DD/YYYY by clicking calendar icon. The postmark date cannot be greater than system date. The field is mandatory. |
| Date Received | The text for received date. Choose a date in the format MM/DD/YYYY by clicking calendar icon. The Date Received cannot be greater than system date. The field is mandatory. |
| Request Reinstate Date | The text for request term date. Choose a date in the format MM/DD/YYYY by clicking calendar icon. The request reinstate date should be the first day of next month. The field is mandatory. |
| Reason for Reinstate | Choose a reason from the drop down list. The field is mandatory. |
| Others | The text for narrating other info, provided the option for reason for reinstate is others |
| Authorized contact | The text for authorized contact. The field is mandatory. |

-continued

| Element | Description |
|---|---|
| | Process Reinstatement |
| Effective Term Date | The text for request term date. Choose a date in the format MM/DD/YYYY by clicking calendar icon. |
| Change Reinstate Status | Choose a status from the drop down list for change reinstate |

Button Functionality

The following table provides explanation for each button in the screen.

| Element | Description |
|---|---|
| Search | Search is performed based on the input |
| Continue | Saves the data and navigates to next screen in the flow of reinstatement. |
| Clear | Clears the contents entered in the fields or restore to the previous state as was before saving the changes |

Employee Reinstatement

The screen is to reinstate an employee.

The sequential steps involved in reinstating an employee are listed below.

Step—1: After successful logon, click the menu Enrollment and select Reinstatement. Then select Employee Reinstatement. (See FIG. C-167)

Step—2: The screen navigates to employee search to select a group. Enter value in any one of the fields, or simply click search button to perform search operation. (See FIG. C-168)

Step—3: This pops a screen with search result. (See FIG. C-169)

Step—4: Click on any employee id for selection. The screen navigates to reinstate request. (See FIG. C-170)

Step—5: Enter the fields with appropriate values as per the format briefed in field's explanation. Click continue.

Step—6: Screen navigates to process reinstate. Enter the details of effective term date and change status and click Continue. (See FIG. C-171)

Step—7: Confirms the reinstate of an employee. (See FIG. C-172)

Step—8: Click Search button to navigate back to Employee Search screen.

Field Explanation

The following table provides explanation for each button in the screen.

| Element | Description |
|---|---|
| | Initiate Employee Reinstatement |
| Reason for Term | Text for reason for term. The field is read only |
| Term Date | Text for termination date. Field is read only. |
| Mode of Request | Choose a mode of request from the drop down list available. The field is mandatory. |
| Post Mark Date | The text for post mark date. Choose a date in the format MM/DD/YYYY by clicking calendar icon. The postmark date cannot be greater than system date. The field is mandatory. |
| Date Received | The text for received date. Choose a date in the format MM/DD/YYYY by clicking calendar icon. The Date Received cannot be greater than system date. The field is mandatory. |
| Request Reinstate Date | The text for request term date. Choose a date in the format MM/DD/YYYY by clicking calendar icon. The request reinstate date should be the first day of next month. The field is mandatory. |
| Reason for Reinstate | Choose a reason from the drop down list. The field is mandatory. |
| Others | The text for narrating other info, provided the option for reason for reinstate is others |
| Authorized contact | The text for authorized contact. The field is mandatory. |
| | Process Reinstatement |
| Effective Term Date | The text for request term date. Choose a date in the format MM/DD/YYYY by clicking calendar icon. |
| Change Reinstate Status | Choose a status from the drop down list for change reinstate |

Button Functionality

The following table provides explanation for each button in the screen.

| Element | Description |
|---|---|
| Search | Search is performed based on the input |
| Continue | Saves the data and navigates to next screen in the flow of termination. |
| Clear | Clears the contents entered in the fields or restore to the previous state as was before saving the changes |

Dependent Reinstatement

The screen is to reinstate a dependent.

The sequential steps involved in reinstating a dependent are listed below.

Step—1: After successful logon, click the menu Enrollment and select Reinstatement. Then select Dependent Reinstatement. (See FIG. C-173)

Step—2: The screen navigates to dependent search to select a group. Enter dependent id or enter first letter of dependent name for search. Click Search button. (See FIG. C-174)

Step—3: This pops a screen with search result. (See FIG. 175)

Step—4: Click on any dependent id for selection. The screen navigates to reinstate request. (See FIG. C-176)

Step—5: Enter the fields with appropriate values as per the format briefed in field's explanation. Click continue.

Step—6: Screen navigates to process reinstate. Enter the details of effective term date and change term status and click Continue. (See FIG. C-177)

Step—7: Confirms the reinstatement of a dependent. (See FIG. C-178)

Step—8: Click search button to go back to Dependent Search screen.

Field Explanation

The following table provides explanation for each button in the screen.

| Element | Description |
|---|---|
| | Initiate Dependent Reinstatement |
| Mode of Request | Choose a mode of request from the drop down list available. The field is mandatory. |
| Post Mark Date | The text for post mark date. Choose a date in the format MM/DD/YYYY by clicking calendar icon. The |

-continued

| Element | Description |
|---|---|
| | postmark date cannot be greater than system date. The field is mandatory. |
| Date Received | The text for received date. Choose a date in the format MM/DD/YYYY by clicking calendar icon. The Date Received cannot be greater than system date. The field is mandatory. |
| Request Reinstate Date | The text for request term date. Choose a date in the format MM/DD/YYYY by clicking calendar icon. The request reinstate date should be the first day of next month. The field is mandatory. |
| Reason for Reinstate | Choose a reason from the drop down list. The field is mandatory. |
| Others | The text for narrating other info, provided the option for reason for reinstate is others |
| Authorized contact | The text for authorized contact. The field is mandatory. |
| | Process Reinstatement |
| Effective Term Date | The text for request term date. Choose a date in the format MM/DD/YYYY by clicking calendar icon. |
| Change Reinstate Status | Choose a status from the drop down list for change reinstate |

Button Functionality

The following table provides explanation for each button in the screen.

| Element | Description |
|---|---|
| Search | Search is performed based on the input |
| Continue | Saves the data and navigates to next screen in the flow of termination. |
| Clear | Clears the contents entered in the fields or restore to the previous state as was before saving the changes |

7 Appeals & Grievances

Appeals and grievance is the transaction module that encompasses the process for the groups and members enrolled with PacAdvantage in the PX2 System to raise appeals and grievance. Appeals and Grievance is the process of maintaining a status for all Appeals and Grievances received from the customer and follow up with the decision made either by PacAdvantage-Roseville or PacAdvantage-SF.

Access

The application can be accessed from the main menu as follows:

Enrollment→Appeals and Grievances→Create
→Modify
→Close

Pre-Requisites

Group and member information must be available in the system for making an appeal or grievance.

Application Functions

This application has the following functions for reinstatement:

Create—to create an appeal & grievance

Modify—to modify an appeal & grievance

Close—to close an appeal & grievance

Create

The screen is to create an appeal and grievance.

The sequential steps involved in creating an appeal & grievance are listed below.

Step—1: After successful logon, click the menu Enrollment and select Appeals & Grievances. Then select Create. (See FIG. C-179)

Step—2: The screen navigates search to select a group or member. Based on the selection the information of group/member will be displayed. Enter value in any one of the fields, or simply click search button to perform search operation. (See FIG. C-180)

Step—3: This pops a screen with search result. (See FIG. C-181)

Step—4: Click on any group/member id for selection. The screen navigates to create grievance. (See FIG. C-182)

Step—5: Enter the fields with appropriate values as per the format briefed in field's explanation. Click continue Step—6: Screen navigates to confirming create grievance. (See FIG. C-183)

Field Explanation

The following table provides explanation for each button in the screen.

| Element | Description |
|---|---|
| | Grievance Information |
| Post Mark Date | The text for post mark date. Choose a date in the format MM/DD/YYYY by clicking calendar icon. The post mark date cannot be greater than system date |
| Date Received | The text for received date. Choose a date in the format MM/DD/YYYY by clicking calendar icon. The post mark date cannot be greater than system date |
| Nature of Grievance | The text for nature of grievance. Choose a type from the drop down list available |
| Subject of Grievance | The text for subject of grievance. Choose a type from the drop down list available |
| Remarks | The text for remarks. Accepts alphabets, numeric and special characters |

Button Functionality

The following table provides explanation for each button in the screen.

| Element | Description |
|---|---|
| Search | Search is performed based on the input |
| Save | Saves the data and navigates to next screen in the flow of creating a grievance |
| Cancel | Clears the contents entered in the fields or restore to the previous state as was before saving the changes |

Modify

The screen is to modify an appeal and grievance.

The sequential steps involved in modifying an appeal & grievance are listed below.

Step—1: After successful logon, click the menu Enrollment and select Appeals & Grievances. Then select Modify. (See FIG. C-184)

Step—2: The screen navigates search to select either by complainant or by grievance. Based on the selection the information of group/member with grievance details will be displayed. Enter group/member/grievance id o for search. Click Search button. (See FIG. C-185)

Step—3: The screen navigates to process grievance Enter the fields with appropriate values as per the format briefed in field's explanation. (See FIG. C-186)

Step—4: Click Save.

Step—5: The screen confirms the modification of grievance. (See FIG. C-187)

Field Explanation

The following table provides explanation for each button in the screen.

| Element | Description |
|---|---|
| | Process Grievance |
| Search by | Choose the option to search by complainant or search by grievance. Based on this option the Either Grievance ID or Complainant ID field will be enabled. |
| Complainant Type | Choose a type of complainant from either group or member |
| Complainant ID | The text for complainant id. Accepts numeric values. |
| Forward for approval | Click this option to have approval |
| Forward To | The text for the person to whom it has to be forwarded |
| Forward Date | The text for forward date. Choose a date in the format MM/DD/YYYY by clicking calendar icon |
| Batch Date | The text for batch date. Choose a date in the format MM/DD/YYYY by clicking calendar icon |
| Additional Remarks | The text for additional remarks. Accepts alphabets, numeric and special characters |

Button Functionality

The following table provides explanation for each button in the screen.

| Element | Description |
|---|---|
| Search | Search is performed based on the input |
| Save | Saves the data and navigates to next screen in the flow of creating a grievance |
| Cancel | Clears the contents entered in the fields or restore to the previous state as was before saving the changes |

Close

The screen is to close an appeal and grievance.

The sequential steps involved in closing an appeal & grievance are listed below.

Step—1: After successful logon, click the menu Enrollment and select Appeals & Grievances. Then select Close. (See FIG. C-188)

Step—2: The screen navigates search to select either by complainant or by grievance. Based on the selection the information of group/member with grievance details will be displayed. Enter group/member/grievance id o or enter first letter of group/member's name for search. Click Search. (See FIG. C-189)

Step—3: The screen navigates to close grievance Enter the fields with appropriate values as per the format briefed in field's explanation. (See FIG. C-190)

Step—4: Click Save.

Step—5: The screen confirms the close of grievance. (See FIG. C-191)

Field Explanation

The following table provides explanation for each button in the screen.

| Element | Description |
|---|---|
| Complainant Type | Choose a type of complainant from either group or member |
| Complainant ID | The text for complainant id. Accepts numeric values |
| Conclusion | Choose a conclusion from the drop down list available |
| Reason | The text for reason. If the reason is others, it will enable the field other reason for entry |
| Other Reason | The text for other reason. Field is enabled only if the option under reasons is others |
| Batch Date | The text for batch date. Choose a date in the format MM/DD/YYYY by clicking calendar icon |

Button Functionality

The following table provides explanation for each button in the screen.

| Element | Description |
|---|---|
| Search | Search is performed based on the input |
| Save | Saves the data and navigates to next screen in the flow of creating a grievance |
| Cancel | Clears the contents entered in the fields or restore to the previous state as was before saving the changes |

8 Carrier Issues

Carrier Issues is the transaction module that encompasses the process for the groups and members enrolled with Pac-Advantage in the PX2 System to raise issues with the carriers. Carrier Issues is the process of maintaining a status for all Carrier Issues received from the customer and follow up with the carrier for resolution and inform the customer of resolution.

Access

The application can be accessed from the main menu as follows:

Enrollment→Carrier Issues→Create

→Modify

→Close

Pre-Requisites

There are no pre-requisites for using this application.

Application Functions

This application has the following functions for reinstatement:

Create—to create carrier issue

Modify—to modify carrier issue

Close—to close carrier issue

Create

The screen is to create carrier issue.

The sequential steps involved in creating carrier issue are listed below.

Step—1: After successful logon, click the menu Enrollment and select Carrier Issues. Then select Create. (See FIG. C-192)

Step—2: The screen navigates search to select a group or member. Based on the selection the information of group/member will be displayed. Enter value in any one of the field or simply click search button to perform search operation. (See FIG. C-193)

Step—3: This pops a screen with search result. (See FIG. C-194)

Step—4: Click on any group/member id for selection. The screen navigates to create carrier issue. (See FIG. C-195)

Step—5: Enter the fields with appropriate values as per the format briefed in field's explanation.

Step—6: Click Save

Step—7: Screen navigates to confirming create carrier issues. (See FIG. C-196)

Field Explanation

The following table provides explanation for each button in the screen.

| Element | Description |
|---|---|
| | Carrier Issue Information |
| Received Date | The text for received date. Choose a date in the format MM/DD/YYYY by clicking calendar icon. |
| Urgent | Click the check box, if it is urgent |
| Carrier | Choose a carrier from the drop down list available |
| Reported Issue | Choose a reported issue from the drop down list available |
| Remarks | The text for remarks. Accepts alphabets, numeric and special characters |

Button Functionality

The following table provides explanation for each button in the screen.

| Element | Description |
|---|---|
| Search | Search is performed based on the input |
| Save | Saves the data and navigates to next screen in the flow of creating carrier issue |
| Cancel | Clears the contents entered in the fields or restore to the previous state as was before saving the changes |

Modify

The screen is to modify carrier issue.

The sequential steps involved in modifying a carrier issue are listed below.

Step—1: After successful logon, click the menu Enrollment and select Carrier Issues. Then select Modify. (See FIG. C-197)

Step—2: The screen navigates search to select either by complainant or by carrier issue. Based on the selection the information of group/member with grievance details will be displayed. Enter the value for either customer id or carrier issue id. The field is mandatory. (See FIG. C-198)

Step—3: Click search. The screen navigates to process carrier issue to modify. (See FIG. C-199)

Step—4: Enter the fields with appropriate values as per the format briefed in field's explanation Step—5: Click Save.

Step—6: The screen confirms the modification of carrier issues. (See FIG. C-200)

Field Explanation

The following table provides explanation for each button in the screen.

| Element | Description |
|---|---|
| Search by | Select search either by client type or by carrier issue type |
| Customer Type | Choose a Customer Type from either group or member. The field is enabled only if the search is selected as client type |
| Customer ID | The text for customer id. Accepts numeric values |
| Carrier Issue ID | The text for carrier issue id. Accepts numeric values. The field is enabled only if the selected type is carrier issue type |
| Notify carrier | Choose an option as yes or no for notifying a carrier |
| Mode of Notification | Choose a mode from the drop down list available |
| Date Notified | The text for notification date. Choose a date in the format MM/DD/YYYY by clicking calendar icon |
| Batch Date | The text for batch date. Choose a date in the format MM/DD/YYYY by clicking calendar icon |

-continued

| Element | Description |
|---|---|
| Additional Remarks | The text for remarks. Accepts alphabets, numeric and special characters |

Button Functionality

The following table provides explanation for each button in the screen.

| Element | Description |
|---|---|
| Search | Search is performed based on the input |
| Save | Saves the data and navigates to next screen in the flow of creating a grievance |
| Cancel | Clears the contents entered in the fields or restore to the previous state as was before saving the changes |

Close

The screen is to close carrier issue.

The sequential steps involved in closing carrier issue are listed below.

Step—1: After successful logon, click the menu Enrollment and select Carrier Issues. Then select Close. (See FIG. C-201)

Step—2: The screen navigates search to select either by customer or by carrier issue. Based on the selection the information of group/member with carrier issue details will be displayed. Enter group/member/carrier issue id for search. The field is mandatory. Click Search. (See FIG. C-202)

Step—3: The screen navigates to close carrier issue Enter the fields with appropriate values as per the format briefed in field's explanation. (See FIG. C-203)

Step—4: Click Save.

Step—5: The screen confirms the close of carrier issue. (See FIG. C-204)

Field Explanation

The following table provides explanation for each button in the screen.

| Element | Description |
|---|---|
| Search by | Select search either by client type or by carrier issue type |
| Customer Type | Choose a Customer Type from either group or member. The field is enabled only if the search is selected as client type |
| Customer ID | The text for customer id. Accepts numeric values with exactly 9 digits |
| Carrier Issue ID | The text for carrier issue id. Accepts numeric values with exactly 9 digits. The field is enabled only if the selected type is carrier issue type |
| Actual Issue | Choose an issue for actual issue from the drop down list available |
| Resolution | Choose a resolution from the drop down list available |
| Retransmission | Click yes or no for retransmission |
| Date Carrier Received | The text for carrier received date. Choose a date in the format MM/DD/YYYY by clicking calendar icon |
| Notify Originator | Click yes or no for notifying originator |
| Batch Date | The text for batch date. Choose a date in the format MM/DD/YYYY by clicking calendar icon |
| Resolution comments | The text for resolution comments. Accepts alphabets, numeric and special characters |

Button Functionality

The following table provides explanation for each button in the screen.

| Element | Description |
|---|---|
| Search | Search is performed based on the input |
| Save | Saves the data and navigates to next screen in the flow of creating a grievance |
| Cancel | Clears the contents entered in the fields or restore to the previous state as was before saving the changes |

9 Add On

Add On is the transaction module that encompasses the process of Adding New Employee or Dependent to the group and or member enrolled with PacAdvantage in the PX2 System.

Access

The application can be accessed from the main menu as follows:

Enrollment→Add On→Employee Add On

→Dependent Add On

Pre-Requisites

Group and the member must be enroll and all their relevant information must be available in the system to Add On Employee and or dependent.

Application Functions

This application has the following functions for reinstatement:

Add Employee—to add employee

Add Dependent—to add dependent

Modify Dependent—to modify employee

Modify Dependent—to modify dependent

Add Employee

The screen is to add an employee.

The sequential steps involved in adding an employee are listed below.

Step—1: After successful logon, click the menu Enrollment and select Add On. Select Employee Add On. Then click Add Employee. (See FIG. C-205)

Step—2: The screen navigates search to select a group. Enter value in any one of the fields, or simply click search button to perform search operation. (See FIG. C-206)

Step—3: This pops up a screen with search result. (See FIG. C-207)

Step—4: Click on any group id for selection. Screen navigates to change request screen for adding an employee.

Field Explanation

The following table provides explanation for each button in the screen.

| Element | Description |
|---|---|
| | Group Information |
| Name of the group | Text for the Name of the Group. Read Only field |
| Effective Date | Text for Employee Effective date. Choose a date by clicking calendar icon. Date accepts the format MM/DD/YYYY. Defaults effective date of the Group. Effective date cannot be past date Read only field |
| Group ID | Text for Group ID. Read only field. |
| Status | Text for status. Read only field |
| Group Type | Text for group type. Read only field. |
| Work Group | Text for work group. Read only field. |
| Mode of Request | Choose a mode of request from the drop down list available |
| Post Mark Date | Text for post mark date. Choose a date by clicking calendar icon. Accepts in the format MM/DD/YYYY Entry to this field is mandatory |
| Received Date | Text for received date. Choose a date by clicking calendar icon. Accepts in the format MM/DD/YYYY. Entry to this field is mandatory. |
| Reasons for Add On | Choose a reason for add on from the drop down list available |
| Others | Text for others. This field is enabled only if the option for reasons for add on is others |

Button Functionality

The following table provides explanation for each button in the screen.

| Element | Description |
|---|---|
| Continue | Saves the entered information and navigates to next screen Employee General Info. |
| Cancel | Clears or restores the content entered in the fields only prior to saving the records |

Step—5: Enter the fields with appropriate values as per the format briefed in field's explanation Step—6: Screen navigates to add employee general information. First and Last name are mandatory other fields are optional. Enter the values in the respective fields, as per the format briefed in field's explanation section. (See FIG. C-209)

Field Explanation

The following table provides explanation for each button in the screen.

| Element | Description |
|---|---|
| | Employee Information |
| Salutation | Choose the salutation from the drop down list of salutations available. |
| First Name | The text for first name. Accepts alphabets and special character like hyphen and single quotes not exceeding 25 characters. First name is mandatory. |
| Middle Initial | The text for middle initial. Accepts alphabets not exceeding 1 character. |
| Last Name | The text for last name Accepts alphabets and special character like hyphen and single quotes not exceeding 35 characters. Last name is mandatory. |
| Suffix | Choose the suffix from the drop down list of suffixes available. |
| Date of Birth | The text for date of birth. Choose a date by clicking calendar icon. Date accepts the format MM/DD/YYYY. Birth date cannot be later than the current date. |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| | Address Information: Physical and Alternate Address - Note: Enter Alternate Address if different from the Physical Address. |
| Street Address | The text for address. Accepts alphanumeric and special characters with values not exceeding 35 characters |

-continued

| Element | Description |
|---|---|
| Apt | The text for suite/apt # . . . Accepts alphanumeric and special characters with values not exceeding 35 characters |
| Zip | The text for zip. Accepts numeric value of either 5 or 9 digits. City, State and County are populated automatically on entering the correct zip code and entering the tab key. |
| City | The text for city. Accepts alphabets and space between two words not exceeding 30 characters. |
| State | Choose the name of the state from the drop down list of States available in United States of America |
| County | Choose the name of the county from the drop down list of States available in United States of America |
| Mode of Correspondence | Choose the mode of correspondence from the drop down list available |
| Phone Number | The text for telephone number of the employee. Accepts numeric values not exceeding 10 digits. The format is (999) 999-9999 |
| Extension | The text for extension number of the employee. Accepts numeric values not exceeding 5 digits |
| Fax | The text for fax number of the employee. Accepts numeric values not exceeding 10 digits. The format is (999) 999-9999 |
| Email | The text for email of the employee. Accepts alphabets, numeric and special characters in the standard email format of length not exceeding 100 characters |

Button Functionality

The following table provides explanation for each button in the screen.

| Element | Description |
|---|---|
| Continue | Saves the data and navigates to coverage information for employees. |
| Cancel | Clears the contents entered in the fields or restore to the previous state as was before saving the changes |
| Enrollment Summary | Click enrollment summary refreshes the screen and display the summary information entered for group creation |
| Missing Information | Click missing information refreshes the screen and displays the missed information. For a successful creation of a group, there should be no missing information |
| Group ID | Click Group ID to navigates to the Group's general info screen. |
| Tab | General Info, Coverage Info, Add Dependent are the tabs visible on this screen. The navigation between the tabs is possible only if there is a valid Employee ID generated and assigned to the employee. Also while navigating through the tab the content that are changed on the screen are not saved unless explicitly saved by other operations on the screen |

Step—7: Screen navigates to coverage information. Even though the fields are optional, enter the values in the respective fields, as per the format briefed in field's explanation section and click Continue. (See FIG. C-210)

Field Explanation

The following table provides explanation for each button in the screen.

| Element | Description |
|---|---|
| | Employee Information |
| Hours worked per week | The text for worked hours per week. Accepts numeric values not exceeding 2 digits. |
| Date of employment | The text for date of employment. Choose a date by clicking calendar icon. Date accepts the format MM/DD/YYYY. |
| Employee type | Choose an employee type from the drop down list available |
| Pay Roll | Check box for Pay Roll verification. Check this if pay roll is verified |
| | Plan Information |
| Line of coverage | Choose a line of coverage from the drop down list available |
| Medical waived | Click the check box for medical waive if the employee is waiving medical. |
| Carrier selection (Benefit level) | Choose a carrier selection from the drop down list available |
| Coverage choice | Choose a coverage from the drop down list available |
| PCP ID/Medical group ID | The text for PCP ID. Accepts alphabets and numeric values not exceeding 10 characters. |
| Are you an existing patient | Click the check box if you are an existing patient |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Prior plan type | Choose a plan type from the drop down list available |
| Prior plan name | Choose a plan name from the drop down list available |
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Other coverage kept | The text for other coverage. Accepts alphabets with values not exceeding 50 characters. |
| Employee signature | Click the check box, to have employee signature |
| Date signed | The text for date signed. Choose a date by clicking calendar icon. Date accepts the format MM/DD/YYYY. Date cannot accept future date. |

Button Functionality

The following table provides explanation for each button in the screen.

| Element | Description |
|---|---|
| Add | Add the contents of employee coverage information. It is only a temporary addition. Becomes permanent only on saving the record. |
| Edit | Edit button will allow for editing a specific record in the table. |
| Update | Update the contents of Plan Information. It is only a temporary update. Becomes permanent only on saving the record. |
| Cancel | Cancels the operation that was currently performed prior to saving the record. |
| Delete | Delete button will delete the records in the table checked for deletion. It is only a temporary deletion. Becomes permanent only on saving the record. |
| Check All | The "Check All" Link will check all the records in the table |
| Clear All | The "Clear All" Link will uncheck all the records in the table that are checked. |
| Enrollment Summary | Click enrollment summary refreshes the screen and display the summary of information entered for group creation |
| Missing Information | Click missing information refreshes the screen and displays the missed information. For a successful creation of a group, there should be no missing information |
| Group ID | Click Group ID to navigates to the Group's general info screen. |
| Continue | Saves the data and navigates to Coverage Information screen. |

-continued

| Element | Description |
|---|---|
| Clear | Clears the contents entered in the fields or restore to the previous state as was before saving the changes |
| Tab | General Info, Coverage Info, Add Dependent are the tabs visible on this screen. The navigation between the tabs are possible only if there is a valid Employee ID generated and assigned to the employee Also while navigating through the tab the content that are changed on the screen are not saved unless explicitly saved by other operations on the screen |

Step—8: Screen navigates to add dependent information. First name and last name fields are mandatory and other fields are optional. Enter the values in the respective fields, as per the format briefed in field's explanation section and click either Enrollment Summary or Add dependent. (See FIG. C-211)

Field Explanation

The following table provides explanation for each button in the screen.

| Element | Description |
|---|---|
| | Dependent Information |
| First Name | The text for first name. Accepts alphabets and special character like hyphen and single quotes not exceeding 25 characters. First name is mandatory. |
| Middle Initial | The text for middle initial. Accepts alphabets not exceeding 1 character. |
| Last Name | The text for last name. Accepts alphabets and special characters like hyphen and single quotes not exceeding 35 characters. Last name is mandatory. |
| Suffix | Choose the suffix from the drop down list of suffixes available. |
| Date of Birth | The text for date of birth. Choose a date by clicking calendar icon. Date accepts the format MM/DD/YYYY. Birth date cannot be later than the current date. |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| Relationship | Choose the relationship from the drop down list available. |
| Street Address | The text for address. Accepts alphanumeric and special characters with values not exceeding 35 characters |
| Suite | The text for suite/apt # . . . Accepts alphanumeric and special characters with values not exceeding 35 characters |
| Zip | The text for zip. Accepts numeric value of either 5 or 9 digits. City, and State are populated automatically on entering the correct zip code and entering the tab key. |
| City | The text for city. Accepts alphabets not exceeding 30 characters. |
| State | Choose the name of the state from the drop down list of States available in United States of America |
| | Line of Coverage |
| Selected carrier | The text for selected carrier. It is a read only field |
| Coverage choice | The text for coverage. It is a read only field |
| Service area | The text for service area. It is a read only field |
| Prior plan type | Choose a plan type from the drop down list available |
| Prior plan | The text for plan name. Accepts alphabets |
| Waived | Click the check box if Line of Coverage is waived. |
| Start date | The text for insurance start date. Choose a date by clicking calendar icon. Date accepts the format MM/DD/YYYY. |
| End date | The text for insurance end date. Choose a date by clicking calendar icon. Date accepts the format MM/DD/YYYY. |
| PCP ID/ | The text for PCP ID. Accepts alphabets and numeric values not exceeding 10 characters. |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Disabled dependent | Click the option of temporary or permanent. This is enable if the relationship opted is child |
| Domestic partner | Click the option for domestic partner. It depends on the value selected in relationship |
| Legal guardian | Click the option for legal guardian. It depends on the value selected in relationship |
| Signature | Click the check box if the signature is opted |

Button Functionality

The following table provides explanation for each button in the screen.

| Element | Description |
|---|---|
| Add Employee | Saves the data and navigates to the screen for adding employees. |
| Add Dependent | Saves the data and navigates to the screen for adding dependent |
| Enrollment Summary | Click enrollment summary refreshes the screen and display the summary of information entered for group creation |
| Missing Information | Click missing information refreshes the screen and displays the missed information. For a successful creation of a group, there should be no missing information |
| Clear | Clears the contents entered in the fields or restore to the previous state as was before saving the changes |
| Tab | General Info, Coverage Info, Add Dependent are the tabs visible on this screen. The navigation between the tabs are possible only if there is a valid Employee ID generated and assigned to the employee Also while navigating through the tab the content that are changed on the screen are not saved unless explicitly saved by other operations on the screen |

Step—9: Clicking enrollment summary button screen navigates to enrollment summary. This screen shows the overall information that is entered will be shown. (See FIG. C-212)

Field Explanation

The following table provides explanation for each element in the screen.

| Element | Description |
|---|---|
| Group Information Header | Contains header information of the Group |
| Name of the Group | Text for the Name of the Group |
| Group ID | Text and Link for the Group ID to navigate to the Group General Info screen |
| Group Type | Specifies the Type of the Group like Small Employer Group |
| Status | Text to specify the status of the group. |
| Work Group | Text for Work Group. This specifies the internal work group attached to the Group. This is based on the writing agent's work group. |
| Enrollment Summary | Enrollment Summary Information is broken down into tree structure. The tree can by expanded or collapsed. |

-continued

| Element | Description |
|---|---|
| Information | The level of the tree is as per the example given below:<br>– Employee<br>– Dependent<br>– Dependent<br>Where (–) signifies expanded view and (+) signifies collapsed view. |
| Employee ID | Text for Employee ID |
| Employee SSN | Text for Employee SSN |
| Employee Name | Text for employee Name (First Name and Last Name) |
| Effective Date | Text for Employee Effective date. Choose a date by clicking calendar icon. Date accepts the format MM/DD/YYYY. Defaults effective date of the Employee. Effective date cannot be past date |
| Status | Text to specify the status of the employee. |
| Element | Description |
| Dependent ID | Text for Dependent ID |
| Dependent SSN | Text for Dependent SSN |
| Dependent Name | Text for Dependent Name (First Name and Last Name) |
| Effective Date | Text for Dependent Effective date. Choose a date by clicking calendar icon. Date accepts the format MM/DD/YYYY. Defaults effective date of the Employee. Effective date cannot be past date |
| Status | Text to specify the status of the Dependent. |

Button Functionality

The following table provides explanation for each button in the screen.

| Element | Description |
|---|---|
| Pre Enrollment | Saves the data and performs validation and eligibility checks against the information required for enrollment and navigates to the screen Missing Information. |
| Cancel | Clears the contents entered in the fields or restore to the previous state as was before saving the changes |

Step—10: Clicking pre enrollment navigates to missing info screen. It gives the information that is left out while entering input for creating a group. For a successful creation of a group the missing information should be empty. (See FIG. C-213)

Field Explanation

The following table provides explanation for each element in the screen.

| Element | Description |
|---|---|
| Group Information Header | Contains header information of the Group |
| Name of the Group | Text for the Name of the Group |
| Group ID | Text and Link for the Group ID to navigate to the Group General Info screen |
| Group Type | Specifies the Type of the Group like Small Employer Group |
| Effective Date | The text for Effective Date. |
| Status | Text to specify the status of the group. |
| Work Group | Text for Work Group. This specifies the internal work group attached to the Group. Internal is based on the writing agent's work group. |
| Tree Structure | Enrollment Missing Information is broken down into tree structure. The tree can by expanded or collapsed. The level of the tree is as per the example given below:<br>– Employee<br>– Dependent<br>– Dependent |

-continued

| Element | Description |
|---|---|
| | Where (–) signifies expanded view and (+) signifies collapsed view. |
| Employee Missing Info | This identifies all the eligibility rules and the information that are incomplete on Employee level for completing the enrollment process. |
| Missing Entities | List the missing entities for the employee. Provides a link to go to the respective screen to fill in the relevant information to complete all the required entries. |
| Message | List the message against each missing entities. |
| Dependent Missing Info | This identifies all the eligibility rules and the information that are incomplete on dependent level for completing the enrollment process. |
| Missing Entities | List the missing entities for the dependent. Provides a link to go to the respective screen to fill in the relevant information to complete all the required entries. |
| Message | List the message against each missing entities. |
| Enrollment Action | Choose from the drop down list the action to be performed for enrollment. Enroll/Decline |
| Remarks | Text for remarks if any. |
| Reasons for Decline | Choose from the drop down list the reasons for decline. |
| Reasons for Other | Text for other reason. If the reason for decline is other than the reasons available. |

Button Functionality

The following table provides explanation for each button in the screen.

| Element | Description |
|---|---|
| Send mail | Click this link to send missing information to the Internal Work Group (GMS representatives) attached to this Group. |
| Preview Invoice | Click this Link to preview the Invoice details prior to generation of invoice. |
| Enroll | Saves the data if there are no missing information and navigates to enrollment confirmation page. |
| Clear | Clears the contents entered in the fields or restore to the previous state as was before saving the changes |
| <<, <, >, >> | The enrollment missing information shows record for 5 employees on single screen. If the employee size increases more than 5. These buttons are used for navigating to the next and previous records for viewing.<br><< - Show first record (s)<br>< - Show previous record (s)<br>> - Show next record (s)<br>>> - Show last record (s) |
| Employee ID | Click Employee ID to navigates to the Employee's general info screen. |
| Preview Invoice | Click Preview Invoice to pop up a new browser window to preview the invoice for the group |

Step—11: On completing all the relevant information that is required for a successful addition of an employee, the following is the sample screen for a successful creation. (See FIG. C-214)

Step—12: Click Search employee to navigate back to Search Employee screen.

Modify Employee

The screen is to modify an employee.

The sequential steps involved in modifying an employee are listed below.

Step—1: After successful logon, click the menu Enrollment and select Add On. Select Employee Add On. Then click Modify Employee. (See FIG. C-215)

Step—2: The screen navigates search to select a group. Enter value in any one of the field or simply click Search button to perform search operation. (See FIG. C-216)

Step—3: This pops up a screen with search result. (See FIG. C-217)

Step—4: Click on any employee id for selection. This navigates to General info of employees. The flow and method of modifying are similar to that of creation, which is explained in Add Employee, vide step 6 through step 11.

Modify Dependent

The screen is to modify a dependent. Here an employee can be added to a group and a dependent to that employee can be modified.

The sequential steps involved in modifying dependent are listed below.

Step—1: After successful logon, click the menu Enrollment and select Add On. Select Employee Add On. Then click Modify Dependent. (See FIG. C-218)

Step—2: The screen navigates search to select a dependent Enter value in any one of the field or simply click Search button to perform search operation. (See FIG. C-219)

Step—3: This pops up a screen with search result. (See FIG. C-220)

Step—4: Click on any employee id for selection. This navigates to Add Dependent of an employee. The flow and method of modifying are similar to that of creation, which is explained in Add Employee, vide step 8 through step 11.

Inactivate Dependent

The screen is to inactivate a dependent.

The sequential steps involved in inactivating dependent are listed below.

Step—1: After successful logon, click the menu Enrollment and select Add On. Select Employee Add On. Then click Inactivate Dependent. (See FIG. C-221)

Step—2: The screen navigates search to select a dependent. Enter value in any one of the field or simply click search button to perform search operation. (See FIG. C-222)

Step—3: This pops up a screen with search result. (See FIG. C-223)

Step—4: Click on any Dependent ID for selection. Screen navigates to Inactivate. (See FIG. C-224)

Step—5 Click Inactivate button, leads to confirmation screen. (See FIG. C-225)

Add Dependent

The screen is to add a dependent.

The sequential steps involved in adding a dependent are listed below.

Step—1: After successful logon, click the menu Enrollment and select Add On. Select Dependent Add On. Then click Add Dependent. (See FIG. C-226)

Step—2: The screen navigates search to select a group/employee Enter value in any one of the field, or simply click search button, to perform search operation. (See FIG. C-227)

Step—3: This pops up a screen with search result. (See FIG. C-228)

Step—4: Click on any employee id for selection. This navigates to change request for add on dependent screen. Enter the fields with appropriate values as per the format briefed in field's explanation. Click Continue. (See FIG. C-229)

Step—5: Screen navigates to Add on Dependent screen. Enter the fields with appropriate values as per the format briefed in field's explanation. Click Enrollment summary. Enrollment summary and missing information are similar to Add Dependent and it is explained under Add Employee vide step 8 through step 11. (See FIG. C-230)

Field Explanation

Refer for field explanations explained in Add Employee

Button Functionality

Refer for field explanations explained in Add Employee

Modify Dependent

The screen is to modify a dependent, where a dependent is added to an already enrolled employee. The process and flow are similar to that of modify dependent under Employee Add on.

The sequential steps involved in modifying dependent are listed below.

Step—1: After successful logon, click the menu Enrollment and select Add On. Select Employee Add On. Then click Modify Dependent. (See FIG. C-231)

Step—2: The screen navigates search to select a dependent Enter value in any one of the field or simply click Search button to perform search operation. (See FIG. C-232)

Step—3: This pops up a screen with search result. (See FIG. C-233)

Step—4: Click on any employee id for selection. This navigates to Add Dependent of an employee. The flow and method of modifying are similar to that of creation, which is explained in Add Employee, vide step 8 through step 11.

10 En-Operations

Enrollment Operation is a utility process for generation various file in the specified output format for transmission to the Carrier, PacAdvantage and Mail House. These operations are Export Membership Data, Export PacAdvantage Data, Export Transmission Data, ROE Process, and ROE Packet Generation.

Access

The application can be accessed from the main menu as follows:

Enrollment→En-Operations→Export Membership Data
→Export PacAdvantage Data
→Export Transmission Data
→ROE Process
→ROE Packet Generation Pre-Requisites All master and transaction records must be available in the system for Enrollment Operation.

Output file format and information for each carrier must be available in the system. Refer "User Manual for Carrier Maintenance" for further information on the output file formats for Carriers (Enrollment Transmission)

Application Functions

This application has the following functions for reinstatement:

Export Membership Data
Export PacAdvantage Data
Export Transmission Data
ROE Process
ROE Packet Generation Export Membership Data The screen is to export membership data.

The sequential steps involved in exporting membership data are listed below.

Step—1: After successful logon, click the menu Enrollment and select EN-Operations. Select Export Membership Data. (See FIG. C-234)

Step—2: The screen navigates to Export Membership Data. (See FIG. C-235)

Step—3: Choose the option of carrier or plan, member status, term effective date and file format and click Export Step—4: Initially the status will be not exported. Once the export button is clicked after filling necessary fields, a new browser window open for downloading the file. (See FIG. C-236)

Step—5: Click "Click here to download" link and then click Ok to download the file Step—6: Click on the Search button navigates to the screen shown below. Enter Export ID and search for the export status. Click on the Export ID link to show the screen with export details or Click back to go back to the export screen. (See FIG. C-237)

Field Explanation

The following table provides explanation for each button in the screen.

| Element | Description |
|---|---|
| Export ID | Read only field to display export id value |
| Status | Read only field to display the status of export. |
| Exported By | Read only field to display the user who exported the files |
| Export Date | Read only field to display the export date |
| Carrier | Choose this option and select from the list if the data export is based on the Carrier |
| Plan | Choose this option and select from the list if the data export is based on the Plan |
| Member Status | Choose from the List the Member status. Member Status can be Active, Termed or Both. The field is mandatory |
| Term Effective Date | Enter the date for Term Effective Date or select a date by clicking calendar icon. The field is mandatory if the Member status option is Termed or Both. |
| File Format | Choose a format from drop down list for output format that should be generated. The field is mandatory |

Button Functionality

The following table provides explanation for each button in the screen.

| Element | Description |
|---|---|
| New | Click on new button enables to have a new Export of files. |
| Export | Click on Export button will perform the action of exporting the files based on selection criteria |
| Search | Click on search button navigates to a screen to have a search on entering Export ID. |
| View Export Log | Click on view export log to have a pop up display showing the status of exported files |
| Hide Export Log | Click on hide export log to hide the pop up display message. |
| Clear | Clears the content and restore the operation that was currently performed prior to saving the record |
| Back | Goes back to Export screen. |

Export PacAdvantage Data

The screen is to export PacAdvantage Data.

The sequential steps involved in exporting PacAdvantage data are listed below.

Step—1: After successful logon, click the menu Enrollment and select EN-Operations. Select Export PacAdvantage Data. (See FIG. C-238)

Step—2: The screen navigates to Export PacAdvantage Data. (See FIG. C-239)

Step—3: Click Export

Step—4: Initially the status will be not exported. Once the export button is clicked, the user has an option to view the status of export process by clicking Search.

Step—5: Click back button to go back to Export. PacAdvantage Data Screen. (See FIG. C-240)

Field Explanation

The following table provides explanation for each button in the screen.

| Element | Description |
|---|---|
| Export ID | Read only field to display export id value |
| Status | Read only field to display the status of export. |
| Exported By | Read only field to display the user who exported the files |
| Export Date | Read only field to display the export date |

Button Functionality

The following table provides explanation for each button in the screen.

| Element | Description |
|---|---|
| New | Click on new button enables to have a new Export of files. |
| Export | Click on Export button will perform the action of exporting the files based on selection criteria |
| Search | Click on search button navigates to a screen to have a search on entering Export ID. |
| View Export Log | Click on view export log to have a pop up display showing the status of exported files |
| Hide Export Log | Click on hide export log to hide the pop up display message. |
| Clear | Clears the content and restore the operation that was currently performed prior to saving the record |
| Back | Goes back to Export PacAdvantage Data screen. |

Export Transmission Data

The screen is to export transmission data.

The sequential steps involved in exporting transmission data are listed below.

Step—1: After successful logon, click the menu Enrollment and select EN-Operations. Select Export Transmission Data. (See FIG. C-241)

Step—2: The screen navigates to Export Transmission Data. (See FIG. C-242)

Step—3: Click Export

Step—4: Initially the status will be not exported. Once the export button is clicked after filling necessary fields, the user has an option to view the status of export process by clicking Search. (See FIG. C-243)

Field Explanation

The following table provides explanation for each button in the screen.

| Element | Description |
|---|---|
| Export ID | Read only field to display export id value |
| Status | Read only field to display the status of export. |
| Exported By | Read only field to display the user who exported the files |
| Export Date | Read only field to display the export date |
| Transmit for the following Date From | Enter the date for Transmit for the following Date From or select a date by clicking calendar icon. The field is mandatory. |

-continued

| Element | Description |
|---|---|
| Transmit for the following Date To | Enter the date for Transmit for the following Date To or select a date by clicking calendar icon. The field is mandatory. |
| Comments | Text to enter Comments if any. |

Button Functionality

The following table provides explanation for each button in the screen.

| Element | Description |
|---|---|
| New | Click on new button enables to have a new Export of files. |
| Export | Click on Export button will perform the action of exporting the files based on selection criteria |
| Search | Click on search button navigates to a screen to have a search on entering Export ID. |
| Back | Goes back to Export Transmission Data screen. |

ROE Process

The screen is to process ROE data.

The sequential steps involved in processing ROE are listed below.

Step—1: After successful logon, click the menu Enrollment and select EN-Operations. Select ROE Process. (See FIG. C-244)

Step—2: The screen navigates to ROE Process. (See FIG. C-245)

Step—3: Click Generate

Field Explanation

The following table provides explanation for each button in the screen.

| Element | Description |
|---|---|
| Run ID | The text for sequential number of Run ID. It is a read only field and is auto generated |
| Renewal Date | The text for Renewal Date during which the ROE/OE process is to be initiated. |
| Run By | The text for name of the user who initiates ROE process. It is a read only field. |

Button Functionality

The following table provides explanation for each button in the screen.

| Element | Description |
|---|---|
| New | Click on New button to start new ROE Process. |
| Generate | Click Generate to Initiate ROE Process. ROE process once initiated for a specific period cannot be re initiated once again. |
| Cancel | Click cancel to reset the fields. |

ROE Packet Generation

The screen is to process ROE Packet Generation.

The sequential steps involved in generating ROE Packets are listed below.

Step—1: After successful logon, click the menu Enrollment and select EN-Operations. Select ROE Packet Generation. (See FIG. C-246)

Step—2: The screen navigates to ROE Packet Generation. Select ROE cycle period and apply filter conditions for Generating ROE/OE packets. (See FIG. C-247)

Step—3: Click Generate

Step—4: Initially the status will be not imported. Once the export button is clicked after filling necessary fields, the user has an option to view the status of export process by clicking Search. (See FIG. C-248) Step 5: Click Back button to go back to ROE Field Explanation The following table provides explanation for each button in the screen.

| Element | Description |
|---|---|
| Export ID | The text for Export ID. This is auto generated by the system |
| Status | The text for Export Status. This is a read only field. The system shows the Export status based on data exported |
| Exported By | The text for Exported By. This is a read only field. |
| Export Date | The text for Export date. This is a read only field. |
| ROE Cycle | Choose the ROE Cycle period for which the ROE/OE packet are to be generated. |
| Post Mark Date | The text for post mark date. Choose a date in the format MM/DD/YYYY by clicking calendar icon. The postmark date cannot be greater than system date. The field is mandatory. |
| Comments | Text to specify comments if any. |
| Selected Groups | The text displays the selected group count based on the ROE Cycle period. Example 0 to 100. It is a read only field |
| Group ID | The text for Group ID. Accepts numeric values only. |
| Group Name | The text for group name. Accepts any characters. |
| Group Type | Choose the group type from the list. |
| Group Size From | The text for group size and specifies the starting range. Accepts numeric values only. |
| Group Size To | The text for group size and specifies the ending range. Accepts numeric values only. |
| View Selected | Check the View Selected Check Box to view only selected groups. |

Button Functionality

The following table provides explanation for each button in the screen.

| Element | Description |
|---|---|
| Filter | Click the Filter to display the Group based on the search criteria/filter conditions provided. |
| Clear Filter | Clear the Content of the fields. |
| Check All | The “Check All” Link will check all the records in the table |
| Clear All | The “Clear All” Link will uncheck all the records in the table that are checked. |
| Check All on this Page | The “Check All on this Page” Link will check all the records in the table on this Page |
| Clear All on this Page | The “Clear All on this Page” Link will uncheck all the records in the table that are checked on this Page. |
| Invert Selection | The Invert Selection Link will invert the selection criteria for the check boxes. I.e. All Check Groups would be unchecked and vice versa. |
| <<, <, >, >> | These buttons are used for navigating to the next and previous records for viewing.<br><< - Show first record(s)<br>< - Show previous record(s)<br>> - Show next record(s)<br>>> - Show last record(s) |
| New | Click New to start new operation on this screen |
| Generate | Click Generate to generate ROE/OE packets for Mail House Transmission. |
| Search | Click Search Button to search the Status of the ROE/OE Packet generation |

-continued

| Element | Description |
|---|---|
| Cancel | Cancels the operation that was currently performed prior to saving the record. |
| Back | Goes back to ROE Transmission screen. |

11 Change

Changes is the transaction module that encompasses the process of accommodating and maintaining all information that is required for Groups ad Members. Change can be done for Groups, COBRA Members, Individual Member, Employee and Dependent.

Access

The application can be accessed from the main menu as follows:

Enrollment→En-Operations→Group Change

→COBRA Change

→Individual Employee Change

→Employee Change

→Dependent Change

Pre-Requisites

Groups and Members must be enrolled and all the relevant information must be available in the system for making changes.

Application Functions

This application has the following functions for reinstatement:

Create New Change Request

Modify Change Request

Group Change Create New Request

The screen is to have an request for any change in Group

The sequential steps involved in change request for group are listed below.

Step—1: After successful logon, click the menu Enrollment and select Change. Select Group change and Create Change Request. (See FIG. C-249)

Step—2: The screen navigates to Group Search screen. Enter any value in one of the field to perform search operation. (See FIG. C-250)

Step—3: This pops up a screen with search result. (See FIG. C-251)

Step—4: Click on any group id for selection the screen navigates to Group Change Request. (See FIG. C-252)

Field Explanation

The following table provides explanation for each button in the screen.

| Element | Description |
|---|---|
| | Group Information |
| Name of the group | Text for the Name of the Group. This is read only field. |
| Effective Date | Text for Effective date. This is read only field. |
| Group ID | Text for Group ID. This is read only field.. |
| Status | Text for status. This is read only field. |
| Group Type | Text for group type. This is read only field.. |
| Work Group | Text for work group. This is read only field.. |
| | General Information |
| Mode of Request | Choose a mode of request from the drop down list available |
| Post Mark Date | Text for post mark date. Choose a date by clicking calendar icon. Accepts in the format MM/DD/YYYY Entry to this field is mandatory |
| Received Date | Text for received date. Choose a date by clicking calendar icon. Accepts in the format MM/DD/YYYY. Entry to this field is mandatory. |
| Reasons for Change | Choose a reason for change from the drop down list available |
| Others | Text for others. This field is enabled only if the option for reasons for change is others |

Button Functionality

The following table provides explanation for each button in the screen.

| Element | Description |
|---|---|
| Continue | Saves the entered information and navigates to next level, which show the pick list for the changes that are sought. |
| Clear | Clears or restores the content entered in the fields as was prior to saving the records. |

Step—5: Choose mode of request, Post mark date, date received and reason for change. Clicks continue. This screen would be available only if there are no change requests pending for the group.

Step—6: Navigates to group changes, which allows the option to pick the changes sought. Check the items that need to be change and click on continue button. This screen is dynamically built to display only those changes that can be performed on the specific group selected. (See FIG. C-253)

Field Explanation

The following table provides explanation for each button in the screen.

| Element | Description |
|---|---|
| | Group Information |
| Name of the group | Text for the Name of the Group. Read Only field |
| Effective Date | Text for Effective date. This is read only field. |
| Group ID | Text for Group ID. This is read only field. |
| Status | Text for status. This is read only field. |
| Group Type | Text for group type. This is read only field. |
| Work Group | Text for work group. This is read only field. |
| | General Information |
| Contact Information1 | Selecting this option will enable to allow for any modifications |
| Contact Information2 | Selecting this option will enable to allow for any modifications |
| Physical Address | Selecting this option will enable to allow for any modifications |
| Billing Address | Selecting this option will enable to allow for any modifications |
| Tax Identification | Selecting this option will enable to allow for any modifications |
| Billing Address | Selecting this option will enable to allow for any modifications |
| | Billing Information |
| Payment information | Selecting this option will enable to allow for any modifications |
| | Agent Information |
| Writing Agent | Selecting this option will enable to allow for any modifications |

-continued

| Element | Description |
|---|---|
| Agent of Record | Selecting this option will enable to allow for any modifications |
| General Agency | Selecting this option will enable to allow for any modifications |
| Coverage Information | |
| RAF | Selecting this option will enable to allow for any modifications |
| Waiting Period | Selecting this option will enable to allow for any modifications |
| Medical LOC | Selecting this option will enable to allow for any modifications |
| Vision LOC | Selecting this option will enable to allow for any modifications |
| Dental LOC | Selecting this option will enable to allow for any modifications |
| CAM LOC | Selecting this option will enable to allow for any modifications |
| Others | Selecting this option will enable to allow for any modifications |

Button Functionality

The following table provides explanation for each button in the screen.

| Element | Description |
|---|---|
| Continue | Saves the data and navigates to General information for groups. |
| Clear | Clears the contents entered in the fields or restore to the previous state as was before saving the changes |

Step—7: On clicking continue, navigates to General Information of group Respective tabs can also clicked to navigate to corresponding screens. Continue would be enabled only if the changes are sought on this screen, else use tab to navigate to the next screen. (See FIG. C-254)

Field Explanation

The following table provides explanation for each button in the screen.

| Element | Description |
|---|---|
| Company Information | |
| Legal Name | The text for name of the group. Accepts alphanumeric and special characters not exceeding 60 characters. Field is mandatory |
| Doing Business As | The text for business nature. Accepts alphanumeric and special characters not exceeding 60 characters. Field is optional |
| Type of Business | Choose the type of business from the drop down list available |
| Tax Identification | The text for tax identification. Accepts numeric values of exactly 9 digits |
| Address Information: Physical and Billing Address - Note: Enter Billing Address if different from the Physical Address. | |
| Street Address | The text for company address. Accepts alphanumeric and special characters not exceeding 35 characters |
| Suite | The text for company suite/apt # Accepts alphanumeric and special characters not exceeding 35 characters |
| Zip | The text for zip. Accepts numeric value of either 5 or 9 digits. City, State and County are populated automatically on entering the correct zip code and entering the tab key. |

-continued

| Element | Description |
|---|---|
| City | The text for city. Accepts alphabets and space between two words not exceeding 30 characters. |
| State | Choose the name of the state from the drop down list of States available in United States of America |
| County | Choose the name of the county from the drop down list of counties available for the ZIP Code entered. |
| Contact Information | |
| Mode of Correspondence | Choose the mode of correspondence from the drop down list available. |
| Contact 1 and Contact 2 - Fill in the relevant for Contact 1 and 2. | |
| Salutation | Choose the salutation from the drop down list of salutations available. |
| First Name | The text for contact name. Accepts alphabets and special characters like hyphen and single quotes not exceeding 25 characters. |
| Middle Initial | The text for middle initial. Accepts alphabets not exceeding 1 character. |
| Last Name | The text for contact name. Accepts alphabets and special characters like hyphen and single quotes not exceeding 35 characters. |
| Suffix | Choose the suffix from the drop down list of suffixes available. |
| Phone Number | The text for telephone number of the contact person. Accepts numeric values of exactly 10 digits. The format is (999) 999-9999 |
| Extension | The text for extension number of the contact person. Accepts numeric values not exceeding 5 digits. |
| Fax | The text for fax number of the contact person. Accepts numeric values of exactly 10 digits. The format is (999) 999-9999 |
| Email | The text for email of the contact person. Accepts alphabets, numeric and special characters in the standard email format of length not exceeding 100 characters |
| Contact Comments | The text for comments. Accepts alphabets, numeric and special characters. Field is optional |

Button Functionality

The following table provides explanation for each button in the screen.

| Element | Description |
|---|---|
| Continue | Saves the data and navigates to Billing Information screen and the system generates Group ID. This is enabled only if changes are sought on this screen. |
| Cancel | Clears the contents entered in the fields or restore to the previous state as was before saving the changes |
| Tabs | General Info, Billing Info, Agent Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen. |

Step—8: On clicking continue, navigates to Billing Information Respective tabs can also clicked to navigate corresponding screens. (See FIG. C-255)

Field Explanation

The following table provides explanation for each button in the screen.

| Element | Description |
|---|---|
| Mode of payment | Choose a mode of payment from the drop down list available. Based on selection corresponding fields will enable to enter the values. For e.g. if the value selected |

-continued

| Element | Description |
|---|---|
| | is card payment, EFT will be disabled and allows only entering card details and vice versa. |
| | Credit Card Information |
| Cardholder's Names | The text for cardholder's name. Accepts alphabets and space between two words. |
| Credit Card Type | Choose the type of credit card from the drop down list available. |
| Credit Card No | The text for credit card number. Accepts numeric values not exceeding 30 digits |
| Expiration Date | Choose a month of expiration from the drop down list available |
| Expiration Year | The text for expiration year. Accepts numeric values of exactly 4. Example 2002. |
| Billing Address | As it appears on the credit Card |
| Street Address | The text for company address. Accepts alphanumeric and special characters not exceeding 35 characters. |
| ZIP | The text for zip. Accepts numeric value of either 5 or 9 digits. |
| State | The text for city. Accepts alphabets and space between two words not exceeding 30 characters. |
| City | Choose the name of the state from the drop down list of States available in United States of America |
| | EFT Information |
| Bank Name | The text for bank name. Accepts alphabets and space between two words. |
| Routing Number | The text for routing number. Accepts numeric values not exceeding 9 digits. |
| Account Number | The text for account number. Accepts numeric values not exceeding 9 digits. |
| Account Type | Choose the type of account from the drop down list available. |
| Depositor's Name | The text for depositor's name. Accepts alphabets and space between two words. |
| | Initial Payment Information |
| Amount Received | The text for amount received. Accepts only numeric values in the format 999999999.99 |
| Date Receive | The text for date received. Choose from the calendar icon in the format MM/DD/YYYY. |
| Check # | The text for check number. Accepts numeric values not exceeding 9 digits. |
| No Check Received | Check the option of no checks received for any non-receipt of checks. |

Button Functionality

The following table provides explanation for each button in the screen.

| Element | Description |
|---|---|
| Continue | Saves the data and Navigates to Agent Information screen. |
| Cancel | Clears the contents entered in the fields or restore to the previous state as was before saving the changes |
| Missing Information | Click missing information refreshes the screen and displays the missed information for the group. |
| Tabs | General Info, Billing Info, Agent Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen. |

Step—9: On clicking continue, navigates to Agent Information. Respective tabs can also clicked to navigate corresponding screens. (See FIG. C-256)

Field Explanation

The following table provides explanation for each button in the screen.

| Element | Description |
|---|---|
| Agent ID | Choose an agent id by clicking search icon |
| Agent Type | Choose an agent type from the drop down list available. Based on the selection of the agent type the percent commission split entry and the Receive ROE packets option would be available. |
| Percent commission split | The text for percent commission. Accepts numeric values in the range of 1-100 (Example 100.00). This will be enabled only if the Agent type selected is "Agent Of Record" Sum of the percentage for all the Agent of Record added should be equal to 100.00. |
| Receive ROE/OE packets | Click the check box to receive ROE/OE packets for agent. This option will not be available for Agent Type "General Agent". |
| Agent Commission | The text for agent commission. Defaults the value defined in CM - rate Administration for Agent Commission. Accepts numeric values less than or equal to the defaulted value in the in the range of 1-100 (Example 4.45) |
| Check the box if the group is without an agent | Click the check box for a group with out an agent. This option will be available only for the Agent Type, "Agent of Record and Writing Agent". |

Button Functionality

The following table provides explanation for each button in the screen.

| Element | Description |
|---|---|
| Add | Add the contents of agent information. It is only a temporary addition. Becomes permanent only on saving the record. |
| Edit | Edit button will allow for editing a specific record in the table. |
| Clear | Clears the contents entered in the fields |
| Update | Update the contents of agent information. It is only a temporary update. Becomes permanent only on saving the record |
| Delete | Delete button will delete the records in the table checked for deletion. It is only a temporary deletion. Becomes permanent only on saving the record |
| Check All | The "Check All" Link will check all the records in the table |
| Clear All | The "Clear All" Link will uncheck all the records in the table that are checked. |
| Missing Information | Click missing information refreshes the screen and displays the missed information. For a successful creation of a group, there should be no missing information |
| Continue | Saves the data and navigates to Coverage Information screen. |
| Cancel | Clears the contents entered in the fields or restore to the previous state as was before saving the changes |
| Tab | General Info, Billing Info, Agent Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen |

Step—10: On clicking continue, navigates to Coverage Information. Respective tabs can also clicked to navigate corresponding screens. (See FIG. C-257)

Field Explanation

The following table provides explanation for each button in the screen.

| Element | Description |
|---|---|
| Hours worked per week | The text for worked hours per week. Accepts numeric values. |
| Date of employment | The text for date of employment. Choose a date by clicking calendar icon. Date accepts the format MM/DD/YYYY. |
| Employee type | Choose an employee type from the drop down list available |
| Line of coverage | Choose a line of coverage from the drop down list available |
| Medical waived | Click the check box for medical waive if the employee is waiving medical. |
| Carrier selection (Benefit level) | Choose a carrier selection from the drop down list available |
| Coverage choice | Choose a coverage from the drop down list available |
| PCP ID/Medical group ID | The text for PCP ID. Accepts alphabets and numeric values not exceeding 10 characters. |
| Are you an existing patient | Click the check box if you are an existing patient |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Prior plan type | Choose a plan type from the drop down list available |
| Prior plan name | Choose a plan name from the drop down list available |
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Other coverage kept | The text for other coverage. Accepts alphabets with values not exceeding 50 characters. |
| RAF | Text to display the RAF applicable for the Individual Association Member. |
| Employee signature | Click the check box, to have employee signature |
| Date signed | The text for date signed. Choose a date by clicking calendar icon. Date accepts the format MM/DD/YYYY. Date cannot accept future date. |

Button Functionality

The following table provides explanation for each button in the screen.

| Element | Description |
|---|---|
| Add | Add the contents of employee coverage information. It is only a temporary addition. Becomes permanent only on saving. |
| Edit | Edit button will allow for editing a specific record in the table. |
| Update | Update the contents of Plan Information. It is only a temporary update. Becomes permanent only on saving. |
| Cancel | Cancels the operation that was currently performed prior to saving the record. |
| Delete | Delete button will delete the records in the table checked for deletion. It is only a temporary deletion. Becomes permanent only on saving. |
| Check All | The "Check All" Link will check all the records in the table |
| Clear All | The "Clear All" Link will uncheck all the records in the table that are checked. |
| Missing Information | Click missing information refreshes the screen and displays the missed information. For a successful creation of a group, there should be no missing information |
| Group ID | Click Group ID to navigates to the Group's general info screen. |
| Continue | Saves the data and navigates to Missing Information screen. |
| Clear | Clears the contents entered in the fields or restore to the previous state as was before saving the changes |

-continued

| Element | Description |
|---|---|
| Tab | General Info, Billing Info, Agent Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen |

Step—11: Clicking change summary button screen navigates to missing info screen. This screen shows the overall information that is entered will be shown. (See FIG. C-258)

Field Explanation

The following table provides explanation for each button in the screen.

| Element | Description |
|---|---|
| Group Missing Information | |
| Missing Entity | List the missing entities for the group change |
| Message | Provides a message for the missing entities |
| Change Information | |
| Change Rule | Specifies the pick list for the changes |
| Change status | Show the change status as incomplete, complete |
| Change confirmation | Choose from the list change status |
| Change Action | Choose from the list of change action |
| Remarks | Text for briefing the change action |

Button Functionality

The following table provides explanation for each button in the screen.

| Element | Description |
|---|---|
| Confirm | Navigates to confirmation screen by incorporating all the changes made |
| Clear | Clears the contents entered in the fields or restore to the previous state as was before saving the changes |

Step—12: Confirms the changes incorporated in-group request. Click Group Change Search to go back to Group Search screen. (See FIG. C-259)

Group Modify Pending Change

The screen is to have an request for any change in Group

The sequential steps involved in change request for group are listed below.

Step—1: After successful logon, click the menu Enrollment and select Change. Select Group change and Modify Pending Change. (See FIG. C-260)

Step—2: The screen navigates to Group Search screen. Enter any value in one of the field to perform search operation. (See FIG. C-261)

Step—3: This pops up a screen with search result. (See FIG. C-262)

Step—4: Navigates to group changes, which allows the option to have changes required. If no option is selected the continue button in respective pages will be disabled and changes cannot be performed. (See FIG. C-263)

Field Explanation

Refer field explanations explained in Create New Change Request under Group Change Button Functionality Refer button functionality explained in Create New Change Request under Group Change.

Step—5: On clicking continue, navigates to General Information of group Respective tabs can also clicked to navigate to corresponding screens. The process and flow for modifying change request is similar to that of create new change request. (See FIG. C-264)

Field Explanation

Refer field explanations explained in Create New Change Request.

Button Functionality

Refer button functionality explained in Create New Change Request.

COBRA Change Create New Request

The screen is to have an request for any change in COBRA

The sequential steps involved in change request for COBRA are listed below.

Step—1: After successful logon, click the menu Enrollment and select Change. Select COBRA change and Create Change Request. (See FIG. C-265)

Step—2: The screen navigates to Employee Search screen. Enter any value in one of the field to perform search operation. (See FIG. C-266)

Step—3: This pops up a screen with search result. (See FIG. C-267)

Step—4: Click on any employee id for selection the screen navigates to Employee change Request. (See FIG. C-268)

Field Explanation

Refer field explanations explained in Create New Change Request

Button Functionality

Refer button functionality explained in Create New Change Request.

Step—5: Screen navigates to employee change (pick list). Select the options to have any modifications, so that the selected screen will enable the continue button. This screen is dynamically built to display only those changes that can be performed on the specific group selected. (See FIG. C-269)

Field Explanation

The following table provides explanation for each button in the screen.

| Element | Description |
|---|---|
| | Group Information |
| Name of the group | Text for the Name of the Group. This is read only field. |
| Effective Date | Text for Effective date. This is read only field. |
| Group ID | Text for Group ID. This is read only field. |
| Status | Text for status. This is read only field. |
| Group Type | Text for group type. This is read only field. |
| Work Group | Text for work group. This is read only field. |
| Employee ID | Text for employee ID This is read only field. |
| Employee Name | Text for employee name. This is read only field |
| | General Information |
| Change in employee address | Selecting this option will enable to allow for any modifications |
| Change SSN information | Selecting this option will enable to allow for any modifications |
| Employee Date of birth | Selecting this option will enable to allow for any modifications |
| Change in employee demographic location | Selecting this option will enable to allow for any modifications |
| | Billing Information |
| Payment Instruction | Selecting this option will enable to allow for any modifications |
| | Coverage Information |
| Medical LOC | Selecting this option will enable to allow for any modifications |
| Vision LOC | Selecting this option will enable to allow for any modifications |
| Dental LOC | Selecting this option will enable to allow for any modifications |
| CAM LOC | Selecting this option will enable to allow for any modifications |
| Hours worked | Selecting this option will enable to allow for any modifications |
| Employee Type | Selecting this option will enable to allow for any modifications |
| Date of employment | Selecting this option will enable to allow for any modifications |

Step—6: On clicking continue, screen navigates to General Info screen. Make any corrections if previously opted in change request, then only continue button will be enabled. Otherwise navigate screens through tabs. (See FIG. C-270)

Field Explanation

The following table provides explanation for each element in the screen.

| Element | Description |
|---|---|
| Group Information Header | Contains header information of the Group |
| Name of the group | Text for the Name of the Group. This is read only field. |
| Effective Date | Text for Effective date. This is read only field. |
| Group ID | Text for Group ID. This is read only field. |
| Status | Text for status. This is read only field. |
| Group Type | Text for group type. This is read only field. |
| Work Group | Text for work group. This is read only field. |
| Employee ID | Text for employee ID This is read only field. |
| Employee Name | Text for employee name. This is read only field |
| | Employee Information |
| Salutation | Choose the salutation from the drop down list of salutations available. This is read only field |
| First Name | The text for first name. Accepts alphabets and special character like hyphen and single quotes not exceeding 25 characters. First name is mandatory. This is read only field |
| Middle Initial | The text for middle initial. Accepts alphabets not exceeding 1 character. This is read only field |
| Last Name | The text for last name. Accepts alphabets and special characters like hyphen and single quotes not exceeding 35 characters. Last name is mandatory. This is read only field |
| Suffix | Choose the Suffix from the drop down list of salutations available This is read only field. |
| Date of Birth | The text for date of birth. Choose a date by clicking calendar icon Allows for modification, as it has been opted for change from the pick up list. |
| Social Security Number | The text for social security number for every individual. This can also be auto generated by clicking auto generate link. Accepts numeric value of exactly 9 digits. Users with User Role as |

-continued

| Element | Description |
|---|---|
| | Level 2 and above can only auto generate SSN. This is read only field |
| Gender | Choose a gender from the drop down list available. This is read only field |
| | Address Information |
| Street Address | The text for address. Accepts alphanumeric and special characters with values not exceeding 35 characters |
| Apt | The text for suite/apt #. Accepts alphanumeric and special characters with values not exceeding 35 characters This is read only field |
| Zip | The text for zip. Accepts numeric value of either 5 or 9 digits. City, State and County are populated automatically on entering the correct zip code and entering the tab key. This is read only field |
| City | The text for city. Accepts alphabets and space between two words not exceeding 30 characters. This is read only field |
| State | Choose the name of the state from the drop down list of States available in United States of America This is read only field |
| County | Choose the name of the county from the drop down list of States available in United States of America This is read only field |
| Mode of Correspondence | Choose the mode of correspondence from the drop down list available This is read only field |
| Phone Number | The text for telephone number of the employee. Accepts numeric values not exceeding 10 digits. The format is (999) 999-9999 This is read only field |
| Extension | The text for extension number of the employee. Accepts numeric values not exceeding 5 digits This is read only field |
| Fax | The text for fax number of the employee. Accepts numeric values not exceeding 10 digits. The format is (999) 999-9999 This is read only field |
| Email | The text for email of the employee. Accepts alphabets, numeric and special characters in the standard email format of length not exceeding 100 characters This is read only field |

Button Functionality

The following table provides explanation for each button in the screen.

| Element | Description |
|---|---|
| Continue | Saves the data and Navigates to Billing Information screen. This is enabled only if changes are sought on this screen |
| Clear | Clears the contents entered in the fields or restore to the previous state as was before saving the changes |
| Missing Information | Click missing information refreshes the screen and displays the missed information for the group. |
| Tabs | General Info, Billing Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen. |

Step—7: On clicking continue, screen navigates to Billing Info. Make any corrections if previously opted in change request, then only continue button will be enabled. Otherwise navigate screens through tabs. (See FIG. C-271)

Field Explanation

The following table provides explanation for each button in the screen.

| Element | Description |
|---|---|
| Mode of payment | Choose a mode of payment from the drop down list available. Based on selection corresponding fields will enable to enter the values. For e.g. if the value selected is card payment, EFT will be disabled and allows only entering card details and vice versa. |
| | Credit Card Information |
| Cardholder's Names | The text for cardholder's name. Accepts alphabets and space between two words. This is read only field |
| Credit Card Type | Choose the type of credit card from the drop down list available. |
| Credit Card No | The text for credit card number. Accepts numeric values not exceeding 30 digits |
| Expiration Date | Choose a month of expiration from the drop down list available |
| Expiration Year | The text for expiration year. Accepts numeric values of exactly 4. Example 2002. |
| Billing Address | As it appears on the credit Card |
| Street Address | The text for company address. Accepts alphanumeric and special characters not exceeding 35 characters. |
| ZIP | The text for zip. Accepts numeric value of either 5 or 9 digits. |
| State | The text for city. Accepts alphabets and space between two words not exceeding 30 characters. |
| City | Choose the name of the state from the drop down list of States available in United States of America |
| | EFT Information |
| Bank Name | The text for bank name Accepts alphabets and space between two words. |
| Routing Number | The text for routing number. Accepts numeric values not exceeding 9 digits. |
| Account Number | The text for account number. Accepts numeric values not exceeding 9 digits. |
| Account Type | Choose the type of account from the drop down list available. |
| Depositor's Name | The text for depositor's name. Accepts alphabets and space between two words. |
| | COBRA Billing Information |
| Send Bills to | Choose the option to send the bills to Group or Sel. |

Button Functionality

The following table provides explanation for each button in the screen.

| Element | Description |
|---|---|
| Continue | Saves the data and Navigates to Coverage Information screen. This is enabled only if changes are sought on this screen |
| Cancel | Clears the contents entered in the fields or restore to the previous state as was before saving the changes |
| Missing Information | Click missing information refreshes the screen and displays the missed information for the group. |
| Tabs | General Info, Billing Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen. |

Step—8: On clicking continue, screen navigates to Coverage Info. Make any corrections if previously opted in change request, then only continue button will be enabled. Otherwise navigate screens through tabs. (See FIG. C-272)

Field Explanation

The following table provides explanation for each button in the screen.

| Element | Description |
|---|---|
| | Plan Information |
| Line of coverage | Choose a line of coverage from the drop down list available |
| Medical waived | Click the check box for medical waive if the employee is waiving medical. |
| Carrier selection (Benefit level) | Choose a carrier selection from the drop down list available |
| Coverage choice | Choose a coverage from the drop down list available |
| PCP ID/Medical group ID | The text for PCP ID. Accepts alphabets and numeric values not exceeding 10 characters. |
| Are you an existing patient | Click the check box if you are an existing patient |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Prior plan type | Choose a plan type from the drop down list available |
| Prior plan name | Choose a plan name from the drop down list available |
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Additional Coverage | The text for additional coverage. Accepts alphabets with values not exceeding 50 characters. |
| Date signed | The text for date signed. Choose a date by clicking calendar icon. Date accepts the format MM/DD/YYYY. Date cannot accept future date. |

Button Functionality

The following table provides explanation for each button in the screen.

| Element | Description |
|---|---|
| Add | Add the contents of employee coverage information. It is only a temporary addition. Becomes permanent only on saving the record. |
| Edit | Edit button will allow for editing a specific record in the table. |
| Update | Update the contents of Plan Information. It is only a temporary update. Becomes permanent only on saving the record. |
| Cancel | Cancels the operation that was currently performed prior to saving the record. |
| Delete | Delete button will delete the records in the table checked for deletion. It is only a temporary deletion. Becomes permanent only on saving the record. |
| Check All | The "Check All" Link will check all the records in the table |
| Clear All | The "Clear All" Link will uncheck all the records in the table that are checked. |
| Missing Information | Click missing information refreshes the screen and displays the missed information. For a successful creation of a group, there should be no missing information |
| Group ID | Click Group ID to navigates to the Group's general info screen. |
| Continue | Saves the data and navigates to Missing Information screen, if it is enabled . . . |
| Clear | Clears the contents entered in the fields or restore to the previous state as was before saving the changes |
| Tab | General Info, Billing Info, Coverage Info, are the tabs visible on this screen. Navigation to the next screen is also possible by using tabs If continue button is disabled use this tab to navigate to the next screen Also while navigating through the tab the content that are changed on the screen are not saved unless explicitly saved by other operations on the screen |

Step—9: On clicking continue, screen navigates to Missing Info. (See FIG. C-273)

Field Explanation

The following table provides explanation for each button in the screen.

| Element | Description |
|---|---|
| | Employee Missing Information |
| Missing Entity | List the missing entities for the group change |
| Message | Provides a message for the missing entities |
| Enrollment Information | Lists all the changes sought in the pick list |
| Status | Displaying the status of change. |
| | Change Information |
| Change Rule | Specifies the pick list for the changes |
| Change status | Show the change status as incomplete, complete |
| Change confirmation | Choose from the list change status |
| Change Action | Choose from the list of change action |
| Remarks | Text for briefing the change action |

Button Functionality

The following table provides explanation for each button in the screen.

| Element | Description |
|---|---|
| Confirm | Navigates to confirmation screen by incorporating all the corrections made |
| Clear | Clears the contents entered in the fields or restore to the previous state as was before saving the changes |

Step—10: After entering the respective fields, click continues, which navigates to confirmation screen. (See FIG. C-274)

COBRA Modify Pending Change

The screen is to have an request for any change in COBRA

The sequential steps involved in change request for COBRA are listed below.

Step—1: After successful logon, click the menu Enrollment and select Change. Select COBRA change and Modify Pending Change. (See FIG. C-275)

Step—2: The screen navigates to Employee Search screen. Enter any value in one of the field to perform search operation. (See FIG. C-276)

Step—3: This pops up a screen with search result. (See FIG. C-277)

Step—4: Navigates to employee changes, which allows the option to have changes required. If no option is selected the continue button in respective pages will be disabled and changes cannot be performed. (See FIG. C-278)

Field Explanation

Refer field explanations explained in Create New Change Request under COBRA Change Button Functionality Refer button functionality explained in Create New Change Request under COBRA Change Step—5: On clicking continue, navigates to General Information of group Respective tabs can also clicked to navigate to corresponding screens. The process and flow for modifying change request is similar to that of create new change request. (See FIG. C-279)

Field Explanation

Refer field explanations explained in Create New Change Request, under COBRA Change Button Functionality Refer button functionality explained in Create New Change Request, under COBRA Change.

Individual Member Change Create New Request

The screen is to have a request for any change in Individual Member

The sequential steps involved in change request for Individual Member are listed below.

Step—1: After successful logon, click the menu Enrollment and select Change. Select Individual Member change and Create Change Request. (See FIG. C-280)

Step—2: The screen navigates to Employee Search screen. Enter any value in one of the field to perform search operation. (See FIG. C-281)

Step—3: This pops up a screen with search result. (See FIG. C-282)

Step—4: Click on any employee id for selection the screen navigates to Employee change Request. (See FIG. C-283)

Field Explanation

Refer field explanations explained in Create New Change Request

Button Functionality

Refer button functionality explained in Create New Change Request.

Step—5: Screen navigates to employee change (pick list). Select the options to have any modifications, so that the selected screen will enable the continue button. (See FIG. C-284)

Field Explanation

The following table provides explanation for each button in the screen.

| Element | Description |
|---|---|
| | Group Information |
| Name of the group | Text for the Name of the Group. This is read only field. |
| Effective Date | Text for Effective date. This is read only field. |
| Group ID | Text for Group ID. This is read only field. |
| Status | Text for status. This is read only field. |
| Group Type | Text for group type. This is read only field. |
| Work Group | Text for work group. This is read only field. |
| Employee ID | Text for employee ID This is read only field. |
| Employee Name | Text for employee name. This is read only field |
| | General Information |
| Change in employee address | Selecting this option will enable to allow for any modifications |
| Change SSN information | Selecting this option will enable to allow for any modifications |

-continued

| Element | Description |
|---|---|
| Employee Date of birth | Selecting this option will enable to allow for any modifications |
| Change in employee demographic location | Selecting this option will enable to allow for any modifications |
| | Billing Information |
| Payment Instruction | Selecting this option will enable to allow for any modifications |
| | Coverage Information |
| Medical LOC | Selecting this option will enable to allow for any modifications |
| Vision LOC | Selecting this option will enable to allow for any modifications |
| Dental LOC | Selecting this option will enable to allow for any modifications |
| CAM LOC | Selecting this option will enable to allow for any modifications |
| Hours worked | Selecting this option will enable to allow for any modifications |
| Employee Type | Selecting this option will enable to allow for any modifications |
| Date of employment | Selecting this option will enable to allow for any modifications |

Step—6: On clicking continue, screen navigates to General Info screen. Make any corrections if previously opted in change request, then only continue button will be enabled. Otherwise navigate screens through tabs. (See FIG. C-285)

Field Explanation

The following table provides explanation for each element in the screen.

| Element | Description |
|---|---|
| Group Information Header | Contains header information of the Group |
| Name of the group | Text for the Name of the Group. This is read only field. |
| Effective Date | Text for Effective date. This is read only field. |
| Group ID | Text for Group ID. This is read only field. |
| Status | Text for status. This is read only field. |
| Group Type | Text for group type. This is read only field. |
| Work Group | Text for work group. This is read only field. |
| Employee ID | Text for employee ID This is read only field. |
| Employee Name | Text for employee name. This is read only field |
| | Employee Information |
| Salutation | Choose the salutation from the drop down list of salutations available. This is read only field |
| First Name | The text for first name. Accepts alphabets and special character like hyphen and single quotes not exceeding 25 characters. First name is mandatory. This is read only field |
| Middle Initial | The text for middle initial. Accepts alphabets not exceeding 1 character. This is read only field |
| Last Name | The text for last name. Accepts alphabets and special characters like hyphen and single quotes not exceeding 35 characters. Last name is mandatory. This is read only field |
| Suffix | Choose the Suffix from the drop down list of salutations available This is read only field. |
| Date of Birth | The text for date of birth. Choose a date by clicking calendar icon Allows for modification, as it has been opted for change from the pick up list. |
| Social Security Number | The text for social security number for every individual. This can also be auto generated by clicking auto generate link. Accepts numeric value of exactly 9 digits. Users with User Role as Level 2 and above can only auto generate SSN. This is read only field |

-continued

| Element | Description |
|---|---|
| Gender | Choose a gender from the drop down list available. This is read only field |
| | Address Information |
| Street Address | The text for address. Accepts alphanumeric and special characters with values not exceeding 35 characters |
| Apt | The text for suite/apt #. Accept alphanumeric and special characters with values not exceeding 35 characters This is read only field |
| Zip | The text for zip. Accepts numeric value of either 5 or 9 digits. City, State and County are populated automatically on entering the correct zip code and entering the tab key. This is read only field |
| City | The text for city. Accepts alphabets and space between two words not exceeding 30 characters. This is read only field |
| State | Choose the name of the state from the drop down list of States available in United States of America This is read only field |
| County | Choose the name of the county from the drop down list of States available in United States of America This is read only field |
| Mode of Correspondence | Choose the mode of correspondence from the drop down list available This is read only field |
| Phone Number | The text for telephone number of the employee. Accepts numeric values not exceeding 10 digits. The format is (999) 999-9999 This is read only field |
| Extension | The text for extension number of the employee. Accepts numeric values not exceeding 5 digits This is read only field |
| Fax | The text for fax number of the employee. Accepts numeric values not exceeding 10 digits. The format is (999) 999-9999 This is read only field |
| Email | The text for email of the employee. Accepts alphabets, numeric and special characters in the standard email format of length not exceeding 100 characters This is read only field |

Button Functionality

The following table provides explanation for each button in the screen.

| Element | Description |
|---|---|
| Continue | Saves the data and Navigates to Billing Information screen. This is enabled only if changes are sought on this screen |
| Cancel | Clears the contents entered in the fields or restore to the previous state as was before saving the changes |
| Missing Information | Click missing information refreshes the screen and displays the missed information for the group. |
| Tabs | General Info, Billing Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen. |

Step—7: On clicking continue, screen navigates to Billing Info. Make any corrections if previously opted in change request, then only continue button will be enabled. Otherwise navigate screens through tabs. (See FIG. C-286)

Field Explanation

The following table provides explanation for each button in the screen.

| Element | Description |
|---|---|
| Mode of payment | Choose a mode of payment from the drop down list available. Based on selection corresponding fields will enable to enter the values. For e.g. if the value selected is card payment, EFT will be disabled and allows only entering card details and vice versa. |
| | Credit Card Information |
| Cardholder's Names | The text for cardholder's name. Accepts alphabets and space between two words. This is read only field |
| Credit Card Type | Choose the type of credit card from the drop down list available. |
| Credit Card No | The text for credit card number. Accepts numeric values not exceeding 30 digits |
| Expiration Date | Choose a month of expiration from the drop down list available |
| Expiration Year | The text for expiration year. Accepts numeric values of exactly 4. Example 2002. |
| Billing Address | As it appears on the credit Card |
| Street Address | The text for company address. Accepts alphanumeric and special characters not exceeding 35 characters. |
| ZIP | The text for zip. Accepts numeric value of either 5 or 9 digits. |
| State | The text for city. Accepts alphabets and space between two words not exceeding 30 characters. |
| City | Choose the name of the state from the drop down list of States available in United States of America |
| | EFT Information |
| Bank Name | The text for bank name. Accepts alphabets and space between two words. |
| Routing Number | The text for routing number. Accepts numeric values not exceeding 9 digits. |
| Account Number | The text for account number. Accepts numeric values not exceeding 9 digits. |
| Account Type | Choose the type of account from the drop down list available. |
| Depositor's Name | The text for depositor's name. Accepts alphabets and space between two words. |

Button Functionality

The following table provides explanation for each button in the screen.

| Element | Description |
|---|---|
| Continue | Saves the data and Navigates to Coverage Information screen. This is enabled only if changes are sought on this screen |
| Cancel | Clears the contents entered in the fields or restore to the previous state as was before saving the changes |

-continued

| Element | Description |
|---|---|
| Missing Information Tabs | Click missing information refreshes the screen and displays the missed information for the group. General Info, Billing Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen. |

Step—8: On clicking continue, screen navigates to Coverage Info. Make any corrections if previously opted in change request, then only continue button will be enabled. Otherwise navigate screens through tabs. (See FIG. C-287)

Field Explanation

The following table provides explanation for each button in the screen.

| Element | Description |
|---|---|
| Employee Information | |
| Hours worked per week | The text for worked hours per week. Accepts numeric values not exceeding 2 digits. |
| Date of employment | The text for date of employment. Choose a date by clicking calendar icon. Date accepts the format MM/DD/YYYY. |
| Employee Type | Choose an Employee Type from the drop down list available |
| RAF Discounting | |
| RAF | List the RAF tier applicable for the group based on the RAF tier available on group's effective date. |
| Plan Information | |
| Line of coverage | Choose a line of coverage from the drop down list available |
| Medical waived | Click the check box for medical waive if the employee is waiving medical. |
| Element | Description |
| Carrier selection (Benefit level) | Choose a carrier selection from the drop down list available |
| Coverage choice | Choose a coverage from the drop down list available |
| PCP ID/Medical group ID | The text for PCP ID. Accepts alphabets and numeric values not exceeding 10 characters. |
| Are you an existing patient | Click the check box if you are an existing patient |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Prior plan type | Choose a plan type from the drop down list available |

-continued

| Element | Description |
|---|---|
| Prior plan name | Choose a plan name from the drop down list available |
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Additional Coverage | The text for additional coverage. Accepts alphabets with values not exceeding 50 characters. |
| Date signed | The text for date signed. Choose a date by clicking calendar icon. Date accepts the format MM/DD/YYYY. Date cannot accept future date. |

Button Functionality

The following table provides explanation for each button in the screen.

| Element | Description |
|---|---|
| Add | Add the contents of employee coverage information. It is only a temporary addition. Becomes permanent only on saving the record. |
| Edit | Edit button will allow for editing a specific record in the table. |
| Update | Update the contents of Plan Information. It is only a temporary update. Becomes permanent only on saving the record. |
| Cancel | Cancels the operation that was currently performed prior to saving the record. |
| Delete | Delete button will delete the records in the table checked for deletion. It is only a temporary deletion. Becomes permanent only on saving the record. |
| Check All | The "Check All" Link will check all the records in the table |
| Clear All | The "Clear All" Link will uncheck all the records in the table that are checked. |
| Missing Information | Click missing information refreshes the screen and displays the missed information. For a successful creation of a group, there should be no missing information |
| Group ID | Click Group ID to navigates to the Group's general info screen. |
| Continue | Saves the data and navigates to Missing Information screen, if it is enabled . . . |
| Clear | Clears the contents entered in the fields or restore to the previous state as was before saving the changes |
| Tab | General Info, Billing Info, Coverage Info, are the tabs visible on this screen. Navigation to the next screen is also possible by using tabs If continue button is disabled use this tab to navigate to the next screen Also while navigating through the tab the content that are changed on the screen are not saved unless explicitly saved by other operations on the screen |

Step—9: On clicking continue, screen navigates to Missing Info. (See FIG. C-288)

Field Explanation

The following table provides explanation for each button in the screen.

| Element | Description |
|---|---|
| | Employee Missing Information |
| Missing Entity | List the missing entities for the group change |
| Message | Provides a message for the missing entities |
| Enrollment Information | Lists all the changes sought in the pick list |
| Status | Displaying the status of change. |
| | Change Information |
| Change Rule | Specifies the pick list for the changes |
| Change status | Show the change status as incomplete, complete |
| Element | Description |
| Change confirmation | Choose from the list change status |
| Change Action | Choose from the list of change action |
| Remarks | Text for briefing the change action |

Button Functionality

The following table provides explanation for each button in the screen.

| Element | Description |
|---|---|
| Confirm | Navigates to confirmation screen by incorporating all the corrections made |
| Clear | Clears the contents entered in the fields or restore to the previous state as was before saving the changes |

Step—10: After entering the respective fields, click continues, which navigates to confirmation screen. (See FIG. C-289)

Individual Member Modify Pending Change

The screen is to have a request for any change in Individual Member

The sequential steps involved in change request for Individual Member are listed below.

Step—1: After successful logon, click the menu Enrollment and select Change. Select Individual Member change and Modify Pending Change. (See FIG. C-290)

Step—2: The screen navigates to Employee Search screen. Enter any value in one of the field to perform search operation. (See FIG. C-291)

Step—3: This pops up a screen with search result. (See FIG. C-292)

Step—4: Navigates to employee changes, which allows the option to have changes required. If no option is selected the continue button in respective pages will be disabled and changes cannot be performed. (See FIG. C-293)

Field Explanation

Refer field explanations explained in Create New Change Request under Individual Change Button Functionality Refer button functionality explained in Create New Change Request under Individual Change Step—5: On clicking continue, navigates to General Information of group Respective tabs can also clicked to navigate to corresponding screens. The process and flow for modifying change request is similar to that of create new change request. (See FIG. C-294)

Field Explanation

Refer field explanations explained in Create New Change Request, under Individual Member Change Button Functionality Refer button functionality explained in Create New Change Request, under Individual Member Change.

Employee Change Create New Request

The screen is to have a request for any change in Employee

The sequential steps involved in change request for Employee are listed below.

Step—1: After successful logon, click the menu Enrollment and select Change. Select Employee change and Create Change Request. (See FIG. C-295)

Step—2: The screen navigates to Employee Search screen. Enter any value in one of the field to perform search operation. (See FIG. C-296)

Step—3: This pops up a screen with search result. (See FIG. C-297)

Step—4: Click on any employee id for selection screen navigates to Employee change Request. (See FIG. C-298)

Field Explanation

Refer field explanations explained in Create New Change Request

Button Functionality

Refer button functionality explained in Create New Change Request.

Step—5: Screen navigates to employee change (pick list). Select the options to have any modifications, so that the selected screen will enable the continue button. (See FIG. C-299)

Field Explanation

The following table provides explanation for each button in the screen.

| Element | Description |
|---|---|
| | Group Information |
| Name of the group | Text for the Name of the Group. This is read only field. |
| Effective Date | Text for Effective date. This is read only field. |
| Group ID | Text for Group ID. This is read only field. |
| Status | Text for status. This is read only field. |
| Group Type | Text for group type. This is read only field. |
| Work Group | Text for work group. This is read only field. |
| Employee ID | Text for employee ID This is read only field. |
| Employee Name | Text for employee name. This is read only field |
| | General Information |
| Change in employee address | Selecting this option will enable to allow for any modifications |
| Change SSN information | Selecting this option will enable to allow for any modifications |
| Employee Date of birth | Selecting this option will enable to allow for any modifications |
| Change in employee demographic location | Selecting this option will enable to allow for any modifications |
| | Billing Information |
| Payment Instruction | Selecting this option will enable to allow for any modifications |
| | Coverage Information |
| Medical LOC | Selecting this option will enable to allow for any modifications |
| Vision LOC | Selecting this option will enable to allow for any modifications |
| Dental LOC | Selecting this option will enable to allow for any modifications |
| CAM LOC | Selecting this option will enable to allow for any modifications |
| Hours worked | Selecting this option will enable to allow for any modifications |
| Employee Type | Selecting this option will enable to allow for any modifications |
| Date of employment | Selecting this option will enable to allow for any modifications |

Step—6: On clicking continue, screen navigates to General Info screen. Make any corrections if previously opted in change request, then only continue button will be enabled. Otherwise navigate screens through tabs. (See FIG. C-300)

Field Explanation

The following table provides explanation for each element in the screen.

| Element | Description |
|---|---|
| Group Information Header | Contains header information of the Group |
| Name of the group | Text for the Name of the Group. This is read only field. |
| Effective Date | Text for Effective date. This is read only field. |
| Group ID | Text for Group ID. This is read only field. |
| Status | Text for status. This is read only field. |
| Group Type | Text for group type. This is read only field. |
| Work Group | Text for work group. This is read only field. |
| Employee ID | Text for employee ID This is read only field. |
| Employee Name | Text for employee name. This is read only field |
| Employee Information | |
| Salutation | Choose the salutation from the drop down list of salutations available. This is read only field |
| First Name | The text for first name. Accepts alphabets and special character like hyphen and single quotes not exceeding 25 characters. First name is mandatory. This is read only field |
| Middle Initial | The text for middle initial. Accepts alphabets not exceeding 1 character. This is read only field |
| Last Name | The text for last name. Accepts alphabets and special characters like hyphen and single quotes not exceeding 35 characters. Last name is mandatory. This is read only field |
| Suffix | Choose the Suffix from the drop down list of salutations available This is read only field. |
| Date of Birth | The text for date of birth. Choose a date by clicking calendar icon Allows for modification, as it has been opted for change from the pick up list. |
| Social Security Number | The text for social security number for every individual. This can also be auto generated by clicking auto generate link. Accepts numeric value of exactly 9 digits. Users with User Role as Level 2 and above can only auto generate SSN. This is read only field |
| Gender | Choose a gender from the drop down list available. This is read only field |
| Address Information | |
| Street Address | The text for address. Accepts alphanumeric and special characters with values not exceeding 35 characters |
| Apt | The text for suite/apt # . . . Accepts alphanumeric and special characters with values not exceeding 35 characters This is read only field |
| Zip | The text for zip. Accepts numeric value of either 5 or 9 digits. City, State and County are populated automatically on entering the correct zip code and entering the tab key. This is read only field |
| City | The text for city. Accepts alphabets and space between two words not exceeding 30 characters. This is read only field |
| State | Choose the name of the state from the drop down list of States available in United States of America This is read only field |
| County | Choose the name of the county from the drop down list of States available in United States of America This is read only field |
| Mode of Corre-spondence | Choose the mode of correspondence from the drop down list available This is read only field |
| Phone Number | The text for telephone number of the employee. Accepts numeric values not exceeding 10 digits. The format is (999) 999-9999 This is read only field |

-continued

| Element | Description |
|---|---|
| Extension | The text for extension number of the employee. Accepts numeric values not exceeding 5 digits This is read only field |
| Fax | The text for fax number of the employee. Accepts numeric values not exceeding 10 digits. The format is (999) 999-9999 This is read only field |
| Email | The text for email of the employee. Accepts alphabets, numeric and special characters in the standard email format of length not exceeding 100 characters This is read only field |

Button Functionality

The following table provides explanation for each button in the screen.

| Element | Description |
|---|---|
| Continue | Saves the data and Navigates to Coverage Information screen. This is enabled only if changes are sought on this screen |
| Cancel | Clears the contents entered in the fields or restore to the previous state as was before saving the changes |
| Missing Information | Click missing information refreshes the screen and displays the missed information for the group. |
| Tabs | General Info, Billing Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen. |

Step—7: On clicking continue, screen navigates to Coverage Info. Make any corrections if previously opted in change request, then only continue button will be enabled. Otherwise navigate screens through tabs. (See FIG. C-301)

Field Explanation

The following table provides explanation for each button in the screen.

| Element | Description |
|---|---|
| Employee Information | |
| Hours worked per week | The text for worked hours per week. Accepts numeric values not exceeding 2 digits. |
| Date of employment | The text for date of employment. Choose a date by clicking calendar icon. Date accepts the format MM/DD/YYYY. |
| Employee Type | Choose an Employee Type from the drop down list available |
| Plan Information | |
| Line of coverage | Choose a line of coverage from the drop down list available |
| Medical waived | Click the check box for medical waive if the employee is waiving medical. |
| Carrier selection (Benefit level) | Choose a carrier selection from the drop down list available |
| Coverage choice | Choose a coverage from the drop down list available |
| PCP ID/Medical group ID | The text for PCP ID. Accepts alphabets and numeric values not exceeding 10 characters. |

-continued

| Element | Description |
|---|---|
| Are you an existing patient | Click the check box if you are an existing patient |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Prior plan type | Choose a plan type from the drop down list available |
| Prior plan name | Choose a plan name from the drop down list available |
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Additional Coverage | The text for additional coverage. Accepts alphabets with values not exceeding 50 characters. |
| Date signed | The text for date signed. Choose a date by clicking calendar icon. Date accepts the format MM/DD/YYYY. Date cannot accept future date. |

Button Functionality

The following table provides explanation for each button in the screen.

| Element | Description |
|---|---|
| Add | Add the contents of employee coverage information. It is only a temporary addition. Becomes permanent only on saving the record. |
| Edit | Edit button will allow for editing a specific record in the table. |
| Update | Update the contents of Plan Information. It is only a temporary update. Becomes permanent only on saving the record. |
| Cancel | Cancels the operation that was currently performed prior to saving the record. |
| Delete | Delete button will delete the records in the table checked for deletion. It is only a temporary deletion. Becomes permanent only on saving the record. |
| Check All | The “Check All” Link will check all the records in the table |
| Clear All | The “Clear All” Link will uncheck all the records in the table that are checked. |
| Missing Information | Click missing information refreshes the screen and displays the missed information. For a successful creation of a group, there should be no missing information |
| Group ID | Click Group ID to navigates to the Group’s general info screen. |
| Continue | Saves the data and navigates to Missing Information screen, if it is enabled . . . |
| Clear | Clears the contents entered in the fields or restore to the previous state as was before saving the changes |
| Tab | General Info, Billing Info, Coverage Info, are the tabs visible on this screen. Navigation to the next screen is also possible by using tabs If continue button is disabled use this tab to navigate to the next screen Also while navigating through the tab the content that are changed on the screen are not saved unless explicitly saved by other operations on the screen |

Step—8: On clicking continue, screen navigates to Missing Info. (See FIG. C-302)

Field Explanation

The following table provides explanation for each button in the screen.

| Element | Description |
|---|---|
| Employee Missing Information | |
| Missing Entity | List the missing entities for the group change |
| Message | Provides a message for the missing entities |
| Enrollment Information | Lists all the changes sought in the pick list |
| Status | Displaying the status of change. |
| Change Information | |
| Change Rule | Specifies the pick list for the changes |
| Change status | Show the change status as incomplete, complete |
| Change confirmation | Choose from the list change status |
| Change Action | Choose from the list of change action |
| Remarks | Text for briefing the change action |

Button Functionality

The following table provides explanation for each button in the screen.

| Element | Description |
|---|---|
| Confirm | Navigates to confirmation screen by incorporating all the corrections made |
| Clear | Clears the contents entered in the fields or restore to the previous state as was before saving the changes |

Step—9: After entering the respective fields, click continues, which navigates to confirmation screen. (See FIG. C-303)

Employee Modify Pending Change

The screen is to have a request for any change in Employee

The sequential steps involved in change request for Employee are listed below.

Step—1: After successful logon, click the menu Enrollment and select Change. Select Employee change and Modify Pending Change. (See FIG. C-304)

Step—2: The screen navigates to Employee Search screen. Enter any value in one of the field to perform search operation. (See FIG. C-305)

Step—3: This pops up a screen with search result. (See FIG. C-306)

Step—4: Navigates to employee changes, which allows the option to have changes required. If no option is selected the continue button in respective pages will be disabled and changes cannot be performed. (See FIG. C-307)

Field Explanation

Refer field explanations explained in Create New Change Request under Employee Change Button Functionality Refer button functionality explained in Create New Change Request under Employee Change Step—5: On clicking continue, navigates to General Information of group Respective tabs can also clicked to navigate to corresponding screens. The process and flow for modifying change request is similar to that of create new change request. (See FIG. C-308)

Field Explanation

Refer field explanations explained in Create New Change Request, under Employee Change Button Functionality Refer button functionality explained in Create New Change Request, under Employee Change.

Dependent Change Create New Request

The screen is to have a request for any change in Dependent

The sequential steps involved in change request for Dependent are listed below.

Step—1: After successful logon, click the menu Enrollment and select Change. Select Dependent change and Create Change Request. (See FIG. C-309)

Step—2: The screen navigates to Dependent Search screen. Enter any value in one of the field to perform search operation. (See FIG. C-310)

Step—3: This pops up a screen with search result. (See FIG. C-311)

Step—4: Click on any dependent id for selection the screen navigates to Dependent change Request. (See FIG. C-312)

Field Explanation

Refer field explanations explained in Create New Change Request

Button Functionality

Refer button functionality explained in Create New Change Request.

Step—5: Screen navigates to employee change (pick list). Select the options to have any modifications, so that the selected screen will enable the continue button. (See FIG. C-313)

Field Explanation

The following table provides explanation for each button in the screen.

| Element | Description |
|---|---|
| **Group Information** | |
| Name of the group | Text for the Name of the Group. This is read only field. |
| Effective Date | Text for Effective date. This is read only field. |
| Group ID | Text for Group ID. This is read only field.. |
| Status | Text for status. This is read only field. |
| Group Type | Text for group type. This is read only field. |
| Work Group | Text for work group. This is read only field. |
| Dependent ID | Text for Dependent ID This is read only field. |
| Dependent Name | Text for Dependent name. This is read only field |
| **General Information** | |
| Change in Dependent address | Selecting this option will enable to allow for any modifications |
| Change SSN information | Selecting this option will enable to allow for any modifications |
| Dependent Date of birth | Selecting this option will enable to allow for any modifications |
| Change in Dependent demographic location | Selecting this option will enable to allow for any modifications |
| Dependent Relationship | Selecting this option will enable to allow for any modifications |

-continued

| Element | Description |
|---|---|
| **Coverage Information** | |
| Change in Plan information | Selecting this option will enable to allow for any modifications |

Step—6: On clicking continue, screen navigates to Dependent Change screen. Make any corrections if previously opted in change request, then only continue button will be enabled. Otherwise navigate screens through tabs. (See FIG. C-314)

Field Explanation

The following table provides explanation for each element in the screen.

| Element | Description |
|---|---|
| Group Information Header | Contains header information of the Group |
| Name of the group | Text for the Name of the Group. This is read only field. |
| Effective Date | Text for Effective date. This is read only field. |
| Group ID | Text for Group ID. This is read only field.. |
| Status | Text for status. This is read only field. |
| Group Type | Text for group type. This is read only field. |
| Work Group | Text for work group. This is read only field. |
| Dependent ID | Text for Dependent ID This is read only field. |
| Dependent Name | Text for Dependent name. This is read only field |
| **Dependent Information** | |
| First Name | The text for first name. Accepts alphabets and special character like hyphen and single quotes not exceeding 25 characters. First name is mandatory. This is read only field |
| Middle Initial | The text for middle initial. Accepts alphabets not exceeding 1 character. This is read only field |
| Last Name | The text for last name. Accepts alphabets and special characters like hyphen and single quotes not exceeding 35 characters. Last name is mandatory. This is read only field |
| Suffix | Choose the Suffix from the drop down list of salutations available This is read only field. |
| Date of Birth | The text for date of birth. Choose a date by clicking calendar icon Allows for modification, as it has been opted for change from the pick up list. |
| Social Security Number | The text for social security number for every individual. This can also be auto generated by clicking auto generate link. Accepts numeric value of exactly 9 digits. Users with User Role as Level 2 and above can only auto generate SSN. This is read only field |
| Gender | Choose a gender from the drop down list available. This is read only field |
| Street Address | The text for address. Accepts alphanumeric and special characters with values not exceeding 35 characters |
| Apt | The text for suite/apt # . . . Accepts alphanumeric and special characters with values not exceeding 35 characters This is read only field |
| Zip | The text for zip. Accepts numeric value of either 5 or 9 digits. City, State and County are populated automatically on entering the correct zip code and entering the tab key. This is read only field |
| City | The text for city. Accepts alphabets and space between two words not exceeding 30 characters. This is read only field |
| State | Choose the name of the state from the drop down list of States available in United States of America This is read only field |
| Relationship | Choose the relationship from the drop down list available. This is read only field |

Button Functionality

The following table provides explanation for each button in the screen.

| Element | Description |
|---|---|
| Change Summary | Saves the data and Navigates to Change Summary Information screen. |
| Cancel | Clears the contents entered in the fields or restore to the previous state as was before saving the changes |
| Missing Information | Click missing information refreshes the screen and displays the missed information for the group. |

Step—7: On clicking continue, screen navigates to Missing Info. (See FIG. C-315)

Field Explanation

The following table provides explanation for each button in the screen.

| Element | Description |
|---|---|
| Dependent Missing Information | |
| Missing Entity | List the missing entities for the group change |
| Message | Provides a message for the missing entities |
| Enrollment Information | Lists all the changes sought in the pick list |
| Status | Displaying the status of change. |
| Change Information | |
| Change Rule | Specifies the pick list for the changes |
| Change status | Show the change status as incomplete, complete |
| Change confirmation | Choose from the list change status |
| Change Action | Choose from the list of change action |
| Remarks | Text for briefing the change action |

Button Functionality

The following table provides explanation for each button in the screen.

| Element | Description |
|---|---|
| Confirm | Navigates to confirmation screen by incorporating all the corrections made |
| Cancel | Clears the contents entered in the fields or restore to the previous state as was before saving the changes |

Step—8: after entering the respective fields, click continues, which navigates to confirmation screen. (See FIG. C-316)

Step—9: Click Dependent Search to navigate back to Dependent Search screen.

Dependent Modify Request Change

The screen is to have a request for any change in Dependent

The sequential steps involved in change request for Dependent are listed below.

Step—1: After successful logon, click the menu Enrollment and select Change. Select Dependent change and Modify Change Request. (See FIG. C-317)

Step—2: The screen navigates to Dependent Search screen. Enter any value in one of the field to perform search operation. (See FIG. C-318)

Step—3: This pops up a screen with search result. (See FIG. C-319)

Step—4: Navigates to Dependent changes, which allows the option to have changes required. If no option is selected the continue button in respective pages will be disabled and changes cannot be performed. (See FIG. C-320)

Step—5: On clicking continue, navigates to Dependent Change. The process and flow for modifying change request is similar to that of create new change request. (See FIG. C-321)

Step—6: On clicking continue, screen navigates to Missing Info. (See FIG. C-322)

Field Explanation

The following table provides explanation for each button in the screen.

| Element | Description |
|---|---|
| Dependent Missing Information | |
| Missing Entity | List the missing entities for the group change |
| Message | Provides a message for the missing entities |
| Enrollment Information | Lists all the changes sought in the pick list |
| Status | Displaying the status of change. |
| Change Information | |
| Change Rule | Specifies the pick list for the changes |
| Change status | Show the change status as incomplete, complete |
| Change confirmation | Choose from the list change status |
| Change Action | Choose from the list of change action |
| Remarks | Text for briefing the change action |

Button Functionality

The following table provides explanation for each button in the screen.

| Element | Description |
|---|---|
| Confirm | Navigates to confirmation screen by incorporating all the corrections made |
| Cancel | Clears the contents entered in the fields or restore to the previous state as was before saving the changes |

Step—7: After entering the respective fields, click continues, which navigates to confirmation screen. (See FIG. C-323)

Step—8: Click Dependent Search to navigate back to Dependent Search screen.

Field Explanation

Refer field explanations explained in Create New Change Request, under Dependent Change Button Functionality Refer button functionality explained in Create New Change Request, under Dependent Change

12 ROE/OE

ROE is the transaction module that encompasses the process of Re-qualification and open enrollment for Group and Members enrolled with PacAdvantage in the PX2 System. ROE (Re-qualification and open enrollment) is the process of Re-qualifying the Group and Members on their anniversary. Once a year, on the anniversary date of a group's enrollment in PacAdvantage, the group's participation, contribution and qualification is reviewed. This review is to ensure that the group meets the qualification requirement.

OE (Open Enrollment) is the process during the anniversary of the group wherein the group has the privilege to make the changes to the plan, waiting period etc that were earlier not open for changes.

Access

The application can be accessed from the main menu as follows:

Enrollment→ROE→Group Enrollment

→Employee Enrollment

→Dependent Enrollment

→Individual Member

→COBRA

→Manual ROE

Pre-Requisites

The Process ROE operation should be initiated prior to making the ROE/OE changes to the Groups and Members.

Group and the member must be enroll and all their relevant information must be available in the system in order to accomplish the task for ROE/OE.

Application Functions

This application has the following functions for reinstatement:

Modify—to modify group, employee, dependent, individual enrollment entries

Group Enrollment

The screen is to modify group enrollment

The sequential steps involved in modifying group enrollment are listed below.

Step—1: After successful logon, click the menu Enrollment and select ROE. Select Group Enrollment. Then click Process Group. (See FIG. C-324)

Step—2: The screen navigates search to select a group. Enter value in any one of the field, or simply click search button to perform search operation. (See FIG. C-325)

Step—3: This pops up a screen with search result. (See FIG. C-326)

Step—4: Click on any Group ID for selection. Screen navigates to change request screen for making ROE/OE changes for a group. (See FIG. C-327)

Field Explanation

The following table provides explanation for each button in the screen.

| Element | Description |
|---|---|
| Group General Information | |
| Contact Information | Selecting this option will enable to allow for any modifications |
| Address Information | Selecting this option will enable to allow for any modifications |
| Tax Identification | Selecting this option will enable to allow for any modifications |
| Demographic location | Selecting this option will enable to allow for any modifications |
| Billing Information | |
| Billing Information | Selecting this option will enable to allow for any modifications |
| Agent Information | |
| Agent Information | Selecting this option will enable to allow for any modifications |
| Coverage Information | |
| RAF Discounting | Selecting this option will enable to allow for any modifications |
| Workers Compensation Flag | Selecting this option will enable to allow for any modifications |
| TEFRA flag | Selecting this option will enable to allow for any modifications |
| 1099 Flag | Selecting this option will enable to allow for any modifications |
| Domestic Partner Support flag | Selecting this option will enable to allow for any modifications |
| COBRA Support flag | Selecting this option will enable to allow for any modifications |
| Part time support flag | Selecting this option will enable to allow for any modifications |
| Waiting period information | Selecting this option will enable to allow for any modifications |
| Medical LOC | Selecting this option will enable to allow for any modifications |
| Vision LOC | Selecting this option will enable to allow for any modifications |
| Dental LOC | Selecting this option will enable to allow for any modifications |
| CAM LOC | Selecting this option will enable to allow for any modifications |

Button Functionality

The following table provides explanation for each button in the screen.

| Element | Description |
|---|---|
| Continue | Saves the data and navigates to General information for groups. |
| Clear | Clears the contents entered in the fields or restore to the previous state as was before saving the changes |

Step—5: On clicking continue, navigates to General Information of group Respective tabs can also clicked to navigate to corresponding screens. Continue would be enabled only if the changes are sought on this screen, else use tab to navigate to the next screen. (See FIG. C-328)

Field Explanation

The following table provides explanation for each button in the screen.

| Element | Description |
|---|---|
| Company Information | |
| Legal Name | The text for name of the group. Accepts alphanumeric and special characters not exceeding 60 characters. Field is mandatory |
| Doing Business As | The text for business nature. Accepts alphanumeric and special characters not exceeding 60 characters. Field is optional |
| Type of Business | Choose the type of business from the drop down list available |
| Tax Identification | The text for tax identification. Accepts numeric values of exactly 9 digits |
| Address Information: Physical and Billing Address - Note: Enter Billing Address if different from the Physical Address. | |
| Street Address | The text for company address. Accepts alphanumeric and special characters not exceeding 35 characters |
| Suite | The text for company suite/apt # Accepts alphanumeric and special characters not exceeding 35 characters |
| Zip | The text for zip. Accepts numeric value of either 5 or 9 digits. City, State and County are populated automatically on entering the correct zip code and entering the tab key. |
| City | The text for city. Accepts alphabets and space between two words not exceeding 30 characters. |
| State | Choose the name of the state from the drop down list of States available in United States of America |

-continued

| Element | Description |
|---|---|
| County | Choose the name of the county from the drop down list of counties available for the ZIP Code entered. |
| Contact Information | |
| Mode of Correspondence | Choose the mode of correspondence from the drop down list available. |
| Contact 1 and Contact 2 - Fill in the relevant for Contact 1 and 2. | |
| Salutation | Choose the salutation from the drop down list of salutations available. |
| First Name | The text for contact name. Accepts alphabets and special characters like hyphen and single quotes not exceeding 25 characters. |
| Middle Initial | The text for middle initial. Accepts alphabets not exceeding 1 character. |
| Last Name | The text for contact name. Accepts alphabets and special characters like hyphen and single quotes not exceeding 35 characters. |
| Suffix | Choose the suffix from the drop down list of suffixes available. |
| Phone Number | The text for telephone number of the contact person. Accepts numeric values of exactly 10 digits. The format is (999) 999-9999 |
| Extension | The text for extension number of the contact person. Accepts numeric values not exceeding 5 digits. |
| Fax | The text for fax number of the contact person. Accepts numeric values of exactly 10 digits. The format is (999) 999 - 9999 |
| Email | The text for email of the contact person. Accepts alphabets, numeric and special characters in the standard email format of length not exceeding 100 characters |
| Contact Comments | The text for comments. Accepts alphabets, numeric and special characters. Field is optional |

Button Functionality

The following table provides explanation for each button in the screen.

| Element | Description |
|---|---|
| Continue | Saves the data and navigates to Billing Information screen and the system generates Group ID. This is enabled only if changes are sought on this screen |
| Cancel | Clears the contents entered in the fields or restore to the previous state as was before saving the changes |
| Tabs | General Info, Billing Info, Agent Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen. |

Step—6: On clicking continue, navigates to Group Billing Information of group Respective tabs can also clicked to navigate to corresponding screens. Continue would be enabled only if the changes are sought on this screen, else use tab to navigate to the next screen. Enter the values in the respective fields, as per the format briefed in field's explanation section and click Continue. (See FIG. C-329)

Field Explanation

The following table provides explanation for each button in the screen.

| Element | Description |
|---|---|
| Mode of payment | Choose a mode of payment from the drop down list available. Based on selection corresponding fields will enable to enter the values. For e.g. if the value selected is card payment, EFT will be disabled and allows only entering card details and vice versa. |
| Credit Card Information | |
| Cardholder's Names | The text for cardholder's name. Accepts alphabets and space between two words. |
| Credit Card Type | Choose the type of credit card from the drop down list available. |
| Credit Card No | The text for credit card number. Accepts numeric values not exceeding 30 digits |
| Expiration Date | Choose a month of expiration from the drop down list available |
| Expiration Year | The text for expiration year. Accepts numeric values of exactly 4. Example 2002. |
| Billing Address As it appears on the credit Card | |
| Street Address | The text for company address. Accepts alphanumeric and special characters not exceeding 35 characters. |
| ZIP | The text for zip. Accepts numeric value of either 5 or 9 digits. |
| State | The text for city. Accepts alphabets and space between two words not exceeding 30 characters. |
| City | Choose the name of the state from the drop down list of States available in United States of America |
| EFT Information | |
| Bank Name | The text for bank name. Accepts alphabets and space between two words. |
| Routing Number | The text for routing number. Accepts numeric values not exceeding 9 digits. |
| Account Number | The text for account number. Accepts numeric values not exceeding 9 digits. |
| Account Type | Choose the type of account from the drop down list available. |
| Depositor's Name | The text for depositor's name. Accepts alphabets and space between two words. |
| Initial Payment Information | |
| Amount Received | The text for amount received. Accepts only numeric values in the format 999999999.99 |
| Date Receive | The text for date received. Choose from the calendar icon in the format MM/DD/YYYY. |
| Check # | The text for check number. Accepts numeric values not exceeding 9 digits. |
| No Check Received | Check the option of no checks received for any non-receipt of checks. |

Button Functionality

The following table provides explanation for each button in the screen.

| Element | Description |
|---|---|
| Continue | Saves the data and Navigates to Agent Information screen. This is enabled only if changes are sought on this screen |
| Cancel | Clears the contents entered in the fields or restore to the previous state as was before saving the changes |
| Enrollment Summary | Click enrollment summary refreshes the screen and display the summary of information entered for group. |
| Missing Information | Click missing information refreshes the screen and displays the missed information for the group. |
| Tabs | General Info, Billing Info, Agent Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen. |

Step—7: On clicking continue, navigates to Group Agent Information of group Respective tabs can also clicked to navigate to corresponding screens. Continue would be enabled only if the changes are sought on this screen, else use tab to navigate to the next screen. (See FIG. C-330)

Field Explanation

The following table provides explanation for each element in the screen.

| Element | Description |
|---|---|
| Agent ID | Choose an agent id by clicking search icon |
| Agent Type | Choose an agent type from the drop down list available. Based on the selection of the agent type the percent commission split entry and the Receive ROE packets option would be available. |
| Percent commission split | The text for percent commission. Accepts numeric values in the range of 1-100 (Example 100.00). This will be enabled only if the Agent type selected is "Agent Of Record" Sum of the percentage for all the Agent of Record added should be equal to 100.00. |
| Receive ROE/OE packets | Click the check box to receive ROE/OE packets for agent. This option will not be available for Agent Type "General Agent". |
| Agent Commission | The text for agent commission. Defaults the value defined in CM – rate Administration for Agent Commission. Accepts numeric values less than or equal to the defaulted value in the in the range of 1-100 (Example 4.45) |
| Check the box if the group is without an agent | Click the check box for a group with out an agent. This option will be available only for the Agent Type, "Agent of Record and Writing Agent". |

Button Functionality

The following table provides explanation for each button in the screen.

| Element | Description |
|---|---|
| Add | Add the contents of agent information. It is only a temporary addition. Becomes permanent only on saving the record. |
| Edit | Edit button will allow for editing a specific record in the table. |
| Update | Update the contents of agent information. It is only a temporary update. Becomes permanent only on saving the record |
| Delete | Delete button will delete the records in the table checked for deletion. It is only a temporary deletion. Becomes permanent only on saving the record |
| Check All | The "Check All" Link will check all the records in the table |
| Clear All | The "Clear All" Link will uncheck all the records in the table that are checked. |
| Enrollment Summary | Click enrollment summary refreshes the screen and display the summary of information entered for group creation |
| Missing Information | Click missing information refreshes the screen and displays the missed information. For a successful creation of a group, there should be no missing information |
| Continue | Saves the data and navigates to Coverage Information screen. This is enabled only if changes are sought on this screen |
| Cancel | Clears the contents entered in the fields or restore to the previous state as was before saving the changes |
| Tab | General Info, Billing Info, Agent Info, Coverage Info are the tabs visible on this screen. Navigation to the next screen is also possible by using tabs If continue button is disabled use this tab to navigate to the next screen.. Also while navigating through the tab the content that are changed on the screen are not saved unless explicitly saved by other operations on the screen |

Step—8: On clicking continue, navigates to Group Coverage Information of group Respective tabs can also clicked to navigate to corresponding screens. Continue would be enabled only if the changes are sought on this screen, else use tab to navigate to the next screen. (See FIG. C-331)

Field Explanation

The following table provides explanation for each button in the screen

| Element | Description |
|---|---|
| Waiting Period Information | |
| Employee Type | Choose an Employee Type from the drop down list available |
| Waiting Period | Choose a waiting period from the drop down list available |
| RAF Discounting | |
| RAF | List the RAF tier applicable for the group based on the RAF tier available on group's effective date. |
| Contribution | |
| Line of Coverage elected | Choose a line of coverage from the drop down list available |
| Contribution For | Choose a contribution for from the drop down list available. Contribution can be for an employee or dependent. |
| Contribution Type | Choose a contribution type from the drop down list available. List the contribution type "% Lowest Cost HMO", "% Lowest Cost Plan", "% Specified Plan", "Flat $ Amount". On Selecting % Specified Plan the page would get refreshed and the Plan Name for the Specified LOC would be populated in the Drop Down List "Plan Name" |
| Contribution Amount | The text for contribution amount. Accepts numeric values in the format 99999999.99 for flat $ amount and for the rest of the option it accepts as % value say 100.00 |
| Plan Name | Choose a plan name from the drop down list available if the Contribution Type selected is "% Specified Plan". |
| Current Group Insurer | Choose a group insurer from the drop down list available |
| Whether group legally required to provide workers compensation coverage | Click the option yes or no |
| Workers compensation carrier name | Choose a compensation carrier name from the drop down list available |
| Number of Employees (Full time and part time) | The text for total number of employees including full time and part time. Accepts numeric values |
| Number of full time employees at the time of application | The text for number of full time employees at the time of applying. Accepts numeric values |
| Number of eligible employees at the time of application | The text for number of eligible employees at the time of applying. Accepts numeric values |
| Number of employee applying | The text for number of employees at the time of applying. Accepts numeric values |
| Have you employed 20 or more employees for 20 or | Click the option yes or no |

-continued

| Element | Description |
| --- | --- |
| more weeks during the current or preceding year (TEFRA) | |
| Have you employed 20 or more employees during at least 50% of the preceding calendar year (COBRA) | Click the option yes or no |
| Are you offering coverage to employees working more 20-29 hours per week | Click the option yes or no |
| Are you offering coverage to domestic partners | Click the option yes or no |

Button Functionality

The following table provides explanation for each button in the screen

| Element | Description |
| --- | --- |
| Add (Waiting Period Information) | Add the contents of Waiting Period information. It is only a temporary addition. Becomes permanent only on saving the record. |
| Add (Contribution) | Add the contents of Contribution and Coverage elected. It is only a temporary addition. Becomes permanent only on saving the record. |
| Update (Waiting Period Information) | Updates the contents of Waiting Period information. It is only a temporary update. Becomes permanent only on saving the record. |
| Update (Contribution) | Update the contents of Contribution and Coverage elected. It is only a temporary update. Becomes permanent only on saving the record. |
| Edit | Edit button will allow for editing a specific record in the table. |
| Delete | Delete button will delete the records in the table checked for deletion. It is only a temporary deletion. Becomes permanent only on saving the record. |
| Check All | The "Check All" Link will check all the records in the table |
| Clear All | The "Clear All" Link will uncheck all the records in the table that are checked. |
| Enrollment Summary | Click enrollment summary refreshes the screen and display the summary information entered for group creation |
| Missing Information | Click missing information refreshes the screen and displays the missed information. For a successful creation of a group, there should be no missing information |
| View Missing Info | Saves the data and navigates to Missing Information Page |
| Save & Create New Group | Saves the data entered and navigates to the screen Group Hierarchy for creating New Group. |
| Cancel | Clears or restores the content entered in the fields only prior to saving the records. |
| Tab | General Info, Billing Info, Agent Info, Coverage Info are the tabs visible on this screen. The navigation between tabs is possible only if there is a valid group ID generated and assigned to the group. Also while navigating through the tab the content that are changed on the screen are not saved unless explicitly saved by other operations on the screen |

Step—9: On clicking Enrollment Summary, screen navigates to Summary screen. (See FIG. C-332)

Field Explanation

The following table provides explanation for each button in the screen.

| Element | Description |
| --- | --- |
| Total Full Time Applied (A) | Value is shown based on the actual full time employee applied (System Identified) |
| Total part Time Applied (B) | Value is shown based on the actual part time employee applied (System Identified) |
| Employee Waived (C) | Text to enter Employee Waived. Contains only whole number. Accepts numbers not exceeding 5 digits. Manually entered based on verification. |
| Employee Declined (D) | Text to enter Employee Declined. Contains only whole number. Accepts numbers not exceeding 5 digits. Manually entered based on verification. |
| Total Eligible Employee (E) = | Text to display total eligible employee. Employee Applying is sum total of A + B + D. |
| Total Employee Applying (F) | Text to display total employee applying. Employee Applying is sum total of A + B. |
| % Participation Based on Info Provided | Test to display % participation. Participation is % of E/F |
| Total Full Time Applied (A) | Text for Total Full Time Applied. Based on the information provide on the Coverage Info screen |
| Total part Time Applied (B) | Text for Total Part Time Applied. Based on the information provide on the Coverage Info screen |
| Total Employees Applied | Text to display total employee applied. Employee Applied is sum total of A + B |
| Total Full Time Applied (A) | Value is shown based on the actual full time employee applied (System Identified) |

Step—10: On clicking continue, navigates to Missing Info screen. (See FIG. C-333)

Field Explanation

The following table provides explanation for each button in the screen.

| Element | Description |
| --- | --- |
| Employee Missing Information | |
| Missing Entity | List the missing entities for the group change |
| Message | Provides a message for the missing entities |
| Enrollment Information | Lists all the changes sought in the pick list |
| Status | Displaying the status of change. |
| Dependent Missing Information | |
| Missing Entity | List the missing entities for the group change |
| Message | Provides a message for the missing entities |
| Enrollment Information | Lists all the changes sought in the pick list |
| Status | Displaying the status of change. |
| Change Information | |
| ROE/OE Status | Specifies the pick list for the changes |
| Remarks | Text for briefing the change action |
| Reason for Decline | Choose from the list of reasons for decline. This field is enabled only if the status of ROE/OE is opted as decline |
| Others | Text for briefing the other status and description |

Button Functionality

The following table provides explanation for each button in the screen.

| Element | Description |
| --- | --- |
| Finalize | Navigates to confirmation screen by incorporating all the corrections made |

-continued

| Element | Description |
|---|---|
| Clear | Clears the contents entered in the fields or restore to the previous state as was before saving the changes |

Step—11: On clicking Finalize, navigates to confirmation screen. (See FIG. C-334)

Employee Enrollment

The screen is to modify employee enrollment

The sequential steps involved in modifying employee enrollment are listed below.

Step—1: After successful logon, click the menu Enrollment and select ROE/OE Select Employee Enrollment. Then click Process Employee. (See FIG. C-335)

Step—2: The screen navigates search to select an employee. Enter value in any one of the field or simply click Search button to perform search operation. (See FIG. C-336)

Step—3: This pops up a screen with search result. (See FIG. C-337)

Step—4: Click on any Employee ID for selection. Screen navigates to change request screen for making ROE/OE changes for an employee. (See FIG. C-338)

Field Explanation

The following table provides explanation for each button in the screen.

| Element | Description |
|---|---|
| | Group Information |
| Name of the group | Text for the Name of the Group. Read Only field |
| Effective Date | Text for Employee Effective date. This is read only field. |
| Group ID | Text for Group ID. This is read only field. |
| Status | Text for status. This is read only field. |
| Group Type | Text for group type. This is read only field. |
| Work Group | Text for work group. This is read only field. |
| Employee ID | Text for Employee ID. This is read only field. |
| Employee Name | Text for Employee Name. This is read only field. |
| | Employee General Information Changes |
| Employee Date of Birth | Selecting this option will enable to allow for any modifications. |
| Employee Address | Selecting this option will enable to allow for any modifications |
| Employee SSN | Selecting this option will enable to allow for any modifications |
| Employee Demographic Information | Selecting this option will enable to allow for any modifications |
| | Employee Coverage Information Changes |
| Payroll | Selecting this option will enable to allow for any modifications |
| Employee Type | Selecting this option will enable to allow for any modifications |
| Medical LOC | Selecting this option will enable to allow for any modifications |
| Vision LOC | Selecting this option will enable to allow for any modifications |
| Dental LOC | Selecting this option will enable to allow for any modifications |
| CAM LOC | Selecting this option will enable to allow for any modifications |

Button Functionality

The following table provides explanation for each button in the screen.

| Element | Description |
|---|---|
| Continue | Saves the data and navigates to General information for employees. This is enabled only if changes are sought on this screen |
| Cancel | Clears the contents entered in the fields or restore to the previous state as was before saving the changes |

Step—5: On selecting the options for changes click Continue. Screen navigates to Employee General Information screen. (See FIG. C-339)

Field Explanation

The following table provides explanation for each button in the screen.

| Element | Description |
|---|---|
| | Employee Information |
| Salutation | Choose the salutation from the drop down list of salutations available. |
| First Name | The text for contact name. Accepts alphabets and special characters like hyphen and single quotes not exceeding 25 characters. |
| Middle Initial | The text for middle initial. Accepts alphabets not exceeding 1 character. |
| Last Name | The text for contact name. Accepts alphabets and special characters like hyphen and single quotes not exceeding 35 characters. |
| Suffix | Choose the suffix from the drop down list of suffixes available. |
| Date of Birth | The text for date of birth. Choose a date by clicking calendar icon. Date accepts the format MM/DD/YYYY. Birth date cannot be later than the current date. |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| | Address Information |
| Street Address | The text for address. Accepts alphanumeric and special characters with values not exceeding 35 characters |
| Apt | The text for suite/apt #. Accepts alphanumeric and special characters with values not exceeding 35 characters |
| Zip | The text for zip. Accepts numeric value of either 5 or 9 digits. City, State and County are populated automatically on entering the correct zip code and entering the tab key. |
| City | The text for city. Accepts alphabets and space between two words not exceeding 30 characters. |
| State | Choose the name of the state from the drop down list of States available in United States of America |
| County | Choose the name of the county from the drop down list of States available in United States of America |
| Mode of Correspondence | Choose the mode of correspondence from the drop down list available |
| Phone Number | The text for telephone number of the employee. Accepts numeric values not exceeding 10 digits. The format is (999) 999-9999 |
| Extension | The text for extension number of the employee. Accepts numeric values not exceeding 5 digits |

-continued

| Element | Description |
|---|---|
| Fax | The text for fax number of the employee. Accepts numeric values not exceeding 10 digits. The format is (999) 999-9999 |
| Email | The text for email of the employee. Accepts alphabets, numeric and special characters in the standard email format of length not exceeding 100 characters |

Button Functionality

The following table provides explanation for each button in the screen.

| Element | Description |
|---|---|
| Continue | Saves the data and navigates to Coverage information for employees. This is enabled only if changes are sought on this screen |
| Cancel | Clears the contents entered in the fields or restore to the previous state as was before saving the changes |
| Tab | General Info, Coverage Info, are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen |

Step—6: After making any changes in the fields as explained in the field explanation, click Continue. Screen navigates to employee Coverage Info screen. (See FIG. C-340)

Field Explanation

The following table provides explanation for each button in the screen.

| Element | Description |
|---|---|
| | Employee Information |
| Hours worked per week | The text for worked hours per week. Accepts numeric values not exceeding 2 digits. |
| Date of employment | The text for date of employment. Choose a date by clicking calendar icon. Date accepts the format MM/DD/YYYY. |
| Employee type | Choose an employee type from the drop down list available |
| | Plan Information |
| Line of coverage | Choose a line of coverage from the drop down list available |
| Medical waived | Click the check box for medical waive if the employee is waiving medical. |
| Carrier selection (Benefit level) | Choose a carrier selection from the drop down list available |
| Coverage choice | Choose a coverage from the drop down list available |
| PCP ID/Medical group ID | The text for PCP ID. Accepts alphabets and numeric values not exceeding 10 characters. |
| Are you an existing patient | Click the check box if you are an existing patient |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |

-continued

| Element | Description |
|---|---|
| Prior plan type | Choose a plan type from the drop down list available |
| Prior plan name | Choose a plan name from the drop down list available |
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Other coverage kept | The text for other coverage. Accepts alphabets with values not exceeding 50 characters. |
| Employee signature | Click the check box, to have employee signature |
| Date signed | The text for date signed. Choose a date by clicking calendar icon. Date accepts the format MM/DD/YYYY. Date cannot accept future date. |

Button Functionality

The following table provides explanation for each button in the screen.

| Element | Description |
|---|---|
| Add | Add the contents of employee coverage information. It is only a temporary addition. Becomes permanent only on saving the record. |
| Edit | Edit button will allow for editing a specific record in the table. |
| Update | Update the contents of Plan Information. It is only a temporary update. Becomes permanent only on saving the record. |
| Delete | Delete button will delete the records in the table checked for deletion. It is only a temporary deletion. Becomes permanent only on saving the record. |
| Check All | The “Check All” Link will check all the records in the table |
| Clear All | The “Clear All” Link will uncheck all the records in the table that are checked. |
| Enrollment Summary | Click enrollment summary refreshes the screen and display the summary of information entered for group creation |
| Missing Information | Click missing information refreshes the screen and displays the missed information. For a successful creation of a group, there should be no missing information |
| Group ID | Click Group ID to navigates to the Group’s general info screen. |
| Continue | Saves the data and navigates to Missing Information screen, if it is enabled. |
| Cancel | Clears the contents entered in the fields or restore to the previous state as was before saving the changes |
| Tab | General Info, Coverage Info, are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen |

Step—7: After entering the fields as per the field details explained in field explanation. Click Continue. Screen navigates to Enrollment Summary. (See FIG. C-341)

Field Explanation

The following table provides explanation for each element in the screen.

| Element | Description |
|---|---|
| Group Information Header | Contains header information of the Group |
| Name of the Group | Text for the Name of the Group |
| Group ID | Text and Link for the Group ID to navigate to the Group General Info screen |
| Group Type | Specifies the Type of the Group like Small Employer Group |
| Proposed Effective Date | The text for Proposed Effective Date. Choose a date by clicking calendar icon. Date accepts the format MM/DD/YYYY. Default effective date is first of the following month. Effective date cannot be past date |
| Status | Text to specify the status of the group. |
| Work Group | Text for Work Group. This specifies the internal work group attached to the Group. This is based on the writing agent's work group. |
| Enrollment Summary Information | Enrollment Summary Information is broken down into tree structure. The tree can by expanded or collapsed. The level of the tree is as per the example given below:<br>– Employee<br>  – Dependent<br>  – Dependent<br>– Employee<br>  – Dependent<br>– Employee<br>+ Employee<br>– Employee<br>  + Dependent<br>+– Employee<br>Where (–) signifies expanded view and (+) signifies collapsed view. |
| Employee ID | Text for Employee ID |
| Employee SSN | Text for Employee SSN |
| Employee Name | Text for employee Name (First Name and Last Name) |
| Effective Date | Text for Employee Effective date. Choose a date by clicking calendar icon. Date accepts the format MM/DD/YYYY. Defaults effective date of the Group. Effective date cannot be past date |
| Status | Text to specify the status of the employee. |
| Enrollment Information Entered based on verification | There are two part of this information:<br>3) Entered based on verification<br>4) Based on the information provide on the Coverage Info screen |
| Total Full Time Applied (A) | Value is shown based on the actual full time employee applied (System Identified) |
| Total part Time Applied (B) | Value is shown based on the actual part time employee applied (System Identified) |
| Employee Waived (C) | Text to enter Employee Waived. Contains only whole number. Accepts numbers not exceeding 5 digits. Manually entered based on verification. |
| Employee Declined (D) | Text to enter Employee Declined. Contains only whole number. Accepts numbers not exceeding 5 digits. Manually entered based on verification. |
| Total Eligible Employee (E) = | Text to display total eligible employee. Employee Applying is sum total of A + B + D. |
| Total Employee Applying (F) | Text to display total employee applying. Employee Applying is sum total of A + B. |
| % Participation Based on Info Provided | Test to display % participation. Participation is % of E/F |
| Total Full Time Applied (A) | Text for Total Full Time Applied. Based on the information provide on the Coverage Info screen |
| Total part Time Applied (B) | Text for Total Part Time Applied. Based on the information provide on the Coverage Info screen |
| Total Employees Applied | Text to display total employee applied. Employee Applied is sum total of A + B |

Button Functionality

The following table provides explanation for each button in the screen.

| Element | Description |
|---|---|
| Pre Enrollment | Saves the data and performs validation and eligibility checks against the information required for enrollment and navigates to the screen Missing Information. |
| Clear | Clears the contents entered in the fields or restore to the previous state as was before saving the changes |
| <<, <. >, >> | The enrollment summary shows record for 5 employees on single screen. If the employee size increases more than 5. These buttons are used for navigating to the next and previous records for viewing.<br><< - Show first record(s)<br>< - Show previous record(s)<br>> - Show next record(s)<br>>> - Show last record(s) |
| Group ID | Click Group ID to navigates to the Group's general info screen. |

Step—8: On clicking Pre-Enrollment, screen navigates to missing info. (See FIG. C-342)

Field Explanation

The following table provides explanation for each button in the screen.

| Element | Description |
|---|---|
| Employee Missing Information | |
| Missing Entity | List the missing entities for the group change |
| Message | Provides a message for the missing entities |
| Enrollment Information | Lists all the changes sought in the pick list |
| Status | Displaying the status of change. |
| Dependent Missing Information | |
| Missing Entity | List the missing entities for the group change |
| Message | Provides a message for the missing entities |
| Enrollment Information | Lists all the changes sought in the pick list |
| Status | Displaying the status of change. |
| Change Information | |
| ROE/OE Status | Specifies the pick list for the changes |
| Remarks | Text for briefing the change action |
| Reason for Decline | Choose from the list of reasons for decline. This field is enabled only if the status of ROE/OE is opted as decline |
| Others | Text for briefing the other status and description |

Button Functionality

The following table provides explanation for each button in the screen.

| Element | Description |
|---|---|
| Finalize | Navigates to confirmation screen by incorporating all the corrections made |
| Cancel | Clears the contents entered in the fields or restore to the previous state as was before saving the changes |

Step—9: On clicking Finalize, navigates to confirmation screen. Click continue to navigate back to Group search irrespective of process, as the process is being carried out for a group. (See FIG. C-343)

Dependent Enrollment

The screen is to modify dependent enrollment

The sequential steps involved in modifying dependent enrollment are listed below.

Step—1: After successful logon, click the menu Enrollment and select ROE. Select Dependent Enrollment. Then click Modify. (See FIG. C-344)

Step—2: The screen navigates search to select an dependent. Enter the search criteria for Searching for the dependent. (See FIG. C-345)

Step—3: This pops up a screen with search result. (See FIG. C-346)

Step—4: Click on any Dependent ID for selection. Screen navigates to change request screen for making ROE/OE changes for an employee. (See FIG. C-347)

Field Explanation

The following table provides explanation for each button in the screen.

| Element | Description |
|---|---|
| Group Information | |
| Name of the group | Text for the Name of the Group. Read Only field |
| Effective Date | Text for Employee Effective date. This is read only field. |
| Group ID | Text for Group ID. This is read only field. |
| Status | Text for status. This is read only field. |
| Group Type | Text for group type. This is read only field. |
| Work Group | Text for work group. This is read only field. |
| Employee ID | Text for Employee ID. This is read only field. |
| Employee Name | Text for Employee Name. This is read only field. |
| Dependent ID | Text for Dependent ID. This is read only field. |
| Dependent Name | Text for Dependent Name. This is read only field. |
| Dependent General Information Changes | |
| Dependent to waive Vision Plan Information | Selecting this option will enable to allow for any modifications. |
| Dependent to waive Dental Plan Information | Selecting this option will enable to allow for any modifications |
| Dependent to waive Medical Plan Information | Selecting this option will enable to allow for any modifications |
| Prior Plan Information | Selecting this option will enable to allow for any modifications |
| Dependent Address Information | Selecting this option will enable to allow for any modifications |
| Dependent SSN | Selecting this option will enable to allow for any modifications |
| Dependent Relationship | Selecting this option will enable to allow for any modifications |
| Dependent Date of Birth | Selecting this option will enable to allow for any modifications |
| Dependent Personal Information | Selecting this option will enable to allow for any modifications |

Button Functionality

The following table provides explanation for each button in the screen.

| Element | Description |
|---|---|
| Continue | Saves the data and navigates to Dependent General information for employees. |
| Cancel | Clears the contents entered in the fields or restore to the previous state as was before saving the changes |

Step—5: On clicking continue, navigates to Dependent General Information screen. Respective tabs can also clicked to navigate to corresponding screens. If any other tabs like Coverage or General Info, or if Enrollment summary, Cancel is disabled, due to non-selection of changes sought, use missing information link to navigate to the missing info screen. (See FIG. C-348)

Field Explanation

The following table provides explanation for each button in the screen.

| Element | Description |
|---|---|
| Dependent Information | |
| Salutation | Choose the salutation from the drop down list of salutations available. |
| First Name | The text for contact name. Accepts alphabets and special characters like hyphen and single quotes not exceeding 25 characters. |
| Middle Initial | The text for middle initial. Accepts alphabets not exceeding 1 character. |
| Last Name | The text for contact name. Accepts alphabets and special characters like hyphen and single quotes not exceeding 35 characters. |
| Suffix | Choose the suffix from the drop down list of suffixes available. |
| Date of Birth | The text for date of birth. Choose a date by clicking calendar icon. Date accepts the format MM/DD/YYYY. Birth date cannot be later than the current date. |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| Address Information | |
| Street Address | The text for address. Accepts alphanumeric and special characters with values not exceeding 35 characters |
| Apt | The text for suite/apt #. Accepts alphanumeric and special characters with values not exceeding 35 characters |
| Zip | The text for zip. Accepts numeric value of either 5 or 9 digits. City, State and County are populated automatically on entering the correct zip code and entering the tab key. |
| City | The text for city. Accepts alphabets and space between two words not exceeding 30 characters. |
| State | Choose the name of the state from the drop down list of States available in United States of America |
| Line of Coverage Information [For Medical, Vision, Dental] | |
| Selected Product | Text for the product selected. It is a read only field. |
| Coverage Choice | Choose a coverage from the drop down list available |
| Waived | Click the check box for any waive. |
| Service Area | The text for service area. |
| PCP ID/Medical group ID | The text for PCP ID. Accepts alphabets and numeric values not exceeding 10 characters. |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |

-continued

| Element | Description |
|---|---|
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Other coverage kept | The text for other coverage. Accepts alphabets with values not exceeding 50 characters. |
| Additional Coverage | The text for additional coverage. Accepts alphabets with values not exceeding 50 characters. |
| Disabled dependent | Click the option of temporary or permanent. This is enable if the relationship opted is child |
| Domestic partner | Click the option for domestic partner. It depends on the value selected in relationship |
| Legal guardian | Click the option for legal guardian. It depends on the value selected in relationship |
| Signature | Click the check box if the signature is opted |

Button Functionality

The following table provides explanation for each button in the screen.

| Element | Description |
|---|---|
| Enrollment Summary | Saves the data and navigates to Summary screen. This is enabled only if changes are sought on this screen. |
| Cancel | Clears the contents entered in the fields or restore to the previous state as was before saving the changes |
| Tab | General Info, Coverage Info, are the tabs visible on this screen. If any other tabs like Coverage or General Info, or if Enrollment summary, Cancel is disabled, due to non-selection of changes sought, use missing information link to navigate to the missing info screen. |

Step—6: After entering the fields as per the field details explained in field explanation. Click Continue. Screen navigates to Enrollment Summary. (See FIG. C-349)

Field Explanation

The following table provides explanation for each element in the screen.

| Element | Description |
|---|---|
| Group Information Header | Contains header information of the Group |
| Name of the Group | Text for the Name of the Group |
| Group ID | Text and Link for the Group ID to navigate to the Group General Info screen |
| Group Type | Specifies the Type of the Group like Small Employer Group |
| Proposed Effective Date | The text for Proposed Effective Date. Choose a date by clicking calendar icon. Date accepts the format MM/DD/YYYY. Default effective date is first of the following month. Effective date cannot be past date |
| Status | Text to specify the status of the group. |
| Work Group | Text for Work Group. This specifies the internal work group attached to the Group. This is based on the writing agent's work group. |
| Enrollment Summary Information | Enrollment Summary Information is broken down into tree structure. The tree can by expanded or collapsed. The level of the tree is as per the example given below:<br>– Employee<br>  – Dependent<br>  – Dependent<br>– Employee<br>  – Dependent<br>– Employee<br>+ Employee<br>– Employee<br>  + Dependent<br>+– Employee<br>Where (–) signifies expanded view and (+) signifies collapsed view. |
| Employee ID | Text for Employee ID |
| Employee SSN | Text for Employee SSN |
| Employee Name | Text for employee Name (First Name and Last Name) |
| Effective Date | Text for Employee Effective date. Choose a date by clicking calendar icon. Date accepts the format MM/DD/YYYY. Defaults effective date of the Group. Effective date cannot be past date |
| Status | Text to specify the status of the employee. |
| Enrollment Information | There are two part of this information:<br>5) Entered based on verification<br>6) Based on the information provide on the Coverage Info screen |
| Entered based on verification | |
| Total Full Time Applied (A) | Value is shown based on the actual full time employee applied (System Identified) |
| Total part Time Applied (B) | Value is shown based on the actual part time employee applied (System Identified) |
| Employee Waived (C) | Text to enter Employee Waived. Contains only whole number. Accepts numbers not exceeding 5 digits. Manually entered based on verification. |
| Employee Declined (D) | Text to enter Employee Declined. Contains only whole number. Accepts numbers not exceeding 5 digits. Manually entered based on verification. |
| Total Eligible Employee (E) = | Text to display total eligible employee. Employee Applying is sum total of A + B + D. |
| Total Employee Applying (F) | Text to display total employee applying. Employee Applying is sum total of A + B. |
| % Participation | Test to display % participation. Participation is % of E/F |
| Based on Info Provided | |
| Total Full Time Applied (A) | Text for Total Full Time Applied. Based on the information provide on the Coverage Info screen |
| Total part Time Applied (B) | Text for Total Part Time Applied. Based on the information provide on the Coverage Info screen |
| Total Employees Applied | Text to display total employee applied. Employee Applied is sum total of A + B |

Button Functionality

The following table provides explanation for each button in the screen.

| Element | Description |
|---|---|
| Pre Enrollment | Saves the data and performs validation and eligibility checks against the information required for enrollment and navigates to the screen Missing Information. |
| Cancel | Clears the contents entered in the fields or restore to the previous state as was before saving the changes |
| <<, <, >, >> | The enrollment summary shows record for 5 employees on single screen. If the employee size increases more than 5. These buttons are used for navigating to the next and previous records for viewing.<br><< - Show first record (s)<br>< - Show previous record (s)<br>> - Show next record (s)<br>>> - Show last record (s) |
| Group ID | Click Group ID to navigates to the Group's general info screen. |

Step—7: On clicking Pre-Enrollment, screen navigates to missing info. (See FIG. C-350)

Field Explanation

The following table provides explanation for each button in the screen.

| Element | Description |
| --- | --- |
| Employee Missing Information | |
| Missing Entity | List the missing entities for the group change |
| Message | Provides a message for the missing entities |
| Enrollment Information | Lists all the changes sought in the pick list |
| Status | Displaying the status of change. |
| Dependent Missing Information | |
| Missing Entity | List the missing entities for the group change |
| Message | Provides a message for the missing entities |
| Enrollment Information | Lists all the changes sought in the pick list |
| Status | Displaying the status of change. |
| Change Information | |
| ROE/OE Status | Specifies the pick list for the changes |
| Remarks | Text for briefing the change action |
| Reason for Decline | Choose from the list of reasons for decline. This field is enabled only if the status of ROE/OE is opted as decline |
| Others | Text for briefing the other status and description |

Button Functionality

The following table provides explanation for each button in the screen.

| Element | Description |
| --- | --- |
| Finalize | Navigates to confirmation screen by incorporating all the corrections made |
| Cancel | Clears the contents entered in the fields or restore to the previous state as was before saving the changes |

Step—8: On clicking Finalize, navigates to confirmation screen. Click continue to go back to Group search. (See FIG. C-351)

COBRA

The screen is to modify COBRA

The sequential steps involved in modifying COBRA are listed below.

Step—1: After successful logon, click the menu Enrollment and select ROE. Select COBRA. (See FIG. C-352)

Step—2: he screen navigates search to select a group. Enter the search criteria for Searching for the group. (See FIG. C-353)

Step—3: his pops up a screen with search result. (See FIG. C-354)

Step—4: lick on any Group ID for selection. Screen navigates to change request screen for making ROE/OE changes for a group. (See FIG. C-355)

Field Explanation

The following table provides explanation for each button in the screen.

| Element | Description |
| --- | --- |
| Group Information | |
| Parent Group ID | Text to display the Parent Group ID. This is a read only field |
| Parent Group Name | Text to display the Parent Group Name. This is a read only field |
| COBRA Group ID | Text to display the COBRA Group ID. This is a read only field |
| COBRA Type | Text to display the COBRA Group Type whether Cal COBRA or Federal COBRA. This is a read only field |
| Group Effective Date | Text to display effective date of the parent group. This is a read only field |
| Work Group | Text to Display the internal Work group associated with the Parent Group This is a read only field |
| Status | Text to display status of the group. This is a read only field |
| Mode of Request | Choose a mode of request from the drop down list available. The field is mandatory. |
| Post Mark Date | The text for post mark date. Choose a date in the format MM/DD/YYYY by clicking calendar icon. The postmark date cannot be greater than system date. The field is mandatory. |
| Date Received | The text for received date. Choose a date in the format MM/DD/YYYY by clicking calendar icon. The received date cannot be greater than system date. The field is mandatory. |
| Reason for Change | Choose a reason from the drop down list The field is mandatory. |
| Others | The text for narrating other info, provided the option for reason for terms is others |

Button Functionality

The following table provides explanation for each button in the screen.

| Element | Description |
| --- | --- |
| Continue | Saves the data and navigates to General information for groups. |
| Clear | Clears the contents entered in the fields or restore to the previous state as was before saving the changes |

Step—5: On clicking continue, navigates to Group General Information of group Respective tabs can also clicked to navigate to corresponding screens. Continue would be enabled only if the changes are sought on this screen, else use tab to navigate to the next screen. (See FIG. C-356)

Field Explanation

The following table provides explanation for each button in the screen.

| Element | Description |
| --- | --- |
| Parent Group ID | Text to display the Parent Group ID. |
| Parent Group Name | Text to display the Parent Group Name. |
| COBRA Group ID | Text to display the COBRA Group ID. |
| COBRA Type | Text to display the COBRA Group Type whether Cal COBRA or Federal COBRA. |
| Group Effective Date | Text to display effective date of the parent group. |
| Work Group | Text to Display the internal Work group associated with the Parent Group |
| Status | Text to display status of the group. |
| Post Mark Date | Text for post mark date. Choose a date by clicking calendar icon. Accepts in the format MM/DD/YYYY |

-continued

| Element | Description |
|---|---|
| Received Date | Text for received date. Choose a date by clicking calendar icon. Accepts in the format MM/DD/YYYY |
| Salutation | Choose the salutation from the drop down list of salutations available. |
| First Name | The text for first name. Accepts alphabets and special character like hyphen and single quotes not exceeding 25 characters. First name is mandatory. |
| Middle Initial | The text for middle initial. Accepts alphabets not exceeding 1 character. |
| Last Name | The text for last name. Accepts alphabets and special characters like hyphen and single quotes not exceeding 35 characters. Last name is mandatory. |
| Suffix | Choose the Suffix from the drop down list of salutations available. |
| Date of Birth | The text for date of birth. Choose a date by clicking calendar icon |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| Address Information: Physical Home Address or Mailing Address | |
| Address | The text for company address. Accepts alphabets and numeric values not exceeding 35 characters |
| Apt | The text for company suite/apt # Accepts alphabets and numeric values of not exceeding 35 characters |
| Zip | The text for zip. Accepts numeric of either 5 or 9 digits. City, State and County are populated automatically for the correct zip code. |
| City | The text for city. Accepts alphabets of not exceeding 30 characters. |
| State | Choose the name of the state from the drop down list of States available in United States of America |
| County | Choose the name of the county from the drop down list of States available in United States of America |
| Mode of Correspondence | Choose the mode of correspondence from the drop down list available |
| Phone Number | The text for telephone number of the contact person. Accepts numeric values of not exceeding 10 digits. The format is (999) 999-9999 |
| Extension | The text for telephone number of the contact person. Accepts numeric values of not exceeding 5 digits. The format is (999) 999-9999 |
| Fax | The text for fax number of the contact person. Accepts numeric values of not exceeding 10 digits. The format is 9999 |
| Email | The text for email of the contact person. Accepts alphabets, numeric and special characters in the standard email format of length not exceeding 100 characters |

Button Functionality

The following table provides explanation for each button in the screen.

| Element | Description |
|---|---|
| Continue | Saves the data and navigates to Billing Information screen and the system generates Group ID. This is enabled only if changes are sought on this screen |
| Cancel | Clears the contents entered in the fields or restore to the previous state as was before saving the changes |
| Tabs | General Info, Billing Info, Coverage Info and Add Employees are the tabs visible on this screen. Navigation to the next screen is also possible by using tabs If continue button is disabled use this tab to navigate to the next screen Also while navigating through the tab the content that are changed on the screen are not saved unless explicitly saved by other operations on the screen. |

Step—6: On clicking continue, navigates to Group Billing Information of group Respective tabs can also clicked to navigate to corresponding screens. Continue would be enabled only if the changes are sought on this screen, else use tab to navigate to the next screen. Enter the values in the respective fields, as per the format briefed in field's explanation section and click Continue. (See FIG. C-357)

Field Explanation

The following table provides explanation for each button in the screen.

| Element | Description |
|---|---|
| Mode of payment | Choose a mode of payment from the drop down list available. Based on selection corresponding fields will enable to enter the values. For e.g. if the value selected is card payment, EFT will be disabled and allows only entering card details and vice versa. |
| Credit Card Information | |
| Cardholder's Names | The text for cardholder's name. Accepts alphabets and space between two words. |
| Credit Card Type | Choose the type of credit card from the drop down list available. |
| Credit Card No | The text for credit card number. Accepts numeric values not exceeding 30 digits |
| Expiration Date | Choose a month of expiration from the drop down list available |
| Expiration Year | The text for expiration year. Accepts numeric values of exactly 4. Example 2002. |
| Billing Address | As itappears on the credit Card |
| Street Address | The text for company address. Accepts alphanumeric and special characters not exceeding 35 characters. |
| ZIP | The text for zip. Accepts numeric value of either 5 or 9 digits. |
| State | The text for city. Accepts alphabets and space between two words not exceeding 30 characters. |
| City | Choose the name of the state from the drop down list of States available in United States of America |
| EFT Information | |
| Bank Name | The text for bank name. Accepts alphabets and space between two words. |
| Routing Number | The text for routing number. Accepts numeric values not exceeding 9 digits. |
| Account Number | The text for account number. Accepts numeric values not exceeding 9 digits. |
| Account Type | Choose the type of account from the drop down list available. |
| Depositor's Name | The text for depositor's name. Accepts alphabets and space between two words. |

Button Functionality

The following table provides explanation for each button in the screen.

| Element | Description |
|---|---|
| Continue | Saves the data and Navigates to coverage Information screen. This is enabled only if changes are sought on this screen |
| Cancel | Clears the contents entered in the fields or restore to the previous state as was before saving the changes |
| Tabs | General Info, Billing Info, Coverage Info and Add Employees are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen. |

Step—7: On clicking continue, navigates to Group Coverage Information of group Respective tabs can also clicked to navigate to corresponding screens. Continue would be enabled only if the changes are sought on this screen, else use tab to navigate to the next screen. (See FIG. C-358)

Field Explanation

The following table provides explanation for each button in the screen

| Element | Description |
|---|---|
| COBRA effective date | The text for COBRA effective date. Choose a date by clicking calendar icon |
| Qualifying event | Choose a qualifying even from the drop down list available |
| COBRA end date | The text for COBRA end date. Choose a date by clicking calendar icon |
| Send bill to | Choose the option of sending the bills either to group or self (individual) |
| | Plan Information |
| Line of coverage | Choose a line of coverage from the drop down list available |
| Medical waived | Click the check box for medical waive if the employee is waiving medical. |
| Carrier selection (Benefit level) | Choose a carrier selection from the drop down list available |
| Coverage choice | Choose a coverage from the drop down list available |
| PCP ID/Medical group ID | The text for PCP ID. Accepts alphabets and numeric values not exceeding 10 characters. |
| Are you an existing patient | Click the check box if you are an existing patient |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Prior plan type | Choose a plan type from the drop down list available |
| Prior plan name | Choose a plan name from the drop down list available |
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Other coverage kept | The text for other coverage. Accepts alphabets with values not exceeding 50 characters. |
| RAF | The text to display RAF applicable for the Primary Group. |
| Employee signature | Click the check box, to have employee signature |
| Date signed | The text for date signed. Choose a date by clicking calendar icon. Date accepts the format MM/DD/YYYY. Date cannot accept future date. |

Button Functionality

The following table provides explanation for each button in the screen.

| Element | Description |
|---|---|
| Add | Add the contents of employee coverage information. It is only a temporary addition. Becomes permanent only on saving the record. |
| Edit | Edit button will allow for editing a specific record in the table. |
| Delete | Delete button will delete the records in the table checked for deletion. It is only a temporary deletion. Becomes permanent only on saving the record. |
| Check All | The “Check All” Link will check all the records in the table |
| Clear All | The “Clear All” Link will uncheck all the records in the table that are checked. |
| COBRA Summary | Click COBRA summary refreshes the screen and display the summary of information entered for COBRA creation |
| Continue | Navigates add dependent screen. |
| Clear | Clears the contents entered in the fields or restore to the previous state as was before saving the changes |
| Tabs | General Info, Billing Info, Coverage Info and Add Employees are the tabs visible on this screen. The navigation between is tabs are possible only if there is a valid group ID generated and assigned to the group. Also while navigating through the tab the content that are changed on the screen are not saved unless explicitly saved by other operations on the screen. |

Step—8: On clicking continue, navigates to Dependent Information of group Respective tabs can also clicked to navigate to corresponding screens. Continue would be enabled only if the changes are sought on this screen, else use tab to navigate to the next screen. (See FIG. C-359)

Field Explanation

The following table provides explanation for each button in the screen.

| Element | Description |
|---|---|
| First Name | The text for first name. Accepts alphabets and special character like hyphen and single quotes not exceeding 25 characters. First name is mandatory. |
| Middle Initial | The text for middle initial. Accepts alphabets not exceeding 1 character. |
| Last Name | The text for last name. Accepts alphabets and special characters like hyphen and single quotes not exceeding 35 characters. Last name is mandatory. |
| Suffix | Choose the suffix from the drop down list of suffixes available. |
| Date of Birth | The text for date of birth. Choose a date by clicking calendar icon. Date accepts the format MM/DD/YYYY. Birth date cannot be later than the current date. |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| Relationship | Choose the relationship from the drop down list available. |
| Street Address | The text for address. Accepts alphanumeric and special characters with values not exceeding 35 characters |
| Suite | The text for suite/apt #. Accepts alphanumeric and special characters with values not exceeding 35 characters |
| Zip | The text for zip. Accepts numeric value of either 5 or 9 digits. City, and State are populated automatically on entering the correct zip code and entering the tab key. |
| City | The text for city. Accepts alphabets not exceeding 30 characters. |
| State | Choose the name of the state from the drop down list of States available in United States of America |
| Selected carrier | The text for selected carrier. It is a read only field |
| Coverage choice | The text for coverage. It is a read only field |
| Service area | The text for service area. It is a read only field |
| Prior plan type | Choose a plan type from the drop down list available |
| Prior plan | The text for plan name. Accepts alphabets |
| Waived | Click the check box if medical is waived |
| Start date | The text for start date. Choose a date by clicking calendar icon |
| End date | The text for end date. Choose a date by clicking calendar icon |

-continued

| Element | Description |
| --- | --- |
| PCP ID/ | The text for PCP ID. Accepts alphabets |
| PCP last name | The text for PCP last name. Accepts alphabets and special character like hyphen and single quotes |
| PCP first name | The text for PCP first name. Accepts alphabets and special character like hyphen and single quotes |
| Disabled dependent | Click the option of temporary or permanent. This is enable if the relationship opted is child |
| Domestic partner | Click the option for domestic partner. It depends on the value selected in relationship |
| Legal guardian | Click the option for legal guardian. It depends on the value selected in relationship |
| Signature | Click the check box if the signature is opted |

Button Functionality

The following table provides explanation for each button in the screen.

| Element | Description |
| --- | --- |
| Add | Add the contents of dependent information. It is only a temporary addition. |
| Edit | Edit button will allow for editing a specific record in the table. |
| Delete | Delete button will delete the records in the table checked for deletion. It is only a temporary deletion. |
| Check All | The "Check All" Link will check all the records in the table |
| Clear All | The "Clear All" Link will uncheck all the records in the table that are checked. |
| Clear | Clears the contents entered in the fields or restore to the previous state as was before saving the changes |
| Continue | Screen navigates to Missing info. |
| Tabs | General Info, Billing Info, Coverage Info and Add Employees are the tabs visible on this screen. The navigation between is tabs are possible only if there is a valid group ID generated and assigned to the group. Also while navigating through the tab the content that are changed on the screen are not saved unless explicitly saved by other operations on the screen. |

Step—9: On clicking continue, navigates to Missing Info screen. (See FIG. C-360)

Field Explanation

The following table provides explanation for each button in the screen.

| Element | Description |
| --- | --- |
| | Employee Missing Information |
| Missing Entity | List the missing entities for the group change |
| Element | Description |
| Message | Provides a message for the missing entities |
| Enrollment Information | Lists all the changes sought in the pick list |
| Status | Displaying the status of change. |
| | Dependent Missing Information |
| Missing Entity | List the missing entities for the group change |
| Message | Provides a message for the missing entities |
| Enrollment Information | Lists all the changes sought in the pick list |
| Status | Displaying the status of change. |
| | Change Information |
| ROE/OE Status | Specifies the pick list for the changes |
| Remarks | Text for briefing the change action |

-continued

| Element | Description |
| --- | --- |
| Reason for Decline | Choose from the list of reasons for decline. This field is enabled only if the status of ROE/OE is opted as decline |
| Others | Text for briefing the other status and description |

Button Functionality

The following table provides explanation for each button in the screen.

| Element | Description |
| --- | --- |
| Finalize | Navigates to confirmation screen by incorporating all the corrections made |
| Cancel | Clears the contents entered in the fields or restore to the previous state as was before saving the changes |

Step—10: On clicking Finalize, navigates to confirmation screen. (See FIG. C-361)

Manual ROE

The screen is to have manual ROE

The sequential steps involved in having manual ROE are listed below.

Step—1: After successful logon, click the menu Enrollment and select ROE. Select Manual ROE. (See FIG. C-362)

Step—2: The screen navigates search to select a process. Entries to the fields are mandatory. Click Search. (See FIG. C-363)

Step—3: This pops up a screen with search result. (See FIG. C-364)

Step—4: Choose a employee id and click Process Manual. Click Search to navigate back to group search screen. (See FIG. C-365)

Individual Member Modify

The screen is to modify Individual Member

The sequential steps involved in modifying Individual Member are listed below.

Step—1: After successful logon, click the menu Enrollment and select ROE. Select Individual Member and then Modify Individual Member. (See FIG. C-366)

Step—2: The screen navigates search to select an employee. Enter the search criteria for Searching for the Employee. (See FIG. C-367)

Step—3: This pops up a screen with search result. (See FIG. C-368)

Step—4: Click on any employee id for selection the screen navigates to Individual Employee Change (pick list). (See FIG. C-369)

Field Explanation

The following table provides explanation for each button in the screen.

| Element | Description |
| --- | --- |
| | Group Information |
| Name of the group | Text for the Name of the Group. This is read only field. |
| Effective Date | Text for Effective date. This is read only field. |
| Group ID | Text for Group ID. This is read only field. |
| Element | Description |
| Status | Text for status. This is read only field. |

-continued

| Element | Description |
| --- | --- |
| Group Type | Text for group type. This is read only field. |
| Work Group | Text for work group. This is read only field. |
| Employee ID | Text for employee ID This is read only field. |
| Employee Name | Text for employee name. This is read only field |
| Association ID | Text for Association ID This is read only field. |
| Association Name | Text for Association name. This is read only field |
| Employee General Information | |
| Employee address | Selecting this option will enable to allow for any modifications |
| SSN information | Selecting this option will enable to allow for any modifications |
| Employee Date of birth | Selecting this option will enable to allow for any modifications |
| Employee demographic location | Selecting this option will enable to allow for any modifications |
| Employee Billing Information | |
| Billing Information | Selecting this option will enable to allow for any modifications |
| Employee Agent Information | |
| Agent Information | Selecting this option will enable to allow for any modifications |
| Coverage Information | |
| RAF Discounting | Selecting this option will enable to allow for any modifications |
| Employee Type | Selecting this option will enable to allow for any modifications |
| Payroll | Selecting this option will enable to allow for any modifications |
| Medical LOC | Selecting this option will enable to allow for any modifications |
| Vision LOC | Selecting this option will enable to allow for any modifications |
| Dental LOC | Selecting this option will enable to allow for any modifications |
| CAM LOC | Selecting this option will enable to allow for any modifications |
| Hours worked | Selecting this option will enable to allow for any modifications |
| Employee Type | Selecting this option will enable to allow for any modifications |
| Date of employment | Selecting this option will enable to allow for any modifications |

Button Functionality

The following table provides explanation for each button in the screen.

| Element | Description |
| --- | --- |
| Continue | Saves the data and navigates to General information for groups. |
| Cancel | Clears the contents entered in the fields or restore to the previous state as was before saving the changes |

Step—5: On clicking continue, navigates to General Information of group Respective tabs can also clicked to navigate to corresponding screens. Continue would be enabled only if the changes are sought on this screen, else use tab to navigate to the next screen. (See FIG. C-370)

Field Explanation

The following table provides explanation for each button in the screen.

| Element | Description |
| --- | --- |
| Group Information | |
| Name of the group | Text for the Name of the Group. This is read only field. |
| Effective Date | Text for Effective date. This is read only field. |
| Group ID | Text for Group ID. This is read only field. |
| Status | Text for status. This is read only field. |
| Group Type | Text for group type. This is read only field. |
| Work Group | Text for work group. This is read only field. |
| Employee ID | Text for employee ID This is read only field. |
| Employee Name | Text for employee name. This is read only field |
| Association ID | Text for Association ID This is read only field. |
| Association Name | Text for Association name. This is read only field |
| Employee Information | |
| Salutation | Choose the salutation from the drop down list of salutations available. |
| First Name | The text for first name. Accepts alphabets and special character like hyphen and single quotes not exceeding 25 characters. First name is mandatory. |
| Middle Initial | The text for middle initial. Accepts alphabets not exceeding 1 character. |
| Last Name | The text for contact name. Accepts alphabets and special character like hyphen and single quotes not exceeding 35 characters. Last name is mandatory |
| Suffix | Choose the suffix from the drop down list of suffixes available. |
| Date of Birth | The text for date of birth. Choose a date by clicking calendar icon |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| Address Information; Physical and Alternate Address - Note: Enter Alternate Address if different from the Physical Address. | |
| Street Address | The text for address. Accepts alphanumeric and special characters not exceeding 35 characters |
| Suite | The text for suite/apt # Accepts alphanumeric and special characters not exceeding 35 characters |
| Zip | The text for zip. Accepts numeric value of either 5 or 9 digits. City, State and County are populated automatically on entering the correct zip code and entering the tab key. |
| City | The text for city. Accepts alphabets and space between two words not exceeding 30 characters. |
| State | Choose the name of the state from the drop down list of States available in United States of America |
| County | Choose the name of the county from the drop down list of counties available for the ZIP Code entered. |
| Mode of Correspondence | Choose the mode of correspondence from the drop down list available. |
| Phone Number | The text for telephone number of the contact person. Accepts numeric values not exceeding 10 digits. The format is (999) 999-9999 |
| Extension | The text for extension number of the contact person. Accepts numeric values not exceeding 5 digits. |
| Fax | The text for fax number of the contact person Accepts numeric values not exceeding 10 digits. The format is (999) 999-9999 |
| Email | The text for email of the contact person. Accepts alphabets, numeric and special characters in the standard email format of length not exceeding 100 characters |

Button Functionality

The following table provides explanation for each button in the screen.

| Element | Description |
| --- | --- |
| Continue | Navigates to Billing Information screen. This is enabled only if changes are sought on this screen |

-continued

| Element | Description |
|---|---|
| Cancel | Clears the contents entered in the fields or restore to the previous state as was before saving the changes |
| Tabs | General Info, Billing Info, Agent Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen. |

Step—6: On clicking continue, navigates to Billing Information of group Respective tabs can also clicked to navigate to corresponding screens. Continue would be enabled only if the changes are sought on this screen, else use tab to navigate to the next screen. (See FIG. C-371)

Field Explanation

The following table provides explanation for each button in the screen.

| Element | Description |
|---|---|
| Mode of payment | Choose a mode of payment from the drop down list available. Based on selection corresponding fields will enable to enter the values. For e.g. if the value selected is card payment, EFT will be disabled and allows only entering card details and vice versa. |
| | Credit Card Information |
| Cardholder's Names | The text for cardholder's name. Accepts alphabets and space between two words. |
| Credit Card Type | Choose the type of credit card from the drop down list available. |
| Credit Card No | The text for credit card number. Accepts numeric values not exceeding 30 digits |
| Expiration Date | Choose a month of expiration from the drop down list available |
| Expiration Year | The text for expiration year. Accepts numeric values of exactly 4. Example 2002. |
| Billing Address | As it appears on the credit Card |
| Street Address | The text for company address. Accepts alphanumeric and special characters not exceeding 35 characters. |
| ZIP | The text for zip. Accepts numeric value of either 5 or 9 digits. |
| State | The text for city. Accepts alphabets and space between two words not exceeding 30 characters. |
| City | Choose the name of the state from the drop down list of States available in United States of America |
| | EFT Information |
| Bank Name | The text for bank name. Accepts alphabets and space between two words. |
| Routing Number | The text for routing number. Accepts numeric values not exceeding 9 digits. |
| Account Number | The text for account number. Accepts numeric values not exceeding 9 digits. |
| Account Type | Choose the type of account from the drop down list available. |
| Depositor's Name | The text for depositor's name. Accepts alphabets and space between two words. |

Button Functionality

The following table provides explanation for each button in the screen.

| Element | Description |
|---|---|
| Continue | Saves the data and Navigates to Agent Information screen. This is enabled only if changes are sought on this screen |
| Cancel | Clears the contents entered in the fields or restore to the previous state as was before saving the changes |
| Enrollment Summary | Click enrollment summary refreshes the screen and display the summary of information entered for group. |
| Missing Information | Click missing information refreshes the screen and displays the missed information for the group. |
| Tabs | General Info, Billing Info, Agent Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen. |

Step—7: On clicking continue, navigates to Agent Information of group Respective tabs can also clicked to navigate to corresponding screens. Continue would be enabled only if the changes are sought on this screen, else use tab to navigate to the next screen. (See FIG. C-372)

Field Explanation

The following table provides explanation for each button in the screen.

| Element | Description |
|---|---|
| Agent ID | Choose an agent id by clicking search icon |
| Agent Type | Choose an agent type from the drop down list available. Based on the selection of the agent type the percent commission split entry and the Receive ROE packets option would be available. |
| Percent commission split | The text for percent commission. Accepts numeric values in the range of 1-100 (Example 100.00). This will be enabled only if the Agent type selected is "Agent Of Record" Sum of the percentage for all the Agent of Record added should be equal to 100.00. |
| Receive ROE/OE packets | Click the check box to receive ROE/OE packets for agent. This option will not be available for Agent Type "General Agent". |
| Agent Commission | The text for agent commission. Defaults the value defined in CM - rate Administration for Agent Commission. Accepts numeric values less than or equal to the defaulted value in the in the range of 1-100 (Example 4.45) |
| Check the box if the group is without an agent | Click the check box for a group with out an agent. This option will be available only for the Agent Type, "Agent of Record and Writing Agent". |

Button Functionality

The following table provides explanation for each button in the screen.

| Element | Description |
|---|---|
| Add | Add the contents of agent information. It is only a temporary addition. Becomes permanent only on saving the record. |
| Edit | Edit button will allow for editing a specific record in the table. |
| Update | Update the contents of agent information. It is only a temporary update. Becomes permanent only on saving the record |

-continued

| Element | Description |
|---|---|
| Delete | Delete button will delete the records in the table checked for deletion. It is only a temporary deletion. Becomes permanent only on saving the record |
| Check All | The "Check All" Link will check all the records in the table |
| Clear All | The "Clear All" Link will uncheck all the records in the table that are checked. |
| Enrollment Summary | Click enrollment summary refreshes the screen and display the summary of information entered for group creation |
| Missing Information | Click missing information refreshes the screen and displays the missed information. For a successful creation of a group, there should be no missing information |
| Continue | Saves the data and navigates to Coverage Information screen. This is enabled only if changes are sought on this screen |
| Cancel | Clears the contents entered in the fields or restore to the previous state as was before saving the changes |
| Tab | General Info, Billing Info, Agent Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen |

Step—8: On clicking continue, navigates to Coverage Information of group Respective tabs can also clicked to navigate to corresponding screens. Continue would be enabled only if the changes are sought on this screen, else use tab to navigate to the next screen. (See FIG. C-373)

Field Explanation

The following table provides explanation for each button in the screen.

| Element | Description |
|---|---|
| | Employee Information |
| Hours worked per week | The text for worked hours per week. Accepts numeric values not exceeding 2 digits. |
| Date of hire | The text for date of hire. Choose a date by clicking calendar icon. Date accepts the format MM/DD/YYYY. |
| Employee type | Choose an employee type from the drop down list available |
| Pay Roll | Check box for Pay Roll verification. Check this if pay roll is verified. |
| | RAF Discounting |
| RAF | List the RAF tier applicable for the group based on the RAF tier available on group's effective date. |
| | Plan Information |
| Line of coverage | Choose a line of coverage from the drop down list available |
| Medical waived | Click the check box for medical waive if the employee is waiving medical. |
| Carrier selection (Benefit level) | Choose a carrier selection from the drop down list available |
| Coverage choice | Choose a coverage from the drop down list available |
| PCP ID/Medical group ID | The text for PCP ID. Accepts alphabets and numeric values not exceeding 10 characters. |
| Are you an existing patient | Click the check box if you are an existing patient |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Prior plan type | Choose a plan type from the drop down list available |
| Prior plan name | Choose a plan name from the drop down list available |
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Additional Coverage | The text for additional coverage. Accepts alphabets with values not exceeding 50 characters. |
| Date signed | The text for date signed. Choose a date by clicking calendar icon. Date accepts the format MM/DD/YYYY. Date cannot accept future date. |

Button Functionality

The following table provides explanation for each button in the screen

| Element | Description |
|---|---|
| Add (Waiting Period Information) | Add the contents of Waiting Period information. It is only a temporary addition. Becomes permanent only on saving the record. |
| Add (Contribution) | Add the contents of Contribution and Coverage elected. It is only a temporary addition. Becomes permanent only on saving the record. |
| Update (Waiting Period Information) | Updates the contents of Waiting Period information. It is only a temporary update. Becomes permanent only on saving the record. |
| Update (Contribution) | Update the contents of Contribution and Coverage elected. It is only a temporary update. Becomes permanent only on saving the record. |
| Cancel | Cancels the operation that was currently performed prior to saving the record. |
| Edit | Edit button will allow for editing a specific record in the table. |
| Delete | Delete button will delete the records in the table checked for deletion. It is only a temporary deletion. Becomes permanent only on saving the record. |
| Check All | The "Check All" Link will check all the records in the table |
| Clear All | The "Clear All" Link will uncheck all the records in the table that are checked. |
| Enrollment Summary | Click enrollment summary refreshes the screen and display the summary information entered for group creation |
| Missing Information | Click missing information refreshes the screen and displays the missed information. For a successful creation of a group, there should be no missing information |
| View Missing Info | Saves the data and navigates to Missing Information Page |
| Save & Create New Group | Saves the data entered and navigates to the screen Group Hierarchy for creating New Group. |
| Cancel | Clears or restores the content entered in the fields only prior to saving the records. |
| Tab | General Info, Billing Info, Agent Info, Coverage Info are the tabs visible on this screen. Navigation to the next screen is also possible by using tabs If continue button is disabled use this tab to navigate to the next screen. Also while navigating through the tab the content that are changed on the screen are not saved unless explicitly saved by other operations on the screen |

Step—9: Click Enrollment Summary link to have a summary detail. Click Pre Enrollment, which also leads to Missing Info screen. (See FIG. C-374)

Step—10: Clicking change summary button screen navigates to missing info screen. This screen shows the overall information that are entered will be shown. (See FIG. C-375)

Field Explanation

The following table provides explanation for each button in the screen.

| Element | Description |
|---|---|
| Employee Missing Information | |
| Missing Entity | List the missing entities for the group change |
| Message | Provides a message for the missing entities |
| Enrollment Information | Lists all the changes sought in the pick list |
| Status | Displaying the status of change. |
| Change Information | |
| ROE/OE Status | Specifies the pick list for the changes |
| Remarks | Text for briefing the change action |
| Reason for Decline | Choose from the list of reasons for decline. This field is enabled only if the status of ROE/OE is opted as decline |
| Others | Text for briefing the other status and description |

Button Functionality

The following table provides explanation for each button in the screen.

| Element | Description |
|---|---|
| Finalize | Navigates to confirmation screen by incorporating all the corrections made |
| Cancel | Clears the contents entered in the fields or restore to the previous state as was before saving the changes |

Step—11: On clicking Finalize, navigates to confirmation screen. Click Continue to go back to Group search screen. (See FIG. C-376)

Individual Dependent Modify

The screen is to modify Individual Member Dependent

The sequential steps involved in modifying Individual Member Dependent are listed below.

Step—1: After successful logon, click the menu Enrollment and select ROE. Select Individual Member and then Modify Dependent. (See FIG. C-377)

Step—2: The screen navigates search to select an dependent. Enter the search criteria for Searching for the Dependent. (See FIG. C-378)

Step—3: This pops up a screen with search result. (See FIG. C-379)

Step—4: Click on any employee id for selection the screen navigates to Individual Employee Change (pick list). (See FIG. C-380)

Field Explanation

The following table provides explanation for each button in the screen.

| Element | Description |
|---|---|
| Group Information | |
| Name of the group | Text for the Name of the Group. Read Only field |
| Effective Date | Text for Employee Effective date. This is read only field. |
| Group ID | Text for Group ID. This is read only field. |
| Status | Text for status. This is read only field. |
| Group Type | Text for group type. This is read only field. |
| Work Group | Text for work group. This is read only field. |
| Employee ID | Text for Employee ID. This is read only field. |
| Employee Name | Text for Employee Name. This is read only field. |
| Dependent ID | Text for Dependent ID. This is read only field. |
| Dependent Name | Text for Dependent Name. This is read only field. |
| Dependent General Information Changes | |
| Dependent to waive Vision Plan Information | Selecting this option will enable to allow for any modifications. |
| Dependent to waive Dental Plan Information | Selecting this option will enable to allow for any modifications |
| Dependent to waive CAM Plan Information | Selecting this option will enable to allow for any modifications |
| Dependent to waive Medical Plan Information | Selecting this option will enable to allow for any modifications |
| Prior Plan Information | Selecting this option will enable to allow for any modifications |
| Dependent Address Information | Selecting this option will enable to allow for any modifications |
| Dependent SSN | Selecting this option will enable to allow for any modifications |
| Dependent Relationship | Selecting this option will enable to allow for any modifications |
| Dependent Date of Birth | Selecting this option will enable to allow for any modifications |
| Dependent Personal Information | Selecting this option will enable to allow for any modifications |

Button Functionality

The following table provides explanation for each button in the screen.

| Element | Description |
|---|---|
| Continue | Saves the data and navigates to Dependent General information for employees. |
| Cancel | Clears the contents entered in the fields or restore to the previous state as was before saving the changes |

Step—5: n clicking continue, navigates to Dependent General Information screen. Respective tabs can also clicked to navigate to corresponding screens. If any other tabs like Coverage or General Info, or if Enrollment summary, Cancel is disabled, due to non-selection of changes sought, use missing information link to navigate to the missing info screen. (See FIG. C-381)

Field Explanation

The following table provides explanation for each button in the screen.

| Element | Description |
|---|---|
| Dependent Information | |
| First Name | The text for contact name. Accepts alphabets and special characters like hyphen and single quotes not exceeding 25 characters. |
| Middle Initial | The text for middle initial. Accepts alphabets not exceeding 1 character. |

| Element | Description |
|---|---|
| Last Name | The text for contact name. Accepts alphabets and special characters like hyphen and single quotes not exceeding 35 characters. |
| Suffix | Choose the suffix from the drop down list of suffixes available. |
| Date of Birth | The text for date of birth. Choose a date by clicking calendar icon. Date accepts the format MM/DD/YYYY. Birth date cannot be later than the current date. |
| Social Security Number | The text for social security number for every individual. This can also be auto generated by clicking auto generate link. Accepts numeric value of exactly 9 digits. Users with User Role as Level 2 and above can only auto generate SSN. |
| Gender | Choose a gender from the drop down list available. |
| Address Information | |
| Street Address | The text for address. Accepts alphanumeric and special characters with values not exceeding 35 characters |
| Apt | The text for suite/apt #. Accepts alphanumeric and special characters with values not exceeding 35 characters |
| Zip | The text for zip. Accepts numeric value of either 5 or 9 digits. City, State and County are populated automatically on entering the correct zip code and entering the tab key. |
| City | The text for city. Accepts alphabets and space between two words not exceeding 30 characters. |
| State | Choose the name of the state from the drop down list of States available in United States of America |
| Line of Coverage Information [For Medical, Vision, Dental] | |
| Selected Product | Text for the product selected. It is a read only field. |
| Coverage Choice | Choose a coverage from the drop down list available |
| Waived | Click the check box for any waive. |
| Service Area | The text for service area. |
| PCP ID/Medical group ID | The text for PCP ID. Accepts alphabets and numeric values not exceeding 10 characters. |
| PCP last name | The text for PCP last name. Accepts alphabets and special character like hyphen and single quotes not exceeding 35 characters. |
| PCP first name | The text for PCP first name. Accepts alphabets and special character like hyphen and single quotes not exceeding 25 characters. |
| Prior insurance start date | The text for insurance start date. Choose a date by clicking calendar icon. Date accepts the format MM/DD/YYYY. |
| Prior insurance end date | The text for insurance end date. Choose a date by clicking calendar icon. Date accepts the format MM/DD/YYYY. |
| Other coverage kept | The text for other coverage. Accepts alphabets with values not exceeding 50 characters. |
| Additional Coverage | The text for additional coverage. Accepts alphabets with values not exceeding 50 characters. |
| Disabled dependent | Click the option of temporary or permanent. This is enable if the relationship opted is child |
| Domestic partner | Click the option for domestic partner. It depends on the value selected in relationship |
| Legal guardian | Click the option for legal guardian. It depends on the value selected in relationship |
| Signature | Click the check box if the signature is opted |

Button Functionality

The following table provides explanation for each button in the screen.

| Element | Description |
|---|---|
| Enrollment Summary | Saves the data and navigates to Summary screen. This is enabled only if changes are sought on this screen. |
| Cancel | Clears the contents entered in the fields or restore to the previous state as was before saving the changes |
| Tab | General Info, Coverage Info, are the tabs visible on this screen. If any other tabs like Coverage or General Info, or if Enrollment summary, Cancel is disabled, due to non-selection of changes sought, use missing information link to navigate to the missing info screen. |

Step—6: After entering the fields as per the field details explained in field explanation. Click Continue. Screen navigates to Enrollment Summary. (See FIG. C-382)

Field Explanation

The following table provides explanation for each element in the screen.

| Element | Description |
|---|---|
| Group Information Header | Contains header information of the Group |
| Name of the Group | Text for the Name of the Group |
| Group ID | Text and Link for the Group ID to navigate to the Group General Info screen |
| Group Type | Specifies the Type of the Group like Small Employer Group |
| Proposed Effective Date | The text for Proposed Effective Date. Choose a date by clicking calendar icon. Date accepts the format MM/DD/YYYY. Default effective date is first of the following month. Effective date cannot be past date |
| Status | Text to specify the status of the group. |
| Work Group | Text for Work Group. This specifies the internal work group attached to the Group. This is based on the writing agent's work group. |
| Enrollment Summary Information | Enrollment Summary Information is broken down into tree structure. The tree can by expanded or collapsed. The level of the tree is as per the example given below:<br>– Employee<br>  – Dependent<br>  – Dependent<br>– Employee<br>  – Dependent<br>– Employee<br>+ Employee<br>– Employee<br>  + Dependent<br>+– Employee<br>Where (–) signifies expanded view and (+) signifies collapsed view. |
| Employee ID | Text for Employee ID |
| Employee SSN | Text for Employee SSN |
| Employee Name | Text for employee Name (First Name and Last Name) |
| Effective Date | Text for Employee Effective date. Choose a date by clicking calendar icon. Date accepts the format MM/DD/YYYY. Defaults effective date of the Group. Effective date cannot be past date |
| Status | Text to specify the status of the employee. |
| Dependent ID | Text for Dependent ID |
| Dependent SSN | Text for Dependent SSN |
| Dependent Name | Text for Dependent Name (First Name and Last Name) |
| Effective Date | Text for Dependent Effective date. Choose a date by clicking calendar icon. Date accepts the format MM/DD/YYYY. Defaults effective date of the Group. Effective date cannot be past date |
| Status | Text to specify the status of the Dependent. |

Button Functionality

The following table provides explanation for each button in the screen.

| Element | Description |
|---|---|
| Missing Information | Click missing information refreshes the screen and displays the missed information. For a successful creation of a group, there should be no missing information |
| Cancel | Clears the contents entered in the fields or restore to the previous state as was before saving the changes |
| <<, <, >, >> | The enrollment summary shows record for 5 employees on single screen. If the employee size increases more than 5. These buttons are used for navigating to the next and previous records for viewing.<br><< - Show first record (s)<br>< - Show previous record (s)<br>> - Show next record (s)<br>>> - Show last record (s) |
| Group ID | Click Group ID to navigates to the Group's general info screen. |

Step—7: On clicking Pre-Enrollment, screen navigates to missing info. (See FIG. C-383)

Field Explanation

The following table provides explanation for each button in the screen.

| Element | Description |
|---|---|
| | Employee Missing Information |
| Missing Entity | List the missing entities for the group change |
| Message | Provides a message for the missing entities |
| Enrollment Information | Lists all the changes sought in the pick list |
| Status | Displaying the status of change. |
| | Dependent Missing Information |
| Missing Entity | List the missing entities for the group change |
| Message | Provides a message for the missing entities |
| Enrollment Information | Lists all the changes sought in the pick list |
| Status | Displaying the status of change. |
| | Change Information |
| ROE/OE Status | Specifies the pick list for the changes |
| Remarks | Text for briefing the change action |
| Reason for Decline | Choose from the list of reasons for decline. This field is enabled only if the status of ROE/OE is opted as decline |
| Others | Text for briefing the other status and description |

Button Functionality

The following table provides explanation for each button in the screen.

| Element | Description |
|---|---|
| Finalize | Navigates to confirmation screen by incorporating all the corrections made |
| Cancel | Clears the contents entered in the fields or restore to the previous state as was before saving the changes |

Step—8: On clicking Finalize, navigates to confirmation screen. (See FIG. C-384)

13 View

View option is to facilitate to have any change, or to view the contents of Group, Employee and Dependent.

Access

The application can be accessed from the main menu as follows:

Enrollment→View→View Group

Enrollment→View→View Employee

Enrollment→View→View Dependent

Pre-Requisites

The groups, employees and dependents must exist in the system.

Application Functions

This application has the following functions for reinstatement:

View Group—to view the contents of group

View Employee—to view the contents of employee

View Dependent—to view the contents of dependents

View Group

The screen is to view the contents of a group, for further process like to change, only to view the contents or to create a new group.

The sequential steps involved in viewing the details of a group are listed below.

Step—1: After successful logon, click the menu Enrollment and select View. Then select View Group. (See FIG. C-385)

Step—2: The screen navigates to group search to select a group. Enter value in any one of the fields, or simply click search button to perform search operation. (See FIG. C-386)

Step—3: This pops up a screen with search result. (See FIG. C-387)

Step—4: Choose a group id for selection. On clicking Change button, screen navigates to group change request screen, which is similar to change request for Group explained under CHANGE. The flow and process are same based on the type of group selected. (See FIG. C-388)

On clicking View button, screen navigates to group view screen. The screen is to only to have view option. Click Search Group to navigate back to Group search screen (See FIG. C-389)

On clicking Create New button, screen navigates to group hierarchy screen which is explained under NEW BUSINESS, to create a new group.

View Employee

The screen is to view the contents of an employee, for further process like to change, only to view the contents or to create a new employee The sequential steps involved in viewing details of an employee are listed below.

Step—1: After successful logon, click the menu Enrollment and select View. Then select View Employee. (See FIG. C-390)

Step—2: The screen navigates to employee search to select an employee. Enter value in any one of the fields, or simply click search button to perform search operation. (See FIG. C-391)

Step—3: This pops up a screen with search result. (See FIG. C-392)

Step—4: Choose an employee id for selection.

On clicking Change button, screen navigates to employee change request screen, which is similar to change request for Employee explained under CHANGE. The flow and process are same as explained under CHANGE. (See FIG. C-FIG. 393)

On clicking View button, screen navigates to employee view screen. The screen is to only to have view option. Click Search employee to navigate back to Employee search screen. (See FIG. C-394)

On clicking Create New button, screen navigates to Change request for employee add on screen to add new employees.

View Dependent

The screen is to view the contents of an dependent, for further process like to change, only to view the contents or to create a new dependent The sequential steps involved in viewing details of a dependent are listed below.

Step—1: After successful logon, click the menu Enrollment and select View. Then select View Dependent. (See FIG. C-395)

Step—2: The screen navigates to employee search to select an employee. Enter value in any one of the fields, or simply click search button to perform search operation. (See FIG. C-396)

Step—3: This pops up a screen with search result. (See FIG. C-397)

Step—4: Choose an dependent id for selection.

On clicking Change button, screen navigates to dependent change request screen, which is similar to change request for Dependent explained under CHANGE. The flow and process are same as explained under CHANGE. (See FIG. C-398)

On clicking View button, screen navigates to dependent view screen. The screen is to only to have view option. Click Search employee to navigate back to Dependent search screen. (See FIG. C-399)

On clicking Create New button, screen navigates to Change request for dependent add on screen to add new dependents.

PX2 User Manual

Finance

1 Introduction

Finance is the transaction module that encompasses the process of Billing, Cash Receipts, Cash Reconciliation and other Finance Operations like Premium Transmission Data Output, Mail House Billing Data Output, Lockbox and EFT Imports, Credit Card Import and export, Commission Check Run and Import Risk Adjustment Factors. These operations are for the various group and members participating in the PacAdvantage program.

The Applications

The above-mentioned processes are accomplished in several applications embedded into the Finance Module. These applications steer the tasks of creating, and maintaining operational information relevant for financial transactions within PX2 entities, thereby helping achieve the goals of the Finance Module.

Billing—Billing is the process of creating invoice for the customers enrolled in the PacAdvantage program. The Invoice on a broad base is classified into two types—First Time Invoice (invoice to the group/member that has enrolled as new business) and Running invoice or periodic invoice (To the existing Group/Members).

Cash Receipts—Cash Receipt is the process of entering the cash received by BPI into the system. The cash receipt can be received in various modes as defined by the business process. Cash Receipt includes Lock Box receipts, Check, Credit Card, EFT and Transfer.

Cash Reconciliation—Cash Reconciliation is the process of reconciling the cash receipts and adjustments to individual invoices and reconciling the amount paid by the group.

Cash Disbursement—Cash Disbursement is the process of handling commission. It deals with both commission disbursement as well as commission adjustments.

Finance Operations—Finance Operation consists of the utility operations within the finance module for various processes like Premium Transmission Data Output, Mail House Billing Data Output, Lockbox and EFT Imports, Credit Card Import and export, Commission Check Run and Import Risk Adjustment Factors.

2 Billing

Billing is the transaction module that encompasses the process of creating and maintaining invoices for the group and member enrolled with PacAdvantage in the PX2 System. Billing mainly can be categorized in to two.

First Time invoice, generate first time invoice for the groups/members who have enrolled as new business and Periodic invoice.

Generate running invoice to the existing groups/members.

Billing also has other utility as a support to the billing process viz. Suppress Batch Billing, Batch Bill, Batch Billing Adjustments, Manual Bill and Dynamic Text.

Access

The application can be accessed from the main menu as follows:

Finance→Billing→Suppress Batch Billing
→Batch Billing
→Manual Billing
→Billing Adjustments
→Dynamic Text Pre-Requisites All relevant master and transaction records must be available in the system for a successful billing. Master and transaction records are as follows:

Carrier Maintenance—Refer "User Manual for Carrier Maintenance" for further information on the master records.

Agent/Agency—Refer "User Manual for Sales and Marketing" for further information on the Agent/Agency records.

Enrollment—"User Manual for Enrollment" for further information on the enrolled group and member records. All the information about the existing group/members and their real time transaction details are required to invoice correctly.

When bill run is in process there should be no other activities performed on the PX2 System. Bill generation process requires considerable overheads. Probable the best time to start batch billing process is at the end of the day when there would be no user accessing the system.

Application Functions

This application has the following functions:

Suppress Batch Billing—Suppress Batch Billing is the process of suppressing periodic bill for a specific Group/Member or collective group and members Batch Billing—Batch billing is the process of generating running invoice for the existing groups/members. To run this process, scheduler must be started.

Manual Billing—Manual billing is the process of creating the invoice manually for a specific group of members where in some special adjustments needs to be made.

Billing Adjustments—Billing adjustment is the process of adjusting the bill amount either in full or in part against its value, for a specific group of members where in some special adjustments needs to be made.

Dynamic Text—This process provides a feature to add dynamic content on the bills sent to the for a specific Group/Member or collective groups and members Suppress Batch Billing The sequential steps involved in Suppress Batch Billing are listed below.

Step—1: After successful logon, click the menu Finance and select Billing. Then select Suppress Batch Billing. (See FIG. D-1)

Step—2: The screen navigates to Suppress Batch Billing screen. (See FIG. D-2)

Step—3: Choose the group ids to suppress and click save button. This will disable save, filter and clear filter buttons and will have only new button enabled to proceed further.

Fields Explanation

The following table provides explanations for each of the screen fields.

| Element | Description |
|---|---|
| Bill Period | The text for bill period. Choose from the list the invoice period for suppressing the bill. |
| Selected Group | The text displays the selected group count based on the invoice period. Example 0 to 100. It is a read only field |
| Group Id | The text for group Id. Accepts numeric values not exceeding 7 digits. |
| Group Name | The text for group name. Accepts alphanumeric and special characters. |
| Group Type | Choose a group type from the drop down list available |
| ROE Cycle Date From | The text for ROE Cycle Date From. Choose from the calendar icon in the format MM/DD/YYYY. |
| ROE Cycle Date To | The text for ROE cycle end date. Choose from the calendar icon in the format MM/DD/YYYY |
| Effective Date From | The text for effective start date. Choose from the calendar icon in the format MM/DD/YYYY |
| Effective Date To | The text for effective end date. Choose from the calendar icon in the format MM/DD/YYYY |
| Group Size From | The text for group size and specifies the starting range. Accepts numeric values not exceeding 3 digits. |
| Group Size To | The text for group size and specifies the ending range. Accepts numeric values not exceeding 3 digits. |
| Rate Type | Choose the rate type option from either Blended or Non-Blended Rate |
| View | Choose view option from the available options like All/Suppressed groups/Un-suppressed groups |
| View Selected | Check the View Selected Check Box to view only selected groups. |
| Table | Table displays the Groups selected based on the Search and filter conditions. |

Button Functionality

The following table provides explanation for each button in the screen.

| Element | Description |
|---|---|
| Bill Period | On Selecting the bill period, shows all the groups/ members available for the specific invoice period |
| Check All | (At Suppress Bill Header) Check All link Checks all the groups from database. |
| Clear All | (At Suppress Bill Header). Clear All link uncheck all the groups that are checked from database. |
| Filter | Click the Filter to display the Group based on the search criteria / filter conditions provided. |
| Clear Filter | Clear the Content of the fields. |
| New | Click New to start new operation on this screen |
| Suppress | Click Suppress to Suppress billing for the groups selected |
| Save | Click Save to save the content of suppress billing |
| Un-Suppress | Click Un-Suppress to Un-Suppress billing for the groups selected. |
| Check All | The “Check All” Link will check all the records in the table |
| Clear All | The “Clear All” Link will uncheck all the records in the table that are checked. |
| Check All on this Page | The “Check All on this Page” Link will check all the records in the table on this Page |
| Invert Selection | The Invert Selection Link will invert the selection criteria for the check boxes. I.e. All Check Groups would be unchecked and vice versa. |
| <<, <, >, >> | These buttons are used for navigating to the next and previous records for viewing.<br><< - Show first record (s)<br>< - Show previous record (s)<br>> - Show next record (s)<br>>> - Show last record (s) |

Batch Billing

The sequential steps involved in Batch Billing are listed below.

Step—1: After successful logon, click the menu Finance and select Billing. Then select Batch Billing. (See FIG. D-3)

Step—2: The screen navigates to batch billing screen. (See FIG. D-4)

Step—3: Select the bill period and click process button to create invoice for all the groups that are un-suppressed for that bill run period.

Fields Explanation

The following table provides explanations for each of the screen fields.

| Element | Description |
|---|---|
| Run Id | The text for sequential number of Run Id. It is a read only field and is auto generated |
| Bill Period | Choose month and year for bill period from the drop down list available, during which bills are to be generated. |
| Run By | The text for name of the user who generated the bill. It is a read only field. |

Button Functionality

The following table provides explanation for each button in the screen.

| Element | Description |
|---|---|
| Process | Click Process to start the bill run process for the all the groups and member for the specified billing period selected. |
| New | Click New to start new operation for the Bill Run. |
| View Status | Click view status to navigate to Auto Billing Status Search |

Step—4: On clicking view status button the screen navigates to auto billing status search screen. {See FIG. D-5}

Step—5: Enter the value of any one field or simply click search button to perform Search operation Step—6: This pops up a search result screen. (See FIG. D-6)

Fields Explanation

The following table provides explanations for each of the screen fields.

| Element | Description |
|---|---|
| Run Id | The text for run id. It accepts numeric values not exceeding 10 digits. |
| Run Date | The text for run date. Choose from the calendar icon in the format MM/DD/YYYY |
| Run Status | Choose a run status from the drop down list available. Run Status can be Completed, In Progress or Error |

Button Functionality

The following table provides explanation for each button in the screen.

| Element | Description |
|---|---|
| Search | Click Search to search for the Billing Status based on the search criteria entered. |
| Cancel | Clears the contents entered in the editable field. |
| Back | Navigates back to Auto Billing screen. |

Manual Billing

The sequential steps involved in Manual Billing

Step—1: After successful logon, click the menu Finance and select Billing. Then select Manual Billing. (See FIG. D-7)

Step—2: The screen navigates to Manual Invoice screen. (See FIG. D-8)

Step—3: Choose period and group id. If the bill for the group id is already generated for the selected month, will display the contents and create button will be disabled. Otherwise, create button will be enabled to generate a bill.

Fields Explanation

The following table provides explanations for each of the screen fields.

| Element | Description |
|---|---|
| | Invoice Details |
| Bill # | Shows the Bill #. This is auto generated by the system. |
| Bill Date | Shows the Bill Date. Show the date when this bill was generated in the format MM/DD/YYYY |
| Period | The text for invoice period. Choose from the list the invoice period for creating the bill. |
| Due Date | Shows the Due Date. Show the date when this bill is due in the format MM/DD/YYYY |
| Status | Shows the status of the Bill. |
| Reconciled Date | Shows the Reconciled Date. Show the date when this bill is reconciled in the format MM/DD/YYYY |
| | Group Information |
| Group Id | Text for Group ID. Accepts numeric values not exceeding 7 digits. |
| Group Type | Text for Group Type. It is a read only field. |
| Group Name | Text for Group Name. It is a read only field |
| Status | Text for Status. It is a read only field |
| Association Name | Text for Association Name. It is a read only field |
| Rate Type | Text for Rate Type. It is a read only field |

-continued

| Element | Description |
|---|---|
| | Group Level Adjustment |
| Type | Choose a type of adjustment from the drop down list available |
| Amount | The text for adjustment amount. Accepts value in the format of currency (example 999999999.99) |
| Period | The text for the period of adjustment. Choose month and year from the drop down list. |
| Billing Summary | Displays the bill summary. |
| Prior period billed amount | Text for Prior period billed amount. It is a read only field |
| Adjustments since prior period | Text for Adjustments since prior period. It is a read only field |
| Payments Received | Text for Payments Received. It is a read only field |
| Past Due Amount | Text for Past Due Amount. It is a read only field |
| Current bill amount | Text for Current bill amount. It is a read only field |
| Total Due | Text for Total Due. It is a read only field |
| Employee Level Adjustments | Displays Employee Level Adjustments. This can be due to Add On or Termed Employee/Members. |
| Current Premium Due | Displays current premium due for each employees |
| Bill Summary | Displays the bill summary |
| Sub Total - Medical Premium | Text for Sub Total - Medical Premium. It is a read only field |
| Sub Total - Dental Premium | Text for Sub Total - Dental Premium. It is a read only field |
| Sub Total - Vision Premium | Text for Sub Total - Vision Premium. It is a read only field |
| Sub Total - CAM Premium | Text for Sub Total - CAM Premium. It is a read only field |
| Administration member Fees | Text for Administration member Fees. It is a read only field |
| Agent member Fees | Text for Agent member Fees. It is a read only field |
| Administration flat Fee | Text for Administration flat Fee. It is a read only field |
| Agent flat Fee | Text for Agent flat Fee. It is a read only field |
| Total due current period | Text for Total due current period. It is a read only field |
| Add Past Due Amount | Text for Add Past Due Amount. It is a read only field |
| Total Due | Text for Total Due. It is a read only field |

Button Functionality

The following table provides explanations for each button in the screen.

| Element | Description |
|---|---|
| New | Click New to create a new manual bill. |
| Create | Click Create to Creates bill based on the information provided |
| Add | Add the contents of adjustments into the table below. It is only a temporary addition. Becomes permanent only on saving the record. |
| Calculate | Click calculate button to calculate the adjustments based on the adjustment period selected. |
| Update | Update the contents of adjustments. It is only a temporary update. Becomes permanent only on saving the record. |
| Delete | Delete button will delete the records in the table checked for deletion. It is only a temporary deletion. Becomes permanent only on saving the record. |
| Check All | The “Check All” Link will check all the records in the table |
| Clear All | The “Clear All” Link will uncheck all the records in the table that are checked. |

Billing Adjustments

The sequential steps involved in Dynamic Text are listed below.

Step—1: After successful logon, click the menu Finance and select Billing. Then select Billing Adjustments. (See FIG. D-9)

Step—2: The screen navigates to Adjustment Screen. (See FIG. D-10)

Step—3: Enter adjustment date.

Step—4: Choose a group id by clicking search icon. Corresponding fields are read only and selecting a group id populates the data.

Step—5: Choose Type of group level adjustment and period. Only if the value of type is Late Fee, Calculate button is enabled to calculate and fetch the value in amount field otherwise calculate button is disabled.

Step—6: Click Search button lead to have details of adjustment ids, generated. (See FIG. D-11)

Fields Explanation

The following table provides explanations for each of the screen fields.

| Element | Description |
|---|---|
| | Adjustment Details |
| Adjustment Id | This field is a read only and system generated id of exactly 10 digits. |
| Adjustment Date | Text for Adjustment Date. Choose a date by clicking calendar icon to have a date in the MM/DD/YYYY format. |
| Status | Shows the status of the adjustment. |
| | Group Information |
| Group ID | Choose a group ID by clicking search icon. Field is mandatory. |
| Group Type | Field is read only. Populates data based on the selected group ID |
| Group Name | Field is read only. Populates data based on the selected group ID |
| Association Name | Field is read only. Populates data based on the selected group ID |
| Status | Field is read only. Populates data based on the selected group ID |
| Rate Type | Field is read only. Populates data based on the selected group ID |
| | Group Level Adjustments |
| Type | Choose a type of group level adjustment from the drop down list available. Field is mandatory |
| Amount | Amount is calculated based on the inputs of type and period. Value gets populated by clicking calculate button |
| Period | Choose a period for which group level adjustment is sought. Field is mandatory. |

Button Functionality

| Element | Description |
|---|---|
| Calculate | Click calculate button to calculate the adjustments based on the adjustment period selected. |
| New | Click New to create a new group level adjustment |
| Save | Click Save to save the content of billing adjustment |
| Search | Click Search to search for the group level adjustment status based on the search criteria entered. |

Dynamic Text

The sequential steps involved in Dynamic Text are listed below.

Step—1: After successful logon, click the menu Finance and select Billing. Then select Dynamic Text. (See FIG. D-12)

Step—2: The screen navigates to dynamic text screen. (See FIG. D-13)

Step—3: Enter the text for dynamic text. This field is mandatory.

Step—4: Enter the values in the fields as per the format briefed in fields' explanation table. Choose a group id.

Step—5: On clicking Save button, the assigned dynamic text will be made available for the selected group and disable all the fields except New to continue the flow.

Fields Explanation

The following table provides explanations for each of the screen fields.

| Element | Description |
|---|---|
| Dynamic Text | The text for dynamic text. Accepts all characters. |
| Invoice Period | The text for invoice period. Choose from the list the invoice period for embedding dynamic text on the bill. |
| Selected Group | The text displays the selected group count based on the invoice period. Example 0 to 100. It is a read only field |
| Group Id | The text for group Id. Accepts numeric values not exceeding 7 digits. |
| Group Name | The text for group name. Accepts alphanumeric and special characters. |
| Group Type | Choose a group type from the drop down list available |
| ROE Cycle Date From | The text for ROE Cycle Date From. Choose from the calendar icon in the format MM/DD/YYYY. |
| ROE Cycle Date To | The text for ROE cycle end date. Choose from the calendar icon in the format MM/DD/YYYY |
| Effective Date From | The text for effective start date. Choose from the calendar icon in the format MM/DD/YYYY |
| Effective Date To | The text for effective end date. Choose from the calendar icon in the format MM/DD/YYYY |
| Group Size From | The text for group size and specifies the starting range. Accepts numeric values not exceeding 3 digits. |
| Group Size To | The text for group size and specifies the ending range. Accepts numeric values not exceeding 3 digits. |
| View Selected | Check the View Selected Check Box to view only selected groups. |
| Table | Table displays the Groups selected based on the Search and filter conditions. |

Button Functionality

The following table provides explanation for each button in the screen.

| Element | Description |
|---|---|
| Invoice Period | On Selecting the invoice period, shows all the groups/members available for the specific invoice period |
| Check All | (At Dynamic Text Header) Check All link Checks all the groups displayed. |
| Clear All | (At Dynamic Text Header). Clear All link uncheck all the groups that are checked |
| Filter | Click the Filter to display the Group based on the search criteria/filter conditions provided. |
| Clear Filter | Clear the Content of the fields. |
| Check All | The "Check All" Link will check all the records in the table |
| Clear All | The "Clear All" Link will uncheck all the records in the table that are checked. |
| Check All on this Page | The "Check All on this Page" Link will check all the records in the table on this Page |
| Invert Selection | The Invert Selection Link will invert the selection criteria for the check boxes. I.e. All Check Groups would be unchecked and vice versa. |

-continued

| Element | Description |
|---|---|
| <<, <, >, >> | These buttons are used for navigating to the next and previous records for viewing.<br><< - Show first record(s)<br>< - Show previous record(s)<br>> - Show next record(s)<br>>> - Show last record(s) |
| New | Click New to start new operation on this screen |
| Save | Click Save to save the Content of the dynamic text |

3 Cash Receipts

Cash Receipt is the transaction module that encompasses the process of creating and maintaining Cash receipts for the group and member enrolled and invoiced in the PX2 System. Cash Receipt is the process of entering the cash received by BPI into the system. The cash receipt can be received in various modes as defined by the business process. Cash Receipt includes Lock Box receipts, Check, Credit Card, EFT and Transfer. Cash Receipts here identifies the Manual Cash batch and Credit Card over phone.

Access

The application can be accessed from the main menu as follows:

Finance→Cash Receipts→Manual Batch →Credit Card over Phone

Pre-Requisites

All relevant transactional data pertaining to the group and member must be available for the Cash receipt process.

Invoice should be generated and available for the Group/Member for cash receipts for existing groups and members.

For new business enrollment the group information must be available in the system to enter the cash batch All billing information and the mode of payments must be available in the system.

For credit card over phone process, Internet connection is a mandatory.

Application Functions

This application has the following functions:

Manual Batch: Manual batch is the process of entering the payments and receipts into the system manually. The payments and receipts are identified based on the batch type that can be Manual Batch, NSF Batch, Returns Batch, Positive Transfer, Negative Transfer, Direct Deposit and Wire Transfer.

Credit Card over Phone: Credit Card over phone is a interface built for processing credit card transactions over phone for the Group/Member who opts to pay be credit card.

Manual Batch

The sequential steps involved in Manual Batch are listed below.

Step—1: After successful logon, click the menu Finance and select Cash Receipts. Then select Manual Batch (See FIG. D-14)

Step—2: The screen navigates to Manual Batch screen. (See FIG. D-15)

Step—3: Choose Batch type and enter tape total.

Step—4: Enter the values in the respective fields as per the format briefed in fields' explanation table.

Step—5: On clicking add will do the temporary storage and clicking Save will have a permanent storage.

Step—6: Clicking Search button navigates to search screen to have the details of Batch Ids generated. In the search screen, either value can be entered or simply click search button to perform the search operation.

Step—7: Following is the search result screen. Click back, to go back to Manual Batch screen. (See FIG. D-16)

Fields Explanation

The following table provides explanations for each of the screen fields.

| Element | Description |
|---|---|
| | Batch Information |
| Batch Id | The text for Batch ID. This is auto generated by the system |
| Batch Date | The text for batch date. Batch Date defaults to the current date. Choose a date by clicking calendar icon. Date accepts the format M/DD/YYYY. |
| Batch Total | The text for Batch Total. This is dynamically calculated by the system based on the batch entries |
| Batch Type | Choose the batch type from the list provided. Batch type can be Manual Batch, NSF Batch, Returns Batch, Positive Transfer, Negative Transfer, Direct Deposit and Wire Transfer. |
| Tape Total | The text for Tape Total. Accepts value in the format of currency (example 9999999999.99). This field is mandatory. |
| Tape Balance | The text for Tape Balance. This is dynamically calculated by the system based on the batch entries. |
| Batch Status | The text for Batch Status. Displays the status of the batch. Batch can be Open or Closed |
| | Check Information |
| Post Mark Date | The text for Post Mark date. Choose a date by clicking calendar icon. Date accepts the format M/DD/YYYY. Post Mark Date cannot be greater than Received date. |
| Received Date | The text for Received date. Choose a date by clicking calendar icon. Date accepts the format M/DD/YYYY. Received Date cannot be future date. This field is mandatory. |
| Check # | The text for Check #. Accepts numeric values not exceeding 10 digits. This field is mandatory. |
| Check Amount | The text for amount received. Accepts value in the format of currency (example 9999999999.99). This field is mandatory. Check amount should be equal Group Amount Total. |
| | Check Distribution |
| Group Id | Text for Group ID. Group ID accepts numeric value of exactly 7 digits. This field is mandatory. |
| Group Name | Text for Group name. It is a read only field |
| Amount | The text for amount received. Accepts value in the format of currency (example 9999999999.99) |
| Comments | Choose the comments from the list provided |
| Others | Text for others. If the Comments is Others specify other comment |
| Table | Display the Check distribution added for the batch. |

Button Functionality

The following table provides explanation for each button in the screen.

| Element | Description |
|---|---|
| Add | Click the Add Link to add additional row for the Check Distribution |
| Add | Click add button to add the content of check distribution to the table. The Check distribution amount should be equal to the check amount to add. This is only a temporary addition. Becomes permanent only on saving the record. |

-continued

| Element | Description |
| --- | --- |
| New | Click New to Create a new Batch entry |
| Save | Click Save to save the batch entry data. |
| Delete | Click Delete to delete the batch entry record checked for deletion. Becomes permanent only on saving the record. |
| Close | Click Close button to close the batch data and process auto reconciliation. Closing the batch is possible only if Tape Balance is equal to zero. |
| Search | Click search for searching the existing status of Batch Data. |

Credit Card Over Phone

The sequential steps involved in Credit card over phone are listed below.

Step—1: After successful logon, click the menu Finance and select Cash Receipts. Then select Credit Card Over Phone. (See FIG. D-17)

Step—2: The screen navigates to Credit Card over phone screen to have transaction, credit card information and amount distribution details. (See FIG. D-18)

Step—3: Enter the values in the fields as per the format briefed in fields' explanation table.

Step—4: Click Save to save the content. Initially Process button will be disabled. Once the contents are saved, Process button is enabled to process the contents.

Step—5: Click Process button to process the transaction. Once Process is click, both Save and Process buttons are disabled.

Step—6: Click Search button to have the list of all transactions ids This pops up a search screen. (See FIG. D-19)

Step—7: Enter the value in any one of the field or simply click search to perform search operation.

Step—8: This navigates to a screen with search results. (See FIG. D-20)

Step—9: Click a transaction id for selection to view/modify the content or otherwise click back to credit card over phone screen.

Fields Explanation

The following table provides explanations for each of the screen fields.

| Element | Description |
| --- | --- |
| | Transaction Information |
| Transaction Id | The text for Transaction ID. This is auto generated by the system |
| Transaction Date | The text for Transaction date. Choose a date by clicking calendar icon. Date accepts the format M/DD/YYYY. |
| Transaction Status | The text for Transaction Status. This is a read only field. The system shows the transaction status based on credit card authorization |
| | Credit Card Information |
| Card Holder's Name | The text for cardholder's name. Accepts alphabets and space between two words. |
| Credit Card Number | The text for credit card number. Accepts numeric values not exceeding 30 digits |
| Credit Card Type | Choose the type of credit card from the drop down list available. |
| Expiration Date | Choose a month and year of expiration from the drop down list available |
| First Name | The text for contact name. Accepts alphabets and special characters like hyphen and single quotes not exceeding 25 characters. |
| Middle Initial | The text for middle initial. Accepts alphabets not exceeding 1 character. |
| Last Name | The text for contact name. Accepts alphabets and special characters like hyphen and single quotes not exceeding 35 characters. |
| Street Address | The text for company address. Accepts alphanumeric and special characters not exceeding 35 characters |
| City | The text for city. Accepts alphabets and space between two words not exceeding 30 characters. |
| State | Choose the name of the state from the drop down list of States available in United States of America |
| Zip | Text for ZIP Code. Accepts numeric value of exactly 5 digits. |
| Payment Amount | Text for Payment Amount. Displays the amount due. |
| | Amount Distribution |
| Group Id | Text for Group ID. Group ID accepts numeric value of exactly 7 digits. |
| Group Name | Text for Group name. It is a read only field |
| Amount Due | Text for Amount Due. It is a read only field |
| Payment Amount | The text for amount received. Accepts value in the format of currency (example 9999999999.99) |
| Remarks | Text for Remarks. Accepts 50 characters |

Button Functionality

The following table provides explanation for each button in the screen.

| Element | Description |
| --- | --- |
| Add | Click the Add Link to add additional row for the Check Distribution |
| New | Click new to Create a new Credit Card over phone entry |
| Save | Click Save to save the Credit Card over phone entry. |
| Process | Click Process to process the credit card transaction |
| Search | Click search for searching the existing Credit Card Information entered. |
| Back | Click Back Button to go back to the Credit card over phone screen. |

4 Cash Reconciliation

Cash Reconciliation is the transaction module that encompasses the process of reconciling the invoices, cash receipts and adjustments for a specific group and member enrolled and invoiced in the PX2 System. Reconciled Cash can be disbursed to the Carriers, Agents, PacAdvantage and Benefit Partners. Normally cash reconciliation is an automated process. But under special circumstances when the Cash Receipts, Invoices and Adjustments do not match the reconciliation can be done manually using the Cash reconciliation Process.

Also it encompasses the history of billing and payment details.

Access

The application can be accessed from the main menu as follows:

Finance→Cash Reconciliation→Manual Reconciliation →Billing & Payment History

Pre-Requisites

Billing, Cash Receipts entries should have occurred for reconciliation.

Enrollment—Refer User Manual for Enrollment for further information on the enrollment process. Real time information and the transaction on the Group and member is required for Reconciliation.

Application Functions

This application has the following functions:

Manual Reconciliation.

Billing & Payment History

Manual Reconciliation

The sequential steps involved in Manual Reconciliation are listed below.

Step—1: After successful logon, click the menu Finance and select Cash Reconciliation. Then select Manual Reconciliation (See FIG. D-21)

Step—2: The screen navigates to Group Search screen. (See FIG. D-22)

Step—3: Enter value in any one of the field or simply click Search button to perform search operation.

Step—4: This pops up a screen with search result (See FIG. D-23)

Step—5: Click on any group id for selection

Step—6: Screen navigates to Cash Reconciliation. (See FIG. D-24)

Fields Explanation

The following table provides explanations for each of the screen fields.

| Element | Description |
|---|---|
| Group Id | Text to display the Group ID, This is a read only field |
| Group Name | Text to display the Group Name, This is a read only field |
| Association Name | Text for Association Name. It is a read only field |
| Rate Type | Text for Rate Type. It is a read only field |
| Group Type | Text for Group Type It is a read only field |
| Left to Balance | Text to display the Left to Balance, This is a read only field. This field is dynamically populated based on the Check box selected for the reconciliation. |

Button Functionality

The following table provides explanation for each button in the screen.

| Element | Description |
|---|---|
| Search | Click Search to search for a new group for processing reconciliation |
| Clear | Click Clear to Cancel and restore to the state as was on loading the page |
| Post Reconciliation | Click Post Reconciliation to Post Reconciliation. If the Amount Left To Balance is within (+/−2) any user can post reconciliation. If the Amount is between $3.00 to $50.00 User with Level II authorization only can post reconciliation. Amount Between $51.00 to $100.00 User with Level III authorization only can post reconciliation. For amount greater than $100.00 User with Level IV authorization only can post reconciliation. |

Billing & Payments History

The sequential steps involved in billing and payment history are listed below

Step—1: After successful logon, click the menu Finance and select Cash Reconciliation. Then Billing & Payments History. (See FIG. D-25)

Step—2: Screen navigates group search. (See FIG. D-26)

Step—3: Enter value in any one of the field or simply click search button to perform search operation.

Step—4: This pops up a search result screen. (See FIG. D-27)

Step—5: Click a group id for selection.

Step—6: Navigates to history screen. (See FIG. D-28)

Fields Explanation

The following table provides explanations for each of the screen fields.

| Element | Description |
|---|---|
| | Group Information |
| Group Id | Text for Group ID. It is a read only field. |
| Group Type | Text for Group Type. It is a read only field. |
| Group Name | Text for Group Name. It is a read only field |
| Status | Text for Status. It is a read only field |
| Association Name | Text for Association Name. It is a read only field |
| Rate Type | Text for Rate Type. It is a read only field |

Button Functionality

The following table provides explanation for each button in the screen.

| Element | Description |
|---|---|
| Search | Click Search to search for billing and payments history |

5 Cash Disbursement

Cash disbursement consists of utility operations like commission disbursement and commission adjustment.

Access

The application can be accessed from the main menu as follows:

Finance→Cash Disbursement→Commission disbursement

→Commission adjustments

All relevant transactional data pertaining to the group and member must be available for the cash disbursement.

Application Functions

This application has the following functions:

Commission disbursement

Commission adjustments

Commission Disbursement

The sequential steps involved in Agent Commission run are listed below.

Step—1: After successful logon, click the menu Finance and select Finance Operations. Select Disbursement and then select Commission Disbursement. (See FIG. D-29)

Step—2: The screen navigates to Commission Disbursement Screen. (See FIG. D-30)

Step—3: Choose Bill period from the drop down list. Click Process

Step—4: Click View Status to have the details of Run ids generated. Search screen pops up. Enter value in any of the fields, or simply click Search button to perform search operation. (See FIG. D-31)

Step—5: This pops up a screen with search result. Click any Run Id for selection to view the status of a particular run id. (See FIG. D-32)

Fields Explanation

The following table provides explanations for each of the screen fields.

| Element | Description |
|---|---|
| Run Id | The text for Export ID. This is auto generated by the system |
| Bill Period | The text for Export date. This is a read only field. |
| Run By | The text for Export Status. This is a read only field. The system shows the Export status based on premium transmission data export |

Button Functionality

The following table provides explanation for each button in the screen.

| Element | Description |
|---|---|
| Process | Click Process to start the bill run process for the all the groups and member for the specified billing period selected. |
| New | Click New to start new operation for the Bill Run. |
| Search | Click Search to navigate to Commission Billing Run Status Search |

Commission Adjustments

The sequential steps involved in Commission Adjustments are listed below.

Step—1: After successful logon, click the menu Finance and select Cash disbursement. Then select Commission Adjustments Step—2: The screen navigates to commission adjustment. (See FIG. D-33)

Step—3: Choose a type of adjustment. (See FIG. D-34)

Step—4: Choose an agent/agency id by clicking search icon. Agent name gets populated based on the selected value.

Step—5: Enter adjustment amount. Then click save.

Step—6: Click on search button yields the details of the adjustment ids created. (See FIG. D-35)

6 Finance Operations

Finance Operation consists of the utility operations within the finance module for various processes like Premium Transmission Data Output, Mail House Billing Data Output, Lockbox and EFT Exports, Credit Card Import and export, and Import Risk Adjustment Factors.

Access

The application can be accessed from the main menu as follows:

Finance→Finance Operations→Premium Transmission

→Billing

→Cash Receipts

→Risk Adjustment

Pre-Requisites

All relevant transactional data pertaining to the group and member must be available for the Finance Operations. To run this process, scheduler must be started.

Application Functions

This application has the following functions:

Premium Transmission

Mail House Billing

Lock Box

EFT Data Export

Credit Card Export

Credit Card Import

Mail house Commission Data Export

Risk Adjustment Import

Premium Transmission

The sequential steps involved in Premium Transmission are listed below.

Step—1: After successful logon, click the menu Finance and select Finance Operations. Then select Premium Transmission (See FIG. D-36)

Step—2: The screen navigates to Transmission screen. (See FIG. D-37)

Step—3: Choose the dates for transmit and comments if any. Click Export. Immediately, the export status will display the status as "In Progress".

Step—4: Click Search to know the status of the export ids generated. (See FIG. D-38)

Fields Explanation

The following table provides explanations for each of the screen fields.

| Element | Description |
|---|---|
| Export Id | The text for Export ID. This is auto generated by the system |
| Export Status | The text for Export Status. This is a read only field. The system shows the Export status based on premium transmission data export |
| Exported By | The text for Exported By. This is a read only field. |
| Export Date | The text for Export date. This is a read only field. |
| Transmit for the following Dates From: | Choose "Transmit for the following Dates From" by clicking calendar icon. The date can be in the format MM/DD/YYYY |
| Transmit for the following Dates To | Choose "Transmit for the following Dates To" by clicking calendar icon. The date can be in the format MM/DD/YYYY |
| Table | Display the Transmission ID for the Carrier and Carrier Name |
| Comments | The text for Comments. |

Button Functionality

The following table provides explanation for each button in the screen.

| Element | Description |
|---|---|
| New | Click New button to Create new Premium Data Transmission |
| Export | Click Export button to Export the Premium Data Transmission based on the selection criteria |
| Search | Click Search Button to Search for the Premium Data Transmission and view the Export Status |

Mail House Billing Data Export

The sequential steps involved in Mail House Billing Export Data are listed below.

Step—1: After successful logon, click the menu Finance and select Finance Operations. Select Billing and then select Mail House Billing Data Export. (See FIG. D-39)

Step—2: The screen navigates to Mail House Billing screen. (See FIG. D-40)

Step—3: Choose Export date and a group id for export. Click Export.

Step—4: Click view status to know the status of export ids generated. Search screen pops up. Enter value in any of the field, or simply click search button to perform search operation. (See FIG. D-41)

Step—5: Click back to navigate back to Mail House Billing screen. (See FIG. D-42)

Fields Explanation

The following table provides explanations for each of the screen fields.

| Element | Description |
|---|---|
| Mail House Billing Data | |
| Export Id | The text for Export ID. This is auto generated by the system |
| Status | The text for Export Status. This is a read only field. The system shows the Export status based on data exported |
| Exported By | The text for Exported By. This is a read only field. |
| Export Date | The text for Export date. This is a read only field. |
| Export Date as of | Choose "Export Date as of" from the list of billing period |
| Selected Groups | The text displays the selected group count based on the invoice period. Example 0 to 100. It is a read only field |
| Comments | The text for Comments. |
| Filter | |
| Group Id | The text for group Id. Accepts numeric values only. |
| Group Name | The text for group name. Accepts any characters. |
| Group Type | Choose a group type from the drop down list available |
| ROE Cycle Date From | The text for ROE Cycle Date From. Choose from the calendar icon in the format MM/DD/YYYY. |
| ROE Cycle Date To | The text for ROE cycle end date. Choose from the calendar icon in the format MM/DD/YYYY |
| Effective Date From | The text for effective start date. Choose from the calendar icon in the format MM/DD/YYYY |
| Effective Date To | The text for effective end date. Choose from the calendar icon in the format MM/DD/YYYY |
| Group Size From | The text for group size and specifies the starting range. Accepts numeric values only. |
| Group Size To | The text for group size and specifies the ending range. Accepts numeric values only. |
| View Selected | Check the View Selected Check Box to view only selected groups. |
| Table | Table displays the Groups selected based on the Search and filter conditions. |

Button Functionality

The following table provides explanation for each button in the screen.

| Element | Description |
|---|---|
| Check All | (At Text Header) Check All link Checks all the groups displayed. |
| Clear All | (At Text Header). Clear All link uncheck all the groups that are checked |
| Filter | Click the Filter to display the Group based on the search criteria/filter conditions provided. |
| Clear Filter | Clear the Content of the fields. |
| Check All | The "Check All" Link will check all the records in the table |
| Clear All | The "Clear All" Link will uncheck all the records in the table that are checked. |
| Check All on this Page | The "Check All on this Page" Link will check all the records in the table on this Page |
| Invert Selection | The Invert Selection Link will invert the selection criteria for the check boxes. I.e. All Check Groups would be unchecked and vice versa. |
| View Selected | Check the View Selected Check Box to view only selected groups. |
| <<, <, >, >> | These buttons are used for navigating to the next and previous records for viewing.<br><< - Show first record (s)<br>< - Show previous record (s)<br>> - Show next record (s)<br>>> - Show last record (s) |

-continued

| Element | Description |
|---|---|
| New | Click New to start new operation on this screen |
| Save | Click Save to save the Content of the Mail House Billing |
| View status | Click view status button to search the Status of the Mail House Billing Process |

Process Lock Box

The sequential steps involved in Lock Box are listed below.

Step—1: After successful logon, click the menu Finance and select Finance Operations. Select Cash Receipts and then select Lock Box. (See FIG. D-43)

Step—2: The screen navigates to Import Lock Box screen. (See FIG. D-44)

Step—3: On clicking Search Button enables to have a list of Import Ids. This pops up a search screen. (See FIG. D-45)

Step—4: Enter value in any of the field or simply click search button to perform search operation. This navigates to a screen with search result. (See FIG. D-46)

Step—5: Choose an Import ID for selection to alter the content or simply click back button to navigate back to Lockbox screen.

Step—6: Enter the values in the respective fields, as per the formats specified in the field explanation table and click Import.

Fields Explanation

The following table provides explanations for each of the screen fields.

| Element | Description |
|---|---|
| Import Id | Read only field to display import id value |
| Status | Read only field to display the status of import |
| Import Date | Read only field to display the import date |
| Imported By | Read only field to display the user who imported the files |
| Import File | Enter the file path or select the path by clicking browse button. The field is mandatory |
| Batch Date | Enter the date for Batch date or select a date by clicking calendar icon. The field is mandatory. |
| Tape Total | Text for tape Total. Enter the tape total. Accepts numeric values in the format 9999999.99 |
| Comment | Text for comments. |

Button Functionality

The following table provides explanation for each button in the screen.

| Element | Description |
|---|---|
| New | Click on new button enables to have a new import of Lockbox File. |
| Import | Click on import button will perform the action of importing the file selected. |
| Search | Click on the Search button to search for the Lockbox file import status. |
| Browse | Click on the Browse button will enable to choose a file to import |

EFT Data Export

The sequential steps involved in EFT Data Export are listed below.

Step—1: After successful logon, click the menu Finance and select Finance Operations. Select Cash Receipts and then select EFT Data Export. (See FIG. D-47)

Step—2: The screen navigates to EFT Data Export screen. (See FIG. D-48)

Step—3: On clicking Search button leads to EFT Data Search screen to have all the Export Ids. (See FIG. D-49)

Step—4: Enter the value in any one of the field or simply click search button to perform search operation. This pops up a screen with search results. (See FIG. D-50)

Step—5: Choose an Export ID for selection, otherwise click Back button to navigate back to EFT Data Export.

Step—6: Enter the values in the respective fields as per the format briefed under Fields' Explanation and click Export.

Fields Explanation

The following table provides explanations for each of the screen fields.

| Element | Description |
|---|---|
| | Export EFT Data |
| Export Id | The text for Export ID. This is auto generated by the system |
| Status | The text for Export Status. This is a read only field. The system shows the Export status based on data exported |
| Exported By | The text for Exported By. This is a read only field. |
| Export Date | The text for Export date. This is a read only field. |
| Export Date as of | Choose "Export Date as of" from the list of billing period |
| Selected Groups | The text displays the selected group count based on the invoice period. Example 0 to 100. It is a read only field |
| Total Bill Amount | Text to display the total bill amount. This is read only field |
| Comments | The text for Comments. |
| | Filter |
| Group Id | The text for group Id. Accepts numeric values only. |
| Group Name | The text for group name. Accepts any characters. |
| Group Type | Choose a group type from the drop down list available |
| ROE Cycle Date From | The text for ROE Cycle Date From. Choose from the calendar icon in the format MM/DD/YYYY. |
| ROE Cycle Date To | The text for ROE cycle end date. Choose from the calendar icon in the format MM/DD/YYYY |
| Effective Date From | The text for effective start date. Choose from the calendar icon in the format MM/DD/YYYY |
| Effective Date To | The text for effective end date. Choose from the calendar icon in the format MM/DD/YYYY |
| Group Size From | The text for group size and specifies the starting range. Accepts numeric values only. |
| Group Size To | The text for group size and specifies the ending range. Accepts numeric values only. |
| View Selected | Check the View Selected Check Box to view only selected groups. |
| Table | Table displays the Groups selected based on the Search and filter conditions. |

Button Functionality

The following table provides explanation for each button in the screen.

| Element | Description |
|---|---|
| Exported date As on | On Selecting the Exported date As on, shows all the groups/members available for the specific period |
| Check All | (At Text Header) Check All link Checks all the groups displayed. |
| Clear All | (At Text Header). Clear All link uncheck all the groups that are checked |
| Filter | Click the Filter to display the Group based on the search criteria/filter conditions provided. |

-continued

| Element | Description |
|---|---|
| Clear Filter | Clear the Content of the fields. |
| Check All | The "Check All" Link will check all the records in the table |
| Clear All | The "Clear All" Link will uncheck all the records in the table that are checked. |
| Check All on this Page | The "Check All on this Page" Link will check all the records in the table on this Page |
| Invert Selection | The Invert Selection Link will invert the selection criteria for the check boxes. I.e. All Check Groups would be unchecked and vice versa. |
| <<, <, >, >> | These buttons are used for navigating to the next and previous records for viewing.<br><< - Show first record (s)<br>< - Show previous record (s)<br>> - Show next record (s)<br>>> - Show last record (s) |
| New | Click New to start new operation on this screen |
| Export | Click Save to save the Content of the EFT Export |
| Commit | Click Commit to effect the EFT Payment |
| Search | Click on Search navigates to have EFT search |
| Back | Click Back navigates back to EFT payment screen |

Credit Card Export

The sequential steps involved in Credit Card Export are listed below.

Step—1: After successful logon, click the menu Finance and select Finance Operations. Select Cash Receipts and then select Credit Card Export. (See FIG. D-51)

Step—2: The screen navigates to Credit Card Export Screen (See FIG. D-52)

Step—3: Choose export date and a group id. Click Export. This pops up a screen for confirmation to download. Click Ok. (See FIG. D-53)

Fields Explanation

The following table provides explanations for each of the screen fields.

| Element | Description |
|---|---|
| | Credit Card Export |
| Export Id | The text for Export ID. This is auto generated by the system |
| Status | The text for Export Status. This is a read only field. The system shows the Export status based on data exported |
| Exported By | The text for Exported By. This is a read only field. |
| Export Date | The text for Export date. This is a read only field. |
| Export Date as of | Choose "Export Date as of" from the list of billing period |
| Selected Groups | The text displays the selected group count based on the invoice period. Example 0 to 100. It is a read only field |
| Comments | The text for Comments. |
| | Filter |
| Group Id | The text for group Id. Accepts numeric values only. |
| Group Name | The text for group name. Accepts any characters. |
| Group Type | Choose a group type from the drop down list available |
| ROE Cycle Date From | The text for ROE Cycle Date From. Choose from the calendar icon in the format MM/DD/YYYY. |
| ROE Cycle Date To | The text for ROE cycle end date. Choose from the calendar icon in the format MM/DD/YYYY |
| Effective Date From | The text for effective start date. Choose from the calendar icon in the format MM/DD/YYYY |
| Effective Date To | The text for effective end date. Choose from the calendar icon in the format MM/DD/YYYY |
| Group Size From | The text for group size and specifies the starting range. Accepts numeric values only. |

-continued

| Element | Description |
|---|---|
| Group Size To | The text for group size and specifies the ending range. Accepts numeric values only. |
| View Selected | Check the View Selected Check Box to view only selected groups. |
| Table | Table displays the Groups selected based on the Search and filter conditions. |

Button Functionality

The following table provides explanation for each button in the screen.

| Element | Description |
|---|---|
| Exported date As on | On Selecting the Exported date As on, shows all the groups/members available for the specific period |
| Check All | (At Text Header) Check All link Checks all the groups displayed. |
| Clear All | (At Text Header). Clear All link uncheck all the groups that are checked |
| Filter | Click the Filter to display the Group based on the search criteria/filter conditions provided. |
| Clear Filter | Clear the Content of the fields. |
| Check All | The "Check All" Link will check all the records in the table |
| Clear All | The "Clear All" Link will uncheck all the records in the table that are checked. |
| Check All on this Page | The "Check All on this Page" Link will check all the records in the table on this Page |
| Invert Selection | The Invert Selection Link will invert the selection criteria for the check boxes. I.e. All Check Groups would be unchecked and vice versa. |
| <<, <, >, >> | These buttons are used for navigating to the next and previous records for viewing.<br><< - Show first record (s)<br>< - Show previous record (s)<br>> - Show next record (s)<br>>> - Show last record (s) |
| New | Click New to start new operation on this screen |
| Save | Click Save to save the Content of the Credit Card Export |

Credit Card Import

The sequential steps involved in Credit Card Import are listed below.

Step—1: After successful logon, click the menu Finance and select Finance Operations. Select Cash Receipts and then select Credit Card Import. (See FIG. D-54)

Step—2: The screen navigates to Credit Card Import Screen. (See FIG. D-55)

Step—3: Choose a file to import by clicking Browse button. The file should be in the format of .txt Step—4: Click Import button to import the selected file. If the file selected is imported successfully, status will show imported.

Fields Explanation

The following table provides explanations for each of the screen fields.

| Element | Description |
|---|---|
| Import Id | Read only field to display import id value |
| Status | Read only field to display the status of import |
| Import Date | Read only field to display the import date |
| Imported By | Read only field to display the user who imported the files |

-continued

| Element | Description |
|---|---|
| Import File | Enter the file path or select the path by clicking browse button. The field is mandatory |
| Comments | Text for Comments |

Button Functionality

The following table provides explanation for each button in the screen.

| Element | Description |
|---|---|
| New | Click on new button enables to have a new import of Credit Card File. |
| Import | Click on import button will perform the action of importing the file selected. |

Mail House Commission Data Export

The sequential steps involved in Agent Commission run are listed below.

Step—1: After successful logon, click the menu Finance and select Finance Operations. Select Cash Receipts and then select Mail house Commission data export. (See FIG. D-56)

Step—2: The screen navigates to Mail House Commission Data Export Screen (See FIG. D-57)

Step—3: Choose export date and group id to be exported. Click Export.

Step—4: Click view status to have the status details of export ids generated. Search screen pops up. Enter value in any of the field or simply click search button to perform search operation. (See FIG. D-58)

Step—5: This pops up a screen with search result. Click Back to navigate back to Mail house commission data export screen. (See FIG. D-59)

Fields Explanation

The following table provides explanations for each of the screen fields.

| Element | Description |
|---|---|
| | Cheque Billing |
| Export Id | The text for Export ID. This is auto generated by the system |
| Status | The text for Status. This is a read only field. The system shows the Export status based on premium transmission data export |
| Exported By | The text for Exported By. This is a read only field. |
| Export Date | The text for Export date. This is a read only field. |
| Exported date As on | On Selecting the Exported date As on, shows all the groups/members available for the specific period |
| Selected Groups Of | Displays the number of groups selected from the total number of available groups |
| Comments | The text for Comments. |
| | Filter |
| Agent/Agency Id | Text for agent/agency id. Accepts numeric values of not exceeding 10 digits |
| Agent/Agency | Choose either agent or agency to incorporate names |
| Agent First Name | The text for contact name. Accepts alphabets and special characters like hyphen and single quotes not exceeding 25 characters. Field is mandatory |
| Agent Last Name | The text for contact name. Accepts alphabets and special characters like hyphen and single quotes not exceeding 35 characters. Field is mandatory |

-continued

| Element | Description |
|---|---|
| Agency Legal Name | |
| View Selected | Check the View Selected Check Box to view only selected groups. |
| Effective Date From | The text for effective start date. Choose from the calendar icon in the format MM/DD/YYYY |
| Effective Date To | The text for effective end date. Choose from the calendar icon in the format MM/DD/YYYY |
| Check All | The "Check All" Link will check all the records in the table |
| Clear All | The "Clear All" Link will uncheck all the records in the table that are checked. |
| Check All on this Page | The "Check All on this Page" Link will check all the records in the table on this Page |
| Invert Selection | The Invert Selection Link will invert the selection criteria for the check boxes. I.e. All Check Groups would be unchecked and vice versa. |

Button Functionality

The following table provides explanation for each button in the screen.

| Element | Description |
|---|---|
| New | Click New to start new operation on this screen |
| Export | Click Export button to Export the check billing data based on the selection criteria |
| Search | Click Search Button to Search for the check billing data and view the Export Status |
| Filter | Click the Filter to display the Group based on the search criteria/filter conditions provided. |
| Clear Filter | Clear the Content of the fields. |

Risk Adjustment

The sequential steps involved in Risk Adjustment Import are listed below.

Step—1: After successful logon, click the menu Finance and select Finance Operations. Select Risk Adjustment and then select Risk Adjustment Import. (See FIG. D-60)

Step—2: The screen navigates to Import Risk Adjustment Factor. (See FIG. D-61)

Step—3: Choose a file to import by clicking Browse button. The file format should be of .txt Click Import to import the selected file.

Step—4: Click search button to know the status of import ids generated. This pops up a search screen, where the enter any value in one of the field or simply click search to perform search operation.

Step—5: This pops up a screen with search result. Click on any import id to view the contents or otherwise click Back button to navigate back to Import Risk Adjustment Factor screen. (See FIG. D-62)

Fields Explanation

The following table provides explanations for each of the screen fields.

| Element | Description |
|---|---|
| Import Id | Read only field to display import id value |
| Import Status | Read only field to display the status of import |
| Imported By | Read only field to display the user who imported the files |
| Import Date | Read only field to display the import date |

-continued

| Element | Description |
|---|---|
| Import File | Enter the file path or select the path by clicking browse button. The field is mandatory |
| Effective Date | Enter the date for Effective date or select a date by clicking calendar icon. The field is mandatory. |

Button Functionality

The following table provides explanation for each button in the screen.

| Element | Description |
|---|---|
| New | Click on new button enables to have a new import of Risk Adjustment Factor File. |
| Import | Click on import button will perform the action of importing the file selected. |
| Search | Click on the Search button to search for the Risk Adjustment file import status. |

PX2 User Manual

Others

1 Introduction

Others encompass the modules like Search Zip, Call Tracking, Manual Mail Merge, Report and Letter Regeneration.

The Applications

Search Zip—. Search Zip provides basically two types of searches. First it analyses the zip codes provided namely zip1 and zip2 and provides the distance between the two locations. Another one is search can be made either by entering zip code, county or city Call Tracking—. Call Tracking is used to track the calls that are made or received with specific business intension. It can be inbound (calls received) or outbound (calls made). It also has a feature for identifying task on hand for the calls as "To do List"

Manual Mail Merge—. The Mail Merge module addresses the functionality of the system where it needs to generate business correspondences using predefined templates. The templates are basically RTF files with placeholders for dynamic data in them. The output is usually a RTF file, but at times this could be a PostScript or a PDF document Letter Regeneration—. The Letter Regeneration is mainly to generate letters as per the templates provided. The templates can be selected based on the selected criteria, namely Group, Employee, Agent and Dependent.

Reports—. Report Module encompasses the process of displaying the business information to the viewers. The objective of the Reports is to provide information captured in the system to the user in a presentable manner. The reports can be single, two-dimensional and multi dimensional providing the information to the decision-maker

2 Search Zip

Search Zip provides basically two types of searches. First it analyses the zip codes provided namely zip1 and zip2 and provides the distance between the two locations. Entering zip code, county or city can make another one is search.

Access

The application can be accessed from the main menu as follows:

Others→Search Zip

Pre-Requisites

Zip search provides the distance between the two zip codes and also search can be made by either on zip code, county or city.

Application Functions

The application consists of only one screen.

Zip Search—to arrive the distance of two zip codes and also to have a search either on zip code, county or city.

Search Zip

Zip search provides the distance between the two zip codes and also either on zip code, county or city can make search.

Step—1: After successful logon, click the menu Others and Search Zip. (See FIG. E-1)

Step—2: Choose any one from the options [City, County, Zip] and enter corresponding value in the text field. Entry to this field is mandatory, before clicking Search button.

Step—3: This pops up a screen with search results. (See FIG. E-2)

Step—4: Enter zip code1 and zip code2, as per field explanation provided in Fields Explanation table. Also choose the search option from City/County/Zip. Click Search. (See FIG. E-3)

Fields Explanation

The following table provides explanations for each of the screen fields

| Element | Description |
|---|---|
| Zip1 | Enter the value for zip1. Accepts numeric values of 5 digits. |
| Zip2 | Enter the value for zip1. Accepts numeric values of 5 digits. Both zip1 and zip2 cannot have the same value. |
| Distance between zip1 and zip is | The text displays the distance between zip1 and zip2 |
| City | Choosing the value of the radio button for city for the text typed in the search box will display matched records. The text entered for this search should be alpha. |
| County | Choosing the value of the radio button for county for the text typed in the search box will display matched records. The text entered for this search should be alpha. |
| Zip | Choosing the value of the radio button for zip for the value typed in the search box will display matched records. The value entered for this search should be numeric with 5 digits. |

Button Functionality

The following table provides explanation for each button in the screen

| Element | Description |
|---|---|
| Search | Click on the search button will search based on the selection of the radio button value for the text entered in the search box. Search box should not be empty. |
| Cancel | Click on the cancel button to clear the data entered on the screen and focus on the same screen to proceed. |
| Print | Click on Print will print the contents of the table generated based on the search criteria. |
| Go button | Click on the go button to analyze the zip codes entered for their availability and displays the result for the valid zip codes. |

3 Call Tracking

Call Tracking is used to track the calls that are made or received with specific business intension. It can be inbound (calls received) or outbound (calls made). It also has a feature for identifying task on hand for the calls as “To do List”.

Access

The application can be accessed from the main menu as follows:

Others→Call Tracking

→To Do List

Pre-Requisites

Group & Agent information must be available in the system. as a pre-requisite

Application Functions

This application has the following functions:

Call Tracking—to keep track of information received from group/agent

To Do List—gives a list of task to be performed

Call Tracking

Step—1: After successful logon, click the menu Sales & Marketing and select Call Tracking. Then select call tracking. (See FIG. E-4)

Step—2: Screen navigates to Call Tracking screen. (See FIG. E-5)

Step—3: Select a value for call type from the list available Choose. Group/Agent Id by clicking search icon. (See FIG. E-6)

Step—4: On clicking search icon, a search screen pops up. Search operation can be performed either based on the inputs or even if the fields are empty. (See FIG. E-7)

Step—5: Click on group id for selection

Step—6: Enter the value of the fields, as per the format briefed in field’s explanation section Step—7: Click save button.

Fields Explanation

The following table provides explanations for each of the screen fields.

| Element | Description |
|---|---|
| Call Type | Choose a type of call from the drop down list available |
| Referenced Entity | Choose an entity from either Group or Agent. Group is the default selected value |
| Group Id | The text for group id. Choose a group id by clicking search icon. It is valid only if the option of referenced entity is group. The field is mandatory |
| Agent Id | The text for agent id. Choose an agent id by clicking search icon. It is valid only if the option of referenced entity is agent. The field is mandatory |
| Caller Name | The text for caller name Accepts alphabets and special characters like hyphen and single quotes not exceeding 35 characters. Field is mandatory |
| Nature of Call | Choose a nature of call from the drop down list available. Field is mandatory |
| Other | The text for others. It accepts alphanumeric values. The field is active only if the value of nature of call is other |
| Date & Time | The text for date and time. It is a system generated value and it is read only |
| Follow-up required | Click the check box, if the follow-up is required |
| Follow-up Date | The text for follow-up date. Choose a date in the format MM/DD/YYYY by clicking calendar icon. It is mandatory only if the follow-up value is clicked. |

-continued

| Element | Description |
|---|---|
| Comment | The text for comments. Accepts alphanumeric and special characters except double quotes of maximum length 255 characters |

Button Functionality

The following table provides explanation for each button in the screen.

| Element | Description |
|---|---|
| Save | Saves the entered information not only for the present screen. |
| Search | Clears the screen and perform search operation based on the input value for group/agent. |
| Cancel | Clears the contents entered in the fields or restore to the previous state as was before saving the changes. |

To do List

Step—1: After successful logon, click the menu Others and select Call Tracking. Then select To Do List. (See FIG. E-8)

Step—2: Screen navigates to “To Do” List screen.

Step—3: Choose call type. Enter date for either follow-up date or called date. Click Search. (See FIG. E-9)

Step—4: This pops up a screen with search result. (See FIG. E-10)

Step—5: On selecting an entity by clicking the check box, it means that the status is going to be changed.

Step—6: On clicking save it will ask for confirming the change in status. Once it is confirmed the task is completed and get removed from the list.

Fields Explanation

The following table provides explanations for each of the screen fields.

| Element | Description |
|---|---|
| Call Type | Choose a type of call from the option of inbound and outbound. The default value selected is inbound |
| Follow-up Date | The text for follow-up date. Choose a date in the format MM/DD/YYYY by clicking calendar icon. provided the option of follow-up-date is selected |
| Called Date | The text for called date. Choose a date in the format MM/DD/YYYY by clicking calendar icon, provided called date is selected |

Button Functionality

The following table provides explanation for each button in the screen.

| Element | Description |
|---|---|
| Save | Saves the entered information not only for the present screen. |
| Search | Clears the screen and perform search operation based on the input value for group/agent. |
| Cancel | Clears the contents entered in the fields or restore to the previous state as was before saving the changes. |
| Close | Close the window. |

4 Manual Mail Merge

The Mail Merge module addresses the functionality of the system where it needs to generate business correspondences using predefined templates. The templates are basically RTF files with placeholders for dynamic data in them. The output is usually a RTF file, but at times this could be a PostScript or a PDF document Access The application can be accessed from the main menu as follows:

Others→Manual Mail Merge

Pre-Requisites

All the pre-defined templates for generating business correspondence must be available for generating the same.

Application Functions

This application has the following functions:

Mail Merge—to generate business correspondence as per the available templates.

Manual Mail Merge

The screen is to generate business correspondence.

The sequential steps involved in manual mail merge are listed below.

Step—1: After successful logon, click the menu others select Manual Mail Merge. (See FIG. E-11)

Step—2: Navigates to a screen wherein a category has to be selected. Based on the selected category, the templates pertaining to that category will be displayed for generating business correspondence. (See FIG. E-12)

Step—3: Choose a template id for generating the business correspondence. (See FIG. E-13)

Step—4: This navigates to a screen, which has mainly three headings stating about the details of Template information, the category selected and the output option. The header that contains the fields based on the selected category, are all dynamically generated. to have search operation. (See FIG. E-14)

Step—5: The content of the fields based on the category selected, has to be selected by search icon. Enter any value or first letter in any one of the fields to perform search operation. Click search icon. (See FIG. E-15)

Step—6: This pops up a screen with search result. (See FIG. E-16)

Step—7: Click on any hyperlink for selection.

Step—8: Choose the output option. If the option is View the user can a view of the business letter generated from the chosen template or otherwise if the option is Print to Mailroom will queue the business correspondence generated to printer. A pop up screen will appear stating the status of mail merge. (See FIG. E-17)

Step—9: On clicking Ok button, screen navigates to word document as follows: (See FIG. E-18)

5 Letter Regeneration

Letter Regeneration is used to generate letters for a specific period with specific type of letter say Add On, Termination etc., with specific addressee say Employee, Group, Dependent etc., Access The application can be accessed from the main menu as follows:

Others→Letter Regeneration

Pre-Requisites

Relevant information must be available in the system as a pre-requisite

Application Functions

This application has the following functions:

Letter Regeneration—to generate letters with specific request

Letter Regeneration

Step—1: After successful logon, click the menu Others and then Letter Regeneration. (See FIG. E-19)

Step—2: Screen navigates to Letter Regeneration screen.

Step—3: Enter the values in the respective field as per the format explained in fields' explanation table.

Step—4: Based on the selected value in Address Type, will allow to have search operation for address, by clicking the search icon. (See FIG. E-20)

Step—5: By clicking the search icon for addressee, search screen displays, for the selected value in address type.

Step—6: Select an employee id. The selected employee name gets reflected in Letter Regeneration screen. (See FIG. E-21)

Step—7: According to the inputs, the templates will be displayed by clicking Search button to generate a letter. If no option is selected and simply clicking search button will display all the templates.

Step—8: Click on any template for selection to generate a letter.

Fields Explanation

The following table provides explanations for each of the screen fields.

| Element | Description |
|---|---|
| Letter generated between | The text for From date to generate a letter. Choose a date in the format MM/DD/YYYY by clicking calendar icon provided |
| And | The text for To date to generate a letter. Choose a date in the format MM/DD/YYYY by clicking calendar icon provided |
| Type of letter | Choose a type of letter from the drop down list available namely, Add On, Termination, Missing Info, Others |
| Addressee type | Choose a type of addressee from the drop down list available namely, Group, Employee, Dependent, Agent. This field is mandatory. |
| Addressee | Based on the selected value of addressee type, will restrict to choose a addressee by clicking the search icon. |
| Addressee name | Text for addressee name. This is a read only field. Data is populated by selecting an addressee by clicking search icon. |

Button Functionality

The following table provides explanation for each button in the screen.

| Element | Description |
|---|---|
| Search | Clears the screen and perform search operation based on the input value. |
| Clear | Clears the contents entered in the fields or restore to the previous state as was before saving the changes. |

6 Reports

Reports Module encompasses the process of displaying the business information to the viewers. The objective of the Reports is to provide information captured in the system to the user in a presentable manner. The reports can be single, two-dimensional and multi dimensional providing the information to the decision-maker.

Reports are categorized based on the modules and the purpose of the reports.

Access

The application can be accessed from the main menu as follows:

Others→Reports

Pre-Requisites

All the master and transactional data must be available in the system to display the real time reporting feature.

Application Functions

This application has the following functions:

Generate—to generate reports

Report

The screen is to generate report

The sequential steps involved in generating a report are listed below.

Step—1: After successful logon, click the menu Others select Report. (See FIG. E-22)

Step—2: The screen navigates to report heading, which are identified as major headings to cover all the information. (See FIG. E-23)

Step—3: Choose any heading. Click (+) to expand and (−) to collapse. Screen displays the sub-headings under each major heading. (See FIG. E-24)

Step—4: Choose any sub-heading to have report.

Step—5: Navigates to a screen for entering the query criteria. These fields are built dynamically based on the report sought. (See FIG. E-25)

Step—6: Enter the search criteria as available on the screen and Click Generate Report. Click on the back button to navigated back to the Report Screen.

Step—7: Opens up a new browser window and displays the report in the crystal viewer. (See FIG. E-26)

PX2 User Manual

Sales & Marketing

1 Introduction

Sales and Marketing is the master and transaction module that encompasses the process of creating and maintaining master and transaction information that is required for the PX2 System like Agent, Agency, Lead, Quotes, Work Group, Associates, Supplier request, Lead and Agent Tracking and Campaign.

The Applications

The above-mentioned processes are accomplished in several applications embedded into the Sales and Marketing Module. These applications steer the tasks of creating, and maintaining master and transaction information for the PX2 entities, thereby helping achieve the goals of the Sales and Marketing.

Supply Request—A Supply Request is the process of ordering the handbooks, rate books, forms and application, complementary, super directories that are sent to the employer groups and its members through the mailroom. Supplier Request basically consists of Internal Supplier request to cater to the internal needs of the BPI and External Supplier request to cater to the external needs of the BPI.

Work Groups—Workgroups is the process of categorization of a group of agents, internal working personnel of BPI, external working personnel associated with BPI into a subset of work groups.

Associates—The Associated is the process of identifying and managing the personnel who are employed by BPI and work with BPI.

Campaign—A campaign is the process of identifying a segment of potential employer groups targeted through the media like the radio, newspaper, mailers etc. Benefit Partners organizes for the marketing campaigns through third parties or by itself periodically.

Sales Master—Sales Master is the process of maintaining the entire master records relevant to the Sales. This includes operations like creation and maintenance of Agent, Agency, Lead Masters, Lead Tracking, and Agent Profiles.

Quotes—Quotes are the processes of providing Quotes for potential business entities as well as existing business entities. Quotes can be requested for small Employer Groups or Alternate Groups (Individual Association Member, Association Group, COBRA etc.) as well as for employees of those groups.

2 Supply Request

Supplier request is to setup basic information for ordering various Handbooks, stationeries and other materials needs by BPI for their day to day business in the PX2 system Supplier Request are of two types, Internal and External Access The application can be accessed from the main menu as follows:

Sales & Marketing→Supply Request→Internal Supply Request

Sales & Marketing→Supply Request→External Supply Request

Sales & Marketing→Supply Request→Confirm Internal

Sales & Marketing→Supply Request→Confirm External

Pre-Requisites

Both internal and external supplier request contains header and the items (As Stock # in the header and Items below). The data for the Stock # and the Items are available in the tables TBL_BPICAS_CODE_CTRL and TBL_BPICAS_UTIL.

Table TBL_BPICAS_CODE_CTRL has CODE_ID, CODE_VALUE and CODE_DESC

The table needs to be populated to have the Stock # on the screen

Example Data

| CODE_ID | CODE_VALUE | CODE_DESC |
|---|---|---|
| EXTERNAL | PSP | Pre-Selected package |
| EXTERNAL | HB | Hand Book |
| INTERNAL | SOS | Standard Office Supply |

Table TBL_BPICAS_UTIL has REQUEST_TYPE, SUB_CLASS, UTIL_NAME and UTIL_DESC

The table needs to be populated to have the Items on the screen

Example Data

| REQUEST_TYPE | SUB_CLASS | UTIL_NAME | UTIL_DESC |
|---|---|---|---|
| EXTERNAL | HB | DNH | Dental Hand Book |
| INTERNAL | SOS | BR | Binder Clips Small |

Application Functionality

The application consists of two screens.

Internal Supply Request—to have internal supply request

External Supply Request—to have external supply request

Internal Supply Request

Step—1: After successful login, click Supply Request then select Internal Supply Request. (See FIG. F-1)

Step—2: Navigates to Internal Supply Request screen. Entry in one quantity field is mandatory. Also confirmation can be accessed by clicking confirmation tab. (See FIG. F-2)

Step—3: On clicking Save navigates Confirmation screen. (See FIG. F-3)

Fields Explanation

The following table provides explanations for each of the screen fields.

| Element | Description |
|---|---|
| Qty | Enter the value for quantity. Accepts only numeric values. At least one value for quantity is mandatory. |
| Special Instructions | Enter the text for special instructions. Accepts alphanumeric and special characters not exceeding 255 characters. The field is optional. |

Button Functionality

The following table provides explanations for each of the screen fields.

| Element | Description |
|---|---|
| Save button | Click on save button to the save the content keyed in and navigates to confirmation screen displaying the Confirmation ID. |
| Cancel button | Click on clear button clears the content and appears again for fresh entries |

External Supply Request

Step—1: After successful login, click Supply Request then select External Supply Request. (See FIG. F-4)

Step—2: Navigates to External Supply Request screen. Entry in one quantity field is mandatory. Also confirmation can be accessed by clicking confirmation tab. (See FIG. F-5)

Step—3: On clicking Save navigates to Confirmation screen. (See FIG. F-6)

Fields Explanation

The following table provides explanations for each of the screen fields.

| Element | Description |
|---|---|
| Qty | Enter the value for quantity. Accepts only numeric values. At least one value for quantity is mandatory. |
| Customer Request | Enter a date or click calendar icon to select a date. |

-continued

| Element | Description |
|---|---|
| Date | The field is mandatory. |
| Confirm fulfillment by Email | Choose the option by ticking the checkbox to have a confirmation of request made by email. |
| Agent/Employer Group Id | Enter the value for agent/employer group id. The field is mandatory. Or Choose the Agent or Group by clicking the Search Icon |
| Company Name | Enter the text for company name. The field is mandatory |
| Address | The text for company address. Accepts alphanumeric and special characters not exceeding 35 characters |
| Suite | The text for company suite Accepts alphanumeric and special characters not exceeding 35 characters |
| City | The text for city. Accepts alphabets and space between two words not exceeding 30 characters. The field is mandatory |
| State | Choose a state from the drop down list. The field is mandatory |
| Referenced Entity | Choose the option either Group or Agent |
| Zip | The text for zip. Accepts numeric value of exactly 5 digits. |
| Ship via | Choose the option of delivery from the available modes like Mailroom, Will Call, |
| Special Instructions | Enter the text for special instructions. Accepts alphanumeric and special characters not exceeding 255 characters. |

Button Functionality

The following table provides explanations for each of the screen fields.

| Element | Description |
|---|---|
| Save button | Click on save button to the save the content keyed in and navigates to confirmation screen displaying the Confirmation ID. |
| Cancel button | Click on clear button clears the content and appears again for fresh entries |

3 Work Groups

Work Group is to setup basic information like Category, Work Group and Child Work Group. Workgroups is the concept of categorization of a group of agents, internal working personnel of BPI, external-working personnel associated with BPI into a subset of work groups. Also this provides a feature of swapping the members within the work group.

Access

The application can be accessed from the main menu as follows:

Sales & Marketing→Work Groups→Category

Sales & Marketing→Work Groups→Main Workgroup

Sales & Marketing→Work Groups→Child Workgroup

Sales & Marketing→Work Groups→Mail Members

Sales & Marketing→Work Groups→Swap Members

Pre-Requisites

There are no pre-requisites for using this application.

Application Functions

This application has the following functions:

Category—To Create, Modify and view Category

Main Workgroup—To Create, Modify and view Main Workgroup

Child Workgroup—To Create, Modify and view Child Workgroup

Mail Members—To Create, Modify and view Mail Members

Swap Members—To Swap members between source and destination work groups

Category

Step—1: After successful logon, click the menu Sales & Marketing and select Work Groups. Then select Category. (See FIG. F-7)

Step—2: Screen navigates to category screen. Enter the category name with its description as per the format briefed in field's explanation section. (See FIG. F-8)

Step—3: Click Add button to have a temporary storage.

Step—4: Select a category name by clicking Edit button to modify a category name. (See FIG. F-9)

Step—5: Change any modifications and click Update

Step—6: Click Save button to save the contents

Fields Explanation

The following table provides explanations for each of the screen fields.

| Element | Description |
|---|---|
| Name | The text for category name. Accepts alphabets and numeric and "/ " values not exceeding 30 characters. Entry to this field is mandatory. |
| Description | The text for category description. Accepts alphabets and numeric and special characters except double quotes with values not exceeding 255 characters. |

Button Functionality

The following table provides explanation for each button in the screen.

| Element | Description |
|---|---|
| Add | Add the contents of category. It is only a temporary addition. Becomes permanent record only after saving |
| Edit | Edit button will allow for editing a specific record in the table. |
| Delete | Delete button will delete the records in the table checked for deletion. It is only a temporary deletion. Becomes permanent record only after saving |
| Update | Update the contents of category. It is only a temporary update. Becomes permanent record only after saving |
| Check All | The "Check All" Link will check all the records in the table |
| Clear All | The "Clear All" Link will uncheck all the records in the table that are checked. |
| Print | The Print will pops up a screen displaying the content of the table created and enables the user to have print out of the same. |
| Save | Saves the entered category in the database. The page gets refreshed and the contents entered in the fields are shown. |
| Cancel | Clears the contents entered in the fields or restore to the previous state as was before saving the changes. |

Main Workgroup

Step—1: After successful logon, click the menu Sales & Marketing and select Work Groups. Then select Main Workgroup. (See FIG. F-10)

Step—2: Screen navigates to main workgroup screen. Choose a category name. Enter the main workgroup name with its description and also select the option whether it is a child work group or main work group, as per the format briefed in field's explanation section. (See FIG. F-11)

Step—3: Click Add button to have a temporary storage.

Step—4: Select a main workgroup name by clicking Edit button to modify a main workgroup name. (See FIG. F-12)

Step—5: Change any modifications and click Update

Step—6: Click Save button to save the contents

Fields Explanation

The following table provides explanations for each of the screen fields.

| Element | Description |
|---|---|
| Category | Choose a category from the drop down list available |
| Name | The text for main workgroup name. Accepts alphabets and numeric values not exceeding 30 characters. Entry to this field is mandatory. |
| Description | The text for main workgroup description. Accepts alphabets and numeric and all special characters except double quotes with values not exceeding 255 characters. Field is optional |
| Is this a child workgroup | Choose this option, if the main work group is also a child work group |

Button Functionality

The following table provides explanation for each button in the screen.

| Element | Description |
|---|---|
| Add | Add the contents of main workgroup. It is only a temporary addition. Becomes permanent record only after saving |
| Edit | Edit button will allow for editing a specific record in the table. |
| Delete | Delete button will delete the records in the table checked for deletion. It is only a temporary deletion. Becomes permanent record only after saving |
| Update | Update the contents of main workgroup. It is only a temporary update. Becomes permanent record only after saving |
| Check All | The "Check All" Link will check all the records in the table |
| Clear All | The "Clear All" Link will uncheck all the records in the table that are checked. |
| Print | The Print will pops up a screen displaying the content of the table created and enables the user to have print out of the same. |
| Save | Saves the entered main workgroup in the database. The page gets refreshed and the contents entered in the fields are shown. |
| Cancel | Clears the contents entered in the fields or restore to the previous state as was before saving the changes. |

Child Workgroup

Step—1: After successful logon, click the menu Sales & Marketing and select Work Groups. Then select Child Workgroup. (See FIG. F-13)

Step—2: Screen navigates to child workgroup screen. Choose a main workgroup. Enter the child workgroup name with its description, as per the format briefed in field's explanation section. (See FIG. F-14)

Step—3: Click Add button to have a temporary storage.

Step—4: Select a child workgroup name by clicking Edit button to modify a child workgroup name. (See FIG. F-15)

Step—5: Change any modifications and click Update

Step—6: Click Save button to save the contents

Fields Explanation

The following table provides explanations for each of the screen fields.

| Element | Description |
|---|---|
| Main workgroup | Choose a main workgroup from the drop down list available |
| Name | The text for child workgroup name. Accepts alphabets and numeric values not exceeding 30 characters. Entry to this field is mandatory. |
| Description | The text for child workgroup description. Accepts alphabets, numeric and special character except double quotes not exceeding 255 characters. Field is optional |

Button Functionality

The following table provides explanation for each button in the screen.

| Element | Description |
|---|---|
| Add | Add the contents of child workgroup. It is only a temporary addition. Becomes permanent record only after saving |
| Edit | Edit button will allow for editing a specific record in the table. |
| Delete | Delete button will delete the records in the table checked for deletion. It is only a temporary deletion. Becomes permanent record only after saving |
| Update | Update the contents of child workgroup. It is only a temporary update. Becomes permanent record only after saving |
| Check All | The "Check All" Link will check all the records in the table |
| Clear All | The "Clear All" Link will uncheck all the records in the table that are checked. |
| Print | The Print will pops up a screen displaying the content of the table created and enables the user to have print out of the same. |
| Save | Saves the entered Child Workgroup in the database. The page gets refreshed and the contents entered in the fields are shown. |
| Cancel | Clears the contents entered in the fields or restore to the previous state as was before saving the changes. |

Mail Members

Step—1: After successful logon, click the menu Sales & Marketing and select Work Groups. Then select Mail Members. (See FIG. F-16)

Step—2: Screen navigates to mail member's screen. Choose a child workgroup Enter the mail id, as per the format briefed in field's explanation section. (See FIG. F-17)

Step—3: Click Add button to have a temporary storage.

Step—4: Selecting a mail member and clicking Edit button to modify a mail member name. (See FIG. F-18)

Step—5: Change any modifications and click Update

Step—6: Click Save button to save the contents

Fields Explanation

The following table provides explanations for each of the screen fields.

| Element | Description |
|---|---|
| Child workgroup | Choose a child workgroup from the drop down list available |
| Mail Id | The text for mail id. Accepts alphabets, numeric and special characters in the standard email format of length not exceeding 100 characters Entry to this field are mandatory. |

Button Functionality

The following table provides explanation for each button in the screen.

| Element | Description |
|---|---|
| Add | Add the contents of mail member. It is only a temporary addition. Becomes permanent record only after saving |
| Edit | Edit button will allow for editing a specific record in the table. |
| Delete | Delete button will delete the records in the table checked for deletion. It is only a temporary deletion. Becomes permanent record only after saving |
| Update | Update the contents of mail member. It is only a temporary update. Becomes permanent record only after saving |
| Check All | The "Check All" Link will check all the records in the table |
| Clear All | The "Clear All" Link will uncheck all the records in the table that are checked. |
| Print | The Print will pops up a screen displaying the content of the table created and enables the user to have print out of the same. |
| Save | Saves the entered Mail Members in the database. The page gets refreshed and the contents entered in the fields are shown. |
| Cancel | Clears the contents entered in the fields or restore to the previous state as was before saving the changes. |

Swap Members

Step—1: After successful logon, click the menu Sales & Marketing and select Work Groups. Then select Swap Members. (See FIG. F-19)

Step—2: Screen navigates to swap members screen. Choose a category, source child group and destination child group to swap members. Also select from the options, whether swap is to be full, partial or duplicate. (See FIG. F-20)

Step—3: Click Search to list the members for swapping from the Source work group to the destination work group.

Step—4: Select the members for swapping and click Swap to swap the members from Source Work group to the destination Work Group.

Step—5: Change any modifications and click Update

Step—6: Click Save button to save the contents

Fields Explanation

The following table provides explanations for each of the screen fields.

| Element | Description |
|---|---|
| Choose Category | Choose the Category from the list. List all the Child Work Group for the specific Category selected. |
| Choose Source Child Work group | Choose the Source Child Work group from the list |
| Choose Destination Child Work group | Choose the Destination Child Work group from the list |
| Do you want to do a full swap or a partial swap? | Choose the Option Full, Partial or Duplicate Default value of selection is Full |

Button Functionality

The following table provides explanation for each button in the screen.

| Element | Description |
|---|---|
| Search | Click the search button to list the Member belonging to the Source Work Group for swapping. Based on the Option, Full, Partial or Duplicate the Check box is enabled or disabled. Say for Full the Check box is disabled and the others the check box is enabled. |
| Swap | Click Swap to swap the member from Source to Destination Child Work Group |
| Check All | The "Check All" Link will check all the records in the table |
| Clear All | The "Clear All" Link will uncheck all the records in the table that are checked. |

4 Associates

An associate is to setup basic information of associates working with BPI in the PX2 System. Associates can be of two types, Internal and External.

Access

The application can be accessed from the main menu as follows:

Sales & Marketing→Associates

Pre-Requisites

Work of Category Internal or External must be available in the system for Assigning associated work group.

Application Functions

This application has the following functions:

Associate—To Create, Modify and Delete Associates

Associate

Step—1: After successful logon, click the menu Sales & Marketing and select Associates. (See FIG. F-21)

Step—2: Screen navigates general information. Choose associate type as either internal or external. (See FIG. F-22)

Step—3: Enter the values in the respective fields, as per the format briefed in field's explanation section.

Step—4: Choose an available workgroup and assign it by clicking>>button. Then enter the value of license number if applicable.

Step—5: Click Add button to have a temporary storage

Step—6: Select an associate and click Edit button to modify an associate name. (See FIG. F-23)

Step—7: Change any modifications and click Update

Step—8: Click Save button to save the contents

Fields Explanation

The following table provides explanations for each of the screen fields.

| Element | Description |
|---|---|
| Associate Type | Choose a type from either Internal or External. Default value selected is External |
| Salutation | Choose the salutation from the drop down list of salutations available. |
| First Name | The text for associate first name. Accepts alphabets and special characters like hyphen and single quotes not exceeding 25 characters. This field is mandatory |
| Middle Initial | The text for middle initial. Accepts alphabets not exceeding 1 character. |
| Last Name | The text for associate last name. Accepts alphabets and special characters like hyphen and single quotes not exceeding 35 characters. |
| Suffix | Choose the suffix from the drop down list of suffixes available. |
| Title | The text for title. Accepts alphabets, numeric and special characters except single quotes not exceeding 255 characters. |

-continued

| Element | Description |
|---|---|
| Address | The text for associate address. Accepts alphanumeric and special characters not exceeding 35 characters |
| Suite | The text for associate suite Accepts alphanumeric and special characters except double quotes not exceeding 35 characters |
| City | The text for city. Accepts alphabets and space between two words not exceeding 30 characters. |

Button Functionality

The following table provides explanation for each button in the screen.

| Element | Description |
|---|---|
| Add | Add the contents of associates. It is only a temporary addition. Becomes permanent record only after saving |
| Edit | Edit button will allow for editing a specific record in the table. |
| Delete | Delete button will delete the records in the table checked for deletion. It is only a temporary deletion. Becomes permanent record only after saving |
| Update | Update the contents of associate. It is only a temporary update. Becomes permanent record only after saving |
| Check All | The "Check All" Link will check all the records in the table |
| Clear All | The "Clear All" Link will uncheck all the records in the table that are checked. |
| Print | The Print will pops up a screen displaying the content of the table created and enables the user to have print out of the same. |
| Save | Saves the entered associate in the database. The page gets refreshed and the contents entered in the fields are shown. |
| Cancel | Clears the contents entered in the fields or restore to the previous state as was before saving the changes. |

5 Campaign

A marketing campaign is an initiative where an identifiable segment of potential employer groups are targeted and organizes for the marketing campaigns through third parties or by BPI PacAdvantage periodically.

The details of a campaign initiative are captured in the system through the campaign master the campaign master provides information on the campaign, duration and the personnel associated with the campaign. The media through which a campaign is done is captured in the system using the source type and source subtype.

Access

The application can be accessed from the main menu as follows:

Sales & Marketing→Campaign→Source Type

Sales & Marketing→Campaign→Source Sub Type

Sales & Marketing→Campaign→Campaign

Sales & Marketing→Campaign→Campaign Search

Pre-Requisites

There are no pre-requisites for using this application.

Application Functions

This application has the following functions:

Source Type

Source Sub Type

Campaign

Campaign Search

Source Type

The source type defines the media through which a campaign can be conducted. The screen provides functionality to save, edit or add new source type.

The sequential steps involved in the creation of a source type are listed below

Step—1: After successful logon, click the menu Sales & Marketing. Select Campaign and then Source Type. (See FIG. F-24)

Step—2: Enter the value of source type and select the option of input source as per the format briefed in field's explanation section. (See FIG. F-25)

Step—3: Click Add button to have a temporary storage.

Step—4: Selecting a source type and clicking Edit button to modify/a source type.

Step—5: Change any modifications and click Update. (See FIG. F-26)

Step—6: Click Save button to save the contents.

Fields Explanation

The following table provides explanations for each of the screen fields.

| Element | Description |
|---|---|
| Source Type | The text for source type name. Accepts alphabets and numeric values not exceeding 40 characters. Entry to this field is mandatory. Source Type Name does not accept duplicate values |
| Input Source | Choose the option of Yes or No. with a default value selected as Yes |
| Table | Table displays the Source type data added |

Button Functionality

The following table provides explanation for each button in the screen.

| Element | Description |
|---|---|
| Add | Add the contents of source type. It is only a temporary addition. Becomes permanent record only after saving |
| Edit | Edit button will allow for editing a specific record in the table. |
| Delete | Delete button will delete the records in the table checked for deletion. It is only a temporary deletion. Becomes permanent record only after saving |
| Update | Update the contents of source type. It is only a temporary update. Becomes permanent record only after saving |
| Check Box | Check box will be disabled which has any reference to other fields. Otherwise the checkbox will be enabled to have the utility of check all/clear all. |
| Check All | The "Check All" Link will check all the enabled records in the table |
| Clear All | The "Clear All" Link will uncheck all the enabled records in the table that are checked. |
| Print | The Print will pops up a screen displaying the content of the table created and enables the user to have print out of the same. |
| Save | Saves the entered source type in the database. The page gets refreshed and the contents entered in the fields are shown. |
| Cancel | Clears the contents entered in the fields or restore to the previous state as was before saving the changes. |

Source Sub Type

Source sub type provides the information on the subcategory that may come under the source type. The screen provides functionality to save, edit or add new source sub type.

The sequential steps involved in the creation of a source sub type are listed below.

Step—1: After successful logon, click the menu Sales & Marketing. Select Campaign and then Source Sub Type. (See FIG. F-27)

Step—2: Select a source sub type. Enter the value of source sub type with its description as per the format briefed in field's explanation section. (See FIG. F-28)

Step—3: Click Add button to have a temporary storage.

Step—4: Selecting a source sub type and clicking Edit button to modify a source sub type.

Step—5: Change any modifications and click Update

Step—6: Click Save button to save the contents. (See FIG. F-29)

Fields Explanation

The following table provides explanations for each of the screen fields.

| Element | Description |
|---|---|
| Source Type | Choose a source type from the available drop down list. This field is mandatory. |
| Source sub Type | The text for source sub type name. Accepts alphabets and numeric values of maximum length 40. Entry to this field is mandatory. Source Sub Type Name does not accept duplicate values |
| Description | The text for description of source sub type. Accepts alphabets, numeric and special characters except double quote with values not exceeding 255 characters. Field is optional. |

Button Functionality

The following table provides explanation for each button in the screen.

| Element | Description |
|---|---|
| Add | Add the contents of source sub type. It is only a temporary addition. Becomes permanent record only after saving |
| Edit | Edit button will allow for editing a specific record in the table. |
| Delete | Delete button will delete the records in the table checked for deletion. It is only a temporary deletion. Becomes permanent record only after saving |
| Update | Update the contents of source sub type. It is only a temporary addition. Becomes permanent record only after saving |
| Check Box | Check box will be disabled which has any reference to other fields. Otherwise the checkbox will be enabled to have the utility of check all/clear all. |
| Check All | The "Check All" Link will check all the enabled records in the table |
| Clear All | The "Clear All" Link will uncheck all the enabled records in the table that are checked. |
| Print | The Print will pops up a screen displaying the content of the table created and enables the user to have print out of the same. |
| Save | Saves the entered source sub type in the database. The page gets refreshed and the contents entered in the fields are shown. |
| Cancel | Clears the contents entered in the fields or restore to the previous state as was before saving the changes. |

Campaign

The campaign master provides information on the campaign, duration and the personnel associated with the campaign. The media through which a campaign is done is captured in the system using the source type and source subtype.

The source type defines the media through which a campaign can be conducted and the source sub type provides the information on the subcategory that may come under the source type. The screen provides functionality to save, edit or add new source type The sequential steps involved in the creation of a Campaign are listed below.

Step—1: After successful logon, click the menu Sales & Marketing. Select Campaign and then Campaign. (See FIG. F-30)

Step—2: Enter the text for campaign name and its description. (See FIG. F-31)

Step—3: Choose source type and source sub type from drop down list. Based on the selection of Source Type the page gets refreshed to list the corresponding Source Sub Type.

Step—4: Choose an associated workgroup. Make it assigned workgroup by clicking>>button.

Step—5: Choose from and to dates of duration by clicking calendar icon

Step—6: Click Save button. Screen gets refreshed with auto generated Campaign Id. The save button is now in update mode. (See FIG. F-32)

Step—7: Click Import button to import files. It pop up a new window. (See FIG. F-33)

Step—8: Choose the file to be imported and click import button.

Step—9: Confirms the status of imported files. Click Back to Import Screen to navigates back for further importing of files. (See FIG. F-34)

Fields Explanation

The following table provides explanations for each of the screen fields.

| Element | Description |
|---|---|
| | Campaign Master |
| Campaign Name | The text for campaign name. Accepts alphabets and numeric values not exceeding 40 characters. Field is mandatory. |
| Campaign ID | Text to Display Campaign ID. This is a read only field. |
| Description | The text for description of campaign name. Accepts alphabets, numeric and special characters except double quotes not exceeding 50 characters. Field is optional. |
| Source Type | Choose a source type from drop down list. Field is mandatory. |
| Source Sub Type | Choose a source sub type from the drop down list. Source sub type depends on the selection of source type. Field is mandatory. |
| Associated Workgroup | Work groups are listed. |
| Assigned Workgroup | Assign a work group. Field is mandatory |
| Duration From | Choose a valid date by clicking calendar icon. Date accepts the format in MM/DD/YYYY. Field is mandatory. |
| Duration To | Choose a valid date by clicking calendar icon. To date cannot be greater than from date. Date accepts the format in MM/DD/YYYY. Field is mandatory |
| | Import Campaign Data |
| Campaign ID | Text to Display Campaign ID. This is a read only field. |
| File Path | Enter the file path or select the path by clicking browse button. The field is mandatory |
| File Format | Choose a format from drop down list for File Format, which should match with selection of file. The field is mandatory |
| Comments | Text to enter comments. Accepts alphabets, numeric and special characters except double quotes not exceeding 250 characters. This field is optional |

Button Functionality

The following table provides explanation for each button in the screen.

| Element | Description |
|---|---|
| | Campaign Master |
| New | Creates a new campaign. |
| Save | Saves the entered campaign information. The page gets refreshed with auto generated campaign id. The save button is now shown as Update Button and Import button is enabled |
| Import | Click import to display a pop up screen to import the campaign data. |
| Update | Updates the contents modified |
| Cancel | Clears the contents entered in the fields or restore to the previous state as was before saving the changes. |
| | Import Campaign Data |
| New | Click new button to Import new Campaign data |
| View Previous Import | Navigates to a screen displaying imported files for the particular campaign id. |
| Back to Campaign Import | Navigates back to import screen for further import of files. |
| Import | Click import to import the campaign data in the database |

Campaign Search

Campaign search is to search campaign based on either campaign id or campaign name. Campaign search is to have view, delete or modify the campaigns already created The sequential steps involved in the campaign search are listed below.

Step—1: After successful logon, click the menu Sales & Marketing. Select Campaign and then Campaign Search. (See FIG. F-35)

Step—2: Search operation can be performed by clicking the search button either by entering the values in the fields or even with empty fields. Campaign id or a first letter of campaign name to have search operation. (See FIG. F-36)

Step—3: Displays the results of search. (See FIG. F-37)

Step—4: Select a campaign and choose the option of modify or view. If the option is modify the following screen appears for modification. (See FIG. F-38)

Step—5: Change the contents and click Update.

Step—6: If the option is view, the following screen appears only to have a view. Campaigns that are not referred elsewhere can also be deleted. (See FIG. F-39)

Step—7: Click New Campaign button to go back to campaign create screen.

Fields Explanation

Refer field explanations provided for Create Campaign

Button Functionality

The following table provides explanation for each button in the screen.

| Element | Description |
|---|---|
| Search | Clears the screen and perform search operation based on the input value for group/agent. |
| Cancel | Clears the contents entered in the fields or restore to the previous state as was before saving the changes. |

6 Sales Master

Sales Master is to setup basic information for Agent, Agency and Lead in the PX2 System. Sales Master also has functionality of Lead tracking, maintenance of Agent profile and Campaign to Lead conversion.

Access

The application can be accessed from the main menu as follows:

Sales & Marketing→Sales Master→Create Agency

Sales & Marketing→Sales Master→Search Agency

Sales & Marketing→Sales Master→Create Agent

Sales & Marketing→Sales Master→Search Agent

Sales & Marketing→Sales Master→Create Lead

Sales & Marketing→Sales Master→Search Lead

Sales & Marketing→Sales Master→Campaign to Lead

Sales & Marketing→Sales Master→Lead Tracking

Sales & Marketing→Sales Master→Lead Tracking—To do list

Sales & Marketing→Sales Master→Create Agent Profile

Sales & Marketing→Sales Master→Search Agent Profile

Pre-Requisites

Pre-Requisites for using this application are as follows:

Work Group must be defined and available in the system

Campaign data must be available to convert Campaign to lead

Associates data must be available for assigning BSS representatives.

Application Functions

This application has the following functions:

Create Agency—to create/edit details of Agency

Search Agency—to search the details of Agency for view modification or deletion

Create Agent—to create/edit details of Agent

Search Agent—to search the details of Agent for view modification or deletion

Create Lead—to create/edit details of lead

Search Lead—to search the details of lead for view modification or deletion

Campaign to Lead—to convert campaign data to lead

Lead Tracking—to track the information on lead

Lead Tracking to do List—to track and follow up on lead

Create Agent Profile—to create/edit details of Agent Profile

Search Agent Profile—to search the details of Agent Profile for view modification or deletion Create Agency Step—1: After successful logon, click the menu Sales & Marketing and select Sales Master. Then select Create Agency. (See FIG. F-40)

Step—2: Screen navigates to Agency Master screen. (See FIG. F-41)

Step—3: Enter the values for the respective fields, as per the format briefed in field's explanation section. Click Next.

Step—4: Navigates to second part of the agency master's screen for filling in further information. (See FIG. F-42)

Step—5: Enter the values for the respective fields, as per the format briefed in field's explanation section. For agency work group, it should be selected by clicking search icon.

Step—6: This pops up a screen for workgroup search. (See FIG. F-43)

Step—7: Choose category, Main workgroup and child workgroup from the respective drop down list and Click Add.

Step—8: This displays a screen with the selected workgroup. (See FIG. F-44)

Step—9: After filling all the fields in agency master, click save to create agency master. Following is the sample confirmation screen for a successful creation of agency master. (See FIG. F-45)

Fields Explanation

The following table provides explanations for each of the screen fields.

| Element | Description |
|---|---|
| Company Name | The text for company name. Accepts alphanumeric and special characters. Field is mandatory |
| DBA | The text for business nature. Accepts alphanumeric and special characters. Field is optional |
| Street Address | The text for company address. Accepts alphanumeric and special characters not exceeding 35 characters |
| Suite | The text for company suite. Accepts alphanumeric and special characters not exceeding 35 characters |
| City | The text for city. Accepts alphabets and space between two words not exceeding 30 characters. |
| State | Choose the name of the state from the drop down list of States available in United States of America |
| Zip | The text for zip. Accepts numeric value of exactly 5 digits. Field is mandatory |
| Phone | The text for telephone number of the contact person. Accepts numeric values not exceeding 10 digits. The format is (999) 999-9999. |
| Fax | The text for fax number of the contact person. Accepts numeric values not exceeding 10 digits. The format is (999) 999-9999. |
| Mode of Communication | Choose a mode of communication from the drop down list available. Based on the selected value, related fields are mandatory. |
| Salutation | Choose the salutation from the drop down list of salutations available. |
| First Name | The text for contact name. Accepts alphabets and special characters like hyphen and single quotes not exceeding 25 characters. Field is mandatory |
| Middle Initial | The text for middle initial. Accepts alphabets not exceeding 1 character. |
| Last Name | The text for contact name. Accepts alphabets and special characters like hyphen and single quotes not exceeding 35 characters. Field is mandatory |
| Street Address | The text for company address. Accepts alphanumeric and special characters not exceeding 35 characters |
| Suite | The text for company suite Accepts alphanumeric and special characters not exceeding 35 characters |
| City | The text for city. Accepts alphabets and space between two words not exceeding 30 characters. |
| State | Choose the name of the state from the drop down list of States available in United States of America |
| Zip | The text for zip. Accepts numeric value of exactly 5 digits. Field is mandatory |
| Phone | The text for telephone number of the contact person. Accepts numeric values not exceeding 10 digits. The format is (999) 999-9999. |
| Extension | The text for extension of telephone number Accepts numeric values not exceeding 4 digits. The format is 9999. |
| Fax | The text for fax number of the contact person. Accepts numeric values not exceeding 10 digits. The format is (999) 999-9999. |
| E-mail | The text for email of the contact person. Accepts alphabets, numeric and special characters in the standard email format of length not exceeding 100 characters. |
| Broker Type | Choose an option for broker type from either Statewide, Regional or unknown |
| Exclude from Broadcast Fax | Click this option to have exclusion of broadcast fax |
| Exclude from Employee/Member Term Letter | Click this option to have exclusion of employee/member term letter |
| Exclude from overdue premium notice | Click this option to have exclusion of overdue premium notice |
| Exclude from Employee/Member Add on Letter | Click this option to have exclusion of employee/member add on letter |

-continued

| Element | Description |
|---|---|
| Agency Workgroup | Choose a agency work group by clicking search icon |
| Internal Workgroup | Choose an internal workgroup from the drop down list available. The field is mandatory. |
| BSS Rep | Choose a value for BSS Rep from the drop down list available |
| Tax ID/SSN | The text for Tax ID/SSN. Accepts numeric values of exactly 9 digits |
| License Number | The text for License number. Accepts numeric values not exceeding 15 digits |
| License Type | Choose a type for license from the drop down list available |
| License Expiration | The text for License expiration date. Choose a date in the format MM/DD/YYYY by clicking calendar icon. |
| E&O Number | The text for E&O number. Accepts numeric values not exceeding 15 digits |
| E&O Expiration | The text for E&O Expiration date. Choose a date in the format MM/DD/YYYY by clicking calendar icon. |
| Preferred Mode of payment | Choose an option for mode of payment either Check or ACH |
| Bank Name | The text for bank name. Accepts alphabets, numeric and special characters except double quotes with values not exceeding 50 characters. |
| Account Number | The text for accounts number. Accepts numeric values not exceeding 9 digits |
| Account Type | Choose a type of account from the drop down list available |
| Routing Number | The text for routing number. Accepts numeric values not exceeding 10 digits. |
| Name of the Account | The text for name of the account holder. Accepts alphabets and numeric values not exceeding 50 characters. |
| Payee Name | The text for payee name. Accepts alphabets not exceeding 60 characters. |
| Requires special handling | Click this option for any special handling is required |

Button Functionality

The following table provides explanation for each button in the screen.

| Element | Description |
|---|---|
| Next | Click Next to move to the next screen for entering the Agency information. |
| Save | Saves the entered information entered for the Agency in the screen one and two. |
| Cancel | Clears the contents entered in the fields or restore to the previous state as was before saving the changes. |
| Close | Closes the window and go back to agency master screen |
| Previous | Navigates to the previous screen. If any data is entered on this screen it validate the data prior to moving to the previous screen. |

Search Agency

Step—1: After successful logon, click the menu Sales & Marketing and select Sales Master. Then select Search Agency. (See FIG. F-46)

Step—2: Screen navigates to Search Agency Master screen. (See FIG. F-47)

Step—3: Either enter the value in any one of the field or simply click Search.

Step—4: This pops up a screen with the search result. (See FIG. F-48)

Step—5: Choose an Agency Id for selection. The selected agency id can be modified or view and delete. If modify button is clicked details with the contents will be displayed for any modification or otherwise clicking view/delete button will enabled to view or deleted.

Step—6: If the modify button is clicked following will be screen. Enter the text at the respective fields for modification, if any. The flow and procedure for modifying an agency master is similar to create agency master. (See FIG. F-49)

Step—7: If the view/delete button is clicked, following is the screen, which allows to view and delete. (See FIG. F-50)

Step—8: After viewing the contents, if the new agency is clicked will enable to add new agency master or if the delete button is clicked will delete the agency master that is currently in view. (See FIG. F-51)

Step—9: On clicking delete, navigates to confirming the deletion of agency record. From here clicking new agency button can create also new agency. (See FIG. F-52)

Fields Explanation

Refer Field explanation provided for Create New Agency

Button Functionality

Refer Button Functionality provided for Create New Agency.

Create Agent

Step—1: After successful logon, click the menu Sales & Marketing and select Sales Master. Then select Create Agent. (See FIG. F-53)

Step—2: Screen navigates to Agent Master screen. (See FIG. F-54)

Step—3: Enter the values for the respective fields, as per the format briefed in field's explanation section. Click Next.

Step—4: Navigates to second part of the agent master screen for entering further information. (See FIG. F-55)

Step—5: Enter the values for the respective fields, as per the format briefed in field's explanation section. For agent work group, it should be selected by clicking search icon.

Step—6: The selection procedure for Work group search is similar to that of workgroup search explained in Create Agency. For Associated agencies the procedure is same but the sample screen is as follows. (See FIG. F-56)

Step—7: Enter the first letter of agency id or agency name to perform search operation Step—8: This displays a screen with the selected work-group. (See FIG. F-57)

Step—9: After filling all the fields in agent master, click save to create agent master. Following is the sample confirmation screen for a successful creation of agent master. (See FIG. F-58)

Fields Explanation

The following table provides explanations for each of the screen fields.

| Element | Description |
|---|---|
| First Name | The text for contact name. Accepts alphabets and special characters like hyphen and single quotes not exceeding 25 characters. Field is mandatory |
| Middle Initial | The text for middle initial. Accepts alphabets not exceeding 1 character. |
| Last Name | The text for contact name. Accepts alphabets and special characters like hyphen and single quotes not exceeding 35 characters. Field is mandatory |
| Company Name | The text for company name. Accepts alphanumeric and special characters. Field is mandatory |
| DBA | The text for business nature. Accepts alphanumeric and special characters. Field is optional |

-continued

| Element | Description |
|---|---|
| Street Address | The text for company address. Accepts alphanumeric and special characters not exceeding 35 characters |
| Suite | The text for company suite Accepts alphanumeric and special characters not exceeding 35 characters |
| City | The text for city. Accepts alphabets and space between two words not exceeding 30 characters. |
| State | Choose the name of the state from the drop down list of States available in United States of America |
| Zip | The text for zip. Accepts numeric value of exactly 5 digits. Field is mandatory |
| Phone | The text for telephone number of the contact person. Accepts numeric values not exceeding 10 digits. The format is (999) 999-9999. |
| Fax | The text for fax number of the contact person. Accepts numeric values not exceeding 10 digits. The format is (999) 999-9999. |
| Mode of Communication | Choose a mode of communication from the drop down list available. Based on the selected value, related fields are mandatory. |
| E-mail | The text for email of the contact person. Accepts alphabets, numeric and special characters in the standard email format of length not exceeding 100 characters. |
| Gender | Choose a gender from the drop down list available. |
| Date of Birth | The text for date of birth. Choose a date by clicking calendar icon. Date accepts the format MM/DD/YYYY. Birth date cannot be later than the current date. |
| Salutation | Choose the salutation from the drop down list of salutations available. |
| First Name | The text for contact name. Accepts alphabets and special characters like hyphen and single quotes not exceeding 25 characters. Field is mandatory |
| Middle Initial | The text for middle initial. Accepts alphabets not exceeding 1 character. |
| Last Name | The text for contact name. Accepts alphabets and special characters like hyphen and single quotes not exceeding 35 characters. Field is mandatory |
| Street Address | The text for address. Accepts alphanumeric and special characters not exceeding 35 characters |
| Suite | The text for suite Accepts alphanumeric and special characters not exceeding 35 characters |
| City | The text for city. Accepts alphabets and space between two words not exceeding 30 characters. |
| State | Choose the name of the state from the drop down list of States available in United States of America |
| Zip | The text for zip. Accepts numeric value of exactly 5 digits. Field is mandatory |
| Phone | The text for telephone number of the contact person. Accepts numeric values not exceeding 10 digits. The format is (999) 999-9999. |
| Extension | The text for extension number of the employee. Accepts numeric values not exceeding 4 digits |
| Fax | The text for fax number of the contact person. Accepts numeric values not exceeding 10 digits. The format is (999) 999-9999. |
| E-mail | The text for email of the contact person. Accepts alphabets, numeric and special characters in the standard email format of length not exceeding 100 characters. |
| Broker Type | Choose an option for broker type from either Statewide, Regional or unknown |
| Exclude from Broadcast Fax | Click this option to have exclusion of broadcast fax |
| Exclude from Employee/Member Term Letter | Click this option to have exclusion of employee/member term letter |
| Exclude from overdue premium notice | Click this option to have exclusion of overdue premium notice |
| Exclude from Employee/Member Add on Letter | Click this option to have exclusion of employee/member add on letter |
| Agent Workgroup | Choose a agent work group by clicking search icon |
| Internal Workgroup | Choose an internal workgroup from the drop down list available. The field is mandatory. |

-continued

| Element | Description |
|---|---|
| BSS Rep | Choose a value for BSS Rep from the drop down list available |
| Associated Agency | Choose a Associated Agency by clicking search icon |
| Tax ID/SSN | The text for Tax ID/SSN. Accepts numeric values of exactly 9 digits |
| License Number | The text for License number. Accepts numeric values not exceeding 15 digits |
| License Type | Choose a type for license from the drop down list available |
| License Expiration | The text for License expiration date. Choose a date in the format MMJDD/YYYY by clicking calendar icon. |
| E&O Number | The text for E&O number. Accepts numeric values not exceeding 15 digits |
| E&O Expiration | The text for E&O Expiration date. Choose a date in the format MM/DDIYYYY by clicking calendar icon. |
| Preferred Mode of payment | Choose an option for mode of payment either Check or ACH |
| Bank Name | The text for bank name. Accepts alphabets, numeric and special characters except double quotes with values not exceeding 50 characters. |
| Account Number | The text for accounts number. Accepts numeric values not exceeding 9 digits |
| Account Type | Choose a type of account from the drop down list available |
| Routing Number | The text for routing number. Accepts numeric values not exceeding 10 digits. |
| Name of the Account | The text for name of the account holder. Accepts alphabets and numeric values not exceeding 50 characters. |
| Payee Name | The text for payee name. Accepts alphabets not exceeding 60 characters |
| Requires special handling | Click this option for any special handling is required |

Button Functionality

The following table provides explanation for each button in the screen.

| Element | Description |
|---|---|
| Next | Click Next to move to the next screen for entering the Agency information. |
| Save | Saves the entered information entered for the Agency in the screen one and two. |
| Cancel | Clears the contents entered in the fields or restore to the previous state as was before saving the changes. |
| Close | Closes the window and go back to agency master screen |
| Previous | Navigates to the previous screen. If any data is entered on this screen it validate the data prior to moving to the previous screen. |

Search Agent

Step—1: After successful logon, click the menu Sales & Marketing and select Sales Master. Then select Search Agent. (See FIG. F-59)

Step—2: Screen navigates to Search Agent Master screen. (See FIG. F-60)

Step—3: Either enter the value in any one of the field or simply click Search.

Step—4: This pops up a screen with the search result. (See FIG. F-61)

Step—5: Choose an Agent Id for selection. The selected agent id can be modified or view and delete. If modify button is clicked details with the contents will be displayed for any modification or otherwise clicking view/delete button will enabled to view or deleted.

Step—6: If the modify button is clicked following will be screen. (See FIG. F-62)

Step—7: Enter the text at the respective fields for modification, if any. The flow and procedure for modifying an agency master is similar to create agency master.

Step—8: If the view/delete button is clicked, following is the screen that can have view or delete. (See FIG. F-63)

Step—9: After viewing the contents, if the new agency is clicked will enable to add new agency master or if the delete button is clicked it will delete the agent master which is currently in view.

Step—10: On clicking delete, navigates to confirming the deletion of agency record. From here clicking new agency button can create new agency. (See FIG. F-64)

Fields Explanation

Refer field explanation provided for Create Agent.

Button Functionality

Refer button functionality provided in Create Agent

Create Lead

Step—1: After successful logon, click the menu Sales & Marketing and select Sales Master. Then select Create Lead. (See FIG. F-65)

Step—2: Screen navigates to Lead Master screen. (See FIG. F-66)

Step—3: Enter the values for the respective fields, as per the format briefed in field's explanation section. Click Next.

Step—4: Navigates to second part of the lead master screen for entering further information. (See FIG. F-67)

Step—5: Enter the values for the respective fields, as per the format briefed in field's explanation section. Based on the selection of name as either agent/agency the corresponding value for agency/agent is selected by clicking search icon.

Step—6: After filling all the fields in lead master, click save to create lead master. Following is the sample confirmation screen for a successful creation of lead master. (See FIG. F-68)

Fields Explanation

The following table provides explanations for each of the screen fields.

| Element | Description |
|---|---|
| Group Type | Choose the Group Type from the list. |
| Association Id | Choose the association id from the list. If the Group type is Guaranteed, Endorsed, PEO or Chamber corresponding association name will be listed. |
| Member Type | Choose the member type as Individual Member or Association Group. This option will be available if the Association selected is Guaranteed. |
| Source Sub Type | Choose sub source type from the list. |
| Company Name | The text for company name. Accepts alphanumeric and special characters. Field is mandatory |
| DBA | The text for business nature. Accepts alphanumeric and special characters. Field is optional |
| Street Address | The text for company address. Accepts alphanumeric and special characters not exceeding 35 characters |
| Suite | The text for company suite Accepts alphanumeric and special characters not exceeding 35 characters |
| City | The text for city. Accepts alphabets and space between two words not exceeding 30 characters. |
| State | Choose the name of the state from the drop down list of States available in United States of America |
| Zip | The text for zip. Accepts numeric value of exactly 5 digits. Field is mandatory |
| Phone | The text for telephone number of the contact person. Accepts numeric values not exceeding 10 digits. The format is (999) 999-9999. |

-continued

| Element | Description |
|---|---|
| Fax | The text for fax number of the contact person. Accepts numeric values not exceeding 10 digits. The format is (999) 999-9999. |
| Salutation | Choose the salutation from the drop down list of salutations available. |
| First Name | The text for contact name. Accepts alphabets and special characters like hyphen and single quotes not exceeding 25 characters. Field is mandatory |
| Middle Initial | The text for middle initial. Accepts alphabets not exceeding 1 character. |
| Last Name | The text for contact name. Accepts alphabets and special characters like hyphen and single quotes not exceeding 35 characters. Field is mandatory |
| Street Address | The text for address. Accepts alphanumeric and special characters not exceeding 35 characters |
| Suite | The text for suite Accepts alphanumeric and special characters not exceeding 35 characters |
| City | The text for city. Accepts alphabets and space between two words not exceeding 30 characters. |
| State | Choose the name of the state from the drop down list of States available in United States of America |
| Zip | The text for zip. Accepts numeric value of exactly 5 digits. Field is mandatory |
| Phone | The text for telephone number of the contact person. Accepts numeric values not exceeding 10 digits. The format is (999) 999-9999. |
| Extension | The text for extension of telephone number Accepts numeric values not exceeding 4 digits. The format is 9999. |
| Fax | The text for fax number of the contact person. Accepts numeric values not exceeding 10 digits. The format is (999) 999-9999. |
| E-mail | The text for email of the contact person. Accepts alphabets, numeric and special characters in the standard email format of length not exceeding 100 characters. |
| None | Choose the option as none if applicable. |
| Agent | Choose an agent by clicking search icon. The option is enabled only if the value is selected as agent for name. |
| Agency | Choose an agency by clicking search icon. The option is enabled only if the value is selected as agency for name. |
| Internal Workgroup | Choose an internal workgroup from the drop down list available. The field is mandatory. |
| BSS Rep | Choose a value for BSS Rep from the drop down list available |
| No. Of employees | The text for number of employees. Accepts numeric values not exceeding 4 digits. |
| Plan Type | Choose a plan type from the drop down list available |
| Current Carrier | Choose a current carrier from the drop down list available |
| Deductible | The text for deductible. Accepts numeric values not exceeding 12 digits. |
| Co Pay | The text for co pay. Accepts numeric values not exceeding 12 digits. |
| Benefit level in Network | The text for benefit level in network |
| Benefit level out of Network | The text for benefit level out of network |
| Employer Contribution in % | The text for employer contribution. |
| Approximate monthly premium | The text for approximate monthly premium. |
| Renewal Date | The text for renewal date. Accepts date in the format MM/DD/YYYY by clicking calendar icon. |
| Best time to call | The text for best to call. |
| Comments | The text for comments. |
| Mode of communications | Select a mode of communication from the drop down list available |

Button Functionality

The following table provides explanation for each button in the screen.

| Element | Description |
|---|---|
| Save | Saves the entered information not only for the present screen. |
| Search | Clears the screen and perform search operation based on the input value for group/agent. |
| Cancel | Clears the contents entered in the fields or restore to the previous state as was before saving the changes. |
| Close | Closes the window and go back to agency master screen |
| Previous | Navigates to the screen earlier to this. |

Search Lead

Step—1: After successful logon, click the menu Sales & Marketing and select Sales Master. Then select Search Lead. (See FIG. F-69)

Step—2: Screen navigates to Search Lead screen. (See FIG. F-70)

Step—3: Either enter value in any of the field or simply click Search.

Step—4: This pops up a screen with the search result. (See FIG. F-71)

Step—5: Choose an Lead Id for selection. The selected lead id can be modified or view and delete. If modify button is clicked details with the contents will be displayed for any modification or otherwise clicking view/delete button will enabled to view or deleted.

Step—6: If the modify button is clicked following will be screen. (See FIG. F-72)

Step—7: Enter the text at the respective fields for modification, if any. The flow and procedure for modifying a lead master is similar to create lead master.

Step—8: If the view/delete button is clicked, following is the screen that can have view or delete. (See FIG. F-73)

Step—9: After viewing the contents, if the new lead is clicked, will enable to add new lead master or if the delete button is clicked it will delete the lead master, which is currently in view.

Step—10: On clicking delete, navigates to confirming the deletion of lead record. From here clicking new lead button can create new lead. (See FIG. F-74)

Fields Explanation

Refer field explanation provided for Create Lead

Button Functionality

Refer button functionality provided for Create Lead

Campaign to Lead

Step—1: After successful logon, click the menu Sales & Marketing and select Sales Master. Then select Campaign to Lead. (See FIG. F-75)

Step—2: Screen navigates to Campaign to Lead screen. (See FIG. F-76)

Step—3: Enter the value of a campaign id or choose a campaign id by clicking search icon Step—4: Either enter value in any of the field or simply click Search. (See FIG. F-77)

Step—5: Click on any campaign id for selection (See FIG. F-78)

Step—6: By clicking Search Campaign Data the following screen gets displayed. (See FIG. F-79)

Step—7: Choose Campaign id. Click Convert to lead This converts campaign to lead and the selected campaign gets Fields Explanation The following table provides explanations for each of the screen fields.

| Element | Description |
|---|---|
| Campaign Id | Text for Campaign ID. Enter the Campaign ID or click the search icon. |
| Campaign Name | Text for Campaign ID |
| From Date | The text for From Date. Choose a date by clicking calendar icon. Date accepts the format MM/DD/YYYY. |
| To Date | The text for To Date. Choose a date by clicking calendar icon. Date accepts the format MM/DD/YYYY. |

Button Functionality

The following table provides explanation for each button in the screen.

| Element | Description |
|---|---|
| Search | Click search to display the Campaign ID based on the search criteria. |
| Close | Closes the window and go back to campaign to lead screen |
| Search Campaign Data | Displays the content of selected campaign id |
| Convert to Lead | Converts campaign to lead and the item gets removed from the campaign id list table. |
| Check All | The “Check All” Link will check all the records in the table |
| Clear All | The “Clear All” Link will uncheck all the records in the table that are checked. |
| Cancel | Clears the contents entered in the field. |

Lead Tracking

Step—1: After successful logon, click the menu Sales & Marketing and select Sales Master. Then select Lead Tracking. (See FIG. F-80)

Step—2: Screen navigates to Lead Tracking screen. (See FIG. F-81)

Step—3: Enter the value of a lead id and Click Get Status to display the current status of the lead or choose a lead id by clicking search icon. (See FIG. F-82)

Step—4: Either enter value in any one of the field or simply click Search.

Step—5: This pops up a screen with search result. (See FIG. F-83)

Step—6: Click on any lead id for selection. The status of the lead is displayed.

Step—7: Choose the respective values and click save. (See FIG. F-84)

Fields Explanation

The following table provides explanations for each of the screen fields.

| Element | Description |
|---|---|
| Lead Id | Text for Lead ID. Enter lead id of choose Lead ID by clicking the Search Icon. |
| Company Name | Read only field to display Company Name |
| Phone | Read only field to display Company Phone |
| First Name | Read only field to display First Name |
| Last Name | Read only field to display Last Name |
| Call Status | Choose from the Call Status provided. |
| Contact Result | Choose from the Contact Result provided. Only if the “Call Status” option is “Made Contact” this will be enabled. |
| Qualified Lead Result | Choose from the Qualified Lead Result provided. Only if the “Contact Result” option is “Qualified Lead” this will be enabled. |
| Non-Qualified Lead Reasons | Choose from the Non-Qualified Lead Reasons provided. Only if the “Contact Result” option is “Non-Qualified Lead” this will be enabled. |
| Not Interested Reasons | Choose from the Not Interested Reasons provided. Only if the “Qualified Lead Result” option is “Not Interested” this will be enabled. |
| Post Quote Result | Choose from the Post Quote Result provided. Only if the “Qualified Lead Result” option is “Produced Quotes” this will be enabled. |
| Status | Displays the status dynamically based on the combination of the options selected. |
| Notes | Text area to enter brief notes on the lead tracking |
| Follow up Date | The text for Follow up Date. Choose a date by clicking calendar icon. Date accepts the format MM/DD/YYYY. |

Button Functionality

The following table provides explanation for each button in the screen.

| Element | Description |
|---|---|
| Save | Saves the entered information not only for the present screen. |
| Get Status | Show the status of the Lead being Tracked. |
| Cancel | Clears the contents entered in the fields or restore to the previous state as was before saving the changes. |

Lead Tracking—To Do List

Step—1: After successful logon, click the menu Sales & Marketing and select Sales Master. Then select Lead Tracking—To Do List.

Step—2: Screen pops up a new window Lead Tracking To Do List screen. The screen can have only view option. The contents of this screen are the inputs of lead tracking screen. This screen displays the follow up on the Lead tracking. (See FIG. F-85)

Step—3: Click close.

Fields Explanation

The following table provides explanations for each of the screen fields.

| Element | Description |
|---|---|
| User Id | Read only field for User id. |
| Lead Id | Read only field for Lead Id. |
| Lead Name | Read only field Lead Name. |
| Phone | Read only field for Phone. |
| Follow up Date | Read only field for follow up date. |

Button Functionality

The following table provides explanation for each button in the screen.

| Element | Description |
|---|---|
| Close | Closes the pop up window. |

Create Agent Profile

Step—1: After successful logon, click the menu Sales & Marketing and select Create Agent Profile (See FIG. F-86)

Step—2: Screen navigates to Agent Profile (See FIG. F-87)

Step—3: Click Save. Confirms the creation of agent profile. (See FIG. F-88)

Fields Explanation

The following table provides explanations for each of the screen fields.

| Element | Description |
|---|---|
| | Agent Details |
| Workgroup Name | Choose a work group name from the available list. List all child workgroup for the selected workgroup |
| Agent ID | Choose a agent id from the available list |
| Agent Name | Text for agent name. Field is read only |
| Company Name | Text for agent name. Field is read only |
| Present Rating | Text for present rating accepts numeric values |
| | Profile Information |
| Do you currently sell Health Insurance | Choose the option from Yes or No |
| Do you currently sell PacAdvantage | Choose the option from Yes/No/Unknown |
| Types of Insurance sold by Agent | Select the check box of insurance from the available check box list. |
| Percentage of time focused on Health Insurance | Text for percentage of time focussed on health insurance. Accepts numeric values. |
| Average Group Size (within PacAdvantage) | Text for average group size [within Pac Advantage]. Accepts numeric values. |
| Average Group Size (outside PacAdvantage) | Text for average group size [outside Pac Advantage]. Accepts numeric values. |
| Percentage of staff concentrating on Health Insurance | Text for percentage of staff concentrating on Health Insurance. Accepts numeric values. |
| Years in Business | Text for years in business. Accepts numeric values. |
| | Subjective Ratings |
| Broker knowledge of PacAdvantage | Choose a rating from 0 to 4 |
| Broker Potential | Choose a rating from 0 to 4 |
| Broker loyalty and confidence with PacAdvantage | Choose a rating from 0 to 4 |
| Subjective Rating | Choose a rating from 0 to 4 |
| | Other Information |
| Marketing Plans | Choose a marketing plan from the available drop list. |
| No. 1 Selling Plan | Choose a plan for selling plan [plan-1] from the available drop down list |
| No. 2 Selling Plan | Choose a plan for selling plan [plan-2] from the available drop down list |

Button Functionality

The following table provides explanations for each of the screen fields.

| Element | Description |
|---|---|
| Save button | Click on save button to the save the content keyed in and navigates to confirmation screen displaying the Confirmation ID. |
| Cancel button | Click on clear button clears the content and appears again for fresh entries |

Search Agent Profile

Step—1: After successful logon, click the menu Sales & Marketing and select Sales Master. Then select Search Agent Profile. (See FIG. F-89)

Step—2: Screen navigates to Search Agent Profile screen (See FIG. F-90)

Step—3: Either enter value in any of the field or simply click Search.

Step—4: This pops up a screen with the search result. (See FIG. F-91)

Step—5: Choose an Agent Id for selection. The selected agent id can be modified or viewed. If modify button is clicked details with the contents will be displayed for any modification or otherwise clicking view button will enabled to view the contents and prevents any modification Step—6: If the modify button is clicked following will be screen. (See FIG. F-92)

Step—7: Enter the text at the respective fields for modification, if any. The flow and procedure for modifying an agency profile is similar to create agency profile. On any change, and clicking Update will pop up a screen. (See FIG. F-93)

Step—8: If the view button is clicked, following is the screen, which can have only to view the contents, and no modification is allowed. (See FIG. F-94)

Step—9: After viewing the contents, if the new agency is clicked will enable to add new agency profile.

Fields Explanation

Refer field explanation referred in Create Agent Profile

Button Functionality

The following table provides explanations for each of the screen fields.

| Element | Description |
|---|---|
| Save | Click on save button to the save the content keyed in and navigates to confirmation screen displaying the Confirmation ID. |
| Cancel | Click on clear button clears the content and appears again for fresh entries |
| Modify | Modify enables to edit and modifications is possible |
| View | View enables to edit the content and modification is not possible |
| Update | Update the contents of source sub type. It is only a temporary addition. Becomes permanent record only after saving |
| New Agent Profile | Creates a new agent profile |

7 Quotes

Quotes are provided for potential business entities as well as existing business entities. Quotes can be requested for small Employer Groups or Alternate Groups (Individual Association Member, Association Group, COBRA etc.) as well as for employees of those groups.

Access

The application can be accessed from the main menu as follows:

Sales & Marketing→Quotes

Pre-Requisites

All master data must be available in the system for generation of Quotes. Pre-requisites for using this application are as follows:

Carrier Maintenance—Refer “User Manual for Carrier Maintenance” for further information on the master records.

Agent/Agency—Refer "User Manual for Sales and Marketing" for further information on the Agent/Agency records.

Work Group—Refer "User Manual for Sales and Marketing" for further information on the Work Group records.

Internal Associates—Refer "User Manual for Sales and Marketing" for further information on the Internal Associates records.

Enrollment—Refer "User Manual for Enrollment" for further information on the Group and Member records.

Application Functions

This application has the following functions:

Create Quotes

Modify Quote/Create Quote Revision

Generate Quote

Generate Interim Quote

View Missing Information

Create Quotes

This function enables the user to input necessary input information/parameters for quotes and save the information for retrieval at a later point in time.

A quote is unique for each Group and Lead; any changes to the quote will result in a new revision. To modify an existing quote or create a new quote revision, please refer to next section "Modify Quote/Create Quote Revision".

Step—1: After successful logon, click menu Sales & Marketing and select the option Quotes. (See FIG. F-95)

Step—2: Browser navigates to Group/Lead Info screen. Choose whether the quote is for a Lead or an Existing Group. Select the Lead/Group by clicking Lookup icon, found next to the lead/group Id field. Alternately, if the lead/group id is known, it can be entered directly into the field. (See FIG. F-96)

Step—3: On clicking the Lookup icon, based on whether the quote is for a lead or group, the browser navigates to either lead search or to group search screen. (See FIG. F-97)

A lead can be searched using first few characters of lead name, contact first/last name or contact phone number.

A group can be searched using first few characters of its legal name, contact first/last name or tax id/SSN or group's effective date or phone number. (See FIG. F-98)

Step—4: Click on the group/lead, for which the quote is being created, to return to the main screen.

Step—5: On selecting a lead/group, either using the lookup option or entering directly into the field, lead/group details and agent details get populated on the screen.

If quoting for a group, an additional option, "Populate Current Enrollment" is enabled. Clicking the option populates additional group information like coverage and contribution option, agent fee, current employee information with their plans.

Step—6: Choose the coverage and contribution options selected by the lead/group.

Alternately, the "Default Coverage and Contribution" option can be used. Default coverage and contribution is Medical coverage alone selected with an employer contribution of 50% of lowest cost HMO plan towards employee premium and none towards dependent premium.

Note: This section is enabled only if the lead/group is an employer group.

Step—7: Click on the "Employee Info" tab on the top or the link at the bottom to navigate to employee information screen. If "Populate Current Enrollment" option was selected earlier, the screen comes populated with current employee information.

Use "Set Size" option to set the number of employees on the quote; the screen inserts specified number of blank employee rows. Enter employee name, employee age/date of birth, coverage option, number of persons covered under the employee (including the employee), and the employee's zip code of residence. (See FIG. F-99)

Note: If zip code is not specified for an employee, the lead's/group's zip code is used for rates calculation.

Alternately, employee information can be uploaded from a flat file. (See FIG. F-100)

Specify the file format, whether CSV ASCII or Fixed Position ASCII, browse and locate the file to be uploaded. Click Upload to upload employee information from the file.

Step—8: Click on the "Quote Output" tab on the top or the link at the bottom to navigate to quote output screen. (See FIG. F-101)

Choose whether Standard quote or Interim quote is required. (Interim quote is explained in a subsequent section).

Use "Exclude Plans" option to exclude any plans that should not appear on the quote. Select the plan(s) that need to be excluded (Hold 'Control' key to select multiple plans) and click Add button.

Enter other information required for quotes like quote for, mode of output and addressee information.

Step—9: Click Save button to save quote input information.

Fields Explanation

The following table provides explanations for each of the screen fields.

Common

| Element | Description |
|---|---|
| Quote # | The id with which the quote is uniquely identified along with the revision. The field is read only. Quote id is auto generated. |
| Quote Date | Date on the quote. The field is read only and reflects the value entered in the quote date field on the "Group/Lead Info" tab. |
| Lead/Group Id | Unique id of lead/group being quoted. The field is read-only and reflects the value entered in the lead/group id field on the "Group/Lead Info" tab. |
| Lead/Group Name | Name of the lead/group being quoted. This field is read only. |
| Type | Lead/Group's type; whether Small Employer Group, Individual Association Member, Cal-COBRA etc. |

Group/Lead Info Tab

| Element | Description |
|---|---|
| | Lead/Group Information |
| Quote for | Choose the option to quote for either lead or group. |
| Lead/Group Id | Unique id of lead/group being quoted. Lead/Group id can be selected by clicking Lookup icon. |
| Other revisions | List all revisions for the quote and allows user to select a specific revision. |
| | General Information |
| Quote Date | Date on the quote. Entry in this field is mandatory. |
| Mode of Request | Choose a type of mode of request from the drop down list available |
| Post Mark Date | Date on which request for quote was post-marked. Choose a date by clicking calendar icon. Entry in this field is mandatory. |

-continued

| Element | Description |
|---|---|
| Receive Date | Date on which request for quote was received. Choose a date by clicking calendar icon. Entry in this field is mandatory. |
| Rate Type | Choose a rate type to be used for quoting. |
| Agent Commission | Agent commission percentage to be used for blended rate calculation. Entry in this field is mandatory. The field is enabled only for the quotes on blended rate structure. |
| Effective Date | Effective date for the quote. Choose a date by clicking calendar icon. Entry in this field is mandatory. |
| Coverage &Contribution Information | |
| Use default coverage and contribution | Check to generate quote using default coverage and contribution options. Default coverage and contribution is Medical coverage alone selected with an employer contribution of 50% of lowest cost HMO plan towards employee premium and none towards dependent premium |
| Contribution Type | For the line of coverage, choose contribution type opted by the lead/group. Leave as blank, when not quoting the line of coverage. |
| Specify Plan | When employer contribution is percentage of specified plan, choose specified plan. |
| Value for EE | Specify employer contribution towards employee's premium. |
| Value for Dep | Specify employer contribution towards dependent's premium. |

Employee Info Tab.

| Element | Description |
|---|---|
| Employee Information | |
| Quote Spec EE | Check to indicate employees to be quoted, when using "Employee Rate Illustration", "Cal-COBRA" or "Fed-COBRA" options. |
| Employee Name | Name of employee. Entry in this field is mandatory. |
| Age/DOB | Age or date of birth of employee. Date of birth has to specify in MM/dd/yyyy format. Entry in this field is mandatory. |
| Tier | Coverage choice opted by the employee. Entry in this field is mandatory. |
| # | Count of members covered under the employee's coverage including the employee. System defaults value in this field based on the coverage type selected but is editable by the user. |
| Zip | Zip code of employee's residence. If no value is provided, employer's zip code is used for rate calculation. |
| County | County of employee's residence. This is normally a read-only field except in cases where employee's zip code spans multiple counties. In such cases, when the user tries to generate a quote, the system prompts the user to select the county. |
| Medical Plan | Medical plan to be used when quoting using "Quote for specified plans only" option. |
| Dental Plan | Dental plan to be used when quoting using "Quote for specified plans only" option. |
| Vision Plan | Vision plan to be used when quoting using "Quote for specified plans only" option. |
| CAM Plan | CAM plan to be used when quoting using "Quote for specified plans only" option. |
| Total Employees | Total number of employees on the quote. This field is read only. |
| Total Waiving | Total number of employees waiving medical coverage. |
| Total Declining | Total number of employees declining coverage through PacAdvantage plans. |
| Total COBRAs | Total number of COBRAs covered under the employer. |
| Rate Differential Factor | |
| Calculated by System/Entered by user | Specify whether differential factor has to be calculated by the system or is entered by the user. Option for entry by user is allowed only when quoting for a lead or doing a group renewal quote. |

-continued

| Element | Description |
|---|---|
| Differential Factor | Rate differential factor applicable for the lead/group. |

Interim Quote Tab

| Element | Description |
|---|---|
| Medical | |
| Quote Medical | Check to include quote for medical coverage. |
| Contribution Summary? | Check to include employer contribution summary in quote output. |
| Employer Summary | Check to include employer rate summary in quotes output for each of the contribution options, namely, % of lowest cost HMO plan, % of lowest cost plan, % of specified plan and flat $ amount. |
| Employee Quotes | Check to include individual employee quote sheets in quotes output for each of the contribution option. |
| Value for Employee | Specify contribution percentage or dollar amount of employer (in case of flat dollar contribution) towards employee's premium for each of the contribution option. |
| Value for Dependent | Specify contribution percentage or dollar amount of employer (in case of flat dollar contribution) towards dependent's premium for each of the contribution option. |
| Dental | |
| Quote Dental | Check to include quote for dental coverage. |
| Contribution Summary? | Check to include employer contribution summary in quote output. |
| Employer Summary | Check to include employer rate summary in quotes output for each of the contribution options, namely, % of lowest cost plan, % of specified plan and flat $ amount. |
| Employee Quotes | Check to include individual employee quote sheets in quotes output for each of the contribution option. |
| Value for Employee | Specify contribution percentage or dollar amount of employer (in case of flat dollar contribution) towards employee's premium for each of the contribution option. |
| Value for Dependent | Specify contribution percentage or dollar amount of employer (in case of flat dollar contribution) towards dependent's premium for each of the contribution option. |
| Vision | |
| Quote Vision | Check to include quote for vision coverage. |
| Contribution Summary? | Check to include employer contribution summary in quote output. |
| Employer Summary | Check to include employer rate summary in quotes output for each of the contribution options, namely, % of lowest cost plan, % of specified plan and flat $ amount. |
| Employee Quotes | Check to include individual employee quote sheets in quotes output for each of the contribution option. |
| Value for Employee | Specify contribution percentage or dollar amount of employer (in case of flat dollar contribution) towards employee's premium for each of the contribution option. |
| Value for Dependent | Specify contribution percentage or dollar amount of employer (in case of flat dollar contribution) towards dependent's premium for each of the contribution option. |
| CAM | |
| Quote CAM | Check to include quote for CAM coverage. |
| Contribution Summary? | Check to include employer contribution summary in quote output. |
| Employer Summary | Check to include employer rate summary in quotes output for each of the contribution options, namely, % of lowest cost plan, % of specified plan and flat $ amount. |

-continued

| Element | Description |
|---|---|
| Employee Quotes | Check to include individual employee quote sheets in quotes output for each of the contribution option. |
| Value for Employee | Specify contribution percentage or dollar amount of employer (in case of flat dollar contribution) towards employee's premium for each of the contribution option. |
| Value for Dependent | Specify contribution percentage or dollar amount of employer (in case of flat dollar contribution) towards dependent's premium for each of the contribution option. |

Quote Output

| Element | Description |
|---|---|
| Generate | Specify whether to generate a standard quote or an interim quote. It is not sufficient to enter input parameters for interim quotes; this field has to be set to "Interim Quote" to generate an interim quote. |
| Quote for specified plans only | Specify whether to quote only for plans specified against each employee. |
| Exclude specified plan | Exclude plans from appearing in the quote output. |
| Quote for | Specify whether quote is for a group or selected set of employees within the group. |
| When quoting groups, include | When quoting for groups, specify whether the quote output should have employer rate summary alone or employer rate summary and employee quote pages. |
| Mode of Output | Specify mode of quote output. |
| Send to whose attention | Specify whether the quote has to be sending to agent's attention or group's attention or other. If "other" is selected name and address or email or fax of addressee has to be specified. |
| Include program brochure | Specify whether to include program brochure as part of the quote output or not. |

Button Functionality

The following table provides explanation for each button in the screen.

Common

| Element | Description |
|---|---|
| New | Clears the screen to allow creation of a quote. |
| Save | Saves quote input information to the database. The saved quote can be retrieved at a later point in time. |
| Search | Allows searching for a saved quote. |

Group/Lead Info Tab

| Element | Description |
|---|---|
| Populate Current Enrollment | Populates quotes screen with additional group information like coverage and contribution option, agent fee, current employee information with their plans. |

Employee Info Tab

| Element | Description |
|---|---|
| Set Size | Sets the size of the employee information entry table based on the number entered in the field preceding the button. |

-continued

| Element | Description |
|---|---|
| Upload Employee Information | Allows uploading employee information from text files of specific format. |
| Delete | Deletes selected (checked) employee rows from the entry table. |

Quote Output Tab

| Element | Description |
|---|---|
| Generate quote | Generates quotes output based on the quotes output options specified. |

Modify Quote/Create Quote Revision

This function enables the user to modify input information for an existing quote and save it as modification to current revision or as a new revision.

Step—1: After successful logon, click menu Sales & Marketing and select the option Quotes.

Step—2: Click Search button to search for an existing quote. The browser navigates to quotes search screen.

A quote can be searched using quote number, quote date, first few characters of lead/group name. (See FIG. F-102)

Click on quote to be modified to return to the main screen. (See FIG. F-103)

Step—3: Existing revision available for the quote gets listed in next to lead/group id field in the "Lead/Group Information" section. Select the revision number to modify. The screen refreshes to load the selected revision.

Step—4: Make necessary modifications to the quotes input information and click save button. The system prompts with a question "Do you want to save changes as a new revision? . . . ". Click OK to save the modifications as a new revision; click Cancel to save the modifications to the same revision.

Generate Quote

This function enables the user to generate a quote and view, print, email or fax the quote output.

Step—1: After successful logon, click menu Sales & Marketing and select the option Quotes. (See FIG. F-104)

Step—2: Click Search button to search for an existing quote. The browser navigates to quotes search screen.

A quote can be searched using quote number, quote date, first few characters of lead/group name.

Click on the quote to be modified to return to the main screen.

Step—3: Click on the "Quote Output" tab on the top or the link at the bottom to navigate to quotes output screen. Ensure that the mode of output and "attention to" information are as desired. Click Generate Quote button to generate the quote.

If "View" option was selected, a popup window appears and the quote output opens up as a word document in the window.

If "Email" or "Fax" option was selected, the quotes output is send via email or fax directly to "Group", "Agent" or "Other" as specified in "attention to" information.

If "Print in Mailroom" option was selected, the quote output is send to the mailroom queue.

Generate Interim Quote

This function enables the user to generate an interim quote and view, print, email or fax the quote output.

An interim quote is different from a standard quote, in that, parameters can be specified for all the 4 contribution options.

Step—1: After successful logon, click menu Sales & Marketing and select the option Quotes.

Step—2: Click Search button to search for an existing quote. The browser navigates to quotes search screen.

A quote can be searched using quote number, quote date, first few characters of lead/group name.

Click on the quote to be modified to return to the main screen.

Step—3: Click on the "Interim Quote" tab on the top or the link at the bottom to navigate to employee information screen. Specify the line of coverage to be quoted and the contribution parameters for each line of coverage. (See FIG. F-105)

Step—4: Click on the "Quote Output" tab on the top or the link at the bottom to navigate to quotes output screen. Choose Interim quote option. Ensure that other information required for quotes like quote for, mode of output and addressee information is entered as desired. Click Generate Quote button to generate the quote.

View Missing Information

This function enables the user to view any missing input information required for quote generation. The option would also list out any business rule that is not satisfied.

Step 1: After successful logon, click menu Sales & Marketing and select the option Quotes.

Step—2: Please refer to previous sections on how to create a new quote or modify a saved quote. Before clicking on save button to the save the quote-input information to the database, click on the "Missing Info" tab on the top or the link at the bottom to navigate to missing information screen.

Step—3: If the quote has any mission information or any business rule not satisfied, the screen would list out all such items. (See FIG. F-106)

The missing information is grouped on how the input fields are grouped in the input screens. Click on the hyperlink at the top corner of each section to navigate to the specific area in the input screen where the missing information is located.

Related Applications

No related applications

PX2 User Manual

User Administration

1 Introduction

User Administration is the administrative module that encompasses the processes of creating and maintaining the PX2 entities like Module, Application, Resource, Group, User, User Role, Group Access rights, User Role Group Mapping and Password Configuration.

The Applications

The above-mentioned processes are accomplished in several applications embedded into the User Administration system. These applications steer the tasks of creating, and administering the PX2 entities, thereby helping achieve the goals of the User Administration system.

Module Master—Modules are the encapsulation from a wider perspective, of the broad functionalities of the PX2 system. For e.g. Carrier Maintenance, Sales and Marketing, Enrollment, Finance etc. This module master application is used to manage modules within the PX2 system.

Application Master—An application represents a business use case or a set of related use cases. The organization of related resources or pages in sequence constitute an application. A module consists of many applications. For e.g. Carrier Maintenance module consists of following applications viz. Zip Master, Carrier Master, and M Plan etc. This application master application is used to manage applications within the PX2 system.

Resource Master—These are entities or pages that are organized in logical sequence to achieve the functionality of an application. An application can have one or more resources, access to which is administered by the User Administration module. This resource master application is used to manage resources within the PX2 system.

Group Master—A group is a functional or logical collection of users. The grouping is based on the nature of operations performed by the users. A user can belong to multiple groups. This group master application is used to manage groups within the PX2 system.

User Master—A user is an entity representing a person working in any of the departments in Benefit Partners Inc. The identity of the user is to be authenticated by the User Administration System in consideration of his/her group and role. A user can belong to multiple groups and can play multiple roles. This user master application is used to manage users within the PX2 system.

User Role Master—User role represents a job a particular person performs in the system. A user can play multiple roles in the system. For e.g., a manager can play the role of a data entry personnel as well as that of an authorizing body. When logged in as data entry personnel, he/she may not have the privileges what was available as a manager. This user role master application is used to manage user roles within the PX2 system.

Mapping—This crucial process involves the creation of modular combinations of the entities. This process of mapping the entities is three-fold as detailed below.

User Role Group Mapping—This bi-fold process assigns a selected role to a user and then assigns the user to a selected group.

Group Access Rights—This process assigns access rights to a group for an application. Subsequently the resources in the selected application could be allotted individual Read, Write or No Access rights to the group.

User Access Rights—This process assigns access rights to the user for an application's resources. This assignment overrides the rights available to the group to which the user belongs.

Password Configuration—This process configures the various password-related parameters. These parameters include maximum & minimum password length, maximum & minimum expiry days, password repeat count etc.

2 Module

Modules are the encapsulation from a wider perspective, of the functionalities associated with the PX2 system. For e.g. Carrier Maintenance, Sales and Marketing, Enrollment, Finance etc.

The module comprises of a group of applications. The following modules form an integral part of the core administrative system viz. Carrier Maintenance, Enrollment, Sales and Marketing and Finance.

Access

The application can be accessed from the main menu as follows:

Security→Module→Create/Modify →Delete Module

Pre-Requisites

There are no pre-requisites for using this application.

Application Functions

This application has the following functions:

Create Module

Modify Module

Delete Module

Create Module

This function enables the creation of a new module. This creates a module with a unique id, under which several applications could be organized.

The sequential steps involved in the creation of a new module are listed below.

Step—1: After successful logon, click the menu Module and select the option Create/Modify. (See FIG. G-G-1)

Step—2: Enter the values in the respective field as per the format briefed in the Fields Explanation section, and click the Save button. (See FIG. G-2)

Fields Explanation

The following table provides explanations for each of the screen fields.

| Element | Description |
|---|---|
| Module Id | The id with which the module is uniquely identified. Accepts alphabets and numeric values. Entry in this field is mandatory. |
| Module Name | The text for module name. Accepts alphabets and numeric values. Entry in this field is mandatory. |
| Comments | The comments pertinent to the module being created. Accepts alphabets and numeric values. Entry in this field is optional. |

Button Functionality

The following table provides explanation for each button in the screen.

| Element | Description |
|---|---|
| Save | Saves the entered module information in the database. The page gets refreshed and the contents entered in the fields are cleared. |
| Cancel | Clears the contents entered in the fields. |

Modify Module

This function enables the modification of an existing module. After modification, the organization of applications under the module remains intact.

The sequential steps involved in the modification of an existing module are listed below.

Step—1: After successful logon, click the menu Module and select the option Create/Modify (See FIG. G-3)

Step—2: Module id has to be selected by clicking the lookup icon. (See FIG. G-4)

This pops a window enlisting the existing module ids. (See FIG. G-5)

Step—3: Choose a module id by double clicking on any of the listed module ids. The selected module id gets inserted in the module id field automatically. (See FIG. G-6)

Step—4: Change the contents to be modified and click Update.

Fields Explanation

The following table provides explanation for each of the screen fields.

| Element | Description |
|---|---|
| Module Id | The id with which the module is uniquely identified. Accepts alphabets and numeric values. Entry in this field is mandatory. |
| Module Name | The text for module name. Accepts alphabets and numeric values. Entry in this field is mandatory. |
| Comments | The comments pertinent to the module being modified. Accepts alphabets and numeric values. Entry in this field is optional. |

Button Functionality

The following table provides explanation for each button in the screen

| Element | Description |
|---|---|
| Module Id | The id with which the module is uniquely identified. Accepts alphabets and numeric values. Entry in this field is mandatory. |
| Module Name | The text for module name. Accepts alphabets and numeric values. Entry in this field is mandatory. |
| Comments | The comments pertinent to the module being modified. Accepts alphabets and numeric values. Entry in this field is optional. |

Delete Module

This function enables the deletion of an existing module. Only the modules that are not associated with any other application are available for deletion.

The sequential steps involved in the deletion of an existing module are listed below.

Step—1: After successful logon, click the menu Module and select the Delete option. (See FIG. G-7)

Step—2: Check the ids of the modules to be deleted. Only modules that do not have any applications organized under them can be deleted.

Step—3: Click the Delete button to perform delete operation on the selected modules. (See FIG. G-8)

Button Functionality

The following table provides explanation for each button in the screen.

| Element | Description |
|---|---|
| Check Box | Check the modules to be deleted. Check box will be in disabled state for applications that have been used in any of the higher-level entities of the User Administration system. |
| Delete | Deletes the selected applications. |

Related Applications

Related applications are:

Application Master

Resource Master

3 Application

An application represents a business use case or a set of related use cases. The organization of related resources or pages in sequence constitute an application. A module consists of many applications. For e.g. Carrier Maintenance module consists of following applications viz. Zip Master, Carrier Master, and M Plan etc. Each application is constituted of several pages.

Access

The application can be accessed from the main menu as follows:

Security→Application→Create/Modify

→Delete Application

Pre-Requisites

The Module, under which the application is to be organized, must have been created and available.

Application Functions

This application has the following functions:

Create application

Modify application

Delete application

Create Application

This function enables the creation of a new application. This creates an application with a unique id under which several resources could be organized.

The sequential steps involved in the creation of a new application are listed below.

Step—1: After successful logon, click the menu Application and select the option Create/Modify. (See FIG. G-9)

Step—2: Enter the values in the respective fields, as per the format briefed in Fields Explanation section. (See FIG. G-10)

Step—3: To select an application, click the lookup icon. This pops a window enlisting the existing application ids. Choose an application id by double clicking on any application id for selection. Corresponding application name of the selected application id will be inserted automatically. (See FIG. G-11)

Step—4: Enter the application name directly.

Step—5: Enter the comments directly.

Step—6: To select a module, click the lookup icon. This pops a window enlisting the existing module ids. Choose a module id by double clicking on any module id for selection. The module name of the selected module id will be inserted automatically (See FIG. G-12)

Step—7: Click Save button to save the contents.

Fields Explanation

| Element | Description |
|---|---|
| Application Id | The id with which the application is uniquely identified. Accepts alphabets and numeric values. Entry in this field is mandatory. Selection could also be made, by clicking the lookup icon. |
| Application Name | The text for application name. Accepts alphabets and numeric values. Entry in this field is mandatory. |
| Comments | The comments pertinent to the Application being created. Accepts alphabets and numeric values. Entry in this field is optional. |
| Select the module | Clicking on the Lookup icon enlists the existing modules, selecting which automatically makes an entry in the field. Entry in this field is mandatory. On this selection, modules selected will get associated with the application being created. |

Button Functionality

| Element | Description |
|---|---|
| Application Id | The id with which the application is uniquely identified. Accepts alphabets and numeric values. Entry in this field is mandatory. Selection could also be made, by clicking the lookup icon. |
| Application Name | The text for application name. Accepts alphabets and numeric values. Entry in this field is mandatory. |
| Comments | The comments pertinent to the Application being created. Accepts alphabets and numeric values. Entry in this field is optional. |
| Select the module | Clicking on the Lookup icon enlists the existing modules, selecting which automatically makes an entry in the field. Entry in this field is mandatory. On this selection, modules selected will get associated with the application being created. |

Modify Application

This function enables the modification of an existing application. After modification, the organization of resources under the application remains intact.

The sequential steps involved in the modification of an existing application are listed below.

Step—1: After successful logon, click the menu Application and select the option Create/Modify. (See FIG. G-13)

Step—2: Application id could be directly entered or selected by clicking the lookup icon. (See FIG. G-14)

This pops a window enlisting the existing application ids. (See FIG. G-15)

Step—3: Choose an application id by double clicking on any application id. The selected application id gets automatically inserted in the application id field with its corresponding application name.

Step—4: Module has to be selected by clicking the lookup icon. [See step—3 of create application] (See FIG. G-16)

Step—5: Change the contents to be modified and click Update.

Fields Explanation

| Element | Description |
|---|---|
| Application Id | The id with which the application is uniquely identified. Accepts alphabets and numeric values. Entry in this field is mandatory. |
| Application Name | The text for Application name. Accepts alphabets and numeric values. Entry in this field is mandatory. |
| Comments | The comments pertinent to the application being modified. Accepts alphabets and numeric values. Entry in this field is optional. |
| Selected the module | Clicking on the lookup icon enlists the existing Modules, selecting which automatically makes an entry in the field. Entry in this field is mandatory. Upon this selection, the selected modules will get associated with the application being modified. |

Button Functionality

| Element | Description |
|---|---|
| Update | Saves the entered Application information in the database. The page gets refreshed and the contents entered in the fields are cleared. |
| Cancel | Clears the contents entered in the fields. |

Delete Application

This function enables the deletion of an existing application. Only the applications that are not associated with any other resource or module are available for deletion.

The sequential steps involved in the deletion of an existing application are listed below.

Step—1: After successful logon, click the menu Application and select the Delete option. (See FIG. G-17)

Step—2: Check the application ids to be deleted. Only applications that don't have any resources under them can be deleted.

Step—3: Click Delete button to perform delete operation on the selected application ids. (See FIG. G-18)

Button Functionality

| Element | Description |
|---|---|
| Check Box | Check the applications to be deleted. Check box will be in disabled state for applications that have been used in any other User Administration levels of higher than it. |
| Delete | Deletes the selected applications. |

Related Applications

Related applications are:

Module Master

Resource Master

4 Resources

These are entities or pages that are organized in logical sequence to achieve the functionality of an application. An application can have one or more resources, access to which is administered by the User Administration module.

The resources accessible from the system can be protected using a single access control (ACL). The ACL specifies the nature of access rights available for a page. For e.g. Read or Write or None.

Access

The application can be accessed from the main menu as follows:

Security→Resource→Create/Modify →Delete Resource

Pre-Requisites

An application is constituted of resources. The application, to which the resources are to be attached, must be available in the system.

Application Functions

This application has the following functions:

Create resource

Modify resource

Delete resource

Create Resource

This function enables the creation of a new resource. This creates a resource with a unique id.

The sequential steps involved in the creation of a new resource are listed below.

Step—1: After successful logon, click menu Resource and select the option of Create/Modify. (See FIG. G-19)

Step—2: Enter the values in the respective fields, as per the format briefed in Fields Explanation section. (See FIG. G-20)

Step—3: For selecting an application, click the lookup icon. This pops a window enlisting the existing application ids. Choose an application id by double clicking on any application id for selection. The name of the selected application id will be inserted automatically. (See FIG. G-21)

Step—4: Enter the resource name directly.

Step—5: Enter screen URL directly.

Step—6: Enter comments directly.

Step—7: Click the Save button to save the contents.

Fields Explanation

| Element | Description |
|---|---|
| Resource Id | The id with which the resource is uniquely identified. Accepts alphabets and numeric values. Entry in this field is mandatory. |
| Resource Name | The text for resource name. Accepts alphabets and numeric values. Entry in this field is mandatory. |
| Screen URL | The path URL for accessing the resource. Accepts alphabets and numeric values. Entry in this field is mandatory. |
| Comments | The comments pertinent to the resource being created. Accepts alphabets and numeric values. Entry in this field is optional. |
| Select the Application | Clicking on the lookup icon enlists the existing applications, selecting which automatically makes an entry in the field. Entry in this field is mandatory. Upon this selection, the application selected will get associated with the resource being created. |

Button Functionality

| Element | Description |
|---|---|
| Save | Saves the entered resource information in the database. The page gets refreshed and the contents entered in the fields are cleared. |
| Cancel | Clears the contents entered in the fields. |

Modify Resource

This function enables the modification of an existing resource.

The sequential steps involved in the modification of an existing module are listed below.

Step—1: After successful logon, click Resource menu and select the option Create/Modify. (See FIG. G-22)

Step—2: Resource id has to be selected by clicking the lookup icon. (See FIG. G-23)

This pops a window enlisting the existing application ids. (See FIG. G-24)

Step—3: Choose a resource id by double clicking on any resourced id. The selected resource id gets automatically inserted in the resource id field with its corresponding resource name.

Step—4: Application has to be selected by clicking the lookup icon. [See step—3 of create resource] (See FIG. G-25)

Step—5: Change the contents to be modified and click Update.

Fields Explanation

| Element | Description |
|---|---|
| Resource Id | The id with which the resource is uniquely identified. Entry in to this field is mandatory. |
| Resource Name | The text for resource name. Accepts alphabets and numeric values. Entry in this field is mandatory. |
| Screen URL | The URL of the resource. Accepts alphabets and numeric values. Entry in this field is mandatory. |

-continued

| Element | Description |
|---|---|
| Comments | The comments pertinent to the resource being modified. Accepts alphabets and numeric values Entry in this field is optional. |
| Selected the Application | Clicking on the lookup icon enlists the existing applications selecting which automatically makes an entry in the field. Entry in this field is mandatory. On this selection, applications selected will get associated with the resource being modified. |

Button Functionality

| Element | Description |
|---|---|
| Update | Saves the entered resource information in the database. The page gets refreshed and the contents entered in the fields are cleared. |
| Cancel | Clears the contents entered in the fields. |

Delete Resource

This function enables the deletion of an existing resource. Only the resources that are not associated with any application are available for deletion.

The sequential steps involved in the deletion of an existing resource are listed below.

Step—1: After successful logon, click Resource menu and select the Delete option. (See FIG. G-26)

Step—2: Select the values of resource ids to be deleted. The resources that are not associated with any application only are available for deletion.

Step—3: Click Delete button to perform delete operation on the selected resources. (See FIG. G-27)

Button Functionality

| Element | Description |
|---|---|
| Check Box | Check the resources to be deleted. Check box will be in disabled state for resources that have been used in any other User Administration levels of higher than this. |
| Delete | Deletes the selected resources. |

Related Applications

Related applications are:

Module Master

Application Master

5 Group

A group is a functional or logical collection of users. The grouping is based on the nature of operations performed by the users. A user can belong to multiple groups. Groups provide an efficient way to manage large numbers of users because an administrator can specify permissions for an entire group at one time. The resources can be allocated to a group instead of assigning to an individual user. The user being a part of the group acquires access rights to those resources attached to the group.

Access

The application can be accessed from the main menu as follows:

Security→Group→Create/Modify

→Delete Group

Pre-Requisites

There are no pre-requisites for using this application.

Application Functions

This application has the following functions:

Create group

Modify group

Delete group

Create Group

This function enables the creation of a new group. This creates a group with a unique id under which several users could be organized.

The sequential steps involved in the creation of a new group are listed below.

Step—1: After successful logon, click the menu Group and select the option Create/Modify. (See FIG. G-28)

Step—2: Enter the values in the respective fields as per the format briefed in the field's explanation section, and click the Save button. (See FIG. G-29)

Fields Explanation

| Element | Description |
|---|---|
| Group Id | The id with which the group is uniquely identified. Accepts alphabets and numeric values. Entry in this field is mandatory. |
| Group Name | The text for group name. Accepts alphabets and numeric values. Entry in this field is mandatory. |
| Comments | The comments pertinent to the group being created. Accepts alphabets and numeric values. Entry in this field is optional. |

Button Functionality

| Element | Description |
|---|---|
| Save | Saves the entered group information in the database. The page gets refreshed and the contents entered in the fields get cleared. |
| Clear | Clears the contents entered in the fields. |

Modify Group

This function enables the modification of an existing group. After modification, the organization of users under the group remains intact.

The sequential steps involved in the modification of an existing group are listed below.

Step—1: After successful logon, click the menu Group and select the option Create/Modify. (See FIG. G-30)

Step—2: Group id has to be selected by clicking the lookup icon. This pops a window enlisting the existing application ids. (See FIG. G-31)

Step—3: Choose a group id by double clicking on any group id for selection. The selected group id gets automatically inserted in the group id field with its corresponding group name. (See FIG. G-32)

Step—4: Change the contents to be modified and click the Update button. (See FIG. G-33)

Fields Explanation

| Element | Description |
|---|---|
| Group Id | The id with which the group is uniquely identified. Accepts alphabets and numeric values. Entry in this field is mandatory. |

-continued

| Element | Description |
|---|---|
| Group Name | The text for group name. Accepts alphabets and numeric values. Entry in this field is mandatory. |
| Comments | The comments pertinent to the group being modified. Accepts alphabets and numeric values Entry in this field is optional. |

Button Functionality

| Element | Description |
|---|---|
| Update | Saves the entered group information in the database. The page gets refreshed and the contents entered in the fields are cleared. |
| Cancel | Clears the contents entered in the fields. |

Delete Group

This function enables the deletion of an existing group. Only the groups that are not associated with any other application are available for deletion.

The sequential steps involved in the deletion of an existing group are listed below.

Step—1: After successful logon, click the menu Group and select the Delete option. (See FIG. G-34)

Step—2: Check the ids of the groups to be deleted. The disabled checkboxes represent the groups that are previously mapped to any users.

Step—3: Click the Delete button to perform delete operation on the selected groups. (See FIG. G-35)

Button Functionality

| Element | Description |
|---|---|
| Check Box | Check the groups to be deleted. Check box will be in disabled state for groups that have been previously associated with users. |
| Delete | Deletes the selected groups. |

Related Applications

Related application is:

Users

6 User

A user is an entity representing a person working in any of the departments in Benefit Partners Inc. The identity of the user is to be authenticated by the User Administration system in consideration of his/her group and role. A user can belong to multiple groups and can play multiple roles.

Access

The application can be accessed from the main menu as follows:

Security→User→Create/Modify
→Delete User

Pre-Requisites

Groups must have been created and available to attach users to those groups. This attachment can be of any form like one user to one group or one user to many groups.

Application Functions

This application has the following functions:

Create user

Modify user

Delete user

Create User

This function enables the creation of a new user.

The sequential steps involved in the creation of a new user are listed below.

Step—1: After successful logon, click the menu User and select the option Create/Modify. (See FIG. G-36)

Step—2: Enter the values in the respective fields as per the format briefed in Fields Explanation section, and click the Save button. (See FIG. G-37)

Fields Explanation

| Element | Description |
|---|---|
| First Name | The first name of the user. Accepts alphabets of length not exceeding 25 characters. Entry in this field is mandatory. |
| Middle Initial | The middle initial of the user. Accepts only 1 alphabet character. Entry in this field is optional. |
| Last Name | The last name of the user. Accepts alphabets of length not exceeding 35 characters. Entry in this field is mandatory. |
| User Id | The id with which the user is uniquely identified. Accepts alphabets and numeric values. Entry in this field is mandatory. |
| Password | The password to logon. Accepts alphabets, numeric values and special characters. Entry in this field is mandatory. |
| Display name | The display name is the name by which a user wishes to display his/her name. Accepts alphabets and numeric values. Entry in this field is mandatory. |
| Phone | The telephone number of a user. Accepts only 10 digits of numeric and should be in the format 999 999 9999. Entry in this field is mandatory. |
| Extension | The extension number to access a user. Accepts only 4 digits of numeric and should be in the format 9999. Entry in this field is optional. |
| Fax | The fax number of a user. Accepts only 10 digits of numeric and should be in the format 999 999 9999. Entry in this field is optional. |
| E-mail | The email id of a user. Accepts alphabets, numeric values and special characters of length not exceeding 100 with a valid email format. Entry in this field is mandatory. |
| Lock | Lock the user access to the PX2 system. On checking the lock check box, the user is denied access to the entire PX2 system. |

Button Functionality

| Element | Description |
|---|---|
| Save | Saves the entered user information in the database. The page gets refreshed and the contents entered in the fields are cleared. |
| Cancel | Clears the contents entered in the fields. |

Modify User

This function enables the modification of an existing user.

The sequential steps involved in the modification of an existing user are listed below.

Step—1: After successful logon, click the menu User and select the option Create/Modify. (See FIG. G-38)

Step—2: User id has to be selected by clicking the lookup icon. (See FIG. G-39)

Step—3: This pops up a screen. Enter the user id. To run a search on existing user ids type a few letter(s) and click on the Search button. (See FIG. G-40)

Step—4: Double click on any user-id for selection. Corresponding display name will get inserted in the field automatically. (See FIG. G-41)

Step—5: Change the contents to be modified and click Update.

Field Explanation

| Element | Description |
|---|---|
| First Name | The first name of the user. Accepts alphabets of length not exceeding 25 characters. Entry in this field is mandatory. |
| Middle Initial | The middle initial of the user. Accepts only 1 alphabet character. Entry in this field is optional. |
| Last Name | The last name of the user. Accepts alphabets of length not exceeding 35 characters. Entry in this field is mandatory. |
| User Id | The id with which the user is uniquely identified. Accepts alphabets and numeric values. Entry in this field is mandatory. |
| Password | The password to logon. Accepts alphabets, numeric values and special characters. Entry in this field is mandatory. |
| Display name | The display name is the name by which a user wishes to display his/her name. Accepts alphabets and numeric values. Entry in this field is mandatory. |
| Phone | The telephone number of a user. Accepts only 10 digits of numeric and should be in the format 999 999 9999. Entry in this field is mandatory. |
| Extension | The extension number to access a user. Accepts only 4 digits of numeric and should be in the format 9999. Entry in this field is optional. |
| Fax | The fax number of a user. Accepts only 10 digits of numeric and should be in the format 999 999 9999. Entry in this field is optional. Entry in this field is mandatory. |
| E-mail | The email id of a user. Accepts alphabets, numeric values and special characters of length not exceeding 100 with a valid email format. Entry in this field is mandatory. |
| Lock | Lock the user access to the PX2 system. On checking the lock check box the user is denied access to the entire PX2 system. |

Button Functionality

| Element | Description |
|---|---|
| Update | Saves the entered user information in the database. The page gets refreshed and the contents entered in the fields are cleared. |
| Cancel | Clears the contents entered in the fields. |

Delete User

This function enables the deletion of an existing user. Only the users that are not associated with any other groups are available for deletion.

The sequential steps involved in the deletion of an existing user are listed below.

Step—1: After successful logon, click the menu User and select the Delete option. (See FIG. G-42)

Step—2: Check the user ids to be deleted. Only the users that are not associated with any other groups are available for deletion.

Step—3: Click Delete button to perform delete operation on the selected user ids. (See FIG. G-43)

Button Explanation

| Element | Description |
|---|---|
| Check Box | Check the users to be deleted. Check box will be in disabled state for users that have been used in any other User Administration levels of higher than it. |
| Delete | Deletes the selected users. |

Related Applications

Related application is:

Group Master

7 User Role

User role represents a job a particular person performs in the system. A user can play multiple roles in the system. For e.g. a manager can play the role of data entry personnel as well as that of an authorizing body. When logged in as data entry personnel, he/she may not have the privileges what was available as a manager.

Access

The application can be accessed from the main menu as follows:

Security→Application→Create/Modify →Delete User Role

Pre-Requisites

There are no pre-requisites as such for using this application.

Application Functions

This application has the following functions:

Create user role

Modify user role

Delete user role

Create User Role

This function enables the creation of a new user role. This creates a user role with a unique id to which several users could be mapped.

The sequential steps involved in the creation of a new user role are listed below.

Step—1: After successful login, click the menu User Role and select the option Create/Modify. (See FIG. G-44)

Step—2: Enter the values in the respective fields as per the format briefed in fields explanation section, and click the Save button. (See FIG. G-45)

Field Explanation

| Element | Description |
|---|---|
| User Role Id | The id with which the user role is uniquely identified. Accepts alphabets and numeric values of length not exceeding 35 characters. Entry in this field is mandatory. |
| User Role Name | The text for user role name. Accepts alphabets and numeric values. Entry in this field is mandatory. |
| Comments | The comments pertinent to the user role being created. Accepts alphabets and numeric values. Entry in this field is optional. |

Button Functionality

| Element | Description |
|---|---|
| Save | Saves the entered user role information in the database. The page gets refreshed and the contents entered in the fields get cleared. |
| Cancel | Clears the contents entered in the fields. |

Modify User Role

This function enables the modification of an existing user role. Many user roles can be assigned to a user but only one role can be exercised at a time.

The sequential steps involved in the modification of an existing user role are listed below.

Step—1: After successful logon, click the menu User Role and select the option Create/Modify. (See FIG. G-46)

Step—2: Enter the User role or select the user role id by clicking the lookup icon. (See FIG. G-47)

This pops a window enlisting the existing application ids. (See FIG. G-48)

Step—3: Double click on any user role id for selection. Corresponding display name will get inserted in the field automatically. (See FIG. G-49)

Step—4: Change the contents to be modified and click the Update button.

Field Explanation

| Element | Description |
|---|---|
| User Role Id | The id with which the user role is uniquely identified. Accepts alphabets and numeric values of length not exceeding 35 characters. Entry in this field is mandatory. |
| User Role Name | The text for user role name. Accepts alphabets and numeric values. Entry in this field is mandatory. |
| Comments | The comments pertinent to the user role being created. Accepts alphabets and numeric values. Entry in this field is optional. |

Button Functionality

| Element | Description |
|---|---|
| Update | Saves the entered user role information in the database. The page gets refreshed and the contents entered in the fields are cleared. |
| Cancel | Clears the contents entered in the fields. |

Delete User Role

This function enables the deletion of an existing user role. Only he user roles that are not mapped to any users are only available for deletion.

The sequential steps involved in the deletion of an existing user role are listed below.

Step—1: After successful logon, click the menu User Role and select the Delete option. (See FIG. G-50)

Step—2: Check the user role ids to be deleted. The user roles that are not associated with any other higher-level hierarchy of users only are available for deletion.

Step—3: Click Delete button to perform delete operation on the selected user role ids. (See FIG. G-51)

Button Explanation

| Element | Description |
|---|---|
| Check Box | Check the user role to be deleted. Check box will be in disabled state for user roles that have been used in any other User Administration levels of higher than it. |
| Delete | Deletes the selected User roles. |

Related Applications

Related applications are:

User

Mapping

8 Mapping

The Mapping master is the application used to create mapping between Groups, User and User Roles. This crucial process involves the creation of modular combinations of these entities.

Access

The application can be accessed from the main menu as follows:

Security→User Role→Group Access Rights

→User Role Group

→User Access Rights

Pre-Requisites

Users, Groups, User Roles, Resources must be available in the system to establish mapping amongst them.

Application Functions

This application is to establish a relationship between Groups, User and User Roles.

Create/Remove Group Access Rights

Create/Remove User Role Group

Create/Remove User Access Rights

User Role Group

This bi-fold process assigns a selected role to a user and then assigns the user to a selected group.

The sequential steps involved in the creating user role group are listed below.

Step—1: After successful logon, click the menu Mapping and select the User Role Group option. (See FIG. G-52)

Step—2: User id has to be selected by clicking the lookup icon. (See FIG. G-53)

This pops up a screen. Enter the user id. (See FIG. G-54)

To run a search on existing user ids type a few letter(s) and click on the Search button.

Step—3: Double click on any user-id for selection. User id and its corresponding display name will get inserted in the respective fields automatically.

Step—4: To assign a role to the user, select an existing role by clicking the lookup icon. This pops a window enlisting the existing roles. Choose a role by double clicking on any role. The selected role name gets inserted in the role field automatically. (See FIG. G-55)

Step—5: Click Select button to complete the mapping of user to role. The window gets refreshed displaying the list of available groups. (See FIG. G-56)

Step—6: Now to associate the user with the assigned role to a group, check the group ids to be associated with.

Step—7: Click on Save button to complete the process of mapping of the user to role to group.

Field Explanation

| Element | Description |
|---|---|
| User Id | The id with which the user is uniquely identified. |
| Display Name | The display name is the name by which a user wishes to display his/her name. |
| Select the Role | The selection of a role is to assign a role to the selected user id. |

Button Functionality

| Element | Description |
|---|---|
| Select | Select will map the selected user to the selected role and enlist the existing groups. |
| Save | Saves the entered user, role, and group information in the database. The page gets refreshed and the contents entered in the fields are cleared. |
| Clear/Cancel | The mapping process carried out up to that point gets cancelled. Clears the contents entered in the fields. |

Group Access Rights

This process assigns access rights to a group for an application. Subsequently the resources in the selected application could be allotted individual read, write or no access rights to the group.

The sequential steps involved in the creating group access rights are listed below.

Step—1: After successful login, click the menu Mapping and select the Group Access Rights option. (See FIG. G-57)

Step—2: Group id has to be selected by clicking the lookup icon. This pops a window enlisting the existing groups ids. Choose a group id by double clicking on any group id for selection. The selected group id gets inserted in the group id field automatically. (See FIG. G-58)

Step—3: Now to assign applications to the selected group, select the application id by clicking the lookup icon. This pops a window enlisting the existing applications. Choose an application by double clicking on any application id for selection. The selected application id gets inserted in the application field automatically. (See FIG. G-59)

Step—4: Click the Select button to complete the mapping of group to application. The window gets refreshed displaying the resources available under the application. (See FIG. G-60)

Step—5: Now to assign resource-wise access rights to the assigned group and application, check the resource names to be associated with and set the desired access right from the adjoining access right list as read or write or no access.

Step—6: Click on Save button to complete the process of creating group access rights.

Field Explanation

| Element | Description |
|---|---|
| Select the Group | The id with which the group is uniquely identified. |
| Select the Application | The id with which the application is uniquely identified. |
| ACL [Access control level] | Level indicates the level of accessing methods say read, write and no access for the each of the resources. |

Button Explanation

| Element | Description |
|---|---|
| Select | Select will map the selected group to the selected Application and enlist the resources under the selected application. |
| Save | Saves the entered information in the database. The page gets refreshed and the contents entered in the fields are cleared. |
| Clear/Cancel | The group access rights carried out up to that point gets cancelled. Clears the contents entered in the fields. |

User Access Rights

User access rights represent the privileges required for accessing resources. An administrator protects resources by establishing access control lists to grant permissions to users and groups. Individual user permissions take precedence over group permissions. Individual user permission overrides the more restrictive group permission.

This process assigns access rights to the user for an application's resources. This assignment over-rides the rights available to the group to which the user belongs.

The sequential steps involved in the creating user access rights are listed below.

Step—1: After successful logon, click the menu Mapping and select the User Access Rights (See FIG. G-61)

Step—2: User id has to be selected by clicking the lookup icon. (See FIG. G-62)

Enter the user id. To run a search on existing user ids type a few letter(s) and click on the Search button. The screen illustrated below pops up.

Step—3: Double click on any user-id for selection. Corresponding display name will get inserted in the field automatically.

Step—4: Application id has to be selected by clicking the lookup icon. This pops a window enlisting the existing application ids. Choose an application id by double clicking on any application id for selection. The selected application id gets inserted in the application id field automatically. (See FIG. G-63)

Step—5: To assign a role to the user with assigned application, now select an existing role by clicking the lookup icon. This pops a window enlisting the existing roles. Choose a role by double clicking on any role for selection. The selected role name gets inserted in the role field automatically. (See FIG. G-64)

Step—6: Click Select button to complete the process of user access rights. The window gets refreshed displaying the resources available under the selected application. (See FIG. G-65)

Step—7: Now to assign resource-wise access rights to the assigned user, application and role, check the resource names to be associated with and set the desired access right from the adjoining access right list as read or write or no access.

Step—8: Click on Save button to complete the process of creating user access rights.

Field Explanation

| Element | Description |
|---|---|
| User Id | The id with which the user is uniquely identified. |
| Display Name | The display name is the name by which a user wishes to display his/her name. |
| Select the Application | The id with which the application is uniquely identified. |
| Select the Role | The selection of a role is to assign a role to the selected user id, application. |
| ACL [Access control level] | Level indicates the level of accessing methods say read, write and no access for the each of the resources. |

Button Functionality

| Element | Description |
|---|---|
| Select | Select will map the selected User, Role to the selected Application and enlist the resources under the selected Application. |
| Save | Saves the entered information in the database. The page gets refreshed and the contents entered in the fields are cleared. |
| Clear/Cancel | The user access rights carried out up to that point gets cancelled. Clears the contents entered in the fields. |

Related Applications

Related applications are:

Users

Groups

User Roles

Resources

9 Password Configuration

This process configures the various password-related parameters. These parameters include maximum & minimum password length, maximum & minimum expiry days, password repeat count etc.

Access

The application can be accessed from the main menu as follows:

Security→Configure→Password Configuration

Pre-Requisites

There are no pre-requisites as such for using this application.

Application Functions

This application is to administer the parameters related to password.

Configure Password

Password configuration is mainly to monitor and control the usage of password.

Following is the screen snapshot for password configuration. (See FIG. G-66)

Fields Explanation

| Element | Description |
|---|---|
| Maximum Password length | Maximum allowed length in characters of the password. Entry in this field is mandatory. |
| Minimum password length | Minimum allowed length in characters of the password. Entry in this field is mandatory. |
| Maximum Expiry Days | Maximum allowed date for password expiration in days. Entry in this field is mandatory. |
| Minimum Expiry Days | Minimum allowed date for password expiration in days. Entry in this field is mandatory. |
| Prompt Expiry Period | Prompt expiry date is to highlight as a reminder for password expiration in days. Entry in this field is mandatory. |
| Password Repeat Count | This specifies the number of times the password has to have a new entry with no repetition of previous passwords. Entry in this field is mandatory. |
| Invalid Password Count | Invalid password count will have the count of attempting with invalid passwords before the user is locked. Entry in this field is mandatory. |
| Lock time for password | Lock time for password in HH:MM:SS format to have session-out. Entry in this field is mandatory. |

Button Functionality

| Element | Description |
|---|---|
| Save | Saves the entered password information in the database. The page gets refreshed and the content entered in the fields appear on the screen. |

Related Applications

None

Benefit Partners Inc

Process Specification

BPI_CAS_FSD_CM__01

1. Introduction 1.1. Purpose

This purpose of this document is to identify the process associated with the business use case Create Carrier Master.

1.2. Business Use Case Specification Reference

Business Use Specification

| Business Use Specification ID | Business Use Case Name |
|---|---|
| BPI_SCOPE_CM_001 | Create Carrier Master |

1.3. Definitions, Acronyms & Abbreviations

| Term | Explanation |
|---|---|

2. Process Identification 2.1. Background

Create Carrier Master is user for creation of master record for the carrier which includes the general information about the carrier, Department Contact Information, Mode of Communications Line of Coverage, plan type and the benefit level offered by the carrier and the benefit description.

2.2. Process Description & Flow

This process describes the Use Case "Create Carrier Master". This document is the amendment of BPI_CAS_FSD_CM__01 (Version 1.1).

2.2.1. Create Carrier Master

The flow of the process is as described below.

a. Input the general information about the carrier.

b. Input the Department Contact Information c. Validate if the department contact information has the right data type.

d. If yes add the information to a temporary storage.

e. If not re enter the information correctly and add again.

f. Continue adding further department contact information.

g. If yes follow steps from b) to e)

h. Edit or delete the Department Contact Information.

i. On edit remove the data from temporary storage and populate the department contact information data to the fields and change the data. Continue from c) to e).

j. On delete remove the data from the temporary storage.

k. Can continue from step b) onwards or go to step 1)

l. If not then check if the data entered for the general carrier information is correct or erroneous.

m. If erroneous re enter the correct data.

n. If Correct then save the data to the repository.

o. System auto generates a unique identification number for the carrier.

p. Choose the Line of coverage q. For the line of coverage choose the system show the Plan type.

r. Choose the Plan Type s. For the plan type choose the system show the benefit level t. Choose the benefit level and enter the benefit level name for the specific carrier and add.

u. The Line of coverage, plan type, Benefit Level and the name is populated in and shown.
v. Check if the data entered is correct or erroneous.
w. If erroneous then edit or delete the benefit level name.
x. Else continue adding the next line of coverage
y. If the process is completed save the data.
z. The data is saved into the repository and unique identification number is generated for the all the benefit level offered by the specific carrier a CarrierName_PlanType_BenefitLevel_UniqueID 2.2.2. Process Flow Diagrams (See FIG. H-1)

3. User Interface 3.1. User Interface Screens 3.1.1. Screen ID's

| Screen ID (SID) | Screen Name | Corresponding HTML File Name |
|---|---|---|
| carrier.general | Carrier General Info | /bpi/cas/carrier/master/CarrierInfo.jsp |
| carrier.search | Carrier Search | /bpi/cas/carrier/master/Carrier Search.jsp |
| carrier.view | Carrier General Info View | /bpi/cas/carrier/master/Carrier GeneralInfo.jsp |
| carrier.product | Carrier Product Info | /bpi/cas/carrier/master/Carrier Product.jsp |
| carrier.prodsearch | Search Product | /bpi/cas/carrier/master/Product Search.jsp |
| carrier.prodinfo | Carrier Product Info | /bpi/cas/carrier/master/Product View.jsp |

3.1.2. User Interface ID: Create Carrier Master 3.1.2.1. Screen Name: Create Carrier Master (BPI_CAS_SCR_CM__001__001)

(See FIG. H-2)

3.1.2.2. Element Name, Element Type, Label & Purpose

| Element Name | Element Type | Label | Purpose |
|---|---|---|---|
| Main Header Create Carrier Master | Text | Main Header Create Carrier Master | To give the heading for the screen being navigated |
| Sub Header Carrier General Information | Text | Sub Header Carrier General Information | Provide Content Area Text |
| Sub Header Address | Text | Sub Header Address | Text for the Company Address |
| Company Name | Text | Company Name | Text for the entry field |
| Company Name (Entry Field) | Entry Field | Company Name (Entry Field) | Entry Field for Company name |
| Address | Text | Address | Text for the Address |
| Address (Entry Field) | Entry Field | Address (Entry Field) | Entry Field for Address |
| Suite/Apt # | Text | Suite/Apt # | Text for Suite/Apt # |
| Suite/Apt # (Entry Field) | Entry Field | Suite/Apt # (Entry Field) | Entry Field for Suite/Apt # |
| City | Text | City | Text for City |
| City (Entry Field) | Entry Field | City (Entry Field) | Entry Field for City |
| State | Text | State | Text for state |
| State (Entry Field) | Entry Field | State (Entry Field) | Entry Field for State |
| ZIP | Text | ZIP | Text for ZIP |
| ZIP (Entry Field) | Entry Field | ZIP (Entry Field) | Entry Field for ZIP |
| Sub Header Contact | Text | Sub Header Contact | Text for the sub heading |

-continued

| Element Name | Element Type | Label | Purpose |
|---|---|---|---|
| Department | | Department | |
| Department | Drop Down List | Department | List all the departments for the carrier for contact information |
| Contact Name | Text | Contact Name | Text for Contact name |
| Salutation | Text | Salutation | Text for Salutation |
| First Name | Text | First Name | Text for First name |
| Middle name | Text | Middle name | Text for middle name |
| Last name | Text | Last name | Text for last name |
| Suffix | Text | Suffix | Text for Suffix |
| Title | Text | Title | Text for title |
| Salutation | Entry Field | Salutation | Entry Field for Salutation |
| First Name | Entry Field | First Name | Entry field for first name |
| Middle name | Entry Field | Middle name | Entry field for middle name |
| Last name | Entry Field | Last name | Entry field for last name |
| Suffix | Entry Field | Suffix | Entry Field for Suffix |
| Title | Entry Field | Title | Entry Field for title |
| Address | Text | Address | Text for the Address |
| Address (Entry Field) | Entry Field | Address (Entry Field) | Entry Field for Address |
| Suite/Apt # | Text | Suite/Apt # | Text for Suite/Apt # |
| Suite/Apt # (Entry Field) | Entry Field | Suite/Apt # (Entry Field) | Entry Field for Suite/Apt # |
| City | Text | City | Text for City |
| City (Entry Field) | Entry Field | City (Entry Field) | Entry Field for City |
| State | Text | State | Text for state |
| State (Entry Field) | Entry Field | State (Entry Field) | Entry Field for State |
| ZIP | Text | ZIP | Text for ZIP |
| ZIP (Entry Field) | Entry Field | ZIP (Entry Field) | Entry Field for ZIP |
| Mode of Communication | Drop Down List | Mode of Communication | List various modes of contact preferred |
| Phone | Text | Phone | Text for phone |
| FAX | Text | FAX | Text for FAX |
| Email | Text | Email | Text for email |
| Phone | Entry Field | Phone | Entry Field for Phone number |
| FAX | Entry Field | FAX | Entry field for FAX |
| Email | Entry Field | Email | Entry field for email |
| ADD | Button (HTML Submit button) | ADD | To add the above details on to the html table after validation check. |
| Table | HTML Table | Table | Table for adding up the contact information |
| Delete | Button (HTML Button) | Delete | To delete the contact information checked for deletion |
| Check All | Text Link | Check All | To check all the check boxes in the table |
| Clear All | Text Link | Clear All | To un check all the check boxes checked in the table |
| Delete | Check box | Delete | To check the items for deletion |
| Edit | Button (HTML Button) | Edit | To edit the contact information against the row selected for edition |
| Department Name | Text | Department Name | Shows the name of the department. added For example finance, marketing etc. |
| Last Name | Text | Last Name | Name of the contact person |
| Phone | Text | Phone | Phone of the contact person |
| FAX | Text | FAX | FAX of the contact person |
| Email | Text | Email | Email address of the contact person |
| SAVE | Button (HTML Submit button) | SAVE | Save all the above information to the repository |
| CANCEL | Button (HTML reset button) | CANCEL | To reset the entries made in all the fields |

3.1.2.3. Front End Validations

Validation Details

This section provides the front-end screen validations along with the associated message—Success/Error Message text

| # | Element Name | Action/Validation Details | Message |
|---|---|---|---|
| 1. | Company Name (Entry Field) | Refer Document No. BPI_CAS_FSD_COMMON | Refer Document No. BPI_CAS_FSD_COMMON |
| 2. | Address (Entry Field) | Refer Document No. BPI_CAS_FSD_COMMON | Refer Document No. BPI_CAS_FSD_COMMON |
| 3. | Suite/Apt # | Refer Document No. BPI_CAS_FSD_COMMON | Refer Document No. BPI_CAS_FSD_COMMON |
| 4. | Suite/Apt # (Entry Field) | Refer Document No. BPI_CAS_FSD_COMMON | Refer Document No. BPI_CAS_FSD_COMMON |
| 5. | City | Refer Document No. BPI_CAS_FSD_COMMON | Refer Document No. BPI_CAS_FSD_COMMON |
| 6. | City (Entry Field) | Refer Document No. BPI_CAS_FSD_COMMON | Refer Document No. BPI_CAS_FSD_COMMON |
| 7. | State | Refer Document No. BPI_CAS_FSD_COMMON | Refer Document No. BPI_CAS_FSD_COMMON |
| 8. | State (Entry Field) | Refer Document No. BPI_CAS_FSD_COMMON | Refer Document No. BPI_CAS_FSD_COMMON |
| 9. | ZIP (Entry Field) | Refer Document No. BPI_CAS_FSD_COMMON | Refer Document No. BPI_CAS_FSD_COMMON |
| 10. | Department | Should list various departments like Finance, Sales, Administration, Technical, Miscellaneous etc from the repository.<br>The First option should be -- Choose One --. Subsequent options should be listed alphabetically. | If none of the option is selected. Then should show an Error Dialog Box With message.<br>“Department Name - Is required” |
| 11. | Salutation | Refer Document No. BPI_CAS_FSD_COMMON | Refer Document No. BPI_CAS_FSD_COMMON |
| 12. | First Name | Refer Document No. BPI_CAS_FSD_COMMON | Refer Document No. BPI_CAS_FSD_COMMON |
| 13. | Middle name | Refer Document No. BPI_CAS_FSD_COMMON | Refer Document No. BPI_CAS_FSD_COMMON |
| 14. | Last name | Refer Document No. BPI_CAS_FSD_COMMON | Refer Document No. BPI_CAS_FSD_COMMON |
| 15. | Suffix | Refer Document No. BPI_CAS_FSD_COMMON | Refer Document No. BPI_CAS_FSD_COMMON |
| 16. | Title | Refer Document No. BPI_CAS_FSD_COMMON | Refer Document No. BPI_CAS_FSD_COMMON |
| 17. | Address (Entry Field) | Refer Document No. BPI_CAS_FSD_COMMON | Refer Document No. BPI_CAS_FSD_COMMON |
| 18. | Suite/Apt # (Entry Field) | Refer Document No. BPI_CAS_FSD_COMMON | Refer Document No. BPI_CAS_FSD_COMMON |
| 19. | City (Entry Field) | Refer Document No. BPI_CAS_FSD_COMMON | Refer Document No. BPI_CAS_FSD_COMMON |
| 20. | State (Entry Field) | Refer Document No. BPI_CAS_FSD_COMMON | Refer Document No. BPI_CAS_FSD_COMMON |
| 21. | ZIP (Entry Field) | Refer Document No. BPI_CAS_FSD_COMMON | Refer Document No. BPI_CAS_FSD_COMMON |
| 22. | Mode of Communication | Should list various types of Mode of Communications like Phone, FAX, email, USPS etc. from the repository.<br>The First option should be -- Choose One --. Subsequent options should be listed alphabetically. | If none of the option is selected. Then should show an Error Dialog Box With message. |
| 23. | Phone | Refer Document No. BPI_CAS_FSD_COMMON | Refer Document No. BPI_CAS_FSD_COMMON |
| 24. | Email | Refer Document No. BPI_CAS_FSD_COMMON | Refer Document No. BPI_CAS_FSD_COMMON |
| 25. | FAX | Refer Document No. BPI_CAS_FSD_COMMON | Refer Document No. BPI_CAS_FSD_COMMON |
| 26. | ADD | Should function with Enter Key Cursor Positioned on the“ADD” button or Mouse Click.<br>Check if the Contact Department is selected. If --choose one - default option is only selected throw a Java script error message.<br>Check if the Mode of Communication is selected. If --choose one - default option is only selected throw a Java script error message.<br>Check if the value entered for the | Error Dialog Box Text:<br>“Department Name - Is required” |

-continued

| # | Element Name | Action/Validation Details | Message |
|---|---|---|---|
| | | fields for the Department contact information are correct. If not throw error message. Success: Populates the HTML Table with the data on each column as relevant with the data entered in the entry field. | |
| 27. | Table | Should have column header and each subsequent row should be identified by alternate color combinations. i.e. First row should have color 'x' and the next row should have color 'y'. The next row should have color 'x' again and so on. The size of any text inside any cell should be wrapped if the text becomes too long. | |
| 28. | Delete | Should function with Enter Key Cursor Positioned on the "Delete" button or on Mouse Click. Delete Button should work on multiple deletes based on the check box or boxes selected. If the user clicks on the delete button without checking any of the delete check box should throw error message. Success: Deletes the row or rows from the HTML Table(temporary storage) | Error Message: "Please choose the row or rows to be deleted." |
| 29. | Check All | On clicking the "Check All" link should check all the check boxes in the HTML table. | On clicking the "Check All" link should check all the check boxes in the HTML table. |
| 30. | Clear All | On clicking the "Clear All"l ink should uncheck all the checked check boxes in the HTML table. | On clicking the "Clear All" link should uncheck all the checked check boxes in the HTML table. |
| 31. | Delete | Check box option with default "unchecked" | Check box option with default "unchecked" |
| 32. | Edit | Should function with Enter Key Cursor Positioned on the "Edit" button or on Mouse Click. On clicking the edit button the row edited should be removed from the HTML table and the data should be populated back on the editable entry fields. | Should function with Enter Key Cursor Positioned on the "Edit" button or on Mouse Click. On clicking the edit button the row edited should be removed from the HTML table and the data should be populated back on the editable entry fields. |
| 33. | Department Name | Display the data in a text | |
| 34. | Name | Display the data in a text | |
| 35. | Phone | Display the data in a text | |
| 36. | Email | Display the data in a text | |
| 37. | FAX | Display the data in a text | |
| 38. | SAVE | Should function with Enter Key Cursor Positioned on the "SAVE" button or on Mouse Click. On saving the data the data gets saved to the database. Validation Check: For the entire field on the carrier general information. Check if the data entered for the Carrier General Information is correct. If not throw error message. Check if there is data populated on the Department Contact information field. If yes show a dialog box with message "Would you like to Add the department contact information before saving" Yes/No. If yes allow the user to add the data. If no save the data without adding the Department contact information to the HTML Table. On Successful saving the flow should | Error Dialog Box Text: "The value entered for 'field name' is incorrect. Please enter the correct value." Note: The field name should be picked up dynamically for the each field that is erroneous. For general script validations for common functionality refer BPI_CAS_FSD_COMMON System Error: Common Text shall be followed for the System Error. Dialog Box Text: |

-continued

| # | Element Name | Action/Validation Details | Message |
|---|---|---|---|
| | | automatically be navigated to the next screen.(BPI_CAS_SCR_CM_001_002) | |
| 39. | Cancel | Cancel Button should clear all the content filled on the entry fields. | |

3.1.3. User Interface ID: Create Product 3.1.3.1. Screen Name: Create Product (BPI_CAS_SCR_CM__001__002)

(See FIG. H-3)

3.1.3.2. Element Name, Element Type, Label & Purpose

| Element Name | Element Type | Label | Purpose |
|---|---|---|---|
| Main Header Carrier Offered Plan | Text | Main Header Carrier Offered Plan | To give the heading for the screen being navigated |
| Trans Id | Text | Trans Id | Text for Trans Id |
| Trans Id | Entry Field | Trans Id | To Enter Trans Id |
| Plan Name | Text | Plan Name | Text for Plan Name |
| Plan Name | Entry Field | Plan Name | To Enter Plan Name |
| Carrier Name | Text | Carrier Name | Text for Carrier Name |
| Carrier Name | Drop Down List | Carrier Name | Lists various Carrier Names. |
| Line of Coverage | Text | Line of Coverage | Text for Line of Coverage |
| Line of Coverage | Drop Down List | Line of Coverage | Lists various line of coverage offered. Example Medical, Dental, Vision, CAM etc. |
| Plan Type | Text | Plan Type | Text for plan type |
| Plan Type | Drop Down List | Plan Type | List the Plan Type available for the line of coverage selected. Example HMO, PPO, PSO etc. |
| Add | Button (HTML Button) | Add | To add the Benefit Level Name to the HTML table. |
| Table | HTML table | Table | For adding and displaying all the names of the benefit level offered by the carrier |
| Delete | Button (HTML Button) | Delete | To delete single or multiple rows of the benefit level checked |
| Check All | Text Link | Check All | To check all the check boxes in the table |
| Clear All | Text Link | Clear All | To un check all the check boxes checked in the table |
| Enrolment | Button | Enrolment | To Navigate to Enrolment Transmission Screen |
| Premium | Button | Premium | To Navigate to Premium Transmission Screen |
| Delete | Check box | Delete | To check the items for deletion |
| Edit | Button (HTML Button) | Edit | To edit the benefit level against the row selected for edition |
| SAVE | Button (HTML Submit button) | SAVE | Save all the above information to the repository |
| Cancel | Button (HTML reset button) | Cancel | To reset the entries made in all the fields |

3.1.3.3. Front End Validations

Validation Details

This section provides the front-end screen validations along with the associated message—Success/Error Message text

| # | Element Name | Action/Validation Details | Message |
|---|---|---|---|
| 1. | Trans Id | This name should be brought from the previous screen BPI_CAS_SCR_CM_001_001. | Plan Id is required PlanId accepts alphanumeric values only |
| 2. | Line of Cov-erage | Should list various types of Line of Coverage from the database. Default Line of Coverage should be -- Choose One -- Subsequent line of coverage should be listed alphabetically. On choosing the line of coverage corresponding Plan Type should be listed. On choosing different Line of Coverage the Plan Type List should be refreshed and new set of plan type should be listed for the new line of coverage selected. | Note: The Screen should not be refreshed when choosing different Line of Coverage. Line of Coverage is required |
| 3. | Plan Type | Should list various types of Plan Type from the database. Plan Type should be Listed alphabetically On choosing the Plan Type Corresponding Benefit Level Should be listed. On choosing different Plan Type the Benefit Level List should be refreshed and new set of Benefit Level should be listed of the new Plan Type selected. | Note: The Screen should not be refreshed when choosing different Plan Type. Plan Type is required |
| 4. | Carrier Name | Should be entered | Carrier Name is required |
| 5. | Plan Name | Should be entered | Plan Name is required |
| 6. | Add | Should function with Enter Key Cursor Positioned on the "ADD" button or Mouse Click. Check if alternate Benefit Level name is valid. If not throw error message. Check if there is no duplicate entry for the Combination of Line of Coverage, Plan Type and Benefit level selected. If Duplicate Show Error Message Check if there is blank field if so throw error message Success: The items selected with the benefit level name are added to the HTML table below (temporary) | Error Dialog Box Text: "The name entered for alternate Benefit Level Name is incorrect. Please enter the correct name." "The is no name entered for Benefit Level Name. Please enter the name." Error Dialog Box Text: "The Benefit Level Name for the combination of Line of Coverage, Plan type and Benefit Level is already entered. Please select other combination." |
| 7. | Table | Should have column header and each subsequent row should be identified by alternate color combinations. i.e. First row should have color 'x' and the next row should have color 'y'.The next row should have color 'x' again and so on. The size of any text | |

-continued

| # | Element Name | Action/Validation Details | Message |
|---|---|---|---|
| | | inside any cell should be wrapped if the text becomes too long. | |
| 8. | Delete | Should function with Enter Key Cursor Positioned on the "Delete" button or on Mouse Click. Delete Button should work on multiple deletes based on the check box or boxes selected. If the user clicks on the delete button without checking any of the delete check box should throw error message. Success: Deletes the row or rows from the HTML table(temporary storage) | Error Message: "Please choose the row or rows to be deleted." |
| 9. | Check All | On clicking the "Check All" Link all the rows with the check box option are checked. | On clicking the "Check All"Link all the rows with the check box option are checked. |
| 10. | Clear All | On clicking the "Clear All" Link all the rows with the check box option checked are unchecked. | On clicking the "Clear All" Link all the rows with the check box option checked are unchecked. |
| 11. | Delete | Check box option with default "unchecked" | |
| 12. | Edit | Should function with Enter Key Cursor Positioned on the "Edit" button or on Mouse Click. On clicking the edit button the row edited should be removed from the table and the data should be populated back on the editable entry field. | Note: All edits that are done on the data from the repository or database, history of the changes made must be available. |
| 13. | SAVE | Should function with Enter Key Cursor Positioned on the "SAVE" button or on Mouse Click. Validation Check: Check if there is any data entered in the alternate Benefit Level Name field. If yes show a dialog box with message "Would you like to Add the Alternate Benefit Level name before saving" Yes/No. If yes allow the user to add the data. If no save the data without adding the Alternate Benefit Level Name to the HTML Table. On saving the data the data gets saved to the database. Success: On Successful saving the flow should be automatically be navigated back to the previous screen. (BPI_CAS_SCR_CM_001_001) | System Error: Common Text shall be followed for the System Error. Dialog box : "Would you like to Add the Alternate Benefit Level name before saving" Yes/ No. |

-continued

| # | Element Name | Action/Validation Details | Message |
|---|---|---|---|
| 14. | Cancel | Cancel Button should clear all the content filled on the entry fields. | |

3.1.4. User Interface ID: Search Carrier Master 3.1.4.1. Screen Name: Search Carrier Master (BPI_CAS_SCR_CM__001__003)

(See FIG. H-4)

3.1.4.2. Element Name, Element Type, Label & Purpose 3.1.4.3. Front End Validations Validation Details This section provides the front-end screen validations along with the associated message—Success/Error Message text

| # | Element Name | Action/Validation Details | Message |
|---|---|---|---|
| 1. | Carrier name | Default option on the list is -- Choose One -- Lists all the active carrier in alphabetical order | |
| 2. | View | Should function with Enter Key Cursor Positioned on the "View" button or on Mouse Click. On clicking the View Button if no Carrier name is selected then throw an error message. Else Success should navigate to the view page BPI_CAS_SCR_CM_001_006 with the data pertaining to the carrier selected. | Error Dialog Box Text: "Please choose a carrier to view information" |
| 3. | Edit | Should function with Enter Key Cursor Positioned on the "Edit" button or on Mouse Click. On clicking the Edit Button if no Carrier name is choose then throw an error message. Else Success should navigate to the Edit pages BPI_CAS_SCR_CM_001_004 with the data pertaining to the carrier selected. | Error Dialog Box Text: "Please choose a carrier to Edit information" |

3.1.5. User Interface ID: Modify Carrier Master 3.1.5.1. Screen Name: Modify Carrier Master (BPI_CAS_SCR_CM__001__004)

(See FIG. H-5)

3.1.5.2. Element Name, Element Type, Label & Purpose

| Element Name | Element Type | Label | Purpose |
|---|---|---|---|
| Main Header Edit Carrier Master | Text | Main Header Edit Carrier Master | To give the heading for the screen being navigated |
| Sub Header Carrier General Information | Text | Sub Header Carrier General Information | Provide Content Area Text |
| Sub Header Address | Text | Sub Header Address | Text for the Company Address |
| Company Name | Text | Company Name | Text for the entry field |

-continued

| Element Name | Element Type | Label | Purpose |
|---|---|---|---|
| Company Name (Entry Field) | Entry Field | Company Name (Entry Field) | Entry Field for Company name with data filled and editable |
| Address | Text | Address | Text for the Address |
| Address (Entry Field) | Entry Field | Address (Entry Field) | Entry Field for Address with data filled and editable |
| Suite/Apt # | Text | Suite/Apt # | Text for Suite # |
| Suite/Apt # (Entry Field) | Entry Field | Suite/Apt # (Entry Field) | Entry Field for Suite/Apt # with data filled and editable |
| City | Text | City | Text for City |
| City (Entry Field) | Entry Field | City (Entry Field) | Entry Field for City with data filled and editable |
| State | Text | State | Text for state |
| State (Entry Field) | Entry Field | State (Entry Field) | Entry Field for State with data filled and editable |
| ZIP | Text | ZIP | Text for ZIP |
| ZIP (Entry Field) | Entry Field | ZIP (Entry Field) | Entry Field for ZIP with data filled and editable |
| Sub Header Contact Department | Text | Sub Header Contact Department | Text for the sub heading |
| Department | Drop Down List | Department | List all the departments for the carrier for contact information |
| Contact Name | Text | Contact Name | Text for Contact name |
| Salutation | Text | Salutation | Text for salutation |
| First Name | Text | First Name | Text for First name |
| Middle name | Text | Middle name | Text for middle name |
| Last name | Text | Last name | Text for last name |
| Suffix | Text | Suffix | Text for suffix |
| Title | Text | Title | Text for title |
| Salutation | Entry Field | Salutation | Entry Field for salutation |
| First Name | Entry Field | First Name | Entry field for first name |
| Middle name | Entry Field | Middle name | Entry field for middle name |
| Last name | Entry Field | Last name | Entry field for last name |
| Suffix | Entry Field | Suffix | Entry Field for suffix |
| Title | Entry Field | Title | Entry Field for title |
| Address | Text | Address | Text for the Address |
| Address (Entry Field) | Entry Field | Address (Entry Field) | Entry Field for Address |
| Suite/Apt # | Text | Suite/Apt # | Text for Suite # |
| Suite/Apt # (Entry Field) | Entry Field | Suite/Apt # (Entry Field) | Entry Field for Suite/Apt # |
| City | Text | City | Text for City |
| City (Entry Field) | Entry Field | City (Entry Field) | Entry Field for City |
| State | Text | State | Text for state |
| State (Entry Field) | Entry Field | State (Entry Field) | Entry Field for State |
| ZIP | Text | ZIP | Text for ZIP |
| ZIP (Entry Field) | Entry Field | ZIP (Entry Field) | Entry Field for ZIP |
| Mode of Communication | Drop Down List | Mode of Communication | List various modes of contact preferred |
| Phone | Text | Phone | Text for phone |
| FAX | Text | FAX | Text for FAX |
| Email | Text | Email | Text for email |
| Phone | Entry Field | Phone | Entry Field for Phone number |
| Email | Entry Field | Email | Entry field for email address |
| FAX | Entry Field | FAX | Entry field for FAX |
| ADD | Button (HTML Submit button) | ADD | To add the above details on to the HTML table below |
| Table | HTML Table | Table | Table for adding up the contact information. The table also contains all the contact information already available in a multiple rows. |
| Delete | Button (HTML Button) | Delete | To delete the contact information. |
| Check All | Text Link | Check All | To check all the check boxes in the table |
| Clear All | Text Link | Clear All | To un check all the check boxes checked in the table |
| Delete | Check box | Delete | To check the items for deletion |

-continued

| Element Name | Element Type | Label | Purpose |
|---|---|---|---|
| Edit | Button (HTML Button) | Edit | To edit the contact information against the row selected for edition |
| Department Name | Text | Department Name | Shows the name of the department added. For example finance, marketing etc. |
| Last Name | Text | Last Name | Last Name of the contact person |
| Phone | Text | Phone | Phone of the contact person |
| Email | Text | Email | Email address of the contact person |
| FAX | Text | FAX | Fax of the contact person |
| SAVE | Button (HTML Submit button) | SAVE | Save all the above information to the repository |
| CANCEL | Button (HTML Reset button) | CANCEL | Cancels the current operations and sets to the value as before saving |
| EDIT CARRIER OFFERED PLAN | Button (HTML Submit button) | EDIT CARRIER OFFERED PLAN | Navigates to the next screen without saving the data.The purpose is if the editing needs to be done for the next screen (BPI_SCREEN_005) |
| New | Button (HTML button) | New | To create a new page as first time. |

3.1.6. User Interface ID: Modify Carrier Product
3.1.6.1. Screen Name: Modify Carrier Product (BPI_CAS_SCR_CM__001__005)
(See FIG. H-6)
3.1.6.2. Element Name, Element Type, Label & Purpose
3.1.6.3. Front End Validations
Validation Details
This section provides the front-end screen validations along with the associated message—Success/Error Message text

| # | Element Name | Action/Validation Details | Message |
|---|---|---|---|
| 1. | Carrier name | This name should be brought from the previous screen BPI_CAS_SCR_CM_001_004. | |
| 2. | Line of Coverage | Should list various types of Line of Coverage from the database. Default Line of Coverage should be — Choose One — Subsequent line of coverage should be listed alphabetically. On choosing the line of coverage corresponding Plan Type should be listed. On choosing different Line of Coverage the Plan Type List should be refreshed and new set of plan type should be listed for the new line of coverage selected. | Note: The Screen should not be refreshed when choosing different line of coverage. |
| 3. | Plan Type | Should list various types of Plan Type from the database. Plan Type should be Listed alphabetically On choosing the Plan Type Corresponding Benefit Level Should be listed. On choosing different Plan Type the Benefit Level List should be refreshed and new set of Benefit Level should be listed of the new Plan Type selected. | Note: The Screen should not be refreshed when choosing different Plan Type. |
| 4. | Benefit Level | Should list various types of Benefit Level from the database. Benefit Level should be listed alphabetically. | |
| 5. | Benefit Level Name | The field is used for filling Benefit Level Name | |

-continued

| # | Element Name | Action/Validation Details | Message |
|---|---|---|---|
| 6. | Alternate name | The field is used for entering Alternate Benefit Level Name | Error Dialog Box Text: "The value entered for Alternate Benefit Level Name is incorrect. Please enter the correct value." |
| 7. | Add | Should function with Enter Key Cursor Positioned on the "ADD" button or Mouse Click. Check if Alternate Benefit Level name is valid. If not throw error message. Check if there is no duplicate entry for the Combination of Line of Coverage, Plan Type and Benefit level selected. If Duplicate Show Error Message Success: The items selected with the benefit level name are added to the HTML table below (temporary) | Error Dialog Box Text: "The value entered for Benefit Level Name is incorrect. Please enter the correct value." Embedded Error Message: Show this message on space above the HTML table with RED color. "The Benefit Level Name for the combination of Line of Coverage, Plan type and Benefit Level is already available. Please select other benefit level." |
| 8. | Table | Should have column header and each subsequent row should be identified by alternate color combinations. i.e. First row should have color 'x' and the next row should have color 'y'. The next row should have color 'x' again and so on. The size of any text inside any cell should be wrapped if the text becomes too long. | |
| 9. | Delete | Check box option with default "unchecked" | |
| 10. | Delete | Should function with Enter Key Cursor Positioned on the "Delete" button or on Mouse Click. Delete Button should work on multiple deletes based on the check box or boxes selected. If the user clicks on the delete button without checking any of the delete check box should throw error message. Note: the delete action should only delete the single or multiple rows selected from the view inside the table. However the data must not be deleted from the database on saving. It should only inactivate the benefit level name/names selected for deletion. | Error Message: "Please choose the row or rows to be deleted." |
| 11. | Edit | Should function with Enter Key Cursor Positioned on the "Edit" button or on Mouse Click. On clicking the edit button the row edited should be removed from the table and the data should be populated back on the editable entry field. | Repository Data should be green in color and the Temporary data should be red in color. |
| 12. | SAVE | Should function with Enter Key Cursor Positioned on the "SAVE" button or on Mouse Click. Validation Check: Check if there is any data entered in the Alternate Name field. If yes show a dialog box with message "Would you like to Add Alternate Benefit Level name before saving" Yes/No. If yes allow the user to add the data. If no save the data without adding the Benefit Level Name to the HTML Table. On saving the data the data gets saved to the database. | System Error: Common Text shall be followed for the System Error. Dialog box: "Would you like to Add the Alternate Benefit Level name before saving" Yes/No. Note: For all the changes made history of changes should be available for viewing via reports for the specific modules. |

-continued

| # | Element Name | Action/Validation Details | Message |
|---|---|---|---|
| | | Success:<br>On Successful saving the flow should be automatically be navigated back to the Search Screen. (BPI_CAS_SCR_CM_001_003)<br>Note: Data must not be deleted from the database on saving. It should only inactivate the benefit level name/names selected for deletion. | |
| 13. | Cancel | To cancel the previous operation. | |

3.1.7. User Interface ID: View Carrier Master 3.1.7.1. Screen Name: View Carrier Master (BPI_CAS_SCR_CM__001__006)

(See FIG. H-7)

3.1.7.2. Element Name, Element Type, Label & Purpose

| Element Name | Element Type | Label | Purpose |
|---|---|---|---|
| Main Header View Carrier Master | Text | Main Header View Carrier Master | To give the heading for the screen being navigated |
| Sub Header carrier general Information | Text | Sub Header carrier general Information | Name for the sub header |
| Carrier name | Dynamic Text | Carrier name | Name of the carrier being viewed |
| Sub Header Address | Text | Sub Header Address | Name of the sub header |
| Company Name | Text | Company Name | Text for the entry field |
| Company Name | Text | Company Name | Text for Company name with data filled |
| Address | Text | Address | Text for the Address |
| Address | Entry Field | Address | Text for Address with data filled |
| Suite/Apt # | Text | Suite/Apt # | Text for Suite # |
| Suite/Apt # | Text | Suite/Apt # | Text for Suite/Apt # with data filled |
| City | Text | City | Text for City |
| City | Text | City | Text for City with data filled |
| State | Text | State | Text for state |
| State | Text | State | Text for State with data filled |
| ZIP | Text | ZIP | Text for ZIP |
| ZIP | Text | ZIP | Text for ZIP with data filled |
| Table | HTML Table | Table | Table for populating the contact details |
| Department Name | Text | Department Name | Shows the name of the department added. For example finance, marketing etc. |
| Name | Text | Name | Name of the contact person |
| Phone | Text | Phone | Phone of the contact person |
| Email | Text | Email | Email address of the contact person |
| FAX | Text | FAX | Fax of the contact person |
| Back | HTML Button | Back | Submit Button to navigate back to the start screen |
| Delete | HTML Button | Delete | Button to delete the particular record currently viewed. |

3.1.7.3. Front End Validations

None.

3.1.8. User Interface ID: Search Product 3.1.8.1. Screen Name: Search Product (BPI_CAS_SCR_CM__001__007)

(See FIG. H-8)

3.1.8.2. Element Name, Element Type, Label & Purpose

| Element Name | Element Type | Label | Purpose |
|---|---|---|---|
| Search Product | Text | Search Product | To give the heading for the screen being navigated |
| Plan name | Text | Plan name | Title for carrier name |
| Plan name | Drop Down List | Plan name | List all the active carrier names available in the system |
| View | HTML Button | View | Button to view the carrier name selected |
| Edit | HTML Button | Edit | Button to edit the carrier name selected |

3.1.8.3. Front End Validations

Validation Details

This section provides the front-end screen validations along with the associated message—Success/Error Message text

| # | Element Name | Action/Validation Details | Message |
|---|---|---|---|
| 1. | Carrier name | Default option on the list is — Choose One —<br>Lists all the active carrier in alphabetical order | |
| 2. | View | Should function with Enter Key Cursor Positioned on the "View" button or on Mouse Click.<br>On clicking the View Button if no Carrier name is selected then throw an error message.<br>Else Success should navigate to the view page BPI_CAS_SCR_CM_001_006 with the data pertaining to the carrier selected. | Error Dialog Box Text: "Please choose a carrier to view information" |
| 3. | Edit | Should function with Enter Key Cursor Positioned on the "Edit" button or on Mouse Click.<br>On clicking the Edit Button if no Carrier name is choose then throw an error message.<br>Else Success should navigate to the Edit pages BPI_CAS_SCR_CM_001_004 with the data pertaining to the carrier selected. | Error Dialog Box Text: "Please choose a carrier to Edit information" |

3.1.9. User Interface ID: View Product Info 3.1.9.1. Screen Name: View Product Info (BPI_CAS_SCR_CM__001__008)

(See FIG. H-9)

3.1.9.2. Element Name, Element Type, Label & Purpose

| Element Name | Element Type | Label | Purpose |
|---|---|---|---|
| Main Header Carrier Product Info | Text | Main Header Carrier Product Info | To give the heading for the screen being navigated |
| Sub Header Plan Info | Text | Sub Header Plan Info | Name for the sub header |
| Plan Id | Text | Plan Id | Provide Text |
| Plan Id | Dynamic Text | Plan Id | Name of the Plan Id being viewed |
| Plan Name | Text | Plan Name | Provide Text |
| Plan Name | Dynamic Text | Plan Name | Name of the Plan Name being viewed |
| Carrier Name | Text | Carrier Name | Provide Text |
| Carrier Name | Dynamic Text | Carrier Name | Name of the Carrier Name being viewed |
| Line Of Coverage | Text | Line Of Coverage | Provide Text |
| Line Of Coverage | Dynamic Text | Line Of Coverage | Name of the Line Of Coverage Name being viewed |
| Plan Type | Text | Plan Type | Provide Text |
| Plan Type | Dynamic Text | Plan Type | Name of the Plan Type being viewed |
| Carrier name | Dynamic Text | Carrier name | Name of the carrier being viewed |
| Sub Header Address | Text | Sub Header Address | Name of the sub header |
| Table | HTML Table | Table | Table for populating the plan offered |
| Benefit level name | Text | Benefit level name | For showing the benefit level name |
| Product Name | Text | Product Name | For showing the Product name |
| Delete | HTML Button | Delete | Button to delete the particular record currently viewed. |
| Back | HTML Button | Back | To Navigate to Search Screen |

3.1.9.3. Front End Validations

None.

3.1.10. Screen Flow (See FIG. H-10)

Benefit Partners Inc

Process Specification

BPI_CAS_FSD_CM__02

1. Introduction 1.1. Purpose

This purpose of this document is to identify the process associated with the business use case Create Plan. This document is the amendment of BPI_CAS_FSD_CM__02 (Version 1.0).

1.2. Business Use Case Specification Reference

| Business Use Specification ID | Business Use Case Name |
|---|---|
| BPI_SCOPE_CM_002 | Create M Plan |

1.3. Definitions, Acronyms & Abbreviations

| Term | Explanation |
|---|---|

2. Process Identification 2.1. Background

This process identifies the functionality for creation of Line of Coverage, Plan Type and Benefit Level.

This process is used to create various Line of Coverage, Plan type and benefit level offered by PacAdvantage. Line of coverage includes the coverage offered by PacAdvantage e.g. Medical, Dental, Vision, Chiropractic, Voluntary Medical etc. These classify broad range of all the line of coverage offered.

Plan type includes plan type for specific line of coverage e.g. PPO, HMO, PSO etc.

Benefit Level specifies the specific benefit level offered for the line of coverage and plan type e.g. Standard, Preferred, preferred plus etc.

2.2. Process Description & Flow 2.2.1. Create Line of Coverage

1. Input Line of Coverage name
2. Validate Line of Coverage name
3. If yes add the information to a temporary storage.
4. If not re enter the information correctly and add again.
5. Edit or delete Line of Coverage name
6. If erroneous re enter the correct data.
7. If Correct then save the data to the repository
8. System auto generates a unique identification number for Line of Coverage Refer Process Flow Diagram 2.2.2. Create Plan Type 1. Input Plan Type name
2. Validate Plan Type name
3. If yes add the information to a temporary storage.
4. If not re enter the information correctly and add again.
5. Edit or delete Plan Type name
6. If erroneous re enter the correct data.
7. If Correct then save the data to the repository
8. System auto generates a unique identification number for Plan Type Refer Process Flow Diagram 2.2.3. Create Benefit Level 1. Input Benefit Level name
2. Validate Benefit Level name
3. If yes add the information to a temporary storage.
4. If not re enter the information correctly and add again.
5. Edit or delete Benefit Level name
6. If erroneous re enter the correct data.
7. If Correct then save the data to the repository
8. System auto generates a unique identification number for Benefit Level Refer Process Flow Diagram 2.2.4. Process Flow Diagrams (See FIG. H-11)

3. User Interface 3.1. User Interface Screens 3.1.1. Screen ID's

| Screen ID (SID) | Screen Name | Corresponding HTML File Name |
|---|---|---|
| plan.loc | Line of Coverage | /bpi/cas/carrier/mplan/LineOfCoverage.jsp |
| plan.plan | Plan Type | /bpi/cas/carrier/mplan/PlanType.jsp |
| plan.ben | Benefit Level | /bpi/cas/carrier/mplan/BenefitLevel.jsp |

3.1.2. User Interface ID: Create Line of Coverage 3.1.2.1. Screen Name: Create Line of Coverage (BPI_CAS_SCR_CM__002__001) (See FIG. H-12)

3.1.2.2. Element Name, Element Type, Label & Purpose

| Element Name | Element Type | Label | Purpose |
|---|---|---|---|
| Main Header Line of coverage | Text | Main Header Line of coverage | To give the heading for the screen being navigated |
| Line of Coverage | Text | Line of Coverage | Provide text |
| Loc Name | Entry Field | Loc Name | Entering line of coverage |
| Add | HTML Button | Add | Button for adding the Line of coverage to the table below |
| Table | HTML table | Table | For adding and displaying all the names of the Line of Coverage |
| Delete | Button (HTML Button) | Delete | To delete the line of Coverage checked |
| Check All | Text Link | Check All | To check all the check boxes in the table |
| Clear All | Text Link | Clear All | To un check all the check boxes checked in the table |
| Delete | Check box | Delete | To check the items for deletion |
| Edit | Button (HTML Button) | Edit | To edit the Line of coverage against the row selected for edition |
| Save | Button (HTML Submit button) | Save | Save all the above information to the repository |
| Cancel | Button (HTML reset button) | Cancel | To reset the entries made in all the fields |

3.1.2.3. Front End Validations

Validation Details

This section provides the front-end screen validations along with the associated message—

| # | Element Name | Action/Validation Details | Message |
|---|---|---|---|
| 1. | Line of coverage Entry | This field is used for entering the line of coverage. The Line of coverage should be alphanumeric only. The special character permitted is only space bar between the two words. And can have max length 20. Blank line of coverage not allowed | "Line of Coverage - Is required." "Line of Coverage - Accepts alphanumeric values only" |
| 2. | Add | On Clicking add button or pressing enter key field with the cursor position on the Add button, The data gets added to the table. Validation checks are done to not allow null value on the entry field and the entry field should have only alphanumeric values. Duplicate name for the line of coverage should not be allowed. | On click of Add button checks for the above mentioned validations + "Line of Coverage - Already exists." (Occurs on duplicate record entry) |
| 3. | Table | Should have column header and each subsequent row should be identified by alternate color combinations. i.e. First row should have color 'x' and the next row should have color 'y'. The next row should have color 'x' again and so on. The size of any text inside any cell should be wrapped if the text becomes too long. | |
| 4. | Delete | Should function with Enter Key Cursor Positioned on the "Delete" button or on Mouse Click. Delete Button should work on multiple deletes based on the check box or boxes selected. If the user clicks on the delete button without checking any of the delete check box should throw error message. Success: Deletes the row or rows from the table (temporary storage) | "! Select record(s) for deletion" (If the operation is in Edit Mode & delete operation is invoked) |
| 5. | Check All | On clicking the "Check All" link should check all the check boxes in the HTML table. | |
| 6. | Clear All | On clicking the "Clear All" link should uncheck all the checked check boxes in the HTML table. | |
| 7. | Delete | Check box option with default "unchecked" | Delete Check box is disabled and grayed out if the data in the corresponding row/ |

-continued

| # | Element Name | Action/Validation Details | Message |
|---|---|---|---|
| | | | rows has child parent relationship. (I.e. it has reference somewhere else in the database.) |
| 8. | Edit | Should function with Enter Key Cursor Positioned on the "Edit" button or on Mouse Click. On clicking the edit button the row edited should be disabled and the data should be populated back on the editable entry field. Note: All data that are from the repository should be in green color. The data that is added and not saved should be in red. The data selected for editing should be displayed in gray. The "Add" button will be changed to "Update" button. | "! Complete the update process" (If the operation is already in Edit Mode & another Edit operation is invoked) |
| 9. | Save | Should function with Enter Key Cursor Positioned on the "SAVE" button or on Mouse Click. On saving the data the data gets saved to the database. Check if there is data populated for editing. If yes show a dialog box with message "Complete update Process." | For general script validations for common functionality refer BPI_CAS_FSD_COMMON System Error: Common Text shall be followed for the System Error. "! Do any operation to save." (Displayed when invoked immediately after the screen is loaded). "! Complete the update process" (Displayed when Save is invoked in Edit Mode). |
| 10. | Cancel | Should reset all the entries to previous status before saving. i.e. the fields should be blank. If any of the data has been selected for editing, the same data should appear when cancel button is clicked. | |

3.1.3. User Interface ID: Create Plan Type 3.1.3.1. Screen Name: Create Plan Type (BPI_CAS_SCR_CM__002__002) (See FIG. H-13)

3.1.3.2. Element Name, Element Type, Label & Purpose

| Element Name | Element Type | Label | Purpose |
|---|---|---|---|
| Main Header Plan Type | Text | Main Header Plan Type | To give the heading for the screen being navigated |
| Plan Type | Text | Plan Type | Provide text |
| Plan type Entry | Entry Field | Plan type Entry | Entering Plan type |
| Add | HTML Button | Add | Button for adding the Plan Type to the table below |
| Table | HTML table | Table | For adding and displaying all the names of the Plan Type |
| Delete | Button (HTML Button) | Delete | To delete the Plan Type checked |
| Check All | Text Link | Check All | To check all the check boxes in the table |
| Clear All | Text Link | Clear All | To un check all the check boxes checked in the table |
| Delete | Check box | Delete | To check the items for deletion |

-continued

| Element Name | Element Type | Label | Purpose |
|---|---|---|---|
| Edit | Button (HTML Button) | Edit | To edit the Plan Type against the row selected for edition |
| SAVE | Button (HTML Submit button) | SAVE | Save all the above information to the repository |
| CANCEL | Button (HTML reset button) | CANCEL | To reset the entries made in all the fields |

3.1.3.3. Front End Validations

Validation Details

This section provides the front-end screen validations along with the associated message—Success/Error Message text

| # | Element Name | Action/Validation Details | Message |
|---|---|---|---|
| 1. | Plan type Entry | This field is used for entering the Plan Type. The Plan Type should be alphanumeric only. The special character permitted is only space bar between the two words. And can have max length 255. Blank line of coverage not allowed | Error Dialog Box: "Plan Name - Is required" "Plan Name - Accepts alphanumeric values only" |
| 2. | Add | On Clicking add button or pressing enter key field with the cursor position on the button, The data gets added to the table. Validation checks are done to not allow null value on the entry field and the entry field should have only alphanumeric values. | Error Dialog Box: On click of Add button checks for the above mentioned validations + "Plan Name - already exists." (Occurs on duplicate record entry) |
| 3. | Table | Should have column header and each subsequent row should be identified by alternate color combinations. i.e. First row should have color 'x' and the next row should have color 'y'. The next row should have color 'x' again and so on. The size of any text inside any cell should be wrapped if the text becomes too long. | |
| 4. | Delete | Should function with Enter Key Cursor Positioned on the "Delete" button or on Mouse Click. Delete Button should work on multiple deletes based on the check box or boxes selected. If the user clicks on the delete button without checking any of the delete check box should throw error message. Success: Deletes the row or rows from the table temporarily. | Error Dialog Box: "! Select record(s) for deletion" "! Complete the update process" (If the operation is in Edit Mode & delete operation is invoked) |
| 5. | Check All | On clicking the "Check All" link should check all the check boxes in the HTML table. | |
| 6. | Clear All | On clicking the "Clear All" link should uncheck all the checked check boxes in the HTML table. | |
| 7. | Delete | Check box option with default "unchecked" | Delete Check box is disabled and grayed out if the data in the corresponding row/rows has child parent relationship. (I.e. it has reference somewhere else in the database.) |
| 8. | Edit | Should function with Enter Key Cursor Positioned on the "Edit" button or on Mouse Click. On clicking the edit button the row edited should be disabled in the table and the data should be populated back on the editable entry field. Note: All the data inside the table that are available from the repository should be green in color text. The temporary data should be red in color text. The data selected for editing should be displayed in gray. The "Add" button will be changed to "Update" button. | "! Complete the update process" (If the operation is already in Edit Mode & another Edit operation is invoked) |
| 9. | Save | Should function with Enter Key Cursor Positioned on the "SAVE" button or on Mouse Click. On saving the data the data gets saved to the database. Check if there is data populated for editing. If yes show a dialog box with message "Complete update Process." | For general script validations for common functionality refer BPI_CAS_FSD_COMMON System Error: Common Text shall be followed for the System Error. "! Do any operation to save." (Displayed when invoked immediately after the |

-continued

| # | Element Name | Action/Validation Details | Message |
|---|---|---|---|
| | | | screen is loaded). "! Complete the update process." (Displayed when Save is invoked in Edit Mode). |
| 10. | Cancel | Should reset to the previous status on clicking the cancel button. i.e. make all the entry field blank. If any of the data has been selected for editing, the same data should appear when cancel button is clicked. | |

3.1.4. User Interface ID: Create Benefit Level 3.1.4.1. Screen Name: Create Benefit Level (BPI_CAS_SCR_CM__002__003) (See FIG. H-14)

3.1.4.2. Element Name, Element Type, Label & Purpose

| Element Name | Element Type | Label | Purpose |
|---|---|---|---|
| Main Header Benefit Level | Text | Main Header Benefit Level | To give the heading for the screen being navigated |
| Benefit Level Name | Text | Benefit Level Name | Provide text |
| Benefit Level Name Entry | Entry Field | Benefit Level Name Entry | Entering the benefit level name |
| Add | HTML Button | Add | Button for adding the Benefit Level to the table below |
| Table | HTML table | Table | For adding and displaying all the names of the Benefit Level |
| Delete | Button (HTML Button) | Delete | To delete the Benefit Level checked |

-continued

| Element Name | Element Type | Label | Purpose |
|---|---|---|---|
| Check All | Text Link | Check All | To check all the check boxes in the table |
| Clear All | Text Link | Clear All | To un check all the check boxes checked in the table |
| Delete | Check box | Delete | To check the items for deletion |
| Edit | Button (HTML Button) | Edit | To edit the Benefit Level against the row selected for edition |
| Save | Button (HTML Submit button) | Save | Save all the above information to the repository |
| Cancel | Button (HTML reset button) | Cancel | To reset the entries made in all the fields |

3.1.4.3. Front End Validations

Validation Details

This section provides the front-end screen validations along with the associated message—Success/Error Message text

| # | Element Name | Action/Validation Details | Message |
|---|---|---|---|
| 1. | Benefit Level | This field is used for entering the Benefit Level. The Benefit Level should be alphanumeric only. The special character permitted is only space bar between the two words. And can have max length 255. Blank line of coverage not allowed | Error Dialog Box: "Benefit Level - Is required" "Benefit Level - Accepts alphanumeric values only" |
| 2. | Add | On Clicking add button or pressing enter key field with the cursor position on the button, The data gets added to the table. Validation checks are done to not allow null value on the entry field and the entry field should have only alpha values. Should check for duplicate entries | Error Dialog Box: On click of Add button checks for the above mentioned validations + "Benefit Level - already exists." (Occurs on duplicate record entry) |
| 3. | Table | Should have column header and each subsequent row should be identified by alternate color combinations. i.e. First row should have color 'x' and the next row should have color 'y'. The next row should have color 'x' again and so on. The size of any text inside any cell should be wrapped if the text becomes too long. | |
| 4. | Delete | Should function with Enter Key Cursor Positioned on the "Delete" button or on Mouse Click. | Error Dialog Box: "! Select the record(s) for deletion" "! Complete the update process" |

-continued

| # | Element Name | Action/Validation Details | Message |
|---|---|---|---|
| | | Delete Button should work on multiple deletes based on the check box or boxes selected. If the user clicks on the delete button without checking any of the delete check box should throw error message. | (If the operation is in Edit Mode & delete operation is invoked) |
| 5. | Check All | On clicking the "Check All" link should check all the check boxes in the HTML table. | |
| 6. | Clear All | On clicking the "Clear All" link should uncheck all the checked check boxes in the HTML table. | |
| 7. | Delete | Check box option with default "unchecked" | Delete Check box is disabled and grayed out if the data in the corresponding row/rows has child parent relationship. (I.e. it has reference somewhere else in the database.) |
| 8. | Edit | Should function with Enter Key Cursor Positioned on the "Edit" button or on Mouse Click.<br>On clicking the edit button the row edited should be removed from the table and the data should be populated back on the editable entry field.<br>If the data is from the repository show it in green color text. If it is temporary data just added show it in red color text. The data selected for editing should be displayed in gray. The "Add" button will be changed to "Update" button. | "! Complete the update process" (If the operation is already in Edit Mode & another Edit operation is invoked) |
| 9. | Save | Should function with Enter Key Cursor Positioned on the "Save" button or on Mouse Click. On saving the data the data gets saved to the database.<br>Check if there is data populated for editing. If yes show a dialog box with message "Complete update Process." | For general script validations for common functionality refer BPI_CAS_FSD_COMMON<br>SystemError:<br>Common Text shall be followed for the System Error.<br>"! Do any operation to save." (Displayed when invoked immediately after the screen is loaded).<br>"! Complete the update process." (Displayed when Save is invoked in Edit Mode). |
| 10. | Cancel | Should reset to the previous status on clicking the cancel button. If any of the data has been selected for editing, the same data should appear when cancel button is clicked. | |

3.1.5. Screen Flow

The flow of the process is as described below. (See FIG. H-15)

Benefit Partners Inc

Process Specification

BPI_CAS_FSD_CM__03

1. Introduction 1.1. Purpose

This purpose of this document is to identify the process associated with the business use case Create Rate Master. This document is the amendment of BPI_CAS_FSD_CM__03 (Version 1.1).

1.2. Business Use Case Specification Reference

| Business Use Specification ID | Business Use Case Name |
|---|---|
| BPI_SCOPE_CM_003 | Create Rate Master |

1.3. Definitions, Acronyms & Abbreviations

| Term | Explanation |
|---|---|

2. Process Identification 2.1. Background

This process describes the Use Case "Rate Master".

Rate Master is used to upload all the rates for the products (Benefits) provided by individual health insurance provider (Carrier). The individual rate files are provided by PacAdvantage with the rate for all the products offered by all the carriers in a specific file format. This Process for loading the rates would be covered in the Document Reference No: BPI_CAS-_FSD_EC The rates are normally classified as blended rates and raw rates.

Raw rates would include only the premium rates for the products offered.

Blended rate would include the sum total of the entire raw rate, admin fees, agent commission additional fees and Differential Fees. The rate classification would define the formula for calculating the blended rate for the product under offering. Using the administrative screens the classification of rates for arriving to these calculations is provided.

Admin Fees Further Admin fees can be of two types % of the premium or a fixed flat $ amount.

Agent Commission Agent commission can be a % of premium or a flat $ amount per member or a flat $ amount per group size.

Additional Fees Additional Fees can be a % premium or flat $ amount for the carrier.

Differential Fees The amount type for Differential Rate should include Flat $ amount as Flat $ amount per member and also Flat $ amount per Group. When the Flat $ amount is per group it should be able to specify group size.

The state is divided into several service areas based on the number of counties and their population. In the state of California there are presently 6 service areas. The Rate is based on the service area where the employees are residing. Also there are cases when the ZIP code has two or more Service Areas. Under these conditions the ZIP code should be attached to those services areas from where the rates are to be picked.

2.2. Process Description & Flow 2.2.1. Admin Fee

The flow of the process is as described below.

1. Input the rate type information.
2. Validate if the rate type information has the right data type.
3. If Correct then save the data to the repository.
4. Search admin fee records.
5. Select a record in modify mode
6. Edit the rate type information.
7. Validate if the rate type information has the right data type.
8. If Correct then save the data to the repository.
9. Search admin fee records.
10. Select a record in view/delete mode
11. View the selected admin fee
12. Delete the selected admin fee from the repository.

Refer Process Flow Diagram FIG. 1.

2.2.2. Agent Fee

The flow of the process is as described below.

1. Input the rate type information.
2. Validate if the rate type information has the right data type.
3. If Correct then save the data to the repository.
4. Search agent fee records.
5. Select a record in modify mode
6. Edit the rate type information.
7. Validate if the rate type information has the right data type.
8. If Correct then save the data to the repository.
9. Search agent fee records.
10. Select a record in view/delete mode
11. View the selected agent fee.
12. Delete the selected agent fee from the repository.

Refer Process Flow Diagram FIG. 2.

2.2.3. Additional Fee

The flow of the process is as described below.

1. Input the rate type information.
2. Validate if the rate type information has the right data type.
3. If Correct then save the data to the repository.
4. Search additional fee records.
5. Select a record in modify mode
6. Edit the rate type information.
7. Validate if the rate type information has the right data type.
8. If Correct then save the data to the repository.
9. Search additional fee records.
10. Select a record in view/delete mode
11. View the selected additional fee.
12. Delete the selected additional fee from the repository.

Refer Process Flow Diagram FIG. 3.

2.2.4. Rate Differential

The flow of the process is as described below.

1. Input the rate type information.
2. Validate if the rate type information has the right data type.
3. If Correct then save the data to the repository.
4. Search rate differential records.
5. Select a record in modify mode
6. Edit the rate type information.
7. Validate if the rate type information has the right data type.
8. If Correct then save the data to the repository.
9. Search rate differential records.
10. Select a record in view/delete mode
11. View the selected rate differential.
12. Delete the selected rate differential from the repository.

Refer Process Flow Diagram FIG. 4.

2.2.5. Process Flow Diagrams (See FIG. H-16)

(See FIG. H-17)

(See FIG. H-18)

(See FIG. H-19)

3. User Interface 3.1. User Interface Screens 3.1.1. Screen ID's

| Screen ID (SID) | Screen Name | Corresponding HTML File Name |
|---|---|---|
| rate.admin | Admin Fees | /bpi/cas/carrier/rates/AdminFee.jsp |
| rate.admin.search | Search Admin Fees | /bpi/cas/carrier/rates/AdminFeeSearch.jsp |
| rate.admin.view | View Admin Fees | /bpi/cas/carrier/rates/AdminFeeView.jsp |
| rate.admin.confirm | Confirm Admin Fees | /bpi/cas/carrier/rates/AdminFeeConfirm.jsp |
| rate.agent | Agent Commission | /bpi/cas/carrier/rates/AgentFee.jsp |
| rate.agent.search | Search Agent Commission | /bpi/cas/carrier/rates/AgentFeeSearch.jsp |
| rate.agent.view | View Agent Commission | /bpi/cas/carrier/rates/AgentFeeView.jsp |
| rate.agent.confirm | Confirm Agent Commission | /bpi/cas/carrier/rates/AgentFeeConfirm.jsp |

-continued

| Screen ID (SID) | Screen Name | Corresponding HTML File Name |
|---|---|---|
| rate.add | Additional Fees | /bpi/cas/canier/rates/ AdditionalFee.jsp |
| rate.add.search | Search Additional Fees | /bpi/cas/carrier/rates/ AdditionalFeeSearch.jsp |
| rate.add.view | View Additional Fees | /bpi/cas/carrier/rates/ AdditionalFeeView.jsp |
| rate.add.confirm | Confirm Additional Fees | /bpi/cas/carrier/rates/ AdditionalFeeConfirm.jsp |
| rate.ratediff | Differential Fees | /bpi/en/carrier/rates/ DifferentialRate.jsp |
| rate.ratediff.search | Search Differential Fees | /bpi/cas/carrier/rates/ DifferentialRateSearch.jsp |
| rate.ratediff.view | View Differential Fees | /bpi/cas/carrier/rates/ DifferentialRateView.jsp |
| rate.ratediff.confirm | Confirm Differential Fees | /bpi/cas/carrier/rates/ DifferentialRateConfirm.jsp |

3.1.2. User Interface ID: Rate Classification—Admin Fees 3.1.2.1. Screen Name: Rate Classification—Admin Fees (BPI_CAS_SCR_CM__003__001) (See FIG. H-20)

3.1.2.2. Element Name, Element Type, Label & Purpose

| Element Name | Element Type | Label | Purpose |
|---|---|---|---|
| Main Header rate Classification for Admin Fees | Text | Main Header rate Classification for Admin Fees | To give heading for the screen being navigated |
| Rate Type | Radio | Rate Type | To Select a rate type (Whether Blended or Non Blended) |
| Rate Type | Radio | Rate Type | To Select a rate type (Whether Enroll or Renew) |
| Group Type | Drop Down List | Group Type | List all the Group Type Available in the system |
| Association ID | Drop Down List | Association ID | List all the Association Type Available in the system |
| Member Type | Radio | Member Type | To Select a Member type (Whether Individual or Association) |
| Percentage Premium | Entry Field | Percentage Premium | Entry field for entering % premium |
| Effective Date | Entry Field | Effective Date | To choose the date required, by calendar or entering it |
| Amount | Entry Field | Amount | Entry field for entering Amount in $ |
| Medical | Entry Field | Medical | Entry field for entering the Medical Fee in $ |
| Dental | Entry Field | Dental | Entry field for entering the Dental Fee in $ |
| Vision | Entry Field | Vision | Entry field for entering the Vision Fee in % |
| CAM | Entry Field | CAM | Entry field for entering the CAM Fee in % |
| Save | Button (HTML Submit button) | Save | Save all the above information to the repository |
| Cancel | Button (HTML reset Button) | Cancel | To reset the entries made in all the fields |

3.1.2.3. Front End Validations

Validation Details

This section provides the front-end screen validations along with the associated message—Success/Error Message text

| # | Element Name | Action/Validation Details | Message |
|---|---|---|---|
| 1. | Rate Type | Rate Type should be selected for Adding Admin Fees(Either one of Blended Rate or Non Blended Rate) and (Either one of Enroll or Renew). | "Rate Type - Is required" |
| 2. | Group Type | Should list all the Group Type within the system The first option should be - Choose One -. Subsequent Group Types should be listed in alphabetical order | "Group Type - Is required" |
| 3. | Association Id | Should list all the Association Id within the system .The first option should be - Choose One -. Subsequent Group Types should be listed in alphabetical | "Association Id - Is required" |
| 4. | Member Type | Member Type should be selected for Adding Admin Fees if Group Type is Guaranteed Association. | "Member Type - Is required. Select either Individual Member or Association Group" |
| 5. | Percentage Premium | Percentage Premium should be entered if the rate type is Blended | "Percentage Premium - Is Required" "Percentage Premium - Accepts numeric value only (0 to 100)" |
| 6. | Effective Date | Effective Date should be selected from Calendar or entered For valid Date Format Refer BPI CAS FSD Common | "Effective Date - Is required " "Effective Date - Accepts the format in MM/DD/YYYY" |
| 7. | Amount | Amount should be entered if the rate type is Non Blended | "Amount - Is required" "Amount - Accepts currency format only (# # #. # #)" |

-continued

| # | Element Name | Action/Validation Details | Message |
|---|---|---|---|
| 8. | Medical | Medical should be entered if the rate type is Non Blended | "Medical - Is required" "Medical - Accepts currency format only (# # #. # #) |
| 9. | Dental | Medical should be entered if the rate type is Non Blended | "Dental - Is required" "Dental - Accepts currency format only (# # #. # #) |
| 10. | Vision | Medical should be entered if the rate type is Non Blended | "Vision - Is required" "Vision - Accepts numeric value only (0 to 100)" |
| 11. | CAM | Medical should be entered if the rate type is Non Blended | "CAM - Is required" "CAM - Accepts numeric value only (0 to 100)" |
| 12. | Save | Should function with Enter Key Cursor Positioned on the "SAVE" button or on Mouse Click. On saving the data the data gets saved to the database. Should there be any validation error on any of the fields. Should show the script error and place the cursor on the specific entry field. Check if the entries are not duplicate. | For general script validations for common functionality refer BPI_CAS_FSD_COMMON System Error: Common Text shall be followed for the System Error. |
| | | On Successful saving the flow should reside in the same screen. Exception: If the data selected for edition is from the repository retain its previous state. I.e. the data should be visible in the table after saving. | "! Do any operation to save." (Displayed when invoked immediately after the screen is loaded). |
| | | Also show different text color for the data added (temporary) and the data picked from the repository. | "! Complete the update process." (Displayed when Save is invoked in Edit Mode). |
| 13. | Cancel | Should reset to the previous state on clicking the cancel button | |

3.1.3. User Interface ID: Rate Classification—Search Admin Fees 3.1.3.1. Screen Name: Rate Classification—Search Admin Fees (BPI_CAS_SCR_CM__003__002) (See FIG. H-21)

3.1.3.2. Element Name, Element Type, Label & Purpose

| Element Name | Element Type | Label | Purpose |
|---|---|---|---|
| Main Header rate Classification for Admin Fees | Text | Main Header rate Classification for Admin Fees | To give heading for the screen being navigated |
| Rate Type | Radio | Rate Type | To Select a rate type (Whether Blended or Non Blended) |
| Rate Type | Radio | Rate Type | To Select a rate type (Whether Enroll or Renew) |
| Group Type | Drop Down List | Group Type | List all the Group Type Available in the system |
| Association ID | Drop Down List | Association ID | List all the Association Type Available in the system |
| Percentage Premium | Entry Field | Percentage Premium | Entry field for entering % premium |
| Effective Date | Entry Field | Effective Date | To choose the date required, by calendar or entering it |
| Search | HTML Button | Search | Button to search the data based on inputs and displays the results in HTML table below |
| Table | HTML table | Table | Shows the all the data in the column format |
| View/ Delete | Button (HTML Button) | View/ Delete | Button to view the selected record data |
| Check Index | Radio Button | Check Index | To check the items for modify, view and deletion |
| Edit | Button (HTML Button) | Edit | To edit the data against the row selected for edition |
| Cancel | Button (HTML Button) | Cancel | To reset the entries made in all the fields |

3.1.3.3. Front End Validations

Validation Details

This section provides the front-end screen validations along with the associated message—Success/Error Message text

| # | Element Name | Action/Validation Details | Message |
|---|---|---|---|
| 1 | Effective Date | Effective Date should be selected from Calendar or entered For valid Date Format Refer BPI_CAS_FSD_Common | "Effective Date - Accepts the format in MM/DD/YYYY |

-continued

| # | Element Name | Action/Validation Details | Message |
|---|---|---|---|
| 2 | Search | Should function with Enter Key Cursor Positioned on the "Search" button or Mouse Click. All the entries are valid. It fetches the records from repository based on inputs and displays the records in the table below. Else throws error dialog box. | On click of Search button checks for the above mentioned validations |
| 3 | Table | Should have column header and each subsequent row should be identified by alternate color combinations. I.e. first row should have color 'x' and the next row should have color 'y'. The next row should have color 'x' again and so on. The size of the text inside any cell should be wrapped if the text becomes too long. | |
| 4 | View/Delete | Should function with Enter Key Cursor Positioned on the "View/Delete" button or on Mouse Click. If the user clicks on the view button without checking any of the view radio button should throw error message. Success: View the current row from the table. | "! Select any one of the record" |
| 5 | Modify | Should function with Enter Key Cursor Positioned on the "Modify" button or on Mouse Click. On clicking the modify button the row is edited and the data should be populated. | |
| 5 | Cancel | Should reset to the previous state on clicking the cancel button | |

3.1.4. User Interface ID: Rate Classification—View Admin Fees 3.1.4.1. Screen Name: Rate Classification—View Admin Fees (BPI_CAS_SCR_CM__003__003) (See FIG. H-22)

3.1.4.2. Element Name, Element Type, Label & Purpose

| Element Name | Element Type | Label | Purpose |
|---|---|---|---|
| Main Header rate Classification for Admin Fees | Text | Main Header rate Classification for Admin Fees | To give heading for the screen being navigated |
| Rate Type | Text Field | Rate Type | Displays Blended or Non Blended rates |
| Enroll Renew | Text Field | Enroll Renew | Displays Enroll or Renew |
| Group Type | Text Field | Group Type | Displays Group Type |
| Association ID | Text Field | Association ID | Displays Association Type |
| Member Type | Text Field | Member Type | Displays Individual or Association |
| Percentage Premium | Text Field | Percentage Premium | Displays % premium |
| Effective Date | Text Field | Effective Date | Displays Effective date |
| Amount | Text Field | Amount | Displays Amount in $ |
| Medical | Text Field | Medical | Displays Medical Fee in $ |
| Dental | Text Field | Dental | Displays Dental Fee in $ |
| Vision | Text Field | Vision | Displays Vision Fee in % |
| CAM | Text Field | CAM | Displays CAM Fee in % |
| Delete | Button (HTML Button) | Delete | To delete the data |
| New Admin fees | Button (HTML Button) | New Admin fees | Go to New Admin fee screen |

3.1.4.3. Front End Validations

Validation Details

This section provides the front-end screen validations along with the associated message—Success/Error Message text

| # | Element Name | Action/Validation Details | Message |
|---|---|---|---|
| 1 | Delete | Should function with Enter Key Cursor Positioned on the "Delete" button or on Mouse Click. If the user clicks on the delete button throw message box. Success: Deletes the row from the data base | "Do you want to delete the selected record?" |
| 2 | New Admin Fees | Should go to the admin fees screen clicking the New Admin Fees button | |

3.1.5. User Interface ID: Rate Classification—Agent Commission 3.1.5.1. Screen Name: Rate Classification—Agent Commission (BPI_CAS_SCR_CM__003__004) (See FIG. H-23)

3.1.5.2. Element Name, Element Type, Label & Purpose

| Element Name | Element Type | Label | Purpose |
|---|---|---|---|
| Main Header rate Classification for Agent Fees | Text | Main Header rate Classification for Agent Fees | To give heading for the screen being navigated |
| Rate Type | Radio | Rate Type | To Select a rate type (Whether Blended or Non Blended) |
| Rate Type | Radio | Rate Type | To Select a rate type (Whether Enroll or Renew) |
| Enrolled before 1997 | Check Box | Enrolled before 1997 | To be checked if enrolled before 1997. |
| Group Type | Drop Down List | Group Type | List all the Group Type Available in the system |
| Association ID | Drop Down List | Association ID | List all the Association Type Available in the system |
| Member Type | Radio | Member Type | To Select a Member type (Whether Individual or Association) |
| Percentage Premium | Entry Field | Percentage Premium | Entry field for entering % premium |
| Effective Date | Entry Field | Effective Date | To choose the date required by calendar or entering |
| Group Size Lower Limit | Entry Field | Group Size Lower Limit | Entry field for entering Group size Lower limit. |
| Group Size Upper Limit | Entry Field | Group Size Upper Limit | Entry field for entering Group size Upper limit. |
| Amount | Entry Field | Amount | Entry field for entering Amount in $ |
| Medical | Entry Field | Medical | Entry field for entering the Medical Fee in $ |

-continued

| Element Name | Element Type | Label | Purpose |
|---|---|---|---|
| Dental | Entry Field | Dental | Entry field for entering the Dental Fee in $ |
| Vision | Entry | Field Vision | Entry field for entering the Vision Fee in % |
| CAM | Entry Field | CAM | Entry field for entering the CAM Fee in % |
| Save | Button (HTML Button) | Save | Save all the above information to the repository |

-continued

| Element Name | Element Type | Label | Purpose |
|---|---|---|---|
| Cancel | Button (HTML Button) | Cancel | To reset the entries made in all the fields |

3.1.5.3. Front End Validations

Validation Details

This section provides the front-end screen validations along with the associated message—Success/Error Message text

| • Element Name | Action/Validation Details | Message |
|---|---|---|
| 1. Rate Type | Rate Type should be selected for Adding Agent Fees (Either one of Blended or Non Blended Rate and Either one of Enroll or Renew) | "Rate Type - Is Required" |
| 2. Enrolled before 1997 | Should be selected if enrolled before 1997. | |
| 3. Group Type | Should list all the Group Type within the system<br>The first option should be<br>- Choose One -.Subsequent Group Types should be listed in alphabetical order | "Group Type - Is required" |
| 4. Association Id | Should list all the Association Id within the system. The first option should be<br>- Choose One -. Subsequent Group Types should be listed in alphabetical | "Association Id - Is required" |
| 5. Member Type | Member Type should be selected for Adding Agent Fees if Group Type is Guaranteed Association. | "Member Type - Is required. Select Individual Member or Association Group." |
| 6. Percentage Premium | Percentage Premium should be entered if the rate type is Blended | "Percentage Premium" - Is required<br>"Percentage Premium in - Accepts numeric values only (0 to 100)" |
| 7. Effective Date | Effective Date should be selected from Calendar or entered<br>For valid Date Format<br>Refer BPI_CAS_FSD_Common | "Effective Date - Is required"<br>"Effective Date - Accepts the format in MM/DD/YYYY " |
| 8. Group Size Lower Limit | Group Size Lower Limit should be entered if the rate type is Non Blended | "Group Size Lower Limit - Is required"<br>"Group Size Lower limit - Accepts numeric values only (1-999)" |
| 9. Group Size Upper Limit | Group Size Upper Limit should be entered if the rate type is Non Blended | "Group Size Upper Limit - Is required"<br>"Group Size Upper Limit - Accepts numeric values only (1-999)"<br>"Kindly enter Group Size Upper limit greater than Lower Limit" |
| 10. Amount | Amount should be entered if the rate type is Non Blended | "Amount - Is required"<br>"Amount - Accepts currency format only (# # #. # #) |
| 11. Medical | Medical should be entered if the rate type is Non Blended | Medical - Is required"<br>"Medical - Accepts currency format only (# # #. # #) |
| 12. Dental | Medical should be entered if the rate type is Non Blended | "Dental - Is required"<br>"Dental - Accepts currency format only (# # #. # #) |
| 13. Vision | Medical should be entered if the rate type is Non Blended | "Vision - Is required"<br>"Vision - Accepts numeric value only (0 to 100)" |
| 14. CAM | Medical should be entered if the rate type is Non Blended | "CAM - Is required"<br>"CAM - Accepts numeric value only (0 to 100)" |
| 15. Save | Should function with Enter Key Cursor Positioned on the "SAVE" button or on Mouse Click.<br>On saving the data the data gets saved to the database.<br>Should there be any validation error on any of the fields. Should show the script error and place the cursor on the specific entry field. | For general script validations for common functionality refer BPI_CAS_FSD_COMMON<br>System Error: Common Text shall be followed for the System Error.<br>"! Do any operation to save."<br>(Displayed when invoked immediately after the screen is loaded). |

-continued

| • Element Name | Action/Validation Details | Message |
|---|---|---|
| | Check if the entries are not duplicate.<br>On Successful saving the flow should reside in the same screen.<br>Exception: If the data selected for edition is from the repository retain its previous state. I.e. the data should be visible in the table after saving. | |
| 16. Cancel | Should reset to the previous state on clicking the cancel button | |

3.1.6. User Interface ID: Rate Classification—Search Agent Commission 3.1.6.1. Screen Name: Rate Classification—Search Agent Commission (BPI_CAS_SCR_CM__003__005) (See FIG. H-24)

| Element Name | Element Type | Label | Purpose |
|---|---|---|---|
| Main Header rate Classification for Agent Fees | Text | Main Header rate Classification for Agent Fees | To give heading for the screen being navigated |
| Rate Type | Radio | Rate Type | To Select a rate type (Whether Blended or Non Blended) |
| Enroll/ Renew | Radio | Enroll/ Renew | To Select a rate type (Whether Enroll or Renew) |
| Group Type | Drop Down List | Group Type | List all the Group Type Available in the system |
| Association ID | Drop Down List | Association ID | List all the Association Type Available in the system |
| Effective Date | Entry Field | Effective Date | To choose the date required by calendar or entering |
| Group Size Lower Limit | Entry Field | Group Size Lower Limit | Entry field for entering Group size Lower limit. |
| Group Size Upper Limit | Entry Field | Group Size Upper Limit | Entry field for entering Group size Upper limit. |
| Search | HTML Button | Search | Button to search the data based on inputs and displays the results in HTML table below |
| Table | HTML table | Table | Shows the all the data in the column format |
| View/ Delete | Button (HTML Button) | View/ Delete | Button to view the selected record data |
| Check Index | Radio Button | Check Index | To check the items for modify, view and deletion |
| Modify | Button (HTML Button) | Modify | To edit the data against the row selected for edition |
| Cancel | Button (HTML Button) | Cancel | To reset the entries made in all the fields |

3.1.6.3. Front End Validations

Validation Details

This section provides the front-end screen validations along with the associated message—Success/Error Message text

| • Element Name | Action/Validation Details | Message |
|---|---|---|
| 1 Effective Date | Effective Date should be selected from Calendar or entered<br>For valid Date Format<br>Refer BPI_CAS_FSD_Common | "Effective Date - Accepts the format in MM/DD/ YYYY " |
| 2 Group Size Lower Limit | Group Size Lower Limit should be entered if the rate type is Non Blended | "Group Size Lower limit - Accepts numeric values only (1-999)" |
| 3 Group Size Upper Limit Blended | Group Size Upper Limit should be entered if the rate type is Non | "Group Size Upper Limit - Accepts numeric values only (1-999)"<br>"Kindly enter Group Size Upper limit greater than Lower Limit" |
| 4 Search | Should function with Enter Key Cursor Positioned on the "Search" button or Mouse Click.<br>All the entries are valid. It fetches the records from repository based on inputs and displays the records in the table below. Else throws error dialog box. | On click of Search button checks for the above mentioned validations |
| 5 Table | Should have column header and each subsequent row should be identified by alternate color combinations. I.e. first row should have color 'x' and the next row should have color 'y'. The next row should have color 'x' again and so on. The size of the text inside any cell should be wrapped if the text becomes too long. | |
| 6 View/Delete | Should function with Enter Key Cursor Positioned on the "View/ Delete" button or on Mouse Click.<br>If the user clicks on the view button without checking any of the view radio button should throw error message.<br>Success: View the current row from the table. | "! Select any one of the record" |
| 7 Modify | Should function with Enter Key Cursor Positioned on the "Modify" button or on Mouse Click.<br>On clicking the modify button the row is edited and the data should be populated. | "! Select any one of the record" |
| 8 Cancel | Should reset to the previous state on clicking the cancel button | |

3.1.7. User Interface ID: Rate Classification—View Agent Commission 3.1.7.1. Screen Name: Rate Classification—View Agent Commission (BPI_CAS_SCR_CM_003_006) (See FIG. H-25)

3.1.7.2. Element Name, Element Type, Label & Purpose

| Element Name | Element Type | Label | Purpose |
|---|---|---|---|
| Main Header rate Classification for Agent Fees | Text | Main Header rate Classification for Agent Fees | To give heading for the screen being navigated |
| Rate Type | Text Field | Rate Type | To Display rate type (Whether Blended or Non Blended) |
| Enroll Type | Text Field | Enroll Type | To Display enroll type (Whether Enroll or Renew) |
| Enrolled before 1997 | Text Field | Enrolled before 1997 | To Display enrolled before 1997 or not. |
| Group Type | Text Field | Group Type | To Display Group Type |
| Association ID | Text Field | Association ID | To Display Association Type |
| Member Type | Text Field | Member Type | To Display member type (Individual or Association) |
| Percentage Premium | Text Field | Percentage Premium | To Display % premium |
| Effective Date | Text Field | Effective Date | To Display Effective date |
| Group Size Lower Limit | Text Field | Group Size Lower Limit | To Display Group size Lower limit. |
| Group Size Upper Limit | Text Field | Group Size Upper Limit | To Display Group size Upper limit. |
| Amount | Text Field | Amount | To Display Amount in $ |
| Medical | Text Field | Medical | To Display Medical Fee in $ |
| Dental | Text Field | Dental | To Display Dental Fee in $ |
| Vision | Text Field | Vision | To Display Vision Fee in % |
| CAM | Text Field | CAM | To Display CAM Fee in % |
| Delete | Button (HTML Button) | Delete | To delete the data |
| New Agent Fees | Button (HTML Button) | New Agent Fees | To go to New Agent fees screen |

3.1.7.3. Front End Validations

Validation Details

This section provides the front-end screen validations along with the associated message—Success/Error Message text

| • | Element Name | Action/Validation Details | Message |
|---|---|---|---|
| 1 | Delete | Should function with Enter Key Cursor Positioned on the "Delete" button or on Mouse Click. If the user clicks on the delete button throw message box. Success: Deletes the row from the data base | "Do you want to delete the selected record?" |
| 2 | New Agent Fees | Should go to the agent fees screen clicking the New Agent Fees button | |

3.1.8. User Interface ID: Rate Classification—Additional Fees 3.1.8.1. Screen Name: Rate Classification—Additional Fees (BPI_CAS_SCR_CM_003_007) (See FIG. H-26)

3.1.8.2. Element Name, Element Type, Label & Purpose

| Element Name | Element Type | Label | Purpose |
|---|---|---|---|
| Main Header rate Classification for Additional Fees | Text | Main Header rate Classification for Additional Fees | To give heading for the screen being navigated |
| Cobra Type | Radio | Cobra Type | To Select a Cobra Type (Whether Cal Cobra or Federal Cobra) |
| Additional Fee Percentage | Entry Field | Additional Fee Percentage | Entry field for entering % Additional Fees |
| Effective Date | Entry Field | Effective Date | To choose the date required by calendar or entering |
| Save | Button (HTML Button) | Save | Save all the above information to the repository |
| Cancel | Button (HTML Button) | Cancel | To reset the entries made in all the fields |

3.1.8.3. Front End Validations

Validation Details

This section provides the front-end screen validations along with the associated message—Success/Error Message text

| • | Element Name | Action/Validation Details | Message |
|---|---|---|---|
| 1. | Cobra Type | Cobra Type should be selected for Adding Additional Fees | "Kindly choose Cobra" |
| 2. | Additional Fee Percentage | Additional Fee Percentage should be entered. | "% Of Additional Fees—Is required" "% of Additional Fees—Accepts numeric value only (0 to 100) |
| 3. | Effective Date | Effective Date should be selected from Calendar or entered For valid Date Format Refer BPI_CAS_FSD_Common | "Effective Date—Is required" "Effective Date -— Accepts the format in MM/DD/YYYY" |
| 4. | Save | Should function with Enter Key Cursor Positioned on the "SAVE" button or on Mouse Click. On saving the data the data gets saved to the database. Should there be any validation error on any of the fields. Should show the script error and place the cursor on the specific entry field. Check if the entries are not duplicate. On Successful saving the flow should reside in the same screen. Exception: If the data selected for edition is from the repository retain its previous state. I.e. the data should be visible in the table after saving. | For general script validations for common functionality refer BPI_CAS_FSD_COMMON System Error: Common Text shall be followed for the System Error. "! Do any operation to save." (Displayed when invoked immediately after the screen is loaded). |
| 5. | Cancel | Should reset to the previous state on clicking the cancel button | |

3.1.9. User Interface ID: Rate Classification—Search Additional Fees 3.1.9.1. Screen Name: Rate Classification—Search Additional Fees (BPI_CAS_SCR_CM_003_008) (See FIG. H-27)

3.1.9.2. Element Name, Element Type, Label & Purpose

| Element Name | Element Type | Label | Purpose |
|---|---|---|---|
| Main Header rate Classification for Additional Fees | Text | Main Header rate Classification for Additional Fees | To give heading for the screen being navigated |
| Cobra Type | Radio | Cobra Type | To Select a Cobra Type (Whether Cal Cobra or Federal Cobra) |
| Additional Fee Percentage | Entry Field | Additional Fee Percentage | Entry field for entering % Additional Fees |
| Effective Date | Entry Field | Effective Date | To choose the date required by calendar or entering |
| Search | HTML Button | Search | Button to search the data based on inputs and displays the results in HTML table below |
| Table | HTML table | Table | Shows the all the data in the column format |
| View/ Delete | Button (HTML Button) | View/ Delete | Button to view the selected record data |
| Check Index | Radio Button | Check Index | To check the items for modify, view and deletion |
| Modify | Button (HTML Button) | Modify | To edit the data against the row selected for edition |
| Cancel | Button (HTML Button) | Cancel | To reset the entries made in all the fields |

3.1.9.3. Front End Validations

Validation Details

This section provides the front-end screen validations along with the associated message—Success/Error Message text

| • Element Name | Action/Validation Details | Message |
|---|---|---|
| 1 Additional Fee Percentage | Additional Fee Percentage should be entered. | "% of Additional Fees—Accepts numeric value only (0 to 100) |
| 2 Effective Date | Effective Date should be selected from Calendar or entered For valid Date Format<br><br>Refer BPI_CAS_FSD_Common | "Effective Date -— Accepts the format in MM/DD/ YYYY" |
| 3 Search | Should function with Enter Key Cursor Positioned on the "Search" button or Mouse Click. All the entries are valid. It fetches the records from repository based on inputs and displays the records in the table below. Else throws error dialog box. | On click of Search button checks for the above mentioned validations |
| 4 Table | Should have column header and each subsequent row should be identified by alternate color combinations. I.e. first row should have color 'x' and the next row should have color 'y'. The next row should have color 'x' again and so on. The size of the text inside any cell should be wrapped if the text becomes too long. | |
| 5 View/Delete | Should function with Enter Key Cursor Positioned on the "View/ Delete" button or on Mouse Click. If the user clicks on the view button without checking any of the view radio button should throw error message. Success: View the current row from the table. | "! Select any one of the record" |
| 6 Modify | Should function with Enter Key Cursor Positioned on the "Modify" button or on Mouse Click. On clicking the modify button the row is edited and the data should be populated. | "! Select any one of the record" |
| 7 Cancel | Should reset to the previous state on clicking the cancel button | |

3.1.10. User Interface ID: Rate Classification—View Additional Fees 3.1.10.1. Screen Name: Rate Classification—View Additional Fees (BPI_CAS_SCR_CM__003__009) (See FIG. H-28)

3.1.10.2. Element Name, Element Type, Label & Purpose

| Element Name | Element Type | Label | Purpose |
|---|---|---|---|
| Main Header rate Classification for Additional Fees | Text | Main Header rate Classification for Additional Fees | To give heading for the screen being navigated |
| Cobra Type | Text Field | Cobra Type | To Display Cobra Type (Whether Cal Cobra or Federal Cobra) |
| Additional Fee Percentage | Text Field | Additional Fee Percentage | To Display % Additional Fees |
| Effective Date | Text Field | Effective Date | To Display Effective date |
| New Additional Fees | HTML Button | New Additional Fees | Button to go to new Additional fees |
| Delete | Button (HTML Button) | Delete | To delete the current additional fees data |

3.1.10.3. Front End Validations

| • Element Name | Action/Validation Details | Message |
|---|---|---|
| 1 Delete | Should function with Enter Key Cursor Positioned on the "Delete" button or on Mouse Click. If the user clicks on the delete button throw message box. Success: Deletes the row from the data base | "Do you want to delete the selected record?" |
| 2 New Additional Fees | Should go to the additional fees screen clicking the New additional Fees button | |

3.1.11. User Interface ID: Rate Classification—Differential Fees 3.1.11.1. Screen Name: Rate Classification—Differential Fees (BPI_CAS_SCR_CM__003__010) (See FIG. H-29)

3.1.11.2. Element Name, Element Type, Label & Purpose

| Element Name | Element Type | Label | Purpose |
|---|---|---|---|
| Main Header rate Classification for Differential Factor | Text | Main Header rate Classification for Differential Factor | To give heading for the screen being navigated |
| Group Size Lower Limit | Entry Field | Group Size Lower Limit | Entry field for entering Group size Lower limit. |
| Group Size Upper Limit | Entry Field | Group Size Upper Limit | Entry field for entering Group size Upper limit. |
| Differential Factor | Entry Field | Differential Factor | Entry field for entering Differential Factor |
| Effective Date | Entry Field | Effective Date | To choose the date required by calendar or entering |
| Applicable For | Radio | Applicable For | To Select a Applicable For (Whether New Business Only or New Business or Renewal) |
| Group Size Criteria | Radio | Group Size Criteria | To Select a Group Size Criteria (Whether Eligible Employee or Enrolled Employee) |
| Save | Button (HTML Submit button) | Save | Save all the above information to the repository |
| Cancel | Button (HTML reset Button) | Cancel | To reset the entries made in all the fields |

3.1.11.3. Front End Validations

Validation Details

This section provides the front-end screen validations along with the associated message—Success/Error Message text

| • | Element Name | Action/Validation Details | Message |
|---|---|---|---|
| 1. | Group Size Lower Limit | Group Size Lower Limit should be entered. | "Group Size Lower Limit—Is required" "Group Size Lower limit—Accepts numeric values only (1-999)" |
| 2. | Group Size Upper Limit | Group Size Upper Limit should be entered. | "Group Size Upper Limit—Is required" "Group Size Upper Limit—Accepts numeric values only (1-999)" "Kindly enter Group Size Upper limit greater than Lower Limit" |
| 3. | Differential Factor | Differential Factor should be entered. | "Differential Factor—Is required" "Differential Factor—Accepts numeric values only." "Differential Factor—Cannot be Zero" |
| 4. | Effective Date | Effective Date should be selected from Calendar or entered For valid Date Format Refer BPI_CAS_FSD_Common | "Effective Date—Is required" "Effective Date-—Accepts the format in MM/DD/YYYY" |
| 5. | Save | Should function with Enter Key Cursor Positioned on the "SAVE" button or on Mouse Click. On saving the data the data gets saved to the database. Should there be any validation error on any of the fields. Should show the script error and place the cursor on the specific entry field. Check if the entries are not duplicate. On Successful saving the flow should reside in the same screen. | For general script validations for common functionality refer BPI_CAS_FSD_COMMON System Error: Common Text shall be followed for the System Error. "! Do any operation to save." (Displayed when invoked immediately after the screen is loaded). |

3.1.12. User Interface ID: Rate Classification—Search Differential Fees 3.1.12.1. Screen Name: Rate Classification—Search Differential Fees (BPI_CAS_SCR_CM__003__011) (See FIG. H-30)

3.1.12.2. Element Name, Element Type, Label & Purpose

| Element Name | Element Type | Label | Purpose |
|---|---|---|---|
| Main Header rate Classification for Differential Factor | Text | Main Header rate Classification for Differential Factor | To give heading for the screen being navigated |
| Group Size Lower Limit | Entry Field | Group Size Lower Limit | Entry field for entering Group size Lower limit. |
| Group Size Upper Limit | Entry Field | Group Size Upper Limit | Entry field for entering Group size Upper limit. |
| Differential Factor | Entry Field | Differential Factor | Entry field for entering Differential Factor |
| Effective Date | Entry Field | Effective Date | To choose the date required by calendar or entering |
| Applicable For | Radio | Applicable For | To Select a Applicable For (Whether New Business Only or New Business or Renewal) |
| Group Size Criteria | Radio | Group Size Criteria | To Select a Group Size Criteria (Whether Eligible Employee or Enrolled Employee) |
| Search | HTML Button | Search | Button to search the data based on inputs and displays the results in HTML table below |
| Table | HTML table | Table | Shows the all the data in the column format |
| View/ Delete | Button (HTML Button) | View/ Delete | Button to view the selected record data |
| Check Index | Radio Button | Check Index | To check the items for modify, view and deletion |
| Modify | Button (HTML Button) | Modify | To edit the data against the row selected for edition |
| Cancel | Button (HTML Button) | Cancel | To reset the entries made in all the fields |

3.1.12.3. Front End Validations

Validation Details

This section provides the front-end screen validations along with the associated message—Success/Error Message text

| • | Element Name | Action/Validation Details | Message |
|---|---|---|---|
| 1 | Group Size Lower Limit | Group Size Lower Limit should accept numeric. | "Group Size Lower limit—Accepts numeric values only (1-999)" |
| 2 | Group Size Upper Limit | Group Size Upper Limit should accept numeric. | "Group Size Upper Limit—Accepts numeric values only (1 -999)" "Kindly enter Group Size Upper limit greater than Lower Limit" |
| 3 | Differential Factor | Differential Factor should accept numeric.. | "Differential Factor—Accepts numeric values only." |
| 4 | Effective Date | Effective Date should be selected from Calendar or entered For valid Date Format Refer BPI_CAS_FSD_Common | "Effective Date -—Accepts the format in MM/DD/YYYY" |
| 5 | Search | Should function with Enter Key Cursor Positioned on the "Search" button or Mouse Click. All the entries are valid. It fetches the records from repository based on inputs and displays the records in the table below. Else throws error dialog box. | On click of Search button checks for the above mentioned validations |
| 6 | Table | Should have column header and each subsequent row should be identified by alternate color combinations. I.e. first row should have color 'x' and the next row should have color 'y'. The next row should have color 'x' again and so on. The size of the text inside any cell should be wrapped if the text becomes too long. | |
| 7 | View/ Delete | Should function with Enter Key Cursor Positioned on the "View/ Delete" button or on Mouse Click. If the user clicks on the view button without checking any of the view radio button should throw error message. Success: View the current row from the table. | "! Select any one of the record" |
| 8 | Modify | Should function with Enter Key Cursor Positioned on the "Modify" button or on Mouse Click. On clicking the modify button the row is edited and the data should be populated. | "! Select any one of the record" |
| 9 | Cancel | Should reset to the previous state on clicking the cancel button | |

3.1.13. User Interface ID: Rate Classification—View Differential Fees 3.1.13.1. Screen Name: Rate Classification—View Differential Fees (BPI_CAS_SCR_CM__003__012) (See FIG. H-31)

3.1.13.2. Element Name, Element Type, Label & Purpose

| Element Name | Element Type | Label | Purpose |
|---|---|---|---|
| Main Header rate Classification for Differential Factor | Text | Main Header rate Classification for Differential Factor | To give heading for the screen being navigated |
| Group Size Lower Limit | Text Field | Group Size Lower Limit | To Display Group size Lower limit. |
| Group Size Upper Limit | Text Field | Group Size Upper Limit | To Display Group size Upper limit. |
| Differential Factor | Text Field | Differential Factor | To Display Differential Factor |
| Effective Date | Text Field | Effective Date | To Display Effective date |
| Applicable For | Text Field | Applicable For | To Display Applicable For (Whether New Business Only or New Business or Renewal) |
| Group Size Criteria | Text Field | Group Size Criteria | To Display Group Size Criteria (Whether Eligible Employee or Enrolled Employee) |
| New Differential Rate | Button (HTML Button) | New Differential Rate | To go to Differential rate screen. |
| Delete | Button (HTML Button) | Delete | To delete the current Differential fee |

3.1.13.3. Front End Validations

Validation Details

This section provides the front-end screen validations along with the associated message—Success/Error Message text

| • | Element Name | Action/Validation Details | Message |
|---|---|---|---|
| 1 | Delete | Should function with Enter Key Cursor Positioned on the "Delete" button or on Mouse Click. If the user clicks on the delete button throw message box. Success: Deletes the row from the data base | "Do you want to delete the selected record?" |
| 2 | New Differential Fees | Should go to the agent fees screen clicking the New Differential Fees button | |

3.1.14. Screen Flow (See FIG. H-32)

Benefit Partners Inc

Process Specification

BPI_CAS_FSD_CM__04

1. Introduction 1.1. Purpose

This purpose of this document is to identify the process associated with the business use case Create ZIP. This document is the amendment of BPI_CAS_FSD_CM__04 (Version 1.0).

1.2. Business Use Case Specification Reference

| Business Use Specification ID | Business Use Case Name |
|---|---|
| BPI_SCOPE__CM__004 | Create ZIP |

1.3. Definitions, Acronyms & Abbreviations

| Term | Explanation |
|---|---|

2. Process Identification 2.1. Background

This process describes the Use Case "Create ZIP". Standard ZIP is loaded into the system. Refer the document reference no. BPI_CAS_FSC_EC for process of loading ZIP Code. Also for the specific ZIP Codes the corresponding service areas are loaded. The state is divided into several service areas based on the number of counties and their population. In the state of California there are presently 6 service areas. The Rate is based on the service area where the employees are residing.

2.2. Process Description & Flow 2.2.1. Zip Code Search

The Screen described below has two features provided:

Zip code search feature is by which the user can search for zip based on any of the selection criteria. Search for zip is based on City name, County name or a Valid Zip code. When user enters the search value, search results are displayed on a table format.

There is also provision for canceling the search value. Numbers of records fetched are also displayed on the screen.

There is also a feature to print the records fetched. A separate page is invoked on clicking the printer icon. The print page has the fetched records with print button. Clicking on which will invoke the printer dialog.

User can view records in Normal as well as Expanded mode. Expanded mode can be invoked by clicking the gif in the table header.

2.2.2. Zip Distance

Zip Distance feature is by which user can get the distance of the zip codes entered. Zip distance is calculated based on the geographical distribution of the area by its latitudinal & longitudinal position. The result is displayed in miles.

The user interface for Zip is provided below. The two screenshots is the same screen shown to describe these two features.

2.2.3. Process Flow Diagrams (See FIG. H-33)

3. User Interface 3.1. User Interface Screens 3.1.1. Screen ID's

| Screen ID (SID) | Screen Name | Corresponding HTML File Name |
|---|---|---|
| zip.zipsearch | Zip Search | /bpi/cas/carrier/zip/ZipSearch.jsp |

3.1.2. User Interface ID: Zip Search 3.1.2.1. Screen Name: Zip Search (BPI_CAS_SCR_CM__004__001) (See FIG. H-34)

Zip Distance: BPI_CAS_SCR_CM__004__002 (See FIG. H-35)

3.1.2.2. Element Name, Element Type, Label & Purpose

| Element Name | Element Type | Label | Purpose |
|---|---|---|---|
| Main Header Searching ZIPS | Text | Main Header Searching ZIPS | To give heading for the screen being navigated |
| City | Text | City | Provide Text |
| City | Radio | City | To choose a city for search |
| County | Text | County | Provide Text |
| County | Radio | County | To choose a county for search |
| ZIP | Text | ZIP | Provide Text |
| ZIP | Radio | ZIP | To choose a zip for search |
| Search Value | Entry Field | Search Value | Entering the Zip search value |
| Search | HTML Button | Search | Button to be invoked for displaying the search results based on the Entered text in Search Value. |
| Cancel | HTML Button | Cancel | To clear the entered field. |
| ZIP 1 | Text | ZIP 1 | Provide Text |
| ZIP 1 | Entry Field | ZIP 1 | Entering the Zip1 value |
| ZIP 2 | Text | ZIP 2 | Provide Text |
| ZIP 2 | Entry Field | ZIP 2 | Entering the Zip2 value |
| Go | HTML Button | Go | Button to be invoked for displaying the distance between the two zip codes entered in miles. |
| Cancel | HTML Button | Cancel | To clear the entered field. |

3.1.2.3. Front End Validations

Validation Details

This section provides the front-end screen validations along with the

| # | Element Name | Action/Validation Details | Message |
|---|---|---|---|
| 1. | City | Max length of the search field is set. | |
| 2. | County | Max length of the search field is set. | |
| 3. | Zip | Max length of the search field is set. | |
| 4. | Search | On click of the button, records are fetched from repository based on selection criteria. | "Search Value - Is required." "City - Accepts alphabetic characters only." "County - Accepts alphabetic characters only." "ZIP - Accepts exactly 5 digit numbers only." |
| 5. | Cancel | On click of this button, entry field is cleared. | |
| 6. | Go | On click of the button, distance between the two zip codes is displayed. | "Zip1 - Is required." "Zip2 - Is required." "ZIP - Accepts exactly 5 digit numbers only." |
| 7. | Cancel | On click of this button, entry field is cleared. | |

3.2. Screen Flow

This section describes the screen flow for the group enrollment process. (See FIG. H-36)

Benefit Partners Inc

Process Specification

Cobra Enrollment

1 Introduction 1.1 Purpose

The purpose of this document is to describe the process of COBRA Enrollment. This document identifies how the user interacts with the system, the data to be captured, the business logic to be implemented, and the output of the process.

1.2 Business Use Case Specification Reference

| Business Use Specification ID | Business Use Case Name |
|---|---|
| BPI_SCOPE_EN | Enrollment |
| BPI_SCOPE_EN_002 | COBRA Enrollment |
| BPI_SCOPE_EN_001 | Group Enrollment |

1.3 Document Reference

| Document ID | Document Name |
|---|---|
| BPI_CAS_FSD_EN | Functional Specification Document - Enrollment |
| BPI_CAS_FSD_EN_001 | Process Flow - New Business Enrollment |
| BPI_CAS_FSD_EN_002 | Process Flow - Enrollment Changes/Add-On |
| BPI_CAS_FSD_EN_003 | Process Flow - COBRA Enrollment/Changes |
| BPI_CAS_FSD_EN_005 | Process Flow - Termination/Reinstatement |

1.4 Definitions, Acronyms & Abbreviations

| Term | Explanation |
|---|---|

2 Process Identification 2.1 Background

California State laws and federal laws govern COBRA Rules based on whether it is Cal COBRA or Federal COBRA.

The decision whether the Group is a CAL COBRA or FEDERAL COBRA would be based on the Group size or the number of employee in the group. If the number of the employee were greater than or equal to 20 then it would be FEDERAL COBRA. If the group size were less than 20 employees then it would be Cal COBRA. This needs to be entered at the time of group enrollment. Based on applications received for group.

2.2 Process Description

The objective of the COBRA Enrollment is to:

New Business COBRA Enrollment

Existing member converting to COBRA because of the qualifying rules.

Add on for COBRA members

Changes to COBRA members

Requalification and Open enrollment and Open enrollment for the COBRA members.

2.3 Process Flow

Process for COBRA is based on the type of COBRA enrollment

New Business COBRA Enrollment

Existing members converting into COBRA after termination

Process Flow for New Business COBRA Enrollment

1) Search for the group and select the SEG Group or Alternate Group with whom the COBRA members are to be added.

2) Specify if the Member is enrolling as COBRA member as an individual or with dependent 3) If the member is enrolling with dependent then specify the number of dependent 4) Enter member general information, which includes the personal information and address information.

5) Add the dependant/dependents if the option selected is with dependent and enter the dependent/dependents information.

6) Enter COBRA information for the member and dependents as applicable.

7) Select the Line of coverage options for the member and dependent as applicable.

8) List COBRA member summary and select the Benefit Level (Carrier Selection) based on the ZIP code and Service area provided.

9) Show missing information for the COBRA enrollment.

10) Enroll/Decline the COBRA enrollment (based on ACL).

Process Flow for New Business COBRA (See FIG. I-1)

Process Flow for Existing Member COBRA Enrollment

1) Search for the group and employee who need to be converted into the COBRA members.

2) Check the term status and reasons for the Employee/dependent.

3) Process COBRA Eligibility checks. This checks the eligibility of the Employee if termed and the reasons for the term, which form the basic for the qualifying event. Of if the employee is not termed and the dependent/dependents are termed their reasons for terms and qualifying event. If none qualify then COBRA enrollment is declined based on ACL. If either qualifies then the COBRA enrollment information is shown with option to select line of coverage for the termed members.

4) Identify the primary member based on the criteria.

Employee is also termed and opts for COBRA then the employee becomes the primary member.

If spouse is termed with children and spouse opts for COBRA coverage then spouse becomes the primary member If Children/child is termed and opts for COBRA coverage the oldest child becomes the primary member.

5) Check if the Plan is available in the Primary members ZIP/Service area.

If so then the member should select the same plan as was before. If not, pend and send quote for plans available and then allow the member to select the plan that is available in the new ZIP service area.

6) Dependents should have the same plan as well. However they can waive any plan. (Refer the business rules for COBRA)

7) Show Summary and missing information.

8) Enroll/Decline member/members as COBRA group.

Process Flow for Existing COBRA Conversion (See FIG. I-2)

3 User Interface 3.1 User Interface Screens 3.1.1 Screen ID's

| Screen ID (SID) | Screen Name | Corresponding HTML File Name |
|---|---|---|
| bpi.enrollment.cobra.new.search | Group Search | /bpi/cas/enrollment/cobra/new/groupsearch/GroupSearch.jsp |

| Screen ID (SID) | Screen Name | Corresponding HTML File Name |
|---|---|---|
| bpi.enrollment.cobra.new.general | Group Information | /bpi/cas/enrollment/cobra/new/generalinfo/GeneralInfo.jsp |
| bpi.enrollment.cobra.new.billing | Billing Info | /bpi/cas/enrollment/cobra/new/billinginfo/BillingInfo.jsp |
| bpi.enrollment.cobra.new.coverage | Coverage Info | /bpi/cas/enrollment/cobra/new/coverageinfo/CoverageInfo.jsp |
| bpi.enrollment.cobra.new.dependent | Dependent Information | /bpi/cas/enrollment/cobra/new/dependentinfo/DependentInfo.jsp |
| bpi.enrollment.cobra.new.searchcobra | Cobra Search | /bpi/cas/enrollment/cobra/new/cobrasearch/CobraSearch.jsp |
| bpi.enrollment.cobra.new.missing | Missing Information | /bpi/cas/enrollment/cobra/new/missinginfo/MissingInfo.jsp |
| bpi.enrollment.cobra.new.inactivate | Group Inactivate | /bpi/cas/enrollment/cobra/new/groupinactivate/GroupInactivate.jsp |
| bpi.enrollment.cobra.new.confirmation | Confirmation | /bpi/cas/enrollment/cobra/new/confirmation/Confirmation.jsp |
| bpi.enrollment.cobra.existing.employeesearch | Employee Search | /bpi/cas/enrollment/cobra/existing/employeesearch/EmployeeSearch.jsp |
| bpi.enrollment.cobra.existing.memberprocess | Member Process | /bpi/cas/enrollment/cobra/existing/memberprocess/MemberProcess.jsp |
| bpi.enrollment.cobra.existing.general | Existing General Information | /bpi/cas/enrollment/cobra/existing/generalinfo/GeneralInfo.jsp |
| bpi.enrollment.cobra.existing.billing | Existing Billing Info | /bpi/cas/enrollment/cobra/existing/billinginfo/BillingInfo.jsp |
| bpi.enrollment.cobra.existing.coverage | Existing Coverage Info | /bpi/cas/enrollment/cobra/existing/coverageinfo/CoverageInfo.jsp |
| bpi.enrollment.cobra.existing.dependent | Existing Dependent Info | /bpi/cas/enrollment/cobra/existing/dependentinfo/DependentInfo.jsp |
| bpi.enrollment.cobra.existing.searchcobra | Existing Cobra Search | /bpi/cas/enrollment/cobra/existing/cobrasearch/CobraSearch.jsp |
| bpi.enrollment.cobra.existing.missing | Existing Missing Info | /bpi/cas/enrollment/cobra/existing/missinginfo/MissingInfo.jsp |
| bpi.enrollment.cobra.existing.confirmation | Existing confirmation | /bpi/cas/enrollment/cobra/existing/confirmation/Confirmation.jsp |
| bpi.enrollment.cobra.existing.inactivate | Existing Inactivate | /bpi/cas/enrollment/cobra/existing/groupinactivate/GroupInactivate.jsp |

3.1.2 User Interface Id: BPI_SCR_EN__002__001—Group Search 3.1.2.1 Screen Name: Group Search (See FIG. I-3)

3.1.2.2 Element Name, Element Type, Label & Purpose

| Element Name | Element Type | Label | Purpose |
|---|---|---|---|
| Group Id | Text | Group Id | To provide text |
| Group Id | Entry Field | Group Id | Enter the group Id for Search |
| Group Name | Text | Group Name | To provide text |
| Group Name | Entry Field | Group Name | To enter group name for search |
| Group Phone | Text | Group Phone | To provide text |
| Group phone | Entry field | Group phone | Enter group phone number for search |
| Search | HTML button | Search | Button for searching the Group |
| Table | HTML Table | Table | Table to display group information |
| Select Group | Radio Button | Select Group | Button to select the group for Attaching the COBRA members |

| Element Name | Element Type | Label | Purpose |
|---|---|---|---|
| Single Member | Radio Button | Single Member | To choose if the COBRA Member is enrolling as a single member |
| Member With dependent | Radio Button | Member With dependent | To choose if the COBRA Member is enrolling as a member with dependent |
| Dependent Member Count | Entry Field | Dependent Member Count | Field to enter the number of dependent members being added to the member as COBRA |

3.1.2.3 Screen Validations

| Element Name | Action/Validation Details | Message |
|---|---|---|
| Group ID | Enter valid group ID only | Error Dialog Box: "Please enter valid group ID" |
| Group Name | Enter the group name | None |
| Group Phone | Enter valid phone number for the group | Error Dialog Box: "Please enter valid phone number" |
| Search | On click of the search button should list the groups or a single group based on the search criteria. | None |
| Select Group | If the groups are multiple then the radio button option to select the specific group should be provided. If the Group available is only one then it should be selected by default. | Error Dialog Box: "Please select a group with whom you would like to add COBRA member" |
| Select member Only or Member with dependent | There should be option either to select single member or member with dependent. | None |
| Dependent Member Count | If the option selected is member with dependent specify the number of dependents. | Error Dialog Box: "Please enter the number of dependent as the option selected is member with dependent. |

3.1.2.4 Help Menu

New Business enrollment can bring in the members as COBRA. This screen is used for adding the COBRA members to the new business groups based on the selection of the group.

| Element Name | Purpose | Valid Values |
|---|---|---|
| Search | To search for the Group | Should list single or multiple groups based on the search criteria. |
| Single Member or member with dependent | This is to specify if the member is availing COBRA benefits individually or with dependents | None |
| Dependent Member Count | Specify the count of the dependent members to be enrolled with the primary member as COBRA. | None |

3.1.3 User Interface Id: BPI_SCR_EN__002__002—Group Information 3.1.3.1 Screen Name: Group Information (See FIG. I-4)

3.1.3.2

| Element Name | Element Type | Label | Purpose |
|---|---|---|---|
| Employer Information | Text | Employer Information | To provide text |
| Date PM | Text | Date PM | To provide text |
| Date PM | Entry field | Date PM | Provide entry for Date Postmarked |
| Date Recd | Text | Date Recd | To provide text |
| Date Recd | Entry field | Date Recd | Provide entry for Date Received |
| Salutation | Text | Salutation | To provide text |
| Salutation | Drop Down List | Salutation | List the Salutation MR., MRS., MS. |
| First name | Text | First name | To provide text |
| First name | Entry field | First name | Provide entry field for the First name |
| Last name | Text | Last name | To provide text |
| Last Name | Entry Field | Last Name | Provide entry field for the Last name |
| MI | Text | MI | To provide text |
| MI | Entry Field | MI | Enter the middle initial |
| Suffix | Text | Suffix | To provide text |
| Suffix | List | Suffix | List the suffix for selection |
| Social Security Number | Text | Social Security Number | To provide text |
| SSN | Entry field | SSN | Enter the SSN number |
| Unique ID | Text | Unique ID | To provide text |
| Unique ID | Entry field (Un editable). | Unique ID | Show the unique ID generated |
| Auto Generate | HTML button | Auto Generate | Button to generate Unique Id if SSN is not provided |
| Date of Birth | Text | Date of Birth | To provide text |
| Date of Birth | Calendar | Date of Birth | Calendar to select the birth date, Should also allow to enter date of birth as MM/DD/YYYY |
| Gender | Text | Gender | To provide text |
| Gender | List | Gender | List whether Male or Female |
| Physical Main Address | Text | Physical Main Address | To provide text |
| Street Address | Entry field | Street Address | Enter the street address |
| Suite/Apts. | Text | Suite/Apts. | To provide text |
| Suite/Apts. | Entry Field | Suite/Apts. | Enter the suite/apts. number |
| City | Text | City | To provide text |
| City | Entry Field | City | Enter the city name |
| State | Text | State | To provide text |
| State | Drop Down List | State | List all the state in US |
| ZIP | Text | ZIP | To provide text |
| ZIP | Entry Field | ZIP | Enter zip code |
| Service Area | Text | Service Area | To provide text |
| Service Area | Entry Field (un editable) or list | Service Area | Shows the Service Area based on the ZIP code typed Show list if the ZIP has multiple service area |
| County | Text | County | To provide text |
| County | Entry Field (un editable) | County | Display the county name based on the zip and service area selected |
| Preferred mode of correspondence | Text | Preferred mode of correspondence | To provide text |
| Mode of correspondence | Drop Down List | Mode of correspondence | List the mode of communication, USPS, FAX, or email/web. Phone is not allowed. |
| Phone number | Text | Phone number | To provide text |
| Phone | Entry Field | Phone | To enter phone number |
| Home FAX No. | Text | Home FAX No. | To provide text |
| FAX | Entry Field | FAX | To enter FAX number |
| Extension | Entry Field | Extension | To enter extension number |
| E-Mail Address | Text | E-Mail Address | To provide text |
| E-mail Address | Entry field | E-mail Address | Enter email address |
| Mailing Address | Text | Mailing Address | To provide text |
| Street Address | Text | Street Address | To provide text |
| Street Address | Entry field | Street Address | Enter the street address |
| Suite/Apts./PO Box # | Text | Suite/Apts./PO Box # | To provide text |
| Suite/Apts./PO Box # | Entry Field | Suite/Apts./PO Box # | Enter the suite/apts. number |
| City | Text | City | To provide text |
| City | Entry Field | City | Enter the city name |
| State | Text | State | To provide text |
| State | Drop Down List | State | List all the state in US |
| ZIP | Text | ZIP | To provide text |
| ZIP | Entry Field | ZIP | Enter zip code |
| Cancel | HTML Reset Button | Cancel | To cancel the operation and reset for new selection |
| Continue | HTML Submit Button | Continue | To save the data gathered in this screen and continue to the next screen BPI_CAS_SCR_EN_002_003 |

3.1.3.3 Screen Validations

| Element Name | Action/Validation Details | Message |
|---|---|---|
| Salutation | Refer Document No. BPI_CAS_FSD_COMMON | Refer Document No. BPI_CAS_FSD_COMMON |
| First name | Refer Document No. BPI_CAS_FSD_COMMON | Refer Document No. BPI_CAS_FSD_COMMON |
| Last name | Refer Document No. BPI_CAS_FSD_COMMON | Refer Document No. BPI_CAS_FSD_COMMON |
| MI | Refer Document No. BPI_CAS_FSD_COMMON | Refer Document No. BPI_CAS_FSD_COMMON |
| Suffix | Refer Document No. BPI_CAS_FSD_COMMON | Refer Document No. BPI_CAS_FSD_COMMON |
| Birth date | Refer Document No. BPI_CAS_FSD_COMMON | Refer Document No. BPI_CAS_FSD_COMMON |
| SSN | Refer Document No. BPI_CAS_FSD_COMMON | Refer Document No. BPI_CAS_FSD_COMMON |
| Unique Id | Unique 9 digit ID should be generated if the SSN number is not provided. This unique ID should not be repeated for any employee. Also unique Id should be generated on change mode. Number should start with 999 999 000 and start | None |

-continued

| Element Name | Action/Validation Details | Message |
|---|---|---|
| | descending e.g. 999 998 999 999 998 998 and so on | |
| Street Address | Refer Document No. BPI_CAS_FSD_COMMON | Refer Document No. BPI_CAS_FSD_COMMON |
| Suite/ Apts. | Refer Document No. BPI_CAS_FSD_COMMON | Refer Document No. BPI_CAS_FSD COMMON |
| City | Refer Document No. BPI_CAS_FSD_COMMON | Refer Document No. BPI_CAS_FSD_COMMON |
| State | Refer Document No. BPI_CAS_FSD_COMMON | Refer Document No. BPI_CAS_FSD_COMMON |
| ZIP | Refer Document No. BPI_CAS_FSD_COMMON | Refer Document No. BPI_CAS_FSD_COMMON |
| Service Area | Should pick up the service area based on the Zip code number typed in the above ZIP entry field from the database If there are multiple service area then it should list the service area for picking up the service area. | None |
| County | Show the county name based on the ZIP code and Service area combination | none |
| Mode of Com-munica-tion | List mode of communications like USPS, FAX, Email/ Web and others. If the option selected is Email then the Email address field cannot be blank. Default Option should be - choose one - If none is selected should throw error message. | Error Dialog Box: "Please choose the mode of communication" |
| Phone | Refer Document No. BPI_CAS_FSD_COMMON | Refer Document No. BPI_CAS_FSD_COMMON |
| Extension | Refer Document No. BPI_CAS_FSD_COMMON | Refer Document No. BPI_CAS_FSD_COMMON |
| FAX | Refer Document No. BPI_CAS_FSD_COMMON | Refer Document No. BPI_CAS_FSD_COMMON |
| Extension | Refer Document No. BPI_CAS_FSD_COMMON | Refer Document No. BPI_CAS_FSD_COMMON |
| E-mail Address | Refer Document No. BPI_CAS_FSD_COMMON | Refer Document No. BPI_CAS_FSD_COMMON |
| Gender | Refer Document No. BPI_CAS_FSD_COMMON | Refer Document No. BPI_CAS_FSD_COMMON |
| Street Address | Refer Document No. BPI_CAS_FSD_COMMON | Refer Document No. BPI_CAS_FSD_COMMON |
| Suite/ Apts. | Refer Document No. BPI_CAS_FSD_COMMON | Refer Document No. BPI_CAS_FSD_COMMON |
| City | Refer Document No. BPI_CAS_FSD_COMMON | Refer Document No. BPI_CAS_FSD_COMMON |
| State | Refer Document No. BPI_CAS_FSD_COMMON | Refer Document No. BPI_CAS_FSD_COMMON |
| ZIP | Refer Document No. BPI_CAS_FSD_COMMON | Refer Document No. BPI_CAS_FSD_COMMON |
| Cancel | Reset Button | To reset the value in the Entry Field to its previous state as was on loading the page |
| Continue | Should function with Enter Key Cursor Positioned on the "Continue" button or on Mouse Click. Check for all the validation on the fields If any data type error throw error message. Allows blank entry On Success Leads to the next page for filling further information on the employee. Screen BPI_CAS_SCR_EN_002_003 | Error Dialog Box: "The value entered for the Field Name is erroneous. Please enter valid values. "Please choose the mode of communication" |

3.1.3.4 Help Menu

This screen is used for filling up the primary COBRA member information. The information contained here is the personal information and the address information. The ZIP and the service are provided here governs the rate calculation for the COBRA member.

| Element Name | Purpose | Valid Values |
|---|---|---|
| Continue | On clicking the button leads to the next page for filling up the dependent information if applicable of member coverage information. | None |

3.1.4 User Interface Id: BPI_SCR_EN__002__003—Dependent Information 3.1.4.1 Screen Name: Dependent Information (See FIG. I-5)

3.1.4.2 Element Name, Element Type, Label & Purpose

| Element Name | Element Type | Label | Purpose |
|---|---|---|---|
| Salutation | Text | Salutation | To provide text |
| Salutation | List | Salutation | List type of salutation |
| Dependent First name | Text | Dependent First name | To provide text |
| First Name | Entry Field | First Name | Enter the first name |
| Dependent Last name | Text | Dependent Last name | To provide text |
| Last name | Entry field | Last name | Enter the last name |
| MI | Text | MI | To provide text |
| MI | Entry Field | MI | Enter the middle initial |
| Suffix | Text | Suffix | To provide text |
| Suffix | Entry Field | Suffix | Enter the suffix |
| Dependent Social Security Number | Text | Dependent Social Security Number | To provide text |
| SSN | Text | SSN | To provide text |
| SSN | Entry field | SSN | Enter the SSN number |
| Unique ID | Text | Unique ID | To provide text |
| Unique ID | Entry field (Un editable). | Unique ID | Show the unique ID generated |
| Gender | Text | Gender | To provide text |
| Gender | List | Gender | List the gender |
| Relationship | Text | Relationship | To provide text |
| Relationship | List | Relationship | List all types of relationship like spouse, domestic partner, child, step child others |
| Birth Date | Text | Birth Date | To provide text |
| Birth Date | Calendar | Birth Date | Calendar to choose the birth date |
| Add Dependent | HTML Submit Button | Add Dependent | To add the above dependent Information to the html table below |
| Table | HTML Table | Table | Table for adding up the dependent information |
| Delete | Button (HTML Button) | Delete | To delete the items checked for deletion |

-continued

| Element Name | Element Type | Label | Purpose |
|---|---|---|---|
| Check All | Text Link | Check All | To check all the check boxes in the table |
| Clear All | Text Link | Clear All | To un check all the check boxes checked in the table |
| Delete | Check box | Delete | To check the items for deletion |
| Edit | Button (HTML Button) | Edit | To edit the items against the row selected for edition |
| Disabled | Text | Disabled | To provide text |
| Disabled Radio Button | Radio Button | Disabled Radio Button | Temporary or permanent disability (Can be only one or the other) Default NONE. |
| Domestic Partner | Text | Domestic Partner | To provide text |
| Domestic Partner | Check box | Domestic Partner | Is Form available if so check. |
| Legal Guardian | Text | Legal Guardian | To provide text |
| Legal Guardian | Check box | Legal Guardian | Is Form available if so check. |
| Signature | Text | Signature | To provide text |
| Signature | Check box | Signature | Is signature available if check |
| Continue | HTML Button | Continue | On clicking the continue button save the information |
| Cancel | HTML reset Button | Cancel | To reset to the state as was before loading the page |

3.1.4.3 Screen Validations

| Element Name | Action/Validation Details | Message |
|---|---|---|
| First Name | Refer BPI_CAS_FSD_Common | Refer BPI_CAS_FSD_Common |
| Last name | Refer BPI_CAS_FSD_Common | Refer BPI_CAS_FSD_Common |
| MI | Refer BPI_CAS_FSD_Common | Refer BPI_CAS_FSD_Common |
| Suffix | Refer BPI_CAS_FSD_Common | Refer BPI_CAS_FSD_Common |
| SSN Number | Refer BPI_CAS_FSD_Common | Refer BPI_CAS_FSD_Common |
| Unique Id | Unique 9 digit ID should be generated if the SSN number is not provided. This unique ID should not be repeated for any employee. Also unique Id should be generated on change mode. Number should start with 999 999 000 and start descending e.g. 999 998 999 999 998 998 and so on | None |
| Birth Date | Refer BPI_CAS_FSD_Common | Refer BPI_CAS_FSD_Common |
| Gender | Refer BPI_CAS_FSD_Common | Refer BPI_CAS_FSD_Common |
| Relationship | Default option should be - Choose one -. If none is selected throw error message | Error Dialog Box: "Please select the relationship of the dependent with the employee" |
| Add Dependent | On clicking the Add Dependent the dependent information gets filled in the HTML Table. All validation checks are performed on the entry field before adding the dependent. | Error Dialog Box: "The value entered in the field name is incorrect. Please enter valid entries" |
| Table | Should have column header and each subsequent row should be identified by alternate color combinations. i.e. First row should have color 'x' and the next row should have color 'y'. The next row should have color 'x' again and so on. The size of any text inside any cell should be wrapped if the text becomes too long. Note: The values inside the table on create mode would be blank. If this screen is reached on edit/change mode then the values inside the table would be green in color if retrieved from the database, if temporarily added then it would be red in color. | None |
| Delete | Should function with Enter Key Cursor Positioned on the "Delete" button or on Mouse Click. Delete Button should work on multiple deletes based on the check box or boxes selected. If the user clicks on the delete button without checking any of the delete check box should throw error message. Success: Deletes the row or rows from the HTML Table (temporary storage) | Error Dialog Box: "Please choose the row or rows to be deleted." |
| Check All | On clicking the "Check All" link should check all the check boxes in the HTML table. | On clicking the "Check All" link should check all the check boxes in the HTML table. |
| Clear All | On clicking the "Clear All" link should uncheck all the checked check boxes in the HTML table. | On clicking the "Clear All" link should uncheck all the checked check boxes in the HTML table. |
| Delete | Check box option with default "unchecked" | Check box option with default "unchecked" |
| Edit | Should function with Enter Key Cursor Positioned on the "Edit" button or on Mouse Click. On clicking the edit button the row edited should be removed from the HTML table and the data should be populated back on the editable entry fields. On clicking the edit for the data that is Green in color (permanent data) the edit becomes disabled and the Add button becomes Update. On clicking edit for the red color data (temporary data) the row with the data disappears from the table | On clicking the edit button the row edited should be removed from the HTML table and the data should be populated back on the editable entry fields. |
| Domestic Partner | Default is un checked. Allow to check if applicable | None |
| Legal Guardian | Default is un checked. Allow to check if applicable | None |
| Signature | Default is un checked. Allow to check if applicable | None |
| Continue | Should function with Enter Key Cursor Positioned on the "Continue" button or on Mouse Click. On success should save the data lead to the next page. | Dialog Box: "Do you want to add the coverage information before continuing" Yes/No |
| Cancel | Should reset to the state as was before loading the page. | None |

3.1.4.4 Help Menu

This screen is used for filling up the dependent COBRA member information. The information contained here is the personal information. If there are multiple dependent then you can add the dependent COBRA members here.

| Element Name | Purpose | Valid Values |
|---|---|---|
| Continue | On clicking the button leads to the next page for filling up the member coverage information. | none |

3.1.5 User Interface Id: BPI_SCR_EN__002__004—Coverage Information 3.1.5.1 Screen Name: Coverage Information (See FIG. I-6)

3.1.5.2 Element Name, Element Type, Label & Purpose

| Element Name | Element Type | Label | Purpose |
|---|---|---|---|
| COBRA qualifying Event | Page sub Header | COBRA qualifying Event | To provide text |
| Initial COBRA effective date | Text | Initial COBRA effective date | To provide text |
| Date | Entry field | Date | Enter the initial effective date |
| COBRA End Date | Text | COBRA End Date | To provide text |
| Period | Entry field | Period | Enter the COBRA effective period |
| Reasons for electing COBRA | Text | Reasons for electing COBRA | To provide text |
| Reasons for electing COBRA | Drop Down List | Reasons for electing COBRA | List the reasons for COBRA election |
| Where would you like the bills to be sent | Text | Where would you like the bills to be sent | To provide text |
| Where would you like the bills to be sent | Check Box | Where would you like the bills to be sent | Check if the bill is to be sent to the group or the member |
| Is member signature verified | Text | Is member signature verified | To provide text |
| Is member signature verified | Check box | Is member signature verified | Check if signature is verified |
| Line of Coverage Selection Table | HTML Table | Line of Coverage Selection Table | Table to display the Member names and the Line of coverage check boxes for picking the line of coverage for each COBRA members |
| Coverage Selection | Check Box | Coverage Selection | Check box to select the line of coverage |
| Show Coverage Choice | HTML button | Show Coverage Choice | Button to show the coverage choice for each line of coverage based on the check box/boxes checked. |

-continued

| Element Name | Element Type | Label | Purpose |
|---|---|---|---|
| Continue | HTML Button | Continue | Button to save the data and lead to the next screen for showing the summary and selection of Benefit level offered by carriers (Screen BPI_CAS_SCR_EN_002_004) |

3.1.5.3 Screen Validations

| Element Name | Action/Validation Details | Message |
|---|---|---|
| Date | Defaults to system date. User can either enter the date of pick the date form the calendar | Error Dialog Box: "Date cannot be future date" Please enter past date" |
| COBRA effective period | Defaults to 18 months. Can be changed by the user. | None |
| Reasons for electing COBRA | List the qualifying reasons for COBRA. | None |
| Where would you like the bills to be sent | Option to bill either the group of the COBRA member based on the flag checked | None |
| Is member signature verified | Check if the member signature is verified | None |
| Line of Coverage Selection Table | Table to show the Line of coverage against each member for picking the option. The Line of coverage displayed is based on the line of coverage selected by the primary group.<br>Note: The table would display the Member name in the following priority.<br>Employee as primary member<br>Spouse as the next member<br>Other members would be listed based on the age. | None |
| Coverage Selection | Check Box to pick any combination of coverage's for all the member for this specific COBRA group | None |
| Show Coverage Choice | On click of the Coverage choice system should identify the coverage choice based on the options checked. Whether member only, member and spouse etc. | None |
| Continue | On clicking the continue button saves the data and leads to the page BPI_CAS_SCR_EN_002_005 | Dialog Box: "Are you sure to continue" |

3.1.5.4 Help Menu

This screen is used for filling up the COBRA qualifying events and the COBRA tenure for the members. Also there is an option to select the line of coverage opted for the various members.

| Element Name | Purpose | Valid Values |
|---|---|---|
| Continue | On clicking the button leads to the next page | None |

| Element Name | Purpose | Valid Values |
|---|---|---|
| | for selecting the benefit level (Carrier) | |

3.1.6 User Interface Id: BPI_SCR_EN__002__006—Summary/Missing Information 3.1.6.1 Screen Name: Missing Info (See FIG. I-7)

3.1.6.2 Element Name, Element Type & Purpose

| Element Name | Element Type | Label | Purpose |
|---|---|---|---|
| Member Missing Information | Text | Member Missing Information | To provide text |
| Employee Tab | Expandable Tree | Employee Tab | Should be able to expand the Employee Tab to list the Details for the Employee Missing and information and Also show an expandable tab for the Dependent Missing Information |
| Enrollment Status | Drop Down List | Enrollment Status | List the status of enrollment. Can be Enroll or Decline |
| Remarks | Entry Field | Remarks | Remark for the status of enrollment |
| Reasons for Decline | Drop Down List | Reasons for Decline | List the reasons for decline |
| Other Reasons | Entry Field | Other Reasons | Any other reasons for decline or others |
| Cancel | HTML Button | Cancel | To reset the operation |
| Process Enrollment | HTML Button | Process Enrollment | Process the enrollment and leads to the enrollment confirmation page. BPI_CAS_SCR_EN_001_011 |

3.1.6.3 Screen Validations

| Element Name | Action/Validation Details | Message |
|---|---|---|
| Enrollment Status | List the status of enrollment. default option should be - choose one - If the option selected is Decline. Should list the list box containing reasons for the decline. If none is selected throw error message. | The Error Dialog Box: “Please choose enrollment status before continuing.” |
| Remarks | Can accept any character. | |
| Reasons for Decline | List the reasons for the decline. The default option should be - choose one - If none is selected throw error message. | Error Dialog Box: “Please choose reasons for declining before continuing.” |
| Other Reasons | Can accept any character. | None |
| Cancel | Resets to the status as was on loading this page. | None |
| Process Enrollment | Should function with Enter Key Cursor Positioned on the “Process Enrollment” button or on Mouse Click. On success leads to the confirmation page. BPI_CAS_SCR_EN_001_011 It checks the eligibility rule for the COBRA member once again. Process the post enrollment activity like sending emails, | Error Dialog Box: “Please choose enrollment status before continuing.” “Please choose reasons for declining before continuing.” |

| Element Name | Action/Validation Details | Message |
|---|---|---|
| | welcome letter. First month invoices and email alert to GMS, Sales and finance. | |

3.1.7 User Interface Id: BPI_SCR_EN__002__007—Existing COBRA Employee Search 3.1.7.1 Screen Name: Employee Search (See FIG. I-8)

3.1.7.2 Element Name, Element Type & Purpose

| Element Name | Element Type | Label | Purpose |
|---|---|---|---|
| Group ID | Text | Group ID | To provide text |
| Group Id | Entry field | Group Id | Enter the group id for searching the employee |
| Employee ID | Text | Employee ID | To provide text |
| Employee ID | Entry field | Employee ID | Enter the Employee ID for searching the employee |
| Employee SSN | Text | Employee SSN | To provide text |
| Employee SSN | Entry field | Employee SSN | Enter the Employee SNN for searching the employee |
| Phone number | Text | Phone number | To provide text |
| Phone number | Entry field | Phone number | Enter the Employee Phone number for searching the employee |
| List Employee | HTML Tree | List Employee | Tree to List the Employee and their dependent |
| Employee Table | HTML Table | Employee Table | Table to list employee information and status |
| Dependent Table | HTML table | Dependent Table | Table to list dependent information and status |
| Process COBRA | HTML button | Process COBRA | Button to check the COBRA eligibility and take to the next page BPI_CAS_SCR_EN_002_008 if eligible. If not the show the same page. |

3.1.7.3 Screen Validations

| Element Name | Action/Validation Details | Message |
|---|---|---|
| Group Id | Enter the Group ID or pick the group ID based on the Group search | Group ID can be entered along with any other valid fields for the employee provided below. |
| Employee ID | Enter the employee Id or pick the employee based on the employee search window. | Note: At least on of the field with the search criteria for the employee must be entered |
| Employee SSN | Enter the employee SSN or pick the employee based on the employee search window. | Note: At least on of the field with the search criteria for the employee must be entered |
| Phone number | Enter the employee Phone or pick the employee based on the employee search window. | Note: At least on of the field with the search criteria for the employee must be entered |
| List Employee | Tree to open up if dependent exist for the employee | None |
| Employee Table | List the employee with status and effective date | None |
| Dependent Table | List the dependent with status and effective date | None |
| Process | Check the status and term | Embedded error if non-of |

-continued

| Element Name | Action/Validation Details | Message |
|---|---|---|
| COBRA | reasons and process the eligibility check for the existing member to COBRA Note: It should check the following status. Term Status, Term reasons Only the member termed all eligible for the COBRA. The reasons for term can either decline COBRA enrollment or define the COBRA period. | the member is termed or not qualifies for COBRA. |

3.1.8 User Interface Id: BPI_SCR_EN__002__008—Existing COBRA Enrollment 3.1.8.1 Screen Name: COBRA Enrollment (See FIG. I-9)

3.1.8.2 Element Name, Element Type & Purpose

| Element Name | Element Type | Label | Purpose |
|---|---|---|---|
| COBRA qualifying Event | Page sub Header | COBRA qualifying Event | To provide text |
| Initial COBRA effective date | Text | Initial COBRA effective date | To provide text |
| Date | Entry field | Date | Enter the initial effective date |
| COBRA End Date | Text | COBRA End Date | To provide text |
| Period | Entry field | Period | Enter the COBRA effective period Default to the period based on the qualifying event. |
| Reasons for Term | Text | Reasons for Term | To provide text |
| Reasons for Term | Dynamic Text | Reasons for Term | Reasons for Term based on the term reasons provided |
| Term Date | Text | Term Date | To provide text |
| Term Date | Dynamic text | Term Date | Display the term date of the member |
| Where would you like the bills to be sent | Text | Where would you like the bills to be sent | To provide text |
| Where would you like the bills to be sent | Check Box | Where would you like the bills to be sent | Check if the bill is to be sent to the group or the member |
| Is member signature verified | Text | Is member signature verified | To provide text |
| Is member signature verified | Check box | Is member signature verified | Check if signature is verified |
| Line of Coverage Selection Table | HTML Table | Line of Coverage Selection Table | Table to display the Member names and the Line of coverage check boxes for picking the line of coverage for each COBRA members |
| Check if member is not enrolling for COBRA | Check box | Check if member is not enrolling for COBRA | Check if the member is not enrolling for COBRA |
| Coverage Selection | Check Box | Coverage Selection | Check box to select the line of coverage |
| Show Coverage Choice | HTML button | Show Coverage Choice | Button to show the coverage choice for each line of coverage based on the check box/boxes checked. |
| Continue | HTML Button | Continue | Button to save the data and lead to the next screen for showing the summary and selection of Benefit level offered by carriers (Screen BPI_CAS_SCR_EN_002_009) |

3.1.8.3 Screen Validations

| Element Name | Action/Validation Details | Message |
|---|---|---|
| Date | Default to the date next to the term date. Allow for making changes based on authorization | Error Dialog Box: “Date cannot be prior to the term date. Please enter the valid date” |
| Period | Default to the period based on the Qualifying events. Allow to change based on authorization | none |
| Where would you like the bills to be sent | Check the option for billing, Whether to the group or the member | none |
| Is member signature verified | Check if signature is verified | none |
| Line of Coverage Selection Table | Table to show the Line of coverage against each member for picking the option. The Line of coverage displayed is based on the line of coverage selected by the primary group. Note: The table would display the Member name in the following priority. Employee as primary member Spouse as the next member Other members would be listed based on the age. | None |
| Check if member is not enrolling for COBRA | This is check if the member is not opting for the COBRA | None |
| Coverage Selection | Check Box to pick any combination of coverage’s for all the member for this specific COBRA group | None |
| Show Coverage Choice | On click of the Coverage choice system should identify the coverage choice based on the options checked. Whether member only, member and spouse etc. | None |
| Continue | On clicking the continue button saves the data and leads to the page BPI_CAS_SCR_EN_002_009 | Dialog Box: “Are you sure to continue” |

3.1.9 User Interface Id: BPI_SCR_EN__002__009—Primary Member Information 3.1.9.1 Screen Name: Primary Member Information (See FIG. I-10)

Note: This screen is pre filled with the employee information available in the employee master for all the members and the dependents belonging to this employee. Changes can be made to the information as applicable.

3.1.9.2

| Element Name | Element Type | Label | Purpose |
|---|---|---|---|
| Main Address | Text | Main Address | To provide text |
| Street Address | Entry field | Street Address | Enter the street address |
| Suite/ Apts. | Text | Suite/Apts. | To provide text |
| Suite/ Apts. | Entry Field | Suite/Apts. | Enter the suite/apts. number |
| City | Text | City | To provide text |
| City | Entry Field | City | Enter the city name |
| State | Text | State | To provide text |
| State | Drop Down List | State | List all the state in US |
| ZIP | Text | ZIP | To provide text |
| ZIP | Entry Field | ZIP | Enter zip code |
| Service Area | Text | Service Area | To provide text |
| Service Area | Entry Field(un editable) or list | Service Area | Shows the Service Area based on the ZIP code typed Show list if the ZIP has multiple service area |
| County | Text | County | To provide text |
| County | Entry Field(un editable) | County | Display the county name based on the zip and service area selected |
| Preferred mode of correspon-dence | Text | Preferred mode of correspondence | To provide text |
| Mode of correspon-dence | Drop Down List | Mode of correspondence | List the mode of communication, USPS, FAX, email |
| Home Phone number | Text | Home Phone number | To provide text |
| Phone | Entry Field | Phone | To enter phone number |
| Extension | Entry Field | Extension | To enter extension number |
| Home FAX No. | Text | Home FAX No. | To provide text |
| FAX | Entry Field | FAX | To enter FAX number |
| Extension | Entry Field | Extension | To enter extension number |
| E-Mail Address | Text | E-Mail Address | To provide text |
| E-mail Address | Entry field | E-mail Address | Enter email address |
| Alternate Address | Text | Alternate Address | To provide text |
| Street Address | Text | Street Address | To provide text |
| Street Address | Entry field | Street Address | Enter the street address |
| Suite/ Apts./PO Box # | Text | Suite/Apts./ PO Box # | To provide text |
| Suite/ Apts./ PO Box # | Entry Field | Suite/Apts./ PO Box # | Enter the suite/apts. number |
| City | Text | City | To provide text |
| City | Entry Field | City | Enter the city name |
| State | Text | State | To provide text |
| State | Drop Down List | State | List all the state in US |
| ZIP | Text | ZIP | To provide text |
| ZIP | Entry Field | ZIP | Enter zip code |
| Cancel | HTML Reset Button | Cancel | To cancel the operation and reset for new selection |
| Continue | HTML Submit Button | Continue | To save the data gathered in this screen and continue to the next screen BPI_CAS_SCR_EN_002_010 |

3.1.9.3 Screen Validations

| Element Name | Action/Validation Details | Message |
|---|---|---|
| Street Address | Refer Document No. BPI_CAS_FSD_COMMON | Refer Document No. BPI_CAS_FSD_COMMON |
| Suite/Apts. | Refer Document No. BPI_CAS_FSD_COMMON | Refer Document No. BPI_CAS_FSD_COMMON |
| City | Refer Document No. BPI_CAS_FSD_COMMON | Refer Document No. BPI_CAS_FSD_COMMON |
| State | Refer Document No. BPI_CAS_FSD_COMMON | Refer Document No. BPI_CAS_FSD_COMMON |
| ZIP | Refer Document No. BPI_CAS_FSD_COMMON | Refer Document No. BPI_CAS_FSD_COMMON |
| Service Area | Should pick up the service area based on the Zip code number typed in the above ZIP entry field from the database If there are multiple service area then it should list the service area for picking up the service area. | None |
| County | Show the county name based on the ZIP code and Service area combination | none |
| Mode of Com-munication | List mode of communications like USPS, FAX, Email and others. If the option selected is Email then the Email address field cannot be blank. Default Option should be - choose one - If none is selected should throw error message. | Error Dialog Box: "Please choose the mode of communication" |
| Phone | Refer Document No. BPI_CAS_FSD_COMMON | Refer Document No. BPI_CAS_FSD_COMMON |
| Extension | Refer Document No. BPI_CAS_FSD_COMMON | Refer Document No. BPI_CAS_FSD_COMMON |
| FAX | Refer Document No. BPI_CAS_FSD_COMMON | Refer Document No. BPI_CAS_FSD_COMMON |
| Extension | Refer Document No. BPI_CAS_FSD_COMMON | Refer Document No. BPI_CAS_FSD_COMMON |
| E-mail Address | Refer Document No. BPI_CAS_FSD_COMMON | Refer Document No. BPI_CAS_FSD_COMMON |
| Street Address | Refer Document No. BPI_CAS_FSD_COMMON | Refer Document No. BPI_CAS_FSD_COMMON |
| Suite/ Apts. | Refer Document No. BPI_CAS_FSD_COMMON | Refer Document No. BPI_CAS_FSD_COMMON |
| City | Refer Document No. BPI_CAS_FSD_COMMON | Refer Document No. BPI_CAS_FSD_COMMON |
| State | Refer Document No. BPI_CAS_FSD_COMMON | Refer Document No. BPI_CAS_FSD_COMMON |
| ZIP | Refer Document No. BPI_CAS_FSD_COMMON | Refer Document No. BPI_CAS_FSD_COMMON |
| Cancel | Reset Button | To reset the value in the Entry Field to its previous state as was on loading the page |
| Continue | Should function with Enter Key Cursor Positioned on the "Continue" button or on Mouse Click. Check for all the validation on the fields If any data type error throw error message. Allows blank entry On Success Leads to the next page for filling further information on the employee. Screen BPI_CAS_SCR_EN_002_010 | Error Dialog Box: "The value entered for the Field Name is erroneous. Please enter valid values. "Please choose the mode of communication" |

3.1.10 User Interface Id: BPI_SCR_EN__002__010—Existing Coverage Information 3.1.10.1 Screen Name: Coverage Information (See FIG. I-11)

3.1.10.2 Element Name, Element Type, Label & Purpose

| Element Name | Element Type | Label | Purpose |
|---|---|---|---|
| Benefit Level (carrier Selection) | HTML Table | Benefit Level (carrier Selection) | Table to display all the Members in the row and The Benefit level selection option in the Columns. |
| Member name | Link | Member name | Provide feature to edit the member information by clicking this link |
| Coverage Choice | HTML ROW | Coverage Choice | The row get pre populated based on the choice made in the screen BPI_CAS_SCR_EN_002_009 |
| Benefit Level Name | Link | Benefit Level Name | Link to the carrier selection for the specific line of coverage if not available in the ZIP and service area of the Primary member. |
| PCP info (Available) | Link | PCP info (Available) | Link to edit the PCP info of the individual members as applicable. |
| COBRA Summary | HTML Button | COBRA Summary | Button to click for saving the date and navigating to the next page for displaying COBRA summary/missing information |
| Cancel | HTML rest button | Cancel | Button to reset to the state as was on loading the page. |

3.1.10.3 Screen Validations

| Element Name | Action/Validation Details | Message |
|---|---|---|
| Benefit Level (carrier Selection) | Should have column header and each subsequent row should be identified by alternate color combinations. I.e. First row should have color 'x' and the next row should have color 'y'. The next row should have color 'x' again and so on. The size of any text inside any cell should be wrapped if the text becomes too long. The Header and the Left Column should be distinguishable. | None |
| Member name | This is a link to edit the member information when on change or edit mode. This | None |
| PCP Info | This is a link to edit the PCP information for the specific member. If PCP information is not available then on clicking the link it allows to fill in the PCP information for the specific line of coverage. | None |
| Coverage Choice | Displays the dynamic text based on the choices checked in the previous screen BPI_CAS_SCR_EN_002_004 | None |
| Benefit Level Selection | Default benefit level would that the employee selected when the status was enrolled. On clicking the Link show a minimized window with option to select the benefit level for the specific line of coverage. Note the line of coverage is displayed based on the Group options. (i.e only if the group has selected the line of coverage. Also the benefit level (carrier) displayed is based on the ZIP code/Service area of the primary COBRA member. Only if the prior Benefit level is not available in the current ZIP/service are of the primary member this is allowed to be changed. | None |
| COBRA Summary | On clicking the COBRA Summary button save the content of this page into the repository and leads to the COBRA summary page to display the COBRA missing information. Screen BPI_CAS_SCR_EN_002_006 This also does all the COBRA eligibility checks prior to the display of summary page. | Dialog Box: "Are you sure you would like to continue" |
| Cancel | Resets to the state as was on loading the page. | none |

Note: the rest of the flow is common for both new Business COBRA and the Existing member conversion to COBRA.

Screen BPI_CAS_SCR_EN__006 followed by COBRA enrollment.

3.2 Screen Flow:

Screen Flow Diagram for COBRA Enrollment (See FIG. I-12)

4 Business Rule Mapping

| Activity | Rules |
|---|---|
| New Business COBRA (NB brings in COBRA) | Need to know initial COBRA effective date<br>Need to have system calculate COBRA end date (18 mo, 36 mo, or other) based on Term Reason (Qualifying events).<br>For system to do this we need to have the following data captured during the New Business COBRA Enrollment<br>a) Initial Effective date<br>b) Qualifying events |
| COBRA coverage | COBRA coverage has no lapse of time from the date of term & COBRA enrollment<br>Exception: Death<br>Main subscribers coverage is terminated date of death and not the end of the month: qualified beneficiaries (i.e. spouse/child) effective date of COBRA is the day after the members death<br>Note: Since the COBRA coverage has no lapse of time it should be basically effective from the day following the term date what ever be the reasons.<br>Normal terms are always done on the end of the Month.<br>Death is done on the day of the death. |
| COBRA Election | 60 days to elect COBRA coverage from the time of COBRA notification letter.<br>60 days is based off the:<br>Date that we are notified of the termination (Postmark date for termination)<br>OR<br>The termination date<br>WHICHEVER IS LATER. The decision is to be made based on manual review by GMS personnel. |
| COBRA Election for Federal COBRA | If a FED COBRA group, we need to include an additional 14 days from termination notification date because FED Employers have 14 days to notify their employees of their rights after which they notify the plan administrator/Pac Advantage). The decision is to be made based on manual review by GMS personnel. |

-continued

| | |
|---|---|
| COBRA Premium Dues | COBRA members initial premium (all premiums from effective date to current) must be made/ mailed/postmarked within 45 days from the COBRA election date (the date the application is postmarked)<br>If payment is not MADE within this time frame, the COBRA coverage is termed flat (effective date). Any partial premium payments made will be reimbursed.<br>Provide over ride for 45th day rule (ACL) (This override needs to be available upon creating the COBRA) |
| COBRA Employee governed by Employer (Groups) | If main Employer group goes into possible term status or is termed, the COBRA will need to be notified and put in same status. Employee will have the same coverage type, carrier & co-pay as when termed (continue with exact coverage as before)<br>Cannot add dependents that were not previously covered (until o/e or qualifying event) |
| Benefit Levels | Benefit level cannot change. Optional benefits and medical offered by the group is not mandatory [Line of Coverage] |
| Possible extension of COBRA coverage | Social Security disability - coverage extended to a total of 29 month (11 mo. Extension) (all other term reasons apply)<br>The main subscriber does not have to elect to extend the coverage for himself, just his dependents can elect to take the extension<br>Age 60 prior to loss of employment & worked for Employer for 5 consecutive years - coverage extended until the Employee turns age 65 (all other term reasons apply)<br>The main subscriber does not have to elect to extend the coverage for himself, just his dependents can elect to take the extension<br>Also there should be a facility to grant COBRA extension if applicable based on authority. |

| Qualifying Events | Qualifying Beneficiaries | Continuation period |
|---|---|---|
| TERMINATION_OF_EMPLOYMENT | Employee, Spouse and Children | 18 |
| REDUCTION_OF_WORK_HOURS | Employee, Spouse and Children | 18 |
| CAN_ NO LONGER_AFFORD_COVERAGE | Employee, Spouse and Children | 18 |
| OBTAINED_COVERAGE_ELSEWHERE | Employee, Spouse and Children | 18 |
| DEATH | Spouse and Children | 36 |
| ENTITLED_TO_MEDICARE | Employee, Spouse and Children | 36 |
| FRAUD_OR_MISREPRESENTATION | Employee, Spouse and Children | 36 |
| DPND OBTAINED_COVERAGE_ELSEWHERE | Employee, Spouse and Children | 18 |
| DIVORCE_OR_LEGAL_SEPARATION | Employee, Spouse and Children | 36 |
| EMPLOYEE_CANNOT_AFFORD_SPOUSE_COVERAGE | Spouse | 36 |
| DPND_DEATH | None | 18 |
| DPND_ENTITLED_TO_MEDICARE | Dependent Spouse and Children | 36 |
| DPND_FRAUD_OR_MISREPRESENTATION | None | 36 |
| OVER_AGE_23 | Dependent Child | 18 |
| NO_LONGER_AN_ELIGIBLE_DEPENDENT | Dependent Spouse and Children | 18 |
| NO_LONGER_A_DISABLED_CHILD | Dependent Child | 18 |
| EMPLOYEE_CAN_NO_LONGER_AFFORD_CHILD_COVERAGE | Child | 18 |
| OTHERS | Employee, Spouse and Children | 36 |

There are other qualifying events, which are also considered while COBRA enrollment based on their Reason For Term.

5 User Role

The respective level of user role can over rule the following missing information.

User Role Level II, Level III, Level IV

S. No., Missing Information Condition

1 SSN already exists. Employee SSN already exists

2 SSN already exists. Dependent SSN already exists

Benefit Partners INC

Process Specification

Functional Design Process Specification

1. Introduction 1.1. Purpose

This document identifies how the user interacts with the system, the data to be captured, the business logic to be implemented, and the output of the process.

1.2. Business Use Case Specification Reference

| Business Use Specification ID | Business Use Case Name |
|---|---|
| BPI_SCOPE_EN | Enrollment |
| BPI_SCOPE_EN_002 | Enrollment Add On |

Other Document Reference

| Document ID | Document name |
|---|---|
| BPI_CAS_FSD_EN | Functional Specification Document - Enrollment |
| BPI_CAS_FSD_EN_001 | Process Flow - New Business Enrollment |
| BPI_CAS_FSD_EN_003 | Process Flow - COBRA Enrollment/Changes |
| BPI_CAS_FSD_EN_005 | Process Flow - Termination/Reinstatement |
| BPI_CAS_RULEBOX | RULE BOX for Add on and change |

1.3. Definitions, Acronyms & Abbreviations

| Term | Explanation |
|---|---|

2. Process Identification

Process Flow and Description

This process is used to make changes to the Existing groups/members or dependents or add a new member/dependent to the Group or employee based on the business rules associated with changes and "Add ON's".

2.1. Background 2.2. Process Description

The objective of the process 2.3. Process Flow

This process is used to make changes to the Existing groups/members or dependents or add a new member/dependent to the Group or employee based on the business rules associated with changes and "Add ON's".

2.4. User Interface Screens
2.4.1. Screen ID's

| Screen ID (SID) | Screen Name | Corresponding HTML File Name |
|---|---|---|
| Enrollment.addon.newemp.groupsearch | Group Search | bpi/cas/enrollment/addon/newemp/groupsearch |
| Enrollment.addon.newemp.changerequest | ChangeRequest | bpi/cas/enrollment/addon/newemp/changerequest |
| Enrollment.addon.newemp.groupgeneral | EmployeeGeneralInfo | bpi/cas/enrollment/addon/newemp/addemployee |
| Enrollment.addon.newemp.employeecoverage | EmployeeCoverageInfo | bpi/cas/enrollment/addon/newemp/employeecoverage |
| Enrollment.addon.newemp.dependent | DependentGeneralInfo | bpi/cas/enrollment/addon/newemp/adddependent |
| Enrollment.addon.newemp.missing | PreEnrollment | bpi/cas/enrollment/addon/newemp/preenrollment |
| Enrollment.addon.newemp.summary | EnrollmentSummary | bpi/cas/enrollment/addon/newemp/enrollmentsummary |
| Enrollment.addon.newemp.confirmation | Confirmation | bpi/cas/enrollment/addon/newemp/confirmation |
| Enrollment.addon.newemp.employeesearch | Employee Search | bpi/cas/enrollment/addon/newemp/employeesearch |
| enrollment.addon.newemp.dependentsearch | Dependent Search | bpi/cas/enrollment/addon/newemp/dependentsearch |
| enrollment.addon.employeesearch | Employee Search | bpi/cas/enrollment/addon/adddependent/employeesearch |
| enrollment.addon.changerequest | Change Request | bpi/cas/enrollment/addon/adddependent/changerequest |
| enrollment.addon.dependent | Dependent General Info | bpi/cas/enrollment/addon/adddependent/dependent |
| enrollment.addon.adddependentsearch | Modify dependent | bpi/cas/enrollment/addon/adddependent/dependentsearch |
| enrollment.addon.missingforadddependent | PreEmrollment | bpi/cas/enrollment/addon/adddependent/preenrollment |
| enrollment.addon.addconfirmation | Confirmation | bpi/cas/enrollment/addon/adddependent/confirmation |
| bpi.enrollment.change.group.groupsearch | Group Search | bpi/cas/enrollment/change/group/groupsearch |
| bpi.enrollment.change.group.changerequest | Change Request | bpi/cas/enrollment/change/group/changerequest |
| bpi.enrollment.change.group.identifychanges | Identify Changes | bpi/cas/enrollment/change/group/identifychanges |
| bpi.enrollment.change.group.general | Group GeneralInfo | bpi/cas/enrollment/change/group/generalinfo |
| bpi.enrollment.change.group.billing | Group Billing Info | bpi/cas/enrollment/change/group/billinginfo |
| bpi.enrollment.change.group.agent | Agent Info | bpi/cas/enrollment/change/group/agentinfo |
| bpi.enrollment.change.group.coverage | Coverage Info | bpi/cas/enrollment/change/group/coverageinfo |
| bpi.enrollment.change.group.missinginfo | Missing Info | bpi/cas/enrollment/change/group/missinginfo |
| bpi.enrollment.change.group.confirmation | Confirmation | bpi/cas/enrollment/change/group/confirmation |
| bpi.enrollment.change.group.groupmodifysearch | Modify Search | bpi/cas/enrollment/change/group/groupmodifysearch |
| bpi.enrollment.change.employee.employeesearch | Employee Search | bpi/cas/enrollment/change/employee/employeesearch |
| bpi.enrollment.change.employee.changerequest | Change Request | bpi/cas/enrollment/change/employee/changerequest |
| bpi.enrollment.change.employee.identifychanges | Identify Changes | bpi/cas/enrollment/change/employee/identifychanges |
| bpi.enrollment.change.employee.individualemployee | Individual Employee | bpi/cas/enrollment/change/employee/indivemployee |
| bpi.enrollment.change.employee.individualbilling | Individual Billing | bpi/cas/enrollment/change/employee/indivbilling |
| bpi.enrollment.change.employee.individualcoverage | Individual Coverage | bpi/cas/enrollment/change/employee/indivcoverage |
| bpi.enrollment.change.employee.individualmissing | Individual Employee Missing | bpi/cas/enrollment/change/employee/indivmissing |
| bpi.enrollment.change.employee.employeemodifysearch | Modify Search | bpi/cas/enrollment/change/employee/employeemodifysearch |
| bpi.enrollment.change.employee.employeeconfirm | Employee Confirm | bpi/cas/enrollment/change/employee/employeeconfirm |
| bpi.enrollment.change.employee.employeegeneral | Employee General Info | bpi/cas/enrollment/change/employee/employeegeneral |
| bpi.enrollment.change.employee.employeecoverage | Employee Coverage | bpi/cas/enrollment/change/employee/employeecoverage |
| bpi.enrollment.change.employee.employeemissing | Missing Info | bpi/cas/enrollment/change/employee/employeemissing |
| bpi.enrollment.change.dependent.dependentsearch | Dependent Search | bpi/cas/enrollment/change/dependent/dependentsearch |
| bpi.enrollment.change.dependent.changerequest | Change Request | bpi/cas/enrollment/change/dependent/changerequest |
| bpi.enrollment.change.dependent.identifychanges | Identify Changes | bpi/cas/enrollment/change/dependent/identifychanges |
| bpi.enrollment.change.dependent.dependentgeneral | Dependent General | bpi/cas/enrollment/change/dependent/dependentgeneral |
| bpi.enrollment.change.dependent.missinginfo | Missing Info | bpi/cas/enrollment/change/dependent/missinginfo |
| bpi.enrollment.change.dependent.dependentconfirm | Confirmation | bpi/cas/enrollment/change/dependent/dependentconfirm |
| bpi.enrollment.change.dependent.dependentmodify | Modify Search | bpi/cas/enrollment/change/dependent/dependentmodify |

2.4.1.1. SID, Element Name, Element Type & Purpose 2.4.1.1.1 SID: enrollment.addon.newemp.groupsearch 2.4.1.1.1.1 Screen Snap Shot Refer BPI_CAS_FSD_EN__01—user Interface ID: BPI_CAS_SCR_EN__001__012

2.4.1.1.1.2 Element Name, Element Type & Purpose

Refer 3.1.13.2 of BPI_CAS_FSD_EN__01 for the details.

2.4.1.1.2 SID: enrollment.addon.newemp.changerequest 2.4.1.1.2.1 Screen Snap Shot 2.4.1.1.2.2 Element Name, Element Type & Purpose 2.4.1.1.3 SID: enrollment.addon.newemp.groupgeneral 2.4.1.1.3.1 Screen Snap Shot Refer User Interface ID: BPI_CAS_SCR_EN__001__002—Group General of BPI_CAS_FSD_EN__01

2.4.1.1.3.2 Element Name, Element Type & Purpose

Refer 3.1.3.2 of BPI_CAS_FSD_EN__01 for the details.

2.4.1.1.4 SID: enrollment.addon.newemp.employeecoverage 2.4.1.1.4.1 Screen Snap Shot Refer to User Interface ID: BPI_CAS_SCR_EN__001__007—Employee Coverage of BPI_CAS_FSD_EN__01

2.4.1.1.4.2 Element Name, Element Type & Purpose

Refer 3.1.8.2 of BPI_CAS_FSD_EN__01 for the details.

2.4.1.1.5 SID: enrollment.addon.newemp.dependent 2.4.1.1.5.1 Screen Snap Shot

Refer to User Interface ID: BPI_CAS_SCR_EN__001__008—Dependent of BPI_CAS_FSD_EN__01

2.4.1.1.5.2 Element Name, Element Type & Purpose

Refer 3.1.9.2 of BPI_CAS_FSD_EN__01 for the details 2.4.1.1.6 SID: enrollment.addon.newemp.missing 2.4.1.1.6.1 Screen Snap Shot Refer to User Interface ID: BPI_CAS_SCR_EN__001__010—Missing Information of BPI_CAS_FSD_EN__01

2.4.1.1.6.2 Element Name, Element Type & Purpose

Refer to 3.1.11.2 of BPI_CAS_FSD_EN__01

2.4.1.1.7 SID: enrollment.addon.newemp.summary 2.4.1.1.7.1 Screen Snap Shot

Refer to User Interface ID: BPI_CAS_SCR_EN__001__009—Enrollment Summary of BPI_CAS_FSD_EN__01

2.4.1.1.7.2 Element Name, Element Type & Purpose

Refer to 3.1.10.1 of BPI_CAS_FSD_EN__01

2.4.1.1.8 SID: enrollment.addon.newemp.confirmation 2.4.1.1.8.1 Screen Snap Shot Refer to User Interface ID: BPI_CAS_SCR_EN__001__011—Enrollment Confirmation of BPI_CAS_FSD_EN__01

2.4.1.1.8.2 Element Name, Element Type & Purpose

Refer to 3.1.12.2 of BPI_CAS_FSD_EN__01

2.4.1.1.9 SID: enrollment.addon.newemp.employeesearch 2.4.1.1.9.1 Screen Snap ShotElement Name, Element Type & Purpose Refer to User Interface ID: BPI_CAS_SCR_EN__001__013—Employee Search of BPI_CAS_FSD__01

2.4.1.1.9.2 Element Name, Element Type & Purpose

Refer to 3.1.14.2 of BPI_CAS_FSD_EN__01

2.4.1.1.10 SID: enrollment.addon.newemp.dependentsearch 2.4.1.1.10.1 Screen Snap Shot Refer to User Interface ID: BPI_CAS_SCR_EN__001__014—Dependent Search of BPI_CAS_FSD_EN__01

2.4.1.1.10.2 Element Name, Element Type & Purpose

Refer to 3.1.15.2 of BPI_CAS_FSD_EN__01

2.4.1.1.11 SID: enrollment.addon.employeesearch 2.4.1.1.11.1 Screen Snap Shot

Refer to User Interface ID: BPI_CAS_SCR_EN__001__013—Employee Search of BPI_CAS_FSD_EN__01

2.4.1.1.11.2 Element Name, Element Type & Purpose

Refer to 3.1.14.2 of BPI_CAS_FSD_EN__01

2.4.1.1.12 SID: enrollment.addon.changerequest 2.4.1.1.12.1 Screen Snap Shot 2.4.1.1.12.2 Element Name, Element Type & Purpose 2.4.1.1.13 SID: enrollment.addon.dependent 2.4.1.1.13.1 Screen Snap Shot Refer to User Interface ID: BPI_CAS_SCR_EN__001__008—Dependent of BPI_CAS_FSD_EN__01

2.4.1.1.13.2 Element Name, Element Type & Purpose 2.4.1.1.14 SID: enrollment.addon.adddependentsearch 2.4.1.1.14.1 Screen Snap Shot Refer to User Interface ID: BPI_CAS_SCR_EN__001__014—Dependent Search of BPI_CAS_FSD_EN__01

2.4.1.1.14.2 Element Name, Element Type & Purpose

Refer to 3.1.15.2 of BPI_CAS_FSD_EN__01

2.4.1.1.15 SID: enrollment.addon.missingforaddependent 2.4.1.1.15.1 Screen Snap Shot Refer to User Interface ID: BPI_CAS_SCR_EN__001__010—Missing Information of BPI_CAS_FSD_EN__01

2.4.1.1.15.2 Element Name, Element Type & Purpose

Refer to 3.1.11.2 of BPI_CAS_FSD_EN__01

2.4.1.1.16 SID: enrollment.addon.addconfirmation 2.4.1.1.16.1 Screen Snap Shot

Refer to User Interface ID: BPI_CAS_SCR_EN__001__011—Enrollment Confirmation of BPI_CAS_FSD_EN__01

2.4.1.1.16.2 Element Name, Element Type & Purpose

Refer to 3.1.12.2 of BPI_CAS_FSD_EN__01

2.4.1.1.17 Change Screen SID 2.4.1.1.17.1 Screen Snap Shot

Refer to User Interface ID BPI_CAS_FSD_EN__01 BPI_CAS_RULKEBOX 2.4.1.1.17.2 Element Name, Element Type & Purpose Refer to User Interface ID BPI_CAS_FSD_EN__01 BPI_CAS_RULKEBOX 2.4.2. Screen Flow (See FIG. I-13)

(See FIG. I-14)

(See FIG. I-15)

(See FIG. I-16)

(See FIG. I-17)

Change: —Group Change New Request (See FIG. I-18)

Change: —Group Modify Pending Changes (See FIG. I-19)

Change: —Employee Change New Request (See FIG. I-20)

Change: —Employee Modify Pending Changes (See FIG. I-21)

Change: —Dependent Change New Request (See FIG. I-22)

Change: —Dependent Modify Pending Changes (See FIG. I-23)

3. Business Rule Mapping

| Activity | Rules |
| --- | --- |
| Employer Add On | The rate for the employer is guaranteed for one year (One year from the date of enrollment) Hence the entire rates that is effective for the employer/ group needs to be effective for the new employees |

-continued

| Activity | Rules |
|---|---|
| | as well. However the eligibility of the Employee is base on the normal eligibility rules that is applicable for the Employee at the time of enrollment. Counts for the add-on employee can go more than 70 and up to 100 if Small Employer Group (override based on ACL). If Guaranteed association then there is no limit on the employee count at any time. |
| Process Add on | Shows the missing information of the Add On employee and emails the missing information to the GMS rep. |
| Process Add on | On successful Add On the welcome mail is sent to the Employer/Employee and cc to Agent. Billing adjustment is made which would be handled in the Finance Module. |
| Process Add On (waiting Period) | Adding employee needs to check on the Waiting Period. If the employee does not satisfy the waiting period then it should send email to the GMS rep. Also the employee effective date should default to the date when the employee is actually eligible. If the Employee satisfied the waiting period and is 60 days past the waiting period then it should flag this as missing information as this becomes a late application, which needs clarification from the employer before enrolling the employee. This employee can be enrolled only with authorization. The employee application form is not deemed as "Late" if it is postmarked within 60 days from the eligibility date. If it is postmarked more than 60 days from the eligibility date, the application is declined as it is "Late". Late application can be enrolled only on the next ROE. |

Employee Add On (Adding Dependent)

| Activity | Rules |
|---|---|
| Employee Add On | The rate for the employer is guaranteed for one year (One year form the date of enrollment) Hence the entire rate that is effective for the employer/group needs to be effective for the new dependent as well. However the eligibility of the Dependent is base on the normal eligibility rules that is applicable for the Dependent at the time of enrollment. Coverage Choice to be manipulated by System automatically. |
| Process Add on | Shows the missing information of the Add On Dependent and emails the missing information to the GMS rep. |
| Process Add on | On successful Add On the welcome mail is sent to the Employer/Employee/Dependent and cc to Agent. Billing adjustment is made which would be handled in the Finance Module. |
| General Rules | If the employee has selected the Employee only option as coverage choice then it needs to be changed for adding a dependent. System would not allow adding dependent with Employee only status. |

Employer Change

| Activity | Rules |
|---|---|
| Demographic changes | Demographic change can include change in Company Name, Contact name, Address, Phone, Fax, Email, Tax ID. All these change can be made and does not affect the business rules except for transmission of letter, email contacts |
| Billing Changes | All Billing changes are flag and email is sent to GMS rep and Finance for Information. Billing changes would effect the billing frequency or the mode of payment (EFT, Credit Card or Check) |

-continued

| Activity | Rules |
|---|---|
| Waiting Period Change | Change in the waiting period would affect the Employee Eligibility criteria for all add on employees, going forward, as the change may be. Change in the Employee type for the waiting period consideration would also affect the Employee Eligibility for the New Employees 'Add-On', going forward. Waiting Period would be based on the Employer Effective date. Effective date for changing the Waiting period should default to the 1$^{st}$ of the following month. Waiting period can be changed only once from the date of enrollment (effective date) to one-year cycle for the employer. If the waiting period changes are more than once in the calendar year for the employer. This is to be notified to the GMS rep and only the authorized person can override this and allow for waiting period change beyond 1 in employer anniversary date (one year cycle). |
| Employer Contribution | Contribution would be based on the Employer Effective date. Effective date for changing the Contribution should default to the 1$^{st}$ of the following month. Contribution can be changed only twice from the date of enrollment (effective date) to one-year cycle for the employer. If the Contribution changes are more than once in the calendar year for the employer. This is to be notified to the GMS rep and only the authorized person can override this and allow for contribution change beyond 1 in employer calendar year. Note: Effective dates for Contribution changes should be 1$^{st}$ following month if the billing cycle has not completed. If the billing cycle is complete then it should be effective the next billing cycle. I.e. 1$^{st}$ of the month following the next month. |
| Optional benefits Changes | a) Medical: No change allowed. b) Dental Can be added only during ROE cycle. Can be dropped any time. Note if dental is dropped then it can be added in the ROE following 12 month from the date of dropping the dental plan. c) Vision and CAM: Can be added and dropped any time. Note if an optional benefit is dropped then it can be added in the ROE following 12 month from the date of dropping the optional benefit. d) This is to be notified to the GMS rep and only the authorized person can override this. |
| Employee Counts (Number of employee) | Can be changed only at next ROE cycle. |
| COBRA | Can Change any time but will effective from 1$^{st}$ of the month only If this changes then any existing COBRA with this group will change accordingly and automatically, 1$^{st}$ of the month. Should trigger automatic transmission |
| TEFRA | Can be change any time but will be effective from 1$^{st}$ of the month only. Transmit record to the carrier only if the employee is 65+ |
| Part time coverage/ Domestic partner | Can be change only during open enrollment or Re qualification and open enrollment. But should allow for overriding this feature based on authority. Note: Any over riding function should trigger auto email to the concerned GMS rep for making the changes based on their authority. |
| Agent Change | This triggers a new process flow. (Refer process flow diagram FIG. 4.) |

Note: For all changes effective date will be defaulted based on POST MARK DATE, If POST MARK date is lesser than 15th Day of month then Effective date will be 1st day of next month else it will be 1st day of next of the next month 4. User Role The respective level of user role can over rule the following missing information.

| User Role<br>S. No., Missing Information | Level II, Level III, Level IV<br>Condition |
|---|---|
| 1 SSN already exists. | Employee |
| 2 SSN already exists. | Dependent |

Employee, Group and Dependent Changes (w.r.t. Current Date)

| User Role | Condition |
|---|---|
| Level I | Reinstatement date is with in 30 days prior or later |
| Level II | Reinstatement date is with in 30 days prior or later |
| Level III | Reinstatement date is with in 60 days prior or later |

Benefit Partners Inc

Process Specification

ROE/OE Process

1. Introduction 1.1. Purpose

The purpose of this document is to describe the process of ROE/OE Process. This document identifies how the user interacts with the system, the data to be captured, the business logic to be implemented, and the output of the process.

1.2. Business Use Case Specification Reference

| Business Use Specification ID | Business Use Case Name |
|---|---|
| BPI_SCOPE_EN | Enrollment |
| BPI_SCOPE_EN_004 | Enrollment - ROE |

1.3. Definitions, Acronyms & Abbreviations

| Term | Explanation |
|---|---|

1.4. Document Reference

| Document ID | Document Name |
|---|---|
| BPI_CAS_FSD_EN | Functional Specification Document - Enrollment |
| BPI_CAS_FSD_EN_001 | Process Flow - New Business Enrollment |
| BPI_CAS_FSD_EN_002 | Process Flow - Enrollment Changes/Add-On |
| BPI_CAS_FSD_EN_003 | Process Flow - COBRA Enrollment/Changes |
| BPI_CAS_FSD_EN_005 | Process Flow - Termination/Reinstatement |

2. Process Identification 2.1. Background

Once a year, on the anniversary date of a group's enrollment in PacAdvantage (or for some, it's July 1st, not their anniversary date), the group's participation, contribution and qualification is reviewed. This review is to ensure that the group meets the qualification requirement. The main objective of this process is to review these criteria and re qualify as needed, notify them of rate changes and provide an opportunity for employees of the group to make changes to their enrollment.

This process is identified as Re-qualification and open enrollment. Also there is another process associated with this called as open enrollment where in the group has the privilege to make the changes to the plan, waiting period etc.

The difference between the two processes is that for re-qualification the Group has to under go the eligibility check to qualify for their next term.

For open enrollment the group need not re qualify and under go the eligibility checks.

The group should already have been enrolled with the PacAdvantage and have no termination date for the ROE to be done.

2.2. Process Description

The objective of the ROE/OE Process is to:

Annual Re qualification or open enrollment form filled by the Employer

Open Enrollment Change form completed by employee, if applicable

Employee Enrollment form(s) completed by employee, if applicable

Dependent Enrollment form(s) completed by employee, if applicable

The following are the other requirements that will be supported and constraints on the proposed system:

1) The system has to initiate ROE/OE process 3 months prior to the actual anniversary date for the specific group. This process needs to be initiated by GMS personnel.

2) System has to pick up the Groups for ROE based on the rules defined below:

Group Size: less than or equal to 4—All the groups needs to be re-qualified.

Group Size: 5 to 9—10% of the Group needs to be re-qualified

Group Size: greater than or equal to 10—1% of the group needs to be re-qualified.

3) System has to randomly pick up the groups based on the above rules for ROE based on random generator algorithm.

4) All other Group that is a part of ROE and OE needs to have their open enrollment processed.

5) Also their needs to be a facility to have manual OE process wherein the Employee or Employees are manually picked for ROE or OE process. Manual OE is usually performed based on searching the Employee based on line of coverage and plan.

6) There needs to be a feature to Finalize the ROE or OE for all the groups that have the same ROE/OE cycle.

2.3. Process Flow

Process for ROE/OE

The process starts after manual initiation

1) Identify the group that has their anniversary date 3 months hence.

2) Based on the group size identify if the group needs to be re-qualified.

3) Randomly pick up the group for re-qualification

4) If the group is not picked for re-qualification then the group only needs to have open enrollment.

5) Send ROE/OE packets to mail house. The packet includes the Agent Packet and the group packet.

6) Also sent the packets to the COBRA members of the existing group.

7) Send reminder for the ROE/OE every month.

8) Receive the ROE/OE packets completed by the Group and enter into the system.

9) Follow up for missing information

10) Convey the Group/Agent about the ROE status on completion of the process.

Note the screens for entry of data for the ROE/OE processes are similar to the Group/Employee/Dependent Changes screen. However for the ROW/OE process the status would be identified as ROE process.

Process Flow Diagram—ROE Process (See FIG. I-24)

3. User Interface 3.1. User Interface Screens 3.1.1. Screen ID's 3.1.2.1.2 Element Name, Element Type & Purpose Refer to 3.1.13.2 of BPI_CAS_FSD_EN__01

3.1.2.2. SID: enrollment.roe.request 3.1.2.2.1 Screen Snap Shot (See FIG. I-25)

3.1.2.3. SID: enrollment.roe.identifygroupchange 3.1.2.3.1 Screen Snap Shot (See FIG. I-26)

3.1.2.4. SID: enrollment.roe.groupgeneral 3.1.2.4.1 Screen Snap Shot

Refer to User Interface ID: BPI_CAS_SCR_EN__001__002—Group General of BPI_CAS_FSD_EN__01

3.1.2.4.2 Element Name, Element Type & Purpose

Refer to 3.1.3.2 of BPI_CAS_FSD_EN__01

| Screen ID (SID) | Screen Name | Corresponding HTML File Name |
|---|---|---|
| enrollment.roe.groupsearch | Group Search | /bpi/cas/enrollment/roe/groupsearch |
| enrollment.roe.request | Group Request | /bpi/cas/enrollment/roe/request |
| enrollment.roe.identifygroupchange | Identify Group Change Request | /bpi/cas/enrollment/roe/identifygroupchange |
| enrollment.roe.groupgeneral | Group General Info | /bpi/cas/enrollment/roe/groupgeneral |
| enrollment.roe.groupbilling | Group Billing Info | /bpi/cas/enrollment/roe/groupbilling |
| enrollment.roe.groupagent | Group Agent Info | /bpi/cas/enrollment/roe/groupagent |
| enrollment.roe.agentsearch | Agent Search | /bpi/cas/enrollment/roe/agentsearch |
| enrollment.roe.groupcoverage | Group Coverage Info | /bpi/cas/enrollment/roe/groupcoverage |
| enrollment.roe.employeesearch | Employee Search | /bpi/cas/enrollment/roe/employeesearch |
| enrollment.roe.identifyemployeechange | Identify Employee Change Request | /bpi/cas/enrollment/roe/identifyemployeechange |
| enrollment.roe.employeegeneral | Employee General Info | /bpi/cas/enrollment/roe/addemployee |
| enrollment.roe.employeecoverage | Employee Coverage Info | /bpi/cas/enrollment/roe/employeecoverage |
| enrollment.roe.dependentsearch | Dependent Search | /bpi/cas/enrollment/roe/dependentsearch |
| enrollment.roe.identifydependentchange | Identify Dependent Change Request | /bpi/cas/enrollment/roe/identifydependentchange |
| enrollment.roe.dependentgeneral | Dependent General | /bpi/cas/enrollment/roe/adddependent |
| enrollment.roe.groupsummary | Group Summary | /bpi/cas/enrollment/roe/enrollmentsummary |
| enrollment.roe.groupmissing | Group Missing Info | /bpi/cas/enrollment/roe/preenrollment/ |
| enrollment.roe.groupconfirm | Group Confirm | /bpi/cas/enrollment/roe/groupconfirm |
| enrollment.roe.individualemployeesearch | Indiv Employee Search/ Indiv Group Search | /bpi/cas/enrollment/roe/indivemployeesearch |
| enrollment.roe.indivemployeerequest | Indiv Employee Request | /bpi/cas/enrollment/roe/indivemployeerequest |
| enrollment.roe.identifyindivemployeechange | Identify Indiv Employee Change Request | /bpi/cas/enrollment/roe/identifyindivemployeechange |
| enrollment.roe.individualemployeegeneral | Indiv Employee General Info | /bpi/cas/enrollment/roe/indivemployee |
| enrollment.roe.individualbilling | Indiv Billing Info | /bpi/cas/enrollment/roe/indivbilling |
| enrollment.roe.individualagent | Indiv Agent Info | /bpi/cas/enrollment/roe/indivagent |
| enrollment.roe.individualagentsearch | Indiv Agent Search | /bpi/cas/enrollment/roe/indivagent |
| enrollment.roe.individualemployeecoverage | Indiv Coverage Info | /bpi/cas/enrollment/roe/indivcoverage |
| enrollment.roe.individualdependentsearch | Indiv Dependent Search | /bpi/cas/enrollment/roe/indivdependentsearch |
| enrollment.roe.identifyindivdependentchange | Identify Indiv Dependent Change Request | /bpi/cas/enrollment/roe/identifyindivdependentchange |
| enrollment.roe.individualdependentgeneral | Indiv Dependent General Info | /bpi/cas/enrollment/roe/indivdependent/ |
| enrollment.roe.individualsummary | Indiv Enrollment Summary | /bpi/cas/enrollment/roe/indivenrollmentsummary |
| enrollment.roe.individualmissing | Indiv Pre Enrollment | /bpi/cas/enrollment/roe/indivpreenrollment |
| bpi.enrollment.cobraroe.new.searchcobra | COBRA Search | /bpi/cas/enrollment/cobraroe/new/cobraroesearch |
| bpi.enrollment.cobraroe.new.request | COBRA ROE/OE Process Request | /bpi/cas/enrollment/cobraroe/new/request |
| bpi.enrollment.cobraroe.new.identifychanges | Identify COBRA ROE/ OE Change Request Info | /bpi/cas/enrollment/cobraroe/new/identifychanges |
| bpi.enrollment.cobraroe.new.general | COBRA General Info | /bpi/cas/enrollment/cobraroe/new/generalinfo |
| bpi.enrollment.cobraroe.new.billing | COBRA Billing Info | /bpi/cas/enrollment/cobraroe/new/billinginfo |
| bpi.enrollment.cobraroe.new.coverage | COBRA Coverage Info | /bpi/cas/enrollment/cobraroe/new/coverageinfo |
| bpi.enrollment.cobraroe.new.dependent | COBRA Dependent Info | /bpi/cas/enrollment/cobraroe/new/dependentinfo |
| bpi.enrollment.cobraroe.new.missing | COBRA Missing Info | /bpi/cas/enrollment/cobraroe/new/missinginfo |
| bpi.enrollment.cobraroe.new.confirmation | COBRA Confirmation | /bpi/cas/enrollment/cobraroe/new/confirmation |
| Enrollment.roe.manualroe | ROE/OE Process | /bpi/cas/enrollment/roe/manualroe |
| Enrollment.roe.roetransfer | ROE/OE Transfer | /bpi/cas/enrollment/roe/roetransfer |

3.1.2. SID, Element Name, Element Type & Purpose 3.1.2.1. SID: enrollment.roe.groupsearch 3.1.2.1.1 Screen Snap Shot Refer to User Interface ID: BPI_CAS_SCR_EN__001__012—Group Search of BPI_CAS_FSD_EN__01

3.1.2.5. SID: enrollment.roe.groupbilling 3.1.2.5.1 Screen Snap Shot

Refer to User Interface ID: BPI_CAS_SCR_EN__001__003—Billing of BPI_CAS_FSD_EN__01

3.1.2.5.2 Element Name, Element Type & Purpose

Refer to 3.1.4.2 of BPI_CAS_FSD_EN__01

3.1.2.6. SID: enrollment.roe.groupagent
3.1.2.6.1 Screen Snap Shot
Refer to User Interface ID: BPI_CAS_SCR_EN__001__005—Agent of BPI_CAS_FSD_EN__01
3.1.2.6.2 Element Name, Element Type & Purpose
Refer to 3.1.6.2 of BPI_CAS_FSD_EN__01
3.1.2.7. SID: enrollment.roe.agentsearch
3.1.2.7.1 Screen Snap Shot
3.1.2.7.2 Element Name, Element Type & Purpose
3.1.2.8. SID: enrollment.roe.groupcoverage
3.1.2.8.1 Screen Snap Shot
Refer to User Interface ID: BPI_CAS_SCR_EN__001__004—Group Coverage of BPI_CAS_FSD_EN__01
3.1.2.8.2 Element Name, Element Type & Purpose
Refer to 3.1.5.2 of BPI_CAS_FSD_EN__01
3.1.2.9. SID: enrollment.roe.employeesearch
3.1.2.9.1 Screen Snap Shot
Refer to User Interface ID: BPI_CAS_SCR_EN__001__013—Employee Search of BPI_CAS_FSD_EN__01
3.1.2.9.2 Element Name, Element Type & Purpose
Refer to 3.1.14.2 of BPI_CAS_FSD_EN__01
3.1.2.10. SID: enrollment.roe.identifyemployeechange
3.1.2.10.1 Screen Snap Shot (See FIG. I-27)
3.1.2.11. SID: enrollment.roe.employeegeneral
3.1.2.11.1 Screen Snap Shot
Refer to User Interface ID: BPI_CAS_SCR_EN__001__006—Employee Information of BPI_CAS_FSD_EN__01
3.1.2.11.2 Element Name, Element Type & Purpose
Refer to 3.1.7.2 of BPI_CAS_FSD_EN__01
3.1.2.12. SID: enrollment.roe.employeecoverage
3.1.2.12.1 Screen Snap Shot
Refer to User Interface ID: BPI_CAS_SCR_EN__001__007—Employee Coverage of BPI_CAS_FSD_EN__01
3.1.2.12.2 Element Name, Element Type & Purpose
Refer to 3.1.8.2 of BPI_CAS_FSD_EN__01
3.1.2.13. SID: enrollment.roe.dependentsearch
3.1.2.13.1 Screen Snap Shot
Refer to User Interface ID: BPI_CAS_SCR_EN__001__014—Dependent Search of BPI_CAS_FSD_EN__01
3.1.2.13.2 Element Name, Element Type & Purpose
Refer to 3.1.15.2 of BPI_CAS_FSD_EN__01
3.1.2.14. SID: enrollment.roe.identifydependentchange
3.1.2.14.1 Screen Snap Shot (See FIG. I-28)
3.1.2.15. SID: enrollment.roe.dependentgeneral
3.1.2.15.1 Screen Snap Shot
Refer to User Interface ID: BPI_CAS_SCR_EN__001__008—Dependent of BPI_CAS_FSD_EN__01
3.1.2.15.2 Element Name, Element Type & Purpose
Refer to 3.1.9.2 of BPI_CAS_FSD_EN__01
3.1.2.16. SID: enrollment.roe.groupsummary
3.1.2.16.1 Screen Snap Shot
Refer to User Interface ID: BPI_CAS_SCR_EN__001__009—Enrollment Summary of BPI_CAS_FSD_EN__01
3.1.2.16.2 Element Name, Element Type & Purpose
Refer to 3.1.10.2 of BPI_CAS_FSD_EN__01
3.1.2.17. SID: enrollment.roe.groupmissing
3.1.2.17.1 Screen Snap Shot
Refer to User Interface ID: BPI_CAS_SCR_EN__001__010—Missing Information of BPI_CAS_FSD_EN__01
3.1.2.17.2 Element Name, Element Type & Purpose
Refer to 3.1.11.2 of BPI_CAS_FSD_EN__01
3.1.2.18. SID: enrollment.roe.groupconfirm
3.1.2.18.1 Screen Snap Shot
Refer to User Interface ID: BPI_CAS_SCR_EN__001__011—Enrollment Confirmation of BPI_CAS_FSD_EN__01
3.1.2.18.2 Element Name, Element Type & Purpose
Refer to 3.1.12.2 of BPI_CAS_FSD_EN__01
3.1.2.19. SID: enrollment.roe.individualemployeesearch
3.1.2.19.1 Screen Snap Shot
Refer to User Interface ID: BPI_CAS_SCR_EN__001__013—Employee Search of BPI_CAS_FSD_EN__01
3.1.2.19.2 Element Name, Element Type & Purpose
Refer to 3.1.14.2 of BPI_CAS_FSD_EN__01
3.1.2.20. SID: enrollment.roe.indivemployeerequest
3.1.2.20.1 Screen Snap Shot
3.1.2.20.2 Element Name, Element Type & Purpose
3.1.2.21. SID: enrollment.roe.identifyindivemployeechange
3.1.2.21.1 Screen Snap Shot
3.1.2.21.2 Element Name, Element Type & Purpose
3.1.2.22. SID: enrollment.roe.individualemployeegeneral
3.1.2.22.1 Screen Snap Shot
Refer to User Interface ID: BPI_CAS_SCR_EN__001__006—Employee Information of BPI_CAS_FSD_EN__01
3.1.2.22.2 Element Name, Element Type & Purpose
Refer to 3.1.7.2 of BPI_CAS_FSD_EN__01
3.1.2.23. SID: enrollment.roe.individualbilling
3.1.2.23.1 Screen Snap Shot
Refer to User Interface ID: BPI_CAS_SCR_EN__001__003—Billing of BPI_CAS_FSD_EN__01
3.1.2.23.2 Element Name, Element Type & Purpose
Refer to 3.1.4.2 of BPI_CAS_FSD_EN__01
3.1.2.24. SID: enrollment.roe.individualagent
3.1.2.24.1 Screen Snap Shot
Refer to User Interface ID: BPI_CAS_SCR_EN__001__005—Agent of BPI_CAS_FSD_EN__01
3.1.2.24.2 Element Name, Element Type & Purpose
Refer to 3.1.6.2 of BPI_CAS_FSD_EN__01
3.1.2.25. SID: enrollment.roe.individualagentsearch
3.1.2.25.1 Screen Snap Shot
3.1.2.25.2 Element Name, Element Type & Purpose
3.1.2.26. SID: enrollment.roe.individualemployeecoverage
3.1.2.26.1 Screen Snap Shot
Refer to User Interface ID: BPI_CAS_SCR_EN__001__007—Employee Coverage of BPI_CAS_FSD_EN__01
3.1.2.26.2 Element Name, Element Type & Purpose
Refer to 3.1.8.2 of BPI_CAS_FSD_EN__01
3.1.2.27. SID: enrollment.roe.individualdependentsearch
3.1.2.27.1 Screen Snap Shot
Refer to User Interface ID: BPI_CAS_SCR_EN__001__014—Dependent Search of BPI_CAS_FSD_EN__01
3.1.2.27.2 Element Name, Element Type & Purpose
Refer to 3.1.15.2 of BPI_CAS_FSD_EN__01
3.1.2.28. SID: enrollment.roe.identifyindivdependentchange
3.1.2.28.1 Screen Snap Shot
3.1.2.28.2 Element Name, Element Type & Purpose
3.1.2.29. SID: enrollment.roe.individualdependentgeneral
3.1.2.29.1 Screen Snap Shot
Refer to User Interface ID: BPI_CAS_SCR_EN__001__008—Dependent of BPI_CAS_FSD_EN__01
3.1.2.29.2 Element Name, Element Type & Purpose
Refer to 3.1.9.2 of BPI_CAS_FSD_EN__01

3.1.2.30. SID: enrollment.roe.individualsummary 3.1.2.30.1 Screen Snap Shot

Refer to User Interface ID: BPI_CAS_SCR_EN__001__009—Enrollment Summary of BPI_CAS_FSD_EN__01

3.1.2.30.2 Element Name, Element Type & Purpose

Refer to 3.1.10.2 of BPI_CAS_FSD_EN__01

3.1.2.31. SID: enrollment.roe.individualmissing 3.1.2.31.1 Screen Snap Shot

Refer to User Interface ID: BPI_CAS_SCR_EN__001__010—Missing Information of BPI_CAS_FSD_EN__01

3.1.2.31.2 Element Name, Element Type & Purpose

Refer to 3.1.11.2 of BPI_CAS_FSD_EN__01

3.1.2.32. SID: bpi.enrollment.cobraroe.new.searchcobra 3.1.2.32.1 Screen Snap Shot Refer to 3.1.1 Screen Shot: BPI_SCR_EN__002__001 of BPI_CAS_FSD_EN__02

3.1.2.32.2 Element Name, Element Type & Purpose

Refer to 3.1.2 of BPI_CAS_FSD_EN__02

3.1.2.33. SID: bpi.enrollment.cobraroe.new.request 3.1.2.33.1 Screen Snap Shot (See FIG. I-29)

3.1.2.34. SID: bpi.enrollment.cobraroe.new.identifychanges 3.1.2.34.1 Screen Snap Shot (See FIG. I-30)

3.1.2.35. SID: bpi.enrollment.cobraroe.new.general 3.1.2.35.1 Screen Snap Shot

Refer to 3.8.1 Screen Shot: BPI_SCR_EN__002__009 of BPI_CAS_FSD_EN__02

3.1.2.35.2 Element Name, Element Type & Purpose

Refer to 3.8.2 of BPI_CAS_FSD_EN__02

3.1.2.36. SID: bpi.enrollment.cobraroe.new.billing 3.1.2.36.1 Screen Snap Shot

Refer to User Interface ID: BPI_CAS_SCR_EN__001__003—Billing of BPI_CAS_FSD_EN__01

3.1.2.36.2 Element Name, Element Type & Purpose

Refer to 3.1.4.2 of BPI_CAS_FSD_EN__01

3.1.2.37. SID: bpi.enrollment.cobraroe.new.coverage 3.1.2.37.1 Screen Snap Shot

Refer to 3.9.1 Screen Shot: BPI_SCR_EN__002__010 of BPI_CAS_FSD_EN__02

3.1.2.37.2 Element Name, Element Type & Purpose

Refer to 3.9.2 of BPI_CAS_FSD_EN__02

3.1.2.38. SID: bpi.enrollment.cobraroe.new.dependent 3.1.2.38.1 Screen Snap Shot Refer to 3.3.1 Screen Shot: BPI_SCR_EN__002__003 of BPI_CAS_FSD_EN__02

3.1.2.38.2 Element Name, Element Type & Purpose

Refer to 3.3.2 of BPI_CAS_FSD_EN__02

3.1.2.39. SID: bpi.enrollment.cobraroe.new.missing 3.1.2.39.1 Screen Snap Shot

Refer to 3.5.1 Screen Shot: BPI_SCR_EN__002__006 of BPI_CAS_FSD_EN__02

3.1.2.39.2 Element Name, Element Type & Purpose

Refer to 3.5.2 of BPI_CAS_FSD_EN__02

3.1.2.40. SID: bpi.enrollment.cobraroe.new.confirmation 3.1.2.40.1 Screen Snap Shot Refer to User Interface ID: BPI_CAS_SCR_EN__001__011—Enrollment Confirmation of BPI_CAS_FSD_EN__01

3.1.2.40.2 Element Name, Element Type & Purpose

Refer to 3.1.12.2 of BPI_CAS_FSD_EN__01

3.1.3. Screen Flow (See FIG. I-31)

(See FIG. I-32)

(See FIG. I-33)

4. Business Rule Mapping

| Activity | Rules |
|---|---|
| ROE Process | Identify the group randomly based on the Group size for ROE. |
| ROE validation | All the eligibility rules that are applicable as new business enrollment are applicable for the ROE as well. |
| Open Enrollment | Open enrollment allows for making the changes that are normally not possible during the normal changes. |
| Billing | Bill in a normal way if the ROE/OE has a completed status. Make the bill for the new effective date. If the ROE/OE has a status as pend then pend the bill for the new effective date. |

5. User Role

The respective level of user role can over rule the following missing information.

| ROE OE SEG/Alternate/Indiv Group | |
|---|---|
| User Role<br>S. No., Missing Information | Level II, Level III, Level IV<br>Condition |
| 1 SSN already exists. | Employee SSN already exists |
| 2 SSN already exists. | Dependent SSN already exists |
| 3 Employer Tax Id already exists. | Employer Tax Id already exists |

| ROE OE COBRA Group | |
|---|---|
| User Role<br>S. No., Missing Information | Level II, Level III, Level IV<br>Condition |
| 1 SSN already exists. | Employee SSN already exists |
| 2 SSN already exists. | Dependent SSN already exists |

Benefit Partners Inc

Process Specification

Termination Reinstatemenet

1. Introduction 1.1. Purpose

The purpose of this document is to identify the process associated with the business use case Termination and Reinstatement 1.2. Business Use Case Specification Reference

| Business Use Specification ID | Business Use Case Name |
|---|---|
| BPI_SCOPE_EN | Enrollment |
| BPI_SCOPE_EN_005 | Termination and Reinstatement |

1.3. Definitions, Acronyms & Abbreviations

| Term | Explanation |
|---|---|

2. Process Identification 2.1. Background

<Brief Description of the Process>

2.2. Process Description

Process Flow for Group Term

This process is used to terminate or reinstate the Group, Employee and or Dependent.

The FIG. 1 shows the process flow for the group termination. The group can be termed broadly based on two reasons; Non-payment of Premium or by group request for termination. Non-payment of premium is an automated process and starts and completes the term process automatically. The employer request is a manual term process and the Group is termed manually.

Automated Term process initiates the Term Process. Letter is sent to the Group with 15 days notice for reinstatement. The system holds the status as "Term Pending" although the group believes they are completely termed. The reason for this is to prevent the sending of termination then reinstatement transmissions to the carriers; which causes confusion. The finance department then processes the term to completion if the payment is not received. Finance also has ability to override the term pend status based on authority.

Manual Term process is based on the request received from the group. All manual term process is notified to finance for necessary action. If the Group has a shortfall then the system notifies the finance department and finance processes the term. Term letter is send to the Group for paying through the balance premium. If the balance premium is paid then the finance department completes the term. If the balance is not paid then finance terms the group retrospectively.

If the Group has a refund due them then the system notifies the finance department and finance processes the refund and completes the term process.

Process Flow for Employee Term

Employee term is based on the Employer request to terminate the employee based on certain reasons. Based on these reasons the employee is termed and all employees who are termed needs to be sent the COBRA packets for COBRA enrollment. Billing adjustments are made for the employee term in the next invoice generated.

Process Flow for Dependent Term

Dependent term is based on the Employer/Employee request to terminate the Dependent based on certain reasons. Based on these reasons the Dependent is termed and the termed Dependent are sent the COBRA packets for COBRA enrollment. Billing adjustments are made for the Dependent term in the next invoice generated for the Group.

2.3. Process Flow

Process Flow Description (See FIG. I-34)

3. User Interface 3.1. User Interface Screens 3.1.1. Screen ID's

| Screen ID (SID) | Screen Name | Corresponding HTML File Name |
|---|---|---|
| enrollment.termination.group-search | Search Group for Termination | /bpi/cas/enrollment/termination/group/GroupSearch.jsp |
| enrollment.termination.group-terminationrequest | Group Termination Request | /bpi/cas/enrollment/termination/group/GroupTermination-Request.jsp |
| enrollment.termination.group-process-termination | Group Termination Process | /bpi/cas/enrollment/termination/group/GroupProcessTermination.jsp |

-continued

| Screen ID (SID) | Screen Name | Corresponding HTML File Name |
|---|---|---|
| enrollment.termination.group-termination-confirm | Group Termination Confirmation | /bpi/cas/enrollment/termination/group/GroupTermination-Confirm.jsp |
| enrollment.termination.multiple groupsearch | Multiple Group Termination Request | /bpi/cas/enrollment/termination/group/MultipleGroup-TerminationRequest.jsp |
| enrollment.termination.multiple grouptermination-confirm | Multiple Group Termination Confirmation | /bpi/cas/enrollment/termination/group/MultipleGroup-TerminationConfirm.jsp |
| enrollment.termination.employee-search | Search Employee for Termination | /bpi/cas/enrollment/termination/employee/EmployeeSearch.jsp |
| enrollment.termination.employee-termination-request | Employee Termination Request | /bpi/cas/enrollment/termination/employee/EmployeeTerminationRequest.jsp |
| enrollment.termination.employee-process-termination | Employee Process Termination | /bpi/cas/enrollment/termination/employee/EmployeeProcess Termination.jsp |
| enrollment.termination.employee-termination-confirm | Employee Termination Confirmation | /bpi/cas/enrollment/termination/employee/EmployeeTerminationConfirm.jsp |
| enrollment.termination.dependent-search | Search Dependent for Termination | /bpi/cas/enrollment/termination/dependent/DependentSearch.jsp |
| enrollment.termination.dependent-termination-request | Dependent Termination Request | /bpi/cas/enrollment/termination/dependent/DependentTerminationRequest.jsp |
| enrollment.termination.dependentprocess-termination | Dependent Process Termination | /bpi/cas/enrollment/termination/dependent/DependentProcess-Termination.jsp |
| enrollment.termination.dependent-terminationconfirm | Dependent Termination Confirmation | /bpi/cas/enrollment/termination/dependent/Dependent-TerminationConfirm.jsp |
| enrollment.reinstatement.group-search | Search Group for Reinstatement | /bpi/cas/enrollment/reinstatement/group/GroupSearch.jsp |
| enrollment.reinstatement.group-reinstatement-request | Group Reinstatement Request | /bpi/cas/enrollment/reinstatement/group/GroupReinstatement Request.jsp |
| enrollment.reinstatement.group-processreinstatement | Group Process Reinstatement | /bpi/cas/enrollment/reinstatement/group/GroupProcessReinstatement.jsp |
| enrollment.reinstatement.group-reinstatement-confirm | Group Reinstatement Confirmation | /bpi/cas/enrollment/reinstatement/group/GroupReinstatement Confirm.jsp |
| enrollment.reinstatement.employeesearch | Search for Employee Reinstatement | /bpi/cas/enrollment/reinstatement/employee/Employee-Search.jsp |
| enrollment.reinstatement.employee-reinstatement-request | Employee Reinstatement Request | /bpi/cas/enrollment/reinstatement/employee/Employee-ReinstatementRequest.jsp |
| enrollment.reinstatement.employee-process-reinstatement | Employee Process Reinstatement | /bpi/cas/enrollment/reinstatement/employee/Employee-ProcessReinstatement.jsp |
| enrollment.reinstatement.employee-reinstatement-confirm | Employee Reinstatement Confirmation | /bpi/cas/enrollment/reinstatement/employee/EmployeeReinstatementConfirm.jsp |
| enrollment.reinstatement.dependentsearch | Search Dependent for Reinstatement | /bpi/cas/enrollment/reinstatement/dependent/Dependent-Search.jsp |
| enrollment.reinstatement.dependentreinstate- | Dependent Reinstatement Request | /bpi/cas/enrollment/reinstatement/dependent/Dependent-ReinstatementRequest.jsp |

-continued

| Screen ID (SID) | Screen Name | Corresponding HTML File Name |
| --- | --- | --- |
| mentrequest | | |
| enrollment.re-instatement.depen-dentprocess-reinstatement | Dependent Process Reinstatement | /bpi/cas/enrollment/reinstatement/dependent/Dependent-ProcessReinstatement.jsp |
| enrollment.re-instatement.depen-dentreinstate-mentconfirm | Dependent Reinstatement Confirmation | /bpi/cas/enrollment/reinstatement/dependent/Dependent-ReinstatementConfirm.jsp |

3.1.1.1. SID, Element Name, Element Type & Purpose

SID: enrollment.termination.groupsearch

Screen Snap Shot (See FIG. I-35)

| Element Name | Element Type | Purpose |
| --- | --- | --- |
| Group Id | Entry Field | Enter Group Id |
| Group Name | Entry Field | Enter Group Name |
| Phone Number | Entry Field | Enter Phone Number |

SID: enrollment.termination.groupterminationrequest

Screen Snap Shot (See FIG. I-36)

| Element Name | Element Type | Purpose |
| --- | --- | --- |
| Mode of Request | Selection Box | Entry Field for the Group Id. |
| Postmark Date | Entry Field | Entry Field for the Group Name |
| Date Received | Entry Field | Entry Field for the Date Received |
| Authorized Contact | Selection Box | Entry Field for the Authorized Contact |
| Requested Term Date | Entry Field | Entry Field for the Request Term Date |
| Reason for Term | Selection Box | Select the Reason for Term |
| Other Reason | Entry Field | Entry Field for the Other Reason |

SID: enrollment.termination.groupprocesstermination

Screen Snap Shot (See FIG. I-37)

| Element Name | Element Type | Purpose |
| --- | --- | --- |
| Effective Term Date | Entry Field | Entry Field for the Group Id. |
| Change Term Status | Select Box | Select Change Term Status |

SID: enrollment.termination.groupterminationconfirm

Screen Snap Shot (See FIG. I-38)

SID enrollment.termination.multiplegroupsearch

Screen Snap Shot (See FIG. I-39)

| Element Name | Element Type | Purpose |
| --- | --- | --- |
| Postmark Date | Entry Field | Entry Field for the Group Name |
| Date Received | Entry Field | Entry Field for the Date Received |
| Requested Term Date | Entry Field | Entry Field for the Request Term Date |
| Reason for Term | Selection Box | Select the Reason for Term |
| Other Reason | Entry Field | Entry Field for the Other Reason |

SID: enrollment.termination.multiplegroupterminationconfirm

Screen Snap Shot (See FIG. I-40)

SID: enrollment.termination.employeesearch

Screen Snap Shot (See FIG. I-41)

| Element Name | Element Type | Purpose |
| --- | --- | --- |
| Group Name | Entry Field | Entry Field for the Group Name. |
| Group Id | Entry Field | Entry Field for the Group ID |
| Employee First Name | Entry Field | Entry Field for the Employee First Name |
| Employee Last Name | Entry Field | Entry Field for the Employee Last Name |
| Employee Phone Number | Entry Field | Entry Field for the Employee Phone Number |
| Employee SSN | Entry Field | Entry Field for the Employee SSN |
| Employee ID | Entry Field | Entry Field for the Employee ID |

SID: enrollment.termination.employeeterminationrequest

Screen Snap Shot (See FIG. I-42)

| Element Name | Element Type | Purpose |
| --- | --- | --- |
| Mode of Request | Selection Box | Entry Field for the Group Id. |
| Postmark Date | Entry Field | Entry Field for the Group Name |
| Date Received | Entry Field | Entry Field for the Date Received |
| Authorized Contact | Selection Box | Entry Field for the Authorized Contact |
| Requested Term Date | Entry Field | Entry Field for the Request Term Date |
| Reason for Term | Selection Box | Select the Reason for Term |
| Other Reason | Entry Field | Entry Field for the Other Reason |

SID: enrollment.termination.employeeprocesstermination

Screen Snap Shot (See FIG. I-43)

| Element Name | Element Type | Purpose |
| --- | --- | --- |
| Effective Term Date | Entry Field | Entry Field for the Group Id. |
| Change Term Status | Select Box | Select Change Term Status |

SID: enrollment.termination.employeeterminationconfirm

Screen Snap Shot (See FIG. I-44)

SID: enrollment.termination.dependentsearch

Screen Snap Shot (See FIG. I-45)

| Element Name | Element Type | Purpose |
| --- | --- | --- |
| Employee First Name | Entry Field | Entry Field for the Employee First Name. |
| Employee Last Name | Entry Field | Entry Field for the Employee Last Name |
| Employee SSN | Entry Field | Entry Field for the Employee SSN |
| Employee Id | Entry Field | Entry Field for the Employee Id |
| Dependent First Name | Entry Field | Entry Field for the Dependent First Name |
| Dependent Last Name | Entry Field | Entry Field for the Dependent Last Name |
| Dependent SSN | Entry Field | Entry Field for the Dependent SSN |
| Dependent Id | Entry Field | Entry Field for the Dependent Id |

SID: enrollment.termination.dependentterminationrequest

Screen Snap Shot (See FIG. I-46)

| Element Name | Element Type | Purpose |
|---|---|---|
| Mode of Request | Selection Box | Entry Field for the Group Id. |
| Postmark Date | Entry Field | Entry Field for the Group Name |
| Date Received | Entry Field | Entry Field for the Date Received |
| Authorized Contact | Selection Box | Entry Field for the Authorized Contact |
| Requested Term Date | Entry Field | Entry Field for the Request Term Date |
| Reason for Term | Selection Box | Select the Reason for Term |
| Other Reason | Entry Field | Entry Field for the Other Reason |

SID: enrollment.termination.dependentprocesstermination

Screen Snap Shot (See FIG. I-47)

| Element Name | Element Type | Purpose |
|---|---|---|
| Effective Term Date | Entry Field | Entry Field for the Term Date. |
| Change Term Status | Select Box | Select Change Term Status |

SID: enrollment.termination.dependentterminationconfirm

Screen Snap Shot (See FIG. I-48)

SID: enrollment.reinstatement.groupsearch

Screen Snap Shot (See FIG. I-49)

| Element Name | Element Type | Purpose |
|---|---|---|
| Group Id | Entry Field | Enter Group Id |
| Group Name | Entry Field | Enter Group Name |
| Phone Number | Entry Field | Enter Phone Number |

SID: enrollment.reinstatement.groupreinstatementrequest

Screen Snap Shot (See FIG. I-50)

| Element Name | Element Type | Purpose |
|---|---|---|
| Mode of Request | Selection Box | Entry Field for the Group Id. |
| Postmark Date | Entry Field | Entry Field for the Group Name |
| Date Received | Entry Field | Entry Field for the Date Received |
| Authorized Contact | Selection Box | Entry Field for the Authorized Contact |
| Reinstatement Date Requested | Entry Field | Entry Field for the Request Rein Date |
| Reason for Reinstatement | Selection Box | Select the Reason for Reinstatement |
| Other Reason | Entry Field | Entry Field for the Other Reason |

SID: enrollment.reinstatement.groupprocessreinstatement

Screen Snap Shot (See FIG. I-51)

| Element Name | Element Type | Purpose |
|---|---|---|
| Effective Date | Entry Field | Entry Field for the Date. |
| Change Status | Select Box | Select Change Status |

SID: enrollment.reinstatement.groupreinstatementconfirm

Screen Snap Shot (See FIG. I-52)

SID: enrollment.reinstatement.employeesearch

Screen Snap Shot (See FIG. I-53)

| Element Name | Element Type | Purpose |
|---|---|---|
| Group Name | Entry Field | Entry Field for the Group Name. |
| Group Id | Entry Field | Entry Field for the Group ID |
| Employee First Name | Entry Field | Entry Field for the Employee First Name |
| Employee Last Name | Entry Field | Entry Field for the Employee Last Name |
| Employee Phone Number | Entry Field | Entry Field for the Employee Phone Number |
| Employee SSN | Entry Field | Entry Field for the Employee SSN |
| Employee ID | Entry Field | Entry Field for the Employee ID |

SID: enrollment.reinstatement.employeereinstatementrequest

Screen Snap Shot (See FIG. I-54)

| Element Name | Element Type | Purpose |
|---|---|---|
| Mode of Request | Selection Box | Entry Field for the Group Id. |
| Postmark Date | Entry Field | Entry Field for the Group Name |
| Date Received | Entry Field | Entry Field for the Date Received |
| Authorized Contact | Selection Box | Entry Field for the Authorized Contact |
| Reinstatement Date Requested | Entry Field | Entry Field for the Request Rein Date |
| Reason for Reinstatement | Selection Box | Select the Reason for Reinstatement |
| Other Reason | Entry Field | Entry Field for the Other Reason |

SID: enrollment.reinstatement.employeeprocessreinstatement

Screen Snap Shot (See FIG. I-55)

| Element Name | Element Type | Purpose |
|---|---|---|
| Effective Date | Entry Field | Entry Field for the Date. |
| Change Status | Select Box | Select Change Status |

SID: enrollment.reinstatement.employeereinstatementconfirm

Screen Snap Shot

SID: enrollment.reinstatement.dependentsearch

Screen Snap Shot (See FIG. I-56)

| Element Name | Element Type | Purpose |
|---|---|---|
| Employee First Name | Entry Field | Entry Field for the Employee First Name. |
| Employee Last Name | Entry Field | Entry Field for the Employee Last Name |
| Employee SSN | Entry Field | Entry Field for the Employee SSN |
| Employee Id | Entry Field | Entry Field for the Employee Id |
| Dependent First Name | Entry Field | Entry Field for the Dependent First Name |
| Dependent Last Name | Entry Field | Entry Field for the Dependent Last Name |
| Dependent SSN | Entry Field | Entry Field for the Dependent SSN |
| Dependent Id | Entry Field | Entry Field for the Dependent Id |

SID: enrollment.reinstatement.dependentreinstatementrequest

Screen Snap Shot (See FIG. I-57)

| Element Name | Element Type | Purpose |
|---|---|---|
| Mode of Request | Selection Box | Entry Field for the Group Id. |
| Postmark Date | Entry Field | Entry Field for the Group Name |
| Date Received | Entry Field | Entry Field for the Date Received |
| Authorized Contact | Selection Box | Entry Field for the Authorized Contact |
| Reinstatement Date Requested | Entry Field | Entry Field for the Request Rein Date |
| Reason for Reinstatement | Selection Box | Select the Reason for Reinstatement |
| Other Reason | Entry Field | Entry Field for the Other Reason |

SID: enrollment.reinstatement.dependentprocessreinstatement

Screen Snap Shot (See FIG. I-58)

| Element Name | Element Type | Purpose |
|---|---|---|
| Effective Date | Entry Field | Entry Field for the Date. |
| Change Status | Select Box | Select Change Status |

SID: enrollment.reinstatement.dependentreinstatementconfirm

Screen Snap Shot (See FIG. I-59)

3.1.2. Screen Flow (See FIG. I-60)

4. Business Rule Mapping

| Activity | Rules |
|---|---|
| Term Process (request received from) | The person who requested the term should be the designated contact person or agent assigned to that group. Other persons are not authorized to initiate the term request. |
| Term Process (Manual) | On employer request the term process is initiated. The term process should check the billing status and the balance due or refund. If the group has paid through and there is no shortage or surplus then this process should auto initiate the term process. Send letters the Group, Employee and dependent. Notify via mail to the GMS rep if the group size is less than 15 and if above 15 notify the Sales rep. If there is a shortage then send a mail to the finance and put the term status as term pending. Finance should initiate follow up for collecting the balance due and sent the term letter and payment letter. On receipt of payment term the Group. If the Payment is not received then retro terms the group. If there is refund due to the group the finance should process the refund and initiate the term there after. Note: GMS can process Term up to 30 days. (LEVEL I) Term beyond 30 days-60 days can be processed only by lead (LEVEL II) Term extended beyond 60 days is based on ultimate authority to a specified user ((LEVEL III and IV) |
| Term Process (Automated) | Automated term process is initiated if the group does not pay the premium or there is shortage of premium. Term letter is sent to the group on 32 day of non-receipt of payment and the Group is given 15-day notice to repay. If the Group does not pay within 32 + 15 days the finance should finalize term based on authority. |
| General Term rules | If the group is termed then all the employees and dependents for the group are termed. The COBRA Members associated with the group should also be termed. The term letter should be sent to the entire member for the Group including the COBRA group. |

-continued

| Activity | Rules |
|---|---|
| | EFT and auto credit card deductions should stop on term. |
| Term Process | Dependent can be terminated based on various reason provide for the employee termination All term should be effective end of the current month or if the term is requested for the month after the current month. Dependent cannot be termed with past date beyond 30 days. Exception: Death of the dependent. The dependent is termed the on the day of the death. |
| Term Rules | Auto initiate Dependent terms if the age of the dependent is 23 and the dependent other than spouse or domestic partner are no longer eligible. Also send the COBRA packet to the dependent if termed. |
| Billing Adjustment | Make adjustment to the billing for the termed dependent in the next billing cycle. |
| Term Process (request received from) | The person who requested the term should be the designated contact person. Other persons are not authorized to initiate the term request. |
| Term Process (Manual) | On employer request the term process is initiated. The term process should check the billing status and the balance due or refund. If the group has paid through and there is no shortage or surplus then this process should auto initiate the term process. Send letters the Group, Employee and dependent. Notify via mail to the GMS rep if the group size is less than 15 and if above 15 notify the Sales rep. If there is a shortage then send a mail to the finance and put the term status as term pending. Finance should initiate follow up for collecting the balance due and sent the term letter and payment letter. On receipt of payment term the Group. If the Payment is not received then retro terms the group. If there is refund due to the group the finance should process the refund and initiate the term there after. Note: GMS can process Term up to 30 days. (LEVEL I) Term beyond 30 days-60 days can be processed only by lead (LEVEL II) Term extended beyond 60 days is based on ultimate authority to a specified user (LEVEL III and IV) |
| Term Process (Automated) | Automated term process is initiated if the group does not pay the premium or there is shortage of premium. Term letter is sent to the group on 32 day of non-receipt of payment and the Group is given 15-day notice to repay. If the Group does not pay within 32 + 15 days the finance should finalize term based on authority. |
| General Term rules | If the group is termed then all the employees and dependents for the group are termed. The COBRA Members associated with the group should also be termed. The term letter should be sent to the entire member for the Group including the COBRA group. EFT and auto credit card deductions should stop on term. |
| Term Process | This is to complete the term process where the term status was term pend. All auto initiated term process has the term status as term pend. It requires user intervention to complete the term process based on authority. |
| Term Process | Employee can be terminated based on various reason provide for the employee termination All term should be effective end of the current month or if the term is requested for the month after the current month. Employee cannot be termed with past date beyond 30 days. Exception: Death of the employee. The employee is termed the on the day of the death. |

-continued

| Activity | Rules |
|---|---|
| Process Associated with term | All employee terms should send term letter to the employee and group. The employee can opt for COBRA and hence the COBRE enrollment packet should be sent to the employee |
| Billing Adjustment | There should be billing adjustment in the subsequent bill for the termed employee. |
| Term Process | Dependent can be terminated based on various reason provide for the employee termination<br>All term should be effective end of the current month or if the term is requested for the month after the current month.<br>Dependent cannot be termed with past date beyond 30 days.<br>Exception:<br>Death of the dependent. The dependent is termed the on the day of the death. |
| Term Rules | Auto initiate Dependent terms if the age of the dependent is 23 and the dependent other than spouse or domestic partner are no longer eligible. Also send the COBRA packet to the dependent if termed. |
| Billing Adjustment | Make adjustment to the billing for the termed dependent in the next billing cycle. |
| Reinstatement Process | The person who requested the reinstatement should be the designated contact person. Other persons are not authorized to initiate the reinstatement request.<br>If reinstatement cannot happen then send the denial letter.<br>If reinstated notify finance<br>System should calculate the reinstatement fees.<br>Finance will reinstate on receipt of payment.<br>Note When the group is reinstated all the members associated with the group are also reinstated. Including COBRA group.<br>GMS can reinstate within 30 days. Any period above this needs authorization. |
| Reinstatement Process | The person who requested the reinstatement should be the designated contact person. Other persons are not authorized to initiate the reinstatement request.<br>If reinstatement cannot happen then send the denial letter.<br>Note When the Employee is reinstated all the dependents of the Employee are also reinstated. |
| Reinstatement Process | The person who requested the reinstatement should be the designated contact person. Other persons are not authorized to initiate the reinstatement request.<br>If reinstatement cannot happen then send the denial letter.<br>If reinstated notify finance for reinstatement fees calculation if applicable. |

5. User Role

The respective level user can terminate or reinstate the dependent, employee or group based on the criteria mention in the following table. The following validations are done with respect to the current date.

| S.No., User Role | Condition |
|---|---|
| | Dependent Termination |
| 1 Level I | Termination date is with in 30 days prior or later |
| 2 Level II | Termination date is with in 60 days prior or later |
| 3 Level III, Level IV | Termination date is with in 90 days prior or later |
| | Employee Termination |
| 1 Level I | Termination date is with in 30 days prior or later |
| 2 Level II | Termination date is with in 60 days prior or later |
| 3 Level III, Level IV | Termination date is with in 90 days prior or later |
| | Group Termination |
| 1 Level I | Termination date is with in 30 days prior or later |
| 2 Level II | Termination date is with in 60 days prior or later |
| 3 Level III, Level IV | Termination date is with in 90 days prior or later |
| | Dependent Reinstatement |
| 1 Level I | Reinstatement date is with in 30 days prior or later |
| 2 Level II | Reinstatement date is with in 60 days prior or later |
| 3 Level III, Level IV | Reinstatement date is with in 90 days prior or later |
| | Employee Reinstatement |
| 1 Level I | Reinstatement date is with in 30 days prior or later |
| 2 Level II | Reinstatement date is with in 60 days prior or later |
| 3 Level III, Level IV | Reinstatement date is with in 90 days prior or later |
| | Group Reinstatement |
| 1 Level I | Reinstatement date is with in 30 days prior or later |
| 2 Level II | Reinstatement date is with in 60 days prior or later |
| 3 Level III, Level IV | Reinstatement date is with in 90 days prior or later |

Benefit Partners Inc

Process Specification

Appeals and Grievances

1. Introduction 1.1. Purpose

The purpose of this document is to describe the process of Appeals and Grievances. This document identifies how the user interacts with the system, the data to be captured, the business logic to be implemented, and the output of the process.

1.2. Business Use Case Specification Reference

| Business Use Specification ID | Business Use Case Name |
|---|---|
| BPI_SCOPE_EN | Enrollment |
| SCOPE_ADD | Addendum to the Scope Document |

1.3. Definitions, Acronyms & Abbreviations

| Term | Explanation |
|---|---|
| BPI_CAS_FSD_EN | Functional Specification Document—Enrollment |
| BPI_CAS_FSD_EN_001 | Process Specification—New Business Enrollment |
| BPI_CAS_FSD_EN_002 | Process Specification—Enrollment Changes/Add-On |
| BPI_CAS_FSD_EN_003 | Process Specification—COBRA Enrollment/Changes |
| BPI_CAS_FSD_EN_004 | Process Specification—ROE/OE |
| BPI_CAS_FSD_EN_005 | Process Specification—Termination/ Reinstatement |

2. Process Identification 2.1. Background

Any process or transaction that is performed by PacAdvantage is subject to a review process. The rule for such is defined in the PacAdvantage handbook. There are cases when the Customer is not satisfied with some of the decisions made during the administration of the program. When a customer is not satisfied with the decision made they can submit a request for Program Review. Once a decision has been made to grant or deny the request, an Appeal can then be submitted to overturn the decision of the Program Review. Not all decisions are appealable. In any case, all grievances need to be sent to PacAdvantage-Roseville, along with other certain requirements, for making a decision whether to consider the Grievances or to reject them as the case may be.

PacAdvantage-Roseville makes the decision on the initial requests or "Program Reviews" and forwards the response to the customer. Upon receipt of a second request or "Appeal", if the decision is appealable, Pac Advantage-Roseville forwards the information to PacAdvantage-SF to make a ruling. (If the decision is not appealable, PacAdvantage-Roseville sends a letter regarding such to the customer.) PacAdvantage-SF then returns a ruling and PacAdvantage-Roseville forwards the response to the customer.

This entire process needs to be captured and tracked by the system.

Any transaction within the system has a history. The personnel handling the grievance need to review the history and generate a report regarding the grievance for review.

2.2. Process Description

The objective of the Grievance process is to:

1) Maintain a status for all Grievances received from the customer and follow up with the decision made either by PacAdvantage-Roseville or PacAdvantage-SF.

The following are the other requirements that will be supported and constraints on the proposed system:

1) The system would track the initial request from open to close.
2) The system would track subsequent requests, if a proper appeal, from re-open to close.
3) Track subsequent requests, if not a proper appeal, for receive dates, remarks and any correspondence.
4) The system would also have a history of all the transactions to get the report for the Nature of Grievance.

2.3. Process Flow

Process for Grievances—First Request (or "Program Review")

1) Receive the Grievance from Group and/or Member and/or Agent representing the Group and/or Member.
2) Categorize the nature of the Grievance.
3) Review the history and collect all the relevant documents for the Grievance.
4) Make decision to approve/deny the Grievance.
5) Close the Grievance.
6) Send relevant letters.
7) If the Grievance is in favor of the group or the employee, send notification to Finance and or GMS to take necessary action (Reinstate the Group/Member).

Process for Grievances—Second Request (or "Appeal")

1) Receive the Grievance from the Group and/or Member and/or Agent representing the Group and/or Member.
2) Categorize the nature of the Grievance.
3) Review the history and collect all the relevant documents for the Grievance.
4) Forward the document with relevant information to PacAdvantage-SF.
5) Follow up with PacAdvantage-SF regarding the decision on the Grievance.
6) On receiving the decision convey the decision to the Group and or employee.
7) Close the Grievance.
8) Send relevant letters.
9) If the Grievance is in favor of the group or the employee send notification to Finance and or GMS to take necessary action (Reinstate the Group/Member).

3. User Interface 3.1. User Interface Screens 3.1.1. Screen ID's

| Screen ID (SID) | Screen Name | Corresponding HTML File Name |
|---|---|---|
| bpi.enrollment.grievance.appellantsearch | Grievance Search | grievancesearch |
| bpi.enrollment.grievance.grievancecreate | Grievance Create | grievancecreate |
| bpi.enrollment.grievance.grievancemodify | Grievance Modify | grievancemodify |
| bpi.enrollment.grievance.grievanceclose | Grievance Close | grievanceclose |

3.1.1.1. SID, Element Name, Element Type & Purpose

SID: bpi.enrollment.grievance.appellantsearch (See FIG. I-61)

Element Name

| Element Name | Element Type | Label | Purpose |
|---|---|---|---|
| Complainant Type | Text | Complainant Type | To display text |
| appellantType | Radio button | Complainant Type | To select the type "Group" or "Member" |
| Complainant ID | Text | Complainant ID | To display text |
| appellantId | Text Field | Complainant ID | To enter complainant id |
| Company Name | Text | Company Name | To display text |
| companyName | Text Field | Company Name | To enter company name |
| First Name | Text | First Name | To display text |
| firstName | Text Field | First Name | To enter first name |
| Last Name | Text | Last Name | To display text |
| lastName | Text Field | Last Name | To enter last name |
| SSN | Text Field | SSN/Tax ID | To enter SSN or Tax ID |
| Phone Number | Text | Phone Number | To display text |
| phoneNumber | Text Field | Phone Number | To enter phone number |
| search | HTML button | Search | To perform Search operation |
| cancel | HTML button | Cancel | To reset the all search fields |
| Search Table | HTML Table | | To list the Complainant ID, Company Name, First Name, Last Name and Phone number is displayed on the screen |

3.1.1.2. SID, Element Name, Element Type & Purpose

SID: bpi.enrollment.grievance.grievancecreate (See FIG. I-62)

| Element Name | Element Type | Label | Purpose |
|---|---|---|---|
| Complainant Type | Text | Complainant Type | To display text |
| Complainant Type | Text | Complainant Type | To display complainant type dynamically |
| Complainant ID | Text | Complainant ID | To display text |
| Complainant ID | Text | Complainant ID | To display complainant type dynamically |
| Group Information | HTML Table | Group Information | To display company name, contact name, address, |

-continued

| Element Name | Element Type | Label | Purpose |
|---|---|---|---|
| | | | phone, effective date, ROE date, status |
| Postmark Date | Text | Postmark Date | To display text |
| postMarkDate | Calendar | Postmark Date | To enter the postmark date |
| Received date | Text | Received date | To display text |
| receivedDate | Calendar | Received date | To enter the received date |
| Nature Of Grievance | Text | Nature of Grievance | To display text |
| natureOf-Grievance | List | Nature of Grievance | To list the Nature of Grievance. Upon selection of the Nature of Grievance, the corresponding Grievance Type is displayed on the screen |
| Subject of Grievance | Text | Subject of Grievance | To display text |
| subjectOf-Grievance | List | Subject of Grievance | To list the Subject of Grievance for selection |
| Urgent | Text | Urgent | To display text |
| urgent | Check-box | Urgent | To select the option of having urgent. |
| Remarks | Text | Remarks | To display text |
| remarks | Text Area | Remarks | To enter remarks larger area is provided |
| save | HTML button | Save | Submit the data and save in the database |
| cancel | HTML button | Cancel | To reset to previous status as was on loading the page |

Screen Validations

| Element Name | Action/Validation Details | Message |
|---|---|---|
| Postmark Date | Should default to system date. Postmark date can never be a future date and can be one day older than current date only. | Error Dialog Box: "Please choose the correct date. Postmark date can be a future date." |
| Received date | Should default to system date. Received date can never be a future date and should be equal to OR greater than current date. | Error Dialog Box: "Please choose the correct date. Received date can be a future date." |
| Nature of Grievance | Default Option should be - Choose One-- Should list all the types of Natures of Grievances | Error Dialog Box: "Please choose the nature of grievance. |
| Subject of Grievance | Default Option should be - Choose One-- Should list all the types of subject of Grievances | Error Dialog Box: "Please choose the subject of grievance. |
| Remarks | Entry Text Area to enter the remarks for the Grievance. The text area should have scrollbar if the content within the text area grows. | None |
| Save | Should function On clicking the Save Button or pressing the Enter key with cursor on the "Save Button" Save the data to the repository with the status of the Grievance as open. Auto generate the grievance ID | Error Dialog Box: "The value entered for 'field name' is incorrect. Please enter the correct value." Note: The "field name" name should be dynamically picked based on the name of the field for which the error has occurred. |
| Cancel | Should reset to the status as was on loading the page on clicking the cancel button | None |

3.1.1.3. SID, Element Name, Element Type & Purpose bpi.enrollment.grievance.grievancemodify (See FIG. I-63)

| Element Name | Element Type | Label | Purpose |
|---|---|---|---|
| Search by Complainant | Text | Search by Complainant | To display text |
| searchType | Radio button | Search by Complainant | To select the option of search |
| Search by Grievance | Text | Search by Grievance | To display text |
| searchType | Radio button | Search by Grievance | To select the option of search |
| Grievance ID | Text | Grievance ID | To display text |
| grievanceID | Read only field | Grievance ID | To display Grievance ID. Ability to search for open Grievances |
| Complainant ID | Text | Complainant ID | To display text |
| appellantId | Entry Field | Complainant ID | To enter complainant ID. Ability to search for open Grievances for the specific complainant. |
| search | Button | Search | To search for the Grievance ID or the Complainant ID (group or member id) with open grievances |
| Grievance Process Table | HTML Table | Grievance Process Table | List the grievances based on the search criteria. |
| Process | HTML Button | Process | To show the grievance selected for further processing |
| Grievance | HTML Table | Grievance | Table to display Postmark Date, Received Date, Nature of Grievance, Subject of Grievance, Appellant Type, Appellant ID, Grievance Status, Remarks. |
| Additional Remarks | Text | Additional Remarks | To display text |
| additional-Remarks | Entry Field | Additional Remarks | To enter text |
| Forward for Approval | Text | Forward for Approval | To display text |
| forwardFor-Approval | Check box | Forward for Approval | To check if forwarding for approval |
| Forward to | Text | Forward to | To display text |
| forwardedTo | Entry Field | Forward to | If "Forward for Approval" is checked then this field must be completed. To enter the name of the person to whom the Grievance is to be forwarded |
| Forward Date | Text | Forward Date | To display text |
| forwardDate | Calendar | Forward Date | If "Forward for Approval" is checked then this field must be completed. Enter the forward date |
| Batch Date | Text | Batch Date | To display text |
| batchDate | Calendar | Batch Date | To enter batch date |
| save | HTML button | Save | Save the data and save in the database |
| cancel | HTML button | Cancel | To reset to previous status as was on loading the page |

Screen Validations

| Element Name | Action/Validation Details | Message |
|---|---|---|
| Grievance | Entry field to enter grievance ID and on tab should populate the Grievance based on the Grievance id | Error Message: "The grievance ID not available" |
| Complainant | Entry fields to enter Complainant ID and on tab should populate all the Grievances for the specific appellant. | Error Message: "Complainant ID not available" |
| Search | Search for the Grievance ID or Appellant ID | None |
| Grievance Process Table | The table gets populated based on the search criteria. For Grievance ID the table shows only one grievance. For Appellant search the table shows all the grievances for the specific Appellant. | None |
| Process | Process the specific Row in the table selected | NONE |
| Grievance | Table to display Postmark Date, Received Date, Nature of Grievance, Subject of Grievance, Appellant Type, Appellant ID, Grievance Status, Remarks. | None |
| Additional Remarks | Entry field for additional remarks | None |
| Forward for Approval | Check box to check if forward or not. | None |
| Forward To | If "Forward for Approval" is checked then this field must be completed. To enter the name of the person to whom the Grievance is to be forwarded | Error Dialog Box: "Please Enter the Forwarded to persons name" |
| Forward Date | Allow entering the date or picking up from the calendar If "Forward for Approval" is checked then this field must be completed. Enter the forward date | Error Dialog Box: "Please Enter the Forwarded Date" |
| Batch Date | Allow entering the batch date or picking up from the calendar | None |
| Save | Should function On clicking the Save Button or pressing the Enter key with cursor on the "Save Button" Save the data on clicking the save button. | Error Dialog Box: "The value entered for 'field name' is incorrect. Please enter the correct value." Note: The "field name" name should be dynamically picked based on the name of the field for which the error has occurred. |
| Cancel | Reset to the state as was on loading the page | None |

3.1.1.4. SID, Element Name, Element Type & Purpose

SID: bpi.enrollment.grievance.grievanceclose (See FIG. I-64)

| Element Name | Element Type | Label | Purpose |
|---|---|---|---|
| Search by Complainant | Text | Search by Complainant | To display text |
| searchType | Radio button | Search by Complainant | To select the option of search |
| Search by Grievance | Text | Search by Grievance | To display text |
| searchType | Radio button | Search by Grievance | To select the option of search |
| Grievance ID | Text | Grievance ID | To display text |
| grievanceID | Entry Field | Grievance ID | To enter Grievance ID. Ability to search for open Grievances |
| Complainant ID | Text | | To display text |
| complainant ID | Text Field | Complainant ID | To display Complainant ID. Ability to search for open Grievances for the specific complainant |
| search | Button | Search | To search for the Grievance ID or the Complainant ID (group or member id) with open grievances |
| Grievance Close Table | HTML Table | Grievance Close Table | List the grievances based on the search criteria. |
| Grievance Table | HTML Table | Grievance Table | Table to display Postmark Date, Received Date, Nature of Grievance, Subject of Grievance, Appellant Type, Appellant ID, Grievance Status, Remarks. |
| Conclusion | Text | Conclusion | To display text |
| conclusion | List | Conclusion | List the conclusion of appeal as Approved, Denied, or Cancelled |
| Reason | Text | Reason | To display text |
| reason | List | Reason | List the Reason for the conclusion |
| otherReason | Entry Field | Other Reason | To enter reason not included in Reason List |
| Batch Date | Text | Batch Date | To display text |
| batchDate | Calendar | Batch Date | To enter batch date |
| Save | HTML button | Save | Submit the data and save in the database |

Screen Validations

| Element Name | Action/Validation Details | Message |
|---|---|---|
| Grievance | Entry field to enter grievance ID. | Error Message: "Grievance ID is required" |
| Complainant | Entry fields to enter Complainant ID. | Error Message: "Complainant ID is required" |
| Search | Search for the Grievance ID or Appellant ID | None |
| Grievance Close Table | The table gets populated based on the search criteria. For Grievance ID the table shows only one grievance. For Appellant search the table shows all the grievances for the specific Appellant. | None |
| Close | Process the specific Row in the table selected | NONE |
| Conclusion | Default option should be - choose one--. List the conclusions for closing the grievance as Approved, Denied or cancelled | None |
| Reason | Default option should be - choose one--. List the reasons applicable | None |
| Other Reason | If the reason selected is others the enter the other reason | None |

-continued

| Element Name | Action/Validation Details | Message |
|---|---|---|
| Batch Date | Allow entering the batch date or picking up from the calendar | None |
| Submit | Should function On clicking the Submit Button or pressing the Enter key with cursor on the "Submit Button"<br>Save the data on clicking the submit button. | Error Dialog Box: "The value entered for 'field name' is incorrect. Please enter the correct value." Note: The "field name" name should be dynamically picked based on the name of the field for which the error has occurred. |

3.1.2. Screen Flow (See FIG. I-65)

4. Business Rule Mapping

| Activity | Rules |
|---|---|
| Appeals and grievance | Appeals and grievance is the screen that needs to be handled by personnel skilled with the operations of the PacAdvantage and the governing rules.<br>All appeals are entered and followed up for the outcome of the appeals. The turn around time for the appeals should be 3 days at the BPI office for entering the record and gathering the reports and summarizing the history. |

Benefit Partners Inc

Process Specification

Association Master

1. Introduction 1.1. Purpose

The purpose of this document is to describe the process of Association Master. This document identifies how the user interacts with the system, the data to be captured, the business logic to be implemented, and the output of the process.

1.2. Business Use Case Specification Reference

| Business Use Specification ID | Business Use Case Name |
|---|---|
| BPI_SCOPE_EN | Enrollment |
| SCOPE_ADD | Addendum to the Scope Document |
| BPI_SCOPE_EN_01 | Business Use case specification- Group Enrollment |
| BPI_SCOPE_EN_03 | Business Use case specification- Create Individual Association |

1.3. Definitions, Acronyms & Abbreviations

| Term | Explanation |
|---|---|

2. Process Identification 2.1. Background

Associations are basically a body of groups/members representing certain types of associations within the State of California. Association Groups and Association Members can participate in the PacAdvantage program similar to small employer groups or members. Associations are classified as Guaranteed, Endorsed, PEO's or Chambers. Each of the associations classified have specific business rules when participating in PacAdvantage program. This document identifies the rules and business governing the association groups and members.

2.2. Process Description

The objective of the Association Master is to:

1) Create a master record for the association based on the classification of the association and specify the business rules associated with these classifications.

2) The master record for association includes

General information about the association

Contact information

Coverage Information

Agent information

Other information like internal work group, membership status etc.

2.3. Process Flow

Process for Association Master

Create, modify or inactivate an association master is the basic operations that can be performed on the association master.

1) Enter general information about the association. The general information includes Association Type Association Name Affiliation ID Address Suite City State

ZIP

2) Enter contact information. The contact information includes

Salutation

First Name

Middle Initial

Last Name

Suffix

Contact Phone

Contact Fax

Email Address

3) Enter coverage information. Coverage information includes

Line of coverage offered

Domestic Partner Coverage

Rate Type

Admin Fees Type (Note: This are captured in Carrier Maintenance Module (Rate Classification)

Agent Fees Type (Note: This are captured in Carrier Maintenance Module (Rate Classification)

Additional Fees type (Note: This are captured in Carrier Maintenance Module (Rate Classification)

4) Enter other information. Other information includes

Internal Work group

Membership status

Contract Date

Association re qualification period

Special Handling

3. User Interface 3.1. User Interface Screens 3.1.1. Screen ID's

| Screen ID (SID) | Screen Name | Corresponding HTML File Name |
|---|---|---|
| enrollment.association.associationgeneral | Association General Info | /bpi/cas/enrollment/association/associationgeneral/AssociationGeneralInfo.jsp |
| enrollment.association.associationcoverage | Association Coverage Info | /bpi/cas/enrollment/association/associationcoverage/AssociationCoverageInfo.jsp |
| enrollment.association.associationother | Association Other Info | /bpi/cas/enrollment/association/associationother/Association OtherInfo.jsp |
| enrollment.association.associationconfirm | Association Confirmation | /bpi/cas/enrollment/association/associationconfirm/AssociationConfirm.jsp |
| enrollment.association.internal workgroupsearch | Internal Work-Group Search | /bpi/cas/enrollment/association/internalworkgroupsearch/InternalWorkGroupSearch.jsp |
| enrollment.association.association-generalsearch | Association Search | /bpi/cas/enrollment/association/associationgeneral/Association GeneralSearch.jsp |

3.1.1.1. SID, Element Name, Element Type & Purpose

SID: enrollment.association.associationgeneral

Screen Snap Shot (See FIG. I-66)

| Element Name | Element Type | Purpose |
|---|---|---|
| General Information | Header Text | To provide content for header |
| Association name | Text | To provide text |
| Association name | Entry Field | Enter association name |
| Search | HTML Button | To show pop up window to search for the association name for editing the data. |
| Association Type | Text | To provide text |
| Association Type | Drop Down List | List the types of association to select from |
| Address Information | Sub Header | To provide content for sub header |
| Address | Text | To provide text |
| Address | Entry field | Enter the address |
| Suite | Text | To provide text |
| Suite | Entry field | Enter the suite number |
| City | Text | To provide text |
| City | Entry field | Enter the city name |
| State | Text | To provide text |
| State | Drop Down List | List the states in USA for selection |
| ZIP | Text | To provide text |
| ZIP | Entry field | Enter the ZIP code |
| Contact Information | Sub Header for contact information | Text for sub header content |
| Salutation | Text | To provide text |
| Salutation | Drop Down List | Select the salutation |
| First Name | Text | To provide text |
| First name | Entry field | Enter first name |
| MI | Text | To provide text |
| MI | Entry field | Enter Middle initial |
| Last name | Text | To provide text |
| Last name | Entry field | Enter last name |
| Suffix | Text | To provide text |
| Suffix | Drop down List | To select the suffix |
| Phone | Text | To provide text |
| Phone | Entry field | Enter phone number |
| Extension | Text | To provide text |
| Extension | Entry field | Enter extension number |

-continued

| Element Name | Element Type | Purpose |
|---|---|---|
| FAX | Text | To provide text |
| Fax | Entry Field | Enter the Fax number |
| Email | Text | To provide text |
| Email | Entry field | Enter the email address |
| Continue | HTML Button | Save and continue to the next screen BPI_CAS_SCR_EN_007_002 |
| Cancel | Reset Button | Reset to the status as was on loading the page |

SID: enrollment.association.associationcoverage

Screen Snap Shot (See FIG. I-67)

| Element Name | Element Type | Purpose |
|---|---|---|
| Coverage Information | Header Text | To provide header for Coverage |
| Line of coverage | Text | To provide text |
| Line of Coverage | Check boxes | Check boxes to select multiple line of coverage offered |
| Domestic Partner Coverage | Text | To provide text |
| Domestic Partner Coverage | Radio Boxes | To choose yes or no for domestic partner coverage |
| Coverage Rate Type | Text | To provide text |
| Coverage Rate type | Radio Boxes | To choose if the rate type is blended or non blended |
| Continue | HTML Button | Submit button to save the data entered in to the repository and navigate to the next screen BPI_CAS_SCR_EN_007_003 |
| Cancel | HTML reset Button | To reset to the status as was on loading the page. |

SID: enrollment.association.associationother

Screen Snap Shot (See FIG. I-68)

| Element Name | Element Type | Purpose |
|---|---|---|
| Other Information | Header text | To provide text for the header |
| Internal work group | Text | To provide text |
| Internal work group | Entry field | Enter the work group ID |
| Search | HTML Button | Button to search for the work group to be attached to the association |
| Membership status | Text | To provide text |
| Membership status | Drop down list | List the membership status as active, closed or frozen |
| Contract Date | Entry field (Calendar) | To enter or pick up the association's effective date |
| Association requalification period | Entry field (Calendar) | To enter or pick up the association's requalification date |
| Batch billing | Text | To provide text |
| Batch billing | Radio box | To specify if the association groups and members are to billed as one batch |

-continued

| Element Name | Element Type | Purpose |
| --- | --- | --- |
| Desired Association name on the bill | Text | To provide text |
| Desired Association name on the bill | Radio Box | To specify if the Association name should be on the bill or not |
| Continue | HTML Button | Button to save the information on this page |
| Clear | HTML reset Button | To reset to the status as was on loading the page. |

SID: enrollment.association.associationconfirm

Screen Snap Shot (See FIG. I-69)

SID: enrollment.association.internalworkgroupsearch

Screen Snap Shot (See FIG. 70)

SID: enrollment.association.associationgeneralsearch

Screen Snap Shot (See FIG. I-71)

3.1.2. Screen Flow (See FIG. I-72)

4. Business Rule Mapping

| Activity | Rules |
| --- | --- |
| Allow Employer Groups 2-50 | Are eligible to enroll at any time and follow business rules for Non-Association Small Employer Groups 2-50. This rules applies for Guaranteed, Endorsed, PEO's and Chambers |
| Allow Individual Members | Must have a membership number and apply after 60 days (read as waiting period), but within 120 days, of becoming a member of the Association or of a group sponsored for coverage. Effective date of coverage will be within 45 days of receipt of a completed application. Declines must wait until Open Enrollment. Waives may enroll within 30 days of losing other employer-sponsored coverage. The Individual Association member is required to enroll in all lines of coverage offered by the Association Master. The Individual Association member is not eligible for COBRA. This is applicable only to Guaranteed association |
| Allow Employer Groups >100 | Are eligible to enroll at any time and follow business rules for Small Employer Groups 2-50 EXCEPT for the size of the group for Guaranteed association (Group size can be un limited for guaranteed association) |
| Rates | Rate for each association for various rate classification are defined in the carrier maintenance module.(Admin Fees, Agent Commission, Additional Fees and Rate differential) |
| Agent | All associations have an Agency and/or Agent(s). Commissions are applicable to both Group's and Association Member's. For both, the agent is attached at the Group/Association member, but can only be chosen from the particular agents attached to the association. Agent is selected based on the internal work group assigned to the agent/agency. |
| Screen Rules for Group | Small employer group after identifying the association would follow the same navigation as applicable for the Small employer group. The Group Affiliated to an association should also have the Membership Number and the date of membership. |
| Screen Rules for Individual Association members | Individual association would follow the same navigation as applicable to the employee after selecting the association and validating that the association is guaranteed. The only additional things needed are a "Membership Number" and a "Date of Membership". Essentially the "Date of Membership" replaces the employee "Date of Hire" for an employee. |

Benefit Partners Inc

Process Specification

Carrier Issues

1. Introduction 1.1. Purpose

The purpose of this document is to describe the process of Carrier Issues. This document identifies how the user interacts with the system, the data to be captured, the business logic to be implemented, and the output of the process.

1.2. Business Use Case Specification Reference

| Business Use Specification ID | Business Use Case Name |
| --- | --- |
| BPI_SCOPE_EN | Enrollment |
| SCOPE_ADD | Addendum to the Scope Document |

1.3. Definitions, Acronyms & Abbreviations

| Term | Explanation |
| --- | --- |
| BPI_CAS_FSD_EN | Functional Specification Document- Enrollment |
| BPI_CAS_FSD_EN_001 | Process Specification - New Business Enrollment |
| BPI_CAS_FSD_EN_002 | Process Specification - Enrollment Changes/Add-On |
| BPI_CAS_FSD_EN_003 | Process Specification - COBRA Enrollment/Changes |
| BPI_CAS_FSD_EN_004 | Process Specification - ROE/OE |
| BPI_CAS_FSD_EN_005 | Process Specification - Termination/ Reinstatement |

2. Process Identification 2.1. Background

Various issues can arise for a member or group once enrolled with a carrier through PacAdvantage. These issues can vary from not receiving identification cards to incomplete transmission upload by the carrier. As PacAdvantage becomes aware of these issues it is their responsibility to resolve the issue in a timely manner acting as a liaison between the member and the carrier. All issues need to be tracked from start to finish by reason for issue and related carrier for reporting on performance standards as well providing information to PacAdvantage-SF regarding recurring issues within a carrier.

Issues can arise at the Group level, for all members on a group and/or all members on a line of coverage. Issues can also arise at the Employee level and/or Dependent level, by member and/or by plan.

Within PacAdvantage there are personnel who specifically handle all carrier related issues. Other representatives within PacAdvantage can receive the initial request, document it as needed and forward it to the Carrier Issue personnel. The Carrier Issue personnel contact the carrier to resolve the issue. They mark the documentation as needed and then close the issue and forward the resolutions back to the initial requestor (Originator). The Originator informs the member/group of resolution.

2.2. Process Description

The objective of the Carrier Issues process is to:

1) Maintain a status for all Carrier Issues received from the customer and follow up with the carrier for resolution and inform the customer of resolution.

The following are the other requirements that will be supported and constraints on the proposed system:

1) The system would track the initial request from open to close.
2) The system would track both the reported issue and the actual issue.
3) The system would track the final resolution.
4) The system would also have a history of all the transactions to get the report for the Reported Issue.

2.3. Process Flow

Process for Carrier Issues

1) Representative is notified of the issue by the customer and cannot resolve the issue alone.
2) Representative initiates a request either from the Group level, Employee level, or Dependent level.
3) The representative categorizes the reported issue and provides any supporting documentation.
4) The issue is marked as "Open" for the Carrier Issue personnel to handle.
5) The Carrier Issue personnel contact the carrier.
6) The Carrier Issue personnel provide the carrier with necessary information to resolve the issue. (i.e. re-transmission, e-mail of information)
7) The Carrier Issue personnel mark the issue as "Closed" and inform the Originator.
8) The originator follows-up with the member.

3. User Interface 3.1. User Interface Screens 3.1.1. Screen ID's

<List SID and the Screen Name and Corresponding HTML File for the Screen.>

| Screen ID (SID) | Screen Name | Corresponding HTML File Name |
|---|---|---|
| bpi.enrollment.carrierissue.carrierissuesearch | Carrier Issue Search | carrierissuesearch |
| bpi.enrollment.carrierissue.carrierissuecreate | Carrier Issue Create | carrierissuecreate |
| bpi.enrollment.carrierissue.carrierissuemodify | Carrier Issue Modify | carrierissuemodify |
| bpi.enrollment.carrierissue.carrierissueclose | Carrier Issue Close | carrierissueclose |

3.1.1.1. SID, Element Name, Element Type & Purpose

SID: bpi.enrollment.carrierissue.carrierissuesearch (See FIG. I-73)

| Element Name | Element Type | Label | Purpose |
|---|---|---|---|
| Customer Type | Text | Customer Type | To display text |
| clientType | Radio button | Customer Type | To select the type "Group" or "Member" |
| Customer ID | Text | Customer ID | To display text |
| clientId | Text Field | Customer ID | To enter complainant id |
| Company Name | Text | Company Name | To display text |
| companyName | Text Field | Company Name | To enter company name |
| First Name | Text | First Name | To display text |
| firstName | Text Field | First Name | To enter first name |
| Last Name | Text | Last Name | To display text |
| lastName | Text Field | Last Name | To enter last name |
| SSN | Text Field | SSN/Tax ID | To enter SSN or Tax ID |
| SSN | Text Field | SSN/Tax ID | To enter SSN or Tax ID |
| Phone Number | Text | Phone Number | To display text |

-continued

| Element Name | Element Type | Label | Purpose |
|---|---|---|---|
| phoneNumber | Text Field | Phone Number | To enter phone number |
| search | HTML button | Search | To perform Search operation |
| cancel | HTML button | Cancel | To reset the all search fields |
| Search Table | HTML Table | | To list the Complainant ID, Company Name, First Name, Last Name and Phone number is displayed on the screen |

3.1.1.2. SID, Element Name, Element Type & Purpose

SID: bpi.enrollment.carrierissue.carrierissuecreate (See FIG. I-74)

| Element Name | Element Type | Purpose |
|---|---|---|
| Received date | Text | To display text |
| Received date | Calendar | To enter the received date |
| Reported Issue | Text | To display text |
| Reported Issue | List | To list the Reported Issue. |
| Group | Entry Field | To enter Group ID if Client Type is Group. Ability to search for Group, upon selection or entry of the Group, the group's general information is displayed (Company Name, Contact Name, Address, Phone, Effective Date, ROE Date, Status) |
| Member | Entry Field | To enter Member ID if Client Type is Member. Ability to search for Member, upon selection or entry of the member ID, the member's general information is displayed (Name, Address, Phone, Effective Date, ROE Date, Status, Benefit Level, Coverage Choice) |
| Remarks | Text | To display text |
| Remarks | Entry Field | To enter remarks |
| Submit | HTML button | Submit the data and save in the database |
| Cancel | HTML button | To reset to previous status as was on loading the page |
| Cancel | HTML button | To reset to previous status as was on loading the page |

Screen Validations

| Element Name | Action/Validation Details | Message |
|---|---|---|
| Received date | Should default to system date. Received date can never be a future date. | Error Dialog Box: "Please choose the correct date. Received date can be a future date." |
| Reported Issue | Default Option should be - Choose One - Should list all the types of Reported Issues | Error Dialog Box: "Please choose the reported issue. |
| Client Type | Option to choose Group or member with radio button group. | None |
| Client | Entry field to enter the group ID or member ID based on the Client type selected. Based on the Client selected Display the Group or member information in the HTML table. | None |
| Search | Pop up window to search for the Group or Member based on the Client type selected. | None |
| Group | HTML Table to display the Group Information | None |
| Member | HTML Table to display member information | None |
| Remarks | Entry Text Area to enter the remarks for the Carrier Issue. The text area should have scrollbar if the content within the text area grows. | None |
| Submit | Should function On clicking the Submit Button or pressing the Enter key with cursor on the "Submit Button" Save the data to the repository with the status of the Carrier Issue as open. Auto generate the Carrier Issue ID | Error Dialog Box: "The value entered for 'field name' is incorrect. Please enter the correct value." Note: The "field name" name should be dynamically picked based on the name of the field for which the error has occurred. |
| Cancel | Should reset to the status as was on loading the page on clicking the cancel button | None |

3.1.1.3. SID, Element Name, Element Type & Purpose

SID: bpi.enrollment.carrierissue.carrierissuemodify (See FIG. I-75)

| Element Name | Element Type | Purpose |
|---|---|---|
| Carrier Issue ID | Text | To display text |
| Carrier Issue ID | Entry Field | To enter Carrier Issue ID. Ability to search for open Carrier Issues |
| Client | Text | To display text |
| Client | Entry Field | To enter client ID. Ability to search for open Issues for the specific client |
| Search | Pop Up window | To search for the Carrier Issue ID or the Client ID (group or member id) with open issues |
| Carrier Issue Process Table | HTML Table | List the issues based on the search criteria. |
| Process | HTML Button | To show the issue selected for further processing |
| Carrier Issue | HTML Table | Table to display Received Date, Reported Issue, Client Type, Client ID, Issue Status, Remarks. |
| Additional Remarks | Text | To display text |
| Additional Remarks | Entry Field | To enter text |
| Notify Carrier | Text | To display text |
| Notify Carrier | Radio Button | To check if notifying to carrier |
| Mode of Notification | Text | To display text |
| Mode of Notification | List Box | If "Notify Carrier" is checked then this field must be completed. To enter the mode of notification |
| Date Notified | Text | To display text |
| Date Notified | Calendar | If "Notify Carrier" is checked then this field must be completed. Enter the notified date |
| Batch Date | Text | To display text |
| Batch Date | Calendar | To enter batch date |
| Submit | HTML button | Submit the data and save in the database |
| Cancel | HTML button | To reset to previous status as was on loading the page |

Screen Validations

| Element Name | Action/Validation Details | Message |
|---|---|---|
| Carrier Issue | Entry field to enter Carrier Issue ID and on tab should populate the Carrier Issue based on the Carrier Issue id | Error Message: "Carrier Issue ID is required" |

-continued

| Element Name | Action/Validation Details | Message |
|---|---|---|
| Client | Entry fields to enter Client ID and on tab should populate all the Carrier Issues for the specific Client. | Error Message: "Client ID is required" |
| Search | search for the Carrier Issue ID or Client ID | None |
| Carrier Issue Process Table | The table gets populated based on the search criteria. For Carrier Issue ID the table shows only one Carrier Issue. For Client search the table shows all the Carrier Issues for the specific Client. | None |
| Process | Process the specific Row in the table selected | NONE |
| Carrier Issue | Table to display Received Date, Reported Issue, Client Type, Client ID, Issue Status, Remarks. | None |
| Additional Remarks | Entry field for additional remarks | None |
| Notify Carrier | Radio button to select if notify or not | None |
| Mode of Notification | If "Notify Carrier" is yes then this field must be completed. To enter the Mode of Notification for whom the Issue is to be forwarded | Error Dialog Box: "Please Enter the Mode of Notification" |
| Date Notified | Allow entering the date or picking up from the calendar If "Notify Carrier" is yes then this field must be completed. Enter the notified date | Error Dialog Box: "Please Enter the Notified Date" |
| Batch Date | Allow entering the batch date or picking up from the calendar | None |
| Submit | Should function On clicking the Submit Button or pressing the Enter key with cursor on the "Submit Button" Save the data on clicking the submit button. If the Mode of Notification is Email, then open new message with appropriate information. If Mode of Notification is Fax, then enter appropriate information for fax. | Error Dialog Box: "The value entered for 'field name' is incorrect. Please enter the correct value." Note: The "field name" name should be dynamically picked based on the name of the field for which the error has occurred. |
| Cancel | Reset to the state as was on loading the page | None |

3.1.1.4. SID, Element Name, Element Type & Purpose

SID: bpi.enrollment.carrierissue.carrierissueclose (See FIG. I-76)

| Element Name | Element Type | Label | Purpose |
|---|---|---|---|
| Search by Customer | Text | Search by Customer | To display text |
| searchType | Radio button | Search by Customer | To select the option of search |
| Search by Carrrier Issue | Text | Search by Carrrier Issue | To display text |
| searchType | Radio button | Search by Carrrier Issue | To select the option of search |
| Carrier Issue ID | Text | Carrier Issue ID | To display text |
| carrierIssueId | Entry Field | Carrier Issue ID | To enter Carrier Issue ID. Ability to search for open Carrier Issue |
| Customer ID | Text | | To display text |
| customerId | Text Field | Customer ID | To display Customer ID. Ability to search for open Carrier Issue for the specific Customer |
| search | Button | Search | To search for the Carrier Issue ID or the Customer ID (group or member id) with open carrier issues |
| Carrier Issue Close Table | HTML Table | Carrier Issue Close Table | List the carrier issue based on the search criteria. |
| Carrier Issue Table | HTML Table | Carrier Issue Table | Table to display Received Date, Reported Issue, Client Type, Client ID, Issue Status, Remarks. |
| Actual Issue | Text | To display text | Actual Issue |
| Actual Issue | List | List the Actual Issue | Actual Issue |
| Retransmission | Text | To display text | Retransmission |

-continued

| Element Name | Element Type | Label | Purpose |
|---|---|---|---|
| Retransmission | Radio button | Select if retransmission needed or not | Retransmission |
| Resolution | Text | To display text | Resolution |
| Resolution | List | List the Resolution of Issue as Verbally Updated; Retransmitted, etc. | Resolution |
| Resolution Comments | Text | To display text | Resolution Comments |
| Resolution Comments | Entry Field | To enter text | Resolution Comments |
| Date Carrier Resolved | Text | To display text | Date Carrier Resolved |
| Date Carrier Resolved | Calendar | To enter date Carrier resolved | Date Carrier Resolved |
| Batch Date | Text | To display text | Batch Date |
| Batch Date | Calendar | To enter batch date | Batch Date |
| Notify Originator | Text | To display text | Notify Originator |
| Notify Originator | Radio Button | To select if notifying to Originator | Notify Originator |
| save | HTML button | Save | Submit the data and save in the database |

Screen Validations

| Element Name | Action/Validation Details | Message |
|---|---|---|
| Carrier Issue | Entry field to enter Carrier Issue ID and on tab should populate the Carrier Issue based on the Carrier Issue id | Error Message: "Carrier Issue ID is required" |
| Customer | Entry fields to enter Client ID and on tab should populate all the Carrier Issues for the specific Client. | Error Message: "Customer ID is required" |
| Search | search for the Carrier Issue ID or Client ID | None |
| Carrier Issue Process Table | The table gets populated based on the search criteria. For Carrier Issue ID the table shows only one Carrier Issue. For Client search the table shows all the Carrier Issues for the specific Client. | None |
| Close | Close the specific Row in the table selected | None |
| Carrier Issue | Table to display Received Date, Reported Issue, Client Type, Client ID, Issue Status, Remarks. | None |
| Actual Issue | Default option should be the same as reported issue. List all issues. | |
| Retransmission | Radio button to select if retransmit or not | None |
| Resolution | Default option should be - choose one -. List the resolutions for closing the issue as Updated, Denied or cancelled | |
| Resolution Comments | Entry field for additional comments | None |
| Date Carrier Resolved | Allow entering the date or picking up from the calendar<br>If "Notify Carrier" is yes then this field must be completed. Enter the notified date | None |
| Batch Date | Allow entering the batch date or picking up from the calendar | None |
| Notify Originator | Radio button to select if notify or not. If yes send pre-formatted email to Originator. | |
| Submit | Should function On clicking the Submit Button or pressing the Enter key with cursor on the "Submit Button"<br>Save the data on clicking the submit button. If the Mode of Notification is Email, then open new message with | Error Dialog Box: "The value entered for 'field name' is incorrect. Please enter the correct value." Note: The "field name" name should be dynamically picked based on the name of the field for which the error has occurred. |

-continued

| Element Name | Action/Validation Details | Message |
|---|---|---|
| | appropriate information. If Mode of Notification is Fax, then enter appropriate information for fax. | |
| Cancel | Reset to the state as was on loading the page | None |

3.1.2. Screen Flow (See FIG. I-77)

4. Business Rule Mapping

| Activity | Rules |
|---|---|
| Carrier Issues | Carrier Issue is the screen that needs to be handled by personnel skilled with the operations of the PacAdvantage and the coordination of data with the Carriers. All issues are entered and followed up for the resolution of the issue. |

Benefit Partners

Process Specification

Billing

1. Introduction 1.1. Purpose

The purpose of this document is to describe the process of Billing. This document identifies how the user interacts with the system, the data to be captured, the business logic to be implemented, and the output of the process.

1.2. Business Use Case Specification Reference

| Business Use Specification ID | Business Use Case Name |
|---|---|
| BPI_SCOPE_FI_001 | Finance - Business use case Specification - Billing |

1.3. Definitions, Acronyms & Abbreviations

| Term | Explanation |
|---|---|

2. Process Identification 2.1. Background

Billing is the process of creating the invoice for the Customers enrolled in the PacAdvantage program. The Invoice is on broad base classified into two—First Time Invoice (invoice to the group/member that has enrolled as new business) and Running invoice or periodic invoice (To the existing Group/Members).

2.2. Process Description

The objective of the Billing process is to:

1) Generate first time invoice to the groups/members who have enrolled as new business. The invoice should get all the information about the group/member prior to invoicing. Generation of first time invoice is an automated process and should be triggered on completion of group/member enrollment.

2) Generate running invoice or periodic invoice to the existing groups/members. All the information about the existing group/members and their real time transaction details are required to invoice correctly.

This billing sub module also needs to have a feature to incorporate the following.

Suppress periodic Bill for a specific Group/Member or collective group and members Preview invoice prior to creation of actual invoice.

Suppress late fee for a specific Group/Member or collective group and members

Calculate Reinstatement Fee for a specific Group/Member or collective group and members Include feature to add dynamic content on the bills sent to the for a specific Group/Member or collective groups and members Calculate additional fee for Credit card transaction if applicable.

Calculate adjustment when there is retrospective change in Benefit Level (for the Carrier Selected) for group/member and make adjustments in the subsequent bill.

Calculate adjustment if the group/members have termed.

Generate manual invoice and preview invoices before generating them.

All billing transactions would be period specific (i.e. the bills would be associated with the month of coverage). Invoices would be run only on a monthly basis, whatever is the billing frequency. For example if the billing frequency opted is quarterly. The excess amount would be adjusted as credits in the subsequent month's invoices.

Invoice view/preview prior to generation of invoice needs to be provided in the Enrollment module.

2.3. Process Flow

Process For Billing—First Time Invoice

1) Enrollment is completed for the new business prior to generation of First Time Invoice.

2) All information relevant for billing (Generation of Invoice is gathered) These information are Group ID Group Billing Address Billing information for the group like billing frequency, mode of payment and relevant information for mode of payment like EFT or Credit Card.

Employees and Dependents information

Member count

Employer Contribution

Employee Contribution

Raw Rate for Each of the Benefit Level for the specific Carrier selected by the employee (for specific Age bracket, Service Area, Coverage Choice with effective date)

Rate differential based on member count (Group size) with effective date

Admin fees for the specific group type with effective date.

Agent commission that is defined in the Agent Info tab for the group if defined. Otherwise the default agent commission specified in the Carrier Maintenance Module (Agent Commission Fees) with effective date.

Additional fees if any for the specific group type with effective date.

Process for Billing—Running Invoice (Periodic Invoice)

1) Monthly or periodic invoice is sent to the existing group/members based on the Frequency selected by the group/member and the mode of communication preferred.

2) Existing billing also gathers all information relevant for billing.

3) In addition to this it also needs the previous invoice history to calculate the additional fees, late fees, reinstatement fees or as applicable.

4) The running invoice generated is for the coverage period following the previous invoice period. I.e if the previous invoice was generated in the month of Jan. 5 2002 and for the coverage period February 2002, The invoice generate on Feb. 5 2001 would be for the coverage period March 2002, 5) Billing should also calculate the Fees required for Credit Card transaction if applicable.

6) Adjustment for Add On employee/dependent or member.

7) Adjustment for Termed employee/dependent or member.

8) Reinstatement fees Termed Group, employee/dependent or member are reinstated.

9) Invoice once created by the system cannot be cancelled.

An invoice is considered closed only if the invoice has been reconciled. Hence all open invoices should be considered for late fee calculation.

3. User Interface 3.1. User Interface Screens 3.1.1. Suppress Batch Billing 3.1.1.1. Screen Snapshot (See FIG. J-1)

3.1.1.2. Element Name, Element Type & Purpose

| Element Name | Element Type | Label | Purpose |
|---|---|---|---|
| Bill Period | Option Box | Bill Period | Bill period for which batch billing is suppressed |
| Selected Groups | Display Text | Selected Groups | Displays count of groups selected out of total groups |
| | | Filter | |
| Group Id | Text Box | Group Id | To filter groups based on group id |
| Group Name | Text Box | Group Name | To filter groups based on group name |
| Group Type | Option Box | Group Type | To filter groups based on group type |
| Group Size | Text Box | Group Size | To filter groups based on group size |
| ROE Date Range | Text Box | ROE Date - To | To filter groups based on ROE date of groups |
| Effective Date Range | Text Box | Effective Date - To | To filter groups based on effective date of groups |
| Rate Type | Option Box | Rate Type | To filter groups based on rate type |
| View | Option Box | View | To filter groups based on whether batch billing is suppressed or not |
| Filter | Command | Filter | Refreshes group selection table based on the filter entered |
| Clear Filter | Command | Clear Filter | Clears the filter and displays all groups in the group selection table |
| Groups Selection | Selection Table | | For selecting groups for export. Options for selection all groups, all groups in a page, deselecting all and selection inversion are available to the user. |
| New | Command | New | Clears the screen |
| Save | Command | Save | Saves the suppressed groups information to the database |

3.1.1.3. Screen Validations

| Element Name | Action/Validation Details | Message |
|---|---|---|
| Bill Period | Check to see that billing period is not null | “Please enter a valid billing period” |

3.1.2. Group Auto Bill Suppressing 3.12.1. Screen Snapshot (See FIG. J-2)

3.1.2.2. Element Name, Element Type & Purpose

| Element Name | Element Type | Label | Purpose |
|---|---|---|---|
| Run Id | Display Text | Import Id | Displays unique system generated id for the bill process run |
| Bill Period | Option Box | Bill Period | Period for which batch billing is run |
| Run By | Display Text | Run By | Displays id of user who initiated the process |
| New | Command | New | Clears the screen |
| Process | Command | Process | Starts the batch billing process |
| View Status | Command | View Status | View status of batch billing process |

3.1.2.3. Screen Validations

| Element Name | Action/Validation Details | Message |
|---|---|---|
| Bill Period | Check to see that billing period is not null | “Please enter a valid billing period” |

3.1.3. Manual Bill 3.1.3.1. Screen Snapshot (See FIG. J-3)

3.1.3.2. Element Name, Element Type & Purpose

| Element Name | Element Type | Label | Purpose |
|---|---|---|---|
| | | Bill Details | |
| Bill # | Display Text | Bill # | Displays unique system generated bill # |
| Bill Date | Display Text | Bill Date | Displays bill date |
| Bill Period | Option Box | Bill Period | Period for which group is billed |
| Due Date | Display Text | Due Date | Displays date on which bill is due |
| Status | Display Text | Status | Displays the status of bill: Open or Reconciled |
| Reconciled Date | Display Text | Reconciled Date | Displays date on which bill was reconciled |
| | | Group Information | |
| Group Id | Text Box | Group Id | Id of the group being billed |
| Group Type | Display Text | Group Type | Displays group type |
| Group Name | Display Text | Group Name | Displays group name |
| Association Name | Display Text | Association Name | Displays name of association if group is enrolled through one |
| Status | Display Text | Status | Displays status of group |
| Rate Type | Display Text | Rate Type | Displays the rate type for the group: blended or non-blended |
| | | Billing Summary | |
| Prior Bill Amount | Display Text | Prior period billed amount | Displays prior period bill amount for the group |
| Adjustments | Display Text | Adjustments since prior period | Displays adjustments total for the group |
| Payments | Display Text | Payments received | Displays payments made by the group from previous bill |
| Past Due | Display Text | Past due amount | Displays amount due from previous bill |
| Current Bill | Display Text | Current bill amount | Displays current bill amount |
| Total Due | Display Text | Total due | Displays total due from the group |
| | | Employer LeveAdjustments | |
| Adjustment Type | Option Box | Adjustment Type | Type of adjustment |
| Amount | Text Box | Amount | Adjustment Amount |
| Period | Option Box | Period | Period for which adjustment entry is posted |
| Adjustments Entry Table | Entry Table | | |
| | | Employee Level Adjustments | |
| Employee Name | Display Column | Employee Name | Displays name of employee |
| Period | Display Column | Period | Displays adjustment period |
| Plan Name | Display Column | Plan Name | Displays the name of the plan |
| Plan Type | Display Column | Plan Type | Displays plan type |
| Coverage Type | Display Column | Coverage Type | Displays coverage option selected by the employee |
| # Members | Display Column | # Members | Displays member count under the employee's coverage |
| Premium | Display Column | Premium | Displays premium |
| Admin Fee | Display Column | Admin Fee | Displays admin fee |
| Agent Fee | Display Column | Agent Fee | Displays agent fee |
| Total Premium | Display Column | Total Premium | Displays total premium |
| | | Employee Level Detail | |
| Employee Name | Display Column | Employee Name | Displays name of employee |
| Plan Name | Display Column | Plan Name | Displays the name of the plan |
| Plan Type | Display Column | Plan Type | Displays plan type |
| Coverage Type | Display Column | Coverage Type | Displays coverage option selected by the employee |

-continued

| Element Name | Element Type | Label | Purpose |
|---|---|---|---|
| # Members | Display Column | # Members | Displays member count under the employee's coverage |
| Premium | Display Column | Premium | Displays premium |
| Admin Fee | Display Column | Admin Fee | Displays admin fee |
| Agent Fee | Display Column | Agent Fee | Displays agent fee |
| Total Premium | Display Column | Total Premium | Displays total premium |
| | | Bill Summary | |
| Medical Premium | Display Text | Subtotal - Medical Premium | Displays medical premium subtotal |
| Dental Premium | Display Text | Subtotal - Dental Premium | Displays dental premium subtotal |
| Vision Premium | Display Text | Subtotal - Vision Premium | Displays vision premium subtotal |
| CAM Premium | Display Text | Subtotal - CAM Premium | Displays CAM premium subtotal |
| Admin Member Fee | Display Text | Administration Member Fee | Displays total of member level admin fee |
| Agent Member Fee | Display Text | Agent Member Fee | Displays total of member level agent fee |
| Admin Flat Fee | Display Text | Administration Flat Fee | Displays group level admin flat fee |
| Agent Flat Fee | Display Text | Agent Flat Fee | Displays group level agent flat fee |
| Current Due | Display Text | Total Due Current Period | Displays current bill amount |
| Past Due | Display Text | Add Past Amount Due | Displays amount due from previous bill |
| Total Due | Display Text | Total Due | Displays total due from the group |
| New | Command | New | Clears the screen |
| Create | Command | Create | Creates the bill |

3.1.3.3. Screen Validations

| Element Name | Action/Validation Details | Message |
|---|---|---|
| Bill Period | Check to see if bill period is not null and is valid | "Please enter a valid bill period" |
| Group Id | Check to see if group id is not null and is valid | "Please enter a valid group id" |
| Adjustment Type | Check to see that the value for the filed is not null and is valid | "Please enter a valid adjustment type" |

-continued

| Element Name | Action/Validation Details | Message |
|---|---|---|
| Amount | Check to see that the value for the filed is not null and is valid | "Please enter a valid adjustment amount" |
| Period | Check to see that the value for the filed is not null and is valid | "Please enter a valid adjustment period" |

3.1.4. Billing Adjustments 3.1.4.1. Screen Snapshot (See FIG. J-4)

3.1.4.2. Element Name, Element Type & Purpose

| Element Name | Element Type | Label | Purpose |
|---|---|---|---|
| Adjustment Id | Display Text | Adjustment Id | Displays unique system generated id for the adjustment |
| Adjustment Date | Text Box | Adjustment Date | Adjustment Date |
| Status | Display Text | Status | Status of the adjustment: Open or Reconciled |
| Group Id | Text Box | Group Id | Id of group for which adjustment entry is made |
| Group Type | Display Text | Group Type | Displays group type |
| Group Name | Display Text | Group Name | Displays group name |
| Association Name | Display Text | Association Name | Displays name of association if group is enrolled through one |
| Group Status | Display Text | Group Status | Displays status of group |
| Adjustment Type | Option Box | Adjustment Type | Type of adjustment |
| Amount | Text Box | Amount | Adjustment Amount |
| Period | Option Box | Period | Period for which adjustment entry is posted |
| New | Command | New | Clears screen for a new adjustment entry |

-continued

| Element Name | Element Type | Label | Purpose |
|---|---|---|---|
| Save | Command | Save | Saves the adjustment entry to the database |
| Search | Command | Search | Provides search functionality for adjustments |

3.1.4.3. Screen Validations

| Element Name | Action/Validation Details | Message |
|---|---|---|
| Group Id | Check to see that the value for the filed is not null and is valid | "Please enter a valid group id" |
| Adjustment Type | Check to see that the value for the filed is not null and is valid | "Please enter a valid adjustment type" |

-continued

| Element Name | Action/Validation Details | Message |
|---|---|---|
| Amount | Check to see that the value for the filed is not null and is valid | "Please enter a valid adjustment amount" |
| Period | Check to see that the value for the filed is not null and is valid | "Please enter a valid adjustment period" |

3.2. Interface Flow

N/A

4. Business Rule Mapping

| Activity | Rules |
|---|---|
| I - First Time Invoice For Small Employer Group | Blended<br>(New Business) Note: All new business falls under blended rate only<br>1. Check All the member for Small Employer Group<br>2. Check the Employee Raw Rate for the Specific Line of Coverage for the (Carrier Selected) Benefit Level.<br>3. Apply formula on the entire employee for all the line of coverage provided by the group for the (Carrier Selected) Benefit Level (Age Bracket, Coverage Choice and Service Area for the specific Employee). Refer Formula<br>4. The Admin Fees, Agent Commission and Rate Differential Factor are governed by the effective date. Apply the effective date for these fees with the Effective date for the Group in deriving the Blended rate for the employees and the total amount payable by the Group. However the Agent commission is based on the one provided at the group level in the Agent Information Tab. It overrides the fee provided in the carrier maintenance agent commission fees.<br>5. Check if the initial payment made by the group equals the Total amount as derived above. If not then check the difference. Allow for Reconciliation up to $2 without and authorized intervention. For amount between $50-$3 Allow reconciliation based on security. For amount above $50 allow reconciliation based on ultimate authority. (This rule governs if the group can be enrolled or not. Hence there should be an invoice preview that identifies the Cash received and the total amount due for the new business) This should be viewable by all.<br>6. The rate should be picked up based on the rules specified below:<br>Check the Effective date for the Group (Initial enrollment date)<br>Check the rate from the rate table whose effective date is latest but less than the effective date of the Group. (E.g.) Group Effective date Mar. 1, 2001. Rate effective dates Jan. 1, 2001 and Jul. 1, 2001. In this example since the group effective date is Mar. 1, 2001 the Rate picked should be Jan. 1, 2001 effective date rate.<br>7. Show the Employer Contribution and the Employee Deduction in the invoice summary. Billing Address should be picked up based on the billing address provided by the group. If billing address is not provided, then business address should be considered for billing. Also check the mode of communication. If the group prefers to be mailed emailed or faxed and accordingly transmit the invoice. Refer Sample Invoice 1 for the Small Employer Group (New Business)<br>Note: Small employer may bring in the COBRA members. Bill the COBRA members separately or along with the Group based on the decision made for billing the COBRA Group.<br>If the COBRA members are billed separately. Generate a separate invoice for the each subscriber COBRA members. Refer Rule for COBRA Member Invoice<br>However the bill for the COBRA members can be sent to the primary group if that option is selected.<br>All COBRA Invoices whether billed to the primary group or the COBRA Group should have a separate invoice for all the COBRA groups. |
| For COBRA Members | (New Business) Note: All new business falls under blended rate only even for COBRA members brought by new business.<br>1. Check the entire subscriber COBRA member for Small Employer Group (primary Group).<br>2. Check Coverage Choice for the Subscriber member for each lines of coverage and also note that these line of coverage are selected by the Primary group.<br>3. Check what are the line of coverage picked up be each of the members including the subscriber member and their dependent.<br>Note: The rate for the COBRA member should be based on the following rule. |

-continued

| Activity | Rules |
|---|---|
| | Identify the subscriber member line of coverage selected. The age, service area and the coverage choice provided by the subscriber member is the governing rate.<br>If the subscriber does not select the line of coverage that the dependent member have selected. Check if the dependent member have relation ship as spouse or child/children.<br>If the Relationship is spouse then the Spouse Age should be the deciding factor for the rate and the coverage choice opted.<br>If the relationship is child/children then the eldest dependent member should be the deciding factor for the rate based on the Age.<br>Note however in all the above cases the Service Area is governed by the Service area of the Subscriber COBRA member.<br>Note: If the Primary COBRA member is a child they have their own Group ID and their own line of coverage and benefit level. |
| For Individual Association Member | (New Business) Note: All new business falls under blended rate even for the individual association member.<br>1. Individual association member can have dependent attached to the member.<br>2. The rate for the individual association member is governed by the rate applicable for the Guaranteed association based on the effective date for the Association.<br>3. The individual members can have the same line of coverage as defined by the association.<br>4. The Admin Fee, Agent Commission, Additional fees and rate differential factor is as applicable for the Association with the effective date.<br>5. The calculation formula is the same as applicable for the employee of Small employer group.<br>6. The dependents for the individual association members are governed by what has been selected by the subscriber individual association member. |
| Small employer Group affiliated to association | New Business) Note: All new business falls under blended rate even for the Small employer group affiliated to an association.<br>1. Small employer groups affiliated with an association have the same rules as applicable to the Small employer group with exception for the rate.<br>2. The Admin fees, Agent commission, additional fees and Differential factor for the small employer groups affiliated with an association are as defined for the Association with effective date for the Association.<br>3. However the Agent commission is based on the one provided at the group level in the Agent Information Tab. It overrides the fee provided in the carrier maintenance agent commission fees |
| II - First Time Invoice Formula | Blended for Small Employer Group<br>Blended Rate = (Raw Rate * Differential Factor)/(1 − Agent Commission % − Admin Fee %) |
| Example | The formula for the premium calculation for invoice Blended is as follows (Blended)<br>a) Raw Rate<br>b) Agent Commission<br>c) Admin fee<br>d) Additional Fees<br>e) Differential factor<br>Example<br>Raw rate = $100<br>Differential Factor = 0.95 on raw rate<br>Agent Commission = 8% on blended rate<br>Admin Fees = 5% on blended rate<br>Additional Fees = 10% on blended rate<br>(A) (Amount Billed to group) Blended Rate = (100*0.95)/(1 - 0.08 - .05) = $109.20<br>(B) Agent Commission (8% of $109.20) = $8.74<br>(C) Admin fees (PacAdvantage and BPI) (5% of $109.20) = $5.46<br>Carrier Premium (A - B - C) = $95<br>This formula is for the specific Benefit Level (offered by carrier) for a specific line of coverage and a specific employee/member.<br>The total amount billed to group should include all the Rates after applying this formula for all the employees/members and their line of coverage. |

-continued

| Activity | Rules |
|---|---|
| III - First Time Invoice Formula Example | Blended for COBRA Members<br>The formula for the premium calculation for the invoice Blended for Cal COBRA is as follows:<br>Cal Cobra Total Premium = Blended Rate * (1 + Additional Fees %)<br><br>Example<br>Amount billed to Cal COBRA member = 109.20 * (1 + 0.10) = $120.12<br>Cobra Fees = $120.12 - $109 .20 = 10.92<br>(A) Blended Rate = (100*.95)/(1 - 0.08-.05) = $109.20<br>(B) Agent Commission (8% of $109.20) = $8.74<br>(C) Admin fees (PacAdvantage and BPI) (5% of $109.20) = $5.46<br>(D) Cal COBRA Carrier (80% of 10% of $109.20) = $8.74<br>(E) Cal COBRA PacAdvantage (20% of 10% Additional Fee on Blended Rate)<br>(20% of 10% of $109.20) = $2.18<br>(F) Carrier Payment including Premium and Cal COBRA fee = A - B - C + D = $103.74<br>(G) PacAdvantage Collection for Cal COBRA = B + C + E = $16.38<br>Total Amount Billed on Cal COBRA member = F + G = $120.12<br>This formula is for the specific Benefit Level (offered by carrier) for a specific line of coverage and a specific employee/member.<br>The total amount billed to COBRA Subscriber member should include all the Rates after applying this formula for all the members and their line of coverage. |
| IV - Running Invoice | Blended<br>1. For Running invoice all that is applicable for first time invoice is applicable. In addition to that the running invoice has the following as well:<br>2. Late fee if applicable: Late fee charges are 5% on the Amount due in the prior invoices. The late fee calculation rule is as follows:<br>Due Date:<br>Postmark date:<br>Received date:<br>If the post mark date for cash receipt is available it should fall on or before due date.<br>If postmark date is not available then if should check 5 calendar days backward from the date received and see if it falls within the due date.<br>If the amount is received within the due date as per the above rules and is short late fee is still applied for the shortage of premium.<br>If the above two conditions are not satisfied then late fee is charged for the Group or member.<br>Note: Late fee is charged on the prior month's current premium<br>(e.g.) Due date is 1$^{st}$ of every month or the first business day of the month. Whichever is applicable. For example Feb. 1, 2001<br>Date payment received : Feb. 1, 2001 No late fee<br>Date payment received is Feb. 2, 2001 and post marked Jan. 31, 2001 No late fee<br>Date payment received is Feb. 3, 2001 and post marked Feb. 2, 2001 late fee applicable<br>Date payment received is Feb. 6, 2001 and postmarked date not available. Look 5 days behind for the date for receipt. I.e Feb. 1, 2001 hence no late fees<br>Date payment received is Feb. 8, 2001 and postmarked date not available. Look 5 days behind for the date for receipt. I.e Feb. 3, 2001 hence late fees applicable.<br>3. Balance forward if applicable: Balance forward is the amount balance from the previous invoice or shortage of premium.<br>4. Billing Adjustment: Billing adjustments can have various categories: Note The adjustment can be positive or negative based on the coverage period.<br>Employee Coverage Choice Change<br>Employee/Dependent Benefit Level(Selected carrier) change<br>Employee/Dependent Termination<br>Employee/Dependent Add On<br>Rate for the Benefit Level Offered by the carrier changes retrospectively. I.e over writing the previous effective date that was applicable for the group.<br>5. Credit Card Payment transaction fee if applicable: Credit card transaction fee is 2.5% of the total amount due for the group/member<br>6. NSF Check if applicable: $25 handling fees is charged for the NSF check.<br>7. Reinstatement fees: (Reinstatement fees are on the following assumption that on the date of term all the previous balances on the group are settled.) The group needs to be reinstated on the date next to the term date. The Amount due for the reinstatement from the date following the term dates to the current month when the group is reinstated.<br>(e.g.) Group Term Date: Feb. 31, 2001<br>Date when the group was reinstated May 10, 2001<br>Effective reinstatement date is Mar. 1, 2001. Reinstatement fees is calculated for the Period Mar. 1, 2001 I.e. the month when the reinstatement occurred. The invoice contains the premium due for the next month as well i.e. Jun. 1, 2001. However the current amount due is based on the current period i.e. from Mar. 1, 2001 to May 31, 2001, Next months period Jun. 31, 2001 and reinstatement fees Percentage on the premium due when reinstatement occurred (The amount on which the reinstatement fees is calculated.)<br>Note: Subsequent billing cycle would contain the Reinstatement Adjustments and Reinstatement fees on reinstatement for the group/member.<br>A reinstatement fee is 10% of the premium due when reinstatement occurred. |

-continued

| Activity | Rules |
|---|---|
| V - Running Invoice | Non- Blended |
| | Note: The difference in the rules for non-blended and blended is in the rate calculation rules. The rest of the processes are same as for the blended. |
| Formula | Formula for Non - Blended Rates<br>The formula for the premium calculation for the invoice Non - Blended is as follows<br>(Non-Blended)<br>a) Raw Rate<br>b) Agent Commission per Member<br>c) Agent Commission per Group based on group size<br>d) Admin fee per Member<br>e) Admin fee per Group based on group size<br>f) Additional Fees<br>g) Differential factor<br>Member Level Fees = Raw Rate + Member Count * (Agent Commission Per Member + Admin Fee Per Member)<br>Note (If differential factor is applicable then Raw rate should be factored i.e Raw Rate * Differential Factor)<br>Group Level Fees = Agent Commission per Group Size + Admin Fees per Group size<br>Total Non Blended Premium Billed to Group =<br>Member Level Fees + Group Level Fees |
| Example | Raw Rate = $100<br>Agent Commission per Member = $10<br>Agent Commission per Group based on group size = $50 for Group size => 15<br>Admin fee per Member = $10<br>Admin fee per Group based on group size = $50 for Group size => 15<br>Additional Fees = 10 % on Raw Rate<br>Differential factor<br>Employee1 Member count including employee = 3<br>Employee2 Member count including employee = 2<br>Employee3 Member count including employee = 4<br>Employee4 Member count including employee = 5<br>Employee5 Member count including employee = 1<br>Total Member count = 15<br>Group size (=>15) = 15<br>Member Level Fee<br>Employee1 = 100 + 3 (10 + 10) = $160<br>Employee2 = 100 + 2 (10 + 10) = $140<br>Employee3 = 100 + 4 (10 + 10) = $180<br>Employee4 = 100 + 5 (10 + 10) = $200<br>Employee5 = 100 + 1 (10 + 10) = $120<br>Member Level Fees = $800<br>Group Level Fees = $50 + $50 + $100<br>Total Non Blended Premium Billed to Group =<br>Member Level Fees + Group Level Fees = $800 + $100 = $900<br>This formula is for the specific Benefit Level (offered by carrier) for a specific line of coverage and a specific employee/member.<br>The total amount billed to group should include all the Rates after applying this formula for all the employees/members and their line of coverage. |
| Formula<br>Example | Formula for Non - Blended Rates<br>The formula for the premium calculation for the invoice Non Blended for Cal COBRA is as follows:<br>Member Premium for Cal COBRA = Raw Rate * (1 + Additional fee %)<br>Example:<br>Member Premium for Cal COBRA = 100 * (1 + 0.10) = $110<br>Amount Billed to COBRA Group = $110<br>This formula is for the specific Benefit Level (offered by carrier) for a specific line of coverage and a specific employee/member.<br>The total amount billed to COBRA Subscriber member should include all the Rates after applying this formula for all the members and their line of coverage. |

Benefit Partners Inc

Process Specification

Cash Receipt

1. Introduction 1.1. Purpose

The purpose of this document is to describe the process of Cash Receipt. This document identifies how the user interacts with the system, the data to be captured, the business logic to be implemented, and the output of the process.

1.2. Business Use Case Specification Reference

| Business Use Specification ID | Business Use Case Name |
|---|---|
| BPI_SCOPE_FI_002 | Finance - Business use case Specification - Cash Receipt |

1.3. Definitions, Acronyms & Abbreviations

| Term | Explanation |
|---|---|
| EFT | Electronic Fund Transfer |

2. Process Identification 2.1. Background

Cash Receipt is the process of entering the cash received by BPI into the system. The cash receipt can be received in various modes as defined by the business process. Cash Receipt includes Lock Box receipts, Check, Credit Card, EFT and Transfer.

2.2. Process Description

This Cash Receipt sub module also needs to incorporate the following.

1) Enter the lock box payment received as a batch process into the system
2) Enter EFT payment received as a batch process into the system
3) EFT payment made directly to Wells Fargo Bank
4) On line payment using the Credit Card and Check
5) User interface to make payment over phone by Credit card or Check
6) Credit Card payment with automatic pulling of the cash or manually on request
7) Handle negative check i.e. NSF's, Refund and Transfer.
8) Transfer of cash from one group to the other.

This Cash Receipt sub module also needs to have a feature to incorporate the following.

Batch the cash receipt based on the batch number defined.

There should be ability to batch each of the modes of the payment received into a separate batch.

For EFT, Credit Card, On Line Check and Lockbox payments there should be ability to upload the files into the system as one batch. Reconciliation will follow once the batch is imported and closed.

In addition, prior entry of Lock box total entry made needs to tally with the lock box total.

This document details only one mode of cash entry namely, Manual Batch. Lockbox, EFT and payments through credit cards are detailed in their respective process specification documents.

2.3. Process Flow

Cash receipts into the system can be from the following sources:

EFT

Check received at BPI

Lock Box file

On line Credit Card

Check or Credit card over phone

The cash received by any of the above mode is batched and entered into the system. The batch number is identified based on the mode of payment receipts. All batches should be identified uniquely with batch number and timestamp.

The Payment received are either entered manually into the system or uploaded into the system from the files available. The batch total and sum of the entries made in each batch should tally before saving the batch.

Batch date should represent the deposit date.

Batch Types are:

1. Manual Batch
2. NSF Batch
3. Returns Batch
4. Positive Transfer
5. Negative Transfer
6. Lockbox Check
7. Auto-Batch EFT
8. Direct Deposit
9. Wire Transfer
10. CC over phone
11. Auto-Batch Credit Card
12. Online Credit Card 3. User Interface 3.1. User Interface Screens 3.1.1. Manual Cash Batch 3.1.1.1. Screen Snapshot (See FIG. J-5)

3.1.1.2. Element Name, Element Type & Purpose

| Element Name | Element Type | Label | Purpose |
|---|---|---|---|
| | | Batch Information | |
| Batch Id | Display Text | Batch Id | Displays unique system generated id for the batch |
| Batch Date | Text Box | Batch Date | Batch Date |
| Batch Total | Display Text | Batch Total | Displays total of all cash entries |
| Batch Type | Option Box | Batch Type | Type of manual batch. Possible options are Manual Batch, NSF Batch, Returns Batch, Positive Transfer, Negative Transfer |
| Tape Total | Text Box | Tape Total | Tape total of all cash entries |
| Tape Balance | Display Text | Tape Balance | Displays difference between the tape total and total of cash entries entered |
| Batch Status | Display Text | Batch Status | Displays status of batch: Open or Closed |
| | | Check Information | |
| Postmark Date | Text Box | Postmark Date | Date on which the payment was postmarked |
| Received Date | Text Box | Received Date | Date on which payment was received |
| Check # | Text Box | Check # | Check number |
| Check Amount | Text Box | Check Amount | Check amount |
| | | Check Distribution | |
| Group Id | Text Box | Group Id | Group against which payment is allocated |
| Group Name | Display Text | Group Name | Displays name of selected group |
| Amount | Text Box | Amount | Amount allocated to the group out of the total payment amount |
| Comments | Option Box | Comments | Standard comments for the payment, if any |

-continued

| Element Name | Element Type | Label | Purpose |
|---|---|---|---|
| Others | Text Box | Others | To enter any comments other than the standard ones |
| Payment Entries | Editable Table | | Displays all payment entries for the batch for editing |
| New | Command | New | Clears screen for a new batch entry |
| Save | Command | Save | Saves the batch information to the database |
| Close | Command | Close | Closes the batch. A batch can not be edited after closing |
| Search | Command | Search | To search for saved batches |

3.1.1.3. Screen Validations

| Element Name | Action/Validation Details | Message |
|---|---|---|
| | Batch Information | |
| Batch Date | Check to see if batch date is not null and is valid | "Please enter a valid batch date" |
| Batch Type | Check to see if valid batch type is selected | "Please select a valid batch type" |
| Tape Total | Check to see if tape total is not null and is valid | "Please enter a valid tape total" |
| | Check Information | |
| Postmark Date | Check to see if postmark date is not null and is valid | "Please enter a valid postmark date" |
| Received Date | Check to see if the received date is not null and is valid | "Please enter a valid received date" |
| Check # | Check to see if check number is not null and is valid | "Please enter a valid check number" |
| Check Amount | Check to see if check amount is not null and is valid | "Please enter a valid check amount" |
| | Check Distribution | |
| Group Id | Check to see if group id is not null and is valid | "Please enter a valid group id" |
| Amount | Check to see if amount is not null and is valid | "Please enter a valid amount" |

3.2. Interface Flow

N/A

4. Business Rule Mapping

| Activities | Rules |
|---|---|
| Batch Entry | Unique id should be created for each batched. The batch total should be tallied to the individual sum before saving the batch. The batch id should be uniquely generated prior to creation of batch. Each cash receipt should have the postmark date, date received and the system date (I.e the date when the batch is created) and batch total. The line items within each batch should have a feature to Split the payment for multiple group ids if required. Batch date should be the deposit data. Any entries made to the batch can be saved prior to completion of the batch entries. However there would be a status for the batch which would indicate if the batch is closed or not. Modification can be done only to the batches that are open. Any batch that is closed cannot be modified. If there is an erroneous entry for the batch and the batch is saved. Only Transfer can be done and it is not allowed to delete the batch that are closed. Only the batches that are closed can be reconciled. |

-continued

| Activities | Rules |
|---|---|
| Batch by File Uploads | The batch that are created by uploading the files like for Lockbox, EFT or Credit Card will have an identification that payment for this batch was made by Lockbox, EFT or Credit Card. These batches are always closed. |
| Negative Check (NSF) | NSF would be entered into the system and there would be an indicator indicating that this batch is a NSF batch. |
| Transfer | Cash transfer may be due to the reason that the Cash has been wrongly enter for the group to which the cash does not belong. In such cased entering negative cash receipt for the Group for whom the cash has been wrongly entered and making positive cash to the group to whom the cash belongs makes the cash adjustment. There should be a positive and negative cash adjustment. |
| Returns | Refund would be a batch and would be handled similar to the NSF Check. |

Benefit Partners Inc

Process Specification

Cash Reconciliation

1. Introduction 1.1. Purpose

The purpose of this document is to describe the process of Cash Reconciliation. This document identifies how the user interacts with the system, the data to be captured, the business logic to be implemented, and the output of the process.

1.2. Business Use Case Specification Reference

| Business Use Specification ID | Business Use Case Name |
|---|---|
| BPI_SCOPE_FI_003 | Finance - Business use case Specification - Cash Reconciliation |

1.3. Definitions, Acronyms & Abbreviations

| Term | Explanation |
|---|---|
| EFT | Electronic Fund Transfer |

2. Process Identification 2.1. Background

Cash Reconciliation is the process of reconciling the cash receipts to individual invoices and reconciling the amount paid by the group.

The objective of the Cash Reconciliation process is to reconcile:

1) Billed amounts and cash receipt
2) Cash to negative cash
3) Adjustment to cash
4) Adjustment to billed amounts
5) Billed amount to itself if the total due results in zero
6) Adjustment to Adjustment 2.2. Process Flow and Description Process for Cash Reconciliation:

Reconciliation is the process of matching one to one the cash received on hand and the invoices that are open. The cash are received by numerous ways as described in BPI_CAS_FSD_FI__02 (Cash Receipt). The invoice is generated for the various groups/members based on the premium due. These invoices are matched with the cash receipts and reconciled.

The rule for reconciliation should be as follows:

1. Look for the Negative Cash available and reconcile it with the positive cash (for NSF checks).
2. Look for the oldest unreconciled invoice and reconcile with the oldest cash.

The reconciliation process should look through all the invoices that have not been reconciled for a specific group and reconcile the invoice that has the earliest date with the cash received. It should also match the Cash receipt with the invoice amount.

Note: reconciliation process is started automatically when the cash receipt batch is closed and it reconciles the cash received with the invoices.

Billed amounts and cash receipt: This reconciliation process is to reconcile the invoice that has not yet been reconciled for the specific group and check if the invoice is earliest un reconciled invoice for the specific group and reconcile the invoice with the cash received form the group/member.

Cash to negative cash: This is the process of reconciling the negative cash with the positive cash received from the group. This case arises when there is a NSF check and the group's invoice has been reconciled. The bank usually notifies NSF check and then NSF Cash receipt entry is created in the system. Now on receipt of a replacement check against the NSF check the NSF check is reconciled with the replacement check provided the amount tallies.

Adjustments to Cash: This is the process of reconciling the cash receipt with the adjustment that may be available in the next invoice. Example: If the group has received the invoice for the next month and they have an employee termed this month after the generation of invoice. The generated invoice would not identify this adjustment for the termed employees as the employee was termed after creation of invoice. But the Group may deduct the adjustments for the termed employee and send the cash that would be short as they would sent the check with the adjustments. Hence this process should identify such conditions and adjust the cash receipt for the invoice with adjustment taken in to account. The next invoice would show the cash receipt and the adjustment for the employees termed. This process can also be coined as "Reconciled but not billed".

Adjustment to billed amounts: This process identifies the invoices that are already billed to the group and any adjustments that are not made in the current invoice needs to be adjusted in the next invoice with the adjustments made.

Billed amount to itself if the total due results in zero: This is process identifies if the group is termed and the invoice is already created for the group for the next month. Invoice would be created for the termed group on group termination and would adjust that with previous invoice. There would always be a final invoice for the termed groups showing adjustments that would include refund, or short fall or zero balance.

Adjustment to Adjustment: This process is for adjusting the late fee with late fee is waived, Reinstatement fees with reinstatement fee waive as the case may be. If the Late fee is shown in the previous invoice that can be adjusted by waiving late fee or reinstatement fees as applicable. Example: Late fees may be $25.00 and waive late fees would be $−25.00. Here adjustment to adjustment would be $25 to $25. Also adjustment needs to be made on invoice with invoice.

3. User Interface 3.1. User Interface Screens 3.1.1. Manual Reconciliation 3.1.1.1. Screen Snapshot (See FIG. J-6)

3.1.1.2. Element Name, Element Type & Purpose

| Element Name | Element Type | Label | Purpose |
|---|---|---|---|
| | | Group Information | |
| Group Id | Display Text | Group Id | Displays id of the group |
| Group Type | Display Text | Group Type | Displays group type |
| Group Name | Display Text | Group Name | Displays group name |
| Association Name | Display Text | Association Name | Displays name of association if group is enrolled through one |
| Status | Display Text | Status | Displays status of group |
| Rate Type | Display Text | Rate Type | Displays the rate type for the group: blended or non-blended |
| Left to balance | Display Text | Left to balance | Displays amount left to be reconciled |
| | | Bill Information | |
| Bill # | Display Column | Bill # | |
| Coverage Period | Display Column | Coverage Period | |
| Due Date | Display Column | Due Date | |
| Bill Date | Display Column | Bill Date | |
| Bill Total | Display Column | Bill Total | |
| Total Due | Display Column | Total Due | |
| | | Adjustments Information | |
| Adjustment Id | Display Column | Adj. Id | |
| Adjustment Type | Display Column | Adj. Type | |
| Adjustment Date | Display Column | Adj. Date | |
| User Id | Display Column | User Id | |
| Coverage Month | Display Column | Cvrg Month | |
| Amount | Display Column | Amount | |
| | | Cash Receipts | |
| Batch Id | Display Column | Batch Id | |
| Postmarked Date | Display Column | Date PM | |
| Date Received | Display Column | Date Recd | |
| Check # | Display Column | Check # | |

-continued

| Element Name | Element Type | Label | Purpose |
|---|---|---|---|
| Batch Type | Display Column | Batch Type | |
| Payment Amount | Display Column | Pmt Amt | |
| Unused Amount | Display Column | Unused Amt | |
| Comments | Display Column | Comments | |
| Post Reconciliation | Command | Post Recon-ciliation | Post reconciliation entries |
| Clear | Command | Clear | Clears screen for a new import. |
| Search | Command | Search | Provides functionality to search groups |

3.1.1.3. Screen Validations

Note: Reconciliation can have any of the possible combination provided below:

1) Invoice to Invoice

2) Invoice to Cash receipt

3) Invoice to Adjustment

4) Cash receipt to cash receipt

5) Cash receipt to adjustment

6) Adjustment to adjustment

Hence, the validation for the amount left to balance is done based on any of the combination selected from the check boxes.

Note: Adjustments would be shown only under special conditions where term has been initiated after generation of invoices and the group pays short taking this adjustments into account.

3.1.2. Billing & Payments History 3.1.2.1. Screen Snapshot (See FIG. J-7)

3.1.2.2. Element Name, Element Type & Purpose

| Element Name | Element Type | Label | Purpose |
|---|---|---|---|
| Group Information | | | |
| Group Id | Display Text | Group Id | Displays id of the group |
| Group Type | Display Text | Group Type | Displays group type |
| Group Name | Display Text | Group Name | Displays group name |
| Association Name | Display Text | Association Name | Displays name of association if group is enrolled through one |
| Status | Display Text | Status | Displays status of group |

-continued

| Element Name | Element Type | Label | Purpose |
|---|---|---|---|
| Rate Type | Display Text | Rate Type | Displays the rate type for the group: blended or non-blended |
| Bill Information | | | |
| Bill # | Display Column | Bill # | |
| Coverage Period | Display Column | Coverage Period | |
| Due Date | Display Column | Due Date | |
| Bill Date | Display Column | Bill Date | |
| Bill Total | Display Column | Bill Total | |
| Total Due | Display Column | Total Due | |
| Adjustments Information | | | |
| Adjustment Id | Display Column | Adj. Id | |
| Adjustment Type | Display Column | Adj. Type | |
| Adjustment Date | Display Column | Adj. Date | |
| User Id | Display Column | User Id | |
| Coverage Month | Display Column | Cvrg Month | |
| Amount | Display Column | Amount | |
| Cash Receipts | | | |
| Batch Id | Display Column | Batch Id | |
| Postmarked Date | Display Column | Date PM | |
| Date Received | Display Column | Date Recd | |
| Check # | Display Column | Check # | |
| Batch Type | Display Column | Batch Type | |
| Payment Amount | Display Column | Pmt Amt | |
| Unused Amount | Display Column | Unused Amt | |
| Comments | Display Column | Comments | |
| Search | Command | Search | Provides functionality to search groups |

3.1.2.3. Screen Validations

NA 3.2. Interface Flow

N/A

4. Business Rule Mapping

| Activities | Rules |
|---|---|
| Automated Reconciliation | Automatic Reconciliation would be done on closing the batch for the cash receipt. If the cash receipt batch were closed then it would start the reconciliation process.<br>The following process would be auto reconciled:<br>Billed amounts and cash receipt<br>Adjustment to cash<br>Billed amount to itself if the total due results in zero<br>Adjustment to billed amounts |
| Reconciliation for the Existing Groups | Reconciliation process would look for the earliest un reconciled invoice and reconciles it provided it is less than $+_2.00.<br>Reconciliation would be as per the following sequence.<br>Look for the Negative Cash available and reconcile it with the positive cash (for NSF checks). |

-continued

| Activities | Rules |
|---|---|
| | Look for the oldest unreconciled invoice and reconcile with the oldest un-reconciled cash and so on. On Reconciliation the entire invoice, cash receipts would have a status as reconciled. |
| Manual Reconciliation | This process would trigger reconciliation manually based on authority or if the user is trying to reconcile and specific cash receipts with the invoice as the case may be. Manual reconciliation can be does only for those invoices that has not reconciled automatically |
| Manual Reconciliation | Cash to negative cash<br>Adjustment to Adjustment<br>Any reconciliation that is not completed by automatic reconciliation process would be reconciled manually. |
| Formula for reconciliation | General formula for reconciliation would be as follows:<br>Billed amounts and cash receipt = (Invoice Amount − Cash Receipt)<br>Adjustment to cash = (Adjustment − Cash Receipts)<br>Billed amount to itself if the total due results in zero = (Invoice Amount + Invoice Amount)<br>Adjustment to billed amounts = (Adjustment Amount + Invoice Amount)<br>Cash to negative cash = (Cash receipt + cash receipt)<br>Adjustment to Adjustment = (Adjustment + adjustment)<br>General formula = (Invoice Amount + Adjustment Amount − Cash Receipt Amount)<br>Example<br>Invoice = $1000.00, Cash receipt = $−100.00, Cash receipt = $918.00, Adjustment = $−100.00, Adjustment = $−80.00<br>Amount that can be Reconciled = 1000 − (−100) − (800) + (−100) + (−80) = 1000 + 100 − 918 −100 − 80 = $2.00 This $2.00 is balance forward for the subsequent invoice. |
| New Business Reconciliation | Excluding COBRA and Individual Association Members who follow the reconciliation rules as per the Existing Group, the new business groups is auto reconcile if within $ +−2.00. If the amount is short by $100.00 the invoice and the cash receipt would be reconciled and the short fall would be balance forward in the next invoice. PacAdvantage Fund (A Cash Receipt Batch auto generated by the system) would adjust this short fall. This would be based on authority (Finance/GMS).<br>Also for the new business the auto reconciliation process would apply to reconcile the Invoice Generated on successful enrollment with the cash receipt as initial enrollment payment. |

Benefit Partners Inc

Process Specification

Risk Adjustment

1. Introduction 1.1. Purpose

The purpose of this document is to describe the process of Risk Adjustment. This document identifies how the user interacts with the system, the data to be captured, the business logic to be implemented, and the output of the process.

1.2. Business Use Case Specification Reference

| Business Use Specification ID | Business Use Case Name |
|---|---|
| BPI_SCOPE_FI_007 | Finance - Business use case Specification - Risk Adjustment |

1.3. Definitions, Acronyms & Abbreviations

| Term | Explanation |
|---|---|
| EFT | Electronic Fund Transfer |

2. Process Identification 2.1. Background

Risk Adjustment is the process of accessing the risk borne by each of the Carrier in paying for the claims submitted to them by members.

Risk adjustment factor is assigned to the Carrier. Based on these factors the carrier may be classified as Payers, Receivers or None (if no factor is assigned).

Payers are the one who pays in the risk adjustment amount to the Pool. Receivers are the one who receives the Risk Adjustment amount from the pool.

These risk adjustment factors are pre-defined by PacAdvantage.

2.2. Process Description

The objective of the Risk Adjustment process is to:

1) Provide for upload of Risk Adjustment (RA) factors in the form of text files into PX2 system The uploaded data would subsequently be used in cash disbursement reports for suggesting the amount to be paid out to carriers after application of RA factors.

The following are the other requirements that will be supported and constraints on the proposed system:

1) The system will maintain a log of all zip codes and service area imports. The log information will include the user, the day & time of import, the file path & format and the status of the import.

2.3. Process Flow

Process for Upload of Risk Adjustment Factors

1) The import file and an effective date for import are all input from the user.

2) The system checks to see if the file data is per the format expected. If not, an error is reported.

3) If data already exists for an effective date, the system prompts to the user as to whether it should overwrite the data or cancel the import.

4) The system imports Risk Adjustment factors to its database.

3. User Interface 3.1. User Interface Screens 3.1.1. Risk Adjustment Factors Import 3.1.1.1. Screen Snapshot (See FIG. J-8)

3.1.1.2. Element Name, Element Type & Purpose

| Element Name | Element Type | Label | Purpose |
|---|---|---|---|
| Import Id | Display Text | Import Id | Displays unique id for the import |
| Status | Display Text | Status | Displays status of import |
| Imported By | Display Text | Imported By | Displays id of user who did the import |
| Import Date | Display Text | Import Date | Displays date on which import was done |
| Import File | Text Box | Import File | Full path of the file to be imported |
| Effective Date | Text Box | Effective Date | Date on which the RA factors becomes effective |
| New | Command | New | Clears screen for a new import. |
| Import | Command | Import | Starts the import process |
| Search | Command | Search | Provides functionality for search of imports |

3.1.1.3. Screen Validations

| Element Name | Action/Validation Details | Message |
|---|---|---|
| Import File Name | Check to see that the value for the field is not null | "Please enter a valid import file name" |
| Effective Date | Check to see that the value for the filed is not null and is valid | "Please enter a valid effective date" |

3.2. Interface Flow

N/A

4. Business Rule Mapping

| Activities | Rules |
|---|---|
| Risk Assessment Formula | The formula for risk Adjustment factor is as given below:<br>Raw Rate = Premium Amount (Raw Rate for Medical Line of coverage and the benefit level for the specific carrier opted by the member)<br>Adjustment Factor = Fixed dollar amount per member count (can be negative or positive based on whether the Carrier is receiver or payer)<br>Positive is the receiver and negative is the payer.<br>Risk Adjustment amount = Raw rate + (Risk Adjustment factor * member count for that plan)<br>Example<br>Adjustment Factor = $ + 5.00 for Aetna (receiver)<br>Adjustment Factor = $ − 2.00 for Health Net (payer)<br>Employee 1 = $400 with (4 member inclusive of employee) Aetna<br>Employee 2 = $300 with (2 member inclusive of employee) Health net<br>Employee 3 = $200 with (1 member inclusive of employee) Health net<br>For Health net<br>300 + (−2 * 2) + 200 + (−2 * 1) = 304 + 202 = 494.00<br>For Aetna<br>400 + (5 * 4) = $420.00 |

Note:
the adjustment factor has an effective date attach to it. Normally it is loaded once in 6 months.

Benefit Partners Inc

Functional Specification Document

Mail Merge

1. Introduction 1.1. Purpose

The purpose of this document is to describe the functional requirements for the Mail Merge module. This document provides a brief description of the module functionality and identifies all the integration points with other modules.

This document is to be read in conjunction with the BPI Scope document, which identifies all the business use cases for the proposed system. For each business use case or a set of logically related use cases, a detailed process specification document is prepared. The process specification document identifies how the user interacts with the system, the data to be captured, the business logic to be implemented, and the output for each business use case. This document consists of forward references to all the process specifications associated with the Mail Merge module.

1.2. Scope Document Reference

This section provides the scope document references for the module.

| Scope Document Reference | Document Description | Version |
|---|---|---|
| BPI_SCOPE | Scope Document for BPI | 1.0 |
| BPI_SCOPE_ADD | Addendum to the BPI scope document | 1.0 |

1.3. Process Specification Document Reference

This section provides the forward references to the process specification document for the module.

| Process Specification Document Reference | Document Description | Version |
|---|---|---|

1.4. Definitions, Acronyms and Abbreviations

| Term | Explanation |
|---|---|
| Mail Merge | Mail merge is the process of populating predefined templates with dynamic data to extract business correspondences like quotes, letters to groups, agents etc. |

2. Module Functionality 2.1. Brief Description

The Mail Merge module addresses the functionality of the system where it needs to generate business correspondences using predefined templates. The templates are basically RTF files with placeholders for dynamic data in them. The output is usually a RTF file, but at times this could be a PostScript or a PDF document. The diagram below illustrates the mail merge process. (See FIG. K-1)

Benefit Partners, Inc uses a lot of mail merge templates for their business correspondences. There are around 150 templates that are in use today.

The proposed system will also maintain a log of mail merge letters generated. The log information includes the template id, timestamp, triggering application, user generating the letter, and to whom the letter is addressed (i.e., which group or member or agent).

3. Letter Regeneration 3.1. Brief Description

Benefit Partners, Inc would like to have functionality where a letter can be reproduced exactly as the original at a later point in time without having to store a whole electronic copy of the original letter. This functionality would be achieved by storing just the dynamic text that goes into generation of the original letter and the template used for the original letter in a persistent medium. When a letter has to be reproduced the template used for the original letter and the dynamic text are retrieved from the persistent medium and merged to produce a copy of the original letter.

3.2. Storing the Template

The proposed functionality requires the template used for generation of the original letter, to be available at the time of reproducing the letter. This would be achieved by versioning the templates whenever there is a change to template. All the versions of a template would be maintained, as electronic copies, for achieving the proposed functionality. The current version to be used for each template would be specifiable in a configuration file (XML).

3.3. Storing the Dynamic Text

The dynamic that goes into generated letter would be stored as an entity (column) in a database table. The dynamic text would be stored as a key-value pair that maps each placeholder in the template with the data that goes in the placeholder. The likely database structure for the table that holds the dynamic data is shown in the "Data Structures" section.

3.3.1 Implementation Notes

Since the size of the dynamic text is relatively huge and varying for different letters, it would be stored as a long field in the database. Most of the database implementations (especially IBM DB2 UDB) suggest that a table containing long fields be placed on a separate storage disk in order to avoid a performance hit. With an idea on the average number of letters generated by Benefit Partners, Inc, it is estimated that the data size growth would be at the rate of 3.5-5 GB per year.

3.4. Reproducing a Letter

The proposed functionality would require a new application to reproduce a letter. The user would be able to search previously generated letters using different parameters like date and time of generation of original letter, type of letter (welcome, term, reinstate etc), intended addressee etc. The system would fetch the version of template used, retrieve the dynamic text from the database and reproduces the letter.

3.4.1 User Interface (See FIG. K-2)

3.4.1.1 Screen Fields Explanation

| Element Name | Element Type | Label | Purpose |
|---|---|---|---|
| Period | Text Boxes | Letters generated between . . . | To specify a criteria for searching letters based on generated date and time |
| Type of letter | Option Box | Type of letter | To specify a criteria for searching letters based on the type of letter. Letter types are welcome, term, add-on etc |
| Addressee | Text Box | Addressee | To specify a criteria for searching letters based on letter addressee. A lookup option is provided to search groups, employees, agents etc. |
| Searched Letters List | Display Table | | Displays letters that match the search criteria. |
| Generate Selected | Command | Generate Selected | Reproduces selected letters. |

4. Mail Merge Templates

The following table lists out the mail merge templates to be used in the proposed system.

Note: Unless specified otherwise, delivery mode is addressee's preferred mode of communication.

| # | Category/ Module | ID | Description | Trigger Process | A/M | Dlry Mode |
|---|---|---|---|---|---|---|
| 1. | Group | 001 | New group welcome | New Biz Enrollment | A | |
| 2. | Group | 002 | Notification of adding new employee | EE Add-on | A | |
| 3. | Group | 003 | Notification of adding dependent when employee is already enrolled | DEP Add-on | A | |
| 4. | Group | 004 | Missing information for new group | New Biz Enrollment | A | |
| 5. | Employee (add-on/changes) | 005 | Missing information for new employee adding to existing group | EE Add-on/ Changes | A | |
| 6. | Group | 006 | Denial to enroll add-on (employee or dependent) | EE/DEP Add-on | A | |
| 7. | Group | 007 | Notification of employee and/or dependent term | EE Term | A | |
| 8. | Group | 008 | Notification of group changes processed | GRP Changes | A | |
| 9. | Group | 009 | Notification of overdue premium | Cash Reconciliation | A & M | |
| 10. | Group | 011 | Notification of employee or dependent changes processed | EE/DEP Changes | A | |
| 11. | Group | 012 | Notification of employee retroactive termination | | M | |
| 12. | Group | 013 | Missing info request dependent | DEP Add-on/ Changes | A | |

-continued

| # | Category/ Module | ID | Description | Trigger Process | A/M | Dlry Mode |
|---|---|---|---|---|---|---|
| 13. | Group | 014 | Denial of reinstatement | GRP Reinstatement | A | |
| 14. | Group | 015 | Approval of reinstatement | GRP Reinstatement | A | |
| 15. | Cobra and CalCobra | 016 | Request for missing information | COBRA Enrollment | A | |
| 16. | Group | 017 | Termination for non-payment of premium with reinstatement | GRP Termination | A | |
| 17. | Group | 018 | Termination for non-payment of premium with no reinstatement option | GRP Termination | A | |
| 18. | Group | 019 | New group not qualified (declined) | New Biz Enrollment | A | |
| 19. | Employee (add-on) | 020 | Notification of add-on employee to existing group | EE Add-on | A | |
| 20. | Employee (termination) | 021 | Notification of employee term | EE Term | A | |
| 21. | Employee (group termination) | 022 | Notification of retroactive group term due to shortage of premium | GRP Term | A | |
| 22. | Employee (group termination) | 023 | Notification of group term | GRP Term | A | |
| 23. | Employee (changes) Dependent | 024 | Notification of employee changes processed Changes processed for dependent | EE/DEP Changes | A | |
| 24. | Employee (group termination of line of coverage) | 025 | Notification that group has terminated a line of coverage | GRP Changes | A | |
| 25. | Employee (termination) | 026 | Notification of retro-termination | EE Term | A | |
| 26. | Employee (group reinstatement) | 027 | Notification to employee of group's reinstatement | GRP Reinstatement | A | |
| 27. | Group | 028 | Group Requalification approval | ROE Process | A | |
| 28. | Group | 029 | Termination for non-requalification | ROE Process | A | |
| 29. | Employee (dependent new enrollment) | 031 | Notification to employee of dependent enrollment when employee is already enrolled | DEP Add-on | A | |
| 30. | Group | 032 | Notification of termination of line of coverage | GRP Changes | A | |
| 31. | Group | 037 | Voluntary termination | GRP Term | A | |
| 32. | Group | 038 | Missing information at ROE or O/E | ROE Process | A | |
| 33. | Agent | 040 | New agent welcome letter | Agent Creation | A | |
| 34. | Employee (add-on) | 041 | CalCobra initial notification (always sent 2 business days after letter 020. Must be mailed USPS | EE Add-on | A | USPS |
| 35. | Group | 042 | Denial of group change | GRP Changes | A | |
| 36. | Group | 043 | Denial of change for employee or dependent | EE/DEP Changes | A | |
| 37. | Employee (termination | 044 | Notification of CalCobra rights (always send 2 business days after letter 007. Must be mailed USPS. | EE Term | A | USPS |
| 38. | Agent (group, employee or dependent) | 046 | Cover letter for agents regarding group, employee, and dependent correspondence. | | A | |
| 39. | Group | 052 | Notification of waiver of late fee | Late fee waive | A | |
| 40. | Group | 053 | Manual letter Declaration of Eligibility for over age 23 Dependent Child | | M | |
| 41. | Group | 054 | Manual letter Certification of Corporate Wage Earner of Self Employed Income | | M | |
| 42. | Group | 055 | Manual letter Termination due to Shortage of premium | | M | |
| 43. | Group | 057 | Manual letter Notification of employee on disability | | M | |
| 44. | Group | 058 | Manual letter Verification of employee on un-paid leave | | M | |
| 45. | Association (requalification) | 060 | Individual member termed due to non-requalification | ROE Process | A | |
| 46. | Cobra and CalCobra | 070 | New Cobra/CalCobra welcome letter | COBRA Enrollment | A | |

-continued

| # | Category/ Module | ID | Description | Trigger Process | A/M | Dlry Mode |
|---|---|---|---|---|---|---|
| 47. | Cobra and CalCobra | 071 | Cobra/CalCobra terming due to ending of continuation period. Letter needs to be sent 60 days prior to the coverage end date. | Automated Process | A | |
| 48. | CalCobra | 072 | CalCobra Voluntary termination prior to continuation end date | Cal-COBRA Term | A | |
| 49. | Cobra | 073 | Cobra Voluntary termination prior to continuation end date | COBRA Term | A | |
| 50. | Cobra and CalCobra | 074 | Termination due to non-payment of initial Cobra/CalCobra premium | COBRA Term | A | |
| 51. | Cobra and CalCobra | 075 | 45 day premium notice | Automated Process | A | |
| 52. | Cobra and CalCobra | 076 | Ineligible for Cobra/CalCobra | COBRA Enrollment | A | |
| 53. | Employee | 078 | Employee term notice with no Cobra option | EE Term | A | |
| 54. | Grievance | 080 | Group denial of late fee waive | Late fee waive | A | |
| 55. | Grievance | 081 | Group denial of copay change for employee/dependent | Appeals & Grievances | A | |
| 56. | Grievance | 082 | Group denial of reinstatement for non-payment | Appeals & Grievances | A | |
| 57. | Grievance | 083 | Group denial of retroactive effective date | Appeals & Grievances | A | |
| 58. | Grievance | 084 | Group denial of retro-termination date | Appeals & Grievances | A | |
| 59. | Grievance | 085 | Group denial of enrollment for employee or dependent | Appeals & Grievances | A | |
| 60. | Grievance | 086 | Group denial for carrier change for employee/dependent | Appeals & Grievances | A | |
| 61. | Grievance | 087 | Group denial to add a newborn dependent | Appeals & Grievances | A | |
| 62. | Grievance | 088 | Group denial for a retro-active carrier transfer for employee or dependent | Appeals & Grievances | A | |
| 63. | Grievance | 089 | Group denial to add domestic partner coverage | Appeals & Grievances | A | |
| 64. | Grievance | 090 | Group denial of 2nd review or appeal | Appeals & Grievances | A | |
| 65. | Dependent | 092 | Manual letter Declaration of eligibility for over age 23 dependent | | M | |
| 66. | Agent (Sales and Marketing | 100 | Event followup | | | |
| 67. | Agent (Sales and Marketing) | 101 | Enrollment meeting questionnaire Need to tie information to a lead | | M | |
| 68. | Agent (Sales and Marketing) | 102 | Business tracking report | | M | |
| 69. | Agent (Sales and Marketing) | 103 | Lead Form | | M | |
| 70. | Agent (Sales and Marketing) | 104 | Broker Survey letter | | M | |
| 71. | Agent (sales and marketing) | 105 | BSS intro to agent | | M | |
| 72. | Agent (sales and Marketing) | 106 | Follow-up on agent intro | | M | |
| 73. | Agent (Sales and Marketing) | 107 | Letterhead - blank | | M | |
| 74. | Agent (sales and marketing) | 108 | Fax coversheet - blank | | | |
| 75. | Agent (commissions) | 109 | Tax ID number request | | M | |
| 76. | Agent (commissions) | 110 | Request W9 | | M | |
| 77. | Agent (commission) | 111 | Vehicle collection order | | M | |
| 78. | Agent (commission) | 112 | Broker of record dispute | | M | |
| 79. | Agent (commission) | 113 | Broker collection letter | | M | |
| 80. | Agent (commission) | 114 | License expiration letter | | M | |
| 81. | Agent (commissions) | 116 | Debit 1 | | M | |

-continued

| # | Category/ Module | ID | Description | Trigger Process | A/M | Dlry Mode |
|---|---|---|---|---|---|---|
| 82. | Agent (Commission) | 117 | Debit 2 | | M | |
| 83. | Agent (Commission) | 118 | Debit 3 | | M | |
| 84. | Agent (Commissions) | 119 | Francise Tax Board withholding | | M | |
| 85. | Group | 120 | Manual letter. Agent license expired; group need to select new agent. | | M | |
| 86. | Group | 121 | Manual letter. $ Owed due to denial of retro-term of EE/dependent | | M | |
| 87. | Group | 122 | Manual letter. $ Owed - EE/dependent will be termed. | | M | |
| 88. | Group | 124 | Manual letter. Federal Cobra election form | | M | |
| 89. | Agent (requalification) | 125 | Requalification reminder letter to agent, contains a list of groups who have not returned material. | | M | |
| 90. | Agent (group non-payment of premium) | 126 | Overdue premiums for groups. Contains a list of agent's groups. | | M | |
| 91. | Group | 127 | Manual letter Electronic Funds Transfer Election Form | | M | |
| 92. | Supply ordering | 127A | Pick list for fulfilling supply requests | | M | |
| 93. | CalCobra only | 128 | Notification that Employer has termed a line of coverage. (Sent to CalCobra when line of coverage is termed) | GRP Changes | A | |
| 94. | CalCobra only | 129 | Notification that Employer has added a line of coverage. (Sent to CalCobra when adding the line of coverage at the employer master.) | GRP Changes | A | |
| 95. | Association individual member | 131 | Notification of dependent term | Assocn Member DEP Term | A | |
| 96. | Association Individual member | 132 | Denial to enroll dependent | Assocn Member DEP Add-on | A | |
| 97. | Association Individual member | 133 | Voluntary Termination | Assocn Member Term | A | |
| 98. | Association Individual member | 134 | Missing information request at ROE or OE | Assocn Member ROE Process | A | |
| 99. | Association Individual member | 135 | Denial of change request | Assocn Member Changes | A | |
| 100. | Association Individual member | 136 | Notification of dependent retro-term | Assocn Member DEP Term | | |
| 101. | Association Individual Member | 137 | Notification of Overdue premium | Cash Reconciliation | A & M | |
| 102. | Association Individual member | 138 | Individual member group termination for NPOP with reinstatement option | Assocn Member Term | A | |
| 103. | Association Individual member | 139 | Denial of reinstatement | Assocn Member Reinstatement | A | |
| 104. | Association Individual member | 140 | Dependent add-on welcome letter | Assocn Member DEP Add-on | A | |
| 105. | Association Individual member | 141 | Missing information request at new business or dependent add | Assocn Member Enrollment or DEP Add-on | A | |
| 106. | Association Individual member | 142 | Individual member group termination with no reinstatement option | Assocn Member Term | A | |
| 107. | Association Individual member | 143 | Individual member new group not eligible | Assocn Member Enrollment | A | |

-continued

| # | Category/ Module | ID | Description | Trigger Process | A/M | Dlry Mode |
|---|---|---|---|---|---|---|
| 108. | Association Individual member | 144 | Manual Letter. Individual member premium shortage not received | | M | |
| 109. | Association Individual member | 145 | Manual letter. Outstanding premium due on termed individual member group | | M | |
| 110. | Association Individual member | 146 | Manual letter. $ Owed due to denial of retro-term of dependent. | | M | |
| 111. | Association individual member | 147 | Manual Letter. $ Owed - dependent will be termed. | | M | |
| 112. | Association Individual member | 148 | Individual member notification of retro-term | Assocn Member Term | A | |
| 113. | Association Individual member | 149 | Individual member welcome | Assocn Member Enrollment | A | |
| 114. | Employee/Dependent | 150 | Cal-COBRA Election Form | EE/DEP Term | A | |
| 115. | Dependent (termination) | 151 | Notification of dependent termination | DEP Term | A | |
| 116. | Association Individual member | 152 | Approval of Individual Association member reinstatement | Assocn Member Reinstatement | A | |
| 117. | Group (Dependent termination) | 153 | Notification of dependent term to Group | DEP Term | A | |
| 118. | Group (Dependent retro termination) | 154 | Notification of dependent retroactive term to Group | DEP Term | A | |
| 119. | Group (Dependent add on denial) | 155 | Dependent add on denial Notification letter | DEP Add-on | A | |
| 120. | Grievance | 156 | Review Denial of Employee Retroactive Effective date | | A | |
| 121. | Grievance | 157 | Review Denial of Dependent Retroactive Effective date | | A | |
| 122. | Grievance | 158 | Review Denial of Dependent Retroactive Termination date for employee | | A | |
| 123. | Grievance | 159 | Review Denial of dependent late enrollee | | A | |
| 124. | Grievance | 160 | Manual letter. Claim form return letter to Employee | | A | |
| 125. | Grievance | 161 | Manual letter. Claim form return letter to Association member | | A | |
| 126. | Grievance | 162 | Manual letter. Dependent Claim form return letter to Employee | | A | |
| 127. | Grievance | 163 | Manual letter. Claim form return letter to Association member's Dependent | | A | |
| 128. | Group | 164 | Notification of Group Premium Shortage Retro Term | Group Term | A | |
| 129. | Employee (Dependent Retro Term | 165 | Employee notification of Dependent Retro Term | DEP Term | A | |
| 130. | Cobra Calcobra | 166 | Cobra Cal cobra notification of group's Retro Term | Group Term | A | |
| 131. | Group (Cobra and Cal Cobra group) | 167 | Parent Group Cover Letter for Cobra member | | A | |
| 132. | Group | 167A | Group Cover Letter | | A | |
| 133. | Association (Association Individual member | 168 | Association Cover Letter | | A | |
| 134. | Employee (Dependent changes denial) | 169 | Denial of Dependent changes | DEP Changes | A | |

Benefit Partners Inc

Process Specification

Reports

1. Introduction 1.1. Purpose

The purpose of this document is to describe the process of Reports and reporting the information and the data available in the system. This document identifies how the user interacts with the system, the data to be captured, the business logic to be implemented, and the output of the process.

1.2. Business Use Case Specification Reference

| Business Use Specification ID | Business Use Case Name |
|---|---|
| BPI_SCOPE_REP | Reports |

1.3. Definitions, Acronyms & Abbreviations

| Term | Explanation |
|---|---|

2. Process Identification 2.1. Background 2.2. Process Description

The objective of the Reports is to provide information captured in the system to the user in a presentable manner.

The reports can be single, two-dimensional and multi dimensional providing the information to the decision-maker.

The objective of reporting is to paint that picture by analyzing and interpreting vast quantities of data-customer demographics, cross-sales, service calls, Internet experiences and online transactions—turning information into insight and developing conclusive, fact-based strategies to gain that competitive edge.

Reports are categorized based on the modules and the purpose of the reports.

2.3. Process Flow

All reports can be classified based on the following criteria:

Purpose of Report: Briefly outline the intended use and the purpose of the report and what information it is to provide.

Intended Audience/Delivery To: This specifies the intended audience for the report and to whom the report is to be delivered. The can be ranging from President, Vice President Operations, Managers and CFO's and BPI Team.

Frequency of reports (Monthly, Weekly daily etc.): The frequencies of reports are based on whether the reports are Automated or Manual. All automated reports would have the frequency for delivery (Monthly, Weekly etc.). Manual reports does not have any frequency and can also be called as adhoc report, which is reported on the screen in the form of HTML when, required by the user.

Mode of Delivery: All automated reports are delivered via email to the users defined as the intended audience. Adhoc reports are viewable on the screen and can be printed in HTML format.

Output Format (HTML, XL or RTF): Output Format can be XL, HTML or RTF. The formats are based on the report type. All reports that are automated are in XL format. The reports that are manual or Adhoc are in HTML format.

User Interface required for the report or not: Adhoc Reports and manual reports require user interface to generate the report. These reports are generated in HTML format.

Automated reports does not require User interface.

Input to the system (Input parameters): This defines the input parameters required to generate the Report. Input can be based on single parameter, Multiple parameters with and/or Conditions.

Expected Output of the report (Output Parameters): This defines the output of the report. The output can be single dimensional or multi dimensional.

Output can also be based on certain logic's, calculation and comparative reports or derivative of two or more reports summarized.

The reports that are generated automatically should be delivered to the intended audience via email. Also all the generated reports should be store under some file path in a systematic manner (may be time stamp and report ID) and logged in file or Database (preferably in database) so that we can retrieve the reports retrospectively from this file path.

3. User Interface 3.1. User Interface Screens 3.1.1. Reports: BPI_SCR_REP_INPUT 3.1.1.1. Screen Snapshot This is a generalized screen for all the reports. This screen can be split into two parts, one as an input parameter to obtain the desired report and the second part is the report itself. (See FIG. L-1)

3.1.1.2. Element Name, Element Type & Purpose

| Element Name | Element Type | Purpose |
|---|---|---|
| Module ID | Text | Describes the name of the module the report is extracted from. |
| Report name | Text | Name of the report |
| Report ID | Text | ID of the Report |
| Parameters | Text | Specifies the input parameters for the report |
| Parameter Entries | Entry Field | Specifies the entry fields for the parameters |
| Fetch report | HTML Button | Button to fetch the report based on the input criteria |

3.1.1.3. Screen Validations

| Element Name | Action/Validation Details | Message |
|---|---|---|
| Parameter Entries | Entry Field for the parameters, E.g. group ID, Group name, from Date, To Date etc. that is required to build the dynamic reports. Note: The number of parameters depends on the report in question. The report output can be based on the input criteria. The input criteria are provided to narrow down the search results or narrow down to a specific output for the report. | Error Message: "The data you have entered is in correct" Please enter the correct data." |

3.1.2. Help Menu

| Element Name | Purpose | Valid Values |
|---|---|---|
| Parameter Entries | Describe the parameters used for the report. | Based on specific Reports |

3.2. User Interface Screens 3.2.1. Reports: BPI_SCR_REP_OUTPUT 3.2.1.1. Screen Snapshot (See FIG. L-2)

This is a generalized screen for all the reports. This screen can be split into two parts, one as an input parameter to obtain the desired report and the second part is the report itself.

3.2.1.2. Element Name, Element Type & Purpose

| Element Name | Element Type | Purpose |
|---|---|---|
| Module Name | Text | Describes the name of the module the report is extracted from. |
| Report name | Text | Name of the report |
| Report ID | Text | ID of the Report |
| Report Description | Text | Brief Description of the report |
| Report | HTML Table | HTML Table Containing the Report |

| Element Name | Element Type | Purpose |
|---|---|---|
| Back | HTML Button | Button to navigate back to the Previous Page. (INPUT for the Report) |

3.2.1.3. Screen Validations

| Element Name | Action/Validation Details | Message |
|---|---|---|
| Report | The HTML Table for the report is dynamic and based on the report can be single or multi dimensional. | None |
| Back | HTML Button to navigate to the previous screen (Input Screen) | None |

3.2.2. Help Menu

| Element Name | Purpose | Valid Values |
|---|---|---|
| Report | Shows the generated reports | Based on the report the output can be single of multi dimensional. |

4. Business Rule Mapping 4.1. Module Name: Carrier Maintenance 4.1.1. Report ID: BPI_CAS_REP_CM__001

| | |
|---|---|
| Report ID | BPI_CAS_REP_CM_001 |
| Report Name | Rates in different format |
| Purpose of Report | This report is used to show the rates for the various health products offered by Carrier |
| Delivery To | Carriers and All BPI users |
| Frequency | Non periodic |
| Mode of Delivery | None |
| Output Format | XL or HTML |
| User Interface Required Yes/No | Yes |
| Automated or Manual | Manual |
| Input to report | 1. Eff_Date<br>2. Carrier_ID<br>3. Plan_Type_ID<br>4. Benefit_ID |
| Output of the Report | Product Name, Product Name, Rates for Employee Only, Employee and Spouse, Employee and Dependents, Employee, Spouse and Dependents. |

4.1.2. Report ID: BPI_CAS_REP_CM__002

| | |
|---|---|
| Report ID | BPI_CAS_REP_CM_002 |
| Report Name | Comparison on the current rates provided by the carrier with past rate. |
| Purpose of Report | This report is to compare the current rate offered by the carrier with their previous rates based on a specified period. |
| Delivery To | PacAdvantage and All BPI users |
| Frequency | Non periodic |
| Mode of Delivery | None |
| Output Format | XL or HTML |
| User Interface Required Yes/No | Yes |

| | |
|---|---|
| Automated or Manual | Manual |
| Input to report | 1. Eff_Date<br>2. Carrier_ID<br>3. Plan_Type_ID<br>4. Benefit_ID<br>5. Eff_Date1<br>6. Carrier_ID1<br>7. Plan_Type_ID1<br>8. Benefit_ID1 |
| Output of the Report | Product Name, Product Name, Rates for Employee Only, Employee and Spouse, Employee and Dependents, Employee, Spouse and Dependents. |

4.1.3. Report ID: BPI_CAS_REP_CM__003

| | |
|---|---|
| Report ID | BPI_CAS_REP_CM_003 |
| Report Name | Plan availability |
| Purpose of Report | This report is used to show the plan availability for the specified carrier in a Zip's available in California. |
| Delivery To | Carriers and All BPI users |
| Frequency | Non periodic |
| Mode of Delivery | None |
| Output Format | XL or HTML |
| User Interface Required Yes/No | Yes |
| Automated or Manual | Manual |
| Input to report | 1. Eff_Date<br>2. Plan ID |
| Output of the Report | Product Name, Carrier name, ZIP, Effective Date and Rating Region. |

4.1.4. Report ID: BPI_CAS_REP_CM__005

| | |
|---|---|
| Report ID | BPI_CAS_REP_CM_005 |
| Report Name | ZIP Codes with No Coverage |
| Purpose of Report | This report is used to show the Zip's in California where there is no coverage. |
| Delivery To | Carriers and All BPI users |
| Frequency | Non periodic |
| Mode of Delivery | None |
| Output Format | XL or HTML |
| User Interface Required Yes/No | Yes |
| Automated or Manual | Manual |
| Input to report | EFF_DATE,<br>LOC_ID. |
| Output of the Report | ZIP, Effective Date of Plan non-Availability. |

4.1.5. Report ID: BPI_CAS_REP_CM__006

| | |
|---|---|
| Report ID | BPI_CAS_REP_CM_006 |
| Report Name | Plan Changes - Member Effected |
| Purpose of Report | When there is a change in the plan availability in a specific ZIP code and or County or whenever a plan ceases to exist report about the entire member in the specific ZIP or County with that plan should be listed. |
| Delivery To | Carriers and All BPI users |
| Frequency | Non periodic |
| Mode of Delivery | Email |

-continued

| | |
|---|---|
| Output Format | XL |
| User Interface Required Yes/No | No |
| Automated or Manual | Automated/Should be triggered by Plan changes |
| Input to report | EFF_DATE, PLAN_ID |
| Output of the Report | Group name, Group ID, Member Name, Member SSN or Unique ID, Member Benefit Level, Coverage Choice, ZIP, County, Service Area |

4.1.6. Report ID: BPI_CAS_REP_CM__007

| | |
|---|---|
| Report ID | BPI_CAS_REP_CM_007 |
| Report Name | Consolidated report on Rate Classification sorted by Rate Type (Admin, Agent Commission, Additional fees and Differential Factor) |
| Purpose of Report | To report on the Fees structure for the rate Classification based on the Admin fees, Agent Commission Additional fees and differential factor. |
| Delivery To | Adhoc |
| Frequency | Non periodic |
| Mode of Delivery | none |
| Output Format | HTML |
| User Interface Required Yes/No | Yes |
| Automated or Manual | Manual |
| Input to report | PARAMEFFDATE |
| Output of the Report | Rate Type - Blended: Group Type, Agent Commission, Admin Fee, Rate Type - Non Blended: LOC Type, Group Type, Group Size, Per Member Flat Amt, Per Group Flat Amt, Differential Factor: Group size down limit, Group size up limit, Differential factor. |

4.2. Module Name: Sales and Marketing 4.2.1. Report ID: BPI_CAS_REP_SM__001

| | |
|---|---|
| Report ID | BPI_CAS_REP_SM_001 |
| Report Name | Sold Group Details for Period Specified |
| Purpose of Report | This report is used to show the Total Groups sold for a specified effective date and also show the cumulative sales up to date |
| Delivery To | BSS Manager, Vice President Operations, President |
| Frequency | Monthly |
| Mode of Delivery | Email |
| Output Format | XL or HTML |
| User Interface Required Yes/No | Yes |
| Automated or Manual | Manual and Automated |
| Input to report | Effective Date |
| Output of the Report | Group Name, Group ID, Writing Agent Name, Marketing Source, Contact Date, Active Subscribers Count, Active Dependent Count |

4.2.2. Report ID: BPI_CAS_REP_SM__002

| | |
|---|---|
| Report ID | BPI_CAS_REP_SM_002 |
| Report Name | Sold Group Details for Period Specified based on Group Type |
| Purpose of Report | This report is used to show the Total Groups sold for a specified effective date and also show the cumulative sales up to date for a specific group type |
| Delivery To | BSS Manager, Vice President Operations, President |
| Frequency | Monthly |
| Mode of Delivery | Email |
| Output Format | XL or HTML |
| User Interface Required Yes/No | Yes |
| Automated or Manual | Manual and Automated |
| Input to report | Effective Date, Group Type |
| Output of the Report | Group Name, Group ID, Writing Agent Name, Marketing Source, Contact Date, Subscribers Count, Dependent Count |

4.2.3. Report ID: BPI_CAS_REP_SM__003

| | |
|---|---|
| Report ID | BPI_CAS_REP_SM_003 |
| Report Name | Average Group Size |
| Purpose of Report | This report is used to show the average group size, i.e. employees/group for Small Employer Group |
| Delivery To | BSS Manager, Vice President Operations, President |
| Frequency | Monthly |
| Mode of Delivery | Email |
| Output Format | XL or HTML |
| User Interface Required Yes/No | Yes |
| Automated or Manual | Manual and Automated |
| Input to report | Effective Date |
| Output of the Report | Group Name, Group ID, Writing Agent Id, Marketing Source, Contact Date, Subscribers Count, Dependent Count |

4.2.4. Report ID: BPI_CAS_REP_SM__004

| | |
|---|---|
| Report ID | BPI_CAS_REP_SM_004 |
| Report Name | Comparison between case sold Current Months and Previous Year Current Month |
| Purpose of Report | This report is used to compare the Case sold in the current month with the cash sold in the previous year current month. |
| Delivery To | BSS Manager, Vice President Operations, President |
| Frequency | Monthly |
| Mode of Delivery | email |
| Output Format | XL or HTML |
| User Interface Required Yes/No | Yes |
| Automated or Manual | Manual/Automated |
| Input to report | Effective Date |
| Output of the Report | Group Type, Current New Groups, Current New Subscribers, Current New Dependents, Current New Member, Prior Year Current New Groups, Prior Year Current New Subscribers, Prior Year Current New Dependents, Prior Year Current New Members, This Month New Subscribers % of Total, This Month New Groups % of Total, % of Change from Prior Year |

4.2.5. Report ID: BPI_CAS_REP_SM__005

| | |
|---|---|
| Report ID | BPI_CAS_REP_SM_005 |
| Report Name | Group Enrollment With line of Coverage |
| Purpose of Report | This report is used to identify the groups enrolled with each line of coverage based on effective date. |
| Delivery To | BSS Manager, Vice President Operations, President |
| Frequency | Monthly |
| Mode of Delivery | email |
| Output Format | XL or HTML |
| User Interface Required Yes/No | Yes |
| Automated or Manual | Manual/Automated |
| Input to report | Effective Date |
| Output of the Report | Group Type, Year To Date Groups, Year To Date Subscribers, Year To Date Dependents, Year To Date Members, Current New Groups, Current New Subscribers, Current New Dependents, Current New Members, Current Terminated Groups, Current Terminated Subscribers, Current Terminated Dependents, Current Terminated Members, Net Gain/Loss Groups, Net Gain/Loss Subscribers, Net Gain/Loss Dependents, Net Gain/Loss Members |

4.2.6. Report ID: BPI_CAS_REP_SM__006

| | |
|---|---|
| Report ID | BPI_CAS_REP_SM_006 |
| Report Name | Leads by Source for Specified Period |
| Purpose of Report | This report is used to identify the leads generated based on the source sub type for the specified period. |
| Delivery To | BSS Manager, Vice President Operations, President |
| Frequency | Weekly, Monthly |
| Mode of Delivery | Email |
| Output Format | XL |
| User Interface Required Yes/No | Yes |
| Automated or Manual | Manual/Automated |
| Input to report | Date |
| Output of the Report | Source Code, Last 12 Months Lead Given, Last 12 Months Lead Sold, Last 12 Months Close Ratio, Last 90 Days Lead Given, Last 90 days Lead Sold, Last 90 Days Close Ratio, This Month Lead Given, This Month Lead Sold, This Month Close Ratio, |

4.2.7. Report ID: BPI_CAS_REP_SM__007

| | |
|---|---|
| Report ID | BPI_CAS_REP_SM_007 |
| Report Name | New Lead tracking for brokers |
| Purpose of Report | This report is used to track the new agent and leads. |
| Delivery To | BSS Manager, Vice President Operations, President |
| Frequency | Weekly, Monthly |
| Mode of Delivery | Email |
| Output Format | XL |
| User Interface Required Yes/No | Yes |
| Automated or Manual | Automated |
| Input to report | Date |
| Output of the Report | Agent Name, Last 12 Months Lead Given, Last 12 Months Lead Sold, Last 12 Months Close Ratio, Last 90 Days Lead Given, Last 90 days Lead Sold, Last 90 Days Close Ratio, This Month Lead Given, This Month Lead Sold, This Month Close Ratio, |

4.2.8. Report ID: BPI_CAS_REP_SM__008

| | |
|---|---|
| Report ID | BPI_CAS_REP_SM_008 |
| Report Name | Quote Tracking |
| Purpose of Report | This report is used to track the quotes generated per week to the quotes converted to sales. |
| Delivery To | BSS Manager, Vice President Operations, President |
| Frequency | Weekly, Monthly |
| Mode of Delivery | Email |
| Output Format | XL |
| User Interface Required Yes/No | Yes |
| Automated or Manual | Automated |
| Input to report | Date |
| Output of the Report | For Quote Generation and Groups Sold (Last 30 days, Last 90 days, Last 120 day and Last 365 days) |

4.2.9. Report ID: BPI_CAS_REP_SM__009

| | |
|---|---|
| Report ID | BPI_CAS_REP_SM_009 |
| Report Name | Quote With 10 or More employees |
| Purpose of Report | This report is used to track the quotes with 10 or more employees for follow up. |
| Delivery To | Sales Team |
| Frequency | Monthly |
| Mode of Delivery | Email |
| Output Format | XL |
| User Interface Required Yes/No | No |
| Automated or Manual | Automated |
| Input to report | Date |
| Output of the Report | Quote No, Company Name, Agent Name, EE Count, Quote Date, Quote Rev, Lead No, Source Sub Type |

4.2.10. Report ID: BPI_CAS_REP_SM__010

| | |
|---|---|
| Report ID | BPI_CAS_REP_SM_010 |
| Report Name | Sales with 10 of More employees |
| Purpose of Report | This report is used to track the sales with 10 or more employees for follow up and customer service. |
| Delivery To | Sales team, GMS Team |
| Frequency | Monthly |
| Mode of Delivery | Email |
| Output Format | XL |
| User Interface RequiredYes/No | No |
| Automated or Manual | Automated |
| Input to report | Date |
| Output of the Report | Group Number, Company Name, Writing Agent, Employee Count, Effective Date, Quote Number, Lead Number, Source Sub Type |

4.2.11. Report ID: BPI_CAS_REP_SM__011

| | |
|---|---|
| Report ID | BPI_CAS_REP_SM_011 |
| Report Name | Quote by Sales Rep/Work Group |
| Purpose of Report | This report is used to track the quote generated by sales rep belonging to a specific work group. |
| Delivery To | BSS Manager, Vice President Operations, President |
| Frequency | Monthly |
| Mode of Delivery | Email |
| Output Format | XL |
| User Interface Required Yes/No | No |
| Automated or Manual | Automated |
| Input to report | Date |
| Output of the Report | Work Group Name, Date Quoted, Company Name, Agent ID, Marketing Source, Proposed Effective Date, EE count. |

4.2.12. Report ID: BPI_CAS_REP_SM__012

| | |
|---|---|
| Report ID | BPI_CAS_REP_SM_012 |
| Report Name | Agent Extract |
| Purpose of Report | This report is used to extract information about the agents up to date |
| Delivery To | BSS Manager, Vice President Operations, President |
| Frequency | Monthly |
| Mode of Delivery | Email |
| Output Format | XL |
| User Interface Required Yes/No | No |
| Automated or Manual | Automated |
| Input to report | Date |
| Output of the Report | Agent ID, Agent Name, Company Name, Gender, Address, Suite, city, State, Zip, County ID, Phone, Fax, Email, DOB, Agent Tax ID, Work Group, Commission Groups, Writing Groups, Internal Reps |

4.2.13. Report ID: BPI_CAS_REP_SM__013

| | |
|---|---|
| Report ID | BPI_CAS_REP_SM_012 |
| Report Name | Agent Extract |
| Purpose of Report | This report is used to extract information about the agents up to date |
| Delivery To | BSS Manager, Vice President Operations, President |
| Frequency | Monthly |
| Mode of Delivery | Email |
| Output Format | XL |
| User Interface Required Yes/No | No |
| Automated or Manual | Automated |
| Input to report | Date |
| Output of the Report | Agent ID, Agent Name, Company Name, Gender, Address, Suite, city, State, Zip, County ID, Phone, Fax, Email, DOB, Agent Tax ID, Work Group, Commission Groups, Writing Groups, Internal Reps |

4.2.14. Report ID: BPI_CAS_REP_SM__014

| | |
|---|---|
| Report ID | BPI_CAS_REP_SM_014 |
| Report Name | Quarterly Sales By County |
| Purpose of Report | This report is used to provide Quarterly sales done by outside sales rep by county |
| Delivery To | BSS Manager, Vice President Operations, President |

-continued

| | |
|---|---|
| Frequency | Monthly |
| Mode of Delivery | Email |
| Output Format | XL |
| User Interface Required Yes/No | No |
| Automated or Manual | Automated |
| Input to report | Date |
| Output of the Report | County ID, County Name, Current Group ID, Current Effective Date, Current Subscriber's Total, Current Dependent's Total, Current Member's Total, Year to Date Group's Total, Year to Date Subscriber's Total, Year to Date Dependent's Total, Year to Date Member's Total |

4.2.15. Report ID: BPI_CAS_REP_SM__015

| | |
|---|---|
| Report ID | BPI_CAS_REP_SM_015 |
| Report Name | Enrollment for an Agent |
| Purpose of Report | This report is used to provide enrollment done by an agent and the group demographics (for Active Groups Only) |
| Delivery To | BSS Manager, Vice President Operations, President |
| Frequency | Monthly |
| Mode of Delivery | None |
| Output Format | XL, HTML |
| User Interface Required Yes/No | Yes |
| Automated or Manual | Manual |
| Input to report | Date, Agent Id |
| Output of the Report | Group Id, Group Name, Address, Suite, City, State, Zip, Phone, Email, Effective Date, Group ROE Cycle, EE count, DEP count |

4.2.16. Report ID: BPI_CAS_REP_SM__016

| | |
|---|---|
| Report ID | BPI_CAS_REP_SM_016 |
| Report Name | Enrollment for an Agencies |
| Purpose of Report | This report is used to provide enrollment done by an agency and associated writing agent, the group demographics (for Active Groups Only) |
| Delivery To | BSS Manager, Vice President Operations, President |
| Frequency | Monthly |
| Mode of Delivery | None |
| Output Format | XL, HTML |
| User Interface Required Yes/No | Yes |
| Automated or Manual | Manual |
| Input to report | Date, Agency Id |
| Output of the Report | Group ID, Group Name, Address, Suite, City, State, Zip, Phone, Email, Writing Agent ID, Effective Date, Group ROE Cycle, EE count, DEP count |

4.2.17. Report ID: BPI_CAS_REP_SM__017

| | |
|---|---|
| Report ID | BPI_CAS_REP_SM_017 |
| Report Name | Association Available |
| Purpose of Report | This report is used to provide information about the association and association groups and individual member. |
| Delivery To | BSS Manager, Vice President Operations, President |
| Frequency | Monthly |

-continued

| | |
|---|---|
| Mode of Delivery | None |
| Output Format | XL, HTML |
| User Interface Required Yes/No | Yes |
| Automated or Manual | Manual |
| Input to report | Date, Association ID |
| Output of the Report | Group Id, Group Name, Address, Suite, City, State, Zip, Phone, Email, Writing Agent ID, Group Effective Date, Group ROE Cycle, EE count, DEP count |

4.2.18. Report ID: BPI_CAS_REP_SM__018

| | |
|---|---|
| Report ID | BPI_CAS_REP_SM_018 |
| Report Name | List of Agent with Agencies along with Group |
| Purpose of Report | This report is used to provide information on a agencies and the groups and members attached to the agent/agencies |
| Delivery To | All BPI |
| Frequency | Adhoc/Monthly |
| Mode of Delivery | None |
| Output Format | HTML |
| User Interface Required Yes/No | Yes |
| Automated or Manual | Manual |
| Input to report | Date, Agency Id |
| Output of the Report | Group ID, Group Name, Address, Suite, City, State, Zip, Phone, Email, Group Effective Date, Group ROE Cycle, EE count, DEP count |

4.2.19. Report ID: BPI_CAS_REP_SM__019

| | |
|---|---|
| Report ID | BPI_CAS_REP_SM_019 |
| Report Name | Agent with Group/member Counts |
| Purpose of Report | This report is used to provide information on a agent with Group and member count. |
| Delivery To | All BPI |
| Frequency | Adhoc/Monthly |
| Mode of Delivery | None |
| Output Format | HTML |
| User Interface Required Yes/No | Yes |
| Automated or Manual | Manual |
| Input to report | Date |
| Output of the Report | Agent ID, New Agent, Agent Name, Agent Type, Group Count, Member Count, BSU Rep, Group Type, Period |

4.2.20. Report ID: BPI_CAS_REP_SM__020

| | |
|---|---|
| Report ID | BPI_CAS_REP_SM_020 |
| Report Name | Sold Cases by Sales Reps |
| Purpose of Report | To see what groups have sold for the month. |
| Delivery To | Weekly/Monthly totals to each BSU rep in their work group. |
| Frequency | Monthly/Weekly |
| Mode of Delivery | email |
| Output Format | XL or HTML |

-continued

| | |
|---|---|
| User Interface Required Yes/No | Yes |
| Automated or Manual | Manual and Automated |
| Input to report | Date |
| Output of the Report | Agent ID, New Agent, Agent Name, Agent Type, Group ID, Group Name, BSU Rep, GroupType, EE members, Quote Date, Effective Date, Finalized Date, Rate Tier |

4.2.21. Report ID: BPI_CAS_REP_SM__021

| | |
|---|---|
| Report ID | BPI_CAS_REP_SM_021 |
| Report Name | Lead Tracking |
| Purpose of Report | To see history of the BSU reps leads. |
| Delivery To | BSS Manager, Vice President Operations, President Weekly to each BSU rep in their work group. |
| Frequency | Monthly/Weekly |
| Mode of Delivery | email |
| Output Format | XL or HTML |
| User Interface Required Yes/No | Yes |
| Automated or Manual | Manual and Automated |
| Input to report | Date |
| Output of the Report | Agent ID, Agent Name, Company, Date Lead Added, Source, BSU Rep, Quote Process Date, Group Size, Lead Follow Up Date, Lead Status, Enrolled Date |

4.2.22. Report ID: BPI_CAS_REP_SM__022

| | |
|---|---|
| Report ID | BPI_CAS_REP_SM_022 |
| Report Name | Hot and Cold Agents |
| Purpose of Report | To report on the agent based on the agents business with PacAdvantage |
| Delivery To | BSS Manager, Vice President Operations, President Weekly to each BSU rep in their work group. |
| Frequency | Adhoc |
| Mode of Delivery | none |
| Output Format | HTML |
| User Interface Required Yes/No | Yes |
| Automated or Manual | Manual |
| Input to report | Date |
| Output of the Report | Agent Id, New Agent, Agent Name, Agent Type, Business Generated Leads/Conversion, Member Count, Workgroup, Period |

4.2.23. Report ID: BPI_CAS_REP_SM__023

| | |
|---|---|
| Report ID | BPI_CAS_REP_SM_023 |
| Report Name | Agent Profile |
| Purpose of Report | To report on the agent Profile statue |
| Delivery To | BSS Manager, Vice President Operations, President Weekly to each BSU rep in their work group. |
| Frequency | Adhoc |
| Mode of Delivery | None |
| Output Format | HTML |
| User Interface Required Yes/No | Yes |

-continued

| | |
|---|---|
| Automated or Manual | Manual |
| Input to report | Date |
| Output of the Report | Agent Id, New Agent, Agent First Name, Agent Last Name, Agent Type, Agent Profile Information, Status, Bsu Rep |

4.3. Module Name: Enrollment

4.3.1. Report ID: BPI_CAS_REP_EN__001

| | |
|---|---|
| Report ID | BPI_CAS_REP_EN_001 |
| Report Name | Enrollment By Plan |
| Purpose of Report | This report is used to provide information on enrollment by Benefit Level for each line of coverage |
| Delivery To | VP Finance, Vice President Operations, President |
| Frequency | Monthly |
| Mode of Delivery | Email |
| Output Format | XL |
| User Interface Required Yes/No | No |
| Automated or Manual | Automated |
| Input to report | Effective Date |
| Output of the Report | Plan Name, Plan Type, Line of Coverage, prior month Total members, Current month New Subscriber, Current month dependent, current termination, current month net gain and loss, total members active last month + net gain and loss, number of members Currently enrolled, This month new subscription % and % change from previous month. |

4.3.2. Report ID: BPI_CAS_REP_EN__002

| | |
|---|---|
| Report ID | BPI_CAS_REP_EN_002 |
| Report Name | Enrollment By Counties |
| Purpose of Report | This report is used to provide information on enrollment by Counties for each line of coverage |
| Delivery To | VP Finance, Vice President Operations, President |
| Frequency | Monthly |
| Mode of Delivery | Email |
| Output Format | XL |
| User Interface Required Yes/No | No |
| Automated or Manual | Automated |
| Input to report | Date |
| Output of the Report | State, County, Plan Type, Line of Coverage, Active Member last period, New Subscriber Current Month, New Dependent Current Month, Terminated Current Month, Net gain/Loss, System generated Currently Enrolled Count. Currently Enrolled Active Subscribers and Active Dependents. |

4.3.3. Report ID: BPI_CAS_REP_EN__003

| | |
|---|---|
| Report ID | BPI_CAS_REP_EN_003 |
| Report Name | Enrollment By Association |
| Purpose of Report | This report is used to provide information on enrollment by Association Name |
| Delivery To | VP Finance, Vice President Operations, President |
| Frequency | Monthly |
| Mode of Delivery | Email |
| Output Format | XL |
| User Interface | No |

-continued

| | |
|---|---|
| Required Yes/No | |
| Automated or Manual | Automated |
| Input to report | Date |
| Output of the Report | Association ID, Group Name, Association name, Number of New Groups, Subscribers, dependents, Total Number of Groups, Subscribers and dependent up to date. |

4.3.4. Report ID: BPI_CAS_REP_EN__004

| | |
|---|---|
| Report ID | BPI_CAS_REP_EN_004 |
| Report Name | Enrollment By Counties |
| Purpose of Report | This report is used to provide information on enrollment by Counties |
| Delivery To | VP Finance, Vice President Operations, President |
| Frequency | Monthly |
| Mode of Delivery | Email |
| Output Format | XL |
| User Interface Required Yes/No | No |
| Automated or Manual | Automated |
| Input to report | Date |
| Output of the Report | Group Type, County Name, (Total Enrolled) # of Groups, Total Active Subscriber, Total Active Dependent (New Enrollment for Current Period) New Subscriber, New Dependent, This period terms Net gain/Loss, # of Groups, # of COBRA, # of Association |

4.3.5. Report ID: BPI_CAS_REP_EN__005

| | |
|---|---|
| Report ID | BPI_CAS_REP_EN_005 |
| Report Name | Monthly Individual Application received and processes |
| Purpose of Report | This report is used to provide information on Applications received and processed on weekly/monthly basis. (This report is based on mail room entry) |
| Delivery To | VP Finance, Vice President Operations, President |
| Frequency | Monthly |
| Mode of Delivery | Email |
| Output Format | XL, HTML |
| User Interface Required Yes/No | Yes |
| Automated or Manual | Automated, Manual |
| Input to report | Applications received Date |
| Output of the Report | Line Of Coverage, Small Employer Group - Subscribers, Small Employer Group - Dependents, COBRA Subscribers, COBRA dependents, Association Subscribers and Association dependents. |

4.3.6. Report ID: BPI_CAS_REP_EN__006

| | |
|---|---|
| Report ID | BPI_CAS_REP_EN_006 |
| Report Name | Total Enrollment By Benefit Level (Carrier Offered) |
| Purpose of Report | This report is used to provide information on total enrollment based on the benefit level offered by carriers. (Small Employer Groups) |
| Delivery To | VP Finance, Vice President Operations, President |
| Frequency | Monthly |
| Mode of Delivery | Email |
| Output Format | XL, |

-continued

| | |
|---|---|
| User Interface Required Yes/No | No |
| Automated or Manual | Automated |
| Input to report | Effective Date |
| Output of the Report | Plan Name, Plan Type, Active Last Period, This Period New Subscribers, This Period New Dependents, This Period Terminated, This Period Net Gain Loss, Active Subscribers, Active Dependents |

4.3.7. Report ID: BPI_CAS_REP_EN__007

| | |
|---|---|
| Report ID | BPI_CAS_REP_EN_007 |
| Report Name | Applications Declined by reasons |
| Purpose of Report | This report is used to provide information on Applications declined based on specific reasons. |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date |
| Output of the Report | Reasons for Decline, # of Subscriber Application, # of Dependent Application, COBRA Subscriber Application, COBRA Dependent Application, Association Subscriber Application, Association Dependent Applications. |

4.3.8. Report ID: BPI_CAS_REP_EN__008

| | |
|---|---|
| Report ID | BPI_CAS_REP_EN_008 |
| Report Name | Group applications Declined by reasons |
| Purpose of Report | This report is used to provide information on Group Applications declined based on specific reasons. |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date |
| Output of the Report | Reasons for Decline, # of Group Application, # of Association Application, # of COBRA Application. |

4.3.9. Report ID: BPI_CAS_REP_EN__009

| | |
|---|---|
| Report ID | BPI_CAS_REP_EN_009 |
| Report Name | Member Termination Summary |
| Purpose of Report | This report is used to provide information on Members Termed. |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |

-continued

| | |
|---|---|
| Input to report | Date |
| Output of the Report | Group Type, Subscriber Terminated this Period, Dependent Terminated this period, Members Terminated this period |

4.3.10. Report ID: BPI_CAS_REP_EN__010

| | |
|---|---|
| Report ID | BPI_CAS_REP_EN_010 |
| Report Name | Group Termination Summary |
| Purpose of Report | This report is used to provide information on Groups Termed. |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date |
| Output of the Report | Group Type, No of Groups terminated this period, Subscriber Terminated this period, Dependent Terminated this period, Members Terminated this period. |

4.3.11. Report ID: BPI_CAS_REP_EN__011

| | |
|---|---|
| Report ID | BPI_CAS_REP_EN_011 |
| Report Name | New Group Summary |
| Purpose of Report | This report is used to provide information on New Groups Enrolled during Current Period |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date |
| Output of the Report | Group Type, New Groups, New Subscribers, New Dependents, New members |

4.3.12. Report ID: BPI_CAS_REP_EN__012

| | |
|---|---|
| Report ID | BPI_CAS_REP_EN_012 |
| Report Name | New Employees and Add-On Summary |
| Purpose of Report | This report is used to provide information on New Employees and Add On's |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date |
| Output of the | Group Type, New Subscribers, New Dependents, New members Report |

4.3.13. Report ID: BPI_CAS_REP_EN_013

| | |
|---|---|
| Report ID | BPI_CAS_REP_EN_013 |
| Report Name | Group Termination details for a specific group size. |
| Purpose of Report | This report is used to provide information on termed Groups by Group Size |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date |
| Output of the Report | Small Employer Group Term reasons, Writing Agent, Group Size (<=4, 5-9, 10-14, 15-24, 25-29, 30>=) Total Groups, Total Members, Total Subscriber and Total Dependent. |

4.3.14. Report ID: BPI_CAS_REP_EN_014

| | |
|---|---|
| Report ID | BPI_CAS_REP_EN_014 |
| Report Name | Member Demographics by Age Bucket |
| Purpose of Report | This report is used to provide information on Member demographics by age bucket |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date |
| Output of the Report | Age and gender, Line of Coverage, Group type, New Subscriber this period, New Dependent This period, New Member this period, Total Subscriber, total dependent, total member Age of enrolled member (<=29, 30-39, 40-49, 50-59, 60-64, 65>=) |

4.3.15. Report ID: BPI_CAS_REP_EN_015

| | |
|---|---|
| Report ID | BPI_CAS_REP_EN_015 |
| Report Name | Member Demographics for Newly Enrolled members |
| Purpose of Report | This report is used to provide information on newly enrolled member by member demographics |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date |
| Output of the Report | Age and gender, Line of Coverage, Group type, New Subscriber this period, New Dependent This period, New Member this period<br>Age of Newly enrolled subscriber<br>Age of enrolled member<br>(<=29, 30-39, 40-49, 50-59, 60-64, 65>=) |

4.3.16. Report ID: BPI_CAS_REP_EN_016

| | |
|---|---|
| Report ID | BPI_CAS_REP_EN_016 |
| Report Name | Employee Demographics by Coverage Choice. |
| Purpose of Report | This report is used to provide information on enrolled employee by coverage choice. |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date |
| Output of the Report | Loc, Coverage Choice (Employee only, Employee and Children, Employee Spouse, Employee family)<br>New Subscriber, New Dependent, New member this period.<br>Total Enrollments<br>Subscriber, Dependent, Member Currently Enrolled up to date,<br>Age of enrolled Subscriber<br>(<=29, 30-39, 40-49, 50-59, 60-64, 65>=) |

4.3.17. Report ID: BPI_CAS_REP_EN_017

| | |
|---|---|
| Report ID | BPI_CAS_REP_EN_017 |
| Report Name | Group Enrollment by group type with and without agent |
| Purpose of Report | This report is used to provide information on enrolled Group with/without agent. |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date |
| Output of the Report | Group Type, With agent or without agent, Group Count, Total active subscribers, Total active Dependents, This Period New groups, This period new Subscribers, This period Add ons, This period terms, Net gain and loss, No of SEG Groups, No of Cobras, No of Associations. |

4.3.18. Report ID: BPI_CAS_REP_EN_018

| | |
|---|---|
| Report ID | BPI_CAS_REP_EN_018 |
| Report Name | Aging Report for Pending status |
| Purpose of Report | This report is used to provide information on performance by duration for Received applications and pending up to date. (i.e. how many applications and what type are in pend status. |
| Delivery To | VP Finance, Vice President Operations, President |
| Frequency | Daily |
| Mode of Delivery | Email |
| Output Format | XL, HTML |
| User Interface Required Yes/No | Yes |
| Automated or Manual | Manual |
| Input to report | Date |
| Output of the Report | Process Type, Reference_ID, Date Started, Started By, Work group, Days in Pending Status. |

4.3.19. Report ID: BPI_CAS_REP_EN__020

| | |
|---|---|
| Report ID | BPI_CAS_REP_EN_020 |
| Report Name | Group Enrolled by Group Size |
| Purpose of Report | This report is used to provide information on group enrolledby group size |
| Delivery To | VP Finance, Vice President Operations, President |
| Frequency | Monthly |
| Mode of Delivery | Email |
| Output Format | XL |
| User Interface Required Yes/No | No |
| Automated or Manual | Automated |
| Input to report | Date |
| Output of the Report | Group Size, Group Name, Writing Agent, Group Count, Subscribers Count, Dependent Count, Total Member Count, (Group Size as (<=4, 5-9, 10-14, 15-24, 25-29, 30>=)) |

4.3.20. Report ID: BPI_CAS_REP_EN__021

| | |
|---|---|
| Report ID | BPI_CAS_REP_EN_021 |
| Report Name | Define Contribution |
| Purpose of Report | This report is used to provide information on group enrolled by Contribution Type for Small Employer Group |
| Delivery To | VP Finance, Vice President Operations, President |
| Frequency | Monthly |
| Mode of Delivery | Email |
| Output Format | XL |
| User Interface Required Yes/No | No |
| Automated or Manual | Automated |
| Input to report | Date |
| Output of the Report | Employer Defined Contribution, Product Type, Contribution Type, Contribution Amount, Groups Current Month, Groups Calendar Year to Date |

4.3.21. Report ID: BPI_CAS_REP_EN__023

| | |
|---|---|
| Report ID | BPI_CAS_REP_EN_023 |
| Report Name | Report on Other's Remarks form all the screens |
| Purpose of Report | This report is used to provide information on New remarks that needs to be added in to the system |
| Delivery To | IT, VP Finance, Vice President Operations, President |
| Frequency | Monthly |
| Mode of Delivery | Manual |
| Output Format | XL , HTML |
| User Interface Required Yes/No | Yes |
| Automated or Manual | Manual |
| Input to report | Screen ID |
| Output of the Report | Module Name, Element Name, Remarks/Others |

4.3.22. Report ID: BPI_CAS_REP_EN__024

-continued

| | |
|---|---|
| Report ID | BPI_CAS_REP_EN_024 |
| Report Name | Summary Report |
| Purpose of Report | This report is used to provide information on summary of Enrollment as on date |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date |
| Output of the Report | Group type, Current Group Count, Current Subscriber Count, Current Dependent Count, Current Member Count, Year-to-date Group Count, Year-to-date Subscriber Count, Year-to-date Dependent Count, Year-to-date Member Count. |

4.3.23. Report ID: BPI_CAS_REP_EN__026

| | |
|---|---|
| Report ID | BPI_CAS_REP_EN_026 |
| Report Name | Employee and Members by Line of Coverage |
| Purpose of Report | This report is used to provide information on employees lives by line of coverage and member per group by line of coverage. |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date |
| Output of the Report | Line of Coverage, Employees Count, Dependent Counts, member Counts Number of Members Per group/Line of Coverage. |

4.3.24. Report ID: BPI_CAS_REP_EN__027

| | |
|---|---|
| Report ID | BPI_CAS_REP_EN_030 |
| Report Name | Un Insured Groups and employees |
| Purpose of Report | This report is used to provide information on Groups and Employees Enrolling without prior coverage. |
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date. |
| Output of the Report | Employee Count Active up to date without prior Coverage, Employee Count up to date without prior Coverage Current Employee Count without prior coverage, Current Employee Count Termed without prior coverage. |

4.3.25. Report ID: BPI_CAS_REP_EN__030

| | |
|---|---|
| Report ID | BPI_CAS_REP_EN_030 |
| Report Name | Un Insured Groups and employees |
| Purpose of Report | This report is used to provide information on Groups and Employees Enrolling without prior coverage. |

-continued

| | |
|---|---|
| Delivery To | VP Finance, Vice President Operations, President |
| Frequency | Monthly |
| Mode of Delivery | Email |
| Output Format | XL, |
| User Interface Required Yes/No | No |
| Automated or Manual | Automated |
| Input to report | Date. |
| Output of the Report | Employee Count Active up to date without prior Coverage, Employee Count up to date without prior Coverage Current Employee Count without prior coverage, Current Employee Count Termed without prior coverage. |

4.3.26. Report ID: BPI_CAS_REP_EN__031

| | |
|---|---|
| Report ID | BPI_CAS_REP_EN_031 |
| Report Name | Prior Insurance Carrier |
| Purpose of Report | This report is used to provide information on Employees with prior coverage information. |
| Delivery To | VP Finance, Vice President Operations, President |
| Frequency | Ad hoc |
| Mode of Delivery | Manual |
| Output Format | XL, HTML |
| User Interface Required Yes/No | Yes |
| Automated or Manual | Manual |
| Input to report | Date |
| Output of the Report | Prior Coverage carrier name, Employee Count |

4.3.27. Report ID: BPI_CAS_REP_EN__032

| | |
|---|---|
| Report ID | BPI_CAS_REP_EN_032 |
| Report Name | ROE Report |
| Purpose of Report | This report is used to provide information on Ad On, Change after and before ROE |
| Delivery To | VP Finance, Vice President Operations, President |
| Frequency | Monthly |
| Mode of Delivery | Email |
| Output Format | XL |
| User Interface Required Yes/No | No |
| Automated or Manual | Automated |
| Input to report | |
| Output of the Report | Group Id, ROE Status, ROE Result, Date Received Requal Info, Date Postmark Requal info type, No of Employees, No of COBRA'S. |

4.3.28. Report ID: BPI_CAS_REP_EN__033

| | |
|---|---|
| Report ID | BPI_CAS_REP_EN_033 |
| Report Name | Carrier issues by Carrier and By issues |
| Purpose of Report | This report is used to provide information on Carrier Issues by Issues and By Carrier |
| Delivery To | VP Finance, Vice President Operations, President |
| Frequency | Monthly |
| Mode of Delivery | Email |
| Output Format | XL |
| User Interface Required Yes/No | No |
| Automated or Manual | Automated |
| Input to report | Date |
| Output of the Report | Carrier Name, Carrier Issue Reported, Carrier Issue - Actual, Date Received, Date Resolved, Total Days To process |

4.3.29. Report ID: BPI_CAS_REP_EN__034

| | |
|---|---|
| Report ID | BPI_CAS_REP_EN_034 |
| Report Name | Appeals and Grievances |
| Purpose of Report | This report is used to provide information on Appeals and Grievances |
| Delivery To | VP Finance, Vice President Operations, President |
| Frequency | Monthly |
| Mode of Delivery | Email |
| Output Format | XL |
| User Interface Required Yes/No | No |
| Automated or Manual | Automated |
| Input to report | Date |
| Output of the Report | Nature of Appeals, Appellant Type, Appellant Name, Group No, Date Received, Date Closed, Conclusion |

4.3.30. Report ID: BPI_CAS_REP_EN__035

| | |
|---|---|
| Report ID | BPI_CAS_REP_EN_035 |
| Report Name | COBRA Enrollment by COBRA Type |
| Purpose of Report | This report is used to provide information on COBRA Enrollment by COBRA type and by Line of Coverage |
| Delivery To | VP Finance, Vice President Operations, President |
| Frequency | Monthly |
| Mode of Delivery | Email |
| Output Format | XL |
| User Interface Required Yes/No | No |
| Automated or Manual | Automated |
| Input to report | Date |
| Output of the Report | COBRA Type, No of New COBRA's Groups Subscribers & Dependents - for Current and Enrolled Total |

4.3.31. Report ID: BPI_CAS_REP_EN__036

| | |
|---|---|
| Report ID | BPI_CAS_REP_EN_036 |
| Report Name | Disabled Dependent |
| Purpose of Report | This report is used to provide information on Disabled Dependent |
| Delivery To | VP Finance, Vice President Operations, President |
| Frequency | Monthly |
| Mode of Delivery | Email |
| Output Format | XL |
| User Interface Required Yes/No | No |
| Automated or Manual | Automated |
| Input to report | Date |
| Output of the Report | Group Id, Group Name, Disabled Type, Disabled Dependent Count |

4.3.32. Report ID: BPI_CAS_REP_EN__037

| | |
|---|---|
| Report ID | BPI_CAS_REP_EN_037 |
| Report Name | Employee Status up to date |
| Purpose of Report | This report is used to provide information on Employee Status up to date. |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | Group ID |
| Output of the Report | Group Id, Group Name, Employee SSN, Employee Name, Employee Status Up to date, Effective Date |

4.3.33. Report ID: BPI_CAS_REP_EN__038

| | |
|---|---|
| Report ID | BPI_CAS_REP_EN_038 |
| Report Name | Employer/Group Status (Including COBRA and Small Employer and Individual Association Member and Association group) |
| Purpose of Report | This report is used to provide information on Group Level Status up to date. |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | Group ID |
| Output of the Report | Group ID, Group Type, Employee Status Up to date, Effective Date, Employee Count, Member Count. |

4.3.34. Report ID: BPI_CAS_REP_EN__039

| | |
|---|---|
| Report ID | BPI_CAS_REP_EN_039 |
| Report Name | COBRA/Cal COBRA Status up to date |
| Purpose of Report | This report is used to provide information on COBRA/Cal COBRA Status up to date. |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | GROUP ID |
| Output of the Report | Parent Group Id, Parent Group Name, Anniversary Date, COBRA Group Id, COBRA Group Name, COBRA type, Status Up to Date, Effective Date, Member Count, COBRA Tenure, COBRA End Date |

4.3.35. Report ID: BPI_CAS_REP_EN__040

| | |
|---|---|
| Report ID | BPI_CAS_REP_EN_040 |
| Report Name | Association Group and Member Counts |
| Purpose of Report | This report is used to provide information on a specific association and the Groups and individual members affiliated with the Association |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | Association ID |
| Output of the Report | Association ID, Association name, Association Type, Association Group Type, Group ID/Member ID, Employee SSN, Employee Name, Status Up to Date, Effective Date of Status, Anniversary Date, Employee Count, Member Count |

4.3.36. Report ID: BPI_CAS_REP_EN__041

| | |
|---|---|
| Report ID | BPI_CAS_REP_EN_041 |
| Report Name | Carrier Issues for a specific Carrier (Member Level) |
| Purpose of Report | This report is used to provide information on Carrier Issues on a specific carrier. |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | Carrier ID |
| Output of the Report | Carrier ID, Carrier Name, List of Member for the carrier specified with SSN # or ID, Date of Birth, Effective Date with the carrier, Plan Opted by Member, Transmission status, Transmission Date. |

4.3.37. Report ID: BPI_CAS_REP_EN__042

| | |
|---|---|
| Report ID | BPI_CAS_REP_EN_042 |
| Report Name | Carrier Issues for a specific Carrier (Group Level) |
| Purpose of Report | This report is used to provide information on Carrier Issues on a specific carrier (Group Level). |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | Carrier ID |
| Output of the Report | Carrier ID, Carrier Name, Group ID, Group name, Effective Date, Member Count, Transmission status, Transmission Date. |

4.3.38. Report ID: BPI_CAS_REP_EN__043

| | |
|---|---|
| Report ID | BPI_CAS_REP_EN_043 |
| Report Name | Report on Transaction History for Enrollment (Group Level) |
| Purpose of Report | This report is used to provide information on the History of all the transactions and changes (Enrollment) made on the group up to date. |
| Delivery To | All BPI |
| Frequency | Adhoc |

-continued

| | |
|---|---|
| Mode of Delivery | None |
| Output Format | HTML |
| User Interface Required Yes/No | Yes |
| Automated or Manual | Manual |
| Input to report | Group ID |
| Output of the Report | Group Id, Group Name, Group Type, Nature of Transaction, Transaction Description, Effective Date, User Id |

4.3.39. Report ID: BPI_CAS_REP_EN__044

| | |
|---|---|
| Report ID | BPI_CAS_REP_EN_044 |
| Report Name | Report on Transaction History for Enrollment (Employee Level) |
| Purpose of Report | This report is used to provide information on the History of all the transactions and changes (Enrollment) made on the employee up to date. |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | Group ID |
| Output of the Report | Group Id, Group Name, Group Type, Employee ID, Employee SSN, Nature of Transaction, Transaction Description Effective Date, User Id |

4.3.40. Report ID: BPI_CAS_REP_EN__045

| | |
|---|---|
| Report ID | BPI_CAS_REP_EN_045 |
| Report Name | Report on Transaction History for Enrollment (Dependent Level) |
| Purpose of Report | This report is used to provide information on the History of all the transactions and changes (Enrollment) made on the dependent up to date. |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | Group ID |
| Output of the Report | Group ID, Group name, Group Type, Employee ID/ SSN, Dependent Id Dependent SSN, Nature of Transaction, Transaction Description, Effective Date, User Id |

4.3.41. Report ID: BPI_CAS_REP_EN__046

| | |
|---|---|
| Report ID | BPI_CAS_REP_EN_046 |
| Report Name | Agent Change record for a specific group |
| Purpose of Report | This report is used to provide information on the Agent Change record for a specific group |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | Date |
| Output of the Report | Agent ID, Agent Name, Effective Change Date |

4.3.42. Report ID: BPI_CAS_REP_EN__047

| | |
|---|---|
| Report ID | BPI_CAS_REP_EN_047 |
| Report Name | Report on ROE/OE on Groups |
| Purpose of Report | This report is used to provide information on the Groups that underwent or is in process for ROE/OE. |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | Date |
| Output of the Report | Group Id, Group Name, Group Type, Effective Date, Process (ROE or OE), ROE/OE Date. |

4.3.43. Report ID: BPI_CAS_REP_EN__048

| | |
|---|---|
| Report ID | BPI_CAS_REP_EN_048 |
| Report Name | Report on Blended Vs Non Blended Group |
| Purpose of Report | This report is used to provide information on the Blended Vs Non Blended Group. |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | Date |
| Output of the Report | Group Id, Group Name, Group Type, Effective Date, Blended/Non Blended, Blended Group Count, Non Blended group Count |

4.3.44. Report ID: BPI_CAS_REP_EN__051

| | |
|---|---|
| Report ID | BPI_CAS_REP_EN_051 |
| Report Name | Reports on Group schedule to be termed. |
| Purpose of Report | This is to report on the Groups whose are scheduled to be termed. |
| Delivery To | VP Operations, GMS Manager |
| Frequency | Monthly |
| Mode of Delivery | email |
| Output Format | XL |
| User Interface Required Yes/No | No |
| Automated or Manual | Automated |
| Input to report | Date |
| Output of the Report | Group ID, Group name, Group Type, Work Group, Terminated Date, Term Process initiation Date, Term Reasons, Days Pending |

4.3.45. Report ID: BPI_CAS_REP_EN__052

| | |
|---|---|
| Report ID | BPI_CAS_REP_FI_044 |
| Report Name | Enrollment Transmission Status |
| Purpose of Report | This report is used to show the status for the transmission for various external transmissions for a specified duration |
| Delivery To | IT |
| Frequency | Non periodic |
| Mode of Delivery | None |
| Output Format | XL or HTML |
| User Interface Required Yes/No | Yes |
| Automated or Manual | Manual |
| Input to report | From Date<br>To Date |
| Output of the Report | Transmission Time and Date, Process Period, Data Format Transmission Type, File Size, Record Count, Status. |

4.4. Module Name: Finance 4.4.1. Report ID: BPI_CAS_REP_FI__001

| | |
|---|---|
| Report ID | BPI_CAS_REP_FI_001 |
| Report Name | Pending Commission |
| Purpose of Report | To report on the list of commissions reconciled but unpaid at the month-end. |
| Delivery To | CFO, Manager Finance |
| Frequency | Monthly, Adhoc |
| Mode of Delivery | Email |
| Output Format | XL, HTML |
| User Interface Required Yes/No | Yes |
| Automated or Manual | Automated, Manual |
| Input to report | Agent ID |
| Output of the Report | Agent ID, Agent name (Commission Payee), Period End Date, Billing Period, Group ID, Month Period Ending, Writing Agent ID, Writing Agent name, Member Counts for the Group, Line of Coverage, Commission Split Percent, Flat Fee (Group Level), Per Member Fees, Total Fees Payable, Monthly Premium amount, Blended/Non Blended. |

4.4.2. Report ID: BPI_CAS_REP_FI__002

| | |
|---|---|
| Report ID | BPI_CAS_REP_FI_002 |
| Report Name | Agent Owing PacAdvantage Money |
| Purpose of Report | To report on the list of agents who must pay back commission to the PacAdvantage. Represents receivable to PacAdvantage at the month-end. |
| Delivery To | CFO, Manager Finance |
| Frequency | Monthly, Adhoc |
| Mode of Delivery | Email |
| Output Format | XL, HTML |
| User Interface Required Yes/No | Yes |
| Automated or Manual | Automated, Manual |
| Input to report | |
| Output of the Report | Agent ID, Agent Type, Commission Address Block, B/F Amount (Balance Forward) |

4.4.3. Report ID: BPI_CAS_REP_FI__003

| | |
|---|---|
| Report ID | BPI_CAS_REP_FI_003 |
| Report Name | Cash Batches |
| Purpose of Report | To report on the list of cash batches entered during the month in question. |
| Delivery To | CFO, Manager Finance |
| Frequency | Monthly, Adhoc |
| Mode of Delivery | Email |
| Output Format | XL, HTML |
| User Interface Required Yes/No | Yes |
| Automated or Manual | Automated, Manual |
| Input to report | Start Date,<br>End Date,<br>Batch Type |
| Output of the Report | Batch Number, Deposit Date, Tape Total, Batch Total, Batch Type, Batch Status, User ID |

4.4.4. Report ID: BPI_CAS_REP_FI__004

| | |
|---|---|
| Report ID | BPI_CAS_REP_FI_004 |
| Report Name | MRMIB Blended Rate Comparison |
| Purpose of Report | To report on medical and dental member counts associated with blended rate invoices reconciled during the month. Used to allocate cash reconciled between blended and non-blended. |
| Delivery To | CFO, Manager Finance |
| Frequency | Monthly, Adhoc |
| Mode of Delivery | Email |
| Output Format | XL, HTML |
| User Interface Required Yes/No | Yes |
| Automated or Manual | Automated, Manual |
| Input to report | Date, |
| Output of the Report | Group Id, Invoice Period, Current medical count, Current dental count, prior medical count, prior dental count, Reconciled date |

4.4.5. Report ID: BPI_CAS_REP_FI__005

| | |
|---|---|
| Report ID | BPI_CAS_REP_FI_005 |
| Report Name | A/R Totals by Group |
| Purpose of Report | To report on customer account balance on the month-end. |
| Delivery To | CFO, Manager Finance |
| Frequency | Monthly, Adhoc |
| Mode of Delivery | Email |
| Output Format | XL, HTML |
| User Interface Required Yes/No | Yes |
| Automated or Manual | Automated, Manual |
| Input to report | |
| Output of the Report | Group ID, A/R, Unbilled, Un App Cash, Total A/R, Current, 30 Days, 60 Days, 90 Days, over 120 |

4.4.6. Report ID: BPI_CAS_REP_FI__006

| | |
|---|---|
| Report ID | BPI_CAS_REP_FI_006 |
| Report Name | Reconciled not Billed Break Down |
| Purpose of Report | To report on distribution of adjustment and members associated with those adjustments used in reconciliation |

| | |
|---|---|
| | that has not yet appeared on an invoice and will appear in the next invoice. |
| Delivery To | CFO, Manager Finance |
| Frequency | Monthly, Adhoc |
| Mode of Delivery | Email |
| Output Format | XL, HTML |
| User Interface Required Yes/No | Yes |
| Automated or Manual | Automated, Manual |
| Input to report | Adjustment Period |
| Output of the Report | HEALTH PLAN PREMIUMS - GROSS<br>ADD: CAL COBRA FEES<br>LESS: RISK ADJUSTMENT WITHHELD<br>HEALTH PLAN PREMIUMS - NET<br>AGENT COMMISSIONS<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>GROUP DIRECT FEES<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>ADMINISTRATIVE FEES<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>LATE FEES<br>REINSTATEMENT FEES<br>NSF FEES<br>COBRA FEES<br>VARIANCE +/− $2.00<br>OTHER FEES<br>TOTAL PREMIUM<br>RISK ADJUSTMENT PAYABLE (MEMO)<br>MEMBERS<br>MEDICAL<br>DENTAL<br>VISION<br>CAM |

4.4.7. Report ID: BPI_CAS_REP_FI__007

| | |
|---|---|
| Report ID | BPI_CAS_REP_FI_007 |
| Report Name | Reconciled not Billed Break Down Details (Group Level) |
| Purpose of Report | To report on distribution of adjustment and members associated with those adjustments used in reconciliation that has not yet appeared on an invoice and will appear in the next invoice. This done for individual groups. |
| Delivery To | CFO, Manager Finance |
| Frequency | Monthly, Adhoc |
| Mode of Delivery | Email |
| Output Format | XL, HTML |
| User Interface Required Yes/No | Yes |
| Automated or Manual | Automated, Manual |
| Input to report | Adjustment Period |
| Output of the Report | GROUP NO,<br>GROUP NAME,<br>GROUP EFF_DATE,<br>GROUP TYPE,<br>AGENT NO,<br>BILLING PERIOD,<br>INVOICE DATE,<br>RECONCILIED DATE,<br>CURRENT MONTH PREMIUM,<br>PRIOR PERIOR ADJ'S,<br>PLAN_ID,<br>HEALTH PLAN PREMIUM,<br>CAL COBRA FEES,<br>RISK ADJ WITHHELD,<br>HEALTH PLAN PREMIUMS - GROSS<br>ADD: CAL COBRA FEES<br>LESS: RISK ADJUSTMENT WITHHELD<br>HEALTH PLAN PREMIUMS - NET<br>AGENT COMMISSIONS<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>GROUP DIRECT FEES<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>ADMINISTRATIVE FEES<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>LATE FEES<br>REINSTATEMENT FEES<br>NSF FEES<br>COBRA FEES<br>VARIANCE +/− $2.00<br>OTHER FEES<br>TOTAL PREMIUM<br>RISK ADJUSTMENT PAYABLE (MEMO)<br>MEMBERS<br>MEDICAL<br>DENTAL<br>VISION<br>CAM |

4.4.8. Report ID: BPI_CAS_REP_FI__008

| | |
|---|---|
| Report ID | BPI_CAS_REP_FI_008 |
| Report Name | A/R Break Down (Carrier Level) |
| Purpose of Report | To report on distribution of amount appearing on unreconciled invoices along with the member count. |
| Delivery To | CFO, Manager Finance |
| Frequency | Monthly, Adhoc |
| Mode of Delivery | Email |
| Output Format | XL, HTML |
| User Interface Required Yes/No | Yes |
| Automated or Manual | Automated, Manual |
| Input to report | Bill Period |
| Output of the Report | HEALTH PLAN PREMIUMS - GROSS<br>ADD: CAL COBRA FEES<br>LESS: RISK ADJUSTMENT WITHHELD<br>HEALTH PLAN PREMIUMS - NET |

-continued

| |
|---|
| AGENT COMMISSIONS |
| FLAT FEES |
| MEDICAL - NON-BLENDED |
| DENTAL - NON-BLENDED |
| MEDICAL - BLENDED |
| DENTAL - BLENDED |
| VISION - BLENDED |
| CAM - BLENDED |
| GROUP DIRECT FEES |
| FLAT FEES |
| MEDICAL - NON-BLENDED |
| DENTAL - NON-BLENDED |
| MEDICAL - BLENDED |
| DENTAL - BLENDED |
| VISION - BLENDED |
| CAM - BLENDED |
| ADMINISTRATIVE FEES |
| FLAT FEES |
| MEDICAL - NON-BLENDED |
| DENTAL - NON-BLENDED |
| MEDICAL - BLENDED |
| DENTAL - BLENDED |
| VISION - BLENDED |
| CAM - BLENDED |
| LATE FEES |
| REINSTATEMENT FEES |
| NSF FEES |
| COBRA FEES |
| VARIANCE +/− $2.00 |
| OTHER FEES |
| TOTAL PREMIUM |
| RISK ADJUSTMENT PAYABLE (MEMO) |
| MEMBERS |
| MEDICAL |
| DENTAL |
| VISION |
| CAM |

4.4.9. Report ID: BPI_CAS_REP_FI__009

| | |
|---|---|
| Report ID | BPI_CAS_REP_FI_009 |
| Report Name | A/R Break Down Details (Group Level) |
| Purpose of Report | To report on distribution of amount appearing on unreconciled invoices along with the member count. This done for individual groups |
| Delivery To | CFO, Manager Finance |
| Frequency | Monthly, Adhoc |
| Mode of Delivery | Email |
| Output Format | XL, HTML |
| User Interface Required Yes/No | Yes |
| Automated or Manual | Automated, Manual |
| Input to report | Period |
| Output of the Report | GROUP NO, |
| | GROUP NAME, |
| | GROUP EFF_DATE, |
| | GROUP TYPE, |
| | AGENT NO, |
| | BILLING PERIOD, |
| | INVOICE DATE, |
| | RECONCILIED DATE, |
| | CURRENT MONTH PREMIUM, |
| | PRIOR PERIOR ADJ'S, |
| | PLAN_ID, |
| | HEALTH PLAN PREMIUM, |
| | CAL COBRA FEES, |
| | RISK ADJ WITHHELD, |
| | HEALTH PLAN PREMIUMS - GROSS |
| | ADD: CAL COBRA FEES |
| | LESS: RISK ADJUSTMENT WITHHELD |
| | HEALTH PLAN PREMIUMS - NET |
| | AGENT COMMISSIONS |
| | FLAT FEES |

-continued

| |
|---|
| MEDICAL - NON-BLENDED |
| DENTAL - NON-BLENDED |
| MEDICAL - BLENDED |
| DENTAL - BLENDED |
| VISION - BLENDED |
| CAM - BLENDED |
| GROUP DIRECT FEES |
| FLAT FEES |
| MEDICAL - NON-BLENDED |
| DENTAL - NON-BLENDED |
| MEDICAL - BLENDED |
| DENTAL - BLENDED |
| VISION - BLENDED |
| CAM - BLENDED |
| ADMINISTRATIVE FEES |
| FLAT FEES |
| MEDICAL - NON-BLENDED |
| DENTAL - NON-BLENDED |
| MEDICAL - BLENDED |
| DENTAL - BLENDED |
| VISION - BLENDED |
| CAM - BLENDED |
| LATE FEES |
| REINSTATEMENT FEES |
| NSF FEES |
| COBRA FEES |
| VARIANCE +/− $2.00 |
| OTHER FEES |
| TOTAL PREMIUM |
| RISK ADJUSTMENT PAYABLE (MEMO) |
| MEMBERS |
| MEDICAL |
| DENTAL |
| VISION |
| CAM |

4.4.10. Report ID: BPI_CAS_REP_FI__010

| | |
|---|---|
| Report ID | BPI_CAS_REP_FI_010 |
| Report Name | Billing Distribution (Carrier Level) |
| Purpose of Report | To report on distribution on amount and member counts appearing on invoices generated during the month. |
| Delivery To | CFO, Manager Finance |
| Frequency | Monthly, Adhoc |
| Mode of Delivery | Email |
| Output Format | XL, HTML |
| User Interface Required Yes/No | Yes |
| Automated or Manual | Automated, Manual |
| Input to report | From Date |
| | To Date |
| Output of the Report | HEALTH PLAN PREMIUMS - GROSS |
| | ADD: CAL COBRA FEES |
| | LESS: RISK ADJUSTMENT WITHHELD |
| | HEALTH PLAN PREMIUMS - NET |
| | AGENT COMMISSIONS |
| | FLAT FEES |
| | MEDICAL - NON-BLENDED |
| | DENTAL - NON-BLENDED |
| | MEDICAL - BLENDED |
| | DENTAL - BLENDED |
| | VISION - BLENDED |
| | CAM - BLENDED |
| | GROUP DIRECT FEES |
| | FLAT FEES |
| | MEDICAL - NON-BLENDED |
| | DENTAL - NON-BLENDED |
| | MEDICAL - BLENDED |
| | DENTAL - BLENDED |
| | VISION - BLENDED |
| | CAM - BLENDED |
| | ADMINISTRATIVE FEES |
| | FLAT FEES |

-continued

| |
|---|
| MEDICAL - NON-BLENDED |
| DENTAL - NON-BLENDED |
| MEDICAL - BLENDED |
| DENTAL - BLENDED |
| VISION - BLENDED |
| CAM - BLENDED |
| LATE FEES |
| REINSTATEMENT FEES |
| NSF FEES |
| COBRA FEES |
| VARIANCE +/− $2.00 |
| OTHER FEES |
| TOTAL PREMIUM |
| RISK ADJUSTMENT PAYABLE (MEMO) |
| MEMBERS |
| MEDICAL |
| DENTAL |
| VISION |
| CAM |

4.4.11. Report ID: BPI_CAS_REP_FI__011

| | |
|---|---|
| Report ID | BPI_CAS_REP_FI_011 |
| Report Name | Billing Distribution Detail (Group Level) |
| Purpose of Report | To report on distribution on amount and member counts appearing on invoices generated during the month. This is done for the individual group |
| Delivery To | CFO, Manager Finance |
| Frequency | Monthly, Adhoc |
| Mode of Delivery | Email |
| Output Format | XL, HTML |
| User Interface Required Yes/No | Yes |
| Automated or Manual | Automated, Manual |
| Input to report | From Date<br>To Date |
| Output of the Report | GROUP NO,<br>GROUP NAME,<br>GROUP EFF_DATE,<br>GROUP TYPE,<br>AGENT NO,<br>BILLING PERIOD,<br>INVOICE DATE,<br>RECONCILIED DATE,<br>CURRENT MONTH PREMIUM,<br>PRIOR PERIOR ADJ'S,<br>PLAN_ID,<br>HEALTH PLAN PREMIUM,<br>CAL COBRA FEES,<br>RISK ADJ WITHHELD,<br>HEALTH PLAN PREMIUMS - GROSS<br>ADD: CAL COBRA FEES<br>LESS: RISK ADJUSTMENT WITHHELD<br>HEALTH PLAN PREMIUMS - NET<br>AGENT COMMISSIONS<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>GROUP DIRECT FEES<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>ADMINISTRATIVE FEES<br>FLAT FEES<br>MEDICAL - NON-BLENDED |

-continued

| |
|---|
| DENTAL - NON-BLENDED |
| MEDICAL - BLENDED |
| DENTAL - BLENDED |
| VISION - BLENDED |
| CAM - BLENDED |
| LATE FEES |
| REINSTATEMENT FEES |
| NSF FEES |
| COBRA FEES |
| VARIANCE +/− $2.00 |
| OTHER FEES |
| TOTAL PREMIUM |
| RISK ADJUSTMENT PAYABLE (MEMO) |
| MEMBERS |
| MEDICAL |
| DENTAL |
| VISION |
| CAM |

4.4.12. Report ID: BPI_CAS_REP_FI__012

| | |
|---|---|
| Report ID | BPI_CAS_REP_FI_012 |
| Report Name | Cash balancing (Carrier Level) |
| Purpose of Report | To report on distribution of the Dollars associated with all the invoices reconciled during the current period (Week, Month). |
| Delivery To | CFO, Manager Finance |
| Frequency | Monthly, Weekly, Adhoc |
| Mode of Delivery | Email |
| Output Format | XL, HTML |
| User Interface Required Yes/No | Yes |
| Automated or Manual | Automated, Manual |
| Input to report | From Date<br>To Date |
| Output of the Report | HEALTH PLAN PREMIUMS - GROSS<br>ADD: CAL COBRA FEES<br>LESS: RISK ADJUSTMENT WITHHELD<br>HEALTH PLAN PREMIUMS - NET<br>AGENT COMMISSIONS<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>GROUP DIRECT FEES<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>ADMINISTRATIVE FEES<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>LATE FEES<br>REINSTATEMENT FEES<br>NSF FEES<br>COBRA FEES<br>VARIANCE +/− $2.00<br>OTHER FEES<br>TOTAL PREMIUM<br>RISK ADJUSTMENT PAYABLE (MEMO)<br>MEMBERS<br>MEDICAL |

| | |
|---|---|
| | DENTAL |
| | VISION |
| | CAM |

4.4.13. Report ID: BPI_CAS_REP_FI__013

| | |
|---|---|
| Report ID | BPI_CAS_REP_FI_013 |
| Report Name | Cash balancing (Group Level) |
| Purpose of Report | To report on distribution of the Dollars associated with all the invoices reconciled during the current period (Week, Month) for individual benefit level. |
| Delivery To | CFO, Manager Finance |
| Frequency | Monthly, Weekly, Adhoc |
| Mode of Delivery | Email |
| Output Format | XL, HTML |
| User Interface Required Yes/No | Yes |
| Automated or Manual | Automated, Manual |
| Input to report | From Date<br>To Date |
| Output of the Report | GROUP NO,<br>GROUP NAME,<br>GROUP EFF_DATE,<br>GROUP TYPE,<br>AGENT NO,<br>BILLING PERIOD,<br>INVOICE DATE,<br>RECONCILIED DATE,<br>CURRENT MONTH PREMIUM,<br>PRIOR PERIOR ADJ'S,<br>PLAN_ID,<br>HEALTH PLAN PREMIUM,<br>CAL COBRA FEES,<br>RISK ADJ WITHHELD,<br>HEALTH PLAN PREMIUMS - GROSS<br>ADD: CAL COBRA FEES<br>LESS: RISK ADJUSTMENT WITHHELD<br>HEALTH PLAN PREMIUMS - NET<br>AGENT COMMISSIONS<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>GROUP DIRECT FEES<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>ADMINISTRATIVE FEES<br>FLAT FEES<br>MEDICAL - NON-BLENDED<br>DENTAL - NON-BLENDED<br>MEDICAL - BLENDED<br>DENTAL - BLENDED<br>VISION - BLENDED<br>CAM - BLENDED<br>LATE FEES<br>REINSTATEMENT FEES<br>NSF FEES<br>COBRA FEES<br>VARIANCE +/− $2.00<br>OTHER FEES<br>TOTAL PREMIUM<br>RISK ADJUSTMENT PAYABLE (MEMO)<br>MEMBERS<br>MEDICAL<br>DENTAL |

| | |
|---|---|
| | VISION |
| | CAM |

4.4.14. Report ID: BPI_CAS_REP_FI__014

| | |
|---|---|
| Report ID | BPI_CAS_REP_FI_014 |
| Report Name | Un Reconciled Cash |
| Purpose of Report | To report on List of unreconciled cash items at the end of the month. |
| Delivery To | CFO, Manager Finance |
| Frequency | Monthly, Weekly, Adhoc |
| Mode of Delivery | Email |
| Output Format | XL, HTML |
| User Interface Required Yes/No | Yes |
| Automated or Manual | Automated, Manual |
| Input to report | Start Date<br>End Date |
| Output of the Report | Crec No, Group No, Date, Amount, Status, Term Date |

4.4.15. Report ID: BPI_CAS_REP_FI__015

| | |
|---|---|
| Report ID | BPI_CAS_REP_FI_015 |
| Report Name | Cash Receipt Report |
| Purpose of Report | To report on List of cash items in each cash batch |
| Delivery To | CFO, Manager Finance |
| Frequency | Monthly, Weekly, Adhoc |
| Mode of Delivery | Email |
| Output Format | HTML |
| User Interface Required Yes/No | Yes |
| Automated or Manual | Manual |
| Input to report | Batch Number |
| Output of the Report | ID, Date, Check No, Amount, Rec (Reconciled), Group ID and Group name. |

4.4.16. Report ID: BPI_CAS_REP_FI__016

| | |
|---|---|
| Report ID | BPI_CAS_REP_FI_016 |
| Report Name | Group and Premium transmitted to the Carrier |
| Purpose of Report | To report on the Groups and the premium transmitted to the carriers based on the member. (Premium Transmission based on members |
| Delivery To | GMS, Finance |
| Frequency | Adhoc |
| Mode of Delivery | None |
| Output Format | HTML |
| User Interface Required Yes/No | Yes |
| Automated or Manual | Manual |
| Input to report | Start Date<br>End Date |
| Output of the Report | Employer Tax ID, Group ID, Employer Tax ID, Employee ID, Carrier ID, Year ID, Plan Code, Premium Code, Premium Billed Amt (as Sent), Premium Billed Amt (Translated), Premium Applied Date, Premium Due Date, Geographic Area. |

4.4.17. Report ID: BPI_CAS_REP_FI__017

| | |
|---|---|
| Report ID | BPI_CAS_REP_FI_017 |
| Report Name | Employee Level Adjustments based on Changes |
| Purpose of Report | To report on the employee level adjustments based on changes. (Employee Add On, Employee Term, Dependent Add On, Dependent Term, Change of Benefit Level, Change of Coverage Choice (Employee Only, Employee Spouse etc.) |
| Delivery To | GMS, Finance |
| Frequency | Adhoc |
| Mode of Delivery | none |
| Output Format | HTML |
| User Interface Required Yes/No | Yes |
| Automated or Manual | Manual |
| Input to report | Start Date<br>End Date |
| Output of the Report | Group ID, Group Name, Employee ID, Employee SSN, Adjustment Amount, Effective Date, Adjustment Period, Adjustment Type, Adjustment Status. |

4.4.18. Report ID: BPI_CAS_REP_FI__018

| | |
|---|---|
| Report ID | BPI_CAS_REP_FI_018 |
| Report Name | Fees Applied or Waived on Group Level |
| Purpose of Report | To report on all types of fees applied and or waived for a specific group during the defined period. |
| Delivery To | GMS, Finance |
| Frequency | Adhoc |
| Mode of Delivery | none |
| Output Format | HTML |
| User Interface Required Yes/No | Yes |
| Automated or Manual | Manual |
| Input to report | Start Date<br>End Date |
| Output of the Report | Group ID, Group Name, Fees Type, Fees Amount, Invoice Number, Invoice Date, Reconciliation Status. |

4.4.19. Report ID: BPI_CAS_REP_FI__019

| | |
|---|---|
| Report ID | BPI_CAS_REP_FI_019 |
| Report Name | Premium History on Group/Employee Level |
| Purpose of Report | To report on the premium collected from group (broken down to employee) up to date |
| Delivery To | GMS, Finance |
| Frequency | Adhoc |
| Mode of Delivery | None |
| Output Format | HTML |
| User Interface Required Yes/No | Yes |
| Automated or Manual | Manual |
| Input to report | Group ID |
| Output of the Report | Invoice ID, Invoice Date, Group ID, Total Inv, Total Due. |

4.4.20. Report ID: BPI_CAS_REP_FI__020

| | |
|---|---|
| Report ID | BPI_CAS_REP_FI_020 |
| Report Name | Group Not paid "Accounts receivable total by Group" |
| Purpose of Report | To report on the groups not paid - Sort by Agent |
| Delivery To | GMS, Finance |
| Frequency | Adhoc |
| Mode of Delivery | none |
| Output Format | HTML |
| User Interface Required Yes/No | Yes |
| Automated or Manual | Manual |
| Input to report | |
| Output of the Report | Agent ID, Agent Name, Invoice Amount Due, Period Outstanding, Group ID, Group Name. |

4.4.21. Report ID: BPI_CAS_REP_FI__021

| | |
|---|---|
| Report ID | BPI_CAS_REP_FI_021 |
| Report Name | Group paid short |
| Purpose of Report | To report on the groups paid short - Sort by Agent |
| Delivery To | GMS, Finance |
| Frequency | Adhoc |
| Mode of Delivery | none |
| Output Format | HTML |
| User Interface Required Yes/No | Yes |
| Automated or Manual | Manual |
| Input to report | |
| Output of the Report | Agent ID, Agent Name, Amount Due, Period Outstanding, Group ID, Group Name, Amount Received, Amount Received, Amount short, Due Date. |

4.4.22. Report ID: BPI_CAS_REP_FI__022

| | |
|---|---|
| Report ID | BPI_CAS_REP_FI_022 |
| Report Name | Group for Refund |
| Purpose of Report | To report on the groups for Refund |
| Delivery To | GMS, Finance |
| Frequency | Adhoc |
| Mode of Delivery | none |
| Output Format | HTML |
| User Interface Required Yes/No | Yes |
| Automated or Manual | Manual |
| Input to report | |
| Output of the Report | Group ID, Group name, Agent ID, Agent name, Refund Amount, reasons for Refund. |

4.4.23. Report ID: BPI_CAS_REP_FI__025

| | |
|---|---|
| Report ID | BPI_CAS_REP_FI_025 |
| Report Name | Prepaid Commission |
| Purpose of Report | To report on distribution of next month's invoices reconciled and paid in current |
| Delivery To | CFO, Manager Finance |
| Frequency | Monthly, Adhoc |
| Mode of Delivery | email |
| Output Format | XL, HTML |

-continued

| | |
|---|---|
| User Interface Required Yes/No | Yes |
| Automated or Manual | Automated/Manual |
| Input to report | Year Month |
| Output of the Report | Group ID, Group Effective Date, Group Type, Bill Period, Invoice Date, Reconciled Date, Flat Fees, Medical Blended, Other, Medical Member Fees, Dental Blended, Dental Member Fees, Vision Blended, CAM Blended, Total. |

4.4.24. Report ID: BPI_CAS_REP_FI__026

| | |
|---|---|
| Report ID | BPI_CAS_REP_FI_026 |
| Report Name | Un Applied (Open) Commission Adjustment |
| Purpose of Report | To report on commission adjustments to Apply to the next commission run. (These are not yet applied and may change) |
| Delivery To | CFO, Commission Specialist |
| Frequency | Adhoc |
| Mode of Delivery | none |
| Output Format | XL/HTML |
| User Interface Required Yes/No | Yes |
| Automated or Manual | Manual |
| Input to report | Start Date<br>End Date |
| Output of the Report | Commission Adjustment ID, Date of Adjustment, Type (1099, Amount, Both), Adjustment Amount, Description, Agent name and Agent ID |

4.4.25. Report ID: BPI_CAS_REP_FI__027

| | |
|---|---|
| Report ID | BPI_CAS_REP_FI_027 |
| Report Name | Invoice and Payment History |
| Purpose of Report | To report on invoice and payment history and date both reconciled |
| Delivery To | GMS and Finance |
| Frequency | Adhoc |
| Mode of Delivery | None |
| Output Format | HTML |
| User Interface Required Yes/No | Yes |
| Automated or Manual | Manual |
| Input to report | Group ID |
| Output of the Report | Type, Date, Amount, Reconciled |

4.4.26. Report ID: BPI_CAS_REP_FI__028

| | |
|---|---|
| Report ID | BPI_CAS_REP_FI_028 |
| Report Name | Commission Register |
| Purpose of Report | To report on the results of semi monthly Commission run |
| Delivery To | Commission Specialist and CFO |
| Frequency | Semi monthly after Commission Run |
| Mode of Delivery | Email |
| Output Format | XL |
| User Interface Required Yes/No | No |

-continued

| | |
|---|---|
| Automated or Manual | Automated |
| Input to report | Commission Period |
| Output of the Report | Check Number, Check Date, Check Amount, Commission Amount, prior balance Forward amount, Commission Fees, Total Adjustment, 1099 Amount, B/F Amount, Agent Id, Commission period, Commission payee<br>(B/F - Balance Forward usually relating to negative balance) |

4.4.27. Report ID: BPI_CAS_REP_FI__029

| | |
|---|---|
| Report ID | BPI_CAS_REP_FI_029 |
| Report Name | Summary of unpaid Commission |
| Purpose of Report | To preview all commission to be paid this period. Includes current period and those payable from the prior periods (previously pended). Sum of Current amount will be equal to the cash balance report for the commissions for the same period. |
| Delivery To | Commission Specialist and CFO |
| Frequency | Run after each Commission Run |
| Mode of Delivery | Email |
| Output Format | XL |
| User Interface Required Yes/No | no |
| Automated or Manual | Automated |
| Input to report | Commission Period |
| Output of the Report | Agent ID, Commission payee, type, Period End Date, Period, Commission fees. |

4.4.28. Report ID: BPI_CAS_REP_FI__031

| | |
|---|---|
| Report ID | BPI_CAS_REP_FI_031 |
| Report Name | Agent License Expiration date |
| Purpose of Report | To report on agent and their license expiration date |
| Delivery To | Commission specialist |
| Frequency | Adhoc |
| Mode of Delivery | None |
| Output Format | HTML |
| User Interface Required Yes/No | Yes |
| Automated or Manual | Manual |
| Input to report | Date |
| Output of the Report | Agent ID, Agent Name, Effective Date, Address, City, Phone, License No, Expiration Date, Status |

4.4.29. Report ID: BPI_CAS_REP_FI__032

| | |
|---|---|
| Report ID | BPI_CAS_REP_FI_032 |
| Report Name | Listing of groups by Agent |
| Purpose of Report | To report on list of all groups associated with an agent sort by status. |
| Delivery To | Commission specialist, GMS, Finance and CFO |
| Frequency | Adhoc |
| Mode of Delivery | None |
| Output Format | HTML |
| User Interface Required Yes/No | Yes |

-continued

| | |
|---|---|
| Automated or Manual | Manual |
| Input to report | Agent ID |
| Output of the Report | Group Id, Group Name, Effective Date, Group Status, Agent id, Agent Name. |

4.4.30. Report ID: BPI_CAS_REP_FI__033

| | |
|---|---|
| Report ID | BPI_CAS_REP_FI_033 |
| Report Name | Listing of an agent's groups and reconciliation history for the last 4 months invoices with current commission payable. |
| Purpose of Report | To report on the group's recent history, agent and total commission payable by agent and to show what commissions are currently payable. (Should be able to sort) |
| Delivery To | Commission specialist, GMS, Finance and CFO and agent |
| Frequency | Adhoc |
| Mode of Delivery | None |
| Output Format | HTML |
| User Interface Required Yes/No | Yes |
| Automated or Manual | Manual |
| Input to report | Date<br>Agent ID |
| Output of the Report | Agent Id, Agent Name, Agent License, Group Id, Group Name, Enrolled Status, Invoices For 30 Days, Invoices For 60 Days, Invoices For 90 Days, Invoices For 120 Days, |

4.4.31. Report ID: BPI_CAS_REP_FI__035

| | |
|---|---|
| Report ID | BPI_CAS_REP_FI_035 |
| Report Name | Cash Extract |
| Purpose of Report | To report on individual payments entered to identify and trace on group level |
| Delivery To | GMS, Finance |
| Frequency | Adhoc |
| Mode of Delivery | None |
| Output Format | HTML |
| User Interface Required Yes/No | Yes |
| Automated or Manual | Manual |
| Input to report | Start Date<br>End Date |
| Output of the Report | Cash Receipt Id, Group Id, Cash Rec Date, Amount, Batch, Batch Date |

4.4.32. Report ID: BPI_CAS_REP_FI__036

| | |
|---|---|
| Report ID | BPI_CAS_REP_FI_036 |
| Report Name | New Business |
| Purpose of Report | To report all new business entered, by day |
| Delivery To | Customer Service, Finance, Management |
| Frequency | Adhoc |
| Mode of Delivery | None |
| Output Format | HTML |
| User Interface Required Yes/No | Yes |
| Automated or Manual | Manual |

-continued

| | |
|---|---|
| Input to report | Start Date<br>End Date |
| Output of the Report | Group ID, Group Name, Date Received, Check Amount, Effective Date, Status |

4.4.33. Report ID: BPI_CAS_REP_FI__038

| | |
|---|---|
| Report ID | BPI_CAS_REP_FI_038 |
| Report Name | Operating Account Daily cash Activity |
| Purpose of Report | To summarize cash activity in system and through the bank |
| Delivery To | Finance, Accounting manager, CFO |
| Frequency | Monthly, Adhoc |
| Mode of Delivery | Email |
| Output Format | XL HTML |
| User Interface Required Yes/No | Yes |
| Automated or Manual | Manual/Auto |
| Input to report | Date |
| Output of the Report | Date, Manual Batch, NSF Batch, Returns Batch, Positive Transfer, Negative Transfer, Lockbox Check, Auto-Batch EFT, Direct Deposit, Wire Transfer, CC Over Phone, Auto-Batch Credit Card, Online Credit Card, TR to 4159 297506, TR to 4159 297456, Interest Received |

4.4.34. Report ID: BPI_CAS_REP_FI__040

| | |
|---|---|
| Report ID | BPI_CAS_REP_FI_040 |
| Report Name | Recap pf A/R & A/P |
| Purpose of Report | To summarize for entry to financials |
| Delivery To | Accounting Manager, CFO |
| Frequency | Monthly |
| Mode of Delivery | Email |
| Output Format | XL HTML |
| User Interface Required Yes/No | No |
| Automated or Manual | Auto |
| Input to report | Bill Period |
| Output of the Report | Code Number, Carrier, Un reconciled, Reconciled/Unbilled, Total |

4.4.35. Report ID: BPI_CAS_REP_FI__041

| | |
|---|---|
| Report ID | BPI_CAS_REP_FI_041 |
| Report Name | Deferred revenue & Expense & Worksheet for journal entries |
| Purpose of Report | To itemize amounts for deferred revenue and expenses (for financials) and journal entries for these. |
| Delivery To | Accounting Manager, CFO |
| Frequency | Monthly |
| Mode of Delivery | Email |
| Output Format | XL HTML |
| User Interface Required Yes/No | No |
| Automated or Manual | Auto |
| Input to report | |
| Output of the Report | Account No, Description, Deferred Revenue |

4.4.36. Report ID: BPI_CAS_REP_FI__042

| | |
|---|---|
| Report ID | BPI_CAS_REP_FI_042 |
| Report Name | Check with Commission Statement |
| Purpose of Report | To pay agents and report commission activity for a period. |
| Delivery To | Mail house (electronically), agents |
| Frequency | Semi-Monthly |
| Mode of Delivery | None |
| Output Format | Paper check, HTML, electronic file to mail house. |
| User Interface Required Yes/No | No |
| Automated or Manual | Automated |
| Input to report | Agent ID, Commission Period |
| Output of the Report | Group Id, Group Name, Month Paid, Effective Date, Product Type, Total Member, Split Percentage, Flat Fee, PM Fee, Total Fees, Monthly Premium, % Com, 1099 Amount. |

4.4.37. Report ID: BPI_CAS_REP_FI__044

| | |
|---|---|
| Report ID | BPI_CAS_REP_FI_044 |
| Report Name | Finance Transmission Status |
| Purpose of Report | This report is used to show the status for the transmission for various external transmissions for a specified duration |
| Delivery To | IT |
| Frequency | Non periodic |
| Mode of Delivery | None |
| Output Format | XL or HTML |
| User Interface Required Yes/No | Yes |
| Automated or Manual | Manual |
| Input to report | From Date<br>To Date |
| Output of the Report | Transmission Time and Date, Process Period, Data Format Transmission Type, File Size, Record Count, Status. |

4.5. Module Name: Miscellaneous (Security, Work Group, Supply Request and Associates)

4.5.1. Report ID: BPI_CAS_REP_MISC__001

| | |
|---|---|
| Report ID | BPI_CAS_REP_ MISC_001 |
| Report Name | User Access right report from Security |
| Purpose of Report | This report is used to provide information on the user name, user roles, user groups and access rights |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | User ID |
| Output of the Report | User ID, User name, User roles, User group, Resource, Access rights. |

4.5.2. Report ID: BPI_CAS_REP_MISC__002

| | |
|---|---|
| Report ID | BPI_CAS_REP_MISC_002 |
| Report Name | Report on Work group |
| Purpose of Report | This report is used to provide information on the work groups and the Groups and member counts per work group |
| Delivery To | All BPI |
| Frequency | Adhoc |
| Mode of Delivery | None |
| Output Format | HTML |
| User Interface Required Yes/No | Yes |
| Automated or Manual | Manual |
| Input to report | Work group ID |
| Output of the Report | Work Group ID, Work Group Name, Group Count, Member Count |

5. Interface Flow

This outlines the menu for the reports. (See FIG. L-3)

6. Data Structures

Not Applicable

| Data Element Name | Data Element Type |
|---|---|

6.1. Back End Validations

Not applicable

| Field Element Name | Back End Validation |
|---|---|

7. Non-Functional Requirements

| Non Functional Requirement | Details |
|---|---|

8. Access Control List

| User ID | Job Description | Functionality | Access Level |
|---|---|---|---|

Benefit Partners Inc

Process Specification

Campaign

1. Introduction 1.1. Purpose

This functional specification document addresses the part of the sales and marketing system that would assign and track the marketing campaigns, which are made by BPI as part of their marketing efforts.

1.2. Business Use Case Specification Reference

| Business Use Specification ID | Business Use Case Name |
|---|---|
| BPI_SCOPE_SM.DOC | Sales & Marketing |
| BPI_SCOPE_SM_01 | Create Sales Rep Master |

1.3. Definitions, Acronyms & Abbreviations

| Term | Explanation |
|---|---|

2. Process Identification 2.1. Process Description & Flow

A marketing campaign is an initiative where an identifiable segment of potential employer groups are targeted through the media like the radio, newspaper, mailers etc. Benefit Partners organizes for the marketing campaigns through third parties or by itself periodically.

The details of a campaign initiative are captured in the system through the campaign master.

The campaign master provides information on the campaign, duration and the personnel associated with the campaign. The media through which a campaign is done is captured in the system using the source type and source subtype.

The source type defines the media through which a campaign can be conducted and the source sub type provides the information on the subcategory that may come under the source type.

The source type and source sub type are configurable and must be created in sequence of source type followed by source subtype. For associated source type and source subtype for a campaign, the details get reflected on the campaign master only if it is captured prior to creation the campaign master.

Creation and modification of a campaign master leads to generation of email to the internal and external sales reps.

The source type can be used as an input for marketing methods in the agent profile and as source in the employer group master on enrollment.

The responses received from a marketing campaign are captured in Employer Group Master.

This would typically help in analyzing the responses made to the marketing campaign and also provide necessary tracking information for future market campaign planning and decision-making on the effectiveness of the campaign. This would provide a tracking mechanism that would measure the affect that an ad or ad campaign has on brand and/or company awareness, interest, attitude and enrollment conversions.

The internal sales rep makes a request for the welcome packets through the supply request The flow diagram describes a typical flow on a campaign. The source type, source subtype and campaign can also be modified, viewed and inactivated.

2.2. Process Flow Diagram (See FIG. M-1)

3. User Interface 3.1. User Interface Screens 3.1.1. Screen ID's

| Screen ID (SID) | Screen Name | Corresponding HTML File Name |
|---|---|---|
| utl.campaign.sourcetype | Source type | /bpi/cas/marketing/campaign/SourceType.jsp |
| utl.campaign.sourcesubtype | Source sub type | /bpi/cas/marketing/campaign/SourceSubType.jsp |
| uti.campaign.create | Campaign | /bpi/cas/marketing/campaign/CampaignMaster.jsp |
| utl.campaign.search | Search Campaign | /bpi/cas/marketing/campaign/CampaignSearch.jsp |
| utl.campaign.view | View Campaign | /bpi/cas/marketing/campaign/CampaignView.jsp |

3.1.2. User Interface ID: Source Type 3.1.2.1. Screen name: Source Type (BPI_CAS_SM_SCR__001__001) (See FIG. M-2)

3.1.2.2. SID, Element Name, Element Type & Purpose

| Element Name | Element Type | Label | Purpose |
|---|---|---|---|
| Main Header "Source Type" | Text | Main Header "Source Type" | To give the heading for the screen being navigated |
| Source Type | Text | Source Type | Text For "Source Type" |
| Source Type Entry Field | Entry Field | Source Type Entry Field | Entry field for entering the source type |
| Input Source | Text | Input Source | Text for "Input Source" |
| Input Source List | List | Input Source List | List with values Yes/No - Default No |
| Add | HTML Button | Add | Button for adding the Source Type/Input Source information in to the HTML table. Changes with label "Modify" when the row in the table is on edit mode. |
| Table | HTML table | Table | For displaying all the information added by pressing the add button, in the form of rows, for every add operation/Rows retrieved from the permanent repository |
| Delete | Button (HTML Button) | Delete | To delete the rows checked |
| Check All | Text Link | Check All | To check all the check boxes in the table |
| Clear All | Text Link | Clear All | To un check all the check boxes checked in the table/does not function when all the checkboxes in the table are unchecked |
| Delete | Check box | Delete | To check the items for deletion |
| Edit | Button (HTML Button) | Edit | To edit the rows entered by "Add"/"Modify"/displayed from permanent repository against the row selected for editing |

-continued

| Element Name | Element Type | Label | Purpose |
|---|---|---|---|
| Save | Button (HTML Submit button) | Save | Save the information to the repository |
| Cancel | Button | Cancel | Reset information as described in the scenarios |

3.1.2.3. Front End Validations

| Element Name | Action/Validation Details | Error Message Text |
|---|---|---|
| Source Type Entry Field | Mandatory Entry<br>Becomes non editable when on modify mode for data from permanent repository | When the Add HTML Button is pressed with an empty entry on the source type entry field, an Error Dialog Box pops up with the message "Please enter the source type before adding to the table" with "yes" option<br>On press of Yes Button, The cursor must be placed on the source type entry field |
| Input Source List | Default - No | Not Applicable |
| Add | On Clicking the add button or pressing the enter key field with the cursor positioned on the Add button, the data gets added to the table. Validation checks are done to not allow null value on the source type entry field.<br>Must not allow duplicate entries on the source type.<br>Must not allow the length of the field entry to go beyond as per the database design for the column | When the Add HTML Button is pressed with an empty entry on the source type entry field, an Error Dialog Box pops up with the message "Please enter the source type before adding to the table" with "yes" option.<br>On press of Yes Button, The cursor must be placed on the source entry field<br>For duplicate entries, Error dialog box - "Duplicate values not allowed. Please enter again" |
| Modify | On Clicking modify button or the pressing the enter key field with the cursor position on the modify button, The data gets added to the table. | None |
| Table | Should have column header and each subsequent row should be identified by alternate color combinations. i.e. First row should have color 'x' and the next row should have color 'y'. The next row should have color 'x' again and so on. The size of any text inside any cell should be wrapped if the text becomes too long.<br>The letters must be green in color for the rows retrieved from the permanent repository and red for the rows in temporary storage.<br>All the letters of the row on edit must be in dark gray. | |
| Delete | Should function with enter key cursor positioned on the "Delete" button or on mouse click<br>Delete button should work on multiple deletes based on the check box or boxes selected. If the user clicks on the delete button without checking any of the check box should throw error message.<br>Success: Deletes the row or rows from the table (temporary storage) | Error Dialog Box: "Please choose the row or rows to be deleted." with "yes" option |
| Check All | On clicking the "Check All" link should check all the check boxes in the HTML table. | Not Applicable |
| Clear All | On clicking the "Clear All" link should uncheck all the checked check boxes in the HTML table. | Not Applicable |
| Edit | Should function with Enter Key Cursor positioned on the "Edit" button or on mouse click.<br>Refer Interface flow on scenarios - "edit data" | |

-continued

| Element Name | Action/Validation Details | Error Message Text |
|---|---|---|
| Save | Should function with enter key cursor positioned on the "Save" button or on mouse click. On saving the data the data gets saved to the permanent repository. | Not Applicable |
| Cancel | All the data entered is reset with empty/initial values in the data entry fields as the case may be (Text Field, List etc). If a row is already modified and added to the table on the screen and the Cancel button is pressed, the row remains with the modified values | Not Applicable |
| Browser Window | When a user tries to close the window with out saving data into the permanent repository, a dialog box pops up | Error Dialog box message: "Do you want to save all changes before closing/leaving the window? " with a "Yes" and "No" option. On press of "Yes" leads to saving of information and "No" leads to the source type screen with the original values |

3.1.3. User Interface ID: Source Sub Type 3.1.3.1. Screen name: Source Sub Type (BPI_CAS_SM_SCR__001__002) (See FIG. M-3)

3.1.3.2. SID, Element Name, Element Type & Purpose

| Element Name | Element Type | Label | Purpose |
|---|---|---|---|
| Main Header "Source Sub Type" | Text | Main Header "Source Sub Type" | To give the heading for the screen being navigated |
| Source Type | Text | Source Type | Text For "Source Type" |
| Source Type List | Non Editable field with search | Source Type List | Search with a List of all active source types retrieved from the permanent repository. |
| Source Sub Type | Text | Source Sub Type | Text For "Source Sub Type" |
| Source Sub Type Entry Field | Entry Field | Source Sub Type Entry Field | Entry field for entering the source sub type |
| Description | Text | Description | Text for "Description" |
| Description Entry Field | Entry Field | Description Entry Field | Entry field for entering the description |
| Add | HTML Button | Add | Button for adding the Source Type/Source Sub Type information in to the HTML table. Changes with label "Modify" when the row in the table is on edit mode. |
| Table | HTML table | Table | For displaying all the information added by pressing the add button in the form of rows, for every add operation/rows retrieved from the permanent repository |
| Delete | Button (HTML Button) | Delete | To delete the rows checked |
| Check All | Text Link | Check All | To check all the check boxes in the table |
| Clear All | Text Link | Clear All | To un check all the check boxes checked in the table/does not function when all the checkboxes in the table are unchecked |
| Delete | Check box | Delete | To check the items for deletion |
| Edit | Button (HTML Button) | Edit | To edit the rows entered by "Add", "Modify", displayed from permanent repository against the row selected for editing |
| Save | Button (HTML Button) | Save | Save the information to the repository |
| Cancel | Button | Cancel | Cancel information as described in the scenarios |

3.1.3.3. Front End Validations

| Element Name | Action/Validation Details | Error Message Text |
| --- | --- | --- |
| Source Sub Type Entry Field | Mandatory Entry<br>Becomes non editable when on modify mode for data from permanent repository | When the Add/Modify HTML Button is pressed with an empty entry on the source sub type entry field, an Error Dialog Box pops up with the message "Please enter the source sub type before adding to the table" with "yes" option<br>On press of Yes Button, The cursor must be placed on the source sub type entry field |
| Source Type List | Default - "Choose One" with list of all active source types<br>Becomes non editable when on modify mode for data from permanent repository | When the Add/Modify HTML Button is pressed without choosing a source type, an Error Dialog Box pops up with the message "Please choose the source type before adding to the table" with "yes" option<br>On press of Yes Button, The user is allowed to choose a source type with the original values still available for the source sub type. |
| Add | On Clicking add button or the pressing the enter key field with the cursor position on the Add button, The data gets added to the table. Validation checks are done to not allow null value on the source sub type entry field.<br>Must not allow duplicate entries for a combination of source type and source subtype<br>Must not allow the length of the field entry to go beyond as per the database design for the column | When the Add HTML Button is pressed with an empty entry on the source sub type entry field, an Error Dialog Box pops up with the message "Please enter the source sub type before adding to the table" with "yes" option.<br>When the Add HTML Button is pressed without choosing a source type, an Error Dialog Box pops up with the message "Please choose the source type before adding to the table" with "yes" option<br>For duplicate entries, Error dialog box - "Duplicate values not allowed. Please enter again" |
| Modify | On Clicking Modify button or the pressing the enter key field with the cursor position on the Modify button, the data gets added to the table. Validation checks are done to not allow null value on the source sub type entry field<br>Must not allow duplicate entries for a combination of source type and source subtype<br>Must not allow the length of the field entry to go beyond as per the database design for the column | When the "Modify" HTML Button is pressed with an empty entry on the source sub type entry field, an Error Dialog Box pops up with the message "Please enter the source sub type before adding to the table" with "yes" option.<br>On press of Yes Button, The cursor must be placed on the source entry field<br>For duplicate entries, Error dialog box - "Duplicate values not allowed. Please enter again" |
| Table | Should have column header and each subsequent row should be identified by alternate color combinations. i.e. First row should have color 'x' and the next row should have color 'y'. The next row should have color 'x' again and so on. The size of any text inside any cell should be wrapped if the text becomes too long.<br>The letters must be green in color for the rows retrieved from the permanent repository and red for the rows in temporary storage.<br>All the letters of the row on edit must be in dark gray. | |
| Delete | Should function with enter key cursor positioned on the "Delete" button or on mouse click<br>Delete button should work on multiple deletes based on the check box or boxes selected. If the user clicks on the delete button without checking any of the check box should throw error message.<br>Success: Deletes the row or rows from the table (temporary storage) | Error Dialog Box: "Please choose the row or rows to be deleted." with "yes" option |
| Check All | On clicking the "Check All" link should check all the check boxes in the HTML table. | Not Applicable |

-continued

| Element Name | Action/Validation Details | Error Message Text |
|---|---|---|
| Clear All | On clicking the “Clear All” link should uncheck all the checked check boxes in the HTML table. | Not Applicable |
| Edit | Should function with Enter Key Cursor positioned on the “Edit” button or on mouse click. Refer Interface flow on (source subtype) scenarios - “edit data” | |
| Save | Should function with enter key cursor positioned on the “Save” button or on mouse click. On saving the data the data gets saved to the permanent repository. | Not Applicable |
| Cancel | All the data entered is Cancel with empty/initial values in the data entry fields as the case may be (Text Field, List etc). If a row is already modified and added to the table on the screen and the Cancel button is pressed, the row remains with the modified values | Not Applicable |

3.1.4. User Interface ID: Campaign Master—Create 3.1.4.1. Screen name: Campaign Master—Create (BPI_CAS_SM_SCR__001__003) (See FIG. M-4)

3.1.4.2. SID, Element Name, Element Type & Purpose

| Element Name | Element Type | Label | Purpose |
|---|---|---|---|
| Main Header “Campaign Master” | Text | Main Header “Campaign Master” | To give the heading for the screen being navigated |
| Campaign Name | Text | Campaign Name | Text For “Campaign Name” |
| Campaign Name Entry Field | Entry field | Campaign Name Entry Field | Entry field for entering the campaign name |
| Description | Text | Description | Text for “Description” |
| Description Entry Field | Entry Field | Description Entry Field | Entry field for entering the description |
| Source Type | Text | Source Type | Text for “Source Type” |
| Source Type | Non Editable Field with Search | Source Type | Provides a list of active source types |
| Sub Type | Text | Sub Type | Text for “Source Sub Type” |
| Source Sub Type | Non editable Field with Search | Source Sub Type | Provides a List of active source subtypes for a selected source type |
| Import | HTML Button | Import | HTML Button with Import Label leads to import screen for importing the data for the campaign data. |
| Associated Workgroups | Text | Associated Workgroups | Text for “Associated Workgroups” |
| Associated Workgroups Combo Box | Combo Box | Associated Workgroups Combo Box | Contains the agent list added on selection from the “Associated Workgroups” - Child work groups available |
| Associated Workgroups List | List | Associated Workgroups List | List of Active workgroups - child work groups from database |
| Duration | Text | Duration | Text for “Duration” |
| From Date | Text | From Date | Text for “From” |
| To Date | Text | To Date | Text for “To” |
| From Date | Calendar | From Date | Calendar for From Date |
| To Date | Calendar | To Date | Calendar for To Date |
| Save | HTML Button | Save | Button for saving the data |

3.1.4.3. Front End Validations

| Element Name | Action/Validation Details | Error Message Text |
|---|---|---|
| Campaign Name Entry Field | Mandatory Entry | When the "Save" HTML Button is pressed with an empty entry on the campaign name, an Error Dialog Box pops up with the message "Please enter the Campaign Name" with "yes" option. On press of Yes Button, The cursor must be placed on the campaign name entry field |
| Import Button | Must be visible only if the source type selected has input source option as yes | |
| Save | On clicking the save button or pressing the enter key field with the cursor positioned on the save button, The data gets inserted to the permanent repository. Validation checks are done to not allow null value on the campaign name. Must not allow duplicate entries for a combination of campaign for a from date and to date for a combination of source type and source subtype Must not allow the length of the field entry to go beyond as per the database design for the column Must choose the Source Type, Sub Type. From date must not be less than the system date - caution message From date must not be beyond the to date or to date must not be before the from date. To date must not be lesser than system date - caution message | When the save HTML Button is pressed with an empty entry on the Campaign, an error dialog box pops up with the message "Please enter the campaign name" If campaign name is not filled up and placement of cursor in respective field. For duplicate entries, Error dialog box - "Duplicate values not allowed. Please enter again" For Invalid dates (from date - beyond - to date) or (To date - before - from date) - Error dialog box - "Please check the validity of from and to dates" with Yes option For invalid dates (from date, to date less than the system date) - caution message in an error dialog box - "Dates selected is before the system date - is it valid entry?" with yes and no option. If Yes - acceptable and if - No - not acceptable. If the source type is not selected, then on press of the save button leads to error dialog box with error message "Choose Source Type" with Yes option If the source subtype is not selected, then on press of the save button leads to the error dialog box with error message "choose the source subtype" with Yes option On press of Yes on both cases, goes to the screen with the original values and enables the user to choose the Source Type or Source Subtype |

3.1.5. User Interface ID: Modify Campaign Master 3.1.5.1. Screen name: Modify Campaign Master Step 1 (BPI_CAS_SM_SCR__001__004) (See FIG. M-5)

Step 2 (BPI_CAS_SM_SCR__001__005) (See FIG. M-6)

3.1.5.2. SID, Element Name, Element Type & Purpose

Step—1:

| Element Name | Element Type | Label | Purpose |
|---|---|---|---|
| Main Header "Search Campaign Master" | Text | Main Header "Search Campaign Master" | To give the heading for the screen being navigated |
| Campaign Name | Text | Campaign Name | Text For "Campaign Name" |
| Campaign Name | Entry Field | Campaign Name | Text field for entering Campaign name. |
| Campaign ID | Text | Campaign ID | Text for Campaign Id |
| Campaign ID | Entry Field | Campaign ID | Text field for entering campaign id |
| Search | Button | Search | Search for Campaigns |
| Cancel | Button | Cancel | Cancel the operation |

-continued

| Element Name | Element Type | Label | Purpose |
|---|---|---|---|
| Modify | Button | Modify | To edit the current record |
| View/Delete | Button | View/Delete | To View the current record |

Step—2:

| Element Name | Element Type | Label | Purpose |
|---|---|---|---|
| Main Header “Modify Campaign Master” | Text | Main Header “Modify Campaign Master” | To give the heading for the screen being navigated |
| Campaign Name | Text | Campaign Name | Text For “Campaign Name” |
| Campaign Name | Entry Field | Campaign Name | Text for modifying Campaign name. |
| Description | Text | Description | Text for “Description” |
| Description Entry Field | Entry Field | Description Entry Field | Entry field for modifying the description |
| Source Type | Text | Source Type | Text for “Source Type” |
| Source Type | List | Source Type | Search feature with a List of active source types with default source type saved during the creation of the campaign master |
| Sub Type | Text | Sub Type | Text for “Source Sub Type” |
| Source Sub Type | List | Source Sub Type | Search feature with a list of active source subtypes for a selected source type with the default value of the sub type saved during the creation of the campaign master. |
| Import | HTML Button | Import | HTML Button for Import |
| Associated workgroups | Text | Associated workgroups | Text for “Associated Workgroups” |
| Associated Workgroups Combo Box | Combo Box | Associated Workgroups Combo Box | Contains the workgroups list added on selection from the “Associated Workgroups” - child workgroups available for category “Campaign” - saved during the creation of the campaign master |
| Associated Workgroups List | List | Associated Workgroups List | List of Active workgroups from database minus the workgroup list - child workgroups in the combo box |
| Duration | Text | Duration | Text for “Duration” |
| From Date | Text | From Date | Text for “From” |
| To Date | Text | To Date | Text for “To” |
| From Date | Calendar | From Date | Calendar for From Date and showing the date saved during the creation of the campaign master |
| To Date | Calendar | To Date | Calendar for To Date and showing the date saved during the creation of the campaign master |
| Update | HTML Button | Modify | Button for modifying data |

3.1.5.3. Front End Validations

| Element Name | Action/Validation Details | Error Message Text |
|---|---|---|
| Modify in step 1 screen | Must choose a campaign | When the modify button is pressed without choosing the campaign, error dialog “Choose a campaign” with a yes option. |
| Campaign Name Text | Non Editable Campaign Name field | |
| Import Button | Must be enabled only if the campaign master create record has an input source | |
| Modify | On clicking “Modify” button or pressing the enter key field with the cursor positioned on the “Modify” button, the data gets modified to | When the “Modify” HTML Button is pressed with an empty entry on the Campaign, an error dialog box pops |

-continued

| Element Name | Action/Validation Details | Error Message Text |
|---|---|---|
| | the permanent repository and makes the data of an input file of the previous entry inactive. Validation checks are done to not allow null value on the campaign name. Must not allow duplicate entries for a combination of campaign for a from date and to date for a combination of source type and source subtype Must not allow the length of the field entry to go beyond as per the database design for the column From date must not be less than the system date - caution message From date must not be beyond the to date or to date must not be before the from date. To date must not be lesser than system date - caution message | up with the message "Please enter the campaign name" For duplicate entries, Error dialog box - "Duplicate values not allowed. Please enter again" For Invalid dates (from date - beyond - to date) or (To date - before - from date) - Error dialog box - "Please check the validity of from and to dates" with Yes option For invalid dates (from date, to date less than the system date) - caution message in an error dialog box - Dates selected is before the system date - is it valid entry?" with yes and no option. If Yes - acceptable and if No - not acceptable. If the source type is not selected, then on press of the save button leads to error dialog box with error message "Choose Source Type" with Yes option If the source subtype is not selected, then on press of the save button leads to the error dialog box with error message "choose the source subtype" with Yes option On press of Yes on both cases, goes to the screen with the original values and enables the user to choose the Source Type or Source Subtype |

3.1.6. User Interface ID: View Campaign Master

This screen below captures the information for viewing campaign master

Step—1: Choose the campaign for viewing navigates to the view campaign master screen Step—2: View the campaign master 3.1.6.1. Screen Name: View Campaign Master (BPI_CAS_SM_SCR__001__006) (See FIG. M-7)

(See FIG. M-8)

3.1.6.2. SID, Element Name, Element Type & Purpose

Step—1:

| Element Name | Element Type | Label | Purpose |
|---|---|---|---|
| Main Header "Search Campaign Master" | Text | Main Header "Search Campaign Master" | To give the heading for the screen being navigated |
| Campaign Name | Text | Campaign Name | Text For "Campaign Name" |
| Campaign Name | Entry Field | Campaign Name | Text field for entering Campaign name. |
| Campaign ID | Text | Campaign ID | Text for Campaign Id |
| Campaign ID | Entry Field | Campaign ID | Text field for entering campaign id |
| Search | Button | Search | Search for Campaigns |
| Cancel | Button | Cancel | Cancel the operation |
| Modify | Button | Modify | To edit the current record |
| View/Delete | Button | View/Delete | To View the current record |

Step—2:

| Element Name | Element Type | Label | Purpose |
|---|---|---|---|
| Main Header "View Campaign Master" | Text | Main Header "View Campaign Master" | To give the heading for the screen being navigated |
| Campaign Name | Text | Campaign Name | Text For "Campaign Name" |
| Campaign Name | Text | Campaign Name | Non Editable field for viewing campaign name |
| Description | Text | Description | Text for "Description" |
| Description | Text | Description | Non Editable field for viewing the description |
| Source Type | Text | Source Type | Text for "Source Type" |
| Source Type | Text | Source Type | Non Editable field for viewing the Source Type |
| Source Sub Type | Text | Source Sub Type | Text for "Source Sub Type" |
| Source Sub Type | Text | Source Sub Type | Non Editable field for viewing the Source Sub Type |
| Associated Workgroups | Text | Associated Workgroups | Text for "Associated Workgroups" |
| Associated Workgroups Combo Box | Non Editable Combo Box | Associated Workgroups Combo Box | Contains the Workgroup list active for the campaign |
| Duration | Text | Duration | Text for "Duration" |
| From Date | Text | From Date | Text for "From" |
| To Date | Text | To Date | Text for "To" |
| From Date | Text | From Date | Shows the from date for the campaign |
| To Date | Text | To Date | Shows the to date for the campaign |

3.1.6.3. Front End Validations

| Element Name | Action/Validation Details | Error Message Text |
|---|---|---|
| View in step 1 screen | Must choose a campaign | When the view button is pressed without choosing the campaign, error dialog "Choose a campaign" with a yes option. |

3.1.7. Screen Flow (See FIG. M-9)

4. Business Rule Mapping

Source Type

| Activity | Rules |
|---|---|
| Create Source Type | Should have unique Id for a source Type - 10 digits with an increment of 1, Say 0000000001, 0000000002, 0000000003 and so on. |

Source Sub Type

| Activity | Rules |
|---|---|
| Create Source Sub Type | Should have unique Id 10 digit for a source sub type with an increment of 1, Say 0000000001, 0000000002, 0000000003 and so on. |

Campaign

| Activity | Rules |
|---|---|
| Create Campaign Master | Should have unique Id 10 digit for a campaign with an increment of 1, Say 0000000001, 0000000002, 0000000003 and so on. |

Benefit Partners Inc

Process Specification

Sales Master

1. Introduction 1.1. Purpose

This functional specification document addresses the part of the sales and marketing system that would deal with creation of master records for sales like the Lead master, Agent/Agency master.

1.2. Business Use Case Specification Reference

| Business Use Specification ID | Business Use Case Name |
|---|---|
| BPI_SCOPE_SM_002 | Agent Master |
| BPI_SCOPE_SM_003 | Agency Master |
| BPI_SCOPE_SM_006 | Lead Master |

1.3. Definitions, Acronyms & Abbreviations

| Term | Explanation |
|---|---|

2. Process Identification 2.1. Process Description & Flow (See FIG. 10)

The user creates the sales masters which shall include lead master, agent master and agency master and has the ability to view, delete and modify apart from create function.

user can navigate to the screens from the content area or from the menus

The users also maintain tracking information of a lead in a lead master.

3. User Interface 3.1. User Interface Screens 3.1.1. Screen ID's

<List SID and the Screen Name and Corresponding HTML File for the Screen.>

| Screen ID (SID) | Screen Name | Corresponding HTML File Name |
|---|---|---|
| sales.leadmaster.creategeninfo | Lead Master Page 1 of 2 | LeadMasterCreate1.jsp |
| sales.leadmaster.createotherinfo | Lead Master Page 2 of 2 | LeadMasterCreate2.jsp |
| sales.leadmaster.search | Search Lead Master | LeadMasterSearch.jsp |
| sales.leadmaster.view | View Lead Master | LeadMasterView.jsp |
| sales.agentmaster.creategeninfo | Agent Master Page 1 of 2 | AgentMasterCreate1.jsp |
| sales.agentmaster.createotherinfo | Agent Master Page 2 of 2 | AgentMasterCreate2.jsp |
| sales.agentmaster.search | Search Agent Master | AgentMasterSearch.jsp |
| sales.agentmaster.view | View Agent Master | AgentMasterView.jsp |
| sales.agencymaster.creategeninfo | Agency Master Page 1 of 2 | AgencyMasterCreategeninfo.jsp |
| sales.agencymaster.createotherinfo | Agency Master Page 2 of 2 | AgencyMasterCreateotherinfo.jsp |
| sales.agencymaster.search | Search Agency Master | AgencyMasterSearch.jsp |
| sales.agencymaster.view | View Agency Master | AgencyMasterView.jsp |
| sales.leadmaster.leadtrack | Lead Tracking | LeadTrack.jsp |

3.1.2. User Interface ID: Create Lead Master 3.1.2.1. Screen Name: Create Lead Master (BPI_CAS_SM_SCR__002__001, BPI_CAS_SM_SCR__002__002 & BPI_CAS_SM_SCR__002__003)

This screen below captures the information for creating lead master.

Step 1: Fill the mandatory information in page1. Click "Next" to navigate to page2.

Step 2: Fill the mandatory information in page2 and click "Save" to save the Lead Master data.

Step 3: Saving of Lead data takes you to Confirmation page.

Page1 (BPI_CAS_SM_SCR__002__001) (See FIG. M-11)

Page2 (BPI_CAS_SM_SCR__002__002) (See FIG. M-12)

Confirmation page (BPI_CAS_SM_SCR__002__003) (See FIG. M-13)

3.1.2.2. SID, Element Name, Element Type & Purpose

| Element Name | Element Type | Element Type | Purpose |
|---|---|---|---|
| Lead Type | Text | Lead Type | Text showing "Lead Type" |
| Group Type | Text | Group Type | Text showing "Group Type" |
| Group Type | Select Feature | Group Type | To select "Group Type" |
| Association ID | Text | Association ID | Text showing "Association ID" |
| Association ID | Select Feature | Association ID | To select "Associations", if the Group Type selected is either Guaranteed Association or Endorsed Association or PEO Association or Chamber Association. |
| Member Type | Text | Member Type | Text for "Member Type" |
| Member Type | Radio Button | Member Type | To select either Individual Member or Association Member if Group Type selected is a Guaranteed Association who offers both Individual and Association Member coverage |
| Source Sub Type | Text | Source Sub Type | Text for "Source Sub Type" |
| Source Sub Type Search Field | Non Editable Entry field | Source Sub Type Search Field | Search feature for a source Type Field |
| Sub Header "General Information" | Text | Sub Header "General Information" | To give the heading for the sub section |
| Company | Text | Company | Text for "Company Name". |
| Company | Entry Field | Company | Entry field for company. |
| DBA | Text | DBA | Text for "DBA". |
| DBA | Entry Field | DBA | Entry field for dba. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| City | Text | City | Text for "City" |

-continued

| Element Name | Element Type | Element Type | Purpose |
|---|---|---|---|
| City | Entry Field | City | Entry Field for City. |
| State | Text | State | Text for "State" |
| State | Select Feature | State | Select feature for selecting a state in US. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Fax | Text | Fax | Text for "Fax" |
| Fax | Entry Field | Fax | Entry Field for Fax. |
| Sub Header "Contact Information" | Text | Sub Header "Contact Information" | To give the heading for the sub section |
| Sub Header "Contact-1" | Text | Sub Header "Contact-1" | To give the heading for the sub section |
| Salutation | Text | Salutation | Text for "Salutation" |
| Salutation | Select Feature | Salutation | Select feature for selecting a salutation. |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| Zip | Text | Zip | Text for "Zip" |
| Zip | Entry Field | Zip | Entry Field for Zip. |
| City | Text | City | Text for "City" |
| City | Entry Field | City | Entry Field for City. |
| State | Text | State | Text for "State" |
| State | Select Feature | State | Select feature for selecting a state in US. |
| Phone | Text | Phone | Text for "Phone" |
| Phone | Entry Field | Phone | Entry Field for Phone. |
| Extn. | Text | Extn. | Text for "Extn" |
| Extn | Entry Field | Extn | Entry Field for Extn. |
| Fax | Text | Fax | Text for "Fax" |
| Fax | Entry Field | Fax | Entry Field for Fax. |
| Email | Text | Email | Text for "Email" |
| Email | Entry Field | Email | Entry Field for Email. |
| Sub Header "Contact-2" | Text | Sub Header "Contact-2" | To give the heading for the sub section |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| Zip | Text | Zip | Text for "Zip" |
| Zip | Entry Field | Zip | Entry Field for Zip. |
| City | Text | City | Text for "City" |
| City | Entry Field | City | Entry Field for City. |
| State | Text | State | Text for "State" |
| State | Select Feature | State | Select feature for selecting a state in US. |
| Phone | Text | Phone | Text for "Phone" |
| Phone | Entry Field | Phone | Entry Field for Phone. |
| Extn. | Text | Extn. | Text for "Extn" |
| Extn | Entry Field | Extn | Entry Field for Extn. |
| Fax | Text | Fax | Text for "Fax" |
| Fax | Entry Field | Fax | Entry Field for Fax. |
| Email | Text | Email | Text for "Email" |
| Next | HTML Button | Next | Takes the user to next screen. |
| Cancel | HTML Button | Cancel | Resets the Data to original values |
| Email | Entry Field | Email | Entry Field for Email. |
| Sub Header "Associated Personnel" | Text | Sub Header "Associated Personnel" | To give the heading for the sub section |
| None | Radio | None | Default radio option. |
| Agent | Radio | Agent | Radio for associated agent |

-continued

| Element Name | Element Type | Element Type | Purpose |
|---|---|---|---|
| Agent | Non-Editable Text | Agent | Shows the number of associated agent. |
| Agent-Popup | Image | Agent-Popup | Clicking this will open a new window, using which user can assign agents for this Lead. |
| Agency | Radio | Agency | Radio for associated agency |
| Agency | Non-Editable Text | Agency | Shows the number of associated agency(s). |
| Agency-Popup | Image | Agency-Popup | Clicking this will open a new window, using which user can assign agency(s) for this Lead. |
| Internal Workgroup | Text | Internal Workgroup | Text for “Internal Workgroup” |
| Internal Workgroup | Select Feature | Internal Workgroup | Shows the internal workgroups. User can select a internal workgroup for this lead. |
| BSS Rep | Text | BSS Rep | Text for “BSS Rep” |
| BSS Rep | Select Feature | BSS Rep | Shows the BSS Rep (Associates) for the selected internal workgroup. User can select a BSS Rep for this Lead. |
| Sub Header “Past Plan Details” | Text | Sub Header “Past Plan Details” | To give the heading for the sub section |
| Number of Employees | Text | Number of Employees | Text for “Number of Employees” |
| Number of Employees Entry Field | Entry Field | Number of Employees Entry Field | Entry field for entering the number of employees |
| Plan Type | Text | Plan Type | Text for “Plan Type” |
| Plan Type entry field | Drop Down List | Plan Type entry field | List for selecting the Plan Type used by the company at present-Picks up values based on the plan types defined in the CM Module |
| Current Carrier | Text | Current Carrier | Text for “Current Carrier” |
| Current Carrier Entry field | Drop Down List | Current Carrier Entry field | List for selecting the current carrier-picks up values from the list carriers available in the CM Module |
| Deductible | Text | Deductible | Text for “Deductible” |
| Deductible Entry field | Entry Field | Deductible Entry field | Entry field for entering the Deductible at present |
| Co Pay Amount | Text | Co Pay Amount | Text for “Co Pay Amount” |
| Co Pay Amount Entry field | Entry Field | Co Pay Amount Entry field | Entry field for entering the Co Pay Amount at present |
| Benefit level in network | Text | Benefit level in network | Text for “Benefit Level In Network” |
| Benefit Level in network Entry field | Entry Field | Benefit Level in network Entry field | Entry field for entering the current carrier |
| Benefit Level Out of Network | Text | Benefit Level Out of Network | Text for “Benefit Level Out of Network” |
| Benefit Level Out of Network | Entry Field | Benefit Level Out of Network | Entry field for entering the Benefit level out of network |
| Employer Contribution | Text | Employer Contribution | Text for “Employer Contribution” |
| Employer Contribution Entry Field | Entry Field | Employer Contribution Entry Field | Entry field for entering the employer contribution |
| Approximately Monthly Premium | Text | Approximately Monthly Premium | Text for “Approximately Monthly Premium” |
| Approximately Monthly Premium Entry Field | Entry Field | Approximately Monthly Premium Entry Field | Entry field for entering the Approximately Monthly Premium at present. |
| Renewal Date | Text | Renewal Date | Text for “Renewal Date” |
| Renewal Date | Entry Field | Renewal Date | Entry field for entering Date. |

-continued

| Element Name | Element Type | Element Type | Purpose |
|---|---|---|---|
| Renewal Date Image | Image | Renewal Date Image | User Can click on this image and select the date using calendar window. |
| Sub Header "Other Information" | Text | Sub Header "Other Information" | To give the heading for the sub section |
| Best Time to Call | Text | Best Time to Call | Text for "Best Time to Call" |
| Best Time to Call | Entry field | BestTime to Call | entry field for entering the best time to call. |
| Comments | Text | Comments | Text for "Comments" |
| Comments Entry Field | Entry field | Comments Entry Field | Entry Field for the comments |
| Mode of Communication | Text | Mode of Communication | Text for ""Mode of Communication |
| Mode Of Communication | List | Mode Of Communication | List providing the list of mode of communication —Shall include Email, Fax, USPS |
| Previous | HTML Button | Previous | Takes user to the Previous page. |
| Save | HTML Button | Save | Saves the Data. |
| Cancel | HTML Button | Cancel | Resets the Data to original values |

3.1.2.3. Front End Validations

| Element Name | Action/Validation Details | Error Message Text |
|---|---|---|
| Group Type | Mandatory. | Error Dialog Box on Save "Is Required". |
| Association ID | For Guaranteed Association or Endorsed Association or PEO Association or Chamber Association, Association is Mandatory | Error Dialog Box on Save "Is Required" |
| Member Type | For Guaranteed Association, Member Type is Mandatory | |
| Company Name | Mandatory. Accepts all alphanumeric and Special characters except double quotes. | Error Dialog Box on Save "Accepts all alphanumeric and Special characters except double quotes" |
| Zip | Mandatory. Accepts exactly 5 numeric digits. | Error Dialog Box "Accepts exactly 5 digits number only". |
| Contact1 First Name | Mandatory. Accepts all alphanumeric and Special characters except double quotes. | Error Dialog Box on Save "Accepts all alphanumeric and Special characters except double quotes" |
| Contact1 Zip | Mandatory. Accepts exactly 5 numeric digits. | Error Dialog Box "Accepts exactly 5 digits number only". |
| Internal workgroup | Mandatory. | Error Dialog on Save "Is Required". |

3.1.2.4. Screen Flow

The following are the scenarios the user may come across when operating on the screen:

| Scenario | Description |
|---|---|
| Next | The User can navigate to the next screen (page2). |
| Previous | The User can navigate to the previous screen (page1). |
| Save | The system checks for all the validations for all the mandatory information filled up, the system successfully saves the data. Upon saving the data, shows a Confirmation page to the user. |
| Cancel | The User can have the information reset to the original values |

3.1.3. User Interface ID: Search Lead Master 3.1.3.1. Screen Name: Search Lead Master (BPI_CAS_SM_SCR__002__004)

This screen below captures the information for searching an existing "Lead".

Step 1: Enter the mandatory lead information and click the search button. This page will display the result of search. User can choose a lead and navigate to either "Modify" screen or "View/Delete" screen. (See FIG. M-14)

3.1.3.2. SID, Element Name, Element Type & Purpose

| Element Name | Element Type | Label | Purpose |
|---|---|---|---|
| Main Header "Lead Search" | Text | Main Header "Lead Search" | To give the heading for the screen |
| Lead ID | Text | Lead ID | Text for "Lead ID" |
| Lead ID | Entry Field | Lead ID | Entry field for lead id |
| Lead Type | Text | Lead Type | Text For "Lead ID" |
| Lead Type | Select Feature | Lead Type | Select Feature for selecting the Group Type |
| First Name | Text | First Name | Text For "First Name" |
| First Name | Entry Field | First Name | Entry field for First Name |

-continued

| Element Name | Element Type | Label | Purpose |
|---|---|---|---|
| Last Name | Text | Last Name | Entry field for Last Name |
| Last Name | Entry Field | Last Name | Entry field for Last Name |
| Company | Text | Company | Text For "First "Company" |
| Company | Entry Field | Company | Entry field for Company |
| Phone | Text | Phone | Entry field for "Phone" |
| Phone | Entry Field | Phone | Entry field for Phone |
| Lead Button Radio | Radio Button | Lead Button Radio | Used to select the lead for modifying or viewing/deleting. |
| Modify | HTML Button | Modify | Leads to the modify screen of the selected lead |
| View/Delete | HTML Button | View/Delete | Leads to the view/delete screen of the selected |

3.1.3.3. Front End Validations

| Element Name | Action/Validation Details | Error Message Text |
|---|---|---|
| Lead ID | Mandatory. Any one of the fields in the search screen is mandatory. Accepts Alphanumeric values only | Error Dialog Box on Search "Accepts Alphanumeric values only." |

3.1.3.4. Screen Flow

The following are the scenarios the user may come across when operating on the search screen.

| Scenario | Description |
|---|---|
| Search | The system checks for all the validations for all the mandatory information. Fetches the lead(s) that matches with the search conditions. |
| Cancel | Clears the search fields |

3.1.4. User Interface ID: Modify Lead Master 3.1.4.1. Screen Name: Modify Lead Master (BPI_CAS_SM_SCR__002_005, BPI_CAS_SM_SCR__002__006 & BPI_CAS_SM_SCR__002__007)

This screen below captures the information for modifying lead master.

Step—1: Using search screen (BPI_CAS_SM_SCR__002__004), search the available Lead(s).

Step—2: Select a Lead and click "Modify" to navigate to page1.

Step—3: Modify the lead information and click "Next" to navigate you to page2.

Step—4: Click the "Save" to save the modified lead information.

Step—5: Saving of Lead data takes you to Confirmation page.

Page1 (BPI_CAS_SM_SCR__002__005) (See FIG. M-15)

Page2 (BPI_CAS_SM_SCR__002__006) (See FIG. M-16)

Confirmation Page (BPI_CAS_SM_SCR__002__007) (See FIG. M-17)

3.1.4.2. SID, Element Name, Element Type & Purpose

| Element Name | Element Type | Element Type | Purpose |
|---|---|---|---|
| Lead Type | Text | Lead Type | Text showing "Lead Type" |

-continued

| Element Name | Element Type | Element Type | Purpose |
|---|---|---|---|
| Group Type | Text | Group Type | Text showing "Group Type" |
| Group Type | Select Feature | Group Type | To select "Group Type" |
| Association ID | Text | Association ID | Text showing "Association ID" |
| Association ID | Select Feature | Association ID | To select "Associations", if the Group Type selected is either Guaranteed Association or Endorsed Association or PEO Association or Chamber Association. |
| Member Type | Text | Member Type | Text for "Member Type" |
| Member Type | Radio Button | Member Type | To select either Individual Member or Association Member if Group Type selected is a Guaranteed Association who offers both Individual and Association Member coverage |
| Source Sub Type | Text | Source Sub Type | Text for "Source Sub Type" |
| Source Sub Type Search Field | Non Editable Entry field | Source Sub Type Search Field | Search feature for a source Type Field |
| Sub Header "General Information" | Text | Sub Header "General Information" | To give the heading for the sub section |
| Company | Text | Company | Text for "Company Name". |
| Company | Entry Field | Company | Entry field for company. |
| DBA | Text | DBA | Text for "DBA". |
| DBA | Entry Field | DBA | Entry field for dba. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| City | Text | City | Text for "City" |
| City | Entry Field | City | Entry Field for City. |
| State | Text | State | Text for "State" |
| State | Select Feature | State | Select feature for selecting a state in US. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Fax | Text | Fax | Text for "Fax" |
| Fax | Entry Field | Fax | Entry Field for Fax. |
| Sub Header "Contact Information" | Text | Sub Header "Contact Information" | To give the heading for the sub section |
| Sub Header "Contact-1" | Text | Sub Header "Contact-1" | To give the heading for the sub section |
| Salutation | Text | Salutation | Text for "Salutation" |
| Salutation | Select Feature | Salutation | Select feature for selecting a salutation. |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| Zip | Text | Zip | Text for "Zip" |
| Zip | Entry Field | Zip | Entry Field for Zip. |
| City | Text | City | Text for "City" |
| City | Entry Field | City | Entry Field for City. |
| State | Text | State | Text for "State" |
| State | Select Feature | State | Select feature for selecting a state in US. |

-continued

| Element Name | Element Type | Element Type | Purpose |
|---|---|---|---|
| Phone | Text | Phone | Text for "Phone" |
| Phone | Entry Field | Phone | Entry Field for Phone. |
| Extn. | Text | Extn. | Text for "Extn" |
| Extn | Entry Field | Extn | Entry Field for Extn. |
| Fax | Text | Fax | Text for "Fax" |
| Fax | Entry Field | Fax | Entry Field for Fax. |
| Email | Text | Email | Text for "Email" |
| Email | Entry Field | Email | Entry Field for Email. |
| Sub Header "Contact-2" | Text | Sub Header "Contact-2" | To give the heading for the sub section |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| Zip | Text | Zip | Text for "Zip" |
| Zip | Entry Field | Zip | Entry Field for Zip. |
| City | Text | City | Text for "City" |
| City | Entry Field | City | Entry Field for City. |
| State | Text | State | Text for "State" |
| State | Select Feature | State | Select feature for selecting a state in US. |
| Phone | Text | Phone | Text for "Phone" |
| Phone | Entry Field | Phone | Entry Field for Phone. |
| Extn. | Text | Extn. | Text for "Extn" |
| Extn | Entry Field | Extn | Entry Field for Extn. |
| Fax | Text | Fax | Text for "Fax" |
| Fax | Entry Field | Fax | Entry Field for Fax. |
| Email | Text | Email | Text for "Email" |
| Next | HTML Button | Next | Takes the user to next screen. |
| Cancel | HTML Button | Cancel | Resets the Data to original values |
| Email | Entry Field | Email | Entry Field for Email. |
| Sub Header "Associated Personnel" | Text | Sub Header "Associated Personnel" | To give the heading for the sub section |
| None | Radio | None | Default radio option. |
| Agent | Radio | Agent | Radio for associated agent |
| Agent | Non-Editable Text | Agent | Shows the number of associated agent. |
| Agent-Popup | Image | Agent-Popup | Clicking this will open a new window, using which user can assign agents for this Lead. |
| Agency | Radio | Agency | Radio for associated agency |
| Agency | Non-Editable Text | Agency | Shows the number of associated agency(s). |
| Agency-Popup | Image | Agency-Popup | Clicking this will open a new window, using which user can assign agency(s) for this Lead. |
| Internal Workgroup | Text | Internal Workgroup | Text for "Internal Workgroup" |
| Internal | Select Feature | Internal | Shows the internal workgroups. |
| Workgroup | | Workgroup | User can select a internal workgroup for this lead. |
| BSS Rep | Text | BSS Rep | Text for "BSS Rep" |
| BSS Rep | Select Feature | BSS Rep | Shows the BSS Rep (Associates) for the selected internal workgroup. User can select a BSS Rep for this Lead. |
| Sub Header "Past Plan Details" | Text | Sub Header "Past Plan Details" | To give the heading for the sub section |
| Number of Employees | Text | Number of Employees | Text for "Number of Employees" |
| Number of | Entry Field | Number of | Entry field for entering the |

-continued

| Element Name | Element Type | Element Type | Purpose |
|---|---|---|---|
| Employees Entry Field | | Employees Entry Field | number of employees |
| Plan Type | Text | Plan Type | Text for "Plan Type" |
| Plan Type entry field | Drop Down List | Plan Type entry field | List for selecting the Plan Type used by the company at present- Picks up values based on the plan types defined in the CM Module |
| Current Carrier | Text | Current Carrier | Text for "Current Carrier" |
| Current Carrier Entry field | Drop Down List | Current Carrier Entry field | List for selecting the current carrier- picks up values from the list carriers available in the CM Module |
| Deductible | Text | Deductible | Text for "Deductible" |
| Deductible Entry field | Entry Field | Deductible Entry field | Entry field for entering the Deductible at present |
| Co Pay Amount | Text | Co Pay Amount | Text for "Co Pay Amount" |
| Co Pay Amount Entry field | Entry Field | Co Pay Amount Entry field | Entry field for entering the Co Pay Amount at present |
| Benefit level in network | Text | Benefit level in network | Text for "Benefit Level In Network" |
| Benefit Level in network Entry field | Entry Field | Benefit Level in network Entry field | Entry field for entering the current carrier |
| Benefit Level Out of Network | Text | Benefit Level Out of Network | Text for "Benefit Level Out of Network" |
| Benefit Level Out of Network | Entry Field | Benefit Level Out of Network | Entry field for entering the Benefit level out of network |
| Employer Contribution | Text | Employer Contribution | Text for "Employer Contribution" |
| Employer Contribution Entry Field | Entry Field | Employer Contribution Entry Field | Entry field for entering the employer contribution |
| Approximately Monthly Premium | Text | Approximately Monthly Premium | Text for "Approximately Monthly Premium" |
| Approximately Monthly Premium Entry Field | Entry Field | Approximately Monthly Premium Entry Field | Entry field for entering the Approximately Monthly Premium at present. |
| Renewal Date | Text | Renewal Date | Text for "Renewal Date" |
| Renewal Date | Entry Field | Renewal Date | Entry field for entering Date. |
| Renewal Date Image | Image | Renewal Date Image | User Can click on this image and select the date using calendar window. |
| Sub Header "Other Information" | Text | Sub Header "Other Information" | To give the heading for the sub section |
| Best Time to Call | Text | Best Time to Call | Text for "Best Time to Call" |
| Best Time to Call | Entry field | Best Time to Call | entry field for entering the best time to call. |
| Comments | Text | Comments | Text for "Comments" |
| Comments Entry Field | Entry field | Comments Entry Field | Entry Field for the comments |
| Mode of Communication | Text | Mode of Communication | Text for ""Mode of Communication |
| Mode Of Communication | List | Mode Of Communication | List providing the list of mode of communication —Shall include Email, Fax, USPS |
| Previous | HTML Button | Previous | Takes user to the Previous page. |
| Save | HTML Button | Save | Saves the Data. |
| Cancel | HTML Button | Cancel | Resets the Data to original values |

3.1.4.3. Front End Validations

| Element Name | Action/Validation Details | Error Message Text |
|---|---|---|
| Group Type | Mandatory. | Error Dialog Box on Save "Is Required". |
| Association ID | For Guaranteed Association or Endorsed Association or PEO Association or Chamber Association, Association is Mandatory | Error Dialog Box on Save "Is Required" |
| Member Type | For Guaranteed Association, Member Type is Mandatory | |
| Company Name | Mandatory. Accepts all alphanumeric and Special characters except double quotes. | Error Dialog Box on Save "Accepts all alphanumeric and Special characters except double quotes" |
| Zip | Mandatory. Accepts exactly 5 numeric digits. | Error Dialog Box "Accepts exactly 5 digits number only". |
| Contact1 First Name | Mandatory. Accepts all alphanumeric and Special characters except double quotes. | Error Dialog Box on Save "Accepts all alphanumeric and Special characters except double quotes" |
| Contact1 Zip | Mandatory. Accepts exactly 5 numeric digits. | Error Dialog Box "Accepts exactly 5 digits number only". |
| Internal workgroup | Mandatory. | Error Dialog on Save "Is Required ". |

3.1.4.4. Screen Flow

The following are the scenarios the user may come across when operating on the screen:

| Scenario | Description |
|---|---|
| Next | The User can navigate to the next screen (page2). |
| Previous | The User can navigate to the previous screen (page1). |
| Save | The system checks for all the validations for all the mandatory information filled up, the system successfully saves the data.<br>Upon saving the data, shows a Confirmation page to the user. |
| Cancel | The User can have the information reset to the original values |

3.1.5. User Interface ID: View & Delete Lead Master 3.1.5.1. Screen Name: View & Delete Lead Master (BPI_CAS_SM_SCR__002__008 & BPI_CAS_SM_SCR__002__009)

This screen below captures the information for view/delete lead master.

Step—1: Using search screen (BPI_CAS_SM_SCR__002__004), search the available Lead(s).

Step—2: Select a Lead and click "View/Delete" to navigate to view/delete page.

Step—3: Click the "Delete" to delete the lead information.

Step—4: Deletion of Lead data takes you to Confirmation page.

View/Delete Page (BPI_CAS_SM_SCR__002__08) (See FIG. M-18)

Confirmation Page (BPI_CAS_SM_SCR__002__09) (See FIG. M-19)

DB Admin should only do Delete Lead Master. The "inactivation" of a Lead Master should change the status of Lead as "Dead". The only other case for "Delete" as noted here would be to get rid of erroneous information added to the system; for this we should prompt for specific reasons as to why the Lead is being deleted. Upon deletion, the status of Lead is changed to "2" in DB.

3.1.5.2. SID, Element Name, Element Type & Purpose

| Element Name | Element Type | Label | Purpose |
|---|---|---|---|
| Lead ID | Text | Lead ID | Text showing "Lead ID" |
| Lead ID | Read-only Text | Lead ID | Shows the value of "Lead ID" |
| Sub Header "Master Information" | Text "Master Information" | Sub Header | To give the heading for the sub section |
| Group Type | Text | Group Type | Text showing "Group Type" |
| Group Type | Read-only Text | Group Type | Shows the value of "Group Type" |
| Association Type | Text | Association Type | Text showing "Association ID" |
| Association Type | Read-only Text | Association Type | Shows the value of "Association Type" |
| Member Type | Text | Member Type | Text for "Member Type" |
| Member Type | Read-only Text | Member Type | Shows the value of "Member Type" |
| Source Sub Type | Text | Source Type | Sub Text for "Source Sub Type" |
| Source Sub Type Search Field | Read-only Text | Source Sub Type Search Field | Shows the value of "Source sub type" |
| Sub Header "General Information" | Text | Sub Header "General Information" | To give the heading for the sub section |
| Company | Text | Company | Text for "Company Name". |
| Company | Read-only Text | Company | Shows the value of company. |
| DBA | Text | DBA | Text for "DBA". |
| DBA | Read-only Text | DBA | Shows the value of dba. |
| Street Address | Text | Street Address | Text for "Street Address". |
| Street Address | Read-only Text | Street Address | Shows the value of street address. |
| Suite | Text | Suite | Text for "Suite" |
| Suite | Read-only Text | Suite | Shows the value of Suite. |
| City | Text | City | Text for "City" |
| City | Read-only Text | City | Shows the value of City. |
| State | Text | State | Text for "State" |
| State | Read-only Text | State | Shows the value of state |
| Zip | Text | Zip | Text for "Zip" |
| Zip | Read-only Text | Zip | Shows the value for Zip. |
| Phone | Text | Phone | Text for "Phone" |
| Phone | Read-only Text | Phone | Shows the value for Phone. |
| Fax | Text | Fax | Text for "Fax" |
| Fax | Read-only Text | Fax | Shows the value for Fax. |
| Sub Header "Contact Information" | Text | Sub Header "Contact Information" | To give the heading for the sub section |
| Sub Header "Contact-1" | Text | Sub Header "Contact-1" | To give the heading for the sub section |
| Salutation | Text | Salutation | Text for "Salutation" |
| Salutation | Read-only Text | Salutation | Shows the value for salutation. |
| First Name | Text | First Name | Text for "First Name" |
| First Name | Read-only Text | First Name | Shows the value for First Name. |
| MI | Text | MI | Text for "MI" |
| MI | Read-only Text | MI | Shows the value for MI. |
| Last Name | Text | Last Name | Text for "Last Name" |
| Last Name | Read-only Text | Last Name | Shows the value for Last Name. |
| Street Address | Text | Street Address | Text for "Street Address". |
| Street Address | Read-only Text | Street Address | Shows the value for street address. |
| Suite | Text | Suite | Text for "Suite" |

-continued

| Element Name | Element Type | Label | Purpose |
|---|---|---|---|
| Suite | Read-only Text | Suite | Shows the value for Suite. |
| Zip | Text | Zip | Text for "Zip" |
| Zip | Read-only Text | Zip | Shows the value for Zip. |
| City | Text | City | Text for "City" |
| City | Read-only Text | City | Shows the value for City. |
| State | Text | State | Text for "State" |
| State | Read-only Text | State | Shows the value for state |
| Phone | Text | Phone | Text for "Phone" |
| Phone | Read-only Text | Phone | Shows the value for Phone. |
| Extn. | Text | Extn. | Text for "Extn" |
| Extn | Read-only Text | Extn | Shows the value for Extn. |
| Fax | Text | Fax | Text for "Fax" |
| Fax | Read-only Text | Fax | Shows the value for Fax. |
| Email | Text | Email | Text for "Email" |
| Email | Read-only Text | Email | Shows the value for Email. |
| Sub Header "Contact-2" | Text | Sub Header "Contact-2" | To give the heading for the sub section |
| First Name | Text | First Name | Text for "First Name" |
| First Name | Read-only Text | First Name | Shows the value for First Name. |
| MI | Text | MI | Text for "MI" |
| MI | Read-only Text | MI | Shows the value for MI. |
| Last Name | Text | Last Name | Text for "Last Name" |
| Last Name | Read-only Text | Last Name | Shows the value for Last Name. |
| Street Address | Text | Street Address | Text for "Street Address". |
| Street Address | Read-only Text | Street Address | Shows the value for street address. |
| Suite | Text | Suite | Text for "Suite" |
| Suite | Read-only Text | Suite | Shows the value for Suite. |
| Zip | Text | Zip | Text for "Zip" |
| Zip | Read-only Text | Zip | Shows the value for Zip. |
| City | Text | City | Text for "City" |
| City | Read-only Text | City | Shows the value for City. |
| State | Text | State | Text for "State" |
| State | Read-only Text | State | Shows the value for State. |
| Phone | Text | Phone | Text for "Phone" |
| Phone | Read-only Text | Phone | Shows the value for Phone. |
| Extn. | Text | Extn. | Text for "Extn" |
| Extn | Read-only Text | Extn | Shows the value for Extn. |
| Fax | Text | Fax | Text for "Fax" |
| Fax | Read-only Text | Fax | Shows the value for Fax. |
| Email | Text | Email | Text for "Email" |
| Email | Read-only Text | Email | Shows the value for Email. |
| Sub Header "Associated Personnel" | Text | Sub Header "Associated Personnel" | To give the heading for the sub section |
| Agent | Text | Agent | Text for "Agent" |
| Agent | Read-only Text | Agent | Shows the number of associated agent. |
| Agency | Text | Agency | Text for "Agency" |
| Agency | Read-only Text | Agency | Shows the number of associated agency(s). |
| Internal Workgroup | Text | Internal Workgroup | Text for "Internal Workgroup" |
| Internal Workgroup | Read-only Text | Internal Workgroup | Shows the value for internal workgroups. |
| BSS Rep | Text | BSS Rep | Text for "BSS Rep" |
| BSS Rep | Read-only Text | BSS Rep | Shows the value for BSS Rep (Associates). |

-continued

| Element Name | Element Type | Label | Purpose |
|---|---|---|---|
| Sub Header "Past Plan Details" | Text | Sub Header "Past Plan Details" | To give the heading for the sub section |
| Number of Employees | Text | Number of Employees | Text for "Number of Employees" |
| Number of Employees Entry Field | Read-only Text | Number of Employees Entry Field | Shows the value for number of employees |
| Plan Type | Text | Plan Type | Text for "Plan Type" |
| Plan Type entry field | Read-only Text | Plan Type entry field | Shows the value for Plan Type. |
| Current Carrier | Text | Current Carrier | Text for "Current Carrier" |
| Current Carrier Entry field | Read-only Text | Current Carrier Entry field | Shows the value for current carrier |
| Deductible | Text | Deductible | Text for "Deductible" |
| Deductible Entry field | Read-only Text | Deductible Entry field | Shows the value for Deductible at present |
| Co Pay Amount | Text | Co Pay Amount | Text for "Co Pay Amount" |
| Co Pay Amount Entry field | Read-only Text | Co Pay Amount Entry field | Shows the value for Co Pay Amount at present |
| Benefit level in network | Text | Benefit level in network | Text for "Benefit Level In Network" |
| Benefit Level in network Entry field | Read-only Text | Benefit Level in network Entry field | Shows the value for current carrier |
| Benefit Level Out of Network | Text | Benefit Level Out of Network | Text for "Benefit Level Out of Network" |
| Benefit Level Out of Network | Read-only Text | Benefit Level Out of Network | Shows the value for Benefit level out of network |
| Employer Contribution | Text | Employer Contribution | Text for "Employer Contribution" |
| Employer Contribution Entry Field | Read-only Text | Employer Contribution Entry Field | Shows the value for employer contribution |
| Approximately Monthly Premium | Text | Approximately Monthly Premium | Text for "Approximately Monthly Premium" |
| Approximately Monthly Premium Entry Field | Read-only Text | Approximately Monthly Premium Entry Field | Shows the value for Monthly Premium at present. |
| Renewal Date | Text | Renewal Date | Text for "Renewal Date" |
| Renewal Date | Read-only Text | Renewal Date | Shows the value for Renewal Date. |
| Sub Header "Other Information" | Text | Sub Header "Other Information" | To give the heading for the sub section |
| Best Time to Call | Text | Best Time to Call | Text for"Best Time to Call" |
| Best Time to Call | Read-only Text | Best Time to Call | Shows the value for the best time to call. |
| Comments | Text | Comments | Text for "Comments" |
| Comments Entry Field | Read-only Text | Comments Entry Field | Shows the value for comments |
| Mode of Communication | Text | Mode of Communication | Text for—Mode of Communication |
| Mode Of Communication | Read-only Text | Mode Of Communication | Shows the value for mode of communication |
| New Lead | HTML Button | New Lead | Takes the user to "Create Lead Master" screen |
| Delete | HTML Button | Delete | Deletes the Lead Master in database. |

3.1.5.3. Front End Validations

None 3.1.5.4. Screen Flow

The following are the scenarios the user may come across when operating on the step2 screen.

| Scenario | Description |
|---|---|
| New Lead | Used to Navigate to "Create Lead Master" screen. |
| Delete | Inactivates (Delete) the Record. |

3.1.6. User Interface ID: Create Agent Master 3.1.6.1. Screen Name: Create Agent Master (BPI_CAS_SM_SCR__002__010, BPI_CAS_SM_SCR__002__011 & BPI_CAS_SM_SCR__002__012)

This screen below captures the information for creating agent master.

Step—1: Fill the mandatory information in page1. Click "Next" to navigate to page2.

Step—2: Fill the mandatory information in page2 and click "Save" to save the Agent Master data.

Step—3: Saving of Agent data takes you to Confirmation page.

Page1 (BPI_CAS_SM_SCR__002__010) (See FIG. M-20)

Page2 (BPI_CAS_SM_SCR__002__011) (See FIG. M-21)

Confirmation page (BPI_CAS_SM_SCR__002__012) (See FIG. M-22)

| Element Name | Element Type | Label | Purpose |
|---|---|---|---|
| Sub Header "Agent Information" | Text | Sub Header "Agent Information" | To give the heading for the sub section |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Company Name | Text | Company Name | Text for "Company Name". |
| Company Name | Entry Field | Company Name | Entry field for company. |
| DBA | Text | DBA | Text for "DBA". |
| DBA | Entry Field | DBA | Entry field for dba. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| City | Text | City | Text for "City" |
| City | Entry Field | City | Entry Field for City. |
| State | Text | State | Text for "State" |
| State | Select Feature | State | Select feature for selecting a state in U.S. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Extn. | Text | Extn. | Text for "Extn." |
| Extn. | Entry Field | Extn. | Entry Field for Extn. |
| Fax | Text | Fax | Text for "Fax" |
| Fax | Entry Field | Fax | Entry Field for Fax. |
| Mode of communication | Text | Mode of communication | Text for "Mode of Communication" |
| Mode of Communication | Entry Field | Mode of Communication | Entry Field for Mode of Communication. |
| Gender | Text | Gender | Text for "Gender" |
| Gender | Select Feature | Gender | Select feature for gender. |
| Email | Text | Email | Text for Email. |
| Email | Entry Field | Email | Entry Field for "Email" |
| Date of Birth | Text | Date of Birth | Text for Email. |
| Date of Birth | Entry Field | Date of Birth | Entry Field for Date of Birth. |
| Sub Header "Contact Information" | Text | Sub Header "Contact Information" | To give the heading for the sub section |
| Sub Header "Contact - 1" | Text | Sub Header "Contact - 1" | To give the heading for the sub section |
| Salutation | Text | Salutation | Text for "Salutation" |
| Salutation | Select Feature | Salutation | Select feature for selecting a salutation. |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| City | Text | City | Text for "City" |
| City | Entry Field | City | Entry Field for City. |
| State | Text | State | Text for "State" |
| State | Select Feature | State | Select feature for selecting a state in U.S. |
| Zip | Text | Zip | Text for "Zip" |

-continued

| Element Name | Element Type | Label | Purpose |
|---|---|---|---|
| Zip | Entry Field | Zip | Entry Field for Zip. |
| Phone | Text | Phone | Text for “Phone” |
| Phone | Entry Field | Phone | Entry Field for Phone. |
| Extn. | Text | Extn. | Text for “Extn.” |
| Extn. | Entry Field | Extn. | Entry Field for Extn. |
| Fax | Text | Fax | Text for “Fax” |
| Fax | Entry Field | Fax | Entry Field for Fax. |
| Email | Text | Email | Text for Email. |
| Email | Entry Field | Email | Entry Field for “Email” |
| Sub Header “Contact - 2” | Text | Sub Header “Contact - 2” | To give the heading for the sub section |
| Salutation | Text | Salutation | Text for “Salutation” |
| Salutation | Select Feature | Salutation | Select feature for selecting a salutation. |
| First Name | Text | First Name | Text for “First Name” |
| First Name | Entry Field | First Name | Entry Field for First Name. |
| MI | Text | MI | Text for “MI” |
| MI | Entry Field | MI | Entry Field for MI. |
| Last Name | Text | Last Name | Text for “Last Name” |
| Last Name | Entry Field | Last Name | Entry Field for Last Name. |
| Street Address | Text | Street Address | Text for “Street Address”. |
| Street Address | Entry Field | Street Address | Entry field for street address. |
| Suite | Text | Suite | Text for “Suite” |
| Suite | Entry Field | Suite | Entry Field for Suite. |
| City | Text | City | Text for “City” |
| City | Entry Field | City | Entry Field for City. |
| State | Text | State | Text for “State” |
| State | Select Feature | State | Select feature for selecting a state in U.S. |
| Zip | Text | Zip | Text for “Zip” |
| Zip | Entry Field | Zip | Entry Field for Zip. |
| Phone | Text | Phone | Text for “Phone” |
| Phone | Entry Field | Phone | Entry Field for Phone. |
| Extn. | Text | Extn. | Text for “Extn.” |
| Extn. | Entry Field | Extn. | Entry Field for Extn. |
| Fax | Text | Fax | Text for “Fax” |
| Fax | Entry Field | Fax | Entry Field for Fax. |
| Email | Text | Email | Text for Email. |
| Email | Entry Field | Email | Entry Field for “Email” |
| Next | HTML Button | Next | Takes user to the Next page. |
| Cancel | HTML Button | Cancel | Resets the Data to original values |
| Broker Type | Text | Broker Type | Text for “Broker Type” |
| Broker Type | Radio Buttons | Broker Type | Statewide, Regional and Unknown (default) |
| Sub Header “Additional Preferences” | | Sub Header “Additional Preferences” | |
| Exclude from Broadcast Messaging | Check box | Exclude from Broadcast Messaging | If checked then Yes. |
| Exclude from overdue premium notices | Check box | Exclude from overdue premium notices | If checked then yes. |
| Exclude from Employee/ Member Term Letters | Check box | Exclude from Employee/ Member Term Letters | If checked then Yes |
| Exclude from Employee/ Member Add-on Term Letters | Check Box | Exclude from Employee/ Member Add-on Term Letters | If checked then Yes |
| Sub Header “Associated Personnel” | Text | Sub Header “Associated Personnel” | To give the heading for the sub section |
| Agent Workgroup | Text | Agent Workgroup | Text for “Agent Workgroup” |
| Agent | Non-Editable Text | Agent | Shows the number of associated agent. |
| Agent-Popup | Image | Agent-Popup | Clicking this will open a new window, using which user can assign agents for this Lead. |
| Agency Workgroup | Text | Agency Workgroup | Text for “Agency Workgroup” |
| Agency | Non-Editable Text | Agency | Shows the number of associated agency(s). |
| Agency-Popup | Image | Agency-Popup | Clicking this will open a new window, using which user can assign agency(s) for this Lead. |
| Internal Workgroup | Text | Internal Workgroup | Text for “Internal Workgroup” |
| Internal | Select Feature | Internal | Shows the internal workgroups. User can |

-continued

| Element Name | Element Type | Label | Purpose |
|---|---|---|---|
| Workgroup | | Workgroup | select a internal workgroup for this lead. |
| BSS Rep | Text | BSS Rep | Text for "BSS Rep" |
| BSS Rep | Select Feature | BSS Rep | Shows the BSS Rep (Associates) for the selected internal workgroup. User can select a BSS Rep for this Lead. |
| Sub Header "License Information" | Text | Sub Header "License Information" | Text for License Information |
| Tax ID/SSN | Text | Tax ID/SSN | Text For "Tax ID/SSN" |
| TaxID/SSN Entry Field | Entry field | TaxID/SSN Entry Field | Entry field for entering the TAX ID/SSN |
| License Number | Text | License Number | Text for "License Number" |
| License Expiration | Calendar | License Expiration | Calendar |
| E&O Number | Text | E&O Number | Text for "E&O" |
| E&O Number | Entry Field | E&O Number | Entry field for E&O Number |
| E&O Expiration | Text | E&O Expiration | Text for "E&O Expiration List" |
| E&O Expiration | Editable text/Calendar | E&O Expiration | Calendar for E&O expiration calendar |
| Sub Header "Bank Information" | Text | Sub Header "Bank Information" | To give the heading for the subsection |
| Preferred Mode of Payment | Text | Preferred Mode of Payment | Text for "Preferred Mode of Payment" |
| Preferred Mode of Payment | Radio Button | Preferred Mode of Payment | Check or ACH |
| Bank Name | Text | Bank Name | Text for Bank Name |
| Bank Name | Entry Field | Bank Name | Entry field for Bank Name |
| Account Number | Text | Account Number | Text for Account Number |
| Account Number | Entry field | Account Number | Entry Field For Account Number |
| Routing Number | Text | Routing Number | Text for Routing Number |
| Routing Number | Entry field | Routing Number | Entry Field for Routing Number |
| Account Type | Text | Account Type | Text for Account Type |
| Account Type | Select feature | Account Type | Select feature to select the type of account |
| Name on the Account | Text | Name on the Account | Text for "Name on the account" |
| Name on the Account | Entry Field | Name on the Account | Entry field for "Name on the Account" |
| Payee Name | Text | Payee Name | Text for Payee Name |
| Payee Name | Entry field | Payee Name | Entry Field for Payee Name |
| Requires Special Handling | Check Box | Requires Special Handling | Check box for "requires special handling" if checked - means Yes |
| Previous | HTML Button | Previous | Takes user to the Previous page. |
| Save | HTML Button | Save | Saves the Data. |
| Cancel | HTML Button | Cancel | Resets the Data to original values |

3.1.6.2. SID, Element Name, Element Type & Purpose

| Element Name | Element Type | Label | Purpose |
|---|---|---|---|
| Sub Header "Agent Information" | Text | Sub Header "Agent Information" | To give the heading for the sub section |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Company Name | Text | Company Name | Text for "Company Name". |
| Company Name | Entry Field | Company Name | Entry field for company. |
| DBA | Text | DBA | Text for "DBA". |
| DBA | Entry Field | DBA | Entry field for dba. |
| Street Address | Text | Street Address | Text for "Street Address". |
| Street Address | Entry Field | Street Address | Entry field for street address. |

-continued

| Element Name | Element Type | Label | Purpose |
|---|---|---|---|
| Suite | Text | Suite | Text for "Suite" |
| Suite | Entry Field | Suite | Entry Field for Suite. |
| City | Text | City | Text for "City" |
| City | Entry Field | City | Entry Field for City. |
| State | Text | State | Text for "State" |
| State | Select Feature | State | Select feature for selecting a state in U.S. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Extn. | Text | Extn. | Text for "Extn." |
| Extn. | Entry Field | Extn. | Entry Field for Extn. |
| Fax | Text | Fax | Text for "Fax" |
| Fax | Entry Field | Fax | Entry Field for Fax. |
| Mode of communication | Text | Mode of communication | Text for "Mode of Communication" |
| Mode of Communication | Entry Field | Mode of Communication | Entry Field for Mode of Communication. |
| Gender | Text | Gender | Text for "Gender" |
| Gender | Select Feature | Gender | Select feature for gender. |
| Email | Text | Email | Text for Email. |
| Email | Entry Field | Email | Entry Field for "Email" |
| Date of Birth | Text | Date of Birth | Text for Email. |
| Date of Birth | Entry Field | Date of Birth | Entry Field for Date of Birth. |
| Sub Header "Contact Information" | Text | Sub Header "Contact Information" | To give the heading for the sub section |
| Sub Header "Contact - 1" | Text | Sub Header "Contact - 1" | To give the heading for the sub section |
| Salutation | Text | Salutation | Text for "Salutation" |
| Salutation | Select Feature | Salutation | Select feature for selecting a salutation. |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| City | Text | City | Text for "City" |
| City | Entry Field | City | Entry Field for City. |
| State | Text | State | Text for "State" |
| State | Select Feature | State | Select feature for selecting a state in U.S. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Extn. | Text | Extn. | Text for "Extn." |
| Extn. | Entry Field | Extn. | Entry Field for Extn. |
| Fax | Text | Fax | Text for "Fax" |
| Fax | Entry Field | Fax | Entry Field for Fax. |
| Email | Text | Email | Text for Email. |
| Email | Entry Field | Email | Entry Field for "Email" |
| Sub Header "Contact - 2" | Text | Sub Header "Contact - 2" | To give the heading for the sub section |
| Salutation | Text | Salutation | Text for "Salutation" |
| Salutation | Select Feature | Salutation | Select feature for selecting a salutation. |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| City | Text | City | Text for "City" |
| City | Entry Field | City | Entry Field for City. |
| State | Text | State | Text for "State" |
| State | Select Feature | State | Select feature for selecting a state in U.S. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Extn. | Text | Extn. | Text for "Extn." |

-continued

| Element Name | Element Type | Label | Purpose |
|---|---|---|---|
| Extn. | Entry Field | Extn. | Entry Field for Extn. |
| Fax | Text | Fax | Text for "Fax" |
| Fax | Entry Field | Fax | Entry Field for Fax. |
| Email | Text | Email | Text for Email. |
| Email | Entry Field | Email | Entry Field for "Email" |
| Next | HTML Button | Next | Takes user to the Next page. |
| Cancel | HTML Button | Cancel | Resets the Data to original values |
| Broker Type | Text | Broker Type | Text for "Broker Type" |
| Broker Type | Radio Buttons | Broker Type | Statewide, Regional and Unknown (default) |
| Sub Header "Additional Preferences" | | Sub Header "Additional Preferences" | |
| Exclude from Broadcast Messaging | Check box | Exclude from Broadcast Messaging | If checked then Yes. |
| Exclude from overdue premium notices | Check box | Exclude from overdue premium notices | If checked then yes. |
| Exclude from Employee/ Member Term Letters | Check box | Exclude from Employee/ Member Term Letters | If checked then Yes |
| Exclude from Employee/ Member Add-on Term Letters | Check Box | Exclude from Employee/ Member Add-on Term Letters | If checked then Yes |
| Sub Header "Associated Personnel" | Text | Sub Header "Associated Personnel" | To give the heading for the sub section |
| Agent Workgroup | Text | Agent Workgroup | Text for "Agent Workgroup" |
| Agent | Non-Editable Text | Agent | Shows the number of associated agent. |
| Agent-Popup | Image | Agent-Popup | Clicking this will open a new window, using which user can assign agents for this Lead. |
| Agency Workgroup | Text | Agency Workgroup | Text for "Agency Workgroup" |
| Agency | Non-Editable Text | Agency | Shows the number of associated agency(s). |
| Agency-Popup | Image | Agency-Popup | Clicking this will open a new window, using which user can assign agency(s) for this Lead. |
| Internal Workgroup | Text | Internal Workgroup | Text for "Internal Workgroup" |
| Internal Workgroup | Select Feature | Internal Workgroup | Shows the internal workgroups. User can select a internal workgroup for this lead. |
| BSS Rep | Text | BSS Rep | Text for "BSS Rep" |
| BSS Rep | Select Feature | BSS Rep | Shows the BSS Rep (Associates) for the selected internal workgroup. User can select a BSS Rep for this Lead. |
| Sub Header "License Information" | Text | Sub Header "License Information" | Text for License Information |
| Tax ID/SSN | Text | Tax ID/SSN | Text For "Tax ID/SSN" |
| TaxID/SSN Entry Field | Entry field | TaxID/SSN Entry Field | Entry field for entering the TAX ID/SSN |
| License Number | Text | License Number | Text for "License Number" |
| License Expiration | Calendar | License Expiration | Calendar |
| E&O Number | Text | E&O Number | Text for "E&O" |
| E&O Number | Entry Field | E&O Number | Entry field for E&O Number |
| E&O Expiration | Text | E&O Expiration | Text for "E&O Expiration List" |
| E&O Expiration | Editable text/Calendar | E&O Expiration | Calendar for E&O expiration calendar |
| Sub Header "Bank Information" | Text | Sub Header "Bank Information" | To give the heading for the subsection |
| Preferred Mode of Payment | Text | Preferred Mode of Payment | Text for "Preferred Mode of Payment" |
| Preferred Mode of Payment | Radio Button | Preferred Mode of Payment | Check or ACH |
| Bank Name | Text | Bank Name | Text for Bank Name |
| Bank Name | Entry Field | Bank Name | Entry field for Bank Name |
| Account Number | Text | Account Number | Text for Account Number |

-continued

| Element Name | Element Type | Label | Purpose |
|---|---|---|---|
| Account Number | Entry field | Account Number | Entry Field For Account Number |
| Routing Number | Text | Routing Number | Text for Routing Number |
| Routing Number | Entry field | Routing Number | Entry Field for Routing Number |
| Account Type | Text | Account Type | Text for Account Type |
| Account Type | Select feature | Account Type | Select feature to select the type of account |
| Name on the Account | Text | Name on the Account | Text for "Name on the account" |
| Name on the Account | Entry Field | Name on the Account | Entry field for "Name on the Account" |
| Payee Name | Text | Payee Name | Text for Payee Name |
| Payee Name | Entry field | Payee Name | Entry Field for Payee Name |
| Requires Special Handling | Check Box | Requires Special Handling | Check box for "requires special handling" if checked - means Yes |
| Previous | HTML Button | Previous | Takes user to the Previous page. |
| Save | HTML Button | Save | Saves the Data. |
| Cancel | HTML Button | Cancel | Resets the Data to original values |

3.1.6.3. Front End Validations

| Element Name | Action/Validation Details | Error Message Text |
|---|---|---|
| First Name | Mandatory. Accepts all alphanumeric and Special characters except double quotes. | Error Dialog Box on Save "Accepts all alphanumeric and Special characters except double quotes". |
| Last Name | Mandatory. Accepts all alphanumeric and Special characters except double quotes. | Error Dialog Box on Save "Accepts all alphanumeric and Special characters except double quotes". |
| Company Name | Mandatory. Accepts all alphanumeric and Special characters except double quotes. | Error Dialog Box on Save "Accepts all alphanumeric and Special characters except double quotes" |
| Zip | Mandatory. Accepts exactly 5 numeric digits. | Error Dialog Box "Accepts exactly 5 digits number only". |
| Contact1 First Name | Mandatory. Accepts all alphanumeric and Special characters except double quotes. | Error Dialog Box on Save "Accepts all alphanumeric and Special characters except double quotes" |
| Contact1 Last Name | Mandatory. Accepts all alphanumeric and Special characters except double quotes. | Error Dialog Box on Save "Accepts all alphanumeric and Special characters except double quotes" |
| Contact1 Zip | Mandatory. Accepts exactly 5 numeric digits. | Error Dialog Box "Accepts exactly 5 digits number only". |
| Internal workgroup | Mandatory. | Error Dialog on Save "Is Required". |

3.1.6.4. Screen Flow

The user enters the information on the agent master

The following are the scenarios the user may come across when operating on the screen

| Scenario | Description |
|---|---|
| Save | Saves the agent data and shows the user confirmation page. |
| Next | Navigates to the page2. |
| Previous | Navigates to the page1. |
| Cancel | Resets the information |

3.1.7. User Interface ID: Search Agent Master 3.1.7.1. Screen Name: Search Agent Master (BPI_CAS_SM_SCR__002__013)

This screen below captures the information for searching an existing "Agent".

Step—1: Enter the mandatory agent information and click the search button. This page will display the result of search. User can choose a agent and navigate to either "Modify" screen or "View/Delete" screen. (See FIG. M-23)

3.1.7.2. SID, Element Name, Element Type & Purpose

| Element Name | Type Element | Label | Purpose |
|---|---|---|---|
| Main Header "Agent Search" | Text | Main Header "Agent Search" | To give the heading for the screen |

-continued

| Element Name | Type Element | Label | Purpose |
|---|---|---|---|
| Agent ID | Text | Agent ID | Text For "Agent ID" |
| Agent ID | Entry Field | Agent ID | Entry field for agent id |
| First Name | Text | First Name | Text For "First Name" |
| First Name | Entry Field | First Name | Entry field for First Name |
| Last Name | Text | Last Name | Text for Last Name |
| Last Name | Entry Field | Last Name | Entry field for Last Name |
| Company | Text | Company | Text For "First "Company" |
| Company | Entry Field | Company | Entry field for Company |
| Phone | Text | Phone | Text for "Phone" |
| Phone | Entry Field | Phone | Entry field for Phone |
| Tax ID | Text | Tax ID | Text For "Tax ID" |
| Tax ID | Select Feature | Tax ID | Entry field for Tax |
| Agent Button Radio | Radio Button | Agent Button Radio | Used to select the agent for modifying or viewing/deleting. |
| Modify | HTML Button | Modify | Agents to the modify screen of the selected agent |
| View/Delete | HTML Button | View/Delete | Agents to the view/delete screen of the selected |

3.1.7.3. Front End Validations

| Element Name | Action/Validation Details | Error Message Text |
|---|---|---|
| Agent ID | Mandatory. Any one of the fields in the search screen is mandatory. Accepts Alphanumeric values only | Error Dialog Box on Search "Accepts Alphanumeric values only." |

3.1.7.4. Screen Flow

The following are the scenarios the user may come across when operating on the search screen.

| Scenario | Description |
|---|---|
| Search | The system checks for all the validations for all the mandatory information. Fetches the agent(s) that matches with the search conditions. |
| Cancel | Clears the search fields |

3.1.8. User Interface ID: Modify Agent Master 3.1.8.1. Screen Name: Modify Agent Master (BPI_CAS_SM_SCR__002__014, BPI_CAS_SM_SCR__002__015 & BPI_CAS_SM_SCR__002__016)

This screen below captures the information for modifying agent master.

Step—1: Using search screen (BPI_CAS_SM_SCR__002__013), search the available Agent(s).

Step—2: Select a Agent and click "Modify" to navigate to page1.

Step—3: Modify the Agent information and click "Next" to navigate you to page2.

Step—4: Click the "Save" to save the modified agent information.

Step—5: Saving of Agent data takes you to Confirmation page.

Page1 (BPI_CAS_SM_SCR__002__014) (See FIG. M-24)

Page2 (BPI_CAS_SM_SCR__002__015) (See FIG. M-25)

Confirmation Page (BPI_CAS_SM_SCR__002__016) (See FIG. M-26)

3.1.8.2. SID, Element Name, Element Type & Purpose

| Element Name | Element Type | Label | Purpose |
|---|---|---|---|
| Sub Header "Agent Information" | Text | Sub Header "Agent Information" | To give the heading for the sub section |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Company Name | Text | Company Name | Text for "Company Name". |
| Company Name | Entry Field | Company Name | Entry field for company. |
| DBA | Text | DBA | Text for "DBA". |
| DBA | Entry Field | DBA | Entry field for dba. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| City | Text | City | Text for "City" |
| City | Entry Field | City | Entry Field for City. |
| State | Text | State | Text for "State" |
| State | Select Feature | State | Select feature for selecting a state in U.S. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Extn. | Text | Extn. | Text for "Extn." |
| Extn. | Entry Field | Extn. | Entry Field for Extn. |
| Fax | Text | Fax | Text for "Fax" |
| Fax | Entry Field | Fax | Entry Field for Fax. |
| Mode of communication | Text | Mode of communication | Text for "Mode of Communication" |
| Mode of Communication | Entry Field | Mode of Communication | Entry Field for Mode of Communication. |
| Gender | Text | Gender | Text for "Gender" |

-continued

| Element Name | Element Type | Label | Purpose |
|---|---|---|---|
| Gender | Select Feature | Gender | Select feature for gender. |
| Email | Text | Email | Text for Email. |
| Email | Entry Field | Email | Entry Field for "Email" |
| Date of Birth | Text | Date of Birth | Text for Email. |
| Date of Birth | Entry Field | Date of Birth | Entry Field for Date of Birth. |
| Sub Header "Contact Information" | Text | Sub Header "Contact Information" | To give the heading for the sub section |
| Sub Header "Contact - 1" | Text | Sub Header "Contact - 1" | To give the heading for the sub section |
| Salutation | Text | Salutation | Text for "Salutation" |
| Salutation | Select Feature | Salutation | Select feature for selecting a salutation. |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| City | Text | City | Text for "City" |
| City | Entry Field | City | Entry Field for City. |
| State | Text | State | Text for "State" |
| State | Select Feature | State | Select feature for selecting a state in U.S. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Extn. | Text | Extn. | Text for "Extn." |
| Extn. | Entry Field | Extn. | Entry Field for Extn. |
| Fax | Text | Fax | Text for "Fax" |
| Fax | Entry Field | Fax | Entry Field for Fax. |
| Email | Text | Email | Text for Email. |
| Email | Entry Field | Email | Entry Field for "Email" |
| Sub Header "Contact - 2" | Text | Sub Header "Contact - 2" | To give the heading for the sub section |
| Salutation | Text | Salutation | Text for "Salutation" |
| Salutation | Select Feature | Salutation | Select feature for selecting a salutation. |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| City | Text | City | Text for "City" |
| City | Entry Field | City | Entry Field for City. |
| State | Text | State | Text for "State" |
| State | Select Feature | State | Select feature for selecting a state in U.S. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Extn. | Text | Extn. | Text for "Extn." |
| Extn. | Entry Field | Extn. | Entry Field for Extn. |
| Fax | Text | Fax | Text for "Fax" |
| Fax | Entry Field | Fax | Entry Field for Fax. |
| Email | Text | Email | Text for Email. |
| Email | Entry Field | Email | Entry Field for "Email" |
| Next | HTML Button | Next | Takes user to the Next page. |
| Cancel | HTML Button | Cancel | Resets the Data to original values |
| Broker Type | Text | Broker Type | Text for "Broker Type" |
| Broker Type | Radio Buttons | Broker Type | Statewide, Regional and Unknown (default) |
| Sub Header "Additional Preferences" | | Sub Header "Additional Preferences" | |
| Exclude from Broadcast Messaging | Check box | Exclude from Broadcast Messaging | If checked then Yes. |
| Exclude from overdue premium notices | Check box | Exclude from overdue premium notices | If checked then yes. |

-continued

| Element Name | Element Type | Label | Purpose |
|---|---|---|---|
| Exclude from Employee/ Member Term Letters | Check box | Exclude from Employee/ Member Term Letters | If checked then Yes |
| Exclude from Employee/ Member Add-on Term Letters | Check Box | Exclude from Employee/ Member Add-on Term Letters | If checked then Yes |
| Sub Header "Associated Personnel" | Text | Sub Header "Associated Personnel" | To give the heading for the sub section |
| Agent Workgroup | Text | Agent Workgroup | Text for "Agent Workgroup" |
| Agent | Non-Editable Text | Agent | Shows the number of associated agent. |
| Agent-Popup | Image | Agent-Popup | Clicking this will open a new window, using which user can assign agents for this Lead. |
| Agency Workgroup | Text | Agency Workgroup | Text for "Agency Workgroup" |
| Agency | Non-Editable Text | Agency | Shows the number of associated agency(s). |
| Agency-Popup | Image | Agency-Popup | Clicking this will open a new window, using which user can assign agency(s) for this Lead. |
| Internal Workgroup | Text | Internal Workgroup | Text for "Internal Workgroup" |
| Internal Workgroup | Select Feature | Internal Workgroup | Shows the internal workgroups. User can select a internal workgroup for this lead. |
| BSS Rep | Text | BSS Rep | Text for "BSS Rep" |
| BSS Rep | Select Feature | BSS Rep | Shows the BSS Rep (Associates) for the selected internal workgroup. User can select a BSS Rep for this Lead. |
| Sub Header "License Information" | Text | Sub Header "License Information" | Text for License Information |
| Tax ID/SSN | Text | Tax ID/SSN | Text For "Tax ID/SSN" |
| TaxID/SSN Entry Field | Entry field | TaxID/SSN Entry Field | Entry field for entering the TAX ID/SSN |
| License Number | Text | License Number | Text for "License Number" |
| License Expiration | Calendar | License Expiration | Calendar |
| E&O Number | Text | E&O Number | Text for "E&O" |
| E&O Number | Entry Field | E&O Number | Entry field for E&O Number |
| E&O Expiration | Text | E&O Expiration | Text for "E&O Expiration List" |
| E&O Expiration | Editable text/Calendar | E&O Expiration | Calendar for E&O expiration calendar |
| Sub Header "Bank Information" | Text | Sub Header "Bank Information" | To give the heading for the subsection |
| Preferred Mode of Payment | Text | Preferred Mode of Payment | Text for "Preferred Mode of Payment" |
| Preferred Mode of Payment | Radio Button | Preferred Mode of Payment | Check or ACH |
| Bank Name | Text | Bank Name | Text for Bank Name |
| Bank Name | Entry Field | Bank Name | Entry field for Bank Name |
| Account Number | Text | Account Number | Text for Account Number |
| Account Number | Entry field | Account Number | Entry Field For Account Number |
| Routing Number | Text | Routing Number | Text for Routing Number |
| Routing Number | Entry field | Routing Number | Entry Field for Routing Number |
| Account Type | Text | Account Type | Text for Account Type |
| Account Type | Select feature | Account Type | Select feature to select the type of account |
| Name on the Account | Text | Name on the Account | Text for "Name on the account" |
| Name on the Account | Entry Field | Name on the Account | Entry field for "Name on the Account" |
| Payee Name | Text | Payee Name | Text for Payee Name |
| Payee Name | Entry field | Payee Name | Entry Field for Payee Name |
| Requires Special Handling | Check Box | Requires Special Handling | Check box for "requires special handling" if checked - means Yes |
| Previous | HTML Button | Previous | Takes user to the Previous page. |

-continued

| Element Name | Element Type | Label | Purpose |
|---|---|---|---|
| Save | HTML Button | Save | Saves the Data. |
| Cancel | HTML Button | Cancel | Resets the Data to original values |

3.1.8.3. Front End Validations

| Element Name | Action/Validation Details | Error Message Text |
|---|---|---|
| First Name | Mandatory. Accepts all alphanumeric and Special characters except double quotes. | Error Dialog Box on Save "Accepts all alphanumeric and Special characters except double quotes". |
| Last Name | Mandatory. Accepts all alphanumeric and Special characters except double quotes. | Error Dialog Box on Save "Accepts all alphanumeric and Special characters except double quotes". |
| Company Name | Mandatory. Accepts all alphanumeric and Special characters except double quotes. | Error Dialog Box on Save "Accepts all alphanumeric and Special characters except double quotes" |
| Zip | Mandatory. Accepts exactly 5 numeric digits. | Error Dialog Box "Accepts exactly 5 digits number only". |
| Contact1 First Name | Mandatory. Accepts all alphanumeric and Special characters except double quotes. | Error Dialog Box on Save "Accepts all alphanumeric and Special characters except double quotes" |
| Contact1 Last Name | Mandatory. Accepts all alphanumeric and Special characters except double quotes. | Error Dialog Box on Save "Accepts all alphanumeric and Special characters except double quotes" |
| Contact1 Zip | Mandatory. Accepts exactly 5 numeric digits. | Error Dialog Box "Accepts exactly 5 digits number only". |
| Internal workgroup | Mandatory. | Error Dialog on Save "Is Required". |

3.1.8.4. Screen Flow

The user enters the information on the agent master

The following are the scenarios the user may come across when operating on the screen

| Scenario | Description |
|---|---|
| Save | Saves the agent data and shows the user confirmation page. |
| Next | Navigates to the page2. |
| Previous | Navigates to the page1. |
| Cancel | Resets the information |

3.1.9. User Interface ID: View & Delete Agent Master 3.1.9.1. Screen Name: View & Delete Agent Master (BPI_CAS_SM_SCR__002__017 & BPI_CAS_SM_SCR__002__018)

This screen below captures the information for view/delete agent master.

Step—1: Using search screen (BPI_CAS_SM_SCR__002__013), search the available Agent(s).

Step—3: Select a Agent and click "View/Delete" to navigate to view/delete page.

Step—3: Click the "Delete" to delete the agent information.

Step—4: Deletion of Agent data takes you to Confirmation page.

View/Delete Page (BPI_CAS_SM_SCR__002__017) (See FIG. M-27)

Confirmation Page (BPI_CAS_SM_SCR__002__018) (See FIG. M-28)

3.1.9.2. SID, Element Name, Element Type & Purpose

| Element Name | Element Type | Label | Purpose |
|---|---|---|---|
| Sub Header "Agent Information" | Text | Sub Header "Agent Information" | To give the heading for the sub section |
| First Name | Text | First Name | Text for "First Name" |
| First Name | Read-only Text | First Name | Display the value for First Name. |
| MI | Text | MI | Text for "MI" |
| MI | Read-only Text | MI | Display the value for MI. |
| Last Name | Text | Last Name | Text for "Last Name" |
| Last Name | Read-only Text | Last Name | Display the value for Last Name. |
| Company Name | Text | Company Name | Text for "Company Name". |
| Company | Read-only Text | Company | Display the value for company. |

-continued

| Element Name | Element Type | Label | Purpose |
|---|---|---|---|
| Name | | Name | |
| DBA | Text | DBA | Text for “DBA”. |
| DBA | Read-only Text | DBA | Display the value for dba. |
| Street Address | Text | Street Address | Text for “Street Address”. |
| Street Address | Read-only Text | Street Address | Display the value for street address. |
| Suite | Text | Suite | Text for “Suite” |
| Suite | Read-only Text | Suite | Display the value for Suite. |
| City | Text | City | Text for “City” |
| City | Read-only Text | City | Display the value for City. |
| State | Text | State | Text for “State” |
| State | Read-only Text | State | Display the value for state. |
| Zip | Text | Zip | Text for “Zip” |
| Zip | Read-only Text | Zip | Display the value for Zip. |
| Phone | Text | Phone | Text for “Phone” |
| Phone | Read-only Text | Phone | Display the value for Phone. |
| Extn. | Text | Extn. | Text for “Extn.” |
| Extn. | Read-only Text | Extn. | Display the value for Extn. |
| Fax | Text | Fax | Text for “Fax” |
| Fax | Read-only Text | Fax | Display the value for Fax. |
| Mode of communication | Text | Mode of communication | Text for “Mode of Communication” |
| Mode of Communication | Read-only Text | Mode of Communication | Display the value for Mode of Communication. |
| Gender | Text | Gender | Text for “Gender” |
| Gender | Read-only Text | Gender | Display the value for gender. |
| Email | Text | Email | Text for Email. |
| Email | Read-only Text | Email | Display the value for “Email” |
| Date of Birth | Text | Date of Birth | Text for Email. |
| Date of Birth | Read-only Text | Date of Birth | Display the value for Date of Birth. |
| Sub Header “Contact Information” | Text | Sub Header “Contact Information” | To give the heading for the sub section |
| Sub Header “Contact - 1” | Text | Sub Header “Contact - 1” | To give the heading for the sub section |
| Salutation | Text | Salutation | Text for “Salutation” |
| Salutation | Read-only Text | Salutation | Display the value for salutation. |
| First Name | Text | First Name | Text for “First Name” |
| First Name | Read-only Text | First Name | Display the value for First Name. |
| MI | Text | MI | Text for “MI” |
| MI | Read-only Text | MI | Display the value for MI. |
| Last Name | Text | Last Name | Text for “Last Name” |
| Last Name | Read-only Text | Last Name | Display the value for Last Name. |
| Company Name | Text | Company Name | Text for “Company Name”. |
| Company Name | Read-only Text | Company Name | Display the value for company. |
| DBA | Text | DBA | Text for “DBA”. |
| DBA | Read-only Text | DBA | Display the value for dba. |
| Street Address | Text | Street Address | Text for “Street Address”. |
| Street Address | Read-only Text | Street Address | Display the value for street address. |
| Suite | Text | Suite | Text for “Suite” |
| Suite | Read-only Text | Suite | Display the value for Suite. |
| City | Text | City | Text for “City” |
| City | Read-only Text | City | Display the value for City. |
| State | Text | State | Text for “State” |
| State | Read-only Text | State | Display the value for state. |
| Zip | Text | Zip | Text for “Zip” |
| Zip | Read-only Text | Zip | Display the value for Zip. |
| Phone | Text | Phone | Text for “Phone” |
| Phone | Read-only Text | Phone | Display the value for Phone. |
| Extn. | Text | Extn. | Text for “Extn.” |
| Extn. | Read-only Text | Extn. | Display the value for Extn. |
| Fax | Text | Fax | Text for “Fax” |
| Fax | Read-only Text | Fax | Display the value for Fax. |
| Email | Text | Email | Text for Email. |
| Email | Read-only Text | Email | Display the value for “Email” |
| Sub Header “Contact - 2” | Text | Sub Header “Contact - 2” | To give the heading for the sub section |
| Salutation | Text | Salutation | Text for “Salutation” |
| Salutation | Read-only Text | Salutation | Display the value for salutation. |
| First Name | Text | First Name | Text for “First Name” |
| First Name | Read-only Text | First Name | Display the value for First Name. |
| MI | Text | MI | Text for “MI” |
| MI | Read-only Text | MI | Display the value for MI. |
| Last Name | Text | Last Name | Text for “Last Name” |
| Last Name | Read-only Text | Last Name | Display the value for Last Name. |
| Company Name | Text | Company Name | Text for “Company Name”. |

-continued

| Element Name | Element Type | Label | Purpose |
|---|---|---|---|
| Company Name | Read-only Text | Company Name | Display the value for company. |
| DBA | Text | DBA | Text for "DBA". |
| DBA | Read-only Text | DBA | Display the value for dba. |
| Street Address | Text | Street Address | Text for "Street Address". |
| Street Address | Read-only Text | Street Address | Display the value for street address. |
| Suite | Text | Suite | Text for "Suite" |
| Suite | Read-only Text | Suite | Display the value for Suite. |
| City | Text | City | Text for "City" |
| City | Read-only Text | City | Display the value for City. |
| State | Text | State | Text for "State" |
| State | Read-only Text | State | Display the value for state. |
| Zip | Text | Zip | Text for "Zip" |
| Zip | Read-only Text | Zip | Display the value for Zip. |
| Phone | Text | Phone | Text for "Phone" |
| Phone | Read-only Text | Phone | Display the value for Phone. |
| Extn. | Text | Extn. | Text for "Extn." |
| Extn. | Read-only Text | Extn. | Display the value for Extn. |
| Fax | Text | Fax | Text for "Fax" |
| Fax | Read-only Text | Fax | Display the value for Fax. |
| Email | Text | Email | Text for Email. |
| Email | Read-only Text | Email | Display the value for "Email" |
| Next | HTML Button | Next | Takes user to the Next page. |
| Cancel | HTML Button | Cancel | Resets the Data to original values |
| Broker Type | Text | Broker Type | Text for "Broker Type" |
| Broker Type | Read-only Text | Broker Type | Display the value for Broker Type |
| Sub Header "Additional Preferences" | | Sub Header "Additional Preferences" | Display the checked values |
| Sub Header "Associated Personnel" | Text | Sub Header "Associated Personnel" | To give the heading for the sub section |
| Agent Workgroup | Text | Agent Workgroup | Text for "Agent Workgroup" |
| Agent | Non-Editable Text | Agent | Shows the number of associated agent. |
| Agency Workgroup | Text | Agency Workgroup | Text for "Agency Workgroup" |
| Agency | Non-Editable Text | Agency | Shows the number of associated agency(s). |
| Internal Workgroup | Text | Internal Workgroup | Text for "Internal Workgroup" |
| Internal Workgroup | Read-only Text | Internal Workgroup | Shows the internal workgroups. |
| BSS Rep | Text | BSS Rep | Text for "BSS Rep" |
| BSS Rep | Read-only Text | BSS Rep | Shows the BSS Rep (Associates) for the selected internal workgroup. |
| Sub Header "License Information" | Text | Sub Header "License Information" | Text for License Information |
| Tax ID/SSN | Text | Tax ID/SSN | Display the value for "Tax ID/SSN" |
| TaxID/SSN Entry Field | Read-only Text | TaxID/SSN Entry Field | Entry field for entering the TAX ID/SSN |
| License Number | Text | License Number | Display the value for "License Number" |
| License Expiration | Read-only Text | License Expiration | Calendar |
| E&O Number | Text | E&O Number | Text for "E&O" |
| E&O Number | Read-only Text | E&O Number | Display the value for E&O Number |
| E&O Expiration | Text | E&O Expiration | Text for "E&O Expiration List" |
| E&O Expiration | Read-only Text | E&O Expiration | Display the value for E&O expiration |
| Sub Header "Bank Information" | Text | Sub Header "Bank Information" | To give the heading for the subsection |
| Preferred Mode of Payment | Text | Preferred Mode of Payment | Text for "Preferred Mode of Payment" |
| Preferred Mode of Payment | Read-only Text | Preferred Mode of Payment | Display the value for Mode of payment |
| Bank Name | Text | Bank Name | Text for Bank Name |
| Bank Name | Read-only Text | Bank Name | Display the value for Bank Name |
| Account Number | Text | Account Number | Text for Account Number |
| Account Number | Read-only Text | Account Number | Display the value for Account Number |
| Routing Number | Text | Routing Number | Text for Routing Number |

-continued

| Element Name | Element Type | Label | Purpose |
|---|---|---|---|
| Routing Number | Read-only Text | Routing Number | Display the value for Routing Number |
| Account Type | Text | Account Type | Text for Account Type |
| Account Type | Read-only Text | Account Type | Display the value for type of account |
| Name on the Account | Text | Name on the Account | Text for "Name on the account" |
| Name on the Account | Read-only Text | Name on the Account | Display the value for "Name on the Account" |
| Payee Name | Text | Payee Name | Text for Payee Name |
| Payee Name | Read-only Text | Payee Name | Display the value for Payee Name |
| Requires Special Handling | Read-only Text | Requires Special Handling | Display the value for "requires special handling" if checked - means Yes |
| Previous | HTML Button | Previous | Takes user to the Previous page. |
| Save | HTML Button | Save | Saves the Data. |
| Cancel | HTML Button | Cancel | Resets the Data to original values |

3.1.9.3. Front End Validations

None.

3.1.9.4. Screen Flow

The following are the scenarios the user may come across when operating on the step 2 screen.

| Scenario | Description |
|---|---|
| New Agent | Used to Navigate to "Create Agent Master" screen. |
| Delete | Inactivates (Delete) the Record. |

3.1.10. User Interface ID: Create Agency Master 3.1.10.1. Screen Name: Create Agency Master (BPI_CAS_SM_SCR__002__019, BPI_CAS_SM_SCR__002__020 & BPI_CAS_SM_SCR__002__021)

This screen below captures the information for creating agency master.

Step—1: Fill the mandatory information in page1. Click "Next" to navigate to page2.

Step—2: Fill the mandatory information in page2 and click "Save" to save the Agency Master data.

Step—3: Saving of Agency data takes you to Confirmation page.

Page1 (BPI_CAS_SM_SCR__002__019) (See FIG. M-29)

Page2 (BPI_CAS_SM_SCR__002__020) (See FIG. M-30)

Confirmation page (BPI_CAS_SM_SCR__002__021) (See FIG. M-31)

3.1.10.2. SID, Element Name, Element Type & Purpose

| Element Name | Element Type | Label | Purpose |
|---|---|---|---|
| Sub Header "General Information" | Text | Sub Header "General Information" | To give the heading for the sub section |
| Company Name | Text | Company Name | Text for "Company Name". |
| Company Name | Entry Field | Company Name | Entry field for company. |
| DBA | Text | DBA | Text for "DBA". |
| DBA | Entry Field | DBA | Entry field for dba. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| City | Text | City | Text for "City" |
| City | Entry Field | City | Entry Field for City. |
| State | Text | State | Text for "State" |
| State | Select Feature | State | Select feature for selecting a state in US. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Fax | Text | Fax | Text for "Fax" |
| Fax | Entry Field | Fax | Entry Field for Fax. |
| Mode of communication | Text | Mode of communication | Text for "Mode of Communication" |
| Mode of Communication | Entry Field | Mode of Communication | Entry Field for Mode of Communication. |
| Date of Birth | Text | Date of Birth | Text for Email. |
| Date of Birth | Entry Field | Date of Birth | Entry Field for Date of Birth. |
| Sub Header "Contact Information" | Text | Sub Header "Contact Information" | To give the heading for the sub section |
| Sub Header "Contact - 1" | Text | Sub Header "Contact - 1" | To give the heading for the sub section |
| Salutation | Text | Salutation | Text for "Salutation" |

-continued

| Element Name | Element Type | Label | Purpose |
|---|---|---|---|
| Salutation | Select Feature | Salutation | Select feature for selecting a salutation. |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| City | Text | City | Text for "City" |
| City | Entry Field | City | Entry Field for City. |
| State | Text | State | Text for "State" |
| State | Select Feature | State | Select feature for selecting a state in US. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Extn. | Text | Extn. | Text for "Extn." |
| Extn. | Entry Field | Extn. | Entry Field for Extn. |
| Fax | Text | Fax | Text for "Fax" |
| Fax | Entry Field | Fax | Entry Field for Fax. |
| Email | Text | Email | Text for Email. |
| Email | Entry Field | Email | Entry Field for "Email" |
| Sub Header "Contact - 2" | Text | Sub Header "Contact - 2" | To give the heading for the sub section |
| Salutation | Text | Salutation | Text for "Salutation" |
| Salutation | Select Feature | Salutation | Select feature for selecting a salutation. |
| First Name | Text | First Name | Text for "First Name" |
| First Name | Entry Field | First Name | Entry Field for First Name. |
| MI | Text | MI | Text for "MI" |
| MI | Entry Field | MI | Entry Field for MI. |
| Last Name | Text | Last Name | Text for "Last Name" |
| Last Name | Entry Field | Last Name | Entry Field for Last Name. |
| Street Address | Text | Street Address | Text for "Street Address". |
| Street Address | Entry Field | Street Address | Entry field for street address. |
| Suite | Text | Suite | Text for "Suite" |
| Suite | Entry Field | Suite | Entry Field for Suite. |
| City | Text | City | Text for "City" |
| City | Entry Field | City | Entry Field for City. |
| State | Text | State | Text for "State" |
| State | Select Feature | State | Select feature for selecting a state in US. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Extn. | Text | Extn. | Text for "Extn." |
| Extn. | Entry Field | Extn. | Entry Field for Extn. |
| Fax | Text | Fax | Text for "Fax" |
| Fax | Entry Field | Fax | Entry Field for Fax. |
| Email | Text | Email | Text for Email. |
| Email | Entry Field | Email | Entry Field for "Email" |
| Next | HTML Button | Next | Takes user to the Next page. |
| Cancel | HTML Button | Cancel | Resets the Data to original values |
| Broker Type | Text | Broker Type | Text for "Broker Type" |
| Broker Type | Radio Buttons | Broker Type | Statewide, Regional and Unknown (default) |
| Sub Header "Additional Preferences" | | Sub Header "Additional Preferences" | |
| Exclude from Broadcast Messaging | Check box | Exclude from Broadcast Messaging | If checked then Yes. |
| Exclude from overdue premium notices | Check box | Exclude from overdue premium notices | If checked then yes. |
| Exclude from Employee/ Member Term Letters | Check box | Exclude from Employee/ Member Term Letters | If checked then Yes |
| Exclude from Employee/ Member Add-on Term Letters | Check Box | Exclude from Employee/ Member Add-on Term Letters | If checked then Yes |
| Sub Header "Associated Personnel" | Text | Sub Header "Associated Personnel" | To give the heading for the sub section |

-continued

| Element Name | Element Type | Label | Purpose |
|---|---|---|---|
| Agent Workgroup | Text | Agent Workgroup | Text for "Agent Workgroup" |
| Agent | Non-Editable Text | Agent | Shows the number of associated agent. |
| Agent-Popup | Image | Agent-Popup | Clicking this will open a new window, using which user can assign agents for this Lead. |
| Internal Workgroup | Text | Internal Workgroup | Text for "Internal Workgroup" |
| Internal Workgroup | Select Feature | Internal Workgroup | Shows the internal workgroups. User can select a internal workgroup for this lead. |
| BSS Rep | Text | BSS Rep | Text for "BSS Rep" |
| BSS Rep | Select Feature | BSS Rep | Shows the BSS Rep (Associates) for the selected internal workgroup. User can select a BSS Rep for this Lead. |
| Sub Header "License Information" | Text | Sub Header "License Information" | Text for License Information |
| Tax ID/SSN | Text | Tax ID/SSN | Text For "Tax ID/SSN" |
| TaxID/SSN Entry Field | Entry field | TaxID/SSN Entry Field | Entry field for entering the TAX ID/SSN |
| License Number | Text | License Number | Text for "License Number" |
| License Expiration | Calendar | License Expiration | Calendar |
| E&O Number | Text | E&O Number | Text for "E&O" |
| E&O Number | Entry Field | E&O Number | Entry field for E& O Number |
| E&O Expiration | Text | E&O Expiration | Text for "E & O Expiration List" |
| E&O Expiration | Editable text/Calendar | E&O Expiration | Calendar for E&O expiration calendar |
| Sub Header "Bank Information" | Text | Sub Header "Bank Information" | To give the heading for the subsection |
| Preferred Mode of Payment | Text | Preferred Mode of Payment | Text for "Preferred Mode of Payment" |
| Preferred Mode of Payment | Radio Button | Preferred Mode of Payment | Check or ACH |
| Bank Name | Text | Bank Name | Text for Bank Name |
| Bank Name | Entry Field | Bank Name | Entry field for Bank Name |
| Account Number | Text | Account Number | Text for Account Number |
| Account Number | Entry field | Account Number | Entry Field For Account Number |
| Routing Number | Text | Routing Number | Text for Routing Number |
| Routing Number | Entry field | Routing Number | Entry Field for Routing Number |
| Account Type | Text | Account Type | Text for Account Type |
| Account Type | Select feature | Account Type | Select feature to select the type of account |
| Name on the Account | Text | Name on the Account | Text for "Name on the account" |
| Name on the Account | Entry Field | Name on the Account | Entry field for "Name on the Account" |
| Payee Name | Text | Payee Name | Text for Payee Name |
| Payee Name | Entry field | Payee Name | Entry Field for Payee Name |
| Requires Special Handling | Check Box | Requires Special Handling | Check box for "requires special handling" if checked - means Yes |
| Previous | HTML Button | Previous | Takes user to the Previous page. |
| Save | HTML Button | Save | Saves the Data. |
| Cancel | HTML Button | Cancel | Resets the Data to original values |

3.1.10.3. Front End Validations

| Element Name | Action/Validation Details | Error Message Text |
|---|---|---|
| Company Name | Mandatory. Accepts all alphanumeric and Special characters except double quotes. | Error Dialog Box on Save "Accepts all alphanumeric and Special characters except double quotes" |
| Zip | Mandatory. Accepts exactly 5 numeric digits. | Error Dialog Box "Accepts exactly 5 digits number only". |
| Contact1 First | Mandatory. Accepts all alphanumeric and | Error Dialog Box on Save |

-continued

| Element Name | Action/Validation Details | Error Message Text |
|---|---|---|
| Name | Special characters except double quotes. | "Accepts all alphanumeric and Special characters except double quotes" |
| Contact1 Last Name | Mandatory. Accepts all alphanumeric and Special characters except double quotes. | Error Dialog Box on Save "Accepts all alphanumeric and Special characters except double quotes" |
| Contact1 Zip | Mandatory. Accepts exactly 5 numeric digits. | Error Dialog Box "Accepts exactly 5 digits number only". |
| Internal workgroup | Mandatory. | Error Dialog on Save "Is Required". |

3.1.10.4. Screen Flow

The user enters the information on the agent master

The following are the scenarios the user may come across when operating on the screen

| Scenario | Description |
|---|---|
| Save | Saves the agent data and shows the user confirmation page. |
| Next | Navigates to the page2. |
| Previous | Navigates to the page1. |
| Cancel | Resets the information |

3.1.11. User Interface ID: Search Agency Master 3.1.11.1. Screen Name: Search Agency Master (BPI_CAS_SM_SCR__002__022)

This screen below captures the information for searching an existing "Agency".

Step—1: Enter the mandatory agent information and click the search button. This page will display the result of search. User can choose a agent and navigate to either "Modify" screen or "View/Delete" screen. (See FIG. M-32)

3.1.11.2. SID, Element Name, Element Type & Purpose

| Element Name | Element Type | Label | Purpose |
|---|---|---|---|
| Main Header "Agent Search" | Text | Main Header "Agent Search" | To give the heading for the screen |
| Agency ID | Text | Agency ID | Text For "Agency ID" |
| Agency ID | Entry Field | Agency ID | Entry field for agency id |
| Agency Name | Text | Agency Name | Text For "Agency Name" |
| Agency Name | Entry Field | Agency Name | Entry field for Agency Name |
| Phone | Text | Phone | Entry field for "Phone" |
| Phone | Entry Field | Phone | Entry field for Phone |
| Tax ID | Text | Tax ID | Text For "Tax ID" |
| Tax ID | Select Feature | Tax ID | Entry field for Tax |
| Lead Button Radio | Radio Button | Lead Button Radio | Used to select the agency for modifying or viewing/deleting. |
| Modify | HTML Button | Modify | Leads to the modify screen of the selected agency |
| View/Delete | HTML Button | View/Delete | Leads to the view/delete screen of the selected |

3.1.11.3. Front End Validations

| Element Name | Action/Validation Details | Error Message Text |
|---|---|---|
| Agency ID | Mandatory. Any one of the fields in the search screen is mandatory. | Error Dialog Box on Search "Accepts |

-continued

| Element Name | Action/Validation Details | Error Message Text |
|---|---|---|
| | Accepts Alphanumeric values only | Alphanumeric values only." |

3.1.11.4. Screen Flow

The following are the scenarios the user may come across when operating on the search screen.

| Scenario | Description |
|---|---|
| Search | The system checks for all the validations for all the mandatory information. Fetches the agency(s) that matches with the search conditions. |
| Cancel | Clears the search fields |

3.1.12. User Interface ID: Modify Agency Master 3.1.12.1. Screen Name: Modify Agency Master (BPI_CAS_SM_SCR__002__023, BPI_CAS_SM_SCR__002__024 & BPI_CAS_SM_SCR__002__025)

This screen below captures the information for modifying agency master.

Step—1: Using search screen (BPI_CAS_SM_SCR__002__013), search the available Agency(s).

Step—2: Select a Agency and click "Modify" to navigate to page1.

Step—3: Modify the Agency information and click "Next" to navigate you to page2.

Step—4: Click the "Save" to save the modified agency information.

Step—5: Saving of Agency data takes you to Confirmation page.

Page1 (BPI_CAS_SM_SCR__002__023) (See FIG. M-33)

Page2 (BPI_CAS_SM_SCR__002__024) (See FIG. M-34)

Confirmation Page (BPI_CAS_SM_SCR__002__025) (See FIG. M-35)

3.1.12.2. SID, Element Name, Element Type & Purpose

| Element Name | Element Type | Label | Purpose |
|---|---|---|---|
| Sub Header “General Information” | Text | Sub Header “General Information” | To give the heading for the sub section |
| Company Name | Text | Company Name | Text for “Company Name”. |
| Company Name | Entry Field | Company Name | Entry field for company. |
| DBA | Text | DBA | Text for “DBA”. |
| DBA | Entry Field | DBA | Entry field for dba. |
| Street Address | Text | Street Address | Text for “Street Address”. |
| Street Address | Entry Field | Street Address | Entry field for street address. |
| Suite | Text | Suite | Text for “Suite” |
| Suite | Entry Field | Suite | Entry Field for Suite. |
| City | Text | City | Text for “City” |
| City | Entry Field | City | Entry Field for City. |
| State | Text | State | Text for “State” |
| State | Select Feature | State | Select feature for selecting a state in US. |
| Zip | Text | Zip | Text for “Zip” |
| Zip | Entry Field | Zip | Entry Field for Zip. |
| Phone | Text | Phone | Text for “Phone” |
| Phone | Entry Field | Phone | Entry Field for Phone. |
| Fax | Text | Fax | Text for “Fax” |
| Fax | Entry Field | Fax | Entry Field for Fax. |
| Mode of communication | Text | Mode of communication | Text for “Mode of Communication” |
| Mode of Communication | Entry Field | Mode of Communication | Entry Field for Mode of Communication. |
| Sub Header “Contact Information” | Text | Sub Header “Contact Information” | To give the heading for the sub section |
| Sub Header “Contact - 1” | Text | Sub Header “Contact - 1” | To give the heading for the sub section |
| Salutation | Text | Salutation | Text for “Salutation” |
| Salutation | Select Feature | Salutation | Select feature for selecting a salutation. |
| First Name | Text | First Name | Text for “First Name” |
| First Name | Entry Field | First Name | Entry Field for First Name. |
| MI | Text | MI | Text for “MI” |
| MI | Entry Field | MI | Entry Field for MI. |
| Last Name | Text | Last Name | Text for “Last Name” |
| Last Name | Entry Field | Last Name | Entry Field for Last Name. |
| Street Address | Text | Street Address | Text for “Street Address”. |
| Street Address | Entry Field | Street Address | Entry field for street address. |
| Suite | Text | Suite | Text for “Suite” |
| Suite | Entry Field | Suite | Entry Field for Suite. |
| City | Text | City | Text for “City” |
| City | Entry Field | City | Entry Field for City. |
| State | Text | State | Text for “State” |
| State | Select Feature | State | Select feature for selecting a state in US. |
| Zip | Text | Zip | Text for “Zip” |
| Zip | Entry Field | Zip | Entry Field for Zip. |
| Phone | Text | Phone | Text for “Phone” |
| Phone | Entry Field | Phone | Entry Field for Phone. |
| Extn. | Text | Extn. | Text for “Extn.” |
| Extn. | Entry Field | Extn. | Entry Field for Extn. |
| Fax | Text | Fax | Text for “Fax” |
| Fax | Entry Field | Fax | Entry Field for Fax. |
| Email | Text | Email | Text for Email. |
| Email | Entry Field | Email | Entry Field for “Email” |
| Sub Header “Contact - 2” | Text | Sub Header “Contact - 2” | To give the heading for the sub section |
| Salutation | Text | Salutation | Text for “Salutation” |
| Salutation | Select Feature | Salutation | Select feature for selecting a salutation. |
| First Name | Text | First Name | Text for “First Name” |
| First Name | Entry Field | First Name | Entry Field for First Name. |
| MI | Text | MI | Text for “MI” |
| MI | Entry Field | MI | Entry Field for MI. |
| Last Name | Text | Last Name | Text for “Last Name” |
| Last Name | Entry Field | Last Name | Entry Field for Last Name. |
| Street Address | Text | Street Address | Text for “Street Address”. |
| Street Address | Entry Field | Street Address | Entry field for street address. |
| Suite | Text | Suite | Text for “Suite” |
| Suite | Entry Field | Suite | Entry Field for Suite. |

-continued

| Element Name | Element Type | Label | Purpose |
|---|---|---|---|
| City | Text | City | Text for "City" |
| City | Entry Field | City | Entry Field for City. |
| State | Text | State | Text for "State" |
| State | Select Feature | State | Select feature for selecting a state in US. |
| Zip | Text | Zip | Text for "Zip" |
| Zip | Entry Field | Zip | Entry Field for Zip. |
| Phone | Text | Phone | Text for "Phone" |
| Phone | Entry Field | Phone | Entry Field for Phone. |
| Extn. | Text | Extn. | Text for "Extn." |
| Extn. | Entry Field | Extn. | Entry Field for Extn. |
| Fax | Text | Fax | Text for "Fax" |
| Fax | Entry Field | Fax | Entry Field for Fax. |
| Email | Text | Email | Text for Email. |
| Email | Entry Field | Email | Entry Field for "Email" |
| Next | HTML Button | Next | Takes user to the Next page. |
| Cancel | HTML Button | Cancel | Resets the Data to original values |
| Broker Type | Text | Broker Type | Text for "Broker Type" |
| Broker Type | Radio Buttons | Broker Type | Statewide, Regional and Unknown (default) |
| Sub Header "Additional Preferences" | | Sub Header "Additional Preferences" | |
| Exclude from Broadcast Messaging | Check box | Exclude from Broadcast Messaging | If checked then Yes. |
| Exclude from overdue premium notices | Check box | Exclude from overdue premium notices | If checked then yes. |
| Exclude from Employee/ Member Term Letters | Check box | Exclude from Employee/ Member Term Letters | If checked then Yes |
| Exclude from Employee/ Member Add-on Term Letters | Check Box | Exclude from Employee/ Member Add-on Term Letters | If checked then Yes |
| Sub Header "Associated Personnel" | Text | Sub Header "Associated Personnel" | To give the heading for the sub section |
| Agent Workgroup | Text | Agent Workgroup | Text for "Agent Workgroup" |
| Agent | Non-Editable Text | Agent | Shows the number of associated agent. |
| Agent-Popup | Image | Agent-Popup | Clicking this will open a new window, using which user can assign agents for this Lead. |
| Internal Workgroup | Text | Internal Workgroup | Text for "Internal Workgroup" |
| Internal Workgroup | Select Feature | Internal Workgroup | Shows the internal workgroups. User can select a internal workgroup for this lead. |
| BSS Rep | Text | BSS Rep | Text for "BSS Rep" |
| BSS Rep | Select Feature | BSS Rep | Shows the BSS Rep (Associates) for the selected internal workgroup. User can select a BSS Rep for this Lead. |
| Sub Header "License Information"" | Text | Sub Header "License Information" | Text for License Information |
| Tax ID/SSN | Text | Tax ID/SSN | Text For "Tax ID/SSN" |
| TaxID/SSN Entry Field | Entry field | TaxID/SSN Entry Field | Entry field for entering the TAX ID/SSN |
| License Number | Text | License Number | Text for "License Number" |
| License Expiration | Calendar | License Expiration | Calendar |
| E&O Number | Text | E&O Number | Text for "E&O" |
| E&O Number | Entry Field | E&O Number | Entry field for E&O Number |
| E&O Expiration | Text | E&O Expiration | Text for "E&O Expiration List" |
| E&O Expiration | Editable text/Calendar | E&O Expiration | Calendar for E&O expiration calendar |
| Sub Header "Bank Information" | Text | Sub Header "Bank Information" | To give the heading for the subsection |
| Preferred Mode of Payment | Text | Preferred Mode of Payment | Text for "Preferred Mode of Payment" |
| Preferred Mode of Payment | Radio Button | Preferred Mode of Payment | Check or ACH |
| Bank Name | Text | Bank Name | Text for Bank Name |
| Bank Name | Entry Field | Bank Name | Entry field for Bank Name |

-continued

| Element Name | Element Type | Label | Purpose |
|---|---|---|---|
| Account Number | Text | Account Number | Text for Account Number |
| Account Number | Entry field | Account Number | Entry Field For Account Number |
| Routing Number | Text | Routing Number | Text for Routing Number |
| Routing Number | Entry field | Routing Number | Entry Field for Routing Number |
| Account Type | Text | Account Type | Text for Account Type |
| Account Type | Select feature | Account Type | Select feature to select the type of account |
| Name on the Account | Text | Name on the Account | Text for "Name on the account" |
| Name on the Account | Entry Field | Name on the Account | Entry field for "Name on the Account" |
| Payee Name | Text | Payee Name | Text for Payee Name |
| Payee Name | Entry field | Payee Name | Entry Field for Payee Name |
| Requires Special Handling | Check Box | Requires Special Handling | Check box for "requires special handling" if checked - means Yes |
| Previous | HTML Button | Previous | Takes user to the Previous page. |
| Save | HTML Button | Save | Saves the Data. |
| Cancel | HTML Button | Cancel | Resets the Data to original values |

3.1.12.3. Front End Validations

| Element Name | Action/Validation Details | Error Message Text |
|---|---|---|
| Company Name | Mandatory. Accepts all alphanumeric and Special characters except double quotes. | Error Dialog Box on Save "Accepts all alphanumeric and Special characters except double quotes" |
| Zip | Mandatory. Accepts exactly 5 numeric digits. | Error Dialog Box "Accepts exactly 5 digits number only". |
| Contact1 First Name | Mandatory. Accepts all alphanumeric and Special characters except double quotes. | Error Dialog Box on Save "Accepts all alphanumeric and Special characters except double quotes" |
| Contact1 Last Name | Mandatory. Accepts all alphanumeric and Special characters except double quotes. | Error Dialog Box on Save "Accepts all alphanumeric and Special characters except double quotes" |
| Contact1 Zip | Mandatory. Accepts exactly 5 numeric digits. | Error Dialog Box "Accepts exactly 5 digits number only". |
| Internal workgroup | Mandatory. | Error Dialog on Save " Is Required ". |

3.1.12.4. Screen Flow

The user enters the information on the agent master

The following are the scenarios the user may come across when operating on the screen

| Scenario | Description |
|---|---|
| Save | Saves the agent data and shows the user confirmation page. |
| Next | Navigates to the page2. |
| Previous | Navigates to the page1. |
| Cancel | Resets the information |

3.1.13. User Interface ID: View & Delete Agency Master 3.1.13.1. Screen Name: View & Delete Agency Master (BPI_CAS_SM_SCR__002__026 & BPI_CAS_SM_SCR__002__027)

This screen below captures the information for view/delete agency master.

Step—1: Using search screen (BPI_CAS_SM_SCR__002__013), search the available Agency(s).

Step—2: Select a Agency and click "View/Delete" to navigate to view/delete page.

Step—3: Click the "Delete" to delete the agency information.

Step—4: Deletion of Agency data takes you to Confirmation page.

View/Delete Page (BPI_CAS_SM_SCR__002__026) (See FIG. M-36)

Confirmation Page (BPI_CAS_SM_SCR__002__027) (See FIG. M-37)

3.1.13.2. SID, Element Name, Element Type & Purpose

| Element Name | Element Type | Label | Purpose |
|---|---|---|---|
| Sub Header "General Information" | Text | Sub Header "General Information" | To give the heading for the sub section |
| Company Name | Text | Company Name | Text for "Company Name". |
| Company Name | Read-only Text | Company Name | Display the value for company. |
| DBA | Text | DBA | Text for "DBA". |
| DBA | Read-only Text | DBA | Display the value for dba. |
| Street Address | Text | Street Address | Text for "Street Address". |
| Street Address | Read-only Text | Street Address | Display the value for street address. |
| Suite | Text | Suite | Text for "Suite" |
| Suite | Read-only Text | Suite | Display the value for Suite. |
| City | Text | City | Text for "City" |
| City | Read-only Text | City | Display the value for City. |
| State | Text | State | Text for "State" |
| State | Read-only Text | State | Display the value for state. |
| Zip | Text | Zip | Text for "Zip" |
| Zip | Read-only Text | Zip | Display the value for Zip. |
| Phone | Text | Phone | Text for "Phone" |
| Phone | Read-only Text | Phone | Display the value for Phone. |
| Fax | Text | Fax | Text for "Fax" |
| Fax | Read-only Text | Fax | Display the value for Fax. |
| Mode of communication | Text | Mode of communication | Text for "Mode of Communication" |
| Mode of Communication | Read-only Text | Mode of Communication | Display the value for Mode of Communication. |
| Sub Header "Contact Information" | Text | Sub Header "Contact Information" | To give the heading for the sub section |
| Sub Header "Contact - 1" | Text | Sub Header "Contact - 1" | To give the heading for the sub section |
| Salutation | Text | Salutation | Text for "Salutation" |
| Salutation | Read-only Text | Salutation | Display the value for salutation. |
| First Name | Text | First Name | Text for "First Name" |
| First Name | Read-only Text | First Name | Display the value for First Name. |
| MI | Text | MI | Text for "MI" |
| MI | Read-only Text | MI | Display the value for MI. |
| Last Name | Text | Last Name | Text for "Last Name" |
| Last Name | Read-only Text | Last Name | Display the value for Last Name. |
| Street Address | Text | Street Address | Text for "Street Address". |
| Street Address | Read-only Text | Street Address | Display the value for street address. |
| Suite | Text | Suite | Text for "Suite" |
| Suite | Read-only Text | Suite | Display the value for Suite. |
| City | Text | City | Text for "City" |
| City | Read-only Text | City | Display the value for City. |
| State | Text | State | Text for "State" |
| State | Read-only Text | State | Display the value for state. |
| Zip | Text | Zip | Text for "Zip" |
| Zip | Read-only Text | Zip | Display the value for Zip. |
| Phone | Text | Phone | Text for "Phone" |
| Phone | Read-only Text | Phone | Display the value for Phone. |
| Extn. | Text | Extn. | Text for "Extn." |
| Extn. | Read-only Text | Extn. | Display the value for Extn. |
| Fax | Text | Fax | Text for "Fax" |
| Fax | Read-only Text | Fax | Display the value for Fax. |
| Email | Text | Email | Text for Email. |
| Email | Read-only Text | Email | Display the value for "Email" |
| Sub Header "Contact - 2" | Text | Sub Header "Contact - 2" | To give the heading for the sub section |
| Salutation | Text | Salutation | Text for "Salutation" |
| Salutation | Read-only Text | Salutation | Display the value for salutation. |
| First Name | Text | First Name | Text for "First Name" |
| First Name | Read-only Text | First Name | Display the value for First Name. |
| MI | Text | MI | Text for "MI" |
| MI | Read-only Text | MI | Display the value for MI. |
| Last Name | Text | Last Name | Text for "Last Name" |
| Last Name | Read-only Text | Last Name | Display the value for Last Name. |
| Street Address | Text | Street Address | Text for "Street Address". |
| Street Address | Read-only Text | Street Address | Display the value for street address. |
| Suite | Text | Suite | Text for "Suite" |
| Suite | Read-only Text | Suite | Display the value for Suite. |
| City | Text | City | Text for "City" |
| City | Read-only Text | City | Display the value for City. |
| State | Text | State | Text for "State" |
| State | Read-only Text | State | Display the value for state. |

-continued

| Element Name | Element Type | Label | Purpose |
|---|---|---|---|
| Zip | Text | Zip | Text for "Zip" |
| Zip | Read-only Text | Zip | Display the value for Zip. |
| Phone | Text | Phone | Text for "Phone" |
| Phone | Read-only Text | Phone | Display the value for Phone. |
| Extn. | Text | Extn. | Text for "Extn." |
| Extn. | Read-only Text | Extn. | Display the value for Extn. |
| Fax | Text | Fax | Text for "Fax" |
| Fax | Read-only Text | Fax | Display the value for Fax. |
| Email | Text | Email | Text for Email. |
| Email | Read-only Text | Email | Display the value for "Email" |
| Next | HTML Button | Next | Takes user to the Next page. |
| Cancel | HTML Button | Cancel | Resets the Data to original values |
| Broker Type | Text | Broker Type | Text for "Broker Type" |
| Broker Type | Read-only Text | Broker Type | Display the value for Broker Type |
| Sub Header "Additional Preferences" | | Sub Header "Additional Preferences" | Display the checked values |
| Sub Header "Associated Personnel" | Text | Sub Header "Associated Personnel" | To give the heading for the sub section |
| Agent Workgroup | Text | Agent Workgroup | Text for "Agent Workgroup" |
| Agent | Non-Editable Text | Agent | Shows the number of associated agent. |
| Internal Workgroup | Text | Internal Workgroup | Text for "Internal Workgroup" |
| Internal Workgroup | Read-only Text | Internal Workgroup | Shows the internal workgroups. |
| BSS Rep | Text | BSS Rep | Text for "BSS Rep" |
| BSS Rep | Read-only Text | BSS Rep | Shows the BSS Rep (Associates) for the selected internal workgroup. |
| Sub Header "License Information" | Text | Sub Header "License Information" | Text for License Information |
| Tax ID/SSN | Text | Tax ID/SSN | Display the value for "Tax ID/SSN" |
| TaxID/SSN Entry Field | Read-only Text | TaxID/SSN Entry Field | Entry field for entering the TAX ID/SSN |
| License Number | Text | License Number | Display the value for "License Number" |
| License Expiration | Read-only Text | License Expiration | Calendar |
| E&O Number | Text | E&O Number | Text for "E&O" |
| E&O Number | Read-only Text | E&O Number | Display the value for E&O Number |
| E&O Expiration | Text | E&O Expiration | Text for "E&O Expiration List" |
| E&O Expiration | Read-only Text | E&O Expiration | Display the value for E&O expiration |
| Sub Header "Bank Information" | Text | Sub Header "Bank Information" | To give the heading for the subsection |
| Preferred Mode of Payment | Text | Preferred Mode of Payment | Text for "Preferred Mode of Payment" |
| Preferred Mode of Payment | Read-only Text | Preferred Mode of Payment | Display the value for Mode of payment |
| Bank Name | Text | Bank Name | Text for Bank Name |
| Bank Name | Read-only Text | Bank Name | Display the value for Bank Name |
| Account Number | Text | Account Number | Text for Account Number |
| Account Number | Read-only Text | Account Number | Display the value for Account Number |
| Routing Number | Text | Routing Number | Text for Routing Number |
| Routing Number | Read-only Text | Routing Number | Display the value for Routing Number |
| Account Type | Text | Account Type | Text for Account Type |
| Account Type | Read-only Text | Account Type | Display the value for type of account |
| Name on the Account | Text | Name on the Account | Text for "Name on the account" |
| Name on the Account | Read-only Text | Name on the Account | Display the value for "Name on the Account" |
| Payee Name | Text | Payee Name | Text for Payee Name |
| Payee Name | Read-only Text | Payee Name | Display the value for Payee Name |
| Requires Special Handling | Read-only Text | Requires Special Handling | Display the value for "requires special handling" if checked - means Yes |

-continued

| Element Name | Element Type | Label | Purpose |
|---|---|---|---|
| Previous | HTML Button | Previous | Takes user to the Previous page. |
| Save | HTML Button | Save | Saves the Data. |
| Cancel | HTML Button | Cancel | Resets the Data to original values |

3.1.13.3. Front End Validations

None.

3.1.13.4. Screen Flow

The following are the scenarios the user may come across when operating on the step 2 screen.

| Scenario | Description |
|---|---|
| New Agency | Used to Navigate to "Create Agency Master" screen. |
| Delete | Inactivates (Delete) the Record. |

3.1.14. User Interface Id: Lead Tracking 3.1.14.1. Screen Name: Lead Tracking (BPI_CAS_SM_SCR__002__028)

This screen below captures the lead tracking information of a lead and the lead tracking shall be a tab in lead master screens (See FIG. M-38)

3.1.14.2. SID, Element Name, Element Type & Purpose

| Element Name | Element Type | Label | Purpose |
|---|---|---|---|
| Main Header "Lead Tracking" | Text | Main Header "Lead Tracking" | To give the heading for the screen being navigated |
| Sub Header "Tracking Information" | Text | Sub Header "Tracking Information" | To give the sub heading |
| Present Status | Text | Present Status | Text For "Present Status" |
| Present Status | Non Editable Entry Fields | Present Status | Non Editable field showing status code and present status which may be updateable due to change in selection on screen |
| Present Desc | Text | Present Desc | Text For " Present Desc" |
| Present Desc | Non Editable Entry Fields | Present Desc | Non Editable field present description which may be updateable due to change in selection on screen |
| Sub Header "Call Status" | Text | Sub Header "Call Status" | To give the heading for the screen being navigated |
| Radio Buttons | Radio Buttons | Radio Buttons | "Made Contact" ,"Disconnected Number", "Wrong Number", "Unreachable". |
| Sub Header "Contact Result" | Text | Sub Header "Contact Result" | To give the heading for the screen being navigated |
| Radio Buttons | Radio Buttons | Radio Buttons | "Qualified" and "Non-Qualified Lead" |
| Sub Header "Qualified Lead Result" | Text | Sub Header "Qualified Lead Result" | To give the heading for the screen being navigated |
| Radio Buttons | Radio Buttons | Radio Buttons | "Produced Quote", "Not Interested", "No Quote at this time" |
| Sub Header "Non-Qualified Lead Reasons" | Text | Sub Header "Non-Qualified Lead Reasons" | To give the heading for the screen being navigated |
| Radio Buttons | Radio Buttons | Radio Buttons | "<2 Eligible Employees", " >50 Eligible Employees" |
| Sub Header "Not Interested Reasons" | Text | Sub Header "Not Interested Reasons" | To give the heading for the screen being navigated |
| Radio Buttons | Radio Buttons | Radio Buttons | "Not up for renewal ", " Doesn't want/need/Provide Insurance" |
| Sub Header "Post Quote Result" | Text | Sub Header "Post Quote Result" | To give the heading for the screen being navigated |
| Sold Group ID | Text | Sold Group ID | Text for "Sold Group ID" |
| Sold Group ID | Non Editable Field | Sold Group ID | Entry field for "Sold Group ID" |
| Radio Buttons | Radio Buttons | Radio Buttons | "Enrolling", "Not Enrolling", "Sold" |
| Sub Header "Status Log & Notes" | Text | Sub Header "Status Log & Notes" | To give the heading for the screen being navigated |
| Status | Text | Status | Text for "Status" |
| Status | Non Editable Field | Status | |
| Notes | Text | Notes | Text for "Notes" |
| Notes | Text Area | Notes | Text Area for Notes |

-continued

| Element Name | Element Type | Label | Purpose |
|---|---|---|---|
| Follow Up date | Text | Follow Up date | Text for Follow Up date |
| Follow Up date | Calendar | Follow Up date | |
| Add | HTML Button | Add | Button for adding data in the temporary repository |
| HTML Table | Scrollable HTML Table | HTML Table | Table containing added values from the status log and notes |
| Save | HTML Button | Save | For saving into the repository |

3.1.14.3. Front End Validations

| S No | Present Status | Code | Present Status Description |
|---|---|---|---|
| | New | 1 | New Lead. The source of the lead could be a data upload of leads<br>New entries on a call from a group If there is a new entry on a call from a group, the status should be "New" with the Source Sub Type determining "Inbound Call." |
| | Dead | 2 | The Lead is a dead lead |
| | Re Call | 3 | When a call is made to the lead and the lead is found to reachable on a call but the rep is not able to make contact/wherever a recall has to be made |
| | Prospect -No Quote/ Materials | 4 | When a lead is contacted and is found eligible - and the lead shows interest but doesn't want a quote |
| | Prospect - Quote/Materials Sent | 5 | When a lead is contacted and is found eligible - and the lead shows interest and wants a quote |
| | Post Quote - Enrolling | 6 | If the present status is not "Dead" then allow change to enrolling status if the lead is in the process of enrolling (there could be instances where status 3 and/or 4 and/or 5 have been skipped all-together) |
| | Post Quote - Sold | 7 | The lead has enrolled and has been assigned a group number |

The present status shall be New (1) for a lead where the lead is new to the system and has not been followed up. The data is one that is uploaded into the system. There could be instances where the lead master is created when a lead calls up and this lead's status must be "New"

There shall be 6 sections Call status, Contact Result, Not-Qualified Lead Reasons, Qualified Lead Result, Not Interested Reason, Post Quote Result.

"Call Status" section is enabled when the Status is New (1) or Re-Call (3)

The Call status would have the radio buttons "Disconnected Number", "Wrong Number", "Unreachable", "Made Contact".

| Select Radio Button | Result |
|---|---|
| Disconnected Number | Change Status - Dead (2), Log |
| Wrong Number | Change Status - Dead (2), Log |
| Unreachable | Change Status - Recall (3), Log |
| Made Contact | Enable Section "Contact Result" |

Contact Result

The contact result section shall have the following radio buttons "Qualified Lead" and "Non-Qualified Lead"

| Select Radio Button | Result |
|---|---|
| Qualified Lead | Enable section "Qualified Lead Result" |
| Non-Qualified Lead | Enable section "Non-Qualified Lead Reasons" |

Non-Qualified Lead Reasons

The Non Qualified Reasons section shall have the following radio buttons "<2 eligible employees" and ">50 Eligible Employees"

| Select Radio Button | Result |
|---|---|
| <2 eligible employees | Change status = Dead (2)/Log |
| >5 Eligible employees | Change status = Dead (2)/Log |

Qualified Lead Result

The "Qualified Lead Result" section shall have the following radio buttons "Produced Quotes", "No Quote at his Time", "Not Interested"

| Select Radio Button | Result |
|---|---|
| Produced Quotes | Change Status = Prospect - Quote/Materials Sent (5) |

-continued

| Select Radio Button | Result |
|---|---|
| No Quote at this Time | Change Status = Prospect -No Quote/Materials (4) |
| Not Interested | Enable section - “Not Interested” Reasons” |

Not Interested Reasons

The “Not Interested Reasons” section shall have the following options “Not up for renewal”, “Doesn’t Want/Need/Provide Insurance”.

| Select Radio Button | Result |
|---|---|
| Not up for renewal - Call again | Change Status - Recall (3)/Log |
| Doesn’t Want/Need/Provide Insurance | Change Status - Dead (2) /Log |

Post Quote

The Post Quote section shall have the following radio buttons

| Select Radio Button | Result |
|---|---|
| Enrolling | Change Status - Post Quote Enrolling (6)/Log |
| Not Enrolling | Change Status - Dead (2)/Show an entry field for entering the reasons/log |
| Sold | Change Status - Sold - Show an entry field for entering the group number (7)/log |

Log

This section will contain the following

Status Log Non Editable Entry field with System Date

Notes Text Area

Follow-up Date—Calendar

Add function

Table that would have columns—Log—Log date—Notes—Follow up Date

The Status Log area would automatically have status entries based on whatever choices are made on the screen/maintain log. The Notes Text Area shall contain the space for entering any notes during a call. The next follow up date would be a calendar for choosing the next follow up date.

There could be times when the status has not changed and the log would be empty but notes may be there. In such instances the notes is only added to the table along with follow up date On adding the information, the information on the Log, Log Date, Notes and Follow up date gets added to the table and the user must save the information to have the data saved in the permanent repository, When ever the user comes to the lead tracking, the previously made notes/log must be non editable.

The user must add the log entries/Notes or must be displayed with an error dialog “Kindly add the Status Log & Notes”

The user will not be allowed to quit without saving the information

When a user logs in, based on the access control The user is provided with a screen with a button “Things to do today” which shall also be part of the Menu.

The user is provided with the user information to choose from and on selection of the same and confirming the user goes into the “Things to do Today Area”

The user would be provided with a report and with the functionality to print the same.

The report content shall be based on the following based on the follow-up date made by the user in all leads Details Of lead—Company Name, Contact Name, Phone, Status and “Lead Info” button which on pressing would lead to the opening of the lead master in another window.

A check box to confirm a call has been made

The report would be in scrollable table with check all, clear all feature.

The user must save the information to make the updates in the database

If the user has not completed all calls for the follow up day mentioned, must have the incomplete calls information under pending calls section when the user logs in the next day.

3.1.14.4. Screen Flow

4. Business Rule Mapping

| Activity | Rules |
|---|---|
| Create Lead ID | Auto generated ID with values 0000000001 to 9999999999 |
| Create Agent | Auto generated ID with values AG0000001 to AG99999999 |
| Create Agency | Auto generated ID with values AG00000001 to AG99999999 |

Benefit Partners Inc

Process Specification

Agent Profile

1. Introduction 1.1. Purpose

This functional specification document addresses the part of the sales and marketing system that would facilitate the creation of agent profile.

1.2. Business Use Case Specification Reference

| Business Use Specification ID | Business Use Case Name |
|---|---|
| None | None |

1.3. Definitions, Acronyms & Abbreviations

| Term | Explanation |
|---|---|

2. Process Identification 2.1. Process Description & Flow

Agent Profile facilitates in creating the profile of agents and ranking them accordingly. The results of this ranking would enable the sales & marketing team to focus on the agents from a better business perspective. The data generated out of an agent profile study leads to identify agent potential and necessary sales strategy.

The prerequisite for creating an agent profile for an agent is that the agent must have an entry in the Agent master.

3. User Interface 3.1. User Interface Screens 3.1.1. Screen ID's

| Screen ID (SID) | Screen Name | Corresponding HTML File Name |
|---|---|---|
| utl.agentprofile.create | Agent Profile | AgentProfile.jsp |
| utl.agentprofile.view | View Agent Profile | AgentProfileView.jsp |
| utl.agentprofile.search | Search Agent Profile | AgentProfileSearch.jsp |

3.1.2. User Interface ID: Create Agent Profile 3.1.2.1. Screen Name: Create Agent Profile (BPI_CAS_SM_SCR__003__001) (See FIG. M-39)

(See FIG. M-40)

3.1.2.2. SID, Element Name, Element Type & Purpose

| Element Name | Element Type | Label | Purpose |
|---|---|---|---|
| Main Header "Create Agent Profile" | Text | Main Header "Create Agent Profile" | To give the heading for the screen being navigated |
| Workgroup Name | Text | Workgroup Name | Text for "Agent ID" |
| Workgroup Name | Drop down list | Workgroup Name | Should list all the workgroup names within the system<br>The first option should be -- Choose One -.<br>Subsequent workgroup name should be listed in alphabetical order |
| Agent ID | Text | Agent ID | Text for "Agent ID" |
| Agent ID | Drop down list | Agent ID | Search Window showing the agent ids for the selected Child groups .The search feature shall contain the details of agents like agent ID, Agent name, Zip Code and the present rating based on.statistics available.<br>The user is also allowed to enter/query for a search based on the entry for an agent id. |
| Agent Name | Text | Agent Name | Text for "Agent Name" |
| Agent Name | Dynamic text | Agent Name | When you select a particular agent id you should get the Agent name. |
| Company Name | Text | Company Name | Text for "Agent Name" |
| Company Name | Dynamic text | Company Name | When you select a particular agent id you should get the company name. |
| Sub Header "Present Rating" | Text | Sub Header "Present Rating" | Heading for "Present Rating" |
| Present Rating 1 | Non Editable Text | Present Rating 1 | Text for rating - 1, 2, 3, 4 |
| Present Rating 2 | Non Editable Text | Present Rating 2 | Text for rating - Inactive, Quoter, Active & Producer |
| Sub Header "Profile Information" | Text | Sub Header "Profile Information" | Heading for "Profile Information" |
| Text for " Do you currently sell health Insurance?" | Text | Text for " Do you currently sell health Insurance?" | Text for" Do you currently sell health Insurance?" |
| Radio Button with Yes label | Radio Button | Radio Button with Yes label | Radio Button with "Yes" Label |
| Radio Button with No label | Radio Button | Radio Button with No label | Radio Button with "No" Label |
| Text for " Do you sell Pac Advantage?" | Text | Text for " Do you sell Pac Advantage?" | Text for " Do you currently sell Pac Advantage?" |
| Radio Button with Yes label | Radio Button | Radio Button with Yes label | Radio Button with "Yes" Label |
| Radio Button with No label | Radio Button | Radio Button with No label | Radio Button with "No" Label |
| Radio Button with Unknown label | Radio Button | Radio Button with Unknown label | Radio Button with "Unknown" Label Shall be default |
| Text for "what Insurance Types dealing with? | Text | Text for "what Insurance Types dealing with? | Text for" what insurance Types dealing with?" |
| Check Box selection for<br>1) Life<br>2) Home<br>3) P&C<br>4) Disability<br>5) Auto<br>6) Securities<br>7) Health<br>8) Others | Check Box | Check Box selection for<br>9) Life<br>10) Home<br>11) P&C<br>12) Disability<br>13) Auto<br>14) Securities<br>15) Health<br>16) Others | Check Box for selection |
| Text for | Text | Text for | Text for "Percentage time focused on |

-continued

| Element Name | Element Type | Label | Purpose |
|---|---|---|---|
| "Percentage time focused on selling health insurance" | | "Percentage time focused on selling health insurance" | selling health insurance" |
| Entry field for "Percentage time focused on selling health insurance" | Entry Field | Entry field for "Percentage time focused on selling health insurance" | Entry field accepting Positive percentage values till 100 |
| Text for "Average Group Size (with In Pac Advantage)" | Text | Text for "Average Group Size (with In Pac Advantage)" | Text for "Average Group Size (with In Pac Advantage)" |
| Entry field for "Average Group Size (with In Pac Advantage)" | Entry Field | Entry field for "Average Group Size (with In Pac Advantage)" | Entry Field showing information on average group size in Pac Advantage |
| Text for "Average Group Size (outside Pac advantage) | Text. | Text for "Average Group Size (outside Pac advantage) | Text for "Average Group Size (outside Pac Advantage) |
| Entry Field for "Average Group Size (outside Pac advantage)" | Entry Field | Entry Field for "Average Group Size (outside Pac advantage)" | Entry Field for entering information on average group size outside Pac Advantage |
| Text for "Years in Business" | Text | Text for "Years in Business" | Text for "Years in Business" |
| Entry field for "Years in Business" | Entry Field | Entry field for "Years in Business" | Entry Field entering "Years in Business" |
| Text for "% of staff concentrating on health Insurance" | Text | Text for "% of staff concentrating on health Insurance" | Text for "% of staff concentrating on health Insurance" |
| Entry field for "% of staff concentrating on health Insurance" | Entry Field | Entry field for "% of staff concentrating on health Insurance" | Entry field for entering "% of staff concentrating on health Insurance" |
| Sub Heading For "Subjective Rating" | Text | Sub Heading For "Subjective Rating" | Sub Heading for "Subjective Rating" |
| Text for "Broker Knowledge of Pac Advantage" | Text | Text for "Broker Knowledge of Pac Advantage" | Text for "Broker Knowledge of Pac Advantage" |
| Text for "Broker Potential" | Text | Text for "Broker Potential" | Text for "Broker Potential" |
| Text for "Broker Loyalty & Confidence with Pac Advantage" | Text | Text for "Broker Loyalty & Confidence with Pac Advantage" | Text for "Broker Loyalty & Confidence with Pac Advantage" |
| Radio Button selection<br>1) 0<br>2) 1<br>3) 2<br>4) 3<br>5) 4<br>6) 5 | Radio Button | Radio Button selection<br>7) 0<br>8) 1<br>9) 2<br>10) 3<br>11) 4<br>12) 5 | Radio Button selection |
| Sub Heading "Other Information" | Text | Sub Heading "Other Information" | Text for "Other Information" |
| Text for "Marketing Methods" | Text | Text for "Marketing Methods" | Text for "Marketing Methods' |
| List for marketing methods | List | List for marketing methods | List for marketing methods |
| Text for "No 1 Selling Plan" | Text | Text for "No 1 Selling Plan" | Text for "No 1 Selling Plan" |
| List for "No 1 Selling Plan " | List | List for "No 1 Selling Plan " | List for No 1 Selling Plan |
| Text for "No 2 Selling Plan" | Text | Text for "No 2 Selling Plan" | Text for "No 2 Selling Plan" |
| List for "No 2 Selling Plan " | List | List for "No 2 Selling Plan " | List for No 2 Selling Plan |
| Save Button | HTML Button | Save Button | Saves the information |
| Cancel Button | HTML Button | Cancel Button | Resets to Original values |

3.1.2.3. Front End Validations

| Element Name | Action/Validation Details | Error Message Text |
|---|---|---|
| Save | All fields are non mandatory The following fields must be positive numeric entries<br><br>Percentage of time focused on health insurance(0-100)<br><br>Average Groups size (within Pac Advantage)<br>Average group size (not within PacAdvanatge)<br>Years in Business (0-999)<br>% Of staff concentrating on health insurance (0-100) | When the save HTML Button is pressed with an invalid entry, an error dialog box pops up with the message " Please enter valid numeric values" with "yes" option On press of Yes Button, The cursor must be placed on the corresponding first entry field |

3.1.2.4. Screen Flow

When the user first calls for the step 1 screen, the user is displayed with the choose child work group search feature. The child work group shall contain only those child work-groups, which belong to the category "Agents". The child workgroups contain a non-editable entry field with search option.

The following are the scenarios the user may come across when operating on the screen

| Scenario | Description |
|---|---|
| On Entering the screen | The List of Child work groups be displayed. The child work groups shall contain only those child work groups which are under the category "Agent" |
| After selecting a child work group | The user after selecting the child workgroup, it gets the agents and will be displayed. |
| After selecting a agent id | Agent ID with search feature in the screen snapshot, present rating and average group size for Pac advantage is populated with the real time values on selection of an agent id.<br>All subjective rating will have default values of Unknown.<br>For queries- "Do you currently sell health Insurance?" and "Do you sell Pac Advantage?" - default values is "Yes"<br>Marketing Methods, No 1 Selling Plan and No 2 Selling Plan would default with 'Choose One " Option and the values shall be picked up from the product profile ID from the carrier master. |
| Save | Saves data into the permanent repository on saving the information after the validation checks and goes to the confirmation page |
| Cancel | Resets values to original values |
| Close the browser without saving/ Navigating to another page without saving | The browser window cannot be closed/user can't navigate to another page without saving the data. The user is prompted with the option of either saving the data and closing/leaving the window or not saving the data and closing/leaving the window. |
| Close the browser/ leave the page after saving | The browser window can be closed/user can leave once all the data is saved in the permanent repository. |

3.1.3. User Interface ID: Search Agent Profile 3.1.3.1. Screen Name: Search Agent Profile (BPI_CAS_SM_SCR__003__002)

This screen below captures the information for searching an existing "Agent Profile".

Step—1: Enter the mandatory agent information and click the search button. This page will display the result of search. User can choose a agent and navigate to either "Modify" screen or "View" screen. (See FIG. M-41)

3.1.3.2. SID, Element Name, Element Type & Purpose

| Element Name | Element Type | Label | Purpose |
|---|---|---|---|
| Main Header "Agent Search" | Text | Main Header "Agent Search" | To give the heading for the screen |
| Agent ID | Text | Agent ID | Text For " Agent ID" |
| Agent ID | Entry Field | Agent ID | Entry field for agent id |
| First Name | Text | First Name | Text For "First Name" |
| First Name | Entry Field | First Name | Entry field for First Name |
| Last Name | Text | Last Name | Text for Last Name |
| Last Name | Entry Field | Last Name | Entry field for Last Name |
| Company | Text | Company | Text For "First "Company" |
| Company | Entry Field | Company | Entry field for Company |
| Phone | Text | Phone | Text for "Phone" |
| Phone | Entry Field | Phone | Entry field for Phone |

-continued

| Element Name | Element Type | Label | Purpose |
|---|---|---|---|
| Tax ID | Text | Tax ID | Text For " Tax ID" |
| Tax ID | Select Feature | Tax ID | Entry field for Tax |
| Agent Button Radio | Radio Button | Agent Button Radio | Used to select the agent for modifying or viewing/deleting. |
| Modify | HTML Button | Modify | Agents to the modify screen of the selected agent |
| View/Delete | HTML Button | View/Delete | Agents to the view/delete screen of the selected |

3.1.3.3. Front End Validations

| Element Name | Action/Validation Details | Error Message Text |
|---|---|---|
| Agent ID | Mandatory. Any one of the fields in the search screen is mandatory. Accepts Alphanumeric values only | Error Dialog Box on Search "Accepts Alphanumeric values only." |

3.1.3.4. Screen Flow

The following are the scenarios the user may come across when operating on the search screen.

| Scenario | Description |
|---|---|
| Search | The system checks for all the validations for all the mandatory information. Fetches the agent(s) that matches with the search conditions. |
| Cancel | Clears the search fields |

3.1.4. User Interface ID: Modify Agent Profile 3.1.4.1. Screen Name: Modify Agent Profile (BPI_CAS_SM_SCR__003__003) (See FIG. M-42)

(See FIG. M-43)

3.1.4.2. SID, Element Name, Element Type & Purpose

This screen contains the default values—the values created in the database on creation of agent profile

| Element Name | Element Type | Label | Purpose |
|---|---|---|---|
| Main Header "Modify Agent Profile" | Text | Main Header "Modify Agent Profile" | To give the heading for the screen being navigated |
| Agent ID | Text | Agent ID | Text for "Agent ID" |
| Agent ID | Non Editable Text | Agent ID | Text for Agent for selected agent profile |
| Sub Header "Present Rating" | Text | Sub Header "Present Rating" | Heading for "Present Rating" |
| Present Rating 1 | Non Editable Text | Present Rating 1 | Text for rating - 1, 2, 3, 4 |
| Present Rating 2 | Non Editable Text | Present Rating 2 | Text for rating - Inactive, Quoter, Active & Producer |
| Sub Header "Profile Information" | Text | Sub Header "Profile Information" | Heading for "Profile Information" |
| Text for "Do you currently sell health Insurance?" | Text | Text for "Do you currently sell health Insurance?" | Text for "Do you currently sell health Insurance" |
| Radio Button with Yes label | Radio Button | Radio Button with Yes label | Radio Button with "Yes" Label |
| Radio Button with No label | Radio Button | Radio Button with No label | Radio Button with "No" Label |
| Text for "Do you currently sell Pac Advantage?" | Text | Text for "Do you currently sell Pac Advantage?" | Text for "Do you currently sell Pac Advantage?" |
| Radio Button with Unknown label | Radio Button | Radio Button with Unknown label | Radio Button with "Unknown" Label |
| Radio Button with Yes label | Radio Button | Radio Button with Yes label | Radio Button with "Yes" Label |
| Radio Button with No label | Radio Button | Radio Button with No label | Radio Button with "No" Label |
| Text for "what Insurance Types dealing with? | Text | Text for "what Insurance Types dealing with? | Text for "what insurance Types dealing with?" |
| Check Box selection for<br>Life<br>Home<br>P&C<br>Disability<br>Auto | Check Box | Check Box selection for<br>Life<br>Home<br>P&C<br>Disability<br>Auto | Check Box for selection |

-continued

| Element Name | Element Type | Label | Purpose |
|---|---|---|---|
| Securities<br>Health<br>Others | | Securities<br>Health<br>Others | |
| Text for "Percentage time focused on Health Insurance" | Text | Text for "Percentage time focused on Health Insurance" | Text for "Percentage time focused on Health Insurance" |
| Entry field for "Percentage time focused on health Insurance" | Entry Field | Entry field for "Percentage time focused on health Insurance" | Entry field accepting Positive percentage values till 1100 |
| Text for "Average Group Size (with In Pac Advantage)" | Text | Text for "Average Group Size (with In Pac Advantage)" | Text for "Average Group Size (with In Pac Advantage)" |
| Entry field for "Average Group Size (with In Pac Advantage)" | Entry Field | Entry field for "Average Group Size (with In Pac Advantage)" | Entry Field showing information on average group size in Pac Advantage |
| Text for "Average Group Size (outside Pac advantage) | Text | Text for "Average Group Size (outside Pac advantage) | Text for "Average Group Size (outside Pac Advantage) |
| Entry Field for "Average Group Size (outside Pac advantage)" | Entry Field | Entry Field for "Average Group Size (outside Pac advantage)" | Entry Field for entering information on average group size outside Pac Advantage |
| Text for "Years in Business" | Text | Text for "Years in Business" | Text for "Years in Business" |
| Entry field for "Years in Business" | Entry Field | Entry field for "Years in Business" | Entry Field entering "Years in Business" |
| Text for "% of staff concentrating on health Insurance" | Text | Text for "% of staff concentrating on health Insurance" | Text for "% of staff concentrating on health Insurance" |
| Entry field for "% of staff concentrating on health Insurance" | Entry Field | Entry field for "% of staff concentrating on health Insurance" | Entry field for entering "% of staff concentrating on health Insurance" |
| Sub Heading For "Subjective Rating" | Text | Sub Heading For "Subjective Rating" | Sub Heading for "Subjective Rating" |
| Text for "Broker Knowledge of Pac Advantage" | Text | Text for "Broker Knowledge of Pac Advantage" | Text for "Broker Knowledge of Pac Advantage" |
| Text for "Broker Potential" | Text | Text for "Broker Potential" | Text for "Broker Potential" |
| Text for "Broker Loyalty & Confidence with Pac Advantage" | Text | Text for "Broker Loyalty & Confidence with Pac Advantage" | Text for "Broker Loyalty & Confidence with Pac Advantage" |
| Radio Button selection<br>Unknown<br>Neutral<br>Neutral+<br>Mild<br>Positive<br>Positive+<br>Very Positive | Radio Button | Radio Button selection<br>Unknown<br>Neutral<br>Neutral+<br>Mild<br>Positive<br>Positive+<br>Very Positive | Radio Button selection |
| Sub Heading "Other Information" | Text | Sub Heading "Other Information" | Text for "Other Information" |
| Text for "Marketing Methods" | Text | Text for "Marketing Methods" | Text for "Marketing Methods" |
| List for marketing methods | List | List for marketing methods | List for marketing methods |
| Text for "No 1 Selling Plan" | Text | Text for "No 1 Selling Plan" | Text for "No 1 Selling Plan" |
| List for "No 1 Selling Plan" | List | List for "No 1 Selling Plan" | List for No 1 Selling Plan |
| Text for "No 2 Selling Plan" | Text | Text for "No 2 Selling Plan" | Text for "No 2 Selling Plan" |
| List for "No 2 Selling Plan" | List | List for "No 2 Selling Plan" | List for No 2 Selling Plan |

-continued

| Element Name | Element Type | Label | Purpose |
|---|---|---|---|
| Modify | HTML Button | Modify | Modifies the data |
| Cancel | HTML Button | Cancel | Resets to the original created values |

3.1.4.3. Front End Validations

| Element Name | Action/Validation Details | Error Message Text |
|---|---|---|
| Modify | All fields are non mandatory The following fields must be positive numeric entries Percentage of time focused on health Insurance (0-100) Average Groups size (with in Pac Advantage) Average group size (not with in PacAdvanatge) Years in Business (0-999) % Of staff concentrating on health insurance (0-100) | When the modify HTML Button is pressed with an invalid entry, an error dialog box pops up with the message "Please enter valid numeric values" with "yes" option On press of Yes Button, The cursor must be placed on the corresponding entry field |

3.1.4.4. Screen Flow

| Scenario | Description |
|---|---|
| On entering the screen | All values default to the created values. Non-editable text includes the agent id and present ratings, which is dynamic. |
| Modify | Modifies data in the permanent repository on saving the information after the validation checks and goes to the confirmation page |

3.1.5. User Interface ID: View Agent Profile 3.1.5.1. Screen Name: View Agent Profile (BPI_CAS_SM_SCR__003__004) (See FIG. M-44)

3.1.5.2. SID, Element Name, Element Type & Purpose

This screen contains only the values—the values created in the database on creation/modification of agent profile All the values are NOT EDITABLE

| Element Name | Element Type | Label | Purpose |
|---|---|---|---|
| Main Header "View Agent Profile" | Text | Main Header "View Agent Profile" | To give the heading for the screen being navigated |
| Agent ID | Text | Agent ID | Text for "Agent ID" |
| Agent ID | Non Editable Text | Agent ID | Non Editable Text showing the agent ID for the associated agent profile ID |
| Sub Header "Present Rating" | Text | Sub Header "Present Rating" | Heading for "Present Rating" |
| Present Rating 1 | Non Editable Text | Present Rating 1 | Text for rating - 1,2,3,4 |
| Present Rating 2 | Non Editable Text | Present Rating 2 | Text for rating - Inactive, Quoter, Active & Producer |
| Sub Header "Profile Information" | Text | Sub Header "Profile Information" | Heading for "Profile Information" |
| Text for "Do you currently sell health Insurance?" | Text | Text for "Do you currently sell health Insurance?" | Text for "Do you currently sell health Insurance?" |
| Radio Button with Yes label | Radio Button | Radio Button with Yes label | Radio Button with "Yes" Label |
| Radio Button with No label | Radio Button | Radio Button with No label | Radio Button with "No" Label |
| Text for "Do you currently sell Pac Advantage?" | Text | Text for "Do you currently sell Pac Advantage?" | Text for "Do you currently sell Pac Advantage?" |
| Radio Button with Unknown label | Radio Button | Radio Button with Unknown label | Radio Button with "Unknown" Label |
| Radio Button with Yes label | Radio Button | Radio Button with Yes label | Radio Button with "Yes" Label |
| Radio Button with No label | Radio Button | Radio Button with No label | Radio Button with "No" Label |
| Text for "what Insurance Types dealing with?" | Text | Text for "what Insurance Types dealing with?" | Text for "what insurance Types dealing with?" |
| Check Box selection for<br>Life<br>Home<br>PFC<br>F&C<br>Disability<br>Auto<br>Securities<br>Health | Check Box | Check Box selection for<br>Life<br>Home<br>PFC<br>F&C<br>Disability<br>Auto<br>Securities<br>Health | Check Box for selection |

-continued

| Element Name | Element Type | Label | Purpose |
|---|---|---|---|
| Others | | Others | |
| Text for "Percentage of time focused on health Insurance" | Text | Text for "Percentage of time focused on health Insurance" | Text for "Percentage of time focused on health insurance" |
| Non Editable Entry field for "Percentage of health insurance sold vs. Total Products sold" | Non Editable Entry Field | Non Editable Entry field for "Percentage of health insurance sold vs. Total Products sold" | Non Editable Entry field accepting Positive percentage values till 100 |
| Text for "Average Group Size (with In Pac Advantage)" | Text | Text for "Average Group Size (with In Pac Advantage)" | Text for "Average Group Size (with In Pac Advantage)" |
| Non Editable Entry field for "Average Group Size (with In Pac Advantage)" | Non Editable Entry Field | Non Editable Entry field for "Average Group Size (with In Pac Advantage)" | Non Editable Entry Field showing information on average group size in Pac Advantage |
| Text for "Average Group Size (outside Pac advantage) | Text | Text for "Average Group Size (outside Pac advantage) | Text for "Average Group Size (outside Pac Advantage) |
| Non Editable Entry Field for "Average Group Size (outside Pac advantage)" | Non Editable Entry Field | Non Editable Entry Field for "Average Group Size (outside Pac advantage)" | Non Editable Entry Field for entering information on average group size outside Pac Advantage |
| Text for "Years in Business" | Text | Text for "Years in Business" | Text for "Years in Business" |
| Non Editable Entry field for "Years in Business" | Non Editable Entry Field | Non Editable Entry field for "Years in Business" | Non Editable Entry Field entering "Years in Business" |
| Text for "% of staff concentrating on health Insurance" | Text | Text for "% of staff concentrating on health Insurance" | Text for "% of staff concentrating on health Insurance" |
| Non Editable Entry field for "% of staff concentrating on health Insurance" | Non Editable Entry Field | Non Editable Entry field for "% of staff concentrating on health Insurance" | Non Editable Entry field for entering "% of staff concentrating on health Insurance" |
| Sub Heading For "Subjective Rating" | Text | Sub Heading For "Subjective Rating" | Sub Heading for "Subjective Rating" |
| Text for "Broker Knowledge of Pac Advantage" | Text | Text for "Broker Knowledge of Pac Advantage" | Text for "Broker Knowledge of Pac Advantage" |
| Text for "Broker Potential" | Text | Text for "Broker Potential" | Text for "Broker Potential" |
| Text for "Broker Loyalty & Confidence with Pac Advantage" | Text | Text for "Broker Loyalty & Confidence with Pac Advantage" | Text for "Broker Loyalty & Confidence with Pac Advantage" |
| Radio Button selection<br>Unknown<br>Neutral<br>Neutral+<br>Mild<br>Positive<br>Positive+<br>Very Positive | Radio Button | Radio Button selection<br>Unknown<br>Neutral<br>Neutral+<br>Mild<br>Positive<br>Positive+<br>Very Positive | Radio Button selection |
| Sub Heading "Other Information" | Text | Sub Heading "Other Information" | Text for "Other Information" |
| Text for "Marketing Methods" | Text | Text for "Marketing Methods" | Text for "Marketing Methods' |
| Non Editable field for marketing methods | Non Editable field | Non Editable field for marketing methods | Non Editable field for marketing methods |
| Text for "No 1 Selling Plan" | Text | Text for "No 1 Selling Plan" | Text for "No 1 Selling Plan" |
| Non Editable field | Non Editable | Non Editable field | Non Editable field for No 1 Selling Plan |

-continued

| Element Name | Element Type | Label | Purpose |
|---|---|---|---|
| for "No 1 Selling Plan" | field | for "No 1 Selling Plan" | |
| Text for "No 2 Selling Plan" | Text | Text for "No 2 Selling Plan" | Text for "No 2 Selling Plan" |
| Non Editable field for "No 2 Selling Plan" | Non Editable field | Non Editable field for "No 2 Selling Plan" | Non Editable field for No 2 Selling Plan |

3.1.5.3. Front End Validations

None.

Average Group size with in Pac Advantage—Picks up the real time value from the database for the agent.

Profile Information Ratings

| | | | Corresponding Rank Value | | | | |
|---|---|---|---|---|---|---|---|
| Item | Type | Description | 1 | 2 | 3 | 4 | 5 |
| Do you currently sell health insurance? | Y/N | Manual Enter | N | Y | N/A | N/A | N/A |
| Percentage of time focused on health Insurance | % | Manual Enter | <60% | 61-70% | 71-80% | 81-90% | 90-100% |
| Average Group Size (outside PacAdvanatge) | Int | Manual Enter | >50 | 1-5 | 6-10 | 11-15 | >15 |
| Average Group Size (within PacAdvanatge) | Int | System Calc | >50 | 1-5 | 6-10 | 11-15 | >15 |
| Date Business Began (years in business) | Date | Manual Enter | >15 | <2 | 2-5 | 5-10 | 10-15 |
| % of Staff concentrating on health? | % | Manual Enter | <60% | 61-70% | 71-80% | 81-90% | 90-100% |

3.1.5.4. Screen Flow

| Scenario | Description |
|---|---|
| On Entering the screen | All values default to the Non Editable created/modified values. Present rating would be dynamic. |

4. Business Rule Mapping

The agent is evaluated with the following ratings. The ratings are established on 2 accounts. One is when the user enters the screen—displays the present rating and another on completion on save operation. The system does an automatic rating of the agent and the same can be viewed by reports and on modify operation. The sales rep on entering the values saves the data and the ratings are picked up based on entries made (ratings described below). The cumulative ratings are stored in the database for reporting purposes.

| Activity | Rules |
|---|---|
| Create Agent profile | Should have unique Id 4 digit for a agent profile record with an increment of 1, Say 1000, 1001, 1002 and so on. |

Present Rating for Pac Advantage Business

| PacAdvantage Business | Broker Potential | Value |
|---|---|---|
| Zero sold cases and zero quotes in last 12 months | Inactive | 1 |
| Zero sold cases and 1+ quotes in last 12 months | Quoter | 2 |
| New agent or old agent with renewed interest (other than the balance 4) | Prospect | 3 |
| 1+ sold cases in last 12 months | Active | 4 |
| 1+ sold cases and 1+ quotes in last 12 months (consistently quoting and selling) | Producer | 5 |

Subjective Ratings

Broker Relationship and Loyalty: Sales Reps opinion of this broker's loyalty to and confidence in PacAdvantage as a program and concept as well as their confidence in PacAdvantage administrative abilities and responsiveness.

0. (Unknown)—No Data available 1. (Neutral)

Neutral Impression of PacAdvantage. Sells PacAdvantage if there are no other choices available.

2. (Neutral Plus)

Agent has a somewhat favorable but guarded impression of PacAdvantage program and it's responsiveness. Sells PacAdvantage when group has too many Kaiser enrollees, when pricing is favorable, or when program is specifically requested but prefers to sell other health products or competing programs.

3. (Mild Positive)

The agent has a positive impression of PacAdvantage program. Sees value in choice concept. Confident in the administration of the PacAdvantage program, but often sells competing products.

4. (Positive Plus)

Agent is fully confident of PacAdvantage administration and concept. Sells us in most situations; may occasionally sell a competing product.

5. (Very Positive)

Agent promotes the choice concept. Has total confidence in PacAdvantage product, service and administration. Sells PacAdvantage before all other products and competing programs. Broker Knowledge Of PacAdvantage: Sales Reps opinion of this broker's knowledge of choice. Includes PacAdvantage and other choice based product concepts (i.e. CC, BC). Ranks brokers' confidence in being able to independently sell and promote PacAdvantage and related programs.

0. (Unknown)—No Data available 1. (Neutral) Agent has little or no knowledge of PacAdvantage or other choice programs and products.

2. (Neutral Plus) Knows a little about PacAdvantage and other choice programs, but focus and preference is for other health products. Requires significant coaching on basics of our product, the choice concept and PacAdvantage administration.

3 (Mild Positive)

Agent understands basics of choice programs and PA, but may not be familiar with many administrative details of PA, (i.e. enrollment guidelines, participation rules, paperwork requirements, etc.). Does not know all the situations were Pac Advantage or other choice programs can "fit" (answer: just about everywhere). Requires some coaching on the product and concept.

4. (Positive Plus)

Agent is pretty familiar with PA and its admin rules. Knows most, but not all situations where choice programs work.

They can freely and independently discuss and promote PA or other programs with clients, but may require assistance from time to time.

5. (Very Positive)

Agent Broker has very good understanding of choice based programs and concepts and has a solid grasp of most PA administrative details. Familiar with all the situations where PA or other choice based programs "fit". Can confidently sell Pac Advantage or other choice programs with little or no assistance.

Broker Potential

Sales Reps opinion of this broker's involvement or interest in all OTHER HEALTH INSURANCE programs, besides PacAdvantage, and the reps assessment of this broker's NEW SALES potential for PA.

0. (Unknown)—No data Available 1 (Neutral) Inactive or broker does very little health insurance. Broker has indicated little or no interest in new group health selling. Does not sell any or very few other group health insurance products.

2. (Neutral Plus)

Broker sells some group health insurance cases upon request, (three or more annually) but it is not the primary focus of business.

3. (Mild positive)

Broker has other some health business, (more than 10 cases) and focus is at least 10% on group health. Actively promotes small business health insurance to clients. May primarily work with competing programs but have potential to produce some PacAdvantage Business.

4. (Positive Plus)

Broker has a significant amount of existing small group business (20 or more groups). Actively interested in selling more group health to all current and prospective clients. Focus is 30% or more on group health.

5. (Very Positive)

Broker sells a lot of health insurance and/or has access to a significant amount of small group health insurance business. Focus is at least 50% or more on group health. May have involvement with larger groups, or association business. May be selling some or a significant amount of PacAdvantage, but has potential to produce even more. May be a current top PA producer OR a significant producer for competing plan(s), (i.e., Cal Choice, Blue Cross, Kaiser direct). "Significant" is defined as 10 or more new sales annually.

Cumulative Ratings Stored in Database: Based on the points system @1-5 the cumulative values are stored in the database and is used for reporting purposes.

A Backend subroutine runs at 1200 at night everyday to calculate the Present rating of the agent based on quotes made, cases sold, average group size. This data would be calculated and updated against individual agents and shown in Step 2 screen when accessed.

Benefit Partners Inc

Process Specification

Create Quotes

1. Introduction 1.1. Purpose

The purpose of this document is to describe the process of Create Quotes. This document identifies how the user interacts with the system, the data to be captured, the business logic to be implemented, and the output of the process.

1.2. Business Use Case Specification Reference

| Business Use Specification ID | Business Use Case Name |
|---|---|
| BPI_SCOPE_SM | External Communication |
| BPI_SCOPEP_SM_005 | Create Quote Master |
| BPI_SCOPEP_SM_006 | Create Lead Master |

1.3. Definitions, Acronyms & Abbreviations

| Term | Explanation |
|---|---|

2. Process Identification 2.1. Background

Quotes are provided for potential business entities as well as existing business entities. Quotes can be requested for small Employer Groups or Alternate Groups (Individual Association Member, Association Group, COBRA etc.) as well as for employees of those groups.

2.2. Process Description

The objective of the Create Quotes process is to:

1) Provide functionality to create, view and modify quotes

The process should support collecting and storing configurable information for quoting purposes. A quote should be unique for each Group and Lead to allow history of data provided for a quote. The process should also support the versioning of each quote output.

The following are the other requirements that will be supported and constraints on the proposed system:

1) The system should allow for updates using current enrollment for existing groups and members
2) The system should allow for quoting specific carriers for an employee or for all employees
3) The system should allow for excluding certain carriers from a quote
4) The system should allow for calculating the rate differential based on the following entry fields: total eligible employees, total waiving, total declining, total COBRAs
5) The system should allow for quoting based on blended and non-blended fee structure
6) The system should allow for configurable agent fees
7) The system should allow the user to choose output types including:
   (a) Group Rate Summary
   (b) Group Rate Summary and Worksheet
   (c) Group Rate Summary, Worksheet and EE Pages
   (d) Employee Quote
   (e) COBRA Quote (Cal or Fed)

(f) Individual Association Member Quote (g) ROE Quote

8) System should allow for configurable effective dates of quotes based on current date and/or enrollment effective date if it is an existing group 9) The system should have a functionality to list out all missing information for a quote. It should also have the functionality to print/fax/email this to the agent/prospective group who requested for the quote. At this point in time, the user should be able to save the quote for retrieval at a later point in time.

2.3. Process Flow

Process for Create, View and Modify Quotes

1) Enter Tracking Dates

2) Choose Lead ID or Group ID; agent information if any gets auto-populated

3) Choose all line if coverage to quote; alternately use default coverage

4) Define contribution for employee/dependent by line of coverage; alternately use default contribution 5) Choose fee type (blended/non-blended). This would default, if Lead, to blended, if Group, to whichever fee structure the group is on)

6) Re-configure agent fee, if applicable

7) Create employee list; for existing groups this gets auto-populated using current enrollment; for prospective groups this information can be uploaded from a comma-separated (CSV) data file.

8) Adjust employee totals as needed i. # waiving ii. #declining iii. #COBRAs

9) Quote/exclude specific carriers

10) Choose quote type i. Group ii. Employee iii. Individual iv. COBRA

11) Choose output type i. Group Summary ii. Group Summary and Worksheet iii. Group Summary, Worksheet and employee pages 12) Specify effective date for quote 13) Choose mode of output i. View ii. Email iii. Fax iv. Print for mailing (in the mailroom)

14) For print, email, fax options, choose "Send to whose attention" in a pop-up window i. Agent's attention ii. Group's Attention iii. Other—For "Other", enter "attention to", address and/or email address and/or fax #

3. User Interface 3.1. User Interface Screens 3.1.1. Create Quotes 3.1.1.1. Screen Snapshot Screen 1—1 (See FIG. M-45)

Screen 1—2 (See FIG. M-46)

Screen 2—1 (See FIG. M-47)

Screen 2—2 (See FIG. M-48)

Screen 3—1 (See FIG. M-49)

Screen 3—2 (See FIG. M-50)

Screen 4—1 (See FIG. M-51)

Screen 4—2 (See FIG. M-52)

Screen 5—1 (See FIG. M-53)

3.1.1.2. Element Name, Element Type & Purpose

Screen1

| Element Name | Element Type | Label | Purpose |
|---|---|---|---|
| Quote Information | | | |
| Quote Number | Display Text | Quote # | Unique id for a quote. There will be only one quote associated with each group/lead. |
| Revision | Display Text | Rev | Revision # of the quote |
| Quote Date | Display Text | Date | Quote Date |
| Lead/Group Type | Display Text | Type | Type of the lead/group to whom quote is generated |
| Lead/Group Id | Display Text | Lead/Group Id | Id of the lead/group to whom quote is generated |
| Lead/Group Name | Display Text | Lead/Group Name | Name of the lead/group to whom quote is generated |
| Lead/Group Information | | | |
| Quoting For | Radio Boxes | Quote For | To specify whether quoting for lead or an existing group |
| Lead/Group Id | Text Box | Lead/Group Id | To specify the id of lead/group quoted |
| Populate Current Enrollment | Link | Populate Current Enrollment | To populate the current enrollment details for a group. Shown only when the quote is for existing group. |
| Other Revisions | Option Box | Other Revisions | To populate the other version of the quote. Shown only when the quote has more than one version. |
| General Information | | | |
| Quote Date | Text Box | Quote Date | To specify quote date |
| Mode of Request | Option Box | Mode of Request | Mode in which request for quote was received; possible values are: USPS, Phone, Fax, Email |
| Request Postmark Date | Text Box | Postmark Date | Postmark date of request for quote |
| Request Receive Date | Text Box | Receive Date | Date on which request for quote was received |
| Rate Type | Radio Boxes | Rate Type | To specify the rate type used for quoting. Possible values are: Blended and non-blended |

-continued

| Element Name | Element Type | Label | Purpose |
|---|---|---|---|
| Agent Commission | Text Box | Agent Commission | To specify agent commission to be used for quoting. |
| Effective Date | Text Box | Effective Date | To specify an effective date for the quote |
| | | Group Information | |
| Group Name | Display Text | Group Name | Displays name of the lead/group being quoted |
| Contact Name | Display Text | Contact Name | Displays name of contact for the lead/group |
| Address | Display Text | Address | Displays address of lead/group |
| Phone | Display Text | Phone | Displays phone # of the lead/group |
| Effective Date | Display Text | Effective Date | Displays effective in case of quoting for a group |
| ROE Date | Display Text | ROE Date | Displays ROE date in case of quoting for a group |
| Status | Display Text | Status | Displays status in case of quoting for a group |
| | | Agent Information | |
| Agent Id | Display Text | Agent Id | Displays id of agent associated with lead/agent |
| Agent Name | Display Text | Agent Name | Displays name of agent associated with lead/agent |
| Address | Display Text | Address | Displays address of agent associated with lead/agent |
| Phone | Display Text | Phone | Displays phone # of agent associated with lead/agent |
| Fax | Display Text | Fax | Displays fax # of agent associated with lead/agent |
| E-mail lead/agent | Display Text | E-mail | Displays email address of agent associated with |
| Workgroup | Display Text | Workgroup | Displays workgroup associated with lead/agent |
| | | Coverage & Contribution Information | |
| Use default coverage and contribution | Check Box | Use default coverage and contribution | To specify that quote has to be generated using default coverage and contribution |
| Contribution Type/Medical | Option Box | Contribution Type/Medical | To specify contribution type for medical. |
| Specified Plan/Medical | Option Box | Specified Plan/Medical | To specify a plan when option is "% specified plan" for medical. |
| Value for EE ($/%)/Medical | Text Box | Value for EE ($/%)/Medical | To specify contribution % or value for medical. |
| Value for Dep ($/%)/Medical | Text Box | Value for Dep ($/%)/Medical | To specify contribution % or value for medical. |
| Contribution Type/Dental | Option Box Type/Dental | Contribution | To specify contribution type for Dental. |
| Specified Plan/Dental | Option Box | Specified Plan/Dental | To specify a plan when option is "% specified plan" for Dental. |
| Value for EE ($/%)/Dental | Text Box | Value for EE ($/%)/Dental | To specify contribution % or value for Dental. |
| Value for Dep ($/%)/Dental | Text Box | Value for Dep ($/%)/Dental | To specify contribution % or value for Dental. |
| Contribution Type/Vision | Option Box | Contribution Type/Vision | To specify contribution type for Vision. |
| Specified Plan/Vision | Option Box | Specified Plan/Vision | To specify a plan when option is "% specified plan" for Vision. |
| Value for EE ($/%)/Vision | Text Box | Value for EE ($/%)/Vision | To specify contribution % or value for Vision. |
| Value for Dep ($/%)/Vision | Text Box | Value for Dep ($/%)/Medical | To specify contribution % or value for Vision. |
| Contribution Type/CAM | Option Box | Contribution Type/CAM | To specify contribution type for CAM. |
| Specified Plan/CAM | Option Box | Specified Plan/CAM | To specify a plan when option is "% specified plan" for CAM. |
| Value for EE ($/%)/CAM | Text Box | Value for EE ($/%)/CAM | To specify contribution % or value for CAM. |
| Value for Dep ($/%)/CAM | Text Box | Value for Dep ($/%)/CAM | To specify contribution % or value for CAM. |
| New | Command | New | To clear the screen for new quote entry |
| Save | Command | Save | To save details of quote to database |
| Search | Command | Search | To search for a specific quote |

Screen2

| Element Name | Element Type | Label | Purpose |
|---|---|---|---|
| | | Quote Information | |
| Quote Number | Display Text | Quote # | Unique id for a quote. There will be only one quote associated with each group/lead. |
| Revision | Display Text | Rev | Revision # of the quote |
| Quote Date | Display Text | Date | Quote Date |
| Lead/Group Type | Display Text | Type | Type of the lead/group to whom quote is generated |
| Lead/Group Id | Display Text | Lead/Group Id | Id of the lead/group to whom quote is generated |
| Lead/Group Name | Display Text | Lead/Group Name | Name of the lead/group to whom quote is generated |
| | | Employee Information | |
| Quote Specific | Column Check Box | Quote Specific | To indicate employees when using "quote specific employees" option |
| Employee Name | Column Text Box | Employee Name | Name of employee |
| Sort by Ascending | Link | Sort A-Z | To sort the employee details by employee name in ascending order. |
| Sort by Descending | Link | Sort Z-A | To sort the employee details by employee name in descending order. |
| Age/DOB | Column Check Box | Age/DOB | Age/DOB of employee |
| Coverage Choice | Column Option Box | Tier | Coverage choice selected by employee |
| #Members | Column Text Box | # | # of members covered under employee (including the employee) |
| Zip | Column Text Box | Zip | Zip code of residence of employee |
| County | Column Option Box | County | County of residence of employee |
| Medical Plan | Column Option Box | Medical Plan | Medical plan selected by employee, if any |
| Dental Plan | Column Option Box | Dental Plan | Dental plan selected by employee, if any |
| Vision Plan | Column Option Box | Vision Plan | Vision plan selected by employee, if any |
| CAM Plan | Column Option Box | CAM Plan | CAM plan selected by employee, if any |
| Size | Text Box | | To alter the size of the employee info entry table. |
| Set Size | Command | Set Size | Adds/deletes row(s) in employee information entry table depending on the size entered. |
| Delete | Command | Delete | Deletes a row from employee information entry table |
| Upload Employee Info | Link | Upload Employee Info | To upload a flat file containing employee information |
| Total Employees | Display Text | Total Employees | Displays count of employees entered in the employee information table. |
| Total Waiving | Text Box | Total Waiving | Total # of waiving employees |
| Total Declining | Text Box | Total Declining | Total # of declining employees |
| Total COBRAs | Text Box | Total COBRAs | Total # of COBRA members with the group |
| Rate Differential Factor | Radio Buttons | Rate Differential Factor | To specify whether the RAF is calculated by the system or entered by the user. |
| Rate Differential Factor | Text Box | Rate Differential Factor | Rate Differential Factor |
| Refresh | Command | Refresh | To calculate the RAF a fresh when the RAF is calculated by the system. |
| New | Command | New | To clear the screen for new quote entry |
| Save | Command | Save | To save details of quote to database |
| Search | Command | Search | To search for a specific quote |

Screen 3

| Element Name | Element Type | Label | Purpose |
|---|---|---|---|
| | | Quote Information | |
| Quote Number | Display Text | Quote # | Unique id for a quote. There will be only one quote associated with each group/lead. |
| Revision | Display Text | Rev | Revision # of the quote |
| Quote Date | Display Text | Date | Quote Date |
| Lead/Group Type | Display Text | Type | Type of the lead/group to whom quote is generated |
| Lead/Group Id | Display Text | Lead/Group Id | Id of the lead/group to whom quote is generated |
| Lead/Group Name | Display Text | Lead/Group Name | Name of the lead/group to whom quote is generated |
| | | Contribution Information Medical | |
| Quote Medical | Check Box | Quote Medical | To include the quote for medical. |
| Contribution Summary | Check Box | Contribution Summary | To include the contribution summary to quote output. |
| Employer Summary/% Lowest Cost HMO | Check Box | Employer Summary/% Lowest Cost HMO | To include the % lowest cost HMO contribution in Employer summary. |
| Employer Summary/% Lowest Cost Plan | Check Box | Employer Summary/% Lowest Cost Plan | To include the % lowest cost Plan contribution in Employer summary. |
| Employer Summary/% Specified Plan | Check Box | Employer Summary/% Specified Plan | To include the % Specified Plan contribution in Employer summary. |
| Employer Summary/Flat $ Amount | Check Box | Employer Summary/Flat $ Amount | To include the Flat $ Amount contribution in Employer summary. |
| Employee Quotes/% Lowest Cost HMO | Check Box | Employee Quotes/% Lowest Cost HMO | To include the % lowest cost HMO contribution in Employee Quotes. |
| Employee Quotes/% Lowest Cost Plan | Check Box | Employee Quotes/% Lowest Cost Plan | To include the % lowest cost Plan contribution in Employee Quotes. |
| Employee Quotes/% Specified Plan | Check Box | Employee Quotes/% Specified Plan | To include the % Specified Plan contribution in Employee Quotes. |
| Employee Quotes/Flat $ Amount | Check Box | Employee Quotes/Flat $ Amount | To include the Flat $ Amount contribution in Employee Quotes. |
| Value for Employee/% Lowest Cost HMO | Text Box | Value for Employee/% Lowest Cost HMO | To specify contribution % for Lowest cost HMO for employee. |
| Value for Employee/% Lowest Cost Plan | Text Box | Value for Employee/% Lowest Cost Plan | To specify contribution % for Lowest Cost Plan for employee. |
| Value for Employee/% Specified Plan | Text Box | Value for Employee/% Specified Plan | To specify contribution % for Specified Plan for employee. |
| Value for Employee/Flat $ Amount | Text Box | Value for Employee/Flat $ Amount | To specify contribution value for Flat $ Amount for employee. |
| Value for Dependent/% Lowest Cost HMO | Text Box | Value for Dependent/% Lowest Cost HMO | To specify contribution % for Lowest cost HMO for dependent. |
| Value for Dependent/% Lowest Cost Plan | Text Box | Value for Dependent/% Lowest Cost Plan | To specify contribution % for Lowest Cost Plan for dependent. |
| Value for Dependent/% Specified Plan | Text Box | Value for Dependent/% Specified Plan | To specify contribution % for Specified Plan for dependent. |
| Value for Dependent/Flat $ Amount | Text Box | Value for Dependent/Flat $ Amount | To specify contribution value for Flat $ Amount for dependent. |
| Specified Plan | Option Box | Specified Plan | To specify a plan when option is "% specified plan" |

-continued

| Element Name | Element Type | Label | Purpose |
|---|---|---|---|
| | | Dental | |
| Quote Dental | Check Box | Quote Dental | To include the quote for dental. |
| Contribution Summary | Check Box | Contribution Summary | To include the contribution summary to quote output. |
| Employer Summary/% Lowest Cost Plan | Check Box | Employer Summary/% Lowest Cost Plan | To include the % lowest cost Plan contribution in Employer summary. |
| Employer Summary/% Specified Plan | Check Box | Employer Summary/% Specified Plan | To include the % Specified Plan contribution in Employer summary. |
| Employer Summary/Flat $ Amount | Check Box | Employer Summary/Flat $ Amount | To include the Flat $ Amount contribution in Employer summary. |
| Employee Quotes/% Lowest Cost Plan | Check Box | Employee Quotes/% Lowest Cost Plan | To include the % lowest cost Plan contribution in Employee Quotes. |
| Employee Quotes/% Specified Plan | Check Box | Employee Quotes/% Specified Plan | To include the % Specified Plan contribution in Employee Quotes. |
| Employee Quotes/Flat $ Amount | Check Box | Employee Quotes/Flat $ Amount | To include the Flat $ Amount contribution in Employee Quotes. |
| Value for Employee/% Lowest Cost Plan | Text Box | Value for Employee/% Lowest Cost Plan | To specify contribution % for Lowest Cost Plan for employee. |
| Value for Employee/% Specified Plan | Text Box | Value for Employee/% Specified Plan | To specify contribution % for Specified Plan for employee. |
| Value for Employee/Flat $ Amount | Text Box | Value for Employee/Flat $ Amount | To specify contribution value for Flat $ Amount for employee. |
| Value for Dependent/% Lowest Cost Plan | Text Box | Value for Dependent/% Lowest Cost Plan | To specify contribution % for Lowest Cost Plan for dependent. |
| Value for Dependent/% Specified Plan | Text Box | Value for Dependent/% Specified Plan | To specify contribution % for Specified Plan for dependent. |
| Value for Dependent/ Flat $ Amount | Text Box | Value for Dependent/Flat $ Amount | To specify contribution value for Flat $ Amount for dependent. |
| Specified Plan | Option Box | Specified Plan | To specify a plan when option is “% specified plan” |
| | | Vision | |
| Quote Vision | Check Box | Quote Vision | To include the quote for vision. |
| Contribution Summary | Check Box | Contribution Summary | To include the contribution summary to quote output. |
| Employer Summary/% Lowest Cost Plan | Check Box | Employer Summary/% Lowest Cost Plan | To include the % lowest cost Plan contribution in Employer summary. |
| Employer Summary/% Specified Plan | Check Box | Employer Summary/% Specified Plan | To include the % Specified Plan contribution in Employer summary. |
| Employer Summary/Flat $ Amount | Check Box | Employer Summary/Flat $ Amount | To include the Flat $ Amount contribution in Employer summary. |
| Employee Quotes/% Lowest Cost Plan | Check Box | Employee Quotes/% Lowest Cost Plan | To include the % lowest cost Plan contribution in Employee Quotes. |
| Employee Quotes/% Specified Plan | Check Box | Employee Quotes/% Specified Plan | To include the % Specified Plan contribution in Employee Quotes. |
| Employee Quotes/Flat $ Amount | Check Box | Employee Quotes/Flat $ Amount | To include the Flat $ Amount contribution in Employee Quotes. |
| Value for Employee/% Lowest Cost Plan | Text Box | Value for Employee/% Lowest Cost Plan | To specify contribution % for Lowest Cost Plan for employee. |
| Value for | Text Box | Value for | To specify contribution % for Specified Plan for |

-continued

| Element Name | Element Type | Label | Purpose |
|---|---|---|---|
| Employee/% Specified Plan | | Employee/% Specified Plan | employee. |
| Value for Employee/Flat $ Amount | Text Box | Value for Employee/Flat $ Amount | To specify contribution value for Flat $ Amount for employee. |
| Value for Dependent/% Lowest Cost Plan | Text Box | Value for Dependent/% Lowest Cost Plan | To specify contribution % for Lowest Cost Plan for dependent. |
| Value for Dependent/% Specified Plan | Text Box | Value for Dependent/% Specified Plan | To specify contribution % for Specified Plan for dependent. |
| Value for Dependent/ Flat $ Amount | Text Box | Value for Dependent/Flat $ Amount | To specify contribution value for Flat $ Amount for dependent. |
| Specified Plan | Option Box | Specified Plan | To specify a plan when option is "% specified plan" |
| CAM | | | |
| Quote CAM | Check Box | Quote CAM | To include the quote for CAM. |
| Contribution Summary | Check Box | Contribution Summary | To include the contribution summary to quote output. |
| Employer Summary/% Lowest Cost Plan | Check Box | Employer Summary/% Lowest Cost Plan | To include the % lowest cost Plan contribution in Employer summary. |
| Employer Summary/% Specified Plan | Check Box | Employer Summary/% Specified Plan | To include the % Specified Plan contribution in Employer summary. |
| Employer Summary/Flat $ Amount | Check Box | Employer Summary/Flat $ Amount | To include the Flat $ Amount contribution in Employer summary. |
| Employee Quotes/% Lowest Cost Plan | Check Box | Employee Quotes/% Lowest Cost Plan | To include the % lowest cost Plan contribution in Employee Quotes. |
| Employee Quotes/% Specified Plan | Check Box | Employee Quotes/% Specified Plan | To include the % Specified Plan contribution in Employee Quotes. |
| Employee Quotes/Flat $ Amount | Check Box | Employee Quotes/Flat $ Amount | To include the Flat $ Amount contribution in Employee Quotes. |
| Value for Employee/% Lowest Cost Plan | Text Box | Value for Employee/% Lowest Cost Plan | To specify contribution % for Lowest Cost Plan for employee. |
| Value for Employee/% Specified Plan | Text Box | Value for Employee/% Specified Plan | To specify contribution % for Specified Plan for employee. |
| Value for Employee/Flat $ Amount | Text Box | Value for Employee/Flat $ Amount | To specify contribution value for Flat $ Amount for employee. |
| Value for Dependent/% Lowest Cost Plan | Text Box | Value for Dependent/% Lowest Cost Plan | To specify contribution % for Lowest Cost Plan for dependent. |
| Value for Dependent/% Specified Plan | Text Box | Value for Dependent/% Specified Plan | To specify contribution % for Specified Plan for dependent. |
| Value for Dependent/ Flat $ Amount | Text Box | Value for Dependent/Flat $ Amount | To specify contribution value for Flat $ Amount for dependent. |
| Specified Plan | Option Box | Specified Plan | To specify a plan when option is "% specified plan" |
| New | Command | New | To clear the screen for new quote entry |
| Save | Command | Save | To save details of quote to database |
| Search | Command | Search | To search for a specific quote |

Screen 4

| Element Name | Element Type | Label | Purpose |
|---|---|---|---|
| | | Quote Information | |
| Quote Number | Display Text | Quote # | Unique id for a quote. There will be only one quote associated with each group/lead. |
| Revision | Display Text | Rev | Revision # of the quote |
| Quote Date | Display Text | Date | Quote Date |
| Lead/Group Type | Display Text | Type | Type of the lead/group to whom quote is generated |
| Lead/Group Id | Display Text | Lead/Group Id | Id of the lead/group to whom quote is generated |
| Lead/Group Name | Display Text | Lead/Group Name | Name of the lead/group to whom quote is generated |
| | | Quote Generation Options | |
| Generate | Radio Buttons | Generate | To specify what type of quote to be generated. Possible values are: Standard Quote, Interim Quote |
| Quote for specified plans only | Check Box | Quote for specified plans only | If this option is set, the quote is generated only for plans specified by employee |
| Exclude Specified Plans | | Exclude Specified Plans | To exclude certain plans from being quoted |
| Quote For | Radio Buttons | Quote For | To specify to whom the quote output is being generated. Possible values are: Group, Employee(s), Cal-COBRA(s), Fed-COBRA(s) |
| When quoting for groups, include | Radio Buttons | When quoting for groups, include | To specify what quote sheets to be included in quote output. |
| Mode of output | Radio Buttons | Mode of output | To specify the mode of quote output. Possible values are: View, Email, Fax, Print in mailroom. |
| Send to whose attention | Radio Buttons | Send to whose attention | To specify to whose attention the quote is to be sent. Possible values are: Agent's Attn., Group's Attn., Other. |
| Attention to | Text Box | Attention to | To specify the attention to whom when the "Send to whose attention", is others. |
| Address 1 | Text Box | Address 1 | To specify the address 1 when the "Send to whose attention", is others. |
| Address 2 | Text Box | Address 2 | To specify the address 2 when the "Send to whose attention", is others. |
| Email | Text Box | Email | To specify the email when the "Send to whose attention", is others. |
| Fax | Text Box | Fax | To specify the fax when the "Send to whose attention", is others. |
| Include program brochure | Check Box | Include program brochure | To indicate whether the program brochure is to be included in the quote output. |
| New | Command | New | To clear the screen for new quote entry |
| Save | Command | Save | To save details of quote to database |
| Search | Command | Search | To search for a specific quote |

Screen 5

| Element Name | Element Type | Label | Purpose |
|---|---|---|---|
| | | Quote Information | |
| Quote Number | Display Text | Quote # | Unique id for a quote. There will be only one quote associated with each group/lead. |
| Revision | Display Text | Rev | Revision # of the quote |
| Quote Date | Display Text | Date | Quote Date |
| Lead/Group Type | Display Text | Type | Type of the lead/group to whom quote is generated |
| Lead/Group Id | Display Text | Lead/Group Id | Id of the lead/group to whom quote is generated |
| Lead/Group Name | Display Text | Lead/Group Name | Name of the lead/group to whom quote is generated |
| | | Missing Information | |
| Missing entity | Display Text | Missing Entity | Name of the missing entity |
| Message | Display Text | Message | Message. |
| New | Command | New | To clear the screen for new quote entry |

-continued

| Element Name | Element Type | Label | Purpose |
|---|---|---|---|
| Save | Command | Save | To save details of quote to database |
| Search | Command | Search | To search for a specific quote |

3.1.1.3. Screen Validations
Screen1

| Element Name | Action/Validation Details | Message |
|---|---|---|
| | Lead Group Information | |
| Quoting For | Check to see that a valid option is selected for the field | "Required information is missing" |
| Lead/Group Id | Check to see that a valid value is entered for the field | "Required information is missing" |
| | General Information | |
| Quote Date | | "Required information is missing" |
| Mode of Request | Check to see that a valid option is selected for the field | "Required information is missing" |
| Request Postmark Date | Check to see that a valid value is entered for the field | "Required information is missing" |
| Request Receive Date | Check to see that a valid value is entered for the field | "Required information is missing" |
| Rate Type | Check to see that a valid option is selected for the field | "Required information is missing" |
| Agent Commission | Check to see that a valid value is entered for the field | "Required information is missing" |
| Effective Date | Check to see that a valid value is entered for the field | "Required information is missing" |

Screen2

| Element Name | Action/Validation Details | Message |
|---|---|---|
| | Employee Information | |
| Age/DOB | Check to see that a valid value is entered for the field | "Required information is missing" |
| Coverage Option | Check to see that a valid option is selected for the field | "Required information is missing" |
| Number of Members | Check to see that a valid value is entered for the field | "Required information is missing" |

Screen4

| Element Name | Action/Validation Details | Message |
|---|---|---|
| | Quote Generation Options | |
| Generate | Check to see that a valid option is selected for the field | "Required information is missing" |
| Quote For | Check to see that a valid option is selected for the field | "Required information is missing" |
| When quoting for groups, include | Check to see that a valid option is selected for the field | "Required information is missing" |
| Mode of output | Check to see that a valid option is selected for the field | "Required information is missing" |

-continued

| Element Name | Action/Validation Details | Message |
|---|---|---|
| Send to whose attention | Check to see that a valid option is selected for the field | "Required information is missing" |

3.2. Interface Flow
N/A
4. Business Rule Mapping

| Activity | Rules |
|---|---|
| Generate Quote | 1. A lead or a group will be associated with (a maximum of) one quote number. Changes to the quote will be saved as revisions.<br>2. For an existing group, fee type (blended or non-blended), coverage & contribution information and employees information gets defaulted from current enrollment.<br>3. Default coverage and contribution is: Line of coverage - Medical; Contribution for employees - 50% of lowest cost HMO plan; Contribution for dependents - None<br>4. For each line of coverage, the contribution type for dependents (if any) has to be same as that for the employee. Only the contribution percentage or value can change.<br>5. Quote for an individual association member should include only one employee.<br>6. If zip code is not provided for an employee, the zip code of the group is used for rate calculation.<br>7. Number of employees willing to enroll should satisfy the participation rule i.e., number of declines to (employee count − number of waiving + number |

-continued

| Activity | Rules |
|---|---|
| | of declines – number of COBRA) should be less than 30%. |
| | 8. Employer's contribution towards employee premium should be at least 50% of the group's average premium for all enrolled employees based on the lowest cost employee-only plan available. |
| | 9. Effective date for quote will default to 1st of next month if current date is lesser than or equal to the 25th of the month and 1st of the next following month after the 25th. |
| | 10. Premium rates are calculated based on the logic as detailed in "Process Specification for Billing - BPI_CAS_FSD_FI_001". |

Benefit Partners Inc

Process Specification

Supply Request

External

1. Introduction 1.1. Purpose

This functional specification document addresses the part of the Core Administration System that would facilitate the sending of Supply Requests or any handbooks to employer groups or the members of a group.

1.2. Business Use Case Specification Reference

| Business Use Specification ID | Business Use Case Name |
|---|---|
| None | None |

1.3. Definitions, Acronyms & Abbreviations

| Term | Explanation |
|---|---|

2. Process Identification 2.1. Process Description

A Supply Request consists of all handbooks, rate books, forms and application, complementary, super directories that are sent to the employer groups and its members through the mailroom.

2.2. Process Flow (See FIG. N-1)

3. User Interface 3.1. User Interface Screens 3.1.1. Screen ID's

| Screen ID (SID) | Screen Name | Corresponding HTML File Name |
|---|---|---|
| utl.supplyrequest.external | Supply Request External | ExternalSupplyRequest.jsp |
| utl.supplyrequestview.external | Supply Request External View | ExternalSupplyRequestView.jsp |
| utl.supplyrequestresult.external | Supply Request External | ExternalSupplyRequestResult.jsp |
| utl.supplyconfirm.external | Supply Request External Confirmation | ExternalSupplyRequestMailConfirm.jsp |

3.1.2. User Interface Id: Supply Request—External 3.1.2.1. Screen Name: Supply Request—External (BPI_CAS_UTL_SCR__001__001) (See FIG. N-2)

3.1.2.2. SID, Element Name, Element Type & Purpose

| Element Name | Element Type | Label | Purpose |
|---|---|---|---|
| Main Header "External Supply Request" | Text | Main Header "External Supply Request" | To give the heading for the screen being navigated |
| Text items as shown in the screen for Pre selected packages, Handbooks, Rate Books, Forms and Applications, Complementary, Super Directories | Text | Text items as shown in the screen for Pre selected packages, Handbooks, Rate Books, Forms and Applications, Complementary, Super Directories | To provide information as shown in the screen along with Qty Text and in Boxes as shown in the screen snapshot |
| Qty Entry Field | Entry Field | Qty Entry Field | Entry field for Quantity for all items |
| Agent/Employer Group ID | Text | Agent/Employer Group ID | Text for Agent/Employer Group. Must not show up if accessed directly from the menu |
| Agent/Employer Group ID | Dynamic Text | Agent/Employer Group ID | Needs to pick up the agent ID or the supply request ID. Must not show up if accessed directly from the menu |
| Company Name Text | Text | Company Name Text | Text for "Company Name" |
| Company Name Entry Field | Entry Field | Company Name Entry Field | Entry Field For Company Name |
| Address Text | Text | Address Text | Text for "Address" |

-continued

| Element Name | Element Type | Label | Purpose |
|---|---|---|---|
| Address Entry Field | Entry Field | Address Entry Field | Entry Field For Address |
| Suite Text | Text | Suite Text | Text for "Suite" |
| Suite Entry Field | Entry Field | Suite Entry Field | Entry Field For Suite |
| City Text | Text | City Text | Text for "City" |
| City Entry Field | Entry Field | City Entry Field | Entry Field For City |
| State Text | Text | State Text | Text for "State" |
| State Entry Field | List | State Entry Field | List for States - with default CA |
| Zip Code Text | Text | Zip Code Text | Text for "Zip Code" |
| Zip Code Entry Field | Entry Field | Zip Code Entry Field | Entry Field For Zip Code |
| Customer Request Date | Text | Customer Request Date | Text for "Customer Request Date" |
| Customer Request Date | Entry Field | Customer Request Date | Calendar |
| Ship Via | Text | Ship Via | Text for "Ship Via" |
| Radio Buttons selection for Ship Via | Radio button | Radio Buttons selection for Ship Via | Radio Buttons for Mail Room and Will Call - Default None |
| Special Instruction Text | Text | Special Instruction Text | Text for "Special Instructions" |
| Special Instructions Entry Field | Text Area | Special Instructions Entry Field | Text Area For Special Instructions |
| Confirm Fulfillment by Email | Check Box | Confirm Fulfillment by Email | Check Box for "Confirm Fulfillment by Email" |
| Save | Button (HTML Submit button) | Save | Save the information to the repository |
| Cancel | Button | Cancel | Reset information as described in the scenarios |

3.1.2.3. Front End Validations

| Element Name | Action/Validation Details | Error Message Text |
|---|---|---|
| Save | Should function with enter key cursor positioned on the "Save" button or on mouse click.<br>On saving the data the data gets saved to the permanent repository. And send an email to the mailroom along with a confirmation page to the user<br>Mandatory Entry<br>1) Choose any one item with Qty<br>2) Company Name<br>3) Address<br>4) City<br>5) Zip Code<br>6) Agent/Employer Group ID<br>7) State<br>8) Suite | Mandatory Entries:<br>1) Choose anyone item with Qty<br>Error dialog Box - "Item Quantity - At least one entry is needed" with Close Button<br>2) For Company Name<br>Error Dialog Box "Company Name - Is required" with Close option and on press of Close button leads to the Company name field<br>3) For Address<br>Error Dialog Box "Address - Is required." with Close option and on press of Close button leads to the Address field<br>4) For City<br>Error Dialog Box "Please enter the City" with Yes option and on press of Yes button leads to the City field<br>5) For Zip Code<br>Error Dialog Box "Zip - Is required." with Close option and on press of Close button leads to the Zip code field<br>6) For Agent/Employer Group ID<br>Error Dialog Box "Agent/Employer Group ID - Is required." with Close option and on press of Close button leads to the Agent/employer Group ID field.<br>7) For State<br>Error Dialog Box "State - Is required." with Close option and on press of Close button leads to the State field. |

-continued

| Element Name | Action/Validation Details | Error Message Text |
|---|---|---|
| | | 8) For Suite Error Dialog Box "Suite - Is required." with Close option and on press of Close button leads to the Suite field |
| Cancel | All the data entered is reset with empty in the data entry fields as the case may be (Text Field, List etc). | |

3.1.2.4. Screen Flow

The user enters the information on the workgroup name and description.

The following are the scenarios the user may come across when operating on the screen

| Scenario | Description |
|---|---|
| Pre-Population | The ID/address fields must be prepopulated with the address details if the user navigates to the supply request screen from Agent Master, Agency Master, Employer Group Master (Sales & Enrollment). |
| Save | Pressing the save button leads to saving the data in the repository, sending an email to mailroom and confirmation to the user who has checked the confirmation by email check box<br>Email Content - Subject: Supply Request<br>Dear Mail Room Staff,<br>Please forward the following to the address mention below<br>Items - Qty<br>Comments<br>Address<br>Ship Via<br>Thanks<br>< ID of the person who has made the request> |
| Close the browser without saving/ Navigating to another page without saving | The browser window cannot be closed/user can't navigate to another page without saving the data. The user is prompted with the option of either saving the data and closing/leaving the window or not saving the data and closing/leaving the window. |
| Close the browser/ leave the page after saving | The browser window can be closed/user can leave once all the data is saved in the permanent repository. |
| Cancel | All the data entered is reset with empty in the data entry fields as the case may be (Text Field, List etc). |

3.1.3. User Interface Id: External Supply Request Mail Room Confirmation 3.1.3.1. Screen Name: Supply Request Mail Room Confirmation (BPI_CAS_UTL_SCR__001__002) (See FIG. N-3)

3.1.3.2. SID, Element Name, Element Type & Purpose

| Element Name | Element Type | Label | Purpose |
|---|---|---|---|
| Main Header "Supply Request-Mail Room Confirmation" | Text | Main Header "Supply Request-Mail Room Confirmation" | To give the heading for the screen being navigated |
| Message | Text | Message | Text For "The following are the pending Supply Requests. On fulfilling the request, check the row and press save to confirm" |
| Check All | Link | Check All | Checks all the check Boxes |
| Clear All | Link | Clear All | Clears All or any Checked Boxes |
| Save | HTML Button | Save | Save Button |
| Cancel | HTML Button | Cancel | Cancel Button |

3.1.3.3. Front End Validations

| Element Name | Action/Validation Details | Error Message Text |
|---|---|---|
| Save | Must choose at least one check Box | Error Dialog Box - "Please Check at least one row" with yes option |

3.1.3.4. Screen Flow

The following are the scenarios the user may come across when operating on the screen

| Scenario | Description |
|---|---|
| On Entering the screen | Provides a list of all pending requests |
| Check All | Checks all the check Boxes |
| Clear All | Clears all the Check Boxes/Or any checked boxes |
| Save | Saves all the updates made and send email to the personnel who made the request where the confirmation on fulfillment by Email check Box is checked. The user Email details are picked up from the security framework<br>Email:<br>Subject: Supply Request Fulfillment"<br>Dear "Name"<br>We have fulfilled your request <Supply Request id> on "date of saving the fulfillment request"<br>Thanks<br>Mailroom |
| Cancel | Resets the screen with original values before a save |

3.1.4. User Interface Id: Supply Request Confirmation 3.1.4.1. Screen Name: Supply Request Confirmation (BPI_CAS_UTL_SCR__001__003)

3.1.4.2. SID, Element Name, Element Type & Purpose

| Element Name | Element Type | Label | Purpose |
|---|---|---|---|
| Main Header "Supply Request Confirmation" | Text | Main Header "Supply Request Confirmation" | To give the heading for the screen being navigated |
| Message | Text | Message | Text For "The Supply Request has been forwarded to the mail room" |
| Message | Text | Message | Text For "The Reference confirmation number is" |
| Dynamic Text | Text | Dynamic Text | Dynamic Value Text for "<Supply Request ID>" |
| Do you want to create more requests? | Text | Do you want to create more requests? | Text for "Do you want to create more requests?" |
| Yes | Link | Yes | Link for "Yes" |
| No | Link | No | Link for "No" |

3.1.4.3. Front End Validations

None.

3.1.4.4. Screen Flow

The following are the scenarios the user may come across when operating on the screen

| Scenario | Description |
|---|---|
| Yes | Leads to the Supply Request Screen |
| No | Leads to the Supply Request Home Page |

4. Business Rule Mapping

| Activity | Rules |
|---|---|
| Create Supply Request ID | Should have unique Id for a Supply Request - 10 digits with an increment of 1, Say EX00000001, EX00000002, EX00000003 and so on. |

Benefit Partners

Process Specification

Workgroups

1. Introduction 1.1. Purpose

This functional specification document addresses the part of the sales and marketing system that would facilitate the creation of workgroups.

1.2. Business Use Case Specification Reference

| Business Use Specification ID | Business Use Case Name |
|---|---|
| None | None |

1.3. Definitions, Acronyms & Abbreviations

| Term | Explanation |
|---|---|

2. Process Identification 2.1. Process Description

Workgroups define the broad categorization of a group of agents, internal working personnel of BPI, external working personnel associated with BPI and Mailing groups.

The process shall include creating

1) Categories

Categories define the segment a workgroup can fall under. For eg—Agents, Employees, HR etc.

2) Define Parent and assign to a category

A Parent is the highest in the hierarchy of a work group. Typical examples include Agent Work groups, Internal work groups. A parent is assigned to a category 3) Define Main Work group and assign to a Parent A work group defines the various groups that come under a parent—Examples include—Agents by ranking etc. A work group can also be a child workgroup. A workgroup is assigned to a Parent 4) Define Child workgroup and assign to a main work group Child groups is a set of groups under a workgroup and typically examples include—agents in San Diego Area Etc 5) Define Mail Members—Create, Modify, View, Delete Mail Members are the components of a child work group for a category Mail and are assigned to the child workgroups The work groups are designed in such a way that members can be swapped in full or in partial or duplicated from one work group to another.

2.2. Process Flow (See FIG. N-4)

3. User Interface 3.1. User Interface Screens 3.1.1. Screen ID's

| Screen ID (SID) | Screen Name | Corresponding HTML File Name |
|---|---|---|
| utl.workgroup.category | Category | Category.jsp |
| utl.workgroup.maingroup | Main Workgroup | MainGroup.jsp |
| utl.workgroup.childgroup | Child Workgroup | ChildGroup.jsp |
| utl.workgroup.mailmember | Mail Members | MailMember.jsp |
| utl.workgroup.swapmembers | Swap Members | SwapMembers.jsp |

3.1.2. User Interface Id: Category 3.1.2.1. Screen Name: Category (BPI_CAS_UTL_SCR__002__001)

3.1.2.2. SID, Element Name, Element Type & Purpose

| Element Name | Element Type | Label | Purpose |
|---|---|---|---|
| Main Header "Category" | Text | Main Header "Category" | To give the heading for the screen being navigated |
| Name | Text | Name | Text For "Name" |
| Name Entry Field | Entry Field | Name Entry Field | Entry field for entering the name |
| Description | Text | Description | Text for "Description" |
| Description Entry Field | Entry Field | Description Entry Field | Entry field for entering the description |
| Add | HTML Button | Add | Button for adding the name/description in to the HTML table. Changes with label "Modify" when the row in the table is on edit mode. |
| Table | HTML table | Table | For displaying all the information added by pressing the add button, in the form of rows, for every add operation/Rows retrieved from the permanent repository |
| Delete | Button (HTML Button) | Delete | To delete the rows checked |
| Check All | Text Link | Check All | To check all the check boxes in the table |
| Clear All | Text Link | Clear All | To uncheck all the check boxes checked in the table/does not function when all the checkboxes in the table are unchecked |
| Delete | Check box | Delete | To check the items for deletion |
| Edit | Button (HTML Button) | Edit | To edit the rows entered by "Add"/ "Modify"/displayed from permanent repository against the row selected for edition |
| Save | Button (HTML Submit button) | Save | Save the information to the repository |
| Cancel | Button | Cancel | Reset information as described in the scenarios |

3.1.2.3. Front End Validations

| Element Name | Action/Validation Details | Error Message Text |
|---|---|---|
| Name Entry Field | Mandatory Entry<br>Becomes non editable when on modify mode for data from permanent repository | When the Add HTML Button is pressed with an empty entry on the name entry field, an Error Dialog Box pops up with the message "Please enter the name before adding to the table" with "yes" option<br>On press of Yes Button, The cursor must be placed on the name entry field |
| Add | On Clicking add button or the pressing the enter key field with the cursor position on the Add button, The data gets added to the table.<br>Validation checks are done to not allow null value on the name entry field.<br>Must not allow duplicate entries on the name<br>Must not allow the length of the field entry to go beyond as per the database design for the column | When the Add HTML Button is pressed with an empty entry on the name entry field, an Error Dialog Box pops up with the message "Please enter the name before adding to the table" with "yes" option.<br>On press of Yes Button, The cursor must be placed on the name entry field<br>For duplicate entries, Error dialog box - "Duplicate values not allowed. Please enter again" |
| Modify | On Clicking the modify button or pressing the enter key field with the cursor positioned on the modify button, the data gets added to the table. | None |
| Table | Should have column header and each subsequent row should be identified by alternate color combinations. i.e. First row should have color 'x' and the next row should have color 'y'. The next row should have color 'x' again and so on. The size of any text inside any cell should be wrapped if the text becomes too long.<br>The letters must be green in color for the rows retrieved from the permanent repository and red | |

-continued

| Element Name | Action/Validation Details | Error Message Text |
|---|---|---|
| | for the rows in temporary storage. All the letters of the row on edit must be in dark gray. | |
| Delete | Should function with enter key cursor positioned on the "Delete" button or on mouse click Delete button should work on multiple deletes based on the check box or boxes selected. If the user clicks on the delete button without checking any of the check box should throw error message. Success: Deletes the row or rows from the table (temporary storage) | Error Dialog Box: "Please choose the row or rows to be deleted." with "yes" option |
| Check All | On clicking the "Check All" link should check all the check boxes in the HTML table. | Not Applicable |
| Clear All | On clicking the "Clear All" link should uncheck all the checked check boxes in the HTML table. | Not Applicable |
| Edit | Should function with Enter Key Cursor positioned on the "Edit" button or on mouse click. Refer Interface flow on scenarios - "edit data" | |
| Save | Should function with enter key cursor positioned on the "Save" button or on mouse click. On saving the data the data gets saved to the permanent repository. | Not Applicable |
| Cancel | All the data entered is reset with empty/initial values in the data entry fields as the case may be (Text Field, List etc). If a row is already modified and added to the table on the screen and the Cancel button is pressed, the row remains with the modified values | Not Applicable |
| Browser Window | When a user tries to close the window with out saving data into the permanent repository, a dialog box pops up | Error Dialog box message: "Do you want to save all changes before closing/leaving the window?" with a "Yes" and "No" option. On press of "Yes" leads to saving of information and "No" leads to the Category screen with the original values |

3.1.2.4. Screen Flow

The user enters the information on the Category name and description.

The following are the scenarios the user may come across when operating on the screen

| Scenario | Description |
|---|---|
| Add data entered | Adding the data entered (pressing the "Add" Button) leads to adding name and description to a temporary storage. The data gets loaded into the permanent repository only after the user saves the information. |
| Modify data entered | When a row is selected for an edit operation, the row is highlighted and data elements populated into respective fields and the add button has a label "modify". Modifying the data entered (pressing the "Modify" button) leads to adding the non-editable name information and modified "description" to a temporary storage. The data gets loaded into the permanent repository only after the user saves the information. |
| Edit data | Editing the Data (pressing the "Edit" Button). The edit operation may be on any of the two scenarios. 1. (Edit for rows from database) When the user comes to the Category screen and the screen is already loaded with data from the permanent repository into a table on the screen. 2. (Edit for rows from the temporary storage) When the user has just added the data into a table on the screen and wants to edit the data entered before saving The data in the table on the screen would be shown as green letters for the data from the database and red letters for the data that is in the temporary storage (not saved yet). The table shall have alternate rows colored with different light colors Under 1, on an edit operation for a row on the table, the row does not get deleted from the table and the data is transferred to the name (becomes non editable) and editable description. Under 2, on an edit operation for a row on the table, the row gets deleted from |

-continued

| Scenario | Description |
|---|---|
| | the table and the data is transferred to the name and description, which are editable. When a row is on edit mode, the letters are in dark gray color in the table. |
| Delete Checked Rows | The data in the table on the screen contains the data, which is from the permanent repository, or the data just added and is in temporary storage. When the rows are “checked” for the rows that contain the data from the repository and a “Delete Checked Rows” is performed, inactivation takes place on saving the information provided there are no subtypes else provides the user with the necessary error information in an error page. Message “The following Category has associated parents” - “parent 1 . . . parent n” When the rows are “checked” for the rows that contain the data from the temporary storage and a “Delete Checked Rows” is performed, the rows are deleted from the temporary storage. |
| Check All | Enables checking of all the checkboxes by checking “check All” Check Box |
| Check All & Delete Checked Rows | Enables deleting all the rows from the table on the screen enabled by “check All” |
| Check Any Number & Delete Checked Rows | Enables deleting the rows from the table on the screen that are only checked. |
| Check All & Clear All | Enables clearing (removing the check) all checked rows done by “Check All” |
| Check Any Number & Clear All | Enables clearing (removing the check) the rows that are checked. |
| Clear All when no rows are checked | The user can only press the button and nothing happens like checking, removing a check |
| Save | All the data added or modified and added into/deleted from the rows in the table are saved into the permanent repository Once saving is done, return back to the Category screen with all the fresh updates |
| Cancel | All the data entered is reset with empty/initial values in the data entry fields as the case may be (Text Field, List etc). If a row (which is retrieved from the database) is already modified and added to the table on the screen and the “Cancel” button is pressed, the row remains with the modified values. |

3.1.3. User Interface Id: Main Work Group 3.1.3.1. Screen Name: Main Work Group (BPI_CAS_UTL_SCR__002__002) (See FIG. N-5)

3.1.3.2. SID, Element Name, Element Type & Purpose

| ElementName | Element Type | Label | Purpose |
|---|---|---|---|
| Main Header “Main Workgroup” | Text | Main Header “Main Workgroup” | To give the heading for the screen being navigated |
| Name | Text | Name | Text For “Name” |
| Name Entry Field | Entry Field | Name Entry Field | Entry field for entering the name |
| Description | Text | Description | Text for “Description” |
| Description Entry Field | Entry Field | Description Entry Field | Entry field for entering the description |
| Parent | Text | Parent | Text for Parent |
| Parent Search | Search | Parent Search | Search window for all active parents |
| Is it a child work Group | Text | Is it a child work Group | Text for “Is it a child workgroup?’ |
| Is it a child work Group | Checkbox | Is it a child work Group | Check Box - Default “No” |
| Add | HTML Button | Add | Button for adding the name/description into the HTML table. Changes with label “Modify” when the row in the table is on edit mode. |
| Table | HTML table | Table | For displaying all the information added by pressing the add button, in the form of rows, for every add operation/Rows retrieved from the permanent repository |
| Delete | Button (HTML Button) | Delete | To delete the rows checked |
| Check All | Text Link | Check All | To check all the check boxes in the table |
| Clear All | Text Link | Clear All | To un check all the check boxes checked in the table/does not function when all the checkboxes in the table are unchecked |

-continued

| ElementName | Element Type | Label | Purpose |
|---|---|---|---|
| Delete | Check box | Delete | To check the items for deletion |
| Edit | Button (HTML Button) | Edit | To edit the rows entered by "Add"/ "Modify"/displayed from permanent repository against the row selected for edition |
| Save | Button (HTML Submit button) | Save | Save the information to the repository |
| Cancel | Button | Cancel | Reset information as described in the scenarios |

3.1.3.3. Front End Validations

| Element Name | Action/Validation Details | Error Message Text |
|---|---|---|
| Name Entry Field | Mandatory Entry<br>Becomes non editable when on modify mode for data from permanent repository | When the Add HTML Button is pressed with an empty entry on the name entry field, an Error Dialog Box pops up with the message "Please enter the name before adding to the table" with "yes" option<br>On press of Yes Button, The cursor must be placed on the name entry field |
| Add | On Clicking add button or the pressing the enter key field with the cursor position on the Add button, The data gets added to the table.<br>Validation checks are done to not allow null value on the name entry field.<br>Must not allow duplicate entries on the name<br>Must not allow the length of the field entry to go beyond as per the database design for the column<br>Must choose a Parent | When the Add HTML Button is pressed with an empty entry on the name entry field, an Error Dialog Box pops up with the message "Please enter the name before adding to the table" with "yes" option.<br>On press of Yes Button, The cursor must be placed on the name entry field<br>For duplicate entries, Error dialog box - "Duplicate values not allowed. Please enter again"<br>For category, Error dialog Box "Please choose a Parent" with a Yes Option |
| Modify | On Clicking modify button or the pressing the enter key field with the cursor position on the modify button, The data gets added to the table. | None |
| Table | Should have column header and each subsequent row should be identified by alternate color combinations. i.e. First row should have color 'x' and the next row should have color 'y'. The next row should have color 'x' again and so on. The size of any text inside any cell should be wrapped if the text becomes too long.<br>The letters must be green in color for the rows retrieved from the permanent repository and red for the rows in temporary storage.<br>All the letters of the row on edit must be in dark gray. | |
| Delete | Should function with enter key cursor positioned on the "Delete" button or on mouse click<br>Delete button should work on multiple deletes based on the check box or boxes selected. If the user clicks on the delete button without checking any of the check box should throw error message.<br>Success: Deletes the row or rows from the table (temporary storage) | Error Dialog Box: "Please choose the row or rows to be deleted." with "yes" option |
| Check All | On clicking the "Check All" link should check all the check boxes in the HTML table. | Not Applicable |
| Clear All | On clicking the "Clear All" link should uncheck all the checked check boxes in the HTML table. | Not Applicable |
| Edit | Should function with Enter Key Cursor positioned on the "Edit" button or on mouse click.<br>Refer Interface flow on scenarios - "edit data" | |
| Save | Should function with enter key cursor positioned on the "Save" button or on mouse click.<br>On saving the data the data gets saved to the permanent repository. | Not Applicable |

-continued

| Element Name | Action/Validation Details | Error Message Text |
|---|---|---|
| Cancel | All the data entered is reset with empty/initial values in the data entry fields as the case may be (Text Field, List etc).<br>If a row is already modified and added to the table on the screen and the Cancel button is pressed, the row remains with the modified values | Not Applicable |
| Browser Window | When a user tries to close the window with out saving data into the permanent repository, a dialog box pops up | Error Dialog box message: "Do you want to save all changes before closing/leaving the window? " with a "Yes" and "No" option.<br>On press of "Yes" leads to saving of information and "No" leads to the Parent screen with the original values |

3.1.3.4. Screen Flow

The user enters the information on the Main work Group name and description and assigns to a parent.

The following are the scenarios the user may come across when operating on the screen

| Scenario | Description |
|---|---|
| Add data entered | Adding the data entered (pressing the "Add " Button) leads to adding name description, parent and child group option to a temporary storage. The data gets loaded into the permanent repository only after the user saves the information. |
| Modify data entered | When a row is selected for an edit operation, the row is highlighted and data elements populated into respective fields and the add button has a label "modify". Modifying the data entered (pressing the "Modify " button) leads to adding the non-editable name information, modified "description "/parent to a temporary storage and child group option. The data gets loaded into the permanent repository only after the user saves the information. Once the main subgroup has been defined as a child work group, the editable data will be shown in the child work group screen |
| Edit data | Editing the Data (pressing the "Edit "Button).<br>The edit operation may be on any of the two scenarios.<br>1. (Edit for rows from database) When the user comes to the Main workgroups screen and the screen is already loaded with data from the permanent repository into a table on the screen.<br>2. (Edit for rows from the temporary storage) When the user has just added the data into a table on the screen and wants to edit the data entered before saving<br>The data in the table on the screen would be shown as green letters for the data from the database and red letters for the data that is in the temporary storage (not saved yet).<br>The table shall have alternate rows colored with different light colors<br>Under 1, on an edit operation for a row on the table, the row does not get deleted from the table and the data is transferred to the name (becomes non editable) and editable description/Parent<br>Under 2, on an edit operation for a row on the table, the row gets deleted from the table and the data is transferred to the name, description/parent (default), which are editable.<br>When a row is on edit mode, the letters are in dark gray color in the table. |
| Search | The search window must generate a list of all active Parents. The user will not be allowed to make entries into the entry field where the search results are going to be put in. |
| Delete Checked Rows | The data in the table on the screen contains the data, which is from the permanent repository, or the data just added and is in temporary storage.<br>When the rows are "checked" for the rows that contain the data from the repository and a "Delete Checked Rows" is performed, inactivation takes place on saving the information provided there are no subtypes else provides the user with the necessary error information in an error page. Message "The following Main workgroup has associated child workgroups" - "child workgroup1 . . . child workgroup n"<br>When the rows are "checked" for the rows that contain the data from the temporary storage and a "Delete Checked Rows" is performed, the rows are deleted from the temporary storage. |
| Check All | Enables checking of all the checkboxes by checking "check All" Check Box |
| Check All & Delete Checked Rows | Enables deleting all the rows from the table on the screen enabled by "check All" |

-continued

| Scenario | Description |
|---|---|
| Check Any Number & Delete Checked Rows | Enables deleting the rows from the table on the screen that are only checked. |
| Check All & Clear All | Enables clearing (removing the check) all checked rows done by "Check All" |
| Check Any Number & Clear All | Enables clearing (removing the check) the rows that are checked. |
| Clear All when no rows are checked | The user can only press the button and nothing happens like checking, removing a check |
| When " Is it a child workgroup" is checked | When the checking is done and the saving of information takes place the Main workgroups also becomes a child workgroup |
| Save | All the data added or modified and added into/deleted from the rows in the table are saved into the permanent repository. The main groups gets saved as child workgroup if the check box is selected for "is it a child workgroup?" Once saving is done, return back to the main workgroup screen with all the fresh updates |
| Cancel | All the data entered is reset with empty/initial values in the data entry fields as the case may be (Text Field, List etc).<br>If a row (which is retrieved from the database) is already modified and added to the table on the screen and the "Cancel" button is pressed, the row remains with the modified values. |

3.1.4. User Interface Id: Child Work Group 3.1.4.1. Screen Name: Child Work Group (BPI_CAS_UTL_SCR__002__003) (See FIG. N-6)

3.1.4.2. SID, Element Name, Element Type & Purpose

| Element Name | Element Type | Label | Purpose |
|---|---|---|---|
| Main Header "Child Workgroup" | Text | Main Header "Child Workgroup" | To give the heading for the screen being navigated |
| Name | Text | Name | Text For "Name" |
| Name Entry Field | Entry Field | Name Entry Field | Entry field for entering the name |
| Description | Text | Description | Text for "Description" |
| Description Entry Field | Entry Field | Description Entry Field | Entry field for entering the description |
| Main Work Group | Text | Main Work Group | Text for Main Work Group |
| Main Work Group Search | Search | Main Work Group Search | Search Window with all active Main Work group |
| Add | HTML Button | Add | Button for adding the name/description into the HTML table. Changes with label "Modify" when the row in the table is on edit mode. |
| Table | HTML table | Table | For displaying all the information added by pressing the add button, in the form of rows, for every add operation/Rows retrieved from the permanent repository |
| Delete | Button (HTML Button) | Delete | To delete the rows checked |
| Check All | Text Link | Check All | To check all the check boxes in the table |
| Clear All | Text Link | Clear All | To un check all the check boxes checked in the table/does not function when all the checkboxes in the table are unchecked |
| Delete | Check box | Delete | To check the items for deletion |
| Edit | Button (HTML Button) | Edit | To edit the rows entered by "Add"/ "Modify"/displayed from permanent repository against the row selected for editing |
| Save | Button (HTML Submit button) | Save | Save the information to the repository |
| Cancel | Button | Cancel | Reset information as described in the scenarios |

3.1.4.3. Front End Validations

| Element Name | Action/Validation Details | Error Message Text |
|---|---|---|
| Name Entry Field | Mandatory Entry<br>Becomes non editable when on modify mode for data from permanent repository | When the Add HTML Button is pressed with an empty entry on the name entry field, an Error Dialog Box pops up with the message "Please enter the name before adding to the table" with "yes" option<br>On press of Yes Button, The cursor must be placed on the name entry field |
| Add | On Clicking add button or the pressing the enter key field with the cursor position on the Add button, The data gets added to the table.<br>Validation checks are done to not allow null value on the name entry field.<br>Must not allow duplicate entries on the name<br>Must not allow the length of the field entry to go beyond as per the database design for the column<br>Must choose a Main work group | When the Add HTML Button is pressed with an empty entry on the name entry field, an Error Dialog Box pops up with the message "Please enter the name before adding to the table" with "yes" option.<br>On press of Yes Button, The cursor must be placed on the name entry field<br>For duplicate entries, Error dialog box - "Duplicate values not allowed. Please enter again"<br>For category, Error dialog Box "Please choose a Main Work Group" with a Yes Option |
| Modify | On Clicking modify button or the pressing the enter key field with the cursor position on the modify button, The data gets added to the table. | None |
| Table | Should have column header and each subsequent row should be identified by alternate color combinations. i.e. First row should have color 'x' and the next row should have color 'y'. The next row should have color 'x' again and so on. The size of any text inside any cell should be wrapped if the text becomes too long.<br>The letters must be green in color for the rows retrieved from the permanent repository and red for the rows in temporary storage.<br>All the letters of the row on edit must be in dark gray. | |
| Delete | Should function with enter key cursor positioned on the "Delete" button or on mouse click<br>Delete button should work on multiple deletes based on the check box or boxes selected. If the user clicks on the delete button without checking any of the check box should throw error message.<br>Success: Deletes the row or rows from the table (temporary storage) | Error Dialog Box: "Please choose the row or rows to be deleted." with "yes" option |
| Check All | On clicking the "Check All" link should check all the check boxes in the HTML table. | Not Applicable |
| Clear All | On clicking the "Clear All" link should uncheck all the checked check boxes in the HTML table. | Not Applicable |
| Edit | Should function with Enter Key Cursor positioned on the "Edit" button or on mouse click.<br>Refer Interface flow on scenarios - "edit data" | |
| Save | Should function with enter key cursor positioned on the "Save" button or on mouse click?<br>On saving the data the data gets saved to the permanent repository. | Not Applicable |
| Cancel | All the data entered is reset with empty/initial values in the data entry fields as the case may be (Text Field, List etc).<br>If a row is already modified and added to the table on the screen and the Cancel button is pressed, the row remains with the modified values | Not Applicable |
| Browser Window | When a user tries to close the window with out saving data into the permanent repository, a dialog box pops up | Error Dialog box message: "Do you want to save all changes before closing/leaving the window?" with a "Yes" and "No" option. |

-continued

| Element Name | Action/Validation Details | Error Message Text |
|---|---|---|
| | | On press of "Yes" leads to saving of information and "No" leads to the Parent screen with the original values |

3.1.4.4. Screen Flow

The user enters the information on the Child work Group name and description and assigns to a Main work group.

The following are the scenarios the user may come across when operating on the screen

| Scenario | Description |
|---|---|
| Add data entered | Adding the data entered (pressing the "Add" Button) leads to adding name, description and Main Workgroup to a temporary storage. The data gets loaded into the permanent repository only after the user saves the information. |
| Modify data entered | When a row is selected for an edit operation, the row is highlighted and data elements populated into respective fields and the add button has a label "modify". Modifying the data entered (pressing the "Modify" button) leads to adding the non-editable name information, modified "description", main workgroup to a temporary storage. The data gets loaded into the permanent repository only after the user saves the information. |
| Edit data | Editing the Data (pressing the "Edit" Button).<br>The edit operation may be on any of the two scenarios.<br>1. (Edit for rows from database) When the user comes to the Child workgroups screen and the screen is already loaded with data from the permanent repository into a table on the screen.<br>2. (Edit for rows from the temporary storage) When the user has just added the data into a table on the screen and wants to edit the data entered before saving<br>The data in the table on the screen would be shown as green letters for the data from the database and red letters for the data that is in the temporary storage (not saved yet).<br>The table shall have alternate rows colored with different light colors<br>Under 1, on an edit operation for a row on the table, the row does not get deleted from the table and the data is transferred to the name (becomes non editable) and editable description/Main Work group<br>Under 2, on an edit operation for a row on the table, the row gets deleted from the table and the data is transferred to the name, description/Main work group (default), which are editable.<br>When a row is on edit mode, the letters are in dark gray color in the table. |
| Search | The search window must generate a list of all active Main Work Groups. The user will not be allowed to make entries into the entry field where the search results are going to be put in. |
| Delete Checked Rows | The data in the table on the screen contains the data, which is from the permanent repository, or the data just added and is in temporary storage.<br>When the rows are "checked" for the rows that contain the data from the repository and a "Delete Checked Rows" is performed, inactivation takes place on saving the information provided there are no subtypes else provides the user with the necessary error information in an error page. Message "The following Child workgroup has associated members" - "Member1 . . . Member n" members could be employer groups, Agent/Agency, Mail work groups or Associates<br>When the rows are "checked" for the rows that contain the data from the temporary storage and a "Delete Checked Rows" is performed, the rows are deleted from the temporary storage. |
| Check All | Enables checking of all the checkboxes by checking "check All" Check Box |
| Check All & Delete Checked Rows | Enables deleting all the rows from the table on the screen enabled by "check All" |
| Check Any Number & Delete Checked Rows | Enables deleting the rows from the table on the screen that are only checked. |
| Check All & Clear All | Enables clearing (removing the check) all checked rows done by "Check All" |
| Check Any Number & Clear All | Enables clearing (removing the check) the rows that are checked. |
| Clear All when no rows are checked | The user can only press the button and nothing happens like checking, removing a check |
| Save | All the data added or modified and added into/deleted from the rows in the table are saved into the permanent repository<br>Once saving is done, return back to the Child workgroup screen with all the fresh updates |

-continued

| Scenario | Description |
| --- | --- |
| Cancel | All the data entered is reset with empty/initial values in the data entry fields as the case may be (Text Field, List etc).<br>If a row (which is retrieved from the database) is already modified and added to the table on the screen and the "Cancel" button is pressed, the row remains with the modified values. |

3.1.5. User Interface Id: Mail Members 3.1.5.1. Screen Name: Mail Members (BPI_CAS_UTL_SCR__002__004) (See FIG. N-7)

3.1.5.2. SID, Element Name, Element Type & Purpose

| Element Name | Element Type | Label | Purpose |
| --- | --- | --- | --- |
| Main Header "Mail Members" | Text | Main Header "Mail Members" | To give the heading for the screen being navigated |
| Mail ID | Text | Mail ID | Text For "Mail ID" |
| Mail ID Entry Field | Entry Field | Mail ID Entry Field | Entry field for entering the Mail ID |
| Child Workgroup | Text | Child Workgroup | Text for "Child Workgroup" |
| Child Workgroup Search | Search | Child Workgroup Search | Search window with all active Child Work Groups under the category Mail |
| Add | HTML Button | Add | Button for adding the name/description in to the HTML table. Changes with label "Modify" when the row in the table is on edit mode. |
| Table | HTML table | Table | For displaying all the information added by pressing the add button, in the form of rows, for every add operation/Rows retrieved from the permanent repository |
| Delete | Button (HTML Button) | Delete | To delete the rows checked |
| Check All | Text Link | Check All | To check all the check boxes in the table |
| Clear All | Text Link | Clear All | To un check all the check boxes checked in the table/does not function when all the checkboxes in the table are unchecked |
| Delete | Check box | Delete | To check the items for deletion |
| Edit | Button (HTML Button) | Edit | To edit the rows entered by "Add"/ "Modify"/displayed from permanent repository against the row selected for edition |
| Save | Button (HTML Submit button) | Save | Save the information to the repository |
| Cancel | Button | Cancel | Reset information as described in the scenarios |

3.1.5.3. Front End Validations

| Element Name | Action/Validation Details | Error Message Text |
| --- | --- | --- |
| Mail ID Entry Field | Mandatory Entry<br>Must accept a valid mail id format | When the Add HTML Button is pressed with an empty entry on the mail id entry field, an Error Dialog Box pops up with the message "Please enter the name before adding to the table" with "yes" option<br>On press of Yes Button, The cursor must be placed on the name entry field<br>When the Add HTML Button is pressed with an invalid entry on the mail id entry field, an Error Dialog Box pops up with the message "Please enter a valid Mail ID" with "yes" option<br>On press of Yes Button, The cursor must be placed on the name entry field |

-continued

| Element Name | Action/Validation Details | Error Message Text |
|---|---|---|
| Add | On Clicking add button or the pressing the enter key field with the cursor position on the Add button, The data gets added to the table. Validation checks are done to not allow null value on the Mail ID entry field. Must not allow duplicate entries on the name Must not allow the length of the field entry to go beyond as per the database design for the column Must Choose a Child workgroup | When the Add HTML Button is pressed with an empty entry on the name entry field, an Error Dialog Box pops up with the message " Please enter the Mail ID before adding to the table" with "yes" option. On press of Yes Button, The cursor must be placed on the name entry field For duplicate entries, Error dialog box - "Duplicate values not allowed. Please enter again" For child workgroup, Error Dialog Box "Please choose a Child workgroup" |
| Modify | On Clicking modify button or the pressing the enter key field with the cursor position on the modify button, The data gets added to the table. | None |
| Table | Should have column header and each subsequent row should be identified by alternate color combinations. i.e. First row should have color 'x' and the next row should have color 'y'. The next row should have color 'x' again and so on. The size of any text inside any cell should be wrapped if the text becomes too long. The letters must be green in color for the rows retrieved from the permanent repository and red for the rows in temporary storage. All the letters of the row on edit must be in dark gray. | |
| Delete | Should function with enter key cursor positioned on the "Delete" button or on mouse click Delete button should work on multiple deletes based on the check box or boxes selected. If the user clicks on the delete button without checking any of the check box should throw error message. Success: Deletes the row or rows from the table (temporary storage) | Error Dialog Box: "Please choose the row or rows to be deleted." with "yes" option |
| Check All | On clicking the "Check All" link should check all the check boxes in the HTML table. | Not Applicable |
| Clear All | On clicking the "Clear All" link should uncheck all the checked check boxes in the HTML table. | Not Applicable |
| Edit | Should function with Enter Key Cursor positioned on the "Edit" button or on mouse click. Refer Interface flow on scenarios - "edit data" | |
| Save | Should function with enter key cursor positioned on the "Save" button or on mouse click? On saving the data the data gets saved to the permanent repository. | Not Applicable |
| Cancel | All the data entered is reset with empty/initial values in the data entry fields as the case may be (Text Field, List etc). If a row is already modified and added to the table on the screen and the Cancel button is pressed, the row remains with the modified values | Not Applicable |
| Browser Window | When a user tries to close the window with out saving data into the permanent repository, a dialog box pops up | Error Dialog box message: "Do you want to save all changes before closing/leaving the window?" with a "Yes" and "No" option. On press of "Yes" leads to saving of information and "No" leads to the Category screen with the original values |

3.1.5.4. Screen Flow

The user enters the information on the Mail ID and Child Workgroup

The following are the scenarios the user may come across when operating on the screen

| Scenario | Description |
|---|---|
| Add data entered | Adding the data entered (pressing the "Add" Button) leads to adding mail id and Child Workgroup to a temporary storage. The data gets loaded into the permanent repository only after the user saves the information. |
| Modify data entered | When a row is selected for an edit operation, the row is highlighted and data elements populated into respective fields and the add button has a label "modify". Modifying the data entered (pressing the "Modify" button) leads to adding modified information to a temporary storage. The data gets loaded into the permanent repository only after the user saves the information. |
| Edit data | Editing the Data (pressing the "Edit" Button).<br>The edit operation may be on any of the two scenarios.<br>1 (Edit for rows from database) When the user comes to the Mail Member screen and the screen is already loaded with data from the permanent repository into a table on the screen.<br>2 (Edit for rows from the temporary storage)<br>When the user has just added the data into a table on the screen and wants to edit the data entered before saving<br>The data in the table on the screen would be shown as green letters for the data from the database and red letters for the data that is in the temporary storage (not saved yet).<br>The table shall have alternate rows colored with different light colors<br>Under 1, on an edit operation for a row on the table, the row does not get deleted from the table and the data is transferred to the mail id and Child Workgroup.<br>Under 2, on an edit operation for a row on the table, the row gets deleted from the table and the data is transferred to the mail id and child workgroup, which are editable.<br>When a row is on edit mode, the letters are in dark gray color in the table. |

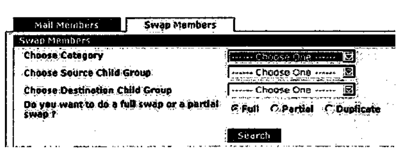

| Scenario | Description |
|---|---|
| Search | The search window must generate a list of all active Child work groups for category Mail. The user will not be allowed to make entries into the entry field where the search results are going to be put in. |
| Delete Checked Rows | The data in the table on the screen contains the data, which is from the permanent repository, or the data just added and is in temporary storage.<br>When the rows are "checked" for |

-continued

| Scenario | Description |
|---|---|
| | the rows that contain the data from the repository and a "Delete Checked Rows" is performed, inactivation takes place on saving the information When the rows are "checked" for the rows that contain the data from the temporary storage and a "Delete Checked Rows" is performed, the rows are deleted from the temporary storage. |
| Check All | Enables checking of all the checkboxes by checking "check All" Check Box |
| Check All & Delete Checked Rows | Enables deleting all the rows from the table on the screen enabled by "check All" |
| Check Any Number & Delete Checked Rows | Enables deleting the rows from the table on the screen that are only checked. |
| Check All & Clear All | Enables clearing (removing the check) all checked rows done by "Check All" |
| Check Any Number & Clear All | Enables clearing (removing the check) the rows that are checked. |
| Clear All when no rows are checked | The user can only press the button and nothing happens like checking, removing a check |
| Save | All the data added or modified and added into/deleted from the rows in the table are saved into the permanent repository Once saving is done, return back to the Mail Member screen with all the fresh updates |
| Cancel | All the data entered is reset with empty/initial values in the data entry fields as the case may be (Text Field, List etc). If a row (which is retrieved from the database) is already modified and added to the table on the screen and the "Cancel" button is pressed, the row remains with the modified values. |

3.1.6. User Interface Id: Swap Members 3.1.6.1. Screen Name: Swap Members (BPI_CAS_UTL_SCR__002__005)

3.1.6.2. SID, Element Name, Element Type & Purpose

| Element Name | Element Type | Purpose |
|---|---|---|
| Main Header "Swap Members" | Text | To give the heading for the screen being navigated |
| Choose Source Child Work Group | Text | Text For "Choose Source Child Workgroup" |
| Choose Source Child Work Group | Search | Search window showing a list of all child work groups |
| Choose Destination Work Group | Text | Text for "Child Workgroup" |
| Choose Destination Child Work Group | List | Search window showing a list of all active child work groups |
| Do you want to do a full or partial or duplicate swap? | Text | Text for " Do you want to do a full or partial or duplicate swap?" |
| Partial/Full | Radio Buttons | Default - Partial |
| Table | HTML table | For displaying all the information of rows retrieved from the permanent repository |
| Swap | Button (HTML Button) | To swap the rows checked |
| Check All | Text Link | To check all the check boxes in the table |
| Clear All | Text Link | To un check all the check boxes checked in the table/does not function when all the checkboxes in the table are unchecked |

3.1.6.3. Front End Validations

| Element Name | Action/Validation Details | Error Message Text |
|---|---|---|
| Submit | The source and destination child work group must not be the same | Error Dialog "Source and Destination Child Groups cannot be the same" with a |

-continued

| Element Name | Action/Validation Details | Error Message Text |
|---|---|---|
| | The source and destination groups must belong to the same Main Workgroup<br>The Child work groups must belong to the same category | Yes Option<br>Error Dialog "Source and Destination Child Groups must belong to the same Main Workgroup" with yes option<br>Error Dialog "Child workgroups must belong to the same category" |
| Swap | As mentioned in scenario | As mentioned in scenario |

3.1.6.4. Screen Flow

The user chooses the source and destination child workgroups and decided whether the swap is for full or partial members of the workgroup.

The following are the scenarios the user may come across when operating on the screen

| Scenario | Description |
|---|---|
| Submit | Press the submit button after choosing the valid values from the source and destination child groups and whether the swap is in full or partial.<br>Full swap leads to swapping of all the members of the source to the destination.<br>Partial swap leads to the screen showing the list of all members of the source in alphabetical order and enables the user to check members who are to be swapped to the destination child group<br>Duplicate swap leads to the screen showing the list of all members of the source in alphabetical order and enables the user to check members who are to be swapped to the destination child group and would also remain in the source child group (Duplicate)<br>Inserts information of the swap into the database and navigates to the confirmation screen |
| Yes/No | Yes leads to the swap members screen and No leads to the work Group Home Page |

4. Business Rule Mapping

| Activity | Rules |
|---|---|
| Create Category | Should have unique Id for a category -- 10 digits with an increment of 1, Say CT00000001, CT00000002, CT00000003 and so on. |
| Create Main Workgroup | Should have unique Id 10 digit for a main workgroup with an increment of 1, Say 1000, 1001, 1002 and so on. |

-continued

| Activity | Rules |
|---|---|
| Create Child Workgroup | Should have unique Id 4 digit for a child workgroup with an increment of 1, Say 1000, 1001, 1002 and so on. |
| Create Mail Members | Should have unique Id 4 digit for a mail member with an increment of 1, Say 1000, 1001, 1002 and so on. |
| Create swap | Should have unique Id 4 digit for a parent with an increment of 1, Say 1000, 1001, 1002 and so on. |

Benefit Partners Inc

Process Specification

Supply Request

Internal

1. Introduction 1.1. Purpose

This functional specification document addresses the part of the Core Administration System that would facilitate the sending of Supply Requests or any handbooks to employer groups or the members of a group.

1.2. Business Use Case Specification Reference

| Business Use Specification ID | Business Use Case Name |
|---|---|
| None | None |

1.3. Definitions, Acronyms & Abbreviations

| Term | Explanation |
|---|---|

2. Process Identification 2.1. Process Description

A Supply Request—Internal contains a list of all stationeries ordered from individual associates for their daily use, which shall be facilitated and fulfilled by a specific department of a person.

2.2. Process Flow (See FIG. N-8)

3. User Interface 3.1. User Interface Screens 3.1.1. Screen ID's

| Screen ID (SID) | Screen Name | Corresponding HTML File Name |
|---|---|---|
| utl.supplyrequest.internal | Supply Request Internal | InternalSupplyRequest.jsp |
| utl.supplyrequestview.internal | Supply Request Internal View | IntemalSupplyRequestView.jsp |
| utl.supplyrequestresult.internal | Supply Request Internal | IntemalSupplyRequestResult.jsp |
| utl.supplyconfirm.internal | Supply Request Internal Confirmation | InternalSupplyRequestMailConfirm.jsp |

3.1.2. User Interface Id: Supply Request—Internal 3.1.2.1. Screen Name: Supply Request—Internal (BPI_CAS_UTL_SCR__003__001) (See FIG. N-9)

3.1.2.2. SID, Element Name, Element Type & Purpose

| Element Name | Element Type | Label | Purpose |
|---|---|---|---|
| Main Header "Internal Supply Request" | Text | Main Header "Internal Supply Request" | To give the heading for the screen being navigated |
| Text items as shown in the screen | Text | Text items as shown in the screen | To provide information as shown in the screen along with Qty Text and in Boxes as shown in the screen snapshot |
| Qty Entry Field | Entry Field | Qty Entry Field | Entry field for Quantity for all items |
| Special Instructions Text | Text | Special Instructions Text | Text for "Special Instructions" |
| Special Instructions Text Area | Text Area | Special Instructions Text Area | Text Area For Special Instructions |
| Confirm Fulfillment by Email | Check Box | Confirm Fulfillment by Email | Check Box for "Confirm Fulfillment by Email" |
| Save | Button (HTML Submit button) | Save | Save the information to the repository |
| Cancel | Button | Cancel | Reset information as described in the scenarios |

3.1.2.3. Front End Validations

| Element Name | Action/Validation Details | Error Message Text |
|---|---|---|
| Save | Should function with enter key cursor positioned on the "Save" button or on mouse click. On saving the data the data gets saved to the permanent repository. And send an email to the fulfillment staff along with a confirmation page to the user Mandatory Entry 1) Choose any one item with Qty | Mandatory Entries: 6) Choose anyone item with Qty Error dialog Box - "Choose Any one item with Quantity" with Yes option |
| Cancel | All the data entered is reset with null values in the data entry fields as the case may be (Text Field, List etc). | Not Applicable |

3.1.2.4. Screen Flow

The following are the scenarios the user may come across when operating on the screen

| Scenario | Description |
|---|---|
| Save | Pressing the save button leads to saving the data in the repository, sending an email to fulfillment Specialist and confirmation to the user who has checked the confirmation by email check box<br>Email Content - Subject: Internal Supply Request<br>Dear Staff,<br>Please forward the following to the address mention below<br>Items - Qty<br>Special Instructions<br>Thanks<br><ID of the person who has made the request> |
| Cancel | All the data entered is reset with empty in the data entry fields as the case may be (Text Field, List etc). |

3.1.3. User Interface Id: Internal Supply Request Confirmation 3.1.3.1. Screen Name: Internal Supply Request Confirmation (BPI_CAS_UTL_SCR__003__002)

3.1.3.2. SID, Element Name, Element Type & Purpose

| Element Name | Element Type | Label | Purpose |
|---|---|---|---|
| Main Header "Supply Request - Internal Confirmation" | Text | Main Header "Supply Request - Internal Confirmation" | To give the heading for the screen being navigated |
| Message | Text | Message | Text For "The Supply Request has been forwarded to the fulfillment specialist" |
| Message | Text | Message | Text For "The Reference confirmation number is" |
| Dynamic Text | Text | Dynamic Text | Dynamic Value Text for "<Supply Request ID>" |
| Do you want to create more requests? | Text | Do you want to create more requests? | Text for "Do you want to create more requests?" |
| Yes | Link | Yes | Link for "Yes" |
| No | Link | No | Link for "No" |

3.1.3.3. Front End Validations

None.

3.1.3.4. Screen Flow

The following are the scenarios the user may come across when operating on the screen

| Scenario | Description |
|---|---|
| Yes | Leads to the Supply Request - Internal Screen |
| No | Leads to the Supply Request - Internal Home Page |

3.1.4. User Interface Id: Supply Request Fulfillment Confirmation 3.1.4.1. Screen Name: Supply Request Fulfillment Confirmation (BPI_CAS_UTL_SCR__003__003) (See FIG. N-10)

3.1.4.2. SID, Element Name, Element Type & Purpose

| Element Name | Element Type | Label | Purpose |
|---|---|---|---|
| Main Header "Internal Supply Request-Fulfillment Confirmation" | Text | Main Header "Internal Supply Request-Fulfillment Confirmation" | To give the heading for the screen being navigated |
| Message | Text | Message | Text For "The following are the pending Supply Requests. On fulfilling the request, check the row and press save to confirm" |
| Check All | Link | Check All | Checks all the check Boxes |
| Clear All | Link | Clear All | Clears All or any Checked Boxes |
| Save | HTML Button | Save | Save Button |
| Cancel | HTML Button | Cancel | Cancel Button |

3.1.4.3. Front End Validations

| Element Name | Action/Validation Details | Error Message Text |
|---|---|---|
| Save | Must choose at least one check Box | Error Dialog Box - "Please Check at least one row" with yes option |

3.1.4.4. Screen Flow

The following are the scenarios the user may come across when operating on the screen

| Scenario | Description |
|---|---|
| On Entering the screen | Provides a list of all pending requests |
| Check All | Checks all the check Boxes |
| Clear All | Clears all the Check Boxes/Or any checked boxes |
| Save | Saves all the updates made and send email to the personnel who made the request where the confirmation on fulfillment by Email check Box is checked. The user Email details are picked up from the security framework<br>Email:<br>Subject: Internal Supply Request Fulfillment"<br>Dear "Name"<br>We have fulfilled your request <Supply Request id> on "date of saving the fulfillment request"<br>Thanks<br>Internal SuppliesFulfillment Staff |
| Cancel | Resets the screen with original values before a save |

4. Business Rule Mapping

| Activity | Rules |
|---|---|
| Create Internal Supply Request ID | Should have unique Id for a Supply Request -- 10 digits with an increment of 1, Say IN00000001, IN00000002, IN00000003 and so on. |

Benefit Partners Inc

Process Specification

Associates

1. Introduction 1.1. Purpose

This functional specification document addresses the part of the sales and marketing system that would deal with creation of master records for internal and external associates.

1.2. Business Use Case Specification Reference

| Business Use Specification ID | Business Use Case Name |
|---|---|
| None | None |

1.3. Definitions, Acronyms & Abbreviations

| Term | Explanation |
|---|---|

2. Process Identification 2.1. Process Description & Flow

The Internal associates are the associates who are employed by BPI and work with BPI. External associates are the associates who are associated with the Business and may not be employed by BPI.

The associates masters are created and assigned to a child work groups

The user has the option to create, modify, delete and view within the same screen.

3. User Interface 3.1. User Interface Screens 3.1.1. Screen ID's

| Screen ID (SID) | Screen Name | Corresponding HTML File Name |
|---|---|---|
| sales.associate.create | Associates | CreateAssociate.jsp |

3.1.2. User Interface Id: Associates 3.1.2.1. Screen Name: Associates (BPI_CAS_UTL_SCR__004__001) (See FIG. N-11)

3.1.2.2. SID, Element Name, Element Type & Purpose

| Element Name | Element Type | Label | Purpose |
|---|---|---|---|
| Main Header "Internal Associate" | Text | Main Header "Internal Associate" | To give the heading for the screen being navigated |
| Sub Header "General Information" | Text | Sub Header "General Information" | To give the heading for the section being navigated |
| Association Type | Text | Association Type | To show Association type |
| Internal | Radio | Internal | To show Association type |
| External | Radio | External | To show Association type |
| Salutation | Text | Salutation | Used in sub section General Information |
| Salutation | List | Salutation | List for Salutation - Mr., Mrs., Miss |
| First Name | Text | First Name | Used in sub section General Information |
| First Name | Entry Field | First Name | Entry field for first name. |
| MI | Text | MI | Used in sub section General Information |
| MI | Entry Field | MI | Entry Field for MI. Used in sub section General Information |
| Last Name | Text | Last Name | Used in sub section General Information |
| Last Name | Entry Field | Last Name | Entry Field for Last Name. Used in sub section General Information |
| Suffix | Text | Suffix | Used in sub section General Information |
| Suffix | List | Suffix | List showing Sr, Jr. Used in sub section General Information |
| Address | Text | Address | Used in sub section General Information |
| Address | Entry Field | Address | Entry Field for Address, Used in sub section General Information |
| Apt No | Text | Apt No | Used in sub section General Information |
| Apt No | Entry Field | Apt No | Entry Field for Suite/Apt no. Used in sub section General Information |
| City | Text | City | Used in sub section General Information |
| City | Entry Field | City | Entry Filed for City. Used in sub section General Information |

-continued

| Element Name | Element Type | Label | Purpose |
|---|---|---|---|
| Zip | Text | Zip | Used in sub section General Information |
| Zip | Entry Field | Zip | Entry Field for Zip. Used in sub section General Information |
| State | Text | State | Used in sub section General Information |
| State | List | State | List of all states in USA. Used in sub section General Information |
| Sub Header "Contact Details" | Text | Sub Header "Contact Details" | To give heading for the subsection |
| Phone | Text | Phone | Text for Phone |
| Phone | Entry Field | Phone | Entry Field for Phone |
| Fax | Text | Fax | Text for Fax |
| Fax | Entry Field | Fax | Entry Field for Fax |
| Email | Text | Email | Text for EMail |
| Email Entry Field | Entry Field | Email Entry Field | Entry Field for EMail |
| Sub Header "Associated Workgroups" | Text | Sub Header "Associated Workgroups" | To give heading for the subsection |
| Associated Workgroup | Text | Associated Workgroup | Text for Associated workgroups |
| Associated work groups (non editable) with search | Search | Associated work groups (non editable) with search | Search for Associated child work groups for category Internal Associates |
| Sub Header "Other Information" | Text | Sub Header "Other Information" | To give heading for the subsection |
| License Number | Text | License Number | Text for "License Number" |
| License Number | Entry Field | License Number | Entry Field for: License Number" |
| Add | HTML Button | Add | Button for adding the name/description in to the HTML table. Changes with label "Modify" when the row in the table is on edit mode. |
| Table | HTML table | Table | For displaying all the information added by pressing the add button, in the form of rows, for every add operation/Rows retrieved from the permanent repository |
| Delete | Button (HTML Button) | Delete | To delete the rows checked |
| Check All | Text Link | Check All | To check all the check boxes in the table |
| Clear All | Text Link | Clear All | To uncheck all the check boxes checked in the table/does not function when all the checkboxes in the table are unchecked |
| Delete | Check box | Delete | To check the items for deletion |
| Edit | Button (HTML Button) | Edit | To edit the rows entered by "Add"/"Modify"/displayed from permanent repository against the row selected for edition |
| Save | Button (HTML Submit button) | Save | Save the information to the repository |
| Cancel | Button | Cancel | Reset information as described in the scenarios |

3.1.2.3. Front End Validations

| Element Name | Action/Validation Details | Error Message Text |
|---|---|---|
| First Name | Mandatory Entry<br>Accepts Alpha numeric characters | When the Add HTML Button is pressed with an empty entry on the name entry field, an Error Dialog Box pops up with the message "First Name is required" name before adding to the table" |
| License Number | Alpha Numeric | When the Add HTML Button is pressed with a non numeric entry on the License Number, an Error Dialog Box pops up with the message "License Number - Accepts Alpha numeric values only" |
| Add | On Clicking add button or the pressing the enter key field with the cursor position on the Add button, The data gets added to the table. Validation checks are done to not allow null value on the First name entry field. Must not allow the length of the field entry to go beyond as per the database design for the column<br>Must choose a workgroup | When the Add HTML Button is pressed without choosing the child work group, an Error Dialog Box pops up with the message "Assigned Workgroup is required" |
| Modify | On Clicking modify button or the pressing the enter key field with the cursor position on the modify button, The data gets added to the table. | Same as Add |
| Table | Should have column header and each subsequent row should be identified by alternate color combinations.<br>i.e. First row should have color 'x' and the next row should have color 'y'. The next row should have color 'x' again and so on. The size of any text inside any cell should be wrapped if the text becomes too long. The letters must be green in color for the rows retrieved from the permanent repository and red for the rows in temporary storage.<br>All the letters of the row on edit must be in dark gray. | |
| Delete | Should function with enter key cursor positioned on the "Delete" button or on mouse click Delete button should work on multiple deletes based on the check box or boxes selected. If the user clicks on the delete button without checking any of the check box should throw error message.<br>Success: Deletes the row or rows from the table (temporary storage) | Error Dialog Box: "Select a record(s) to delete." with "yes" option |
| Check All | On clicking the "Check All" link should check all the check boxes in the HTML table. | Not Applicable |
| Clear All | On clicking the "Clear All" link should uncheck all the checked check boxes in the HTML table. | Not Applicable |
| Edit | Should function with Enter Key Cursor positioned on the "Edit" button or on mouse click. Refer Interface flow on scenarios - "edit data" | |

-continued

| Element Name | Action/Validation Details | Error Message Text |
|---|---|---|
| Save | Should function with enter key cursor positioned on the "Save" button or on mouse click On saving the data the data gets saved to the permanent repository | Not Applicable |
| Cancel | All the data entered is reset with empty/initial values in the data entry fields as the case may be (Text Field, List etc). If a row is already modified and added to the table on the screen and the Cancel button is pressed, the row remains with the modified values | Not Applicable |

3.1.2.4. Screen Flow

| Scenario | Description |
|---|---|
| Click Internal/External workgroup Radio button | On click of Internal/External Association type. Available Internal/External associated work-group in the system will be listed in the respective list box. |
| Add Selected Internal/External Workgroup | Assigning the Internal/External workgroup. |
| Remove Selected Internal/External Workgroup | Remove the assigned Internal/External workgroup. |
| Add data entered | Adding the data entered (pressing the "Add" Button) leads to adding name (first name + Last Name) and child work group to a temporary storage. The data gets loaded into the permanent repository only after the user saves the information. |
| Modify data entered | When a row is selected for an edit operation, the row is highlighted and data elements populated into respective fields and the add button has a label "modify". Modifying the data entered (pressing the "Modify" button) leads to adding the information to a temporary storage. The data gets loaded into the permanent repository only after the user saves the information. |
| Search | The search window must generate a list of all active child groups for Category Internal Associates. The user will not be allowed to make entries into the entry field where the search results are going to be put in. |
| Edit data | Editing the Data (pressing the "Edit" Button). The edit operation may be on any of the two scenarios. 1. (Edit for rows from database) When the user comes to the Internal Associates screen and the screen is already loaded with data from the permanent repository into a table on the screen. 2. (Edit for rows from the temporary storage) When the user has just added the data into a table on the screen and wants to edit the data entered before saving The data in the table on the screen would be shown as green letters for the data from the database and red letters for the data that is in the temporary storage (not saved yet). The table shall have alternate rows colored with different light colors Under 1, on an edit operation for a row on the table, the row does not get deleted from the table and the data is transferred to the placeholders. Under 2, on an edit operation for a row on the table, the row gets deleted from the table and the data is transferred to the placeholders, which are editable. When a row is on edit mode, the letters are in dark gray color in the table. |
| Delete Checked Rows | The data in the table on the screen contains the data, which is from the permanent repository, or the data just added and is in temporary storage. When the rows are "checked" for the rows that contain the data from the repository and a "Delete Checked Rows" is performed, inactivation takes place on saving the information When the rows are "checked" for the rows that contain the data from the temporary storage and a "Delete Checked Rows" is performed, the rows are deleted from the temporary storage. |
| Check All | Enables checking of all the checkboxes by checking "check All" Check Box |
| Check All & Delete Checked Rows | Enables deleting all the rows from the table on the screen enabled by "check All" |
| Check Any Number & Delete Checked Rows | Enables deleting the rows from the table on the screen that are only checked. |
| Check All & Clear All | Enables clearing (removing the check) all checked rows done by "Check All" |
| Check Any Number & Clear All | Enables clearing (removing the check) the rows that are checked. |
| Clear All when no rows are checked | The user can only press the button and nothing happens like checking, removing a check |
| Save | All the data added or modified and added into/deleted from the rows in the table are saved into the permanent repository Once saving is done, return back to the Internal Associates screen with all the fresh updates |
| Cancel | All the data entered is reset with empty/initial values in the data entry fields as the case may be (Text Field, List etc). If a row (which is retrieved from the database) is already modified and added to the table on the screen and the "Cancel" button is pressed, the row remains with the modified values. |

4. Business Rule Mapping

| Activity | Rules |
|---|---|
| Create Associate ID | Should have unique Id for an Associates -- 10 digits with an increment of 1, Say 0000000001, 0000000002, 0000000003 and so on. |

Benefit Partners Inc

Process Specification

Call Tracking

1. Introduction 1.1. Purpose

The purpose of this document is to describe the process of Call Tracking. This document identifies how the user interacts with the system, the data to be captured, the business logic to be implemented, and the output of the process.

1.2. Business Use Case Specification Reference

| Business Use Specification ID | Business Use Case Name |
|---|---|
| None | None |

1.3. Definitions, Acronyms & Abbreviations

| Term | Explanation |
|---|---|

2. Process Identification 2.1. Back Ground

Call tracking is used to basically track the calls that are made or received with specific business intentions. The call can be inbound or outbound based on the nature of calls.

2.2. Process Description

The objective of the Call Tracking process is to:

1) Provide for a user interface for calls categorized as inbound or outbound.

2) The inbound or outbound calls would make up the "To Do List" based on follow up required to be performed by the work group associated with the call in question.

2.3. Process Flow

Process for Call Tracking

1) Call would be identified as inbound or outbound.

2) The user requests the Call Tracking screen (somehow—either menu or something else) and then the Call Tracking appears as a child window. In this case the user can still view the information brought up for use in the inquiry while completing the Call Log. In this case the user would have to specify the type of referenced entity, either Group or Agent, then enter the ID of the referenced entity, the caller name, the nature of call, any remarks, and finally whether follow-up is required.

3) All calls received, having specific inquiries or intentions by the caller, would be documented only at the Group level or Agent level. For instance, if the group calls in reference to a specific employee, then when logging the call, the user will indicate the Group ID, the caller name, the nature of call and indicate in the remarks section of the call log, the specific Employee name/ID.

4) All calls made would have the nature of calls that specifies the nature or reasons for the call received or made. If "referenced entity" is "Group" then nature of call list is displayed for "Group"—If referenced entity is "Agent" then nature of call list is displayed for "Agent".

5) Date and time stamp for the calls received or made would be automatically stamped by the system.

6) If any call needs follow up it would be flagged for follow up and would be visible in the "To Do List" sorted by Date and Workgroup.

7) All completed follow up would have completed status to mark.

3. User Interface 3.1. User Interface Screens 3.1.1. Screen ID's

| Screen ID (SID) | Screen Name | Corresponding HTML File Name |
|---|---|---|
| utl.calltracking.create | Call Tracking | CallTracking.jsp |
| utl.calltracking.todolist | To Do List | ToDoList.jsp |

3.1.2. User Interface Id: Call Tracking 3.1.2.1. Screen Name: Call Tracking (BPI_CAS_UTL_SCR__005__001) (See FIG. N-12)

3.1.2.2. SID, Element Name, Element Type & Purpose

| Element Name | Element Type | Purpose |
|---|---|---|
| Call Type | Drop down list | Select the type of call |
| RE: | Text | To provide text |
| Group | Radio Button | To select either Group or Agent for what the call was regarding. |
| Caller name | Entry Field | Enter the caller name This will allow a search capability in order to link the inbound call to the correct agent or group |
| Nature of Call Group | Text | To provide text |
| Nature of Call Group | Drop down list | Select the nature of call based on the caller type |
| Nature of Call Agent | Text | To provide text |
| Nature of Call Agent | Drop down list | Select the nature of call based on the caller type |
| Other | Entry Field | Enter if other Should only appear if "other" is selected from drop down menu. |
| Follow Up Required | Check Box | To check if follow up required |
| Follow Up Date | Text | To provide text |
| Follow Up Date | Entry Field | To specify date for follow-up. Default should be next day. Date will have an option of a calendar or entering the date in the format MM/DD/YYYY |
| Date and Time Stamp | Date Text | To specify the date |
| Comments | Text Box | Text area to enter comments |
| Save | HTML Button | To save the data captured |
| Cancel | HTML Reset Button | To reset to the status as was on loading the page. |

3.1.2.3. Front End Validations

| Element Name | Action/Validation Details | Message |
|---|---|---|
| Call type | Should list the call types of In bound nad Out bound. The first option should be - Choose One -. Subsequent call types should listed in alphabetical order. | "Call Type - is required" |
| Caller name | Entry field for entering the caller name | "Caller Name - Is required." "Caller Name - Accepts alphabetic characters only" |
| Nature of Call | Nature of call depends on the "referenced entity". Each "referenced entity" has a different list for choosing Nature of Call. Hence the list should get populated based on the "referenced entity". Categories for Nature of Call are included in the drop down menu list. | "Nature of Call - Is required." |
| Other | If the nature of call is other. Entry field to write other. | "Others - is required." |
| Follow Up Required | Check box to be un checked by default. Checked if required for follow up. | None |
| Follow Up Date | To specify date for follow-up, should default to next working day following. | "Follow-up Date - Is required" "Follow-up Date - Accepts date from 1900 to 2200 in the format of MM/DD/YYYY" |
| Comments | Text area to write comments | "Comments - Accepts all Alphanumeric and special |

-continued

| Element Name | Action/Validation Details | Message |
|---|---|---|
| | | Characters except double quotes." |
| Save | On click should save the data captured above into the repository | "The Field Name is blank. Please enter a valid value." |
| Cancel | Reset to the state as was on loading the page on click. | None |

3.1.2.4. Screen Flow

None.

3.1.3. User Interface Id: Call Tracking To Do List 3.1.3.1. Screen Name: Call Tracking To Do List (BPI_CAS_UTL_SCR__005__002) (See FIG. N-13)

3.1.3.2. SID, Element Name, Element Type & Purpose

| Element Name | Element Type | Label | Purpose |
|---|---|---|---|
| Call type | Text | Call type | To provide text |
| Call Type | Radio | Call Type | To Select a rate type (Whether Inbound or Out bound) |
| Follow-up Date | Text | Follow-up Date | To provide text |
| Follow-up Date | Entry Field/ Calendar | Follow-up Date | To pick the date for the to do list |
| Called Date | text | Called Date | To provide text. |
| Called Date | text | Called Date | To pick the date for the to do list. |
| Search | Button | Search | To show the To do List based on the called date |
| Table | HTML Table | Table | Table to provide the inbound or outbound calls information. |
| Task Completed | Check Box | Task Completed | To check if task completed |
| Save | HTML Submit button | Save | To save the data |
| Cancel | HTML reset button | Cancel | To reset |

3.1.3.3. Front End Validations

| Element Name | Action/Validation Details | Message |
|---|---|---|
| Follow-up Date | Choose follow-update radio button. And Select the date to show the to do list. | "Follow-up Date - Is required." "Follow-up Date - Accepts date from 1900 to 2200 in the format of MM/DD/YYYY" |
| Called Date | Choose Called Date radio button and select the date to show the to do list. | "Called Date - Is required." "Called Date - Accepts date from 1900 to 2200 in the format of MM/DD/YYYY" |
| Search | On Click should show the To Do List based on the date selected | none |
| Table | Table to display the data. The table should only contain that data or called that need to be followed up. (i.e. Check box Checked for the Follow up required in previous screen BPI_CAS_SCR_UTL_05_001 | None |
| Task Completed | Default unchecked. If Checked and saved should not allow for Un checking again. | None |
| Save | On click should save the data captured above into the repository | None |
| Cancel | Reset to the state as was on loading the page on click. | None |

3.1.3.4. Screen Flow

None.

4. Business Rule Mapping

| Activity | Rules |
|---|---|

Benefit Partners Inc

Process Specification

BPI_CAS_FSD_SECURITY__01

1.1 Introduction

This purpose of this document is to identify the processes associated with the security mechanism for core administrative system 1.2 Business Use Case Specification Reference

| Business Use Specification ID | Business Use Case Name |
|---|---|
| NONE | NONE |

1.3 Process Identification 1.3.1 Process Description & Flow

This process describes the security framework requirements. The security framework consists of creating database for security system as well as administrator login into the system. The system also allows the administrator to create users, module, groups, and application, assign user roles and ACL etc. The system also takes care of user login into the core administrative system. The system should generate the ACL for each user when user logs in into the system. The access to any resource in the core administrative system will be decided by this ACL which will be stored in the User Profile object, stored into the session.

The security system for Intranet application built for shall broadly contain following categories.

1. Definition of Realms
2. Definition of Modules
3. Definition of Applications
4. Definition of Resources
5. Definition of groups (groups can ideally be a department which has a number of users)
6. Definition of User
7. Definition of User Roles
8. Definition ACL/Permissions
9. Resources, which can be assigned to the groups.
10. User, User Role and Groups mapping
11. Overriding the group access rights.

Realms

A realm is a database of users, groups, modules, application resources and access control lists. A user must be defined in a realm in order to access any resources belonging to that realm.

Modules

The modules provide the high level classification for the applications. The module is a group of applications. The following modules have been identified in the initial stage as a part of core administrative system viz. Carrier Maintenance, Enrollment, Sales and Marketing and Finance.

Applications

A module consists of many applications. An application represents the business use case or set of related use cases. A module consists of many applications. For e.g. Carrier Maintenance module consists of following applications viz. Zip Master, Carrier Master, and M Plan etc. Each application can be further classified into the pages.

Resources

An application can be further classified into the Resources. An application can have one or more resources.

Resources are the valuable items accessible from the Web server/Web Application server:

Web Applications: Java Servlet or JSP

The resources can be protected by using a single access control (ACL). The ACL specifies which users or groups are allowed to access or modify the resource.

For each resource to protect, you'll specify:

An access control list (ACL)—a list defining who can use the resource

Groups

A group is a collection of users. A user can belong to multiple groups. The groups can be created based on the department where all the uses are going to perform the similar kind of operation.

Groups are sets of users. Groups provide an efficient way to manage large numbers of users because an administrator can specify permissions for an entire group at one time. The resources pages can be allocated to group instead of assigning to individual user.

The user gets the default access rights as a part of group. The user can override the group access rights.

A person can be defined as both an individual user and as a member of a group. When an individual user also belongs to a group, the individual access permissions override any group access permissions.

For e.g. a set of data entry operators can have be classified into one group. The rights can be assigned to this group as all basically going to do the data entry operation.

USER ROLES

In any system, there are many roles, which a particular entity plays. For e.g. in any industry role played by the manager differs from the subordinate.

The roles need to be classified into the security system. A user can play multiple roles in the system. A manager can play the role as data entry as well as authorizing body.

A data entry operation may not have provision to enter some critical data, which manager does enter if manager is logging into the system as manager role. The managers can login into the system as data entry operator as well.

If manager is logging in as data entry operation he may not have the privileges as he was having in manager role. In such a case he will be treated as data entry operator.

The security system needs to take above situations.

The user roles can be

SUPER USER

SENIOR MANAGEMENT

MANAGER

DATA ENTRY PERSONNEL

PART TIME EMPLOYEE

The user roles need to be configured into the system. The user roles can be added for the future modifications. The CAS (Core Administration System) system need to be pre configured for the basic pre defined roles which will not be editable.

Users

A user is an identity that can be authenticated by the system. A user can represent a person who is working in any of the departments in Benefit Partners Inc.

A user can belong to multiple groups.

A user can play multiple roles

Access Rights/Permissions

Permissions represent the privileges required for accessing resources. An administrator protects resources by establishing access control lists to grant permissions to users and groups.

Individual user permissions take precedence over group permissions. Individual user permission overrides the more restrictive group permission. (Even if the group permission is less restrictive than the user permission, the user permission overrides the group permission and vice versa).

List of Programs

1. Security Login

Allows the administrator to login into the security system.

2. Module Master

Allows administrator to do following operations

Create Module

Modify Module

Delete Modules

3. Application Master

Allows administrator to do following operations

Create Application

Modify Application

Delete Application

4. Resources

Allows administrator to do following operations

Create Resources

Modify Resources

Delete Resources

5. Group Master

Allows administrator to do following operations

Create Group

Modify Group

Delete Group

6. User Master

Allows administrator to do following operations

Create User

Modify User

Delete User

7. User Role

Allows administrator to do following operations

Create Role

Modify Role

Delete Role

8. User Access Rights

9. User, User Role and Groups Mapping

10. Group Access Rights

Allows administrator to do following operations.

Assign Rights for a User. This program allows the administrator to override the access rights for a user.

11. User Login

When the system user logs in into the core administration system the separate ACL will be generated for each user. The ACL will be stored in the User Profile object, which will be stored in the user session. When user request for a particular page controller will check with the security system whether user is having access to the particular page.

The user password needs to be validated as follows

The password need to be minimum 6 characters long and max 10 characters

The password needs to be combination of alphabets and special characters and numbers (for e.g. Amit1$3, sriRam9#445 etc).

The password is valid for 15 days, which is configurable. The system should prompt user to change the password three days (which is configurable) prior to expiry date of the password.

If user changes the password then his password is valid for 15 days (which is configurable) from the date of change.

In the same way administrator can configure the minimum limit for password age, which signifies that user cannot change the password for this period from the date of prior change.

The minimum limit for the password age, which is configured value, cannot be greater than or equal to configured maximum limit of the password age.

First time user must change his password before entering into the system.

Scenario

If the user password is "123456" the for first time login user goes and change the password to "Mali5%9". The user is created on date Jan. 4, 2002. User logs in on Jan. 5, 2002 and password expiry date for the user changes to Jan. 19, 2002 (15 calendar days) if the configured time limit is 15 days. The user needs to prompt to change password on Jan. 17, 2002 (3 calendar days prior to the expiry date). If user changes the password within stipulated time then extend the password expiry date. by 15 calendar days. (New Date=Sys Date+15). All changes in the date is effective from 0000 AM The above validation is not applicable at the time of user creation as administrator can keep the password 123456 for all.

The new password in the change password is to be validated for above conditions. The old password need not be validated for above conditions. As user can have 123456 as first time as his password.

The old password needs to be maintained in the history. The new password must not be equal to last five passwords. This number of history of passwords (here its 5) should be configurable. (A configurable password history where the administrator can enter value that would represent how many passwords it would remember until the user can use the same password again)

The ability to enable or disable Account lockout with a configuration value for the number of user log in attempts at which point a lockout would occur. A way timer for when to reset the count of attempts before lock would be helpful. Also if it possible to make a lockout duration value that would be configurable would also be helpful.

User Name cannot be a part of password.

Configurable Items

| Sr No | Item Name | Value |
|---|---|---|
| 1 | Length Of Password (Minimum Value) | Integer (Ranging From 1-n) Need to be set by the administrator |
| 2 | Length Of Password (Maximum Value) | Integer (Ranging From 1-n) Need to be set by the administrator Maximum need to be greater than minimum value |
| 3 | Expiry of the password from the date of validity (Maximum Range) | Integer (Number of days) Ranging from 1-n Need to be set by the administrator |
| 4 | Expiry of the password from the date of validity (Minimum Range) | Integer (Number of days) Ranging from 1-n Need to be set by the administrator |
| 5 | Password Repeat allowed value This indicates that new passwords can not be same as last n passwords | Integer (Number of days) Ranging from 1-n Need to be set by the administrator |
| 6 | Invalid Passwords allowed before locking the account If user enters the password incorrect for n times then his account will be locked automatically. | Integer (Number of days) Ranging from 1-n Need to be set by the administrator |
| 7 | Lock Time | Time for which account to be locked if it is locked because of successive invalid passwords entry. |
| 8 | Password change prompt date | This value signifies that user need to be intimated by 3 days prior about password change (Value here set as 3) |

1.3. Security Framework

Process Flow Diagram (See FIG. P-1)

1.3.1.1. Script for Setup

Run the basic admin script, which will create the basic administrative user for security login and minimal data into the database.

1.3.1.2. Security Login

Security Login

Refer Process Flow Diagram FIG. 2. The flow of the process is as described below.

System allows user to login into the system. The basic user id and password validation will be done for the administrator for the security system.

On successful login administrator can create modules, groups, applications, user etc.

FIG. 2 Process Flow Diagram (See FIG. P-2)

1.3.1.3. Module Master

Refer Process Flow Diagram FIG. 3. The flow of the process is as described below.

Create Modules a) On selecting create modules option. The user needs to enter the module name and description.

b) The user enters the details and clicks save.

c) Upon save the data will be stored in the database.

Modify Modules a) When user selects modify modules option. He will be shown all the modules in the combo box.

b) The user selects the module name and clicks select.

c) The user will be shown the details about the selected module. The user can modify the module details and click save. The data will be updated into database.

Delete Modules a) When user selects the Delete option, the user will be shown all the modules where in user can select one or more access control list and click delete.

b) The selected modules will be deleted from the database.

FIG. 3: Process Flow Diagram (See FIG. P-3)

1.3.1.4. Application Master

Refer Process Flow Diagram FIG. 4. The flow of the process is as described below.

Create Application a) On selecting create application option. The user needs to enter the application details like application name, module name and description.

b) The user enters the data and clicks save.

c) Upon save the data will be stored in the database.

Modify Application a) When user selects modify applications option. He will be shown all the applications in the selection box. The user selects one application and clicks select.

b) The user will be shown the details about the selected application. The user can modify the application details and click save.

c) The data will be updated into database.

Delete Application a) When user selects the Delete option, the user will be shown all the applications where in user can select one or more applications and click delete.

b) The selected applications will be deleted from the database.

FIG. 4: Process Flow Diagram (See FIG. P-4)

1.3.1.5. Resource Master

Refer Process Flow Diagram. The flow of the process is as described below.

Create Resource a) On selecting create resource option. The user needs to enter the resource details like resource name, application name and description.

b) The user enters the data and clicks save.

c) Upon save the data will be stored in the database.

Modify Resource a) When user selects modify resource option. He will be shown all the resources in the selection box. The user selects one resource and clicks select.

b) The user will be shown the details about the selected resource. The user can modify the resource details and click save.

c) The data will be updated into database.

Delete Resource a) When user selects the Delete option, the user will be shown all the resource where in user can select one or more resources and click delete.

b) The selected resources will be deleted from the database.

FIG. 5: Process Flow Diagram (See FIG. P-5)

1.3.1.6. Group Master

Refer Process Flow Diagram FIG. 6. The flow of the process is as described below.

Create Group a) On selecting create group option. The user needs to enter the group details like group name and description.

b) The user enters the data and clicks save.

c) Upon save the data will be stored in the database.

Modify Group a) When user selects modify group's option. He will be shown all the groups in the selection box. The user selects one group and clicks select.

b) The user will be shown the details about the selected group. The user can modify the group details and click save c) The data will be updated into database.

Delete Group a) When user selects the Delete option, the user will be shown all the groups where in user can select one or more groups and click delete b) The selected groups will be deleted from the database.

FIG. 6: Process Flow Diagram (See FIG. P-6)

1.3.1.7. User Creation

Refer Process Flow Diagram FIG. 7. The flow of the process is as described below.

Create User a) On selecting create user option. The user needs to enter the details like user name, description, address details etc.

b) The user enters the data and clicks save.

c) Upon save the data will be stored in the database.

Modify User a) When user selects modify user option. He will be shown all the user details in the selection box. The user selects one-user and clicks select.

b) The user will be shown the details about the selected user. The user can modify the user details and click save c) The data will be updated into database.

Delete User a) When user selects the Delete option, the user will be shown all the users where in user can select one or more users and click delete b) The selected users will be deleted from the database.

FIG. 7: Process Flow Diagram (See FIG. P-7)

1.3.1.8. User Role Creation

Refer Process Flow Diagram FIG. 7*a*. The flow of the process is as described below.

Create User Role a) On selecting create user role option. The user needs to enter the details like user role name, description b) The user enters the data and clicks save.

c) Upon save the data will be stored in the database.

Modify User Role a) When user selects modify user role option. He will be shown all the user role details in the selection box. The user selects one-user role and clicks select.

b) The user will be shown the details about the selected user role. The user can modify the user details and click save c) The data will be updated into database.

Delete User Role a) When user selects the Delete option, the user role will be shown all the users roles where in user can select one or more users role and click delete b) The selected user roles will be deleted from the database.

FIG. 7*a*: Process Flow Diagram (See FIG. P-8)

1.3.1.9. User, User Role and Group Mapping

Refer Process Flow Diagram FIG. 8. The flow of the process is as described below.

Assign Rights a) On selecting the User, User Role and Group Mapping option. The user will be shown the all the users and user roles in the selection box. The user can select the combination of user and user role.

b) On selection user will be shown the all the groups with already assigned groups as checked.

c) The user adds or removes the group assignment and clicks save.

d) Upon save the data will be stored in the database

FIG. 8: Process Flow Diagram (See FIG. P-9)

1.3.1.10. Group Access Rights

Refer Process Flow Diagram. The flow of the process is as described below.

Assign Rights a) On selecting the group access rights. The user will be shown the all the groups in the selection box. The user can select any group and click select.

b) When user selects the particular group, the user will be shown the all the resources and with the access rights selection box corresponding to each module.

c) User can assign one or more resources to the group and click save.

d) Upon save the data will be stored in the database.

FIG. 9: Process Flow Diagram (See FIG. P-10)

1.3.1.11. User Access Rights

Refer Process Flow Diagram. The flow of the process is as described below.

As stated earlier, user can override the access specified to the group.

Assign User Rights a) On selecting the user access rights. The user will be shown the all the users in the selection box. The user can select any one user and click select.

b) When user selects the particular user, the user will be shown the all the access rights for his group for corresponding resource.

c) The user can add or remove the resources.

d) Upon save the data will be stored in the database.

1.3.1.12. Configure Items

Refer Process Flow Diagram. The flow of the process is as described below. This allows administrator to configure various items like password length, expiry etc.

FIG. 10: Process Flow Diagram (See FIG. P-11)

FIG. 10A: Process Flow Diagram (See FIG. P-12)

1.4 User Interface 1.4.1 User Interface ID: SECURITY_SCREEN__001 (See FIG. P-13)

User Interface ID: SECURITY_SCREEN__002 (See FIG. P-14)

1.4.1.1 User Interface Screen Snap Shot—Screen Name: Security Login 1.4.1.2 Field Name, Element Type & Purpose Table for Screen SECURITY_LOGIN_SCREEN__001

| Element Name | Element Type | Purpose |
|---|---|---|
| Main Heading Security Login | Text | To give the heading for the screen being navigated |
| Sub Header Login Name | Text | Text for the Login Name |
| Login Name | Entry Field | Text for the entry field |
| Sub Header password | Text | Text for the password |
| Password | Entry Field | Text for the password |
| Save | Button (HTML Button) | To Save the data this button need to be clicked |
| Cancel | Button (HTML Button) | To cancel current operation. |
| Select the Role | Text | Text for the Role |
| Role | Selection Box | Selection box applicable for user login only. |

Table for Screen SECURITY_LOGIN_SCREEN__002

| Element Name | Element Type | Purpose |
|---|---|---|
| Main Heading Security Login | Text | To give the heading for the screen being navigated |
| Sub Header Login Name | Text | Text for the Login Name |
| Login Name | Entry Field | Text for the entry field |
| Sub Header old password | Text | Text for the old password |
| old Password | Entry Field | Text for the old password |
| Sub Header new password | Text | Text for the new password |
| new Password | Entry Field | Text for the new re enter password |
| Sub Header re enter password | Text | Text for the re enter password |
| re enter Password | Entry Field | Text for the re enter password |
| Select | Button (HTML Button) | To select the current selected module to modify. |
| Cancel | Button (HTML Button) | To cancel current operation. |

1.4.1.3 Front End Validation

Validation Details

This section provides the front end screen validations along with the associated message—Success/Error Message text

| # | Element Name | Action/Validation Details | Message |
|---|---|---|---|
| 1. | Login Name (Entry Field) | Accepts all the alphabets and numeric characters. | Mandatory Max Length: 15 "Please Enter Login Name" |
| 2. | Password | Accepts all the alphabets and numeric characters. | Mandatory Max Length: 15 Min Length: 6 "Please Enter the password" |
| 3. | User Role | Selection Box validation | Default: Choose One "Mandatory" "Please choose one of the options specified" |

1.4.2 User Interface ID: SECURITY_SCREEN__003 (See FIG. P-15)

User Interface ID: SECURITY_SCREEN__004 (See FIG. P-16)

User Interface ID: SECURITY_SCREEN__005 (See FIG. P-17)

1.4.2.1 User Interface Screen Snap Shot—Screen Name: Module Master 1.4.2.2 Field Name, Element Type & Purpose Table for Screen SECURITY_SCREEN__003

| Element | Name Element | Type Purpose |
|---|---|---|
| Main Heading Create Module | Text | To give the heading for the screen being navigated |
| Sub Header Module Id | Text | Text for the Module Id |
| Module Id | Entry Field | Text for the entry field |
| Sub Header Module Name | Text | Text for the Module Name |
| Module Name | Entry Field | Text for the entry field |
| Sub Header Module Description | Text | Text for the Module Name |
| Module Description | Entry Field | Text for the entry field |
| Save | Button (HTML Button) | To Save the data this button need to be clicked |
| Cancel | Button (HTML Button) | To cancel current operation. |

Table for Screen SECURITY_SCREEN__004

| Element Name | Element Type | Purpose |
|---|---|---|
| Search | Gif File | Used to search the module |

Table for Screen SECURITY_SCREEN__004

| Element Name | Element Type | Purpose |
|---|---|---|
| Main Heading Modify Module | Text | To give the heading for the screen being navigated |
| Sub Header Module Id | Text | Text for the Module Id |
| Module Id | Entry Field | Text for the entry field |
| Sub Header Module Name | Text | Text for the Module Name |
| Module Name | Entry Field | Text for the entry field |
| Sub Header Module Description | Text | Text for the Module Name |
| Module Description | Entry Field | Text for the entry field |
| Update | Button (HTML Button) | To Save the data this button need to be clicked |
| Cancel | Button (HTML Button) | To cancel current operation. |

Table for Screen SECURITY_SCREEN__005

| Element Name | Element Type | Purpose |
|---|---|---|
| Main Heading Delete Modules | Text | To give the heading for the screen being navigated |
| Sub Heading Select the modules | Text | To give the sub heading for the screen being navigated |
| Module Names Sales, finance | Check Box | Check boxes for module names to be deleted. |
| Check Box | Check All | On clicking the "Check All" link should check all the check boxes in the HTML table. |
| Check Box | Clear All | On clicking the "Clear All" link should uncheck all the checked check boxes in the HTML table. |
| Delete | Delete | To Delete the data this button need to be clicked |

1.4.2.3 Front End Validation

Validation Details

This section provides the front end screen validations along with the associated message—Success/Error Message text

| # | Element Name | Action/Validation Details | Message |
|---|---|---|---|
| 1 | Module Name (Entry Field) | Accepts all the alphabets and numeric characters. | Max length: 50 Mandatory BPI_CAS_FSD_COMMON |
| 2 | Module Id (Entry Field) | Accepts all the alphabets and numeric characters. | Max length: 10 Mandatory BPI_CAS_FSD_COMMON |
| 3 | Comments (Entry Field) | Accepts all the alphabets and numeric characters. | Max length: 250 BPI_CAS_FSD_COMMON |

1.4.3 User Interface ID: SECURITY_SCREEN__006 (See FIG. P-18)

User Interface ID: SECURITY_SCREEN__007 (See FIG. P-19)

User Interface ID: SECURITY_SCREEN__008 (See FIG. P-20)

1.4.3.1

User Interface Screen Snap Shot—Screen Name: Group Master 1.4.3.2 Field Name, Element Type & Purpose Table for Screen SECURITY_SCREEN__006

| Element Name | Element Type | Purpose |
|---|---|---|
| Main Heading Create Group | Text | To give the heading for the screen being navigated |
| Sub Header Group Id | Text | Text for the Group Id |
| Group Id | Entry Field | Text for the entry field |
| Sub Header Group Name | Text | Text for the Group Name |
| Group Name | Entry Field | Text for the entry field |
| Sub Header Group Description | Text | Text for the Group Name |
| Group Description | Entry Field | Text for the entry field |
| Save | Button (HTML Button) | To Save the data this button need to be clicked |
| Cancel | Button (HTML Button) | To cancel current operation. |

Table for Screen SECURITY_SCREEN__007

| Element Name | Element Type | Purpose |
|---|---|---|
| Search | Image | To provide search |

Table for Screen SECURITY_SCREEN__007

| Element Name | Element Type | Purpose |
|---|---|---|
| Main Heading Modify Group | Text | To give the heading for the screen being navigated |
| Sub Header Group Id | Text | Text for the Group Id |
| Group Id | Entry Field | Text for the entry field |
| Sub Header Group Name | Text | Text for the Group Name |
| Group Name | Entry Field | Text for the entry field |
| Sub Header Group Description | Text | Text for the Group Name |
| Group Description | Entry Field | Text for the entry field |
| Update | Button (HTML Button) | To Save the data this button need to be clicked |
| Cancel | Button (HTML Button) | To cancel current operation. |

Table for Screen SECURITY_SCREEN__008

| Element Name | Element Type | Purpose |
|---|---|---|
| Main Heading Delete Group | Text | To give the heading for the screen being navigated |
| Sub Heading Select the Groups | Text | To give the sub heading for the screen being navigated |
| Group Names Sales, finance | Check Box | Check boxes for group names to be deleted. |
| Check Box | Check All | On clicking the "Check All" link should check all the check boxes in the HTML table. |
| Check Box | Clear All | On clicking the "Clear All" link should uncheck all the checked check boxes in the HTML table. |
| Delete | Delete | To Delete the data this button need to be clicked |

1.4.3.3 Front End Validation

Validation Details

This section provides the front end screen validations along with the associated message—Success/Error Message text

| # | Element Name | Action/Validation Details | Message |
|---|---|---|---|
| 1 | Group Name (Entry Field) | Accepts all the alphabets and numeric characters. | Max length: 50 Mandatory BPI_CAS_FSD_COMMON |
| 2 | Group Id (Entry Field) | Accepts all the alphabets and numeric characters. | Max length: 10 Mandatory BPI_CAS_FSD_COMMON |
| 3 | Comments/ Description | Accepts all the alphabets and numeric characters. | Max length: 255 BPI_CAS_FSD_COMMON |

1.4.4 User Interface ID: SECURITY_SCREEN__009 (See FIG. P-21)

User Interface ID: SECURITY_SCREEN__010 (See FIG. P-22)

User Interface ID: SECURITY_SCREEN__011 (See FIG. P-23)

1.4.4.1 User Interface Screen Snap Shot—Screen Name: Application Master 1.4.4.2 Field Name, Element Type & Purpose Table for Screen SECURITY_SCREEN__009

| Element Name | Element Type | Purpose |
|---|---|---|
| Main Heading Create Application | Text | To give the heading for the screen being navigated |
| Sub Header Application Id | Text | Text for the Application Id |
| Application Id | Entry Field | Text for the entry field |
| Sub Header Application Name | Text | Text for the Application Name |
| Application Name | Entry Field | Text for the entry field |
| Sub Header Application Description | Text | Text for the Application Name |
| Application Description | Entry Field | Text for the entry field |
| Sub Header Module Name | Text | Text for the Module Name |
| Selection Box | Selection Box | Module Name |
| Save | Button (HTML Button) | To Save the data this button need to be clicked |

-continued

| Element Name | Element Type | Purpose |
|---|---|---|
| Cancel | Button (HTML Button) | To cancel current operation. |

Table for Screen SECURITY_SCREEN__010

| Element Name | Element Type | Purpose |
|---|---|---|
| Search | Gif | To search the application |

Table for Screen SECURITY_SCREEN__010

| Element Name | Element Type | Purpose |
|---|---|---|
| Main Heading Modify Application | Text | To give the heading for the screen being navigated |
| Sub Header Application Id | Text | Text for the Application Id |
| Application Id | Entry Field | Text for the entry field |
| Sub Header Application Name | Text | Text for the Application Name |
| Application Name | Entry Field | Text for the entry field |
| Sub Header Application Description | Text | Text for the Application Name |
| Application Description | Entry Field | Text for the entry field |
| Update | Button (HTML Button) | To Save the data this button need to be clicked |
| Cancel | Button (HTML Button) | To cancel current operation. |

Table for Screen SECURITY_SCREEN__011

| Element Name | Element Type | Purpose |
|---|---|---|
| Main Heading Delete Application | Text | To give the heading for the screen being navigated |
| Sub Heading Select the Application | Text | To give the sub heading for the screen being navigated |
| Application Names Sales, Select box for Application | Check Box | Check boxes for applications names to be deleted. |
| Check Box | Check All | On clicking the "Check All" link should check all the check boxes in the HTML table. |
| Check Box | Clear All | On clicking the "Clear All" link should uncheck all the checked check boxes in the HTML table. |
| Delete | Delete | To Delete the data this button need to be clicked |

1.4.4.3 Front End Validation

Validation Details

This section provides the front end screen validations along with the associated message—Success/Error Message text

| # | Element Name | Action/Validation Details | Message |
|---|---|---|---|
| 1 | Application Name (Entry Field) | Accepts all the alphabets and numeric characters. | Max length: 50 Mandatory BPI_CAS_FSD_COMMON |
| 2 | Application Id (Entry Field) | Accepts all the alphabets and numeric characters. | Max length: 10 Mandatory BPI_CAS_FSD_COMMON |
| 3 | Comments/ Description | Accepts all the alphabets and numeric characters. | Max length: 255 |
| 4 | Module Name | Selection Box validation | Default: Choose One BPI_CAS_FSD_COMMON |

1.4.5 User Interface ID: SECURITY_SCREEN__012 (See FIG. P-24)

User Interface ID: SECURITY_SCREEN__013 (See FIG. P-25)

User Interface ID: SECURITY_SCREEN__0014 (See FIG. P-26)

1.4.5.1 User Interface Screen Snap Shot—Screen Name: Resource Master 1.4.5.2 Field Name, Element Type & Purpose Table for Screen SECURITY_SCREEN__012

| Element Name | Element Type | Purpose |
|---|---|---|
| Main Heading Create Resource | Text | To give the heading for the screen being navigated |
| Sub Header Resource ID | Text | Text for Resource Id |
| Resource ID | Entry Field | Text for the entry field |
| Sub Header Resource Name | Text | Text for Resource Name |
| Resource Name | Entry Field | Text for the entry field |
| Sub Header Screen URL | Text | Text for screen url |
| Screen URL | Entry Field | Text for the entry field |
| Resource Description | Text | Text for the Resource Description |
| Resource Description | Entry Field | Text for the entry field |
| Save | Button (HTML Button) | To Save the data this button need to be clicked |

-continued

| Element Name | Element Type | Purpose |
|---|---|---|
| Cancel | Button (HTML Button) | To cancel current operation. |

Table for Screen SECURITY_SCREEN__012 & Screen SECURITY_SCREEN__013

| Element Name | Element Type | Purpose |
|---|---|---|
| Search | Gif | To search the resource and application |

Table for Screen SECURITY_SCREEN__013

| Element Name | Element Type | Purpose |
|---|---|---|
| Main Heading Create Resource | Text | To give the heading for the screen being navigated |
| Sub Header Resource ID | Text | Text for Resource Id |
| Resource ID | Entry Field | Text for the entry field |
| Sub Header Resource Name | Text | Text for Resource Name |
| Resource Name | Entry Field | Text for the entry field |
| Sub Header Screen URL | Text | Text for screen url |

-continued

| Element Name | Element Type | Purpose |
|---|---|---|
| Screen URL | Entry Field | Text for the entry field |
| Resource Description | Text | Text for the Resource Description |
| Resource Description | Entry Field | Text for the entry field |
| Save | Button (HTML Button) | To Save the data this button need to be clicked |
| Cancel | Button (HTML Button) | To cancel current operation. |

Table for Screen SECURITY_SCREEN__14

| Element Name | Element Type | Purpose |
|---|---|---|
| Main Heading Delete Resources | Text | To give the heading for the screen being navigated |
| Sub Heading Select the Resources | Text | To give the sub heading for the screen being navigated |
| Resources | Check Box | Check boxes for Resources to be deleted. |
| Check Box | Check All | On clicking the "Check All" link should check all the check boxes in the HTML table. |
| Check Box | Clear All | On clicking the "Clear All" link should uncheck all the checked check boxes in the HTML table. |
| Delete | Delete | To Delete the data this button need to be clicked |

1.4.5.3 Front End Validation

Validation Details

This section provides the front end screen validations along with the associated message—Success/Error Message text

| # | Element Name | Action/Validation Details | Message |
|---|---|---|---|
| 1 | Resource Name (Entry Field) | Accepts all the alphabets and numeric characters. | Max length: 50<br>Mandatory<br>BPI CAS_FSD_COMMON |
| 2 | Resource Id (Entry Field) | Accepts all the alphabets and numeric characters. | Max length: 10<br>Mandatory<br>BPI CAS_FSD_COMMON |
| 3 | Screen URL (Entry Field) | Accepts all the alphabets and numeric characters. | Max length: 255<br>Mandatory<br>BPI_CAS FSD_COMMON |
| 4 | Comments/ Description | Accepts all the alphabets and numeric Max length: 255 characters. | |
| 5 | Application Name | Selection Box validation | Default: Choose One<br>"Mandatory"<br>BPI_CAS_FSD_COMMON |

1.4.6 User Interface ID: SECURITY_SCREEN__015 (See FIG. P-27)

Interface ID: SECURITY_SCREEN__016 (See FIG. P-28)

User Interface ID: SECURITY_SCREEN__017 (See FIG. P-29)

1.4.6.1 User Interface Screen Snap Shot—Screen Name: User Master 1.4.6.2 Field Name, Element Type & Purpose Table for Screen SECURITY_SCREEN__015

| Element Name | Element Type | Purpose |
|---|---|---|
| Main Heading Create User | Text | To give the heading for the screen being navigated |
| Sub Header User Id | Text | Text for the User Id |
| User Id | Entry Field | Text for the entry field |
| Sub Header Display Name | Text | Text for the Display Name |
| Display Name | Entry Field | Text for the entry field |
| Sub Header Name | Text | Text for the Name |
| Sub Header First Name | Text | Text for the First Name |
| First Name | Entry Field | Text for the entry field |
| Sub Header MI | Text | Text for Middle Initial |
| Middle Initial | Entry Field | Text for the entry field |
| Sub Header Last Name | Text | Text for last name |
| Last Name | Entry Field | Text for the entry field |
| Sub Header password | Text | Text for the password |
| Password | Entry Field | Text for the entry field |
| Sub Header Phone | Text | Text for the Phone |
| Phone | Entry Field | Text for the entry field |
| Sub Header Fax | Text | Text for the fax |
| Fax | Entry Field | Text for the entry field |
| Sub Header Extn | Text | Text for the ext |
| Extn | Entry Field | Text for the entry field |
| Sub Header email | Text | Text for the email |
| Email | Entry Field | Text for the entry field |
| Sub Header Lock | Text | Text for the lock |
| Lock | Check Box | Check box for lock field |
| Save | Button (HTML Button) | To Save the data this button need to be clicked |
| Cancel | Button (HTML Button) | To cancel current operation. |

Table for Screen SECURITY_SCREEN__016

| Element Name | Element Type | Purpose |
|---|---|---|
| Search | Gif | To search the user |

Table for Screen SECURITY_SCREEN__016

| Element Name | Element Type | Purpose |
|---|---|---|
| Main Heading Modify User | Text | To give the heading for the screen being navigated |
| Sub Header User Name | Text | Text for the User Name |
| Sub Header User Id | Text | Text for the User Id |
| User Id | Entry Field | Text for the entry field |
| Sub Header Display Name | Text | Text for the Display Name |
| Display Name | Entry Field | Text for the entry field |
| Sub Header Name | Text | Text for the Name |
| Sub Header First Name | Text | Text for the First Name |
| First Name | Entry Field | Text for the entry field |
| Sub Header MI | Text | Text for MI |
| MI | Entry Field | Text for the entry field |
| Sub Header Last Name | Text | Text for last name |
| Last Name | Entry Field | Text for the entry field |
| Sub Header password | Text | Text for the password |
| Password | Entry Field | Text for the entry field |
| Sub Header Phone | Text | Text for the Phone |
| Phone | Entry Field | Text for the entry field |
| Sub Header Fax | Text | Text for the fax |
| Fax | Entry Field | Text for the entry field |
| Sub Header Ext | Text | Text for the Ext |
| Ext | Entry Field | Text for the entry field |
| Sub Header email | Text | Text for the email |
| Email | Entry Field | Text for the entry field |
| Lock | Check Box | Check box for the lock field |
| Update | Button (HTML Button) | To Save the data this button need to be clicked |
| Cancel | Button (HTML Button) | To cancel current operation. |

Table for Screen SECURITY_SCREEN__017

| Element Name | Element Type | Purpose |
|---|---|---|
| Main Heading Delete User | Text | To give the heading for the screen being navigated |
| Sub Heading Select the User | Text | To give the sub heading for the screen being navigated |
| User Names | Check Box | Check boxes for User names to be deleted. |
| Sales, Select box for Application | | |
| Check Box | Check All | On clicking the “Check All” link should check all the check boxes in the HTML table. |
| Check Box | Clear All | On clicking the “Clear All” link should uncheck all the checked check boxes in the HTML table. |
| Delete | Delete | To Delete the data this button need to be clicked |

1.4.6.3 Front End Validation

Validation Details

This section provides the front end screen validations along with the associated message—Success/Error Message text

| # | Element Name | Action/Validation Details | Message |
|---|---|---|---|
| 1 | Display Name (Entry Field) | BPI_CAS_FSD_COMMON | Mandatory Max Length: 30 BPI_CAS_FSD_COMMON |

-continued

| # | Element Name | Action/Validation Details | Message |
|---|---|---|---|
| 2 | First Name (Entry Field) | BPI_CAS_FSD_COMMON | Mandatory Max Length: 25 BPI_CAS_FSD_COMMON |
| 3 | MI (Entry Field) | BPI_CAS_FSD_COMMON | Mandatory Max Length: 1 BPI_CAS_FSD_COMMON |
| 4 | Last Name (Entry Field) | BPI_CAS_FSD_COMMON | Mandatory Max Length: 35 BPI_CAS_FSD_COMMON |
| 5 | Pass-word (Entry Field) | BPI_CAS_FSD_COMMON | Mandatory Max Length: 15 Min Length: 6 BPI_CAS_FSD_COMMON |
| 6 | Phone | BPI_CAS_FSD_COMMON | Max Length: 10 BPI_CAS_FSD_COMMON |
| 7 | Fax | BPI_CAS_FSD_COMMON | Max Length: 10 BPI_CAS_FSD_COMMON |
| 8 | Extn | BPI_CAS_FSD_COMMON | BPI_CAS_FSD_COMMON |
| 9 | Email | BPI_CAS_FSD_COMMON | BPI_CAS_FSD_COMMON |
| 10 | Lock Status | BPI_CAS_FSD_COMMON | BPI_CAS_FSD_COMMON |

1.4.7 User Interface ID: SECURITY_SCREEN__0018 (See FIG. P-30)

User Interface ID: SECURITY_SCREEN__019 (See FIG. P-31)

User Interface ID: SECURITY_SCREEN__020 (See FIG. P-32)

1.4.7.1 User Interface Screen Snap Shot—Screen Name: User Role Master 1.4.7.2 Field Name, Element Type & Purpose Table for Screen SECURITY_SCREEN__018

| Element Name | Element Type | Purpose |
|---|---|---|
| Main Heading Create User Role | Text | To give the heading for the screen being navigated |
| Sub Header User Role Id | Text | Text for the User Role Id |
| User Role Id | Entry Field | Text for the entry field |
| Sub Header User Role Name | Text | Text for the User Role Name |
| User Role Name | Entry Field | Text for the entry field |
| Sub Header User Role Description | Text | Text for the User Role Name |
| User Role Description | Entry Field | Text for the entry field |
| Save | Button (HTML Button) | To Save the data this button need to be clicked |
| Cancel | Button (HTML Button) | To cancel current operation. |

Table for Screen SECURITY_SCREEN__019

| Element Name | Element Type | Purpose |
|---|---|---|
| Search | Gif | To search the user role |

Table for Screen SECURITY_SCREEN__019

| Element Name | Element Type | Purpose |
|---|---|---|
| Main Heading Modify User Role | Text | To give the heading for the screen being navigated |
| Sub Header User Role Id | Text | Text for the User Role Id |
| User Role Id | Entry Field | Text for the entry field |
| Sub Header User Role Name | Text | Text for the User Role Name |
| User Role Name | Entry Field | Text for the entry field |
| Sub Header User Role Description | Text | Text for the User Role Name |
| User Role Description | Entry Field | Text for the entry field |
| Update | Button (HTML Button) | To Save the data this button need to be clicked |
| Cancel | Button (HTML Button) | To cancel current operation. |

Table for Screen SECURITY_SCREEN__020

| Element Name | Element Type | Purpose |
|---|---|---|
| Main Heading Delete User Role | Text | To give the heading for the screen being navigated |
| Sub Heading Select the User Role | Text | To give the sub heading for the screen being navigated |
| User Role Names Sales, finance | Check Box | Check boxes for User Role names to be deleted. |
| Check Box | Check All | On clicking the "Check All" link should check all the check boxes in the HTML table. |
| Check Box | Clear All | On clicking the "Clear All" link should uncheck all the checked check boxes in the HTML table. |
| Delete | Delete | To Delete the data this button need to be clicked |

1.4.7.3 Front End Validation

Validation Details

This section provides the front end screen validations along with the associated message—Success/Error Message text

| # | Element Name | Action/Validation Details | Message |
|---|---|---|---|
| 1 | User Role Name (Entry Field) | BPI_CAS_FSD_COMMON | BPI_CAS_FSD_COMMON |
| 2 | User Role Id (Entry Field) | BPI_CAS_FSD_COMMON | BPI_CAS_FSD_COMMON |
| 3 | Comments/ Description | BPI_CAS_FSD_COMMON | Max length: 255 |

1.4.8 User Interface ID: SECURITY_SCREEN__021 (See FIG. P-33)

1.4.8.1 User Interface Screen Snap Shot—Screen Name: Group Access Rights 1.4.8.2 Field Name, Element Type & Purpose Table for Screen SECURITY_SCREEN__021

| Element Name | Element Type | Purpose |
|---|---|---|
| Main Heading Group Access Rights | Text | To give the heading for the screen being navigated |
| Sub Header Select Group | Text | Text for the Group Name |
| Group Name | Selection Box | Selection box for the Group Name |
| Sub Header Select Application | Text | Text for the Application Name |
| Application Name | Selection Box | Selection box for the Application Name |
| Select | Button (HTML Button) | To select the current selected Group to assign rights and modules. |
| Cancel | Button (HTML Button) | To cancel current operation. |

Table for Screen SECURITY_SCREEN__021

| Element Name | Element Type | Purpose |
|---|---|---|
| Main Heading Group Access Rights | Text | To give the heading for the screen being navigated |
| Sub Header Resource Name | Text | Text for the Resource Name |
| Resource Name | Check Boxes | Check boxes |
| Sub Header Access Rights | Text | Text for Access Rights |
| Combo Box | Combo Box | Combo box for selection of access rights. |
| Save | Button (HTML Button) | To Save the data this button need to be clicked |
| Cancel | Button (HTML Button) | To cancel current operation. |

1.4.8.3 Front End Validation

Validation Details

This section provides the front end screen validations along with the associated message—Success/Error Message text

| # | Element Name | Action/Validation Details | Message |
|---|---|---|---|
| 1 | Group Name | BPI_CAS_FSD_COMMON | BPI_CAS_FSD_COMMON |
| 2 | Application Name | BPI_CAS_FSD_COMMON | BPI_CAS_FSD_COMMON |
| 3 | Resource Id | BPI_CAS_FSD_COMMON | BPI_CAS_FSD_COMMON |

1.4.9 User Interface ID: SECURITY_SCREEN__022 (See FIG. P-34)

User Interface ID: SECURITY_SCREEN__023 (See FIG. P-35)

1.4.9.1 User Interface Screen Snap Shot—Screen Name: User, Role and Group Mapping 1.4.9.2 Field Name, Element Type & Purpose Table for Screen SECURITY_SCREEN__022

| Element Name | Element Type | Purpose |
|---|---|---|
| Main Heading User Search | Text | To give the heading for the screen being navigated |
| Sub Header Select User Id | Text | Text for the User Id |
| User Id | Text Box | Text Field for the User Id |
| Sub Header Select User Name | Text | Text for the User Name |
| User Name | Text Box | Text Field for the User Name |
| Search | Button (HTML Button) | To search the current selected User id |
| Cancel | Button (HTML Button) | To cancel current operation. |

Table Screen SECURITY_SCREEN__022

| Element Name | Element Type | Purpose |
|---|---|---|
| Main Heading User Search | Text | To give the heading for the screen being navigated |
| Sub Header Select User Id | Text | Text for the User Id |
| User Id | Text Field | Text Field for the User Id |
| Sub Header Select User Name | Text | Text for the User Name |
| User Name | Text Field | Text Field for the User Name |
| Search | Button (HTML Button) | To search the current selected User id |
| Cancel | Button (HTML Button) | To cancel current operation. |
| Sub Heading User Search Results | Text | To give the heading for the search screen |
| Sub Header User Id | Label | Text for the User Id |
| Sub Header User Name | Label | Text for the User Name |
| Data Row from database | User Id | User id from database. To be displayed in table |
| Data Row from database | User Name | User name from database. To be displayed in table |
| Cancel | Button (HTML Button) | To cancel current operation. |

Table for Screen SECURITY_SCREEN__023

| Element Name | Element Type | Purpose |
|---|---|---|
| Main Heading User Role Mapping | Text | To give the heading for the screen being navigated |
| Sub Header Select User Id | Text | Text for the User Id |
| User Id | Text Label | Text Label for the User Id |
| Sub Header Select User Name | Text | Text for the User Name |
| User Name | Text Label | Text Label for the User Name |
| Sub Header | Text | Text for the User Role |

-continued

| Element Name | Element Type | Purpose |
|---|---|---|
| Select User Role Selection box | Selection Box | Selection Box for User Role |
| Select | Button (HTML Button) | To select the current selected User id |
| Cancel | Button (HTML Button) | To cancel current operation. |

Table for Screen FIG. 33: Screen SECURITY_SCREEN__023

| Element Name | Element Type | Purpose |
|---|---|---|
| Main Heading User Role Mapping | Text | To give the heading for the screen being navigated |
| Sub Header Select User Id | Text | Text for the User Id |
| User Id | Text Label | Text Label for the User Id |
| Sub Header Select User Name | Text | Text for the User Name |
| User Name | Text Label | Text Label for the User Name |
| Sub Header User Role | Text | Text for the User Role |
| Text Label | Text Label | Selection Box for User Role |
| Sub Header Select the groups | Text | Text for the Groups |
| Check Box | Check Box | Check Box for groups. User can select one or more groups. |
| Select | Button (HTML Button) | To select the current selected User id |
| Cancel | Button (HTML Button) | To cancel current operation. |

1.4.10 User Interface ID: SECURITY_SCREEN__024 (See FIG. P-36)

User Interface ID: SECURITY_SCREEN__025 (See FIG. P-37)

1.4.10.1 User Interface Screen Snap Shot—Screen Name: Group Access Rights 1.4.10.2 Field Name, Element Type & Purpose Table for Screen SECURITY_SCREEN__024

| Element Name | Element Type | Purpose |
|---|---|---|
| Main Heading User Search | Text | To give the heading for the screen being navigated |
| Sub Header Select User Id | Text | Text for the User Id |
| User Id | Text Box | Text Field for the User Id |
| Sub Header Select User Name | Text | Text for the User Name |
| User Name | Text Box | Text Field for the User Name |
| Search | Button (HTML Button) | To search the current selected User id |
| Cancel | Button (HTML Button) | To cancel current operation. |

Table for Screen SECURITY_SCREEN__024

| Element Name | Element Type | Purpose |
|---|---|---|
| Main Heading User Search | Text | To give the heading for the screen being navigated |

-continued

| Element Name | Element Type | Purpose |
|---|---|---|
| Sub Header Select User Id | Text | Text for the User Id |
| User Id | Text Field | Text Field for the User Id |
| Sub Header Select User Name | Text | Text for the User Name |
| User Name | Text Field | Text Field for the User Name |
| Search | Button (HTML Button) | To search the current selected User id |
| Cancel | Button (HTML Button) | To cancel current operation. |
| Sub Heading User Search Results | Text | To give the heading for the search screen |
| Sub Header User Id | Label | Text for the User Id |
| Sub Header User Name | Label | Text for the User Name |
| Data Row from database | User Id | User id from database. To be displayed in table |
| Data Row from database | User Name | User name from database. To be displayed in table |
| Cancel | Button (HTML Button) | To cancel current operation. |

Table for Screen SECURITY_SCREEN__025

| Element Name | Element Type | Purpose |
|---|---|---|
| Main Heading User Access Rights | Text | To give the heading for the screen being navigated |
| Sub Header User Name | Text | Text for the User Name |
| User Name | Text | Text for the User Name |
| Sub Header User ID | Text | Text for the User Id |
| User Id | Text | Text for the User Id |
| Sub Header Module Name | Text | Text for the Module Name |
| Selection Box | Selection Box | Selection Box for Module name |
| Sub Header Role Name | Text | Text for the Role Name |
| Selection Box | Selection Box | Selection Box for Role name |
| Select | Button (HTML Button) | To select the current selected User assign rights for all the r application. |
| Cancel | Button (HTML Button) | To cancel current operation. |

Table for Screen SECURITY_SCREEN__025

| Element Name | Element Type | Purpose |
|---|---|---|
| Main Heading User Access Rights | Text | To give the heading for the screen being navigated |
| Sub Header Resource Name | Text | Text for the Resource Name |
| Resource name | Text | Text for the Resource Name |
| Sub Header Access Rights | Text | Text for Access Rights |
| Combo Box | Combo Box | Combo box for selection of access rights. |
| Save | Button (HTML Button) | To Save the data this button need to be clicked |
| Cancel | Button (HTML Button) | To cancel current operation. |

1.4.10.3 Front End Validation

Validation Details

This section provides the front end screen validations along with the associated message—Success/Error Message text

| # | Element Name | Action/Validation Details | Message |
|---|---|---|---|
| 1 | User Role | BPI_CAS_FSD_COMMON | "Please choose the User Role" |
| 2 | Module Name | BPI_CAS_FSD_COMMON | "Please choose the Module name" |
| 3 | Access Rights | BPI_CAS_FSD_COMMON | "Please choose the Resource name" |

1.4.11 User Interface ID: SECURITY_SCREEN__026 (See FIG. P-38)

1.4.11.1 User Interface Screen Snap Shot—Screen Name: Configurable Items 1.4.11.2 Field Name, Element Type & Purpose Table for Screen SECURITY_SCREEN__026

| Element Name | Element Type | Purpose |
|---|---|---|
| Main Heading Configure Items | Text | To give the heading for the screen being navigated |
| Sub Header Password Length | Text | Text for the Password Length |
| Password Length | Text Box | Text Field for the Password Length |
| Sub Header Password Length (Minimum) | Text | Text for the Password Length (Minimum) |
| Password Length (Minimum) | Text Box | Text Field for the Password Length (Minimum) |
| Sub Header Expiry of password (Max) | Text | Text for the Expiry of password |
| Expiry of password | Text Box | Text Field for the Expiry of password |
| Sub Header Expiry of password (Min) | Text | Text for the Expiry of password |
| Expiry of password | Text Box | Text Field for the Prompt Date Period |
| Sub Header Prompt Date Period | Text | Text for the Prompt Date Period |
| Prompt Date Period | Text Box | Text Field for the Expiry of password Prompt Date Period |
| Sub Header Password Repeat Count | Text | Text for the Password Repeat Count |
| Password Repeat Count | Text Box | Text Field for the Password Repeat Count |
| Sub Header Invalid Passwords Count | Text | Text for the Invalid Passwords Count |
| Invalid Passwords Count | Text Box | Text Field for the Invalid Passwords Count |
| Sub Header Lock Time | Text | Text for the Lock Time |
| Lock Time | Text Box | Text Field for the Lock Time |
| Search | Button (HTML Button) | To search the current selected User id |
| Cancel | Button (HTML Button) | To cancel current operation. |

1.4.11.3 Front End Validation

Validation Details

This section provides the front end screen validations along with the associated message—Success/Error Message text

| # | Element Name | Action/Validation Details | Message |
|---|---|---|---|
| 1 | Password Length (Maximum & Minimum) | Numeric (Integer) | Integer Length max 2<br>For eg Min Value 6<br>Max Value 10 |
| 2 | Expiry of password (Min) | Numeric (Integer) | Integer Length max 2<br>For eg Min Value 1<br>Max Value 99 |
| 3 | Expiry of password (Max) | Numeric (Integer) | Integer Length max 2<br>For eg Min Value 0<br>Max Value 99<br>Should be greater than Expiry of password (Min) |
| 4 | Password Repeat Count | Numeric (Integer) | Integer Length max 2<br>For eg Min Value 1<br>Max Value 10 |
| 5 | Invalid Passwords Count | Numeric (Integer) | Integer Length max 2<br>For eg Min Value 1<br>Max Value 10 |
| 6 | Lock Time (Minutes) | Numeric (Integer) | Integer Length max 2<br>For eg Min Value 10<br>Max Value 36000 |
| 7 | Password Length (Minimum) | Numeric (Integer) | Integer Length max 2<br>For eg Min Value 6<br>Max Value 10<br>Less than maximum length of password |
| 8 | Prompt Date Period for expiration | Numeric (Integer) | Less than maximum limit for expiration date<br>For eg Min Value 1<br>Max Value 10 |

1.4.12 User Login

When the system user logs in into the core administration system the separate ACL will be generated for each user. The ACL will be stored in the User Profile object, which will be stored in the user session. When user request for a particular page controller will check with the security system whether user is having access to the particular page.

When any user requests a particular page in the core administrative system, the controller will ask the security system about the security rights for the application. If user is having rights he will be allowed to perform the current operation.

For e.g. If user request for create carrier master. The carrier master is registered into the system with system with id as 0001. The controller will check the access rights for the carrier master. If the rights for carrier master is write then user will have access to create carrier master as the user rights are higher than requested one. If user is having access rights as read for carrier master then he would not be able to access because it is having lower rights than requested one.

Password Validation

Password validation to be done as per the requirements specified before. The following items need to be configured as per requirements.

1.5 Business Rules

| Activity | Rules |
|---|---|
| Delete Rule | For Deleting referential integrity need to be considered.<br>A group can be deleted if no user is referring to the group<br>Same applies to other hierarchy<br>Module<br>Application<br>Resource |

1.6 Help Menu

Help to be provided for all the screens. Help should contain following details.

Basic Functionality Description

Description about the screen fields.

1.7 Process-Data Structure

This section describes the likely data structure that would contain the data for/by executing the process

BPI_MODULES

| Data Element Name | Data Element Type | Constraints |
|---|---|---|
| MODULE_ID | Varchar (10) | PK Not Null |
| MODULE_NAME | Varchar (50) | Not Null |
| DESCRIPTION | Varchar (255) | |
| CREATED_BY | Varchar (25) | |
| CREATED_DATE | Timestamp | |
| MODIFIED_BY | Varchar (25) | |
| LAST_MODIFIED_DATE | Timestamp | |
| STATUS | NUMBER | 1-Active<br>0-Inactive |

BPI_GROUPS

| Data Element Name | Data Element Type | Constraints |
|---|---|---|
| GROUP_ID | Varchar (10) | PK Not Null |
| DESCRIPTION | Varchar (255) | Not Null |
| GROUP_NAME | Varchar (50) | |
| CREATED_BY | Varchar (25) | |
| CREATED_DATE | Timestamp | |
| MODIFIED_BY | Varchar (25) | |
| LAST_MODIFIED_DATE | Timestamp | |
| STATUS | NUMBER | 1-Active<br>0-Inactive |

BPI_APPLICATIONS

| Data Element Name | Data Element Type | Constraints |
|---|---|---|
| APPLICATION_ID | Varchar (10) | PK Not Null |
| APPLICATION_NAME | Varchar (50) | Not Null |
| DESCRIPTION | Varchar (255) | |
| MODULE_ID | Varchar (10) | FK Refers BPI_MODULES |
| CREATED_BY | Varchar (25) | |
| CREATED_DATE | Timestamp | |
| MODIFIED_BY | Varchar (25) | |
| LAST_MODIFIED_DATE | Timestamp | |
| STATUS | NUMBER | 1-Active<br>0-Inactive |

BPI_RESOURCES

| Data Element Name | Data Element Type | Constraints |
|---|---|---|
| RESOURCE_ID | Varchar (10) | PK Not Null |
| RESOURCE_NAME | Varchar (50) | Not Null |
| DESCRIPTION | Varchar (255) | |
| APPLICATION_ID | Varchar (10) | FK Refers BPI_APPLICATIONS |
| CREATED_BY | Varchar (25) | |
| CREATED_DATE | Timestamp | |
| MODIFIED_BY | Varchar (25) | |
| LAST_MODIFIED_DATE | Timestamp | |
| STATUS | NUMBER | 1 Active<br>0-Inactive |

BPI_ACL

| Data Element Name | Data Element Type | Constraints |
|---|---|---|
| ACL_ID | Varchar (10) | PK Not null |
| ACL_NAME | Varchar (50) | Not null |
| CREATED_BY | Varchar (25) | |
| CREATED_DATE | Timestamp | |
| MODIFIED_BY | Varchar (25) | |
| LAST_MODIFIED_DATE | Timestamp | |
| STATUS | NUMBER | 1 Active<br>0-Inactive |

BPI_ROLES

| Data Element Name | Data Element Type | Constraints |
|---|---|---|
| ROLE_ID | Varchar (10) | PK Not null |
| ROLE_NAME | Varchar (50) | Not null |
| CREATED_BY | Varchar (25) | |
| CREATED_DATE | Timestamp | |
| MODIFIED_BY | Varchar (25) | |
| LAST_MODIFIED_DATE | Timestamp | |
| STATUS | NUMBER | 1 Active<br>0-Inactive |

BPI_USERS

| Data Element Name | Data Element Type | Constraints |
|---|---|---|
| USER_ID | Varchar (10) | PK Not null |
| PASSWORD | Varchar (30) | Not null |
| ADDRESS 1 | Varchar (30) | |
| ADDRESS 2 | Varchar (30) | |
| CITY | Varchar (25) | |
| STATE | Varchar (25) | |
| ZIP | Varchar (25) | |
| COUNTRY | Varchar (25) | |
| PHONE 1 | Varchar (25) | |
| PHONE 2 | Varchar (25) | |
| PHONE 3 | Varchar (25) | |
| CREATED_BY | Varchar (25) | |
| CREATED_DATE | Timestamp | |
| MODIFIED_BY | Varchar (25) | |
| LAST_MODIFIED_DATE | Timestamp | |
| STATUS | Number | 1 Active<br>0 Inactive |
| PASSWORD_EXPIRY_DATE | Timestamp | |
| LOCK_STATUS | Number | |

BPI_GROUP_ACCESS

| Data Element Name | Data Element Type | Constraints |
|---|---|---|
| GROUP_ID | Varchar (10) | Not null Refers BPI_GROUPS |
| RESOURCE_ID | Varchar (105) | Not null Refers BPI_RESOURCES |
| APPLICATION_ID | Varchar (10) | Not null Refers BPI_APPLICATIONS |
| ACL_ID | Varchar (10) | Not null Refers BPI_ACL |
| CREATED_BY | Varchar (25) | |
| CREATED_DATE | Timestamp | |
| MODIFIED_BY | Varchar (25) | |
| LAST_MODIFIED_DATE | Timestamp | |
| STATUS | Number | 1 Active<br>0 Inactive |

BPI_USER_ROLES

| Data Element Name | Data Element Type | Constraints |
|---|---|---|
| USER_ID | Varchar (10) | Not Null Refers BPI_USERS |
| ROLE_ID | Varchar (10) | Not Null Refers BPI_ROLES |
| GROUP_ID | Varchar (10) | Not Null Refers BPI_USGROUPS |
| CREATED_BY | Varchar(25) | |
| CREATED_DATE | Timestamp | |
| MODIFIED_BY | Varchar(25) | |
| LAST_MODIFIED_DATE | Timestamp | |
| Status | Number | 1 Active<br>0 Inactive |

BPI_USER_ACCESS

| Data Element Name | Data Element Type | Constraints |
|---|---|---|
| RESOURCE_ID | Varchar (10) | Not Null Refers BPI_RESOURCE |
| USER_ID | Varchar (25) | Not Null Refers BPI_USERS |
| ACL_ID | Varchar (10) | Not Null Refers BPI_ACL |
| ROLE_ID | Varchar (10) | |
| CREATED_BY | Varchar (25) | |
| CREATED_DATE | Timestamp | |
| MODIFIED_BY | Varchar (25) | |
| LAST_MODIFIED_DATE | Timestamp | |
| Status | Number | 1 Active<br>0 Inactive |

BPI_USER_PASSWORD_HISTORY

| Data Element Name | Data Element Type | Constraints |
|---|---|---|
| USER_ID | Varchar (10) | Not Null Refers BPI_USERS |
| PASSWORD | Varchar (10) | Not Null |
| CREATED_BY | Varchar (25) | |
| CREATED_DATE | Timestamp | |
| MODIFIED_BY | Varchar (25) | |
| LAST_MODIFIED_DATE | Timestamp | |
| Status | Number | 1 Active<br>0 Inactive |

1.8 Back End Validations

This subsection provides the field element name and corresponding back end validation if applicable.

Back end validations are those validations where the validations have got to be necessarily done using the database.

As a general rule backend validations should be done for all the validation checks that are being carrier on the front end.

1.9 Non-Functional Requirements

This subsection corresponds to the requirements that do not relate to the user function. It provides information on the system requirements—Ideally identifies the present problems in the existing system from a non-functional perspective and avoiding the same in the new system

| Non Functional Requirement | Details |
|---|---|
| Performance | Performance criteria should be established based on the data size and the page size. |
| System Exception | All system exceptions should be handled grace fully throwing a error page with relevant exception information and action to be taken for resolving the exception |

1.10 Access Control List

This section describes the classification of users who can access the process under definition

| User ID | Job Description | Functionality | Access Level |
|---|---|---|---|

Benefit Partners Inc

Process Specification

Common Functional Features

1. Introduction 1.1. Purpose

The purpose of this document is to describe the common functional features available across all the modules. This document is identified as Common Functional Features. This document identifies how the user interacts with the system, the data to be captured, the business logic to be implemented, and the output of the process for the common functional features.

1.2. Business Use Case Specification Reference

| Business Use Specification ID | Business Use Case Name |
|---|---|
| BPI_SCOPE | Scope Document |
| BPI_SCOPE_ADD | Addendum to scope |

1.3. Definitions, Acronyms & Abbreviations

| Term | Explanation |
|---|---|

2. Process Identification 2.1. Background

Common functional feature is to identify the common functionality across all the modules that have the same usage. This would help in standardization and reuse of the components.

2.2. Process Description

The objective of the Common Functional Features process is to:

1) Identify the Common functional features across all the modules:

2.3. Process Flow

Not applicable

3. User Interface 3.1. User Interface Screens 3.1.1. Not Applicable 3.1.2. Not Applicable 3.1.3. Element Name, Element Type & Purpose

| Element Name | Element Type | Purpose |
|---|---|---|
| First name | Entry Field | Enter the First name |
| Last name | Entry Field | Enter the last name |
| Middle name (MI) | Entry Field | Enter the middle Name |
| Suffix | Drop Down List | List the Suffix |
| Salutation | Drop Down List | List the Salutation |
| Title | Entry Field | Enter the Job Title |
| Address | Entry Field | Enter the first detail about the address |
| Suite/Apt. # | Entry Field | Enter the suite/Apartment PO BOX number |
| City | Entry Field | Enter the name of the city |
| State | Drop Down List | List all the States in UAS |
| ZIP | Entry Field | Enter the ZIP Code |
| Phone # | Enter Field | Enter the Phone number |
| Fax # | Entry Field | Enter the FAX number |
| Phone Extension | Entry Field | Enter extension number |
| FAX Extension | Entry Field | Enter extension number |
| Email Address | Entry Field | Enter the email address |
| Credit Card Number | Enter the Credit Card Number | Entry Credit Card number |
| Credit Card Type | Drop Down List | List the type of Credit Card |
| (Date) Current Date (System Date) | Calendar/ Entry Field | Entry field to type the date or Calendar to pick the date |
| (Date) Past Date (1900 to system date) | Calendar/ Entry Field | Entry field to type the date or Calendar to pick the date |
| (Date) Future Date | Calendar/ | Entry field to type the date or |
| (System date to 100 Yr. hence) | Entry Field | Calendar to pick the date |
| (Date) Default 1st of Following Month (eg. System date is Dec. 2, 2001 should default to Jan. 1, 2002) | Calendar/ Entry Field | Entry field to type the date or Calendar to pick the date |
| (Date) Default 1st of the current Month (e.g. System date is Dec. 2, 2001 should default to Dec. 1, 2001) | Calendar/ Entry Field | Entry field to type the date or Calendar to pick the date |
| (Date) Default End of current Month (eg. System date is Dec. 2, 2001 should default to Dec. 31, 2001) | Calendar/ Entry Field | Entry field to type the date or Calendar to pick the date |
| (Date) Credit Card | Drop Down List | List all the Months in a year |
| Date (should only accept future date.) Month | | |
| Date) Credit Card | Drop Down List | List the year 25 years ahead |
| Date (should only accept future date.) Year | | |
| Social Security Number | Entry Field | Enter the Social Security number |
| TAX Identification Number | Entry Field | Enter the Tax Identification Number |
| Mode of Communication | Drop Down List | List Various modes of communication |
| Browser Back Button | Button | Validate the back button |
| Browser Forward Button | Button | Validate the forward button |
| Refresh Button | Button | Validate Refresh button |
| Address Bars | Tool Bars | Hide Address bar |
| Link Bar | Tool Bars | Hide Link bar |
| Standard Button | Tool bars | Hide standard bars |
| Window Close | Browser Window | Validate Close |
| Window Minimize | Browser Window | Validate minimize |

3.1.4. Screen Validations

Note: Validation provided here are the default validations. However if the module functionality has specified different validations for these element described then that would override the default validations provided here.

| Element Name | Action/Validation Details | Message |
|---|---|---|
| First name | Entry Field with 40 Character long. Can accept only Alpha characters. Arnold | |
| Last name | Entry Field with 40 Character long Can accept only Alpha characters. Schwarzenegger | |
| Middle name (MI) | Entry Field with 1 Character long Can accept only Alpha characters. M, A etc. | |
| Suffix | List should include Jr., Sr., I., II., III., IV., and V. | |
| Salutation | List should include Mr., Mrs., Ms. | |
| Title | Entry Field with 20 Character long Can accept Alpha and numeric character and blank space between character (Example Administrator 1) | |
| Address | Entry Field with 40 Character long 3013 Douglas Boulevard, Can accept free form entry with any character. | |
| Suite/Apt. # | Entry Field with 20 Character long Example 200 or 1 D etc. Can accept free form entry with any character. | |
| City | Entry Field with 20 Character long Alpha only and Blank between words allowed Roseville, San Jose, San Diego | |
| State | List all the States in USA in abbreviated form as CA, IL, OH, NY etc. | |
| ZIP | Should allow maximum and minimum of 5 Numbers only. Whole Number Field. | |
| Phone # | Entry Field with 10 Character long Should allow maximum and minimum of 10 Numbers only. Whole Number Field. 3 for Area code, 7 for the number. | |
| Fax # | Entry Field with 10 Character long Should allow maximum and minimum of 10 Numbers only. Whole Number Field. 3 for Area code, 7 for the number. | |
| Phone Extension | Entry Field with 5 Character long Should allow maximum of 5 and minimum of 1. Blanks fields are acceptable. Whole Number Field. | |
| FAX Extension | Entry Field with 5 Character long Should allow maximum of 5 and minimum of 1. Blanks fields are acceptable. Whole Number Field. | |
| Email Address | Entry Field with 40 Character long Allow entering more than 40 character. Validate for a Valid Email Address. | |
| Credit Card Number | Entry Field with 20 Character long Minimum and maximum value should be 16. Allow only Whole Number. Numeric Field For Amex allow 20 as min and max value. | |
| Credit Card Type | List Credit Card type as Visa, Master, Discovery, Amex etc | |
| (Date) Current Date (System Date) | Entry Field or Calendar with default system date in the Entry Field and calendar. | |
| (Date) Past Date | Entry Field or Calendar with default | |

-continued

| Element Name | Action/Validation Details | Message |
|---|---|---|
| (1900 to system date) | system date - 1 in the Entry Field and calendar. Do not allow for Current date and future date | |
| (Date) Future Date (System date to 100 Yr. hence) | Entry Field or Calendar with default system date in the Entry Field and calendar. Do not allow for past date | |
| (Date) Default 1st of Following Month (eg. System date is Dec. 2, 2001 should default to Jan. 1, 2002) | Entry Field or Calendar with default first of the following month date in the Entry Field and calendar. | |
| (Date) Default 1st of the current Month (e.g. System date is Dec. 2, 2001 should default to Dec. 1, 2001) | Entry Field or Calendar with default first of the current month date in the Entry Field and calendar. | |
| (Date) Default End of current Month (eg. System date is Dec. 2, 2001 should default to Dec. 31, 2001) | Entry Field or Calendar with default end of the current month date in the Entry Field and calendar. | |
| (Date) Credit Card Date (should only accept future date.) Month | List to show all the months in a year | |
| Date) Credit Card Date (should only accept future date.) Year | List the years from current year to 100 years forward hence. Validate The Credit Card month and year together. Should not have past month as credit card entry. | |
| Social Security Number | Entry Field with 9 Character long Should allow maximum of 9 and minimum of 9. Whole Number Field. | |
| TAX Identification Number | Entry Field with 9 Character long Should allow maximum of 9 and minimum of 9. Whole Number Field. | |
| Mode of Communication | List various modes of Communication like Fax, Phone, Email, USPS | |
| Browser Back Button | Disable the browser back button and hide the back button | |
| Browser Forward Button | Disable the browser forward button and hide the forward button | |
| Refresh Button | Disable the browser refresh button and hide the refresh button | |
| Address Bars | Disable the address bar so that user cannot type the URL to navigate to the respective screen | |
| Link Bar | Disable the link bar | |
| Standard Button | Disable the browser standard button | |
| Window Close | Catch windows close event with Java script and show the message. | |
| Window Minimize | Allow to minimize the window | |

3.1.5. Interface Flow

N/A 3.1.6. Help Menu

| Element Name | Purpose | Valid Values |
|---|---|---|

4. Business Rule Mapping
Not Applicable

| Activity | Rules |
| --- | --- |
| | 1. |

5. Data Structures
Not Applicable

| Data Element Name | Data Element Type |
| --- | --- |

5.1. Back End Validations
Not Applicable

| Field Element Name | Back End Validation |
| --- | --- |

6. Non-Functional Requirements
Not Applicable

| Non Functional Requirement | Details |
| --- | --- |

7. Access Control List
Not Applicable

| User ID | Job Description | Functionality | Access Level |
| --- | --- | --- | --- |

What is claimed is:

1. An automated benefits administration system of the type used to administer benefits subject to business rules for such benefits, the benefits being organized as multiple benefit plans offered from multiple carriers, the benefits administration system comprising:

a processor;

memory; and storage storing plural applications that include:

(A) an automated business rules application including software instructions for automatically applying multiple business rules to data input for enrollment data, eligibility data, and group maintenance data, and further including software instructions for making business rule decisions based on said data input, wherein the multiple business rules include:

one or more enrollment rules, each of the one or more enrollment rules pertaining to enrollment in one of the multiple benefit plans from one of the multiple carriers, each of the multiple benefit plans including at least one health care benefit;

one or more eligibility rules, each of the one or more eligibility rules pertaining to eligibility for at least one health care benefit available as part of one of the multiple benefit plans from one of the multiple carriers; and one or more group maintenance rules, each of the one or more group maintenance rules pertaining to enrollment or eligibility activities for a group of one or more members; and (B) an automatic action application including software instructions for issuing notices for business rule discrepancies based on said data input;

wherein the storage also stores an accounting module that includes software instructions for:

receiving a change notification that indicates a change in enrollment for a group for which an invoice has been generated, the invoice indicating an invoice amount;

receiving a payment notification that indicates a payment amount from the group for which the invoice has been generated;

determining that the payment amount differs from the invoice amount; and automatically accounting for the change in enrollment for the group for which the invoice has been generated by adjusting an amount due to reconcile the payment amount and the invoice amount.

2. The automated benefits administration system of claim 1 wherein the storage also stores: (C) a business rules database having the multiple business rules and making the multiple business rules accessible to the automated business rules application, whereby the automated business rules application may apply the multiple business rules from said business rules database.

3. The automated benefits administration system of claim 1 wherein the storage also stores: (C) a business rule override tool through which a user may override one or more of the multiple business rules applied by the automated business rules application based on user authority level, wherein the business rule override tool includes software instructions for:

identifying an exception to one of the multiple business rules;

determining type of the exception;

identifying an authority level of the user; and determining whether or not to override the exception based upon the authority level of the user and the type of the exception.

4. The automated benefits administration system of claim 2 wherein the storage also stores: (D) a business rule override tool through which a user may override one or more of the multiple business rules applied by the automated business rules application based on user authority level, wherein the business rule override tool includes software instructions for:

identifying an exception to one of the multiple business rules;

determining type of the exception;

identifying an authority level of the user; and determining whether or not to override the exception based upon the authority level of the user and the type of the exception.

5. The automated benefits administration system of claim 3 wherein the determining the type of the exception comprises classifying the exception as one of multiple types of exceptions in the system, the multiple types of exceptions including:

a first exception type that indicates missing enrollment data;

a second exception type that indicates inconsistent enrollment data;

a third exception type that indicates failure of one of the one or more eligibility rules; and a fourth exception type that indicates failure of one of the one or more group maintenance rules.

6. The automated benefits administration system of claim 3 wherein the determining the authority level comprises setting the authority level as one of multiple types of authority levels in the system, the multiple types of authority levels including:

a first authority level that indicates absence of authority to override exceptions to the multiple business rules;

a second authority level that indicates authority to override exceptions that relate to missing enrollment data but not to eligibility; and a third authority level that indicates authority to override any exceptions to the multiple business rules.

7. The automated benefits administration system of claim 1 wherein the change in enrollment for the group for which the invoice has been generated is a termination of a member of the group for which the invoice has been generated, and wherein the adjustment comprises decreasing the amount due based upon the termination.

8. The automated benefits administration system of claim 1 wherein the automated business rules application further includes software instructions for:

from a first user having a first authority level, accepting the enrollment data and the eligibility data for a given application;

checking the enrollment data and the eligibility data for the application against the one or more enrollment rules and the one or more eligibility rules, respectively, to identify one or more exceptions;

presenting at least one of the one or more exceptions to a second user for review, the second user having a second authority level higher than the first authority level;

accepting user input from the second user indicating whether to override the at least one of the one or more exceptions;

if any of the one or more exceptions remains, for at least one remaining exception:

presenting the remaining exception to a third user having a third authority level higher than the second authority level; and accepting user input from the third user indicating whether to override the remaining exception; and if none of the one or more exceptions remains, finalizing the application.

9. The automated benefits administration system of claim 8 wherein the first authority level is data entry authority level, the second authority level is supervisor authority level, and the third authority level is manager authority level.

10. The automated benefits administration system of claim 1 wherein the plural applications and the accounting module of the automated benefits administration system are distributed across a computer network.

11. A benefits administration method of operating an automated benefits administration computing system of the type for administering benefits subject to business rules for said benefits, the automated benefits administration computing system including a processor, memory and storage, the benefits being organized as multiple benefit plans offered from multiple carriers, the benefits administration method comprising:

(A) with the automated benefits administration computing system, automatically applying multiple business rules to data input for enrollment data, eligibility data, and group maintenance data, and making business rule decisions based on said data input, wherein the multiple business rules include:

one or more enrollment rules, each of the one or more enrollment rules pertaining to enrollment in one of the multiple benefit plans from one of the multiple carriers, each of the multiple benefit plans including at least one health care benefit;

one or more eligibility rules, each of the one or more eligibility rules pertaining to eligibility for at least one health care benefit available as part of one of the multiple benefit plans from one of the multiple carriers; and one or more group maintenance rules, each of the one or more group maintenance rules pertaining to enrollment or eligibility activities for a group of one or more members; and (B) with the automated benefits administration computing system, automatically issuing notices for business rule discrepancies based on said data input;

(C) with the automated benefits administration computing system, if one of the multiple business rules is not satisfied when applied to said data input, providing a business rule override of the non-satisfied business rule as selected by a user have a predetermined authority level: and (D) with the automated benefits administration computing system, automatically accounting for a change in enrollment for a group for which an invoice has been generated, the invoice indicating an invoice amount, including:

receiving a change notification that indicates the change in enrollment for the group for which the invoice has been generated;

receiving a payment notification that indicates a payment amount from the group for which the invoice has been generated;

determining that the payment amount differs from the invoice amount; and automatically accounting for the change in enrollment for the group for which the invoice has been generated by adjusting an amount due to reconcile the payment amount and the invoice amount.

12. The benefits administration method of claim 11 further comprising, during said automatic application step (A), automatically accessing a business rules database having the multiple business rules.

13. The benefits administration method of claim 11 wherein the providing the business rule override includes:

identifying an exception to one of the multiple business rules;

determining type of the exception;

identifying the predetermined authority level of the user; and deciding to override the exception based upon the predetermined authority level of the user and the type of the exception.

14. A benefits administration method of operating an automated benefits administration computing system of the type for administering benefits subject to business rules for said benefits, the automated benefits administration computing system including a processor, memory and storage, the benefits being organized as multiple benefit plans offered from multiple carriers, the benefits administration method comprising:

(A) with the automated benefits administration computing system, automatically applying multiple business rules, including at least all legally-required rules and additional business rules, to data input for enrollment data, eligibility data, and group maintenance data, and making business rule decisions based on said data input, wherein the multiple business rules include:

one or more enrollment rules, each of the one or more enrollment rules pertaining to enrollment in one of the multiple benefit plans from one of the multiple carriers, each of the multiple benefit plans including at least one health care benefit;

one or more eligibility rules, each of the one or more eligibility rules pertaining to eligibility for at least one health care benefit available as part of one of the multiple benefit plans from one of the multiple carriers; and one or more group maintenance rules, each of the one or more group maintenance rules pertaining to enrollment or eligibility activities for a group of one or more members;

(B) with the automated benefits administration computing system, automatically issuing notices for business rule discrepancies based on said data input, including automatic issuance of one or more attention notices to a remote managing party upon entry of certain unsatisfactory data during local data input;

(C) with the automated benefits administration computing system, providing at least remote enrollment access over the Internet to said automated benefits administration computing system: and (D) with the automated benefits administration computing system, automatically accounting for a change in enrollment for a group for which an invoice has been generated, the invoice indicating an invoice amount, including:

receiving a change notification that indicates the change in enrollment for the group for which the invoice has been generated;

receiving a payment notification that indicates a payment amount from the group for which the invoice has been generated;

determining that the payment amount differs from the invoice amount; and automatically accounting for the change in enrollment for the group for which the invoice has been generated by adjusting an amount due to reconcile the payment amount and the invoice amount.

15. The benefits administration method of claim 14 wherein the providing remote enrollment access over the Internet includes:

accepting the enrollment data and the eligibility data for a given application;

checking the enrollment data for the given application against the one or more enrollment rules;

checking the eligibility data for the given application against the one or more eligibility rules;

upon satisfaction of the one or more enrollment rules and the one or more eligibility rules, routing a completed version of the given application to a reviewer for approval; and upon receipt of approval from the reviewer, finalizing enrollment for the given application.

16. An automated benefits administration system of the type used to administer benefits subject to business rules for such benefits, the benefits being organized as multiple benefit plans offered from multiple carriers, the benefits administration system comprising:

a processor; and storage storing an accounting module that includes computer-executable instructions for causing the processor to perform a method comprising:

receiving a change notification that indicates a change in enrollment for a group for which an invoice has been generated, the invoice indicating an invoice amount;

receiving a payment notification that indicates a payment amount from the group for which the invoice has been generated;

determining that the payment amount differs from the invoice amount; and automatically accounting for the change in enrollment for the group for which the invoice has been generated by adjusting an amount due to reconcile the payment amount and the invoice amount;

the group for which the invoice has been generated having been administered using plural applications comprising:

(A) an automated business rules application including software instructions for automatically applying multiple business rules to data input for enrollment data, eligibility data, and group maintenance data, and further including software instructions for making business rule decisions based on said data input, wherein the multiple business rules include:

one or more enrollment rules, each of the one or more enrollment rules pertaining to enrollment in one of the multiple benefit plans from one of the multiple carriers, each of the multiple benefit plans including at least one health care benefit;

one or more eligibility rules, each of the one or more eligibility rules pertaining to eligibility for at least one health care benefit available as part of one of the multiple benefit plans from one of the multiple carriers; and one or more group maintenance rules, each of the one or more group maintenance rules pertaining to enrollment or eligibility activities for the group; and (B) an automatic action application including software instructions for issuing notices for business rule discrepancies based on said data input.

* * * * *